US007546602B2

(12) United States Patent
Hejlsberg et al.

(10) Patent No.: US 7,546,602 B2
(45) Date of Patent: Jun. 9, 2009

(54) APPLICATION PROGRAM INTERFACE FOR NETWORK SOFTWARE PLATFORM

(75) Inventors: Anders Hejlsberg, Seattle, WA (US); Brian K. Pepin, Seattle, WA (US); Chad W. Royal, Redmond, WA (US); Christopher L. Anderson, Issaquah, WA (US); Giovanni M. Della-Libera, Seattle, WA (US); Mark A. Boulter, Redmond, WA (US); Nicholas M. Kramer, Redmond, WA (US); Shawn P. Burke, Kirkland, WA (US); Subhag P. Oak, Redmond, WA (US); Sreeram Nivarthi, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 227 days.

(21) Appl. No.: 09/902,812

(22) Filed: Jul. 10, 2001

(65) Prior Publication Data

US 2003/0177282 A1 Sep. 18, 2003

(51) Int. Cl.

| | |
|---|---|
| ***G06F 3/00*** | (2006.01) |
| ***G06F 9/44*** | (2006.01) |
| ***G06F 9/46*** | (2006.01) |
| ***G06F 13/00*** | (2006.01) |

(52) U.S. Cl. ........................ 719/313; 719/320; 717/114

(58) Field of Classification Search ................. 719/310, 719/328, 313, 320; 717/101–103, 114
See application file for complete search history.

(56) References Cited

U.S. PATENT DOCUMENTS 5,218,699 A 6/1993 Brandle et al.
5,430,876 A 7/1995 Schreiber et al.
5,689,700 A 11/1997 Miller et al.
5,748,962 A 5/1998 Brechtel et al.
5,761,494 A 6/1998 Smedley et al.
5,822,580 A 10/1998 Leung
5,903,753 A 5/1999 Bramnick et al.
5,937,406 A 8/1999 Balabine et al.
5,943,424 A 8/1999 Berger et al.
5,956,509 A 9/1999 Kevner
5,987,517 A 11/1999 Firth et al.
6,061,743 A 5/2000 Thatcher et al.
6,175,878 B1 1/2001 Seaman et al.
6,209,124 B1 3/2001 Vermeire et al.
6,256,678 B1 7/2001 Traughber et al.
6,275,871 B1 8/2001 Reinfelder et al.
6,282,581 B1 8/2001 Moore et al.
6,298,354 B1 10/2001 Saulpaugh et al.
6,349,343 B1 2/2002 Foody et al.
6,353,830 B1 3/2002 Yee et al.
6,360,230 B1 3/2002 Chan et al.
6,360,266 B1 3/2002 Pettus (Continued)

OTHER PUBLICATIONS

Gould, Develop n-tier applications using J2EE, Java World, Dec. 2000, pp. 1-10.*

(Continued)

*Primary Examiner*—Meng-Ai An
*Assistant Examiner*—Diem K Cao
(74) *Attorney, Agent, or Firm*—Lee & Hayes, PLLC

(57) ABSTRACT

An application program interface (API) provides a set of functions for application developers who build Web applications on Microsoft Corporation's .NET™ platform.

30 Claims, 4 Drawing Sheets

U.S. PATENT DOCUMENTS

| | | | |
|---|---|---|---|
| 6,381,632 | B1 | 4/2002 | Lowell |
| 6,418,448 | B1 | 7/2002 | Sarkar |
| 6,430,593 | B1 | 8/2002 | Lindsley |
| 6,442,548 | B1 | 8/2002 | Balabine et al. |
| 6,446,253 | B1 | 9/2002 | Mellmer |
| 6,446,256 | B1 | 9/2002 | Hyman et al. |
| 6,473,794 | B1 | 10/2002 | Guheen et al. |
| 6,480,865 | B1 | 11/2002 | Lee et al. |
| 6,487,578 | B2 | 11/2002 | Ranganathan |
| 6,507,856 | B1 | 1/2003 | Chen et al. |
| 6,519,571 | B1 | 2/2003 | Guheen et al. |
| 6,536,037 | B1 | 3/2003 | Guheen et al. |
| 6,598,093 | B1 | 7/2003 | Schmidt et al. |
| 6,609,158 | B1 | 8/2003 | Nevarez et al. |
| 6,615,166 | B1 | 9/2003 | Guheen et al. |
| 6,643,652 | B2 | 11/2003 | Helgeson et al. |
| 6,721,713 | B1 | 4/2004 | Guheen et al. |
| 6,792,605 | B1 | 9/2004 | Roberts et al. |
| 6,938,079 | B1 | 8/2005 | Anderson et al. |
| 6,961,750 | B1 | 11/2005 | Burd et al. |
| 6,968,503 | B1 | 11/2005 | Chang et al. |
| 7,013,340 | B1 | 3/2006 | Burd et al. |
| 2002/0073236 | A1 | 6/2002 | Helgeson et al. |
| 2002/0092004 | A1 | 7/2002 | Lee et al. |
| 2002/0099687 | A1 | 7/2002 | Krishnaprasad et al. |
| 2002/0112078 | A1 | 8/2002 | Yach |
| 2002/0152244 | A1 | 10/2002 | Dean et al. |
| 2002/0169679 | A1 | 11/2002 | Neumayer |
| 2002/0184401 | A1 | 12/2002 | Kadel, Jr. et al. |
| 2003/0005048 | A1 | 1/2003 | Risalvato |
| 2003/0028685 | A1 | 2/2003 | Smith et al. |
| 2003/0051236 | A1 | 3/2003 | Pace et al. |
| 2003/0074206 | A1 | 4/2003 | Hoffman et al. |
| 2003/0084120 | A1 | 5/2003 | Egli |
| 2003/0120665 | A1 | 6/2003 | Fox et al. |
| 2003/0149934 | A1 | 8/2003 | Worden |
| 2003/0167277 | A1 | 9/2003 | Hejlsberg et al. |
| 2003/0167355 | A1 | 9/2003 | Smith et al. |
| 2003/0167356 | A1 | 9/2003 | Smith et al. |
| 2003/0172196 | A1 | 9/2003 | Hejlsberg et al. |
| 2003/0177282 | A1 | 9/2003 | Hejlsberg et al. |
| 2004/0083463 | A1 | 4/2004 | Hawley |
| 2004/0117759 | A1 | 6/2004 | Rippert, Jr. |
| 2004/0205694 | A1 | 10/2004 | James et al. |
| 2006/0294500 | A1 | 12/2006 | Chiang |

OTHER PUBLICATIONS

Flanagan, Java foundation classes in a Nutshell, O'Reilly, 9-1000, Chapters 1-2.*
Flanagan, Java in a Nutshell, O'Reilly & Associates, 1996, pp. 193-200, 237-253, 267-270, 339-342.*
Shannon, Java 2 Platform Enterprise Edition Specifications, v 1.2, Dec. 17, 1999, pp. 2-8 thru 2-11 and 6-2 thru 6-6.*
Hanson, Differences between J2SE and J2EE, Sep. 8, 2003, SearchTechTarget.com.*
Cohn et al, Web programming with Visual J++, Sams.net Publishing, 1997, chapters 5-6, 17-19.*
Microsoft, Delegates in Visual J++6.0, Mar. 11, 1998, pp. 1-6.*
Ben, A comparitive Overview of C#, Genamics, Jul. 31, 2000.*
Flynn et al, Visual J++ Java programming, New Riders Publishing, 1996, pp. 133-143.*
Perry, Teach Yourself Visual Basic 6 in 21 Days, Sams Publishing, 1998, pp. 33-38, 68-72, 187-188, 370-371, 581-582, 656, 715-717.*
Wille, Presenting C#, Sams, Jul. 10, 2000, pp. 15-19, 46-51, 112-119.*
Albahari, A Comparative Overview of C#, Genemics, pp. 1-15.*
Farley, Microsoft .NET vs. J2EE: How do they stack up?, O'Reilly, Aug. 1, 2000, pp. 1-6.*
Wille, Presenting C#, Sams Publishing, Jul. 2000, pp. 5-19, 45-54, 111-124, 148-150.*
Williams, Teach Yourself Visual c++ 6 in 24 Hours, Sams Publishing, Aug. 1998, pp. 5-9, 55-65, 73-81, 89-93, 123-129, 148, 351-353, 369-378, and Microsoft Foundation Class hierarchy—Version 6.0.*
Wille, Presenting C #, Sams Publishing, 2000, pp. 21-29, 164-167.*
Tim O'Reilly, The Network Really Is the Computer, The O'Reilly Network at (http://www.oreilyynet.com) Jun. 8, 2000, pp. 1-11.
The Java tm 2 Enterprise Edition Developer's Guide, v1.2.1, May 2000, Sun Microsystems, Palo Alto Ca. U.S.A., chapter 1; pp. 1-10 & pp. 152-155.
Bill Shannon, Java tm 2 Platform Enterprise Edition Specification, v1.2, Sun Microsystems, Palo Alto, Ca. U.S.A., Dec. 17, 1999, pp. 2-1 thru 2-7 & 6-1.
Java tm Platform, Standard Edition, v1.2.2 API Specification, 1993-1999 Sun Microsystems, Inc. in the U.S.A. and other countries. Palo Alto, Ca. U.S.A, pp. 1-4.
Deitel & Deitel, Java™ How to Program book, Prentice Hall, Third edition, 1999 (pp. 7-29, 698-699, 714-717, 876-878, 936-977, 980-998, 1002-1046).
Deitel & Deitel; Java™ How to Program book, Prentice Hall, Third edition, 1999 (pp. 214-226, 817-838).
H Carr et al., Compiling Distributed C++, IEEE, 1993, pp. 496-503.
Cheng et al. IEEE; "XML and DB2" IEEE Data Engineering 2000. Proceedings 16th International Conference on Feb. 29-Mar. 3, 2000 pp. 569-573.
Lam et al..;.NET Framework Essentials Jun. 2001 O'Reilly pp. 1-320.
Meyer; Microsoft; NET is coming [Microsoft Web Services platform] IEEE Computer vol. 34 Issue: Aug. 8, 2001 pp. 92-97.
Hanson, "Differences between J2SE and J2EE", Sep. 8, 2003, SearchTechTarget.com.
Arulanthu, et al, "The Design and Performanceof A Scalable ORB Architecture for CORBA Asynchronous Messaging." Middleware 2000, Springer-Verlag, 2000, pp. 208-228.
U.S. Appl. No. 09/901,555, filed Jul. 10, 2001 entitled "Application Program Interface for Network Software Platform."
Deitel & Deitel "Java(TM) How to Program Book" Prentice Hall Third Edition 1999 (pp. 7-29, 214-226, 698-699, 714-717, 817-838, 876-878, 936-977, 980-998, 1002-1046).
http:///www.w3.org/TR/xstl,W3C, Nov. 1999, pp. 1-90.
http://www.w3.org/TR/1998/NOTE-XML-data-0105,W3C, Jan. 1998, pp. 1-34.
http://www.w3.org/TR/1999/REC-xpath-19991115.html,WC3,Nov. 1999, pp. 1-32.
Ensel, et al., "Managing Application Service Dependencies with XML and the Resource Description Framework", IEEE, May 2001, pp. 661-674.
Jingyu, et al., "Object-Oriented Representation for XML Data", IEEE, Apr. 2001, pp. 40-49.
Sneed, "Wrapping Legacy COBOL Programs behind and XML-Interface", IEEE, Oct. 2001, pp. 189-197.
"Java 2 Platform, Standard Edition", retrieved on Apr. 4, 2003 at<<http://java.sun.com/products/jdk/1.2/docs/api/overview-summary.html>>, Sun Microsystems, v.1.2.2., 1993-1999, p. 1-4.

* cited by examiner

142

APPLICATION PROGRAM INTERFACE FOR NETWORK SOFTWARE PLATFORM

TECHNICAL FIELD

This invention relates to network software, such as Web applications, and to computer software development of such network software. More particularly, this invention relates to an application program interface (API) that facilitates use of a network software platform by application programs and computer hardware.

BACKGROUND

Very early on, computer software came to be categorized as "operating system" software or "application" software. Broadly speaking, an application is software meant to perform a specific task for the computer user such as solving a mathematical equation or supporting word processing. The operating system is the software that manages and controls the computer hardware. The goal of the operating system is to make the computer resources available to the application programmer while at the same time, hiding the complexity necessary to actually control the hardware.

The operating system makes the resources available via functions that are collectively known as the Application Program Interface or API. The term API is also used in reference to a single one of these functions. The functions are often grouped in terms of what resource or service they provide to the application programmer. Application software requests resources by calling individual API functions. API functions also serve as the means by which messages and information provided by the operating system are relayed back to the application software.

In addition to changes in hardware, another factor driving the evolution of operating system software has been the desire to simplify and speed application software development. Application software development can be a daunting task, sometimes requiring years of developer time to create a sophisticated program with millions of lines of code. For a popular operating system such as Microsoft Windows®, application software developers write thousands of different applications each year that utilize the operating system. A coherent and usable operating system base is required to support so many diverse application developers.

Often, development of application software can be made simpler by making the operating system more complex. That is, if a function may be useful to several different application programs, it may be better to write it once for inclusion in the operating system, than requiring dozens of software developers to write it dozens of times for inclusion in dozens of different applications. In this manner, if the operating system supports a wide range of common functionality required by a number of applications, significant savings in applications software development costs and time can be achieved.

Regardless of where the line between operating system and application software is drawn, it is clear that for a useful operating system, the API between the operating system and the computer hardware and application software is as important as efficient internal operation of the operating system itself.

Over the past few years, the universal adoption of the Internet, and networking technology in general, has changed the landscape for computer software developers. Traditionally, software developers focused on single-site software applications for standalone desktop computers, or LAN-based computers that were connected to a limited number of other computers via a local area network (LAN). Such software applications were typically referred to as "shrink wrapped" products because the software was marketed and sold in a shrink-wrapped package. The applications utilized well-defined APIs to access the underlying operating system of the computer.

As the Internet evolved and gained widespread acceptance, the industry began to recognize the power of hosting applications at various sites on the World Wide Web (or simply the "Web"). In the networked world, clients from anywhere could submit requests to server-based applications hosted at diverse locations and receive responses back in fractions of a second. These Web applications, however, were typically developed using the same operating system platform that was originally developed for standalone computing machines or locally networked computers. Unfortunately, in some instances, these applications do not adequately transfer to the distributed computing regime. The underlying platform was simply not constructed with the idea of supporting limitless numbers of interconnected computers.

To accommodate the shift to the distributed computing environment being ushered in by the Internet, Microsoft Corporation is developing a network software platform known as the ".NET" platform (read as "Dot Net"). The platform allows developers to create Web services that will execute over the Internet. Such a dynamic shift requires a new ground-up design of an entirely new API.

In response to this challenge, the inventors developed a unique set of API functions for Microsoft's .NET™ platform.

SUMMARY

An application program interface (API) provides a set of functions for application developers who build Web applications on a network platform, such as Microsoft Corporation's .NET™ platform.

BRIEF DESCRIPTION OF THE DRAWINGS

The same numbers are used throughout the drawings to reference like features.

BRIEF DESCRIPTION OF ACCOMPANYING COMPACT DISC

Accompanying this specification is a compact disc that stores a compiled HTML help file identifying the API (application program interface) for Microsoft's .NET™ network platform. The file is named "cpref.chm" and was created on Jun. 8, 2001. It is 30.81 Mbytes in size. The file can be executed on a Windows®-based computing device (e.g., IBM-PC, or equivalent) that executes a Windows®-brand operating system (e.g., Windows® NT, Windows® 98, Windows® 2000, etc.). The compiled HTML help file stored on the compact disk is hereby incorporated by reference.

Additionally, the APIs contained in the compiled HTML help file are also provided in approximately 100 separate text files named "NamespaceName.txt". The text files comply with the ASCII format.

The compact disc itself is a CD-ROM, and conforms to the ISO 9660 standard.

DETAILED DESCRIPTION

This disclosure addresses an application program interface (API) for a network platform upon which developers can build Web applications and services. More particularly, an exemplary API is described for the .NET™ platform created by Microsoft Corporation. The .NET™ platform is a software platform for Web services and Web applications implemented in the distributed computing environment. It represents the next generation of Internet computing, using open communication standards to communicate among loosely coupled Web services that are collaborating to perform a particular task.

In the described implementation, the .NET™ platform utilizes XML (extensible markup language), an open standard for describing data. XML is managed by the World Wide Web Consortium (W3C). XML is used for defining data elements on a Web page and business-to-business documents. XML uses a similar tag structure as HTML; however, whereas HTML defines how elements are displayed, XML defines what those elements contain. HTML uses predefined tags, but XML allows tags to be defined by the developer of the page. Thus, virtually any data items can be identified, allowing Web pages to function like database records. Through the use of XML and other open protocols, such as Simple Object Access Protocol (SOAP), the .NET™ platform allows integration of a wide range of services that can be tailored to the needs of the user. Although the embodiments described herein are described in conjunction with XML and other open standards, such are not required for the operation of the claimed invention. Other equally viable technologies will suffice to implement the inventions described herein.

As used herein, the phrase application program interface or API includes traditional interfaces that employ method or function calls, as well as remote calls (e.g., a proxy, stub relationship) and SOAP/XML invocations.

Exemplary Network Environment

Figure 1:
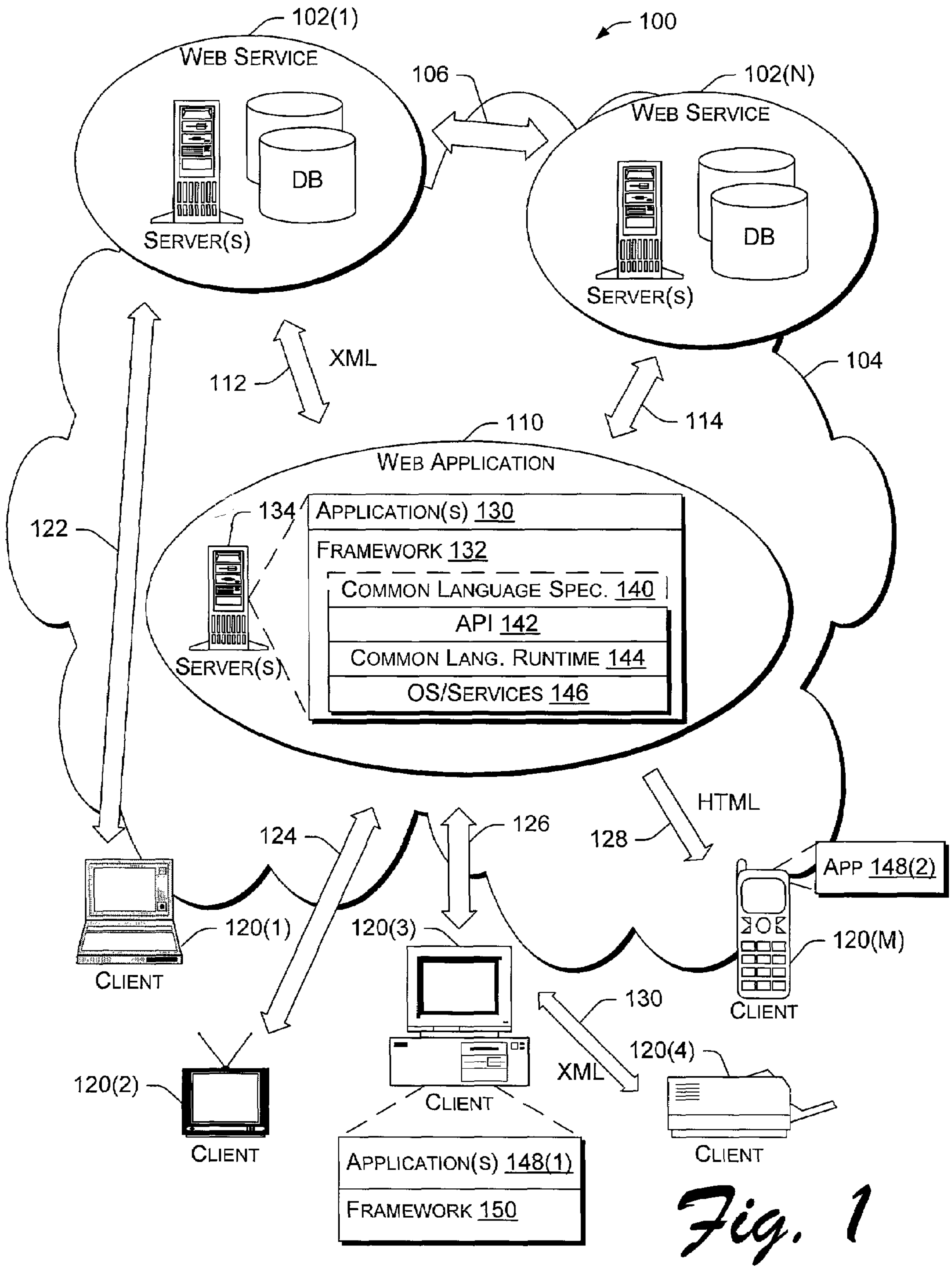
FIG. 1 illustrates a network architecture in which clients access Web services over the Internet using conventional protocols.

FIG. 1 shows a network environment 100 in which a network platform, such as the .NET™ platform, may be implemented. The network environment 100 includes representative Web services 102(1), . . . , 102(N), which provide services that can be accessed over a network 104 (e.g., Internet). The Web services, referenced generally as number 102, are programmable application components that are reusable and interact programmatically over the network 104, typically through industry standard Web protocols, such as XML, SOAP, WAP (wireless application protocol), HTTP (hypertext transport protocol), and SMTP (simple mail transfer protocol) although other means of interacting with the Web services over the network may also be used, such as Remote Procedure Call (RPC) or object broker type technology. A Web service can be self-describing and is often defined in terms of formats and ordering of messages.

Web services 102 are accessible directly by other services (as represented by communication link 106) or a software application, such as Web application 110 (as represented by communication links 112 and 114). Each Web service 102 is illustrated as including one or more servers that execute software to handle requests for particular services. Such services often maintain databases that store information to be served back to requesters. Web services may be configured to perform any one of a variety of different services. Examples of Web services include login verification, notification, database storage, stock quoting, location directories, mapping, music, electronic wallet, calendar/scheduler, telephone listings, news and information, games, ticketing, and so on. The Web services can be combined with each other and with other applications to build intelligent interactive experiences.

The network environment 100 also includes representative client devices 120(1), 120(2), 120(3), 120(4), . . . , 120(M) that utilize the Web services 102 (as represented by communication link 122) and/or the Web application 110 (as represented by communication links 124, 126, and 128). The clients may communicate with one another using standard protocols as well, as represented by an exemplary XML link 130 between clients 120(3) and 120(4).

The client devices, referenced generally as number 120, can be implemented many different ways. Examples of possible client implementations include, without limitation, portable computers, stationary computers, tablet PCs, televisions/set-top boxes, wireless communication devices, personal digital assistants, gaming consoles, printers, photocopiers, and other smart devices.

The Web application 110 is an application designed to run on the network platform and may utilize the Web services 102 when handling and servicing requests from clients 120. The Web application 110 is composed of one or more software applications 130 that run atop a programming framework 132, which are executing on one or more servers 134 or other computer systems. Note that a portion of Web application 110 may actually reside on one or more of clients 120. Alternatively, Web application 110 may coordinate with other software on clients 120 to actually accomplish its tasks.

The programming framework 132 is the structure that supports the applications and services developed by application developers. It permits multi-language development and seamless integration by supporting multiple languages. It supports open protocols, such as SOAP, and encapsulates the underlying operating system and object model services. The framework provides a robust and secure execution environment for the multiple programming languages and offers secure, integrated class libraries.

The framework 132 is a multi-tiered architecture that includes an application program interface (API) layer 142, a common language runtime (CLR) layer 144, and an operating system/services layer 146. This layered architecture allows updates and modifications to various layers without impacting other portions of the framework. A common language specification (CLS) 140 allows designers of various languages to write code that is able to access underlying library functionality. The specification 140 functions as a contract between language designers and library designers that can be used to promote language interoperability. By adhering to the CLS, libraries written in one language can be directly accessible to code modules written in other languages to achieve seamless integration between code modules written in one language and code modules written in another language. One exemplary detailed implementation of a CLS is described in an ECMA standard created by participants in ECMA TC39/TG3. The reader is directed to the ECMA web site at the World Wide Web ".ecna" ".ch".

The API layer 142 presents groups of functions that the applications 130 can call to access the resources and services provided by layer 146. By exposing the API functions for a network platform, application developers can create Web applications for distributed computing systems that make full use of the network resources and other Web services, without needing to understand the complex interworkings of how those network resources actually operate or are made available. Moreover, the Web applications can be written in any number of programming languages, and translated into an intermediate language supported by the common language runtime 144 and included as part of the common language specification 140. In this way, the API layer 142 can provide methods for a wide and diverse variety of applications.

Additionally, the framework 132 can be configured to support API calls placed by remote applications executing remotely from the servers 134 that host the framework. Representative applications 148(1) and 148(2) residing on clients 120(3) and 120(M), respectively, can use the API functions by making calls directly, or indirectly, to the API layer 142 over the network 104.

The framework may also be implemented at the clients. Client 120(3) represents the situation where a framework 150 is implemented at the client. This framework may be identical to server-based framework 132, or modified for client purposes. Alternatively, the client-based framework may be condensed in the event that the client is a limited or dedicated function device, such as a cellular phone, personal digital assistant, handheld computer, or other communication/computing device.

Developers' Programming Framework

Figure 2:
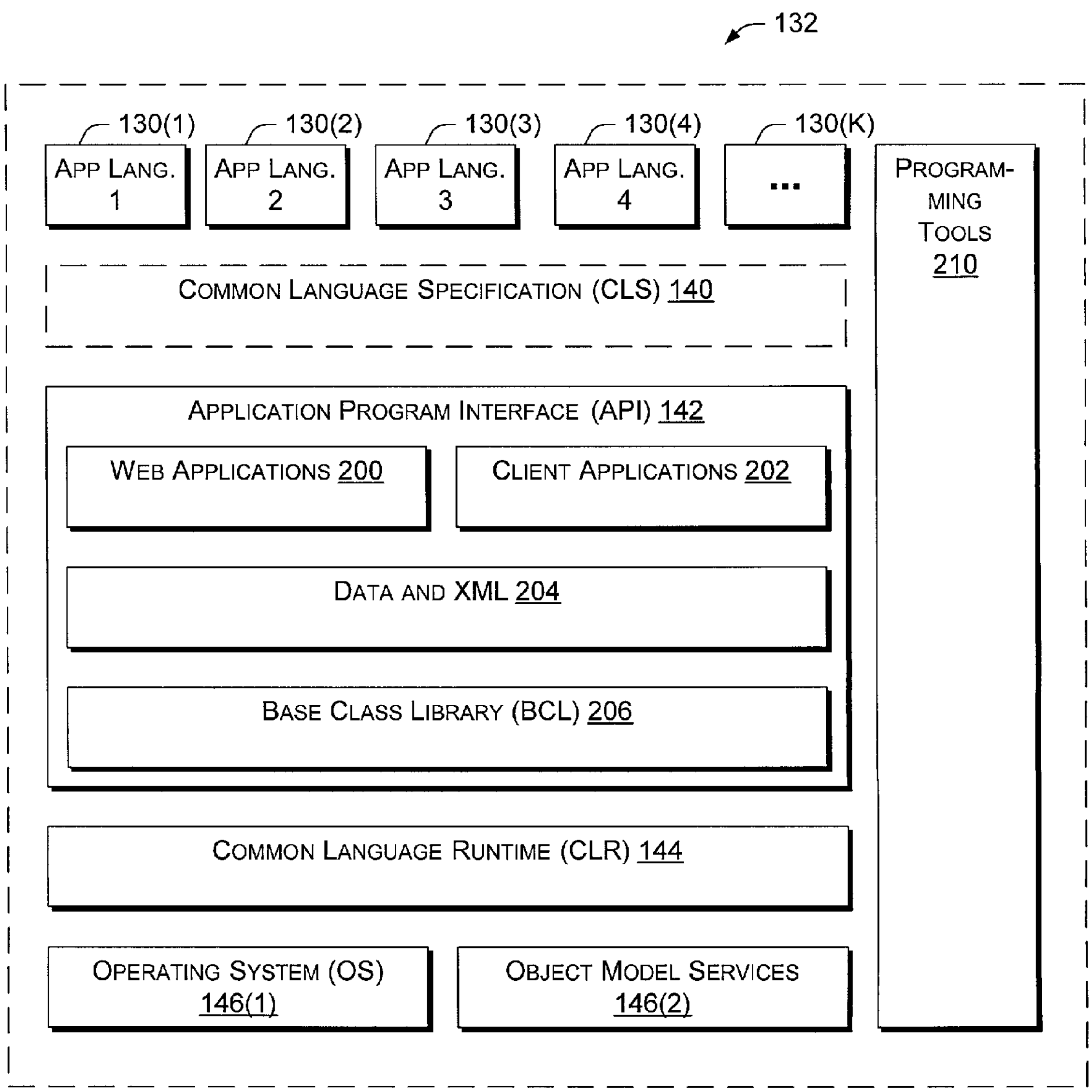
FIG. 2 is a block diagram of a software architecture for Microsoft's .NET™ platform, which includes an application program interface (API).

FIG. 2 shows the programming framework 132 in more detail. The common language specification (CLS) layer 140 supports applications written in a variety of languages 130(1), 130(2), 130(3), 130(4), . . . , 130(K). Such application languages include Visual Basic, C++, C#, COBOL, Jscript, Perl, Eiffel, Python, and so on. The common language specification 140 specifies a subset of features or rules about features that, if followed, allow the various languages to communicate. For example, some languages do not support a given type (e.g., an "int*" type) that might otherwise be supported by the common language runtime 144. In this case, the common language specification 140 does not include the type. On the other hand, types that are supported by all or most languages (e.g., the "int[ ]" type) is included in common language specification 140 so library developers are free to use it and are assured that the languages can handle it. This ability to communicate results in seamless integration between code modules written in one language and code modules written in another language. Since different languages are particularly well suited to particular tasks, the seamless integration between languages allows a developer to select a particular language for a particular code module with the ability to use that code module with modules written in different languages. The common language runtime 144 allow seamless multi-language development, with cross language inheritance, and provide a robust and secure execution environment for the multiple programming languages. For more information on the common language specification 140 and the common language runtime 144, the reader is directed to co-pending applications entitled "Method and System for Compiling Multiple Languages", filed Jun. 21, 2000 (Ser. No. 09/598, 105) and "Unified Data Type System and Method" filed Jul. 10, 2000 (Ser. No. 09/613,289), which are incorporated by reference.

The framework 132 encapsulates the operating system 146(1) (e.g., Windows®-brand operating systems) and object model services 146(2) (e.g., Component Object Model (COM) or Distributed COM). The operating system 146(1) provides conventional functions, such as file management, notification, event handling, user interfaces (e.g., windowing, menus, dialogs, etc.), security, authentication, verification, processes and threads, memory management, and so on. The object model services 146(2) provide interfacing with other objects to perform various tasks. Calls made to the API layer 142 are handed to the common language runtime layer 144 for local execution by the operating system 146(1) and/or object model services 146(2).

The API 142 groups API functions into multiple namespaces. Namespaces essentially define a collection of classes, interfaces, delegates, enumerations, and structures, which are collectively called "types", that provide a specific set of related functionality. A class represents managed heap allocated data that has reference assignment semantics. A delegate is an object oriented function pointer. An enumeration is a special kind of value type that represents named constants. A structure represents static allocated data that has value assignment semantics. An interface defines a contract that other types can implement.

By using namespaces, a designer can organize a set of types into a hierarchical namespace. The designer is able to create multiple groups from the set of types, with each group containing at least one type that exposes logically related functionality. In the exemplary implementation, the API 142 is organized into four root namespaces: a first namespace 200 for Web applications, a second namespace 202 for client applications, a third namespace 204 for data and XML, and a fourth namespace 206 for base class libraries (BCLs). Each group can then be assigned a name. For instance, types in the Web applications namespace 200 are assigned the name "Web", and types in the data and XML namespace 204 can be assigned names "Data" and "XML" respectively. The named groups can be organized under a single "global root" namespace for system level APIs, such as an overall System namespace. By selecting and prefixing a top level identifier, the types in each group can be easily referenced by a hierarchical name that includes the selected top level identifier prefixed to the name of the group containing the type. For instance, types in the Web applications namespace 200 can be referenced using the hierarchical name "System.Web". In this way, the individual namespaces 200, 202, 204, and 206 become major branches off of the System namespace and can carry a designation where the individual namespaces are prefixed with a designator, such as a "System." prefix.

The Web applications namespace 200 pertains to Web based functionality, such as dynamically generated Web pages (e.g., Microsoft's Active Server Pages (ASP)). It supplies types that enable browser/server communication. The client applications namespace 202 pertains to drawing and client side UI functionality. It supplies types that enable drawing of two-dimensional (2 D), imaging, and printing, as well as the ability to construct window forms, menus, boxes, and so on.

The data and XML namespace 204 relates to connectivity to data sources and XML functionality. It supplies classes, interfaces, delegates, and enumerations that enable security, specify data types, and serialize objects into XML format documents or streams. The base class libraries (BCL) namespace 206 pertains to basic system and runtime functionality. It contains the fundamental types and base classes that define commonly-used value and reference data types, events and event handlers, interfaces, attributes, and processing exceptions.

In addition to the framework 132, programming tools 210 are provided to assist the developer in building Web services and/or applications. One example of the programming tools 200 is Visual Studio™, a multi-language suite of programming tools offered by Microsoft Corporation.

Root API Namespaces

Figure 3:
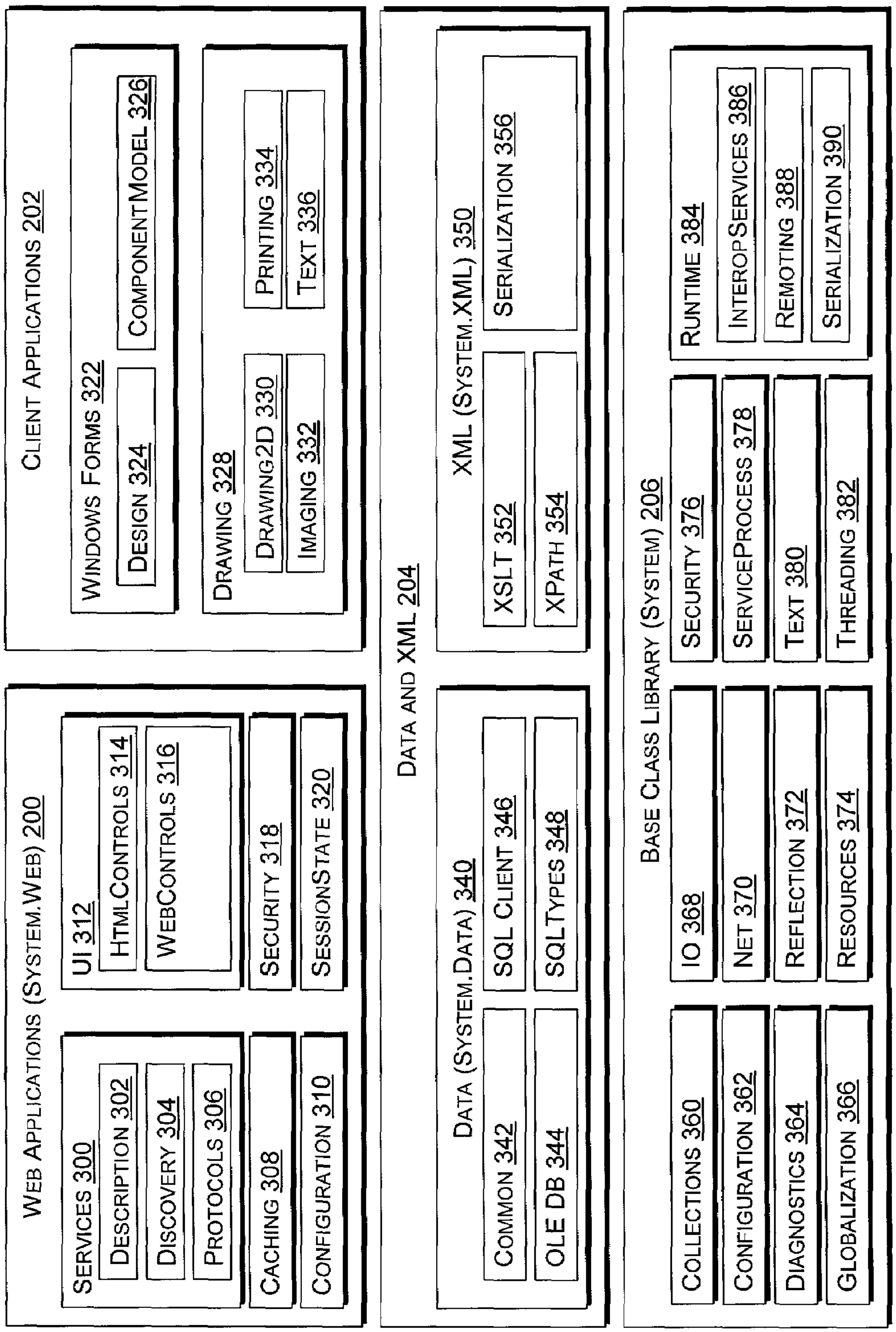
FIG. 3 is a block diagram of unique namespaces supported by the API, as well as function classes of the various API functions.

FIG. 3 shows the API 142 and its four root namespaces in more detail. In one embodiment, the namespaces are identified according to a hierarchical naming convention in which strings of names are concatenated with periods. For instance, the Web applications namespace 200 is identified by the root name "System.Web". Within the "Sytem.Web" namespace is another namespace for Web services, identified as "System. Web.Services", which further identifies another namespace for a description known as "System.Web.Services.Description". With this naming convention in mind, the following provides a general overview of selected namespaces of the API 142, although other naming conventions could be used with equal effect.

The Web applications namespace 200 ("System.Web") defines additional namespaces, including:

- A services namespace 300 ("System.Web.Services") containing classes that enable a developer to build and use Web services. The services namespace 300 defines additional namespaces, including a description namespace 302 ("System.Web.Services.Description") containing classes that enable a developer to publicly describe a Web service via a service description language (such as WSDL, a specification available from the W3C), a discovery namespace 304 ("System.Web.Services.Discovery") containing classes that allow Web service consumers to locate available Web Services on a Web server, and a protocols namespace 306 ("System.Web.Services.Protocols") containing classes that define the protocols used to transmit data across a network during communication between Web service clients and the Web service itself.
- A caching namespace 308 ("System.Web.Caching") containing classes that enable developers to decrease Web application response time through temporarily caching frequently used resources on the server. This includes ASP.NET pages, web services, and user controls. (ASP-.NET is the updated version of Microsoft's ASP technology.) Additionally, a cache dictionary is available for developers to store frequently used resources, such as hash tables and other data structures.
- A configuration namespace 310 ("System.Web.Configuration") containing classes that are used to read configuration data in for an application.
- A UI namespace 312 ("System.Web.UI") containing types that allow developers to create controls and pages that will appear in Web applications as user interfaces on a Web page. This namespace includes the control class, which provides all web based controls, whether those encapsulating HTML elements, higher level Web controls, or even custom User controls, with a common set of functionality. Also provided are classes which provide the web forms server controls data binding functionality, the ability to save the view state of a given control or page, as well as parsing functionality for both programmable and literal controls. Within the UI namespace 312 are two additional namespaces: an HTML controls namespace 314 ("System.Web.UI.HtmlControls") containing classes that permit developers to interact with types that encapsulates html 3.2 elemtents create HTML controls, and a Web controls namespace 316 ("System.Web.UI.WeblControls") containing classes that allow developers to create higher level Web controls.
- A security namespace 318 ("System.Web.Security") containing classes used to implement security in web server applications, such as basic authentication, challenge response authentication, and role based authentication.
- A session state namespace 320 ("System.Web.SessionState") containing classes used to access session state values (i.e., data that lives across requests for the lifetime of the session) as well as session-level settings and lifetime management methods.

The client applications namespace 202 is composed of two namespaces:

- A windows forms namespace 322 ("System.Windows. Forms") containing classes for creating Windows®-based client applications that take full advantage of the rich user interface features available in the Microsoft Windows® operating system, such as the ability to drag and drop screen elements. Such classes may include wrapped APIs available in the Microsoft Windows® operating system that are used in a windowing UI environment. Within this namespace are a design namespace 324 ("System.Windows.Forms.Design") that contains classes to extend design-time support for Windows forms and a component model namespace 326 ("System.Windows.Forms.ComponentModel") that contains the windows form implementation of the general component model defined in System.ComponentModel. This namespace contains designer tools, such as Visual Studio, which offer a rich experience for developers at design time.
- A drawing namespace 328 ("System.Drawing") containing classes for graphics functionality. The drawing namespace 328 includes a 2 D drawing namespace 330 ("System.Drawing.Drawing2D") that contains classes and enumerations to provide advanced 2-dimmensional and vector graphics functionality, an imaging namespace 332 ("System.Drawing.Imaging") that contains classes for advanced imaging functionality, a printing namespace 334 ("System.Drawing.Printing") that contains classes to permit developers to customize printing, and a text namespace 336 ("System.Drawing.Text") that contains classes for advanced typography functionality.

The data and XML namespace 204 is composed of two namespaces:

- A data namespace 340 ("System.Data") containing classes that enable developers to build components that efficiently manage data from multiple data sources. It implements an architecture that, in a disconnected scenario (such as the Internet), provides tools to request, update, and reconcile data in multiple tier systems. The data namespace 340 includes a common namespace 342 that contains types shared by data providers. A data provider describes a collection of types used to access a data source, such as a database, in the managed space. The data namespace 340 also includes an OLE DB namespace 344 that contains types pertaining to data used in object-oriented databases (e.g., Microsoft's SQL Server), and a SQL client namespace 346 that contains types pertaining to data used by SQL clients. The data namespace also includes a SQL types namespace 348 ("System.Data.SqlTypes") that contains classes for native data types within Microsoft's SQL Server. The classes provide a safer, faster alternative to other data types. Using the objects within this namespace helps prevent type conversion errors caused in situations where loss of precision could occur. Because other data types are converted to and from SQL types behind the scenes, explicitly creating and using objects within this namespace results in faster code as well.
- An XML namespace 350 ("System.XML") containing classes that provide standards-based support for processing XML. The supported standards include XML (e.g., version 1.0), XML Namespaces (both stream level and DOM), XML Schemas, XPath expressions, XSL/T transformations, DOM Level 2 Core, and SOAP (e.g., version 1.1). The XML namespace 350 includes an XSLT namespace 352 ("System.XML.Xsl") that contains classes and enumerations to support XSLT (Extensible Stylesheet Language Transformations), an Xpath namespace 354 ("System.XML.Xpath") that contains an XPath parser and evaluation engine, and a serialization namespace 356 ("System.XML.Serialization") that contains classes used to serialize objects into XML format documents or streams.

The base class library namespace 206 ("System") includes the following namespaces:

A collections namespace 360 ("System.Collections") containing interfaces and classes that define various collections of objects, such as lists, queues, arrays, hash tables and dictionaries.

A configuration namespace 362 ("System.Configuration") containing classes and interfaces that allow developers to programmatically access configuration settings and handle errors in configuration files.

A diagnostics namespace 364 ("System.Diagnostics") containing classes that are used to debug applications and to trace code execution. The namespace allows developers to start system processes, read and write to event logs, and monitor system performance using performance counters.

A globalization namespace 366 ("System.Globalization") containing classes that define culture-related information, including the language, the country/region, the calendars in use, the format patterns for dates, currency and numbers, and the sort order for strings.

An I/O namespace 368 ("System.IO") containing the infrastructure pieces to operate with the intput/output of data streams, files, and directories. This namespace includes a model for working with streams of bytes, higher level readers and writers which consume those bytes, various constructions or implementations of the streams (e.g., FileStream and MemoryStream) and, a set of utility classes for working with files and directories.

A net namespace 370 ("System.Net") providing an extensive set of classes for building network-enabled application, referred to as the Net Class Libraries (NCL). One element to the design of the Net Class Libraries is an extensible, layered approach to exposing networking functionality. The NCL stack contains three basic layers. A base layer (System.Net.Socket) provides access to an interface to TCP/IP, the communications protocol of UNIX networks and the Internet. One example of such an interface is the "WinSock API" from Microsoft Corporation. The next layer is the Transport Protocol classes, which support such transport protocols as TCP and UDP. Developers may write their own protocol classes to provide support for protocols such as IGMP and ICMP. The third layer is the Web request, which provides an abstract factory pattern for the creation of other protocol classes. The NCL provides implementations for Hyper Text Transport Protocol (HTTP).

A reflection namespace ("System.Reflection") 372 containing types that provide a managed view of loaded types, methods, and fields, with the ability to dynamically create and invoke types.

A resources namespace 374 ("System.Resources") containing classes and interfaces that allow developers to create, store and manage various culture-specific resources used in an application.

A security namespace 376 ("System.Security") supporting the underlying structure of the security system, including interfaces, attributes, exceptions, and base classes for permissions.

A service process namespace 378 ("System.ServiceProcess") containing classes that allow developers to install and run services. Services are long-running executables that run without a user interface. They can be installed to run under a system account that enables them to be started at computer reboot. Services whose implementation is derived from processing in one class can define specific behavior for start, stop, pause, and continue commands, as well as behavior to take when the system shuts down.

A text namespace 380 ("System.Text") containing classes representing various types of encodings (e.g., ASCII, Unicode, UTF-7, and UTF-8), abstract base classes for converting blocks of characters to and from blocks of bytes, and a helper class that manipulates and formats string objects without creating intermediate instances.

A threading namespace 382 ("System.Threading") containing classes and interfaces that enable multi-threaded programming. The threading namespace includes a ThreadPool class that manages groups of threads, a Timer class that enables a delegate to be called after a specified amount of time, and a Mutex class for synchronizing mutually-exclusive threads. This namespace also provides classes for thread scheduling, wait notification, and deadlock resolution.

A runtime namespace 384 ("System.Runtime") containing multiple namespaces concerning runtime features, including an interoperation services namespace 386 ("System.Runtime.InteropServices") that contains a collection of classes useful for accessing COM objects. The types in the InteropServices namespace fall into the following areas of functionality: attributes, exceptions, managed definitions of COM types, wrappers, type converters, and the Marshal class. The runtime namespace 384 further includes a remoting namespace 388 ("System.Runtime.Remoting") that contains classes and interfaces allowing developers to create and configure distributed applications. Another namespace within the runtime namespace 384 is a serialization namespace 390 ("System.Runtime.Serialization") that contains classes used for serializing and deserializing objects. Serialization is the process of converting an object or a graph of objects into a linear sequence of bytes for either storage or transmission to another location.

The following description pertains to the ".forms" namespace and describes various types associated with the namespace as well as the functionalities provided by the various types.

1. System.Windows.Forms.Design

The namespace contains classes that can be used to extend design-time support for Windows Forms.

Description

The System.Windows.Forms.Design namespace contains classes that can be used to extend design-time support for Windows Forms.

AnchorEditor class (System.Windows.Forms.Design)

Description

Provides a user interface for configuring an System.Windows.Forms.Control.Anchor property.

The System.Windows.Forms.Design.AnchorEditor provides a design-time user interface for configuring an System.Windows.Forms.Control.Anchor property. An System.Windows.Forms.Control.Anchor property is typically used to determine which sides of the container a control is bound to. This class provides a drop-down graphical control that allows the user to specify which sides of the container to anchor the control to.

1. Constructors:
a) AnchorEditor
Example Syntax:

[C#] public AnchorEditor( );

[C++] public: AnchorEditor( );

[VB] Public Sub New( )

[JScript] public function AnchorEditor( );

2. Methods:
a) EditValue

[C#] public override object EditValue(ITypeDescriptorContext context, IServiceProvider provider, object value);

[C++] public: Object* EditValue(ITypeDescriptorContext* context, IServiceProvider* provider, Object* value);

[VB] Overrides Public Function EditValue(ByVal context As ITypeDescriptorContext, ByVal provider As IServiceProvider, ByVal value As Object) As Object

[JScript] public override function EditValue(context: ITypeDescriptorContext, provider: IServiceProvider, value: Object): Object;

Description

Edits the value of the specified object using the specified service provider and context.

Return Value: The new value of the object. If the value of the object hasn't changed, this should return the same object it was passed.

A service provider is provided so that any required editing services can be obtained. An System.ComponentModel.IType DescriptorContext object that can be used to gain additional context information. A service provider object through which editing services may be obtained. An instance of the value being edited.
b) GetEditStyle

[C#] public override UITypeEditorEditStyle GetEditStyle (ITypeDescriptorContext context);

[C++] public: UITypeEditorEditStyle GetEditStyle(ITypeDescriptorContext* context);

[VB] Overrides Public Function GetEditStyle(ByVal context As ITypeDescriptorContext) As UITypeEditorEditStyle

[JScript] public override function GetEditStyle(context: IType DescriptorContext): UITypeEditorEditStyle;

Description

Gets the editor style used by the System.Windows.Forms.Design.AnchorEditor.EditValue(System.ComponentModel.ITypeDescriptorContext, System.IServiceProvider, System. Object) method.

Return Value: One of the System.Drawing.Design.UITypeEditorEditStyle values indicating the provided editing style. If the method is not supported, this method will return System.Drawing.Design.UITypeEditorEditStyle.None. An System.ComponentModel.ITypeDescriptorContext object that can be used to gain additional context information.

AxImporter class (System.Windows.Forms.Design)
a) ToString

Description

Imports ActiveX controls and generates a wrapper that can be accessed by a designer.
b) AxImporter
Example Syntax:
c) ToString

[C#] public AxImporter(AxImporter.Options options);

[C++] public: AxImporter(AxImporter.Options* options);

[VB] Public Sub New(ByVal options As AxImporter.Options)

[JScript] public function AxImporter(options: AxImporter.Options);

Description

2. Properties:
a) GeneratedAssemblies
b) ToString

[C#] public string[ ] GeneratedAssemblies {get;}

[C++] public: _property String* get_Generated Assemblies( );

[VB] Public ReadOnly Property GeneratedAssemblies As String ( )

[JScript] public function get GeneratedAssemblies( ): String[ ];

Description
c) GeneratedSources
d) ToString

[C#] public string[ ] GeneratedSources {get;}

[C++] public: _property String* get_GeneratedSources( );

[VB] Public ReadOnly Property GeneratedSources As String ( )

[JScript] public function get GeneratedSources( ): String[ ];
e) GeneratedTypeLibAttributes
f) ToString

[C#] public TYPELIBATTR[ ] GeneratedTypeLibAttributes {get;}

[C++] public: _property TYPELIBATTR get_GeneratedTypeLibAttributes( );

[VB] Public ReadOnly Property GeneratedTypeLibAttributes As TYPELIBATTR ( )

[JScript] public function get GeneratedTypeLibAttributes( ): TYPELIBATTR[ ];

Description
g) GenerateFromFile

[C#] public string GenerateFromFile(FileInfo file);

[C++] public: String* GenerateFromFile(FileInfo* file);

[VB] Public Function GenerateFromFile(ByVal file As FileInfo) As String

[JScript] public function GenerateFromFile(file: FileInfo): String; Generates a wrapper for an ActiveX control for use in the design-time environment.

Description

Generates a wrapper for an ActiveX control for use in the design-time environment. The file containing the control.

h) GenerateFrom TypeLibrary

[C#] public string GenerateFromTypeLibrary(UCOMITypeLib typeLib);

[C++] public: String* GenerateFromTypeLibrary(UCOMITypeLib* typeLib);

[VB] Public Function GenerateFromTypeLibrary(ByVal typeLib As UCOMITypeLib) As String

[JScript] public function GenerateFromTypeLibrary (typeLib: UCOMITypeLib): String; Generates a wrapper for an ActiveX control for use in the design-time environment.

Description

Generates a wrapper for an ActiveX control for use in the design-time environment.

i) GenerateFromTypeLibrary

[C#] public string GenerateFromTypeLibrary(UCOMITypeLib typeLib, Guid clsid);

[C++] public: String* GenerateFromTypeLibrary(UCOMITypeLib* typeLib, Guid clsid);

[VB] Public Function GenerateFromTypeLibrary(ByVal typeLib As UCOMITypeLib, ByVal clsid As Guid) As String

[JScript] public function GenerateFromTypeLibrary (typeLib: UCOMITypeLib, clsid: Guid): String;

Description

Generates a wrapper for an ActiveX control for use in the design-time environment. A GUID for the wrapper.

j) GetFileOfTypeLib

[C#] public static string GetFileOfTypeLib(ref TYPELIBATTR tlibattr);

[C++] public: static String* GetFileOfTypeLib(TYPELIBATTR* tlibattr);

[VB] Public Shared Function GetFileOfTypeLib(ByRef tlibattr As TYPELIBATTR) As String

[JScript] public static function GetFileOfTypeLib(tlibattr: TYPELIBATTR): String; Gets the file name corresponding to the given TypelibAttribute.

AxParameterData class (System.Windows.Forms.Design)

a) ToString

Description

Represents a parameter of a method of a hosted ActiveX control.

b) AxParameterData

Example Syntax:

c) ToString

[C#] public AxParameterData(ParameterInfo info);

[C++] public: AxParameterData(ParameterInfo* info);

[VB] Public Sub New(ByVal info As ParameterInfo)

[JScript] public function AxParameterData(info: ParameterInfo);

Description

Initializes a new instance of the System.Windows.Forms.Design.AxParameterData class using the specified parameter information. A System.Reflection.ParameterInfo indicating the parameter information to use.

d) AxParameterData

Example Syntax:

e) ToString

[C#] public AxParameterData(ParameterInfo info, bool ignoreByRefs);

[C++] public: AxParameterData(ParameterInfo* info, bool ignoreByRefs);

[VB] Public Sub New(ByVal info As ParameterInfo, ByVal ignoreByRefs As Boolean)

[JScript] public function AxParameterData(info: ParameterInfo, ignoreByRefs: Boolean);

Description

Initializes a new instance of the System.Windows.Forms.Design.AxParameterData class using the specified parameter information and whether to ignore by reference parameters. A System.Reflection.ParameterInfo indicating the parameter information to use. A value indicating whether to ignore parameters passed by reference.

f) AxParameterData

Example Syntax:

g) ToString

[C#] public AxParameterData(string inname, string typeName);

[C++] public: AxParameterData(String* inname, String* typeName);

[VB] Public Sub New(ByVal inname As String, ByVal typeName As String)

[JScript] public function AxParameterData(inname: String, typeName: String); Initializes a new instance of the System.Windows.Forms.Design.AxParameterData class using the specified name and type name.

Description

Initializes a new instance of the System.Windows.Forms.Design.AxParameterData class using the specified name and type name. The name of the parameter. The name of the type expected by the parameter.

h) AxParameterData

Example Syntax:

i) ToString

[C#] public AxParameterData(string inname, Type type);

[C++] public: AxParameterData(String* inname, Type* type);

[VB] Public Sub New(ByVal inname As String, ByVal type As Type)

[JScript] public function AxParameterData(inname: String, type: Type);

Description

Initializes a new instance of the System.Windows.Forms.Design.AxParameterData class using the specified name and type. The name of the parameter. The type expected by the parameter.

j) Direction
k) ToString

[C#] public FieldDirection Direction {get;}

[C++] public: _property FieldDirection get_Direction( );

[VB] Public ReadOnly Property Direction As FieldDirection

[JScript] public function get Direction( ): FieldDirection;

Description

Indicates the direction of assignment fields.
l) IsByRef
m) ToString

[C#] public bool IsByRef {get;}

[C++] public: _property bool get_IsByRef( );

[VB] Public ReadOnly Property IsByRef As Boolean

[JScript] public function get IsByRef( ): Boolean;

Description

Indicates whether the parameter data is passed by reference.
n) IsIn
o) ToString

[C#] public bool IsIn {get;}

[C++] public: _property bool getIsIn( );

[VB] Public ReadOnly Property IsIn As Boolean

[JScript] public function get IsIn( ): Boolean;

Description

Indicates whether the parameter data is in.
p) IsOptional
q) ToString

[C#] public bool IsOptional {get;}

[C++] public: _property bool get_IsOptional( );

[VB] Public ReadOnly Property IsOptional As Boolean

[JScript] public function get IsOptional( ): Boolean;

Description

Indicates whether the parameter data is optional.
r) IsOut
s) ToString

[C#] public bool IsOut {get;}

[C++] public: _property bool getIsOut( );

[VB] Public ReadOnly Property IsOut As Boolean

[JScript] public function get IsOut( ): Boolean;

Description

Indicates whether the parameter data is out.
t) Name
u) ToString

[C#] public string Name {get; set;}

[C++] public: _property String* get Name( ); public: _property void set_Name(String*);

[VB] Public Property Name As String

[JScript] public function get Name( ): String; public function set Name(String);

Description

Gets or sets the name of the parameter.
v) ParameterType
w) ToString

[C#] public Type ParameterType {get;}

[C++] public: _property Type* get_ParameterType( );

[VB] Public ReadOnly Property ParameterType As Type

[JScript] public function get ParameterType( ): Type;

Description

Gets or sets the type expected by the parameter.
x) TypeName
y) ToString

[C#] public string TypeName {get;}

[C++] public: _property String* get TypeName( );

[VB] Public ReadOnly Property TypeName As String

[JScript] public function get TypeName( ): String;

Description

Gets or sets the name of the type expected by the parameter.
z) Convert

[C#] public static AxParameterData[ ] Convert(ParameterInfo[ ] infos);

[C++] public: static AxParameterData* Convert(ParameterInfo* infos[ ])[ ]

[VB] Public Shared Function Convert(ByVal infos( ) As ParameterInfo) As AxParameterData( )

[JScript] public static function Convert(infos: Parameter Info[ ]) AxParameterData[ ]; Converts the specified parameter information to an System.Windows.Forms.Design.AxParameterData object.

Description

Converts the specified parameter information to an System.Windows.Forms.Design.AxParameterData object.

Return Value: An array of System.Windows.Forms.Design.AxParameterData objects representing the specified array of System.Reflection.ParameterInfo objects. An array of System.Reflection.ParameterInfo objects to convert.
aa) Convert

[C#] public static AxParameterData[ ] Convert(ParameterInfo[ ] infos, bool ignoreByRefs);

[C++] public: static AxParameterData* Convert(ParameterInfo* infos[ ], bool ignoreByRefs) [ ];

[VB] Public Shared Function Convert(ByVal infos( ) As ParameterInfo, ByVal ignoreByRefs As Boolean) As AxParameterData( )

[JScript] public static function Convert(infos: Parameter Info[ ], ignoreByRefs: Boolean) AxParameterData[ ];

Description

Converts the specified parameter information to an System.Windows.Forms.Design.AxParameterData object, according to the specified value indicating whether to ignore by reference parameters.

Return Value: An array of System.Windows.Forms.Design.AxParameterData objects representing the specified array of System.Reflection.ParameterInfo objects. An array of System.Reflection.ParameterInfo objects to convert. A value indicating whether to ignore parameters passed by reference.

AxWrapperGen class (System.Windows.Forms.Design)

a) ToString

Description

Generates a wrapper for ActiveX controls for use in the design-time environment.

b) ToString

[C#] public static ArrayList GeneratedSources;

[C++] public: static ArrayList* GeneratedSources;

[VB] Public Shared GeneratedSources As ArrayList

[JScript] public static var GeneratedSources: ArrayList;

Description

This field initializes a local ArrayList variable named GeneratedSources.

c) AxWrapperGen

Example Syntax:

d) ToString

[C#] public AxWrapperGen(Type axType);

[C++] public: AxWrapperGen(Type* axtype);

[VB] Public Sub New(ByVal axType As Type)

[JScript] public function AxWrapperGen(axType: Type);

Description

Generates an ActiveX wrapper for design-time hosting of an ActiveX control. The type of ActiveX control to generate a wrapper for.

ComponentDocumentDesigner class (System.Windows.Forms.Design)

a) ToString

Description

Provides a Windows Forms designer implementation for designing components.

b) ComponentDocumentDesigner

Example Syntax:

c) ToString

[C#] public ComponentDocumentDesigner( );

[C++] public: ComponentDocumentDesigner( );

[VB] Public Sub New( )

[JScript] public function ComponentDocumentDesigner( );

d) AssociatedComponents e) Component f) Control g) ToString

Description

Gets the control for this designer.

h) InheritanceAttribute i) Inherited j) ShadowProperties k) TrayAutoArrange l) ToString Description Indicates whether the component tray for this designer is in auto-arrange mode.

m) TrayLargeIcon n) ToString

[C#] public bool TrayLargeIcon {get; set;}

[C++] public: _property bool get_TrayLargeIcon( ); public: _property void set_TrayLargeIcon(bool);

[VB] Public Property TrayLargeIcon As Boolean

[JScript] public function get TrayLargeIcono: Boolean; public function set TrayLargeIcon(Boolean);

Description

Indicates whether the component tray for this designer is in large icon mode.

o) Verbs p) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Releases the unmanaged resources used by the System.Windows.Forms.Design.ComponentDocumentDesigner and optionally releases the managed resources.

This method is called by the public Dispose( ) method and the System.Object.Finalize method. true to release both managed and unmanaged resources; false to release only unmanaged resources.

q) GetToolSupported

[C#] protected virtual bool GetToolSupported(ToolboxItem tool);

[C++] protected: virtual bool GetToolSupported(ToolboxItem* tool);

[VB] Overridable Protected Function GetToolSupported(ByVal tool As ToolboxItem) As Boolean

[JScript] protected function GetToolSupported(tool: ToolboxItem): Boolean;

Description

Gets a value indicating whether the specified tool is supported by this designer.

Return Value: true if the tool should be enabled on the toolbox; false if the document designer doesn't know how to use the tool.

If a tool is supported then it will be enabled in the toolbox when this designer regains focus. Otherwise, it will be disabled. Once a tool is marked as enabled or disabled it may not be queried again. The tool that is to be enabled on the toolbox.

r) Initialize

[C#] public override void Initialize(IComponent component);

[C++] public: void Initialize(IComponent* component);

[VB] Overrides Public Sub Initialize(ByVal component As IComponent)

[JScript] public override function Initialize(component: IComponent);

Description

Initializes the designer with the specified component.

The designer can get the component's site and request services from it with this call. The component to associate with this designer.

s) PostFilterProperties

[C#] protected override void PostFilterProperties(IDictionary properties);

[C#] protected: void PostFilterProperties(IDictionary* properties);

[VB] Overrides Protected Sub PostFilterProperties(ByVal properties As IDictionary)

[JScript] protected override function PostFilterProperties (properties: IDictionary);

Description

Allows a designer to filter the set of properties the component it is designing will expose through a System.ComponentModel.TypeDescriptor object.

Return Value: The augmented set of properties. If the method does not modify any properties, it may just return a reference to its input parameter. If you do make a change to the properties, you must create a new array.

This method is called immediately after its corresponding "Post" method. If you are overriding this method you should call the base implementation after you perform your own filtering. The properties for the class of the component.

t) PreFilterProperties

[C#] protected override void PreFilterProperties(IDictionary properties);

[C++] protected: void PreFilterProperties(IDictionary* properties);

[VB] Overrides Protected Sub PreFilterProperties(ByVal properties As IDictionary)

[JScript] protected override function PreFilterProperties (properties: IDictionary);

Description

Allows a designer to filter the set of properties the component it is designing will expose through a System.ComponentModel.TypeDescriptor object.

Return Value: The augmented set of properties. If the method does not modify any properties, it may just return a reference to its input parameter. If you do make a change to the properties, you must create a new array to return.

This method is called immediately before its corresponding "Post" method. If you are overriding this method you should call the base implementation before you perform your own filtering. The properties for the class of the component.

u) IRootDesigner.GetView

[C#] object IRootDesigner.GetView(ViewTechnology technology);

[C++] Object* IRootDesigner::GetView(ViewTechnology technology);

[VB] Function GetView(ByVal technology As ViewTechnology) As Object Implements IRootDesigner.GetView

[JScript] function IRootDesigner.GetView(technology: ViewTechnology): Object;

v) IToolboxUser.GetToolSupported

[C#] bool IToolboxUser.GetToolSupported(ToolboxItem tool);

[C++] bool IToolboxUser::GetToolSupported(ToolboxItem* tool);

[VB] Function GetToolSupported(ByVal tool As ToolboxItem) As Boolean Implements IToolboxUser.GetToolSupported

[JScript] function IToolboxUser.GetToolSupported(tool: ToolboxItem): Boolean;

w) IToolboxUser.ToolPicked

[C#] void IToolboxUser.ToolPicked(ToolboxItem tool);

[C++] void IToolboxUser::ToolPicked(ToolboxItem* tool);

[VB] Sub ToolPicked(ByVal tool As ToolboxItem) Implements IToolboxUser.ToolPicked

[JScript] function IToolboxUser.ToolPicked(tool: ToolboxItem);

x) IOleDragClient.AddComponent

[C#] bool IOleDragClient.AddComponent(IComponent component, string name, bool firstAdd);

[C++] bool IOleDragClient::AddComponent(IComponent* component, String* name, bool firstAdd);

[VB] Function AddComponent(ByVal component As IComponent, ByVal name As String, ByVal firstAdd As Boolean) As Boolean Implements IOleDragClient.AddComponent

[JScript] function IOleDragClient.AddComponent(component: IComponent, name: String, firstAdd: Boolean): Boolean;

y) IOleDragClient.GetControlForComponent

[C#] Control IOleDragClient.GetControlForComponent(object component);

[C++] Control* IOleDragClient::GetControlForComponent (Object* component);

[VB] Function GetControlForComponent(ByVal component As Object) As Control Implements IOleDragClient.GetControlForComponent

[JScript] function IOleDragClient.GetControlForComponent(component: Object): Control;

z) IOleDragClient.GetDesignerControl

[C#] Control IOleDragClient.GetDesignerControl( );

[C++] Control* IOleDragClient::GetDesignerControl( );

[VB] Function GetDesignerControl( ) As Control Implements IOleDragClient.GetDesignerControl

[JScript] function IOleDragClient.GetDesignerControl( ): Control;

aa) IOleDragClient.IsDropOk

[C#] bool IOleDragClient.IsDropOk(IComponent component);

[C++] bool IOleDragClient::IsDropOk(IComponent* component);

[VB] Function IsDropOk(ByVal component As IComponent) As Boolean Implements IOleDragClient.IsDropOk

[JScript] function IOleDragClient.IsDropOk(component: IComponent): Boolean;

ComponentTray class (System.Windows.Forms.Design)

a) ToString

Description

Provides the user interface for the component tray of the form designer that represents non-visible components at design-time.

b) ComponentTray

Example Syntax:

c) ToString

[C#] public ComponentTray(IDesigner mainDesigner, IServiceProvider serviceProvider);

[C++] public: ComponentTray(IDesigner* mainDesigner, IServiceProvider* serviceProvider);

[VB] Public Sub New(ByVal mainDesigner As IDesigner, ByVal serviceProvider As IServiceProvider)

[JScript] public function ComponentTray(mainDesigner: IDesigner, serviceProvider: IServiceProvider);

Description

Initializes a new instance of the System.Windows.Forms.Design.ComponentTray class using the specified designer and service provider.

The component tray will monitor component additions and removals and display appropriate UI objects to represent the components it contains. The main designer for the current project. An System.IServiceProvider that can be used to obtain design-time services.

d) AccessibilityObject e) AccessibleDefaultActionDescription f) AccessibleDescription g) AccessibleName h) AccessibleRole i) AllowDrop j) Anchor k) AutoArrange l) ToString Description Indicates whether the positions of the tray items are automatically aligned.

m) AutoScroll n) AutoScrollMargin o) AutoScrollMinSize p) AutoScrollPosition q) BackColor r) BackgroundImage s) BindingContext t) Bottom u) Bounds v) CanFocus w) CanSelect x) Capture y) CausesValidation z) ClientRectangle aa) ClientSize bb) CompanyName cc) ComponentCount dd) ToString Description Gets the number of components contained within the tray.

ee) Container ff) ContainsFocus gg) ContextMenu hh) Controls ii) Created jj) CreateParams kk) Cursor ll) DataBindings mm) DefaultImeMode nn) DefaultSize oo) DesignMode pp) DisplayRectangle qq) Disposing rr) Dock ss) DockPadding tt) Enabled uu) Events vv) Focused ww) Font xx) FontHeight yy) ForeColor zz) Handle aaa) HasChildren bbb) Height ccc) HScroll ddd) ImeMode eee) InvokeRequired fff) IsAccessible ggg) IsDisposed hhh) IsHandleCreated iii) Left jjj) Location kkk) Name lll) Parent mmm) ProductName nnn) ProductVersion ooo) RecreatingHandle ppp) Region qqq) RenderRightToLeft rrr) ResizeRedraw sss) Right ttt) RightToLeft uuu) ShowFocusCues vvv) ShowKeyboardCues www) ShowLargeIcons xxx) ToString Description Indicates whether the tray will display large icons for the non-visible components.

yyy) Site zzz) Size aaaa) TabIndex bbbb) TabStop cccc) Tag dddd) Text eeee) Top ffff) TopLevelControl gggg) Visible hhhh) VScroll iiii) Width jjjj) WindowTarget kkkk) AddComponent

[C#] public virtual void AddComponent(IComponent component);

[C++] public: virtual void AddComponent(IComponent* component);

[VB] Overridable Public Sub AddComponent(ByVal component As IComponent)

[JScript] public function AddComponent(component: IComponent); Adds a component to the tray.

Description

Adds a component to the tray. The component to add.

llll) CanCreateComponentFromTool

[C#] protected virtual bool CanCreateComponentFromTool (ToolboxItem tool);

[C++] protected: virtual bool CanCreateComponentFromTool(ToolboxItem* tool);

[VB] Overridable Protected Function CanCreateComponentFromTool(ByVal tool As ToolboxItem) As Boolean

[JScript] protected function CanCreateComponentFromTool (tool: ToolboxItem) Boolean;

Description

Indicates whether the specified tool can be used to create a new component.

Return Value: true if the specified tool can be used to create a component; otherwise, false. The System.Drawing.Design.ToolboxItem to determine whether a component can be created from.

mmmm) CanDisplayComponent

[C#] protected virtual bool CanDisplayComponent(IComponent component);

[C++] protected: virtual bool CanDisplayComponent(IComponent* component);

[VB] Overridable Protected Function CanDisplayComponent(ByVal component As IComponent) As Boolean

[JScript] protected function CanDisplayComponent(component: IComponent): Boolean;

Description

Gets a value indicating whether the specified component can be displayed.

Return Value: true if the component can be displayed; otherwise, false .

Some types of components, such as a Timer, may not have a UI that can be viewed at design-time. These components are usually represented by icons that are shown in the component tray. The component to determine whether can be displayed.

nnnn) CreateComponentFromTool

[C#] public void CreateComponentFromTool(ToolboxItem tool); [C++] public: void CreateComponentFromTool(ToolboxItem* tool);

[VB] Public Sub CreateComponentFromTool(ByVal tool As ToolboxItem)

[JScript] public function CreateComponentFromTool(tool: ToolboxItem);

Description

Creates a component in the component tray from the specified System.Drawing.Design.ToolboxItem.

This method checks that the component has a System.ComponentModel.DesignTimeVisibleAttribute before attempting to create it and add it to the component tray. The ToolboxItem to create a component from.

oooo) DisplayError

[C#] protected void DisplayError(Exception e);

[C++] protected: void DisplayError(Exception* e);

[VB] Protected Sub DisplayError(ByVal e As Exception)

[JScript] protected function DisplayError(e: Exception);

Description

Displays an error message to the user with information about or from the specified exception. The exception to display.

pppp) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Releases the unmanaged resources used by the System.Windows.Forms.Design.ComponentTray and optionally releases the managed resources.

This method is called by the public Dispose( ) method and the System.Object.Finalize method. true to release both managed and unmanaged resources; false to release only unmanaged resources.

qqqq) GetLocation

[C#] public Point GetLocation(IComponent receiver);

[C++] public: Point GetLocation(IComponent* receiver);

[VB] Public Function GetLocation(ByVal receiver As IComponent) As Point

[JScript] public function GetLocation(receiver: IComponent): Point;

Description

Gets the location of the specified component.

Return Value: A System.Drawing.Point object indicating the coordinates of the specified component, or an empty System.Drawing.Point object if the specified component could not be found in the component tray. An empty System.Drawing.Point object has an System.Drawing.Point.IsEmpty property equal to true and typically System.Drawing.Point.X and System.Drawing.Point.Y properties equal to zero.

System.Windows.Forms.Design.ComponentTray.GetLocation(System.ComponentModel.IComponent) is an accessor method for the location extender property that is added to each non-visual component in the component tray. The IComponent to retrieve the location of.

rrrr) GetService

[C#] protected override object GetService(Type serviceType);

[C++] protected: Object* GetService(Type* serviceType);

[VB] Overrides Protected Function GetService(ByVal serviceType As Type) As Object

[JScript] protected override function GetService(serviceType: Type): Object;

Description

Gets the requested service type.

Return Value: An instance of the requested service, or null if the service could not be found. The type of the service to retrieve.

ssss) OnDoubleClick

[C#] protected override void OnDoubleClick(EventArgs e);

[C++] protected: void OnDoubleClick(EventArgs* e);

[VB] Overrides Protected Sub OnDoubleClick(ByVal e As EventArgs)

[JScript] protected override function OnDoubleClick(e: EventArgs);

Description tttt) OnDragDrop

[C#] protected override void OnDragDrop(DragEventArgs de);

[C++] protected: void OnDragDrop(DragEventArgs* de);

[VB] Overrides Protected Sub OnDragDrop(ByVal de As DragEventArgs)

[JScript] protected override function OnDragDrop(de: Drag EventArgs);

Description

Called in response to a drag drop for OLE drag and drop. Here we drop a toolbox component on our parent control.

uuuu) OnDragEnter

[C#] protected override void OnDragEnter(DragEventArgs de);

[C++] protected: void OnDragEnter(DragEventArgs* de);

[VB] Overrides Protected Sub OnDragEnter(ByVal de As DragEventArgs)

[JScript] protected override function OnDragEnter(de: Drag EventArgs);

Description

Called in response to a drag enter for OLE drag and drop.

vvvv) OnDragLeave

[C#] protected override void OnDragLeave(EventArgs e);

[C++] protected: void OnDragLeave(EventArgs* e);

[VB] Overrides Protected Sub OnDragLeave(ByVal e As EventArgs)

[JScript] protected override function OnDragLeave(e: Event Args);

Description

Called when a drag-drop operation leaves the control designer view Called when a drag-drop operation leaves the control designer view wwww) OnDragOver

[C#] protected override void OnDragOver(DragEventArgs de);

[C++] protected: void OnDragOver(DragEventArgs* de);

[VB] Overrides Protected Sub OnDragOver(ByVal de As DragEventArgs)

[JScript] protected override function OnDragOver(de: Drag EventArgs);

Description

Called when a drag drop object is dragged over the control designer view Called when a drag drop object is dragged over the control designer view xxxx) OnGiveFeedback

[C#] protected override void OnGiveFeedback(GiveFeedbackEventArgs gfevent);

[C++] protected: void OnGiveFeedback(GiveFeedbackEventArgs* gfevent);

[VB] Overrides Protected Sub OnGiveFeedback(ByVal gfevent As GiveFeedbackEventArgs)

[JScript] protected override function OnGiveFeedback(gfevent: GiveFeedbackEventArgs);

Description

Inheriting classes should override this method to handle this event. Call base.onGiveFeedback to send this event to any registered event listeners. event yyyy) OnLayout

[C#] protected override void OnLayout(LayoutEventArgs levent);

[C++] protected: void OnLayout(LayoutEventArgs* levent);

[VB] Overrides Protected Sub OnLayout(ByVal levent As LayoutEventArgs)

[JScript] protected override function OnLayout(levent: LayoutEventArgs);

Description

Forces the layout of any docked or anchored child controls.

zzzz) OnLostCapture

[C#] protected virtual void OnLostCapture( );

[C++] protected: virtual void OnLostCapture( );

[VB] Overridable Protected Sub OnLostCapture( )

[JScript] protected function OnLostCapture( );

Description

This is called when we lose capture. Here we get rid of any rubber band we were drawing. You should put any cleanup code in here.

aaaaa) OnMouseDown

[C#] protected override void OnMouseDown(MouseEvent Args e);

[C++] protected: void OnMouseDown(MouseEventArgs* e);

[VB] Overrides Protected Sub OnMouseDown(ByVal e As MouseEventArgs)

[JScript] protected override function OnMouseDown(e: MouseEventArgs);

Description

Inheriting classes should override this method to handle this event. Call base.onMouseDown to send this event to any registered event listeners. event bbbbb) OnMouseMove

[C#] protected override void OnMouseMove(MouseEvent Args e);

[C++] protected: void OnMouseMove(MouseEventArgs* e);

[VB] Overrides Protected Sub OnMouseMove(ByVal e As MouseEventArgs)

[JScript] protected override function OnMouseMove(e: MouseEventArgs);

Description

Inheriting classes should override this method to handle this event. Call base.on MouseMove to send this event to any registered event listeners. event ccccc) OnMouseUp

[C#] protected override void OnMouseUp(MouseEventArgs e);

[C++] protected: void OnMouseUp(MouseEventArgs* e);

[VB] Overrides Protected Sub OnMouseUp(ByVal e As MouseEventArgs)

[JScript] protected override function OnMouseUp(e: Mouse EventArgs);

Description

Inheriting classes should override this method to handle this event. Call base.on MouseUp to send this event to any registered event listeners. event ddddd) OnPaint

[C#] protected override void OnPaint(PaintEventArgs pe);

[C++] protected: void OnPaint(PaintEventArgs* pe);

[VB] Overrides Protected Sub OnPaint(ByVal pe As PaintEventArgs)

[JScript] protected override function OnPaint(pe: PaintEvent Args);

Description eeeee) OnResize

[C#] protected override void OnResize(EventArgs e);

[C++] protected: void OnResize(EventArgs* e);

[VB] Overrides Protected Sub OnResize(ByVal e As Event Args)

[JScript] protected override function OnResize(e: Event Args);

Description fffff) OnSetCursor

[C#] protected virtual void OnSetCursor( );

[C++] protected: virtual void OnSetCursor( );

[VB] Overridable Protected Sub OnSetCursor( )

[JScript] protected function OnSetCursor( );

Description

Sets the cursor. You can override this to set your own cursor.

ggggg) RemoveComponent

[C#] public virtual void RemoveComponent(IComponent component);

[C++] public: virtual void RemoveComponent(IComponent* component);

[VB] Overridable Public Sub RemoveComponent(ByVal component As IComponent)

[JScript] public function RemoveComponent(component: IComponent);

Description

Removes a component from the tray. The component to remove.

hhhhh) SetLocation

[C#] public void SetLocation(IComponent receiver, Point location);

[C++] public: void SetLocation(IComponent* receiver, Point location);

[VB] Public Sub SetLocation(ByVal receiver As IComponent, ByVal location As Point)

[JScript] public function SetLocation(receiver: IComponent, location: Point);

Description

Sets the location of the specified component to the specified location. The component to set the location of. The new location for the specified component.

iiiii) IExtenderProvider.CanExtend

[C#] bool IExtenderProvider.CanExtend(object component);

[C++] bool IExtenderProvider::CanExtend(Object* component);

[VB] Function CanExtend(ByVal component As Object) As Boolean Implements IExtenderProvider.CanExtend

[JScript] function IExtenderProvider.CanExtend(component: Object): Boolean;

jjjjj) IOleDragClient.AddComponent

[C#] bool IOleDragClient.AddComponent(IComponent component, string name, bool firstAdd);

[C++] bool IOleDragClient::AddComponent(IComponent* component, String* name, bool firstAdd);

[VB] Function AddComponent(ByVal component As IComponent, ByVal name As String, ByVal firstAdd As Boolean) As Boolean Implements IOleDragClient.AddComponent

[JScript] function IOleDragClient.AddComponent(component: IComponent, name: String, firstAdd: Boolean): Boolean;

kkkkk) IOleDragClient.GetControlForComponent

[C#] Control IOleDragClient.GetControlForComponent(object component);

[C++] Control* IOleDragClient::GetControlForComponent (Object* component);

[VB] Function GetControlForComponent(ByVal component As Object) As Control Implements IOleDragClient.GetControlForComponent

[JScript] function IOleDragClient.GetControlForComponent(component: Object): Control;

lllll) IOleDragClient.GetDesignerControl

[C#] Control IOleDragClient.GetDesignerControl( );

[C++] Control* IOleDragClient::GetDesignerControl( );

[VB] Function GetDesignerControl( ) As Control Implements IOleDragClient.GetDesignerControl

[JScript] function IOleDragClient.GetDesignerControl( ): Control;

mmmmm) IOleDragClient.IsDropOk

[C#] bool IOleDragClient.IsDropOk(IComponent component);

[C++] bool IleDragClient::IsDropOk(IComponent* component);

[VB] Function IsDropOk(ByVal component As IComponent) As Boolean Implements IOleDragClient.IsDropOk

[JScript] function IOleDragClient.IsDropOk(component: IComponent): Boolean;

nnnnn) ISelectionUIHandler.BeginDrag

[C#] bool ISelectionUIHandler.BeginDrag(object[ ] components, SelectionRules rules, int initialX, int initialY);

[C++] bool ISelectionUIHandler::BeginDrag(Object* components _gc[ ], SelectionRules rules, int initialX, int initialY);

[VB] Function BeginDrag(ByVal components( ) As Object, ByVal rules As SelectionRules, ByVal initialX As Integer, ByVal initialY As Integer) As Boolean Implements ISelectionUIHandler.BeginDrag

[JScript] function ISelectionUIHandler.BeginDrag(components: Object[ ], rules: SelectionRules, initialX: int, initialY: int): Boolean;

ooooo) ISelectionUIHandler.DragMoved

[C#] void ISelectionUIHandler.DragMoved(object[ ] components, Rectangle offset);

[C++] void ISelectionUIHandler::DragMoved(Object* components _gc[ ], Rectangle offset);

[VB] Sub DragMoved(ByVal components( ) As Object, ByVal offset As Rectangle) Implements ISelectionUIHandler.DragMoved

[JScript] function ISelectionUIHandler.DragMoved(components: Object[ ], offset: Rectangle);

ppppp) ISelectionUIHandler.EndDrag

[C#] void ISelectionUIHandler.EndDrag(object[ ] components, bool cancel);

[C++] void ISelectionUIHandler::EndDrag(Object* components _gc[ ], bool cancel);

[VB] Sub EndDrag(ByVal components( ) As Object, ByVal cancel As Boolean) Implements ISelectionUIHandler.EndDrag

[JScript] function ISelectionUIHandler.EndDrag(components: Object[ ], cancel: Boolean);

qqqqq) ISelectionUIHandler.GetComponentBounds

[C#] Rectangle ISelectionUIHandler.GetComponentBounds (object component);

[C++] Rectangle ISelectionUIHandler::GetComponentBounds(Object* component);

[VB] Function GetComponentBounds(ByVal component As Object) As Rectangle Implements ISelectionUIHandler.GetComponentBounds

[JScript] function ISelectionUIHandler.GetComponentBounds(component: Object): Rectangle;

rrrrr) ISelectionUIHandler.GetComponentRules

[C#] SelectionRules ISelectionUIHandler.GetComponentRules(object component);

[C++] SelectionRules ISelectionUIHandler::GetComponent Rules(Object* component);

[VB] Function GetComponentRules(ByVal component As Object) As SelectionRules Implements ISelectionUIHandler.GetComponentRules

[JScript] function ISelectionUIHandler.GetComponentRules (component: Object): SelectionRules;

sssss) ISelectionUIHandler.GetSelectionClipRect

[C#] Rectangle ISelectionUIHandler.GetSelectionClipRect (object component);

[C++] Rectangle ISelectionUIHandler::GetSelectionClipRect(Object* component);

[VB] Function GetSelectionClipRect(ByVal component As Object) As Rectangle Implements ISelectionUIHandler.GetSelectionClipRect

[JScript] function ISelectionUIHandler.GetSelectionClipRect(component: Object): Rectangle;

ttttt) ISelectionUIHandler.OleDragDrop

[C#] void ISelectionUIHandler.OleDragDrop(DragEvent Args de);

[C++] void ISelectionUIHandler::OleDragDrop(DragEvent Args* de);

[VB] Sub OleDragDrop(ByVal de As DragEventArgs) Implements ISelectionUIHandler.OleDragDrop

[JScript] function ISelectionUIHandler.OleDragDrop(de: DragEventArgs);

uuuuu) ISelectionUIHandler.OleDragEnter

[C#] void ISelectionUIHandler.OleDragEnter(DragEventArgs de);

[C++] void ISelectionUIHandler::OleDragEnter(DragEvent Args* de);

[VB] Sub OleDragEnter(ByVal de As DragEventArgs) Implements ISelectionUIHandler.OleDragEnter

[JScript] function ISelectionUIHandler.OleDragEnter(de: DragEventArgs);

vvvv) ISelectionUIHandler.OleDragLeave

[C#] void ISelectionUIHandler.OleDragLeave( );

[C++] void ISelectionUIHandler::OleDragLeave( );

[VB] Sub OleDragLeave( ) Implements ISelectionUIHandler. OleDragLeave

[JScript] function ISelectionUIHandler.OleDragLeave( );

wwwww) ISelectionUIHandler.OleDragOver

[C#] void ISelectionUIHandler.OleDragOver(DragEvent Args de);

[C++] void ISelectionUIHandler::OleDragOver(DragEvent Args* de);

[VB] Sub OleDragOver(ByVal de As DragEventArgs) Implements ISelectionUIHandler.OleDragOver

[JScript] function ISelectionUIHandler.OleDragOver(de: DragEventArgs);

xxxxx) ISelectionUIHandler.OnSelectionDoubleClick

[C#] void ISelectionUIHandler.OnSelectionDoubleClick (IComponent component);

[C++] void ISelectionUIHandler::OnSelectionDoubleClick (IComponent* component);

[VB] Sub OnSelectionDoubleClick(ByVal component As IComponent) Implements ISelectionUIHandler.OnSelectionDoubleClick

[JScript] function ISelectionUIHandler.OnSelectionDoubleClick(component: IComponent);

yyyyy) ISelectionUIHandler.QueryBeginDrag

[C#] bool ISelectionUIHandler.QueryBeginDrag(object[ ] components, SelectionRules rules, int initialX, int initialY);

[C++] bool ISelectionUIHandler::QueryBeginDrag(Object* components _gc[ ], SelectionRules rules, int initialX, int initialY);

[VB] Function QueryBeginDrag(ByVal components( ) As Object, ByVal rules As SelectionRules, ByVal initialX As Integer, ByVal initialY As Integer) As Boolean Implements ISelectionUIHandler.QueryBeginDrag

[JScript] function ISelectionUIHandler.QueryBeginDrag (components: Object[ ], rules: SelectionRules, initialX: int, initialY: int): Boolean;

zzzzz) ISelectionUIHandler.ShowContextMenu

[C#] void ISelectionUIHandler.ShowContextMenu(IComponent component);

[C++] void ISelectionUIHandler::ShowContextMenu (IComponent* component);

[VB] Sub ShowContextMenu(ByVal component As IComponent) Implements ISelectionUIHandler.ShowContextMenu

[JScript] function ISelectionUIHandler.ShowContextMenu (component: IComponent);

aaaaaa) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

Overrides the base class's WndProc method to monitor for specific messages. The message to process.

ControlDesigner class (System.Windows.Forms.Design)

a) WndProc

Description

Provides design-time support for components that extend Control.

Users wishing to extend the design-time support of their own components should inherit from System.Windows.Forms.Design.ControlDesigner.

b) WndProc

[C#] protected AccessibleObject accessibilityObj;

[C++] protected: AccessibleObject* accessibilityObj;

[VB] Protected accessibilityObj As AccessibleObject

[JScript] protected var accessibilityObj: AccessibleObject;

c) WndProc

[C#] protected static readonly Point InvalidPoint;

[C++] protected: static Point InvalidPoint;

[VB] Protected Shared ReadOnly InvalidPoint As Point

[JScript] protected static var InvalidPoint: Point;

Description d) ControlDesigner

Example Syntax:

e) WndProc

[C#] public ControlDesigner( );

[C++] public: ControlDesigner( );

[VB] Public Sub New( )

[JScript] public function ControlDesigner( );

f) AccessibilityObject g) WndProc

[C#] public virtual AccessibleObject AccessibilityObject {get;}

[C++] public: _property virtual AccessibleObject* get_AccessibilityObject( );

[VB] Overridable Public ReadOnly Property AccessibilityObject As AccessibleObject

[JScript] public function get AccessibilityObject( ): AccessibleObject;

Description h) AssociatedComponents i) WndProc

[C#] public override ICollection AssociatedComponents {get;}

[C++] public: _property virtual ICollection* get_AssociatedComponents( );

[VB] Overrides Public ReadOnly Property AssociatedComponents As ICollection

[JScript] public function get AssociatedComponents( ): ICollection;

Description

Gets or sets the collection of components associated with the designer.

j) Component k) Control l) WndProc

Description

Gets the control being designed.

m) EnableDragRect n) WndProc

[C#] protected virtual bool EnableDragRect {get;}

[C++] protected: property virtual bool get EnableDrag Rect( );

[VB] Overridable Protected ReadOnly Property EnableDrag Rect As Boolean

[JScript] protected function get EnableDragRect( ): Boolean;

Description

Indicates whether drag rectangles can be drawn on this designer component.

o) InheritanceAttribute p) Inherited q) SelectionRules r) WndProc

Description

Gets or sets the selection rules that indicate the movement capabilities of a component.

This should be one or more flags from the System.Windows. Forms.Design.SelectionRules class. If no designer provides rules for a component, the component will not get any UI services.

s) ShadowProperties t) Verbs u) BaseWndProc

[C#] protected void BaseWndProc(ref Message m);

[C++] protected: void BaseWndProc(Message* m);

[VB] Protected Sub BaseWndProc(ByRef m As Message)

[JScript] protected fuction BaseWndProc(m Message);

Description

Provides default processing for messages.

This method causes the message to get processed by windows, skipping the control. This is useful if you want to block this message from getting to the control, but you do not want to block it from getting to Windows itself because it causes other messages to be generated. The message to process.

v) CanBeParentedTo

[C#] public virtual bool CanBeParentedTo(IDesigner parentDesigner);

[C++] public: virtual bool CanBeParentedTo(IDesigner* parentDesigner);

[VB] Overridable Public Function CanBeParentedTo(ByVal parentDesigner As IDesigner) As Boolean

[JScript] public function CanBeParentedTo(parentDesigner: IDesigner): Boolean;

Description

Indicates whether the specified designer can be a child of the designer.

Return Value: true if the designer can be parented to the specified designer; otherwise, false.

This method's result typically indicates whether the specified designer's control can be a child of the designer's control. The designer to determine whether can be the parent of this designer.

w) DefWndProc

[C#] protected void DefWndProc(ref Message m);

[C++] protected: void DefWfndProc(Message* m);

[VB] Protected Sub DefWndProc(ByRef m As Message)

[JScript] protected function DefWndProc(m: Message);

Description

Provides default processing for messages.

This method causes the message to get processed by the control, rather than the designer. The message to process.

x) DisplayError

[C#] protected void DisplayError(Exception e);

[C++] protected: void DisplayError(Exception* e);

[VB] Protected Sub DisplayError(ByVal e As Exception)

[JScript] protected function DisplayError(e: Exception);

Description

Displays the specified exception to the user. The exception to display.

y) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Releases the unmanaged resources used by the System.Windows.Forms.Design.ControlDesigner and optionally releases the managed resources.

This method is called by the public Dispose( ) method and the System.Object.Finalize method. true to release both managed and unmanaged resources; false to release only unmanaged resources.

z) EnableDragDrop

[C#] protected void EnableDragDrop(bool value);

[C++] protected: void EnableDragDrop(bool value);

[VB] Protected Sub EnableDragDrop(ByVal value As Boolean)

[JScript] protected function EnableDragDrop(value: Boolean);

Description

Enables or disables drag/drop support. true to enable drag/drop support for the control; false if the control should not have drag/drop support.

aa) GetHitTest

[C#] protected virtual bool GetHitTest(Point point);

[C++] protected: virtual bool GetHitTest(Point point);

[VB] Overridable Protected Function GetHitTest(ByVal point As Point) As Boolean

[JScript] protected function GetHitTest(point: Point): Boolean;

Description

Indicates whether the specified point is within the bounds of the component.

Return Value: true if the specified point is to be handled by the component; false if it is not something the user and this component can interact with.

System.Windows.Forms.Design.ControlDesigner.GetHitTest(System.Drawing.Point) determines whether a specified point is within the area occupied by the control that this designer is designing. This method allows your component to support a design-time user interface that responds to clicks on its control. This method should return true if the specified point was within the bounds of the component, or otherwise return false . A point relative to the upper left of the control.

bb) HookChildControls

[C+] protected void HookChildControls(Control firstChild);

[C++] protected: void HookChildControls(Control* firstChild);

[VB] Protected Sub HookChildControls(ByVal firstChild As Control)

[JScript] protected function HookChildControls(firstChild: Control);

Description

Hooks the children of the specified control.

We need to do this for child controls that are not in design mode, which is the case for composite controls. The first child control to process. This method may recursively call itself for children of this control.

cc) Initialize

[C#] public override void Initialize(IComponent component);

[C++] public: void Initialize(IComponent* component);

[VB] Overrides Public Sub Initialize(ByVal component As IComponent)

[JScript] public override function Initialize(component: IComponent);

Description

Initializes the designer with the specified component.

This method is called by the designer host to initialize the designer. The component to associate this designer with. This must always be an instance of Control.

dd) InitializeNonDefault

[C#] public override void InitializeNonDefault( );

[C++] public: void InitializeNonDefault( );

[VB] Overrides Public Sub InitializeNonDefault( )

[JScript] public override function InitializeNonDefault( );

Description

Initializes properties of the control to any non-default values.

ee) OnContextMenu

[C#] protected virtual void OnContextMenu(int x, int y);

[C++] protected: virtual void OnContextMenu(int x, int y);

[VB] Overridable Protected Sub OnContextMenu(ByVal x As Integer, ByVal y As Integer)

[JScript] protected function OnContextMenu(x: int, y: int);

Description

Called when the context menu should be displayed Called when the context menu should be displayed ff) OnCreateHandle

[C#] protected virtual void OnCreateHandle( );

[C++] protected: virtual void OnCreateHandle( );

[VB] Overridable Protected Sub OnCreateHandle( )

[JScript] protected function OnCreateHandle( );

Description

This is called immediately after the control handle has been created.

gg) OnDragDrop

[C#] protected virtual void OnDragDrop(DragEventArgs de);

[C++] protected: virtual void OnDragDrop(DragEventArgs* de);

[VB] Overridable Protected Sub OnDragDrop(ByVal de As DragEventArgs)

[JScript] protected function OnDragDrop(de: DragEvent Args);

Description

Called when a drag drop object is dropped onto the control designer view Called when a drag drop object is dropped onto the control designer view hh) OnDragEnter

[C#] protected virtual void OnDragEnter(DragEventArgs de);

[C++] protected: virtual void OnDragEnter(DragEventArgs* de);

[VB] Overridable Protected Sub OnDragEnter(ByVal de As DragEventArgs)

[JScript] protected function OnDragEnter(de: DragEvent Args);

Description

Called when a drag-drop operation enters the control designer view Called when a drag-drop operation enters the control designer view ii) OnDragLeave

[C#] protected virtual void OnDragLeave(EventArgs e);

[C++] protected: virtual void OnDragLeave(EventArgs* e);

[VB] Overridable Protected Sub OnDragLeave(ByVal e As EventArgs)

[JScript] protected function OnDragLeave(e: EventArgs);

Description

Called when a drag-drop operation leaves the control designer view Called when a drag-drop operation leaves the control designer view jj) OnDragOver

[C#] protected virtual void OnDragOver(DragEventArgs de);

[C++] protected: virtual void OnDragOver(DragEventArgs* de);

[VB] Overridable Protected Sub OnDragOver(ByVal de As DragEventArgs)

[JScript] protected function OnDragOver(de: DragEvent Args);

Description

Called when a drag drop object is dragged over the control designer view Called when a drag drop object is dragged over the control designer view kk) OnGiveFeedback

[C#] protected virtual void OnGiveFeedback(GiveFeedbackEventArgs e);

[C++] protected: virtual void OnGiveFeedback(GiveFeedbackEventArgs* e);

[VB] Overridable Protected Sub OnGiveFeedback(ByVal e As GiveFeedbackEventArgs)

[JScript] protected function OnGiveFeedback(e: GiveFeedbackEventArgs);

Description

Event handler for our GiveFeedback event, which is called when a drag operation is in progress. The host will call us with this when an OLE drag event happens.

ll) OnMouseDragBegin

[C#] protected virtual void OnMouseDragBegin(int x, int y);

[C++] protected: virtual void OnMouseDragBegin(int x, int y);

[VB] Overridable Protected Sub OnMouseDragBegin(ByVal x As Integer, ByVal y As Integer)

[JScript] protected function OnMouseDragBegin(x: int, y: int);

Description

Called in response to the left mouse button being pressed on a component. This does two things. First, it ensures that the component is selected. Second, it uses the ISelectionUIService to begin a drag of all selected components. The location of the mouse. The location of the mouse.

mm) OnMouseDragEnd

[C#] protected virtual void OnMouseDragEnd(bool cancel);

[C++] protected: virtual void OnMouseDragEnd(bool cancel);

[VB] Overridable Protected .Sub OnMouseDragEnd(ByVal cancel As Boolean)

[JScript] protected function OnMouseDragEnd(cancel: Boolean);

Description

Called at the end of a drag operation. This either commits or rolls back the drag. Set this to true to cancel the drag, or false to commit it.

nn) OnMouseDragMove

[C#] protected virtual void OnMouseDragMove(int x, int y);

[C++] protected: virtual void OnMouseDragMove(int x, int y);

[VB] Overridable Protected Sub OnMouseDragMove(ByVal x As Integer, ByVal y As Integer)

[JScript] protected function OnMouseDragMove(x: int, y: int);

Description

Called for each movement of the mouse. This will check to see if a drag operation is in progress. If so, it will pass the updated drag dimensions on to the selection UI service. The x position, in screen coordinates, of the mouse. The y position, in screen coordinates, of the mouse.

oo) OnMouseEnter

[C#] protected virtual void OnMouseEnter( );

[C++] protected: virtual void OnMouseEnter( );

[VB] Overridable Protected Sub OnMouseEnter( )

[JScript] protected function OnMouseEnter( );

Description

Called when the mouse first enters the control. This is forwarded to the parent designer to enable the container selector.

pp) OnMouseHover

[C#] protected virtual void OnMouseHover( );

[C++] protected: virtual void OnMouseHover( );

[VB] Overridable Protected Sub OnMouseHover( )

[JScript] protected function OnMouseHover( );

Description

Called after the mouse hovers over the control. This is forwarded to the parent designer to enabled the container selector.

qq) OnMouseLeave

[C#] protected virtual void OnMouseLeave( );

[C++] protected: virtual void OnMouseLeave( );

[VB] Overridable Protected Sub OnMouseLeave( )

[JScript] protected function OnMouseLeave( );

Description

Called when the mouse first enters the control. This is forwarded to the parent designer to enable the container selector.

rr) OnPaintAdornments

[C#] protected virtual void OnPaintAdornments(PaintEvent Args pe);

[C++] protected: virtual void OnPaintAdornments(PaintEventArgs* pe);

[VB] Overridable Protected Sub OnPaintAdornments(ByVal pe As PaintEventArgs)

[JScript] protected function OnPaintAdornments(pe: PaintEventArgs);

Description

Called when the control we're designing has finished painting. This method gives the designer a chance to paint any additional adornments on top of the control. A paint event the designer may use to draw onto the control.

ss) OnSetComponentDefaults

[C#] public override void OnSetComponentDefaults( );

[C++] public: void OnSetComponentDefaults( );

[VB] Overrides Public Sub OnSetComponentDefaults( )

[JScript] public override function OnSetComponentDefaults( );

Description

Called when the designer is initialized. This allows the designer to provide some meaningful default values in the component. The default implementation of this sets the components's default property to it's name, if that property is a string.

tt) OnSetCursor

[C#] protected virtual void OnSetCursor( );

[C++] protected: virtual void OnSetCursor( );

[VB] Overridable Protected Sub OnSetCursor( )

[JScript] protected function OnSetCursor( );

Description

Called each time the cursor needs to be set. The ControlDesigner behavior here will set the cursor to one of three things: 1. If the toolbox service has a tool selected, it will allow the toolbox service to set the cursor. 2. If the selection UI service shows a locked selection, or if there is no location property on the control, then the default arrow will be set. 3. Otherwise, the four headed arrow will be set to indicate that the component can be clicked and moved. 4. If the user is currently dragging a component, the crosshair cursor will be used instead of the four headed arrow.

u) PreFilterProperties

[C#] protected override void PreFilterProperties(IDictionary properties);

[C++] protected: void PreFilterProperties(IDictionary* properties);

[VB] Overrides Protected Sub PreFilterProperties(ByVal properties As IDictionary)

[JScript] protected override function PreFilterProperties (properties: IDictionary);

Description

Allows a designer to filter the set of properties the component it is designing will expose through a TypeDescriptor object.

Return Value: The augmented set of properties. If the method does not modify any properties, it may just return a reference to its input parameter. If you do make a change to the properties, you must create a new array.

This method is called immediately before its corresponding "Post" method. If you are overriding this method you should call the base implementation before you perform your own filtering. The properties for the class of the component.

vv) UnhookChildControls

[C#] protected void UnhookChildControls(Control firstChild);

[C++] protected: void UnhookChildControls(Control* firstChild);

[VB] Protected Sub UnhookChildControls(ByVal firstChild As Control)

[JScript] protected function UnhookChildControls(firstChild: Control);

Description

Hooks the children of the specified control.

We need to do this for child controls that are not in design mode, which is the case for composite controls. The first child control to process. This method may recursively call itself for children of this control.

ww) WndProc

[C#] protected virtual void WndProc(ref Message m);

[C++] protected: virtual void WndProc(Message* m);

[VB] Overridable Protected Sub WndProc(ByRef m As Message)

[JScript] protected function WndProc(m: Message);

Description

This method should be called by the extending designer for each message the control would normally receive. This allows the designer to pre-process messages before allowing them to be routed to the control. The message.

ControlDesigner.ControlDesignerAccessibleObject class (System.Windows.Forms.Design)

a) WndProc

Description b) ControlDesigner.ControlDesignerAccessibleObject

Example Syntax:

c) WndProc

[C#] public ControlDesigner.ControlDesignerAccessibleObject(ControlDesigner designer, Control control);

[C++] public: ControlDesignerAccessibleObject(ControlDesigner* designer, Control* control);

[VB] Public Sub New(ByVal designer As ControlDesigner, ByVal control As Control)

[JScript] public function ControlDesigner.ControlDesignerAccessibleObject(designer: ControlDesigner, control Control);

Description d) Bounds e) WndProc

[C#] public override Rectangle Bounds {get;}

[C++] public: _property virtual Rectangle get_Bounds( );

[VB] Overrides Public ReadOnly Property Bounds As Rectangle

[JScript] public function get Bounds( ): Rectangle;

Description f) DefaultAction g) WndProc

[C#] public override string DefaultAction {get;}

[C++] public: _property virtual String* get DefaultAction( );

[VB] Overrides Public ReadOnly Property DefaultAction As String

[JScript] public function get DefaultAction( ): String;

Description h) Description i) WndProc

[C#] public override string Description {get;}

[C++] public: _property virtual String* get_Description( );

[VB] Overrides Public ReadOnly Property Description As String

[JScript] public function get Description( ): String;

Description j) Help k) KeyboardShortcut l) Name m) WndProc

Description n) Parent o) WndProc

[C#] public override AccessibleObject Parent {get;}

[C++] public: _property virtual AccessibleObject* get_Parent( );

[VB] Overrides Public ReadOnly Property Parent As AccessibleObject

[JScript] public function get Parent( ): AccessibleObject;

Description p) Role q) WndProc

[C#] public override AccessibleRole Role {get;}

[C++] public: _property virtual AccessibleRole get_Role( );

[VB] Overrides Public ReadOnly Property Role As AccessibleRole

[JScript] public function get Roleo: AccessibleRole;

Description r) State s) WndProc

[C#] public override AccessibleStates State {get;}

[C++] public: _property virtual AccessibleStates get_State( );

[VB] Overrides Public ReadOnly Property State As AccessibleStates

[JScript] public function get State( ): AccessibleStates;

Description t) Value u) WndProc

[C#] public override string Value {get;}

[C++] public: _property virtual String* get Value( );

[VB] Overrides Public ReadOnly Property Value As String

[JScript] public function get Value( ): String;

Description v) GetChild

[C#] public override AccessibleObject GetChild(int index);

[C++] public: AccessibleObject* GetChild(int index);

[VB] Overrides Public Function GetChild(ByVal index As Integer) As AccessibleObject

[JScript] public override function GetChild(index: int): AccessibleObject;

Description w) GetChildCount

[C#] public override int GetChildCount( );

[C++] public: int GetChildCount( );

[VB] Overrides Public Function GetChildCount( ) As Integer

[JScript] public override function GetChildCount( ): int;

Description x) GetFocused

[C#] public override AccessibleObject GetFocused( );

[C++] public: AccessibleObject* GetFocused( );

[VB] Overrides Public Function GetFocused( ) As AccessibleObject

[JScript] public override function GetFocused( ): AccessibleObject;

Description y) GetSelected

[C#] public override AccessibleObject GetSelected( );

[C++] public: AccessibleObject* GetSelected( );

[VB] Overrides Public Function GetSelected( ) As AccessibleObject

[JScript] public override function GetSelected( ): AccessibleObject;

Description z) HitTest

[C#] public override AccessibleObject HitTest(int x, int y);

[C++] public: AccessibleObject* HitTest(int X, int y);

[VB] Overrides Public Function HitTest(ByVal x As Integer, ByVal y As Integer) As AccessibleObject

[JScript] public override function HitTest(x: int, y: int): AccessibleObject;

Description

DockEditor class (System.Windows.Forms.Design)

a) UseStdAccessibleObjects

Description

Provides a user interface for specifying a System.Windows.Forms.Control.Dock property.

b) DockEditor

Example Syntax:

c) UseStdAccessibleObjects

[C#] public DockEditor( );

[C++] public: DockEditor( );

[VB] Public Sub New( )

[JScript] public function DockEditor( );

d) EditValue

[C#] public override object EditValue(ITypeDescriptorContext context, IServiceProvider provider, object value);

[C++] public: Object* EditValue(ITypeDescriptorContext* context, IServiceProvider* provider, Object* value);

[VB] Overrides Public Function EditValue(ByVal context As ITypeDescriptorContext, ByVal provider As IServiceProvider, ByVal value As Object) As Object

[JScript] public override function EditValue(context: ITypeDescriptorContext, provider: IServiceProvider, value: Object): Object;

Description

Edits the specifiedn object value using the editor style provided by GetEditorStyle. A service provider is provided so that any required editing services can be obtained.

Return Value: The new value of the object. If the value of the object hasn't changed, this should return the same object it was passed. An System.ComponentModel.ITypeDescriptorContext that can be used to gain additional context information. A service provider object through which editing services may be obtained. An instance of the value being edited.

e) GetEditStyle

[C#] public override UITypeEditorEditStyle GetEditStyle (ITypeDescriptorContext context);

[C++] public: UITypeEditorEditStyle GetEditStyle(ITypeDescriptorContext* context);

[VB] Overrides Public Function GetEditStyle(ByVal context As ITypeDescriptorContext) As UITypeEditorEditStyle

[JScript] public override function GetEditStyle(context: IType DescenptorContext): UITypeEditorEditStyle;

Description

Retrieves the editing style of the EditValue method. If the method is not supported, this will return None.

Return Value: An enum value indicating the provided editing style. An System.ComponentModel.ITypeDescriptorContext that can be used to gain additional context information.

DocumentDesigner class (System.Windows.Forms.Design)

a) ToString

Description

Provides a designer that extends the ScrollableControlDesigner and implements IRootDesigner.

This designer is a "root" designer meaning that it represents the document the user is working on. Any functionality that is shared between all top level documents should appear here, while things specific to only forms or user controls should go in their respective designers.

b) ToString
c) DocumentDesigner
Example Syntax:
d) ToString
e) AccessibilityObject
AssociatedComponents
g) Component
h) Control
i) DefaultControlLocation
j) DrawGrid
k) EnableDragRect
l) GridSize
m) InheritanceAttribute
n) Inherited
o) SelectionRules P) ToString Description We override our selectino rules to make the document non-sizeable.

q) ShadowProperties
r) Verbs
s) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of this designer.

t) EnsureMenuEditorService

[C#] protected virtual void EnsureMenuEditorService (IComponent c);

[C++] protected: virtual void EnsureMenuEditorService (IComponent* c);

[VB] Overridable Protected Sub EnsureMenuEditorService (ByVal c As IComponent)

[JScript] protected function EnsureMenuEditorService(c: IComponent);

Description

Determines if a MenuEditorService has already been started. If not, this method will create a new instance of the service.

u) GetToolSupported

[C#] protected virtual bool GetToolSupported(ToolboxItem tool);

[C++] protected: virtual bool GetToolSupported(ToolboxItem* tool);

[VB] Overridable Protected Function GetToolSupported(ByVal tool As ToolboxItem) As Boolean

[JScript] protected function GetToolSupported(tool: ToolboxItem): Boolean;

Description

Determines if the given tool is supported by this designer. If a tool is supported then it will be enabled in the toolbox when this designer regains focus. Otherwise, it will be disabled. Once a tool is marked as enabled or disabled it may not be queried again.

Return Value: true if the tool should be enabled on the toolbox or false if the document designer doesn't know how to use the tool. The tool that is to be enabled on the toolbox.

v) Initialize

[C#] public override void Initialize(IComponent component);

[C++] public: void Initialize(IComponent* component);

[VB] Overrides Public Sub Initialize(ByVal component As IComponent)

[JScript] public override function Initialize(component: IComponent);

Description

Initializes the designer with the given component. The designer can get the component's site and request services from it in this call. The component to associate with this designer.

w) OnContextMenu

[C#] protected override void OnContextMenu(int x, int y);

[C++] protected: void OnContextMenu(int x, int y);

[VB] Overrides Protected Sub OnContextMenu(ByVal x As Integer, ByVal y As Integer)

[JScript] protected override function OnContextMenu(x: int, y: int);

Description

Called when the context menu should be displayed. This displays the document context menu.

x) OnCreateHandle

[C#] protected override void OnCreateHandle( );

[C++] protected: void OnCreateHandle( );

[VB] Overrides Protected Sub OnCreateHandle( )

[JScript] protected override function OnCreateHandle( );

Description

This is called immediately after the control handle has been created.

v) PreFilterProperties

[C#] protected override void PreFilterProperties(IDictionary properties);

[C++] protected: void PreFilterProperties(IDictionary* properties);

[VB] Overrides Protected Sub PreFilterProperties(ByVal properties As IDictionary)

[JScript] protected override function PreFilterProperties (properties: IDictionary);

Description

Allows a designer to filter the set of properties the component it is designing will expose through the TypeDescriptor object. This method is called immediately before its corresponding "Post" method. If you are overriding this method you should call the base implementation before you perform your own filtering.

Return Value: The augmented set of properties. If the method does not modify any properties, it may just return a reference to its input parameter. If you do make a change to the properties, you must create a new array. The properties for the class of the component.

z) IRootDesigner.GetView

[C#] object IRootDesigner.GetView(ViewTechnology technology);

[C++] Object* IRootDesigner::GetView(ViewTechnology technology);

[VB] Function GetView(ByVal technology As ViewTechnology) As Object Implements IRootDesigner.GetView

[JScript] function IRootDesigner.GetView(technology: ViewTechnology) Object;

aa) IToolboxUser.GetToolSupported

[C#] bool IToolboxUser.GetToolSupported(ToolboxItem tool);

[C++] bool IToolboxUser::GetToolSupported(ToolboxItem* tool);

[VB] Function GetToolSupported(ByVal tool As ToolboxItem) As Boolean Implements IToolboxUser.GetToolSupported

[JScript] function IToolboxUser.GetToolSupported(tool: ToolboxItem): Boolean;

bb) IToolboxUser.ToolPicked

[C#] void IToolboxUser.ToolPicked(ToolboxItem tool);

[C++] void IToolboxUser::ToolPicked(ToolboxItem* tool);

[VB] Sub ToolPicked(ByVal tool As ToolboxItem) Implements IToolboxUser.ToolPicked

[JScript] function IToolboxUser.ToolPicked(tool: ToolboxItem);

cc) IOleDragClient.GetControlForComponent

[C#] Control IOleDragClient.GetControlForComponent(object component);

[C++] Control* IOleDragClient::GetControlForComponent (Object* component);

[VB] Function GetControlForComponent(ByVal component As Object) As Control Implements IOleDragClient.GetControlForComponent

[JScript] function IOleDragClient.GetControlForComponent(component: Object): Control;

dd) ToolPicked

[C#] protected virtual void ToolPicked(ToolboxItem tool);

[C++] protected: virtual void ToolPicked(ToolboxItem* tool);

[VB] Overridable Protected Sub ToolPicked(ByVal tool As ToolboxItem)

[JScript] protected function ToolPicked(tool: ToolboxItem);

Description

This will be called when the user double-clicks on a toolbox item. The document designer should create a component for the given tool. The tool to create.

ee) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

Overrides our base class WndProc to provide support for the menu editor service. The message to handle.

EventHandlerService class (System.Windows.Forms.Design)

a) WndProc

Description

The event handler service provides a unified way to handle the various events that our form designer must process. What we want to be able to do is to write code in one place that handles events of a certain type. We also may need to globally change the behavior of these events for modal functions like the tab order UI. Our designer, however, is in many pieces so we must somehow funnel these events to a common place. This service implements an "event stack" that contains the current set of event handlers. There can be different types of handlers on the stack. For example, we may push a keyboard handler and a mouse handler. When you request a handier, we will find the topmost handler on the stack that fits the class you requested. This way the service can be extended to any eventing scheme, and it also allows sections of a handler to be replaced (eg, you can replace mouse handling without effecting menus or the keyboard).

b) EventHandlerService

Example Syntax:

c) WndProc

[C#] public EventHandlerService(Control focuswnd);

[C++] public: EventHandlerService(Control* focuswnd);

[VB] Public Sub New(ByVal focusWnd As Control)

[JScript] public function EventHandlerService(focusWnd: Control);

Description d) Focus Window e) WndProc

[C#] public Control FocusWindow {get;}

[C++] public: _property Control* get_FocusWindow( );

[VB] Public ReadOnly Property FocusWindow As Control

[JScript] public function get FocusWindow( ): Control;

Description f) WndProc

[C#] public event EventHandler EventHandlerChanged;

[C++] public: sealed _event EventHandler* EventHandler-Changed;

[VB] NotOverridable Public Event EventHandlerChanged As EventHandler

Description g) GetHandler

[C#] public object GetHandler(Type handlerType);

[C++] public: _sealed Object* GetHandler(Type* handler-Type);

[VB] NotOverridable Public Function GetHandler(ByVal handlerType As Type) As Object

[JScript] public function GetHandler(handlerType: Type): Object;

Description

Gets the currently active event handler of the specified type.

Return Value: An instance of the handler, or null if there is no handler of the requested type.

You should never cache this value because other components are free to change it. This call is fairly quick, however, especially for cases when you are always asking for the same type of handler. The type of the handler to get.

h) PopHandler

[C#] public void PopHandler(object handler);

[C++] public: _sealed void PopHandler(Object* handler);

[VB] NotOverridable Public Sub PopHandler(ByVal handler As Object)

[JScript] public function PopHandler(handler: Object);

Description

Pops the given handler off of the stack.

If the handler is not the topmost component on the stack, this will pop all handlers up to and including handler. The handler to remove from the stack.

i) PushHandler

[C#] public void PushHandler(object handler);

[C++] public: _sealed void PushHandler(Object* handler);

[VB] NotOverridable Public Sub PushHandler(ByVal handler As Object)

[JScript] public function PushHandler(handler: Object);

Description

Pushes a new event handler on the stack.

This handler will be used by all components that request a compatible handler type. If this handler does not support the requested type, the next handler on the stack will be used. The handle to add to the stack.

FileNameEditor class (System.Windows.Forms.Design)

a) ToString

Description

Provides a user interface for editing a filename property.

System.Windows.Forms.Design.FileNameEditor provides a file selection dialog for filename selection and editing.

b) FileNameEditor

Example Syntax:

c) ToString

[C#] public FileNameEditor( );

[C++] public: FileNameEditor( );

[VB] Public Sub New( )

[JScript] public function FileNameEditor( );

d) EditValue

[C#] public override object EditValue(ITypeDescriptorContext context, IServiceProvider provider, object value);

[C++] public: Object* EditValue(ITypeDescriptorContext* context, IServiceProvider* provider, Object* value);

[VB] Overrides Public Function EditValue(ByVal context As ITypeDescriptorContext, ByVal provider As IServiceProvider, ByVal value As Object) As Object

[JScript] public override function EditValue(context: ITypeDescriptorContext, provider: IServiceProvider, value: Object): Object;

Description

Edits the specified object using the editor style provided by System.Windows.Forms.Design.FileNameEditor.GetEditStyle(System.ComponentModel.ITypeDescriptorContext).

Return Value: The new value of the object. If the value of the object hasn't changed, this should return the same object it was passed.

A service provider is provided so that any required editing services can be obtained. An System.ComponentModel.ITypeDescriptorContext that can be used to gain additional context information. A service provider object through which editing services may be obtained. An instance of the value being edited.

e) GetEditStyle

[C#] public override UITypeEditorEditStyle GetEditStyle (ITypeDescriptorContext context);

[C++] public: UITypeEditorEditStyle GetEditStyle(ITypeDescriptorContext* context);

[VB] Overrides Public Function GetEditStyle(ByVal context As ITypeDescriptorContext) As UITypeEditorEditStyle

[JScript] public override function GetEditStyle(context: ITypeDescriptorContext): UITypeEditorEditStyle;

Description

Gets the editing style of the Edit method.

Return Value: A System.Drawing.Design.UITypeEditorEditStyle enum value indicating the provided editing style.

If the Edit method is not supported, this will return None. An System.ComponentModel.ITypeDescriptorContext that can be used to gain additional context information.

f) InitializeDialog

[C#] protected virtual void InitializeDialog(OpenFileDialog openFileDialog);

[C++] protected: virtual void InitializeDialog(OpenFileDialog* openFileDialog);

[VB] Overridable Protected Sub InitializeDialog(ByVal openFileDialog As OpenFileDialog)

[JScript] protected function InitializeDialog(openFileDialog: OpenFileDialog);

Description

Initializes the open file dialog when it is created.

This method configures the dialog with a generic file filter and title. An instance of the System.Windows.Forms.OpenFileDialog we will use to choose a file name.

FolderNameEditor.FolderBrowser class (System.Windows.Forms.Design)

a) ToString

Description b) FolderNameEditor.FolderBrowser

Example Syntax:

c) ToString

[C#] public FolderNameEditor.FolderBrowser( );

[C++] public: FolderBrowser( );

[VB] Public Sub New( )

[JScript] public function FolderNameEditor.Folder Browser( );

d) Container e) Description f) ToString

Description

Gets or sets a description to show above the folders. Here you can provide instructions for selecting a folder.

g) DesignMode h) DirectoryPath i) ToString

Description

Gets the directory path of the folder the user picked.

j) Events k) Site l) StartLocation m) ToString

Description

Gets/sets the start location of the root node.

n) Style o) ToString

[C#] public FolderNameEditor.FolderBrowserStyles Style {get; set;}

[C++] public: _property FolderNameEditor.FolderBrowserStyles get_Style( ); public: _property void set_Style(FolderNameEditor.FolderBrowserStyles);

[VB] Public Property Style As FolderNameEditor.FolderBrowserStyles

[JScript] public function get Style( ): FolderNameEditor.FolderBrowserStyles; public function set Style(FolderNameEditor.FolderBrowserStyles);

Description

The styles the folder browser will use when browsing folders. This should be a combination of flags from the FolderBrowserStyles enum.

p) ShowDialog

[C#] public DialogResult ShowDialog( );

[C++] public: DialogResult ShowDialog( );

[VB] Public Function ShowDialog( ) As DialogResult

[JScript] public function ShowDialog( ): DialogResult;

Description

Shows the folder browser dialog.

q) ShowDialog

[C#] public DialogResult ShowDialog(IWin32Window owner);

[C++] public: DialogResult ShowDialog(IWin32Window* owner);

[VB] Public Function ShowDialog(ByVal owner As IWin32Window) As DialogResult

[JScript] public function ShowDialog(owner: IWin32Window): DialogResult;

Description

Shows the folder browser dialog with the specified owner.

Return Value: The DialogResult from the form. Top-level window that will own the modal dialog (e.g.: System.Windows.Forms.Form).

FolderNameEditor.FolderBrowserFolder enumeration (System.Windows.Forms.Design)

a) ToString

Description b) ToString

[C#] public const FolderNameEditor.FolderBrowserFolder Desktop;

[C++] public: const FolderNameEditor.FolderBrowserFolder Desktop;

[VB] Public Const Desktop As FolderNameEditor.FolderBrowserFolder

[JScript] public var Desktop: FolderNameEditor.FolderBrowserFolder;

Description

The user's desktop.

c) ToString

[C#] public const FolderNameEditor.FolderBrowserFolder Favorites;

[C++] public: const FolderNameEditor.FolderBrowserFolder Favorites;

[VB] Public Const Favorites As FolderNameEditor.FolderBrowserFolder

[JScript] public var Favorites: FolderNameEditor.FolderBrowserFolder;

Description

The user's favorites list.

d) ToString

[C#] public const FolderNameEditor.FolderBrowserFolder MyComputer;

[C++] public: const FolderNameEditor.FolderBrowserFolder MyComputer;

[VB] Public Const MyComputer As FolderNameEditor.FolderBrowserFolder

[JScript] public var MyComputer: FolderNameEditor.FolderBrowserFolder;

Description

The contents of the My Computer icon.

e) ToString

[C#] public const FolderNameEditor.FolderBrowserFolder MyDocuments;

[C++] public: const FolderNameEditor.FolderBrowserFolder MyDocuments;

[VB] Public Const MyDocuments As FolderNameEditor.FolderBrowserFolder

[JScript] public var MyDocuments: FolderNameEditor.FolderBrowserFolder;

Description

The user's My Documents folder.

f) ToString

[C#] public const FolderNameEditor.FolderBrowserFolder MyPictures;

[C++] public: const FolderNameEditor.FolderBrowserFolder MyPictures;

[VB] Public Const MyPictures As FolderNameEditor.FolderBrowserFolder

[JScript] public var MyPictures: FolderNameEditor.FolderBrowserFolder;

Description

User's location to store pictures.

g) ToString

[C#] public const FolderNameEditor.FolderBrowserFolder NetAndDialUpConnections;

[C++] public: const FolderNameEditor.FolderBrowserFolder NetAndDialUpConnections;

[VB] Public Const NetAndDialUpConnections As FolderNameEditor.FolderBrowserFolder

[JScript] public var NetAndDialUpConnections FolderNameEditor.FolderBrowserFolder;

Description

Network and dial-up connections.

h) ToString

[C#] public const FolderNameEditor.FolderBrowserFolder NetworkNeighborhood;

[C++] public: const FolderNameEditor.FolderBrowserFolder NetworkNeighborhood;

[VB] Public Const NetworkNeighborhood As FolderNameEditor.FolderBrowserFolder

[JScript] public var NetworkNeighborhood: FolderNameEditor.FolderBrowserFolder;

Description

The network neighborhood.

i) ToString

[C#] public const FolderNameEditor.FolderBrowserFolder Printers;

[C++] public: const FolderNameEditor.FolderBrowserFolder Printers;

[VB] Public Const Printers As FolderNameEditor.FolderBrowserFolder

[JScript] public var Printers: FolderNameEditor.FolderBrowserFolder;

Description

A folder containing installed printers.

j) ToString

[C#] public const FolderNameEditor.FolderBrowserFolder Recent;

[C++] public: const FolderNameEditor.FolderBrowserFolder Recent;

[VB] Public Const Recent As FolderNameEditor.FolderBrowserFolder

[JScript] public var Recent: FolderNameEditor.FolderBrowserFolder;

Description

A folder containing shortcuts to recently opened files.

k) ToString

[C#] public const FolderNameEditor.FolderBrowserFolder SendTo;

[C++] public: const FolderNameEditor.FolderBrowserFolder SendTo;

[VB] Public Const SendTo As FolderNameEditor.FolderBrowserFolder

[JScript] public var SendTo: FolderNameEditor.FolderBrowserFolder;

Description

A folder containing shortcuts to applications to send documents to.

l) ToString

[C#] public const FolderNameEditor.FolderBrowserFolder StartMenu;

[C++] public: const FolderNameEditor.FolderBrowserFolder StartMenu;

[VB] Public Const StartMenu As FolderNameEditor.FolderBrowserFolder

[JScript] public var StartMenu: FolderNameEditor.FolderBrowserFolder;

Description

The user's start menu.

m) ToString

[C#] public const FolderNameEditor.FolderBrowserFolder Templates;

[C++] public: const FolderNameEditor.FolderBrowserFolder Templates;

[VB] Public Const Templates As FolderNameEditor.FolderBrowserFolder

[JScript] public var Templates: FolderNameEditor.FolderBrowserFolder;

Description

The user's file templates.

FolderNameEditor.FolderBrowserStyles enumeration (System.Windows.Forms.Design)

a) ToString

Description

Specifies various styles that may be applied to the System.Windows.Forms.Design.FolderNameEditor.FolderBrowser object.

b) ToString

[C#] public const FolderNameEditor.FolderBrowserStyles BrowseForComputer;

[C++] public: const FolderNameEditor.FolderBrowserStyles BrowseForComputer;

[VB] Public Const BrowseForComputer As FolderNameEditor.FolderBrowserStyles

[JScript] public var BrowseForComputer FolderNameEditor.FolderBrowserStyles;

Description

Only return computers. If the user selects anything other than a computer, the OK button is grayed.

c) ToString

[C#] public const FolderNameEditor.FolderBrowserStyles BrowseForEverything;

[C++] public: const FolderNameEditor.FolderBrowserStyles BrowseForEverything;

[VB] Public Const BrowseForEverything As FolderNameEditor.FolderBrowserStyles

[JScript] public var BrowseForEverything FolderNameEditor.FolderBrowserStyles;

Description

Include everything. This will also include files.

d) ToString

[C#] public const FolderNameEditor.FolderBrowserStyles BrowseForPrinter;

[C++] public: const FolderNameEditor.FolderBrowserStyles BrowseForPrinter;

[VB] Public Const BrowseForPrinter As FolderNameEditor.FolderBrowserStyles

[JScript] public var BrowseForPrinter A FolderNameEditor.FolderBrowserStyles;

Description

Only return printers. If the user selects anything other than a printer, the OK button is grayed.

e) ToString

[C#] public const FolderNameEditor.FolderBrowserStyles RestrictToDomain;

[C++] public: const FolderNameEditor.FolderBrowserStyles RestrictToDomain;

[VB] Public Const RestrictToDomain As FolderNameEditor.FolderBrowserStyles

[JScript] public var RestrictToDomain: FolderNameEditor.FolderBrowserStyles;

Description

Do not include network folders below the domain level in the dialog box's tree view control.

f) ToString

[C+] public const FolderNameEditor.FolderBrowserStyles RestrictToFilesystem;

[C++] public: const FolderNameEditor.FolderBrowserStyles RestrictToFilesystem;

[VB] Public Const RestrictToFilesystem As FolderNameEditor.FolderBrowserStyles

[JScript] public var RestrictToFilesystem FolderNameEditor.FolderBrowserStyles;

Description

Only return file system directories. If the user selects folders that are not part of the file system, the OK button is grayed.

g) ToString

[C#] public const FolderNameEditor.FolderBrowserStyles RestrictToSubfolders;

[C++] public: const FolderNameEditor.FolderBrowserStyles RestrictToSubfolders;

[VB] Public Const RestrictToSubfolders As FolderNameEditor.FolderBrowserStyles

[JScript] public var RestrictToSubfolders FolderNameEditor.FolderBrowserStyles;

Description

Only return file system that is a subfolder of the root folder in the namespace hierarchy. If the user selects a subfolder of the root folder that is not part of the file system, the OK button is grayed.

h) ToString

[C#] public const FolderNameEditor.FolderBrowserStyles ShowTextBox;

[C++] public: const FolderNameEditor.FolderBrowserStyles ShowTextBox;

[VB] Public Const ShowTextBox As FolderNameEditor.FolderBrowserStyles

[JScript] public var ShowTextBox: FolderNameEditor.FolderBrowserStyles;

Description

Includes a textbox control in the browse dialog box that allows the user to type the name of an item.

FolderNameEditor class (System.Windows.Forms.Design)

a) ToString

Description

Provides a user interface for choosing a folder from the file system.

You may customize the folder options by inheriting from this class and overriding System.Windows.Forms.Design.FolderNameEditor.InitializeDialog(System.Windows.Forms.Design.FolderNameEditor.FolderBrowser).

b) FolderNameEditor

Example Syntax:

c) ToString

[C#] public FolderNameEditor( );

[C++] public: FolderNameEditor( );

[VB] Public Sub New( )

[JScript] public function FolderNameEditor( );

d) EditValue

[C#] public override object EditValue(ITypeDescriptorContext context, IServiceProvider provider, object value);

[C++] public: Object* EditValue(ITypeDescriptorContext* context, IServiceProvider* provider, Object* value);

[VB] Overrides Public Function EditValue(ByVal context As ITypeDescriptorContext, ByVal provider As IServiceProvider, ByVal value As Object) As Object

[JScript] public override function EditValue(context: ITypeDescriptorContext, provider: IServiceProvider, value: Object): Object;

Description

Edits the specified object using the editor style provided by System.Windows.Forms.Design.FolderNameEditor.GetEditStyle(System.ComponentModel.ITypeDescriptorContext).

Return Value: The new value of the object, or the old value if the object couldn't be updated. An System.ComponentModel.ITypeDescriptorContext that can be used to gain additional context information. A service object provider. The value to set.

e) GetEditStyle

[C#] public override UITypeEditorEditStyle GetEditStyle(ITypeDescriptorContext context);

[C++] public: UITypeEditorEditStyle GetEditStyle(ITypeDescriptorContext* context);

[VB] Overrides Public Function GetEditStyle(ByVal context As ITypeDescriptorContext) As UITypeEditorEditStyle

[JScript] public override function GetEditStyle(context: ITypeDescriptorContext): UITypeEditorEditStyle;

Description

Gets the editing style of the Edit method.

Return Value: A System.Drawing.Design.UITypeEditorEditStyle enum value indicating the provided editing style.

If the Edit method is not supported, this will return None. An System.ComponentModel.ITypeDescriptorContext that can be used to gain additional context information.

f) InitializeDialog

[C#] protected virtual void InitializeDialog(FolderNameEditor.FolderBrowser folderBrowser);

[C++] protected: virtual void InitializeDialog(FolderNameEditor.FolderBrowser* folderBrowser);

[VB] Overridable Protected Sub InitializeDialog(ByVal folderBrowser As FolderNameEditor.FolderBrowser)

[JScript] protected function InitializeDialog(folderBrowser FolderNameEditor.FolderBrowser);

Description

Initializes the folder browser dialog.

The default implementation provides a generic folder browser. A System.Windows.Forms.Design.FolderNameEditor.FolderBrowser to choose a folder.

IMenuEditorService interface (System.Windows.Forms.Design)

a) ToString

Description

Provides access to the menu editing service.

Most of the implementation of this service is provided by the host environment.

b) GetMenu

[C#] Menu GetMenu( );

[C++] Menu* GetMenu( );

[VB] Function GetMenu( ) As Menu

[JScript] function GetMenu( ) Menu;

Description

Gets the current menu.

c) IsActive

[C#] bool IsActive( );

[C++] bool IsActive( );

[VB] Function IsActive( ) As Boolean

[JScript] function IsActive( ): Boolean;

Description

Indicates whether the current menu is active.

d) MessageFilter

[C#] bool MessageFilter(ref Message m);

[C++] bool MessageFilter(Message* m)

[VB] Function MessageFilter(ByRef m As Message) As Boolean

[JScript] function MessageFilter(m: Message): Boolean;

Description

Allows the editor service to intercept Win32 messages.

e) SetMenu

[C#] void SetMenu(Menu menu);

[C++] void SetMenu(Menu* menu);

[VB] Sub SetMenu(ByVal menu As Menu)

[JScript] function SetMenu(menu: Menu);

Description

Sets the current menu visible on the form.

The menu will be painted at the top of a form's window frame and can be directly edited by the user. The menu to render.

f) SetSelection

[C#] void SetSelection(MenuItem item);

[C++] void SetSelection(MenuItem* item);

[VB] Sub SetSelection(ByVal item As MenuItem)

[JScript] function SetSelection(item: MenuItem);

Description

Sets the selected menu item of the current menu.

AxImporter.IReferenceResolver interface (System.Windows.Forms.Design)

a) SetSelection b) ResolveActiveXReference

[C#] string ResolveActiveXReference(UCOMITypeLib typeLib);

[C++] String* ResolveActiveXReference(UCOMITypeLib* typeLib);

[VB] Function ResolveActiveXReference(ByVal typeLib As UCOMITypeLib) As String

[JScript] function ResolveActiveXReference(typeLib: UCOMITypeLib): String;

c) ResolveComReference

[C#] string ResolveComReference(AssemblyName name);

[C++] String* ResolveComReference(AssemblyName* name);

[VB] Function ResolveComReference(ByVal name As AssemblyName) As String

[JScript] function ResolveComReference(name: AssemblyName): String;

d) ResolveComReference

[C#] string ResolveComReference(UCOMITypeLib typeLib);

[C++] String* ResolveComReference(UCOMITypeLib* typeLib);

[VB] Function ResolveComReference(ByVal typeLib As UCOMITypeLib) As String

[JScript] function ResolveComReference(typeLib: UCOMITypeLib): String;

e) ResolveManagedReference

[C#] string ResolveManagedReference(string assemName);

[C++] String* ResolveManagedReference(String* assemName);

[VB] Function ResolveManagedReference(ByVal assemName As String) As String

[JScript] function ResolveManagedReference(assemName: String): String; MenuCommands class (System.Windows.Forms.Design)

a) ResolveManagedReference

Description

Provides command IDs and GUIDS that correspond to the host Command Bar menu layout.

b) ResolveManagedReference

[C#] public static readonly CommandID ComponentTrayMenu;

[C++] public: static CommandID* ComponentTrayMenu;

[VB] Public Shared ReadOnly ComponentTrayMenu As CommandID

[JScript] public static var ComponentTrayMenu: CommandID;

Description c) ResolveManagedReference

[C#] public static readonly CommandID ContainerMenu;

[C++] public: static CommandID* ContainerMenu;

[VB] Public Shared ReadOnly ContainerMenu As CommandID

[JScript] public static var ContainerMenu: CommandID;

Description d) ResolveManagedReference

[C#] public static readonly CommandID DesignerProperties;

[C++] public: static CommandID* DesignerProperties;

[VB] Public Shared ReadOnly DesignerProperties As CommandID

[JScript] public static var DesignerProperties: CommandID;

Description e) ResolveManagedReference

[C#] public static readonly CommandID KeyCancel;

[C++] public: static CommandID* KeyCancel;

[VB] Public Shared ReadOnly KeyCancel As CommandID

[JScript] public static var KeyCancel: CommandID;

Description d) ResolveManagedReference

[C#] public static readonly CommandID KeyDefaultAction;

[C++] public: static CommandID* KeyDefaultAction;

[VB] Public Shared ReadOnly KeyDefaultAction As CommandID

[JScript] public static var KeyDefaultAction: CommandID;

Description g) ResolveManagedReference

[C#] public static readonly CommandID KeyMoveDown;

[C++] public: static CommandID* KeyMoveDown;

[VB] Public Shared ReadOnly KeyMoveDown As CommandID

[JScript] public static var KeyMoveDown: CommandID;

Description h) ResolveManagedReference

[C#] public static readonly CommandID KeyMoveLeft;

[C++] public: static CommandID* KeyMoveLeft;

[VB] Public Shared ReadOnly KeyMoveLeft As CommandID

[JScript] public static var KeyMoveLeft: CommandID;

Description i) ResolveManagedReference

[C#] public static readonly CommandID KeyMoveRight;

[C++] public: static CommandID* KeyMoveRight;

[VB] Public Shared ReadOnly KeyMoveRight As CommandID

[JScript] public static var KeyMoveRight: CommandID;

Description
j) ResolveManagedReference

[C#] public static readonly CommandID KeyMoveUp;

[C++] public: static CommandID* KeyMoveUp;

[VB] Public Shared ReadOnly KeyMoveUp As CommandID

[JScript] public static var KeyMoveUp: CommandID;

Description
k) ResolveManagedReference

[C#] public static readonly CommandID KeyNudgeDown;

[C++] public: static CommandID* KeyNudgeDown;

[VB] Public Shared ReadOnly KeyNudgeDown As CommandID

[JScript] public static var KeyNudgeDown: CommandID;

Description
l) ResolveManagedReference

[C#] public static readonly CommandID KeyNudgeHeight-Decrease;

[C++] public: static CommandID* KeyNudgeHeightDecrease;

[VB] Public Shared ReadOnly KeyNudgeHeightDecrease As CommandID

[JScript] public static var KeyNudgeHeightDecrease: CommandID;

Description
m) ResolveManagedReference

[C#] public static readonly CommandID KeyNudgeHeight-Increase;

[C++] public: static CommandID* KeyNudgeHeightIncrease;

[VB] Public Shared ReadOnly KeyNudgeHeightIncrease As CommandID

[JScript] public static var KeyNudgeHeightIncrease: CommandID;

Description
n) ResolveManagedReference

[C#] public static readonly CommandID KeyNudgeLeft;

[C++] public: static CommandID* KeyNudgeLeft;

[VB] Public Shared ReadOnly KeyNudgeLeft As Command ID

[JScript] public static var KeyNudgeLeft: CommandID;

Description
o) ResolveManagedReference

[C#] public static readonly CommandID KeyNudgeRight;

[C++] public: static CommandID* KeyNudgeRight;

[VB] Public Shared ReadOnly KeyNudgeRight As Command ID

[JScript] public static var KeyNudgeRight: CommandID;

Description
p) ResolveManagedReference

[C#] public static readonly CommandID KeyNudgeUp;

[C++] public: static CommandID* KeyNudgeUp;

[VB] Public Shared ReadOnly KeyNudgeUp As Command ID

[JScript] public static var KeyNudgeUp: CommandID;

Description
q) ResolveManagedReference

[C#] public static readonly CommandID KeyNudgeWidth-Decrease;

[C++] public: static CommandID* KeyNudgeWidthDecrease;

[VB] Public Shared ReadOnly KeyNudgeWidthDecrease As CommandID

[JScript] public static var KeyNudgeWidthDecrease: CommandID;

Description
r) ResolveManagedReference

[C#] public static readonly CommandID KeyNudgeWidthIncrease;

[C++] public: static CommandID* KeyNudgeWidthIncrease;

[VB] Public Shared ReadOnly KeyNudgeWidthIncrease As CommandID

[JScript] public static var KeyNudgeWidthIncrease: CommandID;

Description
s) ResolveManagedReference

[C#] public static readonly CommandID KeyReverseCancel;

[C++] public: static CommandID* KeyReverseCancel;

[VB] Public Shared ReadOnly KeyReverseCancel As CommandID

[JScript] public static var KeyReverseCancel: CommandID;

Description
t) ResolveManagedReference

[C#] public static readonly CommandID KeySelectNext;

[C++] public: static CommandID* KeySelectNext;

[VB] Public Shared ReadOnly KeySelectNext As Command ID

[JScript] public static var KeySelectNext: CommandID;

Description
u) ResolveManagedReference

[C#] public static readonly CommandID KeySelectPrevious;

[C++] public: static CommandID* KeySelectPrevious;

[VB] Public Shared ReadOnly KeySelectPrevious As CommandID

[JScript] public static var KeySelectPrevious: CommandID;

Description
v) ResolveManagedReference

[C#] public static readonly CommandID KeySizeHeightDecrease;

[C++] public: static CommandID* KeySizeHeightDecrease;

[VB] Public Shared ReadOnly KeySizeHeightDecrease As CommandID

[JScript] public static var KeySizeHeightDecrease: CommandID;

Description w) ResolveManagedReference

[C#] public static readonly CommandID KeySizeHeightIncrease;

[C++] public: static CommandID* KeySizeHeightIncrease;

[VB] Public Shared ReadOnly KeySizeHeightIncrease As CommandID

[JScript] public static var KeySizeHeightIncrease: Command ID;

Description x) ResolveManagedReference

[C#] public static readonly CommandID KeySizeWidthDecrease;

[C++] public: static CommandID* KeySizeWidthDecrease;

[VB] Public Shared ReadOnly KeySizeWidthDecrease As CommandID

[JScript] public static var KeySizeWidthDecrease: Command ID;

Description y) Resolve ManagedReference

[C#] public static readonly CommandID KeySizeWidthIncrease;

[C++] public: static CommandID* KeySizeWidthIncrease;

[VB] Public Shared ReadOnly KeySizeWidthIncrease As CommandID

[JScript] public static var KeySizeWidthIncrease: CommandID;

Description z) ResolveManagedReference

[C#] public static readonly CommandID KeyTabOrderSelect;

[C++] public: static CommandID* KeyTabOrderSelect;

[VB] Public Shared ReadOnly KeyTabOrderSelect As CommandID

[JScript] public static var KeyTabOrderSelect: CommandID;

Description aa) ResolveManagedReference

[C#] public static readonly CommandID SelectionMenu;

[C++] public: static CommandID* SelectionMenu;

[VB] Public Shared ReadOnly SelectionMenu As Command ID

[JScript] public static var SelectionMenu: CommandID;

Description bb) ResolveManagedReference

[C#] public static readonly CommandID TraySelectionMenu;

[C++] public: static CommandID* TraySelectionMenu;

[VB] Public Shared ReadOnly TraySelectionMenu As CommandID

[JScript] public static var TraySelectionMenu: CommandID;

Description cc) MenuCommands

Example Syntax:

dd) ResolveManagedReference

[C#] public MenuCommands( );

[C++] public: MenuCommands( );

[VB] Public Sub New( )

[JScript] public function MenuCommands( );

AxImporter.Options class (System.Windows.Forms.Design)

a) ToString b) ToString c) ToString d) ToString e) ToString f) ToString g) ToString h) ToString i) ToString j) ToString k) ToString l) ToString m) ToString n) ToString o) AxImporter.Options Example Syntax:

p) ToString

ParentControlDesigner class (System.Windows.Forms.Design)

a) ToString

Description

Provides the design-time functionality of the System.Windows.Forms.Design.ControlDesigner, as well as a selection UI handler and the ability to manipulate child components.

b) ParentControlDesigner

Example Syntax:

c) ToString d) AccessibilityObject e) AssociatedComponents f) Component g) Control h) DefaultControlLocation i) ToString Description Indicates the default location for a control added to this designer.

The default location is usually (0,0), but may be modified if the container has special borders, etc.

j) DrawGrid k) ToString

[C#] protected virtual bool DrawGrid {get; set;}

[C++] protected: _property virtual bool get_DrawGrid( ); protected: _property virtual void set_DrawGrid(bool);

[VB] Overridable Protected Property DrawGrid As Boolean

[JScript] protected function get DrawGrid( ): Boolean; protected function set DrawGrid(Boolean);

Description

Accessor method for the DrawGrid property. This property determines if the grid should be drawn on a control.

l) EnableDragRect
m) ToString

[C#] protected override bool EnableDragRect {get;}

[C++] protected: _property virtual bool get_EnableDrag Rect( );

[VB] Overrides Protected ReadOnly Property EnableDrag Rect As Boolean

[JScript] protected function get EnableDragRect( ): Boolean;

Description

Indicates whether drag rectangles can be drawn on this designer.

n) GridSize
o) ToString

[C#] protected Size GridSize {get; set;}

[C++] protected: _property Size get_GridSize( ); protected: _property void set_GridSize(Size);

[VB] Protected Property GridSize As Size

[JScript] protected function get GridSize( ): Size; protected function set GridSize(Size);

Description

Gets/Sets the GridSize property for a form or user control.

Return Value: A Point representing the size of the grid drawn on a form or user control.

p) InheritanceAttribute
q) Inherited
r) SelectionRules
s) ShadowProperties
t) Verbs
u) CanParent

[C#] public virtual bool CanParent(Control control);

[C++] public: virtual bool CanParent(Control* control);

[VB] Overridable Public Function CanParent(ByVal control As Control) As Boolean

[JScript] public function CanParent(control: Control): Boolean; Indicates whether this designer can parent the specified control.

Description

Indicates whether this designer can parent the specified control.

Return Value: true if this designer can parent the specified control; otherwise, false .

v) CanParent

[C#] public virtual bool CanParent(ControlDesigner controlDesigner);

[C++] public: virtual bool CanParent(ControlDesigner* controlDesigner);

[VB] Overridable Public Function CanParent(ByVal controlDesigner As ControlDesigner) As Boolean

[JScript] public function CanParent(controlDesigner: ControlDesigner): Boolean; Indicates whether this designer can parent to the specified designer.

Description

Indicates whether this designer can parent to the specified designer.

Generally this means if the control for this designer can parent the specified ControlDesigner's designer. The designer to determine whether this designer can parent.

w) CreateTool

[C#] protected void CreateTool(ToolboxItem tool);

[C++] protected: void CreateTool(ToolboxItem* tool);

[VB] Protected Sub CreateTool(ByVal tool As ToolboxItem)

[JScript] protected function CreateTool(tool: ToolboxItem); Creates the specified tool in the center of the currently selected control.

Description

Creates the specified tool in the center of the currently selected control.

The default size for the tool is used. The tool to create.

x) CreateTool

[C#] protected void CreateTool(ToolboxItem tool, Point location);

[C++] protected: void CreateTool(ToolboxItem* tool, Point location);

[VB] Protected Sub CreateTool(ByVal tool As ToolboxItem, ByVal location As Point)

[JScript] protected function CreateTool(tool: ToolboxItem, location: Point); Creates the specified tool in the currently selected control at the specified position.

Description

Creates the specified tool in the currently selected control at the specified position.

The default size for the tool is used. The tool to create. The location, in screen coordinates, of the tool's upper left corner. If the tool has a default size it will be centered at this location.

y) CreateTool

[C#] protected void CreateTool(ToolboxItem tool, Rectangle bounds);

[C++] protected: void CreateTool(ToolboxItem* tool, Rectangle bounds);

[VB] Protected Sub CreateTool(ByVal tool As ToolboxItem, ByVal bounds As Rectangle)

[JScript] protected function CreateTool(tool: ToolboxItem, bounds: Rectangle);

Description

Creates the specified tool in the currently selected control.

The tool is created with the provided shape. The tool to create. The dimensions of the tool. The x and y components of the bounds should be the screen coordinates of the upper left corner of the tool.

z) CreateToolCore

[C#] protected virtual IComponent[ ] CreateToolCore(ToolboxItem tool, int x, int y, int width, int height, bool hasLocation, bool hasSize);

[C++] protected: virtual IComponent* CreateToolCore(ToolboxItem* tool, int x, int y, int width, int height, bool hasLocation, bool hasSize) [ ];

[VB] Overridable Protected Function CreateToolCore(ByVal tool As ToolboxItem, ByVal x As Integer, ByVal y As Integer, ByVal width As Integer, ByVal height As Integer, ByVal hasLocation As Boolean, ByVal hasSize As Boolean) As IComponent( )

[JScript] protected function CreateToolCore(tool: ToolboxItem, x: int, y: int, width: int, height: int, hasLocation: Boolean, hasSize: Boolean): IComponent[ ];

Description

Provides core functionality for all the CreateTool methods.

Return Value: An array of components that were created by the tool.

This is the only CreateTool method that can be overridden. The tool to create. The x location, in screen coordinates, of the location of the tool. If the size of the tool is specified here, this will be the upper left corner of the tool. If no size is specified, then this should be interpreted as the center of the tool. The y location, in screen coordinates, of the location of the tool. If the size of the tool is specified here, this will be the upper left corner of the tool. If no size is specified, then this should be interpreted as the center of the tool. The width of the tool. This is ignored if hasSize is false. The height of the tool. This is ignored if hasSize is false. If this is false the x and y values will be calculated to place the tool in the center of the currently selected control. If this is false the width and height values will be calculated to be the default width and height for the control.

aa) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the resources (other than memory) used by the System.Windows.Forms.Design.ParentControlDesigner.

Call System.Windows.Forms.Design. ParentControlDesigner.Dispose(System.Boolean) when you are finished using the System.Windows.Forms.Design. ParentControlDesigner. The System.Windows.Forms. Design.ParentControlDesigner.Dispose(System.Boolean) method leaves the System.Windows.Forms.Design. ParentControlDesigner in an unusable state. After calling System.Windows.Forms. Design. ParentControlDesigner.Dispose(System Boolean), you must release all references to the System.Windows. Forms.Design. ParentControlDesigner so the memory it was occupying can be reclaimed by garbage collection.

bb) GetControl

[C#] protected Control GetControl(object component);

[C++] protected: Control* GetControl(Object* component);

[VB] Protected Function GetControl(ByVal component As Object) As Control

[JScript] protected function GetControl(component: Object): Control; Returns the control that represents the UI for the given component.

cc) GetUpdatedRect

[C#] protected Rectangle GetUpdatedRect(Rectangle originalRect, Rectangle dragRect, bool updateSize);

[C++] protected: Rectangle GetUpdatedRect(Rectangle originalRect, Rectangle dragRect, bool updateSize);

[VB] Protected Function GetUpdatedRect(ByVal originalRect As Rectangle, ByVal dragRect As Rectangle, ByVal updateSize As Boolean) As Rectangle

[JScript] protected function GetUpdatedRect(originalRect: Rectangle, dragRect: Rectangle, updateSize: Boolean): Rectangle;

Description

Updates the given rectangle, adjusting it for grid snaps as needed.

Return Value: the newly updated rectangle. If no changes were needed to the rectangle this will return rect. The original rectangle of the component being updated. The dragging rectangle of the component. True to updateSize as well dd) Initialize

[C#] public override void Initialize(IComponent component);

[C++] public: void Initialize(IComponent* component);

[VB] Overrides Public Sub Initialize(ByVal component As IComponent)

[JScript] public override function Initialize(component: IComponent);

Description

Initializes the designer with the given component. The designer can get the component's site and request services from it in this call. The component to associate with this designer.

ee) InvokeCreateTool

[C#] protected static void InvokeCreateTool(ParentControlDesigner toInvoke, ToolboxItem tool);

[C++] protected: static void InvokeCreateTool(ParentControlDesigner* toInvoke, ToolboxItem* tool);

[VB] Protected Shared Sub InvokeCreateTool(ByVal toInvoke As ParentControlDesigner, ByVal tool As ToolboxItem)

[JScript] protected static function InvokeCreateTool(toInvoke ParentControlDesigner, tool ToolboxItem);

Description ff) OnDragDrop

[C#] protected override void OnDragDrop(DragEventArgs de);

[C++] protected: void OnDragDrop(DragEventArgs * de);

[VB] Overrides Protected Sub OnDragDrop(ByVal de As DragEventArgs)

[JScript] protected override function OnDragDrop(de: Drag EventArgs);

Description

Called in response to a drag drop for OLE drag and drop. Here we drop a toolbox component on our parent control.

gg) OnDragEnter

[C#] protected override void OnDragEnter(DragEventArgs de);

[C++] protected: void OnDragEnter(DragEventArgs* de);

[VB] Overrides Protected Sub OnDragEnter(ByVal de As DragEventArgs)

[JScript] protected override function OnDragEnter(de: Drag EventArgs);

Description

Called in response to a drag enter for OLE drag and drop.

hh) OnDragLeave

[C#] protected override void OnDragLeave(EventArgs e);

[C++] protected: void OnDragLeave(EventArgs* e);

[VB] Overrides Protected Sub OnDragLeave(ByVal e As EventArgs)

[JScript] protected override function OnDragLeave(e: Event Args);

Description

Called when a drag-drop operation leaves the control designer view Called when a drag-drop operation leaves the control designer view ii) OnDragOver

[C#] protected override void OnDragOver(DragEventArgs de);

[C++] protected: void OnDragOver(DragEventArgs* de);

[VB] Overrides Protected Sub OnDragOver(ByVal de As DragEventArgs)

[JScript] protected override function OnDragOver(de: Drag EventArgs);

Description

Called when a drag drop object is dragged over the control designer view Called when a drag drop object is dragged over the control designer view jj) OnGiveFeedback

[C#] protected override void OnGiveFeedback(GiveFeedbackEventArgs e);

[C++] protected: void OnGiveFeedback(GiveFeedback-EventArgs* e);

[VB] Overrides Protected Sub OnGiveFeedback(ByVal e As GiveFeedbackEventArgs)

[JScript] protected override function OnGiveFeedback(e: GiveFeedbackEventArgs);

Description

Event handler for our GiveFeedback event, which is called when a drag operation is in progress. The host will call us with this when an OLE drag event happens.

kk) OnMouseDragBegin

[C#] protected override void OnMouseDragBegin(int x, int y);

[C++] protected: void OnMouseDragBegin(int x, int y);

[VB] Overrides Protected Sub OnMouseDragBegin(ByVal x As Integer, ByVal y As Integer)

[JScript] protected override function OnMouseDragBegin(x: int, y: int);

Description

Called in response to the left mouse button being pressed on a component. The designer overrides this to provide a "lasso" selection for components within the control. The x position, in control coordinates, of the mouse. The y position, in control coordinates, of the mouse.

ll) OnMouseDragEnd

[C#] protected override void OnMouseDragEnd(bool cancel);

[C++] protected: void OnMouseDragEnd(bool cancel);

[VB] Overrides Protected Sub OnMouseDragEnd(ByVal cancel As Boolean)

[JScript] protected override function OnMouseDragEnd (cancel: Boolean);

Description

Called at the end of a drag operation. This either commits or rolls back the drag. Set this to true to cancel the drag, or false to commit it.

mm) OnMouseDragMove

[C#] protected override void OnMouseDragMove(int x, int y);

[C++] protected: void OnMouseDragMove(int x, int y);

[VB] Overrides Protected Sub OnMouseDragMove(ByVal x As Integer, ByVal y As Integer)

[JScript] protected override function OnMouseDragMove(x: int, y: int);

Description

Called for each movement of the mouse. This will check to see if a drag operation is in progress. If so, it will pass the updated drag dimensions on to the selection UI service. The x position, in screen coordinates, of the mouse. The y position, in screen coordinates, of the mouse.

nn) OnMouseEnter

[C#] protected override void OnMouseEnter( );

[C++] protected: void OnMouseEnter( );

[VB] Overrides Protected Sub OnMouseEnter( )

[JScript] protected override function OnMouseEnter( );

Description

Called when the mouse enters the control. At this point we want to cancel the timeout timer.

oo) OnMouseHover

[C#] protected override void OnMouseHover( );

[C++] protected: void OnMouseHover( );

[VB] Overrides Protected Sub OnMouseHover( )

[JScript] protected override function OnMouseHover( );

Description

Called when the user hovers over the control. At this point we want to display the container selector. Note: Since the child controls pass this notification up, we will display the container selector even if you hover over a child control.

pp) OnMouseLeave

[C#] protected override void OnMouseLeave( );

[C++] protected: void OnMouseLeave( );

[VB] Overrides Protected Sub OnMouseLeave( )

[JScript] protected override function OnMouseLeave( );

Description

Called when the mouse leaves the control. At this point we need to start listening for the container selector timeout.

qq) OnPaintAdornments

[C+] protected override void OnPaintAdornments(PaintEventArgs pe);

[C++] protected: void OnPaintAdomments(PaintEventArgs* pe);

[VB] Overrides Protected Sub OnPaintAdornments(ByVal pe As PaintEventArgs)

[JScript] protected override function OnPaintAdomments (pe: PaintEventArgs);

Description

Called after our component has finished painting. Here we draw our grid surface Called after our component has finished painting. Here we draw our grid surface The paint event.

rr) OnSetCursor

[C#] protected override void OnSetCursor( );

[C++] protected: void OnSetCursor( );

[VB] Overrides Protected Sub OnSetCursor( )

[JScript] protected override function OnSetCursor( );

Description

Called each time the cursor needs to be set. The ParentControlDesigner behavior here will set the cursor to one of three things: 1. If the toolbox service has a tool selected, it will allow the toolbox service to set the cursor. 2. The arrow will be set. Parent controls allow dragging within their interior.

ss) PreFilterProperties

[C#] protected override void PreFilterProperties(IDictionary properties);

[C++] protected: void PreFilterProperties(IDictionary* properties);

[VB] Overrides Protected Sub PreFilterProperties(ByVal properties As IDictionary)

[JScript] protected override function PreFilterProperties (properties: IDictionary);

Description

Allows a designer to filter the set of properties the component it is designing will expose through the TypeDescriptor object. This method is called immediately before its corresponding "Post" method. If you are overriding this method you should call the base implementation before you perform your own filtering.

Return Value: The augmented set of properties. If the method does not modify any properties, it may just return a reference to its input parameter. If you do make a change to the properties, you must create a new array. The properties for the class of the component.

tt) IOleDragClient.AddComponent

[C#] bool IOleDragClient.AddComponent(IComponent component, string name, bool firstAdd);

[C++] bool IOleDragClient::AddComponent(IComponent* component, String* name, bool firstAdd);

[VB] Function AddComponent(ByVal component As IComponent, ByVal name As String, ByVal firstAdd As Boolean) As Boolean Implements IOleDragClient.AddComponent

[JScript] function IOleDragClient.AddComponent(component: IComponent, name: String, firstAdd: Boolean): Boolean;

uu) IOleDragClient.GetControlForComponent

[C#] Control IOleDragClient.GetControlForComponent(object component);

[C++] Control* IOleDragClient::GetControlForComponent (Object* component);

[VB] Function GetControlForComponent(ByVal component As Object) As Control Implements IOleDragClient.GetControlForComponent

[JScript] function IOleDragClient.GetControlForComponent(component: Object): Control;

vv) IOleDragClient.GetDesignerControl

[C#] Control IOleDragClient.GetDesignerControl( );

[C++] Control* IOleDragClient::GetDesignerControl( );

[VB] Function GetDesignerControl( ) As Control Implements IOleDragClient.GetDesignerControl

[JScript] function IoleDragClient.GetDesignerControl( ): Control;

ww) IOleDragClient.IsDropOk

[C#] bool IOleDragClient.IsDropOk(IComponent component);

[C++] bool IOleDragClient::IsDropOk(IComponent* component);

[VB] Function IsDropOk(ByVal component As IComponent) As Boolean Implements IOleDragClient.IsDropOk

[JScript] function IOleDragClient.IsDropOk(component: IComponent): Boolean;

xx) ISelectionUIHandler.BeginDrag

[C#] bool ISelectionUIHandler.BeginDrag(object[ ] components, SelectionRules rules, int initialX, int initialY);

[C++] bool ISelectionUIHandler::BeginDrag(Object* components _gc[ ], SelectionRules rules, int initialX, int initialY);

[VB] Function BeginDrag(ByVal components( ) As Object, ByVal rules As SelectionRules, ByVal initialX As Integer, ByVal initialY As Integer) As Boolean Implements ISelectionUIHandler.BeginDrag

[JScript] function ISelectionUIHandler.BeginDrag(components: Object[ ], rules SelectionRules, initialX: int, initialY: int): Boolean;

yy) ISelectionUIHandler.DragMoved

[C#] void ISelectionUIHandler.DragMoved(object[ ] components, Rectangle offset);

[C++] void ISelectionUIHandler::DragMoved(Object* components _gc[ ], Rectangle offset);

[VB] Sub DragMoved(ByVal components( ) As Object, ByVal offset As Rectangle) Implements ISelectionUIHandler.DragMoved

[JScript] function ISelectionUIHandler.DragMoved(components: Object[ ], offset: Rectangle);

zz) ISelectionUIHandler.EndDrag

[C#] void ISelectionUIHandler.EndDrag(object[ ] components, bool cancel);

[C++] void ISelectionUIHandler::EndDrag(Object* components _gc[ ], bool cancel);

[VB] Sub EndDrag(ByVal components( ) As Object, ByVal cancel As Boolean) Implements ISelectionUIHandler.EndDrag

[JScript] function ISelectionUIHandler.EndDrag(components: Object[ ], cancel Boolean);

aaa) ISelectionUIHandler.GetComponentBounds

[C++] Rectangle ISelectionUIHandler.GetComponentBounds(object component);

[C++] Rectangle ISelectionUIHandler::GetComponentBounds(Object* component);

[VB] Function GetComponentBounds(ByVal component As Object) As Rectangle Implements ISelectionUIHandler.GetComponentBounds

[JScript] function ISelectionUIHandler.GetComponentBounds(component Object): Rectangle;

bbb) ISelectionUIHandler.GetComponentRules

[C#] SelectionRules ISelectionUIHandler.GetComponentRules(object component);

[C++] SelectionRules ISelectionUIHandler::GetComponent Rules(Object* component);

[VB] Function GetComponentRules(ByVal component As Object) As SelectionRules Implements ISelectionUIHandler.GetComponentRules

[JScript] function ISelectionUIHandler.GetComponentRules (component: Object) SelectionRules;

ccc) ISelectionUIHandler.GetSelectionClipRect

[C#] Rectangle ISelectionUIHandler.GetSelectionClipRect (object component);

[C++] Rectangle ISelectionUIHandler::GetSelectionClipRect(Object* component);

[VB] Function GetSelectionClipRect(ByVal component As Object) As Rectangle Implements ISelectionUIHandler.GetSelectionClipRect

[JScript] function ISelectionUIHandler.GetSelectionClipRect(component: Object): Rectangle;

ddd) ISelectionUIHandler.OleDragDrop

[C#] void ISelectionUIHandler.OleDragDrop(DragEvent Args de);

[C++] void ISelectionUIHandler::OleDragDrop(DragEvent Args* de);

[VB] Sub OleDragDrop(ByVal de As DragEventArgs) Implements ISelectionUIHandler.OleDragDrop

[JScript] function ISelectionUIHandler.OleDragDrop(de: DragEventArgs);

eee) ISelectionUIHandler.OleDragEnter

[C#] void ISelectionUIHandler.OleDragEnter(DragEvent Args de);

[C++] void ISelectionUIHandler::OleDragEnter(DragEvent Args* de);

[VB] Sub OleDragEnter(ByVal de As DragEventArgs) Implements ISelectionUIHandler.OleDragEnter

[JScript] function ISelectionUIHandler.OleDragEnter(de: DragEventArgs);

fff) ISelectionUIHandler.OleDragLeave

[C#] void ISelectionUIHandler.OleDragLeave( );

[C++] void ISelectionUIHandler::OleDragLeave( );

[VB] Sub OleDragLeave( ) Implements ISelectionUIHandler. OleDragLeave

[JScript] function ISelectionUIHandler.OleDragLeave( );

ggg) ISelectionUIHandler.OleDragOver

[C#] void ISelectionUIHandler.OleDragOver(DragEvent Args de);

[C++] void ISelectionUIHandlder::OleDragover(DragEvent Args* de);

[VB] Sub OleDragOver(ByVal de As DragEventArgs) Implements ISelectionUIHandler.OleDragOver

[JScript] function ISelectionUIHandler.OleDragOver(de: DragEventArgs);

hhh) ISelectionUIHandler.OnSelectionDoubleClick

[C#] void ISelectionUIHandler.OnSelectionDoubleClick (IComponent component);

[C++] void ISelectionUIHandler::OnSelectionDoubleClick (IComponent* component);

[VB] Sub OnSelectionDoubleClick(ByVal component As IComponent) Implements ISelectionUIHandler.OnSelectionDoubleClick

[JScript] function ISelectionUIHandler.OnSelectionDoubleClick(component: IComponent);

iii) ISelectionUIHandler.QueryBeginDrag

[C#] bool ISelectionUIHandler.QueryBeginDrag(object[ ] components, SelectionRules rules, int initialX, int initialY);

[C++] bool ISelectionUIHandler::QueryBeginDrag(Object* components _gc[ ], SelectionRules rules, int initialX, int initialY);

[VB] Function QueryBeginDrag(ByVal components( ) As Object, ByVal rules As SelectionRules, ByVal initialX As Integer, ByVal initialY As Integer) As Boolean Implements ISelectionUIHandler.QueryBeginDrag

[JScript] function ISelectionUIHandler.QueryBeginDrag (components: Object[ ], rules: SelectionRules, initialX: int, initialY: int): Boolean;

jjj) ISelectionUIHandler.ShowContextMenu

[C#] void ISelectionUIHandler.ShowContextMenu(IComponent component);

[C++] void ISelectionUIHandler::ShowContextMenu (IComponent* component);

[VB] Sub ShowContextMenu(ByVal component As IComponent) Implements ISelectionUIHandler.ShowContextMenu

[JScript] function ISelectionUIHandler.ShowContextMenu (component: IComponent);

kkk) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

Provides processing for Windows messages.

ScrollableControlDesigner class (System.Windows.Forms.Design)

a) WndProc

Description

Provides design-time functionality for scrollable controls.

b) ScrollableControlDesigner

Example Syntax:

c) WndProc d) AccessibilityObject e) AssociatedComponents f) Component g) Control h) DefaultControlLocation i) DrawGrid j) EnableDragRect k) GridSize l) InheritanceAttribute m) Inherited n) SelectionRules o) ShadowProperties p) Verbs q) GetHitTest

[C#] protected override bool GetHitTest(Point pt);

[C++] protected: bool GetHitTest(Point pt);

[VB] Overrides Protected Function GetHitTest(ByVal pt As Point) As Boolean

[JScript] protected override function GetHitTest(pt: Point): Boolean;

Description

Indicates whether the specified point was within the bounds of the component.

Return Value: true if the point at the cursor should be live; otherwise, false . For a form, if it has autoscroll set active, the scroll bars are always UI active. The point, in screen coordinates, of the cursor.

r) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

Provides processing for Windows messages. The message being processed.

SelectionRules enumeration (System.Windows.Forms.Design)

a) WndProc

Description

Specifies a set of selection rule identifiers that can be used to indicate attributes for a selected component.

which can be used to determine whether the selected component has some form of visible user interface and whether the user can take actions to move or alter the size of an object.

b) WndProc

[C#] public const SelectionRules AllSizeable;

[C++] public: const SelectionRules AllSizeable;

[VB] Public Const AllSizeable As SelectionRules

[JScript] public var AllSizeable: SelectionRules;

Description

Indicates the given component supports sizing in all directions, and the selection service is not currently locked.

c) WndProc

[C#] public const SelectionRules BottomSizeable;

[C++] public: const SelectionRules BottomSizeable;

[VB] Public Const BottomSizeable As SelectionRules

[JScript] public var BottomSizeable: SelectionRules;

Description

Indicates the given component supports resize from the bottom. This bit will be ignored unless the Sizeable bit is also set.

d) WndProc

[C#] public const SelectionRules LeftSizeable;

[C++] public: const SelectionRules LeftSizeable;

[VB] Public Const LeftSizeable As SelectionRules

[JScript] public var LeftSizeable: SelectionRules;

Description

Indicates the given component supports resize from the left. This bit will be ignored unless the Sizeable bit is also set.

e) WndProc

[C#] public const SelectionRules Locked;

[C++] public: const SelectionRules Locked;

[VB] Public Const Locked As SelectionRules

[JScript] public var Locked: SelectionRules;

Description

Indicates the given component is locked to its container. Overrides the moveable and sizeable properties of this enum.

f) WndProc

[C#] public const SelectionRules Moveable;

[C++] public: const SelectionRules Moveable;

[VB] Public Const Moveable As SelectionRules

[JScript] public var Moveable: SelectionRules;

Description

Indicates the given component supports a location property that allows it to be moved on the screen, and that the selection service is not currently locked.

g) WndProc

[C#] public const SelectionRules None;

[C++] public: const SelectionRules None;

[VB] Public Const None As SelectionRules

[JScript] public var None: SelectionRules;

Description

Indicates no special selection attributes.

h) WndProc

[C#] public const SelectionRules RightSizeable;

[C++] public: const SelectionRules RightSizeable;

[VB] Public Const RightSizeable As SelectionRules

[JScript] public var RightSizeable: SelectionRules;

Description

Indicates the given component supports resize from the right. This bit will be ignored unless the Sizeable bit is also set.

i) WndProc

[C#] public const SelectionRules TopSizeable;

[C++] public: const SelectionRules TopSizeable;

[VB] Public Const TopSizeable As SelectionRules

[JScript] public var TopSizeable: SelectionRules;

Description

Indicates the given component supports resize from the top. This bit will be ignored unless the Sizeable bit is also set.

j) WndProc

[C#] public const SelectionRules Visible;

[C++] public: const SelectionRules Visible;

[VB] Public Const Visible As SelectionRules

[JScript] public var Visible: SelectionRules;

Description

Indicates the given component has some form of visible user interface and the selection service is drawing a selection border around this user interface. If a selected component has this rule set, you can assume that the component implements System.ComponentModel.IComponent and that it is associated with a corresponding design instance.

ComponentEditorForm class (System.Windows.Forms.Design)

a) ToString

Description

Provides a user interface for a System.Windows.Forms.Design.WindowsFormsComponentEditor.

A System.Windows.Forms.Design.ComponentEditorForm shows a view of available component editor pages along with a user interface for selection.

b) ComponentEditorForm

Example Syntax:

c) ToString

[C#] public ComponentEditorForm(object component, Type[ ] pageTypes);

[C++] public: ComponentEditorForm(Object* component, Type* pageTypes[ ]);

[VB] Public Sub New(ByVal component As Object, ByVal pageTypes( ) As Type)

[JScript] public function ComponentEditorForm(component: Object, pageTypes: Type[ ]);

Description

Initializes a new instance of the System.Windows.Forms.Design.ComponentEditorForm class. The component to be edited. The set of System.Windows.Forms. Design.ComponentEditorPage objects to be shown in the form.

d) AcceptButton
e) AccessibilityObject
f) AccessibleDefaultActionDescription
g) AccessibleDescription
h) AccessibleName
i) AccessibleRole
j) ActiveControl
k) ActiveMdiChild
l) AllowDrop
m) AllowTransparency
n) Anchor
o) AutoScale
p) AutoScaleBaseSize
q) AutoScroll
r) AutoScrollMargin
s) AutoScrollMinSize
t) AutoScrollPosition
u) BackColor
v) BackgroundImage
w) BindingContext
x) Bottom
y) Bounds
z) CancelButton
aa) CanFocus
bb) CanSelect
cc) Capture
dd) CausesValidation
ee) ClientRectangle
ff) ClientSize
gg) CompanyName
hh) Container
ii) ContainsFocus
jj) ContextMenu
kk) ControlBox
ll) Controls
mm) Created
nn) CreateParams
oo) Cursor
pp) DataBindings
qq) DefaultImeMode
rr) DefaultSize
ss) DesignMode
tt) DesktopBounds
uu) DesktopLocation
vv) DialogResult
ww) DisplayRectangle
xx) Disposing
yy) Dock
zz) DockPadding
aaa) Enabled
bbb) Events
ccc) Focused
ddd) Font
eee) FontHeight
fff) ForeColor
ggg) FormBorderStyle
hhh) Handle
iii) HasChildren
jjj) Height
kkk) HelpButton
lll) HScroll
mmm) Icon
nnn) ImeMode
ooo) InvokeRequired
ppp) IsAccessible
qqq) IsDisposed
rrr) IsHandleCreated
sss) IsMdiChild
ttt) IsMdiContainer
uuu) IsRestricted Window
vvv) KeyPreview
www) Left
xxx) Location
yyy) MaximizeBox
zzz) MaximizedBounds aaaa) MaximumSize
bbbb) MdiChildren
cccc) MdiParent
dddd) Menu
eeee) MergedMenu
ffff) MinimizeBox
gggg) MinimumSize
hhhh) Modal
iiii) Name
jjjj) Opacity
kkkk) OwnedForms
llll) Owner
mmmm) Parent
nnnn) ParentForm
oooo) ProductName
pppp) ProductVersion
qqqq) RecreatingHandle
rrrr) Region
ssss) RenderRightToLeft
tttt) ResizeRedraw
uuuu) Right
vvvv) RightToLeft
wwww) ShowFocusCues
xxxx) ShowInTaskbar
yyyy) ShowKeyboardCues
zzzz) Site
aaaaa) Size
bbbbb) SizeGripStyle
ccccc) StartPosition
ddddd) TabIndex
eeeee) TabStop
fffff) Tag
ggggg) Text
hhhhh) Top
iiiii) TopLevel
jjjjj) TopLevelControl
kkkkk) TopMost
lllll) TransparencyKey
mmmmm) Visible
nnnnn) VScroll
ooooo) Width
ppppp) WindowState
qqqqq) WindowTarget
rrrrr) OnActivated

[C#] protected override void OnActivated(EventArgs e);

[C++] protected: void OnActivated(EventArgs* e);

[VB] Overrides Protected Sub OnActivated(ByVal e As EventArgs)

[JScript] protected override function OnActivated(e: Event Args);

Description sssss) OnHelpRequested

[C#] protected override void OnHelpRequested(HelpEvent Args e);

[C++] protected: void OnHelpRequested(HelpEventArgs* e);

[VB] Overrides Protected Sub OnHelpRequested(ByVal e As HelpEventArgs)

[JScript] protected override function OnHelpRequested(e: HelpEventArgs);

Description ttttt) OnSelChangeSelector

[C#] protected virtual void OnSelChangeSelector(object source, TreeViewEventArgs e);

[C++] protected: virtual void OnSelChangeSelector(Object* source, TreeViewEventArgs* e);

[VB] Overridable Protected Sub OnSelChangeSelector(ByVal source As Object, ByVal e As TreeViewEventArgs)

[JScript] protected function OnSelChangeSelector(source: Object, e TreeViewEventArgs);

Description

Handles switching between pages.

uuuuu) PreProcessMessage

[C#] public override bool PreProcessMessage(ref Message msg);

[C++] public: bool PreProcessMessage(Message* msg);

[VB] Overrides Public Function PreProcessMessage(ByRef msg As Message) As Boolean

[JScript] public override function PreProcessMessage(msg: Message): Boolean;

Description

Provides a method to override in order to pre-process input messages before they are dispatched.

System.Windows.Forms.Design.ComponentEditorForm.PreProcessMessage System.Windows.Forms.Message@) is called by the application's message loop to pre-process input messages before they are dispatched. A MSG structure that specifies the message to preprocess. Possible values for this parameter include WM_KEYDOWN, WM_SYSKEYDOWN, WM_CHAR, and WM_SYSCHAR.

vvvvv) ShowForm

[C#] public virtual DialogResult ShowForm( );

[C++] public: virtual DialogResult ShowForm( );

[VB] Overridable Public Function ShowForm( ) As DialogResult

[JScript] public function ShowForm( ): DialogResult; Shows the form. The form will have no owner window.

Description

Shows the form. The form will have no owner window.

Return Value: A System.Windows.Forms.DialogResult value indicating the result of showing the dialog.

wwwww) ShowForm

[C#] public virtual DialogResult ShowForm(int page)

[C++] public: virtual DialogResult ShowForm(int page);

[VB] Overridable Public Function ShowForm(ByVal page As Integer) As DialogResult

[JScript] public function ShowForm(page: int): DialogResult;

Description

Shows the form and the specified page. The form will have no owner window.

Return Value: A System.Windows.Forms.DialogResult value indicating the result of showing the dialog. The index of the page to show.

xxxxx) ShowForm

[C#] public virtual DialogResult ShowForm(IWin32Window owner);

[C++] public: virtual DialogResult ShowForm (IWin32Window* owner);

[VB] Overridable Public Function ShowForm(ByVal owner As IWin32Window) As DialogResult

[JScript] public function ShowForm(owner: IWin32Window): DialogResult;

Description

Shows the form with the specified owner.

Return Value: A System.Windows.Forms.DialogResult value indicating the result of showing the dialog. The owner of the dialog.

yyyyy) ShowForm

[C#] public virtual DialogResult ShowForm(IWin32Window owner, int page); [C++] public: virtual DialogResult ShowForm(IWin32Window* owner, int page);

[VB] Overridable Public Function ShowForm(ByVal owner As IWin32Window, ByVal page As Integer) As DialogResult

[JScript] public function ShowForm(owner: IWin32Window, page: int): DialogResult;

Description

Shows the form and the specified page with the specified owner.

Return Value: A System.Windows.Forms.DialogResult value indicating the result of showing the dialog. The owner of the dialog. The index of the page to show.

ComponentEditorPage class (System.Windows.Forms.Design)

a) WndProc

Description

Provides a base implementation for a System.Windows.Forms.Design.ComponentEditorPage. System.Windows.Forms.Design.ComponentEditorPage is a complete implementation for a component editor page that consists of an empty window. You can extend this page to add your own controls.

b) ComponentEditorPage

Example Syntax:

c) WndProc

[C+] public ComponentEditorPage( );

[C++] public: ComponentEditorPage( );

[VB] Public Sub New( )

[JScript] public function ComponentEditorPage( );

Description

Initializes a new instance of the System.Windows.Forms.Design.ComponentEditorPage class.

d) AccessibilityObject e) A ccessibleDefaultA ctiondescription f) AccessibleDescription g) AccessibleName h) AccessibleRole i) AllowDrop j) Anchor k) AutoScroll l) AutoScrollMargin m) AutoScrollMinSize n) AutoScrollPosition o) BackColor p) BackgroundImage q) BindingContext r) BorderStyle s) Bottom t) Bounds u) CanFocus v) CanSelect w) Capture x) Causes Validation y) ClientRectangle z) ClientSize aa) CommitOnDeactivate bb) WndProc Description Indicates whether an editor should apply its changes before it is deactivated.

The standard implementation returns false cc) CompanyName dd) Component ee) WndProc Description Gets or sets the component to edit.

The component to edit.

ff) Container gg) ContainsFocus hh) ContextMenu ii) Controls jj) Created kk) CreateParams ll) WndProc Description Gets or sets the creation parameters for this control.

mm) Cursor nn) DataBindings oo) DefaultImeMode pp) DefaultSize qq) DesignMode rr) DisplayRectangle ss) Disposing tt) Dock uu) DockPadding vv) Enabled ww) Events xx) FirstActivate yy) WndProc Description Indicates whether the page is being activated for the first time.

zz) Focused aaa) Font bbb) FontHeight ccc) ForeColor ddd) Handle eee) HasChildren fff) Height ggg) HScroll hhh) Icon
iii) WndProc Description Gets or sets the icon for this page.

The caller may use this before the editor is actually activated.
jjj) ImeMode
kkk) InvokeRequired
lll) IsAccessible
mmm) IsDisposed
nnn) IsHandleCreated
ooo) Left
ppp) Loading
qqq) WndProc Description Indicates if loading is taking place.
rrr) LoadRequired
sss) WndProc

[C#] protected bool LoadRequired {get; set;}

[C++] protected: _property bool get_LoadRequired( ); protected: _property void set_LoadRequired(bool);

[VB] Protected Property LoadRequired As Boolean

[JScript] protected function get LoadRequired( ): Boolean; protected function set LoadRequired(Boolean);

Description

Indicates whether a load is required previous to editing.
ttt) Location
uuu) Name
vvv) PageSite
www) WndProc Description Gets or sets the page site.

The site for this component editor page.
xxx) Parent
yyy) ProductName
zzz) ProductVersion
aaaa) RecreatingHandle
bbbb) Region
cccc) RenderRightToLeft
dddd) ResizeRedraw
eeee) Right
ffff) RightToLeft
gggg) ShowFocusCues
hhhh) ShowKeyboardCues
iiii) Site
jjjj) Size
kkkk) TabIndex
llll) TabStop
mmmm) Tag
nnnn) Text
oooo) Title
pppp) WndProc Description Gets or sets the title of the page.

The caller may use this to show the name of this editor before it's actually activated.
qqqq) Top
rrrr) TopLevelControl
ssss) Visible
tttt) VScroll
uuuu) Width
vvvv) WindowTarget
wwww) Activate [C#] public virtual void Activate( );

[C++] public: virtual void Activate( );

[VB] Overridable Public Sub Activate( )

[JScript] public function Activate( );

Description

Activates and displays the page.
xxxx) ApplyChanges

[C#] public virtual void ApplyChanges( );

[C++] public: virtual void ApplyChanges( );

[VB] Overridable Public Sub ApplyChanges( )

[JScript] public function ApplyChanges( );

Description

Applies changes to all the components being edited.
yyyy) Deactivate

[C+] public virtual void Deactivate( );

[C++] public: virtual void Deactivate( );

[VB] Overridable Public Sub Deactivate( )

[JScript] public function Deactivate( );

Description

Deactivates and hides the page.
zzzz) EnterLoadingMode

[C#] protected void EnterLoadingMode( );

[C++] protected: void EnterLoadingMode( );

[VB] Protected Sub EnterLoadingMode( )

[JScript] protected function EnterLoadingMode( );

Description

Increments the loading counter, which determines whether a page is in loading mode.
aaaaa) ExitLoadingMode

[C#] protected void ExitLoadingMode( );

[C++] protected: void ExitLoadingMode( );

[VB] Protected Sub ExitLoadingMode( )

[JScript] protected function ExitLoadingMode( );

Description

Decrements the loading counter, which determines whether a page is in loading mode.
bbbbb) GetControl

[C#] public virtual Control GetControl( );

[C++] public: virtual Control* GetControl( );

[VB] Overridable Public Function GetControl( ) As Control

[JScript] public function GetControl( ): Control;

Description

Gets the control that represents the window for this page.
ccccc) GetSelectedComponent

[C#] protected IComponent GetSelectedComponent( );

[C++] protected: IComponent* GetSelectedComponent( );

[VB] Protected Function GetSelectedComponent( ) As IComponent

[JScript] protected function GetSelectedComponent( ): IComponent;

Description

Gets the component that is to be edited.

Return Value: The component that is being edited.

ddddd) IsFirstActivate

[C#] protected bool IsFirstActivate( );

[C++] protected: bool IsFirstActivate( );

[VB] Protected Function IsFirstActivate( ) As Boolean

[JScript] protected function IsFirstActivate( ) Boolean;

Description

Gets a value indicating whether the page is being activated for the first time.

Return Value: true if this is the first time the page is being activated; otherwise, false .

eeeee) IsLoading

[C#] protected bool IsLoading( );

[C++] protected: bool IsLoading( );

[VB] Protected Function IsLoading( ) As Boolean

[JScript] protected function IsLoading( ): Boolean;

Description

Gets a value indicating whether the page is being loaded.

Return Value: true if this is the page is being loaded; otherwise, false fffff) IsPageMessage

[C#] public virtual bool IsPageMessage(ref Message msg);

[C++] public: virtual bool IsPageMessage(Message* msg);

[VB] Overridable Public Function IsPageMessage(ByRef msg As Message) As Boolean

[JScript] public function IsPageMessage(msg: Message): Boolean;

Description

Processes messages that could be handled by the page.

Return Value: true if the page processed the message; otherwise, false.

Gives the page a chance to process messages before the caller uses them. If this returns true, the message will be eaten. Otherwise, the caller will continue to process the message. Message to process.

ggggg) LoadComponent

[C#] protected abstract void LoadComponent( );

[C++] protected: virtual void LoadComponent( )=0;

[VB] MustOverride Protected Sub LoadComponent( )

[JScript] protected abstract function LoadComponent( );

Description

Loads the component into the page UI.

Each page must override this and implement its own custom behavior.

hhhhh) OnApplyComplete

[C#] public virtual void OnApplyComplete( );

[C++] public: virtual void OnApplyComplete( );

[VB] Overridable Public Sub OnApplyComplete( )

[JScript] public function OnApplyComplete( );

Description

Called when the page along with its sibling pages have applied their changes.

System.Windows.Forms.Design.ComponentEditorPage gives a chance for the page to reload itself especially when they are interdependent, and need to reflect changes made in another page.

iiiii) ReloadComponent

[C#] protected virtual void ReloadComponent( );

[C++] protected: virtual void ReloadComponent( );

[VB] Overridable Protected Sub ReloadComponent( )

[JScript] protected function ReloadComponent( );

Description

Called when the current component may have changed elsewhere and needs to be reloded into the UI.

jjjjj) SaveComponent

[C#] protected abstract void SaveComponent( );

[C++] protected: virtual void SaveComponent( )=0;

[VB] MustOverride Protected Sub SaveComponent( )

[JScript] protected abstract function SaveComponent( );

Description

Saves the component from the page UI.

Each page must override this and implement its own custom behavior.

kkkkk) SetComponent

[C#] public virtual void SetComponent(IComponent component);

[C++] public: virtual void SetComponent(IComponent* component);

[VB] Overridable Public Sub SetComponent(ByVal component As IComponent)

[JScript] public function SetComponent(component: IComponent);

Description

Sets the component to be edited. The component to be edited.

lllll) SetDirty

[C#] protected virtual void SetDirty( );

[C++] protected: virtual void SetDirty( );

[VB] Overridable Protected Sub SetDirty( )

[JScript] protected function SetDirty( );

Description

Sets the page to be in dirty state.

mmmmm) SetSite

[C#] public virtual void SetSite(IComponentEditorPageSite site);

[C++] public: virtual void SetSite(IComponentEditorPage Site* site);

[VB] Overridable Public Sub SetSite(ByVal site As IComponentEditorPageSite)

[JScript] public function SetSite(site: IComponentEditorPageSite);

Description

Sets the site for this page. Site for this page.

nnnnn) ShowHelp

[C#] public virtual void ShowHelp( );

[C++] public: virtual void ShowHelp( );

[VB] Overridable Public Sub ShowHelp( )

[JScript] public function ShowHelp( );

Description

Provides help information to the help system.

This is only called if System.Windows.Forms.Design.ComponentEditorPage.SupportsHelp returns true. The help system calls System.Windows.Forms.Design.ComponentEditorPage.ShowHelp to provide help for the page.

ooooo) SupportsHelp

[C#] public virtual bool SupportsHelp( );

[C++] public: virtual bool SupportsHelp( );

[VB] Overridable Public Function SupportsHelp( ) As Boolean

[JScript] public function SupportsHelp( ): Boolean;

Description

Gets a value indicating whether the editor supports Help.

Return Value: true if the editor supports help; otherwise, false. The default implementation returns false.

EventsTab class (System.Windows.Forms.Design)

a) WndProc

Description

Provides a System.Windows.Forms.Design.PropertyTab which can display events for selection and linking.

b) EventsTab

Example Syntax:

c) WndProc

[C#] public EventsTab(IServiceProvider sp);

[C++] public: EventsTab(IServiceProvider* sp);

[VB] Public Sub New(ByVal sp As IServiceProvider)

[JScript] public function EventsTab(sp: IServiceProvider);

Description

Initializes a new instance of the System.Windows.Forms.Design.EventsTab class. A service object provider to use.

d) Bitmap e) Components f) HelpKeyword g) WndProc

Description

Gets or sets the help keyword for the tab.

h) TabName i) WndProc

[C#] public override string TabName {get;}

[C++] public: _property virtual String* get_TabName( );

[VB] Overrides Public ReadOnly Property TabName As String

[JScript] public function get TabName( ): String;

Description

Gets or sets the name of the tab.

j) CanExtend

[C#] public override bool CanExtend(object extendee);

[C++] public: bool CanExtend(Object* extendee);

[VB] Overrides Public Function CanExtend(ByVal extendee As Object) As Boolean

[JScript] public override function CanExtend(extendee: Object): Boolean;

Description

Gets a value indicating whether the specified object can be extended.

Return Value: true if the specified object may be extended; otherwise, false. The object to determine whether can be extended.

k) GetDefaultProperty

[C#] public override PropertyDescriptor GetDefaultProperty (object obj);

[C++] public: PropertyDescriptor* GetDefaultProperty(Object* obj);

[VB] Overrides Public Function GetDefaultProperty(ByVal obj As Object) As PropertyDescriptor

[JScript] public override function GetDefaultProperty(obj: Object): PropertyDescriptor;

Description

Gets the default property from the specified object.

Return Value: A System.ComponentModel.PropertyDescriptor indicating the default property. The object to retrieve the default property of.

l) GetProperties

[C#] public override PropertyDescriptorCollection GetProperties(object component, Attribute[ ] attributes);

[C++] public: PropertyDescriptorCollection* GetProperties (Object* component, Attribute* attributes[ ]);

[VB] Overrides Public Function GetProperties(ByVal component As Object, ByVal attributes( ) As Attribute) As PropertyDescriptorCollection

[JScript] public override function GetProperties(component: Object, attributes: Attribute[ ]) PropertyDescriptorCollection;

Description

Gets all the properties of the event tab that match the specified attributes. The event tab properties are determined from the event properties returned from a component's event service.

Return Value: A System.ComponentModel.PropertyDescriptorCollection that indicates the properties. This will be a default initialized System.ComponentModel.PropertyDescriptorCollection if the component does not implement an event service. The component to retrieve the properties of. An array of System.Attribute that indicates the attributes of the event properties to retrieve.

m) GetProperties

[C#] public override PropertyDescriptorCollection GetProperties(ITypeDescriptorContext context, object component, Attribute[ ] attributes);

[C++] public: PropertyDescriptorCollection* GetProperties (ITypeDescriptorContext* context, Object* component, Attribute* attributes[ ]);

[VB] Overrides Public Function GetProperties(ByVal context As ITypeDescriptorContext, ByVal component As Object, ByVal attributes( ) As Attribute) As PropertyDescriptorCollection

[JScript] public override function GetProperties(context: ITypeDescriptorContext, component: Object, attributes: Attribute[ ]): PropertyDescriptorCollection; Gets the properties of the specified component . . .

IUIService interface (System.Windows.Forms.Design)

a) ToString

Description

Provides support for interaction with the user interface of the development environment object that is hosting the designer.

System.Windows.Forms.Design.IUIService can display error messages, show dialog boxes, and get ambient properties of the host, such as the font for dialogs and color schemes, through the Styles dictionary property.

b) Styles c) ToString

[C#] IDictionary Styles {get;}

[C++] IDictionary* get_Styles( );

[VB] ReadOnly Property Styles As IDictionary

[JScript] abstract function get Styles( ): IDictionary;

Description

Gets or sets the collections of styles that are specific to the host's environment.

The dictionary can provide information from the host environment. At a minimum, this consists of the font that should be used for standard UI text, and the color to use for highlighting. These required styles are "DialogFont" and "HighlightColor".

d) CanShowComponentEditor

[C#] bool CanShowComponentEditor(object component);

[C++] bool CanShowComponentEditor(Object* component);

[VB] Function CanShowComponentEditor(ByVal component As Object) As Boolean

[JScript] function CanShowComponentEditor(component: Object): Boolean;

Description

Indicates whether the component can display a System.ComponentModel.Design.ComponentDesigner.

Component editors are similar to property pages from COM. The component to check for support for displaying a System.ComponentModel.Design.ComponentDesigner.

e) GetDialogOwnerWindow

[C#] IWin32Window GetDialogOwnerWindow( );

[C++] IWin32Window* GetDialogOwnerWindow( );

[VB] Function GetDialogOwnerWindow( ) As IWin32Window

[JScript] function GetDialogOwnerWindow( ): IWin32Window;

Description

Gets the window that should be used for dialog parenting.

f) SetUIDirty

[C#] void SetUIDirty( );

[C++] void SetUIDirty( );

[VB] Sub SetUIDirty( )

[JScript] function SetUIDirty( );

Description

Sets a flag indicating the UI is dirty.

The UI becomes dirty whenever a toolbar or menu item's status changes. Most development environments cache the status of these elements for speed, and need to know when they need to be updated. This method would be called, for example, after a set of objects have been selected within the designer to enable the cut and copy menu items, for example.

g) ShowComponentEditor

[C#] bool ShowComponentEditor(object component, IWin32Window parent);

[C++] bool ShowComponentEditor(Object* component, IWin32Window* parent);

[VB] Function ShowComponentEditor(ByVal component As Object, ByVal parent As IWin32Window) As Boolean

[JScript] function ShowComponentEditor(component: Object, parent: IWin32Window): Boolean;

Description

Attempts to display a System.ComponentModel.Design.ComponentDesigner for a component.

Return Value: true if the attempt was successful; otherwise, false.

A System.ComponentModel.Design.ComponentDesigner is similar to a property page from COM. The component for which to display a System.ComponentModel.Design. ComponentDesigner. The object to parent any dialogs to.

h) ShowDialog

[C#] DialogResult ShowDialog(Form form);

[C++] DialogResult ShowDialog(Form* form);

[VB] Function ShowDialog(ByVal form As Form) As DialogResult

[JScript] function ShowDialog(form: Form): DialogResult;

Description

Attempts to display the specified form in a dialog box.

Return Value: A System.Windows.Forms.DialogResult indicating the results of the dialog box.

i) ShowError

[C#] void ShowError(Exception ex);

[C++] void ShowError(Exception* ex);

[VB] Sub ShowError(ByVal ex As Exception)

[JScript] function ShowError(ex: Exception);

Description

Displays the specified exception and its information in a message box.

Using this method allows the message box display to be properly integrated with the development environment. The exception to display.

j) ShowError

[C#] void ShowError(string message);

[C++] void ShowError(String* message);

[VB] Sub ShowError(ByVal message As String)

[JScript] function ShowError(message: String); Displays the specified error message in a message box.

Description

Displays the specified error message in a message box.

Using this method allows the message box display to be properly integrated with the development environment. The error message to display.

k) ShowError

[C#] void ShowError(Exception ex, string message);

[C++] void ShowError(Exception* ex, String* message);

[VB] Sub ShowError(ByVal ex As Exception, ByVal message As String)

[JScript] function ShowError(ex: Exception, message String);

Description

Displays the specified exception and its information in a message box.

Using this method allows the message box display to be properly integrated with the development environment. The exception to display. A message to display that provides information about the exception.

l) ShowMessage

[C#] void ShowMessage(string message);

[C++] void ShowMessage(String* message);

[VB] Sub ShowMessage(ByVal message As String)

[JScript] function ShowMessage(message: String); Displays the specified message in a message box.

Description

Displays the specified message in a message box.

Using this method allows the message box display to be properly integrated with the development environment. The message to display m) ShowMessage

[C#] void ShowMessage(string message, string caption);

[C++] void ShowMessage(String* message, String* caption);

[VB] Sub ShowMessage(ByVal message As String, ByVal caption As String)

[JScript] function ShowMessage(message: String, caption: String);

Description

Displays the specified message in a message box with the specified caption.

Using this method allows the message box display to be properly integrated with the development environment. The message to display. The caption for the message box.

n) ShowMessage

[C#] DialogResult ShowMessage(string message, string caption, MessageBoxButtons buttons);

[C++] DialogResult ShowMessage(String* message, String* caption, MessageBoxButtons buttons);

[VB] Function ShowMessage(ByVal message As String, ByVal caption As String, ByVal buttons As MessageBoxButtons) As DialogResult

[JScript] function ShowMessage(message String, caption: String, buttons: MessageBoxButtons): DialogResult;

Description

Displays the specified message in a message box with the specified caption and buttons to place on the dialog box.

Return Value: A System.Windows.Forms.DialogResult indicating the results of the dialog box.

Using this method allows the message box display to be properly integrated with the development environment. The message to display. The caption for the dialog box. The buttons to place on the dialog box. Must be one of the following values defined in System.Windows.Forms.MessageBoxButtons: System.Windows.Forms.MessageBoxButtons.OK, System.Windows.Forms.MessageBoxButtons.OKCancel, System.Windows.Forms.MessageBoxButtons.YesNo, System.Windows.Forms.MessageBoxButtons.YesNoCancel.

o) ShowToolWindow

[C#] bool ShowToolWindow(Guid toolWindow);

[C++] bool ShowToolWindow(Guid toolwindow);

[VB] Function ShowToolWindow(ByVal toolWindow As Guid) As Boolean

[JScript] function ShowToolWindow(toolWindow: Guid): Boolean;

Description

Displays the specified tool window.

Return Value: true if the tool window was successfully shown; false if it couldn't be shown or found. An identifier for the tool window. This can be a custom Guid or one of the predefined values from System.ComponentModel.Design.StandardToolWindows.

IWindowsFommsEditorService interface (System.Windows.Forms.Design)

a) ShowToolWindow b) CloseDropDown

[C#] void CloseDropDown( );

[C++] void CloseDropDown( );

[VB] Sub CloseDropDown( )

[JScript] function CloseDropDown( ); Closes a previously opened drop down list.

c) DropDownControl

[C#] void DropDownControl(Control control);

[C++] void DropDownControl(Control* control);

[VB] Sub DropDownControl(ByVal control As Control)

[JScript] function DropDownControl(control: Control); Displays the specified control in a drop down list.

d) ShowDialog

[C#] DialogResult ShowDialog(Form* dialog);

[C++] DialogResult ShowDialog(Form* dialog);

[VB] Function ShowDialog(ByVal dialog As Form) As DialogResult

[JScript] function ShowDialog(dialog: Form): DialogResult; Shows the specified dialog box.

PropertyTab class (System.Windows.Forms.Design)

a) ShowDialog

Description

Provides a base class for property tabs.

System.Windows.Forms.Design.PropertyTab provides the basic functionality for a property tab which can provide an interface to properties which it creates extender providers for.

b) PropertyTab

Example Syntax:

c) ShowDialog

[C#] protected PropertyTab( );

[C++] protected: PropertyTab( );

[VB] Protected Sub New( )

[JScript] protected function PropertyTab( );

d) Bitmap e) ShowDialog

[C#] public virtual Bitmap Bitmap {get;}

[C++] public: _property virtual Bitmap* get_Bitmap( );

[VB] Overridable Public ReadOnly Property Bitmap As Bitmap

[JScript] public function get Bitmapo: Bitmap;

Description

Gets or sets a bitmap to display in the property tab.

f) Components g) ShowDialog

[C#] public virtual object[ ] Components {get; set;}

[C++] public: _property virtual Object* get_Components( ); public: _property virtual void set_Components(Object* _gc[ ]);

[VB] Overridable Public Property Components As Object ( )

[JScript] public function get Components( ): Object[ ]; public function set Components(Object[ ]);

Description

Gets or sets the array of components the property tab is associated with.

h) HelpKeyword i) ShowDialog

[C#] public virtual string HelpKeyword {get;}

[C++] public: _property virtual String* get_HelpKeyword( );

[VB] Overridable Public ReadOnly Property HelpKeyword As String

[JScript] public function get HelpKeyword( ): String;

Description

Gets or sets the help keyword that is to be associated with this tab.

By default, this is set to the tab name.

j) TabName k) ShowDialog

[C#] public abstract string TabName {get;}

[C++] public: _property virtual String* get_TabName( )=0;

[VB] MustOverride Public ReadOnly Property TabName As String

[JScript] public abstract function get TabName( ): String;

Description

Gets or sets the name for the property tab.

l) CanExtend

[C#] public virtual bool Canxtend(object extendee);

[C++] public: virtual bool CanExtend(Object* extendee);

[VB] Overridable Public Function CanExtend(ByVal extendee As Object) As Boolean

[JScript] public function CanExtend(extendee: Object): Boolean;

Description

Gets a value indicating whether the specified object be can extended.

Return Value: true if the object can be extended; otherwise, false. The object to determine whether can be extended.

m) Dispose

[C#] public virtual void Dispose( );

[C++] public: virtual void Dispose( );

[VB] Overridable Public Sub Dispose( )

[JScript] public function Dispose( );

Description n) Dispose

[C#] protected virtual void Dispose(bool disposing);

[C++] protected: virtual void Dispose(bool disposing);

[VB] Overridable Protected Sub Dispose(ByVal disposing As Boolean)

[JScript] protected function Dispose(disposing: Boolean);

o) Finalize

[C#] ~PropertyTab( );

[C++] ~PropertyTab( );

[VB] Overrides Protected Sub Finalize( )

[JScript] protected override function Finalize( );

p) GetDefaultProperty

[C#] public virtual PropertyDescriptor GetDefaultProperty (object component);

[C++] public: virtual PropertyDescriptor* GetDefaultProperty(Object* component);

[VB] Overridable Public Function GetDefaultProperty(ByVal component As Object) As PropertyDescriptor

[JScript] public function GetDefaultProperty(component: Object): PropertyDescriptor;

Description

Gets the default property of the specified component.

Return Value: A System.ComponentModel.PropertyDescriptor that represents the default property. The component to retrieve the default property of.

q) GetProperties

[C#] public virtual PropertyDescriptorCollection GetProperties(object component);

[C++] public: virtual PropertyDescriptorCollection* GetProperties(Object* component);

[VB] Overridable Public Function GetProperties(ByVal component As Object) As PropertyDescriptorCollection

[JScript] public function GetProperties(component: Object): PropertyDescriptorCollection; Gets the properties of the specified component.

Description

Gets the properties of the specified component.

Return Value: A System.ComponentModel.PropertyDescriptorCollection containing the properties of the specified component. The component to retrieve the properties of.

r) GetProperties

[C#] public abstract PropertyDescriptorCollection GetProperties(object component, Attribute[ ] attributes);

[C++] public: virtual PropertyDescriptorCollection* GetProperties(Object* component, Attribute* attributes[ ])=0;

[VB] MustOverride Public Function GetProperties(ByVal component As Object, ByVal attributes( ) As Attribute) As PropertyDescriptorCollection

[JScript] public abstract function GetProperties(component: Object, attributes: Attribute[ ]): PropertyDescriptorCollection;

Description

Gets the properties of the specified component which match the specified attributes.

Return Value: A System.ComponentModel.PropertyDescriptorCollection that indicates the properties. The component to retrieve properties from. An array of System.Attribute that indicates the attributes of the properties to retrieve.

s) GetProperties

[C#] public virtual PropertyDescriptorCollection GetProperties(ITypeDescriptorContext context, object component, Attribute[ ] attributes);

[C++] public: virtual PropertyDescriptorCollection* GetProperties(ITypeDescriptorContext* context, Object* component, Attribute* attributes[ ]);

[VB] Overridable Public Function GetProperties(ByVal context As ITypeDescriptorContext, ByVal component As Object, ByVal attributes( ) As Attribute) As PropertyDescriptorCollection

[JScript] public function GetProperties(context: ITypeDescriptorContext, component: Object, attributes: Attribute[ ]): PropertyDescriptorCollection;

Description

Gets the properties of the specified context which match the specified attributes.

Return Value: A System.ComponentModel.PropertyDescriptorCollection that indicates the properties matching the specified context and attributes. An ITypeDescriptorContext that indicates the context to retrieve properties from. The component to retrieve properties from. An array of System.Attribute that indicates the attributes of the properties to retrieve.

WindowsFormsComponentEditor class (System.Windows.Forms.Design)

a) ToString

Description

Provides a base class for editors that use a modal dialog to display a properties page similar to an ActiveX control's property page.

b) WindowsFormsComponentEditor

Example Syntax:

c) ToString

[C#] protected WindowsFormsComponentEditor( );

[C++] protected: WindowsFormsComponentEditor( );

[VB] Protected Sub New( )

[JScript] protected function WindowsFormsComponentEditor( );

d) EditComponent

[C#] public override bool EditComponent(ITypeDescriptorContext context, object component);

[C++] public: bool EditComponent(ITypeDescriptorContext* context, Object* component);

[VB] Overrides Public Function EditComponent(ByVal context As ITypeDescriptorContext, ByVal component As Object) As Boolean

[JScript] public override function EditComponent(context: ITypeDescriptorContext, component: Object): Boolean;

Description

Activates a UI used to edit the component.

e) EditComponent

[C#] public bool EditComponent(object component, IWin32Window owner);

[C++] public: bool EditComponent(Object* component, IWin32Window* owner);

[VB] Public Function EditComponent(ByVal component As Object, ByVal owner As IWin32Window) As Boolean

[JScript] public function EditComponent(component: Object, owner: IWin32Window) Boolean;

Description

Activates the advanced UI used to edit the component.

f) EditComponent

[C#] public virtual bool EditComponent(ITypeDescriptorContext context, object component, IWin32Window owner);

[C++] public: virtual bool EditComponent(ITypeDescriptorContext* context, Object* component, IWin32Window* owner);

[VB] Overridable Public Function EditComponent(ByVal context As ITypeDescriptorContext, ByVal component As Object, ByVal owner As IWin32Window) As Boolean

[JScript] public function EditComponent(context: ITypeDescriptorContext, component: Object, owner: IWin32Window): Boolean;

Description

Activates the advanced UI used to edit the component.

g) GetComponentEditorPages

[C#] protected virtual Type [ ] GetComponentEditorPages( );

[C++] protected: virtual Type* GetComponentEditor Pages( ) [ ]

[VB] Overridable Protected Function GetComponentEditorPages( ) As Type( )

[JScript] protected function GetComponentEditorPages( ) Type[ ];

Description

Gets the set of System.Windows.Forms.Design.ComponentEditorPage pages to be used.

h) GetInitialComponentEditorPageIndex

[C#] protected virtua

2. System.Windows.Forms

The namespace contains classes for creating Windows-based applications that take full advantage of the rich user interface features available in the Microsoft Windows operating system. In this namespace you will find the class and many other controls that can be added to forms to create user interfaces.

Description

The System.Windows.Forms namespace contains classes for creating Windows-based applications that take full advantage of the rich user interface features available in the Microsoft Windows operating system. In this namespace you will find the System.Windows.Forms.Form class and many other controls that can be added to forms to create user interfaces.

AxHost.AboutBoxDelegate delegate (System.Windows.Forms)

Description

Represents the method that will display an ActiveX control's about dialog box.

When you create an System.Windows.Forms.AxHost.AboutBoxDelegate delegate, you identify the method that will handle display an ActiveX control's about dialog box if it has one. To associate the method with your handler, add an instance of the delegate to the method. The handler is called whenever the method is called, unless you remove the delegate. For more information about delegates, see AccessibleEvents enumeration (System.Windows.Forms)

Description

Specifies events that are reported by accessible applications.

Accessibility events are generated by the operating system in response to changes in the user interface.

[C#] public const AccessibleEvents AcceleratorChange;

[C++] public: const AccessibleEvents AcceleratorChange;

[VB] Public Const AcceleratorChange As AccessibleEvents

[JScript] public var AcceleratorChange: AccessibleEvents;

Description

An object's System.Windows.Forms.AccessibleObject.KeyboardShortcut property changed. Server applications send this event for their accessible objects.

[C#] public const AccessibleEvents Create;

[C++] public: const AccessibleEvents Create;

[VB] Public Const Create As AccessibleEvents

[JScript] public var Create: AccessibleEvents;

Description

An object was created. The system sends this event for the following user interface elements: caret, header control, list view control, tab control, toolbar control, tree view control, and window object. Server applications send this event for their accessible objects. Servers must send this event for all of an object's child objects before sending the event for the parent object. Servers must ensure that all child objects are fully created and ready to accept calls from clients when the parent object sends this event.

[C#] public const AccessibleEvents DefaultActionChange;

[C++] public: const AccessibleEvents DefaultActionChange;

[VB] Public Const DefaultActionChange As AccessibleEvents

[JScript] public var DefaultActionChange: AccessibleEvents;

Description

An object's System.Windows.Forms.AccessibleObject.DefaultAction property changed. The system sends this event for dialog boxes. Server applications send this event for their accessible objects. Therefore, server applications do not need to send this event for the child objects. Hidden objects have a state of System.Windows.Forms.AccessibleStates.Invisible and shown objects do not. Events of type AccessibleEvents.Hide indicate that a state of System.Windows.Forms.AccessibleStates.Invisible has been set. Therefore, servers do not need to send the AccessibleEvents.State Change event in this case.

[C#] public const AccessibleEvents DescriptionChange;

[C++] public: const AccessibleEvents DescriptionChange;

[VB] Public Const DescriptionChange As AccessibleEvents

[JScript] public var DescriptionChange: AccessibleEvents;

Description

An object's System.Windows. Forms.AccessibleObject.Description property changed. Server applications send this event for their accessible objects.

[C#] public const AccessibleEvents Destroy;

[C++] public: const AccessibleEvents Destroy;

[VB] Public Const Destroy As AccessibleEvents

[JScript] public var Destroy: AccessibleEvents;

Description

An object was destroyed. The system sends this event for the following user interface elements: caret, header control, list view control, tab control, toolbar control, tree view control, and window object. Server applications send this event for their accessible objects. This event may or may not be sent for child objects. However, clients can assume that all the children of an object have been destroyed when the parent object sends this event.

[C#] public const AccessibleEvents Focus;

[C++] public: const AccessibleEvents Focus;

[VB] Public Const Focus As AccessibleEvents

[JScript] public var Focus: AccessibleEvents;

Description

An object has received the keyboard focus. The system sends this event for the following user interface elements: list view control, menu bar, pop-up menu, switch window, tab control, tree view control, and window object. Server applications send this event for their accessible objects.

[C#] public const AccessibleEvents HelpChange;

[C++] public: const AccessibleEvents HelpChange;

[VB] Public Const HelpChange As AccessibleEvents

[JScript] public var HelpChange: AccessibleEvents;

Description

An object's Help property changed. Server applications send this event for their accessible objects.

[C#] public const AccessibleEvents Hide;

[C++] public: const AccessibleEvents Hide;

[VB] Public Const Hide As AccessibleEvents

[JScript] public var Hide: AccessibleEvents;

Description

An object is being hidden. The system sends this event for the following user interface elements: caret and cursor. Server applications send this event for their accessible objects. When this event is generated for a parent object, all child objects have already been hidden. Therefore, server applications do not need to send this event for the child objects. This event is not sent consistently by the system. This is a known problem and is being addressed by the accessibilty team.

[C#] public const AccessibleEvents LocationChange;

[C++] public: const AccessibleEvents LocationChange;

[VB] Public Const LocationChange As AccessibleEvents

[JScript] public var LocationChange: AccessibleEvents;

Description

An object has changed location, shape, or size. The system sends this event for the following user interface elements: caret and window object. Server applications send this event for their accessible objects. This event is generated in response to the top-level object within the object hierarchy that has changed, not for any children it might contain. For example, if the user resizes a window, the system sends this notification for the window, but not for the menu bar, title bar, scroll bars, or other objects that have also changed. The system does not send this event for every non-floating child window when the parent moves. However, if an application explicitly resizes child windows as a result of being resized itself, the system will send multiple events for the resized children. If an object's System.Windows.Forms.AccessibleObject.State property is set to System.Windows.Forms.AccessibleStates.Floating, servers should send a location change event whenever the object changes location. If an object does not have this state, servers should raise this event when the object moves relative to its parent.

[C#] public const AccessibleEvents NameChange;

[C++] public: const AccessibleEvents NameChange;

[VB] Public Const NameChange As AccessibleEvents

[JScript] public var NameChange: AccessibleEvents;

Description

An object's System.Windows.Forms.AccessibleObject.Name property changed. The system sends this event for the following user interface elements: check box, cursor, list view control, push button, radio button, status bar control, tree view control, and window object. Server applications send this event for their accessible objects.

[C#] public const AccessibleEvents ParentChange;

[C++] public: const AccessibleEvents ParentChange;

[VB] Public Const ParentChange As AccessibleEvents

[JScript] public var ParentChange: AccessibleEvents;

Description

An object has a new parent object. Server applications send this event for their accessible objects.

[C#] public const AccessibleEvents Reorder;

[C++] public: const AccessibleEvents Reorder;

[VB] Public Const Reorder As AccessibleEvents

[JScript] public var Reorder: AccessibleEvents;

Description

A container object has added, removed, or reordered its children. The system sends this event for the following user interface elements: header control, list view control, toolbar control, and window object. Server applications send this event as appropriate for their accessible objects. This event is also sent by a parent window when the z order for the child windows has changed.

[C#] public const AccessibleEvents Selection;

[C++] public: const AccessibleEvents Selection;

[VB] Public Const Selection As AccessibleEvents

[JScript] public var Selection: AccessibleEvents;

Description

An accessible object within a container object has been selected. This event signals a single selection—either a child has been selected in a container that previously did not contain any selected children or the selection has changed from one child to another.

[C#] public const AccessibleEvents SelectionAdd;

[C++] public: const AccessibleEvents SelectionAdd;

[VB] Public Const SelectionAdd As AccessibleEvents

[JScript] public var SelectionAdd: AccessibleEvents;

Description

An item within a container object was added to the selection. The system sends this event for the following user interface elements: list box, list view control, and tree view control. Server applications send this event for their accessible objects. This event signals that a child has been added to an existing selection.

[C#] public const AccessibleEvents SelectionRemove;

[C++] public: const AccessibleEvents SelectionRemove;

[VB] Public Const SelectionRemove As AccessibleEvents

[JScript] public var SelectionRemove: AccessibleEvents;

Description

An item within a container object was removed from the selection. The system sends this event for the following user interface elements: list box, list view control, and tree view control. Server applications send this event for their accessible objects. This event signals that a child has been removed from an existing selection.

[C#] public const AccessibleEvents SelectionWithin;

[C++] public: const AccessibleEvents SelectionWithin;

[VB] Public Const SelectionWithin As AccessibleEvents

[JScript] public var SelectionWithin: AccessibleEvents;

Description

Numerous selection changes occurred within a container object. The system sends this event for list boxes. Server applications send this event for their accessible objects. This event can be sent when the selected items within a control have changed substantially. This event informs the client that many selection changes have occurred. This preferable to sending several SelectionAdd or SelectionRemove events.

[C#] public const AccessibleEvents Show;

[C++] public: const AccessibleEvents Show;

[VB] Public Const Show As AccessibleEvents

[JScript] public var Show: AccessibleEvents;

Description

A hidden object is being shown. The system sends this event for the following user interface elements: caret, cursor, and window object. Server applications send this event for their accessible objects. Clients can assume that when this event is sent by a parent object, all child objects have already been displayed. Therefore, server applications do not need to send this event for the child objects.

[C#] public const AccessibleEvents StateChange;

[C++] public: const AccessibleEvents StateChange;

[VB] Public Const StateChange As AccessibleEvents

[JScript] public var StateChange: AccessibleEvents;

Description

An object's state has changed. The system sends this event for the following user interface elements: check box, combo box, header control, push button, radio button, scroll bar, toolbar control, tree view control, up-down control, and window object. Server applications send this event for their accessible objects. For example, a state change can occur when a button object has been pressed or released, or when an object is being enabled or disabled. This event is not sent consistently by the system. This is a known problem and is being addressed by the accessibility team.

[C#] public const AccessibleEvents SystemAlert;

[C++] public: const AccessibleEvents SystemAlert;

[VB] Public Const SystemAlert As AccessibleEvents

[JScript] public var SystemAlert: AccessibleEvents;

Description

An alert was generated. Server applications send this event whenever an important user interface change has occurred that a user might need to know about. This event is not sent consistently by the system for dialog box objects. This is a known problem and is being addressed by the accessibilty team.

[C#] public const AccessibleEvents SystemCaptureEnd;

[C++] public: const AccessibleEvents SystemCaptureEnd;

[VB] Public Const SystemCaptureEnd As AccessibleEvents

[JScript] public var SystemCaptureEnd: AccessibleEvents;

Description

A window has lost mouse capture. This event is sent by the system; servers never send this event.

[C#] public const AccessibleEvents SystemCaptureStart;

[C++] public: const AccessibleEvents SystemCaptureStart;

[VB] Public Const SystemCaptureStart As AccessibleEvents

[JScript] public var SystemCaptureStart: AccessibleEvents;

Description

A window is being moved or resized. This event is sent by the system; servers never send this event.

[C#] public const AccessibleEvents SystemContextHelpEnd;

[C++] public: const AccessibleEvents SystemContextHelp End;

[VB] Public Const SystemContextHelpEnd As AccessibleEvents

[JScript] public var SystemContextHelpEnd: AccessibleEvents;

Description

A window exited context-sensitive Help mode. This event is not sent consistently by the system. This is a known problem and is being addressed by the accessibility team.

[C#] public const AccessibleEvents SystemContextHelpStart;

[C++] public: const AccessibleEvents SystemContextHelpStart;

[VB] Public Const SystemContextHelpStart As AccessibleEvents

[JScript] public var SystemContextHelpStart: AccessibleEvents;

Description

A window entered context-sensitive Help mode. This event is not sent consistently by the system. This is a known problem and is being addressed by the accessibility team.

[C#] public const AccessibleEvents SystemDialogEnd;

[C++] public: const AccessibleEvents SystemDlalogEnd;

[VB] Public Const SystemDialogEnd As AccessibleEvents

[JScript] public var SystemDialogEnd: AccessibleEvents;

Description

A dialog box was closed. This event is sent by the system for standard dialog boxes. Servers send this event for custom dialog boxes. This event is not sent consistently by the system. This is a known problem and is being addressed by the accessibility team.

[C#] public const AccessibleEvents SystemDialogStart;

[C++] public: const AccessibleEvents SystemDialogStart;

[VB] Public Const SystemDialogStart As AccessibleEvents

[JScript] public var SystemDialogStart: AccessibleEvents;

Description

A dialog box was displayed. This event is sent by the system for standard dialog boxes. Servers send this event for custom dialog boxes. This event is not sent consistently by the system. This is a known problem and is being addressed by the accessibility team.

[C#] public const AccessibleEvents SystemDragDropEnd;

[C++] public: const AccessibleEvents SystemDragDropEnd;

[VB] Public Const SystemDragDropEnd As AccessibleEvents

[JScript] public var SystemDragDropEnd: AccessibleEvents;

Description

An application is about to exit drag-and-drop mode. Applications that support drag-and-drop operations must send this event; the system does not.

[C#] public const AccessibleEvents SystemDragDropStart;

[C++] public: const AccessibleEvents SystemDragDropStart;

[VB] Public Const SystemDragDropStart As AccessibleEvents

[JScript] public var SystemDragDropStart: AccessibleEvents;

Description

An application is about to enter drag-and-drop mode. Applications that support drag-and-drop operations must send this event; the system does not.

[C#] public const AccessibleEvents SystemForeground;

[C++] public: const AccessibleEvents SystemForeground;

[VB] Public Const SystemForeground As AccessibleEvents

[JScript] public var SystemForeground: AccessibleEvents;

Description

The foreground window changed. The system sends this event even if the foreground window is changed to another window in the same thread. Server applications never send this event.

[C#] public const AccessibleEvents SystemMenuEnd;

[C++] public: const AccessibleEvents SystemMenuEnd;

[VB] Public Const SystemMenuEnd As AccessibleEvents

[JScript] public var SystemMenuEnd: AccessibleEvents;

Description

A menu from the menu bar was closed. The system sends this event for standard menus. Servers send this event for custom menus.

[C#] public const AccessibleEvents SystemMenuPopupEnd;

[C++] public: const AccessibleEvents SystemMenuPopupEnd;

[VB] Public Const SystemMenuPopupEnd As AccessibleEvents

[JScript] public var SystemMenuPopupEnd: AccessibleEvents;

Description

A pop-up menu was closed. The system sends this event for standard menus. Servers send this event for custom menus. When a pop-up menu is closed, the client receives this message followed almost immediately by the SystemMenuEnd event. This event is not sent consistently by the system. This is a known problem and is being addressed by the accessibility team.

[C#] public const AccessibleEvents SystemMenuPopupStart;

[C++] public: const AccessibleEvents SystemMenuPopupStart;

[VB] Public Const SystemMenuPopupStart As AccessibleEvents

[JScript] public var SystemMenuPopupStart: AccessibleEvents;

Description

A pop-up menu was displayed. The system sends this event for standard menus. Servers send this event for custom menus. This event is not sent consistently by the system. This is a known problem and is being addressed by the accessibility team.

[C#] public const AccessibleEvents SystemMenuStart;

[C++] public: const AccessibleEvents SystemMenuStart;

[VB] Public Const SystemMenuStart As AccessibleEvents

[JScript] public var SystemMenuStart: AccessibleEvents;

Description

A menu item on the menu bar was selected. The system sends this event for standard. Servers send this event for custom menus. The system may raise more than one MenuStart event that may or may not have a corresponding MenuEnd event.

[C#] public const AccessibleEvents SystemMinimizeEnd;

[C++] public: const AccessibleEvents SystemMinimizeEnd;

[VB] Public Const SystemMinimizeEnd As AccessibleEvents

[JScript] public var SystemMinimizeEnd: AccessibleEvents;

Description

A window object was minimized or maximized. This event is sent by the system; servers never send this event.

[C#] public const AccessibleEvents SystemMinimizeStart;

[C++] public: const AccessibleEvents SystemMinimizeStart;

[VB] Public Const SystemMinimizeStart As AccessibleEvents

[JScript] public var SystemMinimizeStart: AccessibleEvents;

Description

A window object is about to be minimized or maximized. This event is sent by the system; servers never send this event.

[C+] public const AccessibleEvents SystemMoveSizeEnd;

[C++] public: const AccessibleEvents SystemMoveSizeEnd;

[VB] Public Const SystemMoveSizeEnd As AccessibleEvents

[JScript] public var SystemMoveSizeEnd: AccessibleEvents;

Description

The movement or resizing of a window is finished. This event is sent by the system; servers never send this event.

[C#] public const AccessibleEvents SystemMoveSizeStart;

[C++] public: const AccessibleEvents SystemMoveSize Start;

[VB] Public Const SystemMoveSizeStart As AccessibleEvents

[JScript] public var SystemMoveSizeStart: AccessibleEvents;

Description

A window is being moved or resized. This event is sent by the system; servers never send this event.

[C#] public const AccessibleEvents SystemScrollingEnd;

[C++] public: const AccessibleEvents SystemScrollingEnd;

[VB] Public Const SystemScrollingEnd As AccessibleEvents

[JScript] public var SystemScrollingEnd: AccessibleEvents;

Description

Scrolling has ended on a scroll bar. This event is sent by the system for scroll bars attached to a window and for standard scroll bar controls. Servers send this event for custom scroll bars

[C#] public const AccessibleEvents SystemScrollingStart;

[C++] public: const AccessibleEvents SystemScrollingStart;

[VB] Public Const SystemScrollingStart As AccessibleEvents

[JScript] public var SystemScrollingStart: AccessibleEvents;

Description

Scrolling has started on a scroll bar. This event is sent by the system for scroll bars attached to a window and for standard scroll bar controls. Servers send this event for custom scroll bars.

[C#] public const AccessibleEvents SystemSound;

[C++] public: const AccessibleEvents SystemSound;

[VB] Public Const SystemSound As AccessibleEvents

[JScript] public var SystemSound: AccessibleEvents;

Description

A sound was played. The system sends this event when a system sound, such as for menus, is played even if no sound is audible. This might be caused by lack of a sound file or sound card. Servers send this event if a custom user interface element generates a sound.

[C#] public const AccessibleEvents SystemSwitchEnd;

[C++] public: const AccessibleEvents SystemSwitchEnd;

[VB] Public Const SystemSwitchEnd As AccessibleEvents

[JScript] public var SystemSwitchEnd: AccessibleEvents;

Description

The user released ALT+TAB. The SwitchEnd event is sent by the system; servers never send this event. If only one application is running when the user presses ALT+TAB, the system sends the SwitchEnd event without a corresponding SwitchStart event.

[C#] public const AccessibleEvents SystemSwitchStart;

[C++] public: const AccessibleEvents SystemSwitchStart;

[VB] Public Const SystemSwitchStart As AccessibleEvents

[JScript] public var SystemSwitchStart: AccessibleEvents;

Description

The user pressed ALT+TAB, which activates the switch window. If only one application is running when the user presses ALT+TAB, the system raises the SwitchEnd event without a corresponding SwitchStart event.

[C#] public const AccessibleEvents ValueChange;

[C++] public: const AccessibleEvents ValueChange;

[VB] Public Const ValueChange As AccessibleEvents

[JScript] public var ValueChange: AccessibleEvents;

Description

An object's System.Windows.Forms.AccessibleObject.Value property changed. The system raises the ValueChange event for the following user interface elements: edit control, header control, hot key control, progress bar control, scroll bar, slider control, and up-down control. Server applications send this event for their accessible objects.

1. Methods:

AccessibleNavigation Enumeration (System.Windows.Forms)

a) ToString

Description

Specifies values for navigating between accessible objects.

Accessible navigation directions are either spatial (up, down, left, and right) or logical (first child, last child, next, and previous). Logical directions are used when clients navigate from one user interface element to another within the same container.

b) ToString

[C#] public const AccessibleNavigation Down;

[C++] public: const AccessibleNavigation Down;

[VB] Public Const Down As AccessibleNavigation

[JScript] public var Down: AccessibleNavigation;

Description

Navigation to a sibling object located below the starting object.

c) ToString

[C#] public const AccessibleNavigation FirstChild;

[C++] public: const AccessibleNavigation FirstChild;

[VB] Public Const FirstChild As AccessibleNavigation

[JScript] public var FirstChild: AccessibleNavigation;

Description

Navigation to the first child of the object.

d) ToString

[C#] public const AccessibleNavigation LastChild;

[C++] public: const AccessibleNavigation LastChild;

[VB] Public Const LastChild As AccessibleNavigation

[JScript] public var LastChild: AccessibleNavigation;

Description

Navigation to the last child of the object.

e) ToString

[C#] public const AccessibleNavigation Left;

[C++] public: const AccessibleNavigation Left;

[VB] Public Const Left As AccessibleNavigation

[JScript] public var Left: AccessibleNavigation;

Description

Navigation to the sibling object located to the left of the starting object.

f) ToString

[C#] public const AccessibleNavigation Next;

[C++] public: const AccessibleNavigation Next;

[VB] Public Const Next As AccessibleNavigation

[JScript] public var Next: AccessibleNavigation;

Description

Navigation to the next logical object, typicaly from a sibling object to the starting object.

g) ToString

[C#] public const AccessibleNavigation Previous;

[C++] public: const AccessibleNavigation Previous;

[VB] Public Const Previous As AccessibleNavigation

[JScript] public var Previous: AccessibleNavigation;

Description

Navigation to the previous logical object, typicaly from a sibling object to the starting object.

h) ToString

[C#] public const AccessibleNavigation Right;

[C++] public: const AccessibleNavigation Right;

[VB] Public Const Right As AccessibleNavigation

[JScript] public var Right: AccessibleNavigation;

Description

Navigation to the sibling object located to the right of the starting object.

i) ToString

[C#] public const AccessibleNavigation Up;

[C++] public: const AccessibleNavigation Up;

[VB] Public Const Up As AccessibleNavigation

[JScript] public var Up: AccessibleNavigation;

Description

Navigation to a sibling object located above the starting object.

AccessibleObject Class (System.Windows.Forms)

a) ToString

Description

Provides an implementation for an object that can be inspected by an accessibility application.

Accessibility applications can adjust features of the application to better serve users who have impairments.

2. Constructors:

a) AccessibleObject

Example Syntax:

b) ToString

[C#] public AccessibleObject( );

[C++] public: Accessibleobject( );

[VB] Public Sub New( )

[JScript] public function AccessibleObject( );

Description

Initializes a new instance of the System.Windows.Forms.AccessibleObject class.

3. Properties:

a) Bounds b) ToString

[C#] public virtual Rectangle Bounds {get;}

[C++] public: _property virtual Rectangle get_Bounds( );

[VB] Overridable Public ReadOnly Property Bounds As Rectangle

[JScript] public function get Bounds( ): Rectangle;

Description

Gets the location and size of the accessible object.

The Bounds property retrieves the object's bounding rectangle. If the object has a non-rectangular shape, then this method returns the smallest rectangle that completely encompasses the entire object region. Therefore, for non-rectangular objects such as list view items, the coordinates of the object's bounding rectangle can fail if tested System.Windows.Forms.AccessibleObject.HitTest(System.Int32, System. Int32) because System.Windows.Forms.AccessibleObject.HitTest(System.Int32, System.Int32) determines the object's boundaries on a pixel-by-pixel basis.

c) DefaultAction d) ToString

[C#] public virtual string DefaultAction {get;}

[C++] public: _property virtual String* get DefaultAction( );

[VB] Overridable Public ReadOnly Property DefaultAction As String

[JScript] public function get DefaultAction( ): String;

Description

Gets a string that describes the object's default action. Not all objects have a default action.

The string describes the action that is performed on an object, not what the object does as a result. That is, a toolbar button that prints a document has a default action of "Press" rather than "Prints the current document." Do not confuse an object's default action with its value.

e) Description f) ToString

[C#] public virtual string Description {get;}

[C++] public: _property virtual String* get_Description( );

[VB] Overridable Public ReadOnly Property Description As String

[JScript] public function get Description( ): String;

Description

Gets a string that describes the visual appearance of the specified object. Not all objects have a description.

This property describes the object's visual appearance to the user.

g) Help h) ToString

[C#] public virtual string Help {get;}

[C++] public: _property virtual String* get_Help( );

[VB] Overridable Public ReadOnly Property Help As String

[JScript] public function get Help( ): String;

Description

Gets a description of what the object does or how the object is used.

Not all objects need to support this property. Typically, this property contains balloon-style information (as is found in ToolTips) that is used either to describe what the object does or how to use it. For example, the Help property for a toolbar button that shows a printer might be, "Prints the current document." The text for the Help property does not have to be unique within the user interface. Servers do not need to support the Help property if other properties provide sufficient information about the object's purpose and what actions the object might perform. Accessible objects that expose system-provided controls do not support the Help property.

i) KeyboardShortcut j) ToString

[C#] public virtual string KeyboardShortcut {get;}

[C++] public: _property virtual String* get_KeyboardShortcut( );

[VB] Overridable Public ReadOnly Property KeyboardShortcut As String

[JScript] public function get KeyboardShortcut( ): String;

Description

Gets the shortcut key or access key for the accessible object.

An access key, also known as a mnemonic, is an underlined character in the text of a menu, menu item, or the label of a button, or some other control. For example, a user can display a menu by pressing the ALT key while also pressing the indicated underlined key, such as ALT+F to open the File menu. To use the access key of a menu item, the menu containing the item must be active.Controls such as toolbar buttons and menu items often have an associated shortcut key (also known as a keyboard accelerator). A menu item can have both an access key and a shortcut key associated with it. If this property returns a single character, you can assume it is an access key.

k) Name l) ToString

[C#] public virtual string Name {get; set;}

[C++] public: _property virtual String* get_Name( ); public: _property virtual void set_Name(String*);

[VB] Overridable Public Property Name As String

[JScript] public function get Name( ): String; public function set Name(String);

Description

Gets or sets the object name.

The System.Windows.Forms.AccessibleObject.Name property is a string used by clients to identify, find, or announce an object for the user. To acces the name of a child object, you must first call System.Windows.Forms.AccessibleObject.GetChild(System.Int32) with the index of the child whose name you are retrieving.

m) Parent n) ToString

[C#] public virtual AccessibleObject Parent {get;}

[C++] public: _property virtual AccessibleObject* get_Parent( );

[VB] Overridable Public ReadOnly Property Parent As AccessibleObject

[JScript] public function get Parent( ): AccessibleObject;

Description

Gets the parent of an accessible object.

All objects should support this property.

o) Role p) ToString

[C#] public virtual AccessibleRole Role {get;}

[C++] public: _property virtual AccessibleRole get_Role( );

[VB] Overridable Public ReadOnly Property Role As AccessibleRole

[JScript] public function get Role( ): AccessibleRole;

Description

Gets the role of this accessible object.

The role of the object helps decribe the function of the object.

q) State r) ToString

[C#] public virtual AccessibleStates State {get;}

[C++] public: _property virtual AccessibleStates get_State( );

[VB] Overridable Public ReadOnly Property State As AccessibleStates

[JScript] public function get State( ): AccessibleStates;

Description

Gets the state of this accessible object.

All objects should support this property.

s) Value t) ToString

[C#] public virtual string Value {get; set;}

[C++] public: _property virtual String* get_Value( ); public: Property virtual void set_Value(String*);

[VB] Overridable Public Property Value As String

[JScript] public function get Value( ): String; public function set Value(String);

Description

Gets or sets the value of an accessible object.

Typically, the System.Windows.Forms.AccessibleObject.Value property represents visual information contained by the object. Not all objects support the System.Windows.Forms.AccessibleObject.Value property.

u) IAccessible.accDoDefaultAction

[C#] void IAccessible.accDoDefaultAction(object childID);

[C++] void IAccessible: accDoDefaultAction(Object* child ID);

[VB] Sub accDoDefaultAction(ByVal childID As Object) Implements IAccessible.accDoDefaultAction

[JScript] function IAccessible.accDoDefaultAction(childID: Object);

v) IAccessible.accHitTest

[C#] object IAccessible.accHitTest(int xLeft, int yTop);

[C++] Object* IAccessible::accHitTest(int xLeft, int yTop);

[VB] Function accHitTest(ByVal xLeft As Integer, ByVal yTop As Integer) As Object Implements IAccessible.accHitTest

[JScript] function IAccessible.accHitTest(xLeft: int, yTop: int): Object;

w) IAccessible.accLocation

[C#] void IAccessible.accLocation(out int pxLeft, out int pyTop, out int pcxWidth, out int pcyHeight, object childID);

[C++] void IAccessible::accLocation(int* pxLeft, int* pyTop, int* pcxWidth, int* pcyHeight, Object* childID);

[VB] Sub accLocation(ByRef pxLeft As Integer, ByRef pyTop As Integer, ByRef pcxWidth As Integer, ByRef pcyHeight As Integer, ByVal childID As Object) Implements IAccessible.accLocation

[JScript] function IAccessible.accLocation(pxLeft: int, pyTop int, pcxWidth int, pcyHeight: int, childID: Object);

x) IAccessible.accNavigate

[C#] object IAccessible.accNavigate(int navDir, object childID);

[C++] Object* IAccessible::accNavigate(int navDir, Object* childID);

[VB] Function accNavigate(ByVal navDir As Integer, ByVal childID As Object) As Object Implements IAccessible.acc Navigate

[JScript] function IAccessible.accNavigate(navDir: int, childID: Object): Object;

y) IAccessible.accSelect

[C#] void IAccessible.accSelect(int flagsSelect, object childID);

[C++] void IAccessible::accSelect(int flagsSelect, Object* childID);

[VB] Sub accSelect(ByVal flagsSelect As Integer, ByVal childID As Object) Implements IAccessible.accSelect

[JScript] function IAccessible.accSelect(flagsSelect: int, childID Object);

z) IAccessible.get_accChild

[C#] object IAccessible.get_accChild(object childID);

[C++] Object* IAccessible::get_accChild(Object* childID);

[VB] Function get_accChild(ByVal childID As Object) As Object Implements IAccessible.get_accChild

[JScript] function IAccessible.get_accChild(childID: Object): Object;

aa) IAccessible.get_accDefaultAction

[C#] string IAccessible.get_accDefaultAction(object childID);

[C++] String* IAccessible::get_accDefaultAction(Object* childID);

[VB] Function get_accDefaultAction(ByVal childID As Object) As String Implements IAccessible.get_accDefaultAction

[JScript] function IAccessible.get_accDefaultAction (childID: Object): String;

bb) IAccessible.get_accDescription

[C#] string IAccessible.get_accDescription(object childID);

[C++] String* IAccessible::get_accDescription(Object* childID);

[VB] Function get_accDescription(ByVal childID As Object) As String Implements IAccessible.get_accDescription

[JScript] function IAccessible.get_accDescription(childID: Object): String;

cc) IAccessible.get_accHelp

[C#] string IAccessible.get_accHelp(object childID);

[C++] String* IAccessible::get_accHelp(Object* childID);

[VB] Function get_accHelp(ByVal childID As Object) As String Implements IAccessible.get_accHelp

[JScript] function IAccessible.get_accHelp(childID: Object): String;

dd) IAccessible.get_accHelpTopic

[C#] int IAccessible.get_accHelpTopic(out string pszHelpFile, object childID);

[C++] int IAccessible::get_accHelpTopic(String** pszHelpFile, Object* childID);

[VB] Function get_accHelpTopic(ByRef pszHelpFile As String, ByVal childID As Object) As Integer Implements IAccessible.get_accHelpTopic

[JScript] function IAccessible.get_accHelpTopic(pszHelpFile: String, childID: Object): int;

ee) IAccessible.get_accKeyboardShortcut

[C++] string IAccessible.get_accKeyboardShortcut(object childID);

[C++] String* Iaccessible::get_accKeyboardhortcut(Object* childID);

[VB] Function get_accKeyboardShortcut(ByVal childID As Object) As String Implements IAccessible.get_accKeyboardShortcut

[JScript] function IAccessible.get_accKeyboardShortcut (childID: Object): String;

ff) IAccessible.get_accName

[C#] string IAccessible.get_accName(object childID);

[C++] String* IAccessible::get_accName(Object* childID);

[VB] Function get_accName(ByVal childID As Object) As String Implements IAccessible.get_accName

[JScript] function IAccessible.get_accName(childID: Object): String;

gg) IAccessible.get_accRole

[C#] object IAccessible.get_accRole(object childID);

[C++] Object* IAccessible::get_accRole(Object* childID);

[VB] Function get_accRole(ByVal childID As Object) As Object Implements IAccessible.get_accRole

[JScript] function IAccessible.get_accRole(childID: Object): Object;

hh) IAccessible.get_accState

[C#] object IAccessible.get_accState(object childID);

[C++] Object* IAccessible::get_accState(Object* childID);

[VB] Function get_accState(ByVal childID As Object) As Object Implements IAccessible.get_accState

[JScript] function IAccessible.get_accState(childID: Object): Object;

ii) IAccessible.get_accValue

[C#] string IAccessible.get_accValue(object childID);

[C++] String* IAccessible::get_accValue(Object* childID);

[VB] Function get_accValue(ByVal childID As Object) As String Implements IAccessible.get_accValue

[JScript] function IAccessible.get_accValue(childID: Object): String;

jj) IAccessible.set_accName

[C#] void IAccessible.set_accName(object childID, string newName);

[C++] void IAccessible::set_accName(Object* childID, String* newName);

[VB] Sub set_accName(ByVal childID As Object, ByVal newName As String) Implements IAccessible.set_accName

[JScript] function IAccessible.set_accName(childID: Object, newName: String);

kk) IAccessible.set_accValue

[C#] void IAccessible.set_accValue(object childID, string newValue);

[C++] void IAccessible::set_accValue(Object* childID, String* newValue);

[VB] Sub set_accValue(ByVal childID As Object, ByVal newValue As String) Implements IAccessible.set_accValue

[JScript] function IAccessible.set_accValue(childID: Object, newValue: String);

ll) DoDefaultAction

[C#] public virtual void DoDefaultAction( );

[C++] public: virtual void DoDefaultAction( );

[VB] Overridable Public Sub DoDefaultAction( )

[JScript] public function DoDefaultAction( );

Description

Performs the default action associated with this accessible object.

Clients can retrieve the object's default action by inspecting an objects DeafaultAction property. A client could use Automation (if supported) instead of DoDefaultAction to perform an object's default action. However, DoDefaultAction provides an easy way to perform an object's most commonly used action.

mm) GetChild

[C#] public virtual AccessibleObject GetChild(int index);

[C++] public: virtual AccessibleObject* GetChild(int index);

[VB] Overridable Public Function GetChild(ByVal index As Integer) As AccessibleObject

[JScript] public function GetChild(index: int): AccessibleObject;

Description

Retrieves the accessible child corresponding to the specified index.

Return Value: An System.Windows.Forms.AccessibleObject that represents the accessible child corresponding to the specified index.

All accessible objects must support this property. If the method is not overriden, it returns null. Override this method when an accessible object wants to provide custom accessible children. If the index is invalid, then this method should return null. When you override this method, you must also override System.Windows.Forms.AccessibleObject.GetChildCount. The zero-based index of the accessible child.

nn) GetChildCount

[C#] public virtual int GetChildCount( );

[C++] public: virtual int GetChildCount( );

[VB] Overridable Public Function GetChildCount( ) As Integer

[JScript] public function GetChildCount( ): int;

Description

Retrieves the number of children belonging to an accessible object.

Return Value: The number of children belonging to an accessible object.

All objects must support this property. The default implementation returns −1. Override this method when an accessible object wants to provide custom accessible children. When you override this method, you must also override System.Windows.Forms.AccessibleObject.GetChild(System.Int32).

oo) GetFocused

[C#] public virtual AccessibleObject GetFocused( );

[C++] public: virtual AccessibleObject* GetFocused( );

[VB] Overridable Public Function GetFocused( ) As AccessibleObject

[JScript] public function GetFocused( ): AccessibleObject;

Description

Retrieve the object that has the keyboard focus.

Return Value: An System.Windows.Forms.AccessibleObject that specifies the currently focused child. This method returns the calling object if the object itself is focused. Returns null if no object has focus.

The concept of keyboard focus is related to that of an active window. An active window is the foreground window on which the user is working. The object with the keyboard focus is either the active window or a child object of the active window.

pp) GetHelpTopic

[C#] public virtual int GetHelpTopic(out string fileName);

[C++] public: virtual int GetHelpTopic(String** fileName);

[VB] Overridable Public Function GetHelpTopic(ByRef filename As String) As Integer

[JScript] public function GetHelpTopic(fileName: String): int;

Description

Gets an identifier for a Help topic and the path to the Help file associated with this accessible object.

Return Value: An identifier for a Help topic, or −1 if here is no Help topic. On return, the fileName parameter will contain the path to the Help file associated with this accessible object.

Pass the identifier to the WinHelp file specified by the fileName parameter to identify the desired Help topic. On return, this will contain the path to the Help file associated with this accessible object.

qq) GetSelected

[C#] public virtual AccessibleObject GetSelected( );

[C++] public: virtual AccessibleObject* GetSelected( );

[VB] Overridable Public Function GetSelected( ) As AccessibleObject

[JScript] public function GetSelected( ): AccessibleObject;

Description

Retrieves the currently selected child.

Return Value: An System.Windows.Forms.AccessibleObject that represents the currently selected child. This method returns the calling object if the object itself is selected. Returns null if there is no currently selected child and the object itself does not have focus.

All objects that can be selected should support this property.

rr) HitTest

[C#] public virtual AccessibleObject HitTest(int x, int y);

[C++] public: virtual AccessibleObject* HitTest(int x, int y);

[VB] Overridable Public Function HitTest(ByVal x As Integer, ByVal y As Integer) As AccessibleObject

[JScript] public function HitTest(x: int, y: int): AccessibleObject;

Description

Retrieves the child object at the specified screen coordinates.

Return Value: An System.Windows.Forms.AccessibleObject that represents the child object at the given screen coordinates. This method returns the calling object if the object itself is at the location specified. Returns null if there is no object is at the hit tested location.

For non-rectangular objects such as list view items, the coordinates of the object's bounding rectangle retrieved by System.Windows.Forms.AccessibleObject.Bounds can fail if tested with System.Windows. Forms.AccessibleObject. H itTest(System.Int32, System.Int32) because System.Windows.Forms.AccessibleObject.HitTest(System.Int32, System Int32) determines the object's boundaries on a pixel-by-pixel basis. The horizontal screen coordinate. The vertical screen coordinate.

ss) Navigate

[C#] public virtual AccessibleObject Navigate(AccessibleNavigation navdir);

[C++] public: virtual AccessibleObject* Navigate(AccessibleNavigation navdir);

[VB] Overridable Public Function Navigate(ByVal navdir As AccessibleNavigation) As AccessibleObject

[JScript] public function Navigate(navdir: AccessibleNavigation): IAccessibleObject;

Description

Navigates to another accessible object.

Return Value: An System.Windows.Forms.AccessibleObject that represents one of the System.Windows.Forms.AccessibleNavigation values.

Navigation (both spatial and logical) is always restricted to the user interface elements within a container. With spatial navigation, clients can navigate only to a sibling of the starting object. Depending on the navigational flag used with logical navigation, clients can navigate to either a child or to a sibling of the starting object. This method does not change the selection or focus. To change the focus or to select an object, use System.Windows.Forms.AccessibleObject.Select(System.Windows.Forms.AccessibleSelection). The System.Windows.Forms.AccessibleObject.Navigate(System.Windows.Forms.Accessible Navigation) method retrieves only user interface elements that have a defined screen location. One of the System.Windows.Forms.AccessibleNavigation values.

tt) Select

[C#] public virtual void Select(AccessibleSelection flags);

[C++] public: virtual void Select(AccessibleSelection flags);

[VB] Overridable Public Sub Select(ByVal flags As AccessibleSelection)

[JScript] public function Select(flags: AccessibleSelection);

Description

Modifies the selection or moves the keyboard focus of the accessible object.

Applications can use this method to perform complex selection operations. One of the System.Windows.Forms.AccessibleSelection values.

uu) IReflect.GetField

[C#] FieldInfo IReflect.GetField(string name, BindingFlags bindingAttr);

[C++] FieldInfo* IReflect::GetField(String* name, BindingFlags bindingAttr);

[VB] Function GetField(ByVal name As String, ByVal bindingAttr As BindingFlags) As FieldInfo Implements IReflect.GetField

[JScript] function IReflect.GetField(name: String, binding Attr: BindingFlags) FieldInfo;

vv) IReflect.GetFields

[C#] FieldInfo[ ] IReflect.GetFields(BindingFlags binding attr);

[C++] FieldInfo* IReflect::GetFields(BindingFlags binding Att) [ ];

[VB] Function GetFields(ByVal bindingAttr As BindingFlags) As FieldInfo( ) Implements IReflect.GetFields

[JScript] function IReflect.GetFields(bindingAttr: BindingFlags): FieldInfo[ ];

ww) IReflect.GetMember

[C#] MemberInfo[ ] IReflect.GetMember(string name, BindingFlags bindingAttr);

[C++] MemberInfo* IReflect::GetMember(String* name, BindingFlags bindingAttr) [ ];

[VB] Function GetMember(ByVal name As String, ByVal bindingAttr As BindingFlags) As MemberInfo( ) Implements IReflect.GetMember

[JScript] function IReflect.GetMember(name: String, bindingAttr: BindingFlags): MemberInfo[ ];

xx) IReflect.GetMembers

[C#] MemberInfo[ ] IReflect.GetMembers(BindingFlags bindingAttr);

[C++] MemberInfo* IReflect::GetMembers(BindingFlags bindingAttr)[ ]

[VB] Function GetMembers(ByVal bindingAttr As BindingFlags) As MemberInfo( ) Implements IReflect.GetMembers

[JScript] function IReflect.GetMembers(bindingAttr: BindingFlags) MemberInfo[ ];

yy) IReflect.GetMethod

[C#] MethodInfo IReflect.GetMethod(string name, BindingFlags bindingAr);

[C+#] MethodInfo* IReflect::GetMethod(String* name, BindingFlags bindingAttr);

[VB] Function GetMethod(ByVal name As String, ByVal bindingAttr As BindingFlags) As MethodInfo Implements IReflect.GetMethod

[JScript] function IReflect.GetMethod(name: String, binding Attr: BindingFlags): MethodInfo;

zz) IReflect.GetMethod

[C#] MethodInfo IReflect.GetMethod(string name, BindingFlags bindingAttr, Binder binder, Type[ ] types, ParameterModifier[ ] modifiers);

[C++] MethodInfo* IReflect::GetMethod(String* name, BindingFlags bindingAttr, Binder* binder, Type* types[ ], ParameterModifier modifiers[ ]);

[VB] Function GetMethod(ByVal name As String, ByVal bindingAttr As BindingFlags, ByVal binder As Binder, ByVal types( ) As Type, ByVal modifiers( ) As ParameterModifier) As MethodInfo Implements IReflect.GetMethod

[JScript] function IReflect.GetMethod(name: String, binding Attr: BindingFlags, binder: Binder, types: Type[ ], modifiers: ParameterModifier[ ]): MethodInfo;

aaa) IReflect.GetMethods

[C#] MethodInfo[ ] IReflect.GetMethods(BindingFlags bindingAttr);

[C++] MethodInfo* IRe flect::GetMethods(BindingFlags bindingAttr) [ ];

[VB] Function GetMethods(ByVal bindingAttr As BindingFlags) As MethodInfo( ) Implements IReflect.GetMethods

[JScript] function IReflect.GetMethods(bindingAttr: BindingFlags): MethodInfo[ ];

bbb) IReflect.GetProperties

[C#] PropertyInfo[ ] IReflect.GetProperties(BindingFlags bindingAttr);

[C++] PropertyInfo* IReflect::GetProperties(BindingFlags bindingAttr)[ ]

[VB] Function GetProperties(ByVal bindingAttr As BindingFlags) As PropertyInfo( ) Implements IReflect.GetProperties

[JScript] function IReflect.GetProperties(bindingAttr: BindingFlags): PropertyInfo[ ];

ccc) IReflect.GetProperty

[C#] PropertyInfo IReflect.GetProperty(string name, BindingFlags bindingAttr);

[C++] PropertyInfo* IReflect::GetProperty (String* name, BindingFlags bindingAttr);

[VB] Function GetProperty(ByVal name As String, ByVal bindingAttr As BindingFlags) As PropertyInfo Implements IReflect.GetProperty

[JScript] function IReflect.GetProperty(name: String, bindingAttr: BindingFlags): PropertyInfo;

ddd) IRefleet.GetProperty

[C#] PropertyInfo IReflect.GetProperty(string name, BindingFlags bindingAttr, Binder binder, Type returnType, Type[ ] types, ParameterModifier[ ] modifiers);

[C++] PropertyInfo* IReflect::GetProperty(String* name, BindingFlags bindingAttr, Binder* binder, Type* returnType, Type* types[ ], ParameterModifier modifiers[ ]);

[VB] Function GetProperty(ByVal name As String, ByVal bindingAttr As BindingFlags, ByVal binder As Binder, ByVal returnType As Type, ByVal types( ) As Type, ByVal modifiers ( ) As ParameterModifier) As PropertyInfo Implements IReflect.GetProperty

[JScript] function IReflect.GetProperty(name: String, bindingAttr: BindingFlags, binder: Binder, returnType: Type, types: Type[ ], modifiers: ParameterModifier[ ]): PropertyInfo;

eee) IReflect.InvokeMember

[C#] object IReflect.InvokeMember(string name, BindingFlags invokeAttr, Binder binder, object target, object[ ] args, ParameterModifier[ ] modifiers, CultureInfo culture, string[ ] namedParameters);

[C++] Object* IReflect::InvokeMember(String* name, BindingFlags invokeAttr, Binder* binder, Object* target, Object* args _gc[ ], ParameterModifier modifiers[ ], CultureInfo* culture, String* namedParameters _gc[ ]);

[VB] Function InvokeMember(ByVal name As String, ByVal invokeAttr As BindingFlags, ByVal binder As Binder, ByVal target As Object, ByVal args( ) As Object, ByVal modifiers( ) As ParameterModifier, ByVal culture As CultureInfo, ByVal namedParameters( ) As String) As Object Implements IReflect.InvokeMember

[JScript] function IReflect.InvokeMember(name: String, invokeAttr: BindingFlags, binder: Binder, target: Object, args: Object[ ], modifiers: ParameterModifier[ ], culture: CultureInfo, namedParameters: String[ ]): Object;

fff) UnsafeNativeMethods.IEnum Variant.Clone

[C#] void UnsafeNativeMethods.IEnumVariant.Clone(UnsafeNativeMethods.IEnumVariant [ ] v);

[C++] void UnsafeNativeMethods::IEnumVariant::Clone (UnsafeNativeMethods.IEnumVaria nt* v[ ]);

[VB] Sub IEnumVariant.Clone(ByVal v( ) As UnsafeNativeMethods.IEnumVariant) Implements UnsafeNativeMethods.IEnumVariant.Clone

[JScript] function UnsafeNativeMethods.IEnumVariant.Clone(v UnsafeNativeMethods.IEnumVariant[ ]);

ggg) UnsafeNativeMethods.IEnumVariant.Next

[C#] int UnsafeNativeMethods.IEnumVariant.Next(int n, IntPtr rgvar, int[ ] ns);

[C++] int UnsafeNativeMethods::IEnumVariant::Next(int n, IntPtr rgvar, int ns _gc[ ]);

[VB] Function IEnumVariant.Next(ByVal n As Integer, ByVal rgvar As IntPtr, ByVal ns( ) As Integer) As Integer Implements UnsafeNativeMethods.IEnumVariant.Next

[JScript] function UnsafeNativeMethods.IEnumVariant.Next(n: int, rgvar: IntPtr, ns: int[ ]): int;

hhh) UnsafeNativeMethods.IEnum Variant.Reset

[C#] void UnsafeNativeMethods.IEnumVariant.Reset( );

[C++] void UnsafeNativeMethods::IEnumVariant::Reset( );

[VB] Sub IEnumVariant.Reset( ) Implements UnsafeNativeMethods.IEnumVariant.Reset

[JScript] function UnsafeNativeMethods.IEnumVariant.Reset( );

iii) UnsafeNativeMethods.IEnumVariant.Skip

[C#] void UnsafeNativeMethods::IEnumVariant::Skip(int n);

[C++] void UnsafeNativeMethods::IEnumVariant:: Skip(int n);

[VB] Sub IEnumVariant.Skip(ByVal n As Integer) Implements UnsafeNativeMethods.IEnumVariant.Skip

[JScript] function UnsafeNativeMethods.IEnumVariant.Skip (n: int);

jjj) UseStdAccessibleObjects

[C#] protected void UseStdAccessibleObjects(IntPtr handle);

[C++] protected: void UseStdAccessibleObjects(IntPtr handle);

[VB] Protected Sub UseStdAccessibleObjects(ByVal handle As IntPtr)

[JScript] protected function UseStdAccessibleObjects (handle: IntPtr); Associates an object with an an instance of an System.Windows.Forms.AccessibleObject Description Associates an object with an an instance of an System.Windows.Forms.AccessibleObject based on the handle of the object.

Server applications can call this function when they contain a custom UI object that is similar to a system-provided object. Server applications call CreateStdAccessibleObject and override the IAccessible methods and properties as needed to match their custom object. This approach saves server developers the work of fully implementing all the IAccessible properties and methods. This function is similar to CreateStd AccessibleProxy, except that CreateStdAccessibleProxy allows you to specify the class name as a parameter whereas CreateStdAccessibleObject uses the class name associated with the hwnd. An System.IntPtr that contains the handle of the object.

kkk) UseStdAccessibleObjects

[C#] protected void UseStdAccessibleObjects(IntPtr handle, int objid);

[C++] protected: void UseStdAccessibleObjects(IntPtr handle, int objid);

[VB] Protected Sub UseStdAccessibleObjects(ByVal handle As IntPtr, ByVal objid As Integer)

[JScript] protected function UseStdAccessibleObjects (handle: IntPtr, objid: int);

Description

Associates an object with an an instance of an System.Windows.Forms.AccessibleObject based on the handle and the object id of the object.

Server applications can call this function when they contain a custom UI object that is similar to a system-provided object. Server applications call CreateStdAccessibleObject and override the IAccessible methods and properties as needed to match their custom object. This approach saves server developers the work of fully implementing all the IAccessible properties and methods. An System.IntPtr that contains the handle of the object. An Int that defines the type of object that the handle parameter refers to.

AccessibleRole Enumeration (System.Windows.Forms)

a) UseStdAccessibleObjects

Description

Specifies values representing possible roles for an accessible object.

The role of the object is used to determine the actions taken by the accesible application to make the accessible.

b) UseStdAccessibleObjects

[C#] public const AccessibleRole Alert;

[C++] public: const AccessibleRole Alert;

[VB] Public Const Alert As AccessibleRole

[JScript] public var Alert: AccessibleRole;

Description

An alert or condition that a user should be notified about. This role should be used only for objects that embody an alert but are not associated with another user interface element, such as a message box, graphic, text, or sound.

c) UseStdAccessibleObjects

[C#] public const AccessibleRole Animation;

[C++] public: const AccessibleRole Animation;

[VB] Public Const Animation As AccessibleRole

[JScript] public var Animation: AccessibleRole;

Description

An animation control, which contains content that is changing over time, such as a control that displays a series of bitmap frames, like a film strip. Animation controls are usually displayed when files are being copied, or when some other time-consuming task is being performed.

d) UseStdAccessibleObjects

[C#] public const AccessibleRole Application;

[C++] public: const AccessibleRole Application;

[VB] Public Const Application As AccessibleRole

[JScript] public var Application: AccessibleRole;

Description

The main window for an application.

e) UseStdAccessibleObjects

[C#] public const AccessibleRole Border;

[C++] public: const AccessibleRole Border;

[VB] Public Const Border As AccessibleRole

[JScript] public var Border: AccessibleRole;

Description

A window border. The entire border is represented by a single object, rather than by separate objects for each side.

f) UseStdAccessibleObjects

[C#] public const AccessibleRole ButtonDropDown;

[C++] public: const AccessibleRole ButtonDropDown;

[VB] Public Const ButtonDropDown As AccessibleRole

[JScript] public var ButtonDropDown: AccessibleRole;

Description

A button that drops down a list of items.

g) UseStdAccessibleObjects

[C#] public const AccessibleRole ButtonDropDownGrid;

[C++] public: const AccessibleRole ButtonDropDownGrid;

[VB] Public Const ButtonDropDownGrid As AccessibleRole

[JScript] public var ButtonDropDownGrid: AccessibleRole;

Description

A button that drops down a grid.

h) UseStdAccessibleObjects

[C#] public const AccessibleRole ButtonMenu;

[C++] public: const AccessibleRole ButtonMenu;

[VB] Public Const ButtonMenu As AccessibleRole

[JScript] public var ButtonMenu: AccessibleRole;

Description

A button that drops down a menu.

i) UseStdAccessibleObjects

[C#] public const AccessibleRole Caret;

[C++] public: const AccessibleRole Caret;

[VB] Public Const Caret As AccessibleRole

[JScript] public var Caret: AccessibleRole;

Description

A caret, which is a flashing line, block, or bitmap that marks the location of the insertion point in a window's client area.

j) UseStdAecessibleObjects

[C#] public const AccessibleRole Cell;

[C++] public: const AccessibleRole Cell;

[VB] Public Const Cell As AccessibleRole

[JScript] public var Cell: AccessibleRole;

Description

A cell within a table.

k) UseStdAccessibleObjects

[C#] public const AccessibleRole Character;

[C++] public: const AccessibleRole Character;

[VB] Public Const Character As AccessibleRole

[JScript] public var Character: AccessibleRole;

Description

A cartoon-like graphic object, such as Microsoft Office Assistant, which is typically displayed to provide help to users of an application.

l) UseStdAccessibleObjects

[C#] public const AccessibleRole Chart;

[C++] public: const AccessibleRole Chart;

[VB] Public Const Chart As AccessibleRole

[JScript] public var Chart: AccessibleRole;

Description

A graphical image used to represent data.

m) UseStdAccessibleObjects

[C#] public const AccessibleRole CheckButton;

[C++] public: const AccessibleRole CheckButton;

[VB] Public Const CheckButton As AccessibleRole

[JScript] public var CheckButton: AccessibleRole;

Description

A check box control, which is an option that can be turned on or off independently of other options.

n) UseStdAccessibleObjeets

[C#] public const AccessibleRole Client;

[C++] public: const AccessibleRole Client;

[VB] Public Const Client As AccessibleRole

[JScript] public var Client: AccessibleRole;

Description

A window's user area.

o) UseStdAccessibleObjects

[C#] public const AccessibleRole Clock;

[C++] public: const AccessibleRole Clock;

[VB] Public Const Clock As AccessibleRole

[JScript] public var Clock: AccessibleRole;

Description

A control that displays the time.

p) UseStdAccessibleObjects

[C#] public const AccessibleRole Column;

[C++] public: const AccessibleRole Column;

[VB] Public Const Column As AccessibleRole

[JScript] public var Column AccessibleRole;

Description

A column of cells within a table.

q) UseStdAccessibleObjects

[C#] public const AccessibleRole ColumnHeader;

[C++] public: const AccessibleRole ColumnHeader;

[VB] Public Const ColumnHeader As AccessibleRole

[JScript] public var ColumnHeader: AccessibleRole;

Description

A column header, which provides a visual label for a column in a table.

r) UseStdAccessibleObjects

[C#] public const AccessibleRole ComboBox;

[C++] public: const AccessibleRole ComboBox;

[VB] Public Const ComboBox As AccessibleRole

[JScript] public var ComboBox: AccessibleRole;

Description

A combo box, which is an edit control with an associated list box that provides a set of predefined choices.

s) UseStdAccessibleObjects

[C#] public const AccessibleRole Cursor;

[C++] public: const AccessibleRole Cursor;

[VB] Public Const Cursor As AccessibleRole

[JScript] public var Cursor: AccessibleRole;

Description

A mouse pointer.

t) UseStdAccessibleObjects

[C#] public const AccessibleRole Default;

[C++] public: const AccessibleRole Default;

[VB] Public Const Default As AccessibleRole

[JScript] public var Default: AccessibleRole;

Description

A system provided role.

u) UseStdAccessibleObjects

[C#] public const AccessibleRole Diagram;

[C++] public: const AccessibleRole Diagram;

[VB] Public Const Diagram As AccessibleRole

[JScript] public var Diagram: AccessibleRole;

Description

A graphical image used to diagram data.

v) UseStdAccessibleObjects

[C#] public const AccessibleRole Dial;

[C++] public: const AccessibleRole Dial;

[VB] Public Const Dial As AccessibleRole

[JScript] public var Dial: AccessibleRole;

Description

A dial or knob. This can also be a read-only object, like a speedometer.

w) UseStdAccessibleObjects

[C#] public const AccessibleRole Dialog;

[C++] public: const AccessibleRole Dialog;

[VB] Public Const Dialog As AccessibleRole

[JScript] public var Dialog: AccessibleRole;

Description

A dialog box or message box.

x) UseStdAccessibleObjects

[C#] public const AccessibleRole Document;

[C++] public: const AccessibleRole Document;

[VB] Public Const Document As AccessibleRole

[JScript] public var Document: AccessibleRole;

Description

A document window, which is always contained within an application window. This role applies only to multiple document interface (MDI) windows and refers to an object that contains the MDI title bar.

y) UseStdAccessibleObjects

[C#] public const AccessibleRole DropList;

[C++] public: const AccessibleRole DropList;

[VB] Public Const DropList As AccessibleRole

[JScript] public var DropList: AccessibleRole;

Description

A drop-down list box. This control shows one item and allows the user to display and select another from a list of alternative choices.

z) UseStdAccessibleObjects

[C#] public const AccessibleRole Equation;

[C++] public: const AccessibleRole Equation;

[VB] Public Const Equation As AccessibleRole

[JScript] public var Equation AccessibleRole;

Description

A mathematical equation.

aa) UseStdAccessibleObjects

[C#] public const AccessibleRole Graphic;

[C++] public: const AccessibleRole Graphic;

[VB] Public Const Graphic As AccessibleRole

[JScript] public var Graphic: AccessibleRole;

Description

A picture.

bb) UseStdAccessibleObjects

[C#] public const AccessibleRole Grip;

[C++] public: const AccessibleRole Grip;

[VB] Public Const Grip As AccessibleRole

[JScript] public var Grip: AccessibleRole;

Description

A special mouse pointer, which allows a user to manipulate user interface elements such as a window. For example, a user can click and drag a sizing grip in the lower-right corner of a window to resize it.

cc) UseStdAccessibleObjects

[C#] public const AccessibleRole Grouping;

[C++] public: const AccessibleRole Grouping;

[VB] Public Const Grouping As AccessibleRole

[JScript] public var Grouping: AccessibleRole;

Description

Objects grouped in a logical manner. There can be a parent-child relationship between the grouping object and the objects it contains.

dd) UseStdAccessibleObjects

[C#] public const AccessibleRole HelpBalloon;

[C++] public: const AccessibleRole HelpBalloon;

[VB] Public Const HelpBalloon As AccessibleRole

[JScript] public var HelpBalloon: AccessibleRole;

Description

A Help display in the form of a ToolTip or Help balloon, which contains buttons and labels that users can click to open custom Help topics.

ee) UseStdAccessibleObjects

[C#] public const AccessibleRole HotkeyField;

[C++] public: const AccessibleRole HotkeyField;

[VB] Public Const HotkeyField As AccessibleRole

[JScript] public var HotkeyField: AccessibleRole;

Description

A hot-key field that allows the user to enter a combination or sequence of keystrokes to be used as a hot key, which enables users to perform an action quickly. A hot-key control displays the keystrokes entered by the user and ensures that the user selects a valid key combination.

ff) UseStdA ccessibleObjects

[C#] public const AccessibleRole Indicator;

[C++] public: const AccessibleRole Indicator;

[VB] Public Const Indicator As AccessibleRole

[JScript] public var Indicator AccessibleRole;

Description

An indicator, such as a pointer graphic, that points to the current item.

gg) UseStdAccessibleObjects

[C#] public const AccessibleRole Link;

[C++] public: const AccessibleRole Link;

[VB] Public Const Link As AccessibleRole

[JScript] public var Link: AccessibleRole;

Description

A link, which is a connection between a source document and a destination document. This object might look like text or a graphic, but it acts like a button.

hh) UseStdAccessibleObjects

[C#] public const AccessibleRole List;

[C++] public: const AccessibleRole List;

[VB] Public Const List As AccessibleRole

[JScript] public var List: AccessibleRole;

Description

A list box, which allows the user to select one or more items.

ii) UseStdAccessibleObjects

[C#] public const AccessibleRole ListItem;

[C++] public: const AccessibleRole ListItem;

[VB] Public Const ListItem As AccessibleRole

[JScript] public var ListItem AccessibleRole;

Description

An item in a list box or the list portion of a combo box, drop-down list box, or drop-down combo box.

jj) UseStdAccessibleObjects

[C#] public const AccessibleRole MenuBar;

[C++] public: const AccessibleRole MenuBar;

[VB] Public Const MenuBar As AccessibleRole

[JScript] public var MenuBar: AccessibleRole;

Description

A menu bar, usually beneath the title bar of a window, from which menus can be selected by the user.

kk) UseStdAccessibleObjects

[C#] public const AccessibleRole MenuItem;

[C++] public: const AccessibleRole MenuItem;

[VB] Public Const MenuItem As AccessibleRole

[JScript] public var MenuItem: AccessibleRole;

Description

A menu item, which is an entry in a menu that a user can choose to carry out a command, select an option, or display another menu. Functionally, a menu item can be equivalent to a push button, radio button, check box, or menu.

ll) UseStdAccessibleObjects

[C#] public const AccessibleRole MenuPopup;

[C++] public: const AccessibleRole MenuPopup;

[VB] Public Const MenuPopup As AccessibleRole

[JScript] public var MenuPopup: AccessibleRole;

Description

A menu, which presents a list of options from which the user can make a selection to perform an action. All menu types must have this role, including drop-down menus that are displayed by selection from a menu bar, and shortcut menus that are displayed when the right mouse button is clicked.

mm) UseStdAccessibleObjects

[C#] public const AccessibleRole None;

[C++] public: const AccessibleRole None;

[VB] Public Const None As AccessibleRole

[JScript] public var None AccessibleRole;

Description

No role.

nn) UseStdAccessibleObjects

[C#] public conast AccessibleRole Outline;

[C++] public: const AccessibleRole Outline;

[VB] Public Const Outline As AccessibleRole [JScript] public var Outline: AccessibleRole;

Description

An outline or tree structure, such as a tree view control, which displays a hierarchical list and usually allows the user to expand and collapse branches.

oo) UseStdAccessibleObjects

[C++] public: const AccessibleRole OutlineItem;

[C++] Public Const OutlineItem As AccessibleRole

[JScript] public var OutlineItem: AccessibleRole;

Description

An item in an outline or tree structure.

pp) UseStdAccessibleObjects

[C#] public const AccessibleRole PageTab;

[C++] public: const AccessibleRole PageTab;

[VB] Public Const PageTab As AccessibleRole

[JScript] public var PageTab: AccessibleRole;

Description

A property page that allows a user to view the attributes for a page, such as the page's title, whether it is a home page, or whether the page has been modified. Normally the only child of this control is a grouped object that contains the contents of the associated page.

qq) UseStdAccessibleObjects

[C#] public const AccessibleRole PageTabList;

[C++] public: const AccessibleRole PageTabList;

[VB] Public Const PageTabList As AccessibleRole

[JScript] public var PageTabList: AccessibleRole;

Description

A container of page tab controls.

rr) UseStdAccessibleObjects

[C#] public const AccessibleRole Pane;

[C++] public: const AccessibleRole Pane;

[VB] Public Const Pane As AccessibleRole

[JScript] public var Pane: AccessibleRole;

Description

One of the separate areas in a frame, a split document window, or a rectangular area of the status bar that can be used to display information. Users can navigate between panes and within the contents of the current pane, but cannot navigate between items in different panes. Thus, panes represent a level of grouping lower than frame windows or documents, but above individual controls. Typically the user navigates between panes by pressing TAB, F6, or CTRL+TAB, depending on the context.

ss) UseStdAccessibleObjects

[C#] public const AccessibleRole ProgressBar;

[C++] public: const AccessibleRole ProgressBar;

[VB] Public Const ProgressBar As AccessibleRole

[JScript] public var ProgressBar: AccessibleRole;

Description

A progress bar, which indicates the progress of a lengthy operation by displaying a colored bar inside a horizontal rectangle. The length of the bar in relation to the length of the rectangle corresponds to the percentage of the operation that is complete. This control does not take user input.

tt) UseStdAccessibleObjects

[C#] public const AccessibleRole PropertyPage;

[C++] public: const AccessibleRole PropertyPage;

[VB] Public Const PropertyPage As AccessibleRole

[JScript] public var PropertyPage: AccessibleRole;

Description

A property page, which is a dialog box that controls the appearance and the behavior of an object, such as a file or resource. A property page's appearance differs according to its purpose.

uu) UseStdAccessibleObjects

[C#] public const AccessibleRole PushButton;

[C++] public: const AccessibleRole PushButton;

[VB] Public Const PushButton As AccessibleRole

[JScript] public var PushButton: AccessibleRole;

Description

A push button control, which is a small rectangular control that a user can turn on or off. A push button, also known as a command button, has a raised appearance in its default off state and a sunken appearance when it is turned on.

vv) UseStdA ccessibleObjects

[C#] public const AccessibleRole RadioButton;

[C++] public: const AccessibleRole RadioButton;

[VB] Public Const RadioBuffon As AccessibleRole

[JScript] public var RadioButton: AccessibleRole;

Description

An option button, also known as a radio button. All objects sharing a single parent that have this attribute are assumed to be part of a single mutually exclusive group. You can use grouped objects to divide option buttons into separate groups when necessary.

ww) UseStdAccessibleObjects

[C#] public const AccessibleRole Row;

[C++] public: const AccessibleRole Row;

[VB] Public Const Row As AccessibleRole

[JScript] public var Row: AccessibleRole;

Description

A row of cells within a table.

xx) UseStdAccessibleObjects

[C#] public const AccessibleRole RowHeader;

[C++] public: const AccessibleRole RowHeader;

[VB] Public Const RowHeader As AccessibleRole

[JScript] public var RowHeader: AccessibleRole;

Description

A row header, which provides a visual label for a table row.

yy) UseStdAccessibleObjects

[C#] public const AccessibleRole ScrollBar;

[C++] public: const AccessibleRole ScrollBar;

[VB] Public Const ScrollBar As AccessibleRole

[JScript] public var ScrollBar: AccessibleRole;

Description

A vertical or horizontal scroll bar, which can be either part of the client area or used in a control.

zz) UseStdAccessibleObjects

[C#] public const AccessibleRole Separator;

[C++] public: const AccessibleRole Separator;

[VB] Public Const Separator As AccessibleRole

[JScript] public var Separator AccessibleRole;

Description

Visually divides a space into two regions, such as a separator menu item or a bar dividing split panes within a window.

aaa) UseStdAccessibleObjects

[C#] public const AccessibleRole Slider;

[C++] public: const AccessibleRole Slider;

[VB] Public Const Slider As AccessibleRole

[JScript] public var Slider: AccessibleRole;

Description

A control, sometimes called a trackbar, that allows a user to adjust a setting in given increments between minimum and maximum values by moving a slider. The volume controls in the Windows operating system are slider controls.

bbb) UseStdAccessibleObjects

[C#] public const AccessibleRole Sound;

[C++] public: const AccessibleRole Sound;

[VB] Public Const Sound As AccessibleRole

[JScript] public var Sound: AccessibleRole;

Description

A system sound, which is associated with various system events.

ccc) UseStdAccessibleObjects

[C#] public const AccessibleRole SpinButton;

[C++] public: const AccessibleRole SpinButton;

[VB] Public Const SpinButton As AccessibleRole

[JScript] public var SpinButton: AccessibleRole;

Description

A spin box, also known as an up-down control, which contains a pair of arrow buttons that a user click with a mouse to increment or decrement a value. A spin button control is most often used with a companion control, called a buddy window, where the current value is displayed.

ddd) UseStdAccessibleObjects

[C#] public const AccessibleRole StaticText;

[C++] public: const AccessibleRole StaticText;

[VB] Public Const StaticText As AccessibleRole

[JScript] public var StaticText: AccessibleRole;

Description

Read-only text, such as in a label, for other controls or instructions in a dialog box. Static text cannot be modified or selected.

eee) UseStdAccessibleObjects

[C#] public const AccessibleRole StatusBar;

[C++] public: const AccessibleRole StatusBar;

[VB] Public Const StatusBar As AccessibleRole

[JScript] public var StatusBar: AccessibleRole;

Description

A status bar, which is an area typically at the bottom of an application window that displays information about the current operation, state of the application, or selected object. The status bar can have multiple fields that display different kinds of information, such as an explanation of the currently selected menu command in the status bar.

fff) UseStdAccessibleObjects

[C#] public const AccessibleRole Table;

[C++] public: const AccessibleRole Table;

[VB] Public Const Table As AccessibleRole

[JScript] public var Table: AccessibleRole;

Description

A table containing rows and columns of cells, and optionally, row headers and column headers.

ggg) UseStdAccessibleObjects

[C#] public const AccessibleRole Text;

[C++] public: const AccessibleRole Text;

[VB] Public Const Text As AccessibleRole

[JScript] public var Text: AccessibleRole;

Description

Selectable text that can be editable or read-only.

hhh) UseStdAccessibleObjects

[C#] public const AccessibleRole TitleBar;

[C++] public: const AccessibleRole TitleBar;

[VB] Public Const TitleBar As AccessibleRole [JScript] public var TitleBar A AccessibleRole;

Description

A title or caption bar for a window.

iii) UseStdAccessibleObjects

[C#] public const AccessibleRole ToolBar;

[C++] public: const AccessibleRole ToolBar;

[VB] Public Const ToolBar As AccessibleRole

[JScript] public var ToolBar AccessibleRole;

Description

A toolbar, which is a grouping of controls that provide easy access to frequently used features.

jjj) UseStdAccessibleObjects

[C#] public const AccessibleRole ToolTip;

[C++] public: const AccessibleRole ToolTip;

[VB] Public Const ToolTip As AccessibleRole

[JScript] public var ToolTip: AccessibleRole;

Description

A tool tip, which is a small rectangular pop-up window that displays a brief description of a command bar button's purpose.

kkk) UseStdAccessibleObjects

[C#] public const AccessibleRole WhiteSpace;

[C++] public: const AccessibleRole WhiteSpace;

[VB] Public Const WhiteSpace As AccessibleRole

[JScript] public var WhiteSpace: AccessibleRole;

Description

A blank space between other objects.

lll) UseStdAccessibleObjects

[C++] public const AccessibleRole Window;

[C++] public: const AccessibleRole Window;

[VB] Public Const Window As AccessibleRole

[JScript] public var Window: AccessibleRole;

Description

A window frame, which usually contains child objects such as a title bar, client, and other objects typically contained in a window.

AccessibleSelection enumeration (System.Windows.Forms)

a) ToString

Description

Specifies how an accessible object is selected or receives focus.

A focused object is the one object that receives keyboard input. The object with the keyboard focus is either the active window or a child object of the active window. A selected object is marked to participate in some type of group operation.

b) ToString

[C#] public const AccessibleSelection AddSelection;

[C++] public: const AccessibleSelection AddSelection;

[VB] Public Const AddSelection As AccessibleSelection

[JScript] public var AddSelection: AccessibleSelection;

Description

Adds the object to the selection.

c) ToString

[C#] public const AccessibleSelection ExtendSelection;

[C++] public: const AccessibleSelection ExtendSelection;

[VB] Public Const ExtendSelection As AccessibleSelection

[JScript] public var ExtendSelection: AccessibleSelection;

Description

Selects all objects between the anchor and the selected object.

d) ToString

[C#] public const AccessibleSelection None;

[C++] public: const AccessibleSelection None;

[VB] Public Const None As AccessibleSelection

[JScript] public var None: AccessibleSelection;

Description

The selection or focus of an object is unchanged.

e) ToString

[C#] public const AccessibleSelection RemoveSelection;

[C++] public: const AccessibleSelection RemoveSelection;

[VB] Public Const RemoveSelection As AccessibleSelection

[JScript] public var RemoveSelection: AccessibleSelection;

Description

Removes the object from the selection.

f) ToString

[C#] public const AccessibleSelection TakeFocus;

[C++] public: const AccessibleSelection TakeFocus;

[VB] Public Const TakeFocus As AccessibleSelection

[JScript] public var TakeFocus: AccessibleSelection;

Description

Assigns focus to an object and makes it the anchor, which is the starting point for the selection. Can be combined with TakeSelection, ExtendSelection, AddSelection, or RemoveSelection.

g) ToString

[C#] public const AccessibleSelection TakeSelection;

[C++] public: const AccessibleSelection TakeSelection;

[VB] Public Const TakeSelection As AccessibleSelection

[JScript] public var TakeSelection: AccessibleSelection;

Description

Selects the object and deselects all other objects in the container.

AccessibleStates enumeration (System.Windows.Forms)

a) ToString

Description

Specifies values representing possible states for an accessible object.

An accessible object can be associated with one or more of these states.

b) ToString

[C#] public const AccessibleStates AlertHigh;

[C++] public: const AccessibleStates AlertHigh;

[VB] Public Const AlertHigh As AccessibleStates

[JScript] public var AlertHigh: AccessibleStates;

Description

Indicates important information that should be conveyed to the user immediately. For example, a battery level indicator reaching a critical low level would transition to this state, in which case a blind access utility would announce this information immediately to the user, and a screen magnification program would scroll the screen so that the battery indicator is in view. This state is also appropriate for any prompt or operation that must be completed before the user can continue.

c) ToString

[C#] public const AccessibleStates AlertLow;

[C++] public: const AccessibleStates AlertLow;

[VB] Public Const AlertLow As AccessibleStates

[JScript] public var AlertLow: AccessibleStates;

Description

Indicates low-priority information that might not be important to the user.

d) ToString

[C#] public const AccessibleStates AlertMedium;

[C++] public: const AccessibleStates AlertMedium;

[VB] Public Const AlertMedium As AccessibleStates public var AlertMedium: AccessibleStates;

Description

Indicates important information that does not need to be conveyed to the user immediately. For example, when a battery level indicator is starting to reach a low level, it could generate a medium-level alert. Blind access utilities could then generate a sound to let the user know that important information is available, without actually interrupting the user's work. The user can then query the alert information at his or her leisure.

e) ToString

[C#] public const AccessibleStates Animated;

[C++] public: const AccessibleStates Animated;

[VB] Public Const Animated As AccessibleStates

[JScript] public var Animated: AccessibleStates;

Description

The object has a rapidly or constantly changing appearance. Graphics that are occasionally animated, but not always, should be defined as System.Windows.Forms.AccessibleRole.Graphic OR Animated. This state should not be used to indicate that the object's location is changing.

f) ToString

[C#] public const AccessibleStates Busy;

[C++] public: const AccessibleStates Busy;

[VB] Public Const Busy As AccessibleStates

[JScript] public var Busy: AccessibleStates;

Description

A control that cannot accept input in its current condition.

g) ToString

[C#] public const AccessibleStates Checked;

[C++] public: const AccessibleStates Checked;

[VB] Public Const Checked As AccessibleStates

[JScript] public var Checked: AccessibleStates;

Description

An object with a selected check box.

h) ToString

[C#] public const AccessibleStates Collapsed;

[C++] public: const AccessibleStates Collapsed;

[VB] Public Const Collapsed As AccessibleStates

[JScript] public var Collapsed: AccessibleStates;

Description

The children of the object that are items in an outline or tree structure are hidden.

i) ToString

[C#] public const AccessibleStates Default;

[C++] public: const AccessibleStates Default;

[VB] Public Const Default As AccessibleStates

[JScript] public var Default: AccessibleStates;

Description

The default button or menu item.

j) ToString

[C#] public const AccessibleStates Expanded;

[C++] public: const AccessibleStates Expanded;

[VB] Public Const Expanded As AccessibleStates

[JScript] public var Expanded: AccessibleStates;

Description

The children of the object that are items in an outline or tree structure are displayed.

k) ToString

[C#] public const AccessibleStates ExtSelectable;

[C++] public: const AccessibleStates ExtSelectable;

[VB] Public Const ExtSelectable As AccessibleStates

[JScript] public var ExtSelectable: AccessibleStates;

Description

Alters the selection so that all objects between the selection anchor, which is the Object with the keyboard focus, and this object take on the anchor object's selection state. If the anchor object is not selected, the objects are removed from the selection. If the anchor object is selected, the selection is extended to include this object and all the objects in between. You can set the selection state by combining this with System.Windows.Forms.AccessibleSelection.AddSelection or System.Windows.Forms.AccessibleSelection.RemoveSelection. This tate does not change the focus or the selection anchor unless it is combined with System.Windows.Forms.AccessibleSelection.TakeFocus.

l) ToString

[C#] public const AccessibleStates Floating;

[C++] public: const AccessibleStates Floating;

[VB] Public Const Floating As AccessibleStates

[JScript] public var Floating: AccessibleStates;

Description

The object is not fixed to the boundary of its parent object, and does not move automatically along with the parent.

m) ToString

[C#] public const AccessibleStates Focusable;

[C++] public: const AccessibleStates Focusable;

[VB] Public Const Focusable As AccessibleStates

[JScript] public var Focusable: AccessibleStates;

Description

The object is on the active window and can receive keyboard focus.

n) ToString

[C#] public const AccessibleStates Focused;

[C++] public: const AccessibleStates Focused;

[VB] Public Const Focused As AccessibleStates

[JScript] public var Focused: AccessibleStates;

Description

An object with the keyboard focus.

o) ToString

[C#] public const AccessibleStates HotTracked;

[C++] public: const AccessibleStates HotTracked;

[VB] Public Const HotTracked As AccessibleStates

[JScript] public var HotTracked: AccessibleStates;

Description

The object is hot-tracked by the mouse, meaning its appearance is highlighted to indicate the mouse pointer is located over it.

p) ToString

[C#] public const AccessibleStates Indeterminate;

[C++] public: const AccessibleStates Indeterminate;

[VB] Public Const Indeterminate As AccessibleStates

[JScript] public var Indeterminate: AccessibleStates;

Description

A three-state check box or toolbar button whose state is indeterminate. The check box is neither checked nor unchecked and it is in the third or mixed state.

q) ToString

[C#] public const AccessibleStates Invisible;

[C++] public: const AccessibleStates Invisible;

[VB] Public Const Invisible As AccessibleStates

[JScript] public var Invisible: AccessibleStates;

Description

An object without a visible user interface.

r) ToString

[C#] public const AccessibleStates Linked;

[C++] public: const AccessibleStates Linked;

[VB] Public Const Linked As AccessibleStates

[JScript] public var Linked: AccessibleStates;

Description

A linked object that has not been previously selected.

s) ToString

[C#] public const AccessibleStates Marqueed;

[C++] public: const AccessibleStates Marqueed;

[VB] Public Const Marqueed As AccessibleStates

[JScript] public var Marqueed: AccessibleStates;

Description

An object with scrolling or moving text or graphics.

t) ToString

[C#] public const AccessibleStates Mixed;

[C++] public: const AccessibleStates Mixed;

[VB] Public Const Mixed As AccessibleStates

[JScript] public var Mixed: AccessibleStates;

Description

A three-state check box or toolbar button whose state is indeterminate. The check box is neither checked nor unchecked and it is in the third or mixed state.

u) ToString

[C#] public const AccessibleStates Moveable;

[C++] public: const AccessibleStates Moveable;

[VB] Public Const Moveable As AccessibleStates

[JScript] public var Moveable: AccessibleStates;

Description

A movable object.

v) ToString

[C#] public const AccessibleStates MultiSelectable;

[C++] public: const AccessibleStates MultiSelectable;

[VB] Public Const MultiSelectable As AccessibleStates

[JScript] public var MultiSelectable: AccessibleStates;

Description

An object that accepts multiple selected items.

w) ToString

[C#] public const AccessibleStates None;

[C++] public: const AccessibleStates None;

[VB] Public Const None As AccessibleStates

[JScript] public var None: AccessibleStates;

Description

No state.

x) ToString

[C#] public const AccessibleStates Offscreen;

[C++] public: const AccessibleStates Offscreen;

[VB] Public Const Offscreen As AccessibleStates

[JScript] public var Offscreen: AccessibleStates;

Description

No on-screen representation. A sound or alert object would have this state, or a hidden window that is never made visible.

y) ToString

[C#] public const AccessibleStates Pressed;

[C++] public: const AccessibleStates Pressed;

[VB] Public Const Pressed As AccessibleStates

[JScript] public var Pressed: AccessibleStates;

Description

A pressed object.

z) ToString

[C#] public const AccessibleStates Protected;

[C++] public: const AccessibleStates Protected;

[VB] Public Const Protected As AccessibleStates

[JScript] public var Protected: AccessibleStates;

Description

A password-protected edit control.

aa) ToString

[C#] public const AccessibleStates ReadOnly;

[C++] public: const AccessibleStates ReadOnly;

[VB] Public Const ReadOnly As AccessibleStates

[JScript] public var ReadOnly: AccessibleStates;

Description

A read-only object.

bb) ToString

[C#] public const AccessibleStates Selectable;

[C++] public: const AccessibleStates Selectable;

[VB] Public Const Selectable As AccessibleStates

[JScript] public var Selectable: AccessibleStates;

Description

An object that can accept selection.

cc) ToString

[C#] public const AccessibleStates Selected;

[C++] public: const AccessibleStates Selected;

[VB] Public Const Selected As AccessibleStates

[JScript] public var Selected: AccessibleStates;

Description

A selected object.

dd) ToString

[C#] public const AccessibleStates SelfVoicing;

[C++] public: const AccessibleStates SelfVoicing;

[VB] Public Const SelfVoicing As AccessibleStates

[JScript] public var SelfVoicing: AccessibleStates;

Description

The object or child can use text-to-speech (TTS) to describe itself. A speech-based accessibility aid should not announce information when an object with this state has the focus because the object will automatically announce information about itself.

ee) ToString

[C#] public const AccessibleStates Sizeable;

[C++] public: const AccessibleStates Sizeable;

[VB] Public Const Sizeable As AccessibleStates

[JScript] public var Sizeable: AccessibleStates;

Description

A sizable object.

ff) ToString

[C#] public const AccessibleStates Traversed;

[C++] public: const AccessibleStates Traversed;

[VB] Public Const Traversed As AccessibleStates

[JScript] public var Traversed: AccessibleStates;

Description

A linked object that has previously been selected.

gg) ToString

[C#] public const AccessibleStates Unavailable;

[C++] public: const AccessibleStates Unavailable;

[VB] Public Const Unavailable As AccessibleStates

[JScript] public var Unavailable: AccessibleStates;

Description

An unavailable object.

hh) ToString

[C#] public const AccessibleStates Valid;

[C++] public: const AccessibleStates Valid;

[VB] Public Const Valid As AccessibleStates

[JScript] public var Valid: AccessibleStates;

Description

A valid object.

AmbientProperties class (System.Windows.Forms)

a) ToString

Description

Provides ambient property values to top-level controls.

An ambient property is a property on a control that, if not set, is retrieved from the parent control. If the control does not have a parent and the property is not set, the control tries to find the value of the ambient property through the System. ComponentModel.Component.Site property. If the control is not sited, the site does not support ambient properties, or if the property is not set on the System.Windows.Forms.Ambient-Properties object, the System.Windows.Forms.Control uses its own default values. Some objects derived from the System.Windows.Forms.Control class might set the property even it you do not. For example, the System.Windows.Forms. Form class always sets the System.Windows.Forms.Control. ForeColor and System.Windows.Forms.Control.BackColor properties.

b) AmbientProperties

Example Syntax:

c) ToString

[C#] public AmbientProperties( );

[C++] public: AmbientProperties( );

[VB] Public Sub New( )

[JScript] public function AmbientProperties( );

d) BackColor e) ToString

[C#] public Color BackColor {get; set;}

[C++] public: _property Color get_BackColor( ); public: _property void set_BackColor(Color);

[VB] Public Property BackColor As Color

[JScript] public function get BackColor( ): Color; public function set BackColor(Color);

Description

Gets or sets the ambient background color of an object.

If there is no ambient background color, the value of the System.Windows.Forms.Control.BackColor property is set to System.Drawing.Color.Empty.

f) Cursor g) ToString

[C#] public Cursor Cursor {get; set;}

[C++] public: _property Cursor* get_Cursor( ); public: _property void set_Cursor(Cursor*);

[VB] Public Property Cursor As Cursor

[JScript] public function get Cursor( ): Cursor; public function set Cursor(Cursor);

Description

Gets or sets the ambient cursor of an object.

If there is no ambient cursor, the value of the System.Windows.Forms.Control.Cursor property is null.

h) Font i) ToString

[C#] public Font Font {get; set;}

[C++] public: _property Font* get Font( ); public: _property void set_Font(Font*);

[VB] Public Property Font As Font

[JScript] public function get Font( ): Font; public function set Font(Font);

Description

Gets or sets the ambient font of an object.

If there is no ambient font, the value of the System.Windows. Forms.Control.Font property is null.

j) ForeColor k) ToString

[C#] public Color ForeColor {get; set;}

[C++] public: _property Color get_ForeColor( ); public: _property void set_ForeColor(Color);

[VB] Public Property ForeColor As Color

[JScript] public function get ForeColor( ): Color; public function set ForeColor(Color);

Description

Gets or sets the ambient foreground color of an object.

If there is no ambient foreground color, the value of the System.Windows.Forms.Control.ForeColor property is set to System.Drawing.Color.Empty.

AnchorStyles enumeration (System.Windows.Forms)

a) ToString

Description

Specifies how a control anchors to the edges of its container.

When a control is anchored to an edge of its container, the distance between the control and the specified edge remains constant when the container resizes. For example, if a control is anchored to the right edge of its container, the distance between the right edge of the control and the right edge of the container remains constant when the container resizes. A control can be anchored to any combination of control edges. If the control is anchored to opposite edges of its container (for example, to the top and bottom), it resizes when the container resizes. If a control has its System.Windows.Forms.Control.Anchor property set to AnchorStyle.None, the control moves half of the distance that the container of the control is resized. For example, if a System.Windows.Forms.Button has its System.Windows.Forms.Control.Anchor property set to AnchorStyle.None and the System.Windows.Forms.Form that the control is located on is resized by 20 pixels in either direction, the button will be moved 10 pixels in both directions.

b) ToString

[C#] public const AnchorStyles Bottom;

[C++] public: const AnchorStyles Bottom;

[VB] Public Const Bottom As AnchorStyles

[JScript] public var Bottom: AnchorStyles;

Description

The control is anchored to the bottom edge of its container.

c) ToString

[C#] public const AnchorStyles Left;

[C++] public: const AnchorStyles Left;

[VB] Public Const Left As AnchorStyles

[JScript] public var Left: AnchorStyles;

Description

The control is anchored to the left edge of its container.

d) ToString

[C#] public const AnchorStyles None;

[C++] public: const AnchorStyles None;

[VB] Public Const None As AnchorStyles

[JScript] public var None: AnchorStyles;

Description

The control is not anchored to any edges of its container.

e) ToString

[C#] public const AnchorStyles Right;

[C++] public: const AnchorStyles Right;

[VB] Public Const Right As AnchorStyles

[JScript] public var Right: AnchorStyles;

Description

The control is anchored to the right edge of its container.

f) ToString

[C#] public const AnchorStyles Top;

[C++] public: const AnchorStyles Top;

[VB] Public Const Top As AnchorStyles

[JScript] public var Top: AnchorStyles;

Description

The control is anchored to the top edge of its container.

Appearance enumeration (System.Windows.Forms)

a) ToString

Description

Specifies the appearance of a control.

Use the members of this enumeration in controls that provide the System.Windows.Forms.CheckBox.Appearance property to set its value.

b) ToString

[C#] public const Appearance Button;

[C++] public: const Appearance Button;

[VB] Public Const Button As Appearance

[JScript] public var Button: Appearance;

Description

The appearance of a Windows button.

c) ToString

[C#] public const Appearance Normal;

[C++] public: const Appearance Normal;

[VB] Public Const Normal As Appearance

[JScript] public var Normal: Appearance;

Description

The default appearance defined by the control class.

Application class (System.Windows.Forms)

a) ToString

Description

Provides static methods and properties to manage an application, such as methods to start and stop an application, to process Windows messages, and properties to get information about an application. This class cannot be inherited.

The System.Windows.Forms.Application class has methods to start and stop applications and threads, and to process Windows messages. Call System.Windows.Forms.Application.Run to start an application message loop on the current thread and, optionally, to make a form visible. Call System.Windows.Forms.Application.Exit or System.Windows.Forms.Application.ExitThread to stop a message loop. Call System.Windows.Forms.Application.DoEvents to process messages while your program is in a loop. Call System.Windows.Forms.Application.AddMessageFilter(System.Window s.Forms.IMessageFilter) to add a message filter to the application message pump to monitor Windows messages. An System.Windows.Forms.IMessageFilter lets you stop an event from being raised or perform special operations before invoking an event handler.

b) AllowQuit
c) ToString

[C#] public static bool AllowQuit {get;}

[C++] public: _property static bool get_AllowQuit( );

[VB] Public Shared ReadOnly Property AllowQuit As Boolean

[JScript] public static function get AllowQuit( ): Boolean;

Description

Gets a value indicating whether the caller can quit this application.

This property returns false if it is called from a System.Windows.Forms.Control being hosted within a Web browser. Thus, the System.Windows.Forms.Control cannot quit the System.Windows.Forms.Application.

d) CommonAppDataPath
e) ToString

[C#] public static string CommonAppDataPath {get;}

[C++] public: _property static String* get_CommonAppDataPath( );

[VB] Public Shared ReadOnly Property CommonAppDataPath As String

[JScript] public static function get CommonAppDataPath( ): String;

Description

Gets the path for the application data that is shared among all users.

If a path does not exist, one is created in the following format: Base Path\System.Windows.Forms.Application.CompanyName\System.Windows.Forms.Application.ProductName\System.Windows.Forms.Application.ProductVersion Gets the path for the application data that is shared among all users.

f) CommonAppDataRegistry
g) ToString

[C#] public static RegistryKey CommonAppDataRegistry {get;}

[C++] public: _property static RegistryKey* get_CommonAppDataRegistry( );

[VB] Public Shared ReadOnly Property CommonAppDataRegistry As RegistryKey

[JScript] public static function get CommonAppDataRegistry( ): RegistryKey;

Description

Gets the registry key for the application data that is shared among all users.

Information can be written to the System.Windows.Forms.Application.CommonAppDataRegistry only at install time.

h) CompanyName
i) ToString

[C#] public static string CompanyName {get;}

[C++] public: _property static String* get_CompanyName( );

[VB] Public Shared ReadOnly Property CompanyName As String

[JScript] public static function get CompanyName( ): String;

Description

Gets the company name associated with the application.

j) CurrentCulture
k) ToString

[C#] public static CultureInfo CurrentCulture {get; set;}

[C++] public: _property static CultureInfo* get_CurrentCulture( ); public: _property static void set_CurrentCulture(CultureInfo*);

[VB] Public Shared Property CurrentCulture As CultureInfo

[JScript] public static function get CurrentCulture( ): CultureInfo; public static function set CurrentCulture(CultureInfo);

Description

Gets or sets the culture information for the current thread.

l) CurrentInputLanguage
m) ToString

[C#] public static InputLanguage CurrentInputLanguage {get; set;}

[C++] public: _property static InputLanguage* get_CurrentInputLanguage( ); public: _property static void set_CurrentInputLanguage(InputLanguage*);

[VB] Public Shared Property CurrentInputLanguage As InputLanguage

[JScript] public static function get CurrentInputLanguage( ): InputLanguage; public static function set CurrentInputLanguage(InputLanguage);

Description

Gets or sets the current input language for the current thread.

n) ExecutablePath
o) ToString

[C#] public static string ExecutablePath {get;}

[C++] public: _property static String* get_ExecutablePath( );

[VB] Public Shared ReadOnly Property ExecutablePath As String

[JScript] public static function get ExecutablePath( ): String;

Description

Gets the path for the executable file that started the application.

p) LocalUserAppDataPath
q) ToString

[C#] public static string LocalUserAppDataPath {get;}

[C++] public: _property static String* get_LocalUserAppDataPath( );

[VB] Public Shared ReadOnly Property LocalUserAppDataPath As String

[JScript] public static function get LocalUserAppDataPath( ): String;

Description

Gets the path for the application data of a local, non-roaming user.

A local user is one whose user profile is stored on the system on which the user logged on. If a path does not exist, one is created in the following format: Base Path\ System.Windows.Forms.Application.CompanyName\ System.Windows.Forms.Application.ProductName\System.

Windows.Forms.Application.ProductVersion Gets the path for the application data specific to a local, non-roaming user.

r) MessageLoop s) ToString

[C#] public static bool MessageLoop {get;}

[C++] public: _property static bool get_MessageLoop( );

[VB] Public Shared ReadOnly Property MessageLoop As Boolean

[JScript] public static function get MessageLoop( ): Boolean;

Description

Gets a value indicating whether a message loop exists on this thread.

t) ProductName u) ToString

[C#] public static string ProductName {get;}

[C++] public: _property static String* get_ProductName( );

[VB] Public Shared ReadOnly Property ProductName As String

[JScript] public static function get ProductName( ): String;

Description

Gets the product name associated with this application.

v) ProductVersion w) ToString

[C#] public static string ProductVersion {get;}

[C++] public: _property static String* get_ProductVersion( );

[VB] Public Shared ReadOnly Property ProductVersion As String

[JScript] public static function get ProductVersion( ): String;

Description

Gets the product version associated with this application.

Typically, a version number displays as "major number.minor number.build number.private part number".

x) SafeTopLevelCaptionFormat y) ToString

[C#] public static string SafeTopLevelCaptionFormat {get; set;}

[C++] public: _property static String* get_SafeTopLevelCaptionFormat( ); public: _property static void set_SafeTopLevelCaptionFormat(String*);

[VB] Public Shared Property SafeTopLevelCaptionFormat As String

[JScript] public static function get SafeTopLevelCaptionFormat( ): String; public static function set SafeTopLevelCaptionFormat(String);

Description

Gets or sets the format string to apply to top-level window captions when they are displayed with a warning banner.

z) StartupPath aa) ToString

[C#] public static string StartupPath {get;}

[C++] public: _property static String* get_StartupPath( );

[VB] Public Shared ReadOnly Property StartupPath As String

[JScript] public static function get StartupPath( ): String;

Description

Gets the path for the executable file that started the application.

bb) UserAppDataPath cc) ToString

[C#] public static string UserAppDataPath {get;}

[C++] public: _property static String* get_UserAppDataPath( );

[VB] Public Shared ReadOnly Property UserAppDataPath As String

[JScript] public static function get UserAppDataPath( ): String;

Description

Gets the path for the application data of a roaming user.

If a path does not exist, one is created in the following format: Base Path\System.Windows.Forms.Application.CompanyName\System.Windows.Forms.Application.ProductName\System.Windows.Forms.Application.ProductVersion A roaming user works on more than one computer in a network. The user profile for a roaming user is kept on a server on the network and is loaded onto a system when the user logs dd) UserAppDataRegistry ee) ToString

[C#] public static RegistryKey UserAppDataRegistry {get;}

[C++] public: _property static RegistryKey* get_UserAppDataRegistry( );

[VB] Public Shared ReadOnly Property UserAppDataRegistry As RegistryKey

[JScript] public static function get UserAppDataRegistry( ): RegistryKey;

Description

Gets the registry key of the application data specific to the roaming user.

Information can be written into the System.Windows.Forms.Application.UserAppDataRegistry only at install time.

ff) ToString

[C#] public static event EventHandler ApplicationExit;

[C++] public: static _event EventHandler* ApplicationExit;

[VB] Public Shared Event ApplicationExit As EventHandler

Description

Occurs when the application is about to shut down.

You must attach the event handlers to the System.Windows.Forms.Application.Exit event to perform unhandled, required tasks before the application stops running. You can close files opened by this application, or dispose of objects that garbage collection did not reclaim.

gg) ToString

[C#] a public static event EventHandler Idle;

[C++] public: static _event EventHandler* Idle;

[VB] Public Shared Event Idle As EventHandler

Description

Occurs when the application finishes processing and is about to enter the idle state.

If you have tasks that you must perform before the thread becomes idle, attach them to this event.

hh) ToString

[C#] public static event ThreadExceptionEventHandler ThreadException;

[C++] public: static _event ThreadExceptionEventHandler* ThreadException;

[VB] Public Shared Event ThreadException As ThreadExceptionEventHandler

Description

Occurs when an untrapped thread exception is thrown.

This event enables an application to handle an exception intelligently when it receives a thread exception from a window procedure. Attach your event handlers to the System.Windows.Forms.Application.ThreadException event to deal with the exception. An appropriate event handler does not terminate the thread, and allow your application to continue executing.

ii) ToString

[C#] public static event EventHandler ThreadExit;

[C++] public: static _event EventHandler* ThreadExit;

[VB] Public Shared Event ThreadExit As EventHandler

Description

Occurs when a thread is about to shut down. When the main thread for an application is about to be shut down, this event is raised first, followed by an System.Windows.Forms.Application.ApplicationExit event.

You must attach the event handlers to the System.Windows.Forms.Application.ThreadExit event to perform any unhandled, required tasks before the thread stops running. Close files opened by this thread, or dispose of objects that the garbage collector did not reclaim.

jj) AddMessageFilter

[C#] public static void AddMessageFilter(IMessageFilter value);

[C++] public: static void AddMessageFilter(IMessageFilter* value);

[VB] Public Shared Sub AddMessageFilter(ByVal value As IMessageFilter)

[JScript] public static function AddMessageFilter(value: IMessageFilter);

Description

Adds a message filter to monitor Windows messages as they are routed to their destinations.

Use a message filter to prevent specific events from being raised or to perform special operations for an event before it is passed to an event handler. Message filters are unique to a specific thread. The implementation of the System.Windows.Forms.IMessageFilter interface you want to install.

kk) DoEvents

[C#] public static void DoEvents( );

[C++] public: static void DoEvents( );

[VB] Public Shared Sub DoEvents( )

[JScript] public static function DoEvents( );

Description

Processes all Windows messages currently in the message queue.

When you run a Windows Form, it creates the new form, which then waits for events to handle. Each time the form handles an event, it processes all the code associated with that event. All other events wait in the queue. While your code handles the event, your application does not respond. For example, the window does not repaint if another window is dragged on top.

ll) Exit

[C#] public static void Exit( );

[C++] public: static void Exit( );

[VB] Public Shared Sub Exit( );

[JScript] public static function Exit( );

Description

Informs all message pumps that they must terminate, and then closes all application windows after the messages have been processed.

This method stops all running message loops on all threads and closes all windows of the application. This method does not actually force the application to exit, but rather causes all calls to System.Windows.Forms.Application.Run to return. To exit a message loop for the current thread only, call System.Windows.Forms.Application.ExitThread.

mm) ExitThread

[C#] public static void ExitThread( );

[C++] public: static void ExitThread( );

[VB] Public Shared Sub ExitThread( )

[JScript] public static function ExitThread( );

Description

Exits the message loop on the current thread and closes all windows on the thread.

Use this method to exit the message loop of the current thread. This method causes the call to System.Windows.Forms.Application.Run for the current thread to return. To exit the entire application, call System.Windows.Forms.Application.Exit.

nn) OleRequired

[C#] public static ApartmentState OleRequired( );

[C++] public: static ApartmentState OleRequired( );

[VB] Public Shared Function OleRequired( ) As ApartmentState

[JScript] public static function OleRequired( ): ApartmentState;

Description

Initializes OLE on the current thread.

Return Value: One of the System.Threading.ApartmentState values.

Call this method before calling any Microsoft.Win32 method that requires OLE.

oo) OnThreadException

[C#] public static void OnThreadException(Exception t);

[C++] public: static void OnThreadException(Exception* t);

[VB] Public Shared Sub OnThreadException(ByVal t As Exception)

[JScript] public static function OnThreadException(t: Exception);

Description

Raises the System.Windows.Forms.Application. ThreadException event.

This event enables an application to handle an exception intelligently. A window procedure calls this event when it receives a thread exception. Attach your event handlers to this event. An System.Exception that represents the exception that was thrown.

pp) RemoveMessageFilter

[C#] public static void RemoveMessageFilter(IMessageFilter value);

[C++] public: static void RemoveMessageFilter(IMessageFilter* value);

[VB] Public Shared Sub RemoveMessageFilter(ByVal value As IMessageFilter)

[JScript] public static function RemoveMessageFilter(value: IMessageFilter);

Description

Removes a message filter from the message pump of the application.

You can remove a message filter when you no longer want to capture Windows messages before they are dispatched. The implementation of the System.Windows.Forms.IMessageFilter to remove from the application.

qq) Run

[C#] public static void Run( );

[C++] public: static void Run( );

[VB] Public Shared Sub Run( )

[JScript] public static function Run( ); Begins running a standard application message loop on the current thread.

Description

Begins running a standard application message loop on the current thread, without a form.

The message loop runs until System.Windows.Forms.Application.Exit or System.Windows.Forms.Application. ExitThread is called.

rr) Run

[C#] public static void Run(ApplicationContext context);

[C++] public: static void Run(ApplicationContext* context);

[VB] Public Shared Sub Run(ByVal context As ApplicationContext)

[JScript] public static function Run(context: ApplicationContext);

Description

Begins running a standard application message loop on the current thread, with an System.Windows.Forms.ApplicationContext.

The message loop runs until System.Windows.Forms.Application.Exit or System.Windows.Forms.Application.ExitThread is called or the System.Windows.Forms.Application.ThreadExit event is raised on the context object. An System.Windows.Forms.ApplicationContext in which the application is run.

ss) Run

[C#] public static void Run(Form mainForm);

[C++] public: static void Run(Form* mainForm);

[VB] Public Shared Sub Run(ByVal mainForm As Form)

[JScript] public static function Run(mainForm: Form);

Description

Begins running a standard application message loop on the current thread, and makes the specified form visible.

Typically, the main function of an application calls this method and passes it to the main window of the application. A System.Windows.Forms.Form that represents the form to make visible.

ApplicationContext class (System.Windows.Forms)

a) ToString

Description

Specifies the contextual information about an application thread.

You can use the System.Windows.Forms.ApplicationContext class to redefine the circumstances that cause a message loop to exit. By default, the System.Windows. Forms. ApplicationContext listens to the System.Windows . Forms. Form.Closed event on the application's main System. Windows.Forms.Form, then exits the thread's message loop.

b) ApplicationContext

Example Syntax:

c) ToString

[C#] public ApplicationContext( );

[C++] public: ApplicationContext( );

[VB] Public Sub New( )

[JScript] public function ApplicationContext( ); Initializes a new instance of the System.Windows.Forms.ApplicationContext class.

Description

Initializes a new instance of the System.Windows.Forms.ApplicationContext class with no context.

d) ApplicationContext

Example Syntax:

e) ToString

[C#] public ApplicationContext(Form mainForm);

[C++] public: ApplicationContext(Form* mainForm);

[VB] Public Sub New(ByVal mainForm As Form)

[JScript] public function ApplicationContext(mainForm: Form);

Description

Initializes a new instance of the System.Windows.Forms.ApplicationContext class with the specified System.Windows. Forms.Form If System.Windows.Forms.ApplicationContext.OnMainFormClosed(Syste t.Object, System. EventArgs) is not overridden, the message loop of the thread terminates when System.Windows.Forms.ApplicationContext.MainForm is closed. The main System.Windows.Forms.Form of the application to use for context.

f) MainForm g) ToString

[C#] public Form MainForm {get; set;}

[C++] public: _property Form* get_MainForm( ); public: _property void set_MainForm(Form*);

[VB] Public Property MainForm As Form

[JScript] public function get MainForm( ): Form; public function set MainForm(Form);

Description

Gets or sets the System.Windows.Forms.Form to use as context.

This property determines the main System.Windows.Forms.Form for this context. This property can change at any time. If System.Windows.Forms.ApplicationContext. OnMainFormClosed(Syste m.Object, System.EventArgs) is not overridden, the message loop of the thread terminates when the mainForm parameter closes.

h) ToString

[C#] public event EventHandler ThreadExit;

[C++] public: _event EventHandler* ThreadExit;

[VB] Public Event ThreadExit As EventHandler

Description

Occurs when the message loop of the thread should be terminated, by calling System.Windows.Forms.ApplicationContext.ExitThread.

i) Dispose

[C#] public void Dispose( );

[C++] public: void Dispose( );

[VB] Public Sub Dispose( )

[JScript] public function Dispose( ); Releases the resources used by the System.Windows.Forms.ApplicationContext Description Releases all resources used by the System.Windows.Forms.ApplicationContext.

Calling System.Windows.Forms.ApplicationContext. Dispose allows the resources used by the System.Windows.Forms.ApplicationContext. to be reallocated for other purposes. For more information about System.Windows.Forms.ApplicationContext.Dispose, see.

j) Dispose

[C#] protected virtual void Dispose(bool disposing);

[C++] protected: virtual void Dispose(bool disposing);

[VB] Overridable Protected Sub Dispose(ByVal disposing As Boolean)

[JScript] protected function Dispose(disposing: Boolean);

Description

Releases the unmanaged resources used by the System.Windows.Forms.ApplicationContext and optionally releases the managed resources.

This method is called by the public method and the System.Object.Finalize method. true to release both managed and unmanaged resources; false to release only unmanaged resources.

k) ExitThread

[C#] public void ExitThread( );

[C++] public: void ExitThread( );

[VB] Public Sub ExitThread( )

[JScript] public function ExitThread( );

Description

Terminates the message loop of the thread.

This method calls System.Windows.Forms.ApplicationContext.ExitThreadCore.

l) ExitThreadCore

[C#] protected virtual void ExitThreadCore( );

[C++] protected: virtual void ExitThreadCore( );

[VB] Overridable Protected Sub ExitThreadCore( )

[JScript] protected function ExitThreadCore( );

Description

Terminates the message loop of the thread.

This method is called from System.Windows.Forms.ApplicationContext.ExitThread.

m) Finalize

[C#] ApplicationContext( );

[C++] ApplicationContext( );

[VB] Overrides Protected Sub Finalize( )

[JScript] protected override function Finalize( );

Description n) OnMainForm Closed

[C#] protected virtual void OnMainFormClosed(object sender, EventArgs e);

[C++] protected: virtual void OnMainFormClosed(Object* sender, EventArgs* e);

[VB] Overridable Protected Sub OnMainFormClosed(ByVal sender As Object, ByVal e As EventArgs)

[JScript] protected function OnMainFormClosed(sender: Object, e: EventArgs);

Description

Calls System.Windows.Forms.ApplicationContext. ExitThreadCore, which raises the System.Windows.Forms.ApplicationContext.ThreadExit event.

The default implementation of this method calls System.Windows.Forms.ApplicationContext.ExitThreadCore. The object that raised the event. The System.EventArgs that contains the event data.

ArrangeDirection enumeration (System.Windows.Forms)

a) ToString

Description

Specifies the direction in which the system arranges minimized windows.

This enumeration is used by the System.Windows.Forms.SystemInformation.ArrangeDirection property of the System.Windows.Forms.SystemInformation class.

b) ToString

[C#] public const ArrangeDirection Down;

[C++] public: const ArrangeDirection Down;

[VB] Public Const Down As ArrangeDirection

[JScript] public var Down: ArrangeDirection;

Description

Arranged vertically, from top to bottom.

c) ToString

[C#] public const ArrangeDirection Left;

[C++] public: const ArrangeDirection Left;

[VB] Public Const Left As ArrangeDirection

[JScript] public var Left: ArrangeDirection;

Description

Arranged horizontally, from left to right.

d) ToString

[C#] public const ArrangeDirection Right;

[C++] public: const ArrangeDirection Right;

[VB] Public Const Right As ArrangeDirection

[JScript] public var Right: ArrangeDirection;

Description

Arranged horizontally, from right to left.

e) ToString

[C#] public const ArrangeDirection Up;

[C++] public: const ArrangeDirection Up;

[VB] Public Const Up As ArrangeDirection

[JScript] public var Up: ArrangeDirection;

Description

Arranged vertically, from bottom to top.

ArrangeStartingPosition enumeration (System.Windows.Forms)

a) ToString

Description

Specifies the starting position that the system uses to arrange minimized windows.

This enumeration is used by the System.Windows.Forms.SystemInformation.ArrangeStartingPosition property of the System.Windows.Forms.SystemInformation class.

b) ToString

[C#] public const ArrangeStartingPosition BottomLeft;

[C++] public: const ArrangeStartingPosition BottomLeft;

[VB] Public Const BottomLeft As ArrangeStartingPosition

[JScript] public var BottomLeft: ArrangeStartingPosition;

Description

Starts at the lower-left corner of the screen, which is the default position.

c) ToString

[C#] public const ArrangeStartingPosition BottomRight;

[C++] public: const ArrangeStartingPosition BottomRight;

[VB] Public Const BottomRight As ArrangeStartingPosition

[JScript] public var BottomRight: ArrangeStartingPosition;

Description

Starts at the lower-right corner of the screen.

d) ToString

[C#] public const ArrangeStartingPosition Hide;

[C++] public: const ArrangeStartingPosition Hide;

[VB] Public Const Hide As ArrangeStartingPosition

[JScript] public var Hide: ArrangeStartingPosition;

Description

Hides minimized windows by moving them off the visible area of the screen.

e) ToString

[C#] public const ArrangeStartingPosition TopLeft;

[C++] public: const ArrangeStartingPosition TopLeft;

[VB] Public Const TopLeft As ArrangeStartingPosition

[JSCript] public var TopLeft: ArrangeStartingPosition;

Description

Starts at the upper-left corner of the screen.

f) ToString

[C#] public const ArrangeStartingPosition TopRight;

[C++] public: const ArrangeStartingPosition TopRight;

[VB] Public Const TopRight As ArrangeStartingPosition

[JScript] public var TopRight: ArrangeStartingPosition;

Description

Starts at the upper-right corner of the screen.

AxHost.AxComponentEditor class (System.Windows.Forms)

a) ToString b) AxHost.AxComponentEditor

Example Syntax:

c) ToString d) EditComponent

[C#] public override bool EditComponent(ITypeDescriptorContext context, object obj, IWin32Window parent);

[C++] public: bool EditComponent(ITypeDescriptorContext* context, Object* obj, IWin32Window* parent);

[VB] Overrides Public Function EditComponent(ByVal context As ITypeDescriptorContext, ByVal obj As Object, ByVal parent As IWin32Window) As Boolean

[JScript] public override function EditComponent(context ITypeDescriptorContext, obj: Object, parent: IWin32Window): Boolean;

AxHost class (System.Windows.Forms)

a) ToString

Description

Wraps ActiveX controls and exposes them as fully featured Windows Forms controls.

You typically do not use the System.Windows.Forms.AxHost class directly. You should inherit from this class and add the functionality required by your ActiveX control. You can use the ActiveX Control Importer tool to generate the wrappers that extend System.Windows.Forms.AxHost. For more information about the ActiveX Control Importer tool, see.

b) AxHost
Example Syntax:
c) ToString

[C#] protected AxHost(string clsid);

[C++] protected: AxHost(String* clsid);

[VB] Protected Sub New(ByVal clsid As String)

[JScript] protected function AxHost(clsid: String); Creates a new instance of a control which wraps an activeX control given by the clsid parameter and flags of 0.
d) AxHost
Example Syntax:
e) ToString

[C#] protected AxHost(string clsid, int flags);

[C++] protected: AxHost(String* clsid, int flags);

[VB] Protected Sub New(ByVal clsid As String, ByVal flags As Integer)

[JScript] protected function AxHost(clsid: String, flags: int); Creates a new instance of a control which wraps an activeX control given by the clsid and flags parameters.
f) AccessibilityObject
g) AccessibleDefaultActionDescription
h) AccessibleDescription
i) AccessibleName
j) AccessibleRole
k) AllowDrop
l) Anchor
m) BackColor
n) ToString
o) BackgroundImage
p) ToString
q) BindingContext
r) Bottom
s) Bounds
t) CanFocus
u) CanSelect
v) Capture
w) Causes Validation
x) ClientRectangle
y) ClientSize
z) CompanyName
aa) Container
bb) ContainingControl
cc) ToString Description Gets or sets the parent container of the ActiveX control.
dd) ContainsFocus
ee) ContextMenu
ff) ToString
gg) Controls
hh) Created
ii) CreateParams
jj) ToString
kk) Cursor
ll) ToString
mm) DataBindings
nn) DefaultImeMode
oo) DefaultSize
pp) ToString
qq) DesignMode
rr) DisplayRectangle
ss) Disposing
tt) Dock
uu) EditMode
vv) ToString
ww) Enabled
xx) ToString Description Gets or sets a value indicating whether the ActiveX control is in an enabled state.
yy) Events
zz) Focused
aaa) Font
bbb) ToString
ccc) FontHeight
ddd) ForeColor
eee) ToString
fff) Handle
ggg) HasAboutBox
hhh) ToString Description Gets a value indicating whether the ActiveX control has an about dialog box.

The about dialog box typically displays version and copyright information about the ActiveX control.
iii) HasChildren
jjj) Height
kkk) ImeMode
lll) InvokeRequired
mmm) IsAccessible
nnn) IsDisposed
ooo) IsHandleCreated
ppp) Left
qqq) Location
rrr) Name
sss) OcxState
ttt) ToString Description Gets or sets the persisted state of the ActiveX control.

The value of the System.Windows.Forms.AxHost.OcxState property is used after the control is created but before it is shown. This method computes the persisted state of the underlying ActiveX control and returns it in the encapsulated System.Windows.Forms.AxHost.State object. If the control has been modified since it was last saved to a persisted state, it need to be saved.
uuu) Parent
vvv) ProductName
www) ProductVersion
xxx) RecreatingHandle
yyy) Region
zzz) RenderRightToLeft
aaaa) ResizeRedraw
bbbb) Right
cccc) RightToLeff
dddd) ToString
eeee) RightToLeft
ffff) ShowFocusCues
gggg) ShowKeyboardCues
hhhh) Site
iiii) ToString
jjjj) Size
kkkk) TabIndex
llll) TabStop
mmmm) Tag
nnnn) Text oooo) ToString pppp) Top qqqq) TopLevelControl rrrr) Visible ssss) Width tttt) WindowTarget uuuu) ToString Description Occurs when the System.Windows.Forms.Control. BackColor property of the ActiveX control has changed.

For more information about handling events, see.

vvvv) ToString

[C#] public new event EventHandler BackgroundImageChanged;

[C++] public: _event EventHandler* BackgroundImageChanged;

[VB] Shadows Public Event BackgroundImageChanged As EventHandler

Description

Occurs when the System.Windows.Forms.Control. BackgroundImage property of the ActiveX control has changed.

For more information about handling events, see.

wwww) ToString

[C#] public new event EventHandler BindingContext Changed;

[C++] public: _event EventHandler* BindingContext Changed;

[VB] Shadows Public Event BindingContextChanged As EventHandler

Description

Occurs when the System.Windows.Forms.BindingContext property of the ActiveX control has changed.

For more information about handling events, see.

xxxx) ToString

Description

Occurs when focus or keyboard or both cues have changed.

For more information about handling events, see.

yyyy) ToString

[C#] public new event EventHandler Click;

[C++] public: _event EventHandler* Click;

[VB] Shadows Public Event Click As EventHandler

Description

Occurs when the control is clicked.

For more information about handling events, see.

zzzz) ToString

[C#] public new event EventHandler ContextMenuChanged;

[C++] public: _event EventHandler* ContextMenuChanged;

[VB] Shadows Public Event ContextMenuChanged As EventHandler

Description

Occurs when the System.Windows.Forms.Control.ContextMenu property value has changed.

For more information about handling events, see.

aaaaa) ToString

Description

Occurs when the System.Windows.Forms.Control.Cursor property value has changed.

For more information about handling events, see.

bbbbb) ToString

Description

Occurs when the control is double clicked.

For more information about handling events, see.

ccccc) ToString

[C#] public new event DragEventHandler DragDrop;

[C++] public: event DragEventHandler* DragDrop;

[VB] Shadows Public Event DragDrop As DragEventHandler

Description

Occurs when a drag-and-drop operation is completed.

For more information about handling events, see.

ddddd) ToString

[C#] public new event DragEventHandler DragEnter;

[C++] public: _event DragEventHandler* DragEnter;

[VB] Shadows Public Event DragEnter As DragEventHandler

Description

Occurs when an object is dragged into the control's bounds.

For more information about handling events, see.

eeeee) ToString

[C#] public new event EventHandler DragLeave;

[C++] public: _event EventHandler* DragLeave;

[VB] Shadows Public Event DragLeave As EventHandler

Description

Occurs when an object has been dragged into and out of the control's bounds.

For more information about handling events, see.

fffff) ToString

[C#] public new event DragEventHandler DragOver;

[C++] public: _event DragEventHandler* DragOver;

[VB] Shadows Public Event DragOver As DragEventHandler

Description

Occurs when an object has been dragged over the control's bounds.

For more information about handling events, see.

ggggg) ToString

[C#] public new event EventHandler EnabledChanged;

[C++] public: _event EventHandler* EnabledChanged;

[VB] Shadows Public Event EnabledChanged As EventHandler

Description

Occurs when the System.Windows.Forms.Control.Enabled property value has changed.

For more information about handling events, see.

hhhhh) ToString

Description

Occurs when the System.Windows.Forms.Control.Font property value has changed.

For more information about handling events, see.

iiiii) ToString

[C#] public new event EventHandler ForeColorChanged;

[C++] public: _event EventHandler* ForeColorChanged;

[VB] Shadows Public Event ForeColorChanged As EventHandler

Description

Occurs when the System.Windows.Forms.Control. ForeColor property value has changed.

For more information about handling events, see.

jjjjj) ToString

[C#] public new event GiveFeedbackEventHandler GiveFeedback;

[C++] public: _event GiveFeedbackEventHandler* GiveFeedback;

[VB] Shadows Public Event GiveFeedback As GiveFeedbackEventHandler

Description

Occurs during a drag operation.

The System.Windows.Forms.Control.GiveFeedback event allows the source of a drag event to modify the appearance of the mouse pointer in order to give the user visual feedback during a drag-and-drop operation.

kkkkk) ToString

Description

Occurs when the user requests Help for a control.

For more information about handling events, see.

lllll) ToString

[C#] public new event EventHandler ImeModeChanged;

[C++] public: _event EventHandler* ImeModeChanged;

[VB] Shadows Public Event ImeModeChanged As EventHandler

Description

Occurs when the System.Windows.Forms.Control.ImeMode property has changed.

For more information about handling events, see.

mmmmm) ToString

Description

Occurs when a key is pressed down while the control has focus.

For more information about handling events, see.

nnnnn) ToString

[C#] public new event KeyPressEventHandler KeyPress;

[C++] public: _event KeyPressEventHandler* KeyPress;

[VB] Shadows Public Event KeyPress As KeyPressEventHandler

Description

Occurs when a key is pressed while the control has focus.

For more information about handling events, see.

ooooo) ToString

[C#] public new event KeyEventHandler KeyUp;

[C++] public: _event KeyEventHandler* KeyUp;

[VB] Shadows Public Event KeyUp As KeyEventHandler

Description

Occurs when a key is released while the control has focus.

For more information about handling events, see.

ppppp) ToString

[C#] public new event LayoutEventHandler Layout;

[C++] public: _event LayoutEventHandler* Layout;

[VB] Shadows Public Event Layout As LayoutEventHandler

Description

Occurs when a control has to lay out its child controls.

For more information about handling events, see.

qqqqq) ToString

Description

Occurs when the mouse pointer is over the control and a mouse button is pressed.

For more information about handling events, see.

rrrrr) ToString

[C#] public new event EventHandler MouseEnter;

[C++] public: _event EventHandler* MouseEnter;

[VB] Shadows Public Event MouseEnter As EventHandler

Description

Occurs when the mouse pointer enters the control.

For more information about handling events, see.

sssss) ToString

[C#] public new event EventHandler MouseHover;

[C++] public: _event EventHandler* MouseHover;

[VB] Shadows Public Event MouseHover As EventHandler

Description

Occurs when the mouse pointer hovers over the contro.

For more information about handling events, see.

ttttt) ToString

[C#] public new event EventHandler MouseLeave;

[C++] public: _event EventHandler* MouseLeave;

[VB] Shadows Public Event MouseLeave As EventHandler

Description

Occurs when the mouse pointer leaves the control.

For more information about handling events, see.

uuuuu) ToString

[C#] public new event MouseEventHandler MouseMove;

[C++] public: _event MouseEventHandler* MouseMove;

[VB] Shadows Public Event MouseMove As Mouse EventHandler

Description

Occurs when the mouse pointer is moved over the control.

For more information about handling events, see.

vvvvv) ToString

[C#] public new event MouseEventHandler MouseUp;

[C++] public: _event MouseEventHandler* MouseUp;

[VB] Shadows Public Event MouseUp As Mouse EventHandler

Description

Occurs when the mouse pointer is over the control and a mouse button is released.

For more information about handling events, see.

wwwww) ToString

[C#] public new event MouseEventHandler MouseWheel;

[C++] public: _event MouseEventHandler* MouseWheel;

[VB] Shadows Public Event MouseWheel As Mouse EventHandler

Description

Occurs when the mouse wheel moves while the control has focus.

For more information about handling events, see.

xxxxx) ToString

Description

Occurs when when the control is redrawn.

For more information about handling events, see.

yyyyy) ToString

Description

Occurs when when System.Windows.Forms.Accessible-Object is providing help to accessibility applications.

For more information about handling events, see.

zzzzz) ToString

[C#] public new event QueryContinueDragEventHandler QueryContinueDrag;

[C++] public: _event QueryContinueDragEventHandler* QueryContinueDrag;

[VB] Shadows Public Event QueryContinueDrag As Query-ContinueDragEventHandler

Description

Occurs during a drag-and-drop operation and allows the drag source to determine whether the drag-and-drop operation should be canceled.

For more information about handling events, see.

aaaaaa) ToString

Description

Occurs when the System.Windows.Forms.Control. Right-ToLeft property value has changed.

For more information about handling events, see.

bbbbbb) ToString

Description

Occurs when the control style has changed.

The System.Windows.Forms.Control.StyleChanged event occurs when System.Windows.Forms.ControlStyles flags have been added or changed.

cccccc) ToString

Description

Occurs when the System.Windows.Forms.Control.TabIndex property value has changed.

For more information about handling events, see.

dddddd) ToString

[C#] public new event EventHandler TabStopChanged;

[C++] public: _event EventHandler* TabStopChanged;

[VB] Shadows Public Event TabStopChanged As EventHandler

Description

Occurs when the System.Windows.Forms.Control.TabStop property value has changed.

For more information about handling events, see.

eeeeee) ToString

[C#] public new event EventHandler TextChanged;

[C++] public: _event EventHandler* TextChanged;

[VB] Shadows Public Event TextChanged As EventHandler

Description

Occurs when the System.Windows.Forms.Control.Text property value has changed.

For more information about handling events, see.

ffffff) AttachInterfaces

[C#] protected virtual void AttachInterfaces( );

[C++] protected: virtual void AttachInterfaces( );

[VB] Overridable Protected Sub AttachInterfaces( )

[JScript] protected function AttachInterfaces( );

Description

Called when the System.Windows.Forms.AxHost object is ready to create the underlying ActiveX object.

Classes that extend System.Windows.Forms.AxHost should override this method. Within an overridden version of this method, the extending class should call System.Windows. Forms.AxHost.Getocx to retrieve its own interface. In most cases, the System.Windows.Forms.AxHost.GetOcx method should not be called before this method is called.

gggggg) BeginInit

[C#] public void BeginInit( );

[C++] public: _sealed void BeginInit( );

[VB] NotOverridable Public Sub BeginInit( )

[JScript] public function BeginInit( );

Description

Begins the initialization of an System.Windows.Forms.Ax-Host object.

Design environments typically use this method to start the initialization of a component that is used on a form or used by another component. The System.Windows.Forms.AxHost.EndInit method ends the initialization. Using the System.Windows.Forms.AxHost.BeginInit and System.Windows.Forms.AxHost.EndInit methods prevents the control from being used before it is fully initialized. The initialization occurs at run time.

hhhhhh) CreateHandle

[C#] protected override void CreateHandle( );

[C++] protected: void CreateHandle( );

[VB] Overrides Protected Sub CreateHandle( )

[JScript] protected override function CreateHandle( ); Creates a handle for this control. This method is called by the .NET framework, this should not be called.

iiiiii) CreateSink

[C#] protected virtual void CreateSink( );

[C++] protected: virtual void CreateSink( );

[VB] Overridable Protected Sub CreateSink( )

[JScript] protected function CreateSink( );

jjjjjj) DestroyHandle

[C#] protected override void DestroyHandle( );

[C++] protected: void DestroyHandle( );

[VB] Overrides Protected Sub DestroyHandle( )

[JScript] protected override function DestroyHandle( ); Destroys the handle associated with this control. User code should in general not call this function.

kkkkkk) DetachSink

[C#] protected virtual void DetachSink( );

[C++] protected: virtual void DetachSink( );

[VB] Overridable Protected Sub DetachSink( )

[JScript] protected function DetachSink( );

llllll) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean); Frees all resources associated with this control. This method may not be called at runtime. Any resources used by the control should be setup to be released when the control is GC'ed. Inheriting classes should always call base dispose.

mmmmmm) DoVerb

[C#] public void DoVerb(int verb);

[C++] public: void DoVerb(int verb);

[VB] Public Sub DoVerb(ByVal verb As Integer)

[JScript] public function DoVerb(verb: int);

nnnnnn) EndInit

[C#] public void EndInit( );

[C++] public: sealed void EndInit( );

[VB] NotOverridable Public Sub EndInit( )

[JScript] public function EndInit( );

Description

Ends the initialization of an System.Windows.Forms.AxHost object.

Design environments typically use this method to start the initialization of a component that is used on a form or used by another component. The System.Windows.Forms.AxHost.EndInit method ends the initialization. Using the System.Windows.Forms.AxHost.BeginInit and System.Windows.Forms.AxHost.EndInit methods prevents the control from being used before it is fully initialized. The initialization occurs at run time.

oooooo) GetColorFromOleColor

[C#] protected static Color GetColorFromOleColor (uint color);

[C++] protected: static Color GetColorFromOleColor(unsigned int color);

[VB] Protected Shared Function GetColorFromOleColor (ByVal color As UInt32) As Color

[JScript] protected static function GetColorFromOleColor (color: UInt32): Color; Maps from an OLE COLOR to a System.Drawing.Color pppppp) GetFontFromIFont

[C#] protected static Font GetFontFromIFont(object font);

[C++] protected: static Font* GetFontFromIFont(Object* font);

[VB] Protected Shared Function GetFontFromIFont(ByVal font As Object) As Font

[JScript] protected static function GetFontFromIFont(font: Object): Font; Maps from an OLE IFont to a System.Drawing.Font object qqqqqq) GetFontFromIFontDisp

[C#] protected static Font GetFontFromIFontDisp(object font);

[C++] protected: static Font* GetFontFromIFontDisp(Object* font);

[VB] Protected Shared Function GetFontFromIFontDisp (ByVal font As Object) As Font

[JScript] protected static function GetFontFromIFontDisp (font: Object): Font; Maps from an IFontDisp to a System.Drawing.Font object rrrrrr) GetIFontDispFromFont

[C#] protected static object GetIFontDispFromFont(Font font);

[C++] protected: static Object* GetIFontDispFromFont (Font* font);

[VB] Protected Shared Function GetIFontDispFromFont (ByVal font As Font) As Object

[JScript] protected static function GetIFontDispFromFont (font: Font): Object; Maps from a System.Drawing.Font object to an OLE IFontDisp ssssss) GetIFontFromFont

[C#] protected static object GetIFontFromFont(Font font);

[C++] protected: static Object* GetIFontFromFont(Font* font);

[VB] Protected Shared Function GetIFontFromFont(ByVal font As Font) As Object

[JScript] protected static function GetIFontFromFont(font: Font): Object; Maps from a System.Drawing.Font object to an OLE IFont tttttt) GetIPictureDispFromPicture

[C#] protected static object GetIPictureDispFromPicture(Image image);

[C++] protected: static Object* GetIPictureDispFromPicture (Image* image);

[VB] Protected Shared Function GetIPictureDispFromPicture(ByVal image As Image) As Object

[JScript] protected static function GetIPictureDispFromPicture(image: Image): Object; Maps from a System.Drawing.Image to an OLE IPictureDisp uuuuuu) GetIPictureFromCursor

[C#] protected static object GetIPictureFromCursor(Cursor cursor);

[C++] protected: static Object* GetIPictureFromCursor(Cursor* cursor);

[VB] Protected Shared Function GetIPictureFromCursor (ByVal cursor As Cursor) As Object

[JScript] protected static function GetIPictureFromCursor (cursor: Cursor): Object; Maps from a System.Drawing.Cursor to an OLE IPicture vvvvvv) GetIPictureFromPicture

[C#] protected static object GetIPictureFromPicture(Image image);

[C++] protected: static Object* GetIPictureFromPicture(Image* image);

[VB] Protected Shared Function GetIPictureFromPicture (ByVal image As Image) As Object

[JScript] protected static function GetIPictureFromPicture (image: Image): Object; Maps from a System.Drawing.Image to an OLE IPicture wwwwww) GetOADateFromTime

[C#] protected static double GetOADateFromTime(Date Time time);

[C++] protected: static double GetOADateFromTime(Date Time time);

[VB] Protected Shared Function GetOADateFromTime(ByVal time As DateTime) As Double

[JScript] protected static function GetOADateFromTime (time: DateTime): double; Maps from a DateTime object to an OLE DATE (expressed as a double)

xxxxxx) GetOcx

[C#] public object GetOcx( );

[C++] public: Object* GetOcx( );

[VB] Public Function GetOcx( ) As Object

[JScript] public function GetOcx( ): Object;

Description

Retrieves a pointer to the underlying ActiveX control.

Return Value: A pointer to the underlying ActiveX control.

yyyyyy) GetOleColorFromColor

[C#] protected static uint GetOleColorFromColor(Color color);

[C++] protected: static unsigned int GetOleColorFromColor (Color color);

[VB] Protected Shared Function GetOleColorFromColor (ByVal color As Color) As UInt32

[JScript] protected static function GetOleColorFromColor (color: Color): UInt32; Maps from an System.Drawing.Color to an OLE COLOR zzzzzz) GetPictureFromIPicture

[C#] protected static Image GetPictureFromIPicture(object picture);

[C++] protected: static Image* GetPictureFromIPicture(Object* picture);

[VB] Protected Shared Function GetPictureFromIPicture (ByVal picture As Object) As Image

[JScript] protected static function GetPictureFromIPicture (picture: Object): Image; Maps from an OLE Ipicture to a System.Drawing.Image aaaaaaa) GetPictureFromIPictureDisp

[C#] protected static Image GetPictureFromIPictureDisp(object picture);

[C++] protected: static Image* GetPictureFromIPictureDisp (Object* picture);

[VB] Protected Shared Function GetPictureFromIPictureDisp(ByVal picture As Object) As Image

[JScript] protected static function GetPictureFromIPictureDisp(picture: Object): Image; Maps from an OLE IPictureDisp to a System.Drawing.Image bbbbbbb) GetTimeFromOADate

[C#] protected static DateTime GetTimeFromOADate (double date);

[C++] protected: static DateTime GetTimeFromOADate (double date);

[VB] Protected Shared Function GetTimeFromOADate(ByVal date As Double) As DateTime

[JScript] protected static function GetTimeFromOADate (date: double): DateTime; Maps from an OLE DATE (expressed as a double) to a DateTime object ccccccc) HasPropertyPages

[C#] public bool HasPropertyPages( );

[C++] public: bool HasPropertyPages( );

[VB] Public Function HasPropertyPages( ) As Boolean

[JScript] public function HasPropertyPages( ): Boolean;

Description

Determines if the ActiveX control has a property page.

Return Value: true if the ActiveX control has a property page; otherwise, false.

ddddddd) InvokeEditMode

[C#] public void InvokeEditMode( );

[C++] public: void InvokeEditMode( );

[VB] Public Sub InvokeEditMode( )

[JScript] public function InvokeEditMode( );

eeeeeee) IsInputKey

[C#] protected override bool IsInputKey(Keys keyData);

[C++] protected: bool IsInputKey(Keys keyData);

[VB] Overrides Protected Function IsInputKey(ByVal keyData As Keys) As Boolean

[JScript] protected override function IsInputKey(keyData: Keys): Boolean;

Description

Determines whether the specified key is a regular input key or a special key that requires preprocessing.

Return Value: true if the specified key is a regular input key; otherwise, false.

Call this method during window-message preprocessing to determine whether the specified key is a regular input key that should be sent directly to the control or a special key (such as PAGE UP and PAGE DOWN) that should preprocessed. In the latter case, send the key to the control only if it is not consumed by the preprocessing phase. One of the System.Windows.Forms.Keys values.

fffffff) MakeDirty

[C#] public void MakeDirty( );

[C++] public: void MakeDirty( );

[VB] Public Sub MakeDirty( )

[JScript] public function MakeDirty( );

ggggggg) OnBackColorChanged

[C#] protected override void OnBackColorChanged(Event Args e);

[C++] protected: void OnBackColorChanged(EventArgs* e);

[VB] Overrides Protected Sub OnBackColorChanged(ByVal e As EventArgs)

[JScript] protected override function OnBackColorChanged (e: EventArgs);

hhhhhhh) OnFontChanged

[C#] protected override void OnFontChanged(EventArgs e);

[C++] protected: void OnFontChanged(EventArgs* e);

[VB] Overrides Protected Sub OnFontChanged(ByVal e As EventArgs)

[JScript] protected override function OnFontChanged(e: EventArgs);

iiiiiii) OnForeColorChanged

[C#] protected override void OnForeColorChanged(Event Args e);

[C++] protected: void OnForeColorChanged(EventArgs* e);

[VB] Overrides Protected Sub OnForeColorChanged(ByVal e As EventArgs)

[JScript] protected override function OnForeColorChanged (e: EventArgs);

jjjjjjj) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs); Inheriting classes should override this method to find out when the handle has been created. Call base.OnHandleCreated first.

kkkkkkk) OnLostFocus

[C#] protected override void OnLostFocus(EventArgs e);

[C++] protected: void OnLostFocus(EventArgs* e);

[VB] Overrides Protected Sub OnLostFocus(ByVal e As EventArgs)

[JScript] protected override function OnLostFocus(e: EventArgs);

Description

Raises the System.Windows.Forms.Control.LostFocus event.

lllllll) PreProcessMessage

[C#] public override bool PreProcessMessage(ref Message msg);

[C++] public: bool PreProcessMessage(Message* msg);

[VB] Overrides Public Function PreProcessMessage(ByRef msg As Message) As Boolean

[JScript] public override function PreProcessMessage(msg: Message): Boolean; This method is called by the application's message loop to pre-process input messages before they are dispatched. Possible values for the msg.message field are WM_KEYDOWN, WM_SYSKEYDOWN, WM_CHAR, and WM_SYSCHAR. If this method processes the message it must return true, in which case the message loop will not dispatch the message. This method should not be called directly by the user. The keyboard processing of input keys to AxHost controls go in 3 steps inside AxHost.PreProcessMessage( ) (1) Call the OCX's TranslateAccelarator. This may or may not call back into us using IOleControlSite::TranslateAccelarator( ) (2) If the control completely processed this without calling us back:—If this returns S_OK, then it means that the control already processed this message and we return true, forcing us to not do any more processing or dispatch the message.—If this returns S_FALSE, then it means that the control wants us to dispatch the message without doing any processing on our side. (3) If the control completely processed this by calling us back:—If this returns S_OK, then it means that the control processed this message and we return true, forcing us to not do any more processing or dispatch the message.—If this returns S_FALSE, then it means that the control did not process this message, but we did, and so we should route it through our PreProcessMessage( ).

mmmmmmm) ProcessMnemonic

[C#] protected override bool ProcessMnemonic(char charcode);

[C++] protected: bool ProcessMnemonic(_wchar_t charCode);

[VB] Overrides Protected Function ProcessMnemonic(ByVal charCode As Char) As Boolean

[JScript] protected override function ProcessMnemonic(char Code: Char): Boolean; Process a mnemonic character. This is done by manufacturing a WM_SYSKEYDOWN message and passing it to the ActiveX control.

nnnnnnn) Props Valid

[C#] protected bool PropsValid( );

[C++] protected: bool PropsValid( );

[VB] Protected Function PropsValid( ) As Boolean

[JScript] protected function PropsValid( ): Boolean;

ooooooo) RaiseOnMouseDown

[C#] protected void RaiseOnMouseDown(short button, short shift, int x, int y);

[C++] protected: void RaiseOnMouseDown(short button, short shift, int x, int y);

[VB] Protected Sub RaiseOnMouseDown(ByVal button As Short, ByVal shift As Short, ByVal x As Integer, ByVal y As Integer)

[JScript] protected function RaiseOnMouseDown(button: Int16, shift: Int16, x: int, y: int);

ppppppp) RaiseOnMouseDown

[C#] protected void RaiseOnMouseDown(short button, short shift, float x, float y);

[C++] protected: void RaiseOnMouseDown(short button, short shift, float x, float

[VB] Protected Sub RaiseOnMouseDown(ByVal button As Short, ByVal shift As Short, ByVal x As Single, ByVal y As Single)

[JScript] protected function RaiseOnMouseDown(button: Int16, shift: Int16, x float, y: float);

qqqqqqq) RaiseOnMouseDown

[C#] protected void RaiseOnMouseDown(object o1, object o2, object o3, object o4);

[C++] protected: void RaiseOnMouseDown(Object* o1, Object* o2, Object* o3, Object* o4);

[VB] Protected Sub RaiseOnMouseDown(ByVal o1 As Object, ByVal o2 As Object, ByVal o3 As Object, ByVal o4 As Object)

[JScript] protected function RaiseOnMouseDown(ol: Object, o2: Object, o3: Object, o4: Object);

rrrrrrr) RaiseOnMouseMove

[C] protected void RaiseOnMouseMove(short button, short shift, int x, int y);

[C++] protected: void RaiseOnMouseMove(short button, short shift, int x, int y);

[VB] Protected Sub RaiseOnMouseMove(ByVal button As Short, ByVal shift As Short, ByVal x As Integer, ByVal y As Integer)

[JScript] protected function RaiseOnMouseMove(button: Int16, shift: Int16, x: int, y: int);

sssssss) RaiseOnMouseMove

[C++] protected void RaiseOnMouseMove(short button, short shift, float x, float y);

[C++] protected: void RaiseOnMouseMove(short button, short shift, float x, float y);

[VB] Protected Sub RaiseOnMouseMove(ByVal button As Short, ByVal shift As Short, ByVal x As Single, ByVal y As Single)

[JScript] protected function RaiseOnMouseMove(button: Int16, shift: Int16, x: float, y: float);

ttttttt) RaiseOnMouseMove

[C#] protected void RaiseOnMouseMove(object o1, object o2, object o3, object o4);

[C++] protected: void RaiseOnMouseMove(Object* o1, Object* o2, Object* o3, Object* o4);

[VB] Protected Sub RaiseOnMouseMove(ByVal o1 As Object, ByVal o2 As Object, ByVal o3 As Object, ByVal o4 As Object)

[JScript] protected function RaiseOnMouseMove(o1: Object, o2: Object, o3: Object, o4: Object);

uuuuuuu) RaiseOnMouseUp

[C#] protected void RaiseOnMouseUp(short button, short shift, int x, int y);

[C++] protected: void RaiseOnMouseUp(short button, short shift, int x, int y);

[VB] Protected Sub RaiseOnMouseUp(ByVal button As Short, ByVal shift As Short, ByVal x As Integer, ByVal y As Integer)

[JScript] protected function RaiseOnMouseUp(button: Int16, shift: Int16, x: int, y: int);

vvvvvvv) RaiseOnMouseUp

[C#] protected void RaiseOnMouseUp(short button, short shift, float x, float y);

[C++] protected: void RaiseOnMouseUp(short button, short shift, float x, float y);

[VB] Protected Sub RaiseOnMouseUp(ByVal button As Short, ByVal shift As Short, ByVal x As Single, ByVal y As Single)

[JScript] protected function RaiseOnMouseUp(button: Int16, shift: Int16, x: float, y: float);

wwwwwww) RaiseOnMouseUp

[C#] protected void RaiseOnMouseUp(object o1, object o2, object o3, object o4);

[C++] protected: void RaiseonMouseUp(Object* o1, Object* o2, Object* o3, Object* o4);

[VB] Protected Sub RaiseOnMouseUp(ByVal o1 As Object, ByVal o2 As Object, ByVal o3 As Object, ByVal o4 As Object)

[JScript] protected function RaiseOnMouseUp(o1: Object, o2: Object, o3: Object, o4: Object);

xxxxxxx) SetAboutBoxDelegate

[C#] protected void SetAboutBoxDelegate(AxHost.AboutBoxDelegate d);

[C++] protected: void SetAboutBoxDelegate(AxHost.AboutBoxDelegate* d);

[VB] Protected Sub SetAboutBoxDelegate(ByVal d As AxHost.AboutBoxDelegate)

[JScript] protected function SetAboutBoxDelegate(d: AxHost.AboutBoxDelegate);

Description

Calls the System.Windows.Forms.AxHost.ShowAboutBox method to display the ActiveX controls about dialog box.

The System.Windows.Forms.AxHost.Set AboutBoxDelegate(System.Windows.Forms.AxHost. AboutBoxDelegate) method also allows derived classes to handle the System.

Windows.Forms.AxHost.ShowAboutBox method without attaching a delegate. This is the preferred technique for handling the System.Windows.Forms.AxHost.ShowAboutBox method in a derived class. The delegate to call.

yyyyyyy) SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As BoundsSpecified)

[JScript] protected override function SetBoundsCore(x: int, y: int, width: int, height: int, specified: BoundsSpecified); Performs the work of setting the bounds of this control. User code should usually not call this function.

zzzzzzz) SetVisibleCore

[C#] protected override void SetVisibleCore(bool value);

[C++] protected: void SetVisibleCore(bool value);

[VB] Overrides Protected Sub SetVisibleCore(ByVal value As Boolean)

[JScript] protected override function SetVisibleCore(value: Boolean);

aaaaaaaa) ShowAboutBox

[C#] public void ShowAboutBox( );

[C++] public: void ShowAboutBox( );

[VB] Public Sub ShowAboutBox( )

[JScript] public function ShowAboutBox( );

Description

Displays the ActiveX control's about dialog box.

If System.Windows.Forms.AxHost.HasAboutBox is false, no about dialog box is displayed.

bbbbbbbb) ShowPropertyPages

[C#] public void ShowPropertyPages( );

[C++] public: void ShowPropertyPages( );

[VB] Public Sub ShowPropertyPages( )

[JScript] public function ShowPropertyPages( ); Displays the property page associated with the ActiveX control.

Description

Displays the property page associated with the ActiveX control.

If System.Windows.Forms.AxHost.HasPropertyPages returns false, no property pages are displayed.

ccccccccc) ShowPropertyPages

[C#] public void ShowPropertyPages(Control control);

[C++] public: void ShowPropertyPages(Control* control);

[VB] Public Sub ShowPropertyPages(ByVal control As Control)

[JScript] public function SbowPropertyPages(control: Control);

Description

Displays the property page associated with the ActiveX control assigned to the specified parent control.

If System.Windows.Forms.AxHost.HasPropertyPages returns false, no property pages are displayed. The parent System.Windows.Forms.Control of the ActiveX control.

dddddddd) ICustomTypeDescriptor.GetAttributes

[C#] AttributeCollection ICustomTypeDescriptor.GetAttributes( );

[C++] AttributeCollection* ICustomTypeDescriptor::GetAttributes( );

[VB] Function GetAttributes( ) As AttributeCollection Implements ICustomTypeDescriptor.GetAttributes

[JScript] function ICustomTypeDescriptor.GetAttributes( ): AttributeCollection;

eeeeeeee) ICustomTypeDescriptor.GetClassName

[C#] string ICustomTypeDescriptor.GetClassName( );

[C++] String* ICustomTypeDescriptor::GetClassName( );

[VB] Function GetClassName( ) As String Implements ICustomTypeDescriptor.GetClassName

[JScript] function ICustomTypeDescriptor.GetClassName( ): String;

ffffffff) ICustomTypeDescriptor.GetComponentName

[C#] string ICustomTypeDescriptor.GetComponentName( );

[C++] String* ICustomTypeDescriptor::GetComponentName( );

[VB] Function GetComponentName( ) As String Implements ICustomTypeDescriptor.GetComponentName

[JScript] function ICustomTypeDescriptor.GetComponentName( ): String;

gggggggg) ICustomTypeDescriptor.GetConverter

[C#] TypeConverter ICustomTypeDescriptor.GetConverter( );

[C++] TypeConverter* ICustomTypeDescriptor::GetConverter( );

[VB] Function GetConverter( ) As TypeConverter Implements ICustomTypeDescriptor.GetConverter

[JScript] function ICustomTypeDescriptor.GetConverter( ): TypeConverter;

hhhhhhhh) ICustomTypeDescriptor.GetDefaultEvent

[C#] EventDescriptor ICustomTypeDescriptor.GetDefaultEvent( );

[C++] EventDescriptor* ICustomTypeDescriptor::GetDefaultEvent( );

[VB] Function GetDefaultEvent( ) As EventDescriptor Implements ICustomTypeDescriptor.GetDefaultEvent

[JScript] function ICustomTypeDescriptor.GetDefaultEvent( ): EventDescriptor;

iiiiiii) ICustomTypeDescriptor.GetDefaultProperty

[C#] PropertyDescriptor ICustomTypeDescriptor.GetDefaultProperty( );

[C++] PropertyDescriptor* ICustomTypeDescriptor::GetDefaultProperty( );

[VB] Function GetDefaultProperty( ) As PropertyDescriptor Implements ICustomTypeDescriptor.GetDefaultProperty

[JScript] function ICustomTypeDescriptor.GetDefaultProperty( ): PropertyDescriptor;

jjjjjjj) ICustomTypeDescriptor.GetEditor

[C#] object ICustomTypeDescriptor.GetEditor(Type editorBaseType);

[C++] Object* ICustomTypeDescriptor::GetEditor(Type* editorBaseType);

[VB] Function GetEditor(ByVal editorBaseType As Type) As Object Implements ICustomTypeDescriptor.GetEditor

[JScript] function ICustomTypeDescriptor.GetEditor(editorBaseType: Type): Object;

kkkkkkkk) ICustomTypeDescriptor.GetEvents

[C#] EventDescriptorCollection ICustomTypeDescriptor.GetEvents( );

[C++] EventDescriptorCollection* ICustomTypeDescriptor::GetEvents( );

[VB] Function GetEvents( ) As EventDescriptorCollection Implements ICustomTypeDescriptor.GetEvents

[JScript] function ICustomTypeDescriptor.GetEvents( ): EventDescriptorCollection;

lllllll) ICustomTypeDescriptor.GetEvents

[C#] EventDescriptorCollection ICustomTypeDescriptor.GetEvents(Attribute[ ] attributes);

[C++] EventDescriptorCollection* ICustomTypeDescriptor::GetEvents(Attribute* attributes[ ]);

[VB] Function GetEvents(ByVal attributes( ) As Attribute) As EventDescriptorCollection Implements ICustomTypeDescriptor.GetEvents

[JScript] function ICustomTypeDescriptor.GetEvents(attributes: Attribute[ ]): EventDescriptorCollection;

mmmmmmmm) ICustomTypeDescriptor.GetProperties

[C#] PropertyDescriptorCollection ICustomTypeDescriptor.GetProperties( );

[C++] PropertyDescriptorCollection* ICustomTypeDescriptor::GetProperties( );

[VB] Function GetProperties( ) As PropertyDescriptorCollection Implements ICustomTypeDescriptor.GetProperties

[JScript] function ICustomTypeDescriptor.GetProperties( ): PropertyDescriptorCollection;

nnnnnnnn) ICustomTypeDescriptor.GetProperties

[C#] PropertyDescriptorCollection ICustomTypeDescriptor.GetProperties(Attribute[ ] attributes);

[C++] PropertyDescriptorCollection* ICustomTypeDescriptor::GetProperties(Attribute* attributes[ ]);

[VB] Function GetProperties(ByVal attributes( ) As Attribute) As PropertyDescriptorCollection Implements ICustomTypeDescriptor.GetProperties

[JScript] function ICustomTypeDescriptor.GetProperties(attributes: Attribute[ ]): PropertyDescriptorCollection;

oooooooo) ICustomTypeDescriptor.GetPropertyOwner

[C#] object ICustomTypeDescriptor.GetPropertyOwner (PropertyDescriptor pd);

[C++] Object* ICustomTypeDescriptor::GetPropertyOwner (PropertyDescriptor* pd);

[VB] Function GetPropertyOwner(ByVal pd As PropertyDescriptor) As Object Implements ICustomTypeDescriptor.GetPropertyOwner

[JScript] function ICustomTypeDescriptor.GetPropertyOwner(pd: PropertyDescriptor): Object;

pppppppp) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message); AxHost wndProc. All messages are sent to wndProc after getting filtered through the preProcessMessage function. Certain messages are forwarder directly to the ActiveX control, others are first processed by the wndProc of Control BaseCollection class (System.Windows.Forms)

a) WndProc

Description

Provides the base functionality for creating data-related collections in the System.Windows.Forms namespace.

The System.Windows.Forms.BaseCollection class is not intended for use by application developers. Application developers should use System.Collections.CollectionBase instead.

b) BaseCollection

Example Syntax:

c) WndProc

[C#] public BaseCollection( );

[C++] public: BaseCollection( );

[VB] Public Sub New( )

[JScript] public function BaseCollection( );

d) Count e) WndProc

[C#] public virtual int Count {get;}

[C++] public: _property virtual int get_Count( );

[VB] Overridable Public ReadOnly Property Count As Integer

[JScript] public function get Count( ): int;

Description

Gets the total number of elements in the collection.

f) IsReadOnly g) WndProc

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the collection is read-only.

The collections which derive from the System.Windows.Forms.BaseCollection class are always writeable, which is why this property always returns false.

h) IsSynchronized
i) WndProc

[C#] public bool IsSynchronized {get;}

[C++] public: _property bool get IsSynchronized( );

[VB] Public ReadOnly Property IsSynchronized As Boolean

[JScript] public function get IsSynchronized( ): Boolean;

Description

Gets a value indicating whether access to the System.Collections.ICollection is synchronized.

If a collection is thread safe, the System.Windows.Forms.BaseCollection.IsSynchronized property returns true, and the programmer does not have to do anything to keep the collection safe.

j) List
k) WndProc

[C#] protected virtual ArrayList List {get;}

[C++] protected: _property virtual ArrayList* get_List( );

[VB] Overridable Protected ReadOnly Property List As ArrayList

[JScript] protected function get List( ): ArrayList;

Description

Gets the list of elements contained in the System.Windows.Forms.BaseCollection instance.

l) SyncRoot
m) WndProc

[C#] public object SyncRoot {get;}

[C++] public: _property Object* get_SyncRoot( );

[VB] Public ReadOnly Property SyncRoot As Object

[JScript] public function get SyncRoot( ): Object;

Description

Gets an object that can be used to synchronize access to the System.Windows. Forms. BaseCollection.

If, as is the case with the System.Windows.Forms.BaseCollection, the System.Windows.Forms.BaseCollection.IsSynchronized property returns false, then the System.Windows.Forms.BaseCollection.SyncRoot property returns an object that can be used with the C# lock keyword.

n) CopyTo

[C#] public void CopyTo(Array* ar, int index);

[C++] public: _sealed void CopyTo(Array* ar, int index);

[VB] NotOverridable Public Sub CopyTo(ByVal ar As Array, ByVal index As Integer)

[JScript] public function CopyTo(ar: Array, index: int);

Description

Copies all the elements of the current one-dimensional System.Array to the specified one-dimensional System.Array starting at the specified destination System.Array index. The one-dimensional System.Array that is the destination of the elements copied from the current Array. The zero-based relative index in ar at which copying begins.

o) GetEnumerator

[C#] public IEnumerator GetEnumerator( );

[C++] public: sealed IEnumerator* GetEnumerator( );

[VB] NotOverridable Public Function GetEnumerator( ) As IEnumerator

[JScript] public function GetEnumerator( ): IEnumerator;

Description

Gets the object that allows iterating through the members of the collection.

Return Value: An object that implements the System.Collections.IEnumerator interface.

Binding class (System.Windows.Forms)
a) ToString

Description

Represents the simple binding between the property value of an object and the property value of a control.

Use the System.Windows.Forms.Binding class to create and maintain a simple binding between the property of a control and either the property of an object, or the property of the current object in a list of objects.

b) Binding
Example Syntax:
c) ToString

[C#] public Binding(string propertyName, object dataSource, string dataMember);

[C++] public: Binding(String* propertyName, Object* dataSource, String* dataMember);

[VB] Public Sub New(ByVal propertyName As String, ByVal dataSource As Object, ByVal dataMember As String)

[JScript] public function Binding(propertyName: String, dataSource: Object, dataMember: String); Initializes a new instance of the System.Windows.Forms.Binding class.

Description

Initializes a new instance of the System.Windows.Forms.Binding class that simple-binds the specified control property to the specified data member of the specified data source.

You can specify an instance of any of the following classes for the data source: System. Data. DataSetSystem. Data. DataTableSystem. Data. DataViewSystem.Data.DataViewManager Any class that implements the System.Collections.IList interface. The name of the control property to bind. An System.Object that represents the data source. The property or list to bind to.

d) BindingManagerBase
e) ToString

[C#] public BindingManagerBase BindingManagerBase {get;}

[C++] public: _property BindingManagerBase* get_BindingManagerBase( );

[VB] Public ReadOnly Property BindingManagerBase As BindingManagerBase

[JScript] public function get BindingManagerBase( ): BindingManagerBase;

Description

Gets this binding's System.Windows.Forms.BindingManagerBase.

Use the System.Windows.Forms.BindingManagerBase to iterate through a data-bound list by incrementing or decrementing the System.Windows.Forms.BindingManagerBase.Position property. The System.Windows.Forms. BindingManagerBase class is abstract. The System.Windows.Forms.CurrencyManager class, which manages data-bound lists, inherits from the System.Windows.Forms.BindingManagerBase class.

f) BindingMemberInfo g) ToString

[C#] public BindingMemberInfo BindingMemberInfo {get;}

[C++] public: _property BindingMemberInfo get_BindingMemberInfo( );

[VB] Public ReadOnly Property BindingMemberInfo As BindingMemberinfo

[JScript] public function get BindingMemberInfo( ): BindingMemberInfo;

Description

Gets an object that contains information about this binding based on the dataMember parameter in the System.Windows.Forms.Binding.#ctor constructor.

The System.Windows.Forms.BindingMemberInfo is created from the dataMemberstring passed to the System.Windows.Forms.Binding.#ctor constructor.

h) Control i) ToString

[C#] public Control Control {get;}

[C++] public: _property Control* get Control( );

[VB] Public ReadOnly Property Control As Control

[JScript] public function get Control( ): Control;

Description

Gets the control that the binding belongs to.

j) DataSource k) ToString

[C#] public object DataSource {get;}

[C++] public: _property Object* get_DataSource( );

[VB] Public ReadOnly Property DataSource As Object

[JScript] public function get DataSource( ): Object;

Description

Gets the data source for this binding.

Possible data sources include: System.Data.DataSetSystem. Data.DataTableSystem.Data.DataViewSystem.Data.DataViewManager Any object that implements the System.Collections.IList interface.

l) IsBinding m) ToString

[C#] public bool IsBinding {get;}

[C++] public: _property bool get_IsBinding( );

[VB] Public ReadOnly Property IsBinding As Boolean

[JScript] public function get IsBindingo: Boolean;

Description

Gets a value indicating whether the binding is active.

A binding is active when it meets three conditions: all of its properties are set, it belongs to a System.Windows.Forms. BindingsCollection that points to a table of a data source, and the data source is not null.

n) PropertyName o) ToString

[C#] public string PropertyName {get;}

[C++] public: _property String* get_PropertyName( );

[VB] Public ReadOnly Property PropertyName As String

[JScript] public function get PropertyName( ): String;

Description

Gets or sets the name of the control's data-bound property.

Use the System.Windows.Forms.Binding.PropertyName to specify the control property that you want to bind to a list in a data source. Most commonly, you bind a display property such as the System.Windows.Forms.Control.Text property of a System.Windows.Forms.TextBox control. However, because you can bind any property of a control, you can programmatically create controls at run time using data from a database.

p) ToString

[C#] public event ConvertEventHandler Format;

[C++] public: _event ConvertEventHandler* Format;

[VB] Public Event Format As ConvertEventHandler

Description

Occurs when the property of a control is bound to a data value.

The System.Windows.Forms.Binding.Format and System. Windows.Forms.Binding.Parse events allow you to create custom formats for displaying data. For example, if the data in a table is of type System.Decimal, you can display the data in the local currency format by setting the System.Windows. Forms.ConvertEventArgs.Value property of the System. Windows.Forms.ConvertEventArgs object to the formatted value in the System.Windows.Forms.Binding.Format event. You must consequently unformat the displayed value in the System.Windows.Forms.Binding.Parse event.

q) ToString

[C#] public event ConvertEventHandler Parse;

[C++] public: _event ConvertEventHandler* Parse;

[VB] Public Event Parse As ConvertEventHandler

Description

Occurs when the value of a data-bound control changes.

The System.Windows.Forms.Binding.Format and System. Windows.Forms.Binding.Parse events allow you to create custom formats for displaying data. For example, if the data in a table is of type System.Decimal, you can display the data in the local currency format by setting the System.Windows. Forms.ConvertEventArgs.Value property of the System. Windows.Forms.ConvertEventArgs object to the formatted value in the System.Windows.Forms.Binding.Format event. You must consequently unformat the displayed value in the System.Windows.Forms.Binding.Parse event.

r) OnFormat

[C#] protected virtual void OnFormat(ConvertEventArgs cevent);

[C++] protected: virtual void OnFormat(ConvertEventArgs* cevent);

[VB] Overridable Protected Sub OnFormat(ByVal cevent As ConvertEventArgs)

[JScript] protected function OnFormat(cevent: ConvertEvent Args);

Description

Raises the System.Windows.Forms.Binding.Format event.

Raising an event invokes the event handler through a delegate. For more information, see. A System.Windows.Forms.ConvertEventArgs that contains the event data.

s) OnParse

[C#] protected virtual void OnParse(ConvertEventArgs cevent);

[C++] protected: virtual void OnParse(ConvertEventArgs* cevent);

[VB] Overridable Protected Sub OnParse(ByVal cevent As ConvertEventArgs)

[JScript] protected function OnParse(cevent: ConvertEvent Args);

Description

Raises the System.Windows.Forms.Binding.Parse event.

Raising an event invokes the event handler through a delegate. For more information, see. A System.Windows.Forms.ConvertEventArgs that contains the event data.

BindingContext class (System.Windows.Forms)

a) ToString

Description

Manages the collection of System.Windows.Forms.BindingManagerBase objects for any object that inherits from the System.Windows.Forms.Control class.

Each object that inherits from the System.Windows.Forms.Control class can have a single System.Windows.Forms.BindingContext object. That System.Windows.Forms.BindingContext manages the System.Windows.Forms.BindingManagerBase objects for that control and any contained controls. Use the System.Windows.Forms.BindingContext to create or return the System. Windows.Forms.BindingManagerBase for a data source used by the contained data-bound controls. Most commonly, you use the System.Windows.Forms.Form class's System. Windows.Forms.BindingContext to return System.Windows.Forms.BindingManagerBase objects for the data-bound controls on the form. If you use a container control, such as a System.Windows.Forms.GroupBox, System.Windows.Forms.Panel, or System.Windows.Forms.TabControl, to contain data-bound controls, you can create a System.Windows.Forms.BindingContext for just that container control and its controls. This allows each part of your form to be managed by its own System.Windows.Forms.BindingManagerBase object. See the System.Windows.Forms.BindingContext.#ctor constructor for more details on creating multiple System.Windows.Forms.BindingManagerBase objects for the same data source.

b) BindingContext

Example Syntax:

c) ToString

[C#] public BindingContext( );

[C++] public: BindingContext( );

[VB] Public Sub New( )

[JScript] public function BindingContext( );

Description

Initializes a new instance of the System.Windows.Forms.BindingContext class.

Create a new System.Windows.Forms.BindingContext and set it to the System.Windows.Forms.BindingContext property of an object that inherits from System.Windows.Forms.Control when you want to have multiple System.Windows.Forms.BindingManagerBase instances for the same data source.

d) IsReadOnly e) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the collection is read-only.

The property is derived from System.Collections.ICollection, and is overridden to always return false.

f) Item g) ToString

[C#] public BindingManagerBase this[object dataSource] {get;}

[C++] public: _property BindingManagerBase* get_Item (Object* datasource);

[VB] Public Default ReadOnly Property Item(ByVal dataSource As Object) As BindingManagerBase

[JScript] returnValue=BindingContextObject.Item(dataSource); Gets a particular System.Windows.Forms.BindingManagerBase Description Gets the System.Windows.Forms.BindingManagerBase that is associated with the specified data source.

Use this constructor if the System.Windows.Forms.BindingManagerBase you want does not require a navigation path. For example, if the System.Windows.Forms.BindingManagerBase manages a set of System.Windows.Forms.Binding objects that use an System.Collections.ArrayList or System.Data.DataTable as the System.Windows.Forms.Binding.DataSource, no navigation path is required. The data source associated with a particular System.Windows.Forms.BindingManagerBase.

h) Item i) ToString

[C#] public BindingManagerBase this[object dataSource, string dataMember] {get;}

[C++] public: _property BindingManagerBase* get_Item (Object* dataSource, String* dataMember);

[VB] Public Default ReadOnly Property Item(ByVal dataSource As Object, ByVal dataMember As String) As BindingManagerBase

[JScript] returnValue=BindingContextObject.Item(dataSource, dataMember);

Description

Gets the System.Windows.Forms.BindingManagerBase that is associated with the specified data source and data member.

Use this constructor when the System.Windows.Forms.BindingManagerBase manages a set of System.Windows.Forms.

Binding objects for which the data source contains multiple objects. For example, a System.Data.DataSet can contain several System.Data.DataTable objects linked by System.Data.DataRelation objects. In such a case, the navigation path is required to enable the System.Windows.Forms.BindingContext to return the correct System.Windows.Forms.BindingManagerBase. The data source associated with a particular System.Windows.Forms.BindingManagerBase. A navigation path containing the information that resolves to a specific System.Windows.Forms.BindingManagerBase.

j) ToString

[C#] public event CollectionChangeEventHandler CollectionChanged;

[C++] public: _event CollectionchangeEventHandler* CollectionChanged;

[VB] Public Event CollectionChanged As CollectionChangeEventHandler

Description

Occurs when the collection has changed.

For more information about handling events, see.

k) Add

[C#] protected internal void Add(object dataSource, BindingManagerBase listManager);

[C++] protected public: void Add(Object* dataSource, BindingManagerBase* listManager);

[VB] Protected Friend Dim Sub Add(ByVal dataSource As Object, ByVal listManager As BindingManagerBase)

[JScript] package function Add(dataSource: Object, listManager: BindingManagerBase);

Description

Adds the System.Windows.Forms.BindingManagerBase associated with a specific data source to the collection. The System.Object associated with the System.Windows.Forms.BindingManagerBase. The System.Windows.Forms.BindingManagerBase to add.

l) AddCore

[C#] protected virtual void AddCore(object dataSource, BindingManagerBase listManager);

[C++] protected: virtual void AddCore(Object* dataSource, BindingManagerBase* listManager);

[VB] Overridable Protected Sub AddCore(ByVal dataSource As Object, ByVal listManager As BindingManagerBase)

[JScript] protected function AddCore(dataSource: Object, listManager: BindingManagerBase);

Description m) Clear

[C#] protected internal void Clear( );

[C++] protected public: void Clear( );

[VB] Protected Friend Dim Sub Clear( )

[JScript] package function Clear( );

Description

Clears the collection of any System.Windows.Forms.BindingManagerBase objects.

n) ClearCore

[C#] protected virtual void ClearCore( );

[C++] protected: virtual void ClearCore( );

[VB] Overridable Protected Sub ClearCore( )

[JScript] protected function ClearCore( );

Description

Clears the collection.

o) Contains

[C#] public bool Contains(object dataSource);

[C++] public: bool Contains(Object* dataSource);

[VB] Public Function Contains(ByVal dataSource As Object) As Boolean

[JScript] public function Contains(dataSource: Object): Boolean; Gets a value indicating whether the System.Windows.Forms.BindingContext contains the specified System.Windows.Forms.BindingManagerBase Description Gets a value indicating whether the System.Windows.Forms.BindingContext contains the System.Windows.Forms.BindingManagerBase associated with the specified data source.

Return Value: true, if the System.Windows.Forms.BindingContext contains the specified System.Windows.Forms.BindingManagerBase; otherwise, false.

See the System.Windows.Forms.Binding class for a list of possible data sources and details on creating bindings between controls and data sources. An System.Object that represents the data source.

p) Contains

[C#] public bool Contains(object dataSource, string dataMember);

[C++] public: bool Contains(Object* dataSource, String* dataMember);

[VB] Public Function Contains(ByVal dataSource As Object, ByVal dataMember As String) As Boolean

[JScript] public function Contains(dataSource: Object, dataMember: String): Boolean;

Description

Gets a value indicating whether the System.Windows.Forms.BindingContext contains the System.Windows.Forms.BindingManagerBase associated with the specified data source and data member.

Return Value: true if the System.Windows.Forms.BindingContext contains the specified System.Windows.Forms.BindingManagerBase; otherwise, false.

See the System.Windows.Forms.Binding class for a list of possible data sources and for details on creating bindings between controls and data sources. An System.Object that represents the data source. The information needed to resolve to a specific System.Windows.Forms.BindingManagerBase.

q) OnCollectionChanged

[C#] protected virtual void OnCollectionChanged(CollectionChangeEventArgs ccevent);

[C++] protected: virtual void OnCollectionChanged(CollectionChangeEventArgs* ccevent);

[VB] Overridable Protected Sub OnCollectionChanged(ByVal ccevent As CollectionChangeEventArgs)

[JScript] protected function OnCollectionChanged(ccevent CollectionChangeEventArgs);

Description

This method is called whenever the collection changes. Overriders of this method should call the base implementation of this method. The event information.

r) Remove

[C#] protected internal void Remove(object dataSource);

[C++] protected public: void Remove(Object* dataSource);

[VB] Protected Friend Dim Sub Remove(ByVal dataSource As Object)

[JScript] package function Remove(dataSource: Object);

Description

Deletes the System.Windows.Forms.BindingManagerBase associated with the specified data source. The data source associated with the System.Windows.Forms.BindingManagerBase to remove.

s) RemoveCore

[C#] protected virtual void RemoveCore(object dataSource);

[C++] protected: virtual void RemoveCore(Object* dataSource);

[VB] Overridable Protected Sub RemoveCore(ByVal dataSource As Object)

[JScript] protected function RemoveCore(dataSource: Object);

Description t) ICollection.CopyTo

[C#] void ICollection.CopyTo(Array ar, int index);

[C++] void ICollection::CopyTo(Array* ar, int index);

[VB] Sub CopyTo(ByVal ar As Array, ByVal index As Integer) Implements ICollection.CopyTo

[JScript] function ICollection.CopyTo(ar: Array, index: int);

u) IEnumerable.GetEnumerator

[C#] IEnumerator IEnumerable.GetEnumerator( );

[C++] IEnumerator* IEnumerable::GetEnumerator( );

[VB] Function GetEnumerator( ) As IEnumerator Implements IEnumerable.GetEnumerator

[JScript] function IEnumerable.GetEnumerator( ): IEnumerator;

BindingManagerBase class (System.Windows.Forms)

a) ToString

Description

Manages all System.Windows.Forms.Binding objects that are bound to the same data source and data member. This class is abstract.

The System.Windows.Forms.BindingManagerBase enables the synchronization of data-bound controls on a Windows form that are bound to the same data source. (To simple-bind a control to a data source, add a System.Windows.Forms.Binding object to the control's System.Windows.Forms.ControlBindingsCollection, which is accessed through the System.Windows.Forms.Control.DataBindings property). For example, suppose that a form contains two System.Windows.Forms.TextBox controls that are bound to the same data source but to different columns (The data source might be a System.Data.DataTable that contains customer names, while the columns might contain the first name and last names). The two controls must be synchronized in order to display the correct first and last names together for the same customer. The System.Windows.Forms.CurrencyManager, which inherits from the System.Windows.Forms.BindingManagerBase class, accomplishes this synchronization by maintaining a pointer to the current item for the list. The System.Windows.Forms.TextBox controls are bound to the current item so they display the information for the same row. When the current item changes, the System.Windows.Forms.CurrencyManager notifies all the bound controls so that they can refresh their data. Furthermore, you can set the System.Windows.Forms.BindingManagerBase.Position property to specify the row in the System.Data.DataTable that the controls are point to. To determine how many rows exist in the list, use the System.Windows.Forms.BindingManagerBase.Count property.

b) ToString

[C#] protected EventHandler onCurrentChangedHandler;

[C++] protected: EventHandler* onCurrentChangedHandler;

[VB] Protected onCurrentChangedHandler As EventHandler

[JScript] protected var onCurrentChangedHandler: EventHandler;

Description

Specifies the event handler for the System.Windows.Forms.BindingManagerBase.CurrentChanged event.

c) ToString

[C#] protected EventHandler onPositionChangedHandler;

[C++] protected: EventHandler* onPositionChangedHandler;

[VB] Protected onPositionChangedHandler As EventHandler

[JScript] protected var onPositionChangedHandler: EventHandler;

Description

Specifies the event handler for the System.Windows.Forms.BindingManagerBase.PositionChanged event.

d) BindingManagerBase

Example Syntax:

e) ToString

[C#] public BindingManagerBase( );

[C++] public: BindingManagerBase( );

[VB] Public Sub New( )

[JScript] public function BindingManagerBase( );

Description

Initializes a new instance of the System.Windows.Forms.BindingManagerBase class.

f) Bindings g) ToString

[C#] public BindingsCollection Bindings {get;}

[C++] public: _property BindingsCollection* get_Bindings( );

[VB] Public ReadOnly Property Bindings As BindingsCollection

[JScript] public function get Bindings( ): BindingsCollection;

Description

Gets the collection of bindings being managed.

h) Count i) ToString

[C#] public abstract int Count {get;}

[C++] public: _property virtual int get_Count( )=0;

[VB] MustOverride Public ReadOnly Property Count As Integer

[JScript] public abstract function get Count( ): int;

Description

When overridden in a derived class, gets the number of rows managed by the System.Windows.Forms.BindingManagerBase.

Use the System.Windows.Forms.BindingManagerBase.Count property to determine the last item in the list of rows maintained by the System.Windows.Forms.BindingManagerBase. To go to the last item, set the System.Windows.Forms.BindingManagerBase.Position property to the System.Windows.Forms.BindingManagerBase.Count property value minus one.

j) Current k) ToString

[C#] public abstract object Current {get;}

[C++] public: _property virtual Object* get_Current( )=0;

[VB] MustOverride Public ReadOnly Property Current As Object

[JScript] public abstract function get Current( ): Object;

Description

When overridden in a derived class, gets the current object.

The System.Windows.Forms.BindingManagerBase.Current object contains the value of the current item in the data source. To use the value of the current item, you must cast the item to the System.Type of the object contained by the System.Windows.Forms.Binding.DataSource. For example, a System. Data. DataTable contains System. Data. Data RowView objects. To determine the type of the current object, use the System.Object.GetType and System.Type.ToString methods.

l) Position m) ToString

[C#] public abstract int Position {get; set;}

[C++] public: _property virtual int get_Position( )=0; public: _property virtual void set_Position(int)=0;

[VB] MustOverride Public Property Position As Integer

[JScript] public abstract function get Position( ): int; public abstract function set Position(int);

Description

When overridden in a derived class, gets or sets the position in the underlying list that controls bound to this data source point to.

Use the System.Windows.Forms.BindingManagerBase.Position to iterate through the underlying list maintained by the System.Windows.Forms.BindingManagerBase. To go to the first item, set the System.Windows.Forms.BindingManagerBase.Position to zero. To go to the end of the list, set the System.Windows.Forms.BindingManagerBase.Position to the value of the System.Windows.Forms.BindingManagerBase.Count property minus one.

n) ToString

[C#] public event EventHandler CurrentChanged;

[C++] public: _event EventHandler* CurrentChanged;

[VB] Public Event CurrentChanged As EventHandler

Description

Occurs when the bound value changes.

For more information about handling events, see.

o) ToString

[C#] public event EventHandler PositionChanged;

[C++] public: _event EventHandler* PositionChanged;

[VB] Public Event PositionChanged As EventHandler

Description

Occurs when the System.Windows.Forms.BindingManagerBase.Position has changed.

For more information about handling events, see.

p) AddNew

[C#] public abstract void AddNew( );

[C++] public: virtual void AddNew( )=0;

[VB] MustOverride Public Sub AddNew( )

[JScript] public abstract function AddNew( );

Description

When overridden in a derived class, adds a new item to the underlying list.

q) CancelCurrentEdit

[C#] public abstract void CancelCurrentEdit( );

[C++] public: virtual void CancelCurrentEdit( )=0;

[VB] MustOverride Public Sub CancelCurrentEdit( )

[JScript] public abstract function CancelCurrentEdit( );

Description

When overridden in a derived class, cancels the current edit.

This method is supported only if the data source implements the System.ComponentModel.IEditableObject interface. If the object does not implement the System.ComponentModel.IEditableObject interface, changes made to the data will not be discarded.

r) EndCurrentEdit

[C#] public abstract void EndCurrentEdit( );

[C++] public: virtual void EndCurrentEdit( )=0;

[VB] MustOverride Public Sub EndCurrentEdit( )

[JScript] public abstract function EndCurrentEdit( );

Description

When overridden in a derived class, ends the current edit.

This method is supported only if the data source implements the System.ComponentModel.IEditableObject interface. If the object does not implement the System.ComponentModel.IEditableObject interface, changes made to the data will not be discarded.

s) GetItemProperties

[C#] public abstract PropertyDescriptorCollection GetItemProperties( );

[C++] public: virtual PropertyDescriptorCollection* GetItemProperties( )=0;

[VB] MustOverride Public Function GetItemProperties( ) As PropertyDescriptorCollection

[JScript] public abstract function GetItemProperties( ) PropertyDescriptorCollection; Get or sets the collection of property descriptors for the binding.

Description

When overridden in a derived class, gets the collection of property descriptors for the binding.

Return Value: A System.ComponentModel.PropertyDescriptorCollection that represents the property descriptors for the binding.

t) GetItemProperties

[C#] protected internal virtual PropertyDescriptorCollection GetItemProperties(ArrayList dataSources, ArrayList listAccessors);

[C++] protected public: virtual PropertyDescriptorCollection* GetItemProperties(ArrayList* dataSources, ArrayList* listAccessors);

[VB] Overridable Protected Friend Dim Function GetItemProperties(ByVal dataSources As ArrayList, ByVal listAccessors As ArrayList) As PropertyDescriptorCollection

[JScript] package function GetItemProperties(dataSources: ArrayList, listAccessors: ArrayList): PropertyDescriptorCollection;

Description

Gets the collection of property descriptors for the binding using the specified System.Collections.ArrayList.

Return Value: A System.ComponentModel.PropertyDescriptorCollection that represents the property descriptors for the binding.

This method is used by developers creating data-bound controls. An System.Collections.ArrayList containing the data sources. An System.Collections.ArrayList containing the table's bound properties.

u) GetItemProperties

[C#] protected virtual PropertyDescriptorCollection GetItemProperties(Type listType, int offset, ArrayList dataSources, ArrayList listAccessors);

[C++] protected: virtual PropertyDescriptorCollection* GetItemProperties(Type* listType, int offset, ArrayList* dataSources, ArrayList* listAccessors);

[VB] Overridable Protected Function GetItemProperties(ByVal listType As Type, ByVal offset As Integer, ByVal dataSources As ArrayList, ByVal listAccessors As ArrayList) As PropertyDescriptorCollection

[JScript] protected function GetItemProperties(listType: Type, offset: int, dataSources: ArrayList, listAccessors: ArrayList): PropertyDescriptorCollection;

Description

Gets the collection of property descriptors for the items managed by this System.Windows.Forms.BindingManagerBase.

Return Value: A System.ComponentModel.PropertyDescriptorCollection that represents the property descriptors for the binding.

This overload is used by developers creating data-bound controls. The System.Type of the bound list. A counter used to recursively call the method. An System.Collections.ArrayList containing the data sources. An System.Collections.ArrayList containing the table's bound properties.

v) GetListName

[C#] protected internal abstract string GetListName(ArrayList listAccessors);

[C++] protected public: virtual String* GetListName(ArrayList* listAccessors)=0;

[VB] MustOverride Protected Friend Dim Function GetListName(ByVal listAccessors As ArrayList) As String

[JScript] package abstract function GetListName(listAccessors: ArrayList): String;

Description

When overridden in a derived class, gets the name of the list supplying the data for the binding.

Return Value: The name of the list supplying the data for the binding. An System.Collections.ArrayList containing the table's bound properties.

w) OnCurrentChanged

[C#] protected internal abstract void OnCurrentChanged(EventArgs e);

[C++] protected public: virtual void OnCurrentChanged(EventArgs* e)=0;

[VB] MustOverride Protected Friend Dim Sub OnCurrentChanged(ByVal e As EventArgs)

[JScript] package abstract function OnCurrentChanged(e: EventArgs);

Description

When overridden in a derived class, raises the System.Windows.Forms.BindingManagerBase.CurrentChanged event.

Raising an event invokes the event handler through a delegate. For more information, see. The System.EventArgs that contains the event data.

x) PullData

[C#] protected void PullData( );

[C++] protected: void PullData( );

[VB] Protected Sub PullData( )

[JScript] protected function PullData( );

Description

Pulls data from the data-bound control into the data source.

y) PushData

[C#] protected void PushData( );

[C++] protected: void PushData( );

[VB] Protected Sub PushData( )

[JScript] protected function PushData( );

Description

Pushes data from the data source into the data-bound control.

z) RemoveAt

[C#] public abstract void RemoveAt(int index);

[C++] public: virtual void RemoveAt(int index)=0;

[VB] MustOverride Public Sub RemoveAt(ByVal index As Integer)

[JScript] public abstract function RemoveAt(index: int);

Description

When overridden in a derived class, deletes the row at the specified index from the underlying list.

The System.Windows.Forms.BindingManagerBase.RemoveAt(System.Int32) method relies on the underlying data source to determine how the method behaves. (See the System.Windows.Forms.Binding class for a list of supported data sources). For classes that implement System.Collections.IList, System.ComponentModel.IBindingList, System.ComponentModel.ITypedList, as well as strongly typed classes that implement System.Collections.IList, the System.Windows.Forms.BindingManagerBase.RemoveAt (System.Int32) method actually deletes the row in the underlying list instead of removing it. The index of the row to delete.

aa) ResumeBinding

[C#] public abstract void ResumeBinding( );

[C++] public: virtual void ResumeBinding( )=0;

[VB] MustOverride Public Sub ResumeBinding( )

[JScript] public abstract function ResumeBinding( );

Description

When overridden in a derived class, resumes data binding.

System.Windows.Forms.BindingManagerBase.SuspendBinding and System.Windows.Forms.BindingManagerBase.ResumeBinding are two methods that allow the temporary suspension and resumption of data binding. You would typically suspend data binding if the user must be allowed to make several edits to data fields before validation occurs. For example, if one field must be changed in accordance with a second, but where validating the first field would cause the second field to be in error.

bb) SuspendBinding

[C#] public abstract void SuspendBinding( );

[C++] public: virtual void SuspendBinding( )=0

[VB] MustOverride Public Sub SuspendBinding( )

[JScript] public abstract function SuspendBinding( );

Description

When overridden in a derived class, suspends data binding.

System.Windows.Forms.BindingManagerBase.SuspendBinding and System.Windows.Forms.BindingManagerBase.ResumeBinding are two methods that allow the temporary suspension and resumption of data binding. You would typically suspend data binding if the user must be allowed to make several edits to data fields before validation occurs. For example, if one field must be changed in accordance with a second, but where validating the first field would cause the second field to be in error.

cc) UpdateIsBinding

[C#] protected abstract void UpdateIsBinding( );

[C++] protected: virtual void UpdateIsBinding( )=0;

[VB] MustOverride Protected Sub UpdateIsBinding( )

[JScript] protected abstract function UpdateIsBinding( );

Description

When overridden in a derived class, updates the binding.

BindingMemberInfo structure (System.Windows.Forms)

a) UpdateIsBinding

Description

Contains information that enables a System.Windows.Forms.Binding to resolve a data binding to either the property of an object or the property of the current object in a list of objects.

The System.Windows.Forms.BindingMemberInfo is returned by the System.Windows.Forms.Binding.BindingMemberInfo property of the System.Windows.Forms.Binding class.

b) BindingMemberInfo

Example Syntax:

c) UpdateIsBinding

[C#] public BindingMemberInfo(string dataMember);

[C++] public: BindingMemberInfo(String* dataMember);

[VB] Public Sub New(ByVal dataMember As String)

[JScript] public function BindingMemberInfo(dataMember: String);

Description

Initializes a new instance of the System.Windows.Forms.BindingMemberInfo class.

A System.Windows.Forms.BindingMemberInfo object is created automatically when you call the System.Windows.Forms.Binding.#ctor constructor with a control-property name, data source, and navigation path. The dataMember parameter contains the System.Windows.Forms.BindingMemberInfo.BindingMember string. A navigation path that resolves to either the property of an object or the property of the current object in a list of objects.

d) BindingField e) UpdateIsBinding

[C#] public string BindingField {get;}

[C++] public: _property String* get_BindingField( );

[VB] Public ReadOnly Property BindingField As String

[JScript] public function get BindingField( ): String;

Description

Gets the data-bound object's property name.

The System.Windows.Forms.BindingMemberInfo.BindingField is the last item found in the navigation path returned by the System.Windows.Forms.BindingMemberInfo.BindingMember property. For example, if the navigation path is "Customers.custToOrders.OrderDate", the System.Windows.Forms.BindingMemberInfo.BindingField returns "OrderDate" which names the data-bound property of the data source.

f) BindingMember
g) UpdateIsBinding

[C#] public string BindingMember {get;}

[C++] public: _property String* get_BindingMember( );

[VB] Public ReadOnly Property BindingMember As String

[JScript] public function get BindingMember( ): String;

Description

Gets the information that is used to specify the data-bound object's property name.

A System.Windows.Forms.BindingMemberInfo object is created automatically when you call the System.Windows.Forms.Binding.#ctor constructor with a control-property name, data source, and navigation path. The dataMemberparameter contains the System.Windows.Forms.BindingMemberInfo.BindingMember string.

h) BindingPath
i) UpdateIsBinding

[C#] public string BindingPath {get;}

[C++] public: _property String* get_BindingPath( );

[VB] Public ReadOnly Property BindingPath As String

[JScript] public function get BindingPath( ): String;

Description

Gets the property name, or the period-delimited hierarchy of property names, that precedes the data-bound object's property name.

j) Equals

[C#] public override bool Equals(object otherObject);

[C++] public: bool Equals(Object* otherObject);

[VB] Overrides Public Function Equals(ByVal otherObject As Object) As Boolean

[JScript] public override function Equals(otherObject: Object): Boolean;

Description k) GetHashCode

[C#] public override int GetHashCode( );

[C++] public: int GetHashCode( );

[VB] Overrides Public Function GetHashCode( ) As Integer

[JScript] public override function GetHashCode( ): int;

Description

BindingsCollection class (System.Windows.Forms)

a) ToString

Description

Represents a collection of System.Windows.Forms.Binding objects for a control.

Simple data binding is accomplished by adding System.Windows.Forms.Binding objects to a System.Windows.Forms.BindingsCollection. Any object that inherits from the System.Windows.Forms.Control class can access the System.Windows.Forms.BindingsCollection through the System.Windows.Forms.Control.DataBindings property. For a list of Windows controls that support data binding, see the System.Windows.Forms.Binding class.

b) Count
c) ToString

[C#] public override int Count {get;}

[C++] public: _property virtual int get_Count( );

[VB] Overrides Public ReadOnly Property Count As Integer

[JScript] public function get Count( ): int;

Description

Gets the total number of bindings in the collection.

d) IsReadOnly
e) IsSynchronized
f) Item
g) ToString

Description

Gets the System.Windows.Forms.Binding at the specified index. The index of the System.Windows.Forms.Binding to find.

h) List
i) ToString

[C#] protected override ArrayList List {get;}

[C++] protected: _property virtual ArrayList* get_List( );

[VB] Overrides Protected ReadOnly Property List As ArrayList

[JScript] protected function get List( ): ArrayList;

Description

Gets the bindings in the collection as an object.

j) SyncRoot
k) ToString

Description

Occurs when the collection has changed.

For more information about handling events, see.

l) Add

[C#] protected internal void Add(Binding binding);

[C++] protected public: void Add(Binding* binding);

[VB] Protected Friend Dim Sub Add(ByVal binding As Binding)

[JScript] package function Add(binding: Binding);

Description

Adds the specified binding to the collection. The System.Windows.Forms.Binding to add to the collection.

m) AddCore

[C#] protected virtual void AddCore(Binding dataBinding);

[C++] protected: virtual void Addcore(Binding* dataBinding);

[VB] Overridable Protected Sub AddCore(ByVal dataBinding As Binding)

[JScript] protected function AddCore(dataBinding: Binding);

Description

Adds a System.Windows.Forms.Binding to the collection.

n) Clear

[C#] protected internal void Clear( );

[C++] protected public: void Clear( );

[VB] Protected Friend Dim Sub Clear( )

[JScript] package function Clear( );

Description o) ClearCore

[C#] protected virtual void ClearCore( );

[C++] protected: virtual void ClearCore( );

[VB] Overridable Protected Sub ClearCore( )

[JScript] protected function ClearCore( );

Description

Clears the collection of any members.

p) OnCollectionChanged

[C#] protected virtual void OnCollectionChanged(CollectionChangeEventArgs ccevent);

[C++] protected: virtual void OnCollectionChanged(CollectionChangeEventArgs* ccevent);

[VB] Overridable Protected Sub OnCollectionChanged(ByVal ccevent As CollectionChangeEventArgs)

[JScript] protected function OnCollectionChanged(ccevent: CollectionChangeEventArgs);

Description

Raises the System.Windows.Forms.Bindings Collection. CollectionChanged event.

Raising an event invokes the event handler through a delegate. For more information, see. A System.ComponentModel.CollectionChangeEventArgs that contains the event data.

q) Remove

[C#] protected internal void Remove(Binding binding);

[C++] protected public: void Remove(Binding* binding);

[VB] Protected Friend Dim Sub Remove(ByVal binding As Binding)

[JScript] package function Remove(binding: Binding);

Description

Deletes the specified binding from the collection. The Binding to remove from the collection.

r) RemoveAt

[C#] protected internal void RemoveAt(int index);

[C++] protected public: void RemoveAt(int index);

[VB] Protected Friend Dim Sub RemoveAt(ByVal index As Integer)

[JScript] package function RemoveAt(index: int);

Description

Deletes the binding from the collection at the specified index. The index of the System.Windows.Forms.Binding to remove.

s) RemoveCore

[C#] protected virtual void RemoveCore(Binding dataBinding);

[C++] protected: virtual void RemoveCore(Binding* dataBinding);

[VB] Overridable Protected Sub RemoveCore(ByVal dataBinding As Binding)

[JScript] protected function RemoveCore(dataBinding: Binding);

Description

Removes the specified System.Windows.Forms.Binding from the collection. The System.Windows.Forms.Binding object to remove.

t) ShouldSerializeMyAll

[C#] protected internal bool ShouldSerializeMyAll( );

[C++] protected public: bool ShouldSerializeMyAll( );

[VB] Protected Friend Dim Function ShouldSerializeMy All( ) As Boolean

[JScript] package function ShouldSerializeMyAll( ): Boolean;

Description

Gets a value that indicates whether the collection should be serialized.

Return Value: true if the collection count is greater than zero; otherwise, false BootMode enumeration (System.Windows.Forms)

a) ToString

Description

Specifies the mode the computer was started in.

This enumeration is used by the System.Windows.Forms. SystemInformation.BootMode property in the System.Windows.Forms.SystemInformation class.

b) ToString

[C#] public const BootMode FailSafe;

[C++] public: const BootMode FailSafe;

[VB] Public Const FailSafe As BootMode

[JScript] public var FailSafe: BootMode;

Description

The computer was started by using only the basic files and drivers.

c) ToString

[C#] public const BootMode FailSafeWithNetwork;

[C++] public: const BootMode FailSafeWithNetwork;

[VB] Public Const FailSafeWithNetwork As BootMode

[JScript] public var FailSafeWithNetwork: BootMode;

Description

The computer was started by using the basic files, drivers, and services necessary to start networking.

d) ToString

[C#] public const BootMode Normal;

[C++] public: const BootMode Normal;

[VB] Public Const Normal As BootMode

[JScript] public var Normal: BootMode;

Description

The computer was started in standard mode.

Border3DSide enumeration (System.Windows.Forms)

a) ToString

Description

Specifies the sides of a rectangle to apply a three-dimensional border to.

Use the members of this enumeration with the System.Windows.Forms.ControlPaint.DrawBorder3D(System.Drawing. Graphics, System.Drawing.Rectangle) method of the System.Windows.Forms.ControlPaint class.

b) ToString

[C#] public const Border3DSide All;

[C++] public: const Border3DSide All;

[VB] Public Const All As Border3DSide

[JScript] public var All: Border3DSide;

Description

A three-dimensional border on all four edges and fill the middle of the rectangle with the color defined for three-dimensional controls.

c) ToString

[C#] public const Border3DSide Bottom;

[C++] public: const Border3DSide Bottom;

[VB] Public Const Bottom As Border3DSide

[JScript] public var Bottom: Border3DSide;

Description

A three-dimensional border on the bottom side of the rectangle.

d) ToString

[C#] public const Border3DSide Left;

[C++] public: const Border3DSide Left;

[VB] Public Const Left As Border3DSide

[JScript] public var Left: Border3DSide;

Description

A three-dimensional border on the left edge of the control.

e) ToString

[C#] public const Border3DSide Middle;

[C++] public: const Border3DSide Middle;

[VB] Public Const Middle As Border3DSide

[JScript] public var Middle: Border3DSide;

Description

The interior of the rectangle is filled with the color defined for three-dimensional controls instead of the background color for the form.

f) ToString

[C#] public const Border3DSide Right;

[C++] public: const Border3DSide Right;

[VB] Public Const Right As Border3DSide

[JScript] public var Right: Border3DSide;

Description

A three-dimensional border on the right side of the rectangle.

g) ToString

[C+] public const Border3DSide Top;

[C++] public: const Border3DSide Top;

[VB] Public Const Top As Border3DSide

[JScript] public var Top: Border3DSide;

Description

A three-dimensional border on the top edge of the rectangle.

Border3DStyle enumeration (System.Windows.Forms)

a) ToString

Description

Specifies the style of a three-dimensional border.

Use the members of this enumeration when calling the System.Windows.Forms.ControlPaint.DrawBorder3D(System.Drawing. Graphics, System.Drawing.Rectangle) method of the System.Windows.Forms.ControlPaint class.

b) ToString

[C#] public const Border3DStyle Adjust;

[C++] public: const Border3DStyle Adjust;

[VB] Public Const Adjust As Border3DStyle

[JScript] public var Adjust: Border3DStyle;

Description

The border is drawn outside the specified rectangle, preserving the dimensions of the rectangle for drawing.

c) ToString

[C#] public const Border3DStyle Bump;

[C++] public: const Border3DStyle Bump;

[VB] Public Const Bump As Border3DStyle

[JScript] public var Bump: Border3DStyle;

Description

The inner and outer edges of the border have a raised appearance.

d) ToString

[C#] public const Border3DStyle Etched;

[C++] public: const Border3DStyle Etched;

[VB] Public Const Etched As Border3DStyle

[JScript] public var Etched: Border3DStyle;

Description

The inner and outer edges of the border have an etched appearance.

e) ToString

[C#] public const Border3DStyle Flat;

[C++] public: const Border3DStyle Flat;

[VB] Public Const Flat As Border3DStyle

[JScript] public var Flat: Border3DStyle;

Description

The border has no three-dimensional effects.

f) ToString

[C#] public const Border3DStyle Raised;

[C++] public: const Border3DStyle Raised;

[VB] Public Const Raised As Border3DStyle

[JScript] public var Raised: Border3DStyle;

Description

The border has raised inner and outer edges.

g) ToString

[C#] public const Border3DStyle RaisedInner;

[C++] public: const Border3DStyle RaisedInner;

[VB] Public Const RaisedInner As Border3DStyle

[JScript] public var RaisedInner: Border3DStyle;

Description

The border has a raised inner edge and no outer edge.

h) ToString

[C#] public const Border3DStyle RaisedOuter;

[C++] public: const Border3DStyle RaisedOuter;

[VB] Public Const RaisedOuter As Border3DStyle

[JScript] public var RaisedOuter: Border3DStyle;

Description

The border has a raised outer edge and no inner edge.

i) ToString

[C#] public const Border3DStyle Sunken;

[C++] public: const Border3DStyle Sunken;

[VB] Public Const Sunken As Border3DStyle

[JScript] public var Sunken: Border3DStyle;

Description

The border has sunken inner and outer edges.

j) ToString

[C#] public const Border3DStyle SunkenInner;

[C++] public: const Border3DStyle SunkenInner;

[VB] Public Const SunkenInner As Border3DStyle

[JScript] public var SunkenInner: Border3DStyle;

Description

The border has a sunken inner edge and no outer edge.

k) ToString

[C#] public const Border3DStyle SunkenOuter;

[C++] public: const Border3DStyle SunkenOuter;

[VB] Public Const SunkenOuter As Border3DStyle

[JScript] public var SunkenOuter: Border3DStyle;

Description

The border has a sunken outer edge and no inner edge.

BorderStyle enumeration (System.Windows.Forms)

a) ToString

Description

Specifies the border style for a control.

Use the members of this enumeration to set the border style for controls that have a changeable border.

b) ToString

[C#] public const BorderStyle Fixed3D;

[C++] public: const BorderStyle Fixed3D;

[VB] Public Const Fixed3D As BorderStyle

[JScript] public var Fixed3D: BorderStyle;

Description

A three-dimensional border.

c) ToString

[C#] public const BorderStyle FixedSingle;

[C++] public: const BorderStyle FixedSingle;

[VB] Public Const FixedSingle As BorderStyle

[JScript] public var FixedSingle: BorderStyle;

Description

A single-line border.

d) ToString

[C#] public const BorderStyle None;

[C++] public: const BorderStyle None;

[VB] Public Const None As BorderStyle

[JScript] public var None: BorderStyle;

Description

No border.

BoundsSpecified enumeration (System.Windows.Forms)

a) ToString

Description

Specifies the bounds of the control to use when defining a control's size and position.

Use the members of this enumeration when calling the System.Windows.Forms.Control.SetBoundsCore(System. Int32, System. Int32, System.Int32, System.Int32, System. Windows.Forms.BoundsSpecified) and System.Windows. Forms.Control.SetBounds(System.Int32, System.Int32, System.Int32, System.Int32) methods of the System.Windows. Forms.Control class.

b) ToString

[C#] public const BoundsSpecified All;

[C++] public: const BoundsSpecified All;

[VB] Public Const All As BoundsSpecified

[JScript] public var All: BoundsSpecified;

Description

Both System.Windows.Forms.Control.Location and System. Windows.Forms.Control.Size property values are defined.

c) ToString

[C#] public const BoundsSpecified Height;

[C++] public: const BoundsSpecified Height;

[VB] Public Const Height As BoundsSpecified

[JScript] public var Height: BoundsSpecified;

Description

Specifies the height of the control is defined.

d) ToString

[C#] public const BoundsSpecified Location;

[C++] public: const BoundsSpecified Location;

[VB] Public Const Location As BoundsSpecified

[JScript] public var Location: BoundsSpecified;

Description

Both X and Y coordinates of the control are defined.

e) ToString

[C#] public const BoundsSpecified None;

[C++] public: const BoundsSpecified None;

[VB] Public Const None As BoundsSpecified

[JScript] public var None: BoundsSpecified;

Description

No bounds are specified.

f) ToString

[C#] public const BoundsSpecified Size;

[C++] public: const BoundsSpecified Size;

[VB] Public Const Size As BoundsSpecified

[JScript] public var Size: BoundsSpecified;

Description

Both System.Windows.Forms.Control.Width and System.Windows.Forms.Control.Height property values of the control are defined.

g) ToString

[C#] public const BoundsSpecified Width;

[C++] public: const BoundsSpecified Width;

[VB] Public Const Width As BoundsSpecified

[JScript] public var Width: BoundsSpecified;

Description

Specifies the width of the control is defined.

h) ToString

[C#] public const BoundsSpecified X;

[C++] public: const BoundsSpecified X;

[VB] Public Const X As BoundsSpecified

[JScript] public var X: BoundsSpecified;

Description

Specifies the left edge of the control is defined.

i) ToString

[C#] public const BoundsSpecified Y;

[C++] public: const BoundsSpecified Y;

[VB] Public Const Y As BoundsSpecified

[JScript] public var Y: BoundsSpecified;

Description

Specifies the top edge of the control is defined.

Button class (System.Windows.Forms)

a) ToString

Description

Represents a Windows button control.

A System.Windows.Forms.Button may be clicked by using the mouse or the ENTER key if the button ha s focus.

b) Button

Example Syntax:

c) ToString

[C#] public Button( );

[C++] public: Button( );

[VB] Public Sub New( )

[JScript] public function Button( );

Description

Initializes a new instance of the System.Windows.Forms.Button class.

By default the System.Windows.Forms.Button displays no caption. To specify the caption text, set the System.Windows.Forms.Control.Text property.

d) AccessibilityObject
e) AccessibleDefaultActionDescription
f) AccessibleDescription
g) AccessibleName
h) AccessibleRole
i) AllowDrop
j) Anchor
k) BackColor
l) BackgroundImage
m) BindingContext
n) Bottom
o) Bounds
p) CanFocus
q) CanSelect
r) Capture
s) CausesValidation
t) ClientRectangle
u) ClientSize
v) CompanyName
w) Container
x) ContainsFocus
y) ContextMenu
z) Controls
aa) Created
bb) CreateParams
cc) ToString Description This is called when creating a window. Inheriting classes can override this to add extra functionality, but should not forget to first call base.CreateParams( ) to make sure the control continues to work correctly.

dd) Cursor
ee) DataBindings
ff) DefaultimeMode
gg) DefaultSize
hh) DesignMode
ii) DialogResult
jj) ToString Description Gets or sets a value that is returned to the parent form when the button is clicked.

If the value of this property is set to anything other than None, and if the parent form was displayed through the System.Windows.Forms.Form.ShowDialog method, clicking the button closes the parent form without your having to hook up any events. The form's System.Windows.Forms.Form.DialogResult property is then set to the System.Windows.Forms. Button.DialogResult of the button when the button is clicked.

kk) DisplayRectangle
ll) Disposing
mm) Dock
nn) Enabled
oo) Events
pp) FlatStyle
qq) Focused
rr) Font
ss) FontHeight
tt) ForeColor
uu) Handle
vv) HasChildren
ww) Height
xx) Image
yy) ImageAlign
zz) ImageIndex
aaa) ImageList
bbb) ImeMode
ccc) InvokeRequired
ddd) IsAccessible
eee) IsDefault
fff) IsDisposed
ggg) IsHandleCreated
hhh) Left
iii) Location
jjj) Name
kkk) Parent
lll) ProductName
mmm) ProductVersion
nnn) RecreatingHandle
ooo) Region
ppp) RenderRightToLeft
qqq) ResizeRedraw
rrr) Right
sss) RightToLeft
ttt) ShowFocusCues
uuu) ShowKeyboardCues
vvv) Site
www) Size
xxx) TabIndex
yyy) TabStop
zzz) Tag
aaaa) Text
bbbb) TextAlign
cccc) Top
dddd) TopLevelControl
eeee) Visible
ffff) Width
gggg) WindowTarget
hhhh) ToString
iiii) NotifyDefault

[C#] public virtual void NotifyDefault(bool value);

[C++] public: virtual void NotifyDefault(bool value);

[VB] Overridable Public Sub NotifyDefault(ByVal value As Boolean)

[JScript] public function NotifyDefault(value: Boolean);

Description

Notifies the System.Windows.Forms.Button whether it is the default button so that it can adjust its appearance accordingly.

This method is called by the parent form to notify the System.Windows.Forms.Button that it should be set as the default button and to allow it to adjust its appearance accordingly. Typically, a button that is the default button for a form has a thicker border than other buttons on the form. true if the button is to have the appearance of the default button; otherwise, false.

jjjj) OnClick

[C#] protected override void OnClick(EventArgs e);

[C++] protected: void OnClick(EventArgs* e);

[VB] Overrides Protected Sub OnClick(ByVal e As Event Args)

[JScript] protected override function OnClick(e: EventArgs);

Description

This method actually raises the Click event. Inheriting classes should override this if they wish to be notified of a Click event. (This is far preferable to actually adding an event handler.) They should not, however, forget to call base.onClick(e); before exiting, to ensure that other recipients do actually get the event. This event has no additional information besides the sender.

kkkk) OnMouseUp

[C#] protected override void OnMouseUp(MouseEventArgs mevent);

[C++] protected: void OnMouseUp(MouseEventArgs* mevent);

[VB] Overrides Protected Sub OnMouseUp(ByVal mevent As MouseEventArgs)

[JScript] protected override function OnMouseUp(mevent: MouseEventArgs);

Description

Raises the System.Windows.Forms.ButtonBase.OnMouseUp(System.Windows.For ms.MouseEvent Args) event. A System.Windows.Forms.MouseEventArgs that contains the event data.

llll) Perform Click

[C#] public void PerformClick( );

[C++] public: _sealed void PerformClick( );

[VB] NotOverridable Public Sub PerformClick( )

[JScript] public function PerformClick( );

Description

Generates a System.Windows.Forms.Control.Click event for a button.

This method can be called to raise the System.Windows. Forms.Control.Click event.

mmmm) ProcessMnemonic

[C+] protected override bool ProcessMnemonic (char charCode);

[C++] protected: bool ProcessMnemonic(_wcar_t charCode);

[VB] Overrides Protected Function ProcessMnemonic(ByVal charCode As Char) As Boolean

[JScript] protected override function ProcessMnemonic(char Code: Char): Boolean;

Description

Lets a control process mnmemonic characters. Inheriting classes can override this to add extra functionality, but should not forget to call base.ProcessMnemonic(charCode); to ensure basic functionality remains unchanged.

Return Value: boolean a boolean indicating whether the mnmemonic was processsed [consumed] or not. The mnemonic character entered.

nnnn) ToString

[C#] public override string ToString( );

[C++] public: String* ToString( );

[VB] Overrides Public Function ToString( ) As String

[JScript] public override function ToString( ): String;

Description

Provides some interesting information for the Button control in String form.

Return Value: A String.

oooo) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

The button's window procedure. Inheriting classes can override this to add extra functionality, but should not forget to call base.wndProc(m); to ensure the button continues to function properly. A Windows Message Object.

ButtonBase class (System.Windows.Forms)

a) WndProc

Description

Implements the basic functionality common to button controls.

You do not typically inherit from System.Windows.Forms.ButtonBase. To create your own button class, inherit from the System.Windows.Forms.Button, System.Windows.Forms.CheckBox, or System.Windows.Forms.RadioButton class.

b) ButtonBase

Example Syntax:

c) WndProc

[C#] protected ButtonBase( );

[C++] protected: ButtonBase( );

[VB] Protected Sub New( )

[JScript] protected function ButtonBase( );

Description

Initializes a new instance of the System.Windows.Forms.ButtonBase class. is d) AccessibilityObject
e) AccessibleDefaultActionDescription
f) AccessibleDescription
g) AccessibleName
h) AccessibleRole
i) AllowDrop
j) Anchor
k) BackColor
l) BackgroundImage
m) BindingContext
n) Bottom
o) Bounds
p) CanFocus
(q) CanSelect
r) Capture
s) CausesValidation
t) ClientRectangle
u) ClientSize
v) CompanyName
w) Container
x) ContainsFocus
y) ContextMenu
z) Controls
aa) Created
bb) CreateParams
cc) WndProc Description dd) Cursor
ee) DataBindings
ff) DefaultImeMode
gg) WndProc Description Gets the default Input Method Editor(IME) mode supported by this control.

As implemented in the System.Windows.Forms.ButtonBase class, this property always returns the System.Windows.Forms.ImeMode.Disable value.

hh) DefaultSize
ii) WndProc

[C#] protected override Size DefaultSize {get;}

[C++] protected: _property virtual Size get_DefaultSize( );

[VB] Overrides Protected ReadOnly Property DefaultSize As Size

[JScript] protected function get DefaultSize( ): Size;

Description

Deriving classes can override this to configure a default size for their control. This is more efficient than setting the size in the control's constructor.

jj) DesignMode
kk) DisplayRectangle
ll) Disposing
mm) Dock
nn) Enabled
oo) Events
pp) FlatStyle
qq) WndProc Description Gets or sets the flat style appearance of the button control.

When the System.Windows.Forms.ButtonBase.FlatStyle property of the System.Windows.Forms.RadioButton and System.Windows.Forms.CheckBox classes is set to System.Windows.Forms.FlatStyle.System, the control is drawn by the user's operating system and the check alignment is based upon the CheckAlign and System.Windows.Forms.ButtonBase.TextAlign property values. The CheckAlign property value is not changed, but the appearance of the control can be affected. The check box is horizontally aligned with either the left or right edge of the control (a left or center alignment appears left aligned, right remains unchanged), and vertically aligned the same as the descriptive text. For example, if you have a System.Windows.Forms.CheckBox control with a CheckAlign property value of System.Drawing.Content Alignment.MiddleCenter and a System.Windows.Forms. ButtonBase.TextAlign property value of System.Drawing. ContentAlignment.TopRight, and the System.Windows. Forms.ButtonBase.FlatStyle property value is set to System. Windows.Forms.FlatStyle.System, the check box alignment will appear to be System.Drawing.ContentAlignment.TopLeft while the text alignment remains unchanged.

rr) Focused
ss) Font
tt) FontHeight
uu) ForeColor
vv) Handle
ww) HasChildren
xx) Height
yy) Image
zz) WndProc Description Gets or sets the image that is displayed on a button control.

When the System.Windows.Forms.ButtonBase.Image property is set, the System.Windows.Forms.ButtonBase.ImageList property will be set to null, and the System. Windows.Forms.ButtonBase.ImageIndex property will be set to its default, −1.

aaa) ImageAlign
bbb) WndProc

[C#] public ContentAlignment ImageAlign {get; set;}

[C++] public: _property ContentAlignment get_Image Align( ); public: _property void set_ImageAlign(Content Alignment);

[VB] Public Property ImageAlign As ContentAlignment

[JScript] public function get ImageAlign( ): ContentAlignment; public function set ImageAlign(ContentAlignment);

Description

Gets or sets the alignment of the image on the button control.

ccc) ImageIndex
ddd) WndProc

[C#] public int ImageIndex {get; set;}

[C++] public: _property int get_ImageIndex( ); public: _property void set_ImageIndex(int);

[VB] Public Property ImageIndex As Integer

[JScript] public function get ImageIndex( ): int; public function set ImageIndex(int);

Description

Gets or sets the image list index value of the image displayed on the button control.

When the System.Windows.Forms.ButtonBase.ImageIndex or System.Windows.Forms.ButtonBase.ImageList properties are set, the System.Windows.Forms.ButtonBase.Image property is set to its default value, null eee) ImageList
fff) WndProc

[C#] public ImageList ImageList {get; set;}

[C++] public: _property ImageList* get_ImageList( ); public: _property void set_ImageList(ImageList*);

[VB] Public Property ImageList As ImageList

[JScript] public function get ImageList( ): ImageList; public function set ImageList(ImageList);

Description

Gets or sets the System.Windows.Forms.ImageList that contains the System.Drawing.Image displayed on a button control.

When the System.Windows.Forms.ButtonBase.ImageList or System.Windows.Forms.ButtonBase.ImageIndex property is set the System.Windows.Forms.ButtonBase.Image property will be set to its default value, null ggg) ImeMode
hhh) WndProc

[C#] public new ImeMode ImeMode {get; set;}

[C++] public: _property ImeMode get_ImeMode( ); public: _property void set_ImeMode(ImeMode);

[VB] Public Property ImeMode As ImeMode

[JScript] public function get ImeMode( ): ImeMode; public function set ImeMode(ImeMode);

Description

Gets or sets the Input Method Editor (IME) mode supported by this control.

iii) InvokeRequired
jjj) IsAccessible
kkk) IsDefault
lll) WndProc

Description

Gets or sets a value indicating whether the button control is the default button.

mmm) IsDisposed
nnn) IsHandleCreated
ooo) Left
ppp) Location
qqq) Name
rrr) Parent
sss) ProductName
ttt) ProductVersion
uuu) RecreatingHandle
vvv) Region
www) RenderRightToLeft
xxx) ResizeRedraw
yyy) Right
zzz) RightToLeft
aaaa) ShowFocusCues
bbbb) ShowKeyboardCues
cccc) Site
dddd) Size
eeee) TabIndex
ffff) TabStop
gggg) Tag
hhhh) Text
iiii) TextAlign
jjjj) WndProc Description Gets or sets the alignment of the text on the button control.

kkkk) Top
llll) TopLevelControl
mmmm) Visible
nnnn) Width
oooo) WindowTarget pppp) CreateAccessibilityInstance

[C#] protected override AccessibleObject CreateAccessibilityInstance( );

[C++] protected: AccessibleObject* CreateAccessibilityInstance( );

[VB] Overrides Protected Function CreateAccessibilityInstance( ) As AccessibleObject

[JScript] protected override function CreateAccessibilityInstance( ) AccessibleObject;

Description qqqq) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Removes hooks from the parent, and then calls the base class to perform all other cleanup rrrr) OnEnabledChanged

[C#] protected override void OnEnabledChanged(EventArgs e);

[C++] protected: void OnEnabledChanged(EventArgs* e);

[VB] Overrides Protected Sub OnEnabledChanged(ByVal e As EventArgs)

[JScript] protected override function OnEnabledChanged(e: EventArgs);

Description ssss) OnGotFocus

[C+] protected override void OnGotFocus(EventArgs e);

[C++] protected: void OnGotFocus(EventArgs* e);

[VB] Overrides Protected Sub OnGotFocus(ByVal e As EventArgs)

[JScript] protected override function OnGotFocus(e: EventArgs);

Description

Raises the System.Windows.Forms.ButtonBase.OnGotFocus(System.EventArgs) event.

Raising an event invokes the event handler through a delegate. For an overview, see. An System.EventArgs that contains the event data.

tttt) OnKeyDown

[C#] protected override void OnKeyDown(KeyEventArgs kevent);

[C++] protected: void OnKeyDown(KeyEventArgs* kevent);

[VB] Overrides Protected Sub OnKeyDown(ByVal kevent As KeyEventArgs)

[JScript] protected override function OnKeyDown(kevent: KeyEventArgs);

Description

Raises the System.Windows.Forms.ButtonBase.OnKeyUp (System.Windows.Forms. KeyEventArgs) event.

Raising an event invokes the event handler through a delegate. For an overview, see XXX. A System.Windows.Forms. KeyEventArgs that contains the event data.

uuuu) OnKeyUp

[C#] protected override void OnKeyUp(KeyEventArgs kevent);

[C++] protected: void OnKeyUp(KeyEventArgs* kevent);

[VB] Overrides Protected Sub OnKeyUp(ByVal kevent As KeyEventArgs)

[JScript] protected override function OnKeyUp(kevent: KeyEventArgs);

Description

Raises the System.Windows.Forms.ButtonBase.OnKeyUp (System.Windows.Forms. KeyEventArgs) event.

Raising an event invokes the event handler through a delegate. For an overview, see XXX. A System.Windows.Forms. KeyEventArgs that contains the event data.

vvvv) OnLostFocus

[C#] protected override void OnLostFocus(EventArgs e);

[C++] protected: void OnLostFocus(EventArgs* e);

[VB] Overrides Protected Sub OnLostFocus(ByVal e As EventArgs)

[JScript] protected override function OnLostFocus(e: Event Args);

Description

Raises the System.Windows.Forms.ButtonBase.OnLostFocus(System.EventArgs) event.

Raising an event invokes the event handler through a delegate. For an overview, see XXX. An System.EventArgs that contains the event data.

wwww) OnMouseDown

[C#] protected override void OnMouseDown(MouseEvent Args mevent);

[C++] protected: void OnMouseDown(MouseEventArgs* mevent);

[VB] Overrides Protected Sub OnMouseDown(ByVal mevent As MouseEventArgs)

[JScript] protected override function OnMouseDown (mevent: MouseEventArgs);

Description

Raises the System.Windows.Forms.Control.OnMouseDown (System.Windows.Forms.MouseEventArgs) event.

Raising an event invokes the event handler through a delegate. For an overview, see. A System.Windows.Forms.Mouse EventArgs that contains the event data.

xxxx) OnMouseEnter

[C#] protected override void OnMouseEnter(EventArgs eventargs);

[C++] protected: void OnMouseEnter(EventArgs* event args);

[VB] Overrides Protected Sub OnMouseEnter(ByVal event args As EventArgs)

[JScript] protected override function OnMouseEnter(event args: EventArgs);

Description

Raises the System.Windows.Forms.Control.OnMouseEnter (System.EventArgs) event.

Raising an event invokes the event handler through a delegate. For an overview, see. An System.EventArgs that contains the event data.

yyyy) OnMouseLeave

[C#] protected override void OnMouseLeave(EventArgs eventargs);

[C++] protected: void OnMouseLeave(EventArgs* event args);

[VB] Overrides Protected Sub OnMouseLeave(ByVal event args As EventArgs)

[JScript] protected override function OnMouseLeave(event args: EventArgs);

Description

Raises the System.Windows.Forms.Control.OnMouseLeave (System.EventArgs) event.

Raising an event invokes the event handler through a delegate. For an overview, see. An System.EventArgs that contains the event data.

zzzz) OnMouseMove

[C#] protected override void OnMouseMove(MouseEvent Args mevent);

[C++] protected: void OnMouseMove(MouseEventArgs* mevent);

[VB] Overrides Protected Sub OnMouseMove(ByVal mevent As MouseEventArgs)

[JScript] protected override function OnMouseMove (mevent: MouseEventArgs);

Description

Raises the System.Windows.Forms.Control.OnMouseMove (System.Windows.Form s.MouseEventArgs) event.

Raising an event invokes the event handler through a delegate. For an overview, see. A System.Windows.Forms.Mouse EventArgs that contains the event data.

aaaaa) OnMouseUp

[C#] protected override void OnMouseUp(MouseEventArgs mevent);

[C++] protected: void OnMouseUp(MouseEventArgs* mevent);

[VB] Overrides Protected Sub OnMouseUp(ByVal mevent As MouseEventArgs)

[JScript] protected override function OnMouseUp(mevent: MouseEventArgs);

Description

Raises the System.Windows.Forms.ButtonBase.OnMouseUp(System.Windows.Forms.MouseEvent Args) event.

Raising an event invokes the event handler through a delegate. For an overview, see XXX. A System.Windows.Forms.MouseEventArgs that contains the event data.

bbbbb) OnPaint

[C#] protected override void OnPaint(PaintEventArgs pevent);

[C++] protected: void OnPaint(PaintEventArgs* pevent);

[VB] Overrides Protected Sub OnPaint(ByVal pevent As PaintEventArgs)

[JScript] protected override function OnPaint(pevent: PaintEventArgs);

Description

Raises the System.Windows.Forms.ButtonBase.OnPaint (System.Windows.Forms.PaintEventArgs) event.

Raising an event invokes the event handler through a delegate. For an overview, see XXX. A System.Windows.Forms.PaintEventArgs that contains the event data.

ccccc) OnParentChanged

[C#] protected override void OnParentChanged(EventArgs e);

[C++] protected: void OnParentChanged(EventArgs* e);

[VB] Overrides Protected Sub OnParentChanged(ByVal e As EventArgs)

[JScript] protected override function OnParentChanged(e: EventArgs);

Description ddddd) OnTextChanged

[C#] protected override void OnTextChanged(EventArgs e);

[C++] protected: void OnTextChanged(EventArgs* e);

[VB] Overrides Protected Sub OnTextChanged(ByVal e As EventArgs)

[JScript] protected override function OnTextChanged(e: EventArgs);

Description eeeee) OnVisibleChanged

[C#] protected override void OnVisibleChanged(EventArgs e);

[C++] protected: void OnVisibleChanged(EventArgs* e);

[VB] Overrides Protected Sub OnVisibleChanged(ByVal e As EventArgs)

[JScript] protected override function OnVisibleChanged(e: EventArgs);

Description fffff) ResetFlagsandPaint

[C#] protected void ResetFlagsandPaint( );

[C++] protected: void ResetFlagsandPaint( );

[VB] Protected Sub ResetFlagsandPaint( )

[Jscript] protected function ResetFlagsandPaint( );

Description

Used for quick re-painting of the button after the pressed state.

ggggg) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

ButtonBase.ButtonBaseAccessibleObject class (System.Windows.Forms)

a) WndProc

Description b) ButtonBase.ButtonBaseAccessibleObject

Example Syntax:

c) WndProc

[C#] public ButtonBase.ButtonBaseAccessibleObject(Control owner);

[C++] public: ButtonBaseAccessibleObject(Control* owner);

[VB] Public Sub New(ByVal owner As Control)

[JScript] public function ButtonBase.ButtonBaseAccessibleObject(owner: Control);

Description d) Bounds e) DefaultAction f) Description g) Handle h) Help i) KeyboardShortcut j) Name k) Owner l) Parent m) Role n) State o) Value p) DoDefaultAction

[C#] public override void DoDefaultAction( );

[C++] public: void DoDefaultAction( );

[VB] Overrides Public Sub DoDefaultAction( )

[JScript] public override function DoDefaultAction( );

Description

ButtonBorderStyle enumeration (System.Windows.Forms)

a) UseStdAccessibleObjects

Description

Specifies the border style for a button control.

This enumeration is used by members such as System.Windows.Forms.ControlPaint.DrawBorder(System.Drawing.Graphics, System.Drawing.Rectangle, System.Drawing.Color, System.Windows.Forms.ButtonBorderStyle).

b) UseStdAccessibleObjects

[C#] public const ButtonBorderStyle Dashed;

[C++] public: const ButtonBorderStyle Dashed;

[VB] Public Const Dashed As ButtonBorderStyle

[JScript] public var Dashed: ButtonBorderStyle;

Description

A dashed border.

c) UseStdAccessibleObjects

[C#] public const ButtonBorderStyle Dotted;

[C++] public: const ButtonBorderStyle Dotted;

[VB] Public Const Dotted As ButtonBorderStyle

[JScript] public var Dotted: ButtonBorderStyle;

Description

A dotted-line border.

d) UseStdAccessibleObjects

[C#] public const ButtonBorderStyle Inset;

[C++] public: const ButtonBorderStyle Inset;

[VB] Public Const Inset As ButtonBorderStyle

[JScript] public var Inset: ButtonBorderStyle;

Description

A sunken border.

e) UseStdAccessibleObjects

[C#] public const ButtonBorderStyle None;

[C++] public: const ButtonBorderStyle None;

[VB] Public Const None As ButtonBorderStyle

[JScript] public var None: ButtonBorderStyle;

Description

No border.

f) UseStdAccessibleObjects

[C#] public const ButtonBorderStyle Outset;

[C++] public: const ButtonBorderStyle Outset;

[VB] Public Const Outset As ButtonBorderStyle

[JScript] public var Outset: ButtonBorderStyle;

Description

A raised border.

g) UseStdAccessibleObjects

[C#] public const ButtonBorderStyle Solid;

[C++] public: const ButtonBorderStyle Solid;

[VB] Public Const Solid As ButtonBorderStyle

[JScript] public var Solid: ButtonBorderStyle;

Description

A solid border.

ButtonState enumeration (System.Windows.Forms)

a) ToString

Description

Specifies the appearance of a button.

b) ToString

[C#] public const ButtonState All;

[C++] public: const ButtonState All;

[VB] Public Const All As ButtonState

[JScript] public var All: ButtonState;

Description

All flags except Normal are set.

c) ToString

[C#] public const ButtonState Checked;

[C++] public: const ButtonState Checked;

[VB] Public Const Checked As ButtonState

[JScript] public var Checked: ButtonState;

Description

The button has a checked or latched appearance. Use this appearance to show that a toggle button has been pressed.

d) ToString

[C#] public const ButtonState Flat;

[C++] public: const ButtonState Flat;

[VB] Public Const Flat As ButtonState

[JScript] public var Flat: ButtonState;

Description

The button has a flat, two-dimensional appearance.

e) ToString

[C#] public const ButtonState Inactive;

[C++] public: const ButtonState Inactive;

[VB] Public Const Inactive As ButtonState

[JScript] public var Inactive: ButtonState;

Description

The button is inactive (grayed).

f) ToString

[C#] public const ButtonState Normal;

[C++] public: const ButtonState Normal;

[VB] Public Const Normal As ButtonState

[JScript] public var Normal: ButtonState;

Description

The button has its normal appearance (three-dimensional).

g) ToString

[C#] public const ButtonState Pushed;

[C++] public: const ButtonState Pushed;

[VB] Public Const Pushed As ButtonState

[JScript] public var Pushed: ButtonState;

Description

The button appears pressed.

CaptionButton enumeration (System.Windows.Forms)

a) ToString

Description

Specifies the type of caption button to display.

This enumeration is used by members such as System.Windows.Forms.ControlPaint.DrawCaptionButton(System.Drawing.Graphics, System.Drawing.Rectangle, System.Windows. Forms.CaptionButton, System.Windows.Forms.ButtonState).

b) ToString

[C#] public const CaptionButton Close;

[C++] public: const CaptionButton Close;

[VB] Public Const Close As CaptionButton

[JScript] public var Close: CaptionButton;

Description

A Close button.

c) ToString

[C#] public const CaptionButton Help;

[C++] public: const CaptionButton Help;

[VB] Public Const Help As CaptionButton

[JScript] public var Help: CaptionButton;

Description

A Help button.

d) ToString

[C#] public const CaptionButton Maximize;

[C++] public: const CaptionButton Maximize;

[VB] Public Const Maximize As CaptionButton

[JScript] public var Maximize: CaptionButton;

Description

A Maximize button.

e) ToString

[C#] public const CaptionButton Minimize;

[C++] public: const CaptionButton Minimize;

[VB] Public Const Minimize As CaptionButton

[JScript] public var Minimize: CaptionButton;

Description

A Minimize button.

f) ToString

[C#] public const CaptionButton Restore;

[C++] public: const CaptionButton Restore;

[VB] Public Const Restore As CaptionButton

[JScript] public var Restore: CaptionButton;

Description

A Restore button.

CharacterCasing enumeration (System.Windows.Forms)

a) ToString

Description

Specifies the case of characters in a System.Windows.Forms.TextBox control.

Use the members of this enumeration to set the value of the System.Windows.Forms.TextBox.CharacterCasing property of the System.Windows.Forms.TextBox control.

b) ToString

[C#] public const CharacterCasing Lower;

[C++] public: const CharacterCasing Lower;

[VB] Public Const Lower As CharacterCasing

[JScript] public var Lower: CharacterCasing;

Description

Converts all characters to lowercase.

c) ToString

[C#] public const CharacterCasing Normal;

[C++] public: const CharacterCasing Normal;

[VB] Public Const Normal As CharacterCasing

[JScript] public var Normal: CharacterCasing;

Description

The case of characters is left unchanged.

d) ToString

[C#] public const CharacterCasing Upper;

[C++] public: const CharacterCasing Upper;

[VB] Public Const Upper As CharacterCasing

[JScript] public var Upper: CharacterCasing;

Description

Converts all characters to uppercase.

CheckBox class (System.Windows.Forms)

a) ToString

Description

Represents a Windows check box.

Use a System.Windows.Forms.CheckBox to give the user an option, such as true/false or yes/no. The check box control can display an image or text or both.

b) CheckBox

Example Syntax:

c) ToString

[C#] public CheckBox( );

[C++] public: CheckBox( );

[VB] Public Sub New( )

[JScript] public function CheckBox( );

Description

Initializes a new instance of the System.Windows.Forms.CheckBox class.

By default, when a new System.Windows.Forms.CheckBox is instantiated, System.Windows.Forms.CheckBox.AutoCheck is set to true, System.Windows.Forms.CheckBox.Checked is set to false, and System.Windows.Forms.CheckBox.Appearance is set to Normal.

d) AccessibilityObject e) AccessibleDefaultActionDescription j) AccessibleDescription g) AccessibleName h) AccessibleRole i) AllowDrop j) Anchor k) Appearance l) ToString Description Gets or sets the value that determines the appearance of a check box control.

If System.Windows.Forms.CheckBox.Appearance value is set to Appearance.Normal, the check box has a typical appearance. If the value is set to Button, the check box appears like a toggle button, which may be toggled to an up or down state.

m) AutoCheck n) ToString

[C#] public bool AutoCheck {get; set;}

[C++] public: _property bool get AutoCheck( ); public: _property void set_AutoCheck(bool);

[VB] Public Property AutoCheck As Boolean

[JScript] public function get AutoCheck( ): Boolean; public function set AutoCheck(Boolean);

Description

Gets or set a value indicating whether the System.Windows.Forms.CheckBox.Checked or System.Windows.Forms.CheckBox.CheckState values and the check box's appearance are automatically changed when the check box is clicked.

If System.Windows.Forms.CheckBox.AutoCheck is set to false, you will need to add code to update the System.Windows.Forms.CheckBox.Checked or System.Windows.Forms. CheckBox.CheckState values in the System.Windows.Forms.Control.Click event handler.

o) BackColor p) BackgroundImage q) BindingContext r) Bottom s) Bounds t) CanFocus u) CanSelect v) Capture w) CausesValidation x) CheckAlign y) ToString Description Gets or sets the horizontal and vertical alignment of a check box on a check box control.

z) Checked aa) ToString

[C#] public bool Checked {get; set;}

[C++] public: _property bool get Checked( ); public: _property void set_Checked(bool);

[VB] Public Property Checked As Boolean

[JScript] public function get Checked( ): Boolean; public function set Checked(Boolean);

Description

Gets or set a value indicating whether the check box is in the checked state.

When the value is true, the check box portion of the control displays a check mark. If the System.Windows.Forms.CheckBox.Appearance property is set to Button, the control will appear sunken when System.Windows.Forms.CheckBox.Checked is true and raised like a standard button when false.

bb) CheckState cc) ToString

[C#] public CheckState CheckState {get; set;}

[C++] public: _iroperty CheckState get_CheckState( ); public: _property void set_CheckState(CheckState);

[VB] Public Property CheckState As CheckState

[JScript] public function get CheckState( ): CheckState; public function set CheckState(CheckState);

Description

Gets or sets the state of the check box.

If the System.Windows.Forms.CheckBox.ThreeState property is set to false, the System.Windows.Forms.CheckBox.CheckState property value may only be set to CheckState.Indeterminate in code and not by user interaction.

dd) ClientRectangle
ee) ClientSize
ff) CompanyName
gg) Container
hh) ContainsFocus
ii) ContextMenu
jj) Controls
kk) Created
ll) CreateParams
mm) ToString Description Gets the information used to create the handle for the System.Windows.Forms.CheckBox control.

nn) Cursor
oo) DataBindings
pp) DefaultImeMode
qq) DefaultSize
rr) ToString

Description

Deriving classes can override this to configure a default size for their control. This is more efficient than setting the size in the control's constructor.

ss) DesignMode
tt) DisplayRectangle
uu) Disposing
vv) Dock
ww) Enabled
xx) Events
yy) FlatStyle
zz) Focused
aaa) Font
bbb) FontHeight
ccc) ForeColor
ddd) Handle
eee) HasChildren
fff) Height
ggg) Image
hhh) ImageAlign
iii) ImageIndex
jjj) ImageList
kkk) ImeMode
lll) InvokeRequired
mmm) IsAccessible
nnn) IsDefault
ooo) IsDisposed
ppp) IsHandleCreated
qqq) Left
rrr) Location
sss) Name
ttt) Parent
uuu) ProductName
vvv) ProductVersion
www) RecreatingHandle
xxx) Region
yyy) RenderRightToLeft
zzz) ResizeRedraw
aaaa) Right
bbbb) RightToLeft
cccc) ShowFocusCues
dddd) ShowKeyboardCues
eeee) Site
ffff) Size
gggg) TabIndex
hhhh) TabStop
iiii) Tag
jjjj) Text
kkkk) TextAlign
llll) ToString Description Gets or sets a value indicating the alignment of the text on the checkbox control.

mmmm) ThreeState
nnnn) ToString

[C#] public bool ThreeState {get; set;}

[C++] public: _property bool get_ThreeState( ); public: _property void set_ThreeState(bool);

[VB] Public Property ThreeState As Boolean

[JScript] public function get ThreeState( ): Boolean; public function set ThreeState(Boolean);

Description

Gets or sets a value indicating whether the check box will allow three check states rather than two.

If the System.Windows.Forms.CheckBox.ThreeState property is set to false, the System.Windows.Forms.CheckBox.CheckState property value may only be set to CheckState.Indeterminate in code and not by user interaction.

oooo) Top
pppp) TopLevelControl
qqqq) Visible
rrrr) Width
ssss) WindowTarget
tttt) ToString Description Occurs when the value of the System.Windows.Forms.CheckBox.Appearance property changes.

For more information about handling events, see.

uuuu) ToString

Description

Occurs when the value of the System.Windows.Forms.CheckBox.Checked property changes.

For more information about handling events, see.

vvvv) ToString

[C#] public event EventHandler CheckStateChanged;

[C++] public: _event EventHandler* CheckStateChanged;

[VB] Public Event CheckStateChanged As EventHandler

Description

Occurs when the value of the System.Windows.Forms.CheckBox.CheckState property changes. For more information about handling events, see.

wwww) CreateAccessibilityInstance

[C#] protected override AccessibleObject CreateAccessibilityInstance( );

[C++] protected: AccessibleObject* CreateAccessibilityInstance( );

[VB] Overrides Protected Function CreateAccessibilityInstance( ) As AccessibleObject

[JScript] protected override function CreateAccessibilityInstance( ): AccessibleObject;

Description

Constructs the new instance of the accessibility object for this control. Subclasses should not call base.CreateAccessibilityObject.

xxxx) OnAppearanceChanged

[C#] protected virtual void OnAppearanceChanged(Event Args e);

[C++] protected: virtual void OnAppearanceChanged(Event Args* e);

[VB] Overridable Protected Sub OnAppearanceChanged (ByVal e As EventArgs)

[JScript] protected function OnAppearanceChanged(e: EventArgs);

Description

Raises the System.Windows.Forms.CheckBox.AppearanceChanged event.

Raising an event invokes the event handler through a delegate. For more information, see. An System.EventArgs that contains the event data.

yyyy) OnCheckedChanged

[C+] protected virtual void OnCheckedChanged(EventArgs e);

[C++] protected: virtual void on CheckedChanlged(Event Args* e);

[VB] Overridable Protected Sub OnCheckedChanged(ByVal e As EventArgs)

[JScript] protected function OnCheckedChanged(e: Event Args);

Description

Raises the System.Windows.Forms.CheckBox. Checked-Changed event.

Raising an event invokes the event handler through a delegate. For more information, see. An System.EventArgs that contains the event data.

zzzz) OnCheckStateChanged

[C#] protected virtual void OnCheckStateChanged(Event Args e);

[C++] protected: virtual void onCheckStateChanged(Event Args* e);

[VB] Overridable Protected Sub OnCheckStateChanged(ByVal e As EventArgs)

[JScript] protected function OnCheckStateChanged(e: Event Args);

Description

Raises the System.Windows. Forms.CheckBox.CheckState Changed event.

Raising an event invokes the event handler through a delegate. For more information, see. An System.EventArgs that contains the event data.

aaaaa) On Click

[C#] protected override void OnClick(EventArgs e);

[C++] protected: void OnClick(EventArgs* e);

[VB] Overrides Protected Sub OnClick(ByVal e As Event Args)

[JScript] protected override function OnClick(e: EventArgs);

Description

Fires the event indicating that the control has been clicked. Inheriting controls should use this in favour of actually listening to the event, but should not forget to call base.onClicked( ) to ensure that the event is still fired for external listeners.

bbbbb) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

We override this to ensure that the control's click values are set up correctly.

ccccc) OnMouseUp

[C++] protected override void OnMouseUp(MouseEvent Args mevent);

[C++] protected: void OnMouseUp(MouseEventArgs* mevent);

[VB] Overrides Protected Sub OnMouseUp(ByVal mevent As MouseEventArgs)

[JScript] protected override function OnMouseUp(mevent: MouseEventArgs);

Description

Raises the System.Windows. Forms. ButtonBase.OnMouseUp(System.Windows. For ms.MouseEventArgs) event.

ddddd) ProcessMnemonic

[C#] protected override bool ProcessMnemonic (char charCode);

[C++] protected: bool ProcessMnemonic(_wchar_t charcode);

[VB] Overrides Protected Function ProcessMnemonic(ByVal charCode As Char) As Boolean

[JScript] protected override function ProcessMnemonic(char Code: Char): Boolean; Overridden to handle mnemonics properly.

eeeee) ToString

[C#] public override string ToString( );

[C++] public: String* ToString( );

[VB] Overrides Public Function ToString( ) As String

[JScript] public override function ToString( ): String;

Description

Provides some interesting information for the CheckBox control in String form.

CheckBox.CheckBoxAccessibleObject class (System.Windows.Forms)

a) WndProc

Description b) CheckBox. CheckBoxAccessibleObject

Example Syntax:

c) WndProc

[C#] public CheckBox.CheckBoxAccessibleObject(Control owner);

[C++] public: CheckBoxAccessibleObject(Control* owner);

[VB] Public Sub New(ByVal owner As Control)

[JScript] public function CheckBox.CheckBoxAccessibleObject(owner: Control);

Description d) Bounds e) DefaultAction f) WndProc

Description g) Description h) Handle i) Help j) KeyboardShortcut k) Name l) Owner m) Parent n) Role o) WndProc Description p) State q) WndProc

[C#] public override AccessibleStates State {get;}

[C++] public: _property virtual AccessibleStates get_State( );

[VB] Overrides Public ReadOnly Property State As AccessibleStates

[JScript] public function get State( ): AccessibleStates;

Description r) Value

CheckedListBox.CheckedIndexCollection class (System.Windows.Forms)

a) UseStdAccessibleObjects

Description

Encapsulates the collection of indexes of checked items (including items in an indeterminate state) in a System.Windows.Forms.CheckedListBox.

The checked indexes collection is a subset of the indexes into the collection of all items in the System.Windows.Forms.CheckedListBox control. These indexes specify items in a checked or indeterminate state.

b) Count c) UseStdAccessibleObjects

[C#] public int Count {get;}

[C++] public: _property int get_Count( );

[VB] Public ReadOnly Property Count As Integer

[JScript] public function get Count( ): int;

Description

Gets the number of checked items.

d) IsReadOnly e) UseStdAccessibleObjects

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the collection is read-only.

f) Item g) UseStdAccessibleObjects

[C#] public int this[int index] {get;}

[C++] public: _property int get_Item(int index);

[VB] Public Default ReadOnly Property Item(ByVal index As Integer) As Integer

[JScript] returnValue=CheckedIndexCollectionObject.Item (index);

Description

Gets the index of a checked item in the System.Windows.Forms.CheckedListBox control.

The index parameter is an index into the checked indexes collection. The return value is the corresponding indexed value, which is the index of the checked item in the items collection. An index into the checked indexes collection. This index specifies the index of the checked item you want to retrieve.

h) Contains

[C#] public bool Contains(int index);

[C++] public: bool Contains(int index);

[VB] Public Function Contains(ByVal index As Integer) As Boolean

[JScript] public function Contains(index: int): Boolean;

Description

Determines whether the specified index is located in the collection.

Return Value: true if the specified index from the System.Windows.Forms.CheckedListBox.ObjectCollection is an item in this collection; otherwise, false You can use this method to determine whether an index from the System.Windows.Forms.CheckedListBox.Items collection is in the System.Windows.Forms. CheckedListBox.CheckedIndices collection. The index to locate in the collection.

i) CopyTo

[C#] public void CopyTo(Array dest, int index);

[C++] public: _sealed void CopyTo(Array* dest, int index);

[VB] NotOverridable Public Sub CopyTo(ByVal dest As Array, ByVal index As Integer)

[JScript] public function CopyTo(dest: Array, index: int);

Description

Copies the entire collection into an existing array at a specified location within the array.

You can use this method to combine the selected indexes from multiple collections into a single array. The destination array. The zero-based relative index in destat which copying begins.

j) GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumerator that can be used to iterate through the System.Windows.Forms.CheckedListBox. CheckedIndices collection.

Return Value: An System.Collections.IEnumerator for navigating through the list.

k) Indexof

[C#] public int IndexOf(int index);

[C++] public: int IndexOf(int index);

[VB] Public Function IndexOf(ByVal index As Integer) As Integer

[JScript] public function IndexOf(index: int): int;

Description

Returns an index into the collection of checked indexes.

Return Value: The index that specifies the index of the checked item or −1 if the index parameter is not in the checked indexes collection. For more information, see the examples in the System.Windows.Forms.CheckedListBox. CheckedIndexCollection class overview.

The index parameter is the index of a checked item in the items collection. The return value is the corresponding index into the checked indexes collection. The index of the checked item.

l) IList.Add

[C#] int IList.Add(object value);

[C++] int IList::Add(Object* value);

[VB] Function Add(ByVal value As Object) As Integer Implements IList.Add

[JScript] function IList.Add(value: Object): int;

m) IList.Clear

[C#] void IList.Clear( );

[C++] void IList::Clear( );

[VB] Sub Clear( ) Implements IList.Clear

[JScript] function IList.Clear( );

n) IList.Contains

[C#] bool IList.Contains(object index);

[C++] bool IList::Contains(Object* index);

[VB] Function Contains(ByVal index As Object) As Boolean Implements IList.Contains

[JScript] function IList.Contains(index: Object): Boolean;

o) IList.IndexOf

[C#] int IList.IndexOf(object index);

[C++] int IList::IndexOf(Object* index);

[VB] Function IndexOf(ByVal index As Object) As Integer Implements IList.IndexOf

[JScript] function IList.IndexOf(index: Object): int;

p) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

q) IList.Remove

[C#] void IList.Remove(object value);

[C++] void IList::Remove(Object* value);

[VB] Sub Remove(ByVal value As Object) Implements IList. Remove

[JScript] function IList.Remove(value: Object);

r) IList.RemoveAt

[C#] void IList.RemoveAt(int index);

[C++] void IList::RemoveAt(int index);

[VB] Sub RemoveAt(ByVal index As Integer) Implements IList.RemoveAt

[JScript] function IList.RemoveAt(index: int);

ListView.CheckedIndexCollection class (System.Windows.Forms)

a) ToString

Description b) ListView. CheckedIndexCollection

Example Syntax:

c) ToString

[C#] public ListView.CheckedIndexCollection(ListView owner);

[C++] public: CheckedIndexCollection(ListView* owner);

[VB] Public Sub New(ByVal owner As ListView)

[JScript] public function ListView.CheckedIndexCollection (owner: ListView);

Description d) Count e) ToString

[C#] public int Count {get;}

[C++] public: _property int get_Count( );

[VB] Public ReadOnly Property Count As Integer

[JScript] public function get Count( ): int;

Description

Gets the number of currently selected items.

f) IsReadOnly
g) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets whether the collection is read-only.
h) Item
i) ToString

[C#] public int this[int index] {get;}

[C++] public: _property int get_Item(int index);

[VB] Public Default ReadOnly Property Item(ByVal index As Integer) As Integer

[JScript] returnValue CheckedIndexCollectionObject.Item (index);

Description

Selected item in the list.
j) Contains

[C#] public bool Contains(int checkedIndex);

[C++] public: bool Contains(int checkedIndex);

[VB] Public Function Contains(ByVal checkedIndex As Integer) As Boolean

[JScript] public function Contains(checkedIndex: int): Boolean;

Description
k) GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description
l) IndexOf

[C#] public int IndexOf(int checkedIndex);

[C++] public: int IndexOf(int checkedIndex);

[VB] Public Function IndexOf(ByVal checkedIndex As Integer) As Integer

[JScript] public function IndexOf(checkedIndex: int): int;

Description
m) ICollection.CopyTo

[C#] void ICollection.CopyTo(Array dest, int index);

[C++] void ICollection::CopyTo(Array* dest, int index);

[VB] Sub CopyTo(ByVal dest As Array, ByVal index As Integer) Implements ICollection.CopyTo

[JScript] function ICollection.CopyTo(dest: Array, index: int);
n) IListAdd

[C#] int IList.Add(object value);

[C++] int IList::Add(Object* value);

[VB] Function Add(ByVal value As Object) As Integer Implements IList.Add

[JScript] function IList.Add(value: Object) int;
o) IList. Clear

[C#] void IList.Clear( );

[C++] void IList::Clear( );

[VB] Sub Clear( ) Implements IList.Clear

[JScript] function IList.Clear( );
p) IList.Contains

[C#] bool IList.Contains(object checkedIndex);

[C++] bool IList::Contains(Object* checkedIndex);

[VB] Function Contains(ByVal checkedIndex As Object) As Boolean Implements IList.Contains

[JScript] function IList.Contains(checkedIndex: Object): Boolean;
q) IList.IndexOf

[C#] int IList.IndexOf(object checkedIndex);

[C++] int IList::indexOf(Object* checkedIndex);

[VB] Function IndexOf(ByVal checkedIndex As Object) As Integer Implements IList.IndexOf

[JScript] function IList.IndexOf(checkedIndex: Object): int;
r) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index int, value: Object);
s) IList.Remove

[C#] void IList.Remove(object value);

[C++] void IList::Remove(Object* value);

[VB] Sub Remove(ByVal value As Object) Implements IList. Remove

[JScript] function IList.Remove(value: Object);
t) IList.RemoveAt

[C#] void IList.RemoveAt(int index);

[C++] void IList::RemoveAt(int index);

[VB] Sub RemoveAt(ByVal index As Integer) Implements IList.RemoveAt

[JScript] function IList.RemoveAt(index: int);

CheckedListBox.CheckedItemCollection class (System. Windows.Forms)
a) ToString

Description

Encapsulates the collection of checked items (including items in an indeterminate state) in a System.Windows.Forms. CheckedListBox control.

The checked items collection is a subset of all items in the System.Windows.Forms.CheckedListBox control; it contains only those items that are in a checked or indeterminate state.

b) Count
c) ToString

[C#] public int Count {get;}

[C++] public: _property int get_Count( );

[VB] Public ReadOnly Property Count As Integer

[JScript] public function get Count( ): int;

Description

Gets the number of items in the collection.
d) IsReadOnly
e) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating if the collection is read-only.
f) A Item
g) ToString

[C#] public object this[int index] {get; set;}

[C++] public: _property Object* get_Item(int index); public: _property void set_Item(int index, Object*);

[VB] Public Default Property Item(ByVal index As Integer) As Object

[JScript] returValue=CheckedItemCollectionObject.Item(index); CheckedItemCollectionObject.Item(in dex)=returnValue;

Description

Gets an object in the checked items collection.

The System.Windows.Forms.CheckedListBox.CheckedItems collection is a subset of the objects in the System.Windows.Forms.CheckedListBox.Items collection, representing only items that are checked. This collection is ordered in ascending order. An index into the collection of checked items. This collection index corresponds to the index of the checked item.
h) Contains

[C#] public bool Contains(object item);

[C++] public: _sealed bool Contains(Object* item);

[VB] NotOverridable Public Function Contains(ByVal item As Object) As Boolean

[JScript] public function Contains(item: Object): Boolean;

Description

Determines whether the specified item is located in the collection.

Return Value: true if item is in the collection; otherwise, false.

This method determines if an object from the System.Windows.Forms.CheckedListBox.Items collection is in the System.Windows.Forms.CheckedListBox.CheckedItems collection. An object from the items collection.
i) CopyTo

[C#] public void CopyTo(Array dest, int index);

[C++] public: sealed void CopyTo(Array* dest, int index);

[VB] NotOverridable Public Sub CopyTo(ByVal dest As Array, ByVal index As Integer)

[JScript] public function CopyTo(dest: Array, index: int);

Description

Copies the entire collection into an existing array at a specified location within the array.

You can use this method to combine the selected indexes from multiple collections into a single array. The destination array. The zero-based relative index in destat which copying begins.
j) GetEnumerator

[C#] public IEnumerator GetEnumerator( );

[C++] public: _sealed Ienumerator* GetEnumerator( );

[VB] NotOverridable Public Function GetEnumerator( ) As IEnumerator

[JScript] public function GetEnumerator( ): IEnumerator;

Description

Returns an enumerator that can be used to iterate through the System.Windows.Forms.CheckedListBox.CheckedItems collection.

Return Value: An System.Collections.IEnumerator for navigating through the list.
k) IndexOf

[C#] public int IndexOf(object item);

[C++] public: _sealed int IndexOf(Object* item);

[VB] NotOverridable Public Function IndexOf(ByVal item As Object) As Integer

[JScript] public function IndexOf(item: Object): int;

Description

Returns an index into the collection of checked items.

Return Value: The index of the object in the checked item collection or −1 if the object is not in the collection. For more information, see the examples in the System.Windows-.Forms. CheckedListBox.CheckedItemCollection class overview.

The System.Windows.Forms.CheckedListBox.CheckedItems collection is a subset of the objects in the System.Windows.Forms.CheckedListBox.Items collection, representing only items that are checked. This collection is ordered in ascending order. The object whose index you want to retrieve. This object must belong to the checked items collection.
l) IList.Add

[C#] int IList.Add(object value);

[C++] int IList::Add(Object* value);

[VB] Function Add(ByVal value As Object) As Integer Implements IList.Add

[JScript] function IList.Add(value: Object): int;
m) IList.Clear

[C#] void IList.Clear( );

[C++] void IList::Clear( );

[VB] Sub Clear( ) Implements IList.Clear

[JScript] function IList.Clear( );

n) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

o) IList.Remove

[C#] void IList.Remove(object value);

[C++] void IList::Remove(Object* value);

[VB] Sub Remove(ByVal value As Object) Implements IList.Remove

[JScript] function IList.Remove(value: Object);

p) IList.RemoveAt

[C#] void IList.RemoveAt(int index);

[C++] void IList::RemoveAt(int index);

[VB] Sub RemoveAt(ByVal index As Integer) Implements IList.RemoveAt

[JScript] function IList.RemoveAt(index: int);

CheckedListBox class (System.Windows.Forms)

a) ToString

Description

Displays a System.Windows.Forms.ListBox in which a check box is displayed to the left of each item.

This control presents a list of items that the user can navigate by using the keyboard or the scrollbar on the right side of the control. The user can place a check mark by one or more items and the checked items can be navigated with the System.Windows.Forms.CheckedListBox.CheckedItemCollection and System.Windows.Forms.CheckedListBox. CheckedIndexCollection.

b) CheckedListBox

Example Syntax:

c) ToString

[C#] public CheckedListBox( );

[C++] public: CheckedListBox( );

[VB] Public Sub New( )

[JScript] public function CheckedListBox( );

Description

Initializes a new instance of the System.Windows.Forms.CheckedListBox class.

By default, System.Windows.Forms.CheckedListBox uses System.Windows.Forms.Control.SetStyle(System.Windows.Forms.Cont rolStyles, System.Boolean) and System.Windows.Forms.ControlStyles.ResizeRedraw to specify that the control is redrawn when resized.

d) AccessibilityObject e) AccessibleDefaultActionDescription f) AccessibleDescription g) AccessibleName h) AccessibleRole i) AllowDrop j) Anchor k) BackColor l) BackgroundImage m) BindingContext n) BorderStyle o) Bottom p) Bounds q) CanFocus r) CanSelect s) Capture t) CausesValidation u) CheckedIndices v) ToString Description Collection of checked indexes in this System.Windows.Forms.CheckedListBox.

The collection of checked indexes is a subset of the indexes into the collection of all items in the System.Windows.Forms.CheckedListBox control. These indexes specify items in a checked or indeterminate state.

w) CheckedItems x) ToString

[C#] public CheckedListBox.CheckedItemCollection CheckedItems {get;}

[C++] public: _property CheckedListBox.CheckedItemCollection* get_CheckedItemso;

[VB] Public ReadOnly Property CheckedItems As CheckedListBox.CheckedItemCollection

[JScript] public function get CheckedItems( ): CheckedListBox.CheckedItemCollection;

Description

Collection of checked items in this System.Windows.Forms.CheckedListBox

The collection is a subset of the objects in the System.Windows.Forms.CheckedListBox.Items collection, representing only those items that are in a state of System.Windows.Forms. CheckState.Checked or System.Windows.Forms.CheckState.Indeterminate. The indexes in this collection are in ascending order.

y) CheckOnClick z) ToString

[C#] public bool CheckOnClick {get; set;}

[C++] public: _property bool get CheckOnClick( ); public: _property void set_CheckOnClick(bool);

[VB] Public Property CheckOnClick As Boolean

[JScript] public function get CheckOnClick( ): Boolean; public function set CheckOnClick(Boolean);

Description

Gets or sets a value indicating whether the check box should be toggled when an item is selected.

System.Windows.Forms.CheckedListBox.CheckOnClick indicates whether the check box should be toggled whenever an item is selected. The default behavior is to change the selection on the first click, and then have the user click again to apply the check mark. In some instances, however, you might prefer have the item checked as soon as it is clicked.

aa) ClientRectangle bb) ClientSize cc) Column Width dd) CompanyName ee) Container ff) ContainsFocus gg) ContextMenu hh) Controls ii) Created jj) CreateParams kk) ToString Description This property is read-only.

This is called when creating a window. Inheriting classes can override this to add extra functionality, but should not forget to first call base.CreateParams( ) to make sure the control continues to work correctly.

ll) Cursor mm) DataBindings nn) DataManager oo) DataSource pp) DefaultImeMode qq) DefaultSize rr) DesignMode ss) DisplayMember tt) DisplayRectangle uu) Disposing vv) Dock ww) DrawMode xx) ToString Description Gets a value indicating the mode for drawing elements of the System.Windows.Forms.CheckedListBox.

yy) Enabled zz) Events aaa) Focused bbb) Font ccc) FontHeight ddd) ForeColor eee) Handle fff) HasChildren ggg) Height hhh) HorizontalExtent iii) HorizontalScrollbar jjj) ImeMode kkk) IntegralHeight lll) InvokeRequired mmm) IsAccessible nnn) IsDisposed ooo) IsHandleCreated ppp) ItemHeight qqq) ToString Description Gets the height of the item area.

This measurement is based on the font height plus a small margin to provide white space around the item.

rrr) Items sss) ToString

[C#] public new CheckedListBox.ObjectCollection Items {get;}

[C++] public: _property CheckedListBox.ObjectCollection* get_Items( );

[VB] Public ReadOnly Property Items As CheckedListBox. ObjectCollection

[JScript] public function get Items( ): CheckedListBox.ObjectCollection;

Description

Gets the collection of items in this System.Windows.Forms. CheckedListBox

The System.Windows.Forms.CheckedListBox.Items property enables you to obtain a reference to the list of items that are currently stored in a System.Windows.Forms. CheckedListBox control. With this reference, you can add items, remove items, and obtain a count of the items in the collection. For more information on the tasks that can be performed with the item collection, see the System.Windows. Forms.CheckedListBox.ObjectCollection class reference topics.

ttt) Left uuu) Location vvv) MultiColumn www) Name xxx) Parent yyy) PreferredHeight zzz) ProductName aaaa) ProductVersion bbbb) RecreatingHandle cccc) Region dddd) RenderRightToLeft eeee) ResizeRedraw ffff) Right gggg) RightToLeft hhhh) ScrollAlwaysVisible iiii) SelectedIndex jjjj) SelectedIndices kkkk) SelectedItem llll) SelectedItems mmmm) Selected Value nnnn) SelectionMode oooo) ToString Description Gets or sets a value specifying the selection mode.

For System.Windows.Forms.CheckedListBox objects, multiple selection is not supported. You can set the mode to one item or no items.

pppp) ShowFocusCues qqqq) ShowKeyboardCues rrrr) Site ssss) Size tttt) Sorted uuuu) TabIndex vvvv) TabStop wwww) Tag xxxx) Text yyyy) ThreeDCheckBoxes zzzz) ToString Description Gets or sets a value indicating whether the check boxes display as System.Windows.Forms.ButtonState.Flat or System. Windows. Forms.ButtonState.Normal in appearance.

aaaaa) Top bbbbb) TopIndex ccccc) TopLevelControl ddddd) UseTabStops eeeee) ValueMember fffff) Visible ggggg) Width hhhhh) Window Target iiiii) ToString Description jjjjj) ToString Description kkkkk) ToString Description Occurs when the checked state of an item changes.

lllll) ToString

Description mmmmm) CreateAccessibilityInstance

[C#] protected override AccessibleObject CreateAccessibilityInstance( );

[C++] protected: AccessibleObject* CreateAccessibilityInstance( );

[VB] Overrides Protected Function CreateAccessibilityInstance( ) As AccessibleObject

[JScript] protected override function CreateAccessibilityInstance( ): AccessibleObject;

Description

Constructs the new instance of the accessibility object for this control. Subclasses should not call base.CreateAccessibilityObject.

nnnnn) CreateItem Collection

[C#] protected override ObjectCollection CreateItemCollection( );

[C++] protecteed: ObjectCollection* CreateItem Collection( );

[VB] Overrides Protected Function CreateItemCollection( ) As ObjectCollection

[JScript] protected override function CreateItem Collection( ): ObjectCollection;

Description ooooo) GetItemChecked

[C#] public bool GetItemChecked(int index);

[C++] public: bool GetItemChecked(int index);

[VB] Public Function GetItemChecked(ByVal index As Integer) As Boolean

[JScript] public function GetItemChecked(index: int): Boolean;

Description

Returns a value indicating whether the specified item is checked.

Return Value: true if the item is checked; otherwise, false. System.Windows.Forms.CheckedListBox.GetItemChecked (System.Int32) returns true if the item is System.Windows. Forms.CheckState.Checked or System.Windows.Forms. CheckState.Indeterminate. To determine the specific state the item is in, use the System.Windows.Forms. CheckedListBox.GetItemCheckState(System.I nt32) method. The index of the item.

ppppp) GetItemCheckState

[C#] public CheckState GetItemCheckState(int index);

[C++] public: CheckState GetItemCheckState(int index);

[VB] Public Function GetItemCheckState(ByVal index As Integer) As CheckState

[JScript] public function GetItemCheckState(index: int): CheckState;

Description

Returns a value indicating the check state of the current item.

Return Value: One of the System.Windows.Forms.CheckState values. The index of the item to get the checked value of.

qqqqq) OnBackColorChanged

[C#] protected override void OnBackColorChanged(EventArgs e);

[C++] protected: void OnBackColorChanged(EventArgs* e);

[VB] Overrides Protected Sub OnBackColorChanged(ByVal e As EventArgs)

[JScript] protected override function OnBackColorChanged (e: EventArgs);

Description rrrrr) On Click

[C#] protected override void OnClick(EventArgs e);

[C++] protected: void OnClick(EventArgs* e);

[VB] Overrides Protected Sub OnClick(ByVal e As Event Args)

[JScript] protected override function OnClick(e: EventArgs);

Description

Ensures that mouse clicks can toggle . . . .

sssss) OnDrawItem

[C#] protected override void OnDrawItem(DrawItemEvent Args e);

[C++] protected: void OnDrawItem(DrawItemEventArgs* e);

[VB] Overrides Protected Sub OnDrawItem(ByVal e As DrawItemEventArgs)

[JScript] protected override function OnDrawItem(e: DrawItemEventArgs);

Description

Raises the DrawItem event.

Raising an event invokes the event handler through a delegate. For more information, see. The System.Windows.Forms. DrawItemEventArgs object with the details ttttt) OnFontChanged

[C+] protected override void OnFontChanged(EventArgs e);

[C++] protected: void OnFontChanged(EventArgs* e);

[VB] Overrides Protected Sub OnFontChanged(ByVal e As EventArgs)

[JScript] protected override function OnFontChanged(e: EventArgs);

Description uuuuu) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

When the handle is created we can dump any cached item-check pairs.

vvvvv) OnItemCheck

[C+] protected virtual void OnItemCheck(ItemCheckEvent Args ice);

[C++] protected: virtual void OnItemCheck(ItemCheckIvent Args* ice);

[VB] Overridable Protected Sub OnItemCheck(ByVal ice As ItemCheckEventArgs)

[JScript] protected function OnItemCheck(ice: ItemCheckEventArgs);

Description

This is the code that actually fires the itemCheck event. Don't forget to call base.on ItemCheck( ) to ensure that itemCheck vents are correctly fired for all other keys.

wwwww) OnKeyPress

[C#] protected override void OnKeyPress(KeyPressEvent Args e);

[C++] protected: void OnKeyPress(KeyPressEventArgs* e);

[VB] Overrides Protected Sub OnKeyPress(ByVal e As KeyPressEventArgs)

[JScript] protected override function OnKeyPress(e: KeyPressEventArgs);

Description

This is the code that actually fires the "keypress" event. The Checked ListBox overrides this to look for space characters, since we want to use those to check or uncheck items periodically. Don't forget to call base.OnKeyPresso to ensure that KeyPrese events are correctly fired for all other keys. The KeyPressEventrgs that was fired.

xxxxx) OnMeasureItem

[C#] protected override void OnMeasureItem(MeasureItem EventArgs e);

[C++] protected: void OnMeasureItem(MeasureItemEvent Args* e);

[VB] Overrides Protected Sub OnMeasureItem(ByVal e As MeasureItemEventArgs)

[JScript] protected override function OnMeasureItem(e: MeasureItemEventArgs);

Description

Raises the MeasureItem event.

Raising an event invokes the event handler through a delegate. For more information, see yyyyy) OnSelectedIndexChanged

[C#] protected override void OnSelectedIndexChanged (EventArgs e);

[C++] protected: void OnSelectedIndexChanged(Event Args* e);

[VB] Overrides Protected Sub OnSelectedIndexChanged (ByVal e As EventArgs)

[JScript] protected override function OnSelectedIndexChanged(e: EventArgs);

Description

Actually goes and fires the selectedIndexChanged event. Inheriting controls should use this to know when the event is fired [this is preferable to adding an event handler on yourself for this event]. They should, however, remember to call base.OnSelectedIndexChanged(e); to ensure the event is still fired to external listeners Actually goes and fires the selectedIndexChanged event. Inheriting controls should use this to know when the event is fired [this is preferable to adding an event handler on yourself for this event]. They should, however, remember to call base.OnSelectedIndexChanged(e); to ensure the event is still fired to external listeners Event object with the details zzzzz) SetItem Checked

[C#] public void SetItemChecked(int index, bool value);

[C++] public: void SetItemChecked(int index, bool value);

[VB] Public Sub SetItemChecked(ByVal index As Integer, ByVal value As Boolean)

[JScnrpt] public function SetItemChecked(index: int, value: Boolean);

Description

Sets the item at the specified index to System.Windows.Forms.CheckState.Checked.

When a value of true is passed, this method sets the checked value of the item to System.Windows.Forms.CheckState.Checked. A value of false will set the item to System.Windows.Forms.CheckState.Unchecked. The index of the item to set the check state for. true to set the item as checked; otherwise, false.

aaaaaa) SetItem CheckState

[C#] public void SetItemCheckState(int index, CheckState value);

[C++] public: void SetItemCheckState(int index, CheckState value);

[VB] Public Sub SetItemCheckState(ByVal index As Integer, ByVal value As CheckState)

[JScript] public function SetItemCheckState(index: int, value: CheckState);

Description

Sets the check state of the item at the specified index.

The System.Windows.Forms.CheckedListBox. SetItemCheckState(System.In t32, System.Windows.Forms.CheckState) method raises the System.Windows.Forms.CheckedListBox.ItemCheck event. The index of the item to set the state for. One of the System.Windows.Forms.CheckState values.

bbbbbb) WmReflectCommand

[C#] protected override void WmReflectCommand(ref Message m);

[C++] protected: void WmReflectCommand(Message* m);

[VB] Overrides Protected Sub WmReflectCommand(ByRef m As Message)

[JScript] protected override function WmReflectCommand (m: Message);

Description

We need to get LBN_SELCHANGE notifications We need to get LBN_SELCHANGE notifications cccccc) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

The listbox's window procedure. Inheriting classes can override this to add extra functionality, but should not forget to call base.wndProc(m); to ensure the button continues to function properly. A Windows Message Object.

ListView.CheckedListViewItemCollection class (System.Windows.Forms)

a) WndProc

Description b) ListView.CheckedListViewItem Collection

Example Syntax:

c) WndProc

[C#] public ListView.CheckedListViewItemCollection(ListView owner);

[C++] public: CheckedListViewItemCollection(ListView* owner);

[VB] Public Sub New(ByVal owner As ListView)

[JScript] public function ListView.CheckedListViewItemCollection(owner: ListView);

Description d) Count e) WndProc

[C#] public int Count {get;}

[C++] public: _property int get_Count( );

[VB] Public ReadOnly Property Count As Integer

[JScript] public function get Count( ): int;

Description

Gets the number of currently selected items.

f) IsReadOnly g) WndProc

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets whether the collection is read-only.

h) Item i) WndProc

[C#] public ListViewItem this[int index] {get;}

[C++] public: _property ListViewItem* get_Item(int index);

[VB] Public Default ReadOnly Property Item(ByVal index As Integer) As ListViewItem

[JScript] returnValue=CheckedListViewItemCollectionObject.Item (index);

Description

Seleted item in the list.

j) Contains

[C#] public bool Contains(ListViewItem item);

[C++] public: bool Contains(ListViewItem* item);

[VB] Public Function Contains(ByVal item As ListView Item) As Boolean

[JScript] public function Contains(item: ListViewItem): Boolean;

Description k) CopyTo

[C#] public void CopyTo(Array dest, int index);

[C++] public: _sealed void CopyTo(Array* dest, int index);

[VB] NotOverridable Public Sub CopyTo(ByVal dest As Array, ByVal index As Integer)

[JScript] public function CopyTo(dest: Array, index: int);

Description l) GetEnumerator

[C#] public IEnumerator GetEnumerator( );

[C++] public: _sealed IEnumerator* GetEnumerator( );

[VB] NotOverridable Public Function GetEnumerator( ) As lenumerator

[JScript] public function GetEnumerator( ): IEnumerator;

Description m) IndexOf

[C#] public int IndexOf(ListViewItem item);

[C++] public: int IndexOf(ListViewItem* item);

[VB] Public Function IndexOf(ByVal item As ListViewItem) As Integer

[JScript] public function IndexOf(item: ListViewItem): int;

Description n) IList.Add

[C#] int IList.Add(object value);

[C++] int IList::Add(Object* value);

[VB] Function Add(ByVal value As Object) As Integer Implements IList.Add

[JScript] function IList.Add(value: Object): int;

o) IList.Clear

[C#] void IList.Clear( );

[C++] void IList::Clear( );

[VB] Sub Clear( ) Implements IList.Clear

[JScript] function IList.Clear( );

p) IList.Contains

[C#] bool IList.Contains(object item);

[C++] bool IList::Contains(Object* item);

[VB] Function Contains(ByVal item As Object) As Boolean Implements IList.Contains

[JScript] function IList.Contains(item: Object): Boolean;

q) IList.IndexOf

[C#] int IList.IndexOf(object item);

[C++] int IList::IndexOf(Object* item);

[VB] Function IndexOf(ByVal item As Object) As Integer Implements IList.IndexOf

[JScript] function IList.IndexOf(item: Object): int;

r) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

s) IList.Remove

[C#] void IList.Remove(object value);

[C++] void IList::Remove(Object* value);

[VB] Sub Remove(ByVal value As Object) Implements IList.Remove

[JScript] function IList.Remove(value: Object);

t) IList.RemoveAt

[C#] void IList.RemoveAt(int index);

[C++] void IList::RemoveAt(int index);

[VB] Sub RemoveAt(ByVal index As Integer) Implements IList.RemoveAt

[JScript] function IList.RemoveAt(index: int);

CheckState enumeration (System.Windows.Forms)

a) ToString

Description

Specifies the state of a control, such as a check box, that can be checked, unchecked, or set to an indeterminate state.

Multiple methods in System.Windows.Forms.CheckBox, System.Windows.Forms.CheckedListBox, and System.Windows.Forms.ItemCheckEventArgs use this enumeration.

b) ToString

[C#] public const CheckState Checked;

[C++] public: const CheckState Checked;

[VB] Public Const Checked As CheckState

[JScript] public var Checked: CheckState;

Description

The control is checked.

c) ToString

[C#] public const CheekState Indeterminate;

[C++] public: const CheckState Indeterminate;

[VB] Public Const Indeterminate As CheckState

[JScript] public var Indeterminate: CheckState;

Description

The control is indeterminate. An indeterminate control generally has a shaded appearance.

d) ToString

[C#] public const CheckState Unchecked;

[C++] public: const CheckState Unchecked;

[VB] Public Const Unchecked As CheckState

[JScript] public var Unchecked: CheckState;

Description

The control is unchecked.

ComboBox.ChildccessibleObj ect class (System.Windows.Forms)

a) ToString

Description b) ComboBox.ChildAccessibleObject

Example Syntax:

c) ToString

[C#] public ComboBox.ChildAccessibleObject(ComboBox owner, IntPtr handle);

[C++] public: ChildAccessibleObject(ComboBox* owner, IntPtr handle);

[VB] Public Sub New(ByVal owner As ComboBox, ByVal handle As IntPtr)

[JScript] public function ComboBox.ChildccessibleObject (owner: ComboBox, handle: IntPtr);

Description d) Bounds e) DefaultAction f) Description g) Help h) KeyboardShortcut i) Name j) ToString Description k) Parent l) Role m) State n) Value Clipboard class (System.Windows.Forms)

a) UseStdAccessibleObjects

Description

Provides methods to place data on and retrieve data from the system Clipboard. This class cannot be inherited.

For a list of predefined formats to use with the System.Windows.Forms.Clipboard class, see the System.Windows.Forms.DataFormats class.

b) GetDataObject

[C#] public static IDataObject GetDataObject( );

[C++] public: static IDataObject* GetDataObject( );

[VB] Public Shared Function GetDataObject( ) As IDataObject

[JScript] public static function GetDataObject( ): IDataObject;

Description

Retrieves the data that is currently on the system Clipboard.

Return Value: An System.Windows.Forms.IDataObject that represents the data currently on the Clipboard, or null if there is no data on the Clipboard.

Because the data type of the object returned from the Clipboard can vary, this method returns the data in an System.Windows.Forms.IDataObject. Then you can use methods of the System.Windows.Forms.IDataObject interface to extract the data in its proper data type.

c) SetDataObject

[C#] public static void SetDataObject(object data);

[C++] public: static void SetDataObject(Object* data);

[VB] Public Shared Sub SetDataObject(ByVal data As Object)

[JScript] public static function SetDataObject(data: Object); Places data on the system Clipboard.

Description

Places nonpersistent data on the system Clipboard.

Data will be deleted from system Clipboard when the application exits. The data to place on the Clipboard.

d) SetDataObject

[C#] public static void SetDataObject(object data, bool copy);

[C++] public: static void SetDataObject(Object* data, bool copy);

[VB] Public Shared Sub SetDataObject(ByVal data As Object, ByVal copy As Boolean)

[JScript] public static function SetDataObject(data: Object, copy: Boolean);

Description

Places data on the system Clipboard and specifies whether the data should remain on the Clipboard after the application exits.

If the copy parameter is false, the data will be deleted from system Clipboard when the application exits. The data to place on the Clipboard. true if you want data to remain on the Clipboard after this application exits; otherwise, false.

AxHost.ClsidAttribute class (System.Windows.Fomms)

a) ToString b) AxHost.ClsidAttribute

Example Syntax:

c) ToString d) TypeId e) Value f) ToString

ColorDepth enumeration (System.Windows.Forms)

a) ToString

Description

Specifies the number of colors used to display an image in an System.Windows.Forms.ImageList control.

This enumeration is used by the System.Windows.Forms.ImageList.ColorDepth property of the System.Windows.Forms.ImageList class.

b) ToString

[C#] public const ColorDepth Depth16 Bit;

[C++] public: const ColorDepth Depth16 Bit;

[VB] Public Const Depth16 Bit As ColorDepth

[JScript] public var Depth16 Bit: ColorDepth;

Description

A 16-bit image.

c) ToString

[C+] public const ColorDepth Depth24 Bit;

[C++] public const ColorDepth Depth24 Bit;

[VB] Public Const Depth24 Bit As ColorDepth

[JScript] public var Depth24 Bit: ColorDepth;

Description

A 24-bit image.
d) ToString

[C#] public const ColorDepth Depth32 Bit;

[C++] public: const ColorDepth Depth32 Bit;

[VB] Public Const Depth32 Bit As ColorDepth

[JScript] public var Depth32 Bit: ColorDepth;

Description

A 32-bit image.
e) ToString

[C#] public const ColorDepth Depth4 Bit;

[C++] public: const ColorDepth Depth4 Bit;

[VB] Public Const Depth4 Bit As ColorDepth

[JScript] public var Depth4 Bit: ColorDepth;

Description

A 4-bit image.
f) ToString

[C#] public const ColorDepth Depth8 Bit;

[C++] public: const ColorDepth Depth8 Bit;

[VB] Public Const Depth8 Bit As ColorDepth

[JScript] public var Depth8 Bit: ColorDepth;

Description

An 8-bit image.
ColorDialog class (System.Windows.Forms)
a) ToString

Description

Represents a common dialog box that displays available colors along with controls that allow the user to define custom colors.

The inherited member System.Windows.Forms.CommonDialog.ShowDialog must be invoked to create this specific common dialog box.
b) ColorDialog Example Syntax:
c) ToString

[C#] public ColorDialog( );

[C++] public: ColorDialog( );

[VB] Public Sub New( )

[JScript] public function ColorDialog( );

Description

Initializes a new instance of the System.Windows.Forms.ColorDialog class.

When you create an instance of System.Windows.Forms.ColorDialog, the following read/write properties are set to initial values.
d) AllowFullOpen
e) ToString

[C#] public virtual bool AllowFullOpen {get; set;}

[C++] public: _property virtual bool get_AllowFullOpen( ); public: _property virtual void set_AllowFullOpen(bool);

[VB] Overridable Public Property AllowFullOpen As Boolean

[JScript] public function get AllowFullOpen( ): Boolean; public function set AllowFullOpen(Boolean);

Description

Gets or sets a value indicating whether the user can use the dialog box to define custom colors.

When set to false, the associated button in the dialog box is disabled and the user cannot access the custom colors control in the dialog box.
f) AnyColor
g) ToString

[C#] public virtual bool AnyColor {get; set;}

[C++] public: _property virtual bool get_AnyColor( ); public: _property virtual void set_AnyColor(bool);

[VB] Overridable Public Property AnyColor As Boolean

[JScript] public function get AnyColor( ): Boolean; public function set AnyColor(Boolean);

Description

Gets or sets a value indicating whether the dialog box displays all available colors in the set of basic colors.
h) Color
i) ToString

[C#] public Color Color {get; set;}

[C++] public: _property Color get_Color( ); public: _property void set_Color(Color);

[VB] Public Property Color As Color

[JScript] public function get Color( ): Color; public function set Color(Color);

Description

Gets or sets the color selected by the user.

The color selected by the user in the dialog box at run time, as defined in System.Drawing.Color structure.
j) Container
k) CustomColors
l) ToString Description Gets or sets the set of custom colors shown in the dialog box.

Users can create their own set of custom colors.
m) DesignMode
n) Events
o) FullOpen
P) ToString Description Gets or sets a value indicating whether the controls used to create custom colors are visible when the dialog box is opened true if the custom color controls are available when the dialog box is opened; otherwise, false. The default value is false.

By default, the custom color controls are not visible when the dialog box is first opened. You must click the Custom Colors button to display them.

q) Instance
r) ToString

[C#] protected virtual IntPtr Instance {get;}

[C++] protected: _property virtual IntPtr get_Instance( );

[VB] Overridable Protected ReadOnly Property Instance As IntPtr

[JScript] protected function get Instance( ): IntPtr;

Description

Our HINSTANCE from Windows.

s) Options
t) ToString

[C#] protected virtual int Options {get;}

[C++] protected: _property virtual int get_Options( );

[VB] Overridable Protected ReadOnly Property Options As Integer

[JScript] protected function get Options( ): int;

Description

Returns our CHOOSECOLOR options.

u) ShowHelp
v) ToString

[C#] public virtual bool ShowHelp {get; set;}

[C++] public: _property virtual bool get_ShowHelp( ); public: _property virtual void set_ShowHelp(bool);

[VB] Overridable Public Property ShowHelp As Boolean

[JScript] public function get ShowHelp( ): Boolean; public function set ShowHelp(Boolean);

Description

Gets or sets a value indicating whether a Help button appears in the color dialog box.

w) Site
x) SolidColorOnly
y) ToString

Description

Gets or sets a value indicating whether the dialog box will restrict users to selecting solid colors only.

This property is applicable to systems with 256 or fewer colors. On these types of systems, some colors are composites of others.

z) Reset

[C#] public override void Reset( );

[C++] public: void Reset( );

[VB] Overrides Public Sub Reset( )

[JScript] public override function Reset( );

Description

Resets all options to their default values, the last selected color to black, and the custom colors to their default values.

aa) RunDialog

[C#] protected override bool RunDialog(IntPtr hwndOwner);

[C++] protected: bool RunDial og(IntPtr hwndOwner);

[VB] Overrides Protected Function RunDialog(ByVal hwnd Owner As IntPtr) As Boolean

[JScript] protected override function RunDialog(hwndOwner: IntPtr): Boolean;

Description bb) ToString

[C#] public override string ToString( );

[C++] public: String* ToString( );

[VB] Overrides Public Function ToString( ) As String

[JScript] public override function ToString( ): String;

Description

Provides a string version of this object.

Return Value: A string version of this object.

ColumnClickEventArgs class (System.Windows.Forms)

a) ToString

Description

Provides data for the System.Windows.Forms.ListView. ColumnClick event.

The System.Windows.Forms.ColumnClickEventArgs class provides the zero-based index within the System.Windows.Forms.ListView.ColumnHeaderCollection class of the column that is clicked in the System.Windows.Forms.ListView control. You can use this information in an event handler for the System.Windows.Forms.ListView.ColumnClick event to determine which column is being clicked to perform tasks on the data within the column.

b) ColumnClickEventArgs

Example Syntax:

c) ToString

[C#] public ColumnClickEventArgs(int column);

[C++] public: ColumnClickEventArgs(int column);

[VB] Public Sub New(ByVal column As Integer)

[JScript] public function ColumnClickEventArgs(column: int);

Description

Initializes a new instance of the System.Windows.Forms. ColumnClickEventArgs class. The zero-based index of the column that is clicked.

d) Column
e) ToString

[C#] public int Column {get;}

[C++] public: _property int get_Column( );

[VB] Public ReadOnly Property Column As Integer

[JScript] public function get Column( ): int;

Description

Gets the zero-based index of the column that is clicked.

You can use the information provided by this property in an event handler for the System.Windows.Forms.ListView. ColumnClick event to determine which column is being clicked to perform tasks on the data within the column.

ColumnClickEventHandler delegate (System.Windows. Forms)

a) ToString

Description

Represents the method that will handle the System.Windows. Forms.ListView.ColumnClick event of a System.Windows.

Forms.ListView. The source of the event. A System.Windows.Forms.ColumnClickEventArgs that contains the event data.

When you create a System.Windows.Forms.ColumnClickEventHandler delegate, you identify the method that will handle the event. To associate the event with your event handler, add an instance of the delegate to the event. The event handler is called whenever the event occurs, unless you remove the delegate. For more information about event handler delegates, see.

ColumnHeader class (System.Windows.Forms)

a) ToString

Description

Displays a single column header in a System.Windows.Forms.ListView control.

A column header is an item in a System.Windows.Forms.ListView control that contains heading text.

b) ColumnHeader

Example Syntax:

c) ToString

[C#] public ColumnHeader( );

[C++] public: ColumnHeader( );

[VB] Public Sub New( )

[JScript] public function ColumnHeader( );

Description

Initializes a new instance of the System.Windows.Forms.ColumnHeader class.

d) Container e) DesignMode f) Events g) Index h) ToString

Description

Gets the location with the System.Windows.Forms.ListView control's System.Windows.Forms.ListView.Column HeaderCollection of this column.

The value of this property does not necessarily correspond to the current visual position of the column header within the System.Windows.Forms.ListView. This can be due to the user reordering the column headers at run time (when the System.Windows.Forms.ListView.AllowColumnReorder property is set to true). If the System.Windows.Forms.ColumnHeader is not contained within a System.Windows.Forms.ListView control this property returns a value of −1.

i) ListView j) ToString

[C#] public ListView ListView {get;}

[C++] public: _property ListView* get_ListView( );

[VB] Public ReadOnly Property ListView As ListView

[JScript] public function get ListView( ): ListView;

Description

Gets the System.Windows.Forms.ListView control the System.Windows.Forms.ColumnHeader is located in.

You can use this property to determine which System.Windows.Forms.ListView control a specific System.Windows.Forms.ColumnHeader object is associated with.

k) Site l) Text m) ToString

Description

Gets or sets the text displayed in the column header.

n) TextAlign o) ToString

[C#] public HorizontalAlignment TextAlign {get; set;}

[C++] public: _property HorizontalAlignment get_TextAlign( ); public: _property void set_TextAlign(HorizontalAlignment);

[VB] Public Property TextAlign As HorizontalAlignment

[JScript] public function get TextAlign( ): HorizontalAlignment; public function set TextAlign(HorizontalAlignment);

Description

Gets or sets the horizontal alignment of the text displayed in the System.Windows.Forms.ColumnHeader.

You can use this property to provide different text alignment settings for the text displayed in each System.Windows.Forms.ColumnHeader. For example, you might want to align the first System.Windows.Forms.ColumnHeader in a System.Windows.Forms.ListView control to the left while keeping the rest of the fields center or right aligned.

p) Width q) ToString

[C#] public int Width {get; set;}

[C++] public: _property int get_Width( ); public: _property void set_Width(int);

[VB] Public Property Width As Integer

[JScript] public function get Width( ): int; public function set Width(int);

Description

Gets or sets the width of the column.

r) Clone

[C#] public object Cloneo;

[C++] public: _sealed Object* Clone( );

[VB] NotOverridable Public Function Clone( ) As Object

[JScript] public function Clone( ): Object;

Description

Creates an identical copy of the current System.Windows.Forms.ColumnHeader that is not attached to any list view control.

Return Value: An object representing a copy of this System.Windows.Forms.ColumnHeader object.

You can use this method to copy existing System.Windows.Forms.ColumnHeader objects from an existing System.Windows.Forms.ListView control for use in other System.Windows.Forms.ListView controls.

s) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the resources (other than memory) used by the System.Windows.Forms.ColumnHeader.

Call System.Windows.Forms.ColumnHeader.Dispose(System.Boolean) when you are finished using the System.Windows.Forms.ColumnHeader. The System.Windows.Forms.ColumnHeader.Dispose(System.Boolean) method leaves the System.Windows.Forms.ColumnHeader in an unusable state. After calling System.Windows.Forms.ColumnHeader.Dispose(System.Boolean), you must release all references to the System.Windows.Forms.ColumnHeader so the memory it was occupying can be reclaimed by garbage collection.

t) ToString

[C#] public override string ToString( );

[C++] public: String* ToString( );

[VB] Overrides Public Function ToString( ) As String

[JScript] public override function ToString( ): String;

Description

Returns a string representation of this column header Returns a string representation of this column header ListView.ColumnHeaderCollection class (System.Windows.Forms)

a) ToString

Description b) ListView.ColumnHeaderCollection

Example Syntax:

c) ToString

[C#] public ListView.ColumnHeaderCollection(ListView owner);

[C++] public: ColumnHeaderCollection(ListView* owner);

[VB] Public Sub New(ByVal owner As ListView)

[JScript] public function ListView.ColumnHeaderCollection (owner: ListView);

Description d) Count e) ToString

[C#] public int Count {get;}

[C++] public: _property int get_Count( );

[VB] Public ReadOnly Property Count As Integer

[JScript] public function get Count( ): int;

Description

Gets the number of columns the System.Windows.Forms.ListView currently has in Details view.

f) IsReadOnly g) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description h) Item i) ToString

[C#] public virtual ColumnHeader this[int index] {get;}

[C++] public: _property virtual ColumnHeader* get_Item (int index);

[VB] Overridable Public Default ReadOnly Property Item (ByVal index As Integer) As ColumnHeader

[JScript] returnValue=ColumnHeaderCollectionObject.Item (index);

Description

Given a zero-based index, returns the System.Windows.Forms.ColumnHeader object for the column at that index. The zero-based index of specific column.

j) Add

[C#] public virtual int Add(ColumnHeader value);

[C++] public: virtual int Add(ColumnHeader* value);

[VB] Overridable Public Function Add(ByVal value As ColumnHeader) As Integer

[JScript] public function Add(value: ColumnHeader): int;

Description k) Add

[C#] public virtual ColumnHeader Add(string str, int width, HorizontalAlignment textAlign);

[C++] public: virtual ColumnHeader* Add(String* str, int width, HorizontalAlignment textAlign);

[VB] Overridable Public Function Add(ByVal str As String, ByVal width As Integer, ByVal textAlign As HorizontalAlignment) As ColumnHeader

[JScript] public function Add(str: String, width: int, text Align: HorizontalAlignment) ColumnHeader;

Description

Adds a column to the end of the list.

Return Value: A System.Windows.Forms.ColumnHeader object representing the new column. Text for new column. Width of new column in pixels. The alignment of the text in this column. Must be a value from System.Windows.Forms.orizontalAlignment class.

l) AddRange

[C#] public virtual void AddRange(ColumnHeader[ ] values);

[C++] public: virtual void AddRange(ColumnHeader* values[ ]);

[VB] Overridable Public Sub AddRange(ByVal values( ) As ColumnHeader)

[JScript] public function AddRange(values: Column Header[ ]);

Description m) Clear

[C#] public virtual void Clear( );

[C++] public: virtual void Clear( );

[VB] Overridable Public Sub Clear( )

[JScript] public function Clear( );

Description

Removes all columns from the list view.

n) Contains

[C#] public bool Contains(ColumnHeader value);

[C++] public: bool Contains(ColumnHeader* value);

[VB] Public Function Contains(ByVal value As ColumnHeader) As Boolean

[JScript] public function Contains(value: ColumnHeader): Boolean;

Description o) GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description p) IndexOf

[C#] public int IndexOf(ColumnHeader value);

[C++] public: int IndexOf(ColumnHeader* value);

[VB] Public Function IndexOf(ByVal value As ColumnHeader) As Integer

[JScript] public function IndexOf(value: ColumnHeader): int;

Description q) Insert

[C#] public void Insert(int index, ColumnHeader value);

[C++] public: void Insert(int index, ColumnHeader* value);

[VB] Public Sub Insert(ByVal index As Integer, ByVal value As ColumnHeader)

[JScript] public function Insert(index: int, value: ColumnHeader);

Description r) Insert

[C#] public void Insert(int index, string str, int width, HorizontalAlignment textAlign);

[C++] public: void Insert(int index, String* str, int width, HorizontalAlignment textAlign);

[VB] Public Sub Insert(ByVal index As Integer, ByVal str As String, ByVal width As Integer, ByVal textAlign As HorizontalAlignment)

[JScript] public function Insert(index: int, str: String, width: int, textAlign HorizontalAlignment);

Description s) Remove

[C#] public virtual void Remove(ColumnHeader column);

[C++] public: virtual void Remove(ColumnHeader* column);

[VB] Overridable Public Sub Remove(ByVal column As ColumnHeader)

[JScript] public function Remove(column: ColumnHeader);

Description t) RemoveAt

[C#] public virtual void RemoveAt(int index);

[C++] public: virtual void RemoveAt(int index);

[VB] Overridable Public Sub RemoveAt(ByVal index As Integer)

[JScript] public function RemoveAt(index: int);

Description

Removes a column from the System.Windows.Forms.ListView. The zero-based index of the column that is to be removed u) ICollection.CopyTo

[C#] void ICollection.CopyTo(Array dest, int index);

[C++] void ICollection::CopyTo(Array* dest, int index);

[VB] Sub CopyTo(ByVal dest As Array, ByVal index As Integer) Implements ICollection.CopyTo

[JScript] function ICollection.CopyTo(dest: Array, index: int);

v) IList.Add

[C#] int IList.Add(object value);

[C++] int IList::Add(Object* value);

[VB] Function Add(ByVal value As Object) As Integer Implements IList.Add

[JScript] function IList.Add(value: Object): int;

w) IList.Contains

[C#] bool IList.Contains(object value);

[C++] bool IList::Contains(Object* value);

[VB] Function Contains(ByVal value As Object) As Boolean Implements IList.Contains

[JScript] function IList.Contains(value: Object): Boolean;

x) IList.IndexOf

[C#] int IList.IndexOf(object value);

[C++] int IList::IndexOf(Object* value);

[VB] Function IndexOf(ByVal value As Object) As Integer Implements IList.IndexOf

[JScript] function IList.IndexOf(value: Object): int;

y) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

z) IList.Remove

[C#] void IList.Remove(object value);

[C++] void IList::Remove(Object* value);

[VB] Sub Remove(ByVal value As Object) Implements IList.Remove

[JScript] function IList.Remove (value: Object);

ColumnHeaderStyle enumeration (System.Windows.Forms)

a) ToString

Description

Specifies the styles of the column headers in a System.Windows.Forms.ListView control.

Use the members of this enumeration to set the value of the System.Windows.Forms.ListView.HeaderStyle property of the System.Windows.Forms.ListView control.

b) ToString

[C#] public const ColumnHeaderStyle Clickable;

[C++] public: const ColumnHeaderStyle Clickable;

[VB] Public Const Clickable As ColumnHeaderStyle

[JScript] public var Clickable: ColumnHeaderStyle;

Description

The column headers function like buttons and can carry out an action, such as sorting, when clicked.

c) ToString

[C#] public const ColumnHeaderStyle Nonclickable;

[C++] public: const ColumnHeaderStyle Nonclickable;

[VB] Public Const Nonclickable As ColumnHeaderStyle

[JScript] public var Nonclickable: ColumnHeaderStyle;

Description

The column headers do not respond to the click of a mouse.

d) ToString

[C#] public const ColumnHeaderStyle None;

[C++] public: const ColumnHeaderStyle None;

[VB] Public Const None As ColumnHeaderStyle

[JScript] public var None: ColumnHeaderStyle;

Description

The column header is not displayed in report view.

ComboBox class (System.Windows.Forms)

a) ToString

Description

Represents a Windows combo box control.

A System.Windows.Forms.ComboBox displays an editing field combined with a System.Windows.Forms.ListBox, allowing the user to select from the list or to enter new text. The default behavour of System.Windows.Forms.ComboBox displays an edit field with a hidden drop-down list. The System.Windows.Forms.ComboBox.DropDownStyle property determines the style of combo box to display. You can enter a value that allows for a simple drop-down, where the list always displays, a drop-down list box, where the text portion is not editable and you must select an arrow to view the drop-down list box, or the default drop-down list box, where the text portion is editable and the user must press the arrow key to view the list. To always display a list that the user cannot edit, use a System.Windows.Forms.ListBox control.

b) ComboBox

Example Syntax:

c) ToString

[C#] public ComboBox( );

[C++] public: ComboBox( );

[VB] Public Sub New( )

[JScript] public function ComboBox( );

Description

Initializes a new instance of the System.Windows.Forms.ComboBox class.

Creates a new ComboBox control. The default style for the combo is a regular DropDown Combo.

d) AccessibilityObject e) AccessibleDefaultActionDescription f) AccessibleDescription g) AccessibleName h) AccessibleRole i) AllowDrop j) Anchor k) BackColor l) ToString Description The background color of this control. This is an ambient property and will always return a non-null value.

m) BackgroundImage n) ToString

[C#] public override Image BackgroundImage {get; set;}

[C++] public: _property virtual Image* get_BackgroundImage( ); public: _property virtual void set_Backgroundimage (Image*);

[VB] Overrides Public Property BackgroundImage As Image

[JScript] public function get BackgroundImage( ): Image; public function set BackgroundImage(Image);

Description o) BindingContext p) Bottom q) Bounds r) CanFocus s) CanSelect t) Capture u) Causes Validation v) ClientRectangle w) ClientSize x) CompanyName y) Container z) ContainsFocus aa) ContextMenu bb) Controls cc) Created dd) CreateParams ee) ToString Description Returns the parameters needed to create the handle. Inheriting classes can override this to provide extra functionality. They should not, however, forget to call base.CreateParams( ) first to get the struct filled up with the basic info.

ff) Cursor gg) DataBindings hh) DataManager ii) DataSource jj) DefaultImeMode kk) DefaultSize ll) ToString Description Deriving classes can override this to configure a default size for their control. This is more efficient than setting the size in the control's constructor.

mm) DesignMode
nn) DisplayMember
oo) DisplayRectangle
pp) Disposing
qq) Dock
rr) DrawMode
ss) ToString Description Gets or sets a value indicating whether your code or the operating system will handle drawing of elements in the list.

tt) DropDownStyle
uu) ToString

[C#] public ComboBoxStyle DropDownStyle {get; set;}

[C++] public: _property ComboBoxStyle get_DropDownStyle( ); public: _property void set_DropDownStyle(ComboBoxStyle);

[VB] Public Property DropDownStyle As ComboBoxStyle

[JScript] public function get DropDownStyle( ): ComboBoxStyle; public function set DropDownStyle(ComboBoxStyle);

Description

Gets or sets a value specifying the style of the combo box.

The System.Windows.Forms.ComboBox.DropDownStyle property controls the interface that is presented to the user. You can enter a value that allows for a simple drop-down list box, where the list always displays, a drop-down list box, where the text portion is not editable and you must select an arrow to view the drop down, or the default drop-down list box, where the text portion is editable and the user must press the arrow key to view the list. To always display a list that the user cannot edit, use a System.Windows.Forms.ListBox control.

vv) DropDown Width
ww) ToString

[C#] public int DropDownWidth {get; set;}

[C++] public: _property int get DropDownWidth( ); public: _property void set_DropDownWidth(int);

[VB] Public Property DropDownWidth As Integer

[JScript] public function get DropDownWidth( ): int; public function set DropDownWidth(int);

Description

Gets or sets the width of the of the drop-down portion of a combo box.

If a value has not been set for the System.Windows.Forms.ComboBox.DropDownWidth, this property returns the System.Windows.Forms.Control.Width of the combo box.

xx) DroppedDown
yy) ToString

[C#] public bool DroppedDown {get; set;}

[C++] public: _property bool get DroppedDown( ); public: _property void set DroppedDown(bool);

[VB] Public Property DroppedDown As Boolean

[JScript] public function get DroppedDown( ): Boolean; public function set DroppedDown(Boolean);

Description

Gets or sets a value indicating whether the combo box is displaying its drop-down portion.

zz) Enabled
aaa) Events
bbb) Focused
ccc) ToString

Description

Gets a value indicating whether the System.Windows.Forms.ComboBox has focus.

ddd) Font
eee) FontHeight
fff) ForeColor
ggg) ToString

Description

Gets or sets the foreground color of the control.

hhh) Handle
iii) HasChildren
jjj) Height
kkk) ImeMode
lll) IntegralHeight
mmm) ToString Description Gets or sets a value indicating whether the control should resize to avoid showing partial items.

When this property is set to true, the control automatically resizes to ensure that an item is not partially displayed. If you want to maintain the original size of the System.Windows.Forms.ComboBox based on the space requirements of your form, set this property to false. If the System.Windows.Forms. ComboBox does not contain any items, this property has no effect.

nnn) InvokeRequired
ooo) IsAccessible
ppp) IsDisposed
qqq) IsHandleCreated
rrr) ItemHeight
sss) ToString Description Gets the height of an item in the combo box.

When the System.Windows.Forms.ComboBox.DrawMode property is set to System.Windows.Forms.DrawMode.OwnerDrawFixed, all items have the same height. When the System.Windows.Forms.DrawMode property is set to System.Windows.Forms.DrawMode.OwnerDrawVariable, the System.Windows.Forms.ComboBox.ItemHeight property specifies the height of each item added to the System.Windows.Forms.ComboBox. Because each item in an owner-drawn list can have a different height, you can use the System.Windows.Forms.ComboBox.GetItemHeight (System.Int32) method to get the height of a specific item in the System.Windows.Forms.ComboBox. If you use the System.Windows.Forms.ComboBox.ItemHeight property on a System.Windows.Forms.ComboBox with items of variable height, this property returns the height of the first item in the control.

ttt) Items
uuu) ToString

[C#] public ComboBox.ObjectCollection Items {get;}

[C++] public: _property ComboBox.ObjectCollection* get_Items( );

[VB] Public ReadOnly Property Items As ComboBox.ObjectCollection

[JScript] public function get Items( ): ComboBox.ObjectCollection;

Description

Gets an object representing the collection of the items contained in this System.Windows.Forms.ComboBox.

This property enables you to obtain a reference to the list of items that are currently stored in the System.Windows.Forms.ComboBox. With this reference, you can add items, remove items, and obtain a count of the items in the collection. For more information on the tasks that can be performed with the item collection, see the System.Windows.Forms.Combo Box.ObjectCollection class reference topics.

vvv) Left
www) Location
xxx) MaxDropDownItems
yyy) ToString

Description

Gets or sets the maximum number of items to be shown in the drop-down portion of the System.Windows.Forms.ComboBox.

zzz) MaxLength
aaaa) ToString

[C#] public int MaxLength {get; set;}

[C++] public: _property int get_MaxLength( ); public: _property void set_MaxLength(int);

[VB] Public Property MaxLength As Integer

[JScript] public function get MaxLength( ): int; public function set MaxLength(int);

Description

Gets or sets the maximum number of characters allowed in the editable portion of a combo box.

bbbb) Name
cccc) Parent
dddd) PreferredHeight
eeee) ToString

Description

Gets the preferred height of the System.Windows.Forms.ComboBox.

The preferred height is a value based on the font height and an adjustment for the border.

ffff) ProductName
gggg) ProductVersion
hhhh) RecreatingHandle
iiii) Region
jjjj) RenderRightToLeft
kkkk) ResizeRedraw
llll) Right
mmmm) RightToLeft
nnnn) SelectedIndex
oooo) ToString Description Gets or sets the index specifying the currently selected item.

This property indicates the zero-based index of the currently selected item in the combo box list. Setting a new index raises the System.Windows.Forms.ComboBox.SelectedIndex Changed event.

pppp) SelectedItem
qqqq) ToString

[C#] public object SelectedItem {get; set;}

[C++] public: _property Object* get_SelectedItemo; public: _property void set_SelectedItem(Object*);

[VB] Public Property SelectedItem As Object

[JScript] public function get SelectedItemo: Object; public function set SelectedItem(Object);

Description

Gets or sets currently selected item in the System.Windows.Forms.ComboBox.

When you set the System.Windows.Forms.ComboBox.SelectedItem property to an object, the System.Windows.Forms. ComboBox attempts to make that object the currently selected one in the list. If the object is found in the list, it is displayed in the edit portion of the System.Windows.Forms.ComboBox and the System.Windows.Forms.ComboBox.SelectedIndex property is set to the corresponding index. If the object does not exist in the list the System.Windows.Forms.ComboBox.SelectedIndex property is left at its current value.

rrrr) SelectedText
ssss) ToString

[C#] public string SelectedText {get; set;}

[C++] public: _property String* get_SelectedText( ); public: _property void set_SelectedText(String*);

[VB] Public Property SelectedText As String

[JScript] public function get SelectedText( ): String; public function set SelectedText(String);

Description

Gets or sets the text that is selected in the editable portion of a System.Windows.Forms.ComboBox.

You can assign text to this property to change the text currently selected in the combo box. If no text is currently selected in the combo box, this property returns a zero-length string.

tttt) Selected Value
uuuu) SelectionLength
vvvv) ToString

Description

Gets or sets the number of characters selected in the editable portion of the combo box.

You can use this property to determine whether any characters are currently selected in the combo box control before performing operations on the selected text. When the value of the System.Windows.Forms.ComboBox.SelectionLength property is set to a value that is larger than the number of characters within the text of the control, the value of the System.Windows.Forms.ComboBox.SelectionLength property is set to the entire length of text within the control minus the value of the System.Windows.Forms.ComboBox.SelectionStart property (if any value is specified for the System. Windows.Forms.ComboBox.SelectionStart property).

wwww) SelectionStart
xxxx) ToString

[C#] public int SelectionStart {get; set;}

[C++] public: _property int get_SelectionStart( ); public: _property void set_SelectionStart(int);

[VB] Public Property SelectionStart As Integer

[JScript] public function get SelectionStart( ): int; public function set SelectionStart(int);

Description

Gets or sets the starting index of text selected in the combo box.

If no text is selected in the control, this property indicates the insertion point for new text. If you set this property to a location beyond the length of the text in the control, the selection start position is placed after the last character. When text is selected in the text box control, changing this property can release the value of the System.Windows.Forms.ComboBox.SelectionLength property. If the remaining text in the control after the position indicated by the System.Windows.Forms.ComboBox.SelectionStart property is less than the value of the System.Windows.Forms.ComboBox.SelectionLength property, the value of the System.Windows.Forms.ComboBox.SelectionLength property is automatically decreased. The value of the System.Windows.Forms.ComboBox.SelectionStart property never causes an increase in the System.Windows.Forms.ComboBox.SelectionLength property.

yyyy) ShowFocusCues
zzzz) ShowKeyboardCues
aaaaa) Site
bbbbb) Size
ccccc) Sorted
ddddd) ToString Description Gets or sets a value indicating whether the items in the combo box are sorted.

This property specifies whether the System.Windows.Forms.ComboBox sorts exisitng entries and add new entries to the appropriate sorted position in the list. You can use this property to automatically sort items in a System.Windows.Forms.ComboBox. As items are added to a sorted System.Windows.Forms.ComboBox, the items are moved to the appropriate location in the sorted list. When you set the property to false, new items are added to the end of the existing list. The sort is case-insensitive and in alphabetically ascending order.

eeeee) TabIndex
fffff) TabStop
ggggg) Tag
hhhhh) Text
iiiii) ToString

Description

Gets or sets the text associated with this control.

When setting the System.Windows.Forms.ComboBox.Text property, null or an empty string (" ") sets the System.Windows.Forms.ComboBox.SelectedIndex to −1.

jjjjj) Top
kkkkk) TopLevelControl
lllll) ValueMember
mmmmm) Visible
nnnnn) Width
ooooo) WindowTarget
ppppp) ToString Description Occurs when a visual aspect of an owner-drawn System.Windows.Forms.ComboBox changes.

This event is used by an owner-drawn System.Windows.Forms.ComboBox. You can use this event to perform the tasks needed to draw items in the System.Windows.Forms.ComboBox. If you have a variable sized item (when the System.Windows.Forms.ComboBox.DrawMode property set to System.Windows.Forms.DrawMode.Owner DrawVariable), before drawing an item, the System.Windows.Forms.ComboBox.MeasureItem event is raised. You can create an event handler for the System. Windows.Forms.ComboBox.MeasureItem event to specify the size for the item that you are going to draw in your event handler for the System.Windows.Forms.ComboBox.DrawItem event.

qqqqq) ToString

[C#] public event EventHandler DropDown;

[C++] public: _event EventHandler* DropDown;

[VB] Public Event DropDown As EventHandler

Description

Occurs when the drop-down portion of a System.Windows.Forms.ComboBox is shown.

For more information about handling events, see.

rrrrr) ToString

[C#] public event EventHandler DropDownStyleChanged;

[C++] public: _event EventHandler* DropDownStyleChanged;

[VB] Public Event DropDownStyleChanged As EventHandler

Description

Occurs when the System.Windows.Forms.ComboBox.DropDownStyle property has changed.

For more information about handling events, see.

sssss) ToString

Description

Occurs when an owner-drawn System.Windows.Forms.ComboBox is created and the sizes of the list items are determined.

You can create an event handler for this event to specify the size an item is made before it is drawn in the System.Windows.Forms.ComboBox.DrawItem event.

ttttt) ToString

Description

Occurs when the System.Windows.Forms.ComboBox.SelectedIndex property has changed.

You can create an event handler for this event to determine when the selected index in the System.Windows.Forms.ComboBox has been changed. This can be useful when you need to display information in other controls based on the current selection in the System.Windows.Forms.ComboBox. You can use the event handler for this event to load the information in the other controls.

uuuuu) ToString

Description

Occurs when the selected item has changed and that change is committed.

You can create a System.Windows.Forms.ComboBox.SelectionChangeCommitted event handler to provide special handling for the System.Windows.Forms.ComboBox when the user changes the selected item in the list.

vvvvv) AddItemsCore

[C#] protected virtual void AddItemsCore(object[ ] value);

[C++] protected: virtual void AddItemsCore(Object* value _gc[ ]);

[VB] Overridable Protected Sub AddItemsCore(ByVal value( ) As Object)

[JScript] protected function AddItemsCore(value: Object[ ]);

Description

Adds the specified items to the combo box.

The System.Windows.Forms.ComboBox.AddItemsCore (System.Object[ ]) method allows derived classes to provide special behavour when adding items. An array of System.Object to append to the System.Windows.Forms.ComboBox.

wwwww) Begin Update

[C#] public void BeginUpdate( );

[C++] public: void BeginUpdate( );

[VB] Public Sub BeginUpdate( )

[JScript] public function BeginUpdate( );

Description

Maintains performance when items are added to the System.Windows.Forms.ComboBox one at a time.

This method prevents the control from painting until the System.Windows.Forms.ComboBox.EndUpdate method is called.

xxxxx) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description yyyyy) EndUpdate

[C#] public void EndUpdate( );

[C++] public: void EndUpdate( );

[VB] Public Sub EndUpdate( )

[JScript] public function EndUpdate( );

Description

Resumes painting the System.Windows.Forms.ComboBox control after painting is suspended by the System.Windows.Forms.ComboBox.BeginUpdate method.

The preferred way to add items to the System.Windows.Forms.ComboBox is to use the System.Windows.Forms.ComboBox.ObjectCollection.AddRange(System.Object[ ]) method of the System.Windows.Forms.ComboBox.ObjectCollection class (through the System.Windows.Forms.ComboBox.Items property of the System.Windows.Forms.ComboBox). This enables you to add an array of items to the list at one time. However, if you want to add items one at a time using the System.Windows.Forms.ComboBox.ObjectCollection.Add(System.Object) method of the System.Windows.Forms.ComboBox.ObjectCollection class, you can use the System.Windows.Forms.ComboBox.BeginUpdate method to prevent the control from repainting the System.Windows.Forms.ComboBox each time an item is added to the list. Once you have completed the task of adding items to the list, call the System.Windows.Forms.ComboBox.EndUpdate method to enable the System.Windows.Forms. ComboBox to repaint. This way of adding items can prevent flickered drawing of the System.Windows.Forms.ComboBox when a large number of items are being added to the list.

zzzzz) FindString

[C#] public int FindString(string s);

[C++] public: int FindString(String* s);

[VB] Public Function FindString(ByVal s As String) As Integer

[JScript] public function FindString(s: String): int; Finds the first item in the System.Windows.Forms.ComboBox that starts with the specified string.

Description

Finds the first item in the combo box that starts with the specified string.

Return Value: The zero-based index of the first item found; returns −1 if no match is found.

The search performed by this method is not case-sensitive. The s parameter is a substring to compare against the text associated with the items in the combo box list. The search performs a partial match starting from the beginning of the text, and returning the first item in the list that matches the specified substring. You can then perform tasks, such as removing the item that contains the search text using the System.Windows.Forms.ComboBox.ObjectCollection.Remove(System.Object) method or changing the item's text. Once you have found the specified text, if you want to search for other instances of the text in the System.Windows.Forms.ComboBox, you must use the version of the System.Windows.Forms.ComboBox.FindString(System.String) method that provides a parameter for specifying a starting index within the System.Windows.Forms.ComboBox. If you want to perform a search for an exact word match instead of a partial match, use the System.Windows.Forms.ComboBox.FindStringExact(System.String) method. The System.String to search for.

aaaaaa) FindString

[C#] public int FindString(string s, int startIndex);

[C++] public: int FindString(String* s, int startIndex);

[VB] Public Function FindString(ByVal s As String, ByVal startIndex As Integer) As Integer

[JScript] public function FindString(s: String, startIndex: int): int;

Description

Finds the first item after the given index which starts with the given string. The search is not case sensitive.

Return Value: The zero-based index of the first item found; returns −1 if no match is found.

The search performed by this method is not case-sensitive. The s parameter is a substring to compare against the text associated with the items in the combo box list. The search performs a partial match starting from the beginning of the text, returning the first item in the list that matches the specified substring. You can then perform tasks, such as removing the item that contains the search text using the System.Windows.Forms.ComboBox.ObjectCollection.Remove(System.Object) method or changing the item's text. This method is typically used after a call has been made using the version of this method that does not specify a starting index. Once an initial item has been found in the list, this method is typically used to find further instances of the search text by specifying the index position in the startIndex parameter of the item after the first found instance of the search text. If you want to perform a search for an exact word match instead of a partial match, use the System.Windows.Forms.Combo Box.FindStringExact(System.String) method. The System. String to search for. The zero-based index of the item before the first item to be searched. Set to −1 to search from the beginning of the control.

bbbbbb) FindStringExact

[C#] public int FindStringExact(string s);

[C++] public: int FindStringExact(String* s);

[VB] Public Function FindStringExact(ByVal s As String) As Integer

[JScript] public function FindStringExact(s: String): int; Finds the item that exactly matches the specified string.

Description

Finds the first item in the combo box that matches the specified string.

Return Value: The zero-based index of the first item found; returns −1 if no match is found.

The search performed by this method is not case-sensitive. The s parameter is a string to compare against the text associated with the items in the combo box list. The search looks for a match starting from the beginning of the text, returning the first item in the list that matches the specified substring. You can then perform tasks, such as removing the item that contains the search text using the System.Windows.Forms.ComboBox.ObjectCollection.Remove(System.Object) method or changing the item's text. Once you have found the specified text, if you want to search for other instances of the text in the System.Windows.Forms.ComboBox, you must use the version of the System.Windows.Forms.Combo Box.FindStringExact(System.String) method that provides a parameter for specifying a starting index within the System.Windows.Forms.ComboBox. If you want to perform partial word search instead of an exact word match, use the System.Windows.Forms.ComboBox.FindString(System.String) method. The System.String to search for.

cccccc) FindStringExact

[C#] public int FindStringExact(string s, int startIndex);

[C++] public: int FindStringExact(String* s, int startIndex);

[VB] Public Function FindStringExact(ByVal s As String, ByVal startIndex As Integer) As Integer

[JScript] public function FindStringExact(s: String, startIndex: int): int;

Description

Finds the first item after the specified index that matches the specified string.

Return Value: The zero-based index of the first item found; returns −1 if no match is found.

The search performed by this method is not case-sensitive. The s parameter is a string to compare against the text associated with the items in the combo box list. The search looks for a match starting from the beginning of the text, returning the first item in the list that matches the specified substring. You can then perform tasks, such as removing the item that contains the search text using the System.Windows.Forms.ComboBox.ObjectCollection.Remove(System.Object) method or changing the item's text. This method is typically used after a call has been made using the version of this method that does not specify a starting index. Once an intial item has been found in the list, this method is typically used to find further instances of the search text by specifying the index position in the startIndex parameter of the item after the first found instance of the search text. If you want to perform partial word search instead of an exact word match, use the System.Windows.Forms.ComboBox.FindString(System.String) method. The System.String to search for. The zero-based index of the item before the first item to be searched. Set to −1 to search from the beginning of the control.

dddddd) GetItemHeight

[C#] public int GetItemHeight(int index);

[C++] public: int GetItemHeight(int index);

[VB] Public Function GetItemHeight(ByVal index As Integer) As Integer

[JScript] public function GetItemHeight(index: int): int;

Description

Returns the height of an item in the System.Windows.Forms.ComboBox.

Return Value: The height, in pixels, of the item at the specified index.

If the System.Windows.Forms.ComboBox.DrawMode property is not set to System.Windows.Forms.DrawMode.OwnerDrawVariable, the value of the index parameter is ignored because all items in a standard System.Windows.Forms.ComboBox are the same size. You can use this property when you are using an owner-drawn System.Windows.Forms.ComboBox to determine the size of any item within the System.Windows.Forms.ComboBox. The index of the item to return the height of.

eeeeee) IsInputKey

[C#] protected override bool IsInputKey(Keys keyData);

[C++] protected: bool IsInputKey(Keys keyData);

[VB] Overrides Protected Function IsInputKey(ByVal keyData As Keys) As Boolean

[JScript] protected override function IsInputKey(keyData: Keys): Boolean;

Description

Determines if keyData is in input key that the control wants. Overridden to return true for RETURN and ESCAPE when the combo box is dropped down.

ffffff) OnBackColorChanged

[C#] protected override void OnBackColorChanged(Event Args e);

[C++] protected: void OnBackColorChanged(EventArgs* e);

[VB] Overrides Protected Sub OnBackColorChanged(ByVal e As EventArgs)

[JScript] protected override function OnBackColorChanged (e: EventArgs);

Description

Indicates that a critical property, such as color or font has changed.

gggggg) OnDataSourceChanged

[C#] protected override void OnDataSourceChanged(Event Args e);

[C++] protected: void OnDataSourceChanged(EventArgs* e);

[VB] Overrides Protected Sub OnDataSourceChanged(ByVal e As EventArgs)

[JScript] protected override function OnDataSourceChanged (e: EventArgs);

Description hhhhhh) OnDisplayMemberChanged

[C#] protected override void OnDisplayMemberChanged(EventArgs e);

[C++] protected: void OnDisplayMemberChanged(Event Args* e);

[VB] Overrides Protected Sub OnDisplayMemberChanged (ByVal e As EventArgs)

[JScript] protected override function OnDisplayMemberChanged(e: EventArgs);

Description iiiiii) OnDrawItem

[C#] protected virtual void OnDrawItem(DrawItemEvent Args e);

[C++] protected: virtual void OnDrawItem(DrawItemEventArgs* e);

[VB] Overridable Protected Sub OnDrawItem(ByVal e As DrawItemEventArgs)

[JScript] protected function OnDrawItem(e: DrawItemEvent Args);

Description

Raises the System.Windows.Forms.ComboBox.DrawItem event.

Raising an event invokes the event handler through a delegate. For more information, see. A System.Windows.Forms.DrawItemEventArgs that contains the event data.

jjjjjj) OnDropDown

[C#] protected virtual void OnDropDown(EventArgs e);

[C++] protected: virtual void OnDropDown(EventArgs* e);

[VB] Overrdable Protected Sub OnDropDown(ByVal e As EventArgs)

[JScript] protected function OnDropDown(e: EventArgs);

Description

Raises the System.Windows.Forms.ComboBox.DropDown event.

This event is raised each time the drop-down is displayed. An System.EventArgs that contains the event data.

kkkkkk) OnDropDownStyleChanged

[C#] protected virtual void OnDropDownStyleChanged (EventArgs e);

[C++] protected: virtual void OnDropDownstyleChanged(EventArgs* e);

[VB] Overridable Protected Sub OnDropDownStyleChanged(ByVal e As EventArgs)

[JScript] protected function OnDropDownStyleChanged(e: EventArgs);

Description

Raises the System.Windows.Forms.ComboBox. DropDownStyleChanged event.

This event is raised when you set System.Windows.Forms. ComboBox.DropDownStyle to a new value. An System. EventArgs that contains the event data.

llllll) OnFontChanged

[C#] protected override void OnFontChanged(EventArgs e);

[C++] protected: void OnFontChanged(EventArgs* e);

[VB] Overrides Protected Sub OnFontChanged(ByVal e As EventArgs)

[JScript] protected override function OnFontChanged(e: EventArgs);

Description

Indicates that a critical property, such as color or font has changed.

mmmmmm) OnForeColorChanged

[C#] protected override void OnForeColorChanged(Event Args e);

[C++] protected: void OnForeColorChanged(EventArgs* e);

[VB] Overrides Protected Sub OnForeColorChanged(ByVal e As EventArgs)

[JScript] protected override function OnForeColorChanged (e: EventArgs);

Description

Indicates that a critical property, such as color or font has changed.

nnnnnn) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

Overridden to make sure all the items and styles get set up correctly. Inheriting classes should not forget to call base.OnHandleCreated( ) Overridden to make sure all the items and styles get set up correctly. Inheriting classes should not forget to call base.OnHandleCreated( )

oooooo) OnHandleDestroyed

[C#] protected override void OnHandleDestroyed(EventArgs e);

[C++] protected: void OnHandleDestroyed(EventArgs* e);

[VB] Overrides Protected Sub OnHandleDestroyed(ByVal e As EventArgs)

[JScript] protected override function OnHandleDestroyed(e: EventArgs);

Description

We need to un-subclasses everything here. Inheriting classes should not forget to call base.OnHandleDestroyed( ) We need to un-subclasses everything here. Inheriting classes should not forget to call base.OnHandleDestroyed( )

pppppp) OnKeyPress

[C#] protected override void OnKeyPress(KeyPressEvent Args e);

[C++] protected: void OnKeyPress(KeyPressEventArgs* e);

[VB] Overrides Protected Sub OnKeyPress(ByVal e As KeyPressEventArgs)

[JScript] protected override function OnKeyPress(e: KeyPressEventArgs);

Description

Key press event handler. Overridden to close up the combo box when the user presses RETURN or ESCAPE.

qqqqqq) OnMeasureItem

[C#] protected virtual void OnMeasureItem(MeasureItemEventArgs e);

[C++] protected: virtual void OnMeasureItem(MeasureItem EventArgs* e);

[VB] Overridable Protected Sub OnMeasureItem(ByVal e As MeasureItemEventArgs)

[JScript] protected function OnMeasureItem(e: MeasureItem EventArgs);

Description

Raises the System.Windows.Forms.ComboBox.MeasureItem event.

This is event is raised when you insert an item into the list. The System.Windows.Forms.MeasureItemEventArgs that was raised.

rrrrrr) OnParentBackColorChanged

[C#] protected override void OnParentBackColorChanged (EventArgs e);

[C++] protected: void OnParentBackColorChanged(Event Args* e);

[VB] Overrides Protected Sub OnParentBackColorChanged (ByVal e As EventArgs)

[JScript] protected override function OnParentBackColorChanged(e: EventArgs);

Description

This method is called by the parent control when any property changes on the parent. This can be overriden by inheriting classes, however they must call base.OnParentPropertyChanged. Property change information.

ssssss) OnResize

[C#] protected override void OnResize(EventArgs e);

[C++] protected: void OnResize(EventArgs* e);

[VB] Overrides Protected Sub OnResize(ByVal e As Event Args)

[JScript] protected override function OnResize(e: Event Args);

Description

Raises the System.Windows.Forms.Control.Resize event.

Raising an event invokes the event handler through a delegate. For more information, see. An System.EventArgs that contains the event data.

tttttt) OnSelectedIndexChanged

[C#] protected override void OnSelectedIndexChanged (EventArgs e);

[C++] protected: void OnSelectedIndexChanged(Event Args* e);

[VB] Overrides Protected Sub OnSelectedIndexChanged (ByVal e As EventArgs) [JScript] protected override function OnSelectedIndexChanged(e: EventArgs);

Description

Raises the System.Windows.Forms.ComboBox.SelectedIndexChanged event.

This event is raised when you select a new item from the list. This event is raised when you set System.Windows.Forms.ComboBox.SelectedIndex. An System.EventArgs that contains the event data.

uuuuuu) OnSelectedItemChanged

[C#] protected virtual void OnSelectedItemChanged(Event Args e);

[C++] protected: virtual void OnSelectedItemChanged (EventArgs* e);

[VB] Overridable Protected Sub OnSelectedItemChanged (ByVal e As EventArgs)

[JScript] protected function OnSelectedItemChanged(e: EventArgs);

Description

Raises the SelectedItemChanged event.

This event is raised when you select a new item from the list. This event is raised when you set System.Windows.Forms.ComboBox.SelectedIndex. An System.EventArgs that contains the event data.

vvvvvv) OnSelectionChangeCommitted

[C#] protected virtual void OnSelectionChangeCommitted (EventArgs e);

[C++] protected: virtual void OnSelectionChangeCommitted (EventArgs* e);

[VB] Overridable Protected Sub OnSelectionChangeCommitted(ByVal e As EventArgs)

[JScript] protected function OnSelectionChangeCommitted (e: EventArgs);

Description

Raises the System.Windows.Forms.ComboBox.SelectionChangeCommitted event.

This event is raised when a new item is selected and that change to that item is completed. This event is also raised when you set System.Windows.Forms.ComboBox.SelectedIndex. An System.EventArgs that contains the event data.

wwwwww) RefreshItem

[C#] protected override void RefreshItem(int index);

[C++] protected: void RefreshItem(int index);

[VB] Overrides Protected Sub RefreshItem(ByVal index As Integer)

[JScript] protected override function RefreshItem(index: int);

Description

Reparses the object at the given index, getting new text string for it.

xxxxxx) Select

[C#] public void Select(int start, int length);

[C++] public: void Select(int start, int length);

[VB] Public Sub Select(ByVal start As Integer, ByVal length As Integer)

[JScript] public function Select(start: int, length: it); Selects a range of text.

Description

Selects a range of text in the editable portion of the System.Windows.Forms.ComboBox.

If you want to set the start position to the first character in the control's text, set the start parameter to zero. You can use this method to select a substring of text, such as when searching through the text of the control and replacing information. The position of the first character in the current text selection within the text box. The number of characters to select.

yyyyyy) SelectAll

[C#] public void SelectAll( );

[C++] public: void SelectAll( );

[VB] Public Sub SelectAll( )

[JScript] public function SelectAll( );

Description

Selects all the text in the editable portion of the System.Windows.Forms.ComboBox.

zzzzzz) SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As Bounds Specified)

[JScript] protected override function SetBoundsCore(x: int, y: int, width: int, height int, specified: BoundsSpecified);

Description

Sets the size and location of the System.Windows.Forms.ComboBox. The horizontal location in pixels of the control. The vertical location in pixels of the control. The width in pixels of the control. The height in pixels of the control. One of the System.Windows.Forms.BoundsSpecified values.

aaaaaaa) SetItem Core

[C#] protected override void SetItemCore(int index, object value);

[C++] protected: void SetItemCore(int index, Object* value);

[VB] Overrides Protected Sub SetItemCore(ByVal index As Integer, ByVal value As Object)

[JScript] protected override function SetItemCore(index: int, value: Object);

Description bbbbbbb) SetItemsCore

[C#] protected override void SetItemsCore(object[ ] value);

[C++] protected: void SetItemsCore(Object* value _c[ ]);

[VB] Overrides Protected Sub SetItemsCore(ByVal value( ) As Object)

[JScript] protected override function SetItemsCore(value: Object[ ]);

Description

Performs the work of setting the specified items to the combobox Performs the work of setting the specified items to the combobox ccccccc) ToString

[C#] public override string ToString( );

[C++] public: String* ToString( );

[VB] Overrides Public Function ToString( ) As String

[JScript] public override function ToString( ): String;

Description

Provides some interesting info about this control in String form.

Return Value: String Provides some interesting info about this control in String form.

ddddddd) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

The comboboxs window procedure. Inheriting classes can override this to add extra functionality, but should not forget to call base.wndProc(m); to ensure the combo continues to function properly. A Windows Message Object.

ComboBoxStyle enumeration (System.Windows.Forms)

a) WndProc

Description

Specifies the System.Windows.Forms.ComboBox style.

The System.Windows.Forms.ComboBox.DropDownStyle property determines whether the user can enter a new value in the text portion, and whether the list portion is always displayed.

b) WndProc

[C#] public const ComboBoxStyle DropDown;

[C++] public: const ComboBoxStyle DropDown;

[VB] Public Const DropDown As ComboBoxStyle

[JScript] public var DropDown: ComboBoxStyle;

Description

The text portion is editable. The user must click the arrow button to display the list portion.

c) WndProc

[C#] public const ComboBoxStyle DropDownList;

[C++] public: const ComboBoxStyle DropDownList;

[VB] Public Const DropDownList As ComboBoxStyle

[JScript] public var DropDownList: ComboBoxStyle;

Description

The user cannot directly edit the text portion. The user must click the arrow button to display the list portion.

d) WndProc

[C#] public const ComboBoxStyle Simple;

[C++] public: const ComboBoxStyle Simple;

[VB] Public Const Simple As ComboBoxStyle

[JScript] public var Simple: ComboBoxStyle;

Description

The text portion is editable. The list portion is always visible.

CommonDialog class (System.Windows.Forms)

a) ToString

Description

Specifies the base class used for displaying dialog boxes on the screen.

Inheritied classes are required to implement System.Windows.Forms.CommonDialog.RunDialog(System.IntPtr) by invoking System.Windows.Forms.CommonDialog.ShowDialog to create a specific common dialog box. Inherited classes can optionally override System.Windows.Forms.CommonDialog.HookProc(System.IntPtr, System.Int32, System.IntPtr, System.IntPtr) to implement specific dialog box hook functionality.

b) CommonDialog

Example Syntax:

c) ToString

[C#] public CommonDialog( );

[C++] public: CommonDialog( );

[VB] Public Sub New( )

[JScript] public function CommonDialog( );

Description

Initializes a new instance of the System.Windows.Forms.CommonDialog class.

Initializes a new instance of the System.Windows.Forms.CommonDialog class.

d) Container e) DesignMode f) Events g) Site h) ToString

Description

Occurs when the user clicks the Help button on a common dialog box. For information about handling events, see.

i) HookProc

[C#] protected virtual IntPtr HookProc(IntPtr hWnd, int msg, IntPtr wparam, IntPt lparam);

[C++] protected: virtual IntPtr HookProc(IntPtr hWnd, int msg, IntPtr wparam, IntPtr lparam);

[VB] Overridable Protected Function HookProc(ByVal hWnd As IntPtr, ByVal msg As Integer, ByVal wparam As IntPtr, ByVal lparam As IntPtr) As IntPtr

[JScript] protected function HookProc(hWnd: IntPtr, msg: int, wparam: IntPtr, lparam: IntPtr): IntPtr;

Description

Defines the common dialog box hook procedure that is overridden to add specific functionality to a common dialog box.

Return Value: A zero value if the default dialog box procedure processes the message; a nonzero value if the default dialog box procedure ignores the message.

A hook procedure allows the user to connect or insert other routines into a routine or application for the purpose of debugging or enhancing functionality. The handle to the dialog box window. The message being received. Additional information about the message. Additional information about the message.

j) OnHelpRequest

[C#] protected virtual void OnHelpRequest(EventArgs e);

[C++] protected: virtual void OnHelpRequest(EventArgs* e);

[VB] Overridable Protected Sub OnHelpRequest(ByVal e As EventArgs)

[JScript] protected function OnHelpRequest(e: EventArgs);

Description

Raises the System.Windows.Forms.CommonDialog.HelpRequest event.

This method is invoked when the Help button is clicked. Inheriting classes can override this method to handle the event. An System.Windows.Forms.HelpEventArgs that provides the event data.

k) OwnerWndProc

[C#] protected virtual IntPtr OwnerWndProc(IntPtr hWnd, int msg, IntPtr wparam, IntPtr lparam);

[C++] protected: virtual IntPtr OwnerWndProc(IntPtr hWnd, int msg, IntPtr wparam, IntPtr lparam);

[VB] Overridable Protected Function OwnerWndProc(ByVal hWnd As IntPtr, ByVal msg As Integer, ByVal wparam As IntPtr, ByVal lparam As IntPtr) As IntPtr

[JScript] protected function OwnerWndProc(hWnd: IntPtr, msg: int, wparam: IntPtr, lparam: IntPtr): IntPtr;

Description

Defines the owner window procedure that is overridden to add specific functionality to a common dialog box.

Return Value: The result of the message processing, which is dependent on the message sent.

Control is transferred here when messages are sent to the owner window of the common dialog. Inheriting classes can override this method to add specific functionality to a common dialog. The window handle of the message to send. The Win32 message to send. The wparam to send with the message. The Iparam to send with the message.

l) Reset

[C#] public abstract void Reset( );

[C++] public: virtual void Reset( )=0;

[VB] MustOverride Public Sub Reset( )

[JScript] public abstract function Reset( );

Description

When overridden in a derived class, resets the properties of a common dialog to their default values.

Inheriting classes can override this method to reset their properties.

m) RunDialog

[C#] protected abstract bool RunDialog(IntPtr hwndOwner);

[C++] protected: virtual bool RunDialog(IntPtr hwnd Owner)=0;

[VB] MustOverride Protected Function RunDialog(ByVal hwndOwner As IntPtr) As Boolean

[JScript] protected abstract function RunDialog(hwnd-Owner: IntPtr): Boolean;

Description

When overridden in a derived class, specifies a common dialog box.

Return Value: true if the dialog was successfully run; otherwise, false.

This method is invoked when the user of a common dialog calls System.Windows.Forms.CommonDialog.ShowDialog, and it must be overridden by inherited classes of System.Windows.Forms.CommonDialog to implement a specific common dialog. An implementation of this method should store the hwndOwner and hookProcPtr parameters in the common dialog structure's hwndOwner and IpfnHook fields. A value that represents the window handle of the owner window for the common dialog box.

n) ShowDialog

[C#] public DialogResult ShowDialog( );

[C++] public: DialogResult ShowDialog( );

[VB] Public Function ShowDialog( ) As DialogResult

[JScript] public function ShowDialog( ): DialogResult; Runs a common dialog box.

Description

Runs a common dialog box with a default owner.

Return Value: System.Windows.Forms.DialogResult.OK if the user clicks OK in the dialog box; otherwise, System.Windows.Forms.DialogResult.Cancel.

This method implements System.Windows.Forms.CommonDialog.RunDialog(System.IntPtr).

o) ShowDialog

[C#] public DialogResult ShowDialog(IWin32Window owner);

[C++] public: DialogResult ShowDialog(IWin32Window* owner);

[VB] Public Function ShowDialog(ByVal owner As IWin32Window) As DialogResult

[JScript] public function ShowDialog(owner: IWin32Window): DialogResult;

Description

Runs a common dialog box as a modal dialog with the specified owner.

Return Value: System.Windows.Forms.DialogResult.OK if the user clicks OK in the dialog box; otherwise, System.Windows.Forms.DialogResult.Cancel.

This version of the System.Windows.Forms.CommonDialog.ShowDialog method allows you to specify a specific form or control that will own the dialog box that is shown. If you use the version of this method that has no parameters, the dialog box being shown would be owned automatically by the currently active window of your application. Any object that implements System.Windows.Forms.IWin32Window that represents the top-level window that will own the modal dialog.

AxHost.ConnectionPointCookie class (System.Windows.Forms)

a) ToString b) AxHost.ConnectionPointCookie

Example Syntax:

c) ToString d) Disconnect

[C#] public void Disconnect( );

[C++] public: void Disconnect( );

[VB] Public Sub Disconnect( )

[JScript] public function Disconnect( ); Disconnect the current connection point. If the object is not connected, this method will do nothing.

e) Finalize

[C#] ~ConnectionPointCookie( );

[C++] ~ConnectionPointCookie( );

[VB] Overrides Protected Sub Finalize( )

[JScript] protected override function Finalize( );

ContainerControl class (System.Windows.Forms)

a) ToString

Description

Provides focus management functionality for controls that can function as a container for other controls.

A System.Windows.Forms.ContainerControl represents a control that can function as a container for other controls and provides focus management. Controls that inherit from this class can track the active control they contain, even when the focus moves somewhere within a different container.

b) ContainerControl

Example Syntax:

c) ToString

[C#] public ContainerControl( );

[C++] public: ContainerControl( );

[VB] Public Sub New( )

[JScript] public function ContainerControl( );

Description

Initializes a new instance of the System.Windows.Forms.ContainerControl class.

d) AccessibilityObject
e) AccessibleDefaultActionDescription
f) AccessibleDescription
g) AccessibleName
h) AccessibleRole
i) ActiveControl
j) ToString Description Gets or sets the active control on the container control.

This property activates or retrieves the active control on the container control.

k) AllowDrop
l) Anchor
m) AutoScroll
n) AutoScrollMargin
o) AutoScrollMinSize
p) AutoScrollPosition
q) BackColor
r) BackgroundImage
s) BindingContext
t) ToString Description The binding manager for the container control.

u) Bottom
v) Bounds
w) CanFocus
x) CanSelect
y) Capture
z) CausesValidation
aa) ClientRectangle
bb) ClientSize
cc) CompanyName
dd) Container
ee) ContainsFocus
ff) ContextMenu
gg) Controls
hh) Created
ii) CreateParams
jj) ToString Description kk) Cursor
ll) DataBindings
mm) DefaultImeMode
nn) DefaultSize
oo) DesignMode
pp) DisplayRectangle
qq) Disposing
rr) Dock
ss) DockPadding
tt) Enabled
uu) Events
vv) Focused
ww) Font
xx) FontHeight
yy) ForeColor
zz) Handle
aaa) HasChildren
bbb) Height
ccc) HScroll
ddd) ImeMode
eee) InvokeRequired
fff) IsAccessible
ggg) IsDisposed
hhh) IsHandleCreated
iii) Left
jjj) Location
kkk) Name
lll) Parent
mmm) ParentForm
nnn) ToString Description Gets or sets the form that the container control is assigned to.

ooo) ProductName
ppp) ProductVersion
qqq) RecreatingHandle
rrr) Region
sss) RenderRightToLeft
ttt) ResizeRedraw
uuu) Right
vvv) RightToLeft
www) ShowFocusCues
xxx) ShowKeyboardCues
yyy) Site
zzz) Size
aaaa) TabIndex
bbbb) TabStop
cccc) Tag
dddd) Text
eeee) Top
ffff) TopLevelControl
gggg) Visible
hhhh) VScroll
iiii) Width
jjjj) WindowTarget
kkkk) AdjustFormScrollbars

[C#] protected overide void AdjustFormScrollbars(bool displayScrollbars);

[C++] protected: void AdjustFormScrollbars(bool displayScrollbars);

[VB] Overrides Protected Sub AdjustFormScrollbars(ByVal displayScrollbars As Boolean)

[JScript] protected override function AdjustFormScrollbars (displayScrollbars Boolean);

Description llll) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the resources (other than memory) used by the System.Windows.Forms.ContainerControl.

Call System.Windows.Forms.ContainerControl.Dispose (System.Boolean) when you are finished using the System.Windows.Forms.ContainerControl. The System.Windows.Forms.ContainerControl.Dispose(System.Boolean) method leaves the System.Windows.Forms.ContainerControl in an unusable state. After calling System.Windows.Forms.ContainerControl.Dispose(System.Boolean), you must release all references to the System.Windows.Forms.Container-Control so the memory it was occupying can be reclaimed by garbage collection.

mmmm) OnControlRemoved

[C#] protected override void OnControlRemoved(ControlEventArgs e);

[C++] protected: void OnControlRemoved(ControlEvent Args* e);

[VB] Overrides Protected Sub OnControlRemoved(ByVal e As ControlEventArgs)

[JScript] protected override function OnControlRemoved(e: ControlEventArgs);

Description

Called when a child control is removed from this control. Contains the control that has just been removed.

nnnn) OnCreateControl

[C#] protected override void OnCreateControl( );

[C++] protected: void OnCreateControl( );

[VB] Overrides Protected Sub OnCreateControl( )

[JScript] protected override function OnCreateControl( );

Description

Raises the CreateControl event.

oooo) ProcessDialogChar

[C#] protected override bool ProcessDialogChar(char charCode);

[C++] protected: bool ProcessDialogChar(_wchar_t charCode);

[VB] Overrides Protected Function ProcessDialogChar(ByVal charCode As Char) As Boolean

[JScript] protected override function ProcessDialogChar (charCode: Char) Boolean;

Description

Processes a dialog character. Overrides Control.processDialogChar( ). This method calls the processMnemonic( ) method to check if the character is a mnemonic for one of the controls on the form. If processMnemonic( ) does not consume the character, then base.processDialogChar( ) is called.

Return Value: true to consume the character, false to allow further processing. character to pre-process.

pppp) ProcessDialogKey

[C#] protected override bool ProcessDialogKey(Keys keyData);

[C++] protected: bool ProcessDialogKey(Keys keyData);

[VB] Overrides Protected Function ProcessDialogKey(ByVal keyData As Keys) As Boolean

[JScript] protected override function ProcessDialogKey(keyData: Keys): Boolean;

Description

Processes a dialog key. Overrides Control.processDialogKey( ). This method implements handling of the TAB, LEFT, RIGHT, UP, and DOWN keys in dialogs. The method performs no processing on keys that include the ALT or CONTROL modifiers. For the TAB key, the method selects the next control on the form.

Return Value: true to consume the key, false to allow further processing. key code and modifier flags.

qqqq) ProcessMnemonic

[C#] protected override bool ProcessMnemonic(char charCode);

[C++] protected: bool ProcessMnemonic(_wchar_t charCode);

[VB] Overrides Protected Function ProcessMnemonic(ByVal charCode As Char) As Boolean

[JScript] protected override function ProcessMnemonic(char Code: Char): Boolean;

rrrr) ProcessTabKey

[C#] protected virtual bool ProcessTabKey(bool forward);

[C++] protected: virtual bool ProcessTabKey(bool forward);

[VB] Overridable Protected Function ProcessTabKey(ByVal forward As Boolean) As Boolean

[JScript] protected function ProcessTabKey(forward: Boolean): Boolean;

Description

Selects the next available control and makes it the active control.

Return Value: true if a control is selected; otherwise, false.

A control with its System.Windows.Forms.Control.TabStop property set to false cannot be selected, so the next available control will be selected. true to cycle forward through the controls in the System.Windows.Forms.ContainerControl; otherwise, false.

ssss) Select

[C#] protected override void Select(bool directed, bool forward);

[C++] protected: void Select(bool directed, bool forward);

[VB] Overrides Protected Sub Select(ByVal directed As Boolean, ByVal forward As Boolean)

[JScript] protected override function Select(directed: Boolean, forward: Boolean);

tttt) IContainerControl.ActivateControl

[C#] bool IContainerControl.ActivateControl(Control control);

[C++] bool IContainerControl::ActivateControl(Control* control);

[VB] Function ActivateControl(ByVal control As Control) As Boolean Implements IContainerControl.ActivateControl

[JScript] function IContainerControl.ActivateControl(control: Control): Boolean;

uuuu) UpdateDefaultButton

[C#] protected virtual void UpdateDefaultButton( );

[C++] protected: virtual void UpdateDefaultButton( );

[VB] Overridable Protected Sub UpdateDefaultButton( )

[JScript] protected function UpdateDefaultButton( );

Description

Updates the default button based on current selection, and the acceptButton property.

vvvv) Validate

[C#] public bool Validate( );

[C++] public: bool Validate( );

[VB] Public Function Validate( ) As Boolean

[JScript] public function Validate( ): Boolean;

Description

Validates the last invalidated control and its ancestors up through, but not including, the current control.

Return Value: true if validation is successful; otherwise, false.

wwww) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

ContentsResizedEventArgs class (System.Windows.Forms)

a) WndProc

Description

Provides data for the System.Windows.Forms.RichTextBox.ContentsResized event.

This event is raised when the bounding rectangle necessary to accept new text changes. If the text within the control spans multiple lines, the requested rectangle will always be the width of the control. You can handle this event in your control to implement auto-resizing for multiline System.Windows.Forms.RichTextBox controls. The System.Windows.Forms.ContentsResizedEventArgs identifies the requested size of the System.Windows.Forms.RichTextBox.

b) ContentsResizedEventArgs

Example Syntax:

c) WndProc

[C#] public ContentsResizedEventArgs(Rectangle newRectangle);

[C++] public: ContentsResizedEventArgs(Rectangle newRectangle);

[VB] Public Sub New(ByVal newRectangle As Rectangle)

[JScript] public function ContentsResizedEventArgs(new Rectangle: Rectangle);

Description

Initializes a new instance of the System.Windows.Forms.ContentsResizedEventArgs class. A System.Drawing.Rectangle that specifies the requested dimensions of the System.Windows.Forms.RichTextBox control.

d) NewRectangle e) WndProc

[C#] public Rectangle NewRectangle {get;}

[C++] public: _property Rectangle get_NewRectangle( );

[VB] Public ReadOnly Property NewRectangle As Rectangle

[JScript] public function get NewRectangle( ): Rectangle;

Description

Represents the requested size of the System.Windows.Forms.RichTextBox control.

When text is entered into the System.Windows.Forms.RichTextBox control, the System.Windows.Forms.RichTextBox control determines the proper size of the control in order to display all of the contents of the control. You can use the System.Windows.Forms.ContentsResizedEventArgs.NewRectangle property in an event handler for the System.Windows.Forms.RichTextBox. ContentsResized event of the System.Windows.Forms. RichTextBox control to properly size the control to display all of the control's contents.

ContentsResizedEventHandler delegate (System.Windows.Forms)

a) ToString

Description

Represents the method that will handle the System.Windows.Forms.RichTextBox.ContentsResized event of a System.Windows.Forms.RichTextBox.

When you create a System.Windows.Forms.ContentsResizedEventArgs delegate, you identify the method that will handle the event. To associate the event with your event handler, add an instance of the delegate to the event. The event handler is called whenever the event occurs, unless you remove the delegate. For more information about event handler delegates, see.

ContextMenu class (System.Windows.Forms)

a) ToString

Description

Represents a shortcut menu.

The System.Windows.Forms.ContextMenu class represents shortcut menus that can be displayed when the user clicks the right mouse button over a control or area of the form. Shortcut menus are typically used to combine different menu items from a System.Windows.Forms.MainMenu of a form that are useful for the user given the context of the application. For example, you can use a shortcut menu assigned to a System.Windows.Forms.TextBox control to provide menu items for changing the font of the text, finding text within the control, or Clipboard features for copying and pasting text. You can also display new System.Windows.Forms.MenuItem objects in a shortcut menu that are not located within a System.Windows.Forms.MainMenu to provide situation specific commands that are not appropriate for the System.Windows.Forms.MainMenu to display.

b) ContextMenu

Example Syntax:

c) ToString

[C#] public ContextMenu( );

[C++] public: ContextMenu( );

[VB] Public Sub New( )

[JScript] public function ContextMenu( ); Initializes a new instance of the System.Windows.Forms.ContextMenu class.

Description

Initializes a new instance of the System.Windows.Forms.ContextMenu class with no menu items specified.

Once you have used this version of the constructor, you can add menu items to the System.Windows.Forms.Context- Menu by using the System.Windows.Forms.Menu.MenuItemCollection.Add(System.String) method of the System.Windows.Forms.Menu.MenuItemCollection class. You can access the System.Windows.Forms.Menu.MenuItemCollection through the System.Windows.Forms.Menu.MenuItems property.

d) ContextMenu

Example Syntax:

e) ToString

[C#] public ContextMenu(MenuItem[ ] menuItems);

[C++] public: ContextMenu(MenuItem* menuItems[ ]);

[VB] Public Sub New(ByVal menuItems( ) As MenuItem)

[JScript] public function ContextMenu(menuItems: MenuItem[ ]);

Description

Initializes a new instance of the System.Windows.Forms.ContextMenu class with a specified set of System.Windows.Forms.MenuItem objects.

You can use this version of the constructor to create a System.Windows.Forms.ContextMenu that has its menu items specified at the time it is created. Once you have used this version of the constructor, you can add additional menu items to the System.Windows.Forms.ContextMenu by using the System.Windows.Forms.Menu.MenuItemCollection.Add (System.String) method of the System.Windows.Forms.Menu.MenuItemCollection class. You can access the System.Windows.Forms.Menu.MenuItemCollection through the System.Windows.Forms.Menu.MenuItems property. An array of System.Windows.Forms.MenuItem objects that represent the menu items to add to the context menu.

f) Container g) DesignMode h) Events i) Handle j) IsParent k) MdiListItem l) MenuItems m) RightToLeft n) ToString Description Gets or sets a value indicating whether text displayed by the control is displayed from right to left.

This property allows your menus to support languages that are written from right to left. When this property is set to RightToLeft.Yes, the menu item text is displayed from right to left instead of the default left to right method.

o) Site p) SourceControl q) ToString

Description

Gets the control that is displaying the shortcut menu.

This property enables you to determine which control currently displays the shortcut menu defined in the System.Windows.Forms.ContextMenu. If the context menu is not currently displayed, you can use this property to determine which control last displayed the shortcut menu. You can use this property in the System.Windows.Forms.ContextMenu.Popup event to ensure that the control displays the proper menu items. You can also use this property to pass a reference to the control to a method that performs the tasks associated with a menu command displayed in the shortcut menu. Since the System.Windows.Forms.Form class inherits from System.Windows.Forms.Control, you can also use this property if the System.Windows.Forms.ContextMenu is associated with a form.

r) ToString

Description

Occurs before the context menu is displayed.

You can use this event to initialize the System.Windows.Forms.MenuItem objects before they are displayed. For example, if you use a System.Windows.Forms.ContextMenu for three System.Windows.Forms.TextBox controls and you want to disable certain menu items in the System.Windows.Forms.ContextMenu depending on which System.Windows.Forms.TextBox is displaying the shortcut menu, you can create an event handler for this event. You could use the System.Windows.Forms.ContextMenu.SourceControl property to determine which System.Windows.Forms.TextBox is about to display the System.Windows.Forms.ContextMenu and disable the appropriate System.Windows.Forms.MenuItem objects.

s) OnPopup

[C#] protected internal virtual void OnPopup(EventArgs e);

[C++] protected public: virtual void on Popup(EventArgs* e);

[VB] Overridable Protected Friend Dim Sub OnPopup(ByVal e As EventArgs)

[JScript] package function OnPopup(e: EventArgs);

Description

Fires the popup event Fires the popup event Event object t) Show

[C#] public void Show(Control control, Point pos);

[C++] public: void Show(Control* control, Point pos);

[VB] Public Sub Show(ByVal control As Control, ByVal pos As Point)

[JScript] public function Show(control: Control, pos: Point);

Description

Displays the shortcut menu at the specified position.

Typically, a System.Windows.Forms.ContextMenu is displayed when the user clicks the right mouse button on a control or area of the form that the System.Windows.Forms.ContextMenu is bound to. You can use this method to manually display the shortcut menu at a specific location and bind it with a specific control. This method does not return until the menu is dismissed. A System.Windows.Forms.Control object that specifies the control with which this context menu is associated. A System.Drawing.Point object that specifies the coordinates at which to display the menu. These coordinates are specified relative to the client coordinates of the control specified in the control parameter.

Control class (System.Windows.Forms)

a) ToString

Description

Defines the base class for controls, which are components with visual representation.

The System.Windows.Forms.Control class implements very basic functionality required by classes that display to the user.

It handles user input through the keyboard and pointing devices. It handles message routing and security. It defines the bounds of a control (its position and size), although it does not implement painting. It provides a window handle (hWnd).

b) Control

Example Syntax:

c) ToString

[C#] public Control( );

[C++] public: Control( );

[VB] Public Sub New( )

[JScript] public function Control( ); Initializes a new instance of the System.Windows.Forms.Control class.

Description

Initializes a new instance of the System.Windows.Forms. Control class with default settings.

The System.Windows.Forms.Control class is the base class for all controls used in a Windows Forms application. Because this class is not typically used to create an instance of the class, this constructor is typically not called directly but is instead called by a derived class.

d) Control

Example Syntax:

e) ToString

[C#] public Control(string text);

[C++] public: Control(String* text);

[VB] Public Sub New(ByVal text As String)

[JScript] public function Control(text: Sting);

Description

Initializes a new instance of the System.Windows.Forms. Control class with specific text. A System.String that represents the text displayed by the control.

f) Control

Example Syntax:

g) ToString

[C#] public Control(Control parent, string text);

[C++] public: Control(Control* parent, String* text);

[VB] Public Sub New(ByVal parent As Control, ByVal text As String)

[JScript] public function Control(parent: Control, text: String);

Description

Initializes a new instance of the System.Windows.Forms. Control class as a child control, with specific text. A System. Windows.Forms.Control representing the parent of this control. A System.String that represents the text displayed by the control.

h) Control

Example Syntax:

i) ToString

[C#] public Control(string text, int left, int top, int width, int height);

[C++] public: Control(String* text, int left, int top, int width, int height);

[VB] Public Sub New(ByVal text As String, ByVal left As Integer, ByVal top As Integer, ByVal width As Integer, ByVal height As Integer)

[JScript] public function Control(text: String, left: int, top: int, width: int, height: int);

Description

Initializes a new instance of the System.Windows.Forms. Control class with specific text, size, and location. A System. String that represents the text displayed by the control. The System.Drawing.Point.X position of the control, in pixels, from the left edge of the control's container. The value is assigned to the System.Windows.Forms.Control.Left property. The System.Drawing.Point.Y position of the control, in pixels, from the top edge of the control's container. The value is assigned to the System.Windows.Forms.Control.Top property. The System.Windows.Forms.Control.Width of the control, in pixels. The System.Windows.Forms.Control.Height of the control, in pixels.

j) Control

Example Syntax:

k) ToString

[C#] public Control(Control parent, string text, int left, int top, int width, int height);

[C++] public: Control(Control* parent, String* text, int left, int top, int width, int height);

[VB] Public Sub New(ByVal parent As Control, ByVal text As String, ByVal left As Integer, ByVal top As Integer, ByVal width As Integer, ByVal height As Integer)=

[JScript] public function Control(parent: Control, text: String, left: int, top: int, width: int, height: int);

Description

Initializes a new instance of the System.Windows.Forms. Control class as a child control, with specific text, size, and location. A System.Windows.Forms.Control representing the parent of the control. A System.String that represents the text displayed by the control. The System.Drawing.Point.X position of the control, in pixels, from the left edge of the control's container. The value is assigned to the System.Windows. Forms.Control.Left property. The System.Drawing.Point.Y position of the control, in pixels, from the top edge of the control's container. The value is assigned to the System.Windows.Forms.Control.Top property. The System.Windows. Forms.Control.Width of the control, in pixels. The System. Windows.Forms.Control.Height of the control, in pixels.

l) AccessibilityObject m) ToString

[C#] public AccessibleObject AccessibilityObject {get;}

[C++] public: _property AccesslbleObject* get_AccessibilityObject( );

[VB] Public ReadOnly Property AccessibilityObject As AccessibleObject

[JScript] public function get AccessibilityObject( ): AccessibleObject;

Description

Gets the System.Windows.Forms.AccessibleObject assigned to the control.

To control the instance returned from this method, override the System.Windows.Forms.Control.CreateAccessibility Instance method.

n) AccessibleDefaultActionDescription o) ToString

[C#] public string AccessibleDefaultActionDescription {get; set;}

[C++] public: _property String* get_AccessibleDefaultActionDescription( ); public: _property void set_AccessibleDefaultActionDescription(String*);

[VB] Public Property AccessibleDefaultActionDescription As String

[JScript] public function get AccessibleDefaultActionDescription( ): String; public function set AccessibleDefaultActionDescription(String);

Description

Gets or sets the default action description of the control for use by accessibility client applications.

An object's System.Windows.Forms.Control.AccessibleDefaultActionDescription property describes the objects primary method of manipulation from the user's viewpoint. This property should be a verb or a short verb phrase.

p) AccessibleDescription
q) ToString

[C#] public string AccessibleDescription {get; set;}

[C++] public: _property String* getAccessibleDescription( ); public: _property void set_AccessibleDescription(String*);

[VB] Public Property AccessibleDescription As String

[JScript] public function getAccessibleDescription( ): String; public function set AccessibleDescription(String);

Description

Gets or sets the description of the control used by accessibility client applications.

An object's System.Windows.Forms.Control.AccessibleDescription property provides a textual description about an object's visual appearance. The description is primarily used to provide greater context for low-vision or blind users, but can also be used for context searching or other applications.

r) AccessibleName
s) ToString

[C#] public string AccessibleName {get; set;}

[C++] public: _property String* get_AccessibleName( ); public: _property void set_AccessibleName(String*);

[VB] Public Property AccessibleName As String

[JScript] public function get AccessibleName( ): String; public function set AccessibleName(String);

Description

Gets or sets the name of the control used by accessibility client applications.

The System.Windows.Forms.Control.AccessibleName property is a label that briefly describes and identifies the object within its container, such as the text in a System.Windows.Forms.Button, the name of a System.Windows.Forms.MenuItem, or a label displayed next to a System.Windows.Forms.TextBox control.

t) AccessibleRole
u) ToString

[C#] public AccessibleRole AccessibleRole {get; set;}

[C++] public: _property AccessibleRole get_AccessibleRole( ); public: _property void set_AccessibleRole(AccessibleRole);

[VB] Public Property AccessibleRole As AccessibleRole

[JScript] public function get AccessibleRole( ): AccessibleRole; public function set AccessibleRole(AccessibleRole);

Description

Gets or sets the accessible role of the control The System.Windows.Forms.AccessibleRole of the control. The default is System.Windows.Forms.AccessibleRole.Default.

The System.Windows.Forms.Control.AccessibleRole property describes what kind of user interface element an object is. If the control's role cannot be determined, the System.Windows.Forms.Control.AccessibleRole property is set to System.Windows.Forms.AccessibleRole.Default.

v) AllowDrop
w) ToString

[C#] public virtual bool AllowDrop {get; set;}

[C++] public: _property virtual bool get_AllowDrop( ); public: _property virtual void set_AllowDrop(bool);

[VB] Overridable Public Property AllowDrop As Boolean

[JScript] public function get AllowDrop( ): Boolean; public function set AllowDrop(Boolean);

Description

Gets or sets a value indicating whether the control can accept data that the user drags onto it.

When overriding the System.Windows.Forms.Control.AllowDrop property in a derived class, use the base class's System.Windows.Forms.Control.AllowDrop property to extend the base implementation. Otherwise, you must provide all the implementation. You are not required to override both the get and set methods of the System.Windows.Forms.Control.AllowDrop property; you can override only one if needed.

x) Anchor
y) ToString

[C#] public virtual AnchorStyles Anchor {get; set;}

[C++] public: _property virtual AnchorStyles get_Anchor( ); public: _property virtual void set_Anchor(AnchorStyles);

[VB] Overridable Public Property Anchor As AnchorStyles

[JScript] public function get Anchor( ): AnchorStyles; public function set

Anchor(AnchorStyles);

Description

Gets or sets which edges of the control are anchored to the edges of its container.

A control can be docked to one edge of its parent container or can dock to all edges and fill the parent container. For example, if you set this property to System.Windows.Forms.DockStyle.Left, the left edge of the control will be docked to the left edge of its parent control. Additionally, the docked edge of the control is resized to match that of its container control. Controls are docked in order of their z-order.

z) BackColor
aa) ToString

[C#] public virtual Color BackColor {get; set;}

[C++] public: _property virtual Color get_BackColor( ); public: _property virtual void set_BackColor(Color);

[VB] Overridable Public Property BackColor As Color

[JScript] public function get BackColor( ): Color; public function set BackColor(Color);

Description

Gets or sets the background color for the control.

The System.Windows.Forms.Control.BackColor property does not support transparent colors unless the System.Windows.Forms.ControlStyles.SupportsTransparentBackColor style bit is set to true bb) BackgroundImage cc) ToString

[C#] public virtual Image BackgroundImage {get; set;}

[C++] public: _property virtual Image* get_BackgroundImage( ); public: _property virtual void set_BackgroundImage (Image*);

[VB] Overridable Public Property BackgroundImage As Image

[JScript] public function get BackgroundImage( ): Image; public function set BackgroundImage(Image);

Description

Gets or sets the background image displayed in the control.

Images with translucent or transparent colors are not supported by Windows Forms controls as background images.

dd) BindingContext ee) ToString

[C#] public virtual BindingContext BindingContext {get; set;}

[C++] public: _property virtual BindingContext* get_BindingContext( ); public: _property virtual void set_BindingContext(BindingContext*);

[VB] Overridable Public Property BindingContext As BindingContext

[JScript] public function get BindingContext( ): BindingContext; public function set BindingContext(BindingContext);

Description

Gets or sets the System.Windows.Forms.BindingContext for the control.

The System.Windows.Forms.BindingContext object of a System.Windows.Forms.Control is used to return a single System.Windows.Forms.BindingManagerBase object for all data-bound controls contained by the System.Windows.Forms.Control. The System.Windows.Forms.BindingManagerBase object keeps all controls that are bound to the same data source synchronized. For example, setting the System.Windows.Forms.BindingManagerBase.Position property of the System.Windows.Forms.BindingManagerBase specifies the item in the underlying list that all data-bound controls point to.

ff) Bottom gg) ToString

[C#] public int Bottom {get;}

[C++] public: _property int get_Bottom( );

[VB] Public ReadOnly Property Bottom As Integer

[JScript] public function get Bottom( ): int;

Description

Gets the distance between the bottom edge of the control and the top edge of its container's client area.

The value of this property is equal to the sum of the System.Windows.Forms.Control.Top property value, plus the System.Windows.Forms.Control.Height property value.

hh) Bounds ii) ToString

[C#] public Rectangle Bounds {get; set;}

[C++] public: _property Rectangle get_Bounds( ); public: _property void set_Bounds(Rectangle);

[VB] Public Property Bounds As Rectangle

[JScript] public function get Bounds( ): Rectangle; public function set Bounds(Rectangle);

Description

Gets or sets the size and location of the control.

jj) CanFocus kk) ToString

[C#] public bool CanFocus {get;}

[C++] public: _property bool get_CanFocus( );

[VB] Public ReadOnly Property CanFocus As Boolean

[JScript] public function get CanFocus( ): Boolean;

Description

Gets a value indicating whether the control can receive focus.

In order for a control to receive input focus, the control must have a handle assigned to it, and the System.Windows.Forms.Control.Visible and System.Windows.Forms.Control.Enabled properties must both be set to true.

ll) CanSelect mm) ToString

[C#] public bool CanSelect {get;}

[C++] public: _property bool get_CanSelect( );

[VB] Public ReadOnly Property CanSelect As Boolean

[JScript] public function get CanSelect( ): Boolean;

Description

Gets a value indicating whether the control can be selected.

This property returns true if the control has System.Windows.Forms.ControlStyles.Selectable set to true, is contained in another control, and all of its parent controls are both visible and enabled.

nn) Capture oo) ToString

[C#] public bool Capture {get; set;}

[C++] public: _property bool get_Capture( ); public: _property void set_Capture(bool);

[VB] Public Property Capture As Boolean

[JScript] public function get Capture( ): Boolean; public function set Capture(Boolean);

Description

Gets or sets a value indicating whether the control has captured the mouse.

When a control has captured the mouse, it receives mouse input whether or not the cursor is within its borders. The mouse is typically only captured during drag operations.

pp) Causes Validation qq) ToString

[C#] public bool CausesValidation {get; set;}

[C++] public: _property bool get_CausesValidation( ); public: _property void set_CausesValidation(bool);

[VB] Public Property CausesValidation As Boolean

[JScript] public function get CausesValidation( ): Boolean; public function set CausesValidation(Boolean);

Description

Gets or sets a value indicating whether the control causes validation to be performed on all controls that require validation when it receives focus.

The System.Windows.Forms.Control.CausesValidation property value is typically set to false for controls such as a Help button.

rr) ClientRectangle ss) ToString

[C#] public Rectangle ClientRectangle {get;}

[C++] public: _property Rectangle get_ClientRectangle( );

[VB] Public ReadOnly Property ClientRectangle As Rectangle

[JScript] public function get ClientRectangle( ): Rectangle;

Description

Gets the rectangle that represents the client area of the control.

The client area of a control is the bounds of the control, minus the non-client elements such as scroll bars, borders, title bars and menus.

tt) ClientSize uu) ToString

[C#] public Size ClientSize {get; set;}

[C++] public: _property Size get_ClientSize( ); public: _property void set_ClientSize(Size);

[VB] Public Property ClientSize As Size

[JScript] public function get ClientSize( ): Size; public function set ClientSize(Size);

Description

Gets or sets the height and width of the client area of the control.

The client area of a control is the bounds of the control, minus the non-client elements such as scroll bars, borders, title bars and menus.

vv) CompanyName ww) ToString

[C#] public string CompanyName {get;}

[C++] public: _property String* get_CompanyName( );

[VB] Public ReadOnly Property CompanyName As String

[JScript] public function get CompanyName( ): String;

Description

Gets the name of the company or creator of the application containing the control.

The System.Windows.Forms.Control.CompanyName property is a read-only property. In order to change the value of this property, set the System.Reflection.AssemblyCompanyAttribute.Company property value of the System.Reflection.AssemblyCompanyAttribute.

xx) Container yy) ContainsFocus zz) ToString

Description

Gets a value indicating whether the control, or one of its child controls, currently has the input focus.

You can use this property to determine whether a control or any of the controls contained within it has the input focus. To determine whether the control has focus, regardless of whether any of its child controls have focus, use the System.Windows.Forms.Control.Focused property. To give a control the input focus, use the System.Windows.Forms.Control.Focus or System.Windows.Forms.Control.Select methods.

aaa) ContextMenu bbb) ToString

[C#] public virtual ContextMenu ContextMenu {get; set;}

[C++] public: _property virtual ContextMenu* get_ContextMenu( ); public: _property virtual void set_ContextMenu (ContextMenu*);

[VB] Overridable Public Property ContextMenu As ContextMenu

[JScript] public function get ContextMenu( ): ContextMenu; public function set ContextMenu(ContextMenu);

Description

Gets or sets the shortcut menu associated with the control.

A shortcut menu is also known as a context menu. Shortcut menus are used to give context specific menu options to users when they right-click on the control.

ccc) Controls ddd) ToString

[C#] public Control.ControlCollection Controls {get;}

[C++] public: _property Control.ControlCollection* get_Controls( );

[VB] Public ReadOnly Property Controls As Control.ControlCollection

[JScript] public function get Controls( ): Control.ControlCollection;

Description

Gets the collection of controls contained within the control.

A System.Windows.Forms.Control can act as a parent to a collection of controls. For example, when several controls are added to a System.Windows.Forms.Form, each of the controls is a member of the System.Windows.Forms.Control.ControlCollection object assigned to the System.Windows.Forms.Control.Controls property of the form, which is derived from the System.Windows.Forms.Control class.

eee) Created

[C#] public bool Created {get;}

[C++] public: _property bool get_Created( );

[VB] Public ReadOnly Property Created As Boolean

[JScript] public function get Created( ): Boolean;

Description

Gets a value indicating whether the control has been created.

The System.Windows.Forms.Control.Created property returns true if the System.Windows.Forms.Control was successfully created even though the control's handle may not have been created or recreated yet.

ggg) CreateParams hhh) ToString

[C#] protected virtual CreateParams CreateParams {get;}

[C++] protected: _property virtual CreateParams* get_CreateParams( );

[VB] Overridable Protected ReadOnly Property CreateParams As CreateParams

[JScript] protected function get CreateParams( ): CreateParams;

Description

Gets the required creation parameters when the control handle is created.

The System.Windows.Forms.Control.CreateParams property should not be overridden and used to adjust the properties of your derived control. Properties such as the System.Windows.Forms.CreateParams.Caption System.Windows.Forms. CreateParams.Width, and System.Windows.Forms. CreateParams.Height should be set by the corresponding properties in your control such as System.Windows.Forms. Control.Text System.Windows.Forms.Control.Width and System.Windows.Forms.Control.Height. The System.Windows.Forms.CreateParams object should only be extended when you are wrapping a standard Windows control class or to set styles not provided by the Windows Forms namespace. For more information about creating control parameters, see the CreateWindow and CreateWindowEx functions and the CREATESTRUCT structure documentation in the Windows Platform SDK reference located in the MSDN Library.

iii) Cursor jjj) ToString

[C#] public virtual Cursor Cursor {get; set;}

[C++] public: _property virtual Cursor* get_Cursor( ); public: _property virtual void set_Cursor(Cursor*);

[VB] Overridable Public Property Cursor As Cursor

[JScript] public function get Cursor( ): Cursor; public function set Cursor(Cursor);

Description

Gets or sets the cursor that is displayed when the mouse pointer is over the control.

When overriding the System.Windows.Forms.Control.Cursor property in a derived class, use the base class's System. Windows.Forms.Control.Cursor property to extend the base implementation. Otherwise, you must provide all the implementation. You are not required to override both the get and set methods of the System.Windows.Forms.Control.Cursor property; you can override only one if needed.

kkk) DataBindings lll) Tostring

[C#] public ControlBindingsCollection DataBindings {get;}

[C++] public: _property ControlBindingsCollection* get_DataBindings( );

[VB] Public ReadOnly Property DataBindings As ControlBindingsCollection

[JScript] public function get DataBindings( ): ControlBindingsCollection;

Description

Gets the data bindings for the control.

Use the System.Windows.Forms.Control.DataBindings property to access the System.Windows.Forms.ControlBindingsCollection. By adding System.Windows.Forms.Binding objects to the collection, you can bind any property of a control to the property of an object.

mmm) DefaultBackColor nnn) ToString

[C#] public static Color DefaultBackColor {get;}

[C++] public: _property static Color get_DefaultBack Color( );

[VB] Public Shared ReadOnly Property DefaultBackColor As Color

[JScript] public static function get DefaultBackColor( ): Color;

Description

Gets the default background color of the control.

This is the default System.Windows.Forms.Control. BackColor property value of a generic top-level control. Derived classes may have different defaults.

ooo) DefaultFont ppp) ToString

[C#] public static Font DefaultFont {get;}

[C++] public: _property static Font* get_DefaultFont( );

[VB] Public Shared ReadOnly Property DefaultFont As Font

[JScript] public static function get DefaultFont( ): Font;

Description

Gets the default font of the control.

If no System.Drawing.FontFamily.GenericSansSerif fonts are installed on the user's computer, the DEFAULT_GUI_FONT is used. The DEFAULT_GUI_FONT is the default font used by user interface objects such as menus and dialog boxes.

qqq) DefauitForeColor rrr) ToString

[C#] public static Color DefaultForeColor {get;}

[C++] public: _property static Color get_DefaultFore Color( );

[VB] Public Shared ReadOnly Property DefaultForeColor As Color

[JScript] public static function get DefaultForeColor( ): Color;

Description

Gets the default foreground color of the control.

This is the default System.Windows.Forms.Control. ForeColor property value of a non-parented control. Derived classes may have different defaults.

sss) DefaultImeMode ttt) ToString

[C#] protected virtual ImeMode DefaultImeMode {get;}

[C++] protected: _property virtual ImeMode get_DefaultImeMode( );

[VB] Overridable Protected ReadOnly Property DefaultImeMode As ImeMode

[JScript] protected function get DefaultImeMode( ): ImeMode;

Description

Gets the default Input Method Editor (IME) mode supported by this control.

An input method editor (IME) is a program that allows users to enter complex characters and symbols, such as Japanese Kanji characters, by using a standard keyboard.

uuu) DefaultSize vvv) ToString

[C#] protected virtual Size DefaultSize {get;}

[C++] protected: _property virtual Size get_DefaultSize( );

[VB] Overidable Protected ReadOnly Property DefaultSize As Size

[JScript] protected function get DefaultSize( ): Size;

Description

Gets the default size of the control.

The System.Windows.Forms.Control.DefaultSize property represents the System.Drawing.Size of the control when it is initially created. You may adjust the size of the control by setting its System.Windows.Forms.Control.Size property value.

www) DesignMode xxx) DisplayRectangle yyy) ToString

Description

Gets the rectangle that represents the display area of the control.

The System.Windows.Forms.Control.DisplayRectangle property returns the client rectangle of the display area of the control. For the base control class, this is equal to the client rectangle. However, inheriting controls may want to change this if their client area differs from their display area. The display rectangle is the smallest System.Drawing.Rectangle that encloses a control and is used used to layout controls. If When overriding the System.Windows.Forms.Control.DisplayRectangle property in a derived class, use the base class's System.Windows.Forms.Control.DisplayRectangle property to extend the base implementation. Alternatively, you must provide all the implementation.

zzz) Disposing aaaa) ToString

[C#] public bool Disposing {get;}

[C++] public: _property bool get_Disposing( );

[VB] Public ReadOnly Property Disposing As Boolean

[JScript] public function get Disposing( ): Boolean;

Description

Gets a value indicating whether the control is in the process of being disposed.

When this property returns true, the control is in the process of being disposed. After the control is disposed, it can no longer be referenced as a valid Windows control. Even though the instance of a control is disposed, it is still maintained in memory until it is removed from memory through garbage collection. When a control is disposed, you can not call its System.Windows.Forms.Control.RecreateHandle method.

bbbb) Dock cccc) ToString

[C#] public virtual DockStyle Dock {get; set;}

[C++] public: _property virtual DockStyle get_Dock( ); public: _property virtual void set_Dock(DockStyle);

[VB] Overridable Public Property Dock As DockStyle

[JScript] public function get Dock( ): DockStyle; public function set Dock(DockStyle);

Description

Gets or sets which edge of the parent container a control is docked to.

A control can be docked to one edge of its parent container or can dock to all edges and fill the parent container. For example, if you set this property to System.Windows.Forms.DockStyle.Left, the left edge of the control will be docked to the left edge of its parent control. Additionally, the docked edge of the control is resized to match that of its container control. Controls are docked in order of their z-order.

dddd) Enabled eeee) ToString

[C#] public bool Enabled {get; set;}

[C++] public: _property bool get_Enabled( ); public: _property void set_Enabled(bool);

[VB] Public Property Enabled As Boolean

[JScript] public function get Enabled( ): Boolean; public function set Enabled(Boolean);

Description

Gets or sets a value indicating whether the control can respond to user interaction.

The System.Windows.Forms.Control.Enabled property allows controls to be enabled or disabled at run time. For example, you can disable controls that do not apply to the current state of the application. You can also disable a control to restrict its use. For example, a button can be disabled to prevent the user from clicking it. If a control is disabled, it cannot be selected.

ffff) Events gggg) Focused hhhh) ToString

Description

Gets a value indicating whether the control has input focus.

When overriding the System.Windows.Forms.Control.Focused property in a derived class, use the base class's System.Windows.Forms.Control.Focused property to extend the base implementation. Otherwise, you must provide all the implementation.

iiii) Font
jjjj) ToString

[C#] public virtual Font Font {get; set;}

[C++] public: _property virtual Font* get_Font( ); public: _property virtual void set_Font(Font*);

[VB] Overridable Public Property Font As Font

[JScript] public function get Font( ): Font; public function set Font(Font);

Description

Gets or sets the font of the text displayed by the control.

Because the System.Drawing.Font object is immutable (meaning that you cannot adjust any of it's properties), you can only assign the System.Windows.Forms.Control.Font property a new System.Drawing.Font object. However, you can base the new font on the existing font. The following is an example of how to adjust the existing font to make it bold: myControl.Font=new Font(myControl.Font, myControl.Font.Style|FontStyle.Bold); MyControl.Font=New Font(MyControl.Font, _MyControl. Font.Style Or FontStyle.Bold) When overriding the System. Windows.Forms.Control.Font property in a derived class, use the base class's System.Windows.Forms.Control.Font property to extend the base implementation. Otherwise, you must provide all the implementation. You are not required to override both the get and set methods of the System.Windows-.Forms.Control.Font property; you can override only one if needed.

kkkk) FontHeight
llll) ToString

[C#] protected int FontHeight {get; set;}

[C++] protected: _property int get_FontHeight( ); protected: _property void set_FontHeight(int);

[VB] Protected Property FontHeight As Integer

[JScript] protected function get FontHeight( ): int; protected function set FontHeight(int);

Description

Gets or sets the height of the font of the control.

The System.Windows.Forms.Control.FontHeight property should not be set to any value other than the control's System.Drawing.Font.Height value, or −1. Setting System.Windows.Forms.Control.FontHeight to −1 has the effect of clearing the cached height value, and the value is recalculated the next time the property is referenced.

mmmm) ForeColor
nnnn) ToString

[C#] public virtual Color ForeColor {get; set;}

[C++] public: _property virtual Color get_ForeColor( ); public: _property virtual void set_ForeColor(Color);

[VB] Overridable Public Property ForeColor As Color

[JScript] public function get ForeColor( ): Color; public function set ForeColor(Color);

Description

Gets or sets the foreground color of the control.

When overriding the System.Windows.Forms.Control. ForeColor property in a derived class, use the base class's System.Windows.Forms.Control.ForeColor property to extend to the base implementation. Otherwise, you must provide all the implementation. You are not required to override both the get and set methods of the System.Windows.Forms. Control. ForeColor property; you can override only one if needed.

oooo) Handle
pppp) ToString

[C#] public IntPtr Handle {get;}

[C++] public: _property IntPtr get_Handle( );

[VB] Public ReadOnly Property Handle As IntPtr

[JScript] public function get Handle( ): IntPtr;

Description

Gets the window handle that the control is bound to.

The value of the System.Windows.Forms.Control.Handle property is a Windows HWND. If the handle has not yet been created, referencing this property will force the handle to be created.

qqqq) HasChildren
rrrr) ToString

[C#] public bool HasChildren {get;}

[C++] public: _property bool get_HasChildren( );

[VB] Public ReadOnly Property HasChildren As Boolean

[JScript] public function get HasChildren( ): Boolean;

Description

Gets a value indicating whether the control contains one or more child controls.

If the System.Windows.Forms.Control.Controls collection has a System.Windows.Forms.Control.ControlCollection.Count greater than zero, the System.Windows. Forms.Control.HasChildren property will return true. Accessing the System.Windows.Forms.Control.HasChildren property does not force the creation of a System.Windows. Forms.Control.ControlCollection if the control has no children, so referencing this property can provide a performance benefit when walking a tree of controls.

ssss) Height
tttt) ToString

[C#] public int Height {get; set;}

[C++] public: _property int get_Height( ); public: _property void set_Height(int);

[VB] Public Property Height As Integer

[JScript] public function get Height( ): int; public function set Height(int);

Description

Gets or sets the height of the control.

The minimum height for the derived control System.Windows.Forms.Splitter is one pixel. The default height for the System.Windows.Forms.Splitter control is three pixels.Setting the height of the System.Windows.Forms.Splitter control to a value less than one will reset the property value to the default height.

uuuu) ImeMode
vvvv) ToString

[C#] public ImeMode ImeMode {get; set;}

[C++] public: _property ImeMode get_ImeMode( ); public: _property void set_ImeMode(ImeMode);

[VB] Public Property ImeMode As ImeMode

[JScript] public function get ImeMode( ): ImeMode; public function set ImeMode(ImeMode);

Description

Gets or sets the Input Method Editor (IME) mode of the control.

An input method editor (IME) is a program that allows users to enter complex characters and symbols, such as Japanese Kanji characters, using a standard keyboard. The System.Windows.Forms.Control.ImeMode property is typically set to System.Windows.Forms.ImeMode.Off for a System.Windows.Forms.TextBox that is intended to only enter numeric values.

wwww) InvokeRequired xxxx) ToString

[C#] public bool InvokeRequired {get;}

[C++] public: _property bool get_InvokeRequired( );

[VB] Public ReadOnly Property InvokeRequired As Boolean

[JScript] public function get InvokeRequired( ): Boolean;

Description

Gets a value indicating whether the caller must call invoke when making method calls to this control because the caller is on a different thread than the control was created on.

Controls in Windows Forms are bound to a specific thread and are not thread-safe. Therefore, if you are calling a control's method from a different thread, you must use the control's invoke method to marshal the call to the proper thread. This function can be used to determine if you must call invoke, which can be useful if you do not know what thread owns a control. There are four methods on a control that are safe to call from any thread: System.Windows.Forms.Control.Invoke(System.Delegate), System.Windows.Forms.Control.BeginInvoke(System.Delegate), System.Windows.Forms.Control.EndInvoke(System.IAsyncResult) and System.Windows.Forms.Control.CreateGraphics. For all other method calls, you should use one of the invoke methods when calling from a different thread.

yyyy) IsAccessible zzzz) ToString

[C#] public bool IsAccessible {get; set;}

[C++] public: _property bool get_IsAccessible( ); public: _property void set_IsAccessible(bool);

[VB] Public Property IsAccessible As Boolean

[JScript] public function get IsAccessible( ): Boolean; public function set IsAccessible(Boolean);

Description

Gets or sets a value indicating whether the control is visible to accessibility applications.

aaaaa) IsDisposed bbbbb) ToString

[C#] public bool IsDisposed {get;}

[C++] public: _property bool get_IsDisposed( );

[VB] Public ReadOnly Property IsDisposed As Boolean

[JScript] public function get IsDisposed( ): Boolean;

Description

Gets a value indicating whether the control has been disposed of.

When this property returns true, the control is disposed of and can no longer a be referenced as a valid Windows control. Even though the instance of a control is disposed of, it is still maintained in memory until it is removed from memory through garbage collection. When a control is disposed, you can not call its System.Windows.Forms.Control.RecreateHandle method.

ccccc) IsHandleCreated ddddd) ToString

[C#] public bool IsHandleCreated {get;}

[C++] public: _property bool get_IsHandleCreated( );

[VB] Public ReadOnly Property IsHandleCreated As Boolean

[JScript] public function get IsHandleCreated( ): Boolean;

Description

Gets a value indicating whether the control has a handle associated with it.

eeeee) Left fffff) ToString

[C#] public int Left {get; set;}

[C++] public: _property int get_Left( ); public: _property void set_Left(int);

[VB] Public Property Left As Integer

[JScript] public function get Left( ): int; public function set Left(int);

Description

Gets or sets the x-coordinate of a control's left edge in pixels.

The System.Windows.Forms.Control.Left property value is equivalent to the System.Drawing.Point.X property of the System.Windows.Forms.Control.Location property value of the control.

ggggg) Location hhhhh) ToString

[C#] public Point Location {get; set;}

[C++] public: _property Point get_Location( ); public: _property void set_Location(Point);

[VB] Public Property Location As Point

[JScript] public function get Location( ): Point; public function set Location(Point);

Description

Gets or sets the coordinates of the upper-left corner of the control relative to the upper-left corner of its container.

Since the System.Drawing.Point class is a value type (structure in VB, struct in C#) it is returned by value, meaning accessing the property returns a copy of the upper-left point of the control. So, adjusting the System.Drawing.Point.X or System.Drawing.Point.Y properties of the System.Drawing.Point object returned from this property will not affect the System.Windows.Forms.Control.Left, System.Windows.Forms.Control.Right, System.Windows.Forms.Control.Top, or System.Windows.Forms.Control.Bottom property values of the control. To adjust these properties set each property value individually, or set the System.Windows.Forms.Control.Location property with a new System.Drawing.Point object.

iiiii) ModifierKeys
jjjjj) ToString

[C#] public static Keys ModifierKeys {get;}

[C++] public: _property static Keys get_ModifierKeys( );

[VB] Public Shared ReadOnly Property ModifierKeys As Keys

[JScript] public static function get ModifierKeys( ): Keys;

Description

Gets a value indicating which of the modifier keys (SHIFT, CTRL, and ALT) is in a pressed state.

kkkkk) MouseButtons
lllll) ToString

[C#] public static MouseButtons MouseButtons {get;}

[C++] public: _property static MouseButtons get_MouseButtons( );

[VB] Public Shared ReadOnly Property MouseButtons As MouseButtons

[JScript] public static function get MouseButtons( ): MouseButtons;

Description

Gets a value indicating which of the mouse buttons is in a pressed state.

mmmmm) MousePosition
nnnnn) ToString

[C#] public static Point MousePosition {get;}

[C++] public: _property static Point get_MousePosition( );

[VB] Public Shared ReadOnly Property MousePosition As Point

[JScript] public static function get MousePosition( ): Point;

Description

Gets the position of the mouse cursor in screen coordinates.

The System.Windows.Forms.Control.MousePosition property returns a System.Drawing.Point that represents the mouse cursor position at the time the property was referenced.

ooooo) Name
ppppp) ToString

[C#] public string Name {get; set;}

[C++] public: _property String* get_Name( ); public: _property void set_Name(String*);

[VB] Public Property Name As String

[JScript] public function get Name( ): String; public function set Name(String);

Description

Gets or sets the name of the control.

The System.Windows.Forms.Control.Name property can be used at run time to evaluate the object by name rather than type and programmatic name. Because the System.Windows.Forms.Control.Name property returns a System.String type, it can be evaluated in case-style logic statements (Select statement in Visual Basic, switch statement in C# and C++).

qqqqq) Parent
rrrrr) ToString

[C#] public Control Parent {get; set;}

[C++] public: _property Control* get_Parent( ); public: _property void set_Parent(Control*);

[VB] Public Property Parent As Control

[JScript] public function get Parent( ): Control; public function set Parent(Control);

Description

Gets or sets the parent container of the control.

Setting the System.Windows.Forms.Control.Parent property value to null removes this control from the System.Windows.Forms.Control.ControlCollection of its current parent control.

sssss) ProductName
ttttt) ToString

[C#] public string ProductName {get;}

[C++] public: _property String* get_ProductName( );

[VB] Public ReadOnly Property ProductName As String

[JScript] public function get ProductName( ): String;

Description

Gets the product name of the assembly containing the control.

The System.Windows.Forms.Control.ProductName property is a read-only property. In order to change the value of this property, set the System.Reflection.AssemblyProductAttribute.Product property value of the System.Reflection. AssemblyProductAttribute.

uuuuu) ProductVersion
vvvvv) ToString

[C#] public string ProductVersion {get;}

[C++] public: _property String* get_ProductVersion( );

[VB] Public ReadOnly Property ProductVersion As String

[JScript] public function get ProductVersion( ): String;

Description

Gets the version of the assembly containing the control.

The System.Windows.Forms.Control.ProductVersion property is a read-only property. In order to change the value of this property, set the System.Reflection.AssemblyVersionAttribute.Version property value of the System.Reflection.AssemblyVersionAttribute.

wwwww) RecreatingHandle
xxxxx) ToString

[C#] public bool RecreatingHandle {get;}

[C++] public: _property bool get_RecreatingHandle( );

[VB] Public ReadOnly Property RecreatingHandle As Boolean

[JScript] public function get RecreatingHandle( ): Boolean;

Description

Gets a value indicating whether the control is currently re-creating its handle.

yyyyy) Region
zzzzz) ToString

[C#] public Region Region {get; set;}

[C++] public: _property Region* get Region( ); public: _property void set_Region(Region*);

[VB] Public Property Region As Region

[JScript] public function get Region( ): Region; public function set Region(Region);

Description

Gets or sets the window region associated with the control.

The window region is an elliptical or polygonal area within the window where the operating system permits drawing. The operating system does not display any portion of a window that lies outside of the window region. The coordinates of a control's region are relative to the upper-left corner of the control, not the client area of the control.

aaaaaa) RenderRightToLeft bbbbbb) ToString

[C#] protected bool RenderRightToLeft {get;}

[C++] protected: _property bool get_RenderRightToLeft( );

[VB] Protected ReadOnly Property RenderRightToLeft As Boolean [JScript] protected function get RenderRightTo Left( ): Boolean;

cccccc) ResizeRedraw dddddd) ToString

[C#] protected bool ResizeRedraw {get; set;}

[C++] protected: _property bool get_ResizeRedraw( ); protected: _property void set_ResizeRedraw(bool);

[VB] Protected Property ResizeRedraw As Boolean

[JScript] protected function get ResizeRedraw( ): Boolean; protected function set ResizeRedraw(Boolean);

Description

Gets or sets a value indicating whether the control redraws itself when resized.

The System.Windows.Forms.Control.ResizeRedraw property value is equivalent to the return value of the System.Windows.Forms.Control.GetStyle(System.Windows.Forms.ControlStyles) method when passing in the System.Windows.Forms.ControlStyles.ResizeRedraw value as a parameter.

eeeeee) Right ffffff) ToString

[C#] public int Right {get;}

[C++] public: _property int get_Right( );

[VB] Public ReadOnly Property Right As Integer

[JScript] public function get Right( ): int;

Description

Gets the distance between the right edge of the control and the left edge of its container.

The value of the System.Windows.Forms.Control.Right property is equal to the sum of the System.Windows.Forms.Control.Left property value and the System.Windows.Forms.Control.Width property value.

gggggg) RightToLeft hhhhhh) ToString

[C#] public virtual RightToLeft RightToLeft {get; set;}

[C++] public: _property virtual RightToLeft get_RightToLeft( ); public: _property virtual void set_RightToLeft (RightToLeft);

[VB] Overridable Public Property RightToLeft As RightToLeft

[JScript] public function get RightToLeft( ): RightToLeft; public function set RightToLeft(RightToLeft);

Description

Gets or sets a value indicating whether control's elements are aligned to support locales using right-to-left fonts.

The System.Windows.Forms.Control.RightToLeft property is used for international applications where the language is written from right to left, such as Hebrew or Arabic. When this property is set to System.Windows.Forms.RightToLeft.Yes, control elements that include text are displayed from right to left.

iiiiii) ShowFocusCues jjjjjj) ToString

[C#] protected virtual bool ShowFocusCues {get;}

[C++] protected: _property virtual bool get_ShowFocusCues( );

[VB] Overridable Protected ReadOnly Property ShowFocusCues As Boolean

[JScript] protected function get ShowFocusCues( ): Boolean;

Description

Gets a value indicating whether the control should display focus rectangles.

For more information on this feature see the WM_CHANGEUISTATE, WM_QUERYUISTATE, and WM_UPDATEUISTATE topics located in the Windows Platform SDK in the MSDN Library.

kkkkkk) ShowKeyboardCues llllll) ToString

[C#] protected bool ShowKeyboardCues {get;}

[C++] protected: _property bool get_ShowKeyboardCues( );

[VB] Protected ReadOnly Property ShowKeyboardCues As Boolean

[JScript] protected function get ShowKeyboardCues( ): Boolean;

Description

Gets a value indicating whether the control should display keyboard shortcuts.

For more information on this feature see the WM_CHANGEUISTATE, WM_QUERYUISTATE, and WM_UPDATEUISTATE topics located in the Windows Platform SDK in the MSDN Library.

mmmmmm) Site nnnnnn) ToString

[C#] public override ISite Site {get; set;}

[C++] public: _property virtual ISite* get_Site( ); public: _property virtual void set_Site(ISite*);

[VB] Overrides Public Property Site As ISite

[JScript] public function get Site( ): ISite; public function set Site(ISite);

Description

Gets or sets the site of the control.

oooooo) Size pppppp) ToString

[C#] public Size Size {get; set;}

[C++] public: _property Size get_Size( ); public: _property void set_Size(Size);

[VB] Public Property Size As Size

[JScript] public function get Size( ): Size; public function set Size(Size);

Description

Gets or sets the height and width of the control.

Since the System.Drawing.Size class is a value type (structure in VB, struct in C#) it is returned by value, meaning accessing the property returns a copy of the size of the control. So, adjusting the System.Drawing.Size.Width or System.Drawing.Size.Height properties of the System.Drawing.Size object returned from this property will not affect the System.Windows.Forms.Control.Width and System.Windows.Forms.Control.Height of the control. To adjust the System.Windows.Forms.Control.Width or System.Windows.Forms.Control.Height of the control you must use the System.Windows.Forms.Control.Width or System.Windows.Forms.Control.Height property, or set the System.Windows.Forms.Control.Size property with a new System.Drawing.Size object.

qqqqqq) TabIndex rrrrrr) ToString

[C#] public int TabIndex {get; set;}

[C++] public: _property int get_TabIndex( ); public: _property void set_TabIndex(int);

[VB] Public Property TabIndex As Integer

[JScript] public function get TabIndex( ): int; public function set TabIndex(int);

Description

Gets or sets the tab order of the control within its container.

A tab index may consist of any valid integer greater than or equal to zero, lower numbers being earlier in the tab order. If more than one control on the same parent control has the same tab index, the z-order of the controls determines the order to cycle through the controls.

ssssss) TabStop tttttt) ToString

[C#] public bool TabStop {get; set;}

[C++] public: _property bool get_TabStop( ); public: _property void set_TabStop(bool);

[VB] Public Property TabStop As Boolean

[JScript] public function get TabStop( ): Boolean; public function set TabStop(Boolean);

Description

Gets or sets a value indicating whether the user can give the focus to this control using the TAB key.

When the user presses the TAB key, the input focus is set to the next control in the tab order. Controls with the System.Windows.Forms.Control.TabStop property value of false are not included in the collection of controls in the tab order. The tab order can be manipulated by setting the control's System.Windows.Forms.Control.TabIndex property value.

uuuuuu) Tag vvvvvv) ToString

[C#] public object Tag {get; set;}

[C++] public: _property Object* get_Tag( ); public: _property void set_Tag(Object*);

[VB] Public Property Tag As Object

[JScript] public function get Tag( ): Object; public function set Tag(Object);

Description

Gets or sets the object that contains data about the control.

Any type derived from the System.Object class can be assigned to this property. If the System.Windows.Forms.Control.Tag property is set through the Windows Forms designer, only text may be assigned.

wwwwww) Text xxxxxx) ToString

[C#] public virtual string Text {get; set;}

[C++] public: _property virtual String* get_Text( ); public: _property virtual void set_Text(String*);

[VB] Overridable Public Property Text As String

[JScript] public function get Text( ): String; public function set Text(String);

Description

Gets or sets the text associated with this control.

The System.Windows.Forms.Control.Text property of the control is used differently by each derived class. For example the System.Windows.Forms.Control.Text property of a System.Windows.Forms.Form is displayed in the title bar at the top of the form, is fairly small in character count, and usually displays the application or document name. However, the System.Windows.Forms.Control.Text property of a System.Windows.Forms.RichTextBox can be great in size and can include numerous nonvisual characters used to format the text. For example, the text displayed in a System.Windows.Forms.RichTextBox can be formatted by adjusting the System.Drawing.Font properties, or by the addition of spaces or tab characters to align the text.

yyyyyy) Top zzzzzz) ToString

[C#] public int Top {get; set;}

[C++] public: _property int get_Top( ); public: _property void set_Top(int);

[VB] Public Property Top As Integer

[JScript] public function get Top( ): int; public function set Top(int);

Description

Gets or sets the y-coordinate of a control's top edge in pixels.

The System.Windows.Forms.Control.Top property value is equivalent to the System.Drawing.Point.Y property of the System.Windows.Forms.Control.Location property value of the control.

aaaaaaa) TopLevelControl bbbbbbb) ToString

[C#] public Control TopLevelControl {get;}

[C++] public: _property Control* get_TopLevelControl( );

[VB] Public ReadOnly Property TopLevelControl As Control

[JScript] public function get TopLevelControl( ): Control;

Description

Gets the control that is not parented to another Windows Form control. Typically, this is the outermost System.Windows.Forms.Form that the control is contained in.

The top-level control is defined as the control that is not parented to another Windows Form control. Typically, this is the outermost System.Windows.Forms.Form that the control is contained in. For example, if the control is contained on an MDI child System.Windows.Forms.Form, then the top-level control is the MDI parent System.Windows.Forms.Form.

ccccccc) Visible ddddddd) ToString

[C#] public bool Visible {get; set;}

[C++] public: _property bool get_Visible( ); public: _property void set_Visible(bool);

[VB] Public Property Visible As Boolean

[JScript] public function get Visible( ): Boolean; public function set Visible(Boolean);

Description

Gets or sets a value indicating whether the control is displayed.

eeeeeee) Width fffffff) ToString

[C#] public int Width {get; set;}

[C++] public: _property int get_Width( ); public: _property void set_Width(int);

[VB] Public Property Width As Integer

[JScript] public function get Width( ): int; public function set Width(int);

Description

Gets or sets the width of the control.

ggggggg) WindowTarget hhhhhhh) ToString

[C#] public IWindowTarget WindowTarget {get; set;}

[C++] public: _property IWindowTarget* get_WindowTarget( ); public: _property void set_WindowTarget(IWindowTarget*);

[VB] Public Property WindowTarget As IWindowTarget

[JScript] public function get WindowTarget( ): IWindowTarget; public function set WindowTarget(IWindowTarget);

Description

The target of Win32 window messages.

iiiiiii) ToString

[C#] public event EventHandler BackColorChanged;

[C++] public: _event EventHandler* BackColorChanged;

[VB] Public Event BackColorChanged As EventHandler

Description

Occurs when the value of the System.Windows.Forms.Control.BackColor property changes.

This event will be raised if the System.Windows.Forms.Control.BackColor property is changed either through a programmatic change or through runtime user interaction.

jjjjjjj) ToString

[C++] public event EventHandler BackgroundImageChanged;

[C++] public: _event EventHandler* BackgroundImageChanged;

[VB] Public Event BackgroundImageChanged As EventHandler

Description

Occurs when the value of the System.Windows.Forms.Control.BackgroundImage property changes.

This event will be raised if the System.Windows.Forms.Control.BackgroundImage property is changed either through a programmatic change or through runtime user interaction.

kkkkkkk) ToString

[C#] public event EventHandler BindingContextChanged;

[C++] public: _event EventHandler* BindingContext Changed;

[VB] Public Event BindingContextChanged As EventHandler

Description

Occurs when the value of the System.Windows.Forms.BindingContext property changes.

To add a new System.Windows.Forms.BindingContext to the System.Windows.Forms.Control through the System.Windows.Forms.Control.BindingContext property, see the System.Windows.Forms.BindingContext.#ctor constructor.

lllllll) ToString

[C#] public event EventHandler CausesValidationChanged;

[C++] public: _event EventHandler* CausesValidationChanged;

[VB] Public Event CausesValidationChanged As EventHandler

Description

Occurs when the value of the System.Windows.Forms.Control.CausesValidation property changes.

This event will be raised if the System.Windows.Forms.Control.CausesValidation property is changed either through a programmatic change or through runtime user interaction.

mmmmmmm) ToString

[C#] public event UICuesEventHandler ChangeUICues;

[C++] public: _event UICuesEventHandler* ChangeUICues;

[VB] Public Event ChangeUICues As UICuesEventHandler

Description

Occurs when the focus or keyboard user interface (UI) cues change.

For more information about handling events, see.

nnnnnnn) ToString

[C#] public event EventHandler Click;

[C++] public: _event EventHandler* Click;

[VB] Public Event Click As EventHandler

Description

Occurs when the control is clicked.

The System.Windows.Forms.ControlStyles.StandardClick style must be set for this event to be raised.

ooooooo) ToString

[C#] public event EventHandler ContextMenuChanged;

[C++] public: _event EventHandler* ContextMenuChanged;

[VB] Public Event ContextMenuChanged As EventHandler

Description

Occurs when the value of the System.Windows.Forms.Control.ContextMenu property changes.

This event will be raised if the System.Windows.Forms.Control.ContextMenu property is changed either through a programmatic change or through runtime user interaction.

ppppppp) ToString

[C#] public event ControlEventHandler ControlAdded;

[C++] public: _event ControlEventHandler* ControlAdded;

[VB] Public Event ControlAdded As ControlEventHandler

Description

Occurs when a new control is added to the System.Windows.Forms.Control.ControlCollection.

For more information about handling events, see qqqqqqq) ToString

[C#] public event ControlEventHandler ControlRemoved;

[C++] public: _event ControlEventHandler* ControlRemoved;

[VB] Public Event ControlRemoved As ControlEventHandler

Description

Occurs when a control is removed from the System.Windows.Forms.Control.ControlCollection.

For more information about handling events, see.

rrrrrrr) ToString

[C#] public event EventHandler CursorChanged;

[C++] public: _event EventHandler* CursorChanged;

[VB] Public Event CursorChanged As EventHandler

Description

Occurs when the value of the System.Windows.Forms.Control.Cursor property changes.

This event will be raised if the System.Windows.Forms.Control.Cursor property is changed either through a programmatic changed or through runtime user interaction.

sssssss) ToString

Description

Occurs when the value of the System.Windows.Forms.Control.Dock property changes.

This event will be raised if the System.Windows.Forms.Control.Dock property is changed either through a programmatic changed or through runtime user interaction.

ttttttt) ToString

[C#] public event EventHandler DoubleClick;

[C++] public: _event EventHandler* DoubleClick;

[VB] Public Event DoubleClick As EventHandler

Description

Occurs when the control is double-clicked.

The System.Windows.Forms.ControlStyles.StandardClick style must be set for this event to be raised.

uuuuuuu) ToString

[C#] public event DragEventHandler DragDrop;

[C++] public: _event DragEventHandler* DragDrop;

[VB] Public Event DragDrop As DragEventHandler

Description

Occurs when a drag-and-drop operation is completed.

For more information about handling events, see.

vvvvvvv) ToString

[C#] public event DragEventHandler DragEnter;

[C++] public: _event DragEventHandler* DragEnter;

[VB] Public Event DragEnter As DragEventHandler

Description

Occurs when an object is dragged into the control's bounds.

wwwwwww) ToString

[C#] public event EventHandler DragLeave;

[C++] public: _event EventHandler* DragLeave;

[VB] Public Event DragLeave As EventHandler

Description

Occurs when an object is dragged out of the control's bounds.

xxxxxxx) ToString

[C#] public event DragEventHandler DragOver;

[C++] public: _event DragEventHandler* DragOver;

[VB] Public Event DragOver As DragEventHandler

Description

Occurs when an object is dragged over the control's bounds.

yyyyyyy) ToString

[C#] public event EventHandler EnabledChanged;

[C++] public: _event EventHandler* EnabledChanged;

[VB] Public Event EnabledChanged As EventHandler

Description

Occurs when the System.Windows.Forms.Control.Enabled property value has changed.

This event will be raised if the System.Windows.Forms.Control.Enabled property is changed either through a programmatic changed or through runtime user interaction.

zzzzzzz) ToString

[C#] public event EventHandler Enter;

[C++] public: _event EventHandler* Enter;

[VB] Public Event Enter As EventHandler

Description

Occurs when the control is entered.

For more information about handling events, see.

aaaaaaaa) ToString

[C#] public event EventHandler FontChanged;

[C++] public: _event EventHandler* FontChanged;

[VB] Public Event FontChanged As EventHandler

Description

Occurs when the System.Windows.Forms.Control.Font property value has changed.

This event will be raised if the System.Windows.Forms.Control.Font property is changed either through a programmatic changed or through runtime user interaction.

bbbbbbbb) ToString

[C#] public event EventHandler ForeColorChanged;

[C++] public: _event EventHandler* ForeColorChanged;

[VB] Public Event ForeColorChanged As EventHandler

Description

Occurs when the System.Windows.Forms.Control-.ForeColor property value has changed.

This event will be raised if the System.Windows.Forms.Control.ForeColor property is changed either through a programmatic changed or through runtime user interaction.

cccccccc) ToString

[C#] public event GiveFeedbackEventHandler GiveFeedback;

[C++] public: _event GiveFeedbackEventHandler* GiveFeedback;

[VB] Public Event GiveFeedback As GiveFeedback-EventHandler

Description

Occurs during a drag operation.

The System.Windows.Forms.Control.GiveFeedback event allows the source of a drag event to modify the appearance of the mouse pointer in order to give the user visual feedback during a drag-and-drop operation.

dddddddd) ToString

[C#] public event EventHandler GotFocus;

[C++] public: _event EventHandler* GotFocus;

[VB] Public Event GotFocus As EventHandler

Description

Occurs when the control receives focus.

Focus events occur in the following order: System.Windows.Forms.Control.EnterSystem.Windows.Forms.Control. GotFocusSystem.Windows.Forms.Control.LeaveSystem. Windows.Forms.Control.ValidatingSystem.Windows.Forms.Control.ValidatedSystem.Windows.Forms.Control.LostFocus If the System.Windows.Forms.Control.CausesValidation property is set to false, the System.Windows.Forms.Control.Validating and System.Windows.Forms.Control.Validated events are suppressed.

eeeeeeee) ToString

[C#] public event EventHandler HandleCreated;

[C++] public: _event EventHandler* HandleCreated;

[VB] Public Event HandleCreated As EventHandler

Description

Occurs when a handle is created for the control.

For more information about handling events, see.

ffffffff) ToString

[C#] public event EventHandler HandleDestroyed;

[C++] public: _event EventHandler* HandleDestroyed;

[VB] Public Event HandleDestroyed As EventHandler

Description

Occurs when the control's handle is in the process of being destroyed.

For more information about handling events, see.

gggggggg) ToString

[C#] public event HelpEventHandler HelpRequested;

[C++] public: _event HelpEventHandler* HelpRequested;

[VB] Public Event HelpRequested As HelpEventHandler

Description

Occurs when the user requests help for a control.

For more information about handling events, see.

hhhhhhhh) ToString

[C#] public event EventHandler ImeModeChanged;

[C++] public: _event EventHandler* ImeModeChanged;

[VB] Public Event ImeModeChanged As EventHandler

Description

Occurs when the System.Windows.Forms.Control.ImeMode property has changed.

This event will be raised if the System.Windows.Forms.Control.ImeMode property is changed either through a programmatic changed or through runtime user interaction.

iiiiiiii) ToString

[C#] public event InvalidateEventHandler Invalidated;

[C++] public: _event InvalidateEventHandler* Invalidated;

[VB] Public Event Invalidated As InvalidateEventHandler

Description

Occurs when a control's display requires redrawing.

For more information about handling events, see.

jjjjjjjj) ToString

[C#] public event KeyEventHandler KeyDown;

[C++] public: _event KeyEventHandler* KeyDown;

[VB] Public Event KeyDown As KeyEventHandler

Description

Occurs when a key is pressed while the control has focus.

For more information about handling events, see.

kkkkkkkk) ToString

[C#] public event KeyPressEventHandler KeyPress;

[C++] public: _event KeyPressEventHandler* KeyPress;

[VB] Public Event KeyPress As KeyPressEventHandler

Description

Occurs when a key is pressed while the control has focus.

For more information about handling events, see.
llllllll) ToString

[C#] public event KeyEventHandler KeyUp;

[C++] public: _event KeyEventHandler* KeyUp;

[VB] Public Event KeyUp As KeyEventHandler

Description

Occurs when a key is released while the control has focus.

For more information about handling events, see.
mmmmmmmm) ToString

[C#] public event LayoutEventHandler Layout;

[C++] public: _event LayoutEventHandler* Layout;

[VB] Public Event Layout As LayoutEventHandler

Description

Occurs when a control should reposition its child controls.

The System.Windows.Forms.Control.Layout event occurs when child controls are added or removed, when the bounds of the control changes, and when other changes occur that may affect the layout of the control. The layout event can be suppressed using the System.Windows.Forms.Control.SuspendLayout and System.Windows.Forms.Control.ResumeLayout methods. Suspending layout allows for multiple actions to be performed on a control without having to perform a layout for each change. For example, if you resize and move a control, each operation would raise a System.Windows.Forms.Control.Layout event.
nnnnnnnn) ToString

[C#] public event EventHandler Leave;

[C++] public: _event EventHandler* Leave;

[VB] Public Event Leave As EventHandler

Description

Occurs when the control is left.

For more information about handling events, see.
oooooooo) ToString

[C#] public event EventHandler LocationChanged;

[C++] public: _event EventHandler* LocationChanged;

[VB] Public Event LocationChanged As EventHandler

Description

Occurs when the System.Windows.Forms.Control.Location property value has changed.

This event will be raised if the System.Windows.Forms.Control.Location property is changed either through a programmatic changed or through runtime user interaction.
pppppppp) ToString

[C#] public event EventHandler LostFocus;

[C++] public: _event EventHandler* LostFocus;

[VB] Public Event LostFocus As EventHandler

Description

Occurs when the control loses focus.

Focus events occur in the following order: System.Windows.Forms.Control.EnterSystem.Windows.Forms. Control.GotFocusSystem.Windows.Forms.Control.LeaveSystem. Windows.Forms.Control.ValidatingSystem.Windows. Forms. Control.ValidatedSystem.Windows.Forms.Control. LostFocus If the System.Windows.Forms.Control.CausesValidation property is set to false the System.Windows.Forms.Control.Validating and System.Windows.Forms.Control.Validated events are suppressed.
qqqqqqqq) ToString

[C#] public event MouseEventHandler MouseDown;

[C++] public: _event MouseEventHandler* MouseDown;

[VB] Public Event MouseDown As MouseEventHandler

Description

Occurs when the mouse pointer is over the control and a mouse button is pressed.

For more information about handling events, see.
rrrrrrrr) ToString

[C#] public event EventHandler MouseEnter;

[C++] public: _event EventHandler* MouseEnter;

[VB] Public Event MouseEnter As EventHandler

Description

Occurs when the mouse pointer enters the control.

For more information about handling events, see.
ssssssss) ToString

[C#] public event EventHandler MouseHover;

[C++] public: _event EventHandler* MouseHover;

[VB] Public Event MouseHover As EventHandler

Description

Occurs when the mouse pointer hovers over the control.

For more information about handling events, see.
tttttttt) Tostring

[C#] public event EventHandler MouseLeave;

[C++] public: _event EventHandler* MouseLeave;

[VB] Public Event MouseLeave As EventHandler

Description

Occurs when the mouse pointer leaves the control.

For more information about handling events, see
uuuuuuuu) ToString

[C#] public event MouseEventHandler MouseMove;

[C++] public: _event MouseEventHandler* MouseMove;

[VB] Public Event MouseMove As MouseEventHandler

Description

Occurs when the mouse pointer is moved over the control.

For more information about handling events, see.
vvvvvvvv) ToString

[C#] public event MouseEventHandler MouseUp;

[C++] public: _event MouseEventHandler* MouseUp;

[VB] Public Event MouseUp As MouseEventHandler

Description

Occurs when the mouse pointer is over the control and a mouse button is released.

For more information about handling events, see.

wwwwwwwww) ToString

[C#] public event MouseEventHandler MouseWheel;

[C++] public: _event MouseEventHandler* MouseWheel;

[VB] Public Event MouseWheel As MouseEventHandler

Description

Occurs when the mouse wheel moves while the control has focus.

When handling the System.Windows.Forms.Control-.MouseWheel event it is important to follow the user interface (UI) standards associated with the mouse wheel. The System. Windows.Forms.MouseEventArgs.Delta property value indicates the amount the mouse wheel has been moved. The UI should scroll when the accumulated delta is plus or minus 120. The UI should scroll the number of logical lines returned by the System.Windows.Forms.SystemInformation. Mouse-WheelScrollLines property for every delta value reached. You can also scroll more smoothly in smaller that 120 unit increments, however the ratio should remain constant, that is System.Windows.Forms.SystemInformation.MouseWheelScrollLines lines scrolled per 120 delta units of wheel movement.

xxxxxxxx) ToString

[C#] public event EventHandler Move;

[C++] public: _event EventHandler* Move;

[VB] Public Event Move As EventHandler

Description

Occurs when the control is moved.

For more information about handling events, see yyyyyyyy) ToString

[C#] public event PaintEventHandler Paint;

[C++] public: _event PaintEventHandler* Paint;

[VB] Public Event Paint As PaintEventHandler

Description

Occurs when the control is redrawn.

For more information about handling events, see.

zzzzzzzz) ToString

[C#] public event EventHandler ParentChanged;

[C++] public: _event EventHandler* ParentChanged;

[VB] Public Event ParentChanged As EventHandler

Description

Occurs when the System.Windows.Forms.Control.Parent property value has changed.

This event will be raised if the System.Windows.Forms.Control.Parent property is changed either through a programmatic changed or through runtime user interaction.

aaaaaaaaa) ToString

[C#] public event QueryAccessibilityHelpEventHandler QueryAccessibilityHelp;

[C++] public: _event QueryAccessibilityHelpEventHandler* QueryAccessibilityHelp;

[VB] Public Event QueryAccessibilityHelp As QueryAccessibilityHelpEventHandler

Description

Occurs when System.Windows.Forms.AccessibleObject is providing help to accessibility applications.

For more information about handling events, see.

bbbbbbbbb) ToString

[C#] public event QueryContinueDragEventHandler QueryContinueDrag;

[C++] public: _event QueryContinueDragEventHandler* QueryContinueDrag;

[VB] Public Event QueryContinueDrag As QueryContinueDragEventHandler

Description

Occurs during a drag-and-drop operation and allows the drag source to determine whether the drag-and-drop operation should be canceled.

For more information about handling events, see.

cccccccc) ToString

[C#] public event EventHandler Resize;

[C++] public: _event EventHandler* Resize;

[VB] Public Event Resize As EventHandler

Description

Occurs when the control is resized.

It is preferrable to use the System.Windows.Forms.Control. Layout event to handle custom layouts. The System.Windows.Forms.Control.Layout event is raised in response to System.Windows.Forms.Control.Resize events, but also in other conditions when layout may need to be applied.

ddddddddd) ToString

[C#] public event EventHandler RightToLeftChanged;

[C++] public: _event EventHandler* RightToLeftChanged;

[VB] Public Event RightToLeftChanged As EventHandler

Description

Occurs when the System.Windows.Forms.Control. RightToLeft property value has changed.

This event will be raised if the System.Windows.Forms.Control.RightToLeft property is changed either through a programmatic changed or through runtime user interaction.

eeeeeeeee) ToString

[C#] public event EventHandler SizeChanged;

[C++] public: _event EventHandler* SizeChanged;

[VB] Public Event SizeChanged As EventHandler

Description

Occurs when the System.Windows.Forms.Control.Size property value has changed.

This event will be raised if the System.Windows.Forms.Control.Size property is changed either through a programmatic changed or through runtime user interaction.

ffffffff) ToString

[C#] public event EventHandler StyleChanged;

[C++] public: _event EventHandler* StyleChanged;

[VB] Public Event StyleChanged As EventHandler

Description

Occurs when the control style has changed.

The System.Windows.Forms.Control.StyleChanged event occurs when System.Windows.Forms.ControlStyles flags have been added or changed.

[C#] public event EventHandler SystemColorsChanged;

[C++] public: _event EventHandler* SystemColorsChanged;

[VB] Public Event SystemColorsChanged As EventHandler

Description

Occurs when the system colors have changed.

This event will be raised if the System.Drawing.SystemColors is changed either through a programmatic changed or through runtime user interaction.

hhhhhhhhh) ToString

[C#] public event EventHandler TabIndexChanged;

[C++] public: _event EventHandler* TabIndexChanged;

[VB] Public Event TabIndexChanged As EventHandler

Description

Occurs when the System.Windows.Forms.Control.TabIndex property value has changed.

This event will be raised if the System.Windows.Forms.Control.TabIndex property is changed either through a programmatic changed or through runtime user interaction.

iiiiiiii) ToString

[C#] public event EventHandler TabStopChanged;

[C++] public: _event EventHandler* TabStopChanged;

[VB] Public Event TabStopChanged As EventHandler

Description

Occurs when the System.Windows.Forms.Control.TabStop property value has changed.

This event will be raised if the System.Windows.Forms.Control.TabStop property is changed either through a programmatic changed or through runtime user interaction.

[C#] public event EventHandler TextChanged;

[C++] public: _event EventHandler* TextChanged;

[VB] Public Event TextChanged As EventHandler

Description

Occurs when the System.Windows.Forms.Control.Text property value has changed.

This event will be raised if the System.Windows.Forms.Control.Text property is changed either through a programmatic changed or through runtime user interaction.

kkkkkkkkk) ToString

[C#] public event EventHandler Validated;

[C++] public: _event EventHandler* Validated;

[VB] Public Event Validated As EventHandler

Description

Occurs when the control is done validating.

For more information about handling events, see.

lllllllll) ToString

[C#] public event CancelEventHandler Validating;

[C++] public: _event CancelEventHandler* Validating;

[VB] Public Event Validating As CancelEventHandler

Description

Occurs when the control is validating.

For more information about handling events, see.

mmmmmmmmm) ToString

[C#] public event EventHandler VisibleChanged;

[C++] public: _event EventHandler* VisibleChanged;

[VB] Public Event VisibleChanged As EventHandler

Description

Occurs when the System.Windows.Forms.Control.Visible property value has changed.

This event will be raised if the System.Windows.Forms.Control.Visible property is changed either through a programmatic changed or through runtime user interaction.

nnnnnnnnn) AccessibilityNotifyClients

[C#] protected void AccessibilityNotifyClients(AccessibleEvents accEvent, int childID);

[C++] protected: void AccessibilityNotifyClients(AccessibleEvents accEvent, int childID);

[VB] Protected Sub AccessibilityNotifyClients(ByVal accEvent As AccessibleEvents, ByVal childID As Integer)

[JScript] protected function AccessibilityNotifyClients(accEventAccessibleEvents, childID int);

Description

Notifies the accessibility client applications of the specified System.Windows.Forms.AccessibleEvents for the specified child control. You must call the System.Windows.Forms.Control.ControlAccessibleObject.NotifyClients(System.Windows.Forms.AccessibleEvents) method for each System.Windows.Forms.AccessibleEvents object the accessibility client applications are to be notified of. The System.Windows.Forms.Control.ControlAccessibleObject.Notify Clients(System.Windows.Forms.AccessibleEvents) method is typically called when a property is set or from within an event handler. For example, you might call the System.Windows.Forms.Control.ControlAccessibleObject.NotifyEvents method and pass in System.Windows.Forms.AccessibleEvents.Hide from within the event handler for the System.Windows.Forms.Control.VisibleChanged event. The System.Windows.Forms.AccessibleEvents object to notify the accessibility client applications of. The child System.Windows.Forms.Control to notify of the accessible event.

ooooooooo) BeginInvoke

[C#] public IAsyncResult BeginInvoke(Delegate method);

[C++] public: IAsyncResult* BeginInvoke(Delegate* method);

[VB] Public Function BeginInvoke(ByVal method As Delegate) As IAsyncResult

[JScript] public function BeginInvoke(method: Delegate): IAsyncResult; Executes a delegate asynchronously on the thread that the control's underlying handle was created on Description Executes the specified delegate asynchronously on the thread that the control's underlying handle was created on Return Value: An System.IAsyncResult object that represents the result of the System.Windows.Forms.Control.BeginInvoke(System.Delegate) operation.

The delegate is called asynchronously and this method returns immediately. You may call this from any thread, even the thread that owns the control's handle. If the control's handle does not exist yet, this will follow up the control's parent chain until it finds a control or form that does have a window handle. If no appropriate handle can be found, System.Windows.Forms.Control.BeginInvoke(System.Delegate) will throw an exception. Exceptions within the delegate method are considered untrapped and will be sent to the application's untrapped exception handler. A delegate to a method that takes no parameters.

ppppppppp) BeginInvoke

[C#] public IAsyncResult BeginInvoke(Delegate method, object[ ] args);

[C++] public: _sealed IAsyncResult* BeginInvoke(Delegate* method, Object* args _gc[ ]);

[VB] NotOverridable Public Function BeginInvoke(ByVal method As Delegate, ByVal args( ) As Object) As IAsyncResult

[JScript] public function BeginInvoke(method: Delegate, args: Object[ ]): IAsyncResult;

Description

Executes the specified delegate asynchronously with the specified arguments, on the thread that the control's underlying handle was created on.

Return Value: An System.IAsyncResult object that represents the result of the System.Windows.Forms.Control.BeginInvoke(System.Delegate) operation.

The delegate is called asynchronously and this method returns immediately. You may call this from any thread, even the thread that owns the control's handle. If the control's handle does not exist yet, this will follow up the control's parent chain until it finds a control or form that does have a window handle. If no appropriate handle can be found, System.Windows.Forms.Control.BeginInvoke(System.Delegate) will throw an exception. Exceptions within the delegate method are considered untrapped and will be sent to the application's untrapped exception handler. A delegate to a method that takes parameters of the same number and type that are contained in the args parameter. An array of objects to pass as arguments to the given method. This can be null if no arguments are needed.

qqqqqqqqq) BringToFront

[C#] public void BringToFront( );

[C++] public: void BringToFront( );

[VB] Public Sub BringToFront( )

[JScript] public function BringToFront( );

Description

Brings the control to the front of the z-order.

The control is moved to the top of the z-order. If the control is a child of another control, the child control is moved to the top of the z-order.

rrrrrrrrr) Contains

[C#] public bool Contains(Control ctl);

[C++] public: bool Contains(Control* ctl);

[VB] Public Function Contains(ByVal ctl As Control) As Boolean

[JScript] public function Contains(ctl: Control): Boolean;

Description

Retrieves a value indicating whether the specified control is a child of the control.

Return Value: true if the specified control is a child of the control; otherwise, false. The System.Windows.Forms.Control to evaluate.

sssssssss) CreateAccessibilityInstance

[C#] protected virtual AccessibleObject CreateAccessibilityInstance( );

[C++] protected: virtual AccessibleObject* CreateAccessibilityInstance( );

[VB] Overridable Protected Function CreateAccessibilityInstance( ) As AccessibleObject

[JScript] protected function CreateAccessibilityInstance( ): AccessibleObject;

Description

Creates a new instance of the accessibility object for the control.

Return Value: A new instance of the System.Windows.Forms.AccessibleObject assigned to the control.

If you do not explicitly call the System.Windows.Forms.Control.CreateAccessibilityInstance method it will be called when the System.Windows.Forms.Control.AccessibilityObject property is referenced.

ttttttttt) CreateControl

[C#] public void CreateControl( );

[C++] public: void CreateControl( );

[VB] Public Sub CreateControl( )

[JScript] public function CreateControl( );

Description

Forces the creation of the control including the creation of the handle and any child controls.

uuuuuuuuu) CreateControlsInstance

[C#] protected virtual ControlCollection CreateControlsInstance( );

[C++] protected: virtual ControlCollection* CreateControlsInstance( );

[VB] Overridable Protected Function CreateControlsInstance( ) As ControlCollection

[JScript] protected function CreateControlsInstance( ): ControlCollection;

Description

Creates a new instance of the control collection for the control.

Return Value: A new instance of System.Windows.Forms.Control.ControlCollection assigned to the control.

The base class version of this method should not be called by a derived class.

vvvvvvvvv) CreateGraphics

[C#] public Graphics CreateGraphics( );

[C++] public: Graphics* CreateGraphics( );

[VB] Public Function CreateGraphics( ) As Graphics

[JScript] public function CreateGraphics( ): Graphics; Creates the System.Drawing.Graphics object for the control.

Description

Creates the System.Drawing.Graphics object for the control.

Return Value: The System.Drawing.Graphics object for the control.

The control's brush, font, foreground color, and background color become the default values for the System.Drawing. Graphics object. The returned System.Drawing.Graphics object must be disposed through a call to its System.Drawing.Graphics.Dispose method when it is no longer needed. The System.Drawing.Graphics object is only valid for the duration of the current window's message.

wwwwwwwww) CreateHandle

[C#] protected virtual void CreateHandle( );

[C++] protected: virtual void CreateHandle( );

[VB] Overridable Protected Sub CreateHandle( )

[JScript] protected function CreateHandle( );

Description

Creates a handle for this control.

When overriding System.Windows.Forms.Control.CreateHandle in a derived class, be sure to call the base class's System.Windows.Forms.Control.CreateHandle method.

xxxxxxxxx) DefWndProc

[C#] protected virtual void DefWndProc(ref Message* m);

[C++] protected: virtual void DefWndProc(Message* m)

[VB] Overridable Protected Sub DefWndProc(ByRef m As Message)

[JScript] protected function DefWndProc(m: Message);

Description

Sends the specified message to the default window procedure.

For more information about processing Windows messages, see the WindowProc function documentation in the Windows Platform SDK reference located in the MSDN Library. The System.Windows.Forms.Message to process.

yyyyyyyyy) DestroyHandle

[C#] protected virtual void DestroyHandle( );

[C++] protected: virtual void DestroyHandle( );

[VB] Overridable Protected Sub DestroyHandle( )

[JScript] protected function DestroyHandle( );

Description

Destroys the handle associated with this control.

When overriding System.Windows.Forms.Control.DestroyHandle in a derived class, be sure to call the base class's System.Windows.Forms.Control.DestroyHandle method.

zzzzzzzzz) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean); Releases all resources used by the System.Windows.Forms.Control Description Releases the unmanaged resources used by the System.Windows.Forms.Control and optionally releases the managed resources.

This method is called by the public method and the System. Object.Finalize method. true to release both managed and unmanaged resources; false to release only unmanaged resources.

aaaaaaaaaa) DoDragDrop

[C#] public DragDropEffects DoDragDrop(object data, DragDropEffects allowedEffects);

[C++] public: DragDropEffects DoDragDrop(Object* data, DragDropEffects allowedEffects);

[VB] Public Function DoDragDrop(ByVal data As Object, ByVal allowedEffects As DragDropEffects) As DragDropEffects

[JScript] public function DoDragDrop(data: Object, allowedEffects: DragDropEffects): DragDropEffects;

Description

Begins a drag and drop operation.

Return Value: A value from the System.Windows.Forms. DragDropEffects enumeration that represents the final effect that was performed during the drag and drop operation.

The allowedEffects parameter determines which drag operations can occur. If the drag operation needs to interoperate with applications in another process, data should either be a base managed class (System.String, System.Drawing.Bitmap, or System.Drawing.Imaging.Metafile), or an object that implements System.Runtime.Serialization.ISerializable or System.Windows.Forms.IDataObject. The data to drag. One of the System.Windows.Forms.DragDropEffects values.

bbbbbbbbbb) EndInvoke

[C#] public object EndInvoke(IAsyncResult asyncResult);

[C++] public: sealed Object* EndInvoke(IAsyncResult* asyncResult);

[VB] NotOverridable Public Function EndInvoke(ByVal asyncResult As IAsyncResult) As Object

[JScript] public function EndInvoke(asyncResult: IAsyncResult): Object;

Description

Retrieves the return value of the asynchronous operation represented by the IAsyncResult interface passed.

Return Value: The System.Object generated by the asynchronous operation.

If the async operation has not been completed, this function will block until the result is available. The System.IAsyncResult interface that represents a specific invoke asynchronous operation, returned when calling System.Windows.Forms. Control.BeginInvoke(System.Delegate).

cccccccccc) FindForm

[C#] public Form FindForm( );

[C++] public: Form* FindForm( );

[VB] Public Function FindForm( ) As Form

[JScript] public function FindForm( ): Form;

Description

Retrieves the form that the control is on.

Return Value: The System.Windows.Forms.Form that the control is on.

The control's System.Windows.Forms.Control.Parent property value may not be the same as the System.Windows.Forms.Form returned by System.Windows.Forms.Control.FindForm method.

dddddddddd) Focus

[C#] public bool Focus( );

[C++] public: bool Focus( );

[VB] Public Function Focus( ) As Boolean

[JScript] public function Focus( ): Boolean;

Description

Sets input focus to the control.

Return Value: true if the input focus request was successful; otherwise, false.

The System.Windows.Forms.Control.Focus method returns true if the control successfully received input focus. The control can have the input focus while not displaying any visual cues of having the focus. This behavior is primarily observed by the nonselectable controls listed below, or any controls derived from them.

eeeeeeeeee) From ChildHandle

[C#] public static Control FromChildHandle(IntPtr handle);

[C++] public: static Control* FromChildHandle(IntPtr handle);

[VB] Public Shared Function FromChildHandle(ByVal handle As IntPtr) As Control

[JScript] public static function FromChildHandle(handle: IntPtr): Control;

Description

Retrieves the control that contains the specified handle.

Return Value: The System.Windows.Forms.Control that represents the control associated with the specified handle; returns null if no control with the specified handle is found.

This method searches up the window handle parent chain until it finds a handle that is associated with a control. This method is more robust than the System.Windows.Forms.Control.FromHandle(System.IntPtr) method, because it correctly returns controls that own more than one handle. The window handle (HWND) to search for.

ffffffffff) FromHandle

[C#] public static Control FromHandle(IntPtr handle);

[C++] public: static Control* FromHandle(IntPtr handle);

[VB] Public Shared Function FromHandle(ByVal handle As IntPtr) As Control

[JScript] public static function FromHandle(handle: IntPtr): Control;

Description

Returns the control that is currently associated with the specified handle.

Return Value: A System.Windows.Forms.Control that represents the control associated with the specified handle; returns null if no control with the specified handle is found.

Use the System.Windows.Forms.Control.fromChildHandle (System.IntPtr) method if you need to correctly return controls that own more than one handle. The window handle (HWND) to search for.

gggggggggg) GetChildAtPoint

[C#] public Control GetChildAtPoint(Point pt);

[C++] public: Control* GetChildAtPoint(Point Pt);

[VB] Public Function GetChildAtPoint(ByVal pt As Point) As Control

[JScript] public function GetChildAtPoint(pt: Point): Control;

Description

Retrieves the child control that is located at the specified coordinates.

Return Value: A System.Windows.Forms.Control that represents the control that is located at the specified point.

If there is no control at the specified point other than this control, the System.Windows.Forms.Control.GetChildAtPoint(System.Drawing.Point) method returns returns null. A System.Drawing.Point that contains the coordinates where you want to look for a control. Coordinates are expressed relative to the upper-left corner of the control's client area.

hhhhhhhhhh) GetContainerControl

[C#] public IContainerControl GetContainerControl( );

[C++] public: IContainerControl* GetContainerControl( );

[VB] Public Function GetContainerControl( ) As IContainerControl

[JScript] public function GetContainerControl( ): IContainerControl;

Description

Returns the next System.Windows.Forms.ContainerControl up the control's chain of parent controls.

Return Value: An object implementing the System.Windows.Forms.IContainerControl interface, that represents the parent of the System.Windows.Forms.Control iiiiiiiii) GetNextControl

[C#] public Control GetNextControl(Control ctl, bool forward);

[C++] public: Control* GetNextControl(Control* ctl, bool forward);

[VB] Public Function GetNextControl(ByVal ctl As Control, ByVal forward As Boolean) As Control

[JScript] public function GetNextControl(ctl: Control, forward: Boolean):Control;

Description

Retrieves the next control forward, or back, in the tab order of child controls.

Return Value: The next System.Windows.Forms.Control in the tab order. The System.Windows.Forms.Control to start the search with. true to search forward in the tab order; otherwise, false.

jjjjjjjjj) GetStyle

[C#] protected bool GetStyle(ControlStyles flag);

[C++] protected: bool GetStyle(ControlStyles flag);

[VB] Protected Function GetStyle(ByVal flag As ControlStyles) As Boolean

[JScript] protected function GetStyle(flag: ControlStyles): A Boolean;

Description

Retrieves the value of the specified control style bit for the control.

Return Value: true if specified control style bit is set to true; otherwise, false.

Control style bit flags are used to categorize supported behavior. A control can enable a style by calling the System.Windows.Forms.Control.SetStyle(System.Windows.Forms.ControlStyles,System.Boolean) method and passing in the appropriate System.Windows.Forms.ControlStyles bit and the boolean value set the bit to. To determine the value assigned to a specified System.Windows.Forms.ControlStyles bit, use the System.Windows.Forms.Control.GetStyle (System.Windows.Forms.ControlStyles) method and pass in the System.Windows.Forms.ControlStyles member to evaluate. The System.Windows.Forms.ControlStyles bit to return the value from.

kkkkkkkkkk) GetTopLevel

[C#] protected bool GetTopLevel( );

[C++] protected: bool GetTopLevel( );

[VB] Protected Function GetTopLevel( ) As Boolean

[JScript] protected function GetTopLevel( ): Boolean;

Description

Determines if the control is a top-level control.

Return Value: true if the System.Windows.Forms.Control is a top-level control; otherwise, false

[C#] public void Hide( );

[C++] public: void Hide( );

[VB] Public Sub Hideo

[JScript] public function Hide( );

Description

Conceals the control from the user.

Hiding the control is equal to setting the System.Windows.Forms.Control.Visible property to false. After the System.Windows.Forms.Control.Hide method is called the System.Windows.Forms.Control.Visible property returns a value of false until the System.Windows.Forms.Control.Show method is called.

mmmmmmmmmm) InitLayout

[C#] protected virtual void InitLayout( );

[C++] protected: virtual void InitLayout( );

[VB] Overridable Protected Sub InitLayout( )

[JScript] protected function InitLayout( );

Description

Called after the control has been added to another container.

nnnnnnnnnn) Invalidate

[C#] public void Invalidate( );

[C++] public: void Invalidate( );

[VB] Public Sub Invalidate( )

[JScript] public function Invalidate( );

Description

Invalidates a specific region of the control and causes a paint message to be sent to the control.

oooooooooo) Invalidate

[C#] public void Invalidate(bool invalidateChildren);

[C++] public: void Invalidate(bool invalidateChildren);

[VB] Public Sub Invalidate(ByVal invalidateChildren As Boolean)

[JScript] public function Invalidate(invalidateChildren: Boolean);

Description

Invalidates a specific region of the control and causes a paint message to be sent to the control. Optionally, invalidates the child controls assigned to the control. true to invalidate the control's child controls; otherwise, false.

pppppppppp) Invalidate

[C#] public void Invalidate(Rectangle rc);

[C++] public: void Invalidate(Rectangle rc);

[VB] Public Sub Invalidate(ByVal rc As Rectangle)

[JScript] public function Invalidate(rc: Rectangle);

Description

Invalidates the specified region of the control (adds it to the control's update region, which is the area that will be repainted at the next paint operation), and causes a paint message to be sent to the control. A System.Drawing.Rectangle object that represents the region to invalidate.

qqqqqqqqqq) Invalidate

[C#] public void Invalidate(Region region);

[C++] public: void Invalidate(Region* region);

[VB] Public Sub Invalidate(ByVal region As Region)

[JScript] public function Invalidate(region: Region); Invalidates a specific region of the control and causes a paint message to be sent to the control.

Description

Invalidates the specified region of the control (adds it to the control's update region, which is the area that will be repainted at the next paint operation), and causes a paint message to be sent to the control.

Calling this method does not force a synchronous paint; to force a synchronous paint, call the System.Windows.Forms.Control.Update method after calling the System.Windows.Forms.Control.Invalidate(System.Drawing.Region) method. If this method is called with no parameters, the entire client area is added to the update region. The System.Drawing.Region to invalidate.

rrrrrrrrr) In validate

[C#] public void Invalidate(Rectangle rc, bool invalidateChildren);

[C++] public: void Invalidate(Rectangle rc, bool invalidate Children);

[VB] Public Sub Invalidate(ByVal rc As Rectangle, ByVal invalidateChildren As Boolean)

[JScript] public function Invalidate(rc: Rectangle, invalidate Children: Boolean);

Description

Invalidates the specified region of the control (adds it to the control's update region, which is the area that will be repainted at the next paint operation), and causes a paint message to be sent to the control. Optionally, invalidates the child controls assigned to the control. A System.Drawing. Rectangle object that represents the region to invalidate. true to invalidate the control's child controls; otherwise, false.

ssssssssss) Invalidate

[C#] public void Invalidate(Region region, bool invalidate Children);

[C++] public: void Invalidate(Region* region, bool invalidate Children);

[VB] Public Sub Invalidate(ByVal region As Region, ByVal invalidateChildren As Boolean)

[JScript] public function Invalidate(region: Region, invalidate Children: Boolean);

Description

Invalidates the specified region of the control (adds it to the control's update 14 region, which is the area that will be repainted at the next paint operation), and causes a paint message to be sent to the control. Optionally, invalidates the child controls assigned to the control. The System.Drawing. Region to invalidate. true to invalidate the control's child controls; otherwise, false.

tttttttttt) Invoke

[C#] public object Invoke(Delegate method);

[C++] public: Object* Invoke(Delegate* method);

[VB] Public Function Invoke(ByVal method As Delegate) As Object

[JScript] public function Invoke(method: Delegate): Object; Executes a delegate on the thread that owns this control's underlying window handle.

Description

Executes the specified delegate on the thread that owns this control's underlying window handle.

Return Value: The return value from the delegate being invoked, or null if the delegate has no return value.

It is an error to call this on the same thread that the control belongs to. If the control's handle does not exist yet, this will follow up the control's parent chain until it finds a control or form that does have a window handle. If no appropriate handle can be found, the System.Windows.Forms.Control.Invoke(System.Delegate) method will throw an exception. Exceptions that are raised during the call will be propagated back to the caller. A delegate that contains a method to be called in in the control's thread context.

uuuuuuuuuu) Invoke

[C#] public object Invoke(Delegate method, object[ ] args);

[C++] public: _sealed Object* Invoke(Delegate* method, Object* args _gc[ ]);

[VB] NotOverridable Public Function Invoke(ByVal method As Delegate, ByVal args( ) As Object) As Object

[JScript] public function Invoke(method: Delegate, args: Object[ ]): Object;

Description

Executes the specified delegate, on the thread that owns this control's underlying window handle, with the specified list of arguments.

Return Value: The return value from the delegate being invoked, or null if the delegate has no return value.

It is an error to call this on the same thread that the control belongs to. If the control's handle does not exist yet, this will follow up the control's parent chain until it finds a control or form that does have a window handle. If no appropriate handle can be found, the System.Windows.Forms.Control.Invoke(System.Delegate) method will throw an exception. Exceptions that are raised during the call will be propagated back to the caller. A delegate to a method that takes parameters of the same number and type that are contained in args. An array of objects to pass as arguments to the given method. This can be null if no arguments are needed.

vvvvvvvvvv) InvokeGotFocus

[C#] protected void InvokeGotFocus(Control toInvoke, EventArgs e);

[C++] protected: void InvokeGotFocus(Control* toInvoke, EventArgs* e);

[VB] Protected Sub InvokeGotFocus(ByVal toInvoke As Control, ByVal e As EventArgs)

[JScript] protected function InvokeGotFocus(toInvoke: Control, e: EventArgs);

Description

Raises the System.Windows.Forms.Control.GotFocus event. The System.Windows.Forms.Control to assign the event to. An System.EventArgs that contains the event data.

wwwwwwwwww) InvokeLostFocus

[C#] protected void InvokeLostFocus(Control toInvoke, EventArgs e);

[C++] protected: void InvokeLostFocus(Control* toInvoke, EventArgs* e);

[VB] Protected Sub InvokeLostFocus(ByVal toInvoke As Control, ByVal e As EventArgs)

[JScript] protected function InvokeLostFocus(toInvoke: Control, e: EventArgs);

Description

Raises the System.Windows.Forms.Control.LostFocus event. The System.Windows.Forms.Control to assign the event to. An System.EventArgs that contains the event data.

xxxxxxxxxxx) InvokeOn Click

[C#] protected void InvokeOnClick(Control toInvoke, Event Args e);

[C++] protected: void InvokeOnClick(Control* toInvoke, EventArgs* e);

[VB] Protected Sub InvokeOnClick(ByVal toInvoke As Control, ByVal e As EventArgs)

[JScript] protected function InvokeOnClick(toInvoke: Control, e: EventArgs);

Description

Raises the System.Windows.Forms.Control.Click event for a specific control. The System.Windows.Forms.Control to assign the System.Windows.Forms.Control.Click event to. An System.EventArgs that contains the event data.

yyyyyyyyyy) InvokePaint

[C#] protected void InvokePaint(Control c, PaintEventArgs e);

[C++] protected: void InvokePaint(Control* c, PaintEvent Args* e);

[VB] Protected Sub InvokePaint(ByVal c As Control, ByVal e As PaintEventArgs)

[JScript] protected function InvokePaint(c: Control, e: PaintEventArgs);

Description

Raises the System.Windows.Forms.Control.Paint event for a specific control. The System.Windows.Forms.Control to assign the System.Windows.Forms.Control.Paint event to. An System.Windows.Forms.PaintEventArgs that contains the event data.

zzzzzzzzzz) InvokePaintBackground

[C#] protected void InvokePaintBackground(Control c, PaintEventArgs e);

[C++] protected: void InvokePaintBackground(Control* c, PaintEventArgs* e);

[VB] Protected Sub InvokePaintBackground(ByVal c As Control, ByVal e As PaintEventArgs)

[JScript] protected function InvokePaintBackground(c: Control, e: PaintEventArgs);

Description

Raises the PaintBackground event for a specific control. The System.Windows.Forms.Control to assign the System.Windows.Forms.Control.Paint event to. An System.Windows.Forms.PaintEventArgs that contains the event data.

aaaaaaaaaaa) IsInputChar

[C#] protected virtual bool IsInputChar(char charCode);

[C++] protected: virtual bool IsInputChar(_wchar_t charCode);

[VB] Overridable Protected Function IsInputChar(ByVal charCode As Char) As Boolean

[JScript] protected function IsInputChar(charCode: Char): Boolean;

Description

Determines if a character is an input character that the control recognizes.

Return Value: true if the character should be sent directly to control and not preprocessed; otherwise, false.

This method is called during window message preprocessing to determine whether the given input character should be preprocessed or sent directly to the control. If the System.Windows.Forms.Control.IsInputChar(System.Char) method returns true, the specified character is sent directly to the control. However, if the method returns false, the character is preprocessed and only sent to the control if it is not consumed by the preprocessing phase. The preprocessing of a character includes checking whether the character is a mnemonic of another control. The character to test.

bbbbbbbbbbb) IsInputKey

[C#] protected virtual bool IsInputKey(Keys keyData);

[C++] protected: virtual bool IsInputKey(Keys keyData);

[VB] Overridable Protected Function IsInputKey(ByVal keyData As Keys) As Boolean

[JScript] protected function IsInputKey(keyData: Keys): Boolean;

Description

Determines whether the specified key is a regular input key or a special key that requires preprocessing.

Return Value: true if the specified key is a regular input key; otherwise, false.

Call this method during window-message preprocessing to determine whether the specified key is a regular input key that should be sent directly to the control or a special key (such as PAGE UP and PAGE DOWN) that should preprocessed. In the latter case, send the key to the control only if it is not consumed by the preprocessing phase. One of the System.Windows.Forms.Keys values.

ccccccccccc) IsMnemonic

[C#] public static bool IsMnemonic(char charCode, string text);

[C++] public: static bool IsMnemonic(_wchar_t charCode, String* text);

[VB] Public Shared Function IsMnemonic(ByVal charCode As Char, ByVal text As String) As Boolean

[JScript] public static function IsMnemonic(charCode: Char, text: String):Boolean;

Description

Determines if the specified character is the mnemonic character assigned to the control in the specified string.

Return Value: true if the charCode character is the mnemonic character assigned to the control; otherwise, false.

The mnemonic character is the character immediately following the first instance of "&" in a System.String. The character to test. The System.String to search.

ddddddddddd) NotifyInvalidate

[C#] protected virtual void NotifyInvalidate(Rectangle invalidatedArea);

[C++] protected: virtual void NotifyInvalidate(Rectangle invalidatedArea);

[VB] Overridable Protected Sub NotifyInvalidate(ByVal invalidatedArea As Rectangle)

[JScript] protected function NotifyInvalidate(invalidatedArea: Rectangle);

Description

Raises the System.Windows.Forms.Control.Invalidated event with a specified region of the control to invalidate. A System.Drawing.Rectangle representing the area to invalidate.

eeeeeeeeeee) OnBackColorChanged

[C#] protected virtual void OnBackColorChanged(Event Args e);

[C++] protected: virtual void OnBackColorChanged(Event Args* e);

[VB] Overridable Protected Sub OnBackColorChanged(ByVal e As EventArgs)

[JScript] protected function OnBackColorChanged(e: Event Args);

Description

Raises the System.Windows.Forms.Control.Back Color-Changed event.

Raising an event invokes the event handler through a delegate. For more information, see. An System.EventArgs that contains the event data.

ffffffffff) OnBackgroundImageChanged

[C#] protected virtual void OnBackgroundImageChanged (EventArgs e);

[C++] protected: virtual void OnBackgroundImageChanged (EventArgs* e);

[VB] Overridable Protected Sub OnBackgroundImageChanged(ByVal e As EventArgs)

[JScript] protected function OnBackgroundImageChanged (e: EventArgs);

Description

Raises the System.Windows.Forms.Control.Background ImageChanged event.

Raising an event invokes the event handler through a delegate. For more information, see. An System.EventArgs that contains the event data.

gggggggggg) OnBindingContextChanged

[C#] protected virtual void OnBindingContextChanged (EventArgs e);

[C++] protected: virtual void OnBindingContextChanged (EventArgs* e);

[VB] Overridable Protected Sub OnBindingContextChanged (ByVal e As EventArgs)

[JScript] protected function OnBindingContextChanged(e: EventArgs);

Description

Raises the System.Windows.Forms.Control.BindingContextChanged event.

Raising an event invokes the event handler through a delegate. For more information, see. An System.EventArgs that contains the event data.

hhhhhhhhhh) On Causes Validation Changed

[C#] protected virtual void OnCausesValidationChanged (EventArgs e);

[C++] protected: virtual void OnCausesValidationChanged (EventArgs* e);

[VB] Overridable Protected Sub OnCausesValidation-Changed(ByVal e As EventArgs)

[JScript] protected function OnCausesValidationChanged(e: EventArgs);

Description

Raises the System.Windows.Forms.Control. CausesValidationChanged event.

Raising an event invokes the event handler through a delegate. For more information, see. An System.EventArgs that contains the event data.

iiiiiiiiii) On ChangeUICues

[C#] protected virtual void OnChangeUICues(UICuesEvent Args e);

[C++] protected: virtual void OnChangeUICues(UICues EventArgs* e);

[VB] Overridable Protected Sub OnChangeUICues(ByVal e As UICuesEventArgs)

[JScript] protected function OnChangeUICues(e: UICues EventArgs);

Description

Raises the System.Windows.Forms.Control.ChangeUICues event.

Raising an event invokes the event handler through a delegate. For more information, see. A System.Windows.Forms. UICuesEventArgs that contains the event data.

jjjjjjjjjj) OnClick

[C#] protected virtual void OnClick(EventArgs e);

[C++] protected: virtual void OnClick(EventArgs* e);

[VB] Overridable Protected Sub OnClick(ByVal e As Event Args)

[JScript] protected function OnClick(e: EventArgs);

Description

Raises the System.Windows.Forms.Control.Click event.

Raising an event invokes the event handler through a delegate. For more information, see. An System.EventArgs that contains the event data.

kkkkkkkkkk) OnContextMenuChanged

[C#] protected virtual void OnContextMenuChanged(Event Args e);

[C++] protected: virtual void OnContextMenuChanged (EventArgs* e);

[VB] Overridable Protected Sub OnContextMenuChanged (ByVal e As

EventArgs)

[JScript] protected function OnContextMenuChanged(e: EventArgs);

Description

Raises the System.Windows.Forms.Control.ContextMenuChanged event.

Raising an event invokes the event handler through a delegate. For more information, see. An System.EventArgs that contains the event data.

llllllllll) On ControlAdded

[C#] protected virtual void OnControlAdded(ControlEvent Args e);

[C++] protected: virtual void OnControlAdded(ControlEventArgs* e);

[VB] Overridable Protected Sub OnControlAdded(ByVal e As ControlEventArgs)

[JScript] protected function OnControlAdded(e: ControlEventArgs);

Description

Raises the System.Windows.Forms.Control.ControlAdded event.

Called when a child control is added to this control. A System.Windows.Forms.ControlEventArgs that contains the event data.

mmmmmmmmmm) OnControlRemoved

[C#] protected virtual void OnControlRemoved(Control EventArgs e);

[C++] protected: virtual void OnControlRemoved(ControlEventArgs* e);

[VB] Overridable Protected Sub OnControlRemoved(ByVal e As ControlEventArgs)

[JScript] protected function OnControlRemoved(e: ControlEventArgs);

Description

Raises the System.Windows.Forms.Control.ControlRemoved event.

Called when a child control is removed from this control. A System.Windows.Forms.ControlEventArgs that contains the event data.

nnnnnnnnnnn) OnCreateControl

[C#] protected virtual void OnCreateControl( );

[C++] protected: virtual void OnCreateControl( );

[VB] Overridable Protected Sub OnCreateControl( )

[JScript] protected function OnCreateControl( );

Description

Raises the System.Windows.Forms.Control.CreateControl event.

Called when the control is first created.

ooooooooooo) OnCursorChanged

[C#] protected virtual void OnCursorChanged(EventArgs e);

[C++] protected: virtual void OnCursorChanged(EventArgs* e);

[VB] Overridable Protected Sub OnCursorChanged(ByVal e As EventArgs)

[JScript] protected function OnCursorChanged(e: Event Args);

Description

Raises the System.Windows.Forms.Control.CursorChanged event.

Raising an event invokes the event handler through a delegate. For more information, see. An System.EventArgs that contains the event data.

ppppppppppp) OnDockChanged

[C#] protected virtual void OnDockChanged(EventArgs e);

[C++] protected: virtual void OnDockChanged(EventArgs* e);

[VB] Overridable Protected Sub OnDockChanged(ByVal e As EventArgs)

[JScript] protected function OnDockChanged(e: EventArgs);

Description

Raises the System.Windows.Forms.Control.DockChanged event.

Raising an event invokes the event handler through a delegate. For more information, see. An System.EventArgs that contains the event data.

qqqqqqqqqqq) OnDoubleClick

[C#] protected virtual void OnDoubleClick(EventArgs e);

[C++] protected: virtual void OnDoubleClick(EventArgs* e);

[VB] Overridable Protected Sub OnDoubleClick(ByVal e As EventArgs)

[JScript] protected function OnDoubleClick(e: EventArgs);

Description

Raises the System.Windows.Forms.Control.DoubleClick event.

Raising an event invokes the event handler through a delegate. For more information, see. An System.EventArgs that contains the event data.

rrrrrrrrrr) OnDragDrop

[C#] protected virtual void OnDragDrop(DragEventArgs drgevent);

[C++] protected: virtual void OnDragDrop(DragEventArgs* drgevent);

[VB] Overridable Protected Sub OnDragDrop(ByVal drgevent As DragEventArgs)

[JScript] protected function OnDragDrop(drgevent: Drag EventArgs);

Description

Raises the System.Windows.Forms.Control.DragDrop event.

Raising an event invokes the event handler through a delegate. For more information, see. A System.Windows.Forms.Drag EventArgs that contains the event data.

sssssssssss) OnDragEnter

[C#] protected virtual void OnDragEnter(DragEventArgs drgevent);

[C++] protected: virtual void on DragEnter(DragEventArgs* drgevent);

[VB] Overridable Protected Sub OnDragEnter(ByVal drgevent As DragEventArgs)

[JScript] protected function OnDragEnter(drgevent: Drag EventArgs);

Description

Raises the System.Windows.Forms.Control.DragEnter event.

Raising an event invokes the event handler through a delegate. For more information, see. A System.Windows.Forms.Drag EventArgs that contains the event data.

tttttttttt) OnDragLeave

[C#] protected virtual void OnDragLeave(EventArgs e);

[C++] protected: virtual void OnDragLeave(EventArgs* e);

[VB] Overridable Protected Sub OnDragLeave(ByVal e As EventArgs)

[JScript] protected function OnDragLeave(e: EventArgs);

Description

Raises the System.Windows.Forms.Control.DragLeave event.

Raising an event invokes the event handler through a delegate. For more information, see. An System.EventArgs that contains the event data.

uuuuuuuuuuu) OnDragOver

[C#] protected virtual void OnDragOver(DragEventArgs drgevent);

[C++] protected: virtual void OnDragOver(DragEventArgs* drgevent);

[VB] Overridable Protected Sub OnDragOver(ByVal drgevent As

DragEventArgs)

[JScript] protected function OnDragOver(drgevent: Drag EventArgs);

Description

Raises the System.Windows.Forms.Control.DragOver event.

Raising an event invokes the event handler through a delegate. For more information, see. A System.Windows.Forms.Drag EventArgs that contains the event data.

vvvvvvvvvvv) OnEnabledChanged

[C#] protected virtual void OnEnabledChanged(EventArgs e);

[C++] protected: virtual void OnEnabledChanged(EventArgs* e);

[VB] Overridable Protected Sub OnEnabledChanged(ByVal e As EventArgs)

[JScript] protected unction OnEnabledChanged(e: Event Args);

Description

Raises the System.Windows.Forms.Control.EnabledChanged event.

Raising an event invokes the event handler through a delegate. For more information, see. An System.EventArgs that contains the event data.

wwwwwwwwwww) OnEnter

[C#] protected virtual void OnEnter(EventArgs e);

[C++] protected: virtual void OnEnter(EventArgs* e);

[VB] Overridable Protected Sub OnEnter(ByVal e As Event Args)

[JScript] protected function OnEnter(e: EventArgs);

Description

Raises the System.Windows.Forms.Control.Enter event.

Raising an event invokes the event handler through a delegate. For more information, see. An System.EventArgs that contains the event data.

xxxxxxxxxxx) OnFontChanged

[C#] protected virtual void OnFontChanged(EventArgs e);

[C++] protected: virtual void OnFontChanged(EventArgs* e);

[VB] Overridable Protected Sub OnFontChanged(ByVal e As EventArgs)

[JScript] protected function OnFontChanged(e: EventArgs);

Description

Raises the System.Windows.Forms.Control.FontChanged event.

Raising an event invokes the event handler through a delegate. For more information, see. An System.EventArgs that contains the event data.

yyyyyyyyyyy) OnForeColorChanged

[C#] protected virtual void OnForeColorChanged(EventArgs e);

[C++] protected: virtual void OnForeColorChanged(EventArgs* e);

[VB] Overridable Protected Sub OnForeColorChanged(ByVal e As EventArgs)

[JScript] protected function OnForeColorChanged(e: Event Args);

Description

Raises the System.Windows.Forms.Control.Fore Color-Changed event.

Raising an event invokes the event handler through a delegate. For more information, see. An System.EventArgs that contains the event data.

zzzzzzzzzzz) On GiveFeedback

[C#] protected virtual void OnGiveFeedback(GiveFeedback-EventArgs gfbevent);

[C++] protected: virtual void OnGiveFeedback(GiveFeedbackEventArgs* gfbevent);

[VB] Overridable Protected Sub OnGiveFeedback(ByVal gfbevent As

GiveFeedbackEventArgs)

[JScript] protected function OnGiveFeedback(gfbevent: GiveFeedbackEventArgs);

Description

Raises the System.Windows.Forms.Control.GiveFeedback event.

Raising an event invokes the event handler through a delegate. For more information, see. A System.Windows.Forms.GiveFeedbackEventArgs that contains the event data.

aaaaaaaaaaaa) On GotFocus

[C#] protected virtual void OnGotFocus(EventArgs e);

[C++] protected: virtual void OnGotFocus(EventArgs* e);

[VB] Overridable Protected Sub OnGotFocus(ByVal e As EventArgs)

[JScript] protected function OnGotFocus(e: EventArgs);

Description

Raises the System.Windows.Forms.Control.GotFocus event.

Raising an event invokes the event handler through a delegate. For more information, see. An System.EventArgs that contains the event data.

bbbbbbbbbbbb) OnHandleCreated

[C#] protected virtual void OnHandleCreated(EventArgs e);

[C++] protected: virtual void OnHandleCreated(EventArgs* e);

[VB] Overridable Protected Sub OnHandleCreated(ByVal e As EventArgs)

[JScript] protected function OnHandleCreated(e: Event Args);

Description

Raises the System.Windows.Forms.Control.HandleCreated event.

Raising an event invokes the event handler through a delegate. For more information, see. An System.EventArgs that contains the event data.

cccccccccccc) OnHandleDestroyed

[C#] protected virtual void OnHandleDestroyed(EventArgs e);

[C++] protected: virtual void OnHandleDestroyed(Event Args* e);

[VB] Overridable Protected Sub OnHandleDestroyed(ByVal e As EventArgs)

[JScript] protected function OnHandleDestroyed(e: Event Args);

Description

Raises the System.Windows.Forms.Control. HandleDestroyed event.

Raising an event invokes the event handler through a delegate. For more information, see. An System.EventArgs that contains the event data.

dddddddddddd) OnHelpRequested

[C#] protected virtual void OnHelpRequested(HelpEvent Args hevent);

[C++] protected: virtual void OnHelpRequested(HelpEvent Args* hevent);

[VB] Overridable Protected Sub OnHelpRequested(ByVal hevent As HelpEventArgs)

[JScript] protected function OnHelpRequested(hevent: HelpEventArgs);

Description

Raises the System.Windows.Forms.Control.HelpRequested event.

Raising an event invokes the event handler through a delegate. For more information, see. A System.Windows.Forms. HelpEventArgs that contains the event data.

eeeeeeeeeeee) OnImeModeChanged

[C#] protected virtual void OnImeModeChanged(EventArgs e);

[C++] protected: virtual void OnImeModeChanged(Event Args* e);

[VB] Overridable Protected Sub OnImeModeChanged(ByVal e As EventArgs)

[JScript] protected function OnImeModeChanged(e: Event Args);

Description

Raises the System.Windows.Forms.Control.ImeMode Changed event.

Raising an event invokes the event handler through a delegate. For more information, see. An System.EventArgs that contains the event data.

ffffffffffff) OnInvalidated

[C#] protected virtual void OnInvalidated(InvalidateEvent Args e);

[C++] protected: virtual void OnInvalidated(InvalidateEvent Args* e);

[VB] Overridable Protected Sub OnInvalidated(ByVal e As InvalidateEventArgs)

[JScript] protected function OnInvalidated(e: Invalidate EventArgs);

Description

Raises the System.Windows.Forms.Control.Invalidated event.

Raising an event invokes the event handler through a delegate. For more information, see. An System.Windows.Forms.InvalidateEventArgs that contains the event data.

[C#] protected virtual void OnKeyDown(KeyEventArgs e);

[C++] protected: virtual void OnKeyDown(KeyEventArgs* e);

[VB] Overridable Protected Sub OnKeyDown(ByVal e As KeyEventArgs)

[JScript] protected function OnKeyDown(e: KeyEventArgs);

Description

Raises the System.Windows.Forms.Control.KeyDown event.

Raising an event invokes the event handler through a delegate. For more information, see. A System.Windows.Forms. KeyEventArgs that contains the event data.

hhhhhhhhhhhh) OnKeyPress

[C#] protected virtual void OnKeyPress(KeyPressEventArgs e);

[C++] protected: virtual void OnKeyPress(KeyPressEvent Args* e);

[VB] Overridable Protected Sub OnKeyPress(ByVal e As KeyPressEventArgs)

[JScript] protected function OnKeyPress(e: KeyPressEvent Args);

Description

Raises the System.Windows.Forms.Control.KeyPress event.

Raising an event invokes the event handler through a delegate. For more information, see. A System.Windows.Forms.KeyPressEventArgs that contains the event data.

iiiiiiiiiiii) OnKeyUp

[C#] protected virtual void OnKeyUp(KeyEventArgs e);

[C++] protected: virtual void OnKeyUp(KeyEventArgs* e);

[VB] Overridable Protected Sub OnKeyUp(ByVal e As KeyEventArgs)

[JScript] protected function OnKeyUp(e: KeyEventArgs);

Description

Raises the System.Windows.Forms.Control.KeyUp event.

Raising an event invokes the event handler through a delegate. For more information, see. A System.Windows.Forms.KeyEventArgs that contains the event data.

jjjjjjjjjjjj) OnLayout

[C#] protected virtual void OnLayout(LayoutEventArgs levent);

[C++] protected: virtual void OnLayout(LayoutEventArgs* levent);

[VB] Overridable Protected Sub OnLayout(ByVal levent As LayoutEventArgs)

[JScript] protected function OnLayout(levent: LayoutEventArgs);

Description

Raises the System.Windows.Forms.Control.Layout event.

Raising an event invokes the event handler through a delegate. For more information, see. A System.Windows.Forms.LayoutEventArgs that contains the event data.

kkkkkkkkkkkk) OnLeave

[C#] protected virtual void OnLeave(EventArgs e);

[C++] protected: virtual void OnLeave(EventArgs* e);

[VB] Overridable Protected Sub OnLeave(ByVal e As Event Args)

[JScript] protected function OnLeave(e: EventArgs);

Description

Raises the System.Windows.Forms.Control.Leave event.

Raising an event invokes the event handler through a delegate. For more information, see. An System.EventArgs that contains the event data.

llllllllllll) OnLocation Changed

[C#] protected virtual void OnLocationChanged(EventArgs e);

[C++] protected: virtual void OnLocationChanged(Event Args* e);

[VB] Overridable Protected Sub OnLocationChanged(ByVal e As EventArgs)

[JScript] protected function OnLocationChanged(e: EventArgs);

Description

Raises the System.Windows.Forms.Control.LocationChanged event.

Raising an event invokes the event handler through a delegate. For more information, see. An System.EventArgs that contains the event data.

mmmmmmmmmmmm) OnLostFocus

[C++] protected virtual void OnLostFocus(EventArgs e);

[C++] protected: virtual void OnLostFocus(EventArgs* e);

[VB] Overridable Protected Sub OnLostFocus(ByVal e As EventArgs)

[JScript] protected function OnLostFocus(e: EventArgs);

Description

Raises the System.Windows.Forms.Control.LostFocus event.

Raising an event invokes the event handler through a delegate. For more information, see. An System.EventArgs that contains the event data.

nnnnnnnnnnnn) OnMouseDown

[C#] protected virtual void OnMouseDown(MouseEvent Args e);

[C++] protected: virtual void OnMouseDown(MouseEvent Args* e);

[VB] Overridable Protected Sub OnMouseDown(ByVal e As MouseEventArgs)

[JScript] protected function OnMouseDown(e: MouseEvent Args);

Description

Raises the System.Windows.Forms.Control.MouseDown event.

Raising an event invokes the event handler through a delegate. For more information, see. A System.Windows.Forms.Mouse EventArgs that contains the event data.

oooooooooooo) OnMouseEnter

[C#] protected virtual void OnMouseEnter(EventArgs e);

[C++] protected: virtual void OnMouseEnter(EventArgs* e);

[VB] Overridable Protected Sub OnMouseEnter(ByVal e As EventArgs)

[JScript] protected function OnMouseEnter(e: EventArgs);

Description

Raises the System.Windows.Forms.Control.MouseEnter event.

Raising an event invokes the event handler through a delegate. For more information, see. An System.EventArgs that contains the event data.

pppppppppppp) OnMouseHover

[C#] protected virtual void OnMouseHover(EventArgs e);

[C++] protected: virtual void OnMouseHover(EventArgs* e);

[VB] Overridable Protected Sub OnMouseHover(ByVal e As EventArgs)

[JScript] protected function OnMouseHover(e: EventArgs);

Description

Raises the System.Windows.Forms.Control.MouseHover event.

Raising an event invokes the event handler through a delegate. For more information, see. An System.EventArgs that contains the event data.

qqqqqqqqqqqq) OnMouseLeave

[C#] protected virtual void OnMouseLeave(EventArgs e);

[C++] protected: virtual void OnMouseLeave(EventArgs* e);

[VB] Overridable Protected Sub OnMouseLeave(ByVal e As EventArgs)

[JScript] protected function OnMouseLeave(e: EventArgs);

Description

Raises the System.Windows.Forms.Control.MouseLeave event.

Raising an event invokes the event handler through a delegate. For more information, see. An System.EventArgs that contains the event data.

rrrrrrrrrrr) OnMouseMove

[C#] protected virtual void OnMouseMove(MouseEvent Args e);

[C++] protected: virtual void OnMouseMove(MouseEvent Args* e);

[VB] Overridable Protected Sub OnMouseMove(ByVal e As MouseEventArgs)

[JScript] protected function OnMouseMove(e: MouseEvent Args);

Description

Raises the System.Windows.Forms.Control.MouseMove event.

Raising an event invokes the event handler through a delegate. For more information, see. A System.Windows. Forms.Mouse EventArgs that contains the event data.

sssssssssss) OnMouseUp

[C#] protected virtual void OnMouseUp(MouseEventArgs e);

[C++] protected: virtual void OnMouseUp(MouseEvent Args* e);

[VB] Overridable Protected Sub OnMouseUp(ByVal e As MouseEventArgs)

[JScript] protected function OnMouseUp(e: MouseEventArgs);

Description

Raises the System.Windows.Forms.Control.MouseUp event.

Raising an event invokes the event handler through a delegate. For more information, see. A System.Windows. Forms.Mouse EventArgs that contains the event data.

ttttttttttt) OnMouseWheel

[C#] protected virtual void OnMouseWheel(MouseEvent Args e);

[C++] protected: virtual void OnMouseWheel(MouseEvent Args* e);

[VB] Overridable Protected Sub OnMouseWheel(ByVal e As MouseEventArgs)

[JScript] protected function OnMouseWheel(e: MouseEvent Args);

Description

Raises the System.Windows.Forms.Control.MouseWheel event.

Raising an event invokes the event handler through a delegate. For more information, see. A System.Windows. Forms.Mouse EventArgs that contains the event data.

uuuuuuuuuuuu) OnMove

[C#] protected virtual void OnMove(EventArgs e);

[C++] protected: virtual void OnMove(EventArgs* e);

[VB] Overridable Protected Sub OnMove(ByVal e As Event Args)

[JScript] protected function OnMove(e: EventArgs);

Description

Raises the System.Windows.Forms.Control.Move event.

Raising an event invokes the event handler through a delegate. For more information, see. An System.EventArgs that contains the event data.

vvvvvvvvvvvv) OnNotifyMessage

[C#] protected virtual void OnNotifyMessage(Message m);

[C++] protected: virtual void OnNotifyMessage(Message m);

[VB] Overridable Protected Sub OnNotifyMessage(ByVal m As Message)

[JScript] protected function OnNotifyMessage(m: Message);

Description

Notifies the control of Windows messages.

The System.Windows.Forms.Control.OnNotifyMessage (System.Windows.Forms.Message) method is called if the control's System.Windows.Forms.ControlStyles.EnableNotifyMessage style bit is set. The System. Windows.Forms.ControlStyles.EnableNotifyMessage style allows the control to be notified when the System.Windows. Forms.Control.WndProc(System.Windows.Forms.Message@) method receives a Windows message. This method allows semi-trusted controls to listen for Windows messages without allowing them to modify the message. A System. Windows.Forms.Message that represents the Windows message.

wwwwwwwwwwww) OnPaint

[C#] protected virtual void OnPaint(PaintEventArgs e);

[C++] protected: virtual void OnPaint(PaintEventArgs* e);

[VB] Overridable Protected Sub OnPaint(ByVal e As PaintEventArgs)

[JScript] protected function OnPaint(e: PaintEventArgs);

Description

Raises the System.Windows.Forms.Control.Paint event.

Raising an event invokes the event handler through a delegate. For more information, see. A System.Windows.Forms.PaintEventArgs that contains the event data.

xxxxxxxxxxxx) OnPaintBackground

[C#] protected virtual void OnPaintBackground(PaintEvent Args pevent);

[C++] protected: virtual void OnPaintBackground(PaintEventArgs* pevent);

[VB] Overridable Protected Sub OnPaintBackground(ByVal pevent As PaintEventArgs)

[JScript] protected function OnPaintBackground(pevent: PaintEventArgs);

Description

Paints the background of the control.

Inheriting classes should override this method to handle the erase background request from windows. When overriding System.Windows.Forms.Control.OnPaintBackground(System.Windows. Forms.PaintEventArgs) in a derived class it is not necessary to call the base class's System.Windows. Forms. Control.OnPaintBackground(System.Windows.

Forms.PaintEventArgs) method. A System.Windows.Forms. EventArgs that contains information about the control to paint.

yyyyyyyyyyyy) OnParentBackColorChanged

[C#] protected virtual void OnParentBackColorChanged (EventArgs e);

[C++] protected: virtual void OnParentBackColorChanged (EventArgs* e);

[VB] Overridable Protected Sub OnParentBackColor-Changed(ByVal e As EventArgs)

[JScript] protected function OnParentBackColorChanged(e: EventArgs);

Description

Raises the System.Windows.Forms.Control.Back Color-Changed event when the System.Windows.Forms.Control. BackColor property value of the control's container changes.

Raising an event invokes the event handier through a delegate. For more information, see. An System.EventArgs that contains the event data.

zzzzzzzzzzzz) OnParentBackgroundImageChanged

[C#] protected virtual void OnParentBackgroundImageChanged(EventArgs e);

[C++] protected: virtual void OnParentBackgroundImageChanged(EventArgs* e);

[VB] Overridable Protected Sub OnParentBackgroundImageChanged(ByVal e As EventArgs)

[JScript] protected function OnParentBackgroundImageChanged(e: EventArgs);

Description

Raises the System.Windows.Forms.Control.Background ImageChanged event when the System.Windows.Forms-.Control.BackColor property value of the control's container changes.

Raising an event invokes the event handler through a delegate. For more information, see. An System.EventArgs that contains the event data.

aaaaaaaaaaaaa) OnParentBindingContextChanged

[C#] protected virtual void OnParentBindingContext Changed(EventArgs e);

[C++] protected: virtual void OnParentBindingContext Changed(EventArgs* e);

[VB] Overridable Protected Sub OnParentBindingContext Changed(ByVal e As EventArgs)

[JScript] protected function OnParentBindingContext Changed(e: EventArgs);

Description

Raises the System.Windows.Forms.Control.BindingContextChanged event when the System.Windows. Forms.Control.BindingContext property value of the control's container changes.

Raising an event invokes the event handler through a delegate. For more information, see. An System.EventArgs that contains the event data.

bbbbbbbbbbbbb) OnParentChanged

[C#] protected virtual void OnParentChanged(EventArgs e);

[C++] protected: virtual void OnParentChanged(EventArgs* e);

[VB] Overridable Protected Sub OnParentChanged(ByVal e As EventArgs)

[JScript] protected function OnParentChanged(e: Event Args);

Description

Raises the System.Windows.Forms.Control.ParentChanged event.

Raising an event invokes the event handler through a delegate. For more information, see. An System.EventArgs that contains the event data.

ccccccccccccc) OnParentEnabledChanged

[C#] protected virtual void OnParentEnabledChanged(Event Args e);

[C++] protected: virtual void OnParentEnabledChanged (EventArgs* e);

[VB] Overridable Protected Sub OnParentEnabledChanged (ByVal e As EventArgs)

[JScript] protected function OnParentEnabledChanged(e: EventArgs);

Description

Raises the System.Windows.Forms.Control.EnabledChanged event when the System.Windows.Forms.Control.Enabled property value of the control's container changes.

Raising an event invokes the event handler through a delegate. For more information, see. An System.EventArgs that contains the event data.

ddddddddddddd) OnParentFontChanged

[C#] protected virtual void OnParentFontChanged(Event Args e);

[C++] protected: virtual void OnParentFontChanged(Event Args* e);

[VB] Overridable Protected Sub OnParentFontChanged(ByVal e As EventArgs)

[JScript] protected function OnParentFontChanged(e: Event Args);

Description

Raises the System.Windows.Forms.Control.FontChanged event when the System.Windows.Forms.Control.Font property value of the control's container changes.

Raising an event invokes the event handler through a delegate. For more information, see. An System.EventArgs that contains the event data.

eeeeeeeeeeeee) OnParentForeColorChanged

[C#] protected virtual void OnParentForeColorChanged (EventArgs e);

[C++] protected: virtual void OnParentForeColorChanged (EventArgs* e);

[VB] Overridable Protected Sub OnParentForeColor-Changed(ByVal e As EventArgs)

[JScript] protected function OnParentForeColorChanged(e: EventArgs);

Description

Raises the System.Windows.Forms.Control.Fore Color-Changed event when the System.Windows.Forms.Control. ForeColor property value of the control's container changes.

Raising an event invokes the event handler through a delegate. For more information, see. An System.EventArgs that contains the event data.

ffffffffffff) OnParentRightToLeftChanged

[C#] protected virtual void OnParentRightToLeftChanged (EventArgs e);

[C++] protected: virtual void OnParentRightToLeftChanged (EventArgs* e);

[VB] Overridable Protected Sub OnParentRight-ToLeftChanged(ByVal e As EventArgs)

[JScript] protected function OnParentRightToLeftChanged (e: EventArgs);

Description

Raises the System.Windows.Forms.Control.Right ToLeftChanged event when the System.Windows.Forms. Control.RightToLeft property value of the control's container changes.

Raising an event invokes the event handler through a delegate. For more information, see. An System.EventArgs that contains the event data.

gggggggggggg) OnParentVisibleChanged

[C#] protected virtual void OnParentVisibleChanged(Event Args e);

[C++] protected: virtual void OnParentVisibleChanged (EventArgs* e);

[VB] Overridable Protected Sub OnParentVisibleChanged (ByVal e As

EventArgs)

[JScript] protected function OnParentVisibleChanged(e: EventArgs);

Description

Raises the System.Windows.Forms.Control.VisibleChanged event when the System.Windows.Forms.Control.Visible property value of the control's container changes.

Raising an event invokes the event handler through a delegate. For more information, see. An System.EventArgs that contains the event data.

hhhhhhhhhhhh) OnQueryContinueDrag

[C#] protected virtual void OnQueryContinueDrag(Query-ContinueDragEventArgs qcdevent);

[C++] protected: virtual void OnQueryContinueDrag(Query-ContinueDragEventArgs* qcdevent);

[VB] Overridable Protected Sub OnQueryContinueDrag(By-Val qcdevent As QueryContinueDragEventArgs)

[JScript] protected function OnQueryContinueDrag(qcde-vent QueryContinueDragEventArgs);

Description

Raises the System.Windows.Forms.Control.Que-ryContinueDrag event.

Raising an event invokes the event handler through a delegate. For more information, see. A System.Windows.Forms.Que-ryContinueDragEventArgs that contains the event data.

iiiiiiiiiiii) OnResize

[C#] protected virtual void OnResize(EventArgs e);

[C++] protected: virtual void OnResize(EventArgs* e);

[VB] Overridable Protected Sub OnResize(ByVal e As Event Args)

[JScript] protected function OnResize(e: EventArgs);

Description

Raises the System.Windows.Forms.Control.Resize event.

Raising an event invokes the event handler through a delegate. For more information, see. An System.EventArgs that contains the event data.

jjjjjjjjjjjj) OnRightToLeftChanged

[C#] protected virtual void OnRightToLeftChanged(Event Args e);

[C++] protected: virtual void OnRightToLeftChanged(Event Args* e);

[VB] Overridable Protected Sub OnRightToLeftChanged (ByVal e As EventArgs)

[JScript] protected function OnRightToLeftChanged(e: EventArgs);

Description

Raises the System.Windows.Forms.Control.Right ToLeftChanged event.

Raising an event invokes the event handler through a delegate. For more information, see. An System.EventArgs that contains the event data.

kkkkkkkkkkkk) OnSizeChanged

[C#] protected virtual void OnSizeChanged(EventArgs e);

[C++] protected: virtual void OnSizeChanged(EventArgs* e);

[VB] Overridable Protected Sub OnSizeChanged(ByVal e As EventArgs)

[JScript] protected function OnSizeChanged(e: EventArgs);

Description

Raises the System.Windows.Forms.Control.SizeChanged event.

Raising an event invokes the event handler through a delegate. For more information, see. An System.EventArgs that contains the event data.

llllllllllll) OnStyleChanged

[C#] protected virtual void OnStyleChanged(EventArgs e);

[C++] protected: virtual void OnStyleChanged(EventArgs* e);

[VB] Overridable Protected Sub OnStyleChanged(ByVal e As EventArgs)

[JScript] protected function OnStyleChanged(e: EventArgs);

Description

Raises the System.Windows.Forms.Control.StyleChanged event.

Raising an event invokes the event handler through a delegate. For more information, see. An System.EventArgs that contains the event data.

mmmmmmmmmmmmm) OnSystemColorsChanged

[C#] protected virtual void OnSystemColorsChanged(Event Args e);

[C++] protected: virtual void OnSystemColorsChanged(EventArgs* e);

[VB] Overridable Protected Sub OnSystemColorsChanged (ByVal e As EventArgs)

[JScript] protected function OnSystemColorsChanged(e: EventArgs);

Description

Raises the System.Windows.Forms.Control.SystemColorsChanged event.

Raising an event invokes the event handler through a delegate. For more information, see. An System.EventArgs that contains the event data.

nnmmnnnnnnnn) OnTabIndexChanged

[C#] protected virtual void OnTabIndexChanged(EventArgs e);

[C++] protected: virtual void OnTabIndexChanged(Event Args* e);

[VB] Overridable Protected Sub OnTabIndexChanged(ByVal e As EventArgs)

[JScript] protected function OnTabIndexChanged(e: Event Args);

Description

Raises the System.Windows.Forms.Control.TabIndexChanged event.

Raising an event invokes the event handler through a delegate. For more information, see. An System.EventArgs that contains the event data.

ooooooooooooo) OnTabStopChanged

[C#] protected virtual void OnTabStopChanged(EventArgs e);

[C++] protected: virtual void OnTabStopChanged(Event Args* e);

[VB] Overridable Protected Sub OnTabStopChanged(ByVal e As EventArgs)

[JScript] protected function OnTabStopChanged(e: Event Args);

Description

Raises the System.Windows.Forms.Control.TabStopChanged event.

Raising an event invokes the event handler through a delegate. For more information, see. An System.EventArgs that contains the event data.

ppppppppppppp) On TextChanged

[C#] protected virtual void OnTextChanged(EventArgs e);

[C++] protected: virtual void OnTextChanged(EventArgs* e);

[VB] Overridable Protected Sub OnTextChanged(ByVal e As EventArgs)

[JScript] protected function OnTextChanged(e: EventArgs);

Description

Raises the System.Windows.Forms.Control.TextChanged event.

Raising an event invokes the event handler through a delegate. For more information, see. An System.EventArgs that contains the event data.

qqqqqqqqqqqqq) OnValidated

[C#] protected virtual void OnValidated(EventArgs e);

[C++] protected: virtual void OnValidated(EventArgs* e);

[VB] Overridable Protected Sub OnValidated(ByVal e As EventArgs)

[JScript] protected function OnValidated(e: EventArgs);

Description

Raises the System.Windows.Forms.Control.Validated event.

Raising an event invokes the event handler through a delegate. For more information, see. An System.EventArgs that contains the event data.

rrrrrrrrrrrr) OnValidating

[C#] protected virtual void OnValidating(CancelEventArgs e);

[C++] protected: virtual void OnValidating(CancelEvent Args* e);

[VB] Overridable Protected Sub OnValidating(ByVal e As CancelEventArgs)

[JScript] protected function OnValidating(e: CancelEvent Args);

Description

Raises the System.Windows.Forms.Control.Validating event.

Raising an event invokes the event handler through a delegate. For more information, see. A System.ComponentModel.CancelEventArgs that contains the event data.

sssssssssssss) OnVisibleChanged

[C#] protected virtual void OnVisibleChanged(EventArgs e);

[C++] protected: virtual void OnVisibleChanged(Event Args* e);

[VB] Overridable Protected Sub OnVisibleChanged(ByVal e As EventArgs)

[JScript] protected function OnVisibleChanged(e: EventArgs);

Description

Raises the System.Windows.Forms.Control.VisibleChanged event.

Raising an event invokes the event handler through a delegate. For more information, see. An System.EventArgs that contains the event data.

ttttttttttttt) PerformLayout

[C#] public void PerformLayout( );

[C++] public: void PerformLayout( );

[VB] Public Sub PerformLayout( )

[JScript] public function PerformLayout( ); Forces the control to apply layout logic to child controls.

Description

Forces the control to apply layout logic to all its child controls.

uuuuuuuuuuuuu) PerformLayout

[C#] public void PerformLayout(Control affectedControl, string affectedProperty);

[C++] public: void PerformLayout(Control* affectedControl, String* affectedProperty);

[VB] Public Sub PerformLayout(ByVal affectedControl As Control, ByVal affectedProperty As String)

[JScript] public function PerformLayout(affectedControl: Control, affectedProperty String);

Description

Forces the control to apply layout logic to all of the child controls. A System.Windows.Forms.Control that represents the most recently changed control. The name of the most recently changed property on the control.

vvvvvvvvvvvvv) PointToClient

[C#] public Point PointToClient(Point p);

[C++] public: Point PointToClient(Point p);

[VB] Public Function PointToClient(ByVal p As Point) As Point

[JScript] public function PointToClient(p: Point): Point;

Description Computes the location of the specified screen point to client coordinates.

Return Value: A System.Drawing.Point that represents the converted System.Drawing.Point, p, in client coordinates. The screen coordinate System.Drawing.Point to convert.

wwwwwwwwwwwww) PointToScreen

[C#] public Point PointToScreen(Point p);

[C++] public: Point PointToScreen(Point p);

[VB] Public Function PointToScreen(ByVal p As Point) As Point

[JScript] public function PointToScreen(p: Point): Point;

Description

Computes the location of the specified client point to screen coordinates.

Return Value: A System.Drawing.Point that represents the converted System.Drawing.Point, p, in screen coordinates. The screen coordinate System.Drawing.Point to convert.

xxxxxxxxxxxxx) PreProcessMessage

[C#] public virtual bool PreProcessMessage(ref Message msg);

[C++] public: virtual bool PreProcessMessage(Message* msg);

[VB] Overridable Public Function PreProcessMessage(ByRef msg As Message) As Boolean

[JScript] public function PreProcessMessage(msg: Message): Boolean;

Description

Preprocesses input messages within the message loop before they are dispatched.

Return Value: true if the message was processed by the control; otherwise, false.

This method is only called when the control is hosted inside of a Windows Forms application or as an ActiveX control. A System.Windows.Forms.Message, passed by reference, that represents the message to process.

yyyyyyyyyyyyy) ProcessCmdKey

[C#] protected virtual bool ProcessCmdKey(ref Message msg, Keys keyData);

[C++] protected: virtual bool ProcessCmdKey(Message* msg, Keys keyData);

[VB] Overridable Protected Function ProcessCmdKey(ByRef msg As Message, ByVal keyData As Keys) As Boolean

[JScript] protected function ProcessCmdKey(msg: Message, keyData: Keys) Boolean;

Description

Processes a command key.

Return Value: true if the character was processed by the control; otherwise, false.

This method is called during message preprocessing to handle command keys. Command keys are keys that always take precedence over regular input keys. Examples of command keys include accelerators and menu shortcuts. The method must return true to indicate that it has processed the command key, or false to indicate that the key is not a command key. This method is only called when the control is hosted inside of a Windows Forms application or as an ActiveX control. A System.Windows.Forms.Message, passed by reference, that represents the window message to process. The key code for the key the user presses.

zzzzzzzzzzzzz) ProcessDialogChar

[C#] protected virtual bool ProcessDialogChar(char charCode);

[C++] protected: virtual bool ProcessDialogChar(_wchar_t charCode);

[VB] Overridable Protected Function ProcessDialogChar (ByVal charCode As Char) As Boolean

[JScript] protected function ProcessDialogChar(charCode: Char): Boolean;

Description

Processes a dialog character.

Return Value: true if the character was processed by the control; otherwise, false.

This method is called during message preprocessing to handle dialog characters, such as control mnemonics. This method is called only if the System.Windows.Forms.Control.IsInputChar(System.Char) method indicates that the control is not processing the character. The System.Windows.Forms.Control.ProcessDialogChar(System.Char) method simply sends the character to the parent's System.Windows.Forms.Control.ProcessDialogChar(System.Char) method, or returns false if the control has no parent. The System.Windows.Forms.Form class overrides this method to perform actual processing of dialog characters. This method is only called when the control is hosted inside of a Windows Forms application or as an ActiveX control. The character to process.

aaaaaaaaaaaaaa) ProcessDialogKey

[C#] protected virtual bool ProcessDialogKey(Keys keyData);

[C++] protected: virtual bool ProcessDialogKey(Keys keyData);

[VB] Overridable Protected Function ProcessDialogKey(ByVal keyData As Keys) As Boolean

[JScript] protected function ProcessDialogKey(keyData: Keys): Boolean;

Description

Processes a dialog key.

Return Value: true if the key was processed by the control; otherwise, false.

This method is called during message preprocessing to handle dialog characters, such as TAB, RETURN, ESCAPE, and arrow keys. This method is called only if the System.Windows.Forms.Control.IsInputKey(System.Windows.Forms.Keys) method indicates that the control is not processing the key. The System.Windows.Forms.Control. ProcessDialogKey(System.Windows.Forms.Keys) simply sends the character to the parent's System.Windows.Forms. Control. ProcessDialogKey(System.Windows.Forms.Keys) method, or returns false if the control has no parent. The System.Windows.Forms.Form class overrides this method to perform actual processing of dialog keys. This method is only called when the control is hosted inside of a Windows Forms application or as an ActiveX control. One of the bbbbbbbbbbbbbb) ProcessKeyEventArgs

[C#] protected virtual bool ProcessKeyEventArgs(ref Message m);

[C++] protected: virtual bool ProcessKeyEventArgs(Message* m);

[VB] Overridable Protected Function ProcessKeyEventArgs (ByRef m As Message) As Boolean

[JScript] protected function ProcessKeyEventArgs(m: Message): Boolean;

Description

Processes a key message and generates the appropriate control events.

Return Value: true if the message was processed by the control; otherwise, false.

This method is called when a control receives a keyboard message. The method is responsible for generating the appropriate key events for the message by calling the System.Windows.Forms.Control.OnKeyPress(System.Windows.Forms.KeyPressEventArgs), System.Windows.Forms.Control.OnKeyDown(System. Windows.Forms. KeyEventArgs), or System.Windows. Forms.Control.OnKeyUp(System.Windows.Forms. KeyEventArgs) methods. The m parameter contains the window message that must be processed. Possible values for the System.Windows.Forms.Message.Msg property are WM_CHAR, WM_KEYDOWN, WM_SYSKEYDOWN, WM_KEYUP, WM_SYSKEYUP, and WM_IMECHAR. A System.Windows.Forms.Message, passed by reference, that represents the window message to process.

cccccccccccccc) ProcessKeyMessage

[C#] protected internal virtual bool ProcessKeyMessage(ref Message m);

[C++] protected public: virtual bool ProcessKeyMessage (Message* m);

[VB] Overridable Protected Friend Dim Function ProcessKeyMessage(ByRef m As Message) As Boolean

[JScript] package function ProcessKeyMessage(m: Message): Boolean;

Description

Processes a keyboard message.

Return Value: true if the message was processed by the control; otherwise, false.

This method is called when a control receives a keyboard message. The method first checks if the control has a parent, and if so calls the parent's System.Windows.Forms.Control. ProcessKeyMessage(System.Windows.Forms.Message@) method. If the parent's System.Windows.Forms.Control. ProcessKeyMessage(System.Windows.Forms.Message@) method does not process the message then the System.Windows.Forms.Control.ProcessKeyEventArgs(System.Windows.Forms.Message@) method is called to generate the appropriate keyboard events. The m parameter contains the window message that must be processed. Possible values for the System.Windows.Forms.Message.Msg property are WM_CHAR, WM_KEYDOWN, WM_SYSKEYDOWN, WM_KEYUP, and WM_SYSKEYUP. A System.Windows. Forms.Message, passed by reference, that represents the window message to process.

dddddddddddddd) ProcessKeyPreview

[C#] protected virtual bool ProcessKeyPreview(ref Message m);

[C++] protected: virtual bool ProcessKeyPreview(Message* m);

[VB] Overridable Protected Function ProcessKeyPreview (ByRef m As Message) As Boolean

[JScript] protected function ProcessKeyPreview(m: Message): Boolean;

Description

Previews a keyboard message.

Return Value: true if the message was processed by the control; otherwise, false.

This method is called by a child control when the child control receives a keyboard message. The child control calls this method before generating any keyboard events for the message. If this method returns true, the child control considers the message processed and does not generate any keyboard events.

The m parameter contains the window message to preview. Possible values for the System.Windows.Forms.Message. Msg property are WM_CHAR, WM_KEYDOWN, WM_SYSKEYDOWN, WM_KEYUP, and WM_SYSKEYUP. The System.Windows.Forms.Control. ProcessKeyPreview(System.Windows. Forms.Message@) method simply sends the character to the parent's System. Windows. Forms.Control.ProcessKeyPreview(System.Windows. Forms.Message@) method, or returns false if the control has no parent. The System.Windows.Forms.Form class overrides this method to perform actual processing of dialog keys. A System.Windows.Forms.Message, passed by reference, that represents the window message to process.

eeeeeeeeeeeeee) ProcessMnemonic

[C#] protected virtual bool ProcessMnemonic(char charCode);

[C++] protected: virtual bool ProcessMnemonic(_wchar_t charCode);

[VB] Overridable Protected Function ProcessMnemonic(ByVal charCode As Char) As Boolean

[JScript] protected function ProcessMnemonic(charCode: Char): Boolean;

Description

Processes a mnemonic character.

Return Value: true if the character was processed as a mnemonic by the control; otherwise, false.

This method is called to give a control the opportunity to process a mnemonic character. The method should check if the control is in a state to process mnemonics and if the given character represents a mnemonic. If so, the method should perform the action associated with the mnemonic and return true. If not, the method should return false. Implementations of this method often use the System.Windows.Forms.Control. IsMnemonic(System.Char,System.String) method to check if the given character matches a mnemonic in the control's text, for example: if (CanSelect && IsMnemonic(char Code, MyControl.Text) {//perform action associated with mnemonic} This default implementation of the System.Windows.Forms.Control.ProcessMnemonic(System.Char) method simply returns false to indicate that the control has no mnemonic. The character to process.

fffffffffffff) RaiseDragEvent

[C#] protected void RaiseDragEvent(object key, DragEvent Args e);

[C++] protected: void RaiseDragEvent(Object* key, Drag EventArgs* e);

[VB] Protected Sub RaiseDragEvent(ByVal key As Object, ByVal e As DragEventArgs)

[JScript] protected function RaiseDragEvent(key: Object, e: DragEventArgs);

Description

Raises the appropriate drag event. The event to raise. A System.Windows.Forms.DragEventArgs that contains the event data.

ggggggggggggg) RaiseKeyEvent

[C#] protected void RaiseKeyEvent(object key, KeyEvent Args e);

[C++] protected: void RaiseKeyEvent(Object* key, KeyEventArgs* e);

[VB] Protected Sub RaiseKeyEvent(ByVal key As Object, ByVal e As KeyEventArgs)

[JScript] protected function RaiseKeyEvent(key: Object, e: KeyEventArgs);

Description

Raises the appropriate key event. The event to raise. A System.Windows.Forms.KeyEventArgs that contains the event data.

hhhhhhhhhhhhh) RaiseMouseEvent

[C#] protected void RaiseMouseEvent(object key, Mouse EventArgs e);

[C++] protected: void RaiseMouseEvent(Object* key, Mouse EventArgs* e);

[VB] Protected Sub RaiseMouseEvent(ByVal key As Object, ByVal e As MouseEventArgs)

[JScript] protected function RaiseMouseEvent(key: Object, e: MouseEventArgs);

Description

Raises the appropriate mouse event. The event to raise. A System.Windows.Forms.MouseEventArgs that contains the event data.

iiiiiiiiiiiii) RaisePaintEvent

[C#] protected void RaisePaintEvent(object key, PaintEvent Args e);

[C++] protected: void RaisePaintEvent(Object* key, PaintEventArgs* e);

[VB] Protected Sub RaisePaintEvent(ByVal key As Object, ByVal e As PaintEventArgs)

[JScript] protected function RaisePaintEvent(key: Object, e: PaintEventArgs);

Description

Raises the appropriate paint event. The event to raise. A System.Windows.Forms.PaintEventArgs that contains the event data.

jjjjjjjjjjjjj) RecreateHandle

[C#] protected void RecreateHandle( );

[C++] protected: void RecreateHandle( );

[VB] Protected Sub RecreateHandle( )

[JScript] protected function RecreateHandle( );

Description

Forces the re-creation of the handle for the control.

When overriding this method, you must call the base class implementation of this method.

kkkkkkkkkkkkk) RectangleTo Client

[C#] public Rectangle RectangleToClient(Rectangle r);

[C++] public: Rectangle RectangleToClient(Rectangle r);

[VB] Public Function RectangleToClient(ByVal r As Rectangle) As Rectangle

[JScript] public function RectangleToClient(r: Rectangle): Rectangle;

Description

Computes the size and location of the specified screen rectangle to client coordinates.

Return Value: A System.Drawing.Rectangle that represents the converted System.Drawing.Rectangle, r, in client coordinates. The screen coordinate System.Drawing.Rectangle to convert.

lllllllllllll) RectangleToScreen

[C#] public Rectangle RectangleToScreen(Rectangle r);

[C++] public: Rectangle RectangleToScreen(Rectangle r);

[VB] Public Function RectangleToScreen(ByVal r As Rectangle) As Rectangle

[JScript] public function RectangleToScreen(r: Rectangle): Rectangle;

Description

Computes the size and location of the specified client rectangle to screen coordinates.

Return Value: A System.Drawing.Rectangle that represents the converted System.Drawing.Rectangle, p, in screen coordinates. The screen coordinate System.Drawing.Rectangle to convert.

mmmmmmmmmmmmmmm) ReflectMessage

[C#] protected static bool ReflectMessage(IntPtr hWnd, ref Message m);

[C++] protected: static bool ReflectMessage(IntPtr hWnd, Message* m);

[VB] Protected Shared Function ReflectMessage(ByVal hWnd As IntPtr, ByRef m As Message) As Boolean

[JScript] protected static function ReflectMessage(hWnd: IntPtr, m: Message): Boolean;

Description

Reflects the specified message to the control that is bound to the specified handle.

Return Value: true if the message was reflected; otherwise, false. An System.IntPtr representing the handle to reflect the message to. A System.Windows.Forms.Message representing the windows message to reflectWin32 message to reflect nnnnnnnnnnnnn) Refresh

[C#] public virtual void Refresh( );

[C++] public: virtual void Refresh( );

[VB] Overridable Public Sub Refresh( )

[JScript] public function Refresh( );

Description

Forces the control to invalidate its client area and immediately redraw itself and any child controls.

When overriding System.Windows.Forms.Control.Refresh in a derived class, be sure to call the base class's System.Windows.Forms.Control.Refresh method so that control and its child controls are invaludated and redrawn.

oooooooooooooo) ResetBackColor

[C#] public virtual void ResetBackColor( );

[C++] public: virtual void ResetBackColor( );

[VB] Overridable Public Sub ResetBackColor( )

[JScript] public function ResetBackColor( );

Description

Resets the System.Windows.Forms.Control.BackColor property to its default value.

You typically use this method if you are either creating a designer for the System.Windows.Forms.Control or creating your own control incorporating the System.Windows.Forms.Control.

pppppppppppppp) ResetBindings

[C#] public void ResetBindings( );

[C++] public: void ResetBindings( );

[VB] Public Sub ResetBindings( )

[JScript] public function ResetBindings( );

Description

Resets the System.Windows.Forms.Control.DataBindings property to its default value.

You typically use this method if you are either creating a designer for the System.Windows.Forms.Control or creating your own control incorporating the System.Windows.Forms.Control.

qqqqqqqqqqqqqq) ResetCursor( )

[C#] public virtual void ResetCursor( );

[C++] public: virtual void ResetCursor( );

[VB] Overridable Public Sub ResetCursor( )

[JScript] public function ResetCursor( );

Description

Resets the System.Windows.Forms.Control.Cursor property to its default value.

You typically use this method if you are either creating a designer for the System.Windows.Forms.Control or creating your own control incorporating the System.Windows.Forms.Control.

rrrrrrrrrrrrr) ResetFont

[C#] public virtual void ResetFont( );

[C++] public: virtual void ResetFont( );

[VB] Overridable Public Sub ResetFont( )

[JScript] public function ResetFont( );

Description

Resets the System.Windows.Forms.Control.Font property to its default value.

You typically use this method if you are either creating a designer for the System.Windows.Forms.Control or creating your own control incorporating the System.Windows.Forms.Control.

sssssssssssss) ResetForeColor

[C#] public virtual void ResetForeColor( );

[C++] public: virtual void ResetForeColor( );

[VB] Overridable Public Sub ResetForeColor( )

[JScript] public function ResetForeColor( );

Description

Resets the System.Windows.Forms.Control.ForeColor property to its default value.

You typically use this method if you are either creating a designer for the System.Windows.Forms.Control or creating your own control incorporating the System.Windows.Forms.Control.

tttttttttt) ResetImeMode

[C#] public void ResetImeMode( );

[C++] public: void ResetImeMode( );

[VB] Public Sub ResetImeMode( )

[JScript] public function ResetImeMode( );

Description

Resets the System.Windows.Forms.Control.ImeMode property to its default value.

You typically use this method if you are either creating a designer for the System.Windows.Forms.Control or creating your own control incorporating the System.Windows.Forms. Control uuuuuuuuuuuuuu) ResetMouseEventArgs

[C#] protected void ResetMouseEventArgs( );

[C++] protected: void ResetMouseEventArgs( );

[VB] Protected Sub ResetMouseEventArgs( )

[JScript] protected function ResetMouseEventArgs( );

Description

Resets the mouse leave listeners.

vvvvvvvvvvvvvv) ResetRightToLeft

[C++] public: virtual void ResetRightToLeft( );

[VB] Overridable Public Sub ResetRightToLeft( )

[JScript] public function ResetRightToLeft( );

Description

Resets the System.Windows.Forms.Control.RightToLeft property to its default value.

You typically use this method if you are either creating a designer for the System.Windows.Forms.Control or creating your own control incorporating the System.Windows.Forms. Control.

wwwwwwwwwwwwww) ResetText

[C#] public virtual void ResetText( );

[C++] public: virtual void ResetText( );

[VB] Overridable Public Sub ResetText( )

[JScript] public function ResetText( );

Description

Resets the System.Windows.Forms.Control.Text property to its default value.

You typically use this method if you are either creating a designer for the System.Windows.Forms.Control or creating your own control incorporating the System.Windows.Forms. Control.

xxxxxxxxxxxxxx) Resume Layout

[C#] public void ResumeLayout( );

[C++] public: void ResumeLayout( );

[VB] Public Sub ResumeLayout( )

[JScript] public function ResumeLayout( ); Resumes normal layout logic.

Description

Resumes normal layout logic.

Calling the System.Windows.Forms.Control.ResumeLayout method forces an immediate layout if there are any pending layout requests.

yyyyyyyyyyyyyy) ResumeLayout

[C#] public void ResumeLayout(bool performLayout);

[C++] public: void ResumeLayout(bool performLayout);

[VB] Public Sub ResumeLayout(ByVal performLayout As Boolean)

[JScript] public function ResumeLayout(performLayout: Boolean);

Description

Resumes normal layout logic. Optionally forces an immediate layout of pending layout requests.

Calling the System.Windows.Forms.Control.ResumeLayout method forces an immediate layout if there are any pending layout requests. When the performLayout parameter is set to true, an immediate layout occurs if there are any pending layout requests. true to execute pending layout requests; otherwise, false.

zzzzzzzzzzzzzz) RtlTranslateAlignment

[C#] protected ContentAlignment RtlTranslateAlignment (ContentAlignment align);

[C++] protected: ContentAlignment RtlTranslateAlignment (ContentAlignment align);

[VB] Protected Function RtlTranslateAlignment(ByVal align As ContentAlignment) As ContentAlignment

[JScript] protected function RtlTranslateAlignment(align: ContentAlignment): ContentAlignment;

Description

Converts the specified System.Drawing.ContentAlignment to the appropriate System.Drawing.ContentAlignment to support right to left text.

Return Value: One of the System.Drawing.ContentAlignment values. One of the System.Drawing.ContentAlignment values.

aaaaaaaaaaaaaa) RtlTranslateAlignment

[C#] protected HorizontalAlignment RtlTranslateAlignment (HorizontalAlignment align);

[C++] protected: HorizontalAlignment

RtlTranslateAlignment(HorizontalAlignment align);

[VB] Protected Function RtlTranslateAlignment(ByVal align As HorizontalAlignment) As HorizontalAlignment

[JScript] protected function RtlTranslateAlignment(align: HorizontalAlignment): HorizontalAlignment; Converts the current alignment to the appropriate alignment to support right to left text.

Description

Converts the specified System.Windows.Forms.Horizontal Alignment to the appropriate System.Windows.Forms.HorizontalAlignment to support right to left text.

Return Value: One of the System.Windows.Forms.HorizontalAlignment values. One of the System.Windows.Forms. HorizontalAlignment values.

bbbbbbbbbbbbbb) RtlTranslateAlignment

[C#] protected LeftRightAlignment RtlTranslateAlignment (LeftRightAlignment align);

[C++] protected: LeftRightAlignment RtlTranslateAlignment(LeftRightAlignment align);

[VB] Protected Function RtlTranslateAlignment(ByVal align As LeftRightAlignment) As LeftRightAlignment

[JScript] protected function RtlTranslateAlignment(align: LeftRightAlignment):LeftRightAlignment;

Description

Converts the specified System.Windows.Forms.LeftRightAlignment to the appropriate System.Windows. Forms.LeftRightAlignment to support right to left text.

Return Value: One of the System.Windows.Forms.LeftRightAlignment values. One of the System.Windows.Forms.LeftRightAlignment values.

ccccccccccccccc) RtlTranslateContent

[C#] protected ContentAlignment RtlTranslateContent(ContentAlignment align);

[C++] protected: ContentAlignment RtlTranslateContent (ContentAlignment align);

[VB] Protected Function RtlTranslateContent(ByVal align As ContentAlignment) As ContentAlignment

[JScript] protected function RtlTranslateContent(align: ContentAlignment): ContentAlignment;

Description

Converts the specified System.Drawing.ContentAlignment to the appropriate System.Drawing.ContentAlignment to support right to left text.

Return Value: One of the System.Drawing.ContentAlignment values. One of the System.Drawing.ContentAlignment values.

ddddddddddddddd) RtlTranslateHorizontal

[C#] protected HorizontalAlignment RtlTranslateHorizontal (HorizontalAlignment align);

[C++] protected: HorizontalAlignment RtlTranslateHorizontal(HorizontalAlignment align);

[VB] Protected Function RtlTranslateHorizontal(ByVal align As HorizontalAlignment) As HorizontalAlignment

[JScript] protected function RtlTranslateHorizontal(align: HorizontalAlignment): HorizontalAlignment;

Description

Converts the specified System.Windows.Forms.HorizontaIAlignment to the appropriate System.Windows.Forms.HorizontaIAlignment to support right to left text.

Return Value: One of the System.Windows.Forms.HorizontalAlignment values. One of the System.Windows.Forms.HorizontaIAlignment values.

eeeeeeeeeeeeeee) RtlTranslateLeftRight

[C#] protected LeftRightAlignment RtlTranslateLeftRight (LeftRightAlignment align);

[C++] protected: LeftRightAlignment RtlTranslateLeftRight (LeftRightAlignment align);

[VB] Protected Function RtlTranslateLeftRight(ByVal align As LeftRightAlignment) As LeftRightAlignment

[JScript] protected function RtlTranslateLeftRight(align: LeftRightAlignment): LeftRightAlignment;

Description

Converts the specified System.Windows.Forms.LeftRightAlignment to the appropriate System.Windows.Forms.LeftRightAlignment to support right to left text.

Return Value: One of the System.Windows.Forms.LeftRightAlignment values. One of the System.Windows.Forms.LeftRightAlignment values.

fffffffffffffff) Scale

[C#] public void Scale(float ratio);

[C++] public: void Scale(float ratio);

[VB] Public Sub Scale(ByVal ratio As Single)

[JScript] public function Scale(ratio: float); Scales the entire control and any child controls.

Description

Scales the entire control and any child controls to the specified ratio horizontally and vertically. The ratio by which to scale the control horizontally and vertically.

ggggggggggggggg) Scale

[C#] public void Scale(float dx, float dy);

[C++] public: void Scale(float dx, float dy);

[VB] Public Sub Scale(ByVal dx As Single, ByVal dy As Single)

[JScript] public function Scale(dx: float, dy: float);

Description

Scales the control and any child controls to the specified horizontal ratio and vertical ratio. The ratio by which to scale the control horizontally. The ratio by which to scale the control vertically.

hhhhhhhhhhhhhhh) ScaleCore

[C#] protected virtual void ScaleCore(float dx, float dy);

[C++] protected: virtual void ScaleCore(float dx, float dy);

[VB] Overridable Protected Sub ScaleCore(ByVal dx As Single, ByVal dy As Single)

[JScript] protected function ScaleCore(dx: float, dy: float);

Description

Performs the work of scaling the entire control and any child controls. Ratio to scale the control horizontally. Ratio to scale the control vertically.

iiiiiiiiiiiiiii) Select

[C#] public void Select( );

[C++] public: void Select( );

[VB] Public Sub Select( )

[JScript] public function Select( ); Activates a control.

Description

Activates this control.

The System.Windows.Forms.Control.Select method activates the control if the control has the System.Windows.Forms.ControlStyles.Selectable style bit set to true, is contained in another control, and all of its parent controls are both visible and enabled.

jjjjjjjjjjjjjjj) Select

[C#] protected virtual void Select(bool directed, bool forward);

[C++] protected: virtual void Select(bool directed, bool forward);

[VB] Overridable Protected Sub Select(ByVal directed As Boolean, ByVal forward As Boolean)[JScript] protected function Select(directed: Boolean, forward: Boolean);

Description

Activates a child control. Optionally specifies the direction in the tab order to select the control from.

The directed and forward parameters are used by container-style controls. When the directed parameter is set to true, the forward parameter is evaluated to determine which control to select. When forward is set to true the next control in the tab order is selected, when false, the previous control in the tab order is selected. true to specify the direction of the control to select; otherwise, false. true to select the next control forward in the tab order; otherwise, false.

kkkkkkkkkkkkkkk) SelectNextControl

[C#] public bool SelectNextControl(Control ctl, bool forward, bool tabStopOnly, bool nested, bool wrap);

[C++] public: bool SelectNextControl(Control* ctl, bool forward, bool tabStopOnly, bool nested, bool wrap);

[VB] Public Function SelectNextControl(ByVal ctl As Control, ByVal forward As Boolean, ByVal tabStopOnly As Boolean, ByVal nested As Boolean, ByVal wrap As Boolean) As Boolean

[JScript] public function SelectNextControl(ctl: Control, forward: Boolean, tabStopOnly: Boolean, nested: Boolean, wrap: Boolean): Boolean;

Description

Activates the next control.

Return Value: true if a control was activated; otherwise, false.

This activates the control if the control has System.Windows.Forms.ControlStyles.Selectable set to true, is contained in another control, and all of its parent controls are both visible and enabled. Examples of controls that are not selectable are System.Windows.Forms.Label, System.Windows.Forms.Panel, System.Windows.Forms.PictureBox, and System.Windows.Forms.GroupBox. The System.Windows.Forms.Control where to start the search. true to select the next control forward in the tab order; otherwise, false. true to ignore the controls with the System.Windows.Forms.Control.TabStopproperty set to false; otherwise, false. true to include nested (children of child controls) child controls; otherwise, false. true to start searching from the first control in the tab order after the last control has been reached; otherwise, false lllllllllllllll) SendToBack

[C#] public void SendToBack( );

[C++] public: void SendToBack( );

[VB] Public Sub SendToBack( )

[JScript] public function SendToBack( );

Description

Sends the control to the back of the z-order.

The control is moved to the bottom of the z-order. If the control is a child of another control, the child control is moved to the bottom of the z-order.

mmmmmmmmmmmmmmm) SetBounds

[C#] public void SetBounds(int x, int y, int width, int height);

[C++] public: void SetBounds(int x, int y, int width, int height);

[VB] Public Sub SetBounds(ByVal x As Integer, ByVal y As Integer, ByVal width As Integer, ByVal height As Integer)

[JScript] public function SetBounds(x: int, y: int, width: int, height: int); Sets the bounds of the control.

Description

Sets the bounds of the control to the specified location and size. The new System.Windows.Forms.Control.Left property value of the control. The new System.Windows.Forms.Control.Right property value of the control. The new System.Windows.Forms.Control.Width property value of the control. The new System.Windows.Forms.Control.Height property value of the control.

nnnnnnnnnnnnnnn) SetBounds

[C#] public void SetBounds(int x, int y, int width, int height, BoundsSpecified specified);

[C++] public: void SetBounds(int x, int y, int width, int height, BoundsSpecified specified);

[VB] Public Sub SetBounds(ByVal x As Integer, ByVal y As Integer, ByVal width As Integer, ByVal height As Integer, ByVal specified As BoundsSpecified)

[JScript] public function SetBounds(x: int, y: int, width: int, height: int, specified: BoundsSpecified);

Description

Sets the specified bounds of the control to the specified location and size. The new System.Windows.Forms.Control.Left property value of the control. The new System.Windows.Forms.Control.Right property value of the control. The new System.Windows.Forms.Control.Width property value of the control. The new System.Windows.Forms.Control.Height property value of the control. A bitwise combination of the System.Windows.Forms.BoundsSpecified values. For any parameter not specified, the current value will be used.

ooooooooooooooo) SetBoundsCore

[C#] protected virtual void SetBoundsCore(int x, int y, int width, int height, BoundsSpecified specified);

[C++] protected: virtual void SetBoundsCore(int x, int y, int width, int height, BoundsSpecified specified);

[VB] Overridable Protected Sub SetBoundsCore(ByVal x As Integer, ByVal y As Integer, ByVal width As Integer, ByVal height As Integer, ByVal specified As BoundsSpecified)

[JScript] protected function SetBoundsCore(x: int, y: int, width: int, height: int, specified BoundsSpecified);

Description

Performs the work of setting the specified bounds of this control.

Typically, the parameters that correspond to the bounds not included in the specified parameter are passed in with their current values. For example, the System.Windows.Forms.Control.Height, System.Windows.Forms.Control.Width, or the System.Drawing.Point.X or System.Drawing.Point.Y properties of the System.Windows.Forms.Control.Location property can be passed in with a reference to the current instance of the control. The new System.Windows.Forms.Control.Left property value of the control. The new System.Windows.Forms.Control.Right property value of the control. The new System.Windows.Forms.Control.Width property value of the control. The new System.Windows.Forms.Control.Height property value of the control. A bitwise combination of the System.Windows.Forms.BoundsSpecified values.

ppppppppppppppp) SetClientSizeCore

[C#] protected virtual void SetClientSizeCore(int x, int y);

[C++] protected: virtual void SetClientSizeCore(int x, int y);

[VB] Overridable Protected Sub SetClientSizeCore(ByVal x As Integer, ByVal y As Integer)

[JScript] protected function SetClientSizeCore(x: int, y: int);

Description

Sets the size of the client area of the control.

The client area starts at (0, 0) location and extends to the (x, y) location. The client area width, in pixels. The client area height, in pixels.

qqqqqqqqqqqqqqq) SetStyle

[C#] protected void SetStyle(ControlStyles flag, bool value);

[C++] protected: void SetStyle(ControlStyles flag, bool value);

[VB] Protected Sub SetStyle(ByVal flag As ControlStyles, ByVal value As Boolean)

[JScript] protected function SetStyle(flag: ControlStyles, value: Boolean);

Description

Sets the specified style bit to the specified value.

Control style bit flags are used to categorize supported behavior. A control can enable a style by calling the System.Windows.Forms.Control.SetStyle(System.Windows.Forms.ControlStyles,System.Boolean) method and passing in the appropriate System.Windows.Forms.ControlStyles bit and the boolean value set the bit to. To determine the value assigned to a specified System.Windows.Forms.ControlStyles bit, use the System.Windows.Forms.Control.GetStyle (System.Windows.Forms.ControlStyles) method and pass in the System.Windows.Forms.ControlStyles member to evaluate. The System.Windows.Forms.ControlStyles bit to set. true to apply the specified style to the control; otherwise, false.

rrrrrrrrrrrrrr) SetTopLevel

[C#] protected void SetTopLevel(bool value);

[C++] protected: void SetTopLevel(bool value);

[VB] Protected Sub SetTopLevel(ByVal value As Boolean)

[JScript] protected function SetTopLevel(value: Boolean);

Description

Sets the control as the top-level control. true to set the control as the top-level control; otherwise, false.

sssssssssssssss) SetVisibleCore

[C#] protected virtual void SetVisibleCore(bool value);

[C++] protected: virtual void SetVisibleCore(bool value);

[VB] Overridable Protected Sub SetVisibleCore(ByVal value As Boolean)

[JScript] protected function SetVisibleCore(value: Boolean);

Description

Sets the control to the specified visible state. true to make the control visible; otherwise, false.

tttttttttttttt) Show

[C#] public void Show( );

[C++] public: void Show( );

[VB] Public Sub Show( )

[JScript] public function Show( );

Description

Displays the control to the user.

Showing the control is equal to setting the System.Windows.Forms.Control.Visible property to true. After the System.Windows.Forms.Control.Show method is called the System.Windows.Forms.Control.Visible property returns a value of true until the System.Windows.Forms.Control.Hide method is called.

uuuuuuuuuuuuuuu) SuspendLayout

[C#] public void SuspendLayout( );

[C++] public: void SuspendLayout( );

[VB] Public Sub SuspendLayout( )

[JScript] public function SuspendLayout( );

Description

Temporarily suspends the layout logic for the control.

The layout logic of the control is suspended until a call the System.Windows.Forms.Control.ResumeLayout method is called.

vvvvvvvvvvvvvvv) UnsafeNativeMethods.IOleControl.FreezeEvents

[C#] int UnsafeNativeMethods.IOleControl.FreezeEvents (int bFreeze);

[C++] int UnsafeNativeMethods.IOeControl::FreezeEvents (int bFreeze);

[VB] Function IOleControl.FreezeEvents(ByVal bFreeze As Integer) As Integer Implements UnsafeNativeMethods.IOleControl.FreezeEvents

[JScript] function UnsafeNativeMethods.IOleControl.FreezeEvents(bFreeze: int): int;

wwwwwwwwwwwwwww) UnsafeNativeMethods.IOleControl.GetControlInfo

[C#] int UnsafeNativeMethods.IOleControl.GetControlInfo (NativeMethods.tagCONTROL INFO pCI);

[C++] int UnsafeNativeMethods::IOleControl::GetControlInfo(NativeMethods.tagCONTROLINFO* pCI);

[VB] Function IOleControl.GetControlInfo(ByVal pCI As NativeMethods.tagCONTROLINFO) As Integer Implements UnsafeNativeMethods.IOleControl.GetControlInfo

[JScript] function UnsafeNativeMethods.IOleControl.GetControlInfo(pCI NativeMethods.tagCONTROLINFO): int;

xxxxxxxxxxxxxxx) UnsafeNativeMethods.IOleControl.OnAmbientPropertyChange

[C#] int UnsafeNativeMethods.IOleControl.OnAmbientPropertyChange(int dispID);

[C++] int UnsafeNativeMethods::IOleControl::OnAmbientPropertyChange(int dispID);

[VB] Function IOleControl.OnAmbientPropertyChange (ByVal dispID As Integer) As Integer Implements UnsafeNativeMethods.IOleControl.OnAmbientPropertyChange

[JScript] function UnsafeNativeMethods.IOleControl.OnAmbientPropertyChange(dispID: int): int;

yyyyyyyyyyyyyyy) UnsafeNativeMethods.IOleControl.OnMnemonic

[C#] int UnsafeNativeMethods.IOleControl.OnMnemonic (ref NativeMethods.MSG pMsg);

[C++] int UnsafeNativeMethods::IOleControl::OnMnemonic(NativeMethods.MSG* pMsg);

[VB] Function IOleControl.OnMnemonic(ByRef pMsg As NativeMethods.MSG) As Integer Implements UnsafeNativeMethods.IOleControl.OnMnemonic

[JScript] function UnsafeNativeMethods.IOleControl.OnMnemonic(pMsg: NativeMethods.MSG): int;

zzzzzzzzzzzzzzz) UnsafeNativeMethods.IOleInPlaceActiveObject.ContextSensitive Help

[C#] void UnsafeNativeMethods.IOleInPlace ActiveObject. ContextSensitiveHelp(int fEnterMode);

[C++] void UnsafeNativeMethods::IOleInPlaceActiveObject::ContextSensitiveHelp(int fEnterMode);

[VB] Sub IOleInPlaceActiveObject.ContextSensitiveHelp (ByVal fEnterMode As Integer) ImplementsUnsafeNativeMethods.IOleInPlaceActive Object.ContextSensitiveHelp

[JScript] function UnsafeNativeMethods.IOleInPlace Active Object.ContextSensitiveHelp(fEnterMode: int);

aaaaaaaaaaaaaaaa) UnsafeNativeMethods.IOleInPlace ActiveObject.EnableModeless

[C#] void UnsafeNativeMethods.IOleInPlace ActiveObject. EnableModeless(int fEnable);

[C++] void UnsafeNativeMethods::IOleInPlaceActiveObject::EnableModeless(int fEnable);

[VB] Sub IOleInPlaceActiveObject.EnableModeless(ByVal fEnable As Integer) Implements UnsafeNativeMethods.IOleInPlaceActiveObject.EnableModeless

[JScript] function UnsafeNativeMethods.IOleInPlace Active Object.EnableModeless(fEnable: int);

bbbbbbbbbbbbbbbb) UnsafeNativeMethods.IOleInPlace ActiveObject.Get Window

[C#] int UnsafeNativeMethods.IOleInPlace ActiveObject-.GetWindow(out IntPtr hwnd);

[C++] int UnsafeNativeMethods::IOleInPlaceActiveObject:: GetWindow(IntPtr* hwnd);

[VB] Function IOleInPlaceActiveObject.GetWindow(ByRef hwnd As IntPtr) As Integer Implements UnsafeNativeMethods.IOleInPlaceActiveObject.GetWindow

[JScript] function UnsafeNativeMethods.IOleInPlace Active Object.GetWindow(hwnd: IntPtr): int;

cccccccccccccccc) UnsafeNativeMethods.IOleInPlace ActiveObject.OnDocWindowActivate

[C#] void UnsafeNativeMethods.IOleInPlace ActiveObject. OnDocWindowActivate(int fActivate);

[C++] void UnsafeNativeMethods::IOleInPlaceActiveObject::OnDocWindowActivate(int fActivate);

[VB] Sub IOleInPlaceActiveObject.OnDocWindowActivate (ByVal fActivate As Integer) ImplementsUnsafeNativeMethods.IOleInPlaceActive Object.OnDocWindowActivate

[JScript] function UnsafeNativeMethods.IOleInPlace Active Object.OnDocWindowActivate(fActivate: int);

dddddddddddddddd) UnsafeNativeMethods.IOleInPlace ActiveObject. OnFrame WindowActivate

[C#] void UnsafeNativeMethods.IOleInPlace ActiveObject. OnFrameWindowActivate(int fActivate);

[C++] void UnsafeNativeMethods::IOleInPlaceActiveObject::OnFrameWindowActivate(int fActivate);

[VB] Sub IOleInPlaceActiveObject.OnFrameWindowActivate(ByVal fActivateAs Integer) Implements UnsafeNativeMethods.IOleInPlace ActiveObject.OnFrameWindowActivate

[JScript] function UnsafeNativeMethods.IOleInPlace Active Object.OnFrameWindowActivate(fActivate: int);

eeeeeeeeeeeeeeee) UnsafeNativeMethods.IOleInPlace ActiveObject.ResizeBorder

[C#] void UnsafeNativeMethods.IOleInPlace ActiveObject. ResizeBorder(NativeMethods.CO MRECT prcBorder, UnsafeNativeMethods.IOleInPlaceUIWindow pUIWindow, int fFrameWindow);

[C++] void UnsafeNativeMethods::IOleInPlaceActiveObject::ResizeBorder(NativeMethods.COMRECT* prcBorder, UnsafeNativeMethods.IOleInPlaceUIWindow* pUIWindow, int frameWindow);

[VB] Sub IOleInPlaceActiveObject.ResizeBorder(ByVal prcBorder As NativeMethods.COMRECT, ByVal pUIWindow As UnsafeNativeMethods.IOleInPlaceUIWindow, ByVal fFrameWindow As Integer) Implements UnsafeNativeMethods.IOleInPlaceActiveObject.ResizeBorder

[JScript] function UnsafeNativeMethods.IOleInPlace Active Object.ResizeBorder(prcBorder NativeMethods. COMRECT, pUIWindow UnsafeNativeMethods.OleInPlace UIWindow, fFrameWindow: int);

ffffffffffffffff) UnsafeNativeMethods.IOleInPlace Active Object.TranslateAccelerator

[C#] int UnsafeNativeMethods.IOleInPlace ActiveObject. TranslateAccelerator(ref NativeMethods.MSG lpmsg);

[C++] int UnsafeNativeMethods::IOleInPlaceActiveObject:: TranslateAccelerator(NativeMethods.MSG* lpmsg);

[VB] Function IOleInPlaceActiveObject.TranslateAccelerator(ByRef lpmsg As NativeMethods.MSG) As Integer Implements UnsafeNativeMethods.IOleInPlace Active Object.TranslateAccelerator

[JScript] function UnsafeNativeMethods.IOleInPlace Active Object.TranslateAccelerator(lpmsg NativeMethods.MSG): int;

gggggggggggggggg) UnsafeNativeMethods.IOleInPlace Object. ContextSensitive Help

[C#] void UnsafeNativeMethods.IOleInPlace Object.ContextSensitiveHelp(int fEnterMode);

[C++] void UnsafeNativeMethods::IOleInPlaceObject::ContextSensitiveHelp(int fEnterMode);

[VB] Sub IOleInPlaceObject.ContextSensitiveHelp(ByVal fEnterMode As Integer) Implements UnsafeNativeMethods. IOleInPlaceObject.ContextSensitiveHelp

[JScript] function UnsafeNativeMethods.IOleInPlace Object.ContextSensitiveHelp(fEnterMode: int);

hhhhhhhhhhhhhhhh) UnsafeNativeMethods.IOleInPlace Object.Get Window

[C#] int UnsafeNativeMethods.IOleInPlace Object.GetWindow(out IntPtr hwnd);

[C++] int UnsafeNativeMethods::IOleInPlaceObject:: GetWindow(IntPtr* hwnd);

[VB] Function IOleInPlaceObject.GetWindow(ByRef hwnd As IntPtr) As Integer Implements UnsafeNativeMethods.IOleInPlaceObject.GetWindow

[JScript] function UnsafeNativeMethods.IOleInPlace Object.GetWindow(hwnd IntPtr): int;

iiiiiiiiiiiiiii) UnsafeNativeMethods.IOleInPlace Object. InPlaceDeactivate

[C#] void UnsafeNativeMethods.IOleInPlace Object.InPlaceDeactivate( );

[C++] void UnsafeNativeMethods::IOleInPlaceObject::InPlaceDeactivate( );

[VB] Sub IOleInPlaceObject.InPlaceDeactivate( ) Implements UnsafeNativeMethods.IOleInPlace Object.InPlaceDeactivate

[JScript] function UnsafeNativeMethods.IOleInPlace Object.InPlaceDeactivate( );

jjjjjjjjjjjjjjjj) UnsafeNativeMethods.IOleInPlace Object. ReactivateAndUndo

[C#] void UnsafeNativeMethods.IOleInPlace Object.ReactivateAndUndo( );

[C++] void UnsafeNativeMethods::IOleInPlaceObject::ReactivateAndUndo( );

[VB] Sub IOleInPlaceObject.ReactivateAndUndo( ) Implements UnsafeNativeMethods.IOleInPlace Object. ReactivateAndUndo

[JScript] function UnsafeNativeMethods.IOleInPlaceObject.Reactivate AndUndo( );

kkkkkkkkkkkkkkkk) UnsafeNativeMethods.IOleInPlace Object.Set ObjectRects

[C#] void UnsafeNativeMethods.IOleInPlaceObject. SetObjectRects(NativeMethods.COMRECT lprcPosRect, NativeMethods.COMRECT lprcClipRect);

[C++] void UnsafeNativeMethods::IOleInPlaceObject::Set ObjectRects(NativeMethods.COMRECT* lprcPosRect, NativeMethods.COMRECT* lprcClipRect);

[VB] Sub IOleInPlaceObject.SetObjectRects(ByVal lprcPosRect As NativeMethods.COMRECT, ByVal lprcClipRect As NativeMethods.COMRECT) Implements UnsafeNativeMethods.IOleInPlaceObject.SetObjectRects

[JScript] function UnsafeNativeMethods.IOleInPlace Object.SetObjectRects(lprcPosRect NativeMethods. COMRECT, lprcClipRect: NativeMethods.COMRECT);

llllllllllllllll) UnsafeNativeMethods.IOleInPlaceObject UIDeactivate

[C#] int UnsafeNativeMethods.IOleInPlaceObject. UIDeactivate( );

[C++] int UnsafeNativeMethods::IOleInPlaceObject::UIDeactivate( );

[VB] Function IOleInPlaceObject.UIDeactivate( ) As Integer Implements UnsafeNativeMethods.IOleInPlaceObject. UIDeactivate

[JScript] function UnsafeNativeMethods.IOleInPlaceObject. UIDeactivate( ): int;

mmmmmmmmmmmmmmmmm) Unsafe NativeMethods. IOleObject.Advise

[C#] int UnsafeNativeMethods.IOleObject.Advise(UnsafeNativeMethods.IAdviseSink pAdvSink, out int cookie);

[C++] int UnsafeNativeMethods::IOleObject::Advise(UnsafeNativeMethods.IAdviseSink* pAdvSink, int* cookie);

[VB] Function IOleObject.Advise(ByVal pAdvSink As UnsafeNativeMethods.IAdviseSink, ByRef cookie As Integer) As Integer Implements UnsafeNativeMethods.IOleObject.Advise

[JScript] function UnsafeNativeMethods.IOleObject.Advise (pAdvSink: UnsafeNativeMethods.IAdviseSink, cookie: int): int;

nnnnnnnnnnnnnnnn) UnsafeNativeMethods.IOleObject. Close

[C#] int UnsafeNativeMethods.IOleObject.Close(int dwSave Option);

[C++] int UnsafeNativeMethods::IOleObject::Close(int dwSaveOption);

[VB] Function IOleObject.Close(ByVal dwSaveOption As Integer) As Integer Implements UnsafeNativeMethods.IOle Object.Close

[JScript] function UnsafeNativeMethods.IOleObject.Close (dwSaveOption: int): int;

oooooooooooooooo) UnsafreNativeMethods.IOleObject.DoVerb

[C#] int UnsafeNativeMethods.IOleObject.DoVerb(int iVerb, IntPtr lpmsg, UnsafeNativeMethods.IOleClientSite pActiveSite, int lindex, IntPtr hwndparent, NativeMethods. COMRECT lprcPosRect);

[C++] int UnsafeNativeMethods::IOleObject::DoVerb(int iVerb, IntPtr lpmsg, UnsafeNativeMethods.IOleClientSite* pActiveSite, int lindex, IntPtr hwndparent, NativeMethods. COMRECT* lprcPosRect);

[VB] Function IOleObject.DoVerb(ByVal iVerb As Integer, ByVal lpmsg As IntPtr, ByVal pActiveSite As UnsafeNativeMethods.IOleClientSite, ByVal lindex As Integer, ByVal hwndParent As IntPtr, ByVal lprcPosRect As NativeMethods. COMRECT) As Integer Implements UnsafeNativeMethods. IOleObject.DoVerb

[JScript] function UnsafeNativeMethods.IOleObject.DoVerb(iVerb: int, lpmsg IntPtr, pActiveSite: UnsafeNativeMethods.IOleClientSite, lindex: int, hwndParent: IntPtr, lprcPosRect: NativeMethods.COMRECT): int;

pppppppppppppppp) UnsafeNativeMethods.IOleObject.EnumAdvise

[C#] int UnsafeNativeMethods.IOleObject.EnumAdvise(out UnsafeNativeMethods.IEnumSTATDATAu e);

[C++] int UnsafeNativeMethods::IOleObject::EnumAdvise (UnsafeNativeMethods.IEnumSTATDATA** e);

[VB] Function IOleObject.EnumAdvise(ByRef e As UnsafeNativeMethods.IEnumSTATDATA) As Integer Implements UnsafeNativeMethods.IOleObject.EnumAdvise

[JScript] function UnsafeNativeMethods.IOleObject.EnumAdvise(e: UnsafeNativeMethods.IEnumSTATDATA): int;

qqqqqqqqqqqqqqqq) UnsafeNativeMethods.IOleObject.Enum Verbs

[C#] int UnsafeNativeMethods.IOleObject.EnumVerbs(out UnsafeNativeMethods.IEnumOLEVERB e);

[C++] int UnsafeNativeMethods::IOleObject::EnumVerbs (UnsafeNativeMethods.lEnumOLEVERB** e);

[VB] Function IOleObject.EnumVerbs(ByRef e As UnsafeNativeMethods.IEnumOLEVERB) As Integer Implements UnsafeNativeMethods.IOleObject.EnumVerbs

[JScript] function UnsafeNativeMethods.IOleObject.EnumVerbs(e: UnsafeNativeMethods.IEnumOLEVERB): int;

rrrrrrrrrrrrrrr) UnsafeNativeMethods.IOleObject.GetClientSite

[C#] int UnsafeNativeMethods.IOleObject.GetClientSite (out UnsafeNativeMethods.IOleClientSite site);

[C++] int UnsafeNativeMethods::IOleObject::GetClientSite (UnsafeNativeMethods.IOleClientSite** site);

[VB] Function IOleObject.GetClientSite(ByRef site As UnsafeNativeMethods.IOleClientSite) As Integer Implements UnsafeNativeMethods.IOleObject.GetClientSite

[JScript] function UnsafeNativeMethods.IOleObject.GetClientSite(site: UnsafeNativeMethods.IOleClient Site): int;

sssssssssssssss) UnsafeNativeMethods.IOleObject.GetClipboardData

[C#] int UnsafeNativeMethods.IOleObject.GetClipboardData(int dwReserved, out UnsafeNativeMethods.IOleDataObject data);

[C++] int UnsafeNativeMethods::IOleObject::GetClipboardData(int dwReserved, UnsafeNativeMethods.IOleDataObject** data);

[VB] Function IOleObject.GetClipboardData(ByVal dwReserved As Integer, ByRef data As UnsafeNativeMethods.IOleDataObject) As Integer Implements UnsafeNativeMethods.IOleObject.GetClipboardData

[JScript] function UnsafeNativeMethods.IOleObject.GetClipboardData(dwReserved: int, data: UnsafeNativeMethods.IOleDataObject): int;

ttttttttttttttt) UnsafeNativeMethods.IOleObject.GetExtent

[C#] int UnsafeNativeMethods.IOleObject.GetExtent(int dwDrawAspect, NativeMethods.tagSIZEL pSizel);

[C++] int UnsafeNativeMethods::IOleObject::GetExtent(int dwDrawAspect, NativeMethods.tagSIZEL* pSizel);

[VB] Function IOleObject.GetExtent(ByVal dwDrawAspect As Integer, ByVal pSizel As NativeMethods.tagSIZEL) As Integer Implements UnsafeNativeMethods.IOleObject.GetExtent

[JScript] function UnsafeNativeMethods.IOleObject.GetExtent(dwDrawAspect: int, pSizel: NativeMethods.tagSIZEL): it;

uuuuuuuuuuuuuuu) UnsafeNativeMethods.IOleObject.GetMiscStatus

[C#] int UnsafeNativeMethods.IOleObject.GetMiscStatus (int dwAspect, out int cookie);

[C++] int UnsafeNativeMethods::IOeObject.GetMiscStatus (int dwAspect, int* cookie);

[VB] Function IOleObject.Get MiscStatus(ByVal dwAspect As Integer, ByRef cookie As Integer) As Integer Implements UnsafeNativeMethods.IOleObject.GetMiscStatus

[JScript] function UnsafeNativeMethods.IOleObject.GetMiscStatus(dwAspect: int, cookie: int): int;

vvvvvvvvvvvvvvv) UnsafeNativeMethods.IOleObject.GetMoniker

[C#] int UnsafeNativeMethods.IOleObject.GetMoniker(int dwAssign, int dwWhichMoniker, out object moniker);

[C++] int UnsafeNativeMethods::IOleObject::GetMoniker (int dwAssign, int dwWhichMoniker, Object** moniker);

[VB] Function IOleObject.GetMoniker(ByVal dwAssign As Integer, ByVal dwWhichMoniker As Integer, ByRef moniker As Object) As Integer Implements UnsafeNativeMethods.IOleObject.GetMoniker

[JScript] function UnsafeNativeMethods.IOleObject.GetMoniker(dwAssign: int, dwWhichMoniker: int, moniker: Object): int;

wwwwwwwwwwwwwww) UnsafeNativeMethods.IOle Object.GetUserClassID

[C#] int UnsafeNativeMethods.IOleObject.GetUserClassID (ref Guid pClsid);

[C++] int UnsafeNativeMethods::IOleObject::GetUserClassID(Guid* pClsid);

[VB] Function IOleObject.GetUserClassID(ByRef pClsid As Guid) As Integer Implements UnsafeNativeMethods.IOle Object.GetUserClassID

[JScript] function UnsafeNativeMethods.IOleObject.GetUserClassID(pClsid: Guid): int;

xxxxxxxxxxxxxxx) UnsafeNativeMethods.IOleObject.GetUserType

[C#] int UnsafeNativeMethods.IOleObject.GetUserType(int dwFormOfType, out string userType);

[C++] int UnsafeNativeMethods::IOleObject::GetUserType (int dwFormOfType, String** userType);

[VB] Function IOleObject.GetUserType(ByVal dwForm OfType As Integer, ByRef userType As String) As Integer Implements UnsafeNativeMethods.IOleObject.Get UserType

[JScript] function UnsafeNativeMethods.IOleObject.GetUserType(dwFormOfType: int, userType: String): int;

yyyyyyyyyyyyyyy) UnsafeNativeMethods.IOleObject.InitFromData

[C#] int UnsafeNativeMethods.IOleObject.InitFromData (UnsafeNativeMethods.IOleData Object pDataObject, int fCreation, int dwReserved);

[C++] int UnsafeNativeMethods::IOleObject::InitFromData (UnsafeNativeMethods.IOleDataObject* pDataObject, int fCreation, int dwReserved);

[VB] Function IOleObject.InitFromData(ByVal pDataObject As UnsafeNativeMethods.IOleDataObject, ByVal fCreation As Integer, ByVal dwReserved As Integer) As Integer Implements UnsafeNativeMethods.IOleObject.Init FromData

[JScript] function UnsafeNativeMethods.IOleObject. InitFromData(pDataObject: UnsafeNativeMethods.IOleDataObject, fCreation: int, dwReserved: int): int;

zzzzzzzzzzzzzzz) UnsafeNativeMethods.IOleObject.IsUpToDate

[C#] int UnsafeNativeMethods.IOleObject.IsUpToDate( );

[C++] int UnsafeNativeMethods::IOleObject::IsUpTo Date( );

[VB] Function IOleObject.IsUpToDate( ) As Integer Implements UnsafeNativeMethods.IOleObject.IsUpToDate

[JScript] function UnsafeNativeMethods.IOleObject. IsUpToDate( ): int;

aaaaaaaaaaaaaaaaa) UnsafeNativeMethods.IOleObject.OleUpdate

[C#] int UnsafeNativeMethods.IOleObject.OleUpdate( );

[C++] int UnsafeNativeMethods::IOleObject::OleUpdate( );

[VB] Function IOleObject.OleUpdate( ) As Integer Implements UnsafeNativeMethods.IOleObject.OleUpdate

[JScript] function UnsafeNativeMethods.IOleObject. OleUpdate( ): int;

bbbbbbbbbbbbbbbbb) UnsafeNativeMethods.IOeObject.SetClientSite

[C#] int UnsafeNativeMethods.IOleObject.SetClientSite (UnsafeNativeMethods.IOleClientSite pClientSite);

[C++] int UnsafeNativeMethods::IOleObject::SetClientSite (UnsafeNativeMethods.IOeClientSite* pClientSite);

[VB] Function IOleObject.SetClientSite(ByVal pClientSite As UnsafeNativeMethods.IOleClientSite) As Integer Implements UnsafeNativeMethods.IOleObject.SetClientSite

[JScript] function UnsafeNativeMethods.IOleObject.SetClientSite(pCientSite: UnsafeNativeMethods.IOleClientSite): int;

ccccccccccccccccc) UnsafeNativeMethods.IOleObject.SetColorScheme

[C#] int UnsafeNativeMethods.IOleObject.SetColorScheme (NativeMethods.tagLOGPALETTE pLogpal);

[C++] int UnsafeNativeMethods::IOleObject::SetColorScheme(NativeMethods.tagLOGPALETTE* pLogpal);

[VB] Function IOleObject.SetColorScheme(ByVal pLogpal As NativeMethods.tagLOGPALETTE) As Integer Implements UnsafeNativeMethods.IOleObject.SetColorScheme

[JScript] function UnsafeNativeMethods.IOleObject.SetColorScheme(pLogpal: NativeMethods.tagLOGPALETTE): int;

ddddddddddddddddd) UnsafeNativeMethods.IOleObject.SetExtent

[C#] int UnsafeNativeMethods.IOleObject.SetExtent(int dwDrawAspect, NativeMethods.tagSIZEL pSizel);

[C++] int UnsafeNativeMethods::IOleObject::SetExtent(int dwDrawAspect, NativeMethods.tagSIZEL* pSizel);

[VB] Function IOleObject.SetExtent(ByVal dwDrawAspect As Integer, ByVal pSizel As NativeMethods.tagSIZEL) As Integer Implements UnsafeNativeMethods.IOleObject.SetExtent

[JScript] function UnsafeNativeMethods.IOleObject.SetExtent(dwDrawAspect: int, pSizel: NativeMethods.tagSIZEL): int;

eeeeeeeeeeeeeeeee) UnsafeNativeMethods.IOleObject.SetHostNames

[C#] int UnsafeNativeMethods.IOleObject.SetHostNames (string szContainerApp, string szContainerObj);

[C++] int UnsafeNativeMethods::IOleObject::SetHostNames(String* szContainerApp, String* szContainerObj);

[VB] Function IOleObject.SetHostNames(ByVal szContainerApp As String, ByVal szContainerObj As String) As Integer Implements UnsafeNativeMethods.IOleObject.SetHostNames

[JScript] function UnsafeNativeMethods.IOleObject.SetHostNames(szContainerApp: String, szContainerObj: String): int;

fffffffffffffffff) UnsafeNativeMethods.IOleObject.SetMoniker

[C#] int UnsafeNativeMethods.IOleObject.SetMoniker(int dwWhichMoniker, object pmk);

[C++] int UnsafeNativeMethods::IOleObject::SetMoniker (int dwWhichMoniker, Object* pmk);

[VB] Function IOleObject.SetMoniker(ByVal dwWhichMoniker As Integer, ByVal pmk As Object) As Integer Implements UnsafeNativeMethods.IOleObject.SetMoniker

[JScript] function UnsafeNativeMethods.IOleObject.SetMoniker(dwWhichMoniker: int, pmk: Object): int;

ggggggggggggggggg) UnsafeNativeMethods.IOleObject.Unadvise

[C#] int UnsafeNativeMethods.IOieObject.Unadvise(int dwConnection);

[C++] int UnsafeNativeMethods::IOleObject::Unadvise(int dwConnection);

[VB] Function IOleObject.Unadvise(ByVal dwConnection As Integer) As Integer Implements UnsafeNativeMethods.IOleObject.Unadvise

[JScript] function UnsafeNativeMethods.IOleObject. Unadvise(dwConnection: int): int;

hhhhhhhhhhhhhhhhh) UnsafeNativeMethods.IOleWindow.ContextSensitiveHelp

[C#] void UnsafeNativeMethods.IOleWindow.ContextSensitiveHelp(int fEnterMode);

[C++] void UnsafeNativeMethods::IOleWindow::ContextSensitiveHelp(int fEnterMode);

[VB] Sub IOleWindow.ContextSensitiveHelp(ByVal fEnterMode As Integer) Implements UnsafeNativeMethods.IOleWindow.ContextSensitiveHelp

[JScript] function UnsafeNativeMethods.IOleWindow.ContextSensitiveHelp(fEnterMode: int);

iiiiiiiiiiiiiiiii) UnsafeNativeMethods.IOleWindow.Get Window

[C#] int UnsafeNativeMethods.OleWindow.GetWindow(out IntPtr hwnd);

[C++] int UnsafeNativeMethods::IOleWindow::GetWindow (IntPtr* hwnd);

[VB] Function IOleWindow.GetWindow(ByRef hwnd As IntPtr) As Integer Implements UnsafeNativeMethods.IOleWindow.GetWindow

[JScript] function UnsafeNativeMethods.IOleWindow.GetWindow(hwnd: IntPtr): int;

jjjjjjjjjjjjjjjjj) UnsafeNativeMethods.IPersist.GetClassID

[C#] void UnsafeNativeMethods.IPersist.GetClassID(out Guid pClassID);

[C++] void UnsafeNativeMethods::IPersist::GetClassID (Guid* pClassID);

[VB] Sub IPersist.GetClassID(ByRef pClassID As Guid) Implements UnsafeNativeMethods.IPersist.GetClassID

[JScript] function UnsafeNativeMethods.IPersist. GetClassID(pClassID: Guid);

kkkkkkkkkkkkkkkkk) UnsafeNativeMethods.IPersistPropertyBag.GetClassID

[C#] void UnsafeNativeMethods.IPersistPropertyBag.GetClassID(out Guid pClassID);

[C++] void UnsafeNativeMethods::IPersistPropertyBag::GetClassID(Guid* pClassID);

[VB] Sub IPersistPropertyBag.GetClassID(ByRef pClassID As Guid) Implements UnsafeNativeMethods.IPersistPropertyBag.GetClassID

[JScript] function UnsafeNativeMethods.IPersistPropertyBag.GetClassID(pClassID: Guid);

llllllllllllllll) UnsafeNativeMethods.IPersistPropertyBag.InitNew

[C#] void UnsafeNativeMethods.IPersistPropertyBag.InitNew( );

[C++] void UnsafeNativeMethods::IPersistPropertyBag::InitNew( );

[VB] Sub IPersistPropertyBag.InitNew( ) Implements UnsafeNativeMethods.IPersistPropertyBag.InitNew

[JScript] function UnsafeNativeMethods.IPersistPropertyBag.InitNew( );

mmmmmmmmmmmmmmmmm) UnsafeNativeMethods.IPersistPropertyBag.Load

[C#] void UnsafeNativeMethods.IPersistPropertyBag.Load (UnsafeNativeMethods.IProperty Bag pPropBag, UnsafeNativeMethods.IErrorLog pErrorLog);

[C++] void UnsafeNativeMethods::IPersistPropertyBag::Load(UnsafeNativeMethods.IPropert yBag* pPropBag, UnsafeNativeMethods.IErrorLog* pErrorLog);

[VB] Sub IPersistPropertyBag.Load(ByVal pPropBag As UnsafeNativeMethods.IPropertyBag, ByVal pErrorLog As UnsafeNativeMethods.IErrorLog) Implements UnsafeNativeMethods.IPersistPropertyBag.Load

[JScript] function UnsafeNativeMethods.IPersistPropertyBag.Load(pPropBag: UnsafeNativeMethods.IPropertyBag, pErrorLog: UnsafeNativeMethods.IErrorLog);

nnnnnnnnnnnnnnnnn) UnsafeNativeMethods.IPersistPropertyBag.Save

[C#] void UnsafeNativeMethods.IPersistPropertyBag.Save (UnsafeNativeMethods.IProperty Bag pPropBag, bool fClearDirty, bool fSaveAllProperties);

[C++] void UnsafeNativeMethods::IPersistPropertyBag::Save(UnsafeNativeMethods.IPropert yBag* pPropBag, bool fClearDirty, bool fSaveAllProperties);

[VB] Sub IPersistPropertyBag.Save(ByVal pPropBag As UnsafeNativeMethods.IPropertyBag, ByVal fClearDirty As Boolean, ByVal fSaveAllProperties As Boolean) Implements UnsafeNativeMethods.IPersistPropertyBag. Save

[JScript] function UnsafeNativeMethods.IPersistPropertyBag.Save(pPropBag: UnsafeNativeMethods.IPropertyBag, fClearDirty: Boolean, fSaveAllProperties: Boolean);

ooooooooooooooooo) UnsafeNativeMethods.IPersistStorage.GetClassID

[C#] void UnsafeNativeMethods.IPersistStorage.GetClassID(out Guid pClassID);

[C++] void UnsafeNativeMethods::IPersistStorage::GetClassID(Guid* pClassID);

[VB] Sub IPersistStorage.GetClassID(ByRef pClassID As Guid) Implements UnsafeNativeMethods.IPersistStorage.GetClassID

[JScript] function UnsafeNativeMethods.IPersistStorage.GetClassID(pClassID: Guid);

ppppppppppppppppp) UnsafeNativeMethods.IPersistStorage.HandsOfJStorage

[C#] void UnsafeNativeMethods.IPersistStorage.HandsOffStorage( );

[C++] void UnsafeNativeMethods::IPersistStorage::HandsOffStorage( );

[VB] Sub IPersistStorage.HandsOffStorage( ) Implements UnsafeNativeMethods.IPersistStorage.HandsOffStorage

[JScript] function UnsafeNativeMethods.IPersistStorage.HandsOffStorage( );

qqqqqqqqqqqqqqqqq) UnsafeNativeMethods.IPersistStorage.InitNew

[C#] void UnsafeNativeMethods.IPersistStorage.InitNew (UnsafeNativeMethods.IStorage pstg);

[C++] void UnsafeNativeMethods::IPersistStorage::InitNew (UnsafeNativeMethods.IStorage* pstg);

[VB] Sub IPersistStorage.InitNew(ByVal pstg As UnsafeNativeMethods.IStorage) Implements UnsafeNativeMethods.IPersistStorage.InitNew

[JScript] function UnsafeNativeMethods.IPersistStorage.InitNew(pstg: UnsafeNativeMethods.IStorage);

rrrrrrrrrrrrrrrrr) UnsafeNativeMethods.IPersistStorage.IsDirty

[C#] int UnsafeNativeMethods.IPersistStorage.IsDirty( );

[C++] int UnsafeNativeMethods::IPersistStorage::IsDirty( );

[VB] Function IPersistStorage.IsDirtyo As Integer Implements UnsafeNativeMethods.IPersistStorage.IsDirty

[JScript] function UnsafeNativeMethods.IPersistStorage.IsDirty( ): int;

sssssssssssssssss) UnsafeNativeMethods.IPersistStorage.Load

[C#] int UnsafeNativeMethods.IPersistStorage.Load(UnsafeNativeMethods.IStorage pstg);

[C++] int UnsafeNativeMethods::IPersistStorage::Load(UnsafeNativeMethods.IStorage* pstg);

[VB] Function IPersistStorage.Load(ByVal pstg As UnsafeNativeMethods.IStorage) As Integer Implements UnsafeNativeMethods.IPersistStorage.Load

[JScript] function UnsafeNativeMethods.IPersistStorage.Load(pstg: UnsafeNativeMethods.IStorage): int;

ttttttttttttttttt) UnsafeNativeMethods.IPersiststorage.Save

[C#] void UnsafeNativeMethods.IPersistStorage.Save(UnsafeNativeMethods.IStorage pstg, int fSameAsLoad);

[C++] void UnsafeNativeMethods::IPersistStorage:: Save (UnsafeNativeMethods.IStorage* pstg, int fSameAsLoad);

[VB] Sub IPersistStorage.Save(ByVal pstg As UnsafeNativeMethods.IStorage, ByVal fSameAsLoad As Integer) Implements UnsafeNativeMethods.IPersistStorage.Save

[JScript] function UnsafeNativeMethods.IPersistStorage.Save(pstg: UnsafeNativeMethods.IStorage, fSameAsLoad: int);

uuuuuuuuuuuuuuuuu) UnsafeNativeMethods.IPersistStorage.SaveCompleted

[C#] void UnsafeNativeMethods.IPersistStorage. SaveCompleted(UnsafeNativeMethods.IStorage pStgNew);

[C++] void UnsafeNativeMethods::IPersistStorage:: SaveCompleted(UnsafeNativeMethods.IStorage* pStgNew);

[VB] Sub IPersistStorage.SaveCompleted(ByVal pStgNew As UnsafeNativeMethods.IStorage) Implements UnsafeNativeMethods.IPersistStorage.SaveCompleted

[JScript] function UnsafeNativeMethods.IPersistStorage.SaveCompleted(pStgNew: UnsafeNativeMethods.IStorage);

vvvvvvvvvvvvvvvvv) UnsafeNativeMethods.IPersistStreamInit.GetClassID

[C#] void UnsafeNativeMethods.IPersistStreamInit.GetClassID(out Guid pClassID);

[C++] void UnsafeNativeMethods::IPersistStreamInit::GetClassID(Guid* pClassID);

[VB] Sub IPersistStreamInit.GetClassID(ByRef pClassID As Guid) Implements UnsafeNativeMethods.IPersistStreamInit.GetClassID

[JScript] function UnsafeNativeMethods.IPersistStreamInit.GetClassID(pClassID: Guid);

wwwwwwwwwwwwwwwwww) UnsafeNativeMethods.IPersistStreamInit.GetSizeMax

[C#] void UnsafeNativeMethods.IPersistStreamInit.GetSizeMax(long pcbSize);

[C++] void UnsafeNativeMethods::IPersistStreamInit::GetSizeMax(_int64 pcbSize);

[VB] Sub IPersistStreamInit.GetSizeMax(ByVal pcbSize As Long) Implements UnsafeNativeMethods.IPersistStreamInit.GetSizeMax

[JScript] function UnsafeNativeMethods.IPersistStreamInit.GetSizeMax(pcbSize long);

xxxxxxxxxxxxxxxxx) UnsafeNativeMethods.IPersistStreamInit.InitNew

[C#] void UnsafeNativeMethods.IPersistStreamInit.InitNew( );

[C++] void UnsafeNativeMethods::IPersistStreamInit::InitNew( );

[VB] Sub IPersistStreamInit.InitNew( ) Implements UnsafeNativeMethods.IPersistStreamInit.InitNew [JScript] function UnsafeNativeMethods.IPersistStreamInit.Init New( );

yyyyyyyyyyyyyyyyy) UnsafeNativeMethods.IPersistStreamInit.IsDirty

[C#] int UnsafeNativeMethods.IPersistStreamInit.IsDirty( );

[C++] int UnsafeNativeMethods::IPersistStreamInit::IsDirty( );

[VB] Function IPersistStreamInit.IsDirty( ) As Integer Implements UnsafeNativeMethods.IPersistStreamInit.IsDirty

[JScript] function UnsafeNativeMethods.IPersistStreamInit.IsDirty( ): int;

zzzzzzzzzzzzzzzzz) UnsafeNativeMethods.IPersistStreamInit.Load

[C#] void UnsafeNativeMethods.IPersistStreamInit.Load (UnsafeNativeMethods.IStream pstm);

[C++] void UnsafeNativeMethods::IPersistStreamInit::Load (UnsafeNativeMethods.IStream* pstm);

[VB] Sub IPersistStreamInit.Load(ByVal pstm As UnsafeNativeMethods.IStream) Implements UnsafeNativeMethods.IPersistStreamInit.Load

[JScript] function UnsafeNativeMethods.IPersistStreamInit.Load(pstm: UnsafeNativeMethods.IStream);

aaaaaaaaaaaaaaaaaa) UnsafeNativeMethods.IPersistStreamInit.Save

[C#] void UnsafeNativeMethods.IPersistStreamInit.Save (UnsafeNativeMethods.IStream pstm, bool fClearDirty);

[C++] void UnsafeNativeMethods::IPersistStreamInit::Save (UnsafeNativeMethods.IStream* pstm, bool fClearDirty);

[VB] Sub IPersistStreamInit.Save(ByVal pstm As UnsafeNativeMethods.IStream, ByVal fClearDirty As Boolean) Implements UnsafeNativeMethods.IPersistStreamInit.Save

[JScript] function UnsafeNativeMethods.IPersistStreamInit.Save(pstm: UnsafeNativeMethods.IStream, fClearDirty: Boolean);

bbbbbbbbbbbbbbbbbb) UnsafeNativeMethods.IQuickActivate.GetContentExtent

[C#] void UnsafeNativeMethods.IQuickActivate.GetContentExtent(NativeMethods.tagSIZE L pSizel);

[C++] void UnsafeNativeMethods::IQuickActivate::GetContentExtent(NativeMethods.tagSIZ EL* pSizel);

[VB] Sub IQuickActivate.GetContentExtent(ByVal pSizel As NativeMethods.tagSIZEL) Implements UnsafeNativeMethods.IQuickActivate.GetContentExtent

[JScript] function UnsafeNativeMethods.IQuickActivate.GetContentExtent(pSizel: NativeMethods.tagSIZEL);

cccccccccccccccccc) UnsafeNativeMethods.IQuickActivate.QuickActivate

[C#] void UnsafeNativeMethods.IQuickActivate.QuickActivate(UnsafeNativeMethods.tagQ ACONTAINER pQaContainer, UnsafeNativeMethods.tagQACONTROL pQaControl);

[C++] void UnsafeNativeMethods::IQuickActivate::QuickActivate(UnsafeNativeMethods.tag QACONTAINER* pQaContainer, UnsafeNativeMethods.tagQACONTROL* pQaControl);

[VB] Sub IQuickActivate.QuickActivate(ByVal pQaContainer As UnsafeNativeMethods.tagQACONTAINER, ByVal pQaControl As UnsafeNativeMethods.tagQACONTROL) Implements UnsafeNativeMethods.IQuickActivate.QuickActivate

[JScript] function UnsafeNativeMethods.IQuickActivate.QuickActivate(pQaContainer: UnsafeNativeMethods.tagQACONTAINER, pQaControl: UnsafeNativeMethods.tagQACONTROL);

dddddddddddddddddd) UnsafeNativeMethods.IQuickActivate.SetContentExtent

[C#] void UnsafeNativeMethods.IQuickActivate.SetContentExtent(NativeMethods.tagSIZE L pSizel);

[C++] void UnsafeNativeMethods::IQuickActivate::SetContentExtent(NativeMethods.tagSIZ EL* pSizel);

[VB] Sub IQuickActivate.SetContentExtent(ByVal pSizel As NativeMethods.tagSIZEL) Implements UnsafeNativeMethods.IQuickActivate.SetContentExtent

[JScript] function UnsafeNativeMethods.IQuickActivate.SetContentExtent(pSizel: NativeMethods.tagSIZEL);

eeeeeeeeeeeeeeeeee) UnsafeNativeMethods.IViewObject.Draw

[C#] void UnsafeNativeMethods.IViewObject.Draw(int dwDrawAspect, int lindex, IntPtr pvAspect, NativeMethods.tagDVTARGETDEVICE ptd, IntPtr hdcTargetDev, IntPtr hdcDraw, NativeMethods.COMRECT lprcBounds, NativeMethods.COMRECT lprcWBounds, IntPtr pfnContinue, int dwContinue);

[C++] void UnsafeNativeMethods::IViewObject::Draw(int dwDrawAspect, int lindex, IntPtr pvAspect, NativeMethods.tagDVTARGETDEVICE* ptd, IntPtr hdcTargetDev, IntPtr hdcDraw, NativeMethods.COMRECT* lprcBounds, NativeMethods.COMRECT* lprcWBounds, IntPtr pfnContinue, int dwContinue);

[VB] Sub IViewObject.Draw(ByVal dwDrawAspect As Integer, ByVal lindex As Integer, ByVal pvAspect As IntPtr, ByVal ptd As NativeMethods.tagDVTARGETDEVICE, ByVal hdcTargetDev As IntPtr, ByVal hdcDraw As IntPtr, ByVal lprcBounds As NativeMethods.COMRECT, ByVal lprcWBounds As NativeMethods.COMRECT, ByVal pfnContinue As IntPtr, ByVal dwContinue As Integer) Implements UnsafeNativeMethods.IViewObject.Draw

[JScript] function UnsafeNativeMethods.IViewObject.Draw (dwDrawAspect: int, lindex: int, pvAspect: IntPtr, ptd: NativeMethods.tagDVTARGETDEVICE, hdcTargetDev: IntPtr, hdcDraw: IntPtr, lprcBounds NativeMethods.COMRECT, lpreWBounds: NativeMethods.COMRECT, pfnContinue: IntPtr, dwContinue: int);

ffffffffffffffffff) UnsafeNativeMethods.IViewObject.Freeze

[C#] int UnsafeNativeMethods.IViewObject.Freeze(int dwDrawAspect, int lindex, IntPtr pvAspect, IntPtr pdwFreeze);

[C++] int UnsafeNativeMethods::IViewObject::Freeze(int dwDrawAspect, int lindex, IntPtr pvAspect, IntPtr pdwFreeze);

[VB] Function IViewObject.Freeze(ByVal dwDrawAspect As Integer, ByVal lindex As Integer, ByVal pvAspect As IntPtr, ByVal pdwFreeze As IntPtr) As Integer Implements UnsafeNativeMethods.IViewObject.Freeze

[JScript] function UnsafeNativeMethods.IViewObject.Freeze(dwDrawAspect: int, lindex: int, pvAspect: IntPtr, pdwFreeze: IntPtr): int;

gggggggggggggggggg) UnsafeNativeMethods.IViewObject.GetAdvise

[C#] void UnsafeNativeMethods.IViewObject.GetAdvise (int[ ] paspects, int[ ] padvf, UnsafeNativeMethods.IAdvise Sink[ ] pAdvSink);

[C++] void UnsafeNativeMethods::IViewObject::GetAdvise (int paspects _gc[ ], int padvf _gc[ ], UnsafeNativeMethods.IAdviseSink* pAdvSink[ ]);

[VB] Sub IViewObject.GetAdvise(ByVal paspects( ) As Integer, ByVal padvf( ) As Integer, ByVal pAdvSink( ) As UnsafeNativeMethods.IAdviseSink) Implements UnsafeNativeMethods.IViewObject.GetAdvise

[JScript] function UnsafeNativeMethods.IViewObject.GetAdvise(paspects: int[ ], padvf: int[ ], pAdvSink: UnsafeNativeMethods.IAdviseSink[ ]);

hhhhhhhhhhhhhhhhhh) UnsafeNativeMethods.IViewObject.GetColorSet

[C#] int UnsafeNativeMethods.IViewObject.GetColorSet (int dwDrawAspect, int lindex, IntPtr pvAspect, NativeMethods.tagDVTARGETDEVICE ptd, IntPtr hicTargetDev, NativeMethods.tagLOGPALETTE ppColorSet);

[C++] int UnsafeNativeMethods::IViewObject::GetColorSet (int dwDrawAspect, int lindex, IntPtr pvAspect, NativeMethods.tagDVTARGETDEVICE* ptd, IntPtr hicTargetDev, NativeMethods.tagLOGPALETTE* ppColorSet);

[VB] Function IViewObject.GetColorSet(ByVal dwDraw Aspect As Integer, ByVal lindex As Integer, ByVal pvAspect As IntPtr, ByVal ptd As NativeMethods.tagDVTARGETDEVICE, ByVal hicTargetDev As IntPtr, ByVal ppColorSet As NativeMethods.tagLOGPALETTE) As Integer Implements UnsafeNativeMethods.IViewObject.GetColorSet

[JScript] function UnsafeNativeMethods.IViewObject.GetColorSet(dwDrawAspect: int, lindex: int, pvAspect: IntPtr, ptd: NativeMethods.tagDVTARGETDEVICE, hicTargetDev: IntPtr, ppColorSet: NativeMethods.tagLOGPALETTE): int;

iiiiiiiiiiiiiiiiii) UnsafeNativeMethods.IViewObject.SetAdvise

[C#] void UnsafeNativeMethods.IViewObject.SetAdvise(int aspects, int advf, UnsafeNativeMethods.IAdviseSink pAdvSink);

[C++] void UnsafeNativeMethods::IViewObject::SetAdvise (int aspects, int advf, UnsafeNativeMethods.IAdviseSink* pAdvSink);

[VB] Sub IViewObject.SetAdvise(ByVal aspects As Integer, ByVal advf As Integer, ByVal pAdvSink As UnsafeNativeMethods.IAdviseSink) Implements UnsafeNativeMethods.IViewObject.SetAdvise

[JScript] function UnsafeNativeMethods.IViewObject.SetAdvise(aspects: int, advf: int, pAdvSink: UnsafeNativeMethods.IAdviseSink);

jjjjjjjjjjjjjjjjjj) UnsafeNativeMethods.IViewObject.Unfreeze

[C#] int UnsafeNativeMethods.IViewObject.Unfreeze(int dwFreeze);

[C++] int UnsafeNativeMethods::IViewObject::Unfreeze(int dwFreeze);

[VB] Function IViewObject.Unfreeze(ByVal dwFreeze As Integer) As Integer Implements UnsafeNativeMethods.IViewObject.Unfreeze

[JScript] function UnsafeNativeMethods.IViewObject.Unfreeze(dwFreeze: int): int;

kkkkkkkkkkkkkkkkkk) UnsafeNativeMethods.IViewObject2.Draw

[C#] void UnsafeNativeMethods.IViewObject2.Draw(int dwDrawAspect, int lindex, IntPtr pvAspect, NativeMethods.tagDVTARGETDEVICE ptd, IntPtr hdcTargetDev, IntPtr hdcDraw, NativeMethods.COMRECT lprcBounds, NativeMethods.COMRECT lprcWBounds, IntPtr pfnContinue, int dwContinue);

[C++] void UnsafeNativeMethods::IViewObject2::Draw(int dwDrawAspect, int lindex, IntPtr pvAspect, NativeMethods.tagDVTARGETDEVICE* ptd, IntPtr hdcTargetDev, IntPtr hdcDraw, NativeMethods.COMRECT* lprcBounds, NativeMethods.COMRECT* lprcWBounds, IntPtr pfnContinue, int dwContinue);

[VB] Sub IViewObject2.Draw(ByVal dwDrawAspect As Integer, ByVal lindex As Integer, ByVal pvAspect As IntPtr, ByVal ptd As NativeMethods.tagDVTARGETDEVICE, ByVal hdcTargetDev As IntPtr, ByVal hdcDraw As IntPtr, ByVal lprcBounds As NativeMethods.COMRECT, ByVal lprcWBounds As NativeMethods.COMRECT, ByVal pfnContinue As IntPtr, ByVal dwContinue As Integer) Implements UnsafeNativeMethods.IViewObject2.Draw [JScript] function UnsafeNativeMethods.IViewObject2.Draw(dwDrawAspect int, lindex: int, pvAspect: IntPtr, ptd: NativeMethods.tagDVTARGETDEVICE, hdcTargetDev: IntPtr, hdcDraw: IntPtr, lprcBounds NativeMethods.COMRECT, lprcWBounds: NativeMethods.COMRECT, pfnContinue: IntPtr, dwContinue: int);

lllllllllllllll) UnsafeNativeMethods.IViewObject2.Freeze

[C#] int UnsafeNativeMethods.IViewObject2.Freeze(int dwDrawAspect, int lindex, IntPtr pvAspect, IntPtr pdwFreeze);

[C++] int UnsafeNativeMethods::IViewObject2::Freeze(int dwDrawAspect, int lindex, IntPtr pvAspect, IntPtr pdwFreeze);

[VB] Function IViewObject2.Freeze(ByVal dwDrawAspect As Integer, ByVal lindex As Integer, ByVal pvAspect As IntPtr, ByVal pdwFreeze As IntPtr) As Integer Implements UnsafeNativeMethods.IViewObject2.Freeze

[JScript] function UnsafeNativeMethods.IViewObject2.Freeze(dwDrawAspect: int, lindex: int, pvAspect: IntPtr, pdwFreeze: IntPtr): int;

mmmmmmmmmmmmmmmmmmm) UnsafeNativeMethods.IViewObject2.GetAdvise

[C#] void UnsafeNativeMethods.IViewObject2.GetAdvise (int[ ] paspects, int[ ] padvf, UnsafeNativeMethods.IAdvise Sink[ ] pAdvSink);

[C++] void UnsafeNativeMethods::IViewObject2::GetAdvise(int paspects _gc[ ], int padvf _gc[ ], UnsafeNativeMethods.IAdviseSink* pAdvSink[ ]);

[VB] Sub IViewObject2.GetAdvise(ByVal paspects( ) As Integer, ByVal padvf( ) As Integer, ByVal pAdvSink( ) As UnsafeNativeMethods.lAdviseSink) Implements UnsafeNativeMethods.IViewObject2.GetAdvise

[JScript] function UnsafeNativeMethods.IViewObject2.GetAdvise(paspects: int[ ], padvf: int[ ], pAdvSink: UnsafeNativeMethods.IAdviseSink[ ]);

nnnnnnnnnnnnnnnnn) UnsafeNativeMethods.IViewObject2.GetColorSet

[C#] int UnsafeNativeMethods.IViewObject2.GetColorSet (int dwDrawAspect, int lindex, IntPtr pvAspect, NativeMethods.tagDVTARGETDEVICE ptd, IntPtr hicTargetDev, NativeMethods.tagLOGPALETTE ppColorSet);

[C++] int UnsafeNativeMethods::IViewObject2::GetColorSet(int dwDrawAspect, int lindex, IntPtr pvAspect, NativeMethods.tagDVTARGETDEVICE* ptd, IntPtr hicTargetDev, NativeMethods.tagLOGPALETTE* ppColorSet);

[VB] Function IViewObject2.GetColorSet(ByVal dwDrawAspect As Integer, ByVal lindex As Integer, ByVal pvAspect As IntPtr, ByVal ptd As NativeMethods.tagDVTARGETDEVICE, ByVal hicTargetDev As IntPtr, ByVal ppColorSet As NativeMethods.tagLOGPALETTE) As Integer Implements UnsafeNativeMethods.IView Object2. GetColorSet

[JScript] function UnsafeNativeMethods.IViewObject2. GetColorSet(dwDrawAspect: int, lindex: int, pvAspect: IntPtr, ptd: NativeMethods.tagDVTARGETDEVICE, hicTargetDev: IntPtr, ppColorSet: NativeMethods.tagLOGPALETTE): int;

ooooooooooooooooo) UnsafeNativeMethods.IViewObject2.GetExtent

[C#] void UnsafeNativeMethods.IViewObject2.GetExtent (int dwDrawAspect, int lindex, NativeMethods.tagDVTARGETDEVICE ptd, NativeMethods.tagSIZEL lpsizel);

[C++] void UnsafeNativeMethods::IViewObject2::GetExtent(int dwDrawAspect, int lindex, NativeMethods.tagDVTARGETDEVICE* ptd, NativeMethods.tagSIZEL* lpsizel);

[VB] Sub IViewObject2.GetExtent(ByVal dwDrawAspect As Integer, ByVal lindex As Integer, ByVal ptd As NativeMethods.tagDVTARGETDEVICE, ByVal lpsizel As NativeMethods.tagSIZEL) Implements UnsafeNativeMethods.IViewObject2.GetExtent

[JScript] function UnsafeNativeMethods.IView Object2.GetExtent(dwDrawAspect: int, lindex: int, ptd: NativeMethods.tagDVTARGETDEVICE, lpsizel: NativeMethods.tagSIZEL);

ppppppppppppppppp) UnsafeNativeMethods.IViewObject2.SetAdvise

[C#] void UnsafeNativeMethods.IViewObject2.SetAdvise (int aspects, int advf, UnsafeNativeMethods.lAdviseSink pAdvSink);

[C++] void UnsafeNativeMethods::IViewObject2::SetAdvise(int aspects, int advf, UnsafeNativeMethods.IAdvise Sink* pAdvSink);

[VB] Sub IViewObject2.SetAdvise(ByVal aspects As Integer, ByVal advf As Integer, ByVal pAdvSink As UnsafeNativeMethods.IAdviseSink) Implements UnsafeNativeMethods.IViewObject2.SetAdvise

[JScript] function UnsafeNativeMethods.IViewObject2.SetAdvise(aspects: int, advf: int, pAdvSink: UnsafeNativeMethods.lAdvise Sink);

qqqqqqqqqqqqqqqqq) UnsafeNativeMethods.IViewObject2. Unfreeze

[C#] t UnsafeNativeMethods.IViewObject2.Unfreeze(int dwFreeze);

[C++] int UnsafeNativeMethods::IViewObject2::Unfreeze (int dwFreeze);

[VB] Function IViewObject2.Unfreeze(ByVal dwfreeze As Integer) As Integer Implements UnsafeNativeMethods.IViewObject2.Unfreeze

[JScript] function UnsafeNativeMethods.IViewObject2.Unfreeze(dwFreeze int): int;

rrrrrrrrrrrrrrrr) Update

[C#] public void Update( );

[C++] public: void Update( );

[VB] Public Sub Update( )

[JScript] public function Update( );

Description

Causes the control to redraw the invalidated regions with its client area.

sssssssssssssssss) UpdateBounds

[C#] protected void UpdateBounds( );

[C++] protected: void UpdateBounds( );

[VB] Protected Sub UpdateBounds( )

[JScript] protected function UpdateBounds( ); Updates the bounds of the control.

Description

Updates the bounds of the control with the current size and location.

If the new System.Windows.Forms.Control.Size of the control is different from the previous System.Drawing.Size, the System.Windows.Forms.Control.SizeChanged event is raised. Likewise, if the System.Windows.Forms.Control.Location of the control changes, the System.Windows.Forms.Control.LocationChanged event is raised.

ttttttttttttttttt) UpdateBounds

[C#] protected void UpdateBounds(int x, int y, int width, int height);

[C++] protected: void UpdateBounds(int x, int y, int width, int height);

[VB] Protected Sub UpdateBounds(ByVal x As Integer, ByVal y As Integer, ByVal width As Integer, ByVal height As Integer)

[JScript] protected function UpdateBounds(x: int, y: int, width: int, height: int);

Description

Updates the bounds of the control with the specified size and location.

If the new System.Windows.Forms.Control.Size of the control if different from the previous System.Drawing.Size, the System.Windows.Forms.Control.SizeChanged event is raised. Likewise, is the System.Windows.Forms.Control.Location of the control changes, the System.Windows.Forms.Control.LocationChanged event is raised. The System.Drawing.Point.X coordinate of the control. The System.Drawing.Point.Y coordinate of the control. The System.Drawing.Size.Width of the control. The System.Drawing.Size.Height of the control.

uuuuuuuuuuuuuuuuuu) UpdateBounds

[C#] protected void UpdateBounds(int x, int y, int width, int height, int clientWidth, int clientHeight);

[C++] protected: void UpdateBounds(int x, int y, int width, int height, int clientWidth, int clientHeight);

[VB] Protected Sub UpdateBounds(ByVal x As Integer, ByVal y As Integer, ByVal width As Integer, ByVal height As Integer, ByVal clientWidth As Integer, ByVal clientHeight As Integer)

[JScript] protected function UpdateBounds(x: int, y: int, width: int, height: int, clientWidth int, clientHeight: int);

Description

Updates the bounds of the control with the specified size, location, and client size.

If the new System.Windows.Forms.Control.Size of the control is different from the previous System.Drawing.Size, the System.Windows.Forms.Control.SizeChanged event is raised. Likewise, if the System.Windows.Forms.Control.Location of the control changes, the System.Windows.Forms.Control.LocationChanged event is raised. The System.Drawing.Point.X coordinate of the control. The System.Drawing.Point.Y coordinate of the control. The System.Drawing.Size.Width of the control. The System.Drawing.Size.Height of the control. The client System.Drawing. Size.Width of the control. The client System.Drawing.Size.Height of the control.

vvvvvvvvvvvvvvvvvv) UpdateStyles

[C#] protected void UpdateStyles( );

[C++] protected: void UpdateStyles( );

[VB] Protected Sub UpdateStyles( )

[JScript] protected function UpdateStyles( );

Description

Forces the assigned styles to be reapplied to the control.

This method calls the System.Windows.Forms.Control.CreateParams method to get the styles to apply. The styles assigned to the System.Windows.Forms.CreateParams.Style and System.Windows.Forms.CreateParams.ExStyle properties of the System.Windows.Forms.CreateParams object assigned to the control's System.Windows.Forms.Control.CreateParams property are reapplied. The control is repainted to reflect the style changes if necessary.

wwwwwwwwwwwwwwwwwww) UpdateZOrder

[C#] protected void UpdateZOrder( );

[C++] protected: void UpdateZOrder( );

[VB] Protected Sub UpdateZOrder( )

[JScript] protected function UpdateZOrder( );

Description

Updates control in its parent's z-order.

The System.Windows.Forms.Control.UpdateZOrder method updates the position of the control in its parent control's z-order. For example, if this control is a newly created control that was added to a System.Windows.Forms.Control.ControlCollection, the z-order is updated with the new control added to the bottom.

xxxxxxxxxxxxxxxxxx) WndProc

[C#] protected virtual void WndProc(ref Message m);

[C++] protected: virtual void WndProc(Message* m);

[VB] Overridable Protected Sub WndProc(ByRef m As Message)

[JScript] protected function WndProc(m: Message);

Description

Processes Windows messages.

All messages are sent to the System.Windows.Forms.Control.WndProc(System.Windows.Forms. Message@) method after getting filtered through the System.Windows.Forms.Control.PreProcessMessage(System.Windows.Forms.Message@) method. The Windows System.Windows.Forms.Message to process.

Control.ControlAccessibleObject class (System.Windows.Forms)

a) WndProc

Description

Provides information about a control so it can be inspected by an accessibility application.

Windows Forms has accessibility support built in, and provides information about your application which allows it to work with accessibility client applications. Examples of accessibility client applications are: screen enlarger and reviewer utilities, voice input utilities, on-screen keyboards, alternative input devices, and keyboard enhancement utilities. There are instances when you will want to provide additional information to accessibility client applications. There are two ways of providing this additional information. To provide limited accessibility information for existing controls, set the System.Windows.Forms.Control.AccessibleName, System.Windows.Forms.Control.AccessibleDescription, System.Windows.Forms.Control.AccessibleDefaultActionDescription, and System.Windows.Forms.Control.AccessibleRole property values of the control, which will be reported to accessibility client applications. Alternatively, if you require more accessibility information to be included with your control, you can write your own class deriving from the System.Windows. Forms.AccessibleObject or System.Windows.Forms.Control.ControlAccessibleObject classes. For example, if you are writing your own control that is not derived from the common controls or you require such operations as hit testing within your control, you should create a System.Windows.Forms. Control.ControlAccessibleObject for your control. You can create a System.Windows.Forms.Control.ControlAccessibleObject for your control by calling the System. Windows.Forms.Control.CreateAccessibilityInstance method.

b) Control.ControlAccessibleObject

Example Syntax:

c) WndProc

[C#] public Control.ControlAccessibleObject(Control ownerControl);

[C++] public: ControlAccessibleObject(Control* ownerControl);

[VB] Public Sub New(ByVal ownerControl As Control)

[JScript] public function Control.ControlAccessibleObject (ownerControl: Control);

Description

Initializes a new instance of the System.Windows.Forms.Control.ControlAccessibleObject class. The System.Windows.Forms.Control that owns the System.Windows.Forms.Control.ControlAccessibleObject.

d) Bounds e) DefaultAction f) WndProc

Description

Gets the default action of the System.Windows.Forms.Control.ControlAccessibleObject.

g) Description h) WndProc

[C#] public override string Description {get;}

[C++] public: _property virtual String* get_Description( );

[VB] Overrides Public ReadOnly Property Description As String

[JScript] public function get Description( ): String;

Description

Gets the description of the System.Windows.Forms.Control.ControlAccessibleObject.

i) Handle j) WndProc

[C#] public IntPtr Handle {get; set;}

[C++] public: _property IntPtr get_Handle( ); public: _property void set_Handle(IntPtr);

[VB] Public Property Handle As IntPtr

[JScript] public function get Handle( ): IntPtr; public function set Handle(IntPtr);

Description

Gets or sets the handle of the System.Windows.Forms.Control.ControlAccessibleObject.

The value of the System.Windows.Forms.Control.ControlAccessibleObject.Handle property for the System.Windows.Forms.Control.ControlAccessibleObject is equal to the System.Windows.Forms.Control.Handle property of the System.Windows.Forms.Control it is associated with.

k) Help l) WndProc

[C#] public override string Help {get;}

[C++] public: _property virtual String* get_Help( );

[VB] Overrides Public ReadOnly Property Help As String

[JScript] public function get Help( ): String;

Description

Gets the description of what the object does or how the object is used.

m) KeyboardShortcut n) WndProc

[C#] public override string KeyboardShortcut {get;}

[C++] public: _property virtual String* get_KeyboardShortcut( );

[VB] Overrides Public ReadOnly Property KeyboardShortcut As String

[JScript] public function get KeyboardShortcut( ): String;

Description

Gets the object shortcut key or access key for an accessible object. All objects that have a shortcut key or access key should support this property.

o) Name p) WndProc

[C#] public override string Name {get; set;}

[C++] public: _property virtual String* get_Name( ); public: _property virtual void set_Name(String*);

[VB] Overrides Public Property Name As String

[JScript] public function get Name( ): String; public function set Name(String);

Description

Gets or sets the accessible object name.

q) Owner r) WndProc

[C#] public Control Owner {get;}

[C++] public: _property Control* get_Owner( );

[VB] Public ReadOnly Property Owner As Control

[JScript] public function get Owner( ): Control;

Description

Gets the owner of the System.Windows.Forms.Control.ControlAccessibleObject.

s) Parent t) Role u) WndProc

Description

Gets the role of this accessible object.

v) State w) Value x) GetHelpTopic

[C#] public override int GetHelpTopic(out string fileName);

[C++] public: int GetHelpTopic(String** fileName);

[VB] Overrides Public Function GetHelpTopic(ByRef fileName As String) As Integer

[JScript] public override function GetHelpTopic(fileName: String): int;

Description

Gets an identifier for a Help topic and the path to the Help file associated with this accessible object.

Return Value: An identifier for a Help topic, or −1 if there is no Help topic. On return, the fileName parameter will contain the path to the Help file associated with this accessible object, or null if there is no IAccessible interface specified. Pass the identifier to the WinHelp file specified by the fileName parameter to identify the desired Help topic. When this method returns, contains a string that represents the path to the Help file associated with this accessible object. This parameter is passed uninitialized.

y) NotifyClients

[C#] public void NotifyClients(AccessibleEvents accEvent);

[C++] public: void NotifyClients(AccessibleEvents accEvent);

[VB] Public Sub NotifyClients(ByVal accEvent As AccessibleEvents)

[JScript] public function NotifyClients(accEvent: AccessibleEvents); Notifies accessibility client applications of System.Windows.Forms.AccessibleEvents Description Notifies accessibility client applications of the specified System.Windows.Forms.AccessibleEvents.

You must call the System.Windows.Forms.Control.ControlAccessibleObject.NotifyClients(System.Windows.Forms.AccessibleEvents) method for each System.Windows.Forms.AccessibleEvents object the accessibility client applications are to be notified of. The System.Windows.Forms.Control.ControlAccessibleObject.NotifyClients(System.Windows.Forms.AccessibleEvents) method is typically called when a property is set or from within an event handler. For example, you might call the System.Windows. Forms.Control.ControlAccessibleObject.NotifyEvents method and pass in System.Windows.Forms.AccessibleEvents.Hide from within the event handler for the System. Windows.Forms.Control.VisibleChanged event. The System.Windows.Forms.AccessibleEvents object to notify the accessibility client applications of.

z) NotifyClients

[C#] public void NotifyClients(AccessibleEvents accEvent, int childID);

[C++] public: void NotifyClients(AccessibleEvents accEvent, int childID);

[VB] Public Sub NotifyClients(ByVal accEvent As AccessibleEvents, ByVal childID As Integer)

[JScript] public function NotifyClients(accEvent: AccessibleEvents, childID: int);

Description

Notifies the accessibility client applications of the specified System.Windows.Forms.AccessibleEvents for the specified child control.

You must call the System.Windows.Forms.Control.ControlAccessibleObject.NotifyClients(System.Windows.Forms.AccessibleEvents) method for each System.Windows.Forms.AccessibleEvents object the accessibility client applications are to be notified of. The System.Windows.Forms.Control.ControlAccessibleObject.NotifyClients(System.Windows.Forms.AccessibleEvents) method is typically called when a property is set or from within an event handler. For example, you might call the System.Windows. Forms.Control.ControlAccessibleObject.NotifyEvents method and pass in System.Windows.Forms.AccessibleEvents.Hide from within the event handler for the System. Windows.Forms.Control.VisibleChanged event. The System.Windows.Forms.AccessibleEvents object to notify the accessibility client applications of. The child System.Windows.Forms.Control to notify of the accessible event.

aa) ToString

[C#] public override string ToString( );

[C++] public: String* ToString( );

[VB] Overrides Public Function ToString( ) As String

[JScript] public override function ToString( ): String;

Description

ControlBindingsCollection class (System.Windows.Forms)

a) UseStdAccessibleObjects

Description

Represents the collection of data bindings for a control.

Simple data binding is accomplished by adding System.Windows.Forms.Binding objects to a System.Windows.Forms.ControlBindingsCollection. Any object that inherits from the System.Windows.Forms.Control class can access the System.Windows.Forms.ControlBindingsCollection through the System.Windows.Forms.Control.DataBindings property. For a list of Windows controls that support data binding, see the System.Windows.Forms.Binding class.

b) Control c) UseStdAccessibleObjects

[C#] public Control Control {get;}

[C++] public: _property Control* get_Control( );

[VB] Public ReadOnly Property Control As Control

[JScript] public function get Control( ): Control;

Description

Gets the control that the collection belongs to.

d) Count e) IsReadOnly f) IsSynchronized g) Item h) UseStdAccessibleObjects

System.Windows.Forms.Binding

Description

Gets the System.Windows.Forms.Binding specified by the control's property name.

private void PrintValue( ) {ControlBindingsCollection myControlBindings; myControlBindings=textBox1.DataBindings; //Get the Binding for the Text property. Binding myBinding=myControlBindings["Text"]; //Assuming the data source is a DataTable. DataRowView drv; drv=(DataRowView)myBinding.BindingManagerBase.Current; //Assuming a column named "custName" exists, print the value. Console.WriteLine(drv["custName"]);} The following example uses the System.Windows.Forms.ControlBindingsCollection.Item(System.String) property to return the System.Windows.Forms.Binding for a System.Windows.Forms.TextBox control's System.Windows.Forms.Control.Text property. The name of the property on the data-bound control.

i) Item j) List k) SyncRoot

System.Windows.Forms.Binding

Description

Adds the specified System.Windows.Forms.Binding to the collection.

The System.Windows.Forms.BindingsCollection. CollectionChanged event occurs when the change is complete. The System.Windows.Forms.Binding to add.

l) Add

[C#] public void Add(Binding binding);

[C++] public: void Add(Binding* binding);

[VB] Public Sub Add(ByVal binding As Binding)

[JScript] public function Add(binding: Binding); Adds a System.Windows.Forms.Binding to the collection.

Description

Adds the specified System.Windows.Forms.Binding to the collection.

The System.Windows.Forms.BindingsCollection. CollectionChanged event occurs when the change is complete. The System.Windows.Forms.Binding to add.

m) Add

[C#] public Binding Add(string propertyName, object dataSource, string dataMember);

[C++] public: Binding* Add(String* propertyName, Object* dataSource, String* dataMember);

[VB] Public Function Add(ByVal propertyName As String, ByVal dataSource As Object, ByVal dataMember As String) As Binding

[JScript] public function Add(propertyName: String, dataSource: Object, dataMember: String): Binding;

Description

Creates a System.Windows.Forms.Binding using the specified control property name, data source, and data member, and adds it to the collection.

Return Value: The newly-created System.Windows.Forms.Binding.

Adding a System.Windows.Forms.Binding causes the System.Windows.Forms.BindingsCollection.CollectionChanged event to occur. The name of the control property to bind. An System.Object that represents the data source. The property or list to bind to.

n) AddCore

[C#] protected override void AddCore(Binding dataBinding);

[C++] protected: void AddCore(Binding* dataBinding);

[VB] Overrides Protected Sub AddCore(ByVal dataBinding As Binding)

[JScript] protected override function AddCore(dataBinding: Binding);

Description

Adds a binding to the collection. The System.Windows.Forms.Binding to add.

Description

Clears the collection of any bindings.

The System.Windows.Forms.BindingsCollection. CollectionChanged event occurs when the collection is cleared.

o) Clear

[C#] public void Clear( );

[C++] public: void Clear( );

[VB] Public Sub Clear( )

[JScript] public function Clear( ); Clears the collection of any bindings.

Description

Clears the collection of any bindings.

The System.Windows.Forms.BindingsCollection. CollectionChanged event occurs when the collection is cleared.

p) ClearCore

[C#] protected override void ClearCore( );

[C++] protected: void ClearCore( );

[VB] Overrides Protected Sub ClearCore( )

[JScript] protected override function ClearCore( );

Description

System.Windows.Forms.Binding

Description

Deletes the specified System.Windows.Forms.Binding from the collection. The System.Windows.Forms.Binding to remove.

q) Remove

[C#] public void Remove(Binding binding);

[C++] public: void Remove(Binding* binding);

[VB] Public Sub Remove(ByVal binding As Binding)

[JScript] public function Remove(binding: Binding); Deletes the specified System.Windows.Forms.Binding from the collection.

Description

Deletes the specified System.Windows.Forms.Binding from the collection. The System.Windows.Forms.Binding to remove.

Description

Deletes the System.Windows.Forms.Binding at the specified index.

The System.Windows.Forms.BindingsCollection.Collection Changed event occurs if the removal succeeds. The zero-based index of the item to remove.

r) RemoveAt

[C#] public void RemoveAt(int index);

[C++] public: void RemoveAt(int index);

[VB] Public Sub RemoveAt(ByVal index As Integer)

[JScript] public function RemoveAt(index: int);

Description

Deletes the System.Windows.Forms.Binding at the specified index.

The System.Windows.Forms.BindingsCollection. CollectionChanged event occurs if the removal succeeds. The zero-based index of the item to remove.

s) RemoveCore

[C#] protected override void RemoveCore(Binding dataBinding);

[C++] protected: void RemoveCore(Binding* dataBinding);

[VB] Overrides Protected Sub RemoveCore(ByVal dataBinding As Binding)

[JScript] protected override function RemoveCore(dataBinding: Binding);

Description

TabControl.ControlCollection class (System.Windows.Forms)

a) ToString

Description

Contains a collection of System.Windows.Forms.Control objects.

b) TabControl.ControlCollection

Example Syntax:

c) ToString

[C#] public TabControl.ControlCollection(TabControl owner);

[C++] public: ControlCollection(TabControl* owner);

[VB] Public Sub New(ByVal owner As TabControl)

[JScript] public function TabControl.ControlCollection (owner: TabControl);

Description

Initializes a new instance of the System.Windows.Forms.TabControl.ControlCollection class. The System.Windows.Forms.TabControl that this collection belongs to.

d) Count e) IsReadOnly f) Item g) Add

[C#] public override void Add(Control value);

[C++] public: void Add(Control* value);

[VB] Overrides Public Sub Add(ByVal value As Control)

[JScript] public override function Add(value: Control);

Description

Adds a System.Windows.Forms.Control to the collection.

You cannot add a System.Windows.Forms.TabPage to a System.Windows.Forms.TabPage. The System.Windows.Forms. Control to add.

h) Remove

[C#] public override void Remove(Control value);

[C++] public: void Remove(Control* value);

[VB] Overrides Public Sub Remove(ByVal value As Control)

[JScript] public override function Remove(value: Control);

Description

Removes a System.Windows.Forms.Control from the collection. The System.Windows.Forms.Control to remove.

Control.ControlCollection class (System.Windows.Forms)

a) ToString

Description

Represents a collection of System.Windows.Forms.Control objects

The System.Windows.Forms.Control.ControlCollection. Add(System.Windows.Forms.Control), System.Windows.Forms.Control.ControlCollection.Remove(System.Windows.Forms.Control), and System.Windows.Forms.Control.ControlCollection.RemoveAt(System.Int32) methods enable you to add and remove individual controls from the collection. You can also use the System.Windows.Forms.Control.ControlCollection.AddRange(System.Windows.Forms.Control[ ]) or System.Windows.Forms.Control.ControlCollection.Clear methods to add or remove all the controls from the collection.

b) Control.ControlCollection

Example Syntax:

c) ToString

[C#] public Control.ControlCollection(Control owner);

[C++] public: ControlCollection(Control* owner);

[VB] Public Sub New(ByVal owner As Control)

[JScript] public function Control.ControlCollection(owner: Control);

Description

Initializes a new instance of the System.Windows.Forms.Control.ControlCollection class. A System.Windows.Forms.Control representing the control that owns the control collection.

d) Count e) ToString

[C#] public int Count {get;}

[C++] public: _property int get_Count( );

[VB] Public ReadOnly Property Count As Integer

[JScript] public function get Count( ): int;

Description

Gets the total number of System.Windows.Forms.Control objects in the collection.

The System.Windows.Forms.Control.ControlCollection.Count property holds the number of System.Windows.Forms. Control objects assigned to the collection. You can use the System.Windows.Forms.Control.ControlCollection.Count property value as the upper bounds of a loop to iterate through a collection.

f) IsReadOnly g) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the control collection is read-only.

h) Item i) ToString

[C#] public virtual Control this[int index] {get;}

[C++] public: _property virtual Control* get_Item(int index);

[VB] Overridable Public Default ReadOnly Property Item (ByVal index As Integer) As Control

[JScript] returnValue=ControlCollectionObject.Item(index);

Description

Indicates the System.Windows.Forms.Control at the specified indexed location in the collection.

To retrieve a System.Windows.Forms.Control from the System.Windows.Forms.Control.ControlCollection, reference the collection object with a specific index value. The index value of the System.Windows.Forms.Control.ControlCollection is a zero-based index. The index of the control to retrieve from the control collection.

j) Add

[C#] public virtual void Add(Control value);

[C++] public: virtual void Add(Control* value);

[VB] Overridable Public Sub Add(ByVal value As Control)

[JScript] public function Add(value: Control);

Description

Adds the specified control to the control collection.

The System.Windows.Forms.Control.ControlCollection.Add(System.Windows.Forms.Control) method allows you to add System.Windows.Forms.Control objects to the end of the control collection. The System.Windows.Forms.Control to add to the control collection.

k) AddRange

[C#] public virtual void AddRange(Control[ ] controls);

[C++] public: virtual void AddRange(Control* controls[ ]);

[VB] Overridable Public Sub AddRange(ByVal controls( ) As Control)

[JScript] public function AddRange(controls: Control[ ]);

Description

Adds an array of control objects to the collection.

The System.Windows.Forms.Control objects contained in the controls array are appended to the end of the collection. An array of System.Windows.Forms.Control objects to add to the collection.

l) Clear

[C#] public virtual void Clear( );

[C++] public: virtual void Clear( );

[VB] Overridable Public Sub Clear( )

[JScript] public function Clear( );

Description

Removes all controls from the collection.

You can use the System.Windows.Forms.Control.ControlCollection.Clear method to remove the entire collection of controls from a parent control.

m) Contains

[C#] public bool Contains(Control control);

[C++] public: bool Contains(Control* control);

[VB] Public Function Contains(ByVal control As Control) As Boolean

[JScript] public function Contains(control: Control): Boolean;

Description

Determines whether the specified control is a member of the collection.

Return Value: true if the System.Windows.Forms.Control is a member of the collection; otherwise, false This method enables you to determine whether a System.Windows.Forms.Control is a member of the collection before attempting to perform operations on the System.Windows.Forms.Control. You can use this method to confirm that a System.Windows.Forms.Control has been added to or is still a member of the collection. The System.Windows.Forms.Control to locate in the collection.

n) CopyTo

[C#] public void CopyTo(Array dest, int index);

[C++] public: _sealed void CopyTo(Array* dest, int index);

[VB] NotOverridable Public Sub CopyTo(ByVal dest As Array, ByVal index As Integer)

[JScript] public function CopyTo(dest: Array, index: int);

Description

Copies the entire collection into an existing array at a specified location within the array.

All the controls in the collection are copied into the array starting at the specified indexed location, overwriting any existing data within the range of objects copied into the array. The destination array. The index in the destination array at which storing begins.

o) Equals

[C#] public override bool Equals(object other);

[C++] public: bool Equals(Object* other);

[VB] Overrides Public Function Equals(ByVal other As Object) As Boolean

[JScript] public override function Equals(other: Object): Boolean;

Description p) GetChildIndex

[C#] public int GetChildIndex(Control child);

[C++] public: int GetChildIndex(Control* child);

[VB] Public Function GetChildIndex(ByVal child As Control) As Integer

[JScript] public function GetChildIndex(child: Control): int; Retrieves the index of a control within the control collection.

Description

Retrieves the index of the specified child control within the control collection.

Return Value: A zero-based index value that represents the location of the specified child control within the control collection.

The control with an index value of zero is at the top of the z-order, and higher numbers are closer to the bottom. The System.Windows.Forms.Control to search for in the control collection.

q) GetChildIndex

[C#] public int GetChildIndex(Control child, bool throwException);

[C++] public: int GetChildIndex(Control* child, bool throwException);

[VB] Public Function GetChildIndex(ByVal child As Control, ByVal throwException As Boolean) As Integer

[JScript] public function GetChildIndex(child: Control, throwException Boolean) int;

Description

Retrieves the index of the specified child control within the control collection, and optionally raises an exception if the specified control is not within the control collection.

Return Value: A zero-based index value that represents the location of the specified child control within the control collection.

The control with an index value of zero is at the top of the z-order, and higher numbers are closer to the bottom. The System.Windows.Forms.Control to search for in the control collection. true to throw an exception if the System.Windows.Forms.Control specified in the child parameter is not a control in the System.Windows.Forms.Control.ControlCollection; otherwise, false r) GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumerator that can be used to iterate through the control collection.

Return Value: An System.Collections.IEnumerator object that represents the control collection.

s) GetHashCode

[C#] public override int GetHashCode( );

[C++] public: int GetHashCode( );

[VB] Overrides Public Function GetHashCode( ) As Integer

[JScript] public override function GetHashCode( ): int;

Description t) IndexOf

[C#] public int IndexOf(Control control);

[C++] public: int IndexOf(Control* control);

[VB] Public Function IndexOf(ByVal control As Control) As Integer

[JScript] public function IndexOf(control: Control): int;

Description

Retrieves the index of the specified control in the control collection.

Return Value: A zero-based index value that represents the position of the specified System.Windows.Forms.Control in the System.Windows.Forms.Control.ControlCollection.

If the control is not found in the collection, the System.Windows.Forms.Control.ControlCollection.IndexOf(System.Windows.Forms.Control) method return value is −1. The System.Windows.Forms.Control to locate in the collection.

u) Remove

[C#] public virtual void Remove(Control value);

[C++] public: virtual void Remove(Control* value);

[VB] Overridable Public Sub Remove(ByVal value As Control)

[JScript] public function Remove(value: Control);

Description

Removes the specified control from the control collection.

When a System.Windows.Forms.Control is removed from the control collection, all subsequent controls are moved up one position in the collection. The System.Windows.Forms.Control to remove from the System.Windows.Forms.Control.ControlCollection.

v) RemoveAt

[C#] public void RemoveAt(int index);

[C++] public: sealed void RemoveAt(int index);

[VB] NotOverridable Public Sub RemoveAt(ByVal index As Integer)

[JScript] public function RemoveAt(index: int);

Description

Removes a control from the control collection at the specified indexed location.

When a System.Windows.Forms.Control is removed from the control collection, all subsequent controls are moved up one position in the collection. The index value of the System.Windows.Forms.Control to remove.

w) SetChildIndex

[C#] public void SetChildIndex(Control child, int newIndex);

[C++] public: void SetChildIndex(Control* child, int newIndex);

[VB] Public Sub SetChildIndex(ByVal child As Control, ByVal newIndex As Integer)

[JScript] public function SetChildIndex(child: Control, newIndex: int);

Description

Sets the index of the specified child control in the collection to the specified index value.

The control with an index value of zero is at the top of the z-order, and higher numbers are closer to the bottom. The child System.Windows.Forms.Control to search for. The new index value of the control.

x) IList.Add

[C#] int IList.Add(object control);

[C++] int IList::Add(Object* control);

[VB] Function Add(ByVal control As Object) As Integer Implements IList.Add

[JScript] function IList.Add(control: Object): int;

y) IList. Contains

[C#] bool IList.Contains(object control);

[C++] bool IList::Contains(Object* control);

[VB] Function Contains(ByVal control As Object) As Boolean Implements List.Contains

[JScript] function IList.Contains(control: Object): Boolean;

z) IList.IndexOf

[C#] int IList.IndexOf(object control);

[C++] int IList::IndexOf(Object* control);

[VB] Function IndexOf(ByVal control As Object) As Integer Implements IList.IndexOf

[JScript] function IList.IndexOf(control: Object): int;

aa) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

bb) IList.Remove

[C#] void IList.Remove(object control);

[C++] void IList::Remove(Object* control);

[VB] Sub Remove(ByVal control As Object) Implements IList.Remove

[JScript] function IList.Remove(control: Object);

cc) ICloneable.Clone

[C#] object ICloneable.Clone( );

[C++] Object* ICloneable::Clone( );

[VB] Function Clone( ) As Object Implements ICloneable.Clone

[JScript] function ICloneable.Clone( ): Object;

MdiClient.ControlCollection class (System.Windows.Forms)

a) ToString

Description

Collection of controls . . .

b) MdiClient.ControlCollection

Example Syntax:

c) ToString

[C#] public MdiClient.ControlCollection(MdiClient owner);

[C++] public: ControlCollection(MdiClient* owner);

[VB] Public Sub New(ByVal owner As MdiClient)

[JScript] public function MdiClient.ControlCollection (owner: MdiClient);

Description d) Count e) IsReadOnly f) Item g) Add

[C#] public override void Add(Control value);

[C++] public: void Add(Control* value);

[VB] Overrides Public Sub Add(ByVal value As Control)

[JScript] public override function Add(value: Control);

Description

Adds a control to the MDI Container. This child must be a Form that is marked as an MDI Child to be added to the container. You should not call this directly, but rather set the child form's (ctl) MDIParent property: //wrong Form child=new ChildForm( ); this.getMdiClient( ).add(child); //right Form child=new ChildForm( ); child.setMdiParent (this); Adds a control to the MDI Container. This child must be a Form that is marked as an MDI Child to be added to the container. You should not call this directly, but rather set the child form's (ctl) MDIParent property: //wrong Form child=new ChildForm( ); this.getMdiClient( ).add(child); //right Form child=new ChildForm( ); child.setMdiParent (this); MdiChild Form to add.

h) Remove

[C#] public override void Remove(Control value);

[C++] public: void Remove(Control* value);

[VB] Overrides Public Sub Remove(ByVal value As Control)

[JScript] public override function Remove(value: Control);

Description

Removes a child control. MDIChild Form to remove.

Form.ControlCollection class (System.Windows.Forms)

a) To String

Description

Represents a collection of controls on the form.

This class represents the collection of controls contained within a form. You can use the System.Windows.Forms. Form.ControlCollection.Add(System.Windows.Forms. ontrol) method to add a control to the form and the System. Windows.Forms.Form.ControlCollection.Remove(System. Windows.Forms.Control) method to remove the method from the form. The control collection represented by this class cannot be created without binding it to a specific form. As a result, you cannot create multiple instances of this control collection and interchange them with an active form to provide different control layouts.

b) Form.ControlCollection

Example Syntax:

c) ToString

[C#] public Form.ControlCollection(Form owner);

[C++] public: ControlCollection(Form* owner);

[VB] Public Sub New(ByVal owner As Form)

[JScript] public function Form.ControlCollection(owner: Form);

Description

Initializes a new instance of the System.Windows.Forms-.Form.ControlCollection class.

This constructor allows you to properly bind the control collection to the form to enable controls to be added to the form. The System.Windows.Forms.Form to contain the controls added to the control collection.

d) Count e) IsReadOnly f) Item g) Add

[C#] public override void Add(Control value);

[C++] public: void Add(Control* value);

[VB] Overrides Public Sub Add(ByVal value As Control)

[JScript] public override function Add(value: Control);

Description

Adds a control to the form.

You can use this method to adds controls to the form. If you want to add a group of already created controls to the form, use the System.Windows.Forms.Control.ControlCollection. AddRange(System.Windows.Forms.Control[ ]) method of the System.Windows.Forms.Control.ControlCollection class. The System.Windows.Forms.Control to add to the form.

h) Remove

[C#] public override void Remove(Control value);

[C++] public: void Remove(Control* value);

[VB] Overrides Public Sub Remove(ByVal value As Control)

[JScript] public override function Remove(value: Control);

Description

Removes a control from the form.

You can use this method to remove controls that you no longer need in your form. If you want to display a control after it is removed, you will need to add the control back to the form using the System.Windows.Forms.Form.ControlCollection.Add(System.Windows.Forms.Control) method. To have a control remain on the form but not displayed, use the System.Windows.Forms.Control.Visible property of the control. A System.Windows.Forms.Control to remove from the form.

ControlEventArgs class (System.Windows.Forms)

a) ToString

Description

Provides data for the System.Windows.Forms.Control.ControlAdded and System.Windows.Forms.Control.ControlRemoved events.

For more information about handling events, see.

b) ControlEventArgs

Example Syntax:

c) ToString

[C#] public ControlEventArgs(Control control);

[C++] public: ControlEventArgs(Control* control);

[VB] Public Sub New(ByVal control As Control)

[JScript] public function ControlEventArgs(control: Control);

Description

Initializes a new instance of the System.Windows.Forms. ControlEventArgs class for the specified control. The System.Windows.Forms.Control to store in this event.

d) Control e) ToString

[C#] public Control Control {get;}

[C++] public: _property Control* get_Control( );

[VB] Public ReadOnly Property Control As Control

[JScript] public function get Control( ): Control;

Description

Gets the control object used by this event.

ControlEventHandler delegate (System.Windows.Forms)

a) ToString

Description

Represents the method that will handle the System.Windows. Forms.Control.ControlAdded and System.Windows.Forms. Control.ControlRemoved events of the System.Windows. Forms.Control class. The source of the event. A System.Windows.Forms.ControlEventArgs that contains the event data.

When you create a System.Windows.Forms.ControlEventArgs delegate, you identify the method that will handle the event. To associate the event with your event handler, add an instance of the delegate to the event. The event handler is called whenever the event occurs, unless you remove the delegate. For more information about event handler delegates, see.

ControlPaint class (System.Windows.Forms)

a) ToString

Description

Provides methods used to paint common Windows controls and their elements.

The methods contained in the System.Windows.Forms.ControlPaint class allow you to draw your own controls or elements of controls. You may control the drawing of your own controls if the System.Windows.Forms.ControlStyles.UserPaint bit is set to true for the control. You can get or set the style bits by calling the System.Windows.Forms.

Control.GetStyle(System.Windows.Forms.ControlStyles) or System.Windows.Forms.Control.SetStyle(System.Windows.Forms.ControlStyles,System.Boolean) methods. You can set multiple style bits for any control. The System.Windows.Forms.ControlStyles enumeration members can be combined with bitwise operations.

b) ContrastControlDark c) ToString

[C#] public static Color ContrastControlDark {get;}

[C++] public: _property static Color get_ContrastControlDark( );

[VB] Public Shared ReadOnly Property ContrastControlDark As Color

[JScript] public static function get ContrastControlDark( ): Color;

Description

Gets the color to use as the System.Drawing.SystemColors.ControlDark color.

If the user has enabled the System.Windows.Forms.SystemInformation.HighContrast mode, this property is set to System.Drawing.SystemColors.WindowFrame; otherwise, it is set to System.Drawing.SystemColors.ControlDark.

d) CreateHBitimap16Bit

[C#] public static IntPtr CreateHBitmap16Bit(Bitmap bitmap, Color background);

[C++] public: static IntPtr CreateHBitmap16Bit(Bitmap* bitmap, Color background);

[VB] Public Shared Function CreateHBitmap16Bit(ByVal bitmap As Bitmap, ByVal background As Color) As IntPtr

[JScript] public static function CreateHBitmap16Bit(bitmap: Bitmap, background Color) IntPtr;

Description e) CreateHBitmapColorMask

[C#] public static IntPtr CreateHBitmapColorMask(Bitmap bitmap, IntPtr monochromeMask);

[C++] public: static IntPtr CreateHBitmapColorMask(Bitmap* bitmap, IntPtr monochromeMask);

[VB] Public Shared Function CreateHBitmapColorMask (ByVal bitmap As Bitmap, ByVal monochromeMask As IntPtr) As IntPtr

[JScript] public static function CreateHBitmapColorMask (bitmap: Bitmap, monochromeMask: IntPtr): IntPtr;

Description

Creates a Win32 HBITMAP out of the image. You are responsible for de-allocating the HBITMAP with Windows.Delete Object(handle). If the image uses transparency, the background will be filled with the specified color.

f) CreateHBitmapTransparencyMask

[C#] public static IntPtr CreateHBitmapTransparencyMask (Bitmap bitmap);

[C++] public: static IntPtr CreateHBitmapTransparencyMask(Bitmap* bitmap);

[VB] Public Shared Function CreateHBitmapTransparencyMask(ByVal bitmap As Bitmap) As IntPtr

[JScript] public static function CreateHBitmapTransparencyMask(bitmap: Bitmap): IntPtr;

Description

Creates a color mask for the specified bitmap that indicates which color should be displayed as transparent.

Return Value: The handle to the System.Drawing.Bitmap mask.

You are responsible for de-allocating the bitmap with Windows.DeleteObject(handle). The System.Drawing.Bitmap to create the trancparency mask for.

g) Dark

[C#] public static Color Dark(Color baseColor);

[C++] public: static Color Dark(Color baseColor);

[VB] Public Shared Function Dark(ByVal baseColor As Color) As Color

[JScript] public static function Dark(baseColor: Color): Color;

Description

Creates a new dark color object for the control from the specified color.

Return Value: A System.Drawing.Color that represents the dark color on the control.

If the specified System.Drawing.Color is one of the System.Drawing.SystemColors, the color is converted to a System.Drawing.SystemColors.ControlDark color; otherwise, the color's luminosity value is decreased. The System.Drawing.Color to be darkened.

h) Dark

[C#] public static Color Dark(Color baseColor, float percOfDarkDark);

[C++] public: static Color Dark(Color baseColor, float perc OfDarkDark);

[VB] Public Shared Function Dark(ByVal baseColor As Color, ByVal percOfDarkDark As Single) As Color

[JScript] public static function Dark(baseColor: Color, perc OfDarkDark: float) Color; Creates a new dark color object for the control.

Description

Creates a new dark color object for the control from the specified color and darkens it by the specified percentage.

Return Value: A System.Drawing.Color that represent the dark color on the control.

If the specified System.Drawing.Color is one of the System.Drawing.SystemColors, the color is converted to a System.Drawing.SystemColors.ControlDark color; otherwise, the color's luminosity value is decreased. The System.Drawing.Color to be darkened. The percentage to darken the specified System.Drawing.Color.

i) DarkDark

[C#] public static Color DarkDark(Color baseColor);

[C++] public: static Color DarkDark(Color baseColor);

[VB] Public Shared Function DarkDark(ByVal baseColor As Color) As Color

[JScript] public static function DarkDark(baseColor: Color): Color;

Description

Creates a new dark color object for the control from the specified color.

Return Value: A System.Drawing.Color that represents the dark color on the control.

If the specified System.Drawing.Color is one of the System.Drawing.SystemColors, the color is converted to the System.Drawing.SystemColors.ControlDarkDark color; otherwise, the color's luminosity value is increased. The System.Drawing.Color to be darkened.

j) DrawBorder

[C#] public static void DrawBorder(Graphics graphics, Rectangle bounds, Color color, ButtonBorderStyle style);

[C++] public: static void DrawBorder(Graphics* graphics, Rectangle bounds, Color color, ButtonBorderStyle style);

[VB] Public Shared Sub DrawBorder(ByVal graphics As Graphics, ByVal bounds As Rectangle, ByVal color As Color, ByVal style As ButtonBorderStyle)

[JScript] public static function DrawBorder(graphics: Graphics, bounds: Rectangle, color: Color, style: ButtonBorderStyle); Draws a border on a button-style control.

Description

Draws a border with the specified style and color, on the specified graphics surface, and within the specified bounds on a button-style control. The System.Drawing.Graphics object to draw on. The System.Drawing.Rectangle that represents the dimensions of the border. The System.Drawing.Color of the border. The System.Windows.Forms.ButtonBorderStyle of the border.

k) DrawBorder

[C#] public static void DrawBorder(Graphics graphics, Rectangle bounds, Color leftColor, int leftWidth, ButtonBorderStyle leftStyle, Color topColor, int topWidth, ButtonBorderStyle topStyle, Color rightColor, int rightWidth, ButtonBorderStyle rightStyle, Color bottomColor, int bottomWidth, ButtonBorderStyle bottomStyle);

[C++] public: static void DrawBorder(Graphics* graphics, Rectangle bounds, Color leftColor, int leftWidth, ButtonBorderStyle leftStyle, Color topColor, int topWidth, ButtonBorderStyle topStyle, Color rightColor, int rightWidth, ButtonBorderStyle rightStyle, Color bottomColor, int bottomWidth, ButtonBorderStyle bottomStyle);

[VB] Public Shared Sub DrawBorder(ByVal graphics As Graphics, ByVal bounds As Rectangle, ByVal leftColor As Color, ByVal leftWidth As Integer, ByVal leftStyle As ButtonBorderStyle, ByVal topColor As Color, ByVal topWidth As Integer, ByVal topStyle As ButtonBorderStyle, ByVal rightColor As Color, ByVal rightWidth As Integer, ByVal rightStyle As ButtonBorderStyle, ByVal bottomColor As Color, ByVal bottomWidth As Integer, ByVal bottomStyle As ButtonBorderStyle)

[JScript] public static function DrawBorder(graphics: Graphics, bounds: Rectangle, leftColor: Color, leftWidth: int, leftStyle: ButtonBorderStyle, topColor: Color, topWidth: int, topStyle: ButtonBorderStyle, rightColor: Color, rightWidth: int, rightStyle: ButtonBorderStyle, bottomColor: Color, bottomWidth: int, bottomStyle: ButtonBorderStyle);

Description

Draws a border on a button-style control with the specified styles, colors, and border widths, on the specified graphics surface, and within the specified bounds. The System.Drawing.Graphics object to draw on. The System.Drawing.Rectangle that represents the dimensions of the border. The System.Drawing.Color of the left of the border. The System.Drawing.Pen.Width of the left border. The System.Windows.Forms.ButtonBorderStyle of the left border. The System.Drawing.Color of the top of the border. The System.Drawing.Pen.Width of the top border. The System.Windows.Forms.ButtonBorderStyle of the top border. The System.Drawing.Color of the right of the border. The System.Drawing.Pen.Width of the right border. The System. Windows.Forms.ButtonBorderStyle of the right border. The System.Drawing.Color of the bottom of the border. The System.Drawing.Pen.Width of the left border. The System. Windows.Forms.ButtonBorderStyle of the bottom border.

l) DrawBorder3D

[C#] public static void DrawBorder3D(Graphics graphics, Rectangle rectangle);

[C++] public: static void DrawBorder3D(Graphics* graphics, Rectangle rectangle);

[VB] Public Shared Sub DrawBorder3D(ByVal graphics As Graphics, ByVal rectangle As Rectangle)

[JScript] public static function DrawBorder3D(graphics: Graphics, rectangle Rectangle); Draws a three-dimensional style border on a control.

Description

Draws a three-dimensional style border on the specified graphics surface and within the specified bounds on a control.

The System.Windows.Forms.Border3DStyle.Etched style is used by default to draw the border. The System.Drawing.Graphics object to draw on. The System.Drawing.Rectangle that represents the dimensions of the border.

m) DrawBorder3D

[C#] public static void DrawBorder3D(Graphics graphics, Rectangle rectangle, Border3DStyle style);

[C++] public: static void DrawBorder3D(Graphics* graphics, Rectangle rectangle, Border3DStyle style);

[VB] Public Shared Sub DrawBorder3D(ByVal graphics As Graphics, ByVal rectangle As Rectangle, ByVal style As Border3DStyle)

[JScript] public static function DrawBorder3D(graphics: Graphics, rectangle Rectangle, style Border3DStyle);

Description

Draws a three-dimensional style border with the specified style, on the specified graphics surface, and within the specified bounds on a control. The System.Drawing.Graphics object to draw on. The System.Drawing.Rectangle that represents the dimensions of the border. The System.Windows.Forms.Border3DStyle to use when drawing the border.

n) DrawBorder3D

[C#] public static void DrawBorder3D(Graphics graphics, Rectangle rectangle, Border3DStyle style, Border3DSide sides);

[C++] public: static void DrawBorder3D(Graphics* graphics, Rectangle rectangle, Border3DStyle style, Border3DSide sides);

[VB] Public Shared Sub DrawBorder3D(ByVal graphics As Graphics, ByVal rectangle As Rectangle, ByVal style As Border3DStyle, ByVal sides As Border3DSide)

[JScript] public static function DrawBorder3D(graphics: Graphics, rectangle: Rectangle, style: Border3DStyle, sides: Border3DSide);

Description

Draws a three-dimensional style border with the specified style, on the specified graphics surface and sides, and within the specified bounds on a control. The System.Drawing. Graphics object to draw on. The System.Drawing.Rectangle that represents the dimensions of the border. The System.Windows.Forms.Border3DStyle to use when drawing the border. The System.Windows.Forms.Border3DSide of the rectangle to draw the border on.

o) DrawBorder3D

[C#] public static void DrawBorder3D(Graphics graphics, int x, int y, int width, int height);

[C++] public: static void DrawBorder3D(Graphics* graphics, int x, int y, int width, int height);

[VB] Public Shared Sub DrawBorder3D(ByVal graphics As Graphics, ByVal x As Integer, ByVal y As Integer, ByVal width As Integer, ByVal height As Integer)

[JScript] public static function DrawBorder3D(graphics: Graphics, x: int, y: int, width int, height: int);

Description

Draws a three-dimensional style border on the specified graphics surface and within the specified bounds on a control.

The System.Windows.Forms.Border3DStyle.Etched style is used by default to draw the border. The System.Drawing. Graphics object to draw on. The System.Drawing.Rectangle.X coordinate of the top left of the border rectangle. The System.Drawing.Rectangle.Y coordinate of the top left of the border rectangle. The System.Drawing.Rectangle.Width of the border rectangle. The System.Drawing.Rectangle.Height of the border rectangle.

p) DrawBorder3D

[C#] public static void DrawBorder3D(Graphics graphics, int x, int y, int width, int height, Border3DStyle style);

[C++] public: static void DrawBorder3D(Graphics* graphics, int x, int y, int width, int height, Border3DStyle style);

[VB] Public Shared Sub DrawBorder3D(ByVal graphics As Graphics, ByVal x As Integer, ByVal y As Integer, ByVal width As Integer, ByVal height As Integer, ByVal style As Border3DStyle)

[JScript] public static function DrawBorder3D(graphics: Graphics, x: int, y: int, width: int, height: int, style: Border3DStyle);

Description

Draws a three-dimensional style border with the specified style, on the specified graphics surface, and within the specified bounds on a control. The System.Drawing.Graphics object to draw on. The System.Drawing.Rectangle.X coordinate of the top left of the border rectangle. The System.Drawing.Rectangle.Y coordinate of the top left of the border rectangle. The System.Drawing.Rectangle.Width of the border rectangle. The System.Drawing.Rectangle.Height of the border rectangle. The System.Windows.Forms.Border3DStyle to use when drawing the border.

q) DrawBorder3D

[C#] public static void DrawBorder3D(Graphics graphics, int x, int y, int width, int height, Border3DStyle style, Border3DSide sides);

[C++] public: static void DrawBorder3D(Graphics* graphics, int x, int y, int width, int height, Border3DStyle style, Border3DSide sides);

[VB] Public Shared Sub DrawBorder3D(ByVal graphics As Graphics, ByVal x As Integer, ByVal y As Integer, ByVal width As Integer, ByVal height As Integer, ByVal style As Border3DStyle, ByVal sides As Border3DSide)

[JScript] public static function DrawBorder3D(graphics: Graphics, x: it, y: int, width: int, height: int, style: Border3DStyle, sides: Border3DSide);

Description

Draws a three-dimensional style border with the specified style, on the specified graphics surface and side, and within the specified bounds on a control. The System.Drawing. Graphics object to draw on. The System.Drawing.Rectangle.X coordinate of the top left of the border rectangle. The System.Drawing.Rectangle.Y coordinate of the top left of the border rectangle. The System.Drawing.Rectangle.Width of the border rectangle. The System.Drawing.Rectangle.Height of the border rectangle. The System. Windows.Forms.Border3DStyle to use when drawing the border. The System.Windows.Forms.Border3DSide of the rectangle to draw the border on.

r) DrawButton

[C#] public static void DrawButton(Graphics graphics, Rectangle rectangle, ButtonState state);

[C++] public: static void DrawButton(Graphics* graphics, Rectangle rectangle, ButtonState state);

[VB] Public Shared Sub DrawButton(ByVal graphics As Graphics, ByVal rectangle As Rectangle, ByVal state As ButtonState)

[JScript] public static function DrawButton(graphics: Graphics, rectangle: Rectangle, state: ButtonState); Draws a button control.

Description

Draws a button control in the specified state, on the specified graphics surface, and within the specified bounds. The System.Drawing.Graphics object to draw on. The System.Drawing.Rectangle that represents the dimensions of the button. The System.Windows.Forms.ButtonState to draw the button in.

s) DrawButton

[C#] public static void DrawButton(Graphics graphics, int x, int y, int width, int height, ButtonState state);

[C++] public: static void DrawButton(Graphics* graphics, int x, int y, int width, int height, ButtonState state);

[VB] Public Shared Sub DrawButton(ByVal graphics As Graphics, ByVal x As Integer, ByVal y As Integer, ByVal width As Integer, ByVal height As Integer, ByVal state As ButtonState)

[JScript] public static function DrawButton(graphics: Graphics, x: int, y: int, width: int, height: int, state: ButtonState);

Description

Draws a button control in the specified state, on the specified graphics surface, and within the specified bounds. The System.Drawing.Graphics object to draw on. The System.Drawing.Rectangle.X coordinate of the upper left corner of the drawing rectangle. The System.Drawing.Rectangle.Y coordinate of the upper left corner of the drawing rectangle. The System.Drawing.Rectangle.Width of the button. The System.Drawing.Rectangle.Height of the button. The System.Windows.Forms.ButtonState to the button in.

t) DrawCaptionButton

[C#] public static void DrawCaptionButton(Graphics graphics, Rectangle rectangle, CaptionButton button, ButtonState state);

[C++] public: static void DrawCaptionButton(Graphics* graphics, Rectangle rectangle, CaptionButton button, ButtonState state);

[VB] Public Shared Sub DrawCaptionButton(ByVal graphics As Graphics, ByVal rectangle As Rectangle, ByVal button As CaptionButton, ByVal state As ButtonState)

[JScript] public static function DrawCaptionButton(graphics: Graphics, rectangle Rectangle, button: CaptionButton, state: ButtonState); Draws a caption button control.

Description

Draws the specified caption button control in the specified state, on the specified graphics surface, and within the specified bounds. The System.Drawing.Graphics object to draw on. The System.Drawing.Rectangle that represents the dimensions of the caption button. The System.Windows.Forms.CaptionButton to draw. The System.Windows.Forms.ButtonState to draw the caption button in.

u) DrawCaptionButton

[C#] public static void DrawCaptionButton(Graphics graphics, int x, int y, int width, int height, CaptionButton button, ButtonState state);

[C++] public: static void DrawCaptionButton(Graphics* graphics, int x, int y, int width, int height, CaptionButton button, ButtonState state);

[VB] Public Shared Sub DrawCaptionButton(ByVal graphics As Graphics, ByVal x As Integer, ByVal y As Integer, ByVal width As Integer, ByVal height As Integer, ByVal button As CaptionButton, ByVal state As ButtonState)

[JScript] public static function DrawCaptionButton(graphics: Graphics, x: int, y: int, width: int, height: int, button: CaptionButton, state: ButtonState);

Description

Draws the specified caption button control in the specified state, on the specified graphics surface, and within the specified bounds. The System.Drawing.Graphics object to draw on. The System.Drawing.Rectangle.X coordinate of the top left of the drawing rectangle. The System.Drawing.Rectangle.Y coordinate of the top left of the drawing rectangle. The System.Drawing.Rectangle.Width of the drawing rectangle. The System.Drawing.Rectangle.Height of the drawing rectangle. The System.Windows.Forms.CaptionButton to draw. The System.Windows.Forms.ButtonState to draw the caption button in.

v) DrawCheckBox

[C#] public static void DrawCheckBox(Graphics graphics, Rectangle rectangle, ButtonState state);

[C++] public: static void DrawCheckBox(Graphics* graphics, Rectangle rectangle, ButtonState state);

[VB] Public Shared Sub DrawCheckBox(ByVal graphics As Graphics, ByVal rectangle As Rectangle, ByVal state As ButtonState)

[JScript] public static function DrawCheckBox(graphics: Graphics, rectangle: Rectangle, state: BuffonState); Draws a check box control.

Description

Draws a check box control in the specified state, on the specified graphics surface, and within the specified bounds. The System.Drawing.Graphics object to draw on. The System.Drawing.Rectangle that represents the dimensions of the check box. The System.Windows.Forms.ButtonState to draw the check box in.

w) DrawCheckBox

[C#] public static void DrawCheckBox(Graphics graphics, int x, int y, int width, int height, ButtonState state);

[C++] public: static void DrawCheckBox(Graphics* graphics, int x, int y, int width, int height, ButtonState state);

[VB] Public Shared Sub DrawCheckBox(ByVal graphics As Graphics, ByVal x As Integer, ByVal y As Integer, ByVal width As Integer, ByVal height As Integer, ByVal state As ButtonState)

[JScript] public static function DrawCheckBox(graphics: Graphics, x: int, y: int, width: int, height: int, state: ButtonState);

Description

Draws a check box control in the specified state, on the specified graphics surface, and within the specified bounds. The System.Drawing.Graphics object to draw on. The System.Drawing.Rectangle.X coordinate of the upper left corner of the drawing rectangle. The System.Drawing.Rectangle.Y coordinate of the upper left corner of the drawing rectangle. The System.Drawing.Rectangle.Width of the check box. The System.Drawing.Rectangle.Height of the check box. The System.Windows.Forms.ButtonState to draw the check box in.

x) DrawComboButton

[C#] public static void DrawComboButton(Graphics graphics, Rectangle rectangle, ButtonState state);

[C++] public: static void DrawComboButton(Graphics* graphics, Rectangle rectangle, ButtonState state);

[VB] Public Shared Sub DrawComboButton(ByVal graphics As Graphics, ByVal rectangle As Rectangle, ByVal state As ButtonState)

[JScript] public static function DrawComboButton(graphics: Graphics, rectangle: Rectangle, state: ButtonState); Draws a drop-down button on a combo box control.

Description

Draws a drop-down button on a combo box control in the specified state, on the specified graphics surface, and within the specified bounds. The System.Drawing.Graphics object to draw on. The System.Drawing.Rectangle that represents the dimensions of the combo box. The System.Windows.Forms.ButtonState to draw the combo box in.

y) DrawComboButton

[C#] public static void DrawComboButton(Graphics graphics, int x, int y, int width, int height, ButtonState state);

[C++] public: static void DrawComboButton(Graphics* graphics, int x, int y, int width, int height, ButtonState state);

[VB] Public Shared Sub DrawComboButton(ByVal graphics As Graphics, ByVal x As Integer, ByVal y As Integer, ByVal width As Integer, ByVal height As Integer, ByVal state As ButtonState)

[JScript] public static function DrawComboButton(graphics: Graphics, x: int, y: int, width: int, height: int, state: ButtonState);

Description

Draws a drop-down button on a combo box control in the specified state, on the specified graphics surface, and within the specified bounds. The System.Drawing.Graphics object to draw on. The System.Drawing.Rectangle.X coordinate of the top left of the border rectangle. The System.Drawing.Rectangle.Y coordinate of the top left of the border rectangle. The System.Windows.Forms.Control.Width of the combo box. The System.Windows.Forms.Control.Height of the combo box. The System.Windows.Forms.ButtonState to draw the combo box in.

z) DrawContainerGrabHandle

[C#] public static void DrawContainerGrabHandle(Graphics graphics, Rectangle bounds);

[C++] public: static void DrawContainerGrabHandle(Graphics* graphics, Rectangle bounds);

[VB] Public Shared Sub DrawContainerGrabHandle(ByVal graphics As Graphics, ByVal bounds As Rectangle)

[JScript] public static function DrawContainerGrabHandle (graphics: Graphics, bounds: Rectangle);

Description

Draws a container control grab handle glyph on the specified graphics surface and within the specified bounds.

Grab handles are used by containers to indicate to the user that the user can directly manipulate the containers. The manipulation can consist of actions such as sizing and moving. The System.Drawing.Graphics object to draw on. The System.Drawing.Rectangle that represents the dimensions of the grab handle glyph.

aa) DrawFocusRectangle

[C#] public static void DrawFocusRectangle(Graphics graphics, Rectangle rectangle);

[C++] public: static void DrawFocusRectangle(Graphics* graphics, Rectangle rectangle);

[VB] Public Shared Sub DrawFocusRectangle(ByVal graphics As Graphics, ByVal rectangle As Rectangle)

[JScript] public static function DrawFocusRectangle(graphics: Graphics, rectangle: Rectangle); Draws a focus rectangle.

Description

Draws a focus rectangle on the specified graphics surface and within the specified bounds.

A focus rectangle is a dotted rectangle that Windows uses to indicate what control has the current keyboard focus. The System.Drawing.Graphics object to draw on. The System.Drawing.Rectangle that represents the dimensions of the grab handle glyph.

bb) DrawFocusRectangle

[C#] public static void DrawFocusRectangle(Graphics graphics, Rectangle rectangle, Color foreColor, Color backColor);

[C++] public: static void DrawFocusRectangle(Graphics* graphics, Rectangle rectangle, Color foreColor, Color backColor);

[VB] Public Shared Sub DrawFocusRectangle(ByVal graphics As Graphics, ByVal rectangle As Rectangle, ByVal foreColor As Color, ByVal backColor As Color)

[JScript] public static function DrawFocusRectangle(graphics: Graphics, rectangle: Rectangle, foreColor: Color, backColor: Color);

Description

Draws a focus rectangle on the specified graphics surface and within the specified bounds.

A focus rectangle is a dotted rectangle that Windows uses to indicate what control has the current keyboard focus. The System.Drawing.Graphics object to draw on. The System.Drawing.Rectangle that represents the dimensions of the grab handle glyph. The System.Windows.Forms.Control. ForeColor of the object to draw the focus rectangle on. The System.Windows.Forms.Control.BackColor of the object to draw the focus rectangle on.

cc) DrawGrabHandle

[C#] public static void DrawGrabHandle(Graphics graphics, Rectangle rectangle, bool primary, bool enabled);

[C++] public: static void DrawGrabHandle(Graphics* graphics, Rectangle rectangle, bool primary, bool enabled);

[VB] Public Shared Sub DrawGrabHandle(ByVal graphics As Graphics, ByVal rectangle As Rectangle, ByVal primary As Boolean, ByVal enabled As Boolean)

[JScript] public static function DrawGrabHandle(graphics: Graphics, rectangle: Rectangle, primary: Boolean, enabled: Boolean);

Description

Draws a standard selection grab handle glyph on the specified graphics surface, within the specified bounds, and in the specified state and style. Grab handles are used by objects to indicate to the user that the user can directly manipulate the object. The manipulation can consist of actions such as sizing and moving. The System.Drawing.Graphics object to draw on. The System.Drawing.Rectangle that represents the dimensions of the grab handle glyph. true to draw the handle as a primary grab handle; otherwise, false. true to draw the handle in an enabled state; otherwise, false.

dd) DrawGrid

[C#] public static void DrawGrid(Graphics graphics, Rectangle area, Size pixelsBetweenDots, Color backColor);

[C++] public: static void DrawGrid(Graphics* graphics, Rectangle area, Size pixelsBetweenDots, Color backColor);

[VB] Public Shared Sub DrawGrid(ByVal graphics As Graphics, ByVal area As Rectangle, ByVal pixelsBetweenDots As Size, ByVal backColor As Color)

[JScript] public static function DrawGrid(graphics: Graphics, area: Rectangle, pixelsBetweenDots: Size, backColor: Color);

Description

Draws a grid of one-pixel dots with the specified spacing, within the specified bounds, on the specified graphics surface, and in the specified color.

The backColor parameter is used to calculate the fill color of the dots so that the grid is always visible against the background. The System.Drawing.Graphics object to draw on. The System.Drawing.Rectangle that represents the dimensions of the grab handle glyph. The System.Drawing.Size. Height and System.Drawing.Size.Width between the dots of the grid. The System.Drawing.Color of the background behind the grid.

ee) DrawImageDisabled

[C#] public static void DrawImageDisabled(Graphics graphics, Image image, int x, int y, Color background);

[C++] public: static void DrawImageDisabled(Graphics* graphics, Image* image, int x, int y, Color background);

[VB] Public Shared Sub DrawImageDisabled(ByVal graphics As Graphics, ByVal image As Image, ByVal x As Integer, ByVal y As Integer, ByVal background As Color)

[JScript] public static function DrawImageDisabled(graphics: Graphics, image: Image, x int, y: int, background: Color);

Description

Draws the specified image in a disabled state.

The background parameter is used to calculate the fill color of the disabled image so that it is always visible against the background. The System.Drawing.Graphics object to draw on. The System.Drawing.Image to draw. The System.Drawing.Rectangle.X coordinate of the top left of the border image. The System.Drawing.Rectangle.Y coordinate of the top left of the border image. The System.Drawing.Color of the background behind the image.

ff) DrawLockedErame

[C#] public static void DrawLockedFrame(Graphics graphics, Rectangle rectangle, bool primary);

[C++] public: static void DrawLockedFrame(Graphics* graphics, Rectangle rectangle, bool primary);

[VB] Public Shared Sub DrawLockedFrame(ByVal graphics As Graphics, ByVal rectangle As Rectangle, ByVal primary As Boolean)

[JScript] public static function DrawLockedFrame(graphics: Graphics, rectangle: Rectangle, primary Boolean);

Description

Draws a locked selection frame on the screen within the specified bounds and on the specified graphics surface. Specifies whether to draw the frame with the primary selected colors. The System.Drawing.Graphics object to draw on. The System.Drawing.Rectangle that represents the dimensions of the frame. true to draw this frame with the colors used for the primary selection; otherwise, false.

gg) DrawMenuGlyph

[C#] public static void DrawMenuGlyph(Graphics graphics, Rectangle rectangle, MenuGlyph glyph);

[C++] public: static void DrawMenuGlyph(Graphics* graphics, Rectangle rectangle, MenuGlyph glyph);

[VB] Public Shared Sub DrawMenuGlyph(ByVal graphics As Graphics, ByVal rectangle As Rectangle, ByVal glyph As MenuGlyph)

[JScript] public static function DrawMenuGlyph(graphics: Graphics, rectangle Rectangle, glyph: MenuGlyph); Draws a menu glyph on a menu item control.

Description

Draws the specified menu glyph on a menu item control within the specified bounds and on the specified surface.

When owner-drawing System.Windows.Forms.MenuItem controls, you need to verify property values to determine the correct glyph to draw or remove. For example, when the System.Windows.Forms.MenuItem.Checked property is set to true, you need to draw a System.Windows.Forms.MenuGlyph.Checkmark glyph on the System.Windows.Forms.MenuItem. The System.Drawing.Graphics object to draw on. The System.Drawing.Rectangle that represents the dimensions of the glyph. The System.Windows.Forms.MenuGlyph to draw.

hh) DrawMenuGlyph

[C#] public static void DrawMenuGlyph(Graphics graphics, int x, int y, int width, int height, MenuGlyph glyph);

[C++] public: static void DrawMenuGlyph(Graphics* graphics, int x, int y, int width, int height, MenuGlyph glyph);

[VB] Public Shared Sub DrawMenuGlyph(ByVal graphics As Graphics, ByVal x As Integer, ByVal y As Integer, ByVal width As Integer, ByVal height As Integer, ByVal glyph As MenuGlyph)

[JScript] public static function DrawMenuGlyph(graphics: Graphics, x: int, y: int, width: int, height: int, glyph: MenuGlyph);

Description

Draws the specified menu glyph on a menu item control with the specified bounds and on the specified surface.

When owner-drawing System.Windows.Forms.MenuItem controls, you need to verify property values to determine the correct glyph to draw or remove. For example, when the System.Windows.Forms.MenuItem.Checked property is set to true, you need to draw a System.Windows.Forms.MenuGlyph.Checkmark glyph on the System.Windows.Forms.MenuItem. The System.Drawing.Graphics object to draw on. The System.Drawing.Rectangle.X coordinate of the upper left corner of the drawing rectangle. The System.Drawing.Rectangle.Y coordinate of the upper left corner of the drawing rectangle. The System.Drawing.Rectangle.Width of the menu glyph. The System.Drawing.Rectangle.Height of the menu glyph. The System.Windows.Forms.MenuGlyph to draw.

ii) DrawMixedCheckBox

[C#] public static void DrawMixedCheckBox(Graphics graphics, Rectangle rectangle, BuftonState state);

[C++] public: static void DrawMixedCheckBox(Graphics* graphics, Rectangle rectangle, ButtonState state);

[VB] Public Shared Sub DrawMixedCheckBox(ByVal graphics As Graphics, ByVal rectangle As Rectangle, ByVal state As ButtonState)

[JScript] public static function DrawMixedCheckBox(graphics: Graphics, rectangle: Rectangle, state: BuftonState); Draws a three-state check box control.

Description

Draws a three-state check box control in the specified state, on the specified graphics surface, and within the specified bounds. The System.Drawing.Graphics object to draw on. The System.Drawing.Rectangle that represents the dimensions of the check box. The System.Windows.Forms.ButtonState to draw the check box in.

jj) DrawMixedCheckBox

[C#] public static void DrawMixedCheckBox(Graphics graphics, int x, int y, int width, int height, ButtonState state);

[C++] public: static void DrawMixedCheckBox(Graphics* graphics, int x, int y, int width, int height, ButtonState state);

[VB] Public Shared Sub DrawMixedCheckBox(ByVal graphics As Graphics, ByVal x As Integer, ByVal y As Integer, ByVal width As Integer, ByVal height As Integer, ByVal state As ButtonState)

[JScript] public static function DrawMixedCheckBox(graphics: Graphics, x: int, y: int, width int, height int, state ButtonState);

Description

Draws a three-state check box control in the specified state, on the specified graphics surface, and within the specified bounds. The System.Drawing.Graphics object to draw on. The System.Drawing.Rectangle.X coordinate of the upper left corner of the drawing rectangle. The System.Drawing.Rectangle.Y coordinate of the upper left corner of the drawing rectangle. The System.Drawing.Rectangle.Width of the check box. The System.Drawing.Rectangle.Height of the check box. The System.Windows.Forms.ButtonState to draw the check box in.

kk) DrawRadioButton

[C#] public static void DrawRadioButton(Graphics graphics, Rectangle rectangle, ButtonState state);

[C++] public: static void DrawRadioButton(Graphics* graphics, Rectangle rectangle, ButtonState state);

[VB] Public Shared Sub DrawRadioButton(ByVal graphics As Graphics, ByVal rectangle As Rectangle, ByVal state As ButtonState)

[JScript] public static function DrawRadioButton(graphics: Graphics, rectangle Rectangle, state: ButtonState); Draws a radio button control.

Description

Draws a radio button control in the specified state, on the specified graphics surface, and within the specified bounds. The System.Drawing.Graphics object to draw on. The System.Drawing.Rectangle that represents the dimensions of the radio button. The System.Windows.Forms.ButtonState to draw the radio button in.

ll) DrawRadioButton

[C#] public static void DrawRadioButton(Graphics graphics, int x, int y, int width, int height, ButtonState state);

[C++] public: static void DrawRadioButton(Graphics* graphics, int x, int y, int width, int height, ButtonState state);

[VB] Public Shared Sub DrawRadioButton(ByVal graphics As Graphics, ByVal x As Integer, ByVal y As Integer, ByVal width As Integer, ByVal height As Integer, ByVal state As ButtonState)

[JScript] public static function DrawRadioButton(graphics: Graphics, x: int, y: int, width: int, height: int, state: ButtonState);

Description

Draws a radio button control in the specified state, on the specified graphics surface, and within the specified bounds. The System.Drawing.Graphics object to draw on. The System.Drawing.Rectangle.X coordinate of the upper left corner of the drawing rectangle. The System.Drawing.Rectangle.Y coordinate of the upper left corner of the drawing rectangle. The System.Windows.Forms.Control.Width of the radio button. The System.Windows.Forms.Control.Height of the radio button. The System.Windows.Forms.ButtonState to draw the radio button in.

mm) DrawReversibleFrame

[C#] public static void DrawReversibleFrame(Rectangle rectangle, Color backColor, FrameStyle style);

[C++] public: static void DrawReversibleFrame(Rectangle rectangle, Color backColor, FrameStyle style);

[VB] Public Shared Sub DrawReversibleFrame(ByVal rectangle As Rectangle, ByVal backColor As Color, ByVal style As FrameStyle)

[JScript] public static function DrawReversibleFrame(rectangle: Rectangle, backColor: Color, style: FrameStyle);

Description

Draws a reversible frame on the screen within the specified bounds, with the specified background color, and in the specified state.

The backColor parameter is used to calculate the fill color of the frame so that it is always visible against the background. The System.Drawing.Rectangle that represents the dimensions of the rectangle to draw, in screen coordinates. The System.Drawing.Color of the background behind the frame. The System.Windows.Forms.FrameStyle of the frame.

nn) DrawReversibleLine

[C#] public static void DrawReversibleLine(Point start, Point end, Color backColor);

[C++] public: static void DrawReversibleLine(Point start, Point end, Color backColor);

[VB] Public Shared Sub DrawReversibleLine(ByVal start As Point, ByVal end As Point, ByVal backColor As Color)

[JScript] public static function DrawReversibleLine(start: Point, end: Point, backColor Color);

Description

Draws a reversible line on the screen within the specified starting and ending points and with the specified background color.

The backcolor parameter is used to calculate the fill color of the line so that it is always visible against the background. The starting System.Drawing.Point of the line, in screen coordinates. The ending System.Drawing.Point of the line, in screen coordinates. The System.Drawing.Color of the background behind the line.

oo) DrawScrollButton

[C#] public static void DrawScrollButton(Graphics graphics, Rectangle rectangle, ScrollButton button, ButtonState state);

[C++] public: static void DrawScrollButton(Graphics* graphics, Rectangle rectangle, ScrollButton button, ButtonState state);

[VB] Public Shared Sub DrawScrollButton(ByVal graphics As Graphics, ByVal rectangle As Rectangle, ByVal button As ScrollButton, ByVal state As ButtonState)

[JScript] public static function DrawScrollButton(graphics: Graphics, rectangle: Rectangle, button: ScrollButton, state: ButtonState); Draws a scroll button on a scroll bar control.

Description

Draws the specified scroll button on a scroll bar control in the specified state, on the specified graphics surface, and within the specified bounds. The System.Drawing.Graphics object to draw on. The System.Drawing.Rectangle that represents the dimensions of the glyph. The System.Windows.Forms.ScrollButton to draw. The System.Windows.Forms.ButtonState that represents the state to draw the scroll button in.

pp) DrawScrollButton

[C#] public static void DrawScrollButton(Graphics graphics, int x, int y, int width, int height, ScrollButton button, ButtonState state);

[C++] public: static void DrawScrollButton(Graphics* graphics, int x, int y, int width, int height, ScrollButton button, ButtonState state);

[VB] Public Shared Sub DrawScrollButton(ByVal graphics As Graphics, ByVal x As Integer, ByVal y As Integer, ByVal width As Integer, ByVal height As Integer, ByVal button As ScrollButton, ByVal state As ButtonState)

[JScript] public static function DrawScrollButton(graphics: Graphics, x: int, y: int, width: int, height: int, button: ScrollButton, state: ButtonState);

Description

Draws the specified scroll button on a scroll bar control in the specified state, on the specified graphics surface, and within the specified bounds. The System.Drawing.Graphics object to draw on. The System.Drawing.Rectangle.X coordinate of the upper left corner of the drawing rectangle. The System.Drawing.Rectangle.Y coordinate of the upper left corner of the drawing rectangle. The System.Drawing.Rectangle.Width of the scroll button. The System.Drawing.Rectangle.Height of the scroll button. The System.Windows.Forms.ScrollButton to draw. The System.Windows.Forms.ButtonState that represents the state to draw the scroll button in.

qq) DrawSelectionFrame

[C#] public static void DrawSelectionFrame(Graphics graphics, bool active, Rectangle outsideRect, Rectangle inside Rect, Color backColor);

[C++] public: static void DrawSelectionFrame(Graphics* graphics, bool active, Rectangle outsideRect, Rectangle insideRect, Color backColor);

[VB] Public Shared Sub DrawSelectionFrame(ByVal graphics As Graphics, ByVal active As Boolean, ByVal outsideRect As Rectangle, ByVal insideRect As Rectangle, ByVal backColor As Color)

[JScript] public static function DrawSelectionFrame(graphics: Graphics, active: Boolean, outsideRect: Rectangle, inside Rect: Rectangle, backColor: Color);

Description

Draws a standard selection frame in the specified state, on the specified graphics surface, with the specified inner and outer dimensions, and with the specified background color.

A selection frame is a frame that is drawn around a selected component at design-time. The System.Drawing.Graphics object to draw on. true to draw the selection frame in an active state; otherwise, false. The System.Drawing.Rectangle that represents the outer boundary of the selection frame. The System.Drawing.Rectangle that represents the inner boundary of the selection frame. The System.Drawing.Color of the background behind the frame.

rr) DrawSizeGrip

[C#] public static void DrawSizeGrip(Graphics graphics, Color backColor, Rectangle bounds);

[C++] public: static void DrawSizeGrip(Graphics* graphics, Color backColor, Rectangle bounds);

[VB] Public Shared Sub DrawSizeGrip(ByVal graphics As Graphics, ByVal backColor As Color, ByVal bounds As Rectangle)

[JScript] public static function DrawSizeGrip(graphics: Graphics, backColor: Color, bounds: Rectangle); Draws a size grip on a form.

Description

Draws a size grip on a form with the specified bounds and background color and on the specified graphics surface.

The backColor parameter is used to calculate the color of the size grip so that it is always visible against the background. The System.Drawing.Graphics object to draw on. The System.Drawing.Color of the background used to determine the colors of the size grip. The System.Drawing.Rectangle that represents the dimensions of the size grip.

ss) DrawSizeGrip

[C#] public static void DrawSizeGrip(Graphics graphics, Color backColor, int x, int y, int width, int height);

[C++] public: static void DrawSizeGrip(Graphics* graphics, Color backColor, int x, int y, int width, int height);

[VB] Public Shared Sub DrawSizeGrip(ByVal graphics As Graphics, ByVal backColor As Color, ByVal x As Integer, ByVal y As Integer, ByVal width As Integer, ByVal height As Integer)

[JScript] public static function DrawSizeGrip(graphics: Graphics, backColor Color, x: int, y: int, width: int, height: int);

Description

Draws a size grip on a form with the specified bounds and background color and on the specified graphics surface.

The backColor parameter is used to calculate the color of the size grip so that it is always visible against the background. The System.Drawing.Graphics object to draw on. The System.Drawing.Color of the background used to determine the colors of the size grip. The System.Drawing.Rectangle.X coordinate of the upper left corner of the size grip. The System.Drawing.Rectangle.Y coordinate of the upper left corner of the size grip. The System.Drawing.Rectangle.Width of the size grip. The System.Drawing.Rectangle.Height of the size grip.

tt) DrawStringDisabled

[C#] public static void DrawStringDisabled(Graphics graphics, string s, Font font, Color color, RectangleF layoutRectangle, StringFormat format);

[C++] public: static void DrawStringDisabled(Graphics* graphics, String* s, Font* font, Color color, RectangleF layoutRectangle, StringFormat* format);

[VB] Public Shared Sub DrawStringDisabled(ByVal graphics As Graphics, ByVal s As String, ByVal font As Font, ByVal color As Color, ByVal layoutRectangle As RectangleF, ByVal format As StringFormat)

[JScript] public static function DrawStringDisabled(graphics: Graphics, s: String, font: Font, color: Color, layoutRectangle: RectangleF, format: StringFormat);

Description

Draws the specified string in a disabled state on the specified graphics surface, within the specified bounds, and in the specified font, color, and format. The System.Drawing.Graphics object to draw on. The System.String to draw. The System.Drawing.Font to draw the string with. The System.Drawing.Color to draw the string with. The System.Drawing.RectangleF object that represents the dimensions of the string. The System.Drawing.StringFormat to apply to the string.

uu) FillReversibleRectangle

[C#] public static void FillReversibleRectangle(Rectangle rectangle, Color backColor);

[C++] public: static void FillReversibleRectangle(Rectangle rectangle, Color backColor);

[VB] Public Shared Sub FillReversibleRectangle(ByVal rectangle As Rectangle, ByVal backColor As Color)

[JScript] public static function FillReversibleRectangle(rectangle: Rectangle, backColor: Color);

Description

Draws a filled, reversible rectangle on the screen.

The backColor parameter is used to calculate the fill color of the rectangle so that it is always visible against the background. The System.Drawing.Rectangle that represents the dimensions of the rectangle to fill, in screen coordinates. The System.Drawing.Color of the background behind the fill.

vv) Light

[C#] public static Color Light(Color baseColor);

[C++] public: static Color Light(Color baseColor);

[VB] Public Shared Function Light(ByVal baseColor As Color) As Color

[JScript] public static function Light(baseColor: Color): Color;

Description

Creates a new light color object for the control from the specified color.

Return Value: A System.Drawing.Color that represents the light color on the control.

If the specified System.Drawing.Color is one of the System.Drawing.SystemColors, the color is converted to a System.Drawing.SystemColors.ControlLight color; otherwise, the color's luminosity value is decreased. The System.Drawing.Color to be lightened.

ww) Light

[C#] public static Color Light(Color baseColor, float percOfLightLight);

[C++] public: static Color Light(Color baseColor, float perc OfLightLight);

[VB] Public Shared Function Light(ByVal baseColor As Color, ByVal percOfLightLight As Single) As Color

[JScript] public static function Light(baseColor: Color, perc OfLightLight: float): Color; Creates a new light color object for the control.

Description

Creates a new light color object for the control from the specified color and lightens it by the specified percentage.

Return Value: A System.Drawing.Color that represents the light color on the control.

If the specified System.Drawing.Color is one of the System.Drawing.SystemColors, the color is converted to a System.Drawing.SystemColors.ControlLight color; otherwise, the color's luminosity value is decreased. The System.Drawing.Color to be lightened. The percentage to lighten the specified System.Drawing.Color.

xx) LightLight

[C#] public static Color LightLight(Color basecolor);

[C++] public: static Color LightLight(Color baseColor);

[VB] Public Shared Function LightLight(ByVal baseColor As Color) As Color

[JScript] public static function LightLight(baseColor: Color): Color;

Description

Creates a new light color object for the control from the specified color.

Return Value: A System.Drawing.Color that represents the light color on the control.

If the specified System.Drawing.Color is one of the System.Drawing.SystemColors, the color is converted to the System.Drawing.SystemColors.ControlLightLight color; otherwise, the color's luminosity value is increased. The System.Drawing.Color to be lightened.

ControlStyles enumeration (System.Windows.Forms)

a) ToString

Description

Specifies the style and behavior of the control.

Controls use this enumeration in various properties and methods to specify functionality.

b) ToString

[C#] public const ControlStyles AllPaintingInWmPaint;

[C++] public: const ControlStyles AllPaintingInWmPaint;

[VB] Public Const AllPaintingInWmPaint As ControlStyles

[JScript] public var AllPaintingInWmPaint: ControlStyles;

Description

The control ignores the window message WM_ERASEBKGND to reduce flicker.

This style should only be used if System.Windows.Forms.ControlStyles.UserPaint is set to true.

c) ToString

[C#] public const ControlStyles CacheText;

[C++] public: const ControlStyles CacheText;

[VB] Public Const CacheText As ControlStyles

[JScript] public var CacheText: ControlStyles;

Description

The control keeps a copy of the text rather than getting it from the System.Windows.Forms.Control.Handle each time it is needed. This style defaults to false. This behavior improves performance, but makes it difficult to keep the text synchronized.

d) ToString

[C#] public const ControlStyles ContainerControl;

[C++] public: const ControlStyles ContainerControl;

[VB] Public Const ContainerControl As ControlStyles

[JScript] public var ContainerControl: ControlStyles;

Description

The control is a container-like control.

e) ToString

[C#] public const ControlStyles DoubleBuffer;

[C++] public: const ControlStyles DoubleBuffer;

[VB] Public Const DoubleBuffer As ControlStyles

[JScript] public var DoubleBuffer: ControlStyles;

Description

Drawing is performed in a buffer, and after it completes, the result is output to the screen. Double-buffering prevents flicker caused by the redrawing of the control.

f) ToString

[C#] public const ControlStyles EnableNotifyMessage;

[C++] public: const ControlStyles EnableNotifyMessage;

[VB] Public Const EnableNotifyMessage As ControlStyles

[JScript] public var EnableNotifyMessage: ControlStyles;

Description

If true, the System.Windows.Forms.Control.OnNotifyMessage(System.Windows.Forms.Message) method is called for every message sent to the control's System.Windows.Forms.Control.WndProc(System.Windows.Forms.Message@). This style defaults to false.

g) ToString

[C#] public const ControlStyles FixedHeight;

[C++] public: const ControlStyles FixedHeight;

[VB] Public Const FixedHeight As ControlStyles

[JScript] public var FixedHeight: ControlStyles;

Description

The control has a fixed height.

h) ToString

[C#] public const ControlStyles FixedWidth;

[C++] public: const ControlStyles FixedWidth;

[VB] Public Const FixedWidth As ControlStyles

[JScript] public var FixedWidth: ControlStyles;

Description

The control has a fixed width.

i) ToString

[C#] public const ControlStyles Opaque;

[C++] public: const ControlStyles Opaque;

[VB] Public Const Opaque As ControlStyles

[JScript] public var Opaque: ControlStyles;

Description

The control is drawn opaque and the background is not painted.

j) ToString

[C#] public const ControlStyles ResizeRedraw;

[C++] public: const ControlStyles ResizeRedraw;

[VB] Public Const ResizeRedraw As ControlStyles

[JScript] public var ResizeRedraw: ControlStyles;

Description

The control is redrawn when it is resized.

k) ToString

[C#] public const ControlStyles Selectable;

[C++] public: const ControlStyles Selectable;

[VB] Public Const Selectable As ControlStyles

[JScript] public var Selectable ControlStyles;

Description

The control can receive focus.

l) ToString

[C#] public const ControlStyles StandardClick;

[C++] public: const ControlStyles StandardClick;

[VB] Public Const StandardClick As ControlStyles

[JScript] public var StandardClick: ControlStyles;

Description

The control implements the standard System.Windows.Forms.Control.Click behavior.

m) ToString

[C#] public const ControlStyles StandardDoubleClick;

[C++] public: const ControlStyles StandardDoubleClick;

[VB] Public Const StandardDoubleClick As ControlStyles

[JScript] public var StandardDoubleClick: ControlStyles;

Description

The control implements the standard System.Windows.Forms.Control.DoubleClick behavior. This style is ignored if System.Windows.Forms.ControlStyles.StandardClick is not set.

n) ToString

[C#] public const ControlStyles SupportsTransparentBackColor;

[C++] public: const ControlStyles SupportsTransparentBackColor;

[VB] Public Const SupportsTransparentBackColor As ControlStyles

[JScript] public var SupportsTransparentBackColor: ControlStyles;

Description

The control accepts a System.Windows.Forms.Control.BackColor with an alpha component of less than 255 to simulate transparency. Transparency will be simulated only if the System.Windows.Forms.ControlStyles.UserPaint bit is set to true and the parent control is derived from System.Windows.Forms.Control.

o) ToString

[C#] public const ControlStyles UserMouse;

[C++] public: const ControlStyles UserMouse;

[VB] Public Const UserMouse As ControlStyles

[JScript] public var UserMouse: ControlStyles;

Description

The control does its own mouse processing, and mouse events are not handled by the operating system.

p) ToString

[C#] public const ControlStyles UserPaint;

[C++] public: const ControlStyles UserPaint;

[VB] Public Const UserPaint As ControlStyles

[JScript] public var UserPaint ControlStyles;

Description

The control paints itself rather than the operating system doing so. This style only applies to classes derived from System.Windows.Forms.Control ConvertEventArgs class (System.Windows.Forms)

a) ToString

Description

Provides data for the System.Windows.Forms.Binding.Format and System.Windows.Forms.Binding.Parse events.

The System.Windows.Forms.ConvertEventArgs is used to format and unformat values displayed by a Windows Forms control that is databound through a System.Windows.Forms.Binding object. The System.Windows.Forms.Binding.Format event occurs whenever a control property is bound to a value, and the System.Windows.Forms.Binding.Parse event occurs whenever the bound value changes.

b) ConvertEventArgs

Example Syntax:

c) ToString

[C#] public ConvertEventArgs(object value, Type desiredType);

[C++] public: ConvertEventArgs(Object* value, Type* desiredType);

[VB] Public Sub New(ByVal value As Object, ByVal desiredType As Type)

[JScript] public function ConvertEventArgs(value: Object, desiredType: Type);

Description

Initializes a new instance of the System.Windows.Forms.ConvertEventArgs class. An System.Object that contains the value of the current property. The System.Type of the value.

d) DesiredType e) ToString

[C#] public Type DesiredType {get;}

[C++] public: _property Type* get DesiredType( );

[VB] Public ReadOnly Property DesiredType As Type

[JScript] public function get DesiredType( ): Type;

Description

Gets the data type of the desired value.

The System.Windows.Forms.ConvertEvenArgs.Desired Type property enables you to check the type of the property that the value is being converted to.

f) Value g) ToString

[C#] public object Value {get; set;}

[C++] public: _property Object* get_Value( ); public: _property void set_Value(Object*);

[VB] Public Property Value As Object

[JScript] public function get Value( ): Object; public function set Value(Object);

Description

Gets or sets the value of the System.Windows.Forms.ConvertEventArgs object.

The value contained by the System.Windows.Forms.ConvertEventArgs.Value property depends on the event in which the System.Windows.Forms.ConvertEventArgs object is returned. The System.Windows.Forms.ConvertEventArgs object can be returned in either the System.Windows.Forms.Binding.Format event, or the System.Windows.Forms.Binding.Parse event.

ConvertEventHandler delegate (System.Windows.Forms)

a) ToString

Description

Represents the method that will handle the System.Windows.Forms.Binding.Parse and System.Windows.Forms.Binding.Format events of a System.Windows.Forms.Binding object. The source of the event. A System.Windows.Forms.ConvertEventArgs that contains the event data.

When you create a(n) System.Windows.Forms.ConvertEventHandler delegate, you identify the method that will handle the event. To associate the event with your event handler, add an instance of the delegate to the event. The event handler is called whenever the event occurs, unless you remove the delegate. For more information about event handler delegates, see.

CreateParams class (System.Windows.Forms)

a) ToString

Description

Encapsulates the information needed when creating a control.

The information in a System.Windows.Forms.CreateParams object can be used to pass information about the initial state and appearance of a control. Most System.Windows.Forms.Control derived controls override the System.Windows.Forms.Control.CreateParams property to pass in the appropriate values or include additional information in the System.Windows.Forms.CreateParams object.

b) CreateParams

Example Syntax:

c) ToString

[C#] public CreateParams( );

[C++] public: CreateParams( );

[VB] Public Sub New( )

[JScript] public function CreateParams( );

d) Caption
e) ToString

[C#] public string Caption {get; set;}

[C++] public: _property String* get_Caption( ); public: _property void set_Caption(String*);

[VB] Public Property Caption As String

[JScript] public function get Caption( ): String; public function set Caption(String);

Description

Gets or sets the control's initial text.
f) ClassName
g) ToString

[C#] public string ClassName {get; set;}

[C++] public: _property String* get_ClassName( ); public: _property void set_ClassName(String*);

[VB] Public Property ClassName As String

[JScript] public function get ClassName( ): String; public function set ClassName(String);

Description

Gets or sets the name of the class to derive the control from.

The default value for this property is null, indicating that the control is not derived from an existing control class. To derive from an existing control class, store the system class name in this property. For example, to derive from the standard System.Windows.Forms.Button control, set this property to "BUTTON".
h) ClassStyle
i) ToString

[C#] public int ClassStyle {get; set;}

[C++] public: _property int get_ClassStyle( ); public: _property void set_ClassStyle(int);

[VB] Public Property ClassStyle As Integer

[JScript] public function get ClassStyle( ): int; public function set ClassStyle(int);

Description

Gets or sets a bitwise combination of class style values.

The System.Windows.Forms.CreateParams.ClassStyle property is ignored if the System.Windows.Forms.CreateParams.ClassName property is not null.
j) ExStyle
k) ToString PS [C#] public int ExStyle {get; set;}

[C++] public: _property int get_ExStyle( ); public: _property void set_ExStyle(int);

[VB] Public Property ExStyle As Integer

[JScript] public function get ExStyle( ): int; public function set ExStyle(int);

Description

Gets or sets a bitwise combination of extended window style values.

The System.Windows.Forms.CreateParams.ExStyle property supports extended appearance and initial state values to apply to the control.
l) Height
m) ToString

[C#] public int Height {get; set;}

[C++] public: _property int get_Height( ); public: _property void set_Height(int);

[VB] Public Property Height As Integer

[JScript] public function get Height( ): int; public function set Height(int);

Description

Gets or sets the initial height of the control.
n) Param
o) ToString

[C#] public object Param {get; set;}

[C++] public: _property Object* get_Param( ); public: _property void set_Param(Object*);

[VB] Public Property Param As Object

[JScript] public function get Param( ): Object; public function set Param(Object);

Description

Gets or sets additional parameter information needed to create the control.

If you are creating a multiple document interface (MDI) client window, the System.Windows.Forms.CreateParams.Param property must reference a CLIENTCREATESTRUCT structure.
p) Parent
q) ToString

[C#] public IntPtr Parent {get; set;}

[C++] public: _property IntPtr get_Parent( ); public: _property void set_Parent(IntPtr);

[VB] Public Property Parent As IntPtr

[JScript] public function get Parent( ): IntPtr; public function set Parent(IntPtr);

Description

Gets or sets the control's parent.
r) Style
s) ToString

[C#] public Mt Style {get; set;}

[C++] public: _property int get Style( ); public: _property void set_Style(int);

[VB] Public Property Style As Integer

[JScript] public function get Style( ): int; public function set Style(int);

Description

Gets or sets a bitwise combination of window style values.

The System.Windows.Forms.CreateParams.Style property controls the appearance of the control and its initial state.
t) Width
u) ToString

[C#] public int Width {get; set;}

[C++] public: _property int get_Width( ); public: _property void set_Width(int);

[VB] Public Property Width As Integer

[JScript] public function get Width( ): int; public function set Width(int);

Description

Gets or sets the initial width of the control.

v) X w) ToString

[C#] public int X {get; set;}

[C++] public: _property int get_X( ); public: _property void set_X(int);

[VB] Public Property X As Integer

[JScript] public function get X( ): int; public function set X(int);

Description

Gets or sets the initial left position of the control.

x) Y y) ToString

[C#] public int Y {get; set;}

[C++] public: _property int get_Y( ); public: _property void set Y(int);

[VB] Public Property Y As Integer

[JScript] public function get Y( ): int; public function set Y(int);

Description

Gets or sets the top position of the initial location of the control.

z) ToString

[C#] public override string ToString( );

[C++] public: String* ToString( );

[VB] Overrides Public Function ToString( ) As String

[JScript] public override function ToString( ): String;

Description

CurrencyManager class (System.Windows.Forms)

a) ToString

Description

Manages a list of System.Windows.Forms.Binding objects.

The System.Windows.Forms.CurrencyManager derives from the System.Windows.Forms.BindingManagerBase class. Use the System.Windows.Forms.BindingContext to return either a System.Windows.Forms.CurrencyManager or a System.Windows.Forms.PropertyManager. The actual object returned depends on the data source and data member passed to the System.Windows.Forms.BindingContext.Item (System.Object) property of the System.Windows.Forms. BindingContext. If the data source is an object that can only return a single property (instead of a list of objects), the type will be a System.Windows.Forms.PropertyManager. For example, if you specify a System.Windows.Forms.TextBox as the data source, a System.Windows.Forms.Property-Manager will be returned. If, on the other hand, the data source is an object that implements System.Collections.IList, System.ComponentModel.IListSource, or System.ComponentModel.IBindingList, a System.Windows.Forms.CurrencyManager will be returned.

b) ToString

[C#] protected Type finalType;

[C++] protected: Type* finalType;

[VB] Protected finalType As Type

[JScript] protected var finalType: Type;

Description

Specifies the data type of the list.

c) ToString

[C#] protected int listposition;

[C++] protected: int listposition;

[VB] Protected listposition As Integer

[JScript] protected var listposition: int;

Description

Specifies that there are no list members.

d) Bindings e) Count f) ToString

Description

Gets the number of items in the list.

Use the count property to determine when the end of a list has been reached. Because the System.Windows.Forms.CurrencyManager maintains a 0-based array of items, the end of the list is always System.Windows.Forms.CurrencyManager. Count minus one.

g) Current h) ToString

[C#] public override object Current {get;}

[C++] public: _property virtual Object* get_Current( );

[VB] Overrides Public ReadOnly Property Current As Object

[JScript] public function get Current( ): Object;

Description

Gets the current item in the list.

In order to get the current item, you must know its data type in order to cast it correctly. For example, if the data source is a System.Data.DataView or System.Data.DataTable, you must cast the current item as a System.Data.DataRowView object.

i) List j) ToString

[C#] public IList List {get;}

[C++] public: _property IList* get_List( );

[VB] Public ReadOnly Property List As IList

[JScript] public function get List( ): IList;

Description

Gets the IList for this System.Windows.Forms.Currency-Manager.

If the returned IList is of type Gets the list as an object.

k) Position l) ToString

[C#] public override int Position {get; set;}

[C++] public: _property virtual int get_Position( ); public: _property virtual void set_Position(int);

[VB] Overrides Public Property Position As Integer

[JScript] public function get Position( ): int; public function set Position(int);

Description

Gets or sets the position you are at within the list.

An important property of the System.Windows.Forms.CurrencyManager is the System.Windows.Forms.CurrencyManager.Position property. In a list of items, you can only view one item out of the entire list. To determine which item is viewed, set the System.Windows.Forms.CurrencyManager.Position to a number between 0 (the beginning of the list) and System.Windows.Forms.CurrencyManager.Count minus one (the end of the list).

m) ToString

Description

Occurs when the current item has been altered.

The System.Windows.Forms.CurrencyManager.ItemChanged method event is supported only if the underlying data source implements the System.ComponentModel.IBinding List interface.

n) AddNew

[C#] public override void AddNew( );

[C++] public: void AddNew( );

[VB] Overrides Public Sub AddNew( )

[JScript] public override function AddNew( );

Description

Adds a new item to the underlying list.

This method is only supported if the data source implements System.ComponentModel.IBindingList and the System.ComponentModel.IBindingList.AllowNew property returns true.

o) CancelCurrentEdit

[C#] public override void CancelCurrentEdit( );

[C++] public: void CancelCurrentEdit( );

[VB] Overrides Public Sub CancelCurrentEdit( )

[JScript] public override function CancelCurrentEdit( );

Description

Cancels the current edit operation.

This method is supported only if the objects contained by the data source implement the System.ComponentModel.IEditableObject interface. If the objects contained within the data source do not implement the System.ComponentModel.IEditableObject interface, changes made to the data will not be discarded.

p) CheckEmpty

[C#] protected void CheckEmpty( );

[C++] protected: void CheckEmpty( );

[VB] Protected Sub CheckEmpty( )

[JScript] protected function CheckEmpty( );

Description

Throws an exception if there is no list.

q) EndCurrentEdit

[C#] public override void EndCurrentEdit( );

[C++] public: void EndCurrentEdit( );

[VB] Overrides Public Sub EndCurrentEdit( )

[JScript] public override function EndCurrentEdit( );

Description

Ends the current edit operation.

This method is supported only if the objects contained by the data source implement the System.ComponentModel.IEditableObject interface.

r) GetItemProperties

[C#] public override PropertyDescriptorCollection GetItemProperties( );

[C++] public: PropertyDescriptorCollection* GetItemProperties( );

[VB] Overrides Public Function GetItemProperties( ) As PropertyDescriptorCollection

[JScript] public override function GetItemProperties( ): PropertyDescriptorCollection; Gets the System.ComponentModel.PropertyDescriptorCollection for the list.

Description

Gets the System.ComponentModel.PropertyDescriptorCollection for the list.

Return Value: A System.ComponentModel.PropertyDescriptorCollection for the list.

The System.ComponentModel.PropertyDescriptorCollection for the System.Windows.Forms.CurrencyManager is used to specify a column in the list.

s) GetListName

[C#] protected internal override string GetListName(ArrayList listAccessors);

[C++] protected public: String* GetListName(ArrayList* listAccessors);

[VB] Overrides Protected Friend Dim Function GetListName (ByVal listAccessors As ArrayList) As String

[JScript] package override function GetListName(listAccessors: ArrayList) String;

Description

Gets the name of the specified list.

Return Value: The name of the list. The list, typed as System.Collections.ArrayList, that you are interested in.

t) OnCurrentChanged

[C#] protected internal override void OnCurrentChanged (EventArgs e);

[C++] protected public: void on CurrentChanged(Event Args* e);

[VB] Overrides Protected Friend Dim Sub OnCurrentChanged(ByVal e As EventArgs)

[JScript] package override function OnCurrentChanged(e: EventArgs);

Description

Raises the System.Windows.Forms.BindingManagerBase.CurrentChanged event. An System.EventArgs that contains the event data.

u) OnItemChanged

[C#] protected virtual void OnItemChanged(ItemChangedEventArgs e);

[C++] protected: virtual void OnItemChanged(ItemChangedEventArgs* e);

[VB] Overridable Protected Sub OnItemChanged(ByVal e As ItemChangedEventArgs)

[JScript] protected function OnItemChanged(e: ItemChangedEventArgs);

Description

Raises the System.Windows.Forms.CurrencyManager.ItemChanged event. An System.Windows.Forms.ItemChangedEventArgs that contains the event data.

v) OnPositionChanged

[C#] protected virtual void OnPositionChanged(EventArgs e);

[C++] protected: virtual void OnPositionChanged(Event Args* e);

[VB] Overridable Protected Sub OnPositionChanged(ByVal e As EventArgs)

[JScript] protected function OnPositionChanged(e: Event Args);

Description

Raises the System.Windows.Forms.BindingManagerBase.PositionChanged event. An System.EventArgs that contains the event data.

w) Refresh

[C#] public void Refresh( );

[C++] public: void Refresh( );

[VB] Public Sub Refresh( )

[JScript] public function Refresh( );

Description

Forces a repopulation of the bound controls.

Use the System.Windows.Forms.CurrencyManager.Refresh method when the data source doesn't support notification when it is changed, for example an System.Array.

x) RemoveAt

[C#] public override void RemoveAt(int index);

[C++] public: void RemoveAt(int index);

[VB] Overrides Public Sub RemoveAt(ByVal index As Integer)

[JScript] public override function RemoveAt(index: int);

Description

Removes the item at the specified index.

This method was designed to allow complex controls, such as the System.Windows.Forms.DataGrid control, to remove items from the list. It is not recommended that you use this method to actually remove items. Instead, use the System.Data.DataView.Delete method of the System.Data.DataView class to delete items. The index of the item to remove from the list.

y) ResumeBinding

[C#] public override void ResumeBinding( );

[C++] public: void ResumeBinding( );

[VB] Overrides Public Sub ResumeBinding( )

[JScript] public override function ResumeBinding( );

Description

Resumes binding of component properties to list items.

z) SuspendBinding

[C#] public override void SuspendBinding( );

[C++] public: void SuspendBinding( );

[VB] Overrides Public Sub SuspendBinding( )

[JScript] public override function SuspendBinding( );

Description

Suspends binding.

aa) UpdateIsBinding

[C#] protected override void UpdateIsBinding( );

[C++] protected: void UpdateIsBinding( );

[VB] Overrides Protected Sub UpdateIsBinding( )

[JScript] protected override function UpdateIsBinding( );

Description

Updates the status of the binding.

Cursor class (System.Windows.Forms)

a) UpdateIsBinding

Description

Represents the image used to paint the mouse pointer.

A cursor is a small picture whose location on the screen is controlled by a pointing device, such as a mouse, pen, or trackball. When the user moves the pointing device, the operating system moves the cursor accordingly.

b) Cursor

Example Syntax c) UpdateIsBinding

[C#] public Cursor(IntPtr handle);

[C++] public: Cursor(IntPtr handle);

[VB] Public Sub New(ByVal handle As IntPtr)

[JScript] public function Cursor(handle: IntPtr); Initializes a new instance of the System.Windows.Forms.Cursor class.

Description

Initializes a new instance of the System.Windows.Forms.Cursor class from the specified Windows handle.

You must free the cursor handle when you are done with it. For more information about disposing of resources, see. The Windows handle of the cursor to create.

d) Cursor

Example Syntax:

e) UpdateIsBinding

[C#] public Cursor(Stream stream);

[C++] public: Cursor(Stream* stream);

[VB] Public Sub New(ByVal stream As Stream)

[JScript] public function Cursor(stream: Stream);

Description

Initializes a new instance of the System.Windows.Forms.Cursor class from the specified data stream.

The data stream specified by stream must contain a cursor (.cur) file. The data stream to load the System.Windows.Forms.Cursor from.

f) Cursor
Example Syntax
g) UpdateIsBinding

[C#] public Cursor(string fileName);

[C++] public: Cursor(String* filename);

[VB] Public Sub New(ByVal fileName As String)

[JScript] public function Cursor(fileName: String);

Description

Initializes a new instance of the System.Windows.Forms.Cursor class from the specified file.

The fileName parameter must reference a standard cursor (.cur) file. The cursor file to load.
h) Cursor
Example Syntax
i) UpdateIsBinding

[C#] public Cursor(Type type, string resource);

[C++] public: Cursor(Type* type, String* resource);

[VB] Public Sub New(ByVal type As Type, ByVal resource As String)

[JScript] public function Cursor(type: Type, resource: String);

Description

Initializes a new instance of the System.Windows.Forms.Cursor class from the specified resource with the specified resource type. The resource System.Type. A System.String that represents the name of the resource.
j) Clip
k) UpdateIsBinding

[C#] public static Rectangle Clip {get; set;}

[C++] public: _property static Rectangle get_Clip( ); public: _property static void set_Clip(Rectangle);

[VB] Public Shared Property Clip As Rectangle

[JScript] public static function get Clip( ): Rectangle; public static function set Clip(Rectangle);

Description

Gets or sets the bounds that represents the clipping rectangle for the cursor.

A clipped cursor is allowed to move only within its clipping rectangle. Generally, the system allows this only if the mouse is currently captured. If the cursor is not currently clipped, the resulting rectangle contains the dimensions of the entire screen.
l) Current
m) UpdateIsBinding

[C#] public static Cursor Current {get; set;}

[C++] public: _property static Cursor* get_Current( ); public: _property static void set_Current(Cursor*);

[VB] Public Shared Property Current As Cursor

[JScript] public static function get Current( ): Cursor; public static function set Current(Cursor);

Description

Gets or sets a cursor object that represents the mouse cursor. Setting the System.Windows.Forms.Cursor.Current property changes the cursor currently displayed, and the application stops listening for mouse events. For example, you might set the System.Windows.Forms.Cursor.Current property to System.Windows.Forms.Cursors.WaitCursor before you start filling a System.Windows.Forms.TreeView, System.Windows.Forms.DataGrid, or System.Windows.Forms.ListBox control with a large amount of data. After the loop is completed, set this property back to System.Windows.Forms.Cursors.Default to display the appropriate cursor for each control.
n) Handle
o) UpdateIsBinding

[C#] public IntPtr Handle {get;}

[C++] public: _property IntPtr get_Handle( );

[VB] Public ReadOnly Property Handle As IntPtr

[JScript] public function get Handle( ): IntPtr;

Description

Gets the handle of the cursor.

This is not a copy of the handle; do not dispose of it.
p) Position
q) UpdateIsBinding

[C#] public static Point Position {get; set;}

[C++] public: _property static Point get_Position( ); public: _property static void set_Position(Point);

[VB] Public Shared Property Position As Point

[JScript] public static function get Position( ): Point; public static function set Position(Point);

Description

Gets or sets the cursor's position.
r) Size
s) UpdateIsBinding

[C#] public Size Size {get;}

[C++] public: _property Size get_Size( );

[VB] Public ReadOnly Property Size As Size

[JScript] public function get Size( ): Size;

Description

Gets the size of the cursor object.
t) CopyHandle

[C#] public IntPtr CopyHandle( );

[C++] public: IntPtr CopyHandle( );

[VB] Public Function CopyHandle( ) As IntPtr

[JScript] public function CopyHandle( ): IntPtr;

Description

Copies the handle of this System.Windows.Forms.Cursor.

Return Value: An System.IntPtr object that represents the cursor's handle.

The handle created as a result of calling this method must be disposed of when you are done with it because it will not be disposed of by the garbage collector.
u) Dispose

[C#] public void Dispose( );

[C++] public: sealed void Dispose( );

[VB] NotOverridable Public Sub Dispose( )

[JScript] public function Dispose( );

Description

Releases all resources used by the System.Windows.Forms.Cursor.

Calling System.Windows.Forms.Cursor.Dispose allows the resources used by the System.Windows.Forms.Cursor to be reallocated for other purposes. For more information about System.Windows.Forms.Cursor.Dispose, see.

v) Draw

[C#] public void Draw(Graphics g, Rectangle targetRect);

[C++] public: void Draw(Graphics* g, Rectangle targetRect);

[VB] Public Sub Draw(ByVal g As Graphics, ByVal target Rect As Rectangle)

[JScript] public function Draw(g: Graphics, targetRect: Rectangle);

Description

Draws the cursor on the specified surface, within the specified bounds.

The drawing command originates on the System.Drawing.Graphics object, but a System.Drawing.Graphics object does not contain information about how to render a given image, so it passes the call to the System.Windows.Forms.Cursor object. The System.Windows.Forms.Cursor.Draw(System.Drawing.Graphics,System.Drawing.Rectangle) method crops the image to the given dimensions and allows you to specify a System.Drawing.Rectangle within which to draw the System.Windows.Forms.Cursor. The System.Drawing.Graphics surface on which to draw the System.Windows.Forms.Cursor. The System.Drawing.Rectangle that represents the bounds of the System.Windows.Forms.Cursor.

w) DrawStretched

[C#] public void DrawStretched(Graphics g, Rectangle targetRect);

[C++] public: void DrawStretched(Graphics* g, Rectangle targetRect);

[VB] Public Sub DrawStretched(ByVal g As Graphics, ByVal targetRect As Rectangle)

[JScript] public function DrawStretched(g: Graphics, target Rect: Rectangle);

Description

Draws the cursor in a stretched format on the specified surface, within the specified bounds.

The drawing command originates on the System.Drawing.Graphics object, but a System.Drawing.Graphics object does not contain information about how to render a given image, so it passes the call to the System.Windows.Forms.Cursor object. The System.Windows.Forms.Cursor.DrawStretched (System.Drawing.Graphics, System.Drawing.Rectangle) method stretches the image to fill the specified System.Drawing.Rectangle when the cursor is drawn. The System.Drawing.Graphics surface on which to draw the System.Windows.Forms.Cursor. The System.Drawing.Rectangle that represents the bounds of the System.Windows.Forms.Cursor.

x) Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Returns a value indicating whether the cursor is equal to the specified System.Windows.Forms.Cursor object.

Return Value: true if the cursor is equal to the specified System.Windows.Forms.Cursor object; otherwise, false. The System.Windows.Forms.Cursor object to compare.

y) Finalize

[C#] ~Cursor( );

[C++] ~Cursor( );

[VB] Overrides Protected Sub Finalize( )

[JScript] protected override function Finalize( ); Cleans up Windows resources for this object.

z) GetHashCode

[C#] public override int GetHashCode( );

[C++] public: int GetHashCode( );

[VB] Overrides Public Function GetHashCode( ) As Integer

[JScript] public override function GetHashCode( ): int;

Description aa) Hide

[C#] public static void Hide( );

[C++] public: static void Hide( );

[VB] Public Shared Sub Hide( )

[JScript] public static function Hide( );

Description

Hides the cursor.

The System.Windows.Forms.Cursor.Show and System.Windows.Forms.Cursor.Hide method calls must be balanced. For every call to the System.Windows.Forms.Cursor.Hide method there must be a corresponding call to the System.Windows.Forms.Cursor.Show method.

bb) op_Equality

[C#] public static bool operator==(Cursor left, Cursor right);

[C++] public: static bool op_Equality(Cursor* left, Cursor* right);

[VB] returnValue=Cursor.op_Equality(left, right)

[JScript] returnValue=left==right;

Description

Returns a value indicating whether two instances of a System.Windows.Forms.Cursor object are equal.

Return Value: true if two instances of a System.Windows.Forms.Cursor object are equal; otherwise, false. A System.Windows.Forms.Cursor object to compare. A System.Windows.Forms.Cursor object to compare.

cc) op_Inequality

[C#] public static bool operator !=(Cursor left, Cursor right);

[C++] public: static bool op_Inequality(Cursor* left, Cursor* right);

[VB] returnValue=Cursor.op_Inequality(left, right)

[JScript] returnValue=left ?=right;

Description

Returns a value indicating whether two instances of a System.Windows.Forms.Cursor object are not equal.

Return Value: true if two instances of a System.Windows.Forms.Cursor object are not equal; otherwise, false. A System.Windows.Forms.Cursor object to compare. A System.Windows.Forms.Cursor object to compare.

dd) Show

[C#] public static void Show( );

[C++] public: static void Show( );

[VB] Public Shared Sub Show( )

[JScript] public static function Show( );

Description

Displays the cursor.

The System.Windows.Forms.Cursor.Show and System.Windows.Forms.Cursor.Hide method calls must be balanced. For every call to the System.Windows.Forms.Cursor.Hide method there must be a corresponding call to the System.Windows.Forms.Cursor.Show method.

ee) ISerializable.GetObjectData

[C#] void ISerializable.GetObjectData(SerializationInfo si, StreamingContext context);

[C++] void ISerializable::GetObjectData(SerializationInfo* si, StreamingContext context);

[VB] Sub GetObjectData(ByVal si As SerializationInfo, ByVal context As StreamingContext) Implements ISerializable.GetObjectData

[JScript] function ISerializable.GetObjectData(si: SerializationInfo, context StreamingContext);

ff) ToString

[C#] public override string ToString( );

[C++] public: String* ToString( );

[VB] Overrides Public Function ToString( ) As String

[JScript] public override function ToString( ): String;

Description

Retrieves a human readable string representing this System.Windows.Forms.Cursor.

Return Value: A System.String that represents this System.Windows.Forms.Cursor.

CursorConverter class (System.Windows.Forms)

a) ToString

Description

Provides a type converter to convert System.Windows.Forms.Cursor objects to and from various other representations.

For more information about type converters, see the System.ComponentModel.TypeConverter base class and.

b) CursorConverter

Example Syntax:

c) ToString

[C#] public CursorConverter( );

[C++] public: CursorConverter( );

[VB] Public Sub New( )

[JScript] public function CursorConverter( );

d) CanConvertFrom

[C#] public override bool CanConvertFrom(ITypeDescriptorContext context, Type sourceType);

[C++] public: bool CanConvertFrom(ITypeDescriptorContext* context, Type* sourceType);

[VB] Overrides Public Function CanConvertFrom(ByVal context As ITypeDescriptorContext, ByVal sourceType As Type) As Boolean

[JScript] public override function CanConvertFrom(context ITypeDescriptorContext, sourceType: Type): Boolean;

Description

Determines if this converter can convert an object in the given source type to the native type of the converter.

Return Value: True if this object can perform the conversion. A formatter context. This object can be used to extract additional information about the environment this converter is being invoked from. This may be null, so you should always check. Also, properties on the context object may also return null. The type you wish to convert from.

e) CanConvertTo

[C#] public override bool CanConvertTo(ITypeDescriptorContext context, Type destinationType);

[C++] public: bool CanConvertTo(ITypeDescriptorContext* context, Type* destinationType);

[VB] Overrides Public Function CanConvertTo(ByVal context As ITypeDescriptorContext, ByVal destinationType As Type) As Boolean

[JScript] public override function CanConvertTo(context: ITypeDescriptorContext, destinationType: Type): Boolean;

Description

Gets a value indicating whether this converter can convert an object to the given destination type using the context.

Return Value: true if this converter can perform the conversion; otherwise, false.

The context parameter can be used to extract additional information about the environment this converter is being invoked from. This can be null, so always check. Also, properties on the context object can return null. An System.ComponentModel.ITypeDescriptorContext that provides a format context. A System.Type that represents the type you wish to convert to.

f) ConvertFrom

[C#] public override object ConvertFrom(ITypeDescriptorContext context, CultureInfo culture, object value);

[C++] public: Object* ConvertFrom(ITypeDescriptorContext* context, CultureInfo* culture, Object* value);

[VB] Overrides Public Function ConvertFrom(ByVal context As ITypeDescriptorContext, ByVal culture As CultureInfo, ByVal value As Object) As Object

[JScript] public override function ConvertFrom(context: IType DescriptorContext, culture: CultureInfo, value: Object): Object;

Description

Converts the given object to the converter's native type.

g) ConvertTo

[C#] public override object ConvertTo(ITypeDescriptorContext context, CultureInfo culture, object value, Type destinationType);

[C++] public: Object* ConvertTo(ITypeDescriptorContext* context, CultureInfo* culture, Object* value, Type* destinationType);

[VB] Overrides Public Function ConvertTo(ByVal context As ITypeDescriptorContext, ByVal culture As CultureInfo, ByVal value As Object, ByVal destinationType As Type) As Object

[JScript] public override function ConvertTo(context: ITypeDescriptorContext, culture: CultureInfo, value: Object, destinationType: Type): Object;

Description

Converts the given object to another type. The most common types to convert are to and from a string object. The default implementation will make a call to ToString on the object if the object is valid and if the destination type is string. If this cannot convert to the destination type, this will throw a NotSupportedException.

h) GetStandardValues

[C#] public override StandardValuesCollection

GetStandardValues(ITypeDescriptorContext context);

[C++] public: StandardValuesCollection* GetStandardValues(ITypeDescriptorContext* context);

[VB] Overrides Public Function GetStandardValues(ByVal context As TypeDescriptorContext) As StandardValuesCollection

[JScript] public override function GetStandardValues(context ITypeDescriptorContext): StandardValuesCollection;

Description

Retrieves a collection containing a set of standard values for the data type this validator is designed for. This will return null if the data type does not support a standard set of values.

Return Value: A collection containing a standard set of valid values, or null. The default implementation always returns null. A formatter context. This object can be used to extract additional information about the environment this converter is being invoked from. This may be null, so you should always check. Also, properties on the context object may also return null.

i) GetStandardValuesSupported

[C#] public override bool GetStandardValuesSupported (IType DescriptorContext context);

[C++] public: bool GetStandardValuesSupported(ITypeDescriptorContext* context);

[VB] Overrides Public Function GetStandardValuesSupported(ByVal context As ITypeDescriptorContext) As Boolean

[JScript] public override function GetStandardValuesSupported(context: ITypeDescriptorContext): Boolean;

Description

Determines if this object supports a standard set of values that can be picked from a list.

Return Value: Returns true if GetStandardValues should be called to find a common set of values the object supports. A type descriptor through which additional context may be provided.

Cursors class (System.Windows.Forms)

a) ToString

Description

Provides a collection of System.Windows.Forms.Cursor objects for use by a Windows Forms application.

Some of the System.Windows.Forms.Cursor objects in this class can take on a different appearance than those described. The user can change the cursor appearance by adjusting the mouse pointer settings in their operating system. The panning and no move cursors are static and cannot be changed by the operating system.

b) AppStarting c) ToString

[C#] public static Cursor AppStarting {get;}

[C++] public: _property static Cursor* get_AppStarting( );

[VB] Public Shared ReadOnly Property AppStarting As Cursor

[JScript] public static function get AppStarting( ): Cursor;

Description

Gets the cursor that appears when an application starts.

d) Arrow e) ToString

[C#] public static Cursor Arrow {get;}

[C++] public: _property static Cursor* get_Arrow( );

[VB] Public Shared ReadOnly Property Arrow As Cursor

[JScript] public static function get Arrow( ): Cursor;

Description

Gets the arrow cursor.

f) Cross g) ToString

[C#] public static Cursor Cross {get;}

[C++] public: _property static Cursor* get_Cross( );

[VB] Public Shared ReadOnly Property Cross As Cursor

[JScript] public static function get Cross( ): Cursor;

Description

Gets the crosshair cursor.

h) Default i) ToString

[C#] public static Cursor Default {get;}

[C++] public: _property static Cursor* get_Default( );

[VB] Public Shared ReadOnly Property Default As Cursor

[JScript] public static function get Default( ): Cursor;

Description

Gets the default cursor, which is usually an arrow cursor.

j) Hand k) ToString

[C#] public static Cursor Hand {get;}

[C++] public: _property static Cursor* get_Hand( );

[VB] Public Shared ReadOnly Property Hand As Cursor

[JScript] public static function get Hand( ): Cursor;

Description

Gets the hand cursor, typically used when hovering over a Web link.

l) Help m) ToString

[C#] public static Cursor Help {get;}

[C++] public: _property static Cursor* get_Help( );

[VB] Public Shared ReadOnly Property Help As Cursor

[JScript] public static function get Help( ): Cursor;

Description

Gets the Help cursor, which is a combination of an arrow and a question mark.

n) HSplit o) ToString

[C#] public static Cursor HSplit {get;}

[C++] public: _property static Cursor* get_HSplit( );

[VB] Public Shared ReadOnly Property HSplit As Cursor

[JScript] public static function get HSplit( ): Cursor;

Description

Gets the cursor that appears when the mouse is positioned over a horizontal splitter bar.

p) IBeam q) ToString

[C#] public static Cursor IBeam {get;}

[C++] public: _property static Cursor* get_IBeam( );

[VB] Public Shared ReadOnly Property IBeam As Cursor

[JScript] public static function get IBeam( ): Cursor;

Description

Gets the I-beam cursor, which is used to show where the text cursor appears when the mouse is clicked.

r) No s) ToString

[C#] public static Cursor No {get;}

[C++] public: _property static Cursor* get_No( );

[VB] Public Shared ReadOnly Property No As Cursor

[JScript] public static function get No( ): Cursor;

Description

Gets the cursor that indicates that a particular region is invalid for the current operation.

t) NoMove2D u) ToString

[C#] public static Cursor NoMove2D {get;}

[C++] public: _property static Cursor* get_NoMove2D( );

[VB] Public Shared ReadOnly Property NoMove2D As Cursor

[JScript] public static function get NoMove2D( ): Cursor;

Description

Gets the cursor that appears during wheel operations when the mouse is not moving, but the window can be scrolled in both a horizontal and vertical direction.

v) NoMoveHoriz w) ToString

[C#] public static Cursor NoMoveHoriz {get;}

[C++] public: _property static Cursor* get_NoMoveHoriz( );

[VB] Public Shared ReadOnly Property NoMoveHoriz As Cursor

[JScript] public static function get NoMoveHoriz( ): Cursor;

Description

Gets the cursor that appears during wheel operations when the mouse is not moving, but the window can be scrolled in a horizontal direction.

x) NoMoveVert y) ToString

[C#] public static Cursor NoMoveVert {get;}

[C++] public: _property static Cursor* get_NoMoveVert( );

[VB] Public Shared ReadOnly Property NoMoveVert As Cursor

[JScript] public static function get NoMoveVert( ): Cursor;

Description

Gets the cursor that appears during wheel operations when the mouse is not moving, but the window can be scrolled in a vertical direction.

z) PanEast aa) ToString

[C#] public static Cursor PanEast {get;}

[C++] public: _property static Cursor* get_PanEast( );

[VB] Public Shared ReadOnly Property PanEast As Cursor

[JScript] public static function get PanEast( ): Cursor;

Description

Gets the cursor that appears during wheel operations when the mouse is moving and the window is scrolling horizontally to the right.

bb) PanNE cc) ToString

[C#] public static Cursor PanNE {get;}

[C++] public: _property static Cursor* get_PanNE( );

[VB] Public Shared ReadOnly Property PanNE As Cursor

[JScript] public static function get PanNE( ): Cursor;

Description

Gets the cursor that appears during wheel operations when the mouse is moving and the window is scrolling horizontally and vertically upward and to the right.

dd) PanNorth ee) ToString

[C#] public static Cursor PanNorth {get;}

[C++] public: _property static Cursor* get_PanNorth( );

[VB] Public Shared ReadOnly Property PanNorth As Cursor

[JScript] public static function get PanNorth( ): Cursor;

Description

Gets the cursor that appears during wheel operations when the mouse is moving and the window is scrolling vertically in an upward direction.

ff) PanNW gg) ToString

[C#] public static Cursor PanNW {get;}

[C++] public: _property static Cursor* get_PanNW( );

[VB] Public Shared ReadOnly Property PanNW As Cursor

[JScript] public static function get PanNW( ): Cursor;

Description

Gets the cursor that appears during wheel operations when the mouse is moving and the window is scrolling horizontally and vertically upward and to the left.

hh) PanSE ii) ToString

[C#] public static Cursor PanSE {get;}

[C++] public: _property static Cursor* get_PanSE( );

[VB] Public Shared ReadOnly Property PanSE As Cursor

[JScript] public static function get PanSE( ): Cursor;

Description

Gets the cursor that appears during wheel operations when the mouse is moving and the window is scrolling horizontally and vertically downward and to the right.

jj) PanSouth kk) ToString

[C#] public static Cursor PanSouth {get;}

[C++] public: _property static Cursor* get_PanSouth( );

[VB] Public Shared ReadOnly Property PanSouth As Cursor

[JScript] public static function get PanSouth( ): Cursor;

Description

Gets the cursor that appears during wheel operations when the mouse is moving and the window is scrolling vertically in a downward direction.

ll) PanSW mm) ToString

[C#] public static Cursor PanSW {get;}

[C++] public: _property static Cursor* get_PanSW( );

[VB] Public Shared ReadOnly Property PanSW As Cursor

[JScript] public static function get PanSW( ): Cursor;

Description

Gets the cursor that appears during wheel operations when the mouse is moving and the window is scrolling horizontally and vertically downward and to the left.

nn) Pan West oo) ToString

[C#] public static Cursor PanWest {get;}

[C++] public: _property static Cursor* get_PanWest( );

[VB] Public Shared ReadOnly Property PanWest As Cursor

[JScript] public static function get PanWest( ): Cursor;

Description

Gets the cursor that appears during wheel operations when the mouse is moving and the window is scrolling horizontally to the left.

pp) SizeAll qq) ToString

[C#] public static Cursor SizeAll {get;}

[C++] public: _property static Cursor* get_SizeAll( );

[VB] Public Shared ReadOnly Property SizeAll As Cursor

[JScript] public static function get SizeAll( ): Cursor;

Description

Gets the four-headed sizing cursor, which consists of four joined arrows that point north, south, east, and west.

rr) SizeNESW ss) ToString

[C#] public static Cursor SizeNESW {get;}

[C++] public: _property static Cursor* get_SizeNESW( );

[VB] Public Shared ReadOnly Property SizeNESW As Cursor

[JScript] public static function get SizeNESW( ): Cursor;

Description

Gets the two-headed diagonal (northeast/southwest) sizing cursor.

tt) SizeNS uu) ToString

[C#] public static Cursor SizeNS {get;}

[C++] public: _property static Cursor* get_SizeNS( );

[VB] Public Shared ReadOnly Property SizeNS As Cursor

[JScript] public static function get SizeNS( ): Cursor;

Description

Gets the two-headed vertical (north/south) sizing cursor.

vv) SizeNWSE ww) ToString

[C#] public static Cursor SizeNWSE {get;}

[C++] public: _property static Cursor* get_SizeNWSE( );

[VB] Public Shared ReadOnly Property SizeNWSE As Cursor

[JScript] public static function get SizeNWSE( ): Cursor;

Description

Gets the two-headed diagonal (northwest/southeast) sizing cursor.

xx) Size WE yy) ToString

[C#] public static Cursor SizeWE {get;}

[C++] public: _property static Cursor* get_SizeWE( );

[VB] Public Shared ReadOnly Property SizeWE As Cursor

[JScript] public static function get SizeWE( ): Cursor;

Description

Gets the two-headed horizontal (west/east) sizing cursor.

zz) UpArrow aaa) ToString

[C#] public static Cursor UpArrow {get;}

[C++] public: _property static Cursor* get_UpArrow( );

[VB] Public Shared ReadOnly Property UpArrow As Cursor

[JScript] public static function get UpArrow( ): Cursor;

Description

Gets the up arrow cursor, typically used to identify an insertion point.

bbb) VSplit ccc) ToString

[C#] public static Cursor VSplit {get;}

[C++] public: _property static Cursor* get_VSplit( );

[VB] Public Shared ReadOnly Property VSplit As Cursor

[JScript] public static function get VSplit( ): Cursor;

Description

Gets the cursor that appears when the mouse is positioned over a vertical splitter bar.

ddd) WaitCursor eee) ToString

[C#] public static Cursor WaitCursor {get;}

[C++] public: _property static Cursor* get_WaitCursor( );

[VB] Public Shared ReadOnly Property WaitCursor As Cursor

[JScript] public static function get WaitCursor( ): Cursor;

Description

Gets the wait cursor, typically an hourglass shape.

DataFormats class (System.Windows.Forms)

a) ToString

Description

Provides static, predefined System.Windows.Forms.Clipboard format names. Use them to identify the format of data that you store in an System.Windows.Forms.IDataObject.

The System.Windows.Forms.IDataObject and System.Windows.Forms.DataObject classes also use the static format list to determine the type of data that is retrieved from the system System.Windows.Forms.Clipboard, or that is transferred in a drag-and-drop operation.

b) ToString

[C#] public static readonly string Bitmap;

[C++] public: static String* Bitmap;

[VB] Public Shared ReadOnly Bitmap As String

[JScript] public static var Bitmap: String;

Description

Specifies a Windows bitmap format. This static field is read-only.

A bitmap represents a computer graphic as an array of bits in memory, and these bits represent the attributes of the individual pixels in an image.

c) ToString

[C#] public static readonly string CommaSeparatedValue;

[C++] public: static String* CommaSeparatedValue;

[VB] Public Shared ReadOnly CommaSeparatedValue As String

[JScript] public static var CommaSeparatedValue: String;

Description

Specifies a comma-separated value (CSV) format, which is a common interchange format used by spreadsheets. This format is not used directly by Windows Forms. This static field is read-only.

This field is used by the System.Windows.Forms.IDataObject interface and the System.Windows.Forms.DataObject class to specify the data type.

d) ToString

[C#] public static readonly string Dib;

[C++] public: static String* Dib;

[VB] Public Shared ReadOnly Dib As String

[JScript] public static var Dib: String;

Description

Specifies the Windows Device Independent Bitmap (DIB) format. This static field is read-only.

DIB is a file format designed to ensure that bitmapped graphics created using one application can be loaded and displayed in another application exactly the way they appeared in the originating application.

e) ToString

[C#] public static readonly string Dif;

[C++] public: static String* Dif;

[VB] Public Shared ReadOnly Dif As String

[JScript] public static var Dif: String;

Description

Specifies the Windows Data Interchange Format (DIF), which Windows Forms does not directly use. This static field is read-only.

DIF is a format consisting of ASCII codes in which database, spreadsheet, and similar documents can be structured to facilitate their use by and transfer to other programs.

f) ToString

[C#] public static readonly string EnhancedMetafile;

[C++] public: static String* EnhancedMetafile;

[VB] Public Shared ReadOnly EnhancedMetafile As String

[JScript] public static var EnhancedMetafile: String;

Description

Specifies the Windows enhanced metafile format. This static field is read-only.

The metafile format is a Windows file that stores an image in terms of graphic objects rather than pixels. When resized, a metafile preserves an image better than a bitmap.

g) ToString

[C#] public static readonly string FileDrop;

[C++] public: static String* FileDrop;

[VB] Public Shared ReadOnly FileDrop As String

[JScript] public static var FileDrop: String;

Description

Specifies the Windows file drop format, which Windows Forms does not directly use. This static field is read-only.

You can use this format to interact with shell file drags during drag-and-drop operations.

h) ToString

[C#] public static readonly string Html;

[C++] public: static String* Html;

[VB] Public Shared ReadOnly Html As String

[JScript] public static var Html: String;

Description

Specifies text consisting of HTML data. This static field is read-only.

This field is used by the System.Windows.Forms.IDataObject interface and the System.Windows.Forms.DataObject class to specify the data type.

i) ToString

[C#] public static readonly string Locale;

[C++] public: static String* Locale;

[VB] Public Shared ReadOnly Locale As String

[JScript] public static var Locale: String;

Description

Specifies the Windows culture format, which Windows Forms does not directly use. This static field is read-only.

This field is used by the System.Windows.Forms.IDataObject interface and the System.Windows.Forms.DataObject class to specify the data type.

h) ToString

[C#] public static readonly string MetafilePict;

[C++] public: static String* MetafilePict;

[VB] Public Shared ReadOnly MetafilePict As String

[JScript] public static var MetafilePict: String;

Description

Specifies the Windows metafile format, which Windows Forms does not directly use. This static field is read-only.

The metafile format is a Windows file that stores an image in terms of graphic objects rather than pixels. When resized, a metafile preserves an image better than a bitmap.

k) ToString

[C#] public static readonly string OemText;

[C++] public: static String* OemText;

[VB] Public Shared ReadOnly OemText As String

[JScript] public static var OemText: String;

Description

Specifies the standard Windows original equipment manufacturer (OEM) text format. This static field is read-only.

This field is used by the System.Windows.Forms.IDataObject interface and the System.Windows.Forms.DataObject class to specify the data type.

l) ToString

[C#] public static readonly string Palette;

[C++] public: static String* Palette;

[VB] Public Shared ReadOnly Palette As String

[JScript] public static var Palette: String;

Description

Specifies the Windows palette format. This static field is read-only.

Use this field to query a System.Windows.Forms.DataObject for the format of data that it contains.

m) ToString

[C#] public static readonly string PenData;

[C++] public: static String* PenData;

[VB] Public Shared ReadOnly PenData As String

[JScript] public static var PenData: String;

Description

Specifies the Windows pen data format, which consists of pen strokes for handwriting software; Windows Forms does not use this format. This static field is read-only.

This field is used by the System.Windows.Forms.IDataObject interface and the System.Windows.Forms.DataObject class to specify the data type.

n) ToString

[C#] public static readonly string Riff;

[C++] public: static String* Riff;

[VB] Public Shared ReadOnly Riff As String

[JScript] public static var Riff: String;

Description

Specifies the Resource Interchange File Format (RIFF) audio format, which Windows Forms does not directly use. This static field is read-only.

RIFF is a broad-based specification, designed to be used in defining standard formats for different types of multimedia files.

o) ToString

[C#] public static readonly string Rtf;

[C++] public: static String* Rtf;

[VB] Public Shared ReadOnly Rtf As String

[JScript] public static var Rtf: String;

Description

Specifies text consisting of Rich Text Format (RTF) data. This static field is read-only.

RTF is an adaptation of Document Content Architecture that is used for transferring formatted text documents between applications.

p) ToString

[C#] public static readonly string Serializable;

[C++] public: static String* Serializable;

[VB] Public Shared ReadOnly Serializable As String

[JScript] public static var Serializable: String;

Description

Specifies a format that encapsulates any type of Windows Forms object. This static field is read-only.

This field is used by the System.Windows.Forms.IDataObject interface and the System.Windows.Forms.DataObject class to specify the data type.

q) ToString

[C#] public static readonly string StringFormat;

[C++] public: static String* StringFormat;

[VB] Public Shared ReadOnly StringFormat As String

[JScript] public static var StringFormat: String;

Description

Specifies the Windows Forms string class format, which Windows Forms uses to store string objects. This static field is read-only.

This field is used by the System.Windows.Forms.IDataObject interface and the System.Windows.Forms.DataObject class to specify the data type.

r) ToString

[C#] public static readonly string SymbolicLink;

[C++] public: static String* SymbolicLink;

[VB] Public Shared ReadOnly SymbolicLink As String

[JScript] public static var SymbolicLink: String;

Description

Specifies the Windows symbolic link format, which Windows Forms does not directly use. This static field is read-only.

A symbolic link is a disk directory entry that takes the place of a directory entry for a file, but is actually a reference to a file in a different directory. A symbolic link is also called an alias, shortcut, soft link, or symlink.

s) ToString

[C#] public static readonly string Text;

[C++] public: static String* Text;

[VB] Public Shared ReadOnly Text As String

[JScript] public static var Text: String;

Description

Specifies the standard ANSI text format. This static field is read-only.

This field is used by the System.Windows.Forms.IDataObject interface and the System.Windows.Forms.DataObject class to specify the data type.

t) ToString

[C#] public static readonly string Tiff,

[C++] public: static String* Tiff;

[VB] Public Shared ReadOnly Tiff As String

[JScript] public static var Tiff: String;

Description

Specifies the Tagged Image File Format (TIFF), which Windows Forms does not directly use. This static field is read-only.

TIFF is a standard file format commonly used for scanning, storage, and interchanges of gray-scale graphic images.

u) ToString

[C#] public static readonly string UnicodeText;

[C++] public: static String* UnicodeText;

[VB] Public Shared ReadOnly UnicodeText As String

[JScript] public static var UnicodeText: String;

Description

Specifies the standard Windows Unicode text format. This static field is read-only.

This field is used by the System.Windows.Forms.IDataObject interface and the System.Windows.Forms.DataObject class to specify the data type.

v) ToString

[C#] public static readonly string WaveAudio;

[C++] public: static String* WaveAudio;

[VB] Public Shared ReadOnly WaveAudio As String

[JScript] public static var WaveAudio: String;

Description

Specifies the wave audio format, which Windows Forms does not directly use.

This static field is read-only. This field is used by the System.Windows.Forms.IDataObject interface and the System.Windows.Forms.DataObject class to specify the data type.

w) GetFormat

[C#] public static Format GetFormat(int id);

[C++] public: static Format* GetFormat(int id);

[VB] Public Shared Function GetFormat(ByVal id As Integer) As Format

[JScript] public static function GetFormat(id: int): Format;

Description

Returns a System.Windows.Forms.DataFormats.Format with the Windows Clipboard numeric ID and name for the specified ID.

Return Value: A System.Windows.Forms.DataFormats.Format that has the Windows Clipboard numeric ID and the name of the format.

This member is typically used to register native clipboard formats. The format ID.

x) GetFormat

[C#] public static Format GetFormat(string format);

[C++] public: static Format* GetFormat(String* format);

[VB] Public Shared Function GetFormat(ByVal format As String) As Format

[JScript] public static function GetFormat(format: String): Format; Returns a System.Windows.Forms.DataFormats.Format with the Windows Clipboard numeric ID and name.

Description

Returns a System.Windows.Forms.DataFormats.Format with the Windows Clipboard numeric ID and name for the specified format.

Return Value: A System.Windows.Forms.DataFormats.Format that has the Windows Clipboard numeric ID and the name of the format. Call System.Windows.Forms.DataFormats.GetFormat(System.String) with the format name when you need a Windows Clipboard numeric ID for an existing format. The format name.

DataGrid class (System.Windows.Forms)

a) ToString

Description

Displays ADO.NET data in a scrollable grid.

The System.Windows.Forms.DataGrid displays web-like links to child tables. You can click on a link to navigate to the child table. When a child table is displayed, a back button appears in the caption that can be clicked to navigate back to the parent table. The data from the parent rows is displayed below the caption and above the column headers. You can hide the parent row information by clicking the button to the right of the back button.

b) ToString

[C#] public const int AutoColumnSize;

[C++] public: const int AutoColumnSize;

[VB] Public Const AutoColumnSize As Integer

[JScript] public var AutoColumnSize int;

Description

Specifies that the grid automatically sizes columns to the maximum width of the first ten rows. This field is constant.

Set System.Windows.Forms.DataGrid.PreferredColumnWidth to System.Windows.Forms.DataGrid.AutoColumnSize to automatically size grid columns.

c) DataGrid

Example Syntax:

d) ToString

[C#] public DataGrid( );

[C++] public: DataGrid( );

[VB] Public Sub New( )

[JScript] public function DataGrid( );

Description

Initializes a new instance of the System.Windows.Forms.DataGrid class.

To populate a newly created System.Windows.Forms.DataGrid control, set the System.Windows.Forms.DataGrid.DataSource property to a valid source, such as a System.Data.DataView, System.Data.DataSet, or System.Data.DataViewManager.

e) AccessibilityObject f) AccessibleDefaultActionDescription g) AccessibleDescription h) AccessibleName i) AccessibleRole j) AllowDrop k) AllowNavigation l) ToString Description Gets or sets a value indicating whether navigation is allowed.

If this property is set to false, no links to child tables are shown.

m) AllowSorting n) ToString

[C#] public bool AllowSorting {get; set;}

[C++] public: _property bool get_AllowSorting( ); public: _property void set_AllowSorting(bool);

[VB] Public Property AllowSorting As Boolean

[JScript] public function get AllowSorting( ): Boolean; public function set AllowSorting(Boolean);

Description

Gets or sets a value indicating whether the grid can be resorted by clicking on a column header.

You can also sort using an expression for a System.Data.DataColumn. See System.Data.DataColumn.Expression for details on creating a sort expression.

o) AlternatingBackColor p) ToString

[C#] public Color AlternatingBackColor {get; set;}

[C++] public: _property Color get_AlternatingBackColor( ); public: _property void set_AlternatingBackColor(Color);

[VB] Public Property AlternatingBackColor As Color

[JScript] public function get_AlternatingBackColor( ): Color; public function set AlternatingBackColor(Color);

Description

Gets or sets the background color of alternating rows for a ledger appearance.

By default, all rows have the same color (the System.Windows.Forms.Control.BackColor property of the control). When you set the System.Windows.Forms.DataGrid.AlternatingBackColor to a new color, every other row is set to the new color.

q) Anchor r) BackColor s) ToString

Description

Gets or sets the background color of the grid.

Whereas the System.Windows.Forms.DataGrid.BackColor property determines the color of rows in the grid, the System.Windows.Forms.DataGrid.BackgroundColor determines the color of the nonrow area, which is only visible when the grid is scrolled to the bottom, or if only a few rows are contained in the grid.

t) BackgroundColor u) ToString

[C#] public Color BackgroundColor {get; set;}

[C++] public: _property Color get_BackgroundColor( ); public: _property void set_BackgroundColor(Color);

[VB] Public Property BackgroundColor As Color

[JScript] public function get BackgroundColor( ): Color; public function set BackgroundColor(Color);

Description

Gets or sets the color of the nonrow area of the grid.

The System.Windows.Forms.DataGrid.BackgroundColor determines the color of the nonrow area of the grid, which is only visible when no table is displayed by the System.Windows.Forms.DataGrid, or if the grid is scrolled to the bottom, or if only a few rows are contained in the grid.

v) BackgroundImage w) ToString

[C#] public override Image BackgroundImage {get; set;}

[C++] public: _property virtual Image* get_BackgroundImage; public: _property virtual void set_BackgroundImage (Image*);

[VB] Overrides Public Property BackgroundImage As Image

[JScript] public function get BackgroundImage( ): Image; public function set BackgroundImage(Image);

Description

Gets or sets the background image for the control.

x) BindingContext y) BorderStyle z) ToString

Description

Gets or sets the grid's border style.

aa) Bottom bb) Bounds cc) CanFocus dd) CanSelect ee) CaptionBackColor ff) ToString Description Gets or sets the background color of the caption area.

gg) CaptionFont hh) ToString

[C#] public Font CaptionFont {get; set;}

[C++] public: _property Font* get_CaptionFont( ); public: _property void set_CaptionFont(Font*);

[VB] Public Property CaptionFont As Font

[JScript] public function get CaptionFont( ): Font; public function set CaptionFont(Font);

Description

Gets or sets the font of the grid's caption.

A System.Drawing.Font encapsulates a Windows font and provides the methods for manipulating that font.

ii) CaptionForeColor jj) ToString

[C#] public Color CaptionForeColor {get; set;}

[C++] public: _property Color get_CaptionForeColor( ); public: _property void set_CaptionForeColor(Color);

[VB] Public Property CaptionForeColor As Color

[JScript] public function get CaptionForeColor( ): Color; public function set CaptionForeColor(Color);

Description

Gets or sets the foreground color of the caption area.

kk) Caption Text ll) ToString

[C#] public string CaptionText {get; set;}

[C++] public: _property String* get_CaptionText( ); public: _property void set_CaptionText(String*);

[VB] Public Property CaptionText As String

[JScript] public function get CaptionText( ): String; public function set CaptionText(String);

Description

Gets or sets the text of the grid's window caption.

mm) Caption Visible nn) ToString

[C#] public bool CaptionVisible {get; set;}

[C++] public: _property bool get CaptionVisible( ); public: _property void set_CaptionVisible(bool);

[VB] Public Property CaptionVisible As Boolean

[JScript] public function get CaptionVisible( ): Boolean; public function set CaptionVisible(Boolean);

Description

Gets or sets a value that indicates whether the grid's caption is visible.

If System.Windows.Forms.DataGrid.CaptionVisible is false, the Back button, ParentRow button, and caption will not be seen. Because navigation is limited, links to child tables will also not be visible and System.Windows.Forms.DataGrid.AllowNavigation will be set to None. The following example toggles the System.Windows.Forms.DataGrid. CaptionVisible property.

oo) Capture pp) Causes Validation qq) ClientRectangle rr) ClientSize ss) ColumnHeadersVisible tt) ToString Description Gets or sets a value indicating whether the parent rows of a table are visible.

uu) CompanyName vv) Container ww) ContainsFocus xx) ContextMenu yy) Controls zz) Created aaa) CreateParams bbb) CurrentCell ccc) ToString Description Gets or sets which cell has the focus. Not available at design time.

Setting the System.Windows.Forms.DataGrid.CurrentCell property will cause the grid to scroll and show the cell if it is not already visible.

ddd) CurrentRowIndex eee) ToString

[C#] public int CurrentRowIndex {get; set;}

[C++] public: _property int get_CurrentRowIndex( ); public: _property void set_CurrentRowIndex(int);

[VB] Public Property CurrentRowIndex As Integer

[JScript] public function get CurrentRowIndex( ): int; public function set CurrentRowIndex(int);

Description

Gets or sets index of the selected row.

The System.Windows.Forms.DataGrid.CurrentRowIndex property allows you to iterate through a parent table's rows even if you are viewing the child table rows. For example, if you are viewing a child table, incrementing the System.Windows.Forms.DataGrid.CurrentRowIndex will cause the System.Windows.Forms.DataGrid to display the next set of records in the child table that are linked to the parent table.

fff) Cursor ggg) ToString

[C#] public override Cursor Cursor {get; set;}

[C++] public: _property virtual Cursor* get_Cursor( ); public: _property virtual void set_Cursor(Cursor*);

[VB] Overrides Public Property Cursor As Cursor

[JScript] public function get Cursor( ): Cursor; public function set Cursor(Cursor);

Description

Gets or sets the cursor for the control.

hhh) DataBindings iii) DataMember jjj) ToString

Description

Gets or sets the specific list in a System.Windows.Forms.DataGrid.DataSource for which the System.Windows.Forms.DataGrid control displays a grid.

If a System.Windows.Forms.DataGrid.DataSource contains multiple sources of data, you should set the System.Windows.Forms.DataGrid.DataMember to one of the sources. For example, if the System.Windows.Forms.DataGrid.DataSource is a System.Data.DataSet or System.Data.DataViewManager that contains three tables named Customers, Orders, and OrderDetails, you must specify one of the tables to bind to. If the System.Data.DataSet or System.Data.DataViewManager contains only one System.Data.DataTable, you should set the System.Windows.Forms.DataGrid. DataMember to the System.Data.DataTable.TableName of that System.Data.DataTable.

kkk) DataSource lll) ToString

[C#] public object DataSource {get; set;}

[C++] public: _property Object* get_DataSource( ); public: _property void set_DataSource(Object*);

[VB] Public Property DataSource As Object

[JScript] public function get DataSource( ): Object; public function set DataSource(Object);

Description

Gets or sets the data source that the grid is displaying data for.

At run time, use the System.Windows.Forms.DataGrid. SetDataBinding(System.Object,System.String) method to set the System.Windows.Forms.DataGrid.DataSource and System.Windows.Forms.DataGrid.DataMember properties.

mmm) DefaultImeMode nnn) DefaultSize ooo) ToString

Description

Gets the default size of the control.

ppp) DesignMode qqq) DisplayRectangle rrr) Disposing sss) Dock ttt) Enabled uuu) Events vvv) FirstVisibleColumn www) ToString Description Gets the index of the first visible column in a grid.

A column is considered visible even if it is partially concealed.

xxx) FlatMode yyy) ToString

[C#] public bool FlatMode {get; set;}

[C++] public: _property bool get_FlatMode( ); public: _property void set_FlatMode(bool);

[VB] Public Property FlatMode As Boolean

[JScript] public function get FlatMode( ): Boolean; public function set FlatMode(Boolean);

Description

Gets or sets a value indicating whether the grid displays in flat mode.

zzz) Focused aaaa) Font bbbb) ForeColor cccc) ToString

Description

Gets or sets the foreground color (typically the color of the text) property of the System.Windows.Forms.DataGrid control.

dddd) GridLineColor eeee) ToString

[C#] public Color GridLineColor {get; set;}

[C++] public: _property Color get_GridLineColor( ); public: _property void set_GridLineColor(Color);

[VB] Public Property GridLineColor As Color

[JScript] public function get GridLineColor( ): Color; public function set GridLineColor(Color);

Description

Gets or sets the color of the grid lines.

No grid line is displayed if the System.Windows.Forms.DataGrid.GridLineStyle property is set to DataGridLineStyle. None.

ffff) GridLineStyle gggg) ToString

[C#] public DataGridLineStyle GridLineStyle {get; set;}

[C++] public: _property DataGridLineStyle get_GridLine Style( ); public: _property void set_GridLineStyle(DataGridLineStyle);

[VB] Public Property GridLineStyle As DataGridLineStyle

[JScript] public function get GridLineStyle( ): DataGridLine Style; public function set GridLineStyle(DataGridLine Style);

Description

Gets or sets the line style of the grid.

hhhh) Handle iiii) HasChildren jjjj) HeaderBackColor kkkk) ToString

Description

Gets or sets the background color of all row and column headers.

llll) HeaderFont mmmm) ToString

[C#] public Font HeaderFont {get; set;}

[C++] public: _property Font* get_HeaderFont( ); public: _property void set_HeaderFont(Font*);

[VB] Public Property HeaderFont As Font

[JScript] public function get HeaderFont( ): Font; public function set HeaderFont(Font);

Description

Gets or sets the font used for headers.

You typically use this method only if you are either creating a designer for the System.Windows.Forms.DataGrid, or creating your own control incorporating the System.Windows. Forms.DataGrid You typically use this method only if you are either creating a designer for the System.Windows.Forms.DataGrid, or creating your own control incorporating the System.Windows. Forms.DataGrid.

nnnn) HeaderForeColor oooo) ToString

[C#] public Color HeaderForeColor {get; set;}

[C++] public: _property Color get_HeaderForeColor( ); public: _property void set_HeaderForeColor(Color);

[VB] Public Property HeaderForeColor As Color

[JScript] public function get HeaderForeColor( ): Color; public function set HeaderForeColor(Color);

Description

Gets or sets the foreground color of headers.

The following example sets the foreground color of the grid's column headers.

pppp) Height qqqq) HorizScrollBar rrrr) ToString

Description

Gets the horizontal scrollbar for the grid.

ssss) ImeMode tttt) InvokeRequired uuuu) IsAccessible vvvv) IsDisposed wwww) IsHandleCreated xxxx) Item yyyy) ToString Description Gets or sets the value of a specified System.Windows.Forms. DataGridCell.

Setting this property changes the position of the System.Data. DataView to the specified row. A System.Windows.Forms. DataGridCell that represents a cell in the grid.

zzzz) Item aaaaa) ToString

[C#] public object this[int rowIndex, int columnIndex] {get; set;}

[C++] public: _property Object* get_Item(int rowIndex, int columnIndex); public: _property void set_Item(int rowIndex, int columnIndex, Object*);

[VB] Public Default Property Item(ByVal rowIndex As Integer, ByVal columnIndex As Integer) As Object

[JScript] returnValue=DataGridObject.Item(rowIndex, columnIndex); DataGridObject.Item(rowIndex, columnindex)= retumvalue; Gets or sets the value of a specified cell.

Description

Gets or sets the value of the cell at the specified the row and column.

Setting this property changes the position of the System.Data. DataView to the specified row. The zero-based index of the row containing the value. The zero-based index of the column containing the value.

bbbbb) Left ccccc) LinkColor ddddd) ToString

Description

Gets or sets the color of the text that you can click to navigate to a child table.

You typically use this method only if you are either creating a designer for the System.Windows.Forms.DataGrid, or creating your own control incorporating the System.Windows. Forms.DataGrid.

eeeee) LinkHoverColor fffff) ToString

[C#] public Color LinkHoverColor {get; set;}

[C++] public: _property Color get_LinkHoverColor( ); public: _property void set_LinkHoverColor(Color);

[VB] Public Property LinkHoverColor As Color

[JScript] public function get LinkHoverColor( ): Color; public function set LinkHoverColor(Color);

Description

Gets or sets the color a link changes to when the mouse pointer moves over it.

ggggg) ListManager hhhhh) ToString

[C#] protected internal CurrencyManager ListManager {get; set;}

[C++] internal: _property CurrencyManager* get_ListManager( );internal: _property void set_ListManager(CurrencyManager*);

[VB] Protected Friend Property ListManager As CurrencyManager

[JScript] package function get ListManager( ): CurrencyManager; package function set ListManager(CurrencyManager);

Description

Gets the System.Windows.Forms.CurrencyManager for this System.Windows.Forms.DataGrid control.

iiiii) Location jjjj) Name kkkkk) Parent lllll) ParentRowsBackColor mmmmm) ToString Description Gets or sets the background color of parent rows.

nnnnn) ParentRowsForeColor ooooo) ToString

[C#] public Color ParentRowsForeColor {get; set;}

[C++] public: _property Color get_ParentRowsForeColor( ); public: _property void set_ParentRowsForeColor(Color);

[VB] Public Property ParentRowsForeColor As Color

[JScript] public function get ParentRowsForeColor( ): Color; public function set ParentRowsForeColor(Color);

Description

Gets or sets the foreground color of parent rows.

ppppp) ParentRowsLabelStyle (qqqqq) ToString

[C#] public DataGridParentRowsLabelStyle ParentRowsLabelStyle {get; set;}

[C++] public: _property DataGridParentRowsLabelStyle get_ParentRowsLabelStyle( ); public: _property void set_ParentRowsLabelStyle(DataGridParentRowsLabelStyle);

[VB] Public Property ParentRowsLabelStyle As DataGridParentRowsLabelStyle

[JScript] public function get ParentRowsLabelStyle( ): DataGridParentRowsLabelStyle; public function setParentRowsLabelStyle(DataGridParentRowsLabelStyle);

Description

Gets or sets the way parent row labels are displayed.

rrrrr) ParentRowsVisible sssss) ToString

[C#] public bool ParentRowsVisible {get; set;}

[C++] public: _property bool get_ParentRowsVisible( ); public: _property void set_ParentRowsVisible(bool);

[VB] Public Property ParentRowsVisible As Boolean

[JScript] public function get ParentRowsVisible( ): Boolean; public function set ParentRowsVisible(Boolean);

Description

Gets or sets a value indicating whether the parent rows of a table are visible.

ttttt) PreferredColumn Width uuuuu) ToString

[C#] public int PreferredColumnWidth {get; set;}

[C++] public: _property int get_PreferredColumnWidth( ); public: _property void set_PreferredColumnWidth(int);

[VB] Public Property PreferredColumnWidth As Integer

[JScript] public function get PreferredColumnWidth( ): int; public function set PreferredColumnWidth(int);

Description

Gets or sets the default width of the grid columns in pixels.

Set this property before resetting the System.Windows.Forms.DataGrid.DataSource and System.Windows.Forms.DataGrid.DataMember properties (either separately, or through the System.Windows.Forms.DataGrid.SetData Binding(System.Object, System.String) method), or the property will have no effect.

vvvvv) PreferredRowHeight wwwww) ToString

[C#] public int PreferredRowHeight {get; set;}

[C++] public: _property int get_PreferredRowHeight( ); public: _property void set_PreferredRowHeight(int);

[VB] Public Property PreferredRowHeight As Integer

[JScript] public function get PreferredRowHeight( ): int; public function set PreferredRowHeight(int);

Description

Gets or sets the preferred row height for the System.Windows.Forms.DataGrid control.

Set this property before resetting the System.Windows.Forms.DataGrid.DataSource and System.Windows.Forms.DataGrid.DataMember properties (either separately, or through the System.Windows.Forms.DataGrid. SetDataBinding(System.Object, System.String) method), or the property will have no effect.

xxxxx) ProductName yyyyy) ProductVersion zzzzz) ReadOnly aaaaaa) ToString

Description

Gets or sets a value indicating whether the grid is in read-only mode.

In read-only mode, the grid can be scrolled, nodes can be expanded or collapsed, and so on, However, no additions, edits, or deletes may take place.

bbbbbb) RecreatingHandle cccccc) Region dddddd) RenderRightToLeft eeeeee) ResizeRedraw ffffff) Right gggggg) RightToLeft hhhhhh) RowHeadersVisible iiiii) ToString Description Gets or sets a value that specifies whether row headers are visible.

jjjjjj) RowHeaderWidth kkkkkk) ToString

[C#] public int RowHeaderWidth {get; set;}

[C++] public: _property int get_RowHeaderWidth( ); public: _property void set_RowHeaderWidth(int);

[VB] Public Property RowHeaderWidth As Integer

[JScript] public function get RowHeaderWidth( ): int; public function set RowHeaderWidth(int);

Description

Gets or sets the width of row headers.

llllll) SelectionBackColor mmmmmm) ToString

[C#] public Color SelectionBackColor {get; set;}

[C++] public: _property Color get_SelectionBackColor( ); public: _property void set_SelectionBackColor(Color);

[VB] Public Property SelectionBackColor As Color

[JScript] public function get SelectionBackColor( ): Color; public function set SelectionBackColor(Color);

Description

Gets or sets the background color of selected rows.

You typically use this method if you are either creating a designer for the System.Windows.Forms.DataGrid or creating your own control incorporating the System.Windows.Forms.DataGrid.

nnnnnn) SelectionForeColor oooooo) ToString

[C#] public Color SelectionForeColor {get; set;}

[C++] public: _property Color get_SelectionForeColor( ); public: _property void set_SelectionForeColor(Color);

[VB] Public Property SelectionForeColor As Color

[JScript] public function get SelectionForeColor( ): Color; public function set SelectionForeColor(Color);

Gets or set the foreground color of selected rows.

pppppp) ShowFocusCues qqqqqq) ShowKeyboardCues rrrrrr) Site ssssss) ToString tttttt) Size uuuuuu) TabIndex vvvvvv) TableStyles wwwwww) ToString Gets the collection of System.Windows.Forms.DataGridTableStyle objects for the grid.

Use the System.Windows.Forms.GridTableStylesCollection to create customized views of each table displayed by the System.Windows.Forms.DataGrid control.

xxxxxx) TabStop yyyyyy) Tag zzzzzz) Text aaaaaaa) ToString

Gets or sets text associated with the System.Windows.Forms.DataGrid control.

bbbbbbb) Top ccccccc) TopLevelControl ddddddd) VertScrollBar eeeeeee) ToString

Gets the vertical scroll bar of the control.

fffffff) Visible ggggggg) VisibleColumn Count hhhhhhh) ToString

Gets the number of visible columns.

The number of visible columns can change depending on their width. For example, if a default width for all columns is set, but a new column's width is set twice as large, the number of visible columns will be reduced by at least one.

iiiiiii) VisibleRowCount jjjjjj) ToString

[C#] public int VisibleRowCount {get;}

[C++] public: _property int get_VisibleRowCount( );

[VB] Public ReadOnly Property VisibleRowCount As Integer

[JScript] public function get VisibleRowCount( ): int;

Gets the number of rows visible.

The number of visible rows can be changed at run time if the user is allowed to resize the System.Windows.Forms.DataGrid control.

kkkkkkk) Width lllllll) WindowTarget mmmmmmm) ToString

Occurs when the System.Windows.Forms.DataGrid.AllowNavigation property has changed.

If the System.Windows.Forms.DataGrid.AllowNavigation property is set to false, then no links to child tables are shown.

nnnnnnn) ToString

[C#] public event EventHandler BackButtonClick;

[C++] public: _event EventHandler* BackButtonClick;

[VB] Public Event BackButtonClick As EventHandler

Occurs when the Back button on a child table is clicked.

The Back button becomes visible when a child table is displayed. Clicking the button will cause the grid to display the parent table.

ooooooo) ToString

Occurs when the System.Windows.Forms.DataGrid. BackgroundColor has changed.

For more information about handling events, see.

ppppppp) ToString

Occurs when the System.Windows.Forms.DataGrid. BorderStyle has changed.

Possible values include None, FixedSingle, and Fixed3D.

qqqqqqq) ToString

[C#] public event EventHandler CaptionVisibleChanged;

[C++] public: _event EventHandler* CaptionVisibleChanged;

[VB] Public Event CaptionVisibleChanged As EventHandler

Occurs when the System.Windows.Forms.DataGrid. CaptionVisible property has changed.

For more information about handling events, see.

rrrrrrr) ToString

Occurs when the System.Windows.Forms.DataGrid. CurrentCell property has changed.

To determine the current cell, use the System.Windows.Forms.DataGrid.CurrentCell property.

sssssss) ToString

Occurs when the System.Windows.Forms.DataGrid.DataSource property value has changed.

For more information about handling events, see.

ttttttt) ToString

Occurs when the System.Windows.Forms.DataGrid. FlatMode has changed.

For more information about handling events, see.

uuuuuuu) ToString

Occurs when the user navigates to a new table.

Use the System.Windows.Forms.DataGrid.Navigate event to reset individual column properties, such as Width, as appropriate to the table.

vvvvvvv) ToString

Occurs when the label style of the parent row is changed.

For more information about handling events, see.

wwwwwww) ToString

[C#] public event EventHandler ParentRowsVisibleChanged;

[C++] public: _event EventHandler* ParentRowsVisibleChanged;

[VB] Public Event ParentRowsVisibleChanged As EventHandler

Occurs when the System.Windows.Forms.DataGrid. Parent RowsVisible property value changes.

For more information about handling events, see.

xxxxxxx) ToString

Occurs when the System.Windows.Forms.DataGrid. Read Only property value changes.

For more information about handling events, see.

yyyyyyy) ToString

Occurs when a row header is clicked.

For more information about handling events, see.

zzzzzzz) ToString

[C#] public event EventHandler Scroll;

[C++] public: _event EventHandler* Scroll;

[VB] Public Event Scroll As EventHandler

Occurs when the user scrolls the System.Windows.Forms. DataGrid control.

aaaaaaaa) ToString

[C#] public event EventHandler ShowParentDetailsButtonClick;

[C++] public: _event EventHandler* ShowParentDetailsButtonClick;

[VB] Public Event ShowParentDetailsButtonClick As EventHandler

Occurs when the ShowParentDetails button is clicked.

bbbbbbbb) BeginEdit

[C#] public bool BeginEdit(DataGridColumnStyle gridColumn, int rowNumber);

[C++] public: _sealed bool BeginEdit(DataGridColumnStyle* gridColumn, it rowNumber);

[VB] NotOverridable Public Function BeginEdit(ByVal gridColumn As DataGridColumnStyle, ByVal rowNumber As Integer) As Boolean

[JScript] public function BeginEdit(gridColumn: DataGridColumnStyle, rowNumber: int): Boolean;

Attempts to put the grid into a state where editing is allowed.

Return Value: true if the method is successful; otherwise, false. A System.Windows.Forms.DataGridColumnStyle to edit. The number of the row to edit.

ccccccc) BeginInit

[C#] public void BeginInit( );

[C++] public: _sealed void BeginInit( );

[VB] NotOverridable Public Sub BeginInit( )

[JScript] public function BeginInit( );

Begins the initialization of a System.Windows.Forms.DataGrid that is used on a form or used by another component. The initialization occurs at run time.

The Visual Studio.NET design environment uses this method to start the initialization of a component that is used on a form or used by another component. The System.Windows.Forms. DataGrid.EndInit method ends the initialization. Using the System.Windows.Forms.DataGrid.Beginmit and System. Windows.Forms.DataGrid.EndInit methods prevents the control from being used before it is fully initialized.

dddddddd) CancelEditing

[C#] protected virtual void CancelEditing( );

[C++] protected: virtual void CancelEditing( );

[VB] Overridable Protected Sub CancelEditing( )

[JScript] protected function CancelEditing( );

Cancels the current edit operation and rolls back all changes.

eeeeeeee) Collapse

[C#] public void Collapse(int row);

[C++] public: void Collapse(int row);

[VB] Public Sub Collapse(ByVal row As Integer)

[JScript] public function Collapse(row: int);

Collapses child relations, if any exist for all rows, or for a specified row.

Use the System.Windows.Forms.DataGrid.IsExpanded(System.Int32) method to determine if a row is expanded. The number of the row to collapse. If set to −1, all rows are collapsed.

ffffffff) ColumnStartedEditing

[C#] protected internal virtual void ColumnStartedEditing (Control editingControl);

[C++] protected public: virtual void ColumnStartedEditing (Control* editingControl);

[VB] Overridable Protected Friend Dim Sub ColumnStartedEditing(ByVal editingControl As Control)

[JScript] package function ColumnStartedEditing(editingControl: Control);

Informs the System.Windows.Forms.DataGrid control when the user begins to edit a column using the specified control.

When called, the System.Windows.Forms.IDataGridColumnStyleEditingNotificationService.ColumnStarted Editing(System.Windows.Forms.Control) method allows the System.Windows.Forms.DataGrid control to show a pencil in the row header. The System.Windows.Forms.Control used to edit the column.

gggggggg) ColumnStartedEditing

[C#] protected internal virtual void ColumnStartedEditing (Rectangle bounds);

[C++] protected public: virtual void ColumnStartedEditing (Rectangle bounds);

[VB] Overridable Protected Friend Dim Sub ColumnStartedEditing(ByVal bounds As Rectangle)

[JScript] package function ColumnStartedEditing(bounds: Rectangle); Informs the System.Windows.Forms.DataGrid control that the user has begun editing a column.

Informs the System.Windows.Forms.DataGrid control when the user begins to edit the column at the specified location.

When called, the System.Windows.Forms.IDataGridColumnStyleEditingNotificationService.ColumnStartedEditing(System.Windows.Forms. Control) method allows the System. Windows.Forms. DataGrid control to show a pencil in the row header. The System.Drawing.Rectangle that defines the location of the edited column.

hhhhhhhh) CreateAccessibilityInstance

[C#] protected override AccessibleObject CreateAccessibilityInstance( );

[C++] protected: AccessibleObject* CreateAccessibilityInstance( );

[VB] Overrides Protected Function CreateAccessibilityInstance( ) As AccessibleObject

[JScript] protected override function CreateAccessibilityInstance( ): AccessibleObject;

Constructs a new instance of the accessibility object for this control.

Return Value: The System.Windows.Forms.Control.ControlAccessibleObject for this control. Derived classes should not call the base class's System.Windows.Forms.Control. CreateAccessibilityInstance method.

iiiiiiii) CreateGridColumn

[C#] protected virtual DataGridColumnStyle CreateGridColumn(PropertyDescriptor prop);

[C++] protected: virtual DataGridColumnStyle* CreateGridColumn(PropertyDescriptor* prop);

[VB] Overridable Protected Function CreateGridColumn (ByVal prop As PropertyDescriptor) As DataGridColumnStyle

[JScript] protected function CreateGridColumn(prop: PropertyDescriptor): DataGridColumnStyle;

Creates a new System.Windows.Forms.DataGridColumnStyle with the specified System.ComponentModel. PropertyDescriptor.

Return Value: The new System.Windows.Forms.DataGridColumnStyle.

The System.ComponentModel.PropertyDescriptor to use for creating the grid column style.

jjjjjjjj) CreateGridColumn

[C#] protected virtual DataGridColumnStyle CreateGridColumn(PropertyDescriptor prop, bool isDefault);

[C++] protected: virtual DataGridColumnStyle* CreateGridColumn(PropertyDescriptor* prop, bool isDefault);

[VB] Overridable Protected Function CreateGridColumn (ByVal prop As PropertyDescriptor, ByVal isDefault As Boolean) As DataGridColumnStyle

[JScript] protected function CreateGridColumn(prop: PropertyDescriptor, isDefault: Boolean): DataGridColumnStyle; Creates a new System.Windows.Forms.DataGridColumnStyle that is added to the control.

Creates a System.Windows.Forms.DataGridColumnStyle using the specified System.ComponentModel.PropertyDescriptor.

Return Value. The new System.Windows.Forms.DataGridColumnStyle.

The System.ComponentModel.PropertyDescriptor to use for creating the grid column style. true to set the column style as the default; otherwise, false.

kkkkkkkk) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Disposes of the resources (other than memory) used by the System.Windows.Forms.DataGrid Call System.Windows.Forms.DataGrid.Dispose(System. Boolean) when you are finished using the System.Windows. Forms.DataGrid. The System.Windows.Forms.DataGrid. Dispose(System.Boolean) method leaves the System.Windows.Forms.DataGrid in an unuseable state. After calling System.Windows.Forms.DataGrid.Dispose(System.Boolean), you must release all references to the System.Windows. Forms.DataGrid so the memory it was occupying can be reclaimed by garbage collection.

llllllll) EndEdit

[C#] public bool EndEdit(DataGridColumnStyle gridColumn, int rowNumber, bool shouldAbort);

[C++] public: _sealed bool EndEdit(DataGridColumnStyle* gridColumn, int rowNumber, bool shouldAbort);

[VB] NotOverridable Public Function EndEdit(ByVal gridColumn As DataGridColumnStyle, ByVal rowNumber As Integer, ByVal shouldAbort As Boolean) As Boolean

[JScript] public function EndEdit(gridColumn: DataGridColumnStyle, rowNumber: int, shouldAbort: Boolean): Boolean;

Requests an end to an edit operation taking place on the System.Windows.Forms.DataGrid control.

Return Value: true if the editing operation ceases; otherwise, false. The System.Windows.Forms.DataGridColumnStyle to cease editing. The number of the row to cease editing. Set to true if the current operation should be stopped.

mmmmmmmm) EndInit

[C#] public void EndInit( );

[C++] public: _sealed void EndInit( );

[VB] NotOverridable Public Sub EndInit( )

[JScript] public function EndInit( );

Ends the initialization of a System.Windows.Forms.DataGrid that is used on a form or used by another component. The initialization occurs at run time.

The Visual Studio.NET design environment uses this method to end the initialization of a component that is used on a form or used by another component. The System.Windows.Forms.DataGrid.BeginInit method starts the initialization. Using the System.Windows.Forms.DataGrid.Beginmit and System.Windows.Forms.DataGrid.EndInit methods prevents the control from being used before it is fully initialized.

nnnnnnnn) Expand

[C#] public void Expand(int row);

[C++] public: void Expand(int row);

[VB] Public Sub Expand(ByVal row As Integer)

[JScript] public function Expand(row: int);

Displays child relations, if any exist, for all rows or a specific row. The number of the row to expand. If set to −1, all rows are expanded.

oooooooo) GetCellBounds

[C#] public Rectangle GetCellBounds(DataGridCell dgc);

[C++] public: Rectangle GetCellBounds(DataGridCell dgc);

[VB] Public Function GetCellBounds(ByVal dgc As DataGridCell) As Rectangle

[JScript] public function GetCellBounds(dgc: DataGridCell): Rectangle;

Gets the System.Drawing.Rectangle of the cell specified by System.Windows.Forms.DataGridCell.

Return Value. A System.Drawing.Rectangle that defines the current cell's corners. The System.Windows.Forms.DataGridCell to look up.

pppppppp) GetCellBounds

[C#] public Rectangle GetCellBounds(int row, int col);

[C++] public: Rectangle GetCellBounds(int row, int col);

[VB] Public Function GetCellBounds(ByVal row As Integer, ByVal col As Integer) As Rectangle

[JScript] public function GetCellBounds(row: int, col: int): Rectangle; Gets the System.Drawing.Rectangle that specifies the four corners of a cell.

Gets the System.Drawing.Rectangle of the cell specified by row and column number.

Return Value: A System.Drawing.Rectangle that defines the current cell's corners. The number of the cell's row. The number of the cell's column.

qqqqqqqq) GetCurrentCellBounds

[C#] public Rectangle GetCurrentCellBounds( );

[C++] public: Rectangle GetCurrentCellBounds( );

[VB] Public Function GetCurrentCellBounds( ) As Rectangle

[JScript] public function GetCurrentCellBounds( ): Rectangle;

Gets a System.Drawing.Rectangle that specifies the four corners of the selected cell.

Return Value: A System.Drawing.Rectangle that defines the current cell's corners.

rrrrrrrr) GetOutputTextDelimiter

[C#] protected virtual string GetOutputTextDelimiter( );

[C++] protected: virtual String* GetOutputTextDelimiter( );

[VB] Overridable Protected Function GetOutputTextDelimiter( ) As String

[JScript] protected function GetOutputTextDelimiter( ): String;

Will return the string that will be used as a delimiter between columns when copying rows contents to the Clipboard. At the moment, return "\t" Will return the string that will be used as a delimiter between columns when copying rows contents to the Clipboard. At the moment, return "\t"

ssssssss) GridHScrolled

[C#] protected virtual void GridHScrolled(object sender, ScrollEventArgs se);

[C++] protected: virtual void GridHScrolled(Object* sender, ScrollEventArgs* se);

[VB] Overridable Protected Sub GridHScrolled(ByVal sender As Object, ByVal se As ScrollEventArgs)

[JScript] protected function GridHScrolled(sender: Object, se: ScrollEventArgs);

Listens for the horizontal scrollbar's scroll event. An System.Object that contains data about the control. A System.Windows.Forms.ScrollEventArgs that contains the event data.

tttttttt) GridVScrolled

[C#] protected virtual void GridVScrolled(object sender, ScrollEventArgs se);

[C++] protected: virtual void GridVScrolled(Object* sender, ScrollEventArgs* se);

[VB] Overridable Protected Sub GridVScrolled(ByVal sender As Object, ByVal se As ScrollEventArgs)

[JScript] protected function GridVScrolled(sender: Object, se: ScrollEventArgs);

Listens for the vertical scrollbar's scroll event. An System. Object that contains data about the control. A System.Windows.Forms.ScrollEventArgs that contains the event data.

uuuuuuuu) HitTest

[C#] public HitTestInfo HitTest(Point position);

[C++] public: HitTestInfo* HitTest(Point position);

[VB] Public Function HitTest(ByVal position As Point) As HitTestInfo

[JScript] public function HitTest(position: Point): HitTestInfo;

Gets information, such as row and column number of a clicked point on the grid, about the grid using a specific System.Drawing.Point.

Return Value: A System.Windows.Forms.DataGrid. HitTestInfo that contains specific information about the grid.

The System.Windows.Forms.DataGrid.HitTestInfo, in conjunction with the System.Windows.Forms.DataGrid.HitTest (System.Int32,System.Int32) method of the System.Windows.Forms.DataGrid control, is used to determine which part of a System.Windows.Forms.DataGrid control the user has clicked. The System.Windows.Forms.DataGrid. HitTestInfo contains both the row, column and part of the grid that was clicked. Additionally, the System.Windows. Forms. DataGrid.HitTestInfo.Type property returns a System.Windows.Forms.DataGrid.HitTestType enumeration. A System. Drawing.Point that represents single x,y coordinate.

vvvvvvvv) HitTest

[C#] public HitTestInfo HitTest(int x, int y);

[C++] public: HitTestInfo* HitTest(int x, int y);

[VB] Public Function HitTest(ByVal x As Integer, ByVal y As Integer) As HitTestInfo

[JScript] public function HitTest(x: int, y: int): HitTestInfo; Gets information about the System.Windows.Forms.DataGrid control at a specified point on the screen.

Gets information, such as row and column number of a clicked point on the grid, using the x and y coordinate passed to the method.

Return Value: A System.Windows.Forms.DataGrid. HitTestInfo that contains information about the clicked part of the grid.

The System.Windows.Forms.DataGrid.HitTestInfo, in conjunction with the System.Windows.Forms.DataGrid.HitTest (System.Int32,System.Int32) method of the System.Windows.Forms.DataGrid control, is used to determine which part of a System.Windows.Forms.DataGrid control the user has clicked. The System.Windows.Forms.DataGrid. HitTestInfo contains both the row, column and part of the grid that was clicked. Additionally, the System.Windows. Forms. DataGrid.HitTestInfo.Type property returns a System.Windows.Forms.DataGrid.HitTestType enumeration. The horizontal position of the coordinate. The vertical position of the coordinate.

wwwwwwww) IsExpanded

[C#] public bool IsExpanded(int rowNumber);

[C++] public: bool IsExpanded(int rowNumber);

[VB] Public Function IsExpanded(ByVal rowNumber As Integer) As Boolean

[JScript] public function IsExpanded(rowNumber: int): Boolean;

Gets a value that indicates whether a specified row's node is expanded or collapsed.

Return Value: true if the node is expanded; otherwise, false. The number of the row in question.

xxxxxxxx) IsSelected

[C#] public bool IsSelected(int row);

[C++] public: bool IsSelected(int row);

[VB] Public Function IsSelected(ByVal row As Integer) As Boolean

[JScript] public function IsSelected(row: int): Boolean;

Gets a value indicating whether a specified row is selected.

Return Value: true if the row is selected; otherwise, false. The number of the row you interested in.

yyyyyyyy) NavigateBack

[C#] public void NavigateBack( );

[C++] public: void NavigateBack( );

[VB] Public Sub NavigateBack( )

[JScript] public faction NavigateBack( );

Navigates back to the table previously displayed in the grid.

If the grid has no parent rows, no change occurs.

zzzzzzzz) NavigateTo

[C#] public void NavigateTo(int rowNumber, string relationName);

[C++] public: void NavigateTo(int rowNumber, String* relationName);

[VB] Public Sub NavigateTo(ByVal rowNumber As Integer, ByVal relationName As String)

[JScript] public function NavigateTo(rowNumber: int, relationName: String);

Navigates to a specific table that displays in the System.Windows.Forms.DataGrid control.

Description

Navigates to the table specified by row and relation name. The number of the row to navigate to. The name of the child relation to navigate to.

aaaaaaaaa) OnAllowNavigation Changed

[C#] protected virtual void OnAllowNavigationChanged(EventArgs e);

[C++] protected: virtual void OnAllowNavigationChanged (EventArgs* e);

[VB] Overridable Protected Sub OnAllowNavigation-Changed(ByVal e As EventArgs)

[JScript] protected function OnAllowNavigationChanged(e: EventArgs);

Description

Raises the System.Windows.Forms.DataGrid.AllowNavigationChanged event. An System.EventArgs that contains the event data.

bbbbbbbbb) OnBackButton Clicked

[C#] protected void OnBackButtonClicked(object sender, EventArgs e);

[C++] protected: void OnBackButtonClicked(Object* sender, EventArgs* e);

[VB] Protected Sub OnBackButtonClicked(ByVal sender As Object, ByVal e As EventArgs)

[JScript] protected function OnBackButtonClicked(sender: Object, e: EventArgs);

Description

Listens for the caption's back button clicked event.

Raising an event invokes the event handler through a delegate. For more information, see. An System.Object that contains data about the control. An System.EventArgs that contains data about the event.

ccccccccc) OnBackColorChanged

[C#] protected override void OnBackColorChanged(Event Args e);

[C++] protected: void OnBackColorChanged(EventArgs* e)

[VB] Overrides Protected Sub OnBackColorChanged(ByVal e As EventArgs)

[JScript] protected override function OnBackColorChanged (e: EventArgs);

Description

Raises the System.Windows.Forms.Control.Back Color-Changed event.

Raising an event invokes the event handler through a delegate. For more information, see. An System.EventArgs that contains the event data.

ddddddddd) OnBackgroundColorChanged

[C#] protected virtual void OnBackgroundColorChanged(EventArgs e);

[C++] protected: virtual void OnBackgroundColorChanged (EventArgs* e);

[VB] Overridable Protected Sub OnBackgroundColor-Changed(ByVal e As EventArgs)

[JScript] protected function OnBackgroundColorChanged(e: EventArgs);

Description

Raises the System.Windows.Forms.DataGrid.Background ColorChanged event. An System.EventArgs that contains the event data.

eeeeeeeee) OnBindingContextChanged

[C#] protected override void OnBindingContextChanged (EventArgs e);

[C++] protected: void OnBindingContextChanged(Event Args* e);

[VB] Overrides Protected Sub OnBindingContextChanged (ByVal e As EventArgs)

[JScript] protected override function OnBindingContext Changed(e: EventArgs);

Description

Raises the System.Windows.Forms.Control.BindingContextChanged event.

Raising an event invokes the event handler through a delegate. For more information, see. An System.EventArgs that contains the event data.

fffffffff) OnBorderStyleChanged

[C#] protected virtual void OnBorderStyleChanged(Event Args e);

[C++] protected: virtual void OnBorderStyleChanged(Event Args* e);

[VB] Overridable Protected Sub OnBorderStyleChanged (ByVal e As EventArgs)

[JScript] protected function OnBorderStyleChanged(e: EventArgs);

Description

Raises the System.Windows.Forms.DataGrid.Border StyleChanged event. An System.EventArgs that contains the event data.

ggggggggg) On CaptionVisibleChanged

[C#] protected virtual void OnCaptionVisibleChanged(Event Args e);

[C++] protected: virtual void OnCaptionVisibleChanged (EventArgs* e);

[VB] Overridable Protected Sub OnCaptionVisibleChanged (ByVal e As EventArgs)

[JScript] protected function OnCaptionVisibleChanged(e: EventArgs);

Description

Raises the System.Windows.Forms.DataGrid.Caption VisibleChanged event. An System.EventArgs that contains the event data.

hhhhhhhhh) OnCurrentCellChanged

[C#] protected virtual void OnCurrentCellChanged(Event Args e);

[C++] protected: virtual void OnCurrentCellChanged(Event Args* e);

[VB] Overridable Protected Sub OnCurrentCellChanged (ByVal e As EventArgs)

[JScript] protected function OnCurrentCellChanged(e: EventArgs);

Description

Raises the System.Windows.Forms.DataGrid.Current Cell-Changed event. An System.EventArgs that contains the event data.

iiiiiiii) OnDataSourceChanged

[C#] protected virtual void OnDataSourceChanged(Event Args e);

[C++] protected: virtual void OnDataSourceChanged(Event Args* e);

[VB] Overridable Protected Sub OnDataSourceChanged (ByVal e As EventArgs)

[JScript] protected function OnDataSourceChanged(e: Event Args);

Description

Raises the System.Windows.Forms.DataGrid.Data SourceChanged event.

Raising an event invokes the event handler through a delegate. For more information, see. An System.EventArgs that contains the event data.

jjjjjjjj) OnEnter

[C#] protected override void OnEnter(EventArgs e);

[C++] protected: void OnEnter(EventArgs* e);

[VB] Overrides Protected Sub OnEnter(ByVal e As Event Args)

[JScript] protected override function OnEnter(e: EventArgs);

Description

Raises the System.Windows.Forms.Control.Enter event. An System.EventArgs that contains the event data.

kkkkkkkkk) OnFlatModeChanged

[C#] protected virtual void OnFlatModeChanged(EventArgs e);

[C++] protected: virtual void OnFlatModeChanged(Event Args* e);

[VB] Overridable Protected Sub OnFlatModeChanged(By-Val e As EventArgs)

[JScript] protected function OnFlatModeChanged(e: Event Args);

Description

Raises the System.Windows.Forms.DataGrid. FlatMode Changed event. An System.EventArgs that contains the event data.

lllllllll) OnFontChanged

[C#] protected override void OnFontChanged(EventArgs e);

[C++] protected: void OnFontChanged(EventArgs* e);

[VB] Overrides Protected Sub OnFontChanged(ByVal e As EventArgs)

[JScript] protected override function OnFontChanged(e: EventArgs);

Description

Raises the System.Windows.Forms.Control.FontChanged event.

Raising an event invokes the event handler through a delegate. For more information, see. An System.EventArgs that contains the event data.

mmmmmmmmm) OnForeColorChanged

[C#] protected override void OnForeColorChanged(Event Args e);

[C++] protected: void OnForeColorChanged(EventArgs* e);

[VB] Overrides Protected Sub OnForeColorChanged(ByVal e As EventArgs)

[JScript] protected override function OnForeColorChanged (e: EventArgs);

Description

Raises the System.Windows.Forms.Control. ForeColor-Changed event.

Raising an event invokes the event handler through a delegate. For more information, see. An System.EventArgs that contains the event data.

nnnnnnnnn) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

Raises the System.Windows.Forms.Control.CreateHandle event.

Raising an event invokes the event handler through a delegate. For more information, see. An System.EventArgs that contains the event data.

ooooooooo) OnHandleDestroyed

[C#] protected override void OnHandleDestroyed(EventArgs e);

[C++] protected: void OnHandleDestroyed(EventArgs* e);

[VB] Overrides Protected Sub OnHandleDestroyed(ByVal e As EventArgs)

[JScript] protected override function OnHandleDestroyed(e: EventArgs);

Description

Raises the System.Windows.Forms.Control.DestroyHandle event.

Raising an event invokes the event handler through a delegate. For more information, see. An System.EventArgs containing the event data.

ppppppppp) OnKeyDown

[C#] protected override void OnKeyDown(KeyEventArgs ke);

[C++] protected: void OnKeyDown(KeyEventArgs* ke);

[VB] Overrides Protected Sub OnKeyDown(ByVal ke As KeyEventArgs)

[JScript] protected override function OnKeyDown(ke: KeyEventArgs);

Description

Raises the System.Windows.Forms.Control.KeyDown event.

Raising an event invokes the event handler through a delegate. For more information, see. A System.Windows.Forms. KeyEventArgs that provides data about the System.Windows.Forms.Control.OnKeyDown(System.Windows. Forms. KeyEventArgs) event.

qqqqqqqqq) OnKeyPress

[C#] protected override void OnKeyPress(KeyPressEvent Args kpe);

[C++] protected: void OnKeyPress(KeyPressEventArgs* kpe);

[VB] Overrides Protected Sub OnKeyPress(ByVal kpe As KeyPressEventArgs)

[JScript] protected override function OnKeyPress(kpe: KeyPressEventArgs);

Description

Raises the System.Windows.Forms.Control.KeyPress event.

Raising an event invokes the event handler through a delegate. For more information, see. A System.Windows.Forms.KeyPressEventArgs that contains data about the System.Windows.Forms.Control.OnKeyPress(System.Windows.Forms. KeyPressEventArgs) event rrrrrrrr) OnLayout

[C#] protected override void OnLayout(LayoutEventArgs levent);

[C++] protected: void OnLayout(LayoutEventArgs* levent);

[VB] Overrides Protected Sub OnLayout(ByVal levent As LayoutEventArgs)

[JScript] protected override function OnLayout(levent: LayoutEventArgs);

Description

Raises the System.Windows.Forms.Control.Layout event that repositions controls and updates scroll bars.

Raising an event invokes the event handler through a delegate. For more information, see. A System.Windows.Forms.LayoutEventArgs that contains the event data.

sssssssss) OnLeave

[C#] protected override void OnLeave(EventArgs e);

[C++] protected: void OnLeave(EventArgs* e);

[VB] Overrides Protected Sub OnLeave(ByVal e As Event Args)

[JScript] protected override function OnLeave (e: Event Args);

Description

Raises the System.Windows.Forms.Control.Leave event.

Raising an event invokes the event handler through a delegate. For more information, see. An System.EventArgs that contains the event data.

tttttttt) OnMouseDown

[C#] protected override void OnMouseDown(MouseEvent Args e);

[C++] protected: void OnMouseDown(MouseEventArgs* e);

[VB] Overrides Protected Sub OnMouseDown(ByVal e As MouseEventArgs)

[JScript] protected override function OnMouseDown(e: MouseEventArgs);

Description

Raises the System.Windows.Forms.Control.MouseDown event.

Raising an event invokes the event handler through a delegate. For an overview, see. A System.Windows.Forms.Mouse EventArgs that contains data about the System.Windows. Forms.Control.On MouseDown(System.Windows. Forms.MouseEventArgs) event.

uuuuuuuuu) OnMouseLeave

[C#] protected override void OnMouseLeave(EventArgs e);

[C++] protected: void OnMouseLeave(EventArgs* e);

[VB] Overrides Protected Sub OnMouseLeave(ByVal e As EventArgs)

[JScript] protected override function OnMouseLeave(e: EventArgs);

Description

Creates the System.Windows.Forms.Control.MouseLeave event.

Raising an event invokes the event handler through a delegate. For an overview, see. An System.EventArgs that contains data about the System.Windows.Forms.Control.OnMouseLeave (System.EventArgs) event.

vvvvvvvvv) OnMouseMove

[C#] protected override void OnMouseMove(MouseEvent Args e);

[C++] protected: void OnMouseMove(MouseEventArgs* e);

[VB] Overrides Protected Sub OnMouseMove(ByVal e As MouseEventArgs)

[JScript] protected override function OnMouseMove(e: MouseEventArgs);

Description

Raises the System.Windows.Forms.Control.MouseMove event.

Raising an event invokes the event handler through a delegate. For an overview, see. A System.Windows.Forms.Mouse EventArgs that contains data about the System.Windows. Forms.Control.OnMouseMove(System.Windows. Forms.MouseEventArgs) event.

wwwwwwwww) OnMouseUp

[C#] protected override void OnMouseUp(MouseEventArgs e);

[C++] protected: void OnMouseUp(MouseEventArgs* e);

[VB] Overrides Protected Sub OnMouseUp(ByVal e As MouseEventArgs)

[JScript] protected override function OnMouseUp(e: Mouse EventArgs);

Description

Raises the System.Windows.Forms.Control.MouseUp event.

Raising an event invokes the event handler through a delegate. For an overview, see. A System.Windows.Forms.Mouse EventArgs that contains data about the System.Windows. Forms.Control.OnMouseUp(System.Windows.Forms. Mouse EventArgs) event.

xxxxxxxxx) OnMouseWheel

[C#] protected override void OnMouseWheel(MouseEvent Args e);

[C++] protected: void OnMouseWheel(MouseEventArgs* e);

[VB] Overrides Protected Sub OnMouseWheel(ByVal e As MouseEventArgs)

[JScript] protected override function OnMouseWheel(e: MouseEventArgs);

Description

Raises the System.Windows.Forms.Control.MouseWheel event.

Raising an event invokes the event handler through a delegate. For an overview, see. A System.Windows.Forms.Mouse EventArgs that contains data about the System.Windows. Forms.Control.OnMouseUp(System.Windows.Forms. Mouse EventArgs) event.

yyyyyyyyy) OnNavigate

[C#] protected void OnNavigate(NavigateEventArgs e);

[C++] protected: void OnNavigate(NavigateEventArgs* e);

[VB] Protected Sub OnNavigate(ByVal e As NavigateEvent Args)

[JScript] protected function OnNavigate(e: NavigateEvent Args);

Description

Raises the System.Windows.Forms.DataGrid.Navigate event.

Raising an event invokes the event handler through a delegate. For more information, see. A System.Windows.Forms.NavigateEventArgs that contains the event data.

zzzzzzzzz) OnPaint

[C#] protected override void OnPaint(PaintEventArgs pe);

[C++] protected: void OnPaint(PaintEventArgs* pe);

[VB] Overrides Protected Sub OnPaint(ByVal pe As PaintEventArgs)

[JScript] protected override function OnPaint(pe: PaintEvent Args);

Description

Raises the System.Windows.Forms.Control.Paint event.

Raising an event invokes the event handler through a delegate. For an overview, see. A System.Windows.Forms.PaintEvent Args which contains data about the event.

aaaaaaaaaa) OnPaintBackground

[C#] protected override void OnPaintBackground(PaintEventArgs ebe);

[C++] protected: void OnPaintBackground(PaintEventArgs* ebe);

[VB] Overrides Protected Sub OnPaintBackground(ByVal ebe As PaintEventArgs)

[JScript] protected override function OnPaintBackground (ebe: PaintEventArgs);

Description

Overrides System.Windows.Forms.Control.OnPaintBackground(System.Windows. Forms.PaintEvent Args) to prevent painting the background of the System.Windows.Forms.DataGrid control.

Because the System.Windows.Forms.DataGrid is a complex control, this override is implemented to have no action. Therefore, calling this method will have no effect. A System. Windows.Forms.PaintEventArgs that contains information about the control to paint.

bbbbbbbbbb) OnParentRowsLabelStyleChanged

[C#] protected virtual void OnParentRowsLabelStyleChanged(EventArgs e);

[C++] protected: virtual void OnParentRowsLabelStyleChanged(EventArgs* e);

[VB] Overridable Protected Sub OnParentRowsLabelStyleChanged(ByVal e As EventArgs)

[JScript] protected function OnParentRowsLabelStyleChanged(e: EventArgs);

Description

Raises the System.Windows.Forms.DataGrid.Parent RowsLabelStyleChanged event.

Raising an event invokes the event handler through a delegate. For more information, see. An System.EventArgs that contains the event data.

cccccccccc) OnParentRowsVisibleChanged

[C#] protected virtual void OnParentRowsVisibleChanged (EventArgs e);

[C++] protected: virtual void OnParentRowsVisibleChanged (EventArgs* e);

[VB] Overridable Protected Sub OnParentRowsVisibleChanged(ByVal e As EventArgs)

[JScript] protected function OnParentRowsVisibleChanged (e: EventArgs);

Description dddddddddd) OnReadOnlyChanged

[C#] protected virtual void OnReadOnlyChanged(EventArgs e);

[C++] protected: virtual void OnReadOnlyChanged(Event Args* e);

[VB] Overridable Protected Sub OnReadOnlyChanged(ByVal e As EventArgs)

[JScript] protected function OnReadOnlyChanged(e: Event Args);

Description

Raises the System.Windows.Forms.DataGrid.Read OnlyChanged event

Raising an event invokes the event handler through a delegate. For more information, see. An System.EventArgs that contains the event data.

eeeeeeeeee) OnResize

[C#] protected override void OnResize(EventArgs e);

[C++] protected: void OnResize(EventArgs* e);

[VB] Overrides Protected Sub OnResize(ByVal e As Event Args)

[JScript] protected override function OnResize(e: Event Args);

Description

Raises the System.Windows.Forms.Control.Resize event.

Raising an event invokes the event handler through a delegate. For an overview, see. An System.EventArgs that contains the event data.

fffffffff) OnRowHeaderClick

[C#] protected void OnRowHeaderClick(EventArgs e);

[C++] protected: void OnRowHeaderClick(EventArgs* e);

[VB] Protected Sub OnRowHeaderClick(ByVal e As Event Args)

[JScript] protected function OnRowHeaderClick(e: Event Args);

Description

Raises the System.Windows.Forms.DataGrid.Row Header-Click event.

Raising an event invokes the event handler through a delegate. For more information, see. An System.EventArgs that contains the event data.

ggggggggg) OnScroll

[C#] protected void OnScroll(EventArgs e);

[C++] protected: void OnScroll(EventArgs* e);

[VB] Protected Sub OnScroll(ByVal e As EventArgs)

[JScript] protected function OnScroll(e: EventArgs);

Description

Raises the System.Windows.Forms.DataGrid.Scroll event.

Raising an event invokes the event handler through a delegate. For more information, see. An System.EventArgs that contains the event data.

hhhhhhhhhh) OnShowParentDetailsButtonClicked

[C#] protected void OnShowParentDetailsButtonClicked (object sender, EventArgs

[C++] protected: void OnShowParentDetailsButtonClicked (Object* sender, EventArgs* e)

[VB] Protected Sub OnShowParentDetailsButtonClicked (ByVal sender As Object, ByVal e As EventArgs)

[JScript] protected function OnShowParentDetailsButton-Clicked(sender: Object, e EventArgs);

Description

Raises the System.Windows.Forms.DataGrid.Show Parent-DetailsButtonClick event. The source of the event. An System. EventArgs that contains the event data.

iiiiiiiii) ProcessDialogKey

[C#] protected override bool ProcessDialogKey(Keys key-Data);

[C++] protected: bool ProcessDialogKey(Keys keydata);

[VB] Overrides Protected Function ProcessDialogKey(By-Val keyData As Keys) As Boolean

[JScript] protected override function ProcessDialogKey(key-Data: Keys): Boolean;

Description

Gets or sets a value that indicates whether a key should be processed further.

Return Value: true the key should be processed; otherwise, false.

The method overrides the System.Windows.Forms.Control. ProcessDialogKey(System.Windows.Forms.Keys) method to implement keyboard navigation of the grid. A System.Windows.Forms.Keys that contains data about the pressed key.

jjjjjjjjjj) ProcessGridKey

[C#] protected bool ProcessGridKey(KeyEventArgs ke);

[C++] protected: bool ProcessGridKey(KeyEventArgs* ke);

[VB] Protected Function ProcessGridKey(ByVal ke As KeyEventArgs) As Boolean

[JScript] protected function ProcessGridKey(ke: KeyEvent Args): Boolean;

Description

Processes keys for grid navigation.

Return Value: true, if the key was processed; otherwise false. A System.Windows.Forms.KeyEventArgs that contains data about the key up or key down event.

kkkkkkkkkk) ProcessKeyPreview

[C#] protected override bool ProcessKeyPreview(ref Message m);

[C++] protected: bool ProcessKeyPreview(Message* m);

[VB] Overrides Protected Function ProcessKeyPreview(By-Ref m As Message) As Boolean

[JScript] protected override function ProcessKeyPreview(m: Message): Boolean;

Description

Previews a keyboard message and returns a value indicating if the key was consumed.

Return Value: true, if the key was consumed; otherwise, false.

This method is called by a child control when the child control receives a keyboard message. The child control calls this method before generating any keyboard events for the message. If this method returns true, the child control considers the message consumed and does not generate any keyboard events. A System.Windows.Forms.Message that contains data about the event. The parameter is passed by reference.

llllllllll) ProcessTabKey

[C#] protected bool ProcessTabKey(Keys keyData);

[C++] protected: bool ProcessTabKey(Keys keydata);

[VB] Protected Function ProcessTabKey(ByVal keyData As Keys) As Boolean

[JScript] protected function ProcessTabKey(keyData: Keys): Boolean;

Description

Gets a value indicating whether the Tab key should be processed.

Return Value: true if the Tab key should be processed; otherwise, false. A System.Windows.Forms.Keys that contains data about which the pressed key.

mmmmmmmmmm) ResetAlternatingBackColor

[C#] public void ResetAlternatingBackColor( );

[C++] public: void ResetAlternatingBackColor( );

[VB] Public Sub ResetAlternatingBackColor( )

[JScript] public function ResetAlternatingBackColor( );

Description

Resets the System.Windows.Forms.DataGrid. AlternatingBackColor property to its default color.

You typically use this method if you are either creating a designer for the System.Windows.Forms.DataGrid or creating your own control incorporating the System.Windows.Forms.DataGrid. You can use the System.Windows.Forms.DataGrid.ShouldSerializeAlternatingBackColor method to determine whether the property value has changed from its default.

nnnnnnnnnn) ResetBackColor

[C#] public override void ResetBackColor( );

[C++] public: void ResetBackColor( );

[VB] Overrides Public Sub ResetBackColor( )

[JScript] public override function ResetBackColor( );

Description

Resets the System.Windows.Forms.DataGrid.BackColor property to its default value.

You typically use this method if you are either creating a designer for the System.Windows.Forms.DataGrid or creating your own control incorporating the System.Windows.Forms.DataGrid.

oooooooooo) ResetForeColor

[C#] public override void ResetForeColor( );

[C++] public: void ResetForeColor( );

[VB] Overrides Public Sub ResetForeColor( )

[JScript] public override function ResetForeColor( );

Description

Resets the System.Windows.Forms.DataGrid.ForeColor property to its default value.

You typically use this method if you are either creating a designer for the System.Windows.Forms.DataGrid or creating your own control incorporating the System.Windows.Forms.DataGrid.

pppppppppp) ResetGridLineColor

[C#] public void ResetGridLineColor( );

[C++] public: void ResetGridLineColor( );

[VB] Public Sub ResetGridLineColor( )

[JScript] public function ResetGridLineColor( );

Description

Resets the System.Windows.Forms.DataGrid.Grid LineColor property to its default value.

You typically use this method if you are either creating a designer for the System.Windows.Forms.DataGrid or creating your own control incorporating the System.Windows.Forms.DataGrid. You can use the System.Windows.Forms.DataGrid.ShouldSerializeGridLineColor method to determine whether the property value has changed from its default.

qqqqqqqqqq) ResetHeaderBackColor

[C#] public void ResetHeaderBackColor( );

[C++] public: void ResetHeaderBackColor( );

[VB] Public Sub ResetHeaderBackColor( )

[JScript] public function ResetHeaderBackColor( );

Description

Resets the System.Windows.Forms.DataGrid. HeaderBackColor property to its default value.

You typically use this method if you are either creating a designer for the System.Windows.Forms.DataGrid or creating your own control incorporating the System.Windows.Forms.DataGrid. You can use the System.Windows.Forms.DataGrid.ShouldSerializeHeaderBackColor method to determine whether the property value has changed from its default.

rrrrrrrrrr) ResetHeaderFont

[C#] public void ResetHeaderFont( );

[C++] public: void ResetHeaderFont( );

[VB] Public Sub ResetHeaderFont( )

[JScript] public function ResetHeaderFont( );

Description

Resets the System.Windows.Forms.DataGrid.HeaderFont property to its default value.

You typically use this method if you are either creating a designer for the System.Windows.Forms.DataGrid or creating your own control incorporating the System.Windows.Forms.DataGrid. You can use the System.Windows.Forms.DataGrid.ShouldSerializeHeaderFont method to determine whether the property value has changed from its default.

ssssssssss) ResetHeaderForeColor

[C#] public void ResetHeaderForeColor( );

[C++] public: void ResetHeaderForeColor( );

[VB] Public Sub ResetHeaderForeColor( )

[JScript] public function ResetHeaderForeColor( );

Description

Resets the System.Windows.Forms.DataGrid. HeaderForeColor property to its default value.

You typically use this method if you are either creating a designer for the System.Windows.Forms.DataGrid or creating your own control incorporating the System.Windows.Forms.DataGrid. You can use the System.Windows.Forms.DataGrid.ShouldSerializeHeaderForeColor method to determine whether the property value has changed from its default.

tttttttttt) ResetLinkColor

[C#] public void ResetLinkColor( );

[C++] public: void ResetLinkColor( );

[VB] Public Sub ResetLinkColor( )

[JScript] public function ResetLinkColor( );

Description

Resets the System.Windows.Forms.DataGrid.LinkColor property to its default value.

You typically use this method if you are either creating a designer for the System.Windows.Forms.DataGrid or creating your own control incorporating the System.Windows.Forms.DataGrid.

uuuuuuuuuu) ResetLinkHoverColor

[C#] public void ResetLinkHoverColor( );

[C++] public: void ResetLinkHoverColor( );

[VB] Public Sub ResetLinkHoverColor( )

[JScript] public function ResetLinkHoverColor( );

Description

Resets the System.Windows.Forms.DataGrid.LinkHoverColor property to its default value.

You typically use this method if you are either creating a designer for the System.Windows.Forms.DataGrid or creating your own control incorporating the System.Windows.Forms.DataGrid. You can use the System.Windows.Forms.DataGrid.ShouldSerializeLinkHoverColor method to determine whether the property value has changed from its default.

vvvvvvvvvv) ResetSelection

[C#] protected void ResetSelection( );

[C++] protected: void ResetSelection( );

[VB] Protected Sub ResetSelection( )

[JScript] protected function ResetSelection( );

Description

Turns off selection for all rows that are selected.

wwwwwwwwww) ResetSelectionBackColor

[C#] public void ResetSelectionBackColor( );

[C++] public: void ResetSelectionBackColor( );

[VB] Public Sub ResetSelectionBackColor( )

[JScript] public function ResetSelectionBackColor( );

Description

Resets the System.Windows.Forms.DataGrid.SelectionBackColor property to its default value.

You typically use this method if you are either creating a designer for the System.Windows.Forms.DataGrid or creating your own control incorporating the System.Windows.Forms.DataGrid. You can use the System.Windows.Forms.DataGrid.ShouldSerializeSelectionBackColor method to determine whether the property value has changed from its default.

xxxxxxxxxx) ResetSelectionForeColor

[C#] public void ResetSelectionForeColor( );

[C++] public: void ResetSelectionForeColor( );

[VB] Public Sub ResetSelectionForeColor( )

[JScript] public function ResetSelectionForeColor( );

Description

Resets the System.Windows.Forms.DataGrid.SelectionForeColor property to its default value.

You typically use this method if you are either creating a designer for the System.Windows.Forms.DataGrid or creating your own control incorporating the System.Windows.Forms.DataGrid. You can use the System.Windows.Forms.DataGrid.ShouldSerializeSelectionForeColor method to determine whether the property value has changed from its default.

[C#] public void Select(int row);

[C++] public: void Select(int row);

[VB] Public Sub Select(ByVal row As Integer)

[JScript] public function Select(row: int);

Description

Selects a specified row. The index of the row to select.

zzzzzzzzzz) SetDataBinding

[C#] public void SetDataBinding(object dataSource, string dataMember);

[C++] public: void SetDataBinding(Object* dataSource, String* dataMember);

[VB] Public Sub SetDataBinding(ByVal dataSource As Object, ByVal dataMember As String)

[JScript] public function SetDataBinding(dataSource: Object, dataMember String);

Description

Sets the System.Windows.Forms.DataGrid.DataSource and System.Windows.Forms.DataGrid.DataMember properties at run time.

You must use the System.Windows.Forms.DataGrid. SetDataBinding(System.Object,System.String) method at run time to reset the System.Windows.Forms.DataGrid.DataSource property. The data source, typed as System.Object, for the System.Windows.Forms.DataGrid control. The System.Windows.Forms.DataGrid.DataMember string that specifies the table to bind to within the object returned by the System.Windows.Forms.DataGrid.DataSource property.

aaaaaaaaaaa) ShouldSerializeAlternatingBackColor

[C#] protected virtual bool ShouldSerializeAlternatingBackColor( );

[C++] protected: virtual bool ShouldSerializeAlternatingBackColor( );

[VB] Overridable Protected Function ShouldSerializeAlternatingBackColor( ) As Boolean

[JScript] protected function ShouldSerializeAlternatingBackColor( ): Boolean;

Description

Indicates whether the System.Windows.Forms.DataGrid.AlternatingBackColor property should be persisted.

Return Value: true if the property value has changed from its default; otherwise, false.

You typically use this method if you are either creating a designer for the System.Windows.Forms.DataGrid or creating your own control incorporating the System.Windows.Forms.DataGrid.

bbbbbbbbbbb) ShouldSerializeBackgroundColor

[C#] protected virtual bool ShouldSerializeBackgroundColor( );

[C++] protected: virtual bool ShouldSerializeBackgroundColor( );

[VB] Overridable Protected Function ShouldSerializeBackgroundColor( ) As Boolean

[JScript] protected function ShouldSerializeBackgroundColor( ): Boolean;

Description

Indicates whether the System.Windows.Forms.DataGrid. BackgroundColor property should be persisted.

Return Value: true if the property value has changed from its default; otherwise, false.

You typically use this method if you are either creating a designer for the System.Windows.Forms.DataGrid or creating your own control incorporating the System.Windows. Forms.DataGrid.

cccccccccc) ShouldSerializeCaptionBackColor

[C#] protected virtual bool ShouldSerializeCaptionBackColor( );

[C++] protected: virtual bool ShouldSerializeCaptionBackColor( );

[VB] Overridable Protected Function ShouldSerializeCaptionBackColor( ) As Boolean

[JScript] protected function ShouldSerializeCaptionBackColor( ): Boolean;

Description

Gets a value indicating whether the System.Windows.Forms. DataGrid.CaptionBackColor property should be persisted.

Return Value: true if the property value has been changed from its default; otherwise, false.

You typically use this method only if you are either creating a designer for the System.Windows.Forms.DataGrid, or creating your own control incorporating the System.Windows. Forms.DataGrid.

dddddddddd) ShouldSerializeCaptionForeColor

[C#] protected virtual bool ShouldSerializeCaptionForeColor( );

[C++] protected: virtual bool ShouldSerializeCaptionForeColor( );

[VB] Overridable Protected Function ShouldSerializeCaptionForeColor( ) As Boolean

[JScript] protected function ShouldSerializeCaptionForeColor( ): Boolean;

Description

Gets a value indicating whether the System.Windows.Forms. DataGrid.CaptionForeColor property should be persisted.

Return Value: true if the property value has been changed from its default; otherwise, false.

You typically use this method only if you are either creating a designer for the System.Windows.Forms.DataGrid, or creating your own control incorporating the System.Windows. Forms.DataGrid.

eeeeeeeeee) ShouldSerializeGridLineColor

[C#] protected virtual bool ShouldSerializeGridLineColor( );

[C++] protected: virtual bool ShouldSerializeGridLineColor( );

[VB] Overridable Protected Function ShouldSerializeGridLineColor( ) As Boolean

[JScript] protected function ShouldSerializeGridLine Color( ): Boolean;

Description

Indicates whether the System.Windows.Forms.DataGrid. GridLineColor property should be persisted.

Return Value: true if the property value has changed from its default; otherwise, false.

You typically use this method if you are either creating a designer for the System.Windows.Forms.DataGrid or creating your own control incorporating the System.Windows. Forms.DataGrid.

ffffffffff) ShouldSerializeHeaderBackColor

[C#] protected virtual bool ShouldSerializeHeaderBackColor( );

[C++] protected: virtual bool ShouldSerializeHeaderBackColor( );

[VB] Overridable Protected Function ShouldSerializeHeaderBackColor( ) As Boolean

[JScript] protected function ShouldSerializeHeaderBackColor( ): Boolean;

Description

Indicates whether the System.Windows.Forms.DataGrid. HeaderBackColor property should be persisted.

Return Value: true if the property value has changed from its default; otherwise, false.

You typically use this method if you are either creating a designer for the System.Windows.Forms.DataGrid or creating your own control incorporating the System.Windows. Forms.DataGrid.

gggggggggg) ShouldSerializeHeaderFont

[C#] protected bool ShouldSerializeHeaderFont( );

[C++] protected: bool ShouldSerializeHeaderFont( );

[VB] Protected Function ShouldSerializeHeaderFont( ) As Boolean

[JScript] protected function ShouldSerializeHeaderFont( ): Boolean;

Description

Indicates whether the System.Windows.Forms.DataGrid. HeaderFont property should be persisted.

Return Value. true if the property value has changed from its default; otherwise, false.

You typically use this method if you are either creating a designer for the System.Windows.Forms.DataGrid or creating your own control incorporating the System.Windows. Forms.DataGrid.

hhhhhhhhhh) ShouldSerializeHeaderForeColor

[C#] protected virtual bool ShouldSerializeHeaderForeColor( );

[C++] protected: virtual bool ShouldSerializeHeaderForeColor( );

[VB] a Overridable Protected Function ShouldSerializeHeaderForeColor( ) As Boolean

[JScript] protected function ShouldSerializeHeaderForeColor( ): Boolean;

Description

Indicates whether the System.Windows.Forms.DataGrid. HeaderForeColor property should be persisted.

Return Value: true if the property value has changed from its default; otherwise, false.

You typically use this method if you are either creating a designer for the System.Windows.Forms.DataGrid or creating your own control incorporating the System.Windows.Forms.DataGrid.

iiiiiiiiii) ShouldSerializeLinkHoverColor

[C#] protected virtual bool ShouldSerializeLinkHover Color( );

[C++] protected: virtual bool ShouldSerializeLinkHoverColor( );

[VB] Overridable Protected Function ShouldSerialize LinkHoverColor( ) As Boolean

[JScript] protected function ShouldSerializeLinkHoverColor( ): Boolean;

Description

Indicates whether the System.Windows.Forms.DataGrid.LinkHoverColor property should be persisted.

Return Value: true if the property value has changed from its default; otherwise, false.

You typically use this method if you are either creating a designer for the System.Windows.Forms.DataGrid or creating your own control incorporating the System.Windows.Forms.DataGrid.

jjjjjjjjjj) ShouldSerializeParentRowsBackColor

[C#] protected virtual bool ShouldSerializeParentRowsBackColor( );

[C++] protected: virtual bool ShouldSerializeParentRowsBackColor( );

[VB] Overridable Protected Function ShouldSerializeParentRowsBackColor( ) As Boolean

[JScript] protected function ShouldSerializeParentRowsBackColor( ): Boolean;

Description

Indicates whether the System.Windows.Forms.DataGrid.ParentRowsBackColor property should be persisted.

Return Value: true if the property value has been changed from its default; otherwise, false.

You typically use this method only if you are either creating a designer for the System.Windows.Forms.DataGrid, or creating your own control incorporating the System.Windows.Forms.DataGrid.

kkkkkkkkkkk) ShouldSerializeParentRowsForeColor

[C#] protected virtual bool ShouldSerializeParentRowsForeColor( );

[C++] protected: virtual bool ShouldSerializeParentRowsForeColor( );

[VB] Overridable Protected Function ShouldSerializeParent RowsForeColor( ) As Boolean

[JScript] protected function ShouldSerializeParentRowsForeColor( ): Boolean;

Description

Indicates whether the System.Windows.Forms.DataGrid.ParentRowsForeColor property should be persisted.

Return Value: true if the property value has been changed from its default; otherwise, false.

You typically use this method only if you are either creating a designer for the System.Windows.Forms.DataGrid, or creating your own control incorporating the System.Windows.Forms.DataGrid.

lllllllllll) ShouldSerializePreferredRowHeight

[C#] protected bool ShouldSerializePreferredRowHeight( );

[C++] protected: bool ShouldSerializePreferredRow Height( );

[VB] Protected Function ShouldSerializePreferredRowHeight( ) As Boolean

[JScript] protected function ShouldSerializePreferredRowHeight( ): Boolean;

Description

Indicates whether the System.Windows.Forms.DataGrid.PreferredRowHeight property should be persisted.

Return Value: true if the property value has changed from its default; otherwise, false.

You typically use this method if you are either creating a designer for the System.Windows.Forms.DataGrid or creating your own control incorporating the System.Windows.Forms.DataGrid.

mmmmmmmmmmmm) ShouldSerializeSelectionBackColor

[C#] protected bool ShouldSerializeSelectionBackColor( );

[C++] protected: bool ShouldSerializeSelectionBack Color( );

[VB] Protected Function ShouldSerializeSelectionBackColor( ) As Boolean

[JScript] protected function ShouldSerializeSelectionBackColor( ): Boolean;

Description

Indicates whether the System.Windows.Forms.DataGrid.SelectionBackColor property should be persisted.

Return Value: true if the property value has changed from its default; otherwise, false.

You typically use this method if you are either creating a designer for the System.Windows.Forms.DataGrid or creating your own control incorporating the System.Windows.Forms.DataGrid.

nnnnnnnnnnn) ShouldSerializeSelectionForeColor

[C#] protected virtual bool ShouldSerializeSelectionForeColor( );

[C++] protected: virtual bool ShouldSerializeSelectionForeColor( );

[VB] Overridable Protected Function ShouldSerializeSelectionForeColor( ) As Boolean

[JScript] protected function ShouldSerializeSelectionForeColor( ): Boolean;

Description

Indicates whether the System.Windows.Forms.DataGrid.SelectionForeColor property should be persisted.

Return Value: true if the property value has changed from its default; otherwise, false.

You typically use this method if you are either creating a designer for the System.Windows.Forms.DataGrid or creating your own control incorporating the System.Windows.Forms.DataGrid.

ooooooooooo) SubObjectsSiteChange

[C#] public void SubObjectsSiteChange(bool site);

[C++] public: void SubObjectsSiteChange(bool site);

[VB] Public Sub SubObjectsSiteChange(ByVal site As Boolean)

[JScript] public function SubObjectsSiteChange(site: Boolean);

ppppppppppp) UnSelect

[C#] public void UnSelect(int row);

[C++] public: void UnSelect(int row);

[VB] Public Sub UnSelect(ByVal row As Integer)

[JScript] public function UnSelect(row int);

Description

Unselects a specified row. The index of the row to deselect.

DataGridBoolColumn class (System.Windows.Forms)

a) WndProc

Description

Specifies a column in which each cell contains a check box for representing a Boolean value.

The System.Windows.Forms.DataGridBoolColumn derives from the abstract class System.Windows.Forms.DataGridColumnStyle. At run time, the System.Windows.Forms.DataGridBoolColumn contains check boxes in each cell that have three states: checked (true), unchecked (false), and System.DBNull.Value.

b) DataGridBoolColumn

Example Syntax:

c) WndProc

[C#] public DataGridBoolColumn( );

[C++] public: DataGridBoolColumn( );

[VB] Public Sub New( )

[JScript] public function DataGridBoolColumn( ); Initializes a new instance of the System.Windows.Forms.DataGridBoolColumn class.

Description

Initializes a new instance of the System.Windows.Forms.DataGridBoolColumn class.

When using this overload to create a System.Windows.Forms.DataGridBoolColumn, be sure to set the System.Windows.Forms.DataGridColumnStyle.MappingName value to the System.Data.DataColumn.ColumnName of a System.Data.DataColumn.

d) DataGridBoolColumn

Example Syntax:

e) WndProc

[C#] public DataGridBoolColumn(PropertyDescriptor prop);

[C++] public: DataGridBoolColumn(PropertyDescriptor* prop);

[VB] Public Sub New(ByVal prop As PropertyDescriptor)

[JScript] public function DataGridBoolColumn(prop: PropertyDescriptor);

Description

Initializes a new instance of a System.Windows.Forms.DataGridBoolColumn with the specified System.Data.DataColumn.

The System.Windows.Forms.DataGridBoolColumn must be associated with a data source that contains Boolean values. The System.ComponentModel.PropertyDescriptor associated with the column.

f) DataGridBoolColumn

Example Syntax:

g) WndProc

[C#] public DataGridBoolColumn(PropertyDescriptor prop, bool isDefault);

[C++] public: DataGridBoolColumn(PropertyDescriptor* prop, bool isDefault);

[VB] Public Sub New(ByVal prop As PropertyDescriptor, ByVal isDefault As Boolean)

[JScript] public function DataGridBoolColumn(prop: PropertyDescriptor, isDefault Boolean);

Description

Initializes a new instance of a System.Windows.Forms.DataGridBoolColumn with the specified System.ComponentModel.PropertyDescriptor, and specifying whether the column style is a default column.

To get a System.ComponentModel.PropertyDescriptor, first use the System.Windows.Forms.BindingContext to return the appropriate System.Windows.Forms.BindingManagerBase object. Then use the System.Windows.Forms.BindingManagerBase.GetItemProperties method of the System.Windows.Forms.BindingManagerBase to return a System.ComponentModel.PropertyDescriptorCollection. Finally, use the this property of the System.ComponentModel.PropertyDescriptorCollection to return the specific System.ComponentModel.PropertyDescriptor for the column. The System.ComponentModel.PropertyDescriptor associated with the column. true to specify the column as the default; otherwise, false.

h) Alignment i) AllowNull j) WndProc

Description

Gets or sets a value indicating whether null values are allowed.

k) Container l) DataGridTableStyle m) DesignMode n) Events o) FalseValue p) WndProc Description Gets or sets the actual value used when setting the value of the column to false q) FontHeight r) HeaderAccessibleObject s) HeaderText t) MappingName u) NullText v) NullValue w) WndProc Description Gets or sets the actual value used when setting the value of the column to System.DBNul.Value.

You can also specify what text will be displayed by setting the System.Windows.Forms.DataGridColumnStyle.NullText property.

x) PropertyDescriptor y) ReadOnly z) Site aa) TrueValue bb) WndProc

Description

Gets or sets the actual value used when setting the value of the column to true.

cc) Width dd) WndProc

Description

Occurs when the System.Windows.Forms.DataGridBoolColumn.AllowNull property is changed.

ee) WndProc

Description

Occurs when the System.Windows.Forms.DataGridBoolColumn.FalseValue property is changed.

ff) WndProc

Description

Occurs when the System.Windows.Forms.DataGridBoolColumn.TrueValue property value is changed.

For more information about handling events, see.

gg) Abort

[C#] protected internal override void Abort(int rowNum);

[C++] protected public: void Abort(int rowNum);

[VB] Overrides Protected Friend Dim Sub Abort(ByVal rowNum As Integer)

[JScript] package override function Abort(rowNum: int);

Description

Initiates a request to interrupt an edit procedure. The number of the row in which an operation is being interrupted.

hh) Commit

[C#] protected internal override bool Commit(CurrencyManager dataSource, int rowNum);

[C++] protected public: bool Commit(CurrencyManager* dataSource, int rowNum);

[VB] Overrides Protected Friend Dim Function Commit(ByVal dataSource As CurrencyManager, ByVal rowNum As Integer) As Boolean

[JScript] package override function Commit(dataSource: CurrencyManager, rowNum: int) Boolean;

Description

Initiates a request to complete an editing procedure.

Return Value: true if the editing procedure committed successfully; otherwise, false. The System.Data.DataView of the edited column. The number of the edited row.

ii) ConcedeFocus

[C#] protected internal override void ConcedeFocus( );

[C++] protected public: void ConcedeFocus( );

[VB] Overrides Protected Friend Dim Sub ConcedeFocus( )

[JScript] package override function ConcedeFocus( );

Description jj) Edit

[C#] protected internal override void Edit(CurrencyManager source, int rowNum, Rectangle bounds, bool readOnly, string instantText, bool cellIsVisible);

[C++] protected public: void Edit(CurrencyManager* source, int rowNum, Rectangle bounds, bool readOnly, String* instantText, bool cellIsVisible);

[VB] Overrides Protected Friend Dim Sub Edit(ByVal source As CurrencyManager, ByVal rowNum As Integer, ByVal bounds As Rectangle, ByVal readOnly As Boolean, ByVal instantText As String, ByVal cellIsVisible As Boolean)

[JScript] package override function Edit(source: CurrencyManager, rowNum: int, bounds: Rectangle, readOnly: Boolean, instantText: String, cellIsVisible: Boolean); Prepares the cell for editing a value.

Description

Prepares the cell for editing a value.

Unlike the typical implementation of this method (as described in the System.Windows.Forms.DataGridColumnStyle class), the System.Windows.Forms.DataGridBoolColumn.Edit(System.Windows.Forms.CurrencyManager, System.Int32, System.Drawing.Rectangle, System.Boolean, System.String,System.Boolean) method doesn't site a control for editing the column value. Instead a check box is drawn when the System.Windows.Forms.DataGridBoolColumn.Paint(System.Drawing.Graphics, System.Drawing.Rectangle,System.Windows.Forms.CurrencyManager, System.Int32) method is called. The System.Data.DataView of the edited column. The row number of the edited column. The System.Drawing.Rectangle in which the control is to be sited. true if the value is read only; otherwise, false. The text to display in the cell. true to show the cell; otherwise, false.

kk) EnterNullValue

[C#] protected internal override void EnterNullValue( );

[C++] protected public: void EnterNullValue( );

[VB] Overrides Protected Friend Dim Sub EnterNullValue( )

[JScript] package override function EnterNullValue( );

Description

Enters a System.DBNull.Value into the column.

To set the actual value used when entering a null value, use the System.Windows.Forms.DataGridBoolColumn.NullValue property.

ll) GetColumnValueAtRow

[C#] protected internal override object GetColumnValueAtRow(CurrencyManager lm, int row);

[C++] protected public: Object* GetColumnValueAtRow (CurrencyManager* lm, int row);

[VB] Overrides Protected Friend Dim Function GetColumnValueAtRow(ByVal lm As CurrencyManager, ByVal row As Integer) As Object

[JScript] package override function GetColumnValueAtRow (lm: CurrencyManager, row: int): Object;

Description

Gets the value at the specified row.

Return Value: The value, typed as System.Object. The System.Windows.Forms.CurrencyManager for the column. The row number.

mm) GetMinimumHeight

[C#] protected internal override int GetMinimumHeight( );

[C++] protected public: int GetMinimumHeight( );

[VB] Overrides Protected Friend Dim Function GetMinimumHeight( ) As Integer

[JScript] package override function GetMinimumHeight( ): int;

Description

Gets the height of a cell in a column.

Return Value: The height of the column. The default is 16.

nn) GetPreferredHeight

[C#] protected internal override it GetPreferredHeight (Graphics g, object value);

[C++] protected public: int GetPreferredHeight(Graphics* g, Object* value);

[VB] Overrides Protected Friend Dim Function GetPreferredHeight(ByVal g As Graphics, ByVal value As Object) As Integer

[JScript] package override function GetPreferredHeight(g: Graphics, value Object) int;

Description

Gets the height used when resizing columns.

Return Value: The height used to automatically resize cells in a column. A Graphics that draws on the screen. An System. Object that contains the value to be drawn to the screen.

oo) GetPreferredSize

[C#] protected internal override Size GetPreferredSize (Graphics g, object value);

[C++] protected public: Size GetPreferredSize(Graphics* g, Object* value);

[VB] Overrides Protected Friend Dim Function GetPreferredSize(ByVal g As Graphics, ByVal value As Object) As Size

[JScript] package override function GetPreferredSize(g: Graphics, value: Object): Size;

Description

Gets the optimum width and height of a cell given a specific value to contain.

Return Value: A System.Drawing.Size that contains the drawing information for the cell.

The System.Windows.Forms.DataGridBoolColumn. GetPreferredSize(System.Drawing.Graphics, System.Object) method allows you to resize the column based on the value displayed. For example, if a cell contains an especially large value, you can use the System.Windows.Forms.DataGridBoolColumn.GetPreferredSize(System.Drawing.Graphics, System.Object) method to return the optimum size of the cell based on the value. The optimum size takes into account not only the size of the string, but also the font used to display it. A System.Drawing.Graphics that draws the cell. The value that must fit in the cell.

pp) Paint

[C#] protected internal override void Paint(Graphics g, Rectangle bounds, CurrencyManager source, int rowNum);

[C++] protected public: void Paint(Graphics* g, Rectangle bounds, CurrencyManager* source, int rowNum);

[VB] Overrides Protected Friend Dim Sub Paint(ByVal g As Graphics, ByVal bounds As Rectangle, ByVal source As CurrencyManager, ByVal rowNum As Integer)

[JScript] package override function Paint(g: Graphics, bounds: Rectangle, source: CurrencyManager, rowNum: int); Paints a column.

Description

Draws the System.Windows.Forms.DataGridBoolColumn with the given System.Drawing.Graphics, System.Drawing. Rectangle and row number.

This method paints the background with the background color in the graphics object passed in. The System.Drawing. Graphics object to draw to. The bounding System.Drawing. Rectangle to paint into. The System.Windows.Forms.CurrencyManager of the column. The number of the row referred to in the underlying data.

qq) Paint

[C#] protected internal override void Paint(Graphics g, Rectangle bounds, CurrencyManager source, int rowNum, bool alignToRight);

[C++] protected public: void Paint(Graphics* g, Rectangle bounds, CurrencyManager* source, int rowNum, bool alignToRight);

[VB] Overrides Protected Friend Dim Sub Paint(ByVal g As Graphics, ByVal bounds As Rectangle, ByVal source As CurrencyManager, ByVal rowNum As Integer, ByVal alignTo Right As Boolean)

[JScript] package override function Paint(g: Graphics, bounds: Rectangle, source: CurrencyManager, rowNum: int, alignToRight: Boolean);

Description

Draws the System.Windows.Forms.DataGridBoolColumn with the given System.Drawing.Graphics, System.Drawing. Rectangle, row number, and alignment settings. The System. Drawing.Graphics object to draw to. The bounding System. Drawing.Rectangle to paint into. The System.Windows. Forms.CurrencyManager of the column. The number of the row in the underlying data table being referred to. A value indicating whether to align the content to the right.

rr) Paint

[C#] protected internal override void Paint(Graphics g, Rectangle bounds, CurrencyManager source, int rowNum, Brush backBrush, Brush foreBrush, bool alignToRight);

[C++] protected public: void Paint(Graphics* g, Rectangle bounds, CurrencyManager* source, int rowNum, Brush* backBrush, Brush* foreBrush, bool alignToRight);

[VB] Overrides Protected Friend Dim Sub Paint(ByVal g As Graphics, ByVal bounds As Rectangle, ByVal source As CurrencyManager, ByVal rowNum As Integer, ByVal backBrush As Brush, ByVal foreBrush As Brush, ByVal alignToRight As Boolean)

[JScript] package override function Paint(g: Graphics, bounds: Rectangle, source CurrencyManager, rowNum: int, backBrush: Brush, foreBrush: Brush, alignToRight Boolean);

Description

Draws the System.Windows.Forms.DataGridBoolColumn with the given System.Drawing.Graphics, System.Drawing.Rectangle, row number, System.Drawing.Brush, and System.Drawing.Color. Paints the check box in the column. The System.Drawing.Graphics object to draw to. The bounding System.Drawing.Rectangle to paint into. The System.Windows.Forms.CurrencyManager of the column. The number of the row in the underlying data table being referred to. A System.Drawing.Brush used to paint the background color. A System.Drawing.Color used to paint the foreground color. A value indicating whether to align the content to the right.

ss) SetColumn ValueAtRow

[C#] protected internal override void SetColumnValueAtRow(CurrencyManager lm, int row, object value);

[C++] protected public: void SetColumnValueAtRow(CurrencyManager* lm, int row, Object* value);

[VB] Overrides Protected Friend Dim Sub SetColumnValueAtRow(ByVal lm As CurrencyManager, ByVal row As Integer, ByVal value As Object)

[JScript] package override function SetColumnValueAtRow (lm: CurrencyManager, row: int, value: Object);

Description

Sets the value a a specified row. The System.Windows.Forms.CurrencyManager for the column. The row number. The value to set, typed as System.Object.

DataGridCell structure (System.Windows.Forms)

a) UpdateUI

Description

Identifies a cell in the grid.

The System.Windows.Forms.DataGridCell can be used in conjunction with the System.Windows.Forms.DataGrid control's System.Windows.Forms.DataGrid.CurrentCell property to get or set the value of any cell. Setting the System.Windows.Forms.DataGrid control's System.Windows.Forms.DataGrid.CurrentCell property to a System.Windows.Forms.DataGridCell causes the focus to move to the cell specified by the System.Windows.Forms.DataGridCell.

b) DataGridCell

Example Syntax c) UpdateUI

[C#] public DataGridCell(int r, int c);

[C++] public: DataGridCell(int r, int c);

[VB] Public Sub New(ByVal r As Integer, ByVal c As Integer)

[JScript] public function DataGridCell(r: int, c: int);

Description

Initializes a new instance of the System.Windows.Forms.DataGridCell class. The number of a row in the System.Windows.Forms.DataGrid. The number of a column in the System.Windows.Forms.DataGrid.

d) ColumnNumber e) UpdateUI

[C#] public int ColumnNumber {get; set;}

[C++] public: _property int get_ColumnNumber( ); public: _property void set_ColumnNumber(int);

[VB] Public Property ColumnNumber As Integer

[JScript] public function get ColumnNumber( ): int; public function set ColumnNumber(int);

Description

Gets or sets the number of a column in the System.Windows.Forms.DataGrid control.

You can use the System.Windows.Forms.DataGridCell.ColumnNumber to specify a System.Data.DataColumn object in the System.Data.DataTable associated with the System.Windows.Forms.DataGrid control.

f) RowNumber g) UpdateUI

[C#] public int RowNumber {get; set;}

[C++] public: _property int get_RowNumber( ); public: _property void set_RowNumber(int);

[VB] Public Property RowNumber As Integer

[JScript] public function get RowNumber( ): int; public function set RowNumber(int);

Description

Gets or sets the number of a row in the System.Windows.Forms.DataGrid control.

You can use the System.Windows.Forms.DataGridCell.RowNumber value g to specify a System.Data.DataRow object in the System.Data.DataTable associated with the System.Windows.Forms.DataGrid control.

h) Equals

[C#] public override bool Equals(object)

[C++] public: bool Equals(Object* o);

[VB] Overrides Public Function Equals(ByVal o As Object) As Boolean

[JScript] public override function Equals(o: Object): Boolean;

Description

Gets a value indicating whether the System.Windows.Forms.DataGridCell is identical to a second System.Windows.Forms.DataGridCell.

Return Value: true if the second object is identical to the first; otherwise, false. An object you are to comparing.

i) GetHash Code

[C#] public override int GetHashCode( );

[C++] public: int GetHashCode( );

[VB] Overrides Public Function GetHashCode( ) As Integer

[JScript] public override function GetHashCode( ): int;

Description

Gets a hash value that can be added to a System.Collections.Hashtable.

Return Value: A number that uniquely identifies the System.Windows.Forms.DataGridCell in a System.Collections.Hashtable j) ToString

[C#] public override string ToString( );

[C++] public: String* ToString( );

[VB] Overrides Public Function ToString( ) As String

[JScript] public override function ToString( ): String;

Description

Gets the row number and column number of the cell.

Return Value: A string containing the row number and column number.

DataGridColumnStyle.DataGridColumnHeaderAccessibleObject class (System.Windows.Forms)

a) ToString

Description

Provides an implementation for an object that can be inspected by an accessibility application.

b) DataGridColumnStyle.DataGridColumnHeader AccessibleObject

Example Syntax:

c) ToString

[C#] public DataGridColumnStyle.DataGridColumnHeaderAccessibleObject(DataGridColumnStyle owner);

[C++] public: DataGridColumnHeaderAccessibleObject (DataGridColumnStyle* owner);

[VB] Public Sub New(ByVal owner As DataGridColumnStyle)

[JScript] public function DataGridColumnStyle.DataGridColumnHeaderAccessibleObject(owner DataGridColumnStyle);

Description

Initializes a new instance of the System.Windows.Forms.DataGridColumnStyle.DataGridColumnHeader AccessibleObject class. The System.Windows.Forms.DataGridColumnStyle that hosts the object.

d) Bounds e) ToString

[C#] public override Rectangle Bounds {get;}

[C++] public: _property virtual Rectangle get_Bounds( );

[VB] Overrides Public ReadOnly Property Bounds As Rectangle

[JScript] public function get Bounds( ): Rectangle;

Description

Gets the bounding rectangle of a column.

f) DefaultAction g) Description h) Help i) KeyboardShortcut j) Name k) ToString

Description

Gets the name of the column that owns the accessibility object.

l) Owner m) ToString

[C#] protected DataGridColumnStyle Owner {get;}

[C++] protected: _property DataGridColumnStyle* get_Owner( );

[VB] Protected ReadOnly Property Owner As DataGridColumnStyle

[JScript] protected function get Owner( ): DataGridColumnStyle;

Description

Gets the column style object that owns the accessibility object.

n) Parent o) ToString

[C#] public override AccessibleObject Parent {get;}

[C++] public: _property virtual AccessibleObject* get_Parent( );

[VB] Overrides Public ReadOnly Property Parent As AccessibleObject

[JScript] public function get Parent( ): AccessibleObject;

Description

Gets the parent accessibility object.

p) Role q) ToString

[C#] public override AccessibleRole Role {get;}

[C++] public: _property virtual AccessibleRole get_Role( );

[VB] Overrides Public ReadOnly Property Role As AccessibleRole

[JScript] public function get Role( ): AccessibleRole;

Description

Gets the role of the accessibility object.

r) State s) Value t) Navigate

[C#] public override AccessibleObject Navigate(AccessibleNavigation navdir);

[C++] public: AccessibleObject* Navigate(AccessibleNavigation navdir);

[VB] Overrides Public Function Navigate(ByVal navdir As AccessibleNavigation) As AccessibleObject

[JScript] public override function Navigate(navdir: AccessibleNavigation): AccessibleObject;

Description

Allows navigation to another object.

Return Value: An System.Windows.Forms.AccessibleObject specified by the navdir parameter. One of the System.Windows.Forms.AccessibleNavigation values.

DataGridColumnStyle class (System.Windows.Forms)

a) UseStdAccessibleObjects

Description

Specifies the appearance and text formatting and behavior of a System.Windows.Forms.DataGrid control column. This class is abstract.

The collection of System.Windows.Forms.DataGridColumnStyle objects (the System.Windows.Forms.GridColumnStylesCollection) is accessed through the System.Windows.Forms.DataGrid control's System.Windows.Forms.DataGrid.TableStyles property.

b) DataGridColumnStyle

Example Syntax:

c) UseStdAccessibleObjects

[C#] public DataGridColumnStyle( );

[C++] public: DataGridColumnStyle( );

[VB] Public Sub New( )

[JScript] public function DataGridColumnStyle( ); Initializes a new instance of the System.Windows.Forms.DataGridColumnStyle class.

Description

In a derived class, initializes a new instance of the System.Windows.Forms.DataGridColumnStyle class.

When you create an instance of a System.Windows.Forms.DataGridColumnStyle, the following properties are initialized.

d) DataGridColumnStyle

Example Syntax:

e) UseStdAccessibleObjects

[C#] public DataGridColumnStyle(PropertyDescriptor prop);

[C++] public: DataGridColumnStyle(PropertyDescriptor* prop);

[VB] Public Sub New(ByVal prop As PropertyDescriptor)

[JScript] public function DataGridColumnStyle(prop: PropertyDescriptor);

Description

Initializes a new instance of the System.Windows.Forms.DataGridColumnStyle class with the specified System.ComponentModel.PropertyDescriptor.

To create a new System.Windows.Forms.DataGridColumnStyle, you must first get the System.Windows.Forms.CurrencyManager for the data source of the table to which the column will be added. See the CurrencyManager and BindingManager for details on getting specific CurrencyManager objects for a form. A that System.ComponentModel.PropertyDescriptor that provides the attributes for the column.

f) Alignment g) UseStdAccessibleObjects

[C#] public virtual HorizontalAlignment Alignment {get; set;}

[C++] public: _property virtual HorizontalAlignment get_Alignment( ); public: _property virtual void set_Alignment(HorizontalAlignment);

[VB] Overridable Public Property Alignment As HorizontalAlignment

[JScript] public function get Alignment( ): HorizontalAlignment; public function set Alignment(HorizontalAlignment);

Description

Gets or sets the alignment of text in a column.

h) Container i) DataGridTableStyle j) UseStdAccessibleObjects

Description

Gets the System.Windows.Forms.DataGridTableStyle for the column.

k) DesignMode l) Events m) FontHeight n) UseStdAccessibleObjects

Description

Gets the height of the column's font.

o) HeaderAccessibleObject p) UseStdAccessibleObjects

[C#] public AccessibleObject HeaderAccessibleObject {get;}

[C++] public: _property AccessibleObject* get_HeaderAccessibleObject( );

[VB] Public ReadOnly Property HeaderAccessibleObject As AccessibleObject

[JScript] public function get HeaderAccessibleObject( ): AccessibleObject;

Description

Gets the System.Windows.Forms.AccessibleObject for the column.

q) HeaderText r) UseStdAccessibleObjects

[C#] public virtual string HeaderText {get; set;}

[C++] public: _property virtual String* get_HeaderText( ); public: _property virtual void set_HeaderText(String*);

[VB] Overridable Public Property HeaderText As String

[JScript] public function get HeaderText( ): String; public function set HeaderText(String);

Description

Gets or sets the text of the column header.

The System.Windows.Forms.DataGridColumnStyle. HeaderText property is typically used to display a caption that is different from the System.Windows.Forms.DataGridColumnStyle.MappingName value when the System.Windows.Forms.DataGridColumnStyle.MappingName value isn't easily understandable. For example, you may change the System.Windows.Forms.DataGridColumnStyle.HeaderText to "First Name" when the is "FName".

s) MappingName t) UseStdAccessibleObjects

[C#] public string MappingName {get; set;}

[C++] public: _property String* get_MappingName( ); public: _property void set_MappingName(String*);

[VB] Public Property MappingName As String

[JScript] public function get MappingName( ): String; public function set MappingName(String);

Description

Gets or sets the name used to map the column style to a data member.

The System.Windows.Forms.DataGridColumnStyle. MappingName property is usually set to the System.Data.DataColumn.ColumnName of a System.Data.DataColumn. Whenever the System.Data.DataTable containing the System.Data.DataColumn is displayed, the System.Windows.Forms.DataGridColumnStyle with the same System.Windows.Forms.DataGridColumnStyle.MappingName will be used to display the data.

u) NullText v) UseStdAccessibleObjects

[C#] public virtual string NullText {get; set;}

[C++] public: _property virtual String* get_NullText( ); public: _property virtual void set_NullText(String*);

[VB] Overridable Public Property NullText As String

[JScript] public function get NullText( ): String; public function set NullText(String);

Description

Gets or sets the text that is displayed when the column contains null.

The System.Data.DataColumn class's System.Data.DataColumn.AllowDBNull property determines if a column can contain null values.

w) PropertyDescriptor x) UseStdAccessibleObjects

[C#] public virtual PropertyDescriptor PropertyDescriptor {get; set;}

[C++] public: _property virtual PropertyDescriptor* get_PropertyDescriptor( ); public: _property virtual void set_PropertyDescriptor(PropertyDescriptor*);

[VB] Overridable Public Property PropertyDescriptor As PropertyDescriptor

[JScript] public function get PropertyDescriptor( ): PropertyDescriptor; public function set PropertyDescriptor(PropertyDescriptor);

Description

Gets or sets the System.ComponentModel.PropertyDescriptor that determines the attributes of data displayed by the System.Windows.Forms.DataGridColumnStyle.

The System.ComponentModel.PropertyDescriptor for a column is set using the System.Windows.Forms.BindingManagerBase.GetItemProperties method of the System.Windows.Forms.BindingManagerBase. See the System.Windows.Forms.DataGridColumnStyle.#ctor constructor for an example of using the System.ComponentModel.PropertyDescriptor to create a new System.Windows.Forms.DataGridColumnStyle object.

y) ReadOnly z) UseStdAccessibleObjects

[C#] public virtual bool ReadOnly {get; set;}

[C++] public: _property virtual bool get_ReadOnly( ); public: _property virtual void set_ReadOnly(bool);

[VB] Overridable Public Property ReadOnly As Boolean

[JScript] public function get ReadOnly( ): Boolean; public function set ReadOnly(Boolean);

Description

Gets or sets a value indicating whether the data in the column can be edited.

Make a column read-only if it contains a primary key or if its value is generated automatically (as when the System.Data.DataColumn object's System.Data.DataColumn.AutoIncrement property is set to true).

aa) Site bb) Width cc) UseStdAccessibleObjects

Description

Gets or sets the width of the column.

dd) UseStdAccessibleObjects

[C#] public event EventHandler AlignmentChanged;

[C++] public: _event EventHandler* AlignmentChanged;

[VB] Public Event AlignmentChanged As EventHandler

Description

Occurs when the System.Windows.Forms.DataGridColumnStyle.Alignment property value changes.

For more information about handling events, see.

ee) UseStdAccessibleObjects

Description

Occurs when the column's font changes.

For more information about handling events, see.

ff) UseStdAccessibleObjects

[C#] public event EventHandler HeaderTextChanged;

[C++] public: _event EventHandler* HeaderTextChanged;

[VB] Public Event HeaderTextChanged As EventHandler

Description

Occurs when the System.Windows.Forms.DataGridColumnStyle.HeaderText property value changes.

For more information about handling events, see.

gg) UseStdAccessibleObjects

[C#] public event EventHandler MappingNameChanged;

[C++] public: _event EventHandler* MappingNameChanged;

[VB] Public Event MappingNameChanged As EventHandler

Description

Occurs when the System.Windows.Forms.DataGridColumnStyle.MappingName value changes.

For more information about handling events, see.

hh) UseStdAccessibleObjects

[C#] public event EventHandler NullTextChanged;

[C++] public: _event EventHandler* NullTextChanged;

[VB] Public Event NullTextChanged As EventHandler

Description

Occurs when the System.Windows.Forms.DataGridColumnStyle.NullText value changes.

For more information about handling events, see.

ii) UseStdAccessibleObjects

[C#] public event EventHandler PropertyDescriptorChanged;

[C++] public: _event EventHandler* PropertyDescriptorChanged;

[VB] Public Event PropertyDescriptorChanged As EventHandler

Description

Occurs when the System.Windows.Forms.DataGridColumnStyle.PropertyDescriptor property value changes.

For more information about handling events, see.

jj) UseStdAccessibleObjects

[C#] public event EventHandler ReadOnlyChanged;

[C++] public: _event EventHandler* ReadOnlyChanged;

[VB] Public Event ReadOnlyChanged As EventHandler

Description

Occurs when the System.Windows.Forms.DataGridColumnStyle.ReadOnly property value changes.

For more information about handling events, see.

kk) UseStdAccessibleObjects

[C#] public event EventHandler WidthChanged;

[C++] public: _event EventHandler* WidthChanged;

[VB] Public Event WidthChanged As EventHandler

Description

Occurs when the System.Windows.Forms.DataGridColumnStyle.Width property value changes.

For more information about handling events, see.

ll) Abort

[C#] protected internal abstract void Abort(int rowNum);

[C++] protected public: virtual void Abort(int rowNum)=0;

[VB] MustOverride Protected Friend Dim Sub Abort(ByVal rowNum As Integer)

[JScript] package abstract function Abort(rowNum: int);

Description

When overridden in a derived class, initiates a request to interrupt an edit procedure.

The System.Windows.Forms.DataGridColumnStyle must end any editing operations before returning. Use the System.Windows.Forms.DataGridColumnStyle.Abort(System.Int32) method to accomplish this. The row number upon which an operation is being interrupted.

mm) BeginUpdate

[C#] protected void BeginUpdate( );

[C++] protected: void BeginUpdate( );

[VB] Protected Sub BeginUpdate( )

[JScript] protected function BeginUpdate( );

Description

Suspends the painting of the column until the System.Windows.Forms.DataGridColumnStyle.EndUpdate method is called.

When many changes are made to the appearance of a System.Windows.Forms.DataGrid control (whether the changes are in the attributes of the column or the data displayed by the control), you should invoke the System.Windows.Forms.DataGridColumnStyle.BeginUpdate method to temporarily freeze the drawing of the control. This results in less distraction to the user, and a performance gain. After all updates have been made, invoke the System.Windows.Forms.DataGridColumnStyle.EndUpdate method to resume drawing of the control.

nn) CheckValidDataSource

[C#] protected void CheckValidDataSource(CurrencyManager value);

[C++] protected: void CheckValidDataSource(CurrencyManager* value);

[VB] Protected Sub CheckValidDataSource(ByVal value As CurrencyManager)

[JScript] protected function CheckValidDataSource(value: CurrencyManager);

Description

Throws an exception if the System.Windows.Forms.DataGrid does not have a valid data source, or if this column is not mapped to a valid property in the data source. A System.Windows.Forms.CurrencyManager to check.

oo) ColumnStartedEditing

[C#] protected internal virtual void ColumnStartedEditing (Control editingControl);

[C++] protected public: virtual void ColumnStartedEditing (Control* editingControl);

[VB] Overridable Protected Friend Dim Sub ColumnStartedEditing(ByVal editingControl As Control)

[JScript] package function ColumnStartedEditing(editingControl: Control);

Description

Informs the System.Windows.Forms.DataGrid that the user has begun editing the column.

When called, the System.Windows.Forms.IDataGridColumnStyleEditingNotificationService.ColumnStarted Editing(System.Windows.Forms. Control) method allows the System.Windows.Forms.DataGrid control to show a pencil in the row header indicating the row is being edited. The System.Windows.Forms.Control that is editing the column.

pp) Commit

[C#] protected internal abstract bool Commit(CurrencyManager dataSource, int rowNum);

[C++] protected public: virtual bool Commit(CurrencyManager* dataSource, int rowNum)=0;

[VB] MustOverride Protected Friend Dim Function Commit (ByVal dataSource As CurrencyManager, ByVal rowNum As Integer) As Boolean

[JScript] package abstract function Commit(dataSource: CurrencyManager, rowNum: int): Boolean;

Description

When overridden in a derived class, initiates a request to complete an editing procedure.

Return Value: true if the editing procedure committed successfully; otherwise, false.

Call the System.Windows.Forms.DataGridColumnStyle. Commit(System.Windows.Forms.CurrencyManager, System. Int32) method when the System.Windows.Forms.DataGridColumnStyle receives a request to complete editing. If this is not possible without error, return false. The System. Windows.Forms.CurrencyManager for the System.Windows.Forms.DataGridColumnStyle. The number of the row being edited.

qq) ConcedeFocus

[C#] protected internal virtual void ConcedeFocus( );

[C++] protected public: virtual void ConcedeFocus( );

[VB] Overridable Protected Friend Dim Sub Concede Focus( )

[JScript] package function ConcedeFocus( );

Description

Notifies a column that it has lost focus.

Use this method to determine a further action in a derived class. For example, this method is overridden by the System. Windows.Forms.DataGridTextBoxColumn to hide the System.Windows.Forms.DataGridTextBox.

rr) CreateHeaderAccessibleObject

[C#] protected virtual AccessibleObject CreateHeaderAccessibleObject( );

[C++] protected: virtual AccessibleObject* CreateHeaderAccessibleObject( );

[VB] Overridable Protected Function CreateHeaderAccessibleObject( ) As AccessibleObject

[JScript] protected function CreateHeaderAccessible Object( ): AccessibleObject;

Description

Gets the System.Windows.Forms.AccessibleObject for the column.

Return Value: An System.Windows.Forms.AccessibleObject for the column.

This property is called by a System.Windows.Forms.DataGridTableStyle when its System.Windows.Forms.DataGrid property changes. This property is required because any child controls hosted by a System.Windows.Forms.DataGridColumnStyle must be added to the System.Windows.Forms. DataGrid control's ControlCollection.

ss) Edit

[C#] protected internal virtual void Edit(CurrencyManager source, int rowNum, Rectangle bounds, bool readOnly);

[C++] protected public: virtual void Edit(CurrencyManager* source, int rowNum, Rectangle bounds, bool readOnly);

[VB] Overridable Protected Friend Dim Sub Edit(ByVal source As CurrencyManager, ByVal rowNum As Integer, ByVal bounds As Rectangle, ByVal readOnly As Boolean)

[JScript] package function Edit(source: CurrencyManager, rowNum: int, bounds: Rectangle, readOnly: Boolean); Prepares the cell for editing a value.

Description

Prepares a cell for editing.

Typically, the System.Windows.Forms.DataGridColumnStyle.Edit(System.Windows.Forms.CurrencyManager, System.Int32, System.Drawing.Rectangle, System.Boolean) method sites a control onto the grid at the location of the cell being edited. The System.Windows. Forms. CurrencyManager for the System.Windows.Forms. DataGridColumnStyle. The row number to edit. The bounding System.Drawing.Rectangle in which the control is to be sited. A value indicating whether the column is a read-only.

tt) Edit

[C#] protected internal virtual void Edit(CurrencyManager source, int rowNum, Rectangle bounds, bool readOnly, string instantText);

[C++] protected public: virtual void Edit(CurrencyManager* source, int rowNum, Rectangle bounds, bool readOnly, String* instantText);

[VB] Overridable Protected Friend Dim Sub Edit(ByVal source As CurrencyManager, ByVal rowNum As Integer, ByVal bounds As Rectangle, ByVal readOnly As Boolean, ByVal instantText As String)

[JScript] package function Edit(source: CurrencyManager, rowNum: int, bounds: Rectangle, readOnly: Boolean, instantText: String);

Description

Prepares the cell for editing using the specified System.Windows.Forms.CurrencyManager, row number, and System. Drawing.Rectangle parameters.

Typically, the System.Windows.Forms.DataGridColumnStyle.Edit(System.Windows.Forms.CurrencyManager, System.Int32, System.Drawing.Rectangle,System.Boolean) method sites a control onto the grid at the location of the cell being edited. The System.Windows. Forms. CurrencyManager for the System.Windows.Forms. DataGridColumnStyle. The row number in this column which is being edited. The System.Drawing.Rectangle in which the control is to be sited. A value indicating whether the column is a read-only. The text to display in the control.

uu) Edit

[C#] protected internal abstract void Edit(CurrencyManager source, int rowNum, Rectangle bounds, bool readOnly, string instantText, bool cellIsVisible);

[C++] protected public: virtual void Edit(CurrencyManager* source, int rowNum, Rectangle bounds, bool readOnly, String* instantText, bool cellIsVisible)=0;

[VB] MustOverride Protected Friend Dim Sub Edit(ByVal source As CurrencyManager, ByVal rowNum As Integer, ByVal bounds As Rectangle, ByVal readOnly As Boolean, ByVal instantText As String, ByVal cellIsVisible As Boolean)

[JScript] package abstract function Edit(source: CurrencyManager, rowNum: int, bounds: Rectangle, readOnly: Boolean, instantText: String, cellIsVisible: Boolean); Prepares a cell for editing.

Description

When overridden in a deriving class, prepares a cell for editing.

Typically, the System.Windows.Forms.DataGridColumn Style.Edit(System.Windows.Forms.CurrencyManager, System.Int32, System.Drawing.Rectangle,System.Boolean) method sites a control onto the grid at the location of the cell being edited. The System.Windows.Forms.CurrencyManager for the System.Windows.Forms.DataGridColumnStyle. The row number in this column which is being edited. The System.Drawing.Rectangle in which the control is to be sited. A value indicating whether the column is a read-only. The text to display in the control. A value indicating whether the cell is visible.

vv) EndUpdate

[C#] protected void EndUpdate( );

[C++] protected: void EndUpdate( );

[VB] Protected Sub EndUpdate( )

[JScript] protected function EndUpdate( );

Description

Resumes the painting of columns suspended by calling the System.Windows.Forms.DataGridColumnStyle.BegInUpdate method.

When many changes are made to the appearance of a System.Windows.Forms.DataGrid control (whether the changes are in the attributes of the column or the data displayed by the control), you should invoke the System.Windows.Forms.DataGridColumnStyle.BeginUpdate method to temporarily freeze the drawing of the control. This results in less distraction to the user, and a performance gain. After all updates have been made, invoke the System.Windows.Forms.DataGridColumnStyle.EndUpdate method to resume drawing of the control.

ww) EnterNull Value

[C#] protected internal virtual void EnterNullValue( );

[C++] protected public: virtual void EnterNullValue( );

[VB] Overridable Protected Friend Dim Sub EnterNull Value( )

[JScript] package function EnterNullValue( );

Description

Enters a System.DBNull.Value into the column.

This method is called when the user presses Alt+0 to allow a column to enter the appropriate null value. For example, when called on a System.Windows.Forms.DataGridTextBoxColumn, the appropriate System.Windows.Forms.DataGridColumnStyle.NullText value is inserted into the column.

xx) GetColumnValueAtRow

[C#] protected internal virtual object GetColumnValueAtRow(CurrencyManager source, int rowNum);

[C++] protected public: virtual Object* GetColumnValueAtRow(CurrencyManager* source, int rowNum);

[VB] Overridable Protected Friend Dim Function GetColumn ValueAtRow(ByVal source As CurrencyManager, ByVal rowNum As Integer) As Object

[JScript] package function GetColumnValueAtRow(source: CurrencyManager, rowNum: int): Object;

Description

Gets the value in the specified row from the specified System.Windows.Forms.CurrencyManager.

Return Value. An System.Object containing the value.

If the data source for the column is a System.Data.DataTable, use the System.Data.DataTable.ColumnChanging or System.Data.DataTable.RowChanging events to determine when a row or column value has changed. The System.Windows.Forms.CurrencyManager containing the data. The row number containing the data.

yy) GetMinimumHeight

[C#] protected internal abstract int GetMinimumHeight( );

[C++] protected public: virtual int GetMinimumHeight( )=0;

[VB] MustOverride Protected Friend Dim Function GetMinimumHeight( ) As Integer

[JScript] package abstract function GetMinimumHeight( ): int;

Description

When overridden in a derived class, gets the minimum height of a row.

Return Value: The minimum height of a row.

zz) GetPreferredHeight

[C#] protected internal abstract int GetPreferredHeight (Graphics g, object value);

[C++] protected public: virtual int GetPreferredHeight (Graphics* g, Object* value)=0;

[VB] MustOverride Protected Friend Dim Function GetPreferredHeight(ByVal g As Graphics, ByVal value As Object) As Integer

[JScript] package abstract function GetPreferredHeight(g: Graphics, value: Object): int;

Description

When overridden in a derived class, gets the height used for automatically resizing columns.

Return Value: The height used for auto resizing a cell.

The System.Windows.Forms.DataGridColumnStyle. GetPreferredSize(System.Drawing.Graphics, System.Object) will usually be invoked from a mouse down event to resize a column's height for a long string. A System.Drawing.Graphics object. A object value for which you want to know the screen height and width.

aaa) GetPreferredSize

[C#] protected internal abstract Size GetPreferredSize (Graphics g, object value);

[C++] protected public: virtual Size GetPreferredSize (Graphics* g, Object* value)=0;

[VB] MustOverride Protected Friend Dim Function GetPreferredSize(ByVal g As Graphics, ByVal value As Object) As Size

[JScript] package abstract function GetPreferredSize(g: Graphics, value: Object): Size;

Description

When overridden in a derived class, gets the width and height of the specified value. The width and height are used when the user navigates to System.Windows.Forms.DataGridTableStyle using the System.Windows.Forms.DataGridColumnStyle.

Return Value: A System.Drawing.Size that contains the dimensions of the cell.

Use System.Windows.Forms.DataGridColumnStyle. GetPreferredSize(System.Drawing.Graphics, System.Object) to determine the width a column should resize to, given a particular string or numeral. A System.Drawing.Graphics object. An object value for which you want to know the screen height and width.

bbb) Invalidate

[C#] protected virtual void Invalidate( );

[C++] protected: virtual void Invalidate( );

[VB] Overridable Protected Sub Invalidate( )

[JScript] protected function Invalidate( );

Description

Redraws the column and causes a paint message to be sent to the control.

The System.Windows.Forms.DataGridColumnStyle. Invalidate method is typically called after an editing operation is interrupted. For example, you may call the method when implementing the System.Windows.Forms.DataGridColumnStyle.Abort(System.Int32) method.

ccc) Paint

[C#] protected internal abstract void Paint(Graphics g, Rectangle bounds, CurrencyManager source, int rowNum);

[C++] protected public: virtual void Paint(Graphics* g, Rectangle bounds, CurrencyManager* source, int rowNum)=0;

[VB] MustOverride Protected Friend Dim Sub Paint(ByVal g As Graphics, ByVal bounds As Rectangle, ByVal source As CurrencyManager, ByVal rowNum As Integer)

[JScript] package abstract function Paint(g: Graphics, bounds: Rectangle, source: CurrencyManager, rowNum: int); When overridden in a derived class, paints the column in a System.Windows.Forms.DataGrid control.

Description

Paints the System.Windows.Forms.DataGridColumnStyle with the specified System.Drawing.Graphics, System.Drawing.Rectangle, System.Windows.Forms.CurrencyManager, and row number.

This method will be called very often with state=DataGridColumnStyleState.Normal, so inheriting classes should heavily optimize that type of call. When painting a cell, keep in mind the following: the border painting logic is handled elsewhere. Callers should save all Pens, Brushes, etc. before passing their System.Drawing.Graphics object to this method. The System.Drawing.Graphics object to draw to. The bounding System.Drawing.Rectangle to paint into. The System.Windows.Forms.CurrencyManager of the System.Windows.Forms.DataGrid control the column belongs to. The number of the row in the underlying data being referred to.

ddd) Paint

[C#] protected internal abstract void Paint(Graphics g, Rectangle bounds, CurrencyManager source, int rowNum, bool alignToRight);

[C++] protected public: virtual void Paint(Graphics* g, Rectangle bounds, CurrencyManager* source, int rowNum, bool alignToRight)=0;

[VB] MustOverride Protected Friend Dim Sub Paint(ByVal g As Graphics, ByVal bounds As Rectangle, ByVal source As CurrencyManager, ByVal rowNum As Integer, ByVal alignToRight As Boolean)

[JScript] package abstract function Paint(g: Graphics, bounds: Rectangle, source: CurrencyManager, rowNum: int, alignToRight: Boolean);

Description

When overridden in a derived class, paints a System.Windows.Forms.DataGridColumnStyle with the specified System.Drawing.Graphics, System.Drawing.Rectangle, System.Windows.Forms.CurrencyManager, row number, and alignment. The System.Drawing.Graphics object to draw to. The bounding System.Drawing.Rectangle to paint into. The System.Windows.Forms.CurrencyManager of the System.Windows.Forms.DataGrid control the column belongs to. The number of the row in the underlying data being referred to. A value indicating whether to align the column's content to the right.

eee) Paint

[C#] protected internal virtual void Paint(Graphics g, Rectangle bounds, CurrencyManager source, int rowNum, Brush backBrush, Brush foreBrush, bool alignToRight);

[C++] protected public: virtual void Paint(Graphics* g, Rectangle bounds, CurrencyManager* source, int rowNum, Brush* backBrush, Brush* foreBrush, bool alignToRight);

[VB] Overridable Protected Friend Dim Sub Paint(ByVal g As Graphics, ByVal bounds As Rectangle, ByVal source As CurrencyManager, ByVal rowNum As Integer, ByVal backBrush As Brush, ByVal foreBrush As Brush, ByVal alignToRight As Boolean)

[JScript] package function Paint(g: Graphics, bounds: Rectangle, source: CurrencyManager, rowNum: int, backBrush: Brush, foreBrush: Brush, alignToRight Boolean);

Description

Paints a System.Windows.Forms.DataGridColumnStyle with the specified System.Drawing.Graphics, System.Drawing.Rectangle, System.Windows.Forms.CurrencyManager, row number, background color, foreground color, and alignment. The System.Drawing.Graphics object to draw to. The bounding System.Drawing.Rectangle to paint into. The System.Windows.Forms.CurrencyManager of the System.Windows.Forms.DataGrid control the column belongs to. The number of the row in the underlying data table being referred to. A System.Drawing.Brush used to paint the background color. A System.Drawing.Color used to paint the foreground color. A value indicating whether to align the content to the right.

fff) ResetHeaderText

[C#] public void ResetHeaderText( );

[C++] public: void ResetHeaderText( );

[VB] Public Sub ResetHeaderText( )

[JScript] public function ResetHeaderText( );

Description

Resets the System.Windows.Forms.DataGridColumn Style.HeaderText to its default value, null.

You typically use this method if you are either creating a designer for the System.Windows.Forms.DataGrid, or creating your own control incorporating the System.Windows.Forms.DataGrid.

ggg) SetColumn ValueAtRow

[C#] protected internal virtual void SetColumnValueAtRow (CurrencyManager source, int rowNum, object value);

[C++] protected public: virtual void SetColumnValueAtRow (CurrencyManager* source, int rowNum, Object* value);

[VB] Overridable Protected Friend Dim Sub SetColumnValueAtRow(ByVal source As CurrencyManager, ByVal rowNum As Integer, ByVal value As Object)

[JScript] package function SetColumnValueAtRow(source: CurrencyManager, rowNum: int, value: Object);

Description

Sets the value in a specified row with the value from a specified System.Windows.Forms.CurrencyManager. A System.Windows.Forms.CurrencyManager associated with the System.Windows.Forms.DataGridColumnStyle. The number of the row. The value to set.

hhh) SetDataGrid

[C#] protected virtual void SetDataGrid(DataGrid value);

[C++] protected: virtual void SetDataGrid(DataGrid* value);

[VB] Overridable Protected Sub SetDataGrid(ByVal value As DataGrid)

[JScript] protected function SetDataGrid(value: DataGrid);

Description

Sets the System.Windows.Forms.DataGrid control that this column belongs to.

Typically, you should use the System.Windows.Forms.DataGridColumnStyle.SetDataGridInColumn(System.Windows.Forms.DataGrid) method. The System.Windows.Forms.DataGrid control that this column belongs to.

iii) SetDataGridInColumn

[C#] protected virtual void SetDataGridInColumn(DataGrid value);

[C++] protected: virtual void SetDataGridInColumn(DataGrid* value);

[VB] Overridable Protected Sub SetDataGridInColumn(ByVal value As DataGrid)

[JScript] protected function SetDataGridInColumn(value: DataGrid);

Description

Sets the System.Windows.Forms.DataGrid for the column.

This method is typically overridden by derived classes to do special processing when the System.Windows.Forms.DataGridColumnStyle is added to System.Windows.Forms.DataGrid. For example, the System.Windows.Forms.DataGridTextBoxColumn uses this method to add the System.Windows.Forms.DataGridTextBox as a child of the System.Windows.Forms.DataGrid. A System.Windows.Forms.DataGrid.

jjj) IDataGridColumnStyleEditingNotificationService. ColumnStartedEditing

[C#] void IDataGridColumnStyleEditingNotification Service. ColumnStartedEditing(Control editingControl);

[C++] void IDataGridColumnStyleEditingNotification Service:: ColumnStartedEditing(Control editingControl);

[VB] Sub ColumnStartedEditing(ByVal editingControl As Control) Implements IDataGridColumnStyleEditingNotificationService.ColumnStartedEditing

[JScript] function IDataGridColumnStyleEditingNotificationService.ColumnStartedEditing(editingControl: Control);

kkk) UpdateUI

[C#] protected internal virtual void UpdateUI(CurrencyManager source, int rowNum, string instantText);

[C++] protected public: virtual void UpdateUI(CurrencyManager* source, int rowNum, String* instantText);

[VB] Overridable Protected Friend Dim Sub UpdateUI(ByVal source As CurrencyManager, ByVal rowNum As Integer, ByVal instantText As String)

[JScript] package function UpdateUI(source: CurrencyManager, rowNum: int, instantText: String);

Description

Updates the value of a specified row with the given text. The System.Windows.Forms.CurrencyManager associated with the System.Windows.Forms.DataGridColumnStyle. The row to update. The new value.

DataGridLineStyle enumeration (System.Windows.Forms)

a) UpdateUI

Description

Specifies the style of gridlines in a System.Windows.Forms.DataGrid.

Use the members of this enumeration to set the value of the System.Windows.Forms.DataGrid.GridLineStyle property in the System.Windows.Forms.DataGrid class. The default is Solid.

b) UpdateUI

[C#] public const DataGridLineStyle None;

[C++] public: const DataGridLineStyle None;

[VB] Public Const None As DataGridLineStyle

[JScript] public var None: DataGridLineStyle;

Description

No gridlines between cells.

c) UpdateUI

[C#] public const DataGridLineStyle Solid;

[C++] public: const DataGridLineStyle Solid;

[VB] Public Const Solid As DataGridLineStyle

[JScript] public var Solid: DataGridLineStyle;

Description

Solid gridlines between cells.

DataGridParentRowsLabelStyle enumeration (System.Windows.Forms)

a) ToString

Description

Specifies how the parent row labels of a System.Windows.Forms.DataGrid control are displayed.

Use the members of this enumeration to set the value of the System.Windows.Forms.DataGrid.ParentRowsLabelStyle property.

b) ToString

[C#] public const DataGridParentRowsLabelStyle Both;

[C++] public: const DataGridParentRowsLabelStyle Both;

[VB] Public Const Both As DataGridParentRowsLabelStyle

[JScript] public var Both: DataGridParentRowsLabelStyle;

Description

Displays both the parent table and column names.

c) ToString

[C#] public const DataGridParentRowsLabelStyle ColumnName;

[C++] public: const DataGridParentRowsLabelStyle ColumnName;

[VB] Public Const ColumnName As DataGridParentRowsLabelStyle

[JScript] public var ColumnName: DataGridParentRowsLabelStyle;

Description

Displays the parent column name.

d) ToString

[C#] public const DataGridParentRowsLabelStyle None;

[C++] public: const DataGridParentRowsLabelStyle None;

[VB] Public Const None As DataGridParentRowsLabelStyle

[JScript] public var None: DataGridParentRowsLabelStyle;

Description

Display no parent row labels.

e) ToString

[C#] public const DataGridParentRowsLabelStyle TableName;

[C++] public: const DataGridParentRowsLabelStyle TableName;

[VB] Public Const TableName As DataGridParentRowsLabelStyle

[JScript] public var TableName: DataGridParentRowsLabelStyle;

Description

Displays the parent table name.

DataGridPreferredColumnWidthTypeConverter class (System.Windows.Forms)

a) ToString

Description

Converts the value of an object to a different data type.

b) DataGridPreferredColumnWidthTypeConverter

Example Syntax:

c) ToString

[C#] public DataGridPreferredColumnWidthTypeConverter( );

[C++] public: DataGridPreferredColumnWidthTypeConverter( );

[VB] Public Sub New( )

[JScript] public function DataGridPreferredColumnWidthTypeConverter( );

d) CanConvertFrom

[C#] public override bool CanConvertFrom(ITypeDescriptorContext context, Type sourceType);

[C++] public: bool CanConvertFrom(ITypeDescriptorContext* context, Type* sourceType);

[VB] Overrides Public Function CanConvertFrom(ByVal context As ITypeDescriptorContext, ByVal sourceType As Type) As Boolean

[JScript] public override function CanConvertFrom(context: ITypeDescriptorContext, sourceType: Type): Boolean;

Description

Gets a value that specifies whether the converter can convert an object in the given source type to the native type of the converter.

Return Value: true, if this converter can perform the conversion; otherwise, false. An System.ComponentModel.ITypeDescriptorContext that provides a format context. A System.Type that represents the type you want to convert from.

e) ConvertFrom

[C#] public override object ConvertFrom(ITypeDescriptorContext context, CultureInfo culture, object value);

[C++] public: Object* ConvertFrom(ITypeDescriptorContext* context, CultureInfo* culture, Object* value);

[VB] Overrides Public Function ConvertFrom(ByVal context As ITypeDescriptorContext, ByVal culture As CultureInfo, ByVal value As Object) As Object

[JScript] public override function ConvertFrom(context: ITypeDescriptorContext, culture: CultureInfo, value: Object): Object;

Description

Converts the given object to the native type of the converter. An System.ComponentModel.ITypeDescriptorContext that a provides format context. A System.Globalization.CultureInfo to use for the current culture. The System.Object to convert.

f) ConvertTo

[C#] public override object ConvertTo(ITypeDescriptorContext context, CultureInfo culture, object value, Type destinationType);

[C++] public: Object* ConvertTo(ITypeDescriptorContext* context, CultureInfo* culture, Object* value, Type* destinationType);

[VB] Overrides Public Function ConvertTo(ByVal context As ITypeDescriptorContext, ByVal culture As CultureInfo, ByVal value As Object, ByVal destinationType As Type) As Object

[JScript] public override function ConvertTo(context: ITypeDescriptorContext, culture: CultureInfo, value: Object, destinationType: Type): Object;

Description

Converts the given value to the native type of the converter. An System.ComponentModel.ITypeDescriptorContext that a provides format context. A System.Globalization.CultureInfo to use for the current culture. The System.Object to convert. The System.Type of the conversion.

DataGridTableStyle class (System.Windows.Forms)

a) ToString

Description

Represents the table drawn by the System.Windows.Forms.DataGrid control at run time.

The System.Windows.Forms.DataGrid control displays data in the form of a grid. The System.Windows.Forms.DataGrid-TableStyle is a class that represents the drawn grid only. This grid should not be confused with the System.Data.DataTable class, which is a possible source of data for the grid. Instead, the System.Data.DataGridTableStyle strictly represents the grid as it is painted in the control. Therefore, through the System.Windows.Forms.DataGridTableStyle you can control the appearance of the grid for each System.Data.DataTable. To specify which System.Windows.Forms.DataGrid-TableStyle is used when displaying data from a particular System.Data.DataTable, set the System.Windows.Forms.DataGridTableStyle.MappingName to the System. Data.DataTable.TableName of a System.Data.DataTable.

b) ToString

[C#] public static DataGridTableStyle DefaultTableStyle;

[C++] public: static DataGridTableStyle* DefaultTableStyle;

[VB] Public Shared DefaultTableStyle As DataGridTable Style

[JScript] public static var DefaultTableStyle: DataGridTable Style;

Description

Gets the default table style.

c) DataGridTableStyle

Example Syntax:

d) ToString

[C#] public DataGridTableStyle( );

[C++] public: DataGridTableStyle( );

[VB] Public Sub New( )

[JScript] public function DataGridTableStyle( ); Initializes a new instance of the System.Windows.Forms.DataGrid-TableStyle class.

Description

Initializes a new instance of the System.Windows.Forms.DataGridTableStyle class.

e) DataGridTableStyle

Example Syntax:

f) ToString

[C#] public DataGridTableStyle(bool isDefaultTableStyle);

[C++] public: DataGridTableStyle(bool isDefaultTable Style);

[VB] Public Sub New(ByVal isDefaultTableStyle As Boolean)

[JScript] public function DataGridTableStyle(isDefaultTable Style: Boolean);

Description

Initializes a new instance of the System.Windows.Forms.DataGridTableStyle class using the specified value to determine whether the grid table is the default style. true to specify the table as the default; otherwise, false.

g) DataGridTableStyle

Example Syntax:

h) ToString

[C#] public DataGridTableStyle(CurrencyManager listManager);

[C++] public: DataGridTableStyle(CurrencyManager* listManager);

[VB] Public Sub New(ByVal listManager As CurrencyManager)

[JScript] public function DataGridTableStyle(listManager: CurrencyManager);

Description

Initializes a new instance of the System.Windows.Forms.DataGridTableStyle class with the specified System.Windows.Forms.CurrencyManager. The System.Windows.Forms.CurrencyManager to use.

i) AllowSorting j) ToString

[C#] public bool AllowSorting {get; set;}

[C++] public: _property bool get_AllowSorting( ); public: _property void set_AllowSorting(bool);

[VB] Public Property AllowSorting As Boolean

[JScript] public function get AllowSorting( ): Boolean; public function set AllowSorting(Boolean);

Description

Indicates whether sorting is allowed on the grid table when this System.Windows.Forms.DataGridTableStyle is used.

When the System.Windows.Forms.DataGridTable Style.AllowSorting property is set to true, a triangle appears in each column header indicating the direction of the sort. The user can click on any column header to sort the grid by that column. Clicking the column a second time changes the direction of the sort.

k) AlternatingBackColor l) ToString

[C#] public Color AlternatingBackColor {get; set;}

[C++] public: _property Color get_AlternatingBackColor( ); public: _property void set_AlternatingBackColor(Color);

[VB] Public Property AlternatingBackColor As Color

[JScript] public function get AlternatingBackColor( ): Color; public function set AlternatingBackColor(Color);

Description

The background color of alternating rows.

m) BackColor n) ToString

[C#] public Color BackColor {get; set;}

[C++] public: _property Color get_BackColor( ); public: _property void set_BackColor(Color);

[VB] Public Property BackColor As Color

[JScript] public function get BackColor( ): Color; public function set BackColor(Color);

Description

Gets or sets the background color of the grid table. The System.Windows.Forms.DataGrid-TableStyle.AlternatingBackColor property can also be set to create a ledger-like appearance.

o) ColumnHeaders Visible p) ToString

[C#] public bool ColumnHeadersVisible {get; set;}

[C++] public: _property bool get_ColumnHeadersVisible( ); public: _property void set_ColumnHeadersVisible(bool);

[VB] Public Property ColumnHeadersVisible As Boolean

[JScript] public function get ColumnHeadersVisible( ): Boolean; public function set ColumnHeadersVisible(Boolean);

Description

Gets or sets a value indicating whether column headers are visible.

To set header caption text, use the System.Windows.Forms.DataGridColumnStyle.HeaderText property of the System.Windows.Forms.DataGridColumnStyle class.

q) Container
r) DataGrid
s) ToString

Description

Gets or sets the System.Windows.Forms.DataGrid control for the drawn table.

The System.Windows.Forms.DataGrid control displays data in the form of a grid. The System.Windows.Forms.DataGridTableStyle is an object that represents the drawn grid. The System.Windows.Forms.DataGrid property returns a reference to the control that is displaying the grid.

t) DesignMode
u) Events
v) ForeColor
w) ToString

Description

Gets or sets the foreground color of the grid table.

x) GridColumnStyles
y) ToString

[C#] public virtual GridColumnStylesCollection GridColumnStyles {get;}

[C++] public: _property virtual GridColumnStylesCollection* get_GridColumnStyles( );

[VB] Overridable Public ReadOnly Property GridColumnStyles As GridColumnStylesCollection

[JScript] public function get GridColumnStyles( ): GridColumnStylesCollection;

Description

Gets the collection of columns drawn for this table.

The System.Windows.Forms.GridColumnStylesCollection returned by the System.Windows.Forms.DataGridTableStyle.GridColumnStyles property allows you to create a customized set of column styles. For each System.Data.DataColumn in a System.Data.DataTable, set the System.Windows.Forms.DataGridTableStyle.MappingName of a System.Windows.Forms.DataGridColumnStyle object to the System.Data.DataColumn.ColumnName. That column style will automatically be used when this System.Windows.Forms.DataGridTableStyle is displayed.

z) GridLineColor
aa) ToString

[C#] public Color GridLineColor {get; set;}

[C++] public: _property Color get_GridLineColor( ); public: _property void set_GridLineColor(Color);

[VB] Public Property GridLineColor As Color

[JScript] public function get GridLineColor( ): Color; public function set GridLineColor(Color);

Description

Gets or sets the color of grid lines.

bb) GridLineStyle
cc) ToString

[C#] public DataGridLineStyle GridLineStyle {get; set;}

[C++] public: _property DataGridLineStyle get_GridLineStyle( ); public: _property void set_GridLineStyle(DataGridLineStyle);

[VB] Public Property GridLineStyle As DataGridLineStyle

[JScript] public function get GridLineStyle( ): DataGridLineStyle; public function set GridLineStyle(DataGridLineStyle);

Description

Gets or sets the style of grid lines.

dd) HeaderBackColor
ee) ToString

[C#] public Color HeaderBackColor {get; set;}

[C++] public: _property Color get_HeaderBackColor( ); public: _property void set_HeaderBackColor(Color);

[VB] Public Property HeaderBackColor As Color

[JScript] public function get HeaderBackColor( ): Color; public function set BeaderBackColor(Color);

Description

Gets or sets the background color of headers.

ff) HeaderFont
gg) ToString

[C#] public Font HeaderFont {get; set;}

[C++] public: _property Font* get_HeaderFont( ); public: _property void set_HeaderFont(Font*);

[VB] Public Property HeaderFont As Font

[JScript] public function get HeaderFont( ): Font; public function set HeaderFont(Font);

Description

Gets or sets the font used for header captions.

To set header caption text, use the System.Windows.Forms.DataGridColumnStyle.HeaderText property of the System.Windows.Forms.DataGridColumnStyle class.

hh) HeaderForeColor
ii) ToString

[C#] public Color HeaderForeColor {get; set;}

[C++] public: _property Color get_HeaderForeColor( ); public: _property void set_HeaderForeColor(Color);

[VB] Public Property HeaderForeColor As Color

[JScript] public function get HeaderForeColor( ): Color; public function set HeaderForeColor(Color);

Description

Gets or sets the foreground color of headers.

jj) LinkColor kk) ToString

[C#] public Color LinkColor {get; set;}

[C++] public: _property Color get_LinkColor( ); public: _property void set_LinkColor(Color);

[VB] Public Property LinkColor As Color

[JScript] public function get LinkColor( ): Color; public function set LinkColor(Color);

Description

Gets or sets the color of link text.

ll) LinkHoverColor mm) ToString

[C#] public Color LinkHoverColor {get; set;}

[C++] public: _property Color get_LinkHoverColor( ); public: _property void set_LinkHoverColor(Color);

[VB] Public Property LinkHoverColor As Color

[JScript] public function get LinkHoverColor( ): Color; public function set LinkHoverColor(Color);

Description

Gets or sets the color displayed when hovering over link text.

nn) MappingName oo) ToString

[C#] public string MappingName {get; set;}

[C++] public: _property String* get_MappingName( ); public: _property void set_MappingName(String*);

[VB] Public Property MappingName As String

[JScript] public function get MappingName( ): String; public function set MappingName(String);

Description

Gets or sets the name used to map this table to a specific data source.

The default is the name of the list managed by the System.Windows.Forms.CurrencyManager for this grid. The System.Windows.Forms.CurrencyManager for the System.Windows.Forms.DataGridTableStyle is set using the System.Windows.Forms.DataGridTableStyle.#ctor constructor.

pp) PreferredColumnWidth qq) ToString

[C#] public int PreferredColumnWidth {get; set;}

[C++] public: _property int get_PreferredColumnWidth( ); public: _property void set_PreferredColumnWidth(int);

[VB] Public Property PreferredColumnWidth As Integer

[JScript] public function get PreferredColumnWidth( ): int; public function set PreferredColumnWidth(int);

Description

Gets or sets the width used to create columns when a new grid is displayed.

rr) PreferredRowHeight ss) ToString

[C#] public int PreferredRowHeight {get; set;}

[C++] public: _property int get_PreferredRowHeight( ); public: _property void set_PreferredRowHeight(int);

[VB] Public Property PreferredRowHeight As Integer

[JScript] public function get PreferredRowHeight( ): int; public function set PreferredRowHeight(int);

Description

Gets or sets the height used to create a row when a new grid is displayed.

The preferred height is the minimum height needed to accommodate the displayed text with the assigned System.Windows.Forms.DataGridTableStyle.HeaderFont.

t) ReadOnly u) ToString

[C#] public virtual bool ReadOnly {get; set;}

[C++] public: _property virtual bool get_ReadOnly( ); public: _property virtual void set_ReadOnly(bool);

[VB] Overridable Public Property ReadOnly As Boolean

[JScript] public function get ReadOnly( ): Boolean; public function set ReadOnly(Boolean);

Description

Gets or sets a value indicating whether columns can be edited. You can also specify whether individual columns within the table are editable by setting the System.Windows.Forms.DataGridColumnStyle class's System.Windows.Forms.DataGridColumnStyle.ReadOnly property to an appropriate value, true or false.

vv) RowHeaders Visible ww) ToString

[C#] public bool RowHeadersVisible {get; set;}

[C++] public: _property bool get_RowHeadersVisible( ); public: _property void set_RowHeadersVisible(bool);

[VB] Public Property RowHeadersVisible As Boolean

[JScript] public function get RowHeadersVisible( ): Boolean; public function set RowHeadersVisible(Boolean);

Description

Gets or sets a value indicating whether row headers are visible.

When row headers are visible, a plus sign is displayed in each row header if the underlying System.Data.DataTable has a related child table.

xx) RowHeaderWidth yy) ToString

[C#] public int RowHeaderWidth {get; set;}

[C++] public: _property int get_RowHeaderWidth( ); public: _property void set_RowHeaderWidth(int);

[VB] Public Property RowHeaderWidth As Integer

[JScript] public function get RowHeaderWidth( ): int; public function set RowHeaderWidth(int);

Description

Gets or sets the width of row headers.

When row headers are visible a plus sign is displayed in each row header if the underlying data has a related child table.

zz) SelectionBackColor aaa) ToString

[C#] public Color SelectionBackColor {get; set;}

[C++] public: _property Color get_SelectionBackColor( ); public: _property void set_SelectionBackColor(Color);

[VB] Public Property SelectionBackColor As Color

[JScript] public function get SelectionBackColor( ): Color; public function set SelectionBackColor(Color);

Description

Gets or sets the background color of selected cells.

bbb) SelectionForeColor ccc) ToString

[C#] public Color SelectionForeColor {get; set;}

[C++] public: _property Color get_SelectionForeColor( ); public: _property void set_SelectionForeColor(Color);

[VB] Public Property SelectionForeColor As Color

[JScript] public function get SelectionForeColor( ): Color; public function set SelectionForeColor(Color);

Description

Gets or sets the foreground color of selected cells.

ddd) Site eee) ToString

Description

Occurs when the System.Windows.Forms.DataGridTableStyle.AllowSorting property value changes.

For more information about handling events, see.

fff) ToString

[C#] public event EventHandler AlternatingBackColorChanged;

[C++] public: _event EventHandler* AlternatingBackColorChanged;

[VB] Public Event AlternatingBackColorChanged As EventHandler

Description

Occurs when the System.Windows.Forms.DataGridTableStyle.AlternatingBackColor value changes.

For more information about handling events, see.

ggg) ToString

[C#] public event EventHandler BackColorChanged;

[C++] public: _event EventHandler* BackColorChanged;

[VB] Public Event BackColorChanged As EventHandler

Description

Occurs when the System.Windows.Forms.DataGridTableStyle.BackColor value changes.

For more information about handling events, see.

hhh) ToString

[C#] public event EventHandler ColumnHeadersVisibleChanged;

[C++] public: _event EventHandler* ColumnHeadersVisibleChanged;

[VB] Public Event ColumnHeadersVisibleChanged As EventHandler

Description

Occurs when the System.Windows.Forms.DataGridTableStyle.ColumnHeadersVisible value changes.

To set the caption text for each column in a grid, set the System.Windows.Forms.DataGridColumnStyle.HeaderText property of the System.Windows.Forms.DataGridColumnStyle class.

iii) ToString

Description

Occurs when the System.Windows.Forms.DataGridTableStyle.ForeColor value changes.

For more information about handling events, see.

jjj) ToString

[C#] public event EventHandler GridLineColorChanged;

[C++] public: _event EventHandler* GridLineColorChanged;

[VB] Public Event GridLineColorChanged As EventHandler

Description

Occurs when the System.Windows.Forms.DataGridTableStyle.GridLineColor value changes.

For more information about handling events, see.

kkk) ToString

[C#] public event EventHandler GridLineStyleChanged;

[C++] public: _event EventHandler* GridLine StyleChanged;

[VB] Public Event GridLineStyleChanged As EventHandler

Description

Occurs when the System.Windows.Forms.DataGridTableStyle.GridLineStyle value changes.

For more information about handling events, see.

lll) ToString

[C#] public event EventHandler HeaderBackColorChanged;

[C++] public: _event EventHandler* HeaderBackColorChanged;

[VB] Public Event HeaderBackColorChanged As EventHandler

Description

Occurs when the System.Windows.Forms.DataGridTableStyle.HeaderBackColor value changes.

mmm) ToString

[C#] public event EventHandler HeaderFontChanged;

[C++] public: _event EventHandler* HeaderFontChanged;

[VB] Public Event HeaderFontChanged As EventHandler

Description

Occurs when the System.Windows.Forms.DataGridTableStyle.HeaderFont value changes.

For more information about handling events, see.

nnn) ToString

[C#] public event EventHandler HeaderForeColorChanged;

[C++] public: _event EventHandler* HeaderForeColorChanged;

[VB] Public Event HeaderForeColorChanged As EventHandler

Description

Occurs when the System.Windows.Forms.DataGridTableStyle.HeaderForeColor value changes.

For more information about handling events, see.

ooo) ToString

[C#] public event EventHandler LinkColorChanged;

[C++] public: _event EventHandler* LinkColorChanged;

[VB] Public Event LinkColorChanged As EventHandler

Description

Occurs when the System.Windows.Forms.DataGridTableStyle.LinkColor value changes.

For more information about handling events, see.

ppp) ToString

[C#] public event EventHandler LinkHoverColorChanged;

[C++] public: _event EventHandler* LinkHoverColorChanged;

[VB] Public Event LinkHoverColorChanged As EventHandler

Description

Occurs when the System.Windows.Forms.DataGridTableStyle.LinkHoverColor value changes.

For more information about handling events, see.

qqq) ToString

[C#] public event EventHandler MappingNameChanged;

[C++] public: _event EventHandler* MappingName Changed;

[VB] Public Event MappingNameChanged As EventHandler

Description

Occurs when the System.Windows.Forms.DataGridTableStyle.MappingName value changes.

For more information about handling events, see.

rrr) Tostring

[C#] public event EventHandler PreferredColumnWidthChanged;

[C++] public: _event EventHandler* PreferredColumnWidthChanged;

[VB] Public Event PreferredColumnWidthChanged As EventHandler

Description

Occurs when the System.Windows.Forms.DataGridTableStyle.PreferredColumnWidth property value changes.

sss) ToString

[C#] public event EventHandler PreferredRowHeightChanged;

[C++] public: _event EventHandler* PreferredRowHeightChanged;

[VB] Public Event PreferredRowHeightChanged As EventHandler

Description

Occurs when the System.Windows.Forms.DataGridTableStyle.PreferredRowHeight value changes.

For more information about handling events, see.

ttt) ToString

[C#] public event EventHandler ReadOnlyChanged;

[C++] public: _event EventHandler* ReadOnlyChanged;

[VB] Public Event ReadOnlyChanged As EventHandler

Description

Occurs when the System.Windows.Forms.DataGridTableStyle.ReadOnly value changes.

For more information about handling events, see.

uuu) ToString

[C#] public event EventHandler RowHeadersVisibleChanged;

[C++] public: _event EventHandler* RowHeadersVisibleChanged;

[VB] Public Event RowHeadersVisibleChanged As EventHandler

Description

Occurs when the System.Windows.Forms.DataGridTableStyle.RowHeadersVisible value changes.

For more information about handling events, see.

vvv) ToString

[C#] public event EventHandler RowHeaderWidthChanged;

[C++] public: _event EventHandler* RowHeaderWidthChanged;

[VB] Public Event RowHeaderWidthChanged As EventHandler

Description

Occurs when the System.Windows.Forms.DataGridTableStyle.RowHeaderWidth value changes.

For more information about handling events, see.

www) ToString

[C#] public event EventHandler SelectionBackColorChanged;

[C++] public: _event EventHandler* SelectionBackColorChanged;

[VB] Public Event SelectionBackColorChanged As EventHandler

Description

Occurs when the System.Windows.Forms.DataGridTableStyle.SelectionBackColor value changes.

For more information about handling events, see.

xxx) ToString

[C#] public event EventHandler SelectionForeColorChanged;

[C++] public: _event EventHandler* SelectionForeColorChanged;

[VB] Public Event SelectionForeColorChanged As EventHandler

Description

Occurs when the System.Windows.Forms.DataGridTableStyle.SelectionForeColor value changes.

yyy) BeginEdit

[C#] public bool BeginEdit(DataGridColumnStyle gridColumn, int rowNumber);

[C++] public: _sealed bool BeginEdit(DataGridColumnStyle* gridColumn, int rowNumber);

[VB] NotOverridable Public Function BeginEdit(ByVal gridColumn As DataGridColumnStyle, ByVal rowNumber As Integer) As Boolean

[JScript] public function BeginEdit(gridColumn: DataGridColumnStyle, rowNumber: int): Boolean;

Description

Requests an edit operation.

Return Value: true, if the operation succeeds; otherwise, false.

The System.Windows.Forms.DataGridTableStyle.BeginEdit (System.Windows.Forms.DataGridColumnStyle, System.Int32) method is intended to notify the System.Windows.Forms.DataGrid control when the user has begun an editing operation. When the controls is in edit mode, multiple edits can be made and the constraints will be temporarily unenforced. The System.Windows.Forms.DataGridColumnStyle to edit. The number of the edited row.

zzz) CreateGridColumn

[C#] protected internal virtual DataGridColumnStyle CreateGridColumn(PropertyDescriptor prop);

[C++] protected public: virtual DataGridColumnStyle* CreateGridColumn(PropertyDescriptor* prop);

[VB] Overridable Protected Friend Dim Function CreateGridColumn(ByVal prop As PropertyDescriptor) As DataGridColumnStyle

[JScript] package function CreateGridColumn(prop: PropertyDescriptor): DataGridColumnStyle; Creates a System.Windows.Forms.DataGridColumnStyle.

Description

Creates a System.Windows.Forms.DataGridColumnStyle. using the specified property descriptor.

Return Value: The newly created System.Windows.Forms.DataGridColumnStyle object. The System.ComponentModel.PropertyDescriptor used to create the column style object.

aaaa) CreateGridColumn

[C#] protected internal virtual DataGridColumnStyle CreateGridColumn(PropertyDescriptor prop, bool isDefault);

[C++] protected public: virtual DataGridColumnStyle* CreateGridColumn(PropertyDescriptor* prop, bool isDefault);

[VB] Overridable Protected Friend Dim Function CreateGridColumn(ByVal prop As PropertyDescriptor, ByVal isDefault As Boolean) As DataGridColumnStyle

[JScript] package function CreateGridColumn(prop: PropertyDescriptor, isDefault: Boolean): DataGridColumnStyle;

Description

Creates a System.Windows.Forms.DataGridColumnStyle using the specified property descriptor. Specifies whether the System.Windows.Forms.DataGridColumnStyle is a default column style.

Return Value: The newly created System.Windows.Forms.DataGridColumnStyle object. The System.ComponentModel.PropertyDescriptor used to create the column style object. Specifies whether the System.Windows.Forms.DataGridColumnStyle object is a default column style. This parameter is read-only.

bbbb) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the resources (other than memory) used by the System.Windows.Forms.DataGridTableStyle.

The method calls the System.Windows.Forms.DataGridTableStyle.Dispose(System.Boolean) method on each System.Windows.Forms.DataGridColumnStyle contained by the collection before calling System.Windows.Forms.DataGrid.Dispose(System.Boolean) on the grid itself.

cccc) EndEdit

[C#] public bool EndEdit(DataGridColumnStyle gridColumn, int rowNumber, bool shouldAbort);

[C++] public: _sealed bool EndEdit(DataGridColumnStyle* gridColumn, int rowNumber, bool shouldAbort);

[VB] NotOverridable Public Function EndEdit(ByVal gridColumn As DataGridColumnStyle, ByVal rowNumber As Integer, ByVal shouldAbort As Boolean) As Boolean

[JScript] public function EndEdit(gridColumn: DataGridColumnStyle, rowNumber: int, shouldAbort: Boolean): Boolean;

Description

Requests an end to an edit operation.

Return Value: true if the edit operation ends successfully; otherwise, false.

Similar to the System.Windows.Forms.DataGridTableStyle.BeginEdit(System.Windows.Forms.DataGridColumnStyle, System.Int32) method, the System.Windows.Forms.DataGridTableStyle.EndEdit(System.Windows.Forms.DataGridColumnStyle, System.Int32, System.Boolean) method is intended to notify the System.Windows.Forms.DataGrid when an edit operation is ending. The System.Windows.Forms.DataGridColumnStyle to edit. The number of the edited row. A value indicating whether the operation should be stopped; true if it should stop; otherwise, false.

dddd) OnAllowSortingChanged

[C#] protected virtual void OnAllowSortingChanged(EventArgs e);

[C++] protected: virtual void OnAllowSortingChanged(EventArgs* e);

[VB] Overridable Protected Sub OnAllowSortingChanged (ByVal e As EventArgs)

[JScript] protected function OnAllowSortingChanged(e: EventArgs);

Description

Raises the System.Windows.Forms.DataGridTable Style.AllowSortingChanged event.

Raising an event invokes the event handler through a delegate. For more information, see. An System.EventArgs that contains the event data.

eeee) OnColumnHeadersVisibleChanged

[C#] protected virtual void OnColumnHeadersVisibleChanged(EventArgs e);

[C++] protected: virtual void OnColumnHeadersVisibleChanged(EventArgs* e);

[VB] Overridable Protected Sub OnColumnHeadersVisibleChanged(ByVal e As EventArgs)

[JScript] protected function OnColumnHeadersVisibleChanged(e: EventArgs);

Description

Raises the System.Windows.Forms.DataGridTable Style.ColumnHeadersVisibleChanged event.

Raising an event invokes the event handler through a delegate. For more information, see. An System.EventArgs that contains the event data.

ffff) OnGridLineColorChanged

[C#] protected virtual void OnGridLineColorChanged(EventArgs e);

[C++] protected: virtual void OnGridLineColorChanged(EventArgs* e);

[VB] Overridable Protected Sub OnGridLineColorChanged(ByVal e As EventArgs)

[JScript] protected function OnGridLineColorChanged(e: EventArgs);

Description

Raises the System.Windows.Forms.DataGridTable Style.GridLineColorChanged event.

Raising an event invokes the event handler through a delegate. For more information, see. An System.EventArgs that contains the event data.

gggg) OnGridLineStyleChanged

[C#] protected virtual void OnGridLineStyleChanged(EventArgs e);

[C++] protected: virtual void OnGridLineStyleChanged(EventArgs* e);

[VB] Overridable Protected Sub OnGridLineStyleChanged(ByVal e As EventArgs)

[JScript] protected function OnGridLineStyleChanged(e: EventArgs);

Description

Raises the System.Windows.Forms.DataGridTable Style.GridLineStyleChanged event.

Raising an event invokes the event handler through a delegate. For more information, see. An System.EventArgs that contains the event data.

hhhh) OnHeaderBackColorChanged

[C#] protected virtual void OnHeaderBackColorChanged(EventArgs e);

[C++] protected: virtual void OnHeaderBackColorChanged(EventArgs* e);

[VB] Overridable Protected Sub OnHeaderBackColorChanged(ByVal e As EventArgs)

[JScript] protected function OnHeaderBackColorChanged(e: EventArgs);

Description

Raises the System.Windows.Forms.DataGridTable Style.HeaderBackcolorChanged event.

Raising an event invokes the event handler through a delegate. For more information, see. An System.EventArgs that contains the event data.

iiii) OnHeaderFontChanged

[C#] protected virtual void OnHeaderFontChanged(EventArgs e);

[C++] protected: virtual void OnHeaderFontChanged(EventArgs* e);

[VB] Overridable Protected Sub OnHeaderFontChanged(ByVal e As EventArgs)

[JScript] protected function OnHeaderFontChanged(e: EventArgs);

Description

Raises the System.Windows.Forms.DataGridTable Style.HeaderFontChanged event.

Raising an event invokes the event handler through a delegate. For more information, see. An System.EventArgs that contains the event data.

jjjj) OnHeaderForeColorChanged

[C#] protected virtual void OnHeaderForeColorChanged(EventArgs e);

[C++] protected: virtual void OnHeaderForeColorChanged(EventArgs* e);

[VB] Overridable Protected Sub OnHeaderForeColorChanged(ByVal e As EventArgs)

[JScript] protected function OnHeaderForeColorChanged(e: EventArgs);

Description

Raises the System.Windows.Forms.DataGridTable Style.HeaderForeColorChanged event.

Raising an event invokes the event handler through a delegate. For more information, see. An System.EventArgs that contains the event data.

kkkk) OnLinkColorChanged

[C#] protected virtual void OnLinkColorChanged(EventArgs e);

[C++] protected: virtual void OnLinkColorChanged(EventArgs* e);

[VB] Overridable Protected Sub OnLinkColorChanged(ByVal e As EventArgs)

[JScript] protected function OnLinkColorChanged(e: EventArgs);

Description

Raises the System.Windows.Forms.DataGridTable Style.LinkColorChanged event.

Raising an event invokes the event handler through a delegate. For more information, see. An System.EventArgs that contains the event data.

llll) OnLinkHoverColorChanged

[C#] protected virtual void OnLinkHoverColorChanged(EventArgs e);

[C++] protected: virtual void OnLinkHoverColorChanged (EventArgs* e);

[VB] Overridable Protected Sub OnLinkHoverColor-Changed(ByVal e As EventArgs)

[JScript] protected function OnLinkHoverColorChanged(e: EventArgs);

Description

Raises the LinkHoverColorChanged event.

Raising an event invokes the event handler through a delegate. For more information, see. An System.EventArgs that contains the event data.

mmmm) OnMappingNameChanged

[C#] protected virtual void OnMappingNameChanged(Event Args e);

[C++] protected: virtual void on MappingNameChanged(E-ventArgs* e);

[VB] Overridable Protected Sub OnMappingNameChanged (ByVal e As EventArgs)

[JScript] protected function OnMappingNameChanged(e: EventArgs);

Description

Raises the System.Windows.Forms.DataGridTable Style.MappingNameChanged event

Raising an event invokes the event handler through a delegate. For more information, see. An System.EventArgs that contains the event data.

nnnn) OnPreferredColumnWidthChanged

[C#] protected virtual void OnPreferredColumnWidth-Changed(EventArgs e);

[C++] protected: virtual void OnPreferredColumnWidth-Changed(EventArgs* e);

[VB] Overridable Protected Sub OnPreferredColumnWidth-Changed(ByVal e As EventArgs)

[JScript] protected function OnPreferredColumnWidth-Changed(e: EventArgs);

Description

Raises the System.Windows.Forms.DataGridTable Style.PreferredColumnWidthChanged event Raising an event invokes the event handler through a delegate. For more information, see. An System.EventArgs that contains the event data.

oooo) OnPreferredRowHeightChanged

[C#] protected virtual void OnPreferredRowHeightChanged (EventArgs e);

[C++] protected: virtual void OnPreferredRowHeight-Changed(EventArgs* e);

[VB] Overridable Protected Sub OnPreferredRowHeight-Changed(ByVal e As EventArgs)

[JScript] protected function OnPreferredRowHeight-Changed(e: EventArgs);

Description

Raises the System.Windows.Forms.DataGridTable Style. PreferredRowHeightChanged event.

Raising an event invokes the event handler through a delegate. For more information, see. An System.EventArgs that contains the event data.

pppp) OnReadOnlyChanged

[C#] protected virtual void OnReadOnlyChanged(EventArgs e);

[C++] protected: virtual void OnReadOnlyChanged(Event Args* e);

[VB] Overridable Protected Sub OnReadOnlyChanged(By-Val e As EventArgs)

[JScript] protected function OnReadOnlyChanged(e: Event Args);

Description

Raises the System.Windows.Forms.DataGrid-TableStyle.ReadOnlyChanged event.

Raising an event invokes the event handler through a delegate. For more information, see. An System.EventArgs that contains the event data.

qqqq) OnRowHeadersVisibleChanged

[C#] protected virtual void OnRowHeadersVisibleChanged (EventArgs e);

[C++] protected: virtual void OnRowHeadersVisi-bleChanged(EventArgs* e);

[VB] Overridable Protected Sub OnRowHeadersVisi-bleChanged(ByVal e As EventArgs)

[JScript] protected function OnRowHeadersVisibleChanged (e: EventArgs);

Description

Raises the System.Windows.Forms.DataGridTable Style. RowHeadersVisibleChanged event.

Raising an event invokes the event handler through a delegate. For more information, see. An System.EventArgs that contains the event data.

rrrr) OnRowHeaderWidthChanged

[C#] protected virtual void OnRowHeaderWidthChanged (EventArgs e);

[C++] protected: virtual void OnRowHeaderWidthChanged (EventArgs* e);

[VB] Overridable Protected Sub OnRowHeaderWidth-Changed(ByVal e As EventArgs)

[JScript] protected function OnRowHeaderWidthChanged(e: EventArgs);

Description

Raises the System.Windows.Forms.DataGridTable Style. RowHeaderWidthChanged event.

Raising an event invokes the event handler through a delegate. For more information, see. An System.EventArgs that contains the event data.

ssss) OnSelectionBackColorChanged

[C#] protected virtual void OnSelectionBackColorChanged (EventArgs e);

[C++] protected: virtual void OnSelectionBackColor-Changed(EventArgs* e);

[VB] Overridable Protected Sub OnSelectionBackColor-Changed(ByVal e As EventArgs)

[JScript] protected function OnSelectionBackColorChanged (e: EventArgs);

Description

Raises the System.Windows.Forms.DataGridTable Style.SelectionBackColorChanged event.

Raising an event invokes the event handler through a delegate. For more information, see. An System.EventArgs that contains the event data.

tttt) OnSelectionForeColorChanged

[C#] protected virtual void OnSelectionForeColorChanged (EventArgs e);

[C++] protected: virtual void OnSelectionForeColorChanged (EventArgs* e);

[VB] Overridable Protected Sub OnSelectionForeColorChanged(ByVal e As EventArgs)

[JScript] protected function OnSelectionForeColorChanged (e: EventArgs);

Description

Raises the System.Windows.Forms.DataGridTable Style.SelectionForeColorChanged event.

Raising an event invokes the event handler through a delegate. For more information, see. An System.EventArgs that contains the event data.

uuuu) ResetAlternatingBackColor

[C#] public void ResetAlternatingBackColor( );

[C++] public: void ResetAlternatingBackColor( );

[VB] Public Sub ResetAlternatingBackColor( )

[JScript] public function ResetAlternatingBackColor( );

Description

Resets the System.Windows.Forms.DataGridTable Style.AlternatingBackColor property to its default value.

You typically use this method if you are either creating a designer for the System.Windows.Forms.DataGridTableStyle or creating your own control incorporating the System.Windows.Forms.DataGridTableStyle. You can use the System.Windows.Forms.DataGridTable Style.ShouldSerializeAlternating BackColor method to determine whether the property value has changed from its default.

vvvv) ResetBackColor

[C#] public void ResetBackColor( );

[C++] public: void ResetBackColor( );

[VB] Public Sub ResetBackColor( )

[JScript] public function ResetBackColor( );

Description

Resets the System.Windows.Forms.DataGridTableStyle. BackColor property to its default value.

You typically use this method if you are either creating a designer for the System.Windows.Forms.DataGridTableStyle or creating your own control incorporating the System.Windows.Forms.DataGridTableStyle.

wwww) ResetForeColor

[C#] public void ResetForeColor( );

[C++] public: void ResetForeColor( );

[VB] Public Sub ResetForeColor( )

[JScript] public function ResetForeColor( );

Description

Resets the System.Windows.Forms.DataGridTable Style. ForeColor property to its default value.

You typically use this method if you are either creating a designer for the System.Windows.Forms.DataGridTableStyle or creating your own control incorporating the System.Windows.Forms.DataGridTableStyle. You can use the System.Windows.Forms.DataGridTableStyle. ShouldSerializeForeColor method to determine whether the property value has changed from its default.

xxxx) ResetGridLineColor

[C#] public void ResetGridLineColor( );

[C++] public: void ResetGridLineColor( );

[VB] Public Sub ResetGridLineColor( )

[JScript] public function ResetGridLineColor( );

Description

Resets the System.Windows.Forms.DataGridTableStyle.GridLineColor property to its default value.

You typically use this method if you are either creating a designer for the System.Windows.Forms.DataGridTableStyle or creating your own control incorporating the System.Windows.Forms.DataGridTableStyle. You can use the System.Windows.Forms.DataGridTableStyle. ShouldSerializeGridLineCol or method to determine whether the property value has changed from its default.

yyyy) ResetHeaderBackColor

[C#] public void ResetHeaderBackColor( );

[C++] public: void ResetHeaderBackColor( );

[VB] Public Sub ResetHeaderBackColor( )

[JScript] public function ResetHeaderBackColor( );

Description

Resets the System.Windows.Forms.DataGridTableStyle. HeaderBackColor property to its default value.

You typically use this method if you are either creating a designer for the System.Windows.Forms.DataGridTableStyle or creating your own control incorporating the System.Windows.Forms.DataGridTableStyle. You can use the System.Windows.Forms.DataGridTableStyle. ShouldSerializeHeaderBackColor method to determine whether the property value has changed from its default.

zzzz) ResetHeaderFont

[C#] public void ResetHeaderFont( );

[C++] public: void ResetHeaderFont( );

[VB] Public Sub ResetHeaderFont( )

[JScript] public function ResetHeaderFont( );

Description

Resets the System.Windows.Forms.DataGridTableStyle.HeaderFont property to its default value.

You typically use this method if you are either creating a designer for the System.Windows.Forms.DataGridTableStyle or creating your own control incorporating the System.Windows.Forms.DataGridTableStyle.

aaaaa) ResetHeaderForeColor

[C#] public void ResetHeaderForeColor( );

[C++] public: void ResetHeaderForeColor( );

[VB] Public Sub ResetHeaderForeColor( )

[JScript] public function ResetHeaderForeColor( );

Description

Resets the System.Windows.Forms.DataGridTableStyle.HeaderForeColor property to its default value.

You typically use this method if you are either creating a designer for the System.Windows.Forms.DataGridTableStyle or creating your own control incorporating the System.Windows.Forms.DataGridTableStyle. You can use the System.Windows.Forms.DataGridTableStyle. ShouldSerializeHeaderForeColor method to determine whether the property value has changed from its default.

bbbbb) ResetLinkColor

[C#] public void ResetLinkColor( );

[C++] public: void ResetLinkColor( );

[VB] Public Sub ResetLinkColor( )

[JScript] public function ResetLinkColor( );

Description

Resets the System.Windows.Forms.DataGridTableStyle.LinkColor property to its default value.

You typically use this method if you are either creating a designer for the System.Windows.Forms.DataGridTableStyle or creating your own control incorporating the System.Windows.Forms.DataGridTableStyle. You can use the System.Windows.Forms.DataGridTableStyle. ShouldSerializeLinkColor method to determine whether the property value has changed from its default.

ccccc) ResetLinkHoverColor

[C#] public void ResetLinkHoverColor( );

[C++] public: void ResetLinkHoverColor( );

[VB] Public Sub ResetLinkHoverColor( )

[JScript] public function ResetLinkHoverColor( );

Description

Resets the System.Windows.Forms.DataGridTableStyle.LinkHoverColor property to its default value.

You typically use this method if you are either creating a designer for the System.Windows.Forms.DataGridTableStyle or creating your own control incorporating the System.Windows.Forms.DataGridTableStyle. You can use the System.Windows.Forms.DataGridTableStyle. ShouldSerializeLinkHoverColor method to determine whether the property value has changed from its default.

ddddd) ResetSelectionBackColor

[C#] public void ResetSelectionBackColor( );

[C++] public: void ResetSelectionBackColor( );

[VB] Public Sub ResetSelectionBackColor( )

[JScript] public function ResetSelectionBackColor( );

Description

Resets the System.Windows.Forms.DataGridTableStyle.SelectionBackColor property to its default value.

You typically use this method if you are either creating a designer for the System.Windows.Forms.DataGridTableStyle or creating your own control incorporating the System.Windows.Forms.DataGridTableStyle. You can use the System.Windows.Forms.DataGridTableStyle. ShouldSerializeSelectionBackColor method to determine whether the property value has changed from its default.

eeeee) ResetSelectionForeColor

[C#] public void ResetSelectionForeColor( );

[C++] public: void ResetSelectionForeColor( );

[VB] Public Sub ResetSelectionForeColor( )

[JScript] public function ResetSelectionForeColor( );

Description

Resets the System.Windows.Forms.DataGridTableStyle.SelectionForeColor property to its default value.

You typically use this method if you are either creating a designer for the System.Windows.Forms.DataGridTableStyle or creating your own control incorporating the System.Windows.Forms.DataGridTableStyle. You can use the System.Windows.Forms.DataGridTableStyle. ShouldSerializeSelectionFo recolor method to determine whether the property value has changed from its default.

fffff) ShouldSerializeAlternatingBackColor

[C#] protected virtual bool ShouldSerializeAlternatingBackColor( );

[C++] protected: virtual bool ShouldSerializeAlternatingBackColor( );

[VB] Overridable Protected Function ShouldSerializeAlternatingBackColor( ) As Boolean

[JScript] protected function ShouldSerializeAlternatingBackColor( ): Boolean;

Description

Indicates whether the System.Windows.Forms.DataGridTableStyle.AlternatingBackColor property should be persisted.

Return Value: true if the property value has changed from its default; otherwise, false.

You typically use this method if you are either creating a designer for the System.Windows.Forms.DataGridTableStyle or creating your own control incorporating the System.Windows.Forms.DataGridTableStyle.

ggggg) ShouldSerializeBackColor

[C#] protected bool ShouldSerializeBackColor( );

[C++] protected: bool ShouldSerializeBackColor( );

[VB] Protected Function ShouldSerializeBackColor( ) As Boolean

[JScript] protected function ShouldSerializeBackColor( ): Boolean;

Description

Indicates whether the System.Windows.Forms.DataGridTableStyle.BackColor property should be persisted.

Return Value: true if the property value has changed from its default; otherwise, false.

You typically use this method if you are either creating a designer for the System.Windows.Forms.DataGridTableStyle or creating your own control incorporating the System.Windows.Forms.DataGridTableStyle.

hhhhh) ShouldSerializeForeColor

[C#] protected bool ShouldSerializeForeColor( );

[C++] protected: bool ShouldSerializeForeColor( );

[VB] Protected Function ShouldSerializeForeColor( ) As Boolean

[JScript] protected function ShouldSerializeForeColor( ): Boolean;

Description

Indicates whether the System.Windows.Forms.DataGridTableStyle.ForeColor property should be persisted.

Return Value: true if the property value has changed from its default; otherwise, false.

You typically use this method if you are either creating a designer for the System.Windows.Forms.DataGridTableStyle or creating your own control incorporating the System.Windows.Forms.DataGridTableStyle.

iiiii) ShouldSerializeGridLineColor

[C#] protected virtual bool ShouldSerializeGridLineColor( );

[C++] protected: virtual bool ShouldSerializeGridLineColor( );

[VB] Overridable Protected Function ShouldSerializeGridLineColor( ) As Boolean

[JScript] protected function ShouldSerializeGridLine Color( ): Boolean;

Description

Indicates whether the System.Windows.Forms.DataGridTableStyle.GridLineColor property should be persisted.

Return Value: true if the property value has changed from its default; otherwise, false.

You typically use this method if you are either creating a designer for the System.Windows.Forms.DataGridTableStyle or creating your own control incorporating the System.Windows.Forms.DataGridTableStyle.

jjjjj) ShouldSerializeHeaderBackColor

[C#] protected virtual bool ShouldSerializeHeaderBackColor( );

[C++] protected: virtual bool ShouldSerializeHeaderBackColor( );

[VB] Overridable Protected Function ShouldSerializeHeaderBackColor( ) As Boolean

[JScript] protected function ShouldSerializeHeaderBackColor( ): Boolean;

Description

Indicates whether the System.Windows.Forms.DataGridTableStyle.HeaderBackColor property should be persisted.

Return Value: true if the property value has changed from its default; otherwise, false.

You typically use this method if you are either creating a designer for the System.Windows.Forms.DataGridTableStyle or creating your own control incorporating the System.Windows.Forms.DataGridTableStyle.

kkkkk) ShouldSerializeHeaderForeColor

[C#] protected virtual bool ShouldSerializeHeaderForeColor( );

[C++] protected: virtual bool ShouldSerializeHeaderForeColor( );

[VB] Overridable Protected Function ShouldSerializeHeaderForeColor( ) As Boolean

[JScript] protected function ShouldSerializeHeaderForeColor( ): Boolean;

Description

Indicates whether the System.Windows.Forms.DataGridTableStyle.HeaderForeColor property should be persisted.

Return Value: true if the property value has changed from its default; otherwise, false.

You typically use this method if you are either creating a designer for the System.Windows.Forms.DataGridTableStyle or creating your own control incorporating the System.Windows.Forms.DataGridTableStyle.

lllll) ShouldSerializeLinkColor

[C#] protected virtual bool ShouldSerializeLinkColor( );

[C++] protected: virtual bool ShouldSerializeLinkColor( );

[VB] Overridable Protected Function ShouldSerializeLinkColor( ) As Boolean

[JScript] protected function ShouldSerializeLinkColor( ): Boolean;

Description

Indicates whether the System.Windows.Forms.DataGridTableStyle.LinkColor property should be persisted.

Return Value: true if the property value has changed from its default; otherwise, false.

You typically use this method if you are either creating a designer for the System.Windows.Forms.DataGridTableStyle or creating your own control incorporating the System.Windows.Forms.DataGridTableStyle.

mmmmm) ShouldSerializeLinkHoverColor

[C#] protected virtual bool ShouldSerializeLinkHover Color( );

[C++] protected: virtual bool ShouldSerializeLinkHoverColor( );

[VB] Overridable Protected Function ShouldSerialize LinkHoverColor( ) As Boolean

[JScript] protected function ShouldSerializeLinkHoverColor( ): Boolean;

Description

Indicates whether the System.Windows.Forms.DataGridTableStyle.LinkHoverColor property should be persisted.

Return Value: true if the property value has changed from its default; otherwise, false.

You typically use this method if you are either creating a designer for the System.Windows.Forms.DataGridTableStyle or creating your own control incorporating the System.Windows.Forms.DataGridTableStyle.

nnnnn) ShouldSerializePreferredRowHeight

[C#] protected bool ShouldSerializePreferredRowHeight( );

[C++] protected: bool ShouldSerializePreferredRow Height( );

[VB] Protected Function ShouldSerializePreferred-RowHeight( ) As Boolean

[JScript] protected function ShouldSerializePreferred-RowHeight( ): Boolean;

Description

Indicates whether the System.Windows.Forms.DataGrid-TableStyle.PreferredRowHeight property should be persisted.

Return Value: true if the property value has changed from its default; otherwise, false.

You typically use this method if you are either creating a designer for the System.Windows.Forms.DataGrid-TableStyle or creating your own control incorporating the System.Windows.Forms.DataGridTableStyle.

ooooo) ShouldSerializeSelectionBackColor

[C#] protected bool ShouldSerializeSelectionBackColor( );

[C++] protected: bool ShouldSerializeSelectionBack Color( );

[VB] Protected Function ShouldSerializeSelectionBack-Color( ) As Boolean

[JScript] protected function ShouldSerializeSelectionBack-Color( ): Boolean;

Description

Indicates whether the System.Windows.Forms.DataGrid-TableStyle.SelectionBackColor property should be persisted.

Return Value: true if the property value has changed from its default; otherwise, false.

You typically use this method if you are either creating a designer for the System.Windows.Forms.DataGrid-TableStyle or creating your own control incorporating the System.Windows.Forms.DataGridTableStyle.

ppppp) ShouldSerializeSelectionForeColor

[C#] protected virtual bool ShouldSerializeSelection-ForeColor( );

[C++] protected: virtual bool ShouldSerializeSelection-ForeColor( );

[VB] Overridable Protected Function ShouldSerializeSelec-tionForeColor( ) As Boolean

[JScript] protected function ShouldSerializeSelection-ForeColor( ): Boolean;

Description

Indicates whether the System.Windows.Forms.DataGrid-TableStyle.SelectionForeColor property should be persisted.

Return Value: true if the property value has changed from its default; otherwise, false.

You typically use this method if you are either creating a designer for the System.Windows.Forms.DataGrid-TableStyle or creating your own control incorporating the System.Windows.Forms.DataGridTableStyle.

DataGridTextBox class (System.Windows.Forms)

a) ToString

Description

Represents a System.Windows.Forms.TextBox control that is hosted in a System.Windows.Forms.DataGrid-TextBoxColumn.

The System.Windows.Forms.DataGridTextBox and the System.Windows.Forms.DataGridTextBoxColumn work together to allow users to directly edit values in a System.Windows.Forms.DataGrid control column. The System.Windows.Forms.DataGridTextBoxColumn derives from System.Windows.Forms.DataGridColumnStyle, and is designed to host the System.Windows.Forms.DataGrid-TextBox, which derives from the System.Windows.Forms.TextBox control.

b) DataGridTextBox

Example Syntax:

c) ToString

[C#] public DataGridTextBox( );

[C++] public: DataGridTextBox( );

[VB] Public Sub New( )

[JScript] public function DataGridTextBox( );

d) AcceptsReturn
e) AcceptsTab
f) AccessibilityObject
g) AccessibleDefaultActionDescription
h) AccessibleDescription
i) AccessibleName
j) AccessibleRole
k) AllowDrop
l) Anchor
m) AutoSize
n) BackColor
o) BackgroundImage
p) BindingContext
q) BorderStyle
r) Bottom
s) Bounds
t) CanFocus
u) CanSelect
v) CanUndo
w) Capture
x) Causes Validation
y) CharacterCasing
z) ClientRectangle
aa) ClientSize
bb) CompanyName
cc) Container
dd) ContainsFocus
ee) ContextMenu
ff) Controls
gg) Created
hh) CreateParams
ii) Cursor
jj) DataBindings
kk) DefaultImeMode
ll) DefaultSize
mm) DesignMode
nn) DisplayRectangle
oo) Disposing
pp) Dock
qq) Enabled
rr) Events ss) Focused
tt) Font
uu) FontHeight
vv) ForeColor
ww) Handle
xx) HasChildren
yy) Height
zz) HideSelection
aaa) ImeMode
bbb) InvokeRequired
ccc) IsAccessible
ddd) IsDisposed
eee) IsHandleCreated
fff) IsInEditOrNavigateMode
ggg) ToString Description Gets or sets a value indicating whether the System.Windows.Forms.DataGridTextBox is in a mode that allows either editing or navigating.

The System.Windows.Forms.DataGridTextBox.IsIn EditorNavigateMode property is used within the System.Windows.Forms.Control.ProcessKeyMessage(System.Windows.Forms.Message@) to determine how to process key press events, to check the state of the System.Windows.Forms.DataGridTextBox. For example, if one of the navigation (arrow) keys is pressed, the appropriate action for the state of the control must occur.

hhh) Left
iii) Lines
jjj) Location
kkk) MaxLength
lll) Modified
mmm) Multiline
nnn) Name
ooo) Parent
ppp) PasswordChar
qqq) PreferredHeight
rrr) ProductName
sss) ProductVersion
ttt) ReadOnly
uuu) RecreatingHandle
vvv) Region
www) RenderRightToLeft
xxx) ResizeRedraw
yyy) Right
zzz) RightToLeft
aaaa) ScrollBars
bbbb) SelectedText
cccc) SelectionLength
dddd) SelectionStart
eeee) ShowFocusCues
ffff) ShowKeyboardCues
gggg) Site
hhhh) Size
iiii) TabIndex
jjjj) TabStop
kkkk) Tag
llll) Text
mmmm) TextAlign
nnnn) TextLength
oooo) Top
pppp) TopLevelControl
qqqq) Visible
rrrr) Width
ssss) WindowTarget
tttt) WordWrap
uuuu) OnKeyPress

[C#] protected override void OnKeyPress(KeyPressEvent Args e);

[C++] protected: void OnKeyPress(KeyPressEventArgs* e)

[VB] Overrides Protected Sub OnKeyPress(ByVal e As KeyPressEventArgs)

[JScript] protected override function OnKeyPress(e: KeyPressEventArgs);

Description

Raises the System.Windows.Forms.Control.KeyPress event. A System.Windows.Forms.KeyPressEventArgs that contains the event data.

vvvv) OnMouseWheel

[C#] protected override void OnMouseWheel(MouseEvent Args e);

[C++] protected: void OnMouseWheel(MouseEventArgs* e);

[VB] Overrides Protected Sub OnMouseWheel(ByVal e As MouseEventArgs) [JScript] protected override function OnMouseWheel(e: MouseEventArgs);

Description

Raises the System.Windows.Forms.Control.MouseWheel event. A System.Windows.Forms.MouseEventArgs that contains the event data.

wwww) ProcessKeyMessage

[C#] protected internal override bool ProcessKeyMessage (ref Message m);

[C++] protected public: bool ProcessKeyMessage(Message* m);

[VB] Overrides Protected Friend Dim Function ProcessKeyMessage(ByRef m As Message) As Boolean

[JScript] package override function ProcessKeyMessage(m: Message): Boolean;

Description

Indicates whether the key pressed is processed further (for example, to navigate, or escape). This property is read-only.

Return Value: true if the key is consumed, false to if the key is further processed.

This method is called when a control receives a keyboard message. A System.Windows.Forms.Message, passed by reference, that contains the key data.

xxxx) SetDataGrid

[C#] public void SetDataGrid(DataGrid parentGrid);

[C++] public: void SetDataGrid(DataGrid* parentGrid);

[VB] Public Sub SetDataGrid(ByVal parentGrid As DataGrid)

[JScript] public function SetDataGrid(parentGrid: DataGrid);

Description

Sets the System.Windows.Forms.DataGrid to which this System.Windows.Forms.TextBox control belongs. The System.Windows.Forms.DataGrid control that hosts the control.

yyyy) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

Raises the System.Windows.Forms.Control.WndProc(System.Windows.Forms. Message@) event. A System.Windows.Forms.Message that contains the event data.

DataGridTextBoxColumn class (System.Windows.Forms)

a) WndProc

Description

Hosts a System.Windows.Forms.TextBox control in a cell of a System.Windows.Forms.DataGridColumnStyle for editing strings.

The System.Windows.Forms.DataGridTextBoxColumn class derives from the abstract class System.Windows.Forms.DataGridColumnStyle. At run time, the System.Windows.Forms.DataGridTextBoxColumn hosts a System.Windows.Forms.DataGridTextBox control that allows users to edit text.

b) DataGridTextBoxColumn

Example Syntax:

c) WndProc

[C#] public DataGridTextBoxColumn( );

[C++] public: DataGridTextBoxColumn( );

[VB] Public Sub New( )

[JScript] public function DataGridTextBoxColumn( ); Initializes a new instance of the System.Windows.Forms.DataGridTextBoxColumn class.

Description

Initializes a new instance of the System.Windows.Forms.DataGridTextBoxColumn class.

d) DataGridTextBoxColumn

Example Syntax:

e) WndProc

[C#] public DataGridTextBoxColumn(PropertyDescriptor prop);

[C++] public: DataGridTextBoxColumn(PropertyDescriptor* prop);

[VB] Public Sub New(ByVal prop As PropertyDescriptor)

[JScript] public function DataGridTextBoxColumn(prop: PropertyDescriptor);

Description

Initializes a new instance of a System.Windows.Forms.DataGridTextBoxColumn with a specified System.ComponentModel.PropertyDescriptor.

The System.Windows.Forms.DataGridColumnStyle uses a System.ComponentModel.PropertyDescriptor to determine the type of data displayed in the column. To return a System.ComponentModel.PropertyDescriptorCollection, use the System.Windows.Forms.BindingManagerBase.GetItemProperties method of the System.Windows.Forms.BindingManagerBase class. The System.ComponentModel.PropertyDescriptor for the column with which the System.Windows.Forms.DataGridTextBoxColumn will be associated.

f) DataGridTextBoxColumn

Example Syntax:

g) WndProc

[C#] public DataGridTextBoxColumn(PropertyDescriptor prop, bool isDefault);

[C++] public: DataGridTextBoxColumn(PropertyDescriptor* prop, bool isDefault);

[VB] Public Sub New(ByVal prop As PropertyDescriptor, ByVal isDefault As Boolean)

[JScript] public function DataGridTextBoxColumn(prop: PropertyDescriptor, isDefault Boolean);

Description

Initializes a new instance of the System.Windows.Forms.DataGridTextBoxColumn class using the specified System.ComponentModel.PropertyDescriptor. Specifies whether the System.Windows.Forms.DataGridTextBoxColumn is a default column.

The System.Windows.Forms.DataGridColumnStyle uses a System.ComponentModel.PropertyDescriptor to determine the type of data displayed in the column. To return a System.ComponentModel.PropertyDescriptorCollection, use the System.Windows.Forms. BindingManagerBase.GetItemProperties method of the System.Windows.Forms.BindingManagerBase class. The System.ComponentModel.PropertyDescriptor to be associated with the System.Windows.Forms.DataGridTextBoxColumn. Specifies whether the System.Windows.Forms.DataGridTextBoxColumn is a default column.

h) DataGridTextBoxColumn

Example Syntax:

i) WndProc

[C#] public DataGridTextBoxColumn(PropertyDescriptor prop, string format);

[C++] public: DataGridTextBoxColumn(PropertyDescriptor* prop, String* format);

[VB] Public Sub New(ByVal prop As PropertyDescriptor, ByVal format As

String)

[JScript] public function DataGridTextBoxColumn(prop: PropertyDescriptor, format String);

Description

Initializes a new instance of a System.Windows.Forms.DataGridTextBoxColumn with the specified System.ComponentModel.PropertyDescriptor and format.

Use this constructor to create a custom format for the displayed data. The System.ComponentModel.PropertyDescriptor for the column with which the System.Windows.Forms.DataGridTextBoxColumn will be associated.

The format used to format the column values.

j) DataGridTextBoxColumn

Example Syntax:

k) WndProc

[C#] public DataGridTextBoxColumn(PropertyDescriptor prop, string format, bool isDefault);

[C++] public: DataGridTextBoxColumn(PropertyDescriptor* prop, String* format, bool isDefault);

[VB] Public Sub New(ByVal prop As PropertyDescriptor, ByVal format As String, ByVal isDefault As Boolean)

[JScript] public function DataGridTextBoxColumn(prop: PropertyDescriptor, format: String, isDefault: Boolean);

Description

Initializes a new instance of the System.Windows.Forms.DataGridTextBoxColumn class with a specified System.ComponentModel.PropertyDescriptor and format. Specifies whether the column is the default column.

The System.Windows.Forms.DataGridColumnStyle uses a System.ComponentModel.PropertyDescriptor to determine the type of data displayed in the column. To return a System.ComponentModel.PropertyDescriptorCollection, use the System.Windows.Forms. BindingManagerBase.GetItemProperties method of the System.Windows.Forms.BindingManagerBase class. The System.ComponentModel.PropertyDescriptor to be associated with the System.Windows.Forms.DataGridTextBoxColumn. The format used. Specifies whether the System.Windows.Forms.DataGridTextBoxColumn is the default column.

l) Alignment
m) Container
n) DataGridTableStyle
o) DesignMode
p) Events
q) FontHeight
r) Format
s) WndProc Description Gets or sets the character(s) that specify how text is formatted.

The System.Windows.Forms.DataGridTextBox Column. Format property specifies how values are displayed in the column. For example, set the property to “c” to specify that the values will be formatted as the local currency. The System.Globalization.CultureInfo for the computer is used to determine the actual currency format. The values are automatically unformatted to the native type when data is changed.

t) FormatInfo
u) WndProc

[C#] public IFormatProvider FormatInfo {get; set;}

[C++] public: _property IFormatProvider* get_Format Info( ); public: _property void set_FormatInfo(IFormatProvider*);

[VB] Public Property FormatInfo As IFormatProvider

[JScript] public function get FormatInfo( ): IFormatProvider; public function set FormatInfo(IFormatProvider);

Description

Gets or sets the culture specific information used to determine how values are formatted.

When setting the System.Windows.Forms.DataGridTextBoxColumn.Format property to one of the formatting characters, the System.Windows.Forms.DataGridTextBoxColumn uses the information provided by the System.Windows.Forms.DataGridTextBoxColumn.FormatInfo property to further specify what cultural-specific formatting to use. For example, when the System.Windows.Forms.DataGridTextBoxColumn.Format property is set to the format character “c” (for currency), you can further specify that the symbol for the lira be used. To do this, create a new System.Globalization.CultureInfo object with the locale ID for Italy, and set the System.Windows.Forms.DataGridTextBoxColumn.FormatInfo property to the new System.Globalization.CultureInfo object.

v) HeaderAccessibleObject
w) HeaderText
x) MappingName
y) NullText
z) PropertyDescriptor
aa) WndProc Description Gets or sets the System.ComponentModel.PropertyDescriptor for the System.Windows.Forms.DataGridTextBoxColumn.

bb) ReadOnly
cc) WndProc

[C#] public override bool ReadOnly {get; set;}

[C++] public: _property virtual bool get_ReadOnly( ); public: _property virtual void set_ReadOnly(bool);

[VB] Overrides Public Property ReadOnly As Boolean

[JScript] public function get ReadOnly( ): Boolean; public function set ReadOnly(Boolean);

Description

Sets a value indicating whether the text box column is read-only.

dd) Site
ee) TextBox
ff) WndProc

Description

Gets the hosted System.Windows.Forms.TextBox control.

gg) Width
hh) Abort

[C#] protected internal override void Abort(int rowNum);

[C++] protected public: void Abort(int rowNum);

[VB] Overrides Protected Friend Dim Sub Abort(ByVal rowNum As Integer)

[JScript] package override function Abort(rowNum: int);

Description

Initiates a request to interrupt an edit procedure.

This method rolls back any change made to the column and invokes the System.Windows.Forms.DataGridTextBoxColumn.HideEditBox and System.Windows.Forms.DataGridTextBoxColumn.EndEdit methods. The number of the row in which an edit operation is being interrupted.

ii) Commit

[C#] protected internal override bool Commit(CurrencyManager dataSource, int rowNum);

[C++] protected public: bool Commit(CurrencyManager* dataSource, int rowNum);

[VB] Overrides Protected Friend Dim Function Commit(ByVal dataSource As CurrencyManager, ByVal rowNum As Integer) As Boolean

[JScript] package override function Commit(dataSource: CurrencyManager, rowNum: int): Boolean;

Description

Inititates a request to complete an editing procedure.

Return Value: true if the value was successfully committed; otherwise, false.

The method checks to ensure that an edit is indeed occurring. If so, it formats the value appropriately. If the value is null, the method enters System.Convert.DBNull into the column; otherwise, it uses the System.Windows.Forms.DataGridColumnStyle.SetColumnValueAtRow(System.Windows.Forms.CurrencyManager,System.Int32,System.Object) method to commit the value. The System.Windows.Forms.CurrencyManager of the System.Windows.Forms.DataGrid control the column belongs to. The number of the edited row.

jj) ConcedeFocus

[C#] protected internal override void ConcedeFocus( );

[C++] protected public: void ConcedeFocus( );

[VB] Overrides Protected Friend Dim Sub ConcedeFocus( )

[JScript] package override function ConcedeFocus( );

Description

Informs the column that the focus is being conceded.

In this overridden method, the System.Windows.Forms.TextBox control hosted by the System.Windows.Forms.DataGridTextBoxColumn is hidden.

kk) Edit

[C#] protected internal override void Edit(CurrencyManager source, int rowNum, Rectangle bounds, bool readOnly, string instantText, bool cellIsVisible);

[C++] protected public: void Edit(CurrencyManager* source, int rowNum, Rectangle bounds, bool readOnly, String* instantText, bool cellIsVisible);

[VB] Overrides Protected Friend Dim Sub Edit(ByVal source As CurrencyManager, ByVal rowNum As Integer, ByVal bounds As Rectangle, ByVal readOnly As Boolean, ByVal instantText As String, ByVal cellIsVisible As Boolean)

[JScript] package override function Edit(source: CurrencyManager, rowNum: int, bounds: Rectangle, readOnly: Boolean, instantText: String, cellIsVisible: Boolean);

Description

Prepares a cell for editing.

The System.Windows.Forms.DataGridColumnStyle.Edit(System.Windows.Forms.CurrencyManager,System.Int32,System.Drawing.Rectangle,System.Boolean) sites a System.Windows.Forms.TextBox control on the grid at the location of the cell being edited. The method is called by the System.Windows.Forms.DataGrid class's System.Windows.Forms.DataGrid.BeginEdit(System.Windows.Forms.DataGridColumnStyle,System.Int32) method when an editing operation is about to begin. The System.Windows.Forms. CurrencyManager of the System.Windows.Forms.DataGrid control the column belongs to. The row number in this column being edited. The bounding System.Drawing.Rectangle in which the control is to be sited. A value indicating whether the column is a read-only. The text to display in the control. A value indicating whether the cell is visible.

ll) EndEdit

[C#] protected void EndEdit( );

[C++] protected: void EndEdit( );

[VB] Protected Sub EndEdit( )

[JScript] protected function EndEdit( );

Description

Ends an edit operation on the System.Windows.Forms.DataGridColumnStyle.

To edit the value of a cell, call the System.Data.DataRow object's System.Data.DataRow.BeginEdit before changing the value. You must invoke the System.Data.DataRow.AcceptChanges method on both the System.Data.DataRow and System.Data.DataTable objects before the change is committed.

mm) EnterNullValue

[C#] protected internal override void EnterNullValue( );

[C++] protected public: void EnterNullValue( );

[VB] Overrides Protected Friend Dim Sub EnterNullValue( )

[JScript] package override function EnterNullValue( );

Description

Enters a System.DBNull.Value in the column.

Enters the System.Windows.Forms.DataGridColumnStyle.NullText value into the cell.

nn) GetMinimumHeight

[C#] protected internal override int GetMinimumHeight( );

[C++] protected public: int GetMinimumHeight( );

[VB] Overrides Protected Friend Dim Function GetMinimumHeight( ) As Integer

[JScript] package override function GetMinimumHeight( ): int;

Description

Gets the height of a cell in a System.Windows.Forms.DataGridColumnStyle

Return Value: The height of a cell.

The value returned by System.Windows.Forms.DataGridTextBoxColumn.GetMinimumHeight is calculated by adding the size of the column's font plus a margin value.

oo) GetPreferredHeight

[C#] protected internal override int GetPreferredHeight (Graphics g, object value);

[C++] protected public: int GetPreferredHeight(Graphics* g, Object* value);

[VB] Overrides Protected Friend Dim Function GetPreferredHeight(ByVal g As Graphics, ByVal value As Object) As Integer [JScript] package override function GetPreferredHeight(g: Graphics, value: Object): int;

Description

Gets the height to be used in for automatically resizing columns.

Return Value: The height the cells automatically resize to. A System.Drawing.Graphics object used to draw shapes on the screen. The value to draw.

pp) GetPreferredSize

[C#] protected internal override Size GetPreferredSize (Graphics g, object value);

[C++] protected public: Size GetPreferredSize(Graphics* g, Object* value);

[VB] Overrides Protected Friend Dim Function GetPreferredSize(ByVal g As Graphics, ByVal value As Object) As Size

[JScript] package override function GetPreferredSize(g: Graphics, value: Object): Size;

Description

Returns the optimum width and height of the cell in a specified row relative to the specified value.

Return Value: A System.Drawing.Size that contains the dimensions of the cell.

The optimum width and height is calculated by measuring the string size, taking into account its font and attributes, and adding margin values. A System.Drawing.Graphics object used to draw shapes on the screen. The value to draw.

qq) HideEditBox

[C#] protected void HideEditBox( );

[C++] protected: void HideEditBox( );

[VB] Protected Sub HideEditBox( )

[JScript] protected function HideEditBox( );

Description

Hides the System.Windows.Forms.DataGridTextBox control and moves the focus to the System.Windows.Forms.DataGrid control.

rr) Paint

[C#] protected internal override void Paint(Graphics g, Rectangle bounds, CurrencyManager source, int rowNum);

[C++] protected public: void Paint(Graphics* g, Rectangle bounds, CurrencyManager* source, int rowNum);

[VB] Overrides Protected Friend Dim Sub Paint(ByVal g As Graphics, ByVal bounds As Rectangle, ByVal source As CurrencyManager, ByVal rowNum As Integer)

[JScript] package override function Paint(g: Graphics, bounds: Rectangle, source: CurrencyManager, rowNum: int); Paints the column in the System.Windows.Forms.DataGrid control.

Description

Paints the a System.Windows.Forms.DataGridColumnStyle with the specified System.Drawing.Graphics, System.Drawing.Rectangle, System.Windows.Forms.CurrencyManager, and row number. The System.Drawing.Graphics object to draw to. The bounding System.Drawing.Rectangle to paint into. The System.Windows.Forms.CurrencyManager of the System.Windows.Forms.DataGrid the that contains the column. The number of the row in the underlying data table.

ss) Paint

[C#] protected internal override void Paint(Graphics g, Rectangle bounds, CurrencyManager source, int rowNum, bool alignToRight);

[C++] protected public: void Paint(Graphics* g, Rectangle bounds, CurrencyManager* source, int rowNum, bool alignToRight);

[VB] Overrides Protected Friend Dim Sub Paint(ByVal g As Graphics, ByVal bounds As Rectangle, ByVal source As CurrencyManager, ByVal rowNum As Integer, ByVal alignToRight As Boolean)

[JScript] package override function Paint(g: Graphics, bounds: Rectangle, source CurrencyManager, rowNum: int, alignToRight: Boolean);

Description

Paints a System.Windows.Forms.DataGridColumnStyle with the specified System.Drawing.Graphics, System.Drawing.Rectangle, System.Windows.Forms.CurrencyManager, row number, and alignment. The System.Windows.Forms.DataGridTextBoxColumn.Paint(System.Drawing.Graphics, System.Drawing.Rectangle,System.Windows.Forms.CurrencyManager,System.Int32) method uses the System.Windows.Forms.DataGridColumnStyle.GetColumnValueAtRow(System.Windows.Forms.CurrencyManager,System.Int32) to determine the value to draw in the cell. The System.Windows.Forms.DataGridTextBoxColumn.PaintText(System.Drawing.Graphics,System.Drawing.Rectangle,System.String,System.Boolean) method is called to draw the cell and its contents. The System.Drawing.Graphics object to draw to. The bounding System.Drawing.Rectangle to paint into. The System.Windows.Forms.CurrencyManager of the System.Windows.Forms.DataGrid the that contains the column. The number of the row in the underlying data table. A value indicating whether to align the column's content to the right.

tt) Paint

[C#] protected internal override void Paint(Graphics g, Rectangle bounds, CurrencyManager source, int rowNum, Brush backBrush, Brush foreBrush, bool alignToRight);

[C++] protected public: void Paint(Graphics* g, Rectangle bounds, CurrencyManager* source, int rowNum, Brush* backBrush, Brush* foreBrush, bool alignToRight);

[VB] Overrides Protected Friend Dim Sub Paint(ByVal g As Graphics, ByVal bounds As Rectangle, ByVal source As CurrencyManager, ByVal rowNum As Integer, ByVal backBrush As Brush, ByVal foreBrush As Brush, ByVal alignToRight As Boolean)

[JScript] package override function Paint(g: Graphics, bounds: Rectangle, source: CurrencyManager, rowNum: int, backBrush: Brush, foreBrush: Brush, alignToRight: Boolean);

Description

Paints a System.Windows.Forms.DataGridColumnStyle with the specified System.Drawing.Graphics, System.Drawing.Rectangle, System.Windows.Forms.CurrencyManager, row number, System.Drawing.Brush, and foreground color.

The System.Windows.Forms.DataGridTextBox Column.Paint(System.Drawing.Graphics,System. Drawing.Rectangle,System.Windows.Forms.CurrencyManager,System.Int32) method uses the System.Windows. Forms.DataGridColumnStyle.GetColumnValueAtRow(System.Windows.Forms.CurrencyManager,System.Int32) to determine the value to draw in the cell. The System.Windows. Forms.DataGridTextBoxColumn.PaintText(System. Drawing.Graphics, System.Drawing.Rectangle,System. String,System.Boolean) method is called to draw the cell and its contents. The System.Drawing.Graphics object to draw to. The bounding System.Drawing.Rectangle to paint into. The System.Windows.

Forms.CurrencyManager of the System.Windows.Forms. DataGrid the that contains the column. The number of the row in the underlying data table. A System.Drawing.Brush that paints the background. A System.Drawing.Brush that paints the foreground color. A value indicating whether to align the column's content to the right.

uu) PaintText

[C#] protected void PaintText(Graphics g, Rectangle bounds, string text, bool alignToRight);

[C++] protected: void PaintText(Graphics* g, Rectangle bounds, String* text, bool alignToRight);

[VB] Protected Sub PaintText(ByVal g As Graphics, ByVal bounds As Rectangle, ByVal text As String, ByVal alignTo Right As Boolean)

[JScript] protected function PaintText(g: Graphics, bounds: Rectangle, text: String, alignToRight: Boolean); Draws the specified text and surrounding rectangle at the specified location.

Description

Draws the text and rectangle at the given location with the specified alignment.

The System.Windows.Forms.DataGridTextBox Column. PaintText(System.Drawing.Graphics,System.Drawing. Rectangle,System.String,System.Boolean) method uses the System.Windows.Forms.DataFormats.Format object set with the System.Windows.Forms.DataGridText BoxColumn. Format property to format the value before drawing it to the screen. A System.Drawing.Graphics object used to draw the string. A System.Drawing.Rectangle which contains the boundary data of the rectangle. The string to be drawn to the screen. A value indicating whether the text is right-aligned.

vv) PaintText

[C#] protected void PaintText(Graphics g, Rectangle textBounds, string text, Brush backBrush, Brush foreBrush, bool alignToRight);

[C++] protected: void PaintText(Graphics* g, Rectangle textBounds, String* text, Brush* backBrush, Brush* foreBrush, bool alignToRight);

[VB] Protected Sub PaintText(ByVal g As Graphics, ByVal textBounds As Rectangle, ByVal text As String, ByVal backBrush As Brush, ByVal foreBrush As Brush, ByVal alignTo Right As Boolean)

[JScript] protected function PaintText(g: Graphics, textBounds: Rectangle, text: String, backBrush: Brush, foreBrush: Brush, alignToRight: Boolean);

Description

Draws the text and rectangle at the specified location with the specified colors and alignment.

The System.Windows.Forms.DataGridTextBoxColumn.PaintText(System.Drawing.Graphics,System.Drawing.Rectangle,System.String,System.Boolean) method uses the System.Windows.Forms.DataGridTextBoxColumn.Format property to format the value before drawing it to the screen. A System.Drawing.Graphics object used to draw the string. A System.Drawing.Rectangle which contains the boundary data of the rectangle. The string to be drawn to the screen. A System.Drawing.Brush that determines the rectangle's background color A System.Drawing. Brush that determines the rectangles foreground color. A value indicating whether the text is right-aligned.

ww) SetDataGridInColumn

[C#] protected override void SetDataGridInColumn(DataGrid value);

[C++] protected: void SetDataGridInColumn(DataGrid* value);

[VB] Overrides Protected Sub SetDataGridInColumn(ByVal value As DataGrid)

[JScript] protected override function SetDataGridInColumn (value: DataGrid);

Description

Adds a System.Windows.Forms.TextBox control to the System.Windows.Forms.DataGrid control's System.Windows. Forms.Control.ControlCollection.

When this methods is called, the hosted System.Windows. Forms.TextBox control is added to the System.Windows. Forms.DataGrid control's System.Windows.Forms.Control. ControlCollection. This allows the System.Windows.Forms. CurrencyManager to associate both controls with the same data source. The System.Windows. Forms.DataGrid control the System.Windows.Forms.TextBox control is added to.

xx) UpdateUI

[C#] protected internal override void UpdateUI(CurrencyManager source, int rowNum, string instantText);

[C++] protected public: void UpdateUI(CurrencyManager* source, int rowNum, String* instantText);

[VB] Overrides Protected Friend Dim Sub UpdateUI(ByVal source As CurrencyManager, ByVal rowNum As Integer, ByVal instantText As String)

[JScript] package override function UpdateUI(source: CurrencyManager, rowNum: int, instantText: String);

Description

Updates the user interface. The System.Windows.Forms. CurrencyManager that supplies the data. The index of the row to update. The text that will be displayed in the cell.

DataObject class (System.Windows.Forms)

a) UpdateUI

Description

Implements a basic data transfer mechanism.

System.Windows.Forms.DataObject implements the System.Windows.Forms.IDataObject interface, whose methods provide a format-independent mechanism for data transfer.

b) DataObject

Example Syntax:

c) UpdateUI

[C#] public DataObject( );

[C++] public: DataObject( );

[VB] Public Sub New( )

[JScript] public function DataObject( ); Initializes a new instance of the System.Windows.Forms.DataObject class.

Description

Initializes a new instance of the System.Windows.Forms. DataObject class, which can store arbitrary data.

d) DataObject
Example Syntax:
e) UpdateUI

[C#] public DataObject(object data);

[C++] public: DataObject(Object* data);

[VB] Public Sub New(ByVal data As Object)

[JScript] public function DataObject(data: Object);

Description

Initializes a new instance of the System.Windows.Forms. DataObject class, containing the specified data. The data to store.

f) DataObject
Example Syntax:
g) UpdateUI

[C#] public DataObject(string format, object data);

[C++] public: DataObject(String* format, Object* data);

[VB] Public Sub New(ByVal format As String, ByVal data As Object)

[JScript] public function DataObject(format: String, data: Object);

Description

Initializes a new instance of the System.Windows.Forms. DataObject class, containing the specified data and its associated format. The class type associated with the data. See System.Windows.Forms.DataFormats for the predefined formats. The data to store.

h) GetData

[C#] public virtual object GetData(string format);

[C++] public: virtual Object* GetData(String* format);

[VB] Overridable Public Function GetData(ByVal format As String) As Object

[JScript] public function GetData(format: String): Object;

Description

Returns the data associated with the specified data format.

Return Value: The data associated with the specified format, or null.

If this method cannot find data in the specified format, it attempts to convert the data to the format. If the data cannot be converted to the specified format, or if the data was stored with automatic conversion set to false, this method returns null. The format of the data to retrieve. See System.Windows. Forms.DataFormats for predefined formats.

i) GetData

[C#] public virtual object GetData(Type format);

[C++] public: virtual Object* GetData(Type* format);

[VB] Overridable Public Function GetData(ByVal format As Type) As Object

[JScript] public function GetData(format: Type): Object;

Description

Returns the data associated with the specified class type format.

Return Value: The data associated with the specified format, or null.

If this method cannot find data in the specified format, it attempts to convert the data to the format. If the data cannot be converted to the specified format, or if the data was stored with automatic conversion set to false, this method returns null. A System.Type representing the format of the data to retrieve.

j) GetData

[C+] public virtual object GetData(string format, bool autoConvert);

[C++] public: virtual Object* GetData(String* format, bool autoConvert);

[VB] Overridable Public Function GetData(ByVal format As String, ByVal autoConvert As Boolean) As Object

[JScript] public function GetData(format: String, autoConvert: Boolean): Object; Returns the data associated with the specified data format.

Description

Returns the data associated with the specified data format, using an automated conversion parameter to determine whether to convert the data to the format.

Return Value: The data associated with the specified format, or null.

If the autoConvert parameter is true and this method cannot find data in the specified format, it attempts to convert the data to the format. If the data cannot be converted to the specified format, or if the data was stored with the automatic conversion set to false, this method returns null. The format of the data to retrieve. See System.Windows.Forms.DataFormats for predefined formats. true to the convert data to the specified format; otherwise, false.

k) GetDataPresent

[C#] public virtual bool GetDataPresent(string format);

[C++] public: virtual bool GetDataPresent(String* format);

[VB] Overridable Public Function GetDataPresent(ByVal format As String) As Boolean

[JScript] public function GetDataPresent(format: String): Boolean;

Description

Determines whether data stored in this instance is associated with, or can be converted to, the specified format.

Return Value: true if data stored in this instance is associated with, or can be converted to, the specified format; otherwise, false.

Call this method to determine whether a format exists in this System.Windows.Forms.DataObject instance before calling System.Windows.Forms.DataObject.GetData(System. String,System.Boolean). Call System.Windows.Forms. DataObject.GetFormats(System.Boolean) for the formats that are available in this instance. The format to check for. See System.Windows.Forms.DataFormats for predefined formats.

l) GetDataPresent

[C#] public virtual bool GetDataPresent(Type format);

[C++] public: virtual bool GetDataPresent(Type* format);

[VB] Overridable Public Function GetDataPresent(ByVal format As Type) As Boolean

[JScript] public function GetDataPresent(format: Type): Boolean; Determines whether data stored in this instance is associated with the specified format.

Description

Determines whether data stored in this instance is associated with, or can be converted to, the specified format.

Return Value: true if data stored in this instance is associated with, or can be converted to, the specified format; otherwise, false.

Call this method to determine whether a format exists in this System.Windows.Forms.DataObject instance before calling System.Windows.Forms.DataObject.GetData(System.String,System.Boolean). Call System.Windows.Forms.DataObject.GetFormats(System.Boolean) for the formats that are available in this instance. A System.Type representing the format to check for.

m) GetDataPresent

[C#] public virtual bool GetDataPresent(string format, bool autoConvert);

[C++] public: virtual bool GetDataPresent(String* format, bool autoConvert);

[VB] Overridable Public Function GetDataPresent(ByVal format As String, ByVal autoConvert As Boolean) As Boolean

[JScript] public function GetDataPresent(format: String, autoConvert: Boolean): Boolean;

Description

Determines whether data stored in this instance is associated with the specified format, using an automatic conversion parameter to determine whether to convert the data to the format.

Return Value: true if the data is in, or can be converted to, the specified format; otherwise, false.

Call this method to determine whether a format exists in this System.Windows.Forms.DataObject instance before calling System.Windows.Forms.DataObject.GetData(System.String,System.Boolean). Call System.Windows.Forms.DataObject.GetFormats(System.Boolean) for the formats that are available in this instance. The format to check for. See System.Windows.Forms.DataFormats for predefined formats. true to determine whether data stored in this instance can be converted to the specified format; false to check whether the data is in the specified format.

n) GetFormats

[C#] public virtual string[ ] GetFormats( );

[C++] public: virtual String* GetFormats( ) _gc[ ];

[VB] Overridable Public Function GetFormats( ) As String( )

[JScript] public function GetFormats( ): String[ ];

Description

Returns a list of all formats that data stored in this instance is associated with or can be converted to.

Return Value: An array of the names representing a list of all formats that are supported by the data stored in this object.

Call this method to get the supported data formats before calling System.Windows.Forms.DataObject.GetData(System.String,System.Boolean). See System.Windows.Forms.DataFormats for the predefined formats.

o) GetFormats

[C#] public virtual string[ ] GetFormats(bool autoConvert);

[C++] public: virtual String* GetFormats(bool auto Convert) _gc[ ];

[VB] Overridable Public Function GetFormats(ByVal autoConvert As Boolean) As String( )

[JScript] public function GetFormats(autoConvert: Boolean): String[ ]; Returns a list of all formats that data stored in this instance is associated with or can be converted to.

Description

Returns a list of all formats that data stored in this instance is associated with or can be converted to, using an automatic conversion parameter to determine whether to retrieve only native data formats or all formats that the data can be converted to.

Return Value: An array of the names representing a list of all formats that are supported by the data stored in this object.

Call this method to get the supported data formats before calling System.Windows.Forms.DataObject.GetData(System.String,System.Boolean). See System.Windows.Forms.DataFormats for the predefined formats. true to retrieve all formats that data stored in this instance is associated with, or can be converted to; false to retrieve only native data formats.

p) SetData

[C#] public virtual void SetData(object data);

[C++] public: virtual void SetData(Object* data);

[VB] Overridable Public Sub SetData(ByVal data As Object)

[JScript] public function SetData(data: Object);

Description

Stores the specified data in this instance, using the class of the data for the format.

The data format is its class. If you do not know the format of the target application, you can store data in multiple formats using this method. The data to store.

q) SetData

[C#] public virtual void SetData(string format, object data);

[C++] public: virtual void SetData(String* format, Object* data);

[VB] Overridable Public Sub SetData(ByVal format As String, ByVal data As Object)

[JScript] public function SetData(format: String, data: Object);

Description

Stores the specified format and data in this instance.

If you do not know the format of the target application, you can store data in multiple formats using this method. The format associated with the data. See System.Windows.Forms.DataFormats for predefined formats. The data to store.

r) SetData

[C#] public virtual void SetData(Type format, object data);

[C++] public: virtual void SetData(Type* format, Object* data);

[VB] Overridable Public Sub SetData(ByVal format As Type, ByVal data As Object)

[JScript] public function SetData(format: Type, data: Object);

Description

Stores the specified data and its associated class type in this instance.

If you do not know the format of the target application, you can store data in multiple formats using this method. A System.Type representing the format associated with the data. The data to store.

s) SetData

[C#] public virtual void SetData(string format, bool autoConvert, object data);

[C++] public: virtual void SetData(String* format, bool autoConvert, Object* data);

[VB] Overridable Public Sub SetData(ByVal format As String, ByVal autoConvert As Boolean, ByVal data As Object)

[JScript] public function SetData(format: String, autoConvert: Boolean, data: Object); Stores the specified format and data in this instance.

Description

Stores the specified format and data in this instance, using the automatic conversion parameter to specify whether the data can be converted to another format.

If you do not know the format of the target application, you can store data in multiple formats using this method. The format associated with the data. See System.Windows.Forms.DataFormats for predefined formats. true to allow the data to be converted to another format; otherwise, false. The data to store.

t) UnsafeNativeMethods.IOleDataObject.OleDAdvise

[C#] int UnsafeNativeMethods.IOleDataObject.OleDAdvise (NativeMethods.FORMATETC pFormatetc, int advf, object pAdvSink, int[ ] pdwConnection);

[C++] int UnsafeNativeMethods::IOleDataObject::OleDAdvise(NativeMethods.FORMATETC* pFormatetc, int advf, Object* pAdvSink, int pdwConnection _gc[ ]);

[VB] Function IOleDataObject.OleDAdvise(ByVal pFormatetc As NativeMethods.FORMATETC, ByVal advf As Integer, ByVal pAdvSink As Object, ByVal pdw Connection( ) As Integer) As Integer Implements UnsafeNativeMethods.IOleDataObject.OleDAdvise

[JScript] function UnsafeNativeMethods.IOleDataObject.OleDAdvise(pFormatetc: NativeMethods.FORMATETC, advf: int, pAdvSink: Object, pdwConnection: int[ ]): int;

u) UnsafeNativeMethods.IOieDataObject.OleDUnadvise

[C#] int UnsafeNativeMethods.IOleDataObject. OleDUnadvise(int dwConnection);

[C++] int UnsafeNativeMethods::IOleDataObject::OleDUnadvise(int dwConnection);

[VB] Function IOleDataObject.OleDUnadvise(ByVal dwConnection As Integer) As Integer Implements UnsafeNativeMethods.IOleDataObject.OleDUnadvise

[JScript] function UnsafeNativeMethods.IOleDataObject.OleDUnadvise(dwConnection: int): int;

v) UnsafeNativeMethods.IOleDataObject. OleEnumDAdvise

[C#] int UnsafeNativeMethods.IOleDataObject. OleEnumDAdvise(object[ ] ppenumAdvise);

[C++] int UnsafeNativeMethods::IOleDataObject::OleEnumDAdvise(Object* ppenumAdvise _gc[ ]);

[VB] Function IOleDataObject.OleEnumDAdvise(ByVal ppenumAdvise( ) As Object) As Integer Implements UnsafeNativeMethods.IOleDataObject.OleEnumDAdvise

[JScript] function UnsafeNativeMethods.IOleDataObject.OleEnumDAdvise(ppenumAdvise: Object[ ]): int;

w) UnsafeNativeMethods.IOleDataObject.OleEnumFormatEtc

[C#] IEnumFORMATETC UnsafeNativeMethods.IOleDataObject.OleEnumFormatEtc(int dwDirection);

[C++] IEnumFORMATETC* UnsafeNativeMethods::IOleDataObject::OleEnumFormatEtc(int dwDirection);

[VB] Function IOleDataObject.OleEnumFormatEtc(ByVal dwDirection As Integer) As IEnumFORMATETC Implements UnsafeNativeMethods.IOleDataObject.OleEnumFormatEtc

[JScript] function UnsafeNativeMethods.IOleDataObject.OleEnumFormatEtc(dwDirection: int): IEnumFORMATETC;

x) UnsafeNativeMethods.IOleDataObject. OleGetCanonicalFormatEtc

[C#] int UnsafeNativeMethods.IOleDataObject.OleGetCanonicalFormatEtc(NativeMethods. FORMATETC pformatetcIn, NativeMethods.FORMATETC pformatetcOut);

[C++] int UnsafeNativeMethods::IOleDataObject::OleGetCanonicalFormatEtc(NativeMethods.FORMATETC* pformatetcIn, NativeMethods.FORMATETC* pformatetcOut);

[VB] Function IOleDataObject.OleGetCanonicalFormatEtc (ByVal pformatetcIn As NativeMethods.FORMATETC, ByVal pformatetcOut As NativeMethods.FORMATETC) As Integer Implements UnsafeNativeMethods.IOleDataObject.OleGetCanonicalFormatEtc

[JScript] function UnsafeNativeMethods.IOleDataObject.OleGetCanonicalFormatEtc(pformatetcIn: NativeMethods.FORMATETC, pformatetcOut: NativeMethods.FORMATETC): int;

y) UnsafeNativeMethods.IOleDataObject.OleGetData

[C#] int UnsafeNativeMethods.IOleDataObject.OleGetData (NativeMethods.FORMATETC formatetc, NativeMethods.STGMEDIUM medium);

[C++] int UnsafeNativeMethods::IOleDataObject::OleGetData(NativeMethods.FORMATETC* formatetc, NativeMethods.STGMEDIUM* medium);

[VB] Function IOleDataObject.OleGetData(ByVal formatetc As NativeMethods.FORMATETC, ByVal medium As NativeMethods.STGMEDIUM) As Integer Implements UnsafeNativeMethods.IOleDataObject.OleGetData

[JScript] function UnsafeNativeMethods.IOleDataObject.OleGetData(formatetc: NativeMethods.FORMATETC, medium:NativeMethods.STGMEDIUM):int;

z) UnsafeNativeMethods.IOleDataObject. OleGetDataHere

[C#] int UnsafeNativeMethods.IOleDataObject. OleGetDataHere(NativeMethods.FORMATETC formatetc, NativeMethods.STGMEDIUM medium);

[C++] int UnsafeNativeMethods::IOleDataObject::OleGetDataHere(NativeMethods.FORMATETC* formatetc, NativeMethods.STGMEDIUM* medium);

[VB] Function IOleDataObject.OleGetDataHere(ByVal formatetc As NativeMethods.FORMATETC, ByVal medium As NativeMethods.STGMEDIUM) As Integer Implements UnsafeNativeMethods.IOleDataObject.OleGetDataHere

[JScript] function UnsafeNativeMethods.IOleDataObject.OleGetDataHere(formatetc: NativeMethods. FORMATETC, medium:NativeMethods.STGMEDIUM): int;

aa) UnsafeNativeMethods.IOleDataObject.OleQueryGelData

[C#] int UnsafeNativeMethods.IoleDataObject. OleQueryGetData(NativeMethods.FORMATETC formatetc);

[C++] int UnsafeNativeMethods::IOleDataObject::OleQueryGetData(NativeMethods.FORMATETC* formatetc);

[VB] Function IOleDataObject.OleQueryGetData(ByVal formatetc As NativeMethods.FORMATETC) As Integer Implements UnsafeNativeMethods.IoleDataObject.OleQueryGetData

[JScript] function UnsafeNativeMethods.IOleDataObject.OleQueryGetData(formatetc: NativeMethods. FORMATETC):int;

bb) UnsafeNativeMethods.IOleDataObject.OleSetData

[C#] int UnsafeNativeMethods.IOleDataObject.OleSetData (NativeMethods.FORMATETC pFormatetcIn, NativeMethods.STGMEDIUM pmedium, int fRelease);

[C++] int UnsafeNativeMethods::IOleDataObject::OleSetData(NativeMethods.FORMATETC* pFormatetcIn, NativeMethods.STGMEDIUM* pmedium, int fRelease);

[VB] Function IOleDataObject.OleSetData(ByVal pFormatetcIn As NativeMethods.FORMATETC, ByVal pmedium As NativeMethods.STGMEDIUM, ByVal fRelease As Integer) As Integer Implements UnsafeNativeMethods.IOleDataObject.OleSetData

[JScript] function UnsafeNativeMethods.IOleDataObject.OleSetData(pFormatetcIn: NativeMethods. FORMATETC, pmedium: NativeMethods.STGMEDIUM, fRelease: int): int;

DateBoldEventArgs class (System.Windows.Forms)

a) ToString b) DaysToBold c) ToString d) Size e) ToString f) StartDate g) ToString DateBoldEventHandler delegate (System.Windows. Forms)

a) ToString

DateRangeEventArgs class (System.Windows.Forms)

a) ToString

Description

Provides data for the System.Windows.Forms.MonthCalendar.DateChanged or System.Windows.Forms.MonthCalendar.DateSelected events of the System.Windows.Forms-.MonthCalendar control.

The System.Windows.Forms.MonthCalendar.DateChanged event occurs when the currently selected date or range of dates changes; for example, when the user explicitly changes a selection within the current month or when the selection is implicitly changed in response to next/previous month navigation. The System.Windows.Forms.MonthCalendar.DateSelected event occurs when the user explicitly changes a selection. The System. Windows. Forms.DateRangeEventArgs.#ctor constructor specifies the start and end for the new date range that has been selected.

b) DateRangeEventArgs

Example Syntax:

c) ToString

[C#] public DateRangeEventArgs(DateTime start, DateTime end);

[C++] public: DateRangeEventArgs(DateTime start, DateTime end);

[VB] Public Sub New(ByVal start As DateTime, ByVal end As DateTime)

[JScript] public function DateRangeEventArgs(start: DateTime, end: DateTime);

Description

Initializes a new instance of the System.Windows.Forms. DateRangeEventArgs class.

The System.Windows.Forms.DateRangeEventArgs.Start and System.Windows.Forms.DateRangeEventArgs.End property values are set by the start and end parameter values of this constructor. The first date-time value in the range that the user has selected. The last date-time value in the range that the user has selected.

d) End e) ToString

[C#] public DateTime End {get;}

[C++] public: _property DateTime get_End( );

[VB] Public ReadOnly Property End As DateTime

[JScript] public function get End( ): DateTime;

Description

Gets the last date-time value in the range that the user has selected.

f) Start g) ToString

[C#] public DateTime Start {get;}

[C++] public: _property DateTime get_Start( );

[VB] Public ReadOnly Property Start As DateTime

[JScript] public function get Start( ): DateTime;

Description

Gets the first date-time value in the range that the user has selected.

DateRangeEventHandler delegate (System.Windows.Forms)

a) ToString

Description

Represents the method that will handle the System.Windows.Forms.MonthCalendar.DateChanged or System.Windows.Forms.MonthCalendar.DateSelected event of a System.Windows.Forms.MonthCalendar. The source of the event. A System.Windows.Forms.DateRangeEventArgs that contains the event data.

When you create a System.Windows.Forms.DateRange EventArgs delegate, you identify the method that will handle the event. To associate the event with your event handler, add an instance of the delegate to the event. The event handler is called whenever the event occurs, unless you remove the delegate. For more information about event handler delegates, see.

DateTimePicker class (System.Windows.Forms)

a) ToString

Description

Represents a Windows date-time picker control.

The System.Windows.Forms.DateTimePicker control is used to allow the user to select a date and time, and to display that date-time in the specified format. You can limit the date and times that can be selected by setting the System.Windows.Forms.DateTimePicker.MinDate and System.Windows.Forms.DateTimePicker.MaxDate properties.

b) ToString

[C#] protected static readonly Color DefaultMonthBackColor;

[C++] protected: static Color DefaultMonthBackColor;

[VB] Protected Shared ReadOnly DefaultMonthBackColor As Color

[JScript] protected static var DefaultMonthBackColor: Color;

Description

Specifies the default month background color of the date-time picker control. This field is read-only.

c) ToString

[C#] protected static readonly Color DefaultTitleBackColor;

[C++] protected: static Color DefaultTitleBackColor;

[VB] Protected Shared ReadOnly DefaultTitleBackColor As Color

[JScript] protected static var DefaultTitleBackColor: Color;

Description

Specifies the default title back color of the date-time picker control. This field is read-only.

d) ToString

[C#] protected static readonly Color DefaultTitleForeColor;

[C++] protected: static Color DefaultTitleForeColor;

[VB] Protected Shared ReadOnly DefaultTitleForeColor As Color

[JScript] protected static var DefaultTitleForeColor: Color;

Description

Specifies the default title foreground color of the date-time picker control. This field is read-only.

e) ToString

[C#] protected static readonly Color DefaultTrailingForeColor;

[C++] protected: static Color DefaultTrailingForeColor;

[VB] Protected Shared ReadOnly DefaultTrailingForeColor As Color

[JScript] protected static var DefaultTrailingForeColor: Color;

Description

Specifies the default trailing foreground color of the date-time picker control. This field is read-only.

f) ToString

[C#] public static readonly DateTime MaxDateTime;

[C++] public: static DateTime MaxDateTime;

[VB] Public Shared ReadOnly MaxDateTime As DateTime

[JScript] public static var MaxDateTime: DateTime;

Description

Specifies the maximum date value of the date-time picker control. This field is read-only.

The maximum date is set to 12/31/9998 23:59:59.

g) ToString

[C#] public static readonly DateTime MinDateTime;

[C++] public: static DateTime MinDateTime;

[VB] Public Shared ReadOnly MinDateTime As DateTime

[JScript] public static var MinDateTime: DateTime;

Description

Specifies the minimum date value of the date-time picker control. This field is read-only.

The minimum date is set to 1/1/1753 00:00:00.

h) DateTimePicker

Example Syntax:

i) ToString

[C#] public DateTimePicker( ); [C++] public: DateTimePicker( );

[VB] Public Sub New( )

[JScript] public function DateTimePicker( );

Description

Initializes a new instance of the System.Windows.Forms.DateTimePicker class.

j) AccessibilityObject k) AccessibleDefaultActionDescription l) AccessibleDescription m) AccessibleName n) AccessibleRole o) AllowDrop p) Anchor q) BackColor r) ToString Description s) BackgroundImage t) ToString

[C#] public override Image BackgroundImage {get; set;}

[C++] public: _property virtual Image* get_BackgroundImage( ); public: _property virtual void set_BackgroundImage (Image*);

[VB] Overrides Public Property BackgroundImage As Image

[JScript] public function get BackgroundImage( ): Image; public function set BackgroundImage(Image);

Description u) BindingContext v) Bottom w) Bounds x) CalendarFont y) ToString

Description

Gets or sets the font style applied to the calendar.

z) CalendarForeColor aa) ToString

[C#] public Color CalendarForeColor {get; set;}

[C++] public: _property Color get_CalendarForeColor( ); public: _property void set_CalendarForeColor(Color);

[VB] Public Property CalendarForeColor As Color

[JScript] public function get CalendarForeColor( ): Color; public function set CalendarForeColor(Color);

Description

Gets or sets the foreground color of the calendar.

When a System.Windows.Forms.DateTimePicker is created, this property is initially set equal to the System.Windows.Forms.Control.ForeColor property value.

bb) CalendarMonthBackground cc) ToString

[C#] public Color CalendarMonthBackground {get; set;}

[C++] public: _property Color get_CalendarMonthBackground( ); public: _property void set_CalendarMonthBackground(Color);

[VB] Public Property CalendarMonthBackground As Color

[JScript] public function get CalendarMonthBackground( ): Color; public function set CalendarMonthBackground (Color);

Description

Gets or sets the background color of the calendar month.

When a System.Windows.Forms.DateTimePicker is created, this property is initially set equal to the System.Windows.Forms.DateTimePicker.DefaultMonthBackColor field value.

dd) CalendarTitleBackColor ee) ToString

[C#] public Color CalendarTitleBackColor {get; set;}

[C++] public: _property Color get_CalendarTitleBack Color( ); public: _property void set_CalendarTitleBackColor (Color);

[VB] Public Property CalendarTitleBackColor As Color

[JScript] public function get CalendarTitleBackColor( ): Color; public function set CalendarTitleBackColor(Color);

Description

Gets or sets the background color of the calendar title.

When a System.Windows.Forms.DateTimePicker is created, this property is initially set equal to the System.Windows.Forms.DateTimePicker.DefaultTitleBackColor field value.

ff) CalendarTitleForeColor gg) ToString

[C#] public Color CalendarTitleForeColor {get; set;}

[C++] public: _property Color get_CalendarTitleFore Color( ); public: _property void set_CalendarTitleForeColor (Color);

[VB] Public Property CalendarTitleForeColor As Color

[JScript] public function get CalendarTitleForeColor( ): Color; public function set CalendarTitleForeColor(Color);

Description

Gets or sets the foreground color of the calendar title.

When a System.Windows.Forms.DateTimePicker is created, this property is initially set equal to the System.Windows.Forms.DateTimePicker.DefaultTitleForeColor field value.

hh) CalendarTrailingForeColor ii) ToString

[C#] public Color CalendarTrailingForeColor {get; set;}

[C++] public: _property Color get CalendarTrailingForeColor( ); public: _property void set_CalendarTrailingForeColor(Color);

[VB] Public Property CalendarTrailingForeColor As Color

[JScript] public function get CalendarTrailingForeColor( ): Color; public function set CalendarTrailingForeColor (Color);

Description

Gets or sets the foreground color of the calendar trailing dates.

When a System.Windows.Forms.DateTimePicker is created, this property is initially set equal to the System.Windows.Forms.DateTimePicker.DefaultTrailingForeColor field value.

jj) CanFocus kk) CanSelect ll) Capture mm) CausesValidation nn) Checked oo) ToString Description Gets or sets a value indicating whether the System.Windows.Forms.DateTimePicker.Value property has been set with a valid date-time value and the displayed value is able to be updated.

This parameter is used to obtain the state of the check box that is displayed if the System.Windows.Forms.DateTimePicker.ShowCheckBox property value is true. If the System.Windows.Forms.DateTimePicker.Checked property value is true, the date-time picker control displays the properly formatted System.Windows.Forms.DateTimePicker.Value property value; otherwise, the control displays either the current date and time (System.DateTime.Now) or the last valid date-time value assigned to the System.Windows.Forms.Date TimePicker.Value property.

pp) ClientRectangle
qq) ClientSize
rr) CompanyName
ss) Container
tt) ContainsFocus
uu) ContextMenu
vv) Controls
ww) Created
xx) CreateParams
yy) ToString Description Returns the CreateParams used to create this window.

zz) Cursor
aaa) CustomFormat
bbb) ToString

Description

Gets or sets the custom date-time format string.

To display string literals that contain date and time separators or format strings you must escape the substring. For example, to display the date as "June 06 at 3:00 PM", set the System. Windows.Forms.DateTimePicker.CustomFormat property to "MMMM dd 'at' t:mm tt". If the "at" substring is not escaped, the result is a "June 06 aP 3:00 PM" because the "t" character is read as the one-letter AM/PM format string (see the format string table below).

ccc) DataBindings
ddd) DefaultImeMode
eee) DefaultSize
fff) ToString

Description

Deriving classes can override this to configure a default size for their control.

This is more efficient than setting the size in the control's constructor.

ggg) DesignMode
hhh) DisplayRectangle
iii) Disposing
jjj) Dock
kkk) DropDownAlign
lll) ToString Description Gets or sets the alignment of the drop-down calendar on the date-time control. The calendar drop-down can be aligned to the left or right of the control.

mmm) Enabled
nnn) Events
ooo) Focused
ppp) Font
qqq) FontHeight
rrr) ForeColor
sss) ToString Description ttt) Format
uuu) ToString

[C#] public DateTimePickerFormat Format {get; set;}

[C++] public: _property DateTimePickerFormat get Format( ); public: _property void set_Format(DateTimePickerFormat);

[VB] Public Property Format As DateTimePickerFormat

[JScript] public function get Format( ): DateTimePickerFormat; public function set Format(DateTimePickerFormat);

Description

Gets or sets the format of the date and time displayed in the control.

This property determines the date-time format the date is displayed in. The date-time format is based on the user's regional settings in their operating system.

vvv) Handle
www) HasChildren
xxx) Height
yyy) ImeMode
zzz) InvokeRequired
aaaa) IsAccessible
bbbb) IsDisposed
cccc) IsHandleCreated
dddd) Left
eeee) Location
ffff) MaxDate
gggg) ToString Description Gets or sets the maximum date and time that can be selected in the control.

hhhh) MinDate
iiii) ToString

[C#] public DateTime MinDate {get; set;}

[C++] public: _property DateTime get_MinDate( ); public: _property void set_MinDate(DateTime);

[VB] Public Property MinDate As DateTime

[JScript] public function get MinDate( ): DateTime; public function set MinDate(DateTime);

Description

Gets or sets the minimum date and time that can be selected in the control.

jjjj) Name
kkkk) Parent
llll) PreferredHeight
mmmm) ToString

Description

Gets the preferred height of the date-time picker control.

The preferred height is the minimum height needed to accommodate the displayed text with the assigned System.Drawing.Font applied.

nnnn) ProductName
oooo) ProductVersion
pppp) RecreatingHandle
qqqq) Region
rrrr) RenderRightToLeft
ssss) ResizeRedraw
tttt) Right
uuuu) RightToLeft
vvvv) ShowCheckBox
wwww) ToString Description Gets or sets a value indicating whether a check box is displayed to the left of the selected date.

When System.Windows.Forms.DateTimePicker.Show CheckBox is set to true a check box is displayed to the left of the date in the control. When the check box is checked, the date-time value can be updated. When the check box is empty, the date-time value is unable to be changed.

xxxx) ShowFocusCues yyyy) ShowKeyboardCues zzzz) ShowUpDown aaaaa) ToString

Description

Gets or sets a value indicating whether an up-down control is used to adjust the date-time value.

When System.Windows.Forms.DateTimePicker.Show UpDown is set to true, an up-down control is used to adjust time values instead of the drop-down calendar. The date-time can be adjusted by selecting each element individually and using the up and down buttons to change the value.

bbbbb) Site ccccc) Size ddddd) TabIndex eeeee) TabStop fffff) Tag ggggg) Text hhhhh) ToString Description Gets or sets the text associated with this control.

The string returned by this property is equivalent to the System.Windows.Forms.DateTimePicker.Value property with the appropriate formatting or custom formatting applied. For example, if the System.Windows.Forms.DateTimePicker.Value property is set to 06/01/2001 12:00:00 AM while the System.Windows.Forms.DateTimePicker.Custom Format property is set to "dddd, MMMM dd, yyyy", the System.Windows.Forms.DateTimePicker.Text property value is "Friday, Jun. 1, 2001".

iiiii) Top jjjjj) TopLevelControl kkkkk) Value lllll) ToString

Description

Gets or sets the date-time value assigned to the control.

If the System.Windows.Forms.DateTimePicker.Value property has not been changed in code or by the user, it is set to the current date and time (System.DateTime.Now).

mmmmm) Visible nnnnn) Width ooooo) WindowTarget ppppp) ToString

Description

Occurs when the drop-down calendar is dismissed and disappears.

For more information about handling events, see.

qqqqq) ToString

Description

Occurs when the drop-down calendar is shown.

For more information about handling events, see.

rrrrr) ToString

Description

Occurs when the System.Windows.Forms.DateTimePicker.Format property value has changed.

For more information about handling events, see.

sssss) ToString

Description

Occurs when the System.Windows.Forms.DateTimePicker.Value property changes.

For more information about handling events, see.

ttttt) CreateAccessibilityInstance

[C#] protected override AccessibleObject CreateAccessibilityInstance( );

[C++] protected: AccessibleObject* CreateAccessibilityInstance( );

[VB] Overrides Protected Function CreateAccessibilityInstance( ) As AccessibleObject

[JScript] protected override function CreateAccessibilityInstance( ): AccessibleObject;

Description

Description

Constructs the new instance of the accessibility object for this control. Subclasses should not call base.CreateAccessibilityObject.

uuuuu) CreateHandle

[C#] protected override void CreateHandle( );

[C++] protected: void CreateHandle( );

[VB] Overrides Protected Sub CreateHandle( )

[JScript] protected override function CreateHandle( );

Description

Creates the physical window handle.

vvvvv) DestroyHandle

[C.#] protected override void DestroyHandle( );

[C++] protected: void DestroyHandle( );

[VB] Overrides Protected Sub DestroyHandle( )

[JScript] protected override function DestroyHandle( );

Description

Destroys the physical window handle.

wwwww) IsInputKey

[C#] protected override bool IsInputKey(Keys keyData);

[C++] protected: bool IsInputKey(Keys keyData);

[VB] Overrides Protected Function IsInputKey(ByVal keyData As Keys) As Boolean

[JScript] protected override function IsInputKey(keyData: Keys): Boolean;

Description

Determines whether the specified key is a regular input key or a special key that requires preprocessing.

Return Value: true if the specified key is a regular input key; otherwise, false.

Call this method during window-message preprocessing to determine whether the specified key is a regular input key that should be sent directly to the control or a special key (such as PAGE UP and PAGE DOWN) that should preprocessed. In the latter case, send the key to the control only if it is not consumed by the preprocessing phase. One of the System. Windows.Forms.Keys values.

xxxxx) OnCloseUp

[C#] protected virtual void OnCloseUp(EventArgs event args);

[C++] protected: virtual void OnCloseUp(EventArgs* event args);

[VB] Overridable Protected Sub OnCloseUp(ByVal event args As EventArgs)

[JScript] protected function OnCloseUp(eventargs: Event Args);

Description

Raises the System.Windows.Forms.DateTime-Picker.CloseUp event.

The System.Windows.Forms.DateTimePicker.CloseUp event occurs when the drop-down calendar is dismissed and disappears. An System.EventArgs that contains the event data.

yyyyy) OnDropDown

[C#] protected virtual void OnDropDown(EventArgs event args);

[C++] protected: virtual void OnDropDown(EventArgs* eventargs);

[VB] Overridable Protected Sub OnDropDown(ByVal event args As EventArgs)

[JScript] protected function OnDropDown(eventargs: Event Args);

Description

Raises the System.Windows.Forms.DateTime-Picker.DropDown event.

The System.Windows.Forms.DateTimePicker.DropDown event occurs when the drop-down calendar is shown. An System.EventArgs that contains the event data.

zzzzz) OnFontChanged

[C#] protected override void OnFontChanged(EventArgs e);

[C++] protected: void OnFontChanged(EventArgs* e);

[VB] Overrides Protected Sub OnFontChanged(ByVal e As EventArgs)

[JScript] protected override function OnFontChanged(e: EventArgs);

Description

Occurs when a property for the control changes. Event data aaaaaa) OnFormatChanged

[C#] protected virtual void OnFormatChanged(EventArgs e);

[C++] protected: virtual void OnFormatChanged(Event Args* e);

[VB] Overridable Protected Sub OnFormatChanged(ByVal e As EventArgs)

[JScript] protected function OnFormatChanged(e: Event Args);

Description

Raises the System.Windows.Forms.DateTimePicker. FormatChanged event.

The System.Windows.Forms.DateTime-Picker.FormatChanged event occurs when the System.Windows.Forms.DateTimePicker.Format property value has changed. An System.EventArgs that contains the event data.

bbbbbb) OnSystemColorsChanged

[C#] protected override void OnSystemColorsChanged(EventArgs e);

[C++] protected: void OnSystemColorsChanged(Event Args* e);

[VB] Overrides Protected Sub OnSystemColorsChanged (ByVal e As EventArgs)

[JScript] protected override function OnSystemColors Changed(e: EventArgs);

Description

Handles system color changes Handles system color changes cccccc) On ValueChanged

[C#] protected virtual void OnValueChanged(EventArgs eventargs);

[C++] protected: virtual void OnValueChanged(EventArgs* eventargs);

[VB] Overridable Protected Sub OnValueChanged(ByVal eventargs As EventArgs)

[JScript] protected function OnValueChanged(eventargs: EventArgs);

Description

Raises the System.Windows.Forms.DateTimePicker. Value Changed event.

The System.Windows.Forms.DateTimePicker. Value Changed event occurs when the value for the control changes. An System.EventArgs that contains the event data.

dddddd) SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As BoundsSpecified)

[JScript] protected override function SetBoundsCore(x: int, y: int, width: int, height: int, specified: BoundsSpecified);

Description

Restricts the vertical size of the control Restricts the vertical size of the control eeeeee) ToString

[C#] public override string ToString( );

[C++] public: String* ToString( );

[VB] Overrides Public Function ToString( ) As String

[JScript] public override function ToString( ): String;

Description

Returns the control as a string

Return Value: String Returns the control as a string ffffff) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

Overrided wndProc Overrided wndProc

DateTimePicker.DateTimePickerAccessibleObject class (System.Windows.Forms)

a) WndProc

Description

Description b) DateTimePicker.DateTimePickerAccessibleObject

Example Syntax:

c) WndProc

[C#] public DateTimePicker.DateTimePickerAccessibleObject(DateTimePicker owner);

[C++] public: DateTimePickerAccessibleObject(DateTimePicker* owner);

[VB] Public Sub New(ByVal owner As DateTimePicker)

[JScript] public function DateTimePicker.DateTimePickerAccessibleObject(owner: DateTimePicker);

Description d) Bounds e) DefaultAction f) Description g) Handle h) Help i) KeyboardShortcut j) Name k) Owner l) Parent m) Role n) State o) WndProc Description p) Value q) WndProc

[C#] public override string Value {get;}

[C++] public: _property virtual String* get_Value( );

[VB] Overrides Public ReadOnly Property Value As String

[JScript] public function get Value( ): String;

Description

DateTimePickerFormat enumeration (System.Windows.Forms)

a) UseStdAccessibleObjects

Description

Specifies the date and time format the System.Windows.Forms.DateTimePicker control displays.

This enumeration is used by members such as System.Windows.Forms.DateTimePicker.Format.

b) UseStdAccessibleObjects

[C#] public const DateTimePickerFormat Custom;

[C++] public: const DateTimePickerFormat Custom;

[VB] Public Const Custom As DateTimePickerFormat

[JScript] public var Custom: DateTimePickerFormat;

Description

The System.Windows.Forms.DateTimePicker control displays the date-time value in a custom format.

c) UseStdAccessibleObjects

[C#] public const DateTimePickerFormat Long;

[C++] public: const DateTimePickerFormat Long;

[VB] Public Const Long As DateTimePickerFormat

[JScript] public var Long: DateTimePickerFormat;

Description

The System.Windows.Forms.DateTimePicker control displays the date-time value in the long date format set by the user's operating system.

d) UseStdAccessibleObjects

[C#] public const DateTimePickerFormat Short;

[C++] public: const DateTimePickerFormat Short;

[VB] Public Const Short As DateTimePickerFormat

[JScript] public var Short: DateTimePickerFormat;

Description

The System.Windows.Forms.DateTimePicker control displays the date-time value in the short date format set by the user's operating system.

e) UseStdAccessibleObjects

[C#] public const DateTimePickerFormat Time;

[C++] public: const DateTimePickerFormat Time;

[VB] Public Const Time As DateTimePickerFormat

[JScript] public var Time: DateTimePickerFormat;

Description

The System.Windows.Forms.DateTimePicker control displays the date-time value in the time format set by the user's operating system.

Day enumeration (System.Windows.Forms)

a) ToString

Description

Specifies the day of the week.

This class is used by only System.Windows.Forms.MonthCalendar.

b) ToString

[C#] public const Day Default;

[C++] public: const Day Default;

[VB] Public Const Default As Day

[JScript] public var Default: Day;

Description

A default day of the week specified by the application.

c) ToString

[C#] public const Day Friday;

[C++] public: const Day Friday;

[VB] Public Const Friday As Day

[JScript] public var Friday: Day;

Description

The day Friday.

d) ToString

[C#] public const Day Monday;

[C++] public: const Day Monday;

[VB] Public Const Monday As Day

[JScript] public var Monday: Day;

Description

The day Monday.

e) ToString

[C#] public const Day Saturday;

[C++] public: const Day Saturday;

[VB] Public Const Saturday As Day

[JScript] public var Saturday: Day;

Description

The day Saturday.

f) ToString

[C#] public const Day Sunday;

[C++] public: const Day Sunday;

[VB] Public Const Sunday As Day

[JScript] public var Sunday: Day;

Description

The day Sunday.

g) ToString

[C#] public const Day Thursday;

[C++] public: const Day Thursday;

[VB] Public Const Thursday As Day

[JScript] public var Thursday: Day;

Description

The day Thursday.

h) ToString

[C#] public const Day Tuesday;

[C++] public: const Day Tuesday;

[VB] Public Const Tuesday As Day

[JScript] public var Tuesday: Day;

Description

The day Tuesday.

i) ToString

[C#] public const Day Wednesday;

[C++] public: const Day Wednesday;

[VB] Public Const Wednesday As Day

[JScript] public var Wednesday: Day;

Description

The day Wednesday.

DialogResult enumeration (System.Windows.Forms)

a) ToString

Description

Specifies identifiers to indicate the return value of a dialog box.

The System.Windows.Forms.Button.DialogResult property and the System.Windows.Forms.Form.ShowDialog method use this enumeration.

b) ToString

[C#] public const DialogResult Abort;

[C++] public: const DialogResult Abort;

[VB] Public Const Abort As DialogResult

[JScript] public var Abort: DialogResult;

Description

The dialog box return value is Abort (usually sent from a button labeled Abort).

c) ToString

[C#] public const DialogResult Cancel;

[C++] public: const DialogResult Cancel;

[VB] Public Const Cancel As DialogResult

[JScript] public var Cancel: DialogResult;

Description

The dialog box return value is Cancel (usually sent from a button labeled Cancel).

d) ToString

[C#] public const DialogResult Ignore;

[C++] public: const DialogResult Ignore;

[VB] Public Const Ignore As DialogResult

[JScript] public var Ignore: DialogResult;

Description

The dialog box return value is Ignore (usually sent from a button labeled Ignore).

e) ToString

[C#] public const DialogResult No;

[C++] public: const DialogResult No;

[VB] Public Const No As DialogResult

[JScript] public var No: DialogResult;

Description

The dialog box return value is No (usually sent from a button labeled No).

f) ToString

[C#] public const DialogResult None;

[C++] public: const DialogResult None;

[VB] Public Const None As DialogResult

[JScript] public var None: DialogResult;

Description

Nothing is returned from the dialog box. This means that the modal dialog continues running.

g) ToString

[C#] public const DialogResult OK;

[C++] public: const DialogResult OK;

[VB] Public Const OK As DialogResult

[JScript] public var OK: DialogResult,

Description

The dialog box return value is OK (usually sent from a button labeled OK).

h) ToString

[C#] public const DialogResult Retry;

[C++] public: const DialogResult Retry;

[VB] Public Const Retry As DialogResult

[JScript] public var Retry: DialogResult;

Description

The dialog box return value is Retry (usually sent from a button labeled Retry).

i) ToString

[C#] public const DialogResult Yes;

[C++] public: const DialogResult Yes;

[VB] Public Const Yes As DialogResult

[JScript] public var Yes: DialogResult;

Description

The dialog box return value is Yes (usually sent from a button labeled Yes).

ScrollableControl.DockPaddingEdges class (System.Windows.Forms)

a) ToString

Description

Determines the border padding for docked controls.

The System.Windows.Forms.ScrollableControl. DockPaddingEdges class creates a margin on a given edge or all edges of a docked control. You may set the width of this margin for each individual edge by setting the following properties: System.Windows.Forms.ScrollableControl.DockPadding Edges.Bottom, System.Windows. Forms.ScrollableControl.DockPaddingEdges.Top, System. Windows.Forms.ScrollableControl.DockPadding Edges.Left, System.Windows. Forms.ScrollableControl.DockPaddingEdges.Right. Alternatively, you may set all the edges to the same width simultaneously by setting the System.Windows.Forms.ScrollableControl.DockPaddingEdges.All property. If the size of the control is too large for its container, the control will be resized to fit in the container, minus the specified margin width.

b) All c) ToString

[C#] public int All {get; set;}

[C++] public: _property int get_All( ); public: _property void set_All(int);

[VB] Public Property All As Integer

[JScript] public function get All( ): int; public function set All(int);

Description

Gets or sets the padding width for all edges of a docked control.

The padding width assigned to this property is applied to all edges of the docked control.

d) Bottom e) ToString

[C#] public int Bottom {get; set;}

[C++] public: _property int get_Bottom( ); public: _property void set_Bottom(int);

[VB] Public Property Bottom As Integer

[JScript] public function get Bottom( ): int; public function set Bottom(int);

Description

Gets or sets the padding width for the bottom edge of a docked control.

The padding width assigned to this property is applied only to the bottom edge of the docked control.

f) Left g) ToString

[C#] public int Left {get; set;}

[C++] public: _property int get_Left( ); public: _property void set_Left(int);

[VB] Public Property Left As Integer

[JScript] public function get Left( ): int; public function set Left(int);

Description

Gets or sets the padding width for the left edge of a docked control.

The padding width assigned to this property is applied only to the left edge of the docked control.

h) Right i) ToString

[C#] public int Right {get; set;}

[C++] public: _property int get_Right( ); public: _property void set_Right(int);

[VB] Public Property Right As Integer

[JScript] public function get Right( ): int; public function set Right(int);

Description

Gets or sets the padding width for the right edge of a docked control.

The padding width assigned to this property is applied only to the right edge of the docked control.

j) Top k) ToString

[C#] public int Top {get; set;}

[C++] public: _property int get Top( ); public: _property void set Top(int);

[VB] Public Property Top As Integer

[JScript] public function get Top( ): int; public function set Top(int);

Description

Gets or sets the padding width for the top edge of a docked control.

The padding width assigned to this property is applied only to the top edge of the docked control.

l) Equals

[C#] public override bool Equals(object other);

[C++] public: bool Equals(Object* other);

[VB] Overrides Public Function Equals(ByVal other As Object) As Boolean

[JScript] public override function Equals(other: Object): Boolean;

Description m) GetHashCode

[C#] public override int GetHashCode( );

[C++] public: int GetHashCode( );

[VB] Overrides Public Function GetHashCode( ) As Integer

[JScript] public override function GetHashCode( ): int;

Description n) ICloneable.Clone

[C#] object ICloneable.Clone( );

[C++] Object* ICloneable::Clone( );

[VB] Function Clone( ) As Object Implements ICloneable.Clone

[JScript] function ICloneable.Clone( ): Object;

o) ToString

[C#] public override string ToString( );

[C++] public: String* ToString( );

[VB] Overrides Public Function ToString( ) As String

[JScript] public override function ToString( ): String;

ScrollableControl.DockPaddingEdgesConverter class (System.Windows.Forms)

a) ToString b) ScrollableControl.DockPaddingEdgesConverter

Example Syntax:

c) ToString d) GetProperties

[C#] public override PropertyDescriptorCollection GetProperties(ITypeDescriptorContext context, object value, Attribute[ ] attributes);

[C++] public: PropertyDescriptorCollection* GetProperties (ITypeDescriptorContext* context, Object* value, Attribute* attributes[ ]);

[VB] Overrides Public Function GetProperties(ByVal context As ITypeDescriptorContext, ByVal value As Object, ByVal attributes( ) As Attribute) As PropertyDescriptorCollection

[JScript] public override function GetProperties(context: ITypeDescriptorContext, value: Object, attributes: Attribute[ ]): PropertyDescriptorCollection;

Description

Retrieves the set of properties for this type. By default, a type has does not return any properties. An easy implementation of this method can just call TypeDescriptor.GetProperties for the correct data type.

Return Value: The set of properties that should be exposed for this data type. If no properties should be exposed, this may return null. The default implementation always returns null. A type descriptor through which additional context may be provided. The value of the object to get the properties for.

e) GetPropertiesSupported

[C#] public override bool GetPropertiesSupported(ITypeDescriptorContext context);

[C++] public: bool GetPropertiesSupported(ITypeDescriptorContext* context);

[VB] Overrides Public Function GetPropertiesSupported (ByVal context As ITypeDescriptorContext) As Boolean

[JScript] public override function GetPropertiesSupported (context: ITypeDescriptorContext): Boolean;

Description

Determines if this object supports properties. By default, this is false.

Return Value: Returns true if GetProperties should be called to find the properties of this object. A type descriptor through which additional context may be provided.

DockStyle enumeration (System.Windows.Forms)

a) ToString

Description

Specifies the position and manner in which a control is docked.

This enumeration is used by members such as System.Windows.Forms.Control.Dock.

b) ToString

[C#] public const DockStyle Bottom;

[C++] public: const DockStyle Bottom;

[VB] Public Const Bottom As DockStyle

[JScript] public var Bottom: DockStyle;

Description

The control's bottom edge is docked to the bottom of its containing control.

c) ToString

[C#] public const DockStyle Fill;

[C++] public: const DockStyle Fill;

[VB] Public Const Fill As DockStyle

[JScript] public var Fill: DockStyle;

Description

All the control's edges are docked to the all edges of its containing control and sized appropriately.

d) ToString

[C#] public const DockStyle Left;

[C++] public: const DockStyle Left;

[VB] Public Const Left As DockStyle

[JScript] public var Left: DockStyle;

Description

The control's left edge is docked to the left edge of its containing control.

e) ToString

[C#] public const DockStyle None;

[C++] public: const DockStyle None;

[VB] Public Const None As DockStyle

[JScript] public var None: DockStyle;

Description

The control is not docked.

f) ToString

[C#] public const DockStyle Right;

[C++] public: const DockStyle Right;

[VB] Public Const Right As DockStyle

[JScript] public var Right: DockStyle;

Description

The control's right edge is docked to the right edge of its containing control.

g) ToString

[C#] public const DockStyle Top;

[C++] public: const DockStyle Top;

[VB] Public Const Top As DockStyle

[JScript] public var Top: DockStyle;

Description

The control's top edge is docked to the top of its containing control.

DomainUpDown.DomainItemAccessibleObject class (System.Windows.Forms)

a) ToString

Description b) DomainUpDown.DomainItemAccessibleObject

Example Syntax c) ToString

[C#] public DomainUpDown.DomainItemAccessibleObject (string name, AccessibleObject parent);

[C++] public: DomainItemAccessibleObject(String* name, AccessibleObject* parent);

[VB] Public Sub New(ByVal name As String, ByVal parent As AccessibleObject)

[JScript] public function DomainUpDown.DomainItemAccessibleObject(name: String, parent AccessibleObject);

Description d) Bounds e) DefaultAction f) Description g) Help h) KeyboardShortcut i) Name j) ToString Description k) Parent l) ToString

[C#] public override AccessibleObject Parent {get;}

[C++] public: _property virtual AccessibleObject* get_Parent( );

[VB] Overrides Public ReadOnly Property Parent As AccessibleObject

[JScript] public function get Parent( ): AccessibleObject;

Description m) Role n) ToString

[C#] public override AccessibleRole Role {get;}

[C++] public: _property virtual AccessibleRole get_Role( );

[VB] Overrides Public ReadOnly Property Role As AccessibleRole

[JScript] public function get Role( ): AccessibleRole;

Description o) State p) ToString

[C#] public override AccessibleStates State {get;}

[C++] public: _property virtual AccessibleStates get_State( );

[VB] Overrides Public ReadOnly Property State As AccessibleStates

[JScript] public function get State( ): AccessibleStates;

Description q) Value r) ToString

[C#] public override string Value {get;}

[C++] public: _property virtual String* get_Value( );

[VB] Overrides Public ReadOnly Property Value As String

[JScript] public function get Value( ): String;

Description

DomainUpDown class (System.Windows.Forms)

a) UseStdAccessibleObjects

Description

Represents a Windows up-down control that displays string values.

A System.Windows.Forms.DomainUpDown control displays a single string value that is selected from an System.Object collection by clicking the up or down buttons of the control. The user can also enter text in the control, unless the System.Windows.Forms.UpDownBase.ReadOnly property is set to true (the string typed in must match an item in the collection to be accepted). When an item is selected, the object is converted to a string value so it may be displayed in the up-down control.

b) DomainUpDown

Example Syntax:

c) UseStdAccessibleObjects

[C#] public DomainUpDown( );

[C++] public: DomainUpDown( );

[VB] Public Sub New( )

[JScript] public function DomainUpDown( );

Description

Initializes a new instance of the System.Windows.Forms.DomainUpDown class.

d) AccessibilityObject e) AccessibleDefaultActionDescription f) AccessibleDescription g) AccessibleName h) AccessibleRole i) ActiveControl j) AllowDrop k) Anchor
l) AutoScroll
m) AutoScrollMargin
n) AutoScrollMinSize
o) AutoScrollPosition
p) BackColor
q) BackgroundImage
r) BindingContext
s) BorderStyle
t) Bottom
u) Bounds
v) CanFocus
w) CanSelect
x) Capture
y) Causes Validation
z) ChangingText
aa) ClientRectangle
bb) ClientSize
cc) CompanyName
dd) Container
ee) ContainsFocus
ff) ContextMenu
gg) Controls
hh) Created
ii) CreateParams
jj) Cursor
kk) DataBindings
ll) DefaultImeMode
mm) DefaultSize
nn) DesignMode
oo) DisplayRectangle
pp) Disposing
qq) Dock
rr) DockPadding
ss) Enabled
tt) Events
uu) Focused
vv) Font
ww) FontHeight
xx) ForeColor
yy) Handle
zz) HasChildren
aaa) Height
bbb) HScroll
ccc) ImeMode
ddd) InterceptArrowKeys
eee) InvokeRequired
fff) IsAccessible
ggg) IsDisposed
hhh) IsHandleCreated
iii) Items
jjj) UseStdAccessibleObjects Description A collection of objects assigned to the up-down control.

The System.Object collection may be built and made available to the System.Windows.Forms.DomainUpDown control in two ways. You can add items to the collection by using the System.Collections.ArrayList.Add(System.Object) or System.Collections.ArrayList.Insert(System.Int32, System.Object) methods.

kkk) Left
lll) Location
mmm) Name
nnn) Parent
ooo) ParentForm
ppp) PreferredHeight
qqq) ProductName
rrr) ProductVersion
sss) ReadOnly
ttt) RecreatingHandle
uuu) Region
vvv) RenderRightToLeft
www) ResizeRedraw
xxx) Right
yyy) RightToLeft
zzz) SelectedIndex
aaaa) UseStdAccessibleObjects Description Gets or sets the index value of the selected item.

The System.Windows.Forms.DomainUpDown. SelectedIndex property holds the index value of the item in the collection that is currently selected in the up-down control. Collection items may be re-assigned new index values if the System.Windows.Forms.DomainUpDown.Sorted property has been changed from false to true. As the collection is re-sorted alphabetically, the items will be assigned a new index value.

bbbb) SelectedItem
cccc) UseStdAccessibleObjects

[C#] public object SelectedItem {get; set;}

[C++] public: _property Object* get_SelectedItem( ); public: _property void set_SelectedItem(Object*);

[VB] Public Property SelectedItem As Object

[JScript] public function get SelectedItem( ): Object; public function set SelectedItem(Object);

Description

Gets or sets the selected item based on the index value of the selected item in the collection.

When this property is set, the value is validated to be one of the items in the collection, and the System.Windows.Forms.DomainUpDown.SelectedIndex property is set to the appropriate index value.

dddd) ShowFocusCues
eeee) ShowKeyboardCues
ffff) Site
gggg) Size
hhhh) Sorted
iiii) UseStdAccessibleObjects Description Gets or sets a value indicating whether the item collection is sorted.

When System.Windows.Forms.DomainUpDown.Sorted is set to true, the collection is sorted in alphabetical order.

jjjj) TabIndex
kkkk) TabStop
llll) Tag
mmmm) Text
nnnn) TextAlign
oooo) Top
pppp) TopLevelControl
qqqq) UpDownAlign
rrrr) UserEdit
ssss) Visible
tttt) VScroll
uuuu) Width
vvvv) WindowTarget wwww) Wrap xxxx) UseStdAccessibleObjects Description Gets or sets a value indicating whether the collection of items continues to the first or last item if the user continues past the end of the list.

When System.Windows.Forms.DomainUpDown.Wrap is set to true, if you reach the last item in the collection and continue, the list will start over with the first item and appear to be continuous. This behavior works in reverse as well.

yyyy) UseStdAccessibleObjects

Description

Occurs when the System.Windows.Forms.DomainUpDown.SelectedItem property has been changed.

For the System.Windows.Forms.DomainUpDown. SelectedItemChanged event to occur, the System.Windows.Forms. DomainUpDown.SelectedItem property can be changed in code, by the user typing in a new value or clicking the control's up or down buttons.

zzzz) CreateAccessibilityInstance

[C#] protected override AccessibleObject CreateAccessibilityInstance( );

[C++] protected: AccessibleObject* CreateAccessibilityInstance( );

[VB] Overrides Protected Function CreateAccessibilityInstance( ) As AccessibleObject

[JScript] protected override function CreateAccessibilityInstance( ): AccessibleObject;

Description

Constructs the new instance of the accessibility object for this control. Subclasses should not call base.CreateAccessibilityObject.

aaaaa) DownButton

[C#] public override void DownButton( );

[C++] public: void DownButton( );

[VB] Overrides Public Sub DownButton( )

[JScript] public override function DownButton( );

Description

Displays the next item in the object collection.

As you move through the collection of items in the System. Windows.Forms.DomainUpDown control using the down button, you will eventually reach the last item in the collection. If you continue, and System.Windows.Forms.DomainUpDown.Wrap is set to true, the list will start over with the first item in the collection and appear to be continuous. This behavior is also true when moving through the collection using the up button.

bbbbb) OnChanged

[C#] protected override void OnChanged(object source, EventArgs e);

[C++] protected: void OnChanged(Object* source, Event Args* e);

[VB] Overrides Protected Sub OnChanged(ByVal source As Object, ByVal e As EventArgs)

[JScript] protected override function OnChanged(source: Object, e: EventArgs);

Description

In the case of a DomainUpDown, the handler for changing values is called OnSelectedItemChanged—so just forward it to that function.

ccccc) OnSelectedItemChanged

[C#] protected void OnSelectedItemChanged(object source, EventArgs e);

[C++] protected: void OnSelectedItemChanged(Object* source, EventArgs* e);

[VB] Protected Sub OnSelectedItemChanged(ByVal source As Object, ByVal e As EventArgs)

[JScript] protected function OnSelectedItemChanged (source: Object, e: EventArgs);

Description

Raises the System.Windows.Forms.DomainUpDown.SelectedItemChanged event.

Raising an event invokes the event handler through a delegate. For more information, see. The source of the event. An System.EventArgs that contains the event data.

ddddd) On TextBoxKeyDown

[C#] protected override void OnTextBoxKeyDown(object source, KeyEventArgs e);

[C++] protected: void OnTextBoxKeyDown(Object* source, KeyEventArgs* e);

[VB] Overrides Protected Sub OnTextBoxKeyDown(ByVal source As Object, ByVal e As KeyEventArgs)

[JScript] protected override function OnTextBoxKeyDown (source Object, e: KeyEventArgs);

Description

DEV: Overridden OnTextBoxKeyDown—when the user types a key in a read-only domain updown, the first/next item in the domain list is selected.

eeeee) ToString

[C#] public override string ToString( );

[C++] public: String* ToString( );

[VB] Overrides Public Function ToString( ) As String

[JScript] public override function ToString( ): String;

Description

Provides some interesting info about this control in String form.

Return Value: String Provides some interesting info about this control in String form.

fffff) UpButton

[C#] public override void UpButton( );

[C++] public: void UpButton( );

[VB] Overrides Public Sub UpButton( )

[JScript] public override function UpButton( );

Description

Displays the previous item in the collection.

As you move through the collection of items in the System. Windows.Forms.DomainUpDown control using the up button, you will eventually reach the first item in the collection. If you continue, and System.Windows.Forms.DomainUpDown.Wrap is set to true, the list will start over with the last item in the collection and appear to be continuous. This behavior is also true when moving through the collection using the down button.

ggggg) UpdateEditText

[C#] protected override void UpdateEditText( );

[C++] protected: void UpdateEditText( );

[VB] Overrides Protected Sub UpdateEditText( )

[JScript] protected override function UpdateEditText( );

Description

Updates the text in the up-down control to display the selected item.

DomainUpDown.DomainUpDownAccessibleObject class (System.Windows.Forms)

a) WndProc

Description b) DomainUpDown.DomainUpDownAccessibleObject

Example Syntax:

c) WndProc

[C#] public DomainUpDown.DomainUpDownAccessibleObject(Control owner);

[C++] public: DomainUpDownAccessibleObject(Control* owner);

[VB] Public Sub New(ByVal owner As Control)

[JScript] public function DomainUpDown.DomainUpDownAccessibleObject(owner: Control);

Description d) Bounds e) DefaultAction f) Description g) Handle h) Help i) KeyboardShortcut j) Name k) Owner l) Parent m) Role n) WndProc Description o) State p) Value q) GetChild

[C#] public override AccessibleObject GetChild(int index);

[C++] public: AccessibleObject* GetChild(int index);

[VB] Overrides Public Function GetChild(ByVal index As Integer) As AccessibleObject

[JScript] public override function GetChild(index: int): AccessibleObject;

Description r) GetChildCount

[C#] public override int GetChildCount( );

[C++] public: int GetChildCount( );

[VB] Overrides Public Function GetChildCount( ) As Integer

[JScript] public override function GetChildCount( ): int;

Description

DomainUpDown.DomainUpDownItemCollection class (System.Windows.Forms)

a) UseStdAccessibleObjects

Description

Encapsulates a collection of objects for use by the System.Windows.Forms.DomainUpDown class.

To create a collection of objects to display in the System.Windows.Forms.DomainUpDown control, you can add or remove the items individually by using the System.Windows.Forms.DomainUpDown.DomainUpDownItem Collection.Add(System.Object) and System.Windows.Forms.DomainUpDown.DomainUpDownItemCollection.Remove(System.Object) methods. The collection is accessed from the parent control, System.Windows.Forms.DomainUpDown, by the System. Windows.Forms.DomainUpDown.Items property.

b) Capacity c) Count d) IsFixedSize e) IsReadOnly f) IsSynchronized g) Item h) UseStdAccessibleObjects Description Gets or sets the item at the specified indexed location in the collection.

To assign items to a specific location, or to retrieve them from the System.Windows.Forms.DomainUpDown. DomainUpDownItemCollection, you can reference the collection object with a specific index value. The index value of the System.Windows.Forms.DomainUpDown.DomainUpDownItemCollection is a zero-based index. The indexed location of the item in the collection.

i) SyncRoot j) Add

[C#] public override int Add(object item);

[C++] public: int Add(Object* item);

[VB] Overrides Public Function Add(ByVal item As Object) As Integer

[JScript] public override function Add(item: Object): int;

Description

Adds a the specified object to the end of the collection.

Return Value: The zero-based index value of the System.Object added to the collection.

You can also add a new System.Object to the collection by using the System.Windows.Forms.DomainUpDown.DomainUpDownItemCollection.Insert(System.Int32, System. Object) method. The System.Object to be added to the end of the collection.

k) Insert

[C#] public override void Insert(int index, object item);

[C++] public: void Insert(int index, Object* item);

[VB] Overrides Public Sub Insert(ByVal index As Integer, ByVal item As Object)

[JScript] public override function Insert(index: int, item: Object);

Description

Inserts an existing toolbar button in the toolbar button collection at the specified location.

You can also add a new System.Object to the collection by using the System.Windows.Forms.DomainUpDown.DomainUpDownItemCollection.Add(System.Object) method. The indexed location within the collection to insert the System.Object. The System.Object to insert.

l) Remove

[C#] public override void Remove(object item);

[C++] public: void Remove(Object* item);

[VB] Overrides Public Sub Remove(ByVal item As Object)

[JScript] public override function Remove(item: Object);

Description

Removes the specified item from the collection.

You can also remove an System.Object that you have previously added by using the System.Windows.Forms.DomainUpDown.DomainUpDownItemCollection.RemoveAt(System.Int32) method. The System.Object to remove from the collection.

m) RemoveAt

[C#] public override void RemoveAt(int item);

[C++] public: void RemoveAt(int item);

[VB] Overrides Public Sub RemoveAt(ByVal item As Integer)

[JScript] public override function RemoveAt(item: int);

Description

Removes the item from the specified location in the collection.

You can also remove an System.Object that you have previously added by using the System.Windows.Forms.DomainUpDown.DomainUpDownItemCollection.Remove(System.Object) method. The indexed location of the System.Object in the collection.

DragAction enumeration (System.Windows.Forms)

a) TrimToSize

Description

Specifies how and if a drag-and-drop operation should continue.

This enumeration is used by System.Windows.Forms.QueryContinueDragEventArgs.

b) TrimToSize

[C#] public const DragAction Cancel;

[C++] public: const DragAction Cancel;

[VB] Public Const Cancel As DragAction

[JScript] public var Cancel: DragAction;

Description

The operation is canceled with no drop message.

c) TrimToSize

[C#] public const DragAction Continue;

[C++] public: const DragAction Continue;

[VB] Public Const Continue As DragAction

[JScript] public var Continue: DragAction;

Description

The operation will continue.

d) TrimToSize

[C#] public const DragAction Drop;

[C++] public: const DragAction Drop;

[VB] Public Const Drop As DragAction

[JScript] public var Drop: DragAction;

Description

The operation will stop with a drop.

DragDropEffects enumeration (System.Windows.Forms)

a) ToString

Description

Specifies the effects of a drag-and-drop operation.

This enumeration is used by the following classes: System.Windows.Forms.DragEventArgs, System.Windows.Forms.GiveFeedbackEventArgs, and System.Windows.Forms.Control.

b) ToString

[C#] public const DragDropEffects All;

[C++] public: const DragDropEffects All;

[VB] Public Const All As DragDropEffects

[JScript] public var All: DragDropEffects;

Description

The data is copied, removed from the drag source, and scrolled in the drop target.

c) ToString

[C#] public const DragDropEffects Copy;

[C++] public: const DragDropEffects Copy;

[VB] Public Const Copy As DragDropEffects

[JScript] public var Copy: DragDropEffects;

Description

The data is copied to the drop target.

d) ToString

[C#] public const DragDropEffects Link;

[C++] public: const DragDropEffects Link;

[VB] Public Const Link As DragDropEffects

[JScript] public var Link: DragDropEffects;

Description

The data from the drag source is linked to the drop target.

e) ToString

[C#] public const DragDropEffects Move;

[C++] public: const DragDropEffects Move;

[VB] Public Const Move As DragDropEffects

[JScript] public var Move: DragDropEffects;

Description

The data from the drag source is moved to the drop target.

f) ToString

[C#] public const DragDropEffects None;

[C++] public: const DragDropEffects None;

[VB] Public Const None As DragDropEffects

[JScript] public var None: DragDropEffects;

Description

The drop target does not accept the data.

g) ToString

[C#] public const DragDropEffects Scroll;

[C++] public: const DragDropEffects Scroll;

[VB] Public Const Scroll As DragDropEffects

[JScript] public var Scroll: DragDropEffects;

Description

Scrolling is about to start or is currently occurring in the drop target.

DragEventArgs class (System.Windows.Forms)

a) ToString

Description

Provides data for the System.Windows.Forms.Control.DragDrop, System.Windows.Forms.Control.DragEnter, or System.Windows.Forms.Control.DragOver event.

The System.Windows.Forms.Control.DragDrop event occurs when the user completes a drag-and-drop operation by dragging an object over the control and then dropping it onto the control by releasing the mouse button. The System.Windows.Forms.Control.DragEnter event occurs when the user moves the mouse pointer onto the control while dragging an object with the mouse. The System.Windows.Forms.Control.DragOver event occurs when the user moves the mouse pointer over the control while dragging an object with the mouse.

b) DragEventArgs

Example Syntax:

c) ToString

[C#] public DragEventArgs(IDataObject data, int keyState, int x, int y, DragDropEffects allowedEffect, DragDropEffects effect);

[C++] public: DragEventArgs(IDataObject* data, int keyState, int x, int y, DragDropEffects allowedEffect, DragDropEffects effect);

[VB] Public Sub New(ByVal data As IDataObject, ByVal keyState As Integer, ByVal x As Integer, ByVal y As Integer, ByVal allowedEffect As DragDropEffects, ByVal effect As DragDropEffects)

[JScript] public function DragEventArgs(data: IDataObject, keyState: int, x: int, y: int, allowedEffect: DragDropEffects, effect: DragDropEffects);

Description

Initializes a new instance of the System.Windows.Forms.DragEventArgs class. The data associated with this event. The current state of the SHIFT, CTRL, and ALT keys. The x-coordinate of the mouse cursor in pixels. The y-coordinate of the mouse cursor in pixels. One of the System.Windows.Forms.DragDropEffects values. One of the System.Windows.Forms.DragDropEffects values.

d) AllowedEffect e) ToString

[C#] public DragDropEffects AllowedEffect {get;}

[C++] public: _property DragDropEffects get_AllowedEffect( );

[VB] Public ReadOnly Property AllowedEffect As DragDropEffects

[JScript] public function get AllowedEffect( ): DragDropEffects;

Description

Gets which drag-and-drop operations are allowed by the originator (or source) of the drag event.

For example, when you start dragging a file from a source, if the file is read-only (or from a read-only storage medium such as a CD), the source will indicate that the file can be copied, but not transferred, to the target.

f) Data g) ToString

[C#] public IDataObject Data {get;}

[C++] public: _property IDataObject* get_Data( );

[VB] Public ReadOnly Property Data As IDataObject

[JScript] public function get Data( ): IDataObject;

Description

Gets the System.Windows.Forms.IDataObject that contains the data associated with this event.

h) Effect i) ToString

[C#] public DragDropEffects Effect {get; set;}

[C++] public: _property DragDropEffects get_Effect( ); public: _property void set_Effect(DragDropEffects);

[VB] Public Property Effect As DragDropEffects

[JScript] public function get Effect( ): DragDropEffects; public function set Effect(DragDropEffects);

Description

Gets or sets which drag-and-drop operations are allowed by the target of the drag event.

For example, when you drag a file from a source, if you press the CTRL key, the target will try to make it a copy operation.

j) KeyState k) ToString

[C#] public int KeyState {get;}

[C++] public: _property int get_KeyState( );

[VB] Public ReadOnly Property KeyState As Integer

[JScript] public function get KeyState( ): int;

Description

Gets the current state of the SHIFT, CTRL, and ALT keys.

l) X m) ToString

[C#] public int x {get;}

[C++] public: _property int get_X( );

[VB] Public ReadOnly Property X As Integer

[JScript] public function get X( ): int;

Description

Gets the x-coordinate of the mouse pointer.

n) Y o) ToString

[C#] public int Y {get;}

[C++] public: _property int get_Y( );

[VB] Public ReadOnly Property Y As Integer

[JScript] public function get Y( ): int;

Description

Gets the y-coordinate of the mouse pointer.

DragEventHandler delegate (System.Windows.Forms)

a) ToString

Description

Represents the method that will handle the System.Windows.Forms.Control.DragDrop, System.Windows.Forms.Control.DragEnter, or System.Windows.Forms.Control.DragOver event of a System.Windows.Forms.Control. The source of the event. A System.Windows.Forms.DragEventArgs that contains the event data.

When you create a System.Windows.Forms.DragEventHandler delegate, you identify the method that will handle the event. To associate the event with your event handler, add an instance of the delegate to the event. The event handler is called whenever the event occurs, unless you remove the delegate. For more information about handling events with delegates, see.

DrawItemEventArgs class (System.Windows.Forms)

a) ToString

Description

Provides data for the DrawItem event.

The DrawItem event is raised by owner draw controls, such as System.Windows.Forms.ListBox and System.Windows.Forms.ComboBox controls. It contains all the information needed for the user to paint the specified item, including the item index, the System.Drawing.Rectangle, and the System.Drawing.Graphics object on which the drawing should be done.

b) DrawItemEventArgs

Example Syntax:

c) ToString

[C#] public DrawItemEventArgs(Graphics graphics, Font font, Rectangle rect, int index, DrawItemState state);

[C++] public: DrawItemEventArgs(Graphics* graphics, Font* font, Rectangle rect, int index, DrawItemState state);

[VB] Public Sub New(ByVal graphics As Graphics, ByVal font As Font, ByVal rect As Rectangle, ByVal index As Integer, ByVal state As DrawItemState)

[JScript] public function DrawItemEventArgs(graphics: Graphics, font: Font, rect: Rectangle, index: int, state: DrawItemState); Initializes a new instance of the System.Windows.Forms.DrawItemEventArgs class.

Description

Initializes a new instance of the System.Windows.Forms.DrawItemEventArgs class for the specified control with the specified font, state, surface to draw on, and the bounds to draw within. The System.Drawing.Graphics surface on which to draw. The System.Drawing.Font to use, usually the parent control's System.Drawing.Font property. The System.Drawing.Rectangle bounds to draw within. The System.Windows.Forms.Control.ControlCollection index value of the item that is being drawn. The control's System.Windows.Forms.DrawItemState information.

d) DrawItemEventArgs

Example Syntax:

e) ToString

[C#] public DrawItemEventArgs(Graphics graphics, Font font, Rectangle rect, int index, DrawItemState state, Color foreColor, Color backColor);

[C++] public: DrawItemEventArgs(Graphics* graphics, Font* font, Rectangle rect, int index, DrawItemState state, Color foreColor, Color backColor);

[VB] Public Sub New(ByVal graphics As Graphics, ByVal font As Font, ByVal rect As Rectangle, ByVal index As Integer, ByVal state As DrawItemState, ByVal foreColor As Color, ByVal backColor As Color)

[JScript] public function DrawItemEventArgs(graphics: Graphics, font: Font, rect: Rectangle, index: int, state: DrawItemState, foreColor: Color, backColor Color);

Description

Initializes a new instance of the System.Windows.Forms.DrawItemEventArgs class for the specified control with the specified font, state, foreground color, background color, surface to draw on, and the bounds to draw within. The System.Drawing.Graphics surface on which to draw. The System.Drawing.Font to use, usually the parent control's System.Drawing.Font property. The System.Drawing.Rectangle bounds to draw within. The System.Windows.Forms. Control.ControlCollection index value of the item that is being drawn. The control's System.Windows.Forms.DrawItemState information. The foreground System.Drawing.Color to draw the control with. The background System.Drawing.Color to draw the control with.

f) BackColor g) ToString

[C#] public Color BackColor {get;}

[C++] public: _property Color get_BackColor( );

[VB] Public ReadOnly Property BackColor As Color

[JScript] public function get BackColor( ): Color;

Description

Gets the background color of the item that is being drawn.

If the item's state is System.Windows.Forms.DrawItemState.Selected, the System.Windows.Forms.DrawItem Event Args.BackColor is set to System.Drawing.SystemColors.HighlightText. If the item's state is not System.Windows.Forms.DrawItemState.Selected, then the System.Windows.Forms.DrawItemEventArgs.BackColor property is set to System.Drawing.SystemColors.Window.

h) Bounds i) ToString

[C#] public Rectangle Bounds {get;}

[C++] public: _property Rectangle get_Bounds( );

[VB] Public ReadOnly Property Bounds As Rectangle

[JScript] public function get Bounds( ): Rectangle;

Description

Gets the rectangle that represents the bounds of the item that is being drawn.

j) Font k) ToString

[C#] public Font Font {get;}

[C++] public: _property Font* get_Font( );

[VB] Public ReadOnly Property Font As Font

[JScript] public function get Font( ): Font;

Description

Gets the font assigned to the item being drawn.

A suggested System.Drawing.Font, usually the parent control's System.Windows.Forms.Control.Font property.

l) ForeColor m) ToString

[C#] public Color ForeColor {get;}

[C++] public: _property Color get_ForeColor( );

[VB] Public ReadOnly Property ForeColor As Color

[JScript] public function get ForeColor( ): Color;

Description

Gets the foreground color of the of the item being drawn.

If the item's state is System.Windows.Forms.DrawItemState.Selected, the System.Windows.Forms.DrawItem Event Args.ForeColor is set to System.Drawing.SystemColors.HighlightText. If the item's state is not System.Windows.Forms.DrawItemState.Selected, then the System.Windows.Forms.DrawItemEventArgs.ForeColor property is set to System.Drawing.SystemColors.WindowText.

n) Graphics o) ToString

[C#] public Graphics Graphics {get;}

[C++] public: _property Graphics* get_Graphics( );

[VB] Public ReadOnly Property Graphics As Graphics

[JScript] public function get Graphics( ): Graphics;

Description

Gets the graphics surface to draw the item on.

p) Index q) ToString

[C#] public int Index {get;}

[C++] public: _property int get_Index( );

[VB] Public ReadOnly Property Index As Integer

[JScript] public function get Index( ): int;

Description

Gets the index value of the item that is being drawn.

This property returns the System.Windows.Forms.Control.ControlCollection.Item(System.Int32) value of the item being drawn in the System.Windows.Forms.Control.ControlCollection.

r) State s) ToString

[C#] public DrawItemState State {get;}

[C++] public: _property DrawItemState get_State( );

[VB] Public ReadOnly Property State As DrawItemState

[JScript] public function get State( ): DrawItemState;

Description

Gets the state of the item being drawn.

This property value may be a combination of the System.Windows.Forms.DrawItemState enumeration members. The members can be combined by use of bitwise operators.

t) DrawBackground

[C#] public virtual void DrawBackground( );

[C++] public: virtual void DrawBackground( );

[VB] Overridable Public Sub DrawBackground( )

[JScript] public function DrawBackground( );

Description

Draws the background within the bounds specified in the System.Windows.Forms.DrawItemEventArgs.#ctor constructor and with the appropriate color.

If the item being drawn is System.Windows.Forms.DrawItemState.Selected, the background is drawn with the text highlighted.

u) DrawFocusRectangle

[C#] public virtual void DrawFocusRectangle( );

[C++] public: virtual void DrawFocusRectangle( );

[VB] Overridable Public Sub DrawFocusRectangle( )

[JScript] public function DrawFocusRectangle( );

Description

Draws a focus rectangle within the bounds specified in the System.Windows.Forms.DrawItemEventArgs.#ctor constructor.

If the item being drawn has System.Windows.Forms.DrawItemState.Focus, the focus rectangle is drawn.

DrawItemEventHandler delegate (System.Windows.Forms)

a) ToString

Description

Represents the method that will handle the DrawItem event of a System.Windows.Forms.ComboBox, System.Windows.Forms.ListBox, System.Windows.Forms.MenuItem, or System.Windows.Forms.TabControl control. The source of the event. A System.Windows.Forms.DrawItemEventArgs that contains the event data.

When you create a System.Windows.Forms.DrawItem Event Args delegate, you identify the method that will handle the event. To associate the event with your event handler, add an instance of the delegate to the event. The event handler is called whenever the event occurs, unless you remove the delegate. For more information about event handler delegates, see.

DrawItemState enumeration (System.Windows.Forms)

a) ToString

Description

Specifies the state of an item that is being drawn.

This enumeration is used by members such as System.Windows.Forms.DrawItemEventArgs.State.

b) ToString

[C#] public const DrawItemState Checked;

[C++] public: const DrawItemState Checked;

[VB] Public Const Checked As DrawItemState

[JScript] public var Checked: DrawItemState;

Description

The item is checked. Only menu controls use this value.

c) ToString

[C#] public const DrawItemState ComboBoxEdit;

[C++] public: const DrawItemState ComboBoxEdit;

[VB] Public Const ComboBoxEdit As DrawItemState

[JScript] public var ComboBoxEdit: DrawItemState;

Description

The item is the editing portion of a System.Windows.Forms. ComboBox.

d) ToString

[C#] public const DrawItemState Default;

[C++] public: const DrawItemState Default;

[VB] Public Const Default As DrawItemState

[JScript] public var Default: DrawItemState;

Description

The item is in its default visual state.

e) ToString

[C#] public const DrawItemState Disabled;

[C++] public: const DrawItemState Disabled;

[VB] Public Const Disabled As DrawItemState

[JScript] public var Disabled: DrawItemState;

Description

The item is disabled.

f) ToString

[C#] public const DrawItemState Focus;

[C++] public: const DrawItemState Focus;

[VB] Public Const Focus As DrawItemState

[JScript] public var Focus: DrawItemState;

Description

The item has focus.

g) ToString

[C#] public const DrawItemState Grayed;

[C++] public: const DrawItemState Grayed;

[VB] Public Const Grayed As DrawItemState

[JScript] public var Grayed: DrawItemState;

Description

The item is grayed. Only menu controls use this value.

h) ToString

[C#] public const DrawItemState HotLight;

[C++] public: const DrawItemState HotLight;

[VB] Public Const HotLight As DrawItemState

[JScript] public var HotLight: DrawItemState;

Description

The item is being hot-tracked (the item is highlighted as the mouse pointer passes over it).

i) ToString

[C#] public const DrawItemState Inactive;

[C++] public: const DrawItemState Inactive;

[VB] Public Const Inactive As DrawItemState

[JScript] public var Inactive: DrawItemState;

Description

The item is inactive.

j) ToString

[C#] public const DrawItemState NoAccelerator;

[C++] public: const DrawItemState NoAccelerator;

[VB] Public Const NoAccelerator As DrawItemState

[JScript] public var NoAccelerator: DrawItemState;

Description

The item displays without a keyboard accelerator.

k) ToString

[C#] public const DrawItemState NoFocusRect;

[C++] public: const DrawItemState NoFocusRect;

[VB] Public Const NoFocusRect As DrawItemState

[JScript] public var NoFocusRect: DrawItemState;

Description

The item displays without the visual cue that indicates it has focus.

l) ToString

[C#] public const DrawItemState None;

[C++] public: const DrawItemState None;

[VB] Public Const None As DrawItemState

[JScript] public var None: DrawItemState;

Description

The item currently has no state.

m) ToString

[C#] public const DrawItemState Selected;

[C++] public: const DrawItemState Selected;

[VB] Public Const Selected As DrawItemState

[JScript] public var Selected: DrawItemState;

Description

The item is selected.

DrawMode enumeration (System.Windows.Forms)

a) ToString

Description

Specifies how the elements of a control are drawn.

This enumeration is used by members, such as System.Windows.Forms.ListBox.DrawMode in the System.Windows.Forms.ListBox, System.Windows.Forms.CheckedListBox, and System.Windows.Forms.ComboBox classes.

b) ToString

[c#] public const DrawMode Normal;

[C++] public: const DrawMode Normal;

[VB] Public Const Normal As DrawMode

[JScript] public var Normal: DrawMode;

Description

All the elements in a control are drawn by the operating system and are of the same size.

c) ToString

[C#] public const DrawMode OwnerDrawFixed;

[C++] public: const DrawMode OwnerDrawFixed;

[VB] Public Const OwnerDrawFixed As DrawMode

[JScript] public var OwnerDrawFixed: DrawMode;

Description

All the elements in the control are drawn manually and are of the same size.

d) ToString

[C#] public const DrawMode OwnerDrawVariable;

[C++] public: const DrawMode OwnerDrawVariable;

[VB] Public Const OwnerDrawVariable As DrawMode

[JScript] public var OwnerDrawVariable: DrawMode;

Description

All the elements in the control are drawn manually and may differ in size.

ErrorBlinkStyle enumeration (System.Windows.Forms)

a) ToString

Description

Specifies constants indicating when the error icon, supplied by an System.Windows.Forms.ErrorProvider, should blink to alert the user that an error has occurred.

This enumeration is used by System.Windows.Forms.ErrorProvider.

b) ToString

[C#] public const ErrorBlinkStyle AlwaysBlink;

[C++] public: const ErrorBlinkStyle AlwaysBlink;

[VB] Public Const AlwaysBlink As ErrorBlinkStyle

[JScript] public var AlwaysBlink: ErrorBlinkStyle;

Description

Always blink when the error icon is first displayed, or when a error description string is set for the control and the error icon is already displayed.

c) ToString

[C#] public const ErrorBlinkStyle BlinkIfDifferentError;

[C++] public: const ErrorBlinkStyle BlinkIfDifferentError;

[VB] Public Const BlinkIfDifferentError As ErrorBlinkStyle

[JScript] public var BlinkIfDifferentError: ErrorBlinkStyle;

Description

Blinks when the icon is already displayed and a new error string is set for the control.

d) ToString

[C#] public const ErrorBlinkStyle NeverBlink;

[C++] public: const ErrorBlinkStyle NeverBlink;

[VB] Public Const NeverBlink As ErrorBlinkStyle

[JScript] public var NeverBlink: ErrorBlinkStyle;

Description

Never blink the error icon.

ErrorIconAlignment enumeration (System.Windows.Forms)

a) ToString

Description

Specifies constants indicating the locations that an error icon can appear in relation to the control with an error.

This enumeration is used by System.Windows.Forms.ErrorProvider.

b) ToString

[C#] public const ErrorIconAlignment BottomLeft;

[C++] public: const ErrorIconAlignment BottomLeft;

[VB] Public Const BottomLeft As ErrorIconAlignment

[JScript] public var BottomLeft: ErrorIconAlignment;

Description

The icon appears aligned with the bottom of the control and the left of the control.

c) ToString

[C#] public const ErrorIconAlignment BottomRight;

[C++] public: const ErrorIconAlignment BottomRight;

[VB] Public Const BottomRight As ErrorIconAlignment

[JScript] public var BottomRight: ErrorIconAlignment;

Description

The icon appears aligned with the bottom of the control and the right of the control.

d) ToString

[C#] public const ErrorIconAlignment MiddleLeft;

[C++] public: const ErrorIconAlignment MiddleLeft;

[VB] Public Const MiddleLeft As ErrorIconAlignment

[JScript] public var MiddleLeft: ErrorIconAlignment;

Description

The icon appears aligned with the middle of the control and the left of the control.

e) ToString

[C#] public const ErrorIconAlignment MiddleRight;

[C++] public: const ErrorIconAlignment MiddleRight;

[VB] Public Const MiddleRight As ErrorIconAlignment

[JScript] public var MiddleRight: ErrorIconAlignment;

Description

The icon appears aligned with the middle of the control and the right of the control.

f) ToString

[C#] public const ErrorIconAlignment TopLeft;

[C++] public: const ErrorIconAlignment TopLeft;

[VB] Public Const TopLeft As ErrorIconAlignment

[JScript] public var TopLeft: ErrorIconAlignment;

Description

The icon appears aligned with the top of the control and to the left of the control.

g) ToString

[C#] public const ErrorIconAlignment TopRight;

[C++] public: const ErrorIconAlignment TopRight;

[VB] Public Const TopRight As ErrorIconAlignment

[JScript] public var TopRight ErrorIconAlignment;

Description

The icon appears aligned with the top of the control and to the right of the control.

ErrorProvider class (System.Windows.Forms)

a) ToString

Description

Provides a user interface for indicating that a control on a form has an error associated with it.

System.Windows.Forms.ErrorProvider presents a simple interface for indicating to the end user that a control on a form has an error associated with it. If an error description string is specified for the control, an icon appears next to the control. The icon flashes in the manner specified by System.Windows.Forms.ErrorProvider.BlinkStyle, at the rate specified by System.Windows.Forms.ErrorProvider.BlinkRate. When the mouse hovers over the icon, a tool tip appears showing the error description string.

b) ErrorProvider

Example Syntax:

c) ToString

[C#] public ErrorProvider( );

[C++] public: ErrorProvider( );

[VB] Public Sub New( )

[JScript] public function ErrorProvider( ); Initializes a new instance of the System.Windows.Forms.ErrorProvider class.

Description

Initializes a new instance of the System.Windows.Forms.ErrorProvider class and initializes the default settings for System.Windows.Forms.ErrorProvider.BlinkRate, System.Windows.Forms.ErrorProvider.BlinkStyle, and the System.Windows.Forms.ErrorProvider.Icon.

The following table shows initial property values for an instance of System.Windows.Forms.ErrorProvider.

d) ErrorProvider

Example Syntax:

e) ToString

[C#] public ErrorProvider(ContainerControl parentControl);

[C++] public: ErrorProvider(ContainerControl* parentControl);

[VB] Public Sub New(ByVal parentControl As ContainerControl)

[JScript] public function ErrorProvider(parentControl: ContainerControl);

Description

Initializes a new instance of the System.Windows.Forms.ErrorProvider class attached to a container.

The System.Windows.Forms.Control specified by System.Windows.Forms.ErrorProvider.ContainerControl is the container object for the data-bound controls to associate the error provider with. The container of the control to monitor for errors.

f) BlinkRate g) ToString

[C#] public int BlinkRate {get; set;}

[C++] public: _property int get_BlinkRate( ); public: _property void set_BlinkRate(int);

[VB] Public Property BlinkRate As Integer

[JScript] public function get BlinkRate( ): int; public function set BlinkRate(int);

Description

Gets or sets the rate at which the error icon flashes.

The error icon flashes at the specified rate. A value of zero sets System.Windows.Forms.ErrorProvider.BlinkStyle to System.Windows.Forms.ErrorBlinkStyle.NeverBlink.

h) BlinkStyle i) ToString

[C#] public ErrorBlinkStyle BlinkStyle {get; set;}

[C++] public: _property ErrorBlinkStyle get_BlinkStyle( ); public: _property void set BlinkStyle(ErrorBlinkStyle);

[VB] Public Property BlinkStyle As ErrorBlinkStyle

[JScript] public function get BlinkStyle( ): ErrorBlinkStyle; public function set BlinkStyle(ErrorBlinkStyle);

Description

Gets or sets a value indicating when the error icon flashes.

The error icon flashes in the manner specified by the assigned System.Windows.Forms.ErrorBlinkStyle when an error occurs. Setting the System.Windows.Forms.ErrorProvider.BlinkRate to zero sets the System.Windows.Forms.ErrorProvider.BlinkStyle to System.Windows.Forms.ErrorBlinkStyle.NeverBlink.

j) Container k) ContainerControl l) ToString

Description

Gets or sets a value indicating the parent control for this System.Windows.Forms.ErrorProvider.

Typically, this is the System.Windows.Forms.Form the data-bound controls reside on.

m) DataMember n) ToString

[C#] public string DataMember {get; set;}

[C++] public: _property String* get_DataMember( ); public: _property void set_DataMember(String*);

[VB] Public Property DataMember As String

[JScript] public function get DataMember( ): String; public function set DataMember(String);

Description

Gets or sets the data table to monitor.

The System.Windows.Forms.ErrorProvider.DataMember is a navigation string based on System.Windows.Forms.ErrorProvider.DataSource.

o) DataSource p) ToString

[C#] public object DataSource {get; set;}

[C++] public: _property Object* get_DataSource( ); public: _property void set_DataSource(Object*);

[VB] Public Property DataSource As Object

[JScript] public function get DataSource( ): Object; public function set DataSource(Object);

Description

Gets or sets data set the System.Windows.Forms.ErrorProvider to monitor.

The System.Windows.Forms.ErrorProvider.DataSource is a System.Data.DataSet containing tables with the fields that you can attach to a control and that you want to monitor for errors.

q) DesignMode r) Events s) Icon t) ToString

Description

Gets or sets the System.Drawing.Icon that is displayed next to a control when an error description string has been set for the control.

For best results, using an icon of the size 16 by 16 pixels. If the specified icon is not 16 by 16, it is resized to 16 by 16.

u) Site v) ToString

[C#] ISite Site {set;}

[C++] public: _property virtual void set_Site(ISite*);

[VB] Property Site As ISite

[JScript] public function set Site(ISite);

Description w) BindToDataAndErrors

[C#] public void BindToDataAndErrors(object newDataSource, string newDataMember);

[C++] public: void BindToDataAndErrors(Object* newDataSource, String* newDataMember);

[VB] Public Sub BindToDataAndErrors(ByVal newDataSource As Object, ByVal newDataMember As String)

[JScript] public function BindToDataAndErrors(newDataSource: Object, newDataMember: String);

Description

Provides a method to set both the System.Windows.Forms.ErrorProvider.DataSource and System.Windows.Forms.ErrorProvider.DataMember at run time.

To avoid conflicts at run time that can occur when changing System.Windows.Forms.ErrorProvider.DataSource and System.Windows.Forms.ErrorProvider.DataMember, you should use System.Windows.Forms.ErrorProvider.BindToDataAndErrors(System.Object, System.String) instead of setting System.Windows.Forms.ErrorProvider.DataSource and System.Windows.Forms.ErrorProvider. Data Member individually. A System.Data.DataSet to monitor for errors. A collection within the System.Data.DataSet to monitor for errors.

x) CanExtend

[C#] public bool CanExtend(object extendee);

[C++] public: _sealed bool CanExtend(Object* extendee);

[VB] NotOverridable Public Function CanExtend(ByVal extendee As Object) As Boolean

[JScript] public function CanExtend(extendee: Object): Boolean;

Description

Gets a value indicating whether a control can be extended.

Return Value: true if the control can be extended; otherwise, false.

Typically, you will use System.Windows.Forms.ErrorProvider.CanExtend(System.Object) to determine whether you can attach an System.Windows.Forms.ErrorProvider to the specified control. The control to be extended.

y) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the resources (other than memory) used by the System.Windows.Forms.ErrorProvider.

Call System.Windows.Forms.ErrorProvider.Dispose(System.Boolean) when you are finished using the System.Windows.Forms.ErrorProvider. The System.Windows.Forms.ErrorProvider.Dispose(System.Boolean) method leaves the System.Windows.Forms.ErrorProvider in an unusable state. After calling System.Windows.Forms.ErrorProvider.Dispose(System.Boolean), you must release all references to the System.Windows.Forms.ErrorProvider so the memory it was occupying can be reclaimed by garbage collection.

z) GetError

[C#] public string GetError(Control control);

[C++] public: String* GetError(Control* control);

[VB] Public Function GetError(ByVal control As Control) As String

[JScript] public function GetError(control: Control): String;

Description

Returns the current error description string for the specified control.

Return Value: The error description string for the specified control. The item to get the error description string for.

aa) GetIconAlignment

[C#] public ErrorIconAlignment GetIconAlignment(Control control);

[C++] public: ErrorIconAlignment GetIconAlignment(Control* control);

[VB] Public Function GetIconAlignment(ByVal control As Control) As ErrorIconAlignment

[JScript] public function GetIconAlignment(control: Control) ErrorIconAlignment;

Description

Gets a value indicating where the error icon should be placed in relation to the control.

Return Value: One of the System.Windows.Forms.ErrorIconAlignment values. The control to get the icon location for.

bb) GetIconPadding

[C#] public int GetIconPadding(Control control);

[C++] public: int GetIconPadding(Control* control);

[VB] Public Function GetIconPadding(ByVal control As Control) As Integer

[JScript] public function GetIconPadding(control: Control): int;

Description

Returns the amount of extra space to leave next to the error icon.

Return Value: The number of pixels to leave between the icon and the control. Many icons normally have extra space around their central images, so the padding value is only necessary if additional space is necessary. Padding values can be positive or negative. Negative values cause the icon to overlap the edge of the control. The control to get the padding for.

cc) SetError

[C#] public void SetError(Control control, string value);

[C++] public: void SetError(Control* control, String* value);

[VB] Public Sub SetError(ByVal control As Control, ByVal value As String)

[JScript] public function SetError(control: Control, value: String);

Description

Sets the error description string for the specified control.

If the string length is greater than zero, then the error icon is displayed, and the ToolTip for the error icon is the error description text. If the string length is zero, the error icon is hidden. The control to set the error description string for. The error description string.

dd) SetIconAlignment

[C#] public void SetIconAlignment(Control control, ErrorIconAlignment value);

[C++] public: void SetIconAlignment(Control* control, ErrorIconAlignment value);

[VB] Public Sub SetIconAlignment(ByVal control As Control, ByVal value As ErrorIconAlignment)

[JScript] public function SetIconAlignment(control: Control, value ErrorIconAlignment);

Description

Sets the location where the error icon should be placed in relation to the control.

The final placement of the icon is modified by the icon padding values. The control to set the icon location for. One of the System.Windows.Forms.ErrorIconAlignment values.

ee) SetIconPadding

[C#] public void SetIconPadding(Control control, int padding);

[C++] public: void SetIconPadding(Control* control, int padding);

[VB] Public Sub SetIconPadding(ByVal control As Control, ByVal padding As Integer)

[JScript] public function SetIconPadding(control: Control, padding: int);

Description

Sets the amount of extra space to leave between the specified control and the error icon.

Many icons normally have extra space around their central images, so the padding value is only necessary when additional space is necessary. Padding values can be positive or negative. Negative values cause the icon to overlap the edge of the control. The contralto set the padding for. The number of pixels to add between the icon and the control.

ff) UpdateBinding

[C#] public void UpdateBinding( );

[C++] public: void UpdateBinding( );

[VB] Public Sub UpdateBinding( )

[JScript] public function UpdateBinding( );

Description

Provides a method to update the bindings of the System.Windows.Forms.ErrorProvider.DataSource, System.Windows.Forms.ErrorProvider.DataMember, and the error text.

Typically, you call this method after you have called System.Windows.Forms.ErrorProvider.BindToDataAndErrors(System.Object, System.String).

FeatureSupport class (System.Windows.Forms)

a) UpdateBinding

Description

Provides static methods for retrieving feature information from the current system.

Use the static methods of this class when the classes you query for feature information implement the System.Windows.Forms.IFeatureSupport interface. Otherwise, inherit from System.Windows.Forms.FeatureSupport and provide your own implementation. For an implementation of this class, see System.Windows.Forms.OSFeature.

b) FeatureSupport

Example Syntax:

c) UpdateBinding

[C#] protected FeatureSupport( );

[C++] protected: FeatureSupport( );

[VB] Protected Sub New( )

[JScript] protected function FeatureSupport( );

d) GetVersionPresent

[C#] public abstract Version GetVersionPresent(object feature);

[C++] public: virtual Version* GetVersionPresent(Object* feature)=0;

[VB] MustOverride Public Function GetVersionPresent(ByVal feature As Object) As Version

[JScript] public abstract function GetVersionPresent(feature: Object): Version;

Description

When overridden in a derived class, gets the version of the specified feature that is available on the system.

Return Value: A System.Version representing the version number of the specified feature available on the system; or null if the feature is not installed.

Version numbers consist of three parts: major, minor, and build. Typically, a version number is displayed as "major number.minor number.build number". The feature whose version is requested.

e) GetVersionPresent

[C#] public static Version GetVersionPresent(string featureClassName, string featureConstName);

[C++] public: static Version* GetVersionPresent(String* featureClassName, String* featureConstName);

[VB] Public Shared Function GetVersionPresent(ByVal featureClassName As String, ByVal featureConstName As String) As Version

[JScript] public static function GetVersionPresent(featureClassName: String, featureConstName: String): Version; Gets the version of the specified feature that is available on the system.

Description

Gets the version of the specified feature that is available on the system.

Return Value: A System.Version with the version number of the specified feature available on the system; or null if the feature is not installed.

Version numbers consist of three parts: major, minor, and build. Typically, a version number is displayed as "major number.minor number.build number". The fully qualified name of the class to query for information about the specified feature. This class must implement the System.Windows.Forms.IFeatureSupport interface or inherit from a class that implements this interface. The fully qualified name of the feature to look for.

f) IsPresent

[C#] public virtual bool IsPresent(object feature);

[C++] public: virtual bool IsPresent(Object* feature);

[VB] Overridable Public Function IsPresent(ByVal feature As Object) As Boolean

[JScript] public function IsPresent(feature: Object): Boolean;

Description

Determines whether any version of the specified feature is installed in the system.

Return Value: true if the feature is present; otherwise, false.

When you inherit from System.Windows.Forms.FeatureSupport, you must override the System.Windows.Forms.FeatureSupport.GetVersionPresent(System.String, System.String) method. When you override this method, check that the class that you use for the feature parameter is the same as the class used for this parameter in the System.Windows.Forms.FeatureSupport.IsPresent(System.String, System.String) method. If the two feature parameters differ, you must also override System.Windows.Forms.FeatureSupport.IsPresent (System.String, System.String). The feature to look for.

g) IsPresent

[C#] public virtual bool IsPresent(object feature, Version minimumVersion);

[C++] public: virtual bool IsPresent(Object* feature, Version* minimumVersion);

[VB] Overridable Public Function IsPresent(ByVal feature As Object, ByVal minimumVersion As Version) As Boolean

[JScript] public function IsPresent(feature: Object, minimumVersion: Version): Boolean;

Description

Determines whether the specified or newer version of the specified feature is installed in the system.

Return Value: true if the feature is present and its version number is greater than or equal to the specified minimum version number; false if the feature is not installed or its version number is below the specified minimum number.

When you inherit from System.Windows.Forms.FeatureSupport, you must override the System.Windows.Forms.FeatureSupport.GetVersionPresent(System.String, System.String) method. When you override this method, check that the class that you use for the feature parameter is the same as the class used for this parameter in the System.Windows.Forms.FeatureSupport.IsPresent(System.String, System.String) method. If the two feature parameters differ, you must also override System.Windows.Forms.FeatureSupport.IsPresent (System.String, System.String). The feature to look for. A System.Version representing the minimum version number of the feature to look for.

h) IsPresent

[C#] public static bool IsPresent(string featureClassName, string featureConstName);

[C++] public: static bool IsPresent(String* featureClassName, String* featureConstName);

[VB] Public Shared Function IsPresent(ByVal featureClassName As String, ByVal featureConstName As String) As Boolean

[JScript] public static function IsPresent(featureClassName: String, featureConstName: String): Boolean; Determines whether the specified feature is installed in the system.

Description

Determines whether any version of the specified feature is installed in the system. This method is static.

Return Value: true if the specified feature is present; false if the specified feature is not present or if the product containing the feature is not installed.

See the documentation for the product containing the feature to determine the names to pass to the featureClassName and the featureConstName parameters. The fully qualified name of the class to query for information about the specified feature. This class must implement the System.Windows.Forms.IFeatureSupport interface or inherit from a class that implements this interface. The fully qualified name of the feature to look for.

i) IsPresent

[C#] public static bool IsPresent(string featureClassName, string featureConstName, Version minimumVersion);

[C++] public: static bool IsPresent(String* featureClassName, String* featureConstName, Version* minimumVersion);

[VB] Public Shared Function IsPresent(ByVal featureClassName As String, ByVal featureConstName As String, ByVal minimumVersion As Version) As Boolean

[JScript] public static function IsPresent(featureClassName: String, featureConstName: String, minimumVersion: Version): Boolean;

Description

Determines whether the specified or newer version of the specified feature is installed in the system. This method is static.

Return Value: true if the feature is present and its version number is greater than or equal to the specified minimum version number; false if the feature is not installed or its version number is below the specified minimum number.

See the documentation for the product containing the feature to determine the names to pass to the featureClassName and the featureConstName parameters. The fully qualified name of the class to query for information about the specified feature. This class must implement the System.Windows.Forms.IFeatureSupport interface or inherit from a class that implements this interface. The fully qualified name of the feature to look for. A System.Version representing the minimum version number of the feature.

FileDialog class (System.Windows.Forms)

a) ToString

Description

Displays a dialog window from which the user can select a file.

System.Windows.Forms.FileDialog is an abstract class, and cannot be instantiated directly. Additionally, you cannot inherit from this class. To create a dialog to select or save a file use System.Windows.Forms.OpenFileDialog or System.Windows.Forms.SaveFileDialog.

b) ToString

[C#] protected static readonly object EventFileOk;

[C++] protected: static Object* EventFileOk;

[VB] Protected Shared ReadOnly EventFileOk As Object

[JScript] protected static var EventFileOk: Object;

Description c) AddExtension d) ToString

[C#] public bool AddExtension {get; set;}

[C++] public: _property bool get_AddExtension( ); public: _property void set_AddExtension(bool);

[VB] Public Property AddExtension As Boolean

[JScript] public function get AddExtension( ): Boolean; public function set AddExtension(Boolean);

Description

Gets or sets a value indicating whether the dialog box automatically adds an extension to a file name if the user omits the extension.

The extension added to a file name depends on the currently selected file filter and the value of the System.Windows.Forms.FileDialog.CheckFileExists property.

e) CheckFileExists f) ToString

[C#] public virtual bool CheckFileExists {get; set;}

[C++] public: _property virtual bool get_CheckFileExists( ); public: _property virtual void set_CheckFileExists(bool);

[VB] Overridable Public Property CheckFileExists As Boolean

[JScript] public function get CheckFileExists( ): Boolean; public function set CheckFileExists(Boolean);

Description

Gets or sets a value indicating whether the dialog box displays a warning if the user specifies a file name that does not exist.

The default value is true for an inheriting System.Windows.Forms.OpenFileDialog and false for an inheriting System.Windows.Forms.SaveFileDialog.

g) CheckPathExists h) ToString

[C#] public bool CheckPathExists {get; set;}

[C++] public: _property bool get CheckPathExists( ); public: _property void set_CheckPathExists(bool);

[VB] Public Property CheckPathExists As Boolean

[JScript] public function get CheckPathExists( ): Boolean; public function set CheckPathExists(Boolean);

Description

Gets or sets a value indicating whether the dialog box displays a warning if the user specifies a path that does not exist.

i) Container j) DefaultExt k) ToString

Description

Gets or sets the default file extension.

l) DereferenceLinks m) ToString

[C#] public bool DereferenceLinks {get; set;}

[C++] public: _property bool get_DereferenceLinks( ); public: _property void set_DereferenceLinks(bool);

[VB] Public Property DereferenceLinks As Boolean

[JScript] public function get DereferenceLinks( ): Boolean; public function set DereferenceLinks(Boolean);

Description

Gets or sets a value indicating whether the dialog box returns the location of the file referenced by the shortcut or whether it returns the location of the shortcut (.lnk).

n) DesignMode o) Events p) FileName q) ToString

Description

Gets or sets a string containing the file name selected in the file dialog box.

The file name includes both the file path and the extension. If no files are selected, this method returns an empty string (“ ”).

r) FileNames s) ToString

[C#] public string[ ] FileNames {get;}

[C++] public: _property String* get_FileNames( );

[VB] Public ReadOnly Property FileNames As String ( )

[JScript] public function get FileNames( ): String[ ];

Description

Gets the file names of all selected files in the dialog box.

Each file name includes both the file path and the extension. If no files are selected, this method returns an empty array.

t) Filter u) ToString

[C#] public string Filter {get; set;}

[C++] public: _property Sting* get Filter( ); public: _property void set_Filter(String*);

[VB] Public Property Filter As String

[JScript] public function get Filter( ): String; public function set Filter(String);

Description

Gets or sets the current file name filter string, which determines the choices that appear in the “Save as file type” or “Files of type” box in the dialog box.

For each filtering option, the filter string contains a description of the filter, followed by the vertical bar (|) and the filter pattern. The strings for different filtering options are separated by the vertical bar.

v) FilterIndex w) ToString

[C#] public int FilterIndex {get; set;}

[C++] public: _property int get_FilterIndex( ); public: _property void set_FilterIndex(int);

[VB] Public Property FilterIndex As Integer

[JScript] public function get FilterIndex( ): int; public function set FilterIndex(int);

Description

Gets or sets the index of the filter currently selected in the file dialog box.

x) InitialDirectory y) ToString

[C#] public string InitialDirectory {get; set;}

[C++] public: _property String* get InitialDirectory( ); public: _property void set_InitialDirectory(String*);

[VB] Public Property InitialDirectory As String

[JScript] public function get InitialDirectory( ): String; public function set InitialDirectory(String);

Description

Gets or sets the initial directory displayed by the file dialog box.

z) Instance aa) ToString

[C#] protected virtual IntPtr Instance {get;}

[C++] protected: _property virtual IntPtr get_Instance( );

[VB] Overridable Protected ReadOnly Property Instance As IntPtr

[JScript] protected function get Instance( ): IntPtr;

Description

Gets the Win32 instance handle for the application.

bb) Options cc) ToString

[C#] protected int Options {get;}

[C++] protected: _property int get_Options( );

[VB] Protected ReadOnly Property Options As Integer

[JScript] protected function get Options( ): int;

Description

Gets the Win32 common Open File Dialog OFN_* option flags.

dd) RestoreDirectory ee) ToString

[C#] public bool RestoreDirectory {get; set;}

[C++] public: _property bool get_RestoreDirectory( ); public: _property void set_RestoreDirectory(bool);

[VB] Public Property RestoreDirectory As Boolean

[JScript] public function get RestoreDirectory( ): Boolean; public function set RestoreDirectory(Boolean);

Description

Gets or sets a value indicating whether the dialog box restores the current directory before closing.

ff) ShowHelp gg) ToString

[C#] public bool ShowHelp {get; set;}

[C++] public: _property bool get_ShowHelp( ); public: _property void set_ShowHelp(bool);

[VB] Public Property ShowHelp As Boolean

[JScript] public function get ShowHelp( ): Boolean; public function set ShowHelp(Boolean);

Description

Gets or sets a value indicating whether the Help button is displayed in the file dialog.

A System.Windows.Forms.Control.HelpRequested event is raised when the user clicks the Help button.

hh) Site ii) Title jj) ToString

Description

Gets or sets the file dialog box title.

The string is placed in the title bar of the dialog box. If the title is an empty string, the system uses a default title, which is either "Save As" or "Open".

kk) ValidateNames ll) ToString

[C#] public bool ValidateNames {get; set;}

[C++] public: _property bool get_ValidateNames( ); public: _property void set_ValidateNames(bool);

[VB] Public Property ValidateNames As Boolean

[JScript] public function get ValidateNames( ): Boolean; public function set ValidateNames(Boolean);

Description

Gets or sets a value indicating whether the dialog box accepts only valid Win32 file names.

If the edit control contains anything but spaces when the user clicks OK, the dialog returns the file name, whether it is valid or not. No default extension is added to the text.

mm) ToString

Description

Occurs when the user clicks on the Open or Save button on a file dialog box.

For information about handling events, see.

For information about handling events, see.

nn) HookProc

[C#] protected override IntPtr HookProc(IntPtr hWnd, int msg, IntPtr wparam, IntPtr lparam);

[C++] protected: IntPtr HookProc(IntPtr hWnd, int msg, IntPtr wparam, IntPtr lparam);

[VB] Overrides Protected Function HookProc(ByVal hWnd As IntPtr, ByVal msg As Integer, ByVal wparam As IntPtr, ByVal lparam As IntPtr) As IntPtr

[JScript] protected override function HookProc(hWnd: IntPtr, msg: int, wparam: IntPtr, lparam: IntPtr): IntPtr;

Description

Defines the common dialog box hook procedure that is overridden to add specific functionality to the file dialog box.

Return Value: Returns zero if the default dialog box procedure processes the message; returns a nonzero value if the default dialog box procedure ignores the message.

A hook procedure allows the user to connect or insert other routines into a routine or application for the purpose of debugging or enhancing functionality. The handle to the dialog box window. The message received by the dialog box. Additional information about the message. Additional information about the message.

oo) OnFileOk

[C#] protected void OnFileOk(CancelEventArgs e);

[C++] protected: void OnFileOk(CancelEventArgs* e);

[VB] Protected Sub OnFileOk(ByVal e As CancelEventArgs)

[JScript] protected function OnFileOk(e: CancelEventArgs);

Description

Raises the System.Windows.Forms.FileDialog.FileOk event. A System.ComponentModel.CancelEventArgs that contains the event data.

pp) Reset

[C#] public override void Reset( );

[C++] public: void Reset( );

[VB] Overrides Public Sub Reset( )

[JScript] public override function Reset( );

Description

Resets all properties to their default values.

When overriding System.Windows.Forms.FileDialog.Reset in a derived class, be sure to call the base class's System.Windows.Forms.CommonDialog.Reset method.

qq) RunDialog

[C#] protected override bool RunDialog(IntPtr hWndOwner);

[C++] protected: bool RunDialog(IntPtr hWndOwner);

[VB] Overrides Protected Function RunDialog(ByVal hWnd Owner As IntPtr) As Boolean

[JScript] protected override function RunDialog(hWndOwner: IntPtr): Boolean;

Description

Specifies a common dialog box.

Return Value: true if the file could be opened; otherwise, false.

This method provides an implementation of System.Windows.Forms.CommonDialog.RunDialog(System.IntPtr), and is invoked when the user of a file dialog invokes System.Windows.Forms.CommonDialog.ShowDialog. A value that represents the window handle of the owner window for the common dialog box.

rr) ToString

[C#] public override string ToString( );

[C++] public: String* ToString( );

[VB] Overrides Public Function ToString( ) As String

[JScript] public override function ToString( ): String;

Description

Provides a string version of this Object.

Return Value: A string version of this Object.

FlatStyle enumeration (System.Windows.Forms)

a) ToString

Description

Specifies the appearance of a control.

This enumeration is used by members such as System.Windows.Forms.ButtonBase.FlatStyle, System.Windows.Forms.GroupBox.FlatStyle, and System.Windows.Forms.Label.FlatStyle.

b) ToString

[C#] public const FlatStyle Flat;

[C++] public: const FlatStyle Flat;

[VB] Public Const Flat As FlatStyle

[JScript] public var Flat: FlatStyle;

Description

The control appears flat.

c) ToString

[C#] public const FlatStyle Popup;

[C++] public: const FlatStyle Popup;

[VB] Public Const Popup As FlatStyle

[JScript] public var Popup: FlatStyle;

Description

A control appears flat until the mouse pointer moves over it, at which point it appears three-dimensional.

d) ToString

[C#] public const FlatStyle Standard;

[C++] public: const FlatStyle Standard;

[VB] Public Const Standard As FlatStyle

[JScript] public var Standard: FlatStyle;

Description

The control appears three-dimensional.

e) ToString

[C#] public const FlatStyle System;

[C++] public: const FlatStyle System;

[VB] Public Const System As FlatStyle

[JScript] public var System: FlatStyle;

Description

The appearance of the control is determined by the user's operating system.

FontDialog class (System.Windows.Forms)

a) ToString

Description

Represents a common dialog box that displays a list of fonts that are currently installed on the system.

The inherited member System.Windows.Forms.CommonDialog.ShowDialog must be invoked to create this specific common dialog box.

b) ToString

[C#] protected static readonly object EventApply;

[C++] protected: static Object* EventApply;

[VB] Protected Shared ReadOnly EventApply As Object

[JScript] protected static var EventApply: Object;

Description c) FontDialog

Example Syntax:

d) ToString

[C#] public FontDialog( );

[C++] public: FontDialog( );

[VB] Public Sub New( )

[JScript] public function FontDialog( );

Description

Initializes a new instance of the System.Windows.Forms.FontDialog class.

When you create an instance of System.Windows.Forms.FontDialog, the following read/write properties are initialized.

e) AllowScriptChange f) ToString

[C#] public bool AllowScriptChange {get; set;}

[C++] public: _property bool get_AllowScriptChange( ); public: _property void set_AllowScriptChange(bool);

[VB] Public Property AllowScriptChange As Boolean

[JScript] public function get AllowScriptChange( ): Boolean; public function set AllowScriptChange(Boolean);

Description

Gets or sets a value indicating whether the user can change the character set specified in the Script combo box to display a character set other than the one currently displayed.

The Script combo box found on the font dialog box contains character sets associated with the selected font.

g) AllowSimulations h) ToString

[C#] public bool AllowSimulations {get; set;}

[C++] public: _property bool get_AllowSimulations( ); public: Property void set_AllowSimulations(bool);

[VB] Public Property AllowSimulations As Boolean

[JScript] public function get AllowSimulations( ): Boolean; public function set AllowSimulations(Boolean);

Description

Gets or sets a value indicating whether the dialog box allows graphics device interface (GDI) font simulations.

i) AllowVectorFonts j) ToString

[C#] public bool AllowVectorFonts {get; set;}

[C++] public: _property bool get_AllowVectorFonts( ); public: _property void set_AllowVectorFonts(bool);

[VB] Public Property AllowVectorFonts As Boolean

[JScript] public function get AllowVectorFonts( ): Boolean; public function set AllowVectorFonts(Boolean);

Description

Gets or sets a value indicating whether the dialog box allows vector font selections.

k) AllowVerticalFonts l) ToString

[C#] public bool AllowVerticalFonts {get; set;}

[C++] public: _property bool get AllowVerticalFonts( ); public: _property void set_AllowVerticalFonts(bool);

[VB] Public Property AllowVerticalFonts As Boolean

[JScript] public function get AllowVerticalFonts( ): Boolean; public function set AllowVerticalFonts(Boolean);

Description

Gets or sets a value indicating whether the dialog box displays both vertical and horizontal fonts or only horizontal fonts.

m) Color n) ToString

[C#] public Color Color {get; set;}

[C++] public: _property Color get Color( ); public: _property void set Color(Color);

[VB] Public Property Color As Color

[JScript] public function get Color( ): Color; public function set Color(Color);

Description

Gets or sets the selected font color.

o) Container p) DesignMode q) Events r) FixedPitchOnly s) ToString

Description

Gets or sets a value indicating whether the dialog box allows only the selection of fixed-pitch fonts.

t) Font u) ToString

[C#] public Font Font {get; set;}

[C++] public: _property Font* get_Font( ); public: _property void set_Font(Font*);

[VB] Public Property Font As Font

[JScript] public function get Font( ): Font; public function set Font(Font);

Description

Gets or sets the selected font.

v) FontMustExist w) ToString

[C#] public bool FontMustExist {get; set;}

[C++] public: _property bool get_FontMustExist( ); public: _property void set_FontMustExist(bool);

[VB] Public Property FontMustExist As Boolean

[JScript] public function get FontMustExist( ): Boolean; public function set FontMustExist(Boolean);

Description

Gets or sets a value indicating whether the dialog box specifies an error condition if the user attempts to select a font or style that does not exist.

x) MaxSize y) ToString

[C#] public int MaxSize {get; set;}

[C++] public: _property int get_MaxSize( ); public: _property void set_MaxSize(int);

[VB] Public Property MaxSize As Integer

[JScript] public function get MaxSize( ): int; public function set MaxSize(int);

Description

Gets or sets the maximum point size a user can select.

In order for the maximum and minimum size settings to take effect, System.Windows.Forms.FontDialog.MaxSize must be greater than System.Windows.Forms.FontDialog. MinSize, and both must be greater than zero.

z) MinSize aa) ToString

[C#] public int MinSize {get; set;}

[C++] public: _property int get_MinSize( ); public: _property void set_MinSize(int);

[VB] Public Property MinSize As Integer

[JScript] public function get MinSize( ): int; public function set MinSize(int);

Description

Gets or sets the minimum point size a user can select.

In order for the maximum and minimum size settings to take effect, System.Windows.Forms.FontDialog.MaxSize must be greater than System.Windows.Forms.FontDialog. MinSize, and both must be greater than zero.

bb) Options cc) ToString

[C#] protected int Options {get;}

[C++] protected: _property int get_Options( );

[VB] Protected ReadOnly Property Options As Integer

[JScript] protected function get Options( ): int;

Description

Gets the value passed to CHOOSEFONT.Flags.

dd) ScriptsOnly ee) ToString

[C#] public bool ScriptsOnly {get; set;}

[C++] public: _property bool get_ScriptsOnly( ); public: _property void set_ScriptsOnly(bool);

[VB] Public Property ScriptsOnly As Boolean

[JScript] public function get ScriptsOnly( ): Boolean; public function set ScriptsOnly(Boolean);

Description

Gets or sets a value indicating whether the dialog box allows selection of fonts for all non-OEM and Symbol character sets, as well as the ANSI character set.

ff) ShowApply gg) ToString

[C#] public bool ShowApply {get; set;}

[C++] public: _property bool get_ShowApply( ); public: _property void set_ShowApply(bool);

[VB] Public Property ShowApply As Boolean

[JScript] public function get ShowApply( ): Boolean; public function set ShowApply(Boolean);

Description

Gets or sets a value indicating whether the dialog box contains an Apply button.

hh) ShowColor ii) ToString

[C#] public bool ShowColor {get; set;}

[C++] public: _property bool get_ShowColor( ); public: _property void set_ShowColor(bool);

[VB] Public Property ShowColor As Boolean

[JScript] public function get ShowColor( ): Boolean; public function set ShowColor(Boolean);

Description

Gets or sets a value indicating whether the dialog box displays the color choice.

jj) ShowEffects kk) ToString

[C#] public bool ShowEffects {get; set;}

[C++] public: _property bool get_ShowEffects( ); public: _property void set_ShowEffects(bool);

[VB] Public Property ShowEffects As Boolean

[JScript] public function get ShowEffects( ): Boolean; public function set ShowEffects(Boolean);

Description

Gets or sets a value indicating whether the dialog box contains controls that allow the user to specify strikethrough, underline, and text color options.

ll) ShowHelp mm) ToString

[C#] public bool ShowHelp {get; set;}

[C++] public: _property bool get_ShowHelp( ); public: _property void set_ShowHelp(bool);

[VB] Public Property ShowHelp As Boolean

[JScript] public function get ShowHelp( ): Boolean; public function set ShowHelp(Boolean);

Description

Gets or sets a value indicating whether the dialog box displays a Help button.

nn) Site oo) ToString

Description

Occurs when the user clicks the Apply button in the font dialog box.

Every time the Apply button is clicked, another System.Windows.Forms.FontDialog.Apply event is raised.

pp) HookProc

[C#] protected override IntPtr HookProc(IntPtr hWnd, int msg, IntPtr wparam, IntPtr lparam);

[C++] protected: IntPtr HookProc(IntPtr hWnd, int msg, IntPtr wparam, IntPtr lparam);

[VB] Overrides Protected Function HookProc(ByVal hWnd As IntPtr, ByVal msg As Integer, ByVal wparam As IntPtr, ByVal lparam As IntPtr) As IntPtr

[JScript] protected override function HookProc(hWnd: IntPtr, msg: int, wparam: IntPtr, lparam: IntPtr): IntPtr;

Description

Specifies the common dialog box hook procedure that is overridden to add specific functionality to a common dialog box.

Return Value: A zero value if the default dialog box procedure processes the message; a nonzero value if the default dialog box procedure ignores the message.

Raising an event invokes the event handler through a delegate. For an overview, see. The handle to the dialog box window. The message being received. Additional information about the message. Additional information about the message.

qq) OnApply

[C#] protected virtual void OnApply(EventArgs e);

[C++] protected: virtual void OnApply(EventArgs* e);

[VB] Overridable Protected Sub OnApply(ByVal e As EventArgs)

[JScript] protected function OnApply(e: EventArgs);

Description

Raises the System.Windows.Forms.FontDialog.Apply event.

Raising an event invokes the event handler through a delegate. For an overview, see. An System.EventArgs that contains the data.

rr) Reset

[C#] public override void Reset( );

[C++] public: void Reset( );

[VB] Overrides Public Sub Reset( )

[JScript] public override function Reset( );

Description

Resets all dialog box options to their default values.

When the options are reset, the strikethrough, underline, and color effects are enabled, the fonts listed include only the screen fonts supported by the system.

ss) RunDialog

[C#] protected override bool RunDialog(IntPtr hWndOwner);

[C++] protected: bool RunDialog(IntPtr hWndOwner);

[VB] Overrides Protected Function RunDialog(ByVal hWnd Owner As IntPtr) As Boolean

[JScript] protected override function RunDialog(hWndOwner: IntPtr): Boolean;

Description

The actual implementation of running the dialog. Inheriting classes should override this if they want to add more functionality, and call base.runDialog( ) if necessary Return Value: true if the user hit OK; otherwise false.UNDONE tt) ToString

[C#] public override string ToString( );

[C++] public: String* ToString( );

[VB] Overrides Public Function ToString( ) As String

[JScript] public override function ToString( ): String;

Description

Retrieves a string that includes the name of the current font selected in the dialog box.

Return Value: A string that includes the name of the currently selected font.

Form class (System.Windows.Forms)

a) ToString

Description

Represents a window or dialog box that makes up an application's user interface.

A System.Windows.Forms.Form is a representation of any window displayed in your application. The System.Windows.Forms.Form class can be used to create standard, tool, borderless, and floating windows. You can also use the System.Windows.Forms.Form class to create modal windows such as a dialog box. A special kind of form, the multiple document interface (MDI) form, can contain other forms called MDI child forms. An MDI form is created by setting the System.Windows.Forms.Form.IsMdiContainer property to true.MDI child forms are created by setting the System.Windows.Forms.Form.MdiParent property to the MDI parent form that will contain the child form.

b) Form

Example Syntax:

c) ToString

[C#] public Form( );

[C++] public: Form( );

[VB] Public Sub New( )

[JScript] public function Form( );

Description

Initializes a new instance of the System.Windows.Forms.Form class.

The default size of a form is 300 pixels in height and 300 pixels in width.

d) AcceptButton e) ToString

[C#] public IButtonControl AcceptButton {get; set;}

[C++] public: _property IButtonControl* get_Accept Button( ); public: _property void set AcceptButton(IButtonControl*);

[VB] Public Property AcceptButton As IButtonControl

[JScript] public function get AcceptButton( ): IButtonControl; public function set AcceptButton(IButtonControl);

Description

Gets or sets the button on the form that is clicked when the user presses the ENTER key.

This property allows you to designate a default action to occur when the user presses the ENTER key in your application. The button assigned to this property must be an System.Windows.Forms.IButtonControl that is on the current form or located within a container on the current form.

f) AccessibilityObject g) AccessibleDefaultActionDescription h) AccessibleDescription i) AccessibleName j) AccessibleRole k) ActiveControl l) ActiveForm m) ToString Description Gets the currently active form for this application.

You can use this method to obtain a reference to the currently active form to perform actions on the form or its controls.

n) ActiveMdiChild o) ToString

[C#] public Form ActiveMdiChild {get;}

[C++] public: _property Form* get_ActiveMdiChild( );

[VB] Public ReadOnly Property ActiveMdiChild As Form

[JScript] public function get ActiveMdiChild( ): Form;

Description

Gets the currently active multiple document interface (MDI) child window.

You can use this method to determine whether there are any MDI child forms open in your MDI application. You can also use this method to perform operations on an MDI child window from its MDI parent form or from another form that is displayed in your application.

p) AllowDrop q) AllowTransparency r) ToString

Description

Gets or sets a value indicating whether the opacity of the form can be adjusted.

This property is automatically set to true if the Opacity is changed. When the opacity of a form is set using the Opacity property, the form will layer objects on the form. If you set the System.Windows.Forms.Form.AllowTransparency property to false the form will not be in layered mode which will improve the display performance of the form.

s) Anchor
t) AutoScale
u) ToString

Description

Gets or sets a value indicating whether the form adjusts its size to fit the height of the font used on the form and scales its controls.

You can use this property to allow your form and its controls to automatically adjust based on changes in the font. This can be useful in applications where the font might increase or decrease based on the language specified for use by Windows.

v) AutoScaleBaseSize
w) ToString

[C#] public virtual Size AutoScaleBaseSize {get; set;}

[C++] public: _property virtual Size get_AutoScaleBaseSize( ); public: _property virtual void set_AutoScaleBaseSize(Size);

[VB] Overridable Public Property AutoScaleBaseSize As Size

[JScript] public function get AutoScaleBaseSize( ): Size; public function set AutoScaleBaseSize(Size);

Description

Gets or sets the base size used for autoscaling of the form.

The value of the System.Windows.Forms.Form.AutoScaleBaseSize property is used at form-display time to compute the scaling factor for the form. The autoscaling base size is used by the form as a baseline for comparison to the system's font size to determine how much to scale the form when autoscaling is used. If you want to determine the size a form will auto scale to based on a specific font, use the System.Windows.Forms.Form.GetAutoScaleSize(System.Drawing.Font) method.

x) AutoScroll
y) ToString

[C#] public override bool AutoScroll {get; set;}

[C++] public: _property virtual bool get AutoScroll( ); public: _property virtual void set_AutoScroll(bool);

[VB] Overrides Public Property AutoScroll As Boolean

[JScript] public function get AutoScroll( ): Boolean; public function set AutoScroll(Boolean);

Description

Gets or sets a value indicating whether the form implements autoscrolling.

If this property is set to true, scroll bars are displayed on the form if any controls are located outside the form's client region. Additionally, when autoscrolling is on, the client area of the form automatically scrolls to make the control with input focus visible.

z) AutoScrollMargin
aa) AutoScrollMinSize
bb) AutoScrollPosition
cc) BackColor
dd) ToString Description The background color of this control. This is an ambient property and will always return a non-null value.

ee) BackgroundImage
ff) BindingContext
gg) Bottom
hh) Bounds
ii) CancelButton
jj) ToString Description Gets or sets the button control that is clicked when the user presses the ESC key.

The cancel button for a form is the button control that is clicked whenever the user presses the ESC key. The button assigned to this property must be an System.Windows.Forms.IButtonControl that is on the current form or located within a container on the current form.

kk) CanFocus
ll) CanSelect
mm) Capture
nn) CausesValidation
oo) ClientRectangle
pp) ClientSize
qq) ToString Description Gets or sets the size of the client area of the form.

The size of the client area of the form is the size of the form excluding the borders and the title bar. The client area of a form is the area within a form where controls can be placed. You can use this property to get the proper dimensions when performing graphics operations or when sizing and positioning controls on the form. To get the size of the entire form, use the System.Windows.Forms.Form.Size property or use the individual properties System.Windows.Forms.Control.Height and System.Windows.Forms.Control.Width.

rr) CompanyName
ss) Container
tt) ContainsFocus
uu) ContextMenu
vv) ControlBox
ww) ToString Description Gets or sets a value indicating whether a control box is displayed in the caption bar of the form.

If the System.Windows.Forms.Form.ControlBox property is set to true, the control box is displayed in the upper-left corner of the caption bar. The control box is where the user can click to access the system menu.

xx) Controls
yy) Created
zz) CreateParams
aaa) ToString

Description

Retrieves the CreateParams used to create the window. If a subclass overrides this function, it must call the base implementation.

bbb) Cursor
ccc) DataBindings
ddd) DefaultImeMode
eee) ToString

Description fff) DefaultSize
ggg) ToString

[C#] protected override Size DefaultSize {get;}

[C++] protected: _property virtual Size get_DefaultSize( );

[VB] Overrides Protected ReadOnly Property DefaultSize As Size

[JScript] protected function get DefaultSize( ): Size;

Description

Deriving classes can override this to configure a default size for their control. This is more efficient than setting the size in the control's constructor.

hhh) DesignMode
iii) DesktopBounds
jjj) ToString

Description

Gets or sets the size and location of the form on the Windows desktop.

Desktop coordinates are based on the working area of the screen, which excludes the taskbar. The coordinate system of the desktop is pixel based. If your application is running on a multiple monitor system, the coordinates of the form are the coordinates for the combined desktop.

kkk) DesktopLocation
lll) ToString

[C#] public Point DesktopLocation {get; set;}

[C++] public: _property Point get_DesktopLocation( ); public: _property void set_DesktopLocation(Point);

[VB] Public Property DesktopLocation As Point

[JScript] public function get DesktopLocation( ): Point; public function set DesktopLocation(Point);

Description

Gets or sets the location of the form on the Windows desktop.

Desktop coordinates are based on the working area of the screen, which excludes the taskbar. The coordinate system of the desktop is pixel based. If your application is running on a multi-monitor system, the coordinates of the form are the coordinates for the combined desktop.

mmm) DialogResult
nnn) ToString

[C#] public DialogResult DialogResult {get; set;}

[C++] public: _property DialogResult get DialogResult( ); public: _property void set_DialogResult(DialogResult);

[VB] Public Property DialogResult As DialogResult

[JScript] public function get DialogResult( ): DialogResult; public function set DialogResult(DialogResult);

Description

Gets or sets the dialog result for the form.

The dialog result of a form is the value that is returned from the form when it is displayed as a modal dialog. If the form is displayed as a dialog box, setting this property with a value from the System.Windows.Forms.DialogResult enumeration sets the value of the dialog result for the form, hides the modal dialog, and returns control to the calling form. This property is typically set by the System.Windows.Forms.Button.DialogResult property of a System.Windows.Forms.Button control on the form. When the user clicks the System.Windows.Forms.Button control, the value assigned to the System.Windows.Forms.Button.DialogResult property of the System.Windows.Forms.Button is assigned to the System.Windows.Forms.Form.DialogResult property of the form.

ooo) DisplayRectangle
ppp) Disposing
qqq) Dock
rrr) DockPadding
sss) Enabled
ttt) Events
uuu) Focused
vvv) Font
www) FontHeight
xxx) ForeColor
yyy) FormBorderStyle
zzz) ToString Description Gets or sets the border style of the form.

The border style of the form determines how the outer edge of the form appears. In addition to changing the border display for a form, certain border styles prevent the form from being sized. For example, the FormBorderStyle.FixedDialog border style changes the border of the form to that of a dialog box and prevents the form from being resized. The border style can also affect the size or availability of the caption bar section of a form.

Description

Gets or sets the border style of the form.

aaaa) Handle
bbbb) HasChildren
cccc) Height
dddd) HelpButton
eeee) ToString

Description

Gets or sets a value indicating whether a Help button should be displayed in the caption box of the form.

When this property is set to true, a small button with a question mark appears in the caption bar to the left of the close button. You can use this button to display help for your application. You can create an event handler for the System.Windows.Forms.Control.HelpRequested event of the System.Windows.Forms.Control class to display Help information to the user when the Help button of the form is clicked.

ffff) HScroll
gggg) Icon
hhhh) ToString

Description

Gets or sets the icon for the form.

A form's icon designates the picture that represents the form in the taskbar as well as the icon that is displayed for the control box of the form.

iiii) ImeMode
jjjj) InvokeRequired
kkkk) IsAccessible
llll) IsDisposed
mmmm) IsHandleCreated
nnnn) IsMdiChild
oooo) ToString Description Gets a value indicating whether the form is a multiple document interface (MDI) child form.

At run time, MDI child forms are displayed inside the client area of an MDI parent form. An MDI child form can be maximized, minimized, and moved within the MDI parent form. To create an MDI child form, assign the System.Windows.Forms.Form that will be the MDI parent form to the System.Windows.Forms.Form.MdiParent property of the child form. You can use the System.Windows.Forms.Form.IsMdiContainer property to determine whether a form is an MDI parent form.

pppp) IsMdiContainer qqqq) ToString

[C#] public bool IsMdiContainer {get; set;}

[C++] public: _property bool get IsMdiContainer( ); public: _property void set IsMdiContainer(bool);

[VB] Public Property IsMdiContainer As Boolean

[JScript] public function get IsMdiContainer( ): Boolean; public function set IsMdiContainer(Boolean);

Description

Gets or sets a value indicating whether the form is a container for multiple document interface (MDI) child forms.

This property changes the display and behavior of the form to an MDI parent form. When this property is set to true, the form displays a sunken client area with a raised border. All MDI child forms assigned to the parent form are displayed within its client area.

rrrr) IsRestrictedWindow ssss) ToString

[C#] public bool IsRestrictedWindow {get;}

[C++] public: _property bool get_IsRestrictedWindow( );

[VB] Public ReadOnly Property IsRestrictedWindow As Boolean

[JScript] public function get IsRestrictedWindow( ): Boolean;

Description

Determines if this form should display a warning banner when the form is displayed in an unsecure mode.

tttt) KeyPreview uuuu) ToString

[C#] public bool KeyPreview {get; set;}

[C++] public: _property bool get KeyPreview( ); public: _property void set_KeyPreview(bool);

[VB] Public Property KeyPreview As Boolean

[JScript] public function get KeyPreview( ): Boolean; public function set KeyPreview(Boolean);

Description

Gets or sets a value indicating whether the form will receive key events before the event is passed to the control that has focus.

When this property is set to true, the form will receive all System.Windows.Forms.Control.KeyPress, System.Windows.Forms.Control.KeyDown, and System.Windows.Forms.Control.KeyUp events. After the form's event handlers have completed processing the keystroke, the keystroke is then assigned to the control with focus. For example, if the System.Windows.Forms.Form.KeyPreview property is set to true and the currently selected control is a System.Windows.Forms.TextBox, after the keystroke is handled by the event-handling methods of the form the System.Windows.Forms.TextBox control will receive the key that was pressed. To handle keyboard events only at the form level and not allow controls to receive keyboard events, set the e.Handled parameter in your form's System.Windows.Forms.Control.KeyPress or System.Windows.Forms.Control.KeyDown event to true.

vvvv) Left wwww) Location xxxx) MaximizeBox yyyy) ToString

Description

Gets or sets a value indicating whether the maximize button is displayed in the caption bar of the form.

A maximize button enables users to enlarge a window to full-screen size. To display a maximize button, you must also set the form's System.Windows.Forms.Form.FormBorderStyle property to either FormBorderStyle.FixedSingle, FormBorderStyle.Sizable, FormBorderStyle.Fixed3D, or FormBorderStyle.FixedDialog zzzz) MaximizedBounds aaaaa) ToString

[C#] protected Rectangle MaximizedBounds {get; set;}

[C++] protected: _property Rectangle get_MaximizedBounds( ); protected: _property void set_MaximizedBounds (Rectangle);

[VB] Protected Property MaximizedBounds As Rectangle

[JScript] protected function get MaximizedBounds( ): Rectangle; protected function set MaximizedBounds(Rectangle);

Description

Gets the size of the form when it is maximized.

Classes that inherit from System.Windows.Forms.Form can override this method to provide new bounds for the form when it is maximized. The class sets this property internally when the form's maximize box button is clicked.

bbbbb) MaximumSize ccccc) ToString

[C#] public Size MaximumSize {get; set;}

[C++] public: _property Size get_MaximumSize( ); public: _property void set_MaximumSize(Size);

[VB] Public Property MaximumSize As Size

[JScript] public function get MaximumSize( ): Size; public function set MaximumSize(Size);

Description

Gets the maximum size the form can be resized to.

This property enables you to limit the size of a form to a specified maximum size. You can use this feature when displaying multiple windows at the same time, to ensure that a single window does not cause other windows to be hidden.

ddddd) MdiChildren eeeee) ToString

[C#] public Form[ ] MdiChildren {get;}

[C++] public: _property Form* get MdiChildren( );

[VB] Public ReadOnly Property MdiChildren As Form( )

[JScript] public function get MdiChildren( ): Form[ ];

Description

Gets an array of forms that represent the multiple document interface (MDI) child forms that are parented to this form.

This property allows you to obtain references to all the MDI child forms currently opened in an MDI parent form. To create an MDI child form, assign the System.Windows.Forms.Form that will be the MDI parent form to the System.Windows.Forms.Form.MdiParent property of the child form.

fffff) MdiParent ggggg) ToString

[C#] public Form MdiParent {get; set;}

[C++] public: _property Form* get_MdiParent( ); public: _property void set_MdiParent(Form*);

[VB] Public Property MdiParent As Form

[JScript] public function get MdiParent( ): Form; public function set MdiParent(Form);

Description

Gets or sets the current multiple document interface (MDI) parent form of this form.

To create an MDI child form, assign the System.Windows.Forms.Form that will be the MDI parent form to the System.Windows.Forms.Form.MdiParent property of the child form. You can use this property from an MDI child form to obtain global information that all child forms need or to invoke methods that perform actions to all child forms.

hhhhh) Menu iiiii) ToString

[C#] public MainMenu Menu {get; set;}

[C++] public: _property MainMenu* get Menu( ); public: _property void set Menu(MainMenu*);

[VB] Public Property Menu As MainMenu

[JScript] public function get Menu( ): MainMenu; public function set Menu(MainMenu);

Description

Gets or sets the System.Windows.Forms.MainMenu that is displayed in the form.

You can use this property to switch between complete menu sets at run time. For example, you can define one System.Windows.Forms.MainMenu to be displayed when your multiple document interface (MDI) form has no active MDI child forms and another System.Windows.Forms.MainMenu to display when a child window is displayed. You can also use a different System.Windows.Forms.MainMenu when specific conditions exist in your application that require displaying a different menu set.

jjjjj) MergedMenu kkkkk) ToString

[C#] public MainMenu MergedMenu {get;}

[C++] public: _property MainMenu* get_MergedMenu( );

[VB] Public ReadOnly Property MergedMenu As MainMenu

[JScript] public function get MergedMenu( ): MainMenu;

Description

Gets the merged menu for the form.

This property is primarily used when the form is a multiple document interface (MDI) child form that merges its menu with its parent form's menu. You can use this property to obtain the current menu structure in an MDI application to make changes or additions to the menu structure. To obtain the non-merged System.Windows.Forms.MainMenu assigned to a form, use the System.Windows.Forms.Form.Menu property.

lllll) MinimizeBox mmmmm) ToString

[C#] public bool MinimizeBox {get; set;}

[C++] public: _property bool get_MinimizeBox( ); public: _property void set_MinimizeBox(bool);

[VB] Public Property MinimizeBox As Boolean

[JScript] public function get MinimizeBox( ): Boolean; public function set MinimizeBox(Boolean);

Description

Gets or sets a value indicating whether the minimize button is displayed in the caption bar of the form.

A minimize button enables users to minimize a window to an icon. To display a minimize button, you must also set the form's System.Windows.Forms.Form.FormBorderStyle property to either FormBorderStyle.FixedSingle, FormBorderStyle.Sizable, FormBorderStyle.Fixed3D, or FormBorderStyle.FixedDialog.

nnnnn) MinimumSize ooooo) ToString

[C#] public Size MinimumSize {get; set;}

[C++] public: _property Size get_MinimumSize( ); public: _property void set_MinimumSize(Size);

[VB] Public Property MinimumSize As Size

[JScript] public function get MinimumSize( ): Size; public function set MinimumSize(Size);

Description

Gets the minimum size the form can be resized to.

This property enables you to limit the size of a form to a specified minimum size. You can use this feature to prevent a user from sizing a window to an undesirable size.

ppppp) Modal qqqqq) ToString

[C#] public bool Modal {get;}

[C++] public: _property bool get_Modal( );

[VB] Public ReadOnly Property Modal As Boolean

[JScript] public function get Modal( ): Boolean;

Description

Gets a value indicating whether this form is displayed modally.

When a form is displayed modally, no input (keyboard or mouse click) can occur except to objects on the modal form. The program must hide or close a modal form (usually in response to some user action) before input to another form can occur. Forms that are displayed modally are typically used as dialog boxes in an application.

rrrrr) Name sssss) Opacity ttttt) ToString

Description

Gets or sets the opacity level of the form.

This property enables you to specify a level of transparency for the form and its controls. This property differs from transparency provided by the System.Windows.Forms.Form.TransparencyKey which only makes a form and its controls completely transparent if they are the same color as the value specified in the System.Windows.Forms.Form.TransparencyKey property. When this property is set to a value less than 100% (1.00), the entire form, including borders, is made more transparent. Setting this property to a value of 0% (0.00) makes the form completely invisible. You can use this property to provide different levels of transparency or to provide affects such as phasing a form in or out of view. For example, you can phase a form into view by setting the System.Windows.Forms.Form.Opacity property to a value of 0% (0.00) and gradually increasing the value until it reaches 100% (1.00).

uuuuu) OwnedForms vvvvv) ToString

[C#] public Form[ ] OwnedForms {get;}

[C++] public: _property Form* get_OwnedForms( );

[VB] Public ReadOnly Property OwnedForms As Form( )

[JScript] public function get OwnedForms( ): Form[ ];

Description

Gets an array of System.Windows.Forms.Form objects that represent all forms that are owned by this form.

This property returns an array that contains all forms that are owned by this form. To make a form owned by another form, call the System.Windows.Forms.Form.AddOwnedForm (System.Windows.Forms.Form) method. The form assigned to the owner form will remain owned until the System.Windows.Forms.Form.RemoveOwnedForm(System.Windows.Forms.Form) method is called. You can also make a form owned by another by setting the System.Windows.Forms.Form.Owner property with a reference to its owner form.

wwwww) Owner xxxxx) ToString

[C#] public Form Owner {get; set;}

[C++] public: _property Form* get_Owner( ); public: _property void set_Owner(Form*);

[VB] Public Property Owner As Form

[JScript] public function get Owner( ): Form; public function set Owner(Form);

Description

Gets or sets the form that owns this form.

To make a form owned by another form, assign its System.Windows.Forms.Form.Owner property a reference to the form that will be the owner.

yyyyy) Parent zzzzz) ParentForm aaaaaa) ProductName bbbbbb) Product Version cccccc) RecreatingHandle dddddd) Region eeeeee) RenderRightToLeft ffffff) ResizeRedraw gggggg) Right hhhhhh) RightToLeft iiiiii) ShowFocusCues jjjjjj) ShowInTaskbar kkkkkk) ToString Description Gets or sets a value indicating whether the form is displayed in the Windows taskbar.

If a form is parented within another form, the parented form is not displayed in the Windows taskbar.

llllll) ShowKeyboardCues mmmmmm) Site nnnnnn) Size oooooo) ToString

Description

Gets or sets the size of the form.

This property allows you to set both the height and width of the form at the same time instead of setting the System.Windows.Forms.Control.Height and System.Windows.Forms.Control.Width properties individually. If you want to set the size and location of a form, you can use the System.Windows.Forms.Form.DesktopBounds property to size and locate the form based on desktop coordinates or use the System.Windows.Forms.Control.Bounds property of the System.Windows.Forms.Control class to set the size and location of the form based on screen coordinates.

pppppp) SizeGripStyle qqqqqq) ToString

[C#] public SizeGripStyle SizeGripStyle {get; set;}

[C++] public: _property SizeGripStyle get SizeGripStyle( ); public: _property void set_SizeGripStyle(SizeGripStyle);

[VB] Public Property SizeGripStyle As SizeGripStyle

[JScript] public function get SizeGripStyle( ): SizeGripStyle; public function set SizeGripStyle(SizeGripStyle);

Description

Gets or sets the style of the size grip to display in the lower-right corner of the form.

This property enables you to determine when the sizing grip is displayed on the form. You can set this property to display the sizing grip or have it automatically displayed based on the setting of the System.Windows.Forms.Form.FormBorderStyle property.

rrrrrr) StartPosition ssssss) ToString

[C#] public FormStartPosition StartPosition {get; set;}

[C++] public: _property FormStartPosition get_StartPosition; public: _property void set_StartPosition(FormStartPosition);

[VB] Public Property StartPosition As FormStartPosition

[JScript] public function get StartPosition( ): FormStartPosition; public function set StartPosition(FormStartPosition);

Description

Gets or sets the starting position of the form at run time.

This property enables you to set the starting position of the form when it is displayed at run time. The form can be displayed manually or in the default location specified by Windows. You can also position the form to display in the center of the screen or in the center of its parent form for forms such as multiple document interface (MDI) child forms.

tttttt) TabIndex uuuuuu) ToString

[C#] public new int TabIndex {get; set;}

[C++] public: _property int get_TabIndex( ); public: _property void set_TabIndex(int);

[VB] Public Property TabIndex As Integer

[JScript] public function get TabIndex( ): int; public function set TabIndex(int);

Description vvvvvv) TabStop wwwwww) Tag xxxxxx) Text yyyyyy) Top zzzzzz) TopLevel aaaaaaa) ToString Description Gets or sets a value indicating whether to display the form as a top-level window.

A top-level form is a window that has no parent form, or whose parent form is the desktop window. Top-level windows are typically used as the main form in an application.

bbbbbbb) TopLevelControl ccccccc) TopMost ddddddd) ToString

Description

Gets or sets a value indicating whether the form should be displayed as the top-most form of your application.

A top-most form is a form that overlaps all the other forms even if it is not the active or foreground form. Top-most forms are always displayed at the highest point in the Z-order of an application. You can use this method to create a form that is always displayed in your application, such as a Find and Replace tool window.

eeeeeee) TransparencyKey fffffff) ToString

[C#] public Color TransparencyKey {get; set;}

[C++] public: _property Color get TransparencyKey( ); public: _property void set TransparencyKey(Color);

[VB] Public Property TransparencyKey As Color

[JScript] public function get TransparencyKey( ): Color; public function set TransparencyKey(Color);

Description

Gets or sets the color that will represent transparent areas of the form.

When the System.Windows.Forms.Form.TransparencyKey property is assigned a System.Drawing.Color, the areas of the form that have the same System.Windows.Forms.Control.BackColor will be displayed transparently. Any mouse actions, such as the click of the mouse, that are performed on the transparent areas of the form will be transferred to the windows below the transparent area. For example, if the client region of a form is made transparent, clicking the mouse on that area would send the event notification of the click to any window that is below it. If the color assigned to the System.Windows.Forms.Form.TransparencyKey property is the same as any controls on the form, they also will be displayed transparently. For example, if you have a System.Windows.Forms.Button control on a form that has its System.Windows.Forms.Form.TransparencyKey property set to SystemColors.Control, the control will be displayed transparently unless the System.Windows.Forms.Control.BackColor property of the System.Windows.Forms.Button control is changed to a different color.

ggggggg) Visible hhhhhhh) VScroll iiiiiii) Width jjjjjjj) WindowState kkkkkkk) ToString Description Gets or sets the form's window state.

Before a form is displayed, the System.Windows.Forms.Form.WindowState property is always set to FormWindowState.Normal, regardless of its initial setting. This is reflected in the System.Windows.Forms.Control.Height, System.Windows.Forms.Control.Left, System.Windows.Forms.Control.Top, and System.Windows.Forms.Control.Width property settings. If a form is hidden after it has been shown, these properties reflect the previous state until the form is shown again, regardless of any changes made to the System.Windows.Forms.Form.WindowState property.

lllllll) WindowTarget mmmmmmm) ToString

Description

Occurs when the form is activated in code or by the user.

To activate a form at run time using code, call the System.Windows.Forms.Form.Activate method. You can use this event for tasks such as updating the contents of the form based on changes made to the form's data when the form was not activated.

nnnnnnn) ToString

Description

Occurs when the form is closed.

This event occurs after the form has been closed by the user or by the System.Windows.Forms.Form.Close method of the form. To prevent a form from closing, handle the System.Windows.Forms.Form.Closing event and set the System.ComponentModel.CancelEventArgs.Cancel property of the System.ComponentModel.CancelEvenArgs passed to your event-handling method to true.

ooooooo) ToString

[C#] public event CancelEventHandler Closing;

[C++] public: _event CancelEventHandler* Closing;

[VB] Public Event Closing As CancelEventHandler

Description

Occurs when the form is closing.

The System.Windows.Forms.Form.Closing event occurs as the form is being closed. When a form is closed, all resources created within the object are released and the form is disposed. If you cancel this event, the form remains opened. To cancel the closure of a form, set the System.ComponentModel.CancelEventArgs.Cancel property of the System.ComponentModel.CancelEventArgs passed to your event handler to true.

ppppppp) ToString

Description

Occurs when the form loses focus and is not the active form.

You can use this event to perform tasks such as updating another window in your application with data from the deactivated form.

qqqqqqq) ToString

Description

Occurs after the input language of the form has changed.

You can use this event to make changes to your form's appearance and text based on changes made to the input language of the form.

rrrrrrr) ToString

[C#] public event InputLanguageChangingEventHandler InputLanguageChanging;

[C++] public: _event InputLanguageChangingEventHandler* InputLanguageChanging;

[VB] Public Event InputLanguageChanging As InputLanguageChangingEventHandler

Description

Occurs when the user attempts to change the input language for the form.

This event occurs before the change of input language is made for the form. You can cancel the language change by setting the System.ComponentModel.CancelEventArgs.Cancel property of the System.Windows.Forms.InputLanguageChangingEventArgs passed to your event-handling method to false. If the event is canceled, the input language is not changed. You can use this event to determine whether the requested input language change is appropriate for your application.

sssssss) ToString

Description

Occurs before a form is displayed for the first time.

You can use this event to perform tasks such as allocating resources used by the form.

ttttttt) ToString

Description

Occurs when the value of the System.Windows.Forms.Form.MaximizedBounds property has changed.

For more information about handling events, see.

uuuuuuu) ToString

[C#] public event EventHandler MaximumSizeChanged;

[C++] public: _event EventHandler* MaximumSizeChanged;

[VB] Public Event MaximumSizeChanged As EventHandler

Description

Occurs when the value of the System.Windows.Forms.Form.MaximumSize property has changed.

For more information about handling events, see.

vvvvvvv) ToString

[C#] public event EventHandler MdiChildActivate;

[C++] public: _event EventHandler* MdiChildActivate;

[VB] Public Event MdiChildActivate As EventHandler

Description

Occurs when a multiple document interface (MDI) child form is activated or closed within an MDI application.

You can use this event to perform tasks such as updating the contents of the MDI child form and changing the menu options available in the MDI parent form based on the status of the MDI child form that is activated.

wwwwwww) ToString

[C#] public event EventHandler MenuComplete;

[C++] public: _event EventHandler* MenuComplete;

[VB] Public Event MenuComplete As EventHandler

Description

Occurs when the menu of a form loses focus.

This event is raised when you click on any menu item in a menu that results in a command being performed and the menu losing focus. You can use this event to perform tasks such as updating the text of a System.Windows.Forms.StatusBar control or enabling and disabling buttons on a System.Windows.Forms.ToolBar.

xxxxxxx) ToString

[C#] public event EventHandler MenuStart;

[C++] public: _event EventHandler* MenuStart;

[VB] Public Event MenuStart As EventHandler

Description

Occurs when the menu of a form receives focus.

This event is raised when any menu item in the menu is clicked by the user. You can use this event to perform tasks such as enabling and disabling controls on the form that should not be accessed by the user when the menus are being accessed.

yyyyyyy) ToString

[C#] public event EventHandler MinimumSizeChanged;

[C++] public: _event EventHandler* MinimumSizeChanged;

[VB] Public Event MinimumSizeChanged As EventHandler

Description

Occurs when the value of the System.Windows.Forms.Form.MinimumSize property has changed.

For more information about handling events, see.

zzzzzzz) Activate

[C#] public void Activate( );

[C++] public: void Activate( );

[VB] Public Sub Activate( )

[JScript] public function Activate( );

Description

Activates the form and gives it focus.

Activating a form brings it to the front if this is the active application, or it flashes the window caption if this is not the active application. The form must be visible for this method to have any effect. To determine the active form in an application, use the System.Windows.Forms.Form.ActiveForm property or the System.Windows.Forms.Form.ActiveMdiChild property if your forms are in a Multiple Document Interface (MDI) application.

aaaaaaaa) ActivateMdiChild

[C#] protected void ActivateMdiChild(Form form);

[C++] protected: void ActivateMdiChild(Form* form);

[VB] Protected Sub ActivateMdiChild(ByVal form As Form)

[JScript] protected function ActivateMdiChild(form: Form);

Description

This function handles the activation of a MDI child form. If a subclass overrides this function, it must call base.ActivateMdi Child This function handles the activation of a MDI child form. If a subclass overrides this function, it must call base.ActivateMdiChild Form that is getting activated bbbbbbbb) AddOwnedForm

[C#] public void AddOwnedForm(Form ownedForm);

[C++] public: void AddOwnedForm(Form* ownedForm);

[VB] Public Sub AddOwnedForm(ByVal ownedForm As Form)

[JScript] public function AddOwnedForm(ownedForm: Form);

Description

Adds an owned form to this form.

The form assigned to the owner form remains owned until the System.Windows.Forms.Form.RemoveOwnedForm(System.Windows.Forms.Form) method is called. You can also make a form owned by another by setting the System.Windows.Forms.Form.Owner property with a reference to its owner form. The System.Windows.Forms.Form that this form will own.

cccccccc) AdjustFormScrollbars

[C#] protected override void AdjustFormScrollbars(bool displayScrollbars);

[C++] protected: void AdjustFormScrollbars(bool displayScrollbars);

[VB] Overrides Protected Sub AdjustFormScrollbars(ByVal displayScrollbars As Boolean)

[JScript] protected override function AdjustFormScrollbars (displayScrollbars Boolean);

Description dddddddd) ApplyAutoScaling

[C#] protected void ApplyAutoScaling( );

[C++] protected: void ApplyAutoScaling( );

[VB] Protected Sub ApplyAutoScaling( )

[JScript] protected function ApplyAutoScaling( );

Description

This auto scales the form based on the AutoScaleBaseSize.

eeeeeeee) CenterToParent

[C#] protected void CenterToParent( );

[C++] protected: void CenterToParent( );

[VB] Protected Sub CenterToParent( )

[JScript] protected function CenterToParent( );

Description

Centers the dialog to its parent.

ffffffff) CenterToScreen

[C#] protected void CenterToScreen( );

[C++] protected: void CenterToScreen( );

[VB] Protected Sub CenterToScreen( )

[JScript] protected function CenterToScreen( );

Description

Centers the dialog to the screen. This will first attempt to use the owner property to determine the correct screen, then it will try the HWND owner of the form, and finally this will center the form on the same monitor as the mouse cursor.

gggggggg) Close

[C#] public void Close( );

[C++] public: void Close( );

[VB] Public Sub Close( )

[JScript] public function Close( );

Description

Closes the form.

When a form is closed, all resources created within the object are closed and the form is disposed. You can prevent the closing of a form at run time by handling the System.Windows.Forms.Form.Closing event and setting the System.ComponentModel.CancelEventArgs.Cancel property of the System.ComponentModel.CancelEventArgs passed as a parameter to your event-handling method. If the form you are closing is the startup form of your application, your application ends.

hhhhhhhh) CreateControlsInstance

[C#] protected override ControlCollection CreateControlsInstance( );

[C++] protected: ControlCollection* CreateControlsInstance( );

[VB] Overrides Protected Function CreateControls Instance( ) As ControlCollection

[JScript] protected override function CreateControlsInstance( ): ControlCollection;

Description iiiiiiii) CreateHandle

[C#] protected override void CreateHandle( );

[C++] protected: void CreateHandle( );

[VB] Overrides Protected Sub CreateHandle( )

[JScript] protected override function CreateHandle( );

Description

Creates the handle for the Form. If a subclass overrides this function, it must call the base implementation.

jjjjjjjj) DefWndProc

[C#] protected override void DefWndProc(ref Message m);

[C++] protected: void DefWndProc(Message* m);

[VB] Overrides Protected Sub DefWndProc(ByRef m As Message)

[JScript] protected override function DefWndProc(m: Message);

Description

Calls the default window proc for the form. If a subclass overrides this function, it must call the base implementation.

kkkkkkkk) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the resources (other than memory) used by the System.Windows.Forms.Form.

Call System.Windows.Forms.Form.Dispose(System.Boolean) when you are finished using the System.Windows.Forms.Form. The System.Windows.Forms.Form.Dispose (System.Boolean) method leaves the System.Windows.Forms.Form in an unusable state. After calling System.Windows.Forms.Form.Dispose(System.Boolean), you must release all references to the System.Windows.Forms.Form so the memory it was occupying can be reclaimed by garbage collection.

llllllll) GetAutoScaleSize

[C#] public static SizeF GetAutoScaleSize(Font font);

[C++] public: static SizeF GetAutoScaleSize(Font* font);

[VB] Public Shared Function GetAutoScaleSize(ByVal font As Font) As SizeF

[JScript] public static function GetAutoScaleSize(font: Font): SizeF;

Description

Gets the sized when autoscaling the form based on a specified font.

Return Value: A System.Drawing.SizeF representing the autoscaled size of the form.

You can use this method to determine the size a form would autoscale to for a specific font before applying the font to the form. If you want to determine the size a form is autoscaled to based on the form currently assigned to the form, use the System.Windows.Forms.Form.AutoScaleBaseSize property. A System.Drawing.Font representing the font to determine the autoscaled base sized of the form.

mmmmmmmm) LayoutMdi

[C#] public void LayoutMdi(MdiLayout value);

[C++] public: void LayoutMdi(MdiLayout value);

[VB] Public Sub LayoutMdi(ByVal value As MdiLayout)

[JScript] public function LayoutMdi(value: MdiLayout);

Description

Arranges the multiple document interface (MDI) child forms within the MDI parent form.

You can use this method to arrange the MDI child forms in your MDI parent form to allow for easier navigation and manipulation of MDI child forms. MDI child forms can be tiled horizontally and vertically, cascaded, or as icons within the MDI parent form. One of the System.Windows.Forms.MdiLayout values that defines the layout of MDI child forms.

nnnnnnnn) OnActivated

[C#] protected virtual void OnActivated(EventArgs e);

[C++] protected: virtual void OnActivated(EventArgs* e);

[VB] Overridable Protected Sub OnActivated(ByVal e As EventArgs)

[JScript] protected function OnActivated(e: EventArgs);

Description

Raises the System.Windows.Forms.Form.Activated event.

Raising an event invokes the event handler through a delegate. For more information, see. An System.EventArgs that contains the event data.

oooooooo) OnClosed

[C#] protected virtual void OnClosed(EventArgs e);

[C++] protected: virtual void OnClosed(EventArgs* e);

[VB] Overridable Protected Sub OnClosed(ByVal e As EventArgs)

[JScript] protected function OnClosed(e: EventArgs);

Description

Raises the System.Windows.Forms.Form.Closed event.

Raising an event invokes the event handler through a delegate. For more information, see. The System.EventArgs that contains the event data.

pppppppp) OnClosing

[C#] protected virtual void OnClosing(CancelEventArgs e);

[C++] protected: virtual void OnClosing(CancelEventArgs* e);

[VB] Overridable Protected Sub OnClosing(ByVal e As CancelEventArgs)

[JScript] protected function OnClosing(e: CancelEventArgs);

Description

Raises the System.Windows.Forms.Form.Closing event.

Raising an event invokes the event handler through a delegate. For more information, see. A System.ComponentModel.CancelEventArgs that contains the event data.

qqqqqqqq) On CreateControl

[C#] protected override void OnCreateControl( );

[C++] protected: void OnCreateControl( );

[VB] Overrides Protected Sub OnCreateControl( )

[JScript] protected override function OnCreateControl( );

Description

Raises the CreateControl event.

Raising an event invokes the event-handling method through a delegate. For more information, see.

rrrrrrrr) OnDeactivate

[C#] protected virtual void OnDeactivate(EventArgs e);

[C++] protected: virtual void OnDeactivate(EventArgs* e);

[VB] Overridable Protected Sub OnDeactivate(ByVal e As EventArgs)

[JScript] protected function OnDeactivate(e: EventArgs);

Description

Raises the System.Windows.Forms.Form.Deactivate event.

Raising an event invokes the event handler through a delegate. For more information, see. The System.EventArgs that contains the event data.

ssssssss) OnFontChanged

[C#] protected override void OnFontChanged(EventArgs e);

[C++] protected: void OnFontChanged(EventArgs* e);

[VB] Overrides Protected Sub OnFontChanged(ByVal e As EventArgs)

[JScript] protected override function OnFontChanged(e: EventArgs);

Description tttttttt) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

Inheriting classes should override this method to find out when the handle has been created. Call base.OnHandleCreated first.

uuuuuuuu) OnHandleDestroyed

[C#] protected override void OnHandleDestroyed(EventArgs e);

[C++] protected: void OnHandleDestroyed(EventArgs* e);

[VB] Overrides Protected Sub OnHandleDestroyed(ByVal e As EventArgs)

[JScript] protected override function OnHandleDestroyed(e: EventArgs);

Description

Inheriting classes should override this method to find out when the handle is about to be destroyed. Call base.OnHandleDestroyed last.

vvvvvvvv) OnInputLanguageChanged

[C#] protected virtual void OnInputLanguageChanged(InputLanguageChangedEventArgs e);

[C++] protected: virtual void OnInputLanguageChanged(InputLanguageChangedEventArgs* e);

[VB] Overridable Protected Sub OnInputLanguageChanged (ByVal e As InputLanguageChangedEventArgs)

[JScript] protected function OnInputLanguageChanged(e: InputLanguageChangedEventArgs);

Description

Raises the System.Windows.Forms.Form.InputLanguageChanged event.

Raising an event invokes the event handler through a delegate. For more information, see. The System.Windows.Forms.InputLanguageChangedEventArgs that contains the event data.

wwwwwwww) OnInputLanguageChanging

[C#] protected virtual void OnInputLanguageChanging(InputLanguageChangingEventArgs e);

[C++] protected: virtual void OnInputLanguageChanging (InputLanguageChangingEventArgs* e);

[VB] Overridable Protected Sub OnInputLanguageChanging (ByVal e As InputLanguageChangingEventArgs)

[JScript] protected function OnInputLanguageChanging(e: InputLanguageChangingEventArgs);

Description

Raises the System.Windows.Forms.Form.InputLanguageChanging event.

Raising an event invokes the event handler through a delegate. For more information, see. The System.Windows.Forms.InputLanguageChangingEventArgs that contains the event data.

xxxxxxxx) OnLoad

[C#] protected virtual void OnLoad(EventArgs e);

[C++] protected: virtual void OnLoad(EventArgs* e);

[VB] Overridable Protected Sub OnLoad(ByVal e As EventArgs)

[JScript] protected function OnLoad(e: EventArgs);

Description

Raises the System.Windows.Forms.Form.Load event.

Raising an event invokes the event handler through a delegate. For more information, see. An System.EventArgs that contains the event data.

yyyyyyyy) OnMaximizedBoundsChanged

[C#] protected virtual void OnMaximizedBoundsChanged (EventArgs e);

[C++] protected: virtual void OnMaximizedBoundsChanged (EventArgs* e);

[VB] Overridable Protected Sub OnMaximizedBoundsChanged(ByVal e As EventArgs)

[JScript] protected function OnMaximizedBoundsChanged (e: EventArgs);

Description

Raises the System.Windows.Forms.Form.MaximizedBoundsChanged event.

Raising an event invokes the event handler through a delegate. For more information, see. The System.EventArgs that contains the event data.

zzzzzzzz) OnMaximumSizeChanged

[C#] protected virtual void OnMaximumSizeChanged(EventArgs e);

[C++] protected: virtual void OnMaximumSizeChanged (EventArgs* e);

[VB] Overridable Protected Sub OnMaximumSizeChanged (ByVal e As EventArgs)

[JScript] protected function OnMaximumSizeChanged(e: EventArgs);

Description

Raises the System.Windows.Forms.Form.MaximumSizeChanged event. Raising an event invokes the event handler through a delegate. For more information, see. The System.EventArgs that contains the event data.

aaaaaaaaa) OnMdiChildActivate

[C#] protected virtual void OnMdiChildActivate(EventArgs e);

[C++] protected: virtual void OnMdiChildActivate(EventArgs* e);

[VB] Overridable Protected Sub OnMdiChildActivate(ByVal e As EventArgs)

[JScript] protected function OnMdiChildActivate(e: EventArgs);

Description

Raises the System.Windows.Forms.Form.MdiChildActivate event.

Raising an event invokes the event handler through a delegate. For more information, see. The System.EventArgs that contains the event data.

bbbbbbbbb) OnMenu Complete

[C#] protected virtual void OnMenuComplete(EventArgs e);

[C++] protected: virtual void OnMenuComplete(EventArgs* e);

[VB] Overridable Protected Sub OnMenuComplete(ByVal e As EventArgs)

[JScript] protected function OnMenuComplete(e: EventArgs);

Description

Raises the System.Windows.Forms.Form.MenuComplete event.

Raising an event invokes the event handler through a delegate. For more information, see. The System.EventArgs that contains the event data.

ccccccccc) OnMenuStart

[C#] protected virtual void OnMenuStart(EventArgs e);

[C++] protected: virtual void OnMenuStart(EventArgs* e);

[VB] Overridable Protected Sub OnMenuStart(ByVal e As EventArgs)

[JScript] protected function OnMenuStart(e: EventArgs);

Description

Raises the System.Windows.Forms.Form.MenuStart event.

Raising an event invokes the event handler through a delegate. For more information, see. The System.EventArgs that contains the event data.

ddddddddd) OnMinimumSizeChanged

[C#] protected virtual void OnMinimumSizeChanged(EventArgs e);

[C++] protected: virtual void OnMinimumSizeChanged(EventArgs* e);

[VB] Overridable Protected Sub OnMinimumSizeChanged(ByVal e As EventArgs)

[JScript] protected function OnMinimumSizeChanged(e: EventArgs);

Description

Raises the System.Windows.Forms.Form.MinimumSizeChanged event.

Raising an event invokes the event handler through a delegate. For more information, see. An System.EventArgs that contains the event data.

eeeeeeeee) OnPaint

[C#] protected override void OnPaint(PaintEventArgs e);

[C++] protected: void OnPaint(PaintEventArgs* e);

[VB] Overrides Protected Sub OnPaint(ByVal e As PaintEventArgs)

[JScript] protected override function OnPaint(e: PaintEventArgs);

Description

Raises the Paint event.

fffffffff) OnResize

[C#] protected override void OnResize(EventArgs e);

[C++] protected: void OnResize(EventArgs* e);

[VB] Overrides Protected Sub OnResize(ByVal e As EventArgs)

[JScript] protected override function OnResize(e: EventArgs);

Description

Raises the Resize event.

ggggggggg) OnStyleChanged

[C#] protected override void OnStyleChanged(EventArgs e);

[C++] protected: void OnStyleChanged(EventArgs* e);

[VB] Overrides Protected Sub OnStyleChanged(ByVal e As EventArgs)

[JScript] protected override function OnStyleChanged(e: EventArgs);

Description

Raises the StyleChanged event.

Raising an event invokes the event handler through a delegate. For more information, see. An System.EventArgs that contains the event data.

hhhhhhhhh) OnTextChanged

[C#] protected override void OnTextChanged(EventArgs e);

[C++] protected: void OnTextChanged(EventArgs* e);

[VB] Overrides Protected Sub OnTextChanged(ByVal e As EventArgs)

[JScript] protected override function OnTextChanged(e: EventArgs);

Description iiiiiiiii) OnVisibleChanged

[C#] protected override void OnVisibleChanged(EventArgs e);

[C++] protected: void OnVisibleChanged(EventArgs* e);

[VB] Overrides Protected Sub OnVisibleChanged(ByVal e As EventArgs)

[JScript] protected override function OnVisibleChanged(e: EventArgs);

Description

Raises the System.Windows.Forms.Control.VisibleChanged event.

Raising an event invokes the event handler through a delegate. For more information, see. The System.EventArgs that contains the event data.

jjjjjjjj) ProcessCmdKey

[C#] protected override bool ProcessCmdKey(ref Message msg, Keys keyData);

[C++] protected: bool ProcessCmdKey(Message* msg, Keys keyData);

[VB] Overrides Protected Function ProcessCmdKey(ByRef msg As Message, ByVal keyData As Keys) As Boolean

[JScript] protected override function ProcessCmdKey(msg: Message, keyData Keys) Boolean;

Description

Processes a command key. Overrides Control.processCmdKey( ) to provide additional handling of main menu command keys and Mdi accelerators.

Return Value: true to consume the key, false to allow further processing. original window message. key code and modifier flags.

kkkkkkkkk) ProcessDialogKey

[C#] protected override bool ProcessDialogKey(Keys keyData);

[C++] protected: bool ProcessDialogKey(Keys keyData);

[VB] Overrides Protected Function ProcessDialogKey(ByVal keyData As Keys) As Boolean

[JScript] protected override function ProcessDialogKey(keyData: Keys): Boolean;

Description

Processes a dialog key. Overrides Control.processDialogKey( ). This method implements handling of the RETURN, and ESCAPE keys in dialogs. The method performs no processing on keys that include the ALT or CONTROL modifiers.

Return Value: true to consume the key, false to allow further processing. key code and modifier flags.

lllllllll) ProcessKeyPreview

[C#] protected override bool ProcessKeyPreview(ref Message m);

[C++] protected: bool ProcessKeyPreview(Message* m);

[VB] Overrides Protected Function ProcessKeyPreview(ByRef m As Message) As Boolean

[JScript] protected override function ProcessKeyPreview(m: Message): Boolean;

Description mmmmmmmmm) ProcessTabKey

[C#] protected override bool ProcessTabKey(bool forward);

[C<] protected: bool ProcessTabKey(bool forward);

[VB] Overrides Protected Function ProcessTabKey(ByVal forward As Boolean) As Boolean

[JScript] protected override function ProcessTabKey(forward: Boolean) Boolean;

Description nnnnnnnnn) RemoveOwnedForm

[C#] public void RemoveOwnedForm(Form ownedForm);

[C++] public: void RemoveOwnedForm(Form* ownedForm);

[VB] Public Sub RemoveOwnedForm(ByVal ownedForm As Form)

[JScript] public function RemoveOwnedForm(ownedForm: Form);

Description

Removes an owned form from this form.

The form assigned to the owner form remains owned until the System.Windows.Forms.Form.RemoveOwnedForm(System.Windows.Forms.Form) method is called. In addition to removing the owned form from the list of owned form, this method also sets the owner form to null. A System.Windows.Forms.Form representing the form to remove from the list of owned forms for this form.

ooooooooo) ScaleCore

[C#] protected override void ScaleCore(float x, float y);

[C++] protected: void ScaleCore(float x, float y);

[VB] Overrides Protected Sub ScaleCore(ByVal x As Single, ByVal y As Single)

[JScript] protected override function ScaleCore(x: float, y: float);

Description

Base function that performs scaling of the form. Percentage to scale the form horizontally Percentage to scale the form vertically ppppppppp) Select

[C#] protected override void Select(bool directed, bool forward);

[C++] protected: void Select(bool directed, bool forward);

[VB] Overrides Protected Sub Select(ByVal directed As Boolean, ByVal forward As Boolean)

[JScript] protected override function Select(directed: Boolean, forward: Boolean);

Description

Selects this form, and optionally selects the next/previous control. If set to true that the active control is changed If directed is true, then this controls the direction in which focus is moved. If this is true, then the next control is selected, otherwise the previous control is selected.

qqqqqqqqq) SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As BoundsSpecified)

[JScript] protected override function SetBoundsCore(x: int, y: int, width: int, height: int, specified: BoundsSpecified);

Description rrrrrrrrr) SetClientSizeCore

[C#] protected override void SetClientSizeCore(int x, int y);

[C++] protected: void SetClientSizeCore(int x, int y);

[VB] Overrides Protected Sub SetClientSizeCore(ByVal x As Integer, ByVal y As Integer)

[JScript] protected override function SetClientSizeCore(x: int, y: int);

Description

Sets the clientSize of the form. This will adjust the bounds of the form to make the clientSize the requested size. Requested width of the client region Requested height of the client region sssssssss) SetDesktopBounds

[C#] public void SetDesktopBounds(int x, int y, int width, int height);

[C++] public: void SetDesktopBounds(int x, int y, int width, int height);

[VB] Public Sub SetDesktopBounds(ByVal x As Integer, ByVal y As Integer, ByVal width As Integer, ByVal height As Integer)

[JScript] public function SetDesktopBounds(x: int, y: int, width: int, height: int);

Description

Sets the bounds of the form in desktop coordinates.

Desktop coordinates are based on the working area of the screen, which excludes the taskbar. You can use this method to set the position and size of your form on the desktop. Since desktop coordinates are based on the working area of the form, you can use this method to ensure that your form is completely visible on the desktop. The x-coordinate of the form's location. The y-coordinate of the form's location. The width of the form. The height of the form.

ttttttttt) SetDesktopLocation

[C#] public void SetDesktopLocation(int x, int y);

[C++] public: void SetDesktopLocation(int x, int y);

[VB] Public Sub SetDesktopLocation(ByVal x As Integer, ByVal y As Integer)

[JScript] public function SetDesktopLocation(x: int, y: int);

Description

Sets the location of the form in desktop coordinates.

Desktop coordinates are based on the working area of the screen, which excludes the taskbar. You can use this method to position your form on the desktop. Since desktop coordinates are based on the working area of the form, you can use this method to ensure that your form is completely visible on the desktop. The x-coordinate of the form's location. The y-coordinate of the form's location.

uuuuuuuuu) SetVisibleCore

[C#] protected override void SetVisibleCore(bool value);

[C++] protected: void SetVisibleCore(bool value);

[VB] Overrides Protected Sub SetVisibleCore(ByVal value As Boolean)

[JScript] protected override function SetVisibleCore(value: Boolean);

vvvvvvvvv) ShowDialog

[C#] public DialogResult ShowDialog( );

[C++] public: DialogResult ShowDialog( );

[VB] Public Function ShowDialog( ) As DialogResult

[JScript] public function ShowDialog( ): DialogResult; Shows the form as a modal dialog box.

Description

Shows the form as a modal dialog box with no owner window.

Return Value: One of the System.Windows.Forms.DialogResult values.

You can use this method to display a modal dialog box in your application. When this method is called, the code following it is not executed until after the dialog box is closed. The dialog box can be assigned one of the values of the System.Windows.Forms.DialogResult enumeration by assigning it to the System.Windows.Forms.Button.DialogResult property of a System.Windows.Forms.Button on the form or by setting the System.Windows.Forms.Form.DialogResult property of the form in code. This value is then returned by this method. You can use this return value to determine how to process the actions that occurred in the dialog box. For example, if the dialog box was closed and returned the DialogResult.Cancel value through this method, you could prevent code following the call to System.Windows.Forms.Form.ShowDialog from executing.

wwwwwwwww) ShowDialog

[C#] public DialogResult ShowDialog(IWin32Window owner);

[C++] public: DialogResult ShowDialog(IWin32Window* owner);

[VB] Public Function ShowDialog(ByVal owner As IWin32Window) As DialogResult

[JScript] public function ShowDialog(owner: IWin32Window): DialogResult;

Description

Shows the form as a modal dialog with the specified owner.

Return Value: One of the System.Windows.Forms.DialogResult values.

You can use this method to display a modal dialog box in your application. When this method is called, the code following it is not executed until after the dialog box is closed. The dialog box can be assigned one of the values of System.Windows.Forms.DialogResult by assigning it to the System.Windows.Forms.Button.DialogResult property of a System.Windows.Forms.Button on the form or by setting the System.Windows.Forms.Form.DialogResult property of the form in code. This value is then returned by this method. You can use this return value to determine how to process the actions that occurred in the dialog box. For example, if the dialog box was closed and returned the DialogResult.Cancel value through this method, you could prevent code following the call to System.Windows.Forms.Form.ShowDialog from executing. Any object that implements System.Windows.Forms.IWin32Window that represents the top-level window that will own the modal dialog.

xxxxxxxxx) ToString

[C#] public override string ToString( );

[C++] public: String* ToString( );

[VB] Overrides Public Function ToString( ) As String

[JScript] public override function ToString( ) String;

Description

Returns a string representation for this control.

Return Value: String Returns a string representation for this control.

yyyyyyyyyy) UpdateDefaultButton

[C#] protected override void UpdateDefaultButton( );

[C++] protected: void UpdateDefaultButton( );

[VB] Overrides Protected Sub UpdateDefaultButton( )

[JScript] protected override function UpdateDefault Button( );

Description

Updates the default button based on current selection, and the acceptButton property.

zzzzzzzzz) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

Base wndProc encapsulation. Message sent

DataFormats.Format class (System.Windows.Forms)

a) WndProc

Description

Represents a clipboard format type.

A format type consists of a text-based format name and an ID number. The format name/ID number pair can define a system System.Windows.Forms.Clipboard or other format.

b) DataFormats.Format

Example Syntax:

c) WndProc

[C#] public DataFormats.Format(string name, int id);

[C++] public: Format(String* name, int id);

[VB] Public Sub New(ByVal name As String, ByVal id As Integer)

[JScript] public function DataFormats.Format(name: String, id: int);

Description

Initializes a new instance of the System.Windows.Forms. DataFormats.Format class with a Boolean that indicates whether a Win32 handle is expected. The name of this format. The ID number for this format.

d) Id e) WndProc

[C#] public int Id {get;}

[C++] public: _property int get_Id( );

[VB] Public ReadOnly Property Id As Integer

[JScript] public function get Id( ): int;

Description

Gets the ID number for this format.

f) Name g) WndProc

[C#] public string Name {get;}

[C++] public: _property String* get_Name( );

[VB] Public ReadOnly Property Name As String

[JScript] public function get Name( ): String;

Description

Gets the name of this format.

FormBorderStyle enumeration (System.Windows.Forms)

a) ToString

Description

Specifies the border styles for a form.

This enumeration is used by the System.Windows.Forms. Form class.

b) ToString

[C#] public const FormBorderStyle Fixed3D;

[C++] public: const FormBorderStyle Fixed3D;

[VB] Public Const Fixed3D As FormBorderStyle

[JScript] public var Fixed3D: FormBorderStyle;

Description

A fixed, three-dimensional border.

c) ToString

[C#] public const FormBorderStyle FixedDialog;

[C++] public: const FormBorderStyle FixedDialog;

[VB] Public Const FixedDialog As FormBorderStyle

[JScript] public var FixedDialog: FormBorderStyle;

Description

A thick, fixed dialog-style border.

d) ToString

[C#] public const FormBorderStyle FixedSingle;

[C++] public: const FormBorderStyle FixedSingle;

[VB] Public Const FixedSingle As FormBorderStyle

[JScript] public var FixedSingle: FormBorderStyle;

Description

A fixed, single line border.

e) ToString

[C#] public const FormBorderStyle FixedToolWindow;

[C++] public: const FormBorderStyle FixedToolWindow;

[VB] Public Const FixedToolWindow As FormBorderStyle

[JScript] public var FixedToolWindow: FormBorderStyle;

Description

A tool window border that is not resizable.

f) ToString

[C#] public const FormBorderStyle None;

[C++] public: const FormBorderStyle None;

[VB] Public Const None As FormBorderStyle

[JScript] public var None: FormBorderStyle;

Description

No border.

g) ToString

[C#] public const FormBorderStyle Sizable;

[C++] public: const FormBorderStyle Sizable;

[VB] Public Const Sizable As FormBorderStyle

[JScript] public var Sizable: FormBorderStyle;

Description

A resizable border.

h) ToString

[C#] public const FormBorderStyle SizableToolWindow;

[C++] public: const FormBorderStyle SizableToolWindow;

[VB] Public Const SizableToolWindow As FormBorderStyle

[JScript] public var SizableToolWindow: FormBorderStyle;

Description

A resizable tool window border.

FormStartPosition enumeration (System.Windows.Forms)

a) ToString

Description

Specifies the initial position of a form.

This enumeration is used by the System.Windows.Forms.Form class.

b) ToString

[C#] public const FormStartPosition CenterParent;

[C++] public: const FormStartPosition CenterParent;

[VB] Public Const CenterParent As FormStartPosition

[JScript] public var CenterParent: FormStartPosition;

Description

The form is centered within the bounds of its parent form.

c) ToString

[C#] public const FormStartPosition CenterScreen;

[C++] public: const FormStartPosition CenterScreen;

[VB] Public Const CenterScreen As FormStartPosition

[JScript] public var CenterScreen: FormStartPosition;

Description

The form is centered on the current display, and has the dimensions specified in the form's size.

d) ToString

[C#] public const FormStartPosition Manual;

[C++] public: cost FormStartPosition Manual;

[VB] Public Const Manual As FormStartPosition

[JScript] public var Manual: FormStartPosition;

Description

The location and size of the form will determine its starting position.

e) ToString

[C#] public const FormStartPosition WindowsDefault-Bounds;

[C++] public: const FormStartPosition WindowsDefault-Bounds;

[VB] Public Const WindowsDefaultBounds As FormStartPosition

[JScript] public var WindowsDefaultBounds: FormStartPosition;

Description

The form is positioned at the Windows default location and has the bounds determined by Windows default.

f) ToString

[C#] public const FormStartPosition WindowsDefaultLocation;

[C++] public: const FormStartPosition WindowsDefaultLocation;

[VB] Public Const WindowsDefaultLocation As FormStart-Position

[JScript] public var WindowsDefaultLocation: FormStartPosition;

Description

The form is positioned at the Windows default location and has the dimensions specified in the form's size.

FormWindowState enumeration (System.Windows.Forms)

a) ToString

Description

Specifies how a form window is displayed.

This enumeration is used by the System.Windows.Forms.Form class.

b) ToString

[C+] public const FormWindowState Maximized;

[C++] public: const FormWindowState Maximized;

[VB] Public Const Maximized As FormWindowState

[JScript] public var Maximized: FormWindowState;

Description

A maximized window.

c) ToString

[C#] public const FormWindowState Minimized;

[C++] public: const FormWindowState Minimized;

[VB] Public Const Minimized As FormWindowState

[JScript] public var Minimized: FormWindowState;

Description

A minimized window.

d) ToString

[C#] public const FormWindowState Normal;

[C++] public: const FormWindowState Normal;

[VB] Public Const Normal As FormWindowState

[JScript] public var Normal: FormWindowState;

Description

A default sized window.

FrameStyle enumeration (System.Windows.Forms)

a) ToString

Description

Specifies the frame style of the selected control.

This enumeration is used by members such as System.Windows.Forms.ControlPaint.DrawReversibleFrame(System.Drawing.Rectangle,System.Drawing.Color,System.Windows.Forms.Frame Style).

b) ToString

[C#] public const FrameStyle Dashed;

[C++] public: const FrameStyle Dashed;

[VB] Public Const Dashed As FrameStyle

[JScript] public var Dashed: FrameStyle;

Description

A thin, dashed border.

c) ToString

[C#] public const FrameStyle Thick;

[C++] public: const FrameStyle Thick;

[VB] Public Const Thick As FrameStyle

[JScript] public var Thick: FrameStyle;

Description

A thick, solid border.

GiveFeedbackEventArgs class (System.Windows.Forms)

a) ToString

Description

Provides data for the System.Windows.Forms.Control. GiveFeedback event.

The System.Windows.Forms.Control.GiveFeedback event occurs during a drag operation. It allows the source of a drag event to modify the appearance of the mouse pointer in order to give the user visual feedback during a drag-and-drop operation. A System.Windows.Forms.GiveFeedback Event Args object specifies the type of drag-and-drop operation and whether default cursors are used.

b) GiveFeedbackEventArgs

Example Syntax:

c) ToString

[C#] public GiveFeedbackEventArgs(DragDropEffects effect, bool useDefaultCursors);

[C++] public: GiveFeedbackEventArgs(DragDropEffects effect, bool useDefaultCursors);

[VB] Public Sub New(ByVal effect As DragDropEffects, ByVal useDefaultCursors As Boolean)

[JScript] public function GiveFeedbackEventArgs(effect: DragDropEffects, useDefaultCursors: Boolean);

Description

Initializes a new instance of the System.Windows.Forms.GiveFeedbackEventArgs class. The type of drag-and-drop operation. Possible values are obtained by applying the bitwise OR (|) operation to the constants defined in the System.Windows.Forms.DragDropEffects. true if default pointers are used; otherwise, false.

d) Effect e) ToString

[C#] public DragDropEffects Effect {get;}

[C++] public: _property DragDropEffects get_Effect( );

[VB] Public ReadOnly Property Effect As DragDropEffects

[JScript] public function get Effect( ): DragDropEffects;

Description

Gets the type of drag-and-drop operation.

f) UseDefaultCursors g) ToString

[C#] public bool UseDefaultCursors {get; set;}

[C++] public: _property bool get_UseDefaultCursors( ); public: _property void set_UseDefaultCursors(bool);

[VB] Public Property UseDefaultCursors As Boolean

[JScript] public function get UseDefaultCursors( ): Boolean; public function set UseDefaultCursors(Boolean);

Description

Gets or sets whether the default pointer is used.

The default pointer is usually an arrow. A pointer is sometimes called a cursor.

GiveFeedbackEventHandler delegate (System.Windows.Forms)

a) ToString

Description

Represents the method that handles the System.Windows.Forms.Control.GiveFeedback event of a System.Windows.Forms.Control. The source of the event. A System.Windows.Forms.GiveFeedbackEventArgs that contains the event data.

When you create a System.Windows.Forms.GiveFeedbackEventHandler delegate, you identify the method that will handle the event. To associate the event with your event handler, add an instance of the delegate to the event. The event handler is called whenever the event occurs, unless you remove the delegate. For more information about handling events with delegates, see.

GridColumnStylesCollection class (System.Windows.Forms)

a) ToString

Description

Represents a collection of System.Windows.Forms.DataGridColumnStyle objects in the System.Windows.Forms.DataGrid control.

On the System.Windows.Forms.DataGridTableStyle, you access the System.Windows.Forms.GridColumnStylesCollection through the System.Windows.Forms.DataGridTableStyle.GridColumnStyles property.

b) Count c) IsReadOnly d) IsSynchronized e) Item f) ToString

System.Windows.Forms.DataGridColumnStyleSystem.Windows. Forms.GridColumnStyles Collection Description Gets the System.Windows.Forms.DataGridColumnStyle at a specified index.

Use the System.Windows.Forms.GridColumnStyles Collection.IndexOf(System.Windows.Forms.DataGridColumnStyle) method to determine the index of any element in the collection. The zero-based index of the System.Windows.Forms.DataGridColumnStyle to return.

g) Item h) ToString

[C#] public DataGridColumnStyle this[string columnName] {get;}

[C++] public: _property DataGridColumnStyle* get_Item (String* columnName);

[VB] Public Default ReadOnly Property Item(ByVal columnName As String) As DataGridColumnStyle

[JScript] returnValue=GridColumnStylesCollectionObject.Item(columnName);

Description

Gets the System.Windows.Forms.DataGridColumnStyle with the specified name.

The column header of a System.Windows.Forms.DataGridColumnStyle can be set explicitly by setting the System.Windows.Forms.DataGridColumnStyle.HeaderText property. By default, the System.Windows.Forms.DataGridColumnStyle.HeaderText is set using uses System.Windows.Forms.DataGridColumnStyle.MappingName property value. The System.Windows.Forms.DataGridColumnStyle.MappingName of the System.Windows.Forms.DataGridColumnStyle retrieve.

i) Item j) ToString

[C#] public DataGridColumnStyle this[PropertyDescriptor propDesc] {get;}

[C++] public: _property DataGridColumnStyle* get_Item (PropertyDescriptor* propDesc);

[VB] Public Default ReadOnly Property Item(ByVal propDesc As PropertyDescriptor) As DataGridColumnStyle

[JScript] returnValue=GridColumnStylesCollectionObject.Item (propDesc);

Description

Gets the System.Windows.Forms.DataGridColumnStyle associated with the specified System.ComponentModel.PropertyDescriptor.

Each System.Windows.Forms.DataGridColumnStyle object is created using a System.ComponentModel.PropertyDescriptor. The System.ComponentModel.PropertyDescriptor can be returned using the System.Windows.Forms.DataGridColumnStyle.PropertyDescriptor property. The System.ComponentModel.PropertyDescriptor associated with the System.Windows.Forms.DataGridColumnStyle.

k) List l) ToString

[C#] protected override ArrayList List {get;}

[C++] protected: _property virtual ArrayList* get_List( );

[VB] Overrides Protected ReadOnly Property List As ArrayList

[JScript] protected function get List( ): ArrayList;

Description

Gets the list of items in the collection.

m) SyncRoot n) ToString

Description

Occurs when a change is made to the System.Windows.Forms.GridColumnStylesCollection.

For more information about handling events, see.

o) Add

[C#] public virtual int Add(DataGridColumnStyle column);

[C++] public: virtual int Add(DataGridColumnStyle* column);

[VB] Overridable Public Function Add(ByVal column As DataGridColumnStyle) As Integer

[JScript] public function Add(column: DataGridColumnStyle): int;

Description

Adds a column style to the collection.

Return Value: The index of the new

System.Windows.Forms.DataGridColumnStyle object. The

System.Windows.Forms.DataGridColumnStyle to add.

p) AddRange

[C#] public void AddRange(DataGridColumnStyle[ ] columns);

[C++] public: void AddRange(DataGridColumnStyle* columns[ ]);

[VB] Public Sub AddRange(ByVal columns( ) As DataGridColumnStyle)

[JScript] public function AddRange(columns: DataGridColumnStyle[ ]);

Description

Adds an array of column style objects to the collection. An array of System.Windows.Forms.DataGridColumnStyle objects to add to the collection.

q) Clear

[C#] public void Clear( );

[C++] public: void Clear( );

[VB] Public Sub Clear( )

[JScript] public function Clear( );

Description

Clears the collection of System.Windows.Forms.DataGridColumnStyle objects.

r) Contains

[C#] public bool Contains(DataGridColumnStyle column);

[C++] public: bool Contains(DataGridColumnStyle* column);

[VB] Public Function Contains(ByVal column As DataGridColumnStyle) As Boolean

[JScript] public function Contains(column: DataGridColumnStyle): Boolean;

Description

Gets a value indicating whether the System.Windows.Forms.GridColumnStylesCollection contains the specified System.Windows.Forms.DataGridColumnStyle.

Return Value: true if the collection contains the System.Windows.Forms.DataGridColumnStyle; otherwise, false.

Use the System.Windows.Forms.GridColumnStylesCollection.Contains(System.ComponentModel.PropertyDescriptor) method to determine if a particular System. Windows.Forms.DataGridColumnStyle object exists before invoking the System.Windows.Forms.GridColumnStylesCollection.Remove(System.Windows.Forms.DataGridColumnStyle) method to remove the item. If you need to know the index of a particular System.Windows.Forms.DataGridColumnStyle, use the System.Windows.Forms.GridColumnStylesCollection.IndexOf(System. Windows.Forms. DataGridColumnStyle) method. The desired System.Windows.Forms.DataGridColumnStyle.

s) Contains

[C#] public bool Contains(PropertyDescriptor propDesc);

[C++] public: bool Contains(PropertyDescriptor* propDesc);

[VB] Public Function Contains(ByVal propDesc As PropertyDescriptor) As Boolean

[JScript] public function Contains(propDesc: PropertyDescriptor): Boolean; Gets a value indicating whether the System.Windows.Forms.GridColumnStylesCollection contains a specific System.Windows.Forms.DataGridColumnStyle Description Gets a value indicating whether the System.Windows.Forms. GridColumnStylesCollection contains a System.Windows. Forms.DataGridColumnStyle associated with the specified System.ComponentModel.PropertyDescriptor.

Return Value: true if the collection contains the System.Windows.Forms.DataGridColumnStyle; otherwise, false.

To get a System.ComponentModel.PropertyDescriptor Collection, use the System.Windows.Forms.BindingManagerBase.GetItemProperties method of the System. Windows.Forms.BindingManagerBase class. Pass the System.Windows.Forms.DataGridColumnStyle. MappingName of the System.Windows. Forms.DataGridColumnStyle to the System.ComponentModel.PropertyDescriptorCollection.Item(System.Int32) property of the System.ComponentModel.PropertyDescriptorCollection to return the System.ComponentModel.PropertyDescriptor for a specific column. The System. ComponentModel.PropertyDescriptor associated with the desired System.Windows. Forms.DataGridColumnStyle.

t) Contains

[C#] public bool Contains(string name);

[C++] public: bool Contains(String* name);

[VB] Public Function Contains(ByVal name As String) As Boolean

[JScript] public function Contains(name: String): Boolean;

Description

Gets a value indicating whether the System.Windows.Forms. GridColumnStylesCollection contains the System.Windows. Forms.DataGridColumnStyle with the specified name.

Return Value: true if the collection contains the System.Windows.Forms.DataGridColumnStyle; otherwise, false.

The caption of a System.Windows.Forms.DataGridColumnStyle is set with the System.Windows.Forms.DataGridColumnStyle.HeaderText property. The System.Windows.Forms.DataGridColumnStyle.MappingName of the desired System.Windows.Forms.DataGridColumnStyle.

u) IndexOf

[C#] public int IndexOf(DataGridColumnStyle element);

[C++] public: int IndexOf(DataGridColumnStyle* element);

[VB] Public Function IndexOf(ByVal element As DataGridColumnStyle) As Integer

[JScript] public function IndexOf(element: DataGridColumnStyle): int;

Description

Gets the index of a specified System.Windows.Forms.DataGridColumnStyle.

Return Value: The zero-based index of the System.Windows. Forms.DataGridColumnStyle within the System.Windows. Forms.GridColumnStylesCollection or −1 if no corresponding System.Windows.Forms.DataGridColumnStyle exists.

Use the System.Windows.Forms.GridColumnStyles Collection.Contains(System. ComponentModel.PropertyDescriptor) method to determine if a specific System. Windows. Forms.DataGridColumnStyle exists. If so, and you need the index of the element within the collection, use the System. Windows.Forms.GridColumnStylesCollection.IndexOf (System. Windows.Forms.DataGridColumnStyle) method. The System.Windows.Forms. DataGridColumnStyle to find.

v) OnCollectionChanged

[C#] protected void OnCollectionChanged(CollectionChange EventArgs ccevent);

[C++] protected: void OnCollectionChanged(CollectionChangeEventArgs* ccevent);

[VB] Protected Sub OnCollectionChanged(ByVal ccevent As CollectionChangeEventArgs)

[JScript] protected function OnCollectionChanged(ccevent: CollectionChangeEventArgs);

Description

Raises the System.Windows.Forms.GridColumnStyles Collection.CollectionChanged event.

Raising an event invokes the event handler through a delegate. For more information, see. A System.ComponentModel.CollectionChangeEventArgs that contains the event data event.

w) Remove

[C#] public void Remove(DataGridColumnStyle column);

[C++] public: void Remove(DataGridColumnStyle* column);

[VB] Public Sub Remove(ByVal column As DataGridColumnStyle)

[JScript] public function Remove(column: DataGridColumnStyle); Removes the specified System.Windows.Forms. DataGridColumnStyle from the System.Windows.Forms. GridColumnStylesCollection.

Description

Removes the specified System.Windows.Forms.DataGridColumnStyle from the System.Windows.Forms.GridColumnStylesCollection.

Use the System.Windows.Forms.GridColumnStylesCollection.Contains(System. ComponentModel.PropertyDescriptor) method to determine whether the System.

Windows.Forms.DataGridColumnStyle exists in the collection. The System.Windows.Forms.DataGridColumnStyle to remove from the collection.

x) RemoveAt

[C#] public void RemoveAt(int index);

[C++] public: void RemoveAt(int index);

[VB] Public Sub RemoveAt(ByVal index As Integer)

[JScript] public function RemoveAt(index: int);

Description

Removes the System.Windows.Forms.DataGridColumnStyle with the specified index from the System.Windows.Forms.GridColumnStylesCollection.

Use the System.Windows.Forms.GridColumnStylesCollection.Contains(System. ComponentModel.PropertyDescriptor) method to determine whether the System. Windows.Forms.DataGridColumnStyle exists in the collection. The zero-based index of the System.Windows. Forms. DataGridColumnStyle to remove.

y) ResetPropertyDescriptors

[C#] public void ResetPropertyDescriptors( );

[C++] public: void ResetPropertyDescriptors( );

[VB] Public Sub ResetPropertyDescriptors( )

[JScript] public function ResetPropertyDescriptors( );

Description

Sets the System.ComponentModel.PropertyDescriptor for each column style in the collection to null z) ICollection.CopyTo

[C#] void ICollection.CopyTo(Array array, int index);

[C++] void ICollection::CopyTo(Array* array, int index);

[VB] Sub CopyTo(ByVal array As Array, ByVal index As Integer) Implements ICollection.CopyTo

[JScript] function ICollection.CopyTo(array: Array, index: int);

aa) IEnumerable.GetEnumerator

[C#] IEnumerator IEnumerable.GetEnumerator( );

[C++] IEnumerator* IEnumerable::GetEnumerator( );

[VB] Function GetEnumerator( ) As IEnumerator Implements IEnumerable.GetEnumerator

[JScript] function IEnumerable.GetEnumerator( ): IEnumerator;

bb) IList.Add

[C#] int IList.Add(object value);

[C++] int IList::Add(Object* value);

[VB] Function Add(ByVal value As Object) As Integer Implements IList.Add

[JScript] function IList.Add(value: Object): int;

cc) IList.Clear

[C#] void IList.Clear( );

[C++] void IList::Clear( );

[VB] Sub Clear( ) Implements IList.Clear

[JScript] function IList.Clear( );

dd) IList.Contains

[C#] bool IList.Contains(object value);

[C++] bool IList::Contains(Object* value);

[VB] Function Contains(ByVal value As Object) As Boolean Implements IList.Contains

[JScript] function IList.Contains(value: Object): Boolean;

ee) IList.IndexOf

[C#] int IList.IndexOf(object value);

[C++] int IList::IndexOf(Object* value);

[VB] Function IndexOf(ByVal value As Object) As Integer Implements IList.IndexOf

[JScript] function IList.IndexOf(value: Object): int;

ff) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

gg) IList.Remove

[C#] void IList.Remove(object value);

[C++] void IList::Remove(Object* value);

[VB] Sub Remove(ByVal value As Object) Implements IList.Remove

[JScript] function IList.Remove(value: Object);

hh) IList.RemoveAt

[C#] void IList.RemoveAt(int index);

[C++] void IList::RemoveAt(int index);

[VB] Sub RemoveAt(ByVal index As Integer) Implements IList.RemoveAt

[JScript] function IList.RemoveAt(index: int);

GridItem class (System.Windows.Forms)

a) ToString

Description

Implements one row in a System.Windows.Forms.PropertyGrid.

Grid items represent the hierarchy of the view into a System. Windows.Forms.PropertyGrid. You can use a System.Windows.Forms.GridItem to obtain information about the grid's state and contents.

b) GridItem

Example Syntax:

c) ToString

[C#] protected GridItem( );

[C++] protected: GridItem( );

[VB] Protected Sub New( )

[JScript] protected function GridItem( );

d) Expandable e) ToString

[C#] public virtual bool Expandable {get;}

[C++] public: _property virtual bool get_Expandable( );

[VB] Overridable Public ReadOnly Property Expandable As Boolean

[JScript] public function get Expandable( ): Boolean;

Description

When overridden in a derived class, gets a value indicating whether the specified property is expandable.

f) Expanded g) ToString

[C#] public virtual bool Expanded {get; set;}

[C++] public: _property virtual bool get_Expanded( ); public: _property virtual void set_Expanded(bool);

[VB] Overridable Public Property Expanded As Boolean

[JScript] public function get Expanded( ): Boolean; public function set Expanded(Boolean);

Description

When overridden in a derived class, gets or sets a value indicating whether the System.Windows.Forms.GridItem is in an expanded state.

h) GridItems i) ToString

[C#] public abstract GridItemCollection GridItems {get;}

[C++] public: _property virtual GridItemCollection* get_GridItems( )=0;

[VB] MustOverride Public ReadOnly Property GridItems As GridItemCollection

[JScript] public abstract function get GridItems( ): GridItemCollection;

Description

When overridden in a derived class, gets the collection of System.Windows.Forms.GridItem objects, if any, associated as a child of this System.Windows.Forms.GridItem.

j) GridItemType k) ToString

[C#] public abstract GridItemType GridItemType {get;}

[C++] public: _property virtual GridItemType get_GridItemType( )=0;

[VB] MustOverride Public ReadOnly Property GridItemType As GridItemType

[JScript] public abstract function get GridItemType( ): GridItemType;

Description

When overridden in a derived class, gets the type of this System.Windows.Forms.GridItem.

For a System.Windows.Forms.GridItem of type System.Windows.Forms.GridItemType.Property, you must also ensure that the System.Windows.Forms.GridItem.Property Descriptor has a valid value. For a System.Windows.Forms.GridItem of type System.Windows.Forms.GridItemType.Root the System.Windows.Forms.GridItem.Parent property must be null.

l) Label m) ToString

[C#] public abstract string Label {get;}

[C++] public: _property virtual String* get_Label( )=0;

[VB] MustOverride Public ReadOnly Property Label As String

[JScript] public abstract function get Label( ): String;

Description

When overridden in a derived class, gets the text of this System.Windows.Forms.GridItem.

This class gets the text that displays in the left column of the grid. The text retrieved can be different from the actual property name of the property represented by this System.Windows.Forms.GridItem. You can get the name for a System.Windows.Forms.GridItem of type System.Windows.Forms.GridItemType.Property by retrieving the System.Windows.Forms.GridItem. PropertyDescriptor and checking its System.ComponentModel.MemberDescriptor.Name property.

n) Parent o) ToString

[C#] public abstract GridItem Parent {get;}

[C++] public: _property virtual GridItem* get_Parent( )=0;

[VB] MustOverride Public ReadOnly Property Parent As GridItem

[JScript] public abstract function get Parent( ): GridItem;

Description

When overridden in a derived class, gets the parent System.Windows.Forms.GridItem of this System.Windows.Forms.GridItem, if any.

p) PropertyDescriptor q) ToString

[C#] public abstract PropertyDescriptor PropertyDescriptor {get;}

[C++] public: _property virtual PropertyDescriptor* get_PropertyDescriptor( )=0;

[VB] MustOverride Public ReadOnly Property PropertyDescriptor As PropertyDescriptor

[JScript] public abstract function get PropertyDescriptor( ): PropertyDescriptor;

Description

When overridden in a derived class, gets the System.ComponentModel.PropertyDescriptor that is associated with this System.Windows.Forms.GridItem.

This property is only valid for a System.Windows.Forms.GridItem of type System.Windows.Forms.GridItemType.Property.

r) Value s) ToString

[C#] public abstract object Value {get;}

[C++] public: _property virtual Object* get_Value( )=0;

[VB] MustOverride Public ReadOnly Property Value As Object

[JScript] public abstract function get Value( ): Object;

Description

When overridden in a derived class, gets the current value of this System.Windows.Forms.GridItem.

t) Select

[C#] public abstract bool Select( );

[C++] public: virtual bool Select( )=0;

[VB] MustOverride Public Function Select( ) As Boolean

[JScript] public abstract function Select( ): Boolean;

Description

When overridden in a derived class, selects this System.Windows.Forms.GridItem in the System.Windows.Forms.PropertyGrid.

Return Value: true if the selection is successful; otherwise, false.

GridItemCollection class (System.Windows.Forms)

a) ToString

Description

Contains a collection of System.Windows.Forms.GridItem objects.

This class represents a collection of System.Windows.Forms.GridItem objects stored in a System.Windows.Forms.PropertyGrid.

b) ToString

[C#] public static GridItemCollection Empty;

[C++] public: static GridItemCollection* Empty;

[VB] Public Shared Empty As GridItemCollection

[JScript] public static var Empty: GridItemCollection;

Description c) Count d) ToString

[C#] public int Count {get;}

[C++] public: _property int get_Count( );

[VB] Public ReadOnly Property Count As Integer

[JScript] public function get Count( ): int;

Description

Gets the number of grid items in the collection.

e) Item f) ToString

[C#] public GridItem this[string label] {get;}

[C++] public: _property GridItem* get_Item(String* label);

[VB] Public Default ReadOnly Property Item(ByVal label As String) As GridItem

[JScript] returnValue=GridItemCollectionObject.Item(label);

Description

Gets the System.Windows.Forms.GridItem with the matching label. A string value to match to a grid item label g) Item h) ToString

[C#] public GridItem this[int index] {get;}

[C++] public: _property GridItem* get_Item(int index);

[VB] Public Default ReadOnly Property Item(ByVal index As Integer) As GridItem

[JScript] returnValue=GridItemCollectionObject.Item(index); Gets a System.Windows.Forms.GridItem from the collection.

Description

Gets the System.Windows.Forms.GridItem at the specified index. The index of the grid item to return.

i) GetEnumerator

[C#] public IEnumerator GetEnumerator( );

[C++] public: sealed IEnumerator* GetEnumerator( );

[VB] NotOverridable Public Function GetEnumerator( ) As IEnumerator

[JScript] public function GetEnumerator( ): IEnumerator;

Description

Returns an enumeration of all the grid items in the collection.

Return Value: An System.Collections.IEnumerator for the System.Windows.Forms.GridItemCollection.

j) ICollection.CopyTo

[C#] void ICollection.CopyTo(Array dest, int index);

[C++] void ICollection::CopyTo(Array* dest, Mt index);

[VB] Sub CopyTo(ByVal dest As Array, ByVal index As Integer) Implements ICollection.CopyTo

[JScript] function ICollection.CopyTo(dest: Array, index: int);

GridItemType enumeration (System.Windows.Forms)

a) ToString

Description

Specifies the valid grid item types for a System.Windows.Forms.PropertyGrid.

b) ToString

[C#] public const GridItemType ArrayValue;

[C++] public: const GridItemType ArrayValue;

[VB] Public Const ArrayValue As GridItemType

[JScript] public var ArrayValue: GridItemType;

Description

The System.Windows.Forms.GridItem is an element of an array.

c) ToString

[C#] public const GridItemType Category;

[C++] public: const GridItemType Category;

[VB] Public Const Category As GridItemType

[JScript] public var Category: GridItemType;

Description

A grid entry that is a category name. A category is a descriptive grouping for groups of System.Windows.Forms.GridItem rows. Typical categories include the following Behavior, Layout, Data, and Appearance.

d) ToString

[C#] public const GridItemType Property;

[C++] public: const GridItemType Property;

[VB] Public Const Property As GridItemType

[JScript] public var Property: GridItemType;

Description

A grid entry that corresponds to a property.

e) ToString

[C#] public const GridItemType Root;

[C++] public: const GridItemType Root;

[VB] Public Const Root As GridItemType

[JScript] public var Root: GridItemType;

Description

A root item in the grid hierarchy.

GridTablesFactory class (System.Windows.Forms)

a) ToString

Description b) CreateGridTables

[C#] public static DataGridTableStyle[ ] CreateGridTables (DataGridTableStyle gridTable, object dataSource, string dataMember, BindingContext bindingManager);

[C++] public: static DataGridTableStyle* CreateGridTables (DataGridTableStyle* gridTable, Object* dataSource, String* dataMember, BindingContext* bindingManager) [ ];

[VB] Public Shared Function CreateGridTables(ByVal gridTable As DataGridTableStyle, ByVal dataSource As Object, ByVal dataMember As String, ByVal bindingManager As BindingContext) As DataGridTableStyle( )

[JScript] public static function CreateGridTables(gridTable: DataGridTableStyle, dataSource: Object, dataMember: String, bindingManager: BindingContext): DataGridTable Style[ ];

Description

Takes a DataView and creates an intelligent mapping of DataView storage types into available DataColumn types.

Return Value: A GridTables containing DataGridTable objects which map to the DataTables "reachable" from the cursor specified. Only DataTables that are accessible from the DataTable associated with cursor through child relations will be contained in the collection.

GridTableStylesCollection class (System.Windows.Forms)

a) ToString

Description

Represents a collection of System.Windows.Forms.DataGridTableStyle objects in the System.Windows.Forms.DataGrid control.

The System.Windows.Forms.GridTableStylesCollection contains System.Windows.Forms.DataGridTableStyle objects that allows the System.Windows.Forms.DataGrid control to display a customized grid style for each System.Data.DataTable in a System.Data.DataSet.

b) Count c) IsReadOnly d) IsSynchronized e) Item f) ToString

System.Windows.Forms.DataGridTableStyle

Description

Gets the System.Windows.Forms.DataGridTableStyle specified by index.

Use the System.Windows.Forms.GridTable StylesCollection.Add(System.Windows.Forms.DataGridTableStyle) or System.Windows.Forms.GridTable StylesCollection.AddRange(System.Windows.Forms.DataGridTableStyle[ ]) method to add items to the collection. The index of the System.Windows.Forms.DataGridTableStyle to get.

g) Item h) ToString

[C#] public DataGridTableStyle this[string tableName] {get;}

[C++] public: _property DataGridTableStyle* get_Item (String* tableName);

[VB] Public Default ReadOnly Property Item(ByVal tableName As String) As DataGridTableStyle

[JScript] returnValue=GridTableStylesCollectionObject.Item(tableName);

Description

Gets the System.Windows.Forms.DataGridTableStyle with the specified name.

When retrieving a System.Windows.Forms.DataGridTableStyle by System.Windows.Forms.DataGridTableStyle.MappingName, the System.Windows.Forms.GridTableStylesCollecion.Item(System.Int32) property uses a case-insensitive comparison. The System.Windows.Forms.DataGridTableStyle.MappingName of the System.Windows.Forms.DataGridTableStyle to retrieve.

i) List j) ToString

[C#] protected override ArrayList List {get;}

[C++] protected: _property virtual ArrayList* get_List( );

[VB] Overrides Protected ReadOnly Property List As ArrayList

[JScript] protected function get List( ): ArrayList;

Description

Gets the underlying list.

k) SyncRoot l) ToString

Description

OCCURS when the collection has changed.

For more information about handling events, see.

m) Add

[C#] public virtual int Add(DataGridTableStyle table);

[C++] public: virtual int Add(DataGridTableStyle* table);

[VB] Overridable Public Function Add(ByVal table As DataGridTableStyle) As Integer

[JScript] public function Add(table: DataGridTableStyle): int;

Description

Adds a System.Windows.Forms.DataGridTableStyle to this collection.

Return Value: The index of the newly added object. The System.Windows.Forms.DataGridTableStyle to add to the collection.

n) AddRange

[C#] public virtual void AddRange(DataGridTableStyle[ ] tables);

[C++] public: virtual void AddRange(DataGridTableStyle* tables[ ]);

[VB] Overridable Public Sub AddRange(ByVal tables( ) As DataGridTableStyle)

[JScript] public function AddRange(tables: DataGridTable Style[ ]);

Description

Adds an array of table styles to the collection. An array of System.Windows.Forms.DataGridTableStyle objects.

o) Clear

[C#] public void Clear( );

[C++] public: void Clear( );

[VB] Public Sub Clear( )

[JScript] public function Clear( );

Description

Clears the collection.

p) Contains

[C#] public bool Contains(DataGridTableStyle table);

[C++] public: bool Contains(DataGridTableStyle* table);

[VB] Public Function Contains(ByVal table As DataGridTableStyle) As Boolean

[JScript] public function Contains(table: DataGridTable Style): Boolean; Gets a value indicating whether the System. Windows.Forms.GridTableStylesCollection contains the specified System.Windows.Forms.DataGridTableStyle Description Gets a value indicating whether the System.Windows.Forms. GridTableStylesCollection contains the specified System. Windows.Forms.DataGridTableStyle.

Return Value: true if the specified table style exists in the collection; otherwise, false. The System.Windows.Forms. DataGridTableStyle to look for.

q) Contains

[C#] public bool Contains(string name);

[C++] public: bool Contains(String* name);

[VB] Public Function Contains(ByVal name As String) As Boolean

[JScript] public function Contains(name: String): Boolean;

Description

Gets a value indicating whether the System.Windows.Forms. GridTableStylesCollection contains the System.Windows. Forms.DataGridTableStyle specified by name.

Return Value: true if the specified table style exists in the collection; otherwise, false. The System.Windows.Forms. DataGridTableStyle.MappingName of the System.Windows.Forms.DataGridTableStyle to look for.

r) OnCollectionChanged

[C#] protected void OnCollectionChanged(CollectionChange EventArgs ccevent);

[C++] protected: void on CollectionChanged(CollectionChangeEventArgs* ccevent);

[VB] Protected Sub OnCollectionChanged(ByVal ccevent As CollectionChangeEventArgs)

[JScript] protected function OnCollectionChanged(ccevent: CollectionChangeEventArgs);

Description

Raises the System.Windows.Forms.GridTable StylesCollection.CollectionChanged event. A System.ComponentModel. CollectionChangeEventArgs containing the event data.

s) Remove

[C#] public void Remove(DataGridTableStyle table);

[C++] public: void Remove(DataGridTableStyle* table);

[VB] Public Sub Remove(ByVal table As DataGridTable Style)

[JScript] public function Remove(table: DataGridTable Style);

Description

Removes the specified System.Windows.Forms.DataGridTableStyle.

Use the System.Windows.Forms.GridTable StylesCollection.Contains(System.Windows.Forms.DataGridTableStyle) method to determine if a specific System. Windows.Forms. DataGridTableStyle object exists before using the System. Windows.Forms.GridTable StylesCollection.Remove(System.Windows.Forms.DataGridTableStyle) method. The System.Windows.Forms.DataGridTableStyle to remove.

t) RemoveAt

[C#] public void RemoveAt(int index);

[C++] public: void RemoveAt(int index);

[VB] Public Sub RemoveAt(ByVal index As Integer)

[JScript] public function RemoveAt(index: int);

Description

Removes a System.Windows.Forms.DataGridTableStyle at the specified index.

Use the System.Windows.Forms.GridTable StylesCollection.Contains(System.Windows.Forms.DataGridTableStyle) method to determine if a specific System. Windows.Forms. DataGridTableStyle object exists before using the System. Windows.Forms.GridTable StylesCollection.Remove(System.Windows.Forms.DataGridTableStyle) method. The index of the System.Windows. Forms.DataGridTableStyle to remove.

u) ICollection.CopyTo

[C#] void ICollection.CopyTo(Array array, int index);

[C++] void ICollection::CopyTo(Array* array, int index);

[VB] Sub CopyTo(ByVal array As Array, ByVal index As Integer) Implements ICollection.CopyTo

[JScript] function ICollection.CopyTo(array: Array, index: int);

v) IEnumerable.GetEnumerator

[C#] IEnumerator IEnumerable.GetEnumerator( );

[C++] IEnumerator* IEnumerable::GetEnumerator( );

[VB] Function GetEnumerator( ) As IEnumerator Implements IEnumerable.GetEnumerator

[JScript] function IEnumerable.GetEnumerator( ): IEnumerator;

w) IList.Add

[C#] int IList.Add(object value);

[C++] int IList::Add(Object* value);

[VB] Function Add(ByVal value As Object) As Integer Implements IList.Add

[JScript] function IList.Add(value: Object): int;

x) IList.Clear

[C#] void IList.Clear( ); [C++] void IList::Clear( );

[VB] Sub Clear( ) Implements IList.Clear

[JScript] function IList.Clear( );

y) IList.Contains

[C#] bool IList.Contains(object value);

[C++] bool IList::Contains(Object* value);

[VB] Function Contains(ByVal value As Object) As Boolean Implements IList.Contains

[JScript] function IList.Contains(value: Object): Boolean;

z) IList.IndexOf

[C#] int IList.IndexOf(object value);

[C++] int IList::IndexOf(Object* value);

[VB] Function IndexOf(ByVal value As Object) As Integer Implements IList.IndexOf

[JScript] function IList.IndexOf(value Object) int;

aa) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

bb) IList.Remove

[C#] void IList.Remove(object value);

[C++] void IList::Remove(Object* value);

[VB] Sub Remove(ByVal value As Object) Implements IList.Remove

[JScript] function IList.Remove(value: Object);

cc) IList.RemoveAt

[C#] void IList.RemoveAt(int index);

[C++] void IList::RemoveAt(int index);

[VB] Sub RemoveAt(ByVal index As Integer) Implements IList.RemoveAt

[JScript] function IList.RemoveAt(index: int);

GroupBox class (System.Windows.Forms)

a) ToString

Description

Represents a Windows group box.

The System.Windows.Forms.GroupBox displays a frame around a group of controls with or without a caption. Use a System.Windows.Forms.GroupBox to logically group a collection of controls on a form. The group box is a container control that can be used to define groups of controls.

b) GroupBox

Example Syntax:

c) ToString

[C#] public GroupBox( );

[C++] public: GroupBox( );

[VB] Public Sub New( )

[JScript] public function GroupBox( );

Description

Initializes a new instance of the System.Windows.Forms.GroupBox class.

By default, the System.Windows.Forms.Control.TabStop property is set to false when a new System.Windows.Forms.GroupBox is created. The group box has an initial height of 100 pixels and width of 200 pixels.

d) AccessibilityObject
e) AccessibleDefaultActionDescription
f) AccessibleDescription
g) AccessibleName
h) AccessibleRole
i) AllowDrop
j) ToString Description Gets or sets a value indicating whether the control will allow drag and drop operations and events to be used.

k) Anchor
l) BackColor
m) BackgroundImage
n) BindingContext
o) Bottom
p) Bounds
q) CanFocus
r) CanSelect
s) Capture
t) CausesValidation
u) ClientRectangle
v) ClientSize
w) CompanyName
x) Container
y) ContainsFocus
z) ContextMenu
aa) Controls
bb) Created
cc) CreateParams
dd) ToString Description ee) Cursor
ff) DataBindings
gg) DefaultImeMode
hh) DefaultSize
ii) ToString Description Deriving classes can override this to configure a default size for their control. This is more efficient than setting the size in the control's constructor.

jj) DesignMode
kk) DisplayRectangle
ll) ToString

Description

Gets a rectangle that represents the dimensions of the System.Windows.Forms.GroupBox.

The rectangle is Gets a rectangle that represents the dimensions of the System.Windows.Forms.GroupBox.

mm) Disposing
nn) Dock
oo) Enabled
pp) Events
qq) FlatStyle
rr) ToString

Description

Gets or sets the flat style appearance of the group box control.

ss) Focused
tt) Font
uu) FontHeight
vv) ForeColor
ww) Handle
xx) HasChildren
yy) Height
zz) ImeMode
aaa) InvokeRequired
bbb) IsAccessible
ccc) IsDisposed
ddd) IsHandleCreated
eee) Left
fff) Location
ggg) Name
hhh) Parent
iii) ProductName
jjj) ProductVersion
kkk) RecreatingHandle
lll) Region
mmm) RenderRightToLeft
nnn) ResizeRedraw
ooo) Right
ppp) RightToLeft
qqq) ShowFocusCues
rrr) ShowKeyboardCues
sss) Site
ttt) Size
uuu) TabIndex
vvv) TabStop
www) ToString Description Gets or sets a value indicating whether the user may press the TAB key to give the focus to the System.Windows.Forms.GroupBox.

xxx) Tag
yyy) Text
zzz) ToString

Description aaaa) Top
bbbb) TopLevelControl
cccc) Visible
dddd) Width
eeee) WindowTarget
ffff) ToString
gggg) ToString
hhhh) ToString
iiii) ToString
jjjj) ToString
kkkk) ToString
llll) ToString
mmmm) ToString
nnnn) ToString
oooo) ToString
pppp) OnFontChanged

[C#] protected override void OnFontChanged(EventArgs

[C++] protected: void OnFontChanged(EventArgs* e);

[VB] Overrides Protected Sub OnFontChanged(ByVal e As EventArgs)

[JScript] protected override function OnFontChanged(e: EventArgs);

Description qqqq) OnPaint

[C+] protected override void OnPaint(PaintEventArgs e);

[C++] protected: void OnPaint(PaintEventArgs* e);

[VB] Overrides Protected Sub OnPaint(ByVal e As PaintEventArgs)

[JScript] protected override function OnPaint(e: PaintEvent Args);

rrrr) ProcessMnemonic

[C#] protected override bool ProcessMnemonic(char charCode);

[C++] protected: bool ProcessMnemonic(_wchar_t charCode);

[VB] Overrides Protected Function ProcessMnemonic(ByVal charCode As Char) As Boolean

[JScript] protected override function ProcessMnemonic(char Code: Char): Boolean;

Description

We use this to process mnemonics and send them on to the first child control.

ssss) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

tttt) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

Help class (System.Windows.Forms)

a) WndProc

Description

Encapsulates the HTML Help 1.0 engine.

You cannot create a new instance of the System.Windows.Forms.Help class. To provide Help to an application, call the static System.Windows.Forms.Help.ShowHelp(System.Windows.Forms.Control, System.String) and System.Windows.Forms.Help.ShowHelpIndex(System.Windows.Forms. Control, System.String) methods.

b) ShowHelp

[C#] public static void ShowHelp(Control parent, string url);

[C++] public: static void ShowHelp(Control* parent, String* url);

[VB] Public Shared Sub ShowHelp(ByVal parent As Control, ByVal url As String)

[JScript] public static function ShowHelp(parent: Control, url: String); Displays the contents of a Help file.

Description

Displays the contents of the Help file at the specified URL.

The url parameter can be of the form C:\path\sample.chm or /folder/file.htm. A System.Windows.Forms.Control that identifies the parent of the Help dialog box. The path and name of the Help file.

c) ShowHelp

[C#] public static void ShowHelp(Control parent, string url, HelpNavigator navigator);

[C++] public: static void ShowHelp(Control* parent, String* url, HelpNavigator navigator);

[VB] Public Shared Sub ShowHelp(ByVal parent As Control, ByVal url As String, ByVal navigator As HelpNavigator)

[JScript] public static function ShowHelp(parent: Control, url: String, navigator: HelpNavigator);

Description

Displays the contents of the Help file found at the specified URL for a specific topic.

The url parameter can be of the form C:\path\sample.chm or /folder/file.htm. A System.Windows.Forms.Control that identifies the parent of the Help dialog box. The path and name of the Help file. One of the System.Windows.Forms.HelpNavigator values.

d) ShowHelp

[C#] public static void ShowHelp(Control parent, string url, string keyword);

[C++] public: static void ShowHelp(Control* parent, String* url, String* keyword);

[VB] Public Shared Sub ShowHelp(ByVal parent As Control, ByVal url As String, ByVal keyword As String)

[JScript] public static function ShowHelp(parent: Control, url: String, keyword: String);

Description

Displays the contents of the Help file found at the specified URL for a specific keyword.

The url parameter can be of the form C:\path\sample.chm or /folder/file.htm. A System.Windows.Forms.Control that identifies the parent of the Help dialog box. The path and name of the Help file. The keyword to display Help for.

e) ShowHelp

[C#] public static void ShowHelp(Control parent, string url, HelpNavigator command, object param);

[C++] public: static void ShowHelp(Control* parent, String* url, HelpNavigator command, Object* param);

[VB] Public Shared Sub ShowHelp(ByVal parent As Control, ByVal url As String, ByVal command As HelpNavigator, ByVal param As Object)

[JScript] public static function ShowHelp(parent: Control, url: String, command: HelpNavigator, param Object);

Description

Displays the contents of the Help file located at the URL supplied by the user.

Compiled help files provide table of contents, index, search, and keyword links in pages. You can use the following values for command: System.Windows.Forms.HelpNavigator.TableOfContents, System.Windows.Forms.HelpNavigator.Find, System.Windows.Forms.HelpNavigator.Index, or System.Windows.Forms.HelpNavigator.Topic. A System.Windows.Forms.Control that identifies the parent of the Help dialog box. The path and name of the Help file. One of the System.Windows.Forms.HelpNavigator values. The numeric id of the topic to display.

f) ShowHelpIndex

[C#] public static void ShowHelpIndex(Control parent, string url);

[C++] public: static void ShowHelpIndex(Control* parent, String* url);

[VB] Public Shared Sub ShowHelpIndex(ByVal parent As Control, ByVal Url As String)

[JScript] public static function ShowHelpIndex(parent: Control, url String);

Description

Displays the index of the specified Help file.

The url parameter can be of the form C:\path\sample.chm or /folder/file.htm. A System.Windows.Forms.Control that identifies the parent of the Help dialog box. The path and name of the Help file.

g) ShowPopup

[C#] public static void ShowPopup(Control parent, string caption, Point location);

[C++] public: static void ShowPopup(Control* parent, String* caption, Point location);

[VB] Public Shared Sub ShowPopup(ByVal parent As Control, ByVal caption As String, ByVal location As Point)

[JScript] public static function ShowPopup(parent: Control, caption: String, location Point);

Description

Displays a help pop-up window. A System.Windows.Forms.Control that identifies the parent of the Help dialog box. The message to display in the pop-up window. A value specifying the horizontal and vertical coordinates at which to display the pop-up window.

HelpEventArgs class (System.Windows.Forms)

a) ToString

Description

Provides data for the System.Windows.Forms.Control.HelpRequested event.

The System.Windows.Forms.Control.HelpRequested event occurs when the user requests help for a control. A System.

Windows.Forms.HelpEventArgs object specifies the screen coordinates of the mouse pointer and whether the event was handled.

b) HelpEventArgs

[C#] public HelpEventArgs(Point mousePos);

[C++] public: HelpEventArgs(Point mousePos);

[VB] Public Sub New(ByVal mousePos As Point)

[JScript] public function HelpEventArgs(mousePos: Point);

Description

Initializes a new instance of the System.Windows.Forms.HelpEventArgs class. The coordinates of the mouse pointer.

d) Handled e) ToString

[C#] public bool Handled {get; set;}

[C++] public: _property bool get Handled( ); public: _property void set_Handled(bool);

[VB] Public Property Handled As Boolean

[JScript] public function get Handled( ): Boolean; public function set Handled(Boolean);

Description

Gets or sets a value indicating whether the help event was handled.

If you do not set this property to true the event will be passed to Windows for additional processing.

f) MousePos g) ToString

[C#] public Point MousePos {get;}

[C++] public: _property Point get_MousePos( );

[VB] Public ReadOnly Property MousePos As Point

[JScript] public function get MousePos( ): Point;

Description

Gets the screen coordinates of the mouse pointer.

You can use this information to provide help based on the position of the mouse pointer.

HelpEventHandler delegate (System.Windows.Forms)

a) ToString

Description

Represents the method that will handle the System.Windows.Forms.Control.HelpRequested event of a System.Windows.Forms.Control. The source of the event. A System.Windows.Forms.HelpEventArgs that contains the event data.

When you create a System.Windows.Forms.HelpEventHandler delegate, you identify the method that will handle the event. To associate the event with your event handler, add an instance of the delegate to the event. The event handler is called whenever the event occurs, unless you remove the delegate. For more information about handling events with delegates, see.

HelpNavigator enumeration (System.Windows.Forms)

a) ToString

Description

Specifies constants indicating which elements of the Help file to display.

This enumeration is used by System.Windows.Forms.Help and System.Windows.Forms.HelpProvider to provide access to specific elements of the Help file.

b) ToString

[C#] public const HelpNavigator AssociateIndex;

[C++] public: const HelpNavigator AssociateIndex;

[VB] Public Const AssociateIndex As HelpNavigator

[JScript] public var AssociateIndex: HelpNavigator;

Description

Specifies that the index for a specified topic is performed in the specified URL.

c) ToString

[C#] public const HelpNavigator Find;

[C++] public: const HelpNavigator Find;

[VB] Public Const Find As HelpNavigator

[JScript] public var Find: HelpNavigator;

Description

Specifies that the search page of a specified URL is displayed.

d) ToString

[C#] public const HelpNavigator Index;

[C++] public: const HelpNavigator Index;

[VB] Public Const Index As HelpNavigator

[JScript] public var Index: HelpNavigator;

Description

Specifies that the index of a specified URL is displayed.

e) ToString

[C#] public const HelpNavigator KeywordIndex;

[C++] public: const HelpNavigator KeywordIndex;

[VB] Public Const KeywordIndex As HelpNavigator

[JScript] public var KeywordIndex: HelpNavigator;

Description

Specifies a keyword to search for and the action to take in the specified URL.

f) ToString

[C#] public const HelpNavigator TableOfContents;

[C++] public: const HelpNavigator TableOfContents;

[VB] Public Const TableOfContents As HelpNavigator

[JScript] public var TableOfContents: HelpNavigator;

Description

Specifies that the table of contents of the HTML 1.0 Help file is displayed.

g) ToString

[C#] public const HelpNavigator Topic;

[C++] public: const HelpNavigator Topic;

[VB] Public Const Topic As HelpNavigator

[JScript] public var Topic HelpNavigator;

Description

Specifies that the topic referenced by the specified URL is displayed.

HelpProvider class (System.Windows.Forms)

a) ToString

Description

Provides pop-up or online Help for controls.

Each instance of System.Windows.Forms.HelpProvider maintains a collection of references to controls associated with it. To associate a Help file with the System.Windows.Forms.HelpProvider object, set the System.Windows.Forms.HelpProvider.HelpNamespace property. You specify the type of Help provided by calling System.Windows.Forms. HelpProvider.SetHelpNavigator(System.Windows.Forms. Control, System.Windows.Forms.HelpNavigator) and providing System.Windows.Forms.HelpNavigator value for the specified control. You provide the keyword or topic for the Help by calling System.Windows.Forms.HelpProvider.Set HelpKeyword(System.Windows.Forms.Control, System.String).

b) HelpProvider

Example Syntax:

c) ToString

[C#] public HelpProvider( );

[C++] public: HelpProvider( );

[VB] Public Sub New( )

[JScript] public unction HelpProvider( );

Description

Initializes a new instance of the System.Windows.Forms.HelpProvider class.

Once you have created an instance of System.Windows.Forms.HelpProvider, use System.Windows.Forms.HelpProvider.HelpNamespace, System.Windows.Forms.HelpProvider.SetHelpKeyword(System.Windows.Forms.Control, System.String), and System.Windows.Forms.HelpProvider.SetHelpNavigator(System.Windows.Forms.Control, System.Windows.Forms.HelpNavigator) to associate your help topics with a control.

d) Container e) DesignMode f) Events g) HelpNamespace h) ToString

Description

Gets or sets a value specifying the name of the Help file associated with this System.Windows.Forms.HelpProvider object.

The file name retrieved by this method identifies the file that provides Help support for all the controls for which this object provides Help. This file name can designate either a compiled Help file (.chm) or a raw HTML file.

i) Site j) CanExtend

[C#] public virtual bool CanExtend(object target);

[C++] public: virtual bool CanExtend(Object* target);

[VB] Overridable Public Function CanExtend(ByVal target As Object) As Boolean

[JScript] public function CanExtend(target: Object): Boolean;

Description

Specifies whether this object can provide its extender properties to the specified object. The object k) GetHelpKeyword

[C#] public virtual string GetHelpKeyword(Control ctl);

[C++] public: virtual String* GetHelpKeyword(Control* ctl);

[VB] Overridable Public Function GetHelpKeyword(ByVal ctl As Control) As String

[JScript] public function GetHelpKeyword(ctl: Control): String;

Description

Gets the Help keyword for the specified control.

Return Value: The Help topic associated with this control. If the System.Windows.Forms.HelpProvider object is currently configured to display the entire Help file or is configured to provide a Help string, this method returns null. A System.Windows.Forms.Control from which to retrieve the Help topic.

l) GetHelpNavigator

[C#] public virtual HelpNavigator GetHelpNavigator(Control ctl);

[C++] public: virtual HelpNavigator GetHelpNavigator (Control* ctl);

[VB] Overridable Public Function GetHelpNavigator(ByVal ctl As Control) As HelpNavigator

[JScript] public function GetHelpNavigator(ctl: Control): HelpNavigator;

Description

Gets the current System.Windows.Forms.HelpNavigator setting for the specified control.

Return Value: The System.Windows.Forms.HelpNavigator setting for the specified control. The default is null. A System.Windows.Forms.Control from which to retrieve the Help string.

m) GetHelpString

[C#] public virtual string GetHelpString(Control ctl);

[C++] public: virtual String* GetHelpString(Control* ctl);

[VB] Overridable Public Function GetHelpString(ByVal ctl As Control) As String

[JScript] public function GetHelpString(ctl: Control): String;

Description

Gets the contents of the pop-up Help window for the specified control.

Return Value: The Help string associated with this control. The default value is null.

To display this Help string at run time, the user presses the F1 Key while the specified control has the input focus. A System.Windows.Forms.Control from which to retrieve the Help string.

n) GetShowHelp

[C#] public virtual bool GetShowHelp(Control ctl);

[C++] public: virtual bool GetShowHelp(Control* ctl);

[VB] Overridable Public Function GetShowHelp(ByVal ctl As Control) As Boolean

[JScript] public function GetShowHelp(ctl: Control): Boolean;

Description

Gets a value indicating whether the specified control is associated with this System.Windows.Forms.HelpProvider.

Return Value: true if Help will be displayed for the control; otherwise, false.

When you use the System.Windows.Forms.HelpProvider.SetHelpKeyword(System.Windows.Forms.Control, System.String) or System.Windows.Forms.HelpProvider.SetHelpString(System.Windows.Forms.Control, System.String) method to associate a keyword or prompt with a specified control, calling this method automatically returns true. You can override this behavior by passing false to the System.Windows.Forms.HelpProvider.SetShowHelp(System.Windows.Forms.Control, System.Boolean) method. A System.Windows.Forms.Control for which Help will be displayed.

o) ResetShowHelp

[C#] public virtual void ResetShowHelp(Control ctl);

[C++] public: virtual void ResetShowHelp(Control* ctl);

[VB] Overridable Public Sub ResetShowHelp(ByVal ctl As Control)

[JScript] public function ResetShowHelp(ctl: Control);

Description

Used by the designer Used by the designer p) SetHelpKeyword

[C#] public virtual void SetHelpKeyword(Control ctl, string keyword);

[C++] public: virtual void SetHelpKeyword(Control* ctl, String* keyword);

[VB] Overridable Public Sub SetHelpKeyword(ByVal ctl As Control, ByVal keyword As String)

[JScript] public function SetHelpKeyword(ctl: Control, keyword: String);

Description

Specifies the keyword used to retrieve Help when the user invokes Help for the specified control.

The Help keyword provides the key information to retrieve the help associated with this control from the Help file specified by System.Windows.Forms.HelpProvider.HelpNamespace. To clear the keyword call System.Windows.Forms.HelpProvider.SetHelpKeyword(System.Windows.Forms.Control, System.String) with a keyword value of null. A System.Windows.Forms.Control that specifies the control for which to set the Help topic. The Help keyword to associate with the control.

q) SetHelpNavigator

[C#] public virtual void SetHelpNavigator(Control ctl, HelpNavigator navigator);

[C++] public: virtual void SetHelpNavigator(Control* ctl, HelpNavigator navigator);

[VB] Overridable Public Sub SetHelpNavigator(ByVal ctl As Control, ByVal navigator As HelpNavigator)

[JScript] public function SetHelpNavigator(ctl: Control, navigator HelpNavigator);

Description

Specifies the Help command to use when retrieving Help from the Help file for the specified control. A System.Windows.Forms.Control for which to set the Help keyword. The Help keyword to associate with the control; or null, if the contents of the entire Help file display.

r) SetHelpString

[C#] public virtual void SetHelpString(Control ctl, string helpString);

[C++] public: virtual void SetHelpString(Control* ctl, String* helpString);

[VB] Overridable Public Sub SetHelpString(ByVal ctl As Control, ByVal helpString As String)

[JScript] public function SetHelpString(ctl: Control, helpString: String);

Description

Specifies the Help string associated with the specified control.

The Help string that you specify in the helpString parameter is displayed in a pop-Up window when the user presses the F1 Key while the specified control has focus. A System.Windows.Forms.Control with which to associate the Help string. The Help string associated with the control.

s) SetShowHelp

[C#] public virtual void SetShowHelp(Control ctl, bool value);

[C++] public: virtual void SetShowHelp(Control* ctl, bool value);

[VB] Overridable Public Sub SetShowHelp(ByVal ctl As Control, ByVal value As Boolean)

[JScript] public function SetShowHelp(ctl: Control, value: Boolean);

Description

Specifies whether Help is displayed for the specified control.

If you previously called the System.Windows.Forms.HelpProvider.SetHelpString(System.Windows.Forms.Control, System.String) or System.Windows.Forms.HelpProvider.SetHelpKeyword(System.Windows.Forms.Control, System.String) for the control specified in the ctl parameter, the System.Windows.Forms.HelpProvider object automatically displays Help for that control. To modify this behavior, call the System.Windows.Forms.HelpProvider.SetShowHelp(System.Windows.Forms.Control, System.Boolean) method, specifying false in the value parameter. A System.Windows.Forms.Control for which Help is turned on or off. true if Help displays for the control; otherwise, false.

t) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

MonthCalendar.HitArea enumeration (System.Windows.Forms)

a) ToString

Description

Defines constants that represent areas in a System.Windows.Forms.MonthCalendar control.

This enumeration has specific areas of the System.Windows.Forms.MonthCalendar control as its enumerated values. The System.Windows.Forms.MonthCalendar.HitTestInfo.HitArea member of System.Windows.Forms.MonthCalendar.HitTestInfo will be one of these enumerated values, and indicates which portion of a month calendar is under a specified point.

b) ToString

[C#] public const MonthCalendar.HitArea CalendarBackground;

[C++] public: const MonthCalendar.HitArea CalendarBackground;

[VB] Public Const CalendarBackground As MonthCalendar.HitArea

[JScript] public var CalendarBackground: MonthCalendar.HitArea;

Description

The specified point is part of the calendar's background.

c) ToString

[C#] public const MonthCalendar.HitArea Date;

[C++] public: const MonthCalendar.HitArea Date;

[VB] Public Const Date As MonthCalendar.HitArea

[JScript] public var Date: MonthCalendar.HitArea;

Description

The specified point is on a date within the calendar. The System.Windows.Forms.MonthCalendar.HitTestInfo.Time property of System.Windows.Forms.MonthCalendar.HitTestInfo is set to the date at the specified point.

d) ToString

[C#] public const MonthCalendar.HitArea DayOfWeek;

[C++] public: const MonthCalendar.HitArea DayOfWeek;

[VB] Public Const DayOfWeek As MonthCalendar.HitArea

[JScript] public var DayOfWeek: MonthCalendar.HitArea;

Description

The specified point is over a day abbreviation ("Fri", for example). The System.Windows.Forms.MonthCalendar.HitTestInfo.Time property of System.Windows.Forms.MonthCalendar.HitTestInfo is set to the corresponding date on the top row.

e) ToString

[C#] public const MonthCalendar.HitArea NextMonthButton;

[C++] public: const MonthCalendar.HitArea NextMonthButton;

[VB] Public Const NextMonthButton As MonthCalendar.HitArea

[JScript] public var NextMonthButton: MonthCalendar.HitArea;

Description

The specified point is over the button at the upper-right corner of the control. If the user clicks here, the month calendar will scroll its display to the next month or set of months.

f) ToString

[C#] public const MonthCalendar.HitArea NextMonthDate;

[C++] public: const MonthCalendar.HitArea NextMonthDate;

[VB] Public Const NextMonthDate As MonthCalendar.HitArea

[JScript] public var NextMonthDate: MonthCalendar.HitArea;

Description

The specified point is over a date from the next month (partially displayed at the end of the currently displayed month). If the user clicks here, the month calendar scrolls its display to the next month or set of months.

g) ToString

[C#] public const MonthCalendar.HitArea Nowhere;

[C++] public: const MonthCalendar.HitArea Nowhere;

[VB] Public Const Nowhere As MonthCalendar.HitArea

[JScript] public var Nowhere: MonthCalendar.HitArea;

Description

The specified point is not on the month calendar control, or it is in an inactive portion of the control.

h) ToString

[C#] public const MonthCalendar.HitArea PrevMonthButton;

[C++] public: const MonthCalendar.HitArea PrevMonthButton;

[VB] Public Const PrevMonthButton As MonthCalendar.HitArea

[JScript] public var PrevMonthButton: MonthCalendar.HitArea;

Description

The specified point is over the button at the upper-left corner of the control. If the user clicks here, the month calendar will scroll its display to the previous month or set of months The given point was over the button at the top left corner of the control. If the user clicks here, the month calendar will scroll its display to the previous month or set of months i) ToString

[C#] public const MonthCalendar.HitArea PrevMonthDate;

[C++] public: const MonthCalendar.HitArea PrevMonthDate;

[VB] Public Const PrevMonthDate As MonthCalendar.HitArea

[JScript] public var PrevMonthDate: MonthCalendar.HitArea;

Description

The specified point is over a date from the previous month (partially displayed at the end of the currently displayed month). If the user clicks here, the month calendar scrolls its display to the previous month or set of months.

j) ToString

[C#] public const MonthCalendar.HitArea TitleBackground;

[C++] public: const MonthCalendar.HitArea TitleBackground;

[VB] Public Const TitleBackground As MonthCalendar.HitArea

[JScript] public var TitleBackground: MonthCalendar.Hit Area;

Description

The specified point is over the background of a month's title.

k) ToString

[C#] public const MonthCalendar.HitArea TitleMonth;

[C++] public: const MonthCalendar.HitArea TitleMonth;

[VB] Public Const TitleMonth As MonthCalendar.HitArea

[JScript] public var TitleMonth: MonthCalendar.HitArea;

Description

The specified point is in a month's title bar, over a month name.

l) ToString

[C#] public const MonthCalendar.HitArea TitleYear;

[C++] public: const MonthCalendar.HitArea TitleYear;

[VB] Public Const TitleYear As MonthCalendar.HitArea

[JScript] public var TitleYear: MonthCalendar.HitArea;

Description

The specified point is in a month's title bar, over the year value.

m) ToString

[C#] public const MonthCalendar.HitArea TodayLink;

[C++] public: const MonthCalendar.HitArea TodayLink;

[VB] Public Const TodayLink As MonthCalendar.HitArea

[JScript] public var TodayLink: MonthCalendar.HitArea;

Description

The specified point is on the "today" link at the bottom of the month calendar control.

i) ToString

[C#] public const MonthCalendar.HitArea WeekNumbers;

[C++] public: const MonthCalendar.HitArea WeekNumbers;

[VB] Public Const WeekNumbers As MonthCalendar.Hit Area

[JScript] public var WeekNumbers: MonthCalendar.HitArea;

Description

The specified point is over a week number. This will only occur if the System.Windows.Forms.MonthCalendar.ShowWeekNumbers property of System.Windows.Forms.MonthCalendar is enabled. The System.Windows.Forms.MonthCalendar.HitTestInfo.Time property of System.Windows.Forms.MonthCalendar.HitTestInfo is set to the corresponding date in the leftmost column.

DataGrid.HitTestInfo class (System.Windows.Forms)

a) ToString

Description

Contains information about a part of the System.Windows.Forms.DataGrid at a specified coordinate. This class cannot be inherited.

The System.Windows.Forms.DataGrid.HitTestInfo class, in conjunction with the System.Windows.Forms.DataGrid. HitTest(System.Int32,System.Int32) method of the System.Windows.Forms.DataGrid control, is used to determine which part of a System.Windows.Forms.DataGrid control the user has clicked. The System.Windows.Forms.DataGrid. HitTestInfo contains both the row, column and part of the grid that was clicked. See the System.Windows.Forms.DataGrid.HitTestType enumeration returned by the System.Windows.Forms.DataGrid.HitTestInfo.Type property for a complete list of grid parts.

b) ToString

[C#] public static readonly DataGrid.HitTestInfo Nowhere;

[C++] public: static DataGrid.HitTestInfo* Nowhere;

[VB] Public Shared ReadOnly Nowhere As DataGrid.HitTestInfo

[JScript] public static var Nowhere: DataGrid.HitTestInfo;

Description

Indicates that a coordinate corresponds to a non-functioning part of the System.Windows.Forms.DataGrid control.

Other parts of the System.Windows.Forms.DataGrid, such as the System.Windows.Forms.DataGrid.HitTestType.Caption, can return useful information. If the part of the grid has no function (such as the gray area behind a sparsely populated grid table), the System.Windows.Forms.DataGrid. HitTestInfo.Nowhere field is returned.

c) Column d) ToString

[C#] public int Column {get;}

[C++] public: _property int get Column( );

[VB] Public ReadOnly Property Column As Integer

[JScript] public function get Column( ): int;

Description

Gets the number of the column the user has clicked.

If the coordinate is not a cell, the property returns −1.

e) Row f) ToString

[C#] public int Row {get;}

[C++] public: _property int get Row( );

[VB] Public ReadOnly Property Row As Integer

[JScript] public function get Row( ): int;

Description

Gets the number of the row the user has clicked.

If the coordinate is not a cell, the property returns −1. If the coordinate is a System.Windows.Forms.DataGrid. HitTestType.RowHeader, the property returns the row number of the header, but the System.Windows.Forms.DataGrid. HitTestInfo.Column property will return g) Type h) ToString

[C#] public DataGrid.HitTestType Type {get;}

[C++] public: _property DataGrid.HitTestType get_Type( );

[VB] Public ReadOnly Property Type As DataGrid.HitTestType

[JScript] public function get Type( ): DataGrid.HitTestType;

Description

Gets the part of the System.Windows.Forms.DataGrid control, other than the row or column, that was clicked.

i) Equals

[C#] public override bool Equals(object value);

[C++] public: bool Equals(Object* value);

[VB] Overrides Public Function Equals(ByVal value As Object) As Boolean

[JScript] public override function Equals(value: Object): Boolean;

Description

Indicates whether two objects are identical.

Return Value: true if the objects are equal; otherwise, false. The second object to compare, typed as System.Object.

j) GetHashCode

[C#] public override int GetHashCode( );

[C++] public: int GetHashCode( );

[VB] Overrides Public Function GetHashCode( ) As Integer

[JScript] public override function GetHashCode( ): int;

Description

Gets the hash code for the System.Windows.Forms.DataGrid. HitTestInfo instance.

Return Value: The hash code for this instance.

This method overrides System.Object.GetHashCode k) ToString

[C#] public override string ToString( );

[C++] public: String* ToString( );

[VB] Overrides Public Function ToString( ) As String

[JScript] public override function ToString( ): String;

Description

Gets the type, row number, and column number.

Return Value: The type, row number, and column number.

MonthCalendar.HitTestInfo class (System.Windows.Forms)

a) ToString

Description

System.Windows.Forms.MonthCalendar.HitTestInfo objects are returned by System.Windows.Forms.MonthCalendar in response to the System.Windows.Forms.MonthCalendar.HitTest(System.Int32 System.Int32) method.

b) HitArea c) ToString

[C#] public MonthCalendar.HitArea HitArea {get;}

[C++] public: _property MonthCalendar.HitArea get_HitArea( );

[VB] Public ReadOnly Property HitArea As MonthCalendar.HitArea

[JScript] public function get HitArea( ): MonthCalendar.HitArea;

Description

Output member that receives an enumeration value from System.Windows.Forms.MonthCalendar.HitArea representing the result of the hit-test operation.

d) Point e) ToString

[C#] public Point Point {get;}

[C++] public: _property Point get_Point( );

[VB] Public ReadOnly Property Point As Point

[JScript] public function get Point( ): Point;

Description

The point that was hit-tested.

f) Time g) ToString

[C#] public DateTime Time {get;}

[C++] public: _property DateTime get Time( );

[VB] Public ReadOnly Property Time As DateTime

[JScript] public function get Time( ): DateTime;

Description

The time information specific to the location that was hit-tested. This value will only be valid at certain values of System.Windows.Forms.MonthCalendar.HitTestInfo.HitArea.

DataGrid.HitTestType enumeration (System.Windows.Forms)

a) ToString

Description

Specifies the part of the System.Windows.Forms.DataGrid control the user has clicked.

Use the members of this enumeration to determine which part of the grid has been clicked. The System.Windows.Forms.DataGrid.HitTestInfo.Type property of a System.Windows.Forms.DataGrid.HitTestInfo object returns a System.Windows.Forms.DataGrid.HitTestType. The System.Windows.Forms.DataGrid.HitTestInfo is created by invoking the System.Windows.Forms.DataGrid.HitTest(System.Int32,System.Int32) method of a System.Windows.Forms.DataGrid control.

b) ToString

[C#] public const DataGrid.HitTestType Caption;

[C++] public: const DataGrid.HitTestType Caption;

[VB] Public Const Caption As DataGrid.HitTestType

[JScript] public var Caption DataGrid.HitTestType;

Description

The caption of the System.Windows.Forms.DataGrid control.

c) ToString

[C#] public const DataGrid.HitTestType Cell;

[C++] public: const DataGrid.HitTestType Cell;

[VB] Public Const Cell As DataGrid.HitTestType

[JScript] public var Cell: DataGrid.HitTestType;

Description

A cell in the System.Windows.Forms.DataGrid control.

d) ToString

[C#] public const DataGrid.HitTestType ColumnHeader;

[C++] public: const DataGrid.HitTestType ColumnHeader;

[VB] Public Const ColumnHeader As DataGrid.HitTestType

[JScript] public var ColumnHeader: DataGrid.HitTestType;

Description

A column header in the System.Windows.Forms.DataGrid control.

e) ToString

[C#] public const DataGrid.HitTestType ColumnResize;

[C++] public: const DataGrid.HitTestType ColumnResize;

[VB] Public Const ColumnResize As DataGrid.HitTestType

[JScript] public var ColumnResize: DataGrid.HitTestType;

Description

The column border, which is the line between column headers. It can be dragged to resize a column's width.

f) ToString

[C#] public const DataGrid.HitTestType None;

[C++] public: const DataGrid.HitTestType None;

[VB] Public Const None As DataGrid.HitTestType

[JScript] public var None: DataGrid.HitTestType;

Description

The background area, visible when the control contains no table, few rows, or when a table is scrolled to its bottom.

g) ToString

[C#] public const DataGrid.HitTestType ParentRows;

[C++] public: const DataGrid.HitTestType ParentRows;

[VB] Public Const ParentRows As DataGrid.HitTestType

[JScript] public var ParentRows: DataGrid.HitTestType;

Description

The parent row section of the System.Windows.Forms.DataGrid control. The parent row displays information from or about the parent table of the currently displayed child table, such as the name of the parent table, column names and values of the parent record.

h) ToString

[C#] public const DataGrid.HitTestType RowHeader;

[C++] public: const DataGrid.HitTestType RowHeader;

[VB] Public Const RowHeader As DataGrid.HitTestType

[JScript] public var RowHeader: DataGrid.HitTestType;

Description

A row header in the System.Windows.Forms.DataGrid control.

i) ToString

[C#] public const DataGrid.HitTestType RowResize;

[C++] public: const DataGrid.HitTestType RowResize;

[VB] Public Const RowResize As DataGrid.HitTestType

[JScript] public var RowResize: DataGrid.HitTestType;

Description

The row border, which is the line between grid row headers. It can be dragged to resize a row's height.

HorizontalAlignment enumeration (System.Windows.Forms)

a) ToString

Description

Specifies how an object or text in a control is horizontally aligned relative to an element of the control.

This enumeration is used in numerous classes. A partial list of these classes is System.Windows.Forms.CheckedListBox, System.Windows.Forms.ColumnHeader, System.Windows.Forms.ComboBox, System.Windows.Forms.ControlPaint, System.Windows.Forms.Label, System.Windows.Forms.ListBox, System.Windows.Forms.Control, System.Windows.Forms.RichTextBox, and System.Windows.Forms. TextBox.

b) ToString

[C#] public const HorizontalAlignment Center;

[C++] public: const HorizontalAlignment Center;

[VB] Public Const Center As HorizontalAlignment

[JScript] public var Center: HorizontalAlignment;

Description

The object or text is aligned in the center of the control element.

c) ToString

[C#] public const HorizontalAlignment Left;

[C++] public: const HorizontalAlignment Left;

[VB] Public Const Left As HorizontalAlignment

[JScript] public var Left: HorizontalAlignment;

Description

The object or text is aligned on the left of the control element.

d) ToString

[C#] public const HorizontalAlignment Right;

[C++] public: const HorizontalAlignment Right;

[VB] Public Const Right As HorizontalAlignment

[JScript] public var Right: HorizontalAlignment;

Description

The object or text is aligned on the right of the control element.

HScrollBar class (System.Windows.Forms)

a) ToString

Description

Represents a standard Windows horizontal scroll bar.

Most controls that need scroll bars already provide them and do not require this control. This is true of a multi-line System.Windows.Forms.TextBox control, a System.Windows.Forms.ListBox, and a System.Windows.Forms.ComboBox, for example.

b) HScrollBar

Example Syntax:

c) ToString

[C#] public HScrollBar( );

[C++] public: HScrollBar( );

[VB] Public Sub New( )

[JScript] public function HScrollBar( );

d) AccessibilityObject
e) AccessibleDefaultActionDescription
f) AccessibleDescription
g) AccessibleName
h) AccessibleRole
i) AllowDrop
j) Anchor
k) BackColor
l) BackgroundImage
m) BindingContext
n) Bottom
o) Bounds
p) CanFocus
q) CanSelect
r) Capture
s) Causes Validation
t) ClientRectangle
u) ClientSize
v) CompanyName
w) Container
x) ContainsFocus
y) ContextMenu
z) Controls
aa) Created
bb) CreateParams
cc) ToString Description Returns the parameters needed to create the handle. Inheriting classes can override this to provide extra functionality. They should not, however, forget to call base.getCreateParams( ) first to get the struct filled up with the basic info.

dd) Cursor
ee) DataBindings
ff) DefaultImeMode
gg) DefaultSize
hh) ToString

Description

Deriving classes can override this to configure a default size for their control. This is more efficient than setting the size in the control's constructor.

ii) DesignMode
jj) DisplayRectangle
kk) Disposing
ll) Dock
mm) Enabled
nn) Events
oo) Focused
pp) Font
qq) FontHeight
rr) ForeColor
ss) Handle
tt) HasChildren
uu) Height
vv) ImeMode
ww) InvokeRequired
xx) IsAccessible
yy) IsDisposed
zz) IsHandleCreated
aaa) LargeChange
bbb) Left
ccc) Location
ddd) Maximum
eee) Minimum
fff) Name
ggg) Parent
hhh) ProductName
iii) ProductVersion
jjj) RecreatingHandle
kkk) Region
lll) RenderRightToLeft
mmm) ResizeRedraw
nnn) Right
ooo) RightToLeft
ppp) ShowFocusCues
qqq) ShowKeyboardCues
rrr) Site
sss) Size
ttt) SmallChange
uuu) TabIndex
vvv) TabStop
www) Tag
xxx) Text
yyy) Top
zzz) TopLevelControl
aaaa) Value
bbbb) Visible
cccc) Width
dddd) WindowTarget IButtonControl interface (System.Windows.Forms)

a) WndProc

Description

Allows a control to act like a button on a form.

An example of where this interface might be implemented is default and cancel button processing. Default buttons are notified when an unprocessed ENTER key is entered for a form, just like a dialog would be closed. Similarly, cancel buttons are notified whenever an unprocessed ESC key is entered on a form, much like a dialog would be dismissed.

b) DialogResult
c) WndProc

[C#] DialogResult DialogResult {get; set;}

[C++] DialogResult get DialogResult( );void set_DialogResult(DialogResult);

[VB] Property DialogResult As DialogResult

[JScript] abstract function get DialogResult( ): DialogResult; public abstract function set DialogResult(DialogResult);

Description

Gets or sets the value returned to the parent form when the button is clicked.

When a form is shown as a dialog box using the System.Windows.Forms.Form.ShowDialog method and one of its buttons is clicked, the button's System.Windows.Forms.IButtonControl.DialogResult value is assigned to the form's System.Windows.Forms.Form.DialogResult property.

d) NotifyDefault

[C#] void NotifyDefault(bool value);

[C++] void NotifyDefault(bool value);

[VB] Sub NotifyDefault(ByVal value As Boolean)

[JScript] function NotifyDefault(value: Boolean);

Description

Notifies a control that it is the default button so that its appearance and behavior is adjusted accordingly.

This method is called by a parent form to make a control the default button. Default buttons are set to have an extra thick border. true if the control should behave as a default button; otherwise false.

e) PerformClick

[C#] void PerformClick( );

[C++] void PerformClick( );

[VB] Sub PerformClick( )

[JScript] function PerformClick( );

Description

Generates a System.Windows.Forms.Control.Click event for the control.

This method is called for the button that has focus, or for the default button(if no other button has focus) when the user presses the ENTER key. This method is also called when the user presses the ESC key if the button is set as the cancel button.

ICommandExecutor interface (System.Windows.Forms)

a) Perform Click

Description b) Execute

[C#] void Execute( );

[C++] void Execute( );

[VB] Sub Execute( )

[JScript] function Execute( );

Description

IComponentEditorPageSite interface (System.Windows.Forms)

a) Execute

Description

The site for a ComponentEditorPage.

b) GetControl

[C#] Control GetControl( );

[C++] Control* GetControl( );

[VB] Function GetControl( ) As Control

[JScript] function GetControl( ): Control;

Description

Returns the parent control for the page window.

c) SetDirty

[C#] void SetDirty( );

[C++] void SetDirty( );

[VB] Sub SetDirty( )

[JScript] function SetDirty( );

Description

Notifies the site that the editor is in dirty state.

IContainerControl interface (System.Windows.Forms)

a) SetDirty

Description

Provides the functionality for a control to act as a parent for other controls.

Implement this interface in classes that you wish to parent a collection of controls. The members of this interface allow you to activate a child control, or determine which control is currently active. When implemented in a class, System.Windows.Forms.IContainerControl.ActivateControl(System.Windows.Forms.Control) takes a System.Windows.Forms.Control as a parameter and activates the specified control. The System.Windows.Forms.IContainerControl.ActiveControl property activates or retrieves the control that is active.

b) ActiveControl c) SetDirty

[C#] Control ActiveControl {get; set;}

[C++] Control* get_ActiveControl( );void set_ActiveControl (Control*);

[VB] Property ActiveControl As Control

[JScript] abstract function get ActiveControl( ): Control; public abstract function set ActiveControl(Control);

Description

Gets or sets the control that is active on the container control.

When implemented in a class, this property activates or retrieves the active control on the container control.

d) ActivateControl

[C#] bool ActivateControl(Control active);

[C++] bool ActivateControl(Control* active);

[VB] Function ActivateControl(ByVal active As Control) As Boolean

[JScript] function ActivateControl(active: Control): Boolean;

Description

Activates a specified control.

Return Value: true if the control is successfully activated; otherwise, false.

When implemented in a class, this method activates the specified System.Windows.Forms.Control. The control must be a child of the container control. The System.Windows.Forms.Control being activated.

IDataGridColummStyleEditingNotificationService interface (System.Windows.Forms)

a) ActivateControl

Description

Provides an editing notification interface.

To create a new System.Windows.Forms.DataGrid column with special properties, you must first inherit from the System.Windows.Forms.DataGridColumnStyle class. The System.Windows.Forms.IDataGridColumnStyleEditingNotificationService interface is provided to notify the System.Windows.Forms.DataGrid when a column is being edited.

b) ColumnStartedEditing

[C#] void ColumnStartedEditing(Control editingControl);

[C++] void ColumnStartedEditing(Control* editingControl);

[VB] Sub ColumnStartedEditing(ByVal editingControl As Control)

[JScript] function ColumnStartedEditing(editingControl: Control);

Description

Informs the System.Windows.Forms.DataGrid that the user has begun editing the column.

When called, the System.Windows.Forms.IDataGridColumnStyleEditingNotificationService.ColumnStartedEditing(System.Windows.Forms. Control) method allows the System.Windows.Forms.DataGrid control to show a pencil in the row header indicating the row is being edited. The System.Windows.Forms.Control that is editing the column.

IDataGridEditingService interface (System.Windows.Forms)

a) ColumnStartedEditing

Description

The DataGrid exposes hooks to request editing commands via this interface.

b) BeginEdit

[C#] bool BeginEdit(DataGridColumnStyle gridColumn, int rowNumber);

[C++] bool BeginEdit(DataGridColumnStyle* gridColumn, int rowNumber);

[VB] Function BeginEdit(ByVal gridColumn As DataGridColumnStyle, ByVal rowNumber As Integer) As Boolean

[JScript] function BeginEdit(gridColumn: DataGridColumnStyle, rowNumber int): Boolean;

Description

Requests an edit operation.

Return Value: If the operation will be performed, true is returned; otherwise false is returned.

Return Value: If the operation will be performed, true is returned; otherwise false is returned. The DataGridColumn to edit. The number of the row to edit c) EndEdit

[C#] bool EndEdit(DataGridColumnStyle gridColumn, int rowNumber, bool shouldAbort);

[C++] bool EndEdit(DataGridColumnStyle* gridColumn, int rowNumber, bool shouldAbort);

[VB] Function EndEdit(ByVal gridColumn As DataGridColumnStyle, ByVal rowNumber As Integer, ByVal shouldAbort As Boolean) As Boolean

[JScript] function EndEdit(gridColumn: DataGridColumnStyle, rowNumber: int, shouldAbort: Boolean): Boolean;

Description

Requests an end to an edit operation taking place.

Return Value: If the operation will be performed, true is returned; otherwise false is returned.

Return Value: If the operation will be performed, true is returned; otherwise false is returned. The DataGridColumn of the cell to cease editing. The number of the row to edit True if an abort operation is requested IDataObject interface (System.Windows.Forms)

a) EndEdit

Description

Provides a format-independent mechanism for transferring data.

The IDataObject interface is used by the System.Windows.Forms.Clipboard class and in drag-and-drop operations.

b) GetData

[C#] object GetData(string format);

[C++] Object* GetData(String* format);

[VB] Function GetData(ByVal format As String) As Object

[JScript] function GetData(format: String): Object;

Description

Retrieves the data associated with the specified data format.

Return Value: The data associated with the specified format, or null.

If this method cannot find data in the specified format, it attempts to convert the data to the format. If the data cannot be converted to the specified format, or if the data was stored with autoConvert set to false, this method returns null. The format of the data to retrieve. See System.Windows.Forms.DataFormats for predefined formats.

c) GetData

[C#] object GetData(Type format);

[C++] Object* GetData(Type* format);

[VB] Function GetData(ByVal format As Type) As Object

[JScript] function GetData(format: Type): Object;

Description

Retrieves the data associated with the specified class type format.

Return Value: The data associated with the specified format, or null

If this method cannot find data in the specified format, it attempts to convert the data to the format. If the data cannot be converted to the specified format, or if the data was stored with autoConvert set to false, this method returns null. A System.Type representing the format of the data to retrieve. See System.Windows.Forms.DataFormats for predefined formats.

d) GetData

[C#] object GetData(string format, bool autoConvert);

[C++] Object* GetData(String* format, bool autoConvert);

[VB] Function GetData(ByVal format As String, ByVal autoConvert As Boolean) As Object

[JScript] function GetData(format: String, autoConvert: Boolean): Object; Retrieves the data associated with the specified data format.

Description

Retrieves the data associated with the specified data format, using a Boolean to determine whether to convert the data to the format.

Return Value: The data associated with the specified format, or null.

If the autoConvert parameter is true and this method cannot find data in the specified format, it attempts to convert the data to the format. If the data cannot be converted to the specified format, or if the data was stored with the autoConvert parameter set to false, this method returns null. The format of the data to retrieve. See System.Windows.Forms.DataFormats for predefined formats. true to convert the data to the specified format; otherwise, false.

e) GetDataPresent

[C#] bool GetDataPresent(string format);

[C++] bool GetDataPresent(String* format);

[VB] Function GetDataPresent(ByVal format As String) As Boolean

[JScript] function GetDataPresent(format: String): Boolean;

Description

Determines whether data stored in this instance is associated with, or can be converted to, the specified format.

Return Value: true if data stored in this instance is associated with, or can be converted to, the specified format; otherwise false.

Call this method to determine whether a format exists in this System.Windows.Forms.DataObject instance before calling System.Windows.Forms.IDataObject.GetData(System.String,System.Boolean). Call System.Windows.Forms.IDataObject.GetFormats(System.Boolean) for the formats that are available in this instance. The format for which to check. See System.Windows.Forms.DataFormats for predefined formats.

f) GetDataPresent

[C#] bool GetDataPresent(Type format);

[C++] bool GetDataPresent(Type* format);

[VB] Function GetDataPresent(ByVal format As Type) As Boolean

[JScript] function GetDataPresent(format: Type): Boolean;

Description

Determines whether data stored in this instance is associated with, or can be converted to, the specified format.

Return Value: true if data stored in this instance is associated with, or can be converted to, the specified format; otherwise, false.

Call this method to determine whether a format exists in this System.Windows.Forms.DataObject instance before calling System.Windows.Forms.IDataObject.GetData(System.String,System.Boolean). Call System.Windows.Forms.IDataObject.GetFormats(System.Boolean) for the formats that are available in this instance. A System.Type representing the format for which to check. See System.Windows.Forms.DataFormats for predefined formats.

g) GetDataPresent

[C#] bool GetDataPresent(string format, bool autoConvert);

[C++] bool GetDataPresent(String* format, bool autoConvert);

[VB] Function GetDataPresent(ByVal format As String, ByVal autoConvert As Boolean) As Boolean

[JScript] function GetDataPresent(format: String, autoConvert: Boolean): Boolean; Determines whether data stored in this instance is associated with the specified format.

Description

Determines whether data stored in this instance is associated with the specified format, using a Boolean value to determine whether to convert the data to the format.

Return Value: true if the data is in, or can be converted to, the specified format; otherwise, false.

Call this method to determine whether a format exists in this System.Windows.Forms.DataObject instance before calling System.Windows.Forms.IDataObject.GetData(System.String,System.Boolean). Call System.Windows.Forms.IDataObject.GetFormats(System.Boolean) for the formats that are available in this instance. The format for which to check. See System.Windows.Forms.DataFormats for predefined formats. true to determine whether data stored in this instance can be converted to the specified format; false to check whether the data is in the specified format.

h) GetFormats

[C#] string[ ] GetFormats( );

[C++] String* GetFormats( ) _gc[ ];

[VB] Function GetFormats( ) As String( )

[JScript] function GetFormats( ): String[ ];

Description

Gets a list of all formats that data stored in this instance is associated with or can be converted to.

Return Value: An array of the names that represents a list of all formats that are supported by the data stored in this object.

Call this method to get the supported data formats before calling System.Windows.Forms.IDataObject.GetData(System.String,System.Boolean). See System.Windows.Forms.DataFormats for the predefined formats.

i) GetFormats

[C#] string[ ] GetFormats(bool autoConvert);

[C++] String* GetFormats(bool autoConvert) _gc[ ];

[VB] Function GetFormats(ByVal autoConvert As Boolean) As String( )

[JScript] function GetFormats(autoConvert: Boolean): String[ ]; Gets a list of all formats that data stored in this instance is associated with or can be converted to.

Description

Gets a list of all formats that data stored in this instance is associated with or can be converted to, using a Boolean value to determine whether to retrieve all formats that the data can be converted to or only native data formats.

Return Value: An array of the names that represents a list of all formats that are supported by the data stored in this object.

Call this method to get the supported data formats before calling System.Windows.Forms.IDataObject.GetData(System.String,System.Boolean). See System.Windows.Forms.DataFormats for the predefined formats. true to retrieve all formats that data stored in this instance is associated with, or can be converted to; false to retrieve only native data formats.

j) SetData

[C#] void SetData(object data);

[C++] void SetData(Object* data);

[VB] Sub SetData(ByVal data As Object)

[JScript] function SetData(data: Object);

Description

Stores the specified data in this instance, using the class of the data for the format.

The data format is its class. If you do not know the format of the target application, you can store data in multiple formats using this method. The data to store.

k) SetData

[C#] void SetData(string format, object data);

[C++] void SetData(String* format, Object* data);

[VB] Sub SetData(ByVal format As String, ByVal data As Object)

[JScript] function SetData(format: String, data: Object);

Description

Stores the specified data and its associated format in this instance.

If you do not know the format of the target application, you can store data in multiple formats using this method. The format associated with the data. See System.Windows.Forms.DataFormats for predefined formats. The data to store.

l) SetData

[C#] void SetData(Type format, object data);

[C++] void SetData(Type* format, Object* data);

[VB] Sub SetData(ByVal format As Type, ByVal data As Object)

[JScript] function SetData(format: Type, data: Object);

Description

Stores the specified data and its associated class type in this instance.

If you do not know the format of the target application, you can store data in multiple formats using this method. A System.Type representing the format associated with the data. See System.Windows.Forms.DataFormats for predefined formats. The data to store.

m) SetData

[C#] void SetData(string format, bool autoConvert, object data);

[C++] void SetData(String* format, bool autoConvert, Object* data);

[VB] Sub SetData(ByVal format As String, ByVal autoConvert As Boolean, ByVal data As Object)

[JScript] function SetData(format: String, autoConvert: Boolean, data: Object); Stores the specified data and its associated format in this instance.

Description

Stores the specified data and its associated format in this instance, using a Boolean value to specify whether the data can be converted to another format.

If you do not know the format of the target application, you can store data in multiple formats using this method. The format associated with the data. See System.Windows.Forms.DataFormats for predefined formats. true to allow the data to be converted to another format; otherwise, false. The data to store.

IFeatureSupport interface (System.Windows.Forms)

a) SetData

Description

Specifies a standard interface for retrieving feature information from the current system.

When implemented in a class, System.Windows.Forms.IFeatureSupport provides methods you can use to determine whether a feature is currently installed on the system and to get the version number of a feature. Call System.Windows.Forms.IFeatureSupport.IsPresent(System.Object) to determine whether a feature, or a specific version of a feature, is currently installed. Call System.Windows.Forms.IFeatureSupport.GetVersionPresent(System.Object) to determine the version number of an installed feature.

b) GetVersionPresent

[C#] Version GetVersionPresent(object feature);

[C++] Version* GetVersionPresent(Object* feature);

[VB] Function GetVersionPresent(ByVal feature As Object) As Version

[JScript] function GetVersionPresent(feature: Object): Version;

Description

Retrieves the version of the specified feature.

Return Value: A System.Version representing the version number of the specified feature; or null if the feature is not installed.

For an implementation of this method, see System.Windows.Forms.OSFeature.GetVersionPresent(System.Object). The feature whose version is requested.

c) IsPresent

[C#] bool IsPresent(object feature);

[C++] bool IsPresent(Object* feature);

[VB] Function IsPresent(ByVal feature As Object) As Boolean

[JScript] function IsPresent(feature: Object): Boolean; Determines whether the specified feature is currently available on the system.

Description

Determines whether any version of the specified feature is currently available on the system.

Return Value: true if the feature is present; otherwise, false. The feature to look for.

d) IsPresent

[C#] bool IsPresent(object feature, Version minimumVersion);

[C++] bool IsPresent(Object* feature, Version* minimumVersion);

[VB] Function IsPresent(ByVal feature As Object, ByVal minimumVersion As Version) As Boolean

[JScript] function IsPresent(feature: Object, minimumVersion: Version) Boolean;

Description

Determines whether the specified or newer version of the specified feature is currently available on the system.

Return Value: true if the requested version of the feature is present; otherwise, false. The feature to look for. A System. Version representing the minimum version number of the feature to look for.

IFileReaderService interface (System.Windows.Forms)

a) IsPresent

Description b) OpenFileFromSource

[C#] Stream OpenFileFromSource(string relativePath);

[C++] Stream* OpenFileFromSource(String* relativePath);

[VB] Function OpenFileFromSource(ByVal relativePath As String) As Stream

[JScript] function OpenFileFromSource(relativePath: String): Stream;

Description

ImageList.ImageCollection class (System.Windows. Forms)

a) OpenFileFromSource

Description

Encapsulates the collection of System.Drawing.Image objects in an System.Windows.Forms.ImageList.

This is used to manage the images in the System.Windows. Forms.ImageList programmatically, providing methods to add and remove image objects.

b) Count c) OpenFileFromSource

[C#] public int Count {get;}

[C++] public: _property int get_Count( );

[VB] Public ReadOnly Property Count As Integer

[JScript] public function get Count( ): int;

Description

Gets the number of images currently in the list.

Counting the images forces the System.Windows.Forms.ImageList.Handle to be created.

d) Empty e) OpenFileFromSource

[C#] public bool Empty {get;}

[C++] public: _property bool get_Empty( );

[VB] Public ReadOnly Property Empty As Boolean

[JScript] public function get Empty( ): Boolean;

Description

Gets a value indicating whether the System.Windows.Forms. ImageList has any images.

You can check this property without forcing the creation of a System.Windows.Forms.ImageList.Handle.

f) IsReadOnly g) OpenFileFromSource

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the list is read only.

h) Item i) OpenFileFromSource

[C#] public Image this[int index] {get; set;}

[C++] public: _property Image* get_Item(int index); public: _property void set_Item(int index, Image*);

[VB] Public Default Property Item(ByVal index As Integer) As Image

[JScript] returnValue=ImageCollectionObject.Item(index); ImageCollectionObject.Item(index)=returnValue;

Description

Gets or sets an System.Drawing.Image in an existing System. Windows.Forms.ImageList. The index of the image to get or set.

j) Add

[C#] public void Add(Icon value);

[C++] public: void Add(Icon* value);

[VB] Public Sub Add(ByVal value As Icon)

[JScript] public function Add(value: Icon); Adds the specified object to the System.Windows.Forms.ImageList.

Description

Adds the specified icon to the System.Windows.Forms.ImageList.

The System.Drawing.Icon is converted to a System.Drawing. Bitmap before it is added to the list. An System.Drawing.Icon to add to the list.

k) Add

[C#] public void Add(Image value);

[C++] public: void Add(Image* value);

[VB] Public Sub Add(ByVal value As Image)

[JScript] public function Add(value: Image);

Description

Adds the specified image to the System.Windows.Forms.ImageList. A System.Drawing.Bitmap of the image to add to the list.

l) Add

[C#] public int Add(Image value, Color transparentColor);

[C++] public: int Add(Image* value, Color transparentColor);

[VB] Public Function Add(ByVal value As Image, ByVal transparentColor As Color) As Integer

[JScript] public function Add(value: Image, transparentColor: Color): int;

Description

Adds the specified image to the System.Windows.Forms.ImageList, using the specified color to generate the mask.

Return Value: The index of the newly added image or −1 if the image could not be added. A System.Drawing.Bitmap of the image to add to the list. The System.Drawing.Color to mask this image.

m) AddStrip

[C#] public int AddStrip(Image value);

[C++] public: int AddStrip(Image* value);

[VB] Public Function AddStrip(ByVal value As Image) As Integer

[JScript] public function AddStrip(value: Image): int;

Description

Adds an image strip to the specified image to the System.Windows.Forms.ImageList.

Return Value: The index of the newly added image or −1 if the image could not be added.

The number of images to add is inferred from the width of the given image. A System.Drawing.Bitmap object with the image(s) to add.

n) Clear

[C#] public void Clear( );

[C++] public: sealed void Clear( );

[VB] NotOverridable Public Sub Clear( )

[JScript] public function Clear( );

Description

Removes all the images and masks from the System.Windows.Forms.ImageList.

o) Contains

[C#] public bool Contains(Image image);

[C++] public: bool Contains(Image* image);

[VB] Public Function Contains(ByVal image As Image) As Boolean

[JScript] public function Contains(image: Image): Boolean;

Description

Not supported. The System.Collections.IList.Contains method indicates whether a specified object is contained in the list.

Return Value: true if the image is found in the list; otherwise, false.

This implementation of System.Collections.IList.Contains throws a System.NotSupportedException exception. The System.Drawing.Image to find in the list.

p) GetEnumerator

[C#] public IEnumerator GetEnumerator( );

[C++] public: sealed IEnumerator* GetEnumerator( );

[VB] NotOverridable Public Function GetEnumerator( ) As IEnumerator

[JScript] public function GetEnumerator( ): IEnumerator;

Description

Returns an enumerator that can be used to iterate through the item collection.

Return Value: An System.Collections.IEnumerator object that represents the item collection.

q) IndexOf

[C#] public int IndexOf(Image image);

[C++] public: int IndexOf(Image* image);

[VB] Public Function IndexOf(ByVal image As Image) As Integer

[JScript] public function IndexOf(image: Image): int;

Description

Not supported. The System.Collections.IList.IndexOf method returns the index of a specified object in the list.

Return Value: The index of the image in the list.

This implementation of System.Collections.IList.IndexOf throws a System.NotSupportedException exception. The System.Drawing.Image to find in the list.

r) Remove

[C#] public void Remove(Image image);

[C++] public: void Remove(Image* image);

[VB] Public Sub Remove(ByVal image As Image)

[JScript] public function Remove(image: Image);

Description

Not supported. The System.Collections.IList.Remove method removes a specified object from the list.

This implementation of System.Collections.IList.Remove throws a System.NotSupportedException exception. The System.Drawing.Image to remove from the list.

s) RemoveAt

[C#] public void RemoveAt(int index);

[C++] public: _sealed void RemoveAt(int index);

[VB] NotOverridable Public Sub RemoveAt(ByVal index As Integer)

[JScript] public function RemoveAt(index: int);

Description

Removes an image from the list. The index of the image to remove.

t) ICollection.CopyTo

[C#] void ICollection.CopyTo(Array dest, int index);

[C++] void ICollection::CopyTo(Array* dest, int index);

[VB] Sub CopyTo(ByVal dest As Array, ByVal index As Integer) Implements ICollection.CopyTo

[JScript] function ICollection.CopyTo(dest: Array, index: int);

u) IList.Add

[C#] int IList.Add(object value);

[C++] int IList::Add(Object* value);

[VB] Function Add(ByVal value As Object) As Integer Implements IList.Add

[JScript] function IList.Add(value: Object): int;

v) IList.Contains

[C#] bool IList.Contains(object image);

[C++] bool IList::Contains(Object* image);

[VB] Function Contains(ByVal image As Object) As Boolean Implements IList.Contains

[JScript] function IList.Contains(image: Object): Boolean;

w) IList.IndexOf

[C#] int IList.IndexOf(object image);

[C++] int IList::IndexOf(Object* image);

[VB] Function IndexOf(ByVal image As Object) As Integer Implements IList.IndexOf

[JScript] function IList.IndexOf(image: Object): int;

x) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

y) IList.Remove

[C#] void IList.Remove(object image);

[C++] void IList::Remove(Object* image);

[VB] Sub Remove(ByVal image As Object) Implements I List. Remove

[JScript] function IList.Remove(image: Object);

ImageIndexConverter class (System.Windows.Forms)

a) ToString

Description

Provides a type converter to convert data for an image index to and from a string.

For more information about type converters, see the System. ComponentModel.TypeConverter base class and.

b) ImageIndexConverter

Example Syntax:

c) ToString

[C#] public ImageIndexConverter( );

[C++] public: ImageIndexConverter( );

[VB] Public Sub New( )

[JScript] public function ImageIndexConverter( );

d) IncludeNoneAsStandardValue e) ToString

[C#] protected virtual bool IncludeNoneAsStandardValue {get;}

[C++] protected: _property virtual bool get_IncludeNoneAsStandardValue( );

[VB] Overridable Protected ReadOnly Property IncludeNone AsStandardValue As Boolean

[JScript] protected function get IncludeNoneAsStandardValue( ): Boolean;

Description

Gets or sets a value indicating whether a none or null value is valid in the System.ComponentModel.TypeConverter.StandardValuesCollection collection.

As implemented in this class is always returns true.

f) ConvertFrom

[C#] public override object ConvertFrom(ITypeDescriptorContext context, CultureInfo culture, object value);

[C++] public: Object* ConvertFrom(ITypeDescriptorContext* context, CultureInfo* culture, Object* value);

[VB] Overrides Public Function ConvertFrom(ByVal context As ITypeDescriptorContext, ByVal culture As CultureInfo, ByVal value As Object) As Object

[JScript] public override function ConvertFrom(context: IType DescriptorContext, culture: CultureInfo, value: Object): Object; Converts the given value to the native type of the converter.

Description

Converts the specified value object to a 32-bit signed integer object.

Return Value: An System.Object that represents the converted value.

This converter only can convert a 32-bit signed integer object to and from a string. An System.ComponentModel.ITypeDescriptorContext that provides a format context. A System. Globalization.CultureInfo object to provide locale information. The System.Object to convert.

g) ConvertTo

[C#] public override object ConvertTo(ITypeDescriptorContext context, CultureInfo culture, object value, Type destinationType);

[C++] public: Object* ConvertTo(ITypeDescriptorContext* context, CultureInfo* culture, Object* value, Type* destinationType);

[VB] Overrides Public Function ConvertTo(ByVal context As ITypeDescriptorContext, ByVal culture As CultureInfo, ByVal value As Object, ByVal destinationType As Type) As Object

[JScript] public override function ConvertTo(context: ITypeDescriptorContext, culture: CultureInfo, value: Object, destinationType: Type): Object; Converts the given value object to the specified destination type.

Description

Converts the specified object to the destination type.

Return Value: An System.Object that represents the converted value.

Override this method to provide your own coversion requirements. An System.ComponentModel.ITypeDescriptorContext that provides a format context, which can be used to extract additional information about the environment this converter is being invoked from. This parameter or properties of this parameter can be null. A System.Globalization.CultureInfo object to provide locale information. The object to convert. The type to convert the object to.

h) GetStandardValues

[C#] public override StandardValuesCollection GetStandardValues(ITypeDescriptorContext context);

[C++] public: StandardValuesCollection* GetStandardValues(ITypeDescriptorContext* context);

[VB] Overrides Public Function GetStandardValues(ByVal context As ITypeDescriptorContext) As StandardValuesCollection

[JScript] public override function GetStandardValues(context: ITypeDescriptorContext): StandardValuesCollection; Returns a collection of standard values for the data type this type converter is designed for.

Description

Returns a collection of standard values for the data type this type converter is designed for when provided with a format context.

Return Value: A System.ComponentModel.TypeConverter.StandardValuesCollection that holds a standard set of valid values, or a null if the data type does not support a standard set of values.

Returns a collection of index values for the data type.

AnSystem.ComponentModel.ITypeDescriptorContext that provides a format context, which can be used to extract additional information about the environment this converter is being invoked from. This parameter or properties of this parameter can benull.

i) GetStandardValuesExclusive

[C#] public override bool GetStandardValuesExclusive (ITypeDescriptorContext context);

[C++] public: bool GetStandardValuesExclusive(ITypeDescriptorContext* context);

[VB] Overrides Public Function GetStandardValuesExclusive(ByVal context As ITypeDescriptorContext) As Boolean

[JScript] public override function GetStandardValuesExclusive(context: ITypeDescriptorContext): Boolean;

Description

Determines if the list of standard values returned from GetStandardValues is an exclusive list. If the list is exclusive, then no other values are valid, such as in an enum data type. If the list is not exclusive, then there are other valid values besides the list of standard values GetStandardValues provides.

Return Value: Always returns false.

As implemented in this converter, this method always returns false. A formatter context.

j) GetStandardValuesSupported

[C#] public override bool GetStandardValuesSupported (IType DescriptorContext context);

[C++] public: bool GetStandardValuesSupported(ITypeDescriptorContext* context);

[VB] Overrides Public Function GetStandardValuesSupported(ByVal context As ITypeDescriptorContext) As Boolean

[JScript] public override function GetStandardValuesSupported(context: ITypeDescriptorContext): Boolean; Returns whether this object supports a standard set of values that can be picked from a list.

Description

Determines if this object supports a standard set of values that can be picked from a list.

Return Value: Always returns true.

As implemented in this class, System.Windows.Forms.ImageIndexConverter.GetStandardValuesSupported(System.ComponentModel.ITypeDescriptorContext) always returns true since this object supports a standard set of values that can be picked from a list. An System.ComponentModel.ITypeDescriptorContext that provides a format context, which can be used to extract additional information about the environment this converter is being invoked from. This parameter or properties of this parameter can be null.

ImageList class (System.Windows.Forms)

a) ToString

Description

Provides methods to manage a collection of System.Drawing.Image objects. This class cannot be inherited.

System.Windows.Forms.ImageList is typically used by other controls, such as the System.Windows.Forms.ListView, System.Windows.Forms.TreeView, or System.Windows.Forms.ToolBar. You can add bitmaps, icons, or meta files to the System.Windows.Forms.ImageList, and the other controls are able to use the images as they require.

b) ImageList

Example Syntax:

c) ToString

[C#] public ImageList( );

[C++] public: ImageList( );

[VB] Public Sub New( )

[JScript] public function ImageList( ); Initializes a new instance of the System.Windows.Forms.ImageList class.

Description

Initializes a new instance of the System.Windows.Forms.ImageList class with default values for System.Windows.Forms.ImageList.ColorDepth, System.Windows.Forms.ImageList.ImageSize, and System.Windows.Forms.ImageList.TransparentColor.

The following table shows initial property values for an instance of System.Windows.Forms.ImageList.

d) ImageList

Example Syntax:

e) ToString

[C#] public ImageList(IContainer container);

[C++] public: ImageList(IContainer* container);

[VB] Public Sub New(ByVal container As IContainer)

[JScript] public function ImageList(container: IContainer);

Description

Initializes a new instance of the System.Windows.Forms.ImageList class, associating it with a container.

This constructor adds the image list to the specified container. An object implementing System.ComponentModel.IContainer to associate with this instance of System.Windows.Forms.ImageList.

f) ColorDepth g) ToString

[C#] public ColorDepth ColorDepth {get; set;}

[C++] public: _property ColorDepth get ColorDepth( ); public: _property void set_ColorDepth(ColorDepth);

[VB] Public Property ColorDepth As ColorDepth

[JScript] public function get ColorDepth( ): ColorDepth; public function set ColorDepth(ColorDepth);

Description

Gets the color depth of the image list.

When you set the color depth to a new value, the System.Windows.Forms.ImageList.Handle for the image list is recreated.

h) Container i) DesignMode j) Events
k) Handle
l) ToString

Description

Gets the handle of the image list object.

This corresponds to a Win32 HIMAGELIST handle. Unless you provided the handle in the constructor, the handle is not created until you need to use it. Getting the handle causes it to be created.

m) HandleCreated
n) ToString

[C#] public bool HandleCreated {get;}

[C++] public: _property bool get HandleCreated( );

[VB] Public ReadOnly Property HandleCreated As Boolean

[JScript] public function get HandleCreated( ): Boolean;

Description

Gets a value indicating whether the underlying Win32 handle has been created.

o) Images
p) ToString

[C#] public ImageList.ImageCollection Images {get;}

[C++] public: _property ImageList.ImageCollection* get_Images( );

[VB] Public ReadOnly Property Images As ImageList.ImageCollection

[JScript] public function get Images( ): ImageList.ImageCollection;

Description

Gets the System.Windows.Forms.ImageList.ImageCollection for this image list.

If the image collection has not yet been created, it is created when you retrieve this property.

q) ImageSize
r) ToString

[C#] public Size ImageSize {get; set;}

[C++] public: _property Size get_ImageSize( ); public: _property void set_ImageSize(Size);

[VB] Public Property ImageSize As Size

[JScript] public function get ImageSize( ): Size; public function set ImageSize(Size);

Description

Gets or sets the size of the images in the image list.

When you set a new image size, the handle is recreated.

s) ImageStream
t) ToString

[C#] public ImageListStreamer ImageStream {get; set;}

[C++] public: _property ImageListStreamer* get_Image Stream( ); public: _property void set_ImageStream(ImageListStreamer*);

[VB] Public Property ImageStream As ImageListStreamer

[JScript] public function get ImageStream( ): ImageListStreamer; public function set ImageStream(ImageListStreamer);

Description

Gets the handle to the System.Windows.Forms.ImageListStreamer associated with this image list.

The System.Windows.Forms.ImageListStreamer is the data portion of the image list.

u) Site
v) TransparentColor
w) ToString

Description

Gets or sets the color to treat as transparent.

The transparent color is not rendered when the image is drawn.

x) ToString

Description

Occurs when the System.Windows.Forms.ImageList.Handle is recreated.

You can use this event to do special processing when the System.Windows.Forms.ImageList.Handle is created by actions such as changing the System.Windows.Forms.ImageList.ColorDepth or System.Windows.Forms.ImageList.ImageSize. Special processing is recommended when you have supplied the handle for the list.

y) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the resources (other than memory) used by the System.Windows.Forms.ImageList.

Call System.Windows.Forms.ImageList.Dispose(System.Boolean) when you are finished using the System.Windows.Forms.ImageList. The System.Windows.Forms.ImageList.Dispose(System.Boolean) method leaves the System.Windows.Forms.ImageList in an unusable state. After calling System.Windows.Forms.ImageList.Dispose(System.Boolean), you must release all references to the System.Windows.Forms.ImageList so the memory it was occupying can be reclaimed by garbage collection.

z) Draw

[C#] public void Draw(Graphics g, Point pt, int index);

[C++] public: void Draw(Graphics* g, Point pt, int index);

[VB] Public Sub Draw(ByVal g As Graphics, ByVal pt As Point, ByVal index As Integer)

[JScript] public function Draw(g: Graphics, pt: Point, index: int); Draws the indicated image.

Description

Draws the image indicated by the specified index on the specified System.Drawing.Graphics at the given location. System.Drawing.Graphics object to draw into. The location defined by a System.Drawing.Point at which to draw the image. Index of the image in the System.Windows.Forms.ImageList to draw.

aa) Draw

[C#] public void Draw(Graphics g, int x, int y, int index);

[C++] public: void Draw(Graphics* g, int x, int y, int index);

[VB] Public Sub Draw(ByVal g As Graphics, ByVal x As Integer, ByVal y As Integer, ByVal index As Integer)

[JScript] public function Draw(g: Graphics, x: int, y: int, index: int);

Description

Draws the image indicated by the given index on the specified System.Drawing.Graphics at the specified location. System.Drawing.Graphics object to draw into. Horizontal position at which to draw the image. Vertical position at which to draw the image. Index of the image in the System.Windows.Forms.ImageList to draw.

bb) Draw

[C#] public void Draw(Graphics g, int x, int y, int width, int height, int index);

[C++] public: void Draw(Graphics* g, int x, int y, int width, int height, int index);

[VB] Public Sub Draw(ByVal g As Graphics, ByVal x As Integer, ByVal y As Integer, ByVal width As Integer, ByVal height As Integer, ByVal index As Integer)

[JScript] public function Draw(g: Graphics, x: int, y: int, width: int, height: int, index int);

Description

Draw the image indicated by the given index using the location, size and raster op code specified.

The image is stretched or compressed as necessary to fit the bounds provided. System.Drawing.Graphics object to draw into. Horizontal position at which to draw the image. Vertical position at which to draw the image. Width of destination image. Height of destination image. Index of the image in the System.Windows.Forms.ImageList to draw.

cc) ToString

[C#] public override string ToString( );

[C++] public: String* ToString( );

[VB] Overrides Public Function ToString( ) As String

[JScript] public override function ToString( ) String;

Description

Returns a string representation for this control.

Return Value: String Returns a string representation for this control.

ImageListStreamer class (System.Windows.Forms)

a) ToString

Description

Provides the data portion of an System.Windows.Forms.ImageList.

This is a sealed class, so you can not inherit from it. Also, the constructor is private. So you cannot create a new instance of it.

b) GetObjectData

[C#] public void GetObjectData(SerializationInfo si, StreamingContext context);

[C++] public: _sealed void GetObjectData(SerializationInfo* si, StreamingContext context);

[VB] NotOverridable Public Sub GetObjectData(ByVal si As SerializationInfo, ByVal context As StreamingContext)

[JScript] public function GetObjectData(si: SerializationInfo, context: StreamingContext);

Description

ImeMode enumeration (System.Windows.Forms)

a) ToString

Description

Specifies a value that determines the Input Method Editor (IME) status of an object when the object is selected.

An Input Method Editor (IME) allows users to enter and edit Chinese, Japanese, and Korean characters. The IME is an essential component for writing Chinese, Japanese, and Korean scripts. These writing systems have more characters than can be encoded for a regular keyboard. The IMEs for these languages use sequences of base characters that describe an individual character or group of characters to allow you to enter a larger set of characters. Base characters can be component letters from Hangul syllables, phonetic components for Japanese Kanji characters, or various combinations for Chinese characters.

b) ToString

[C#] public const ImeMode Alpha;

[C++] public: const ImeMode Alpha;

[VB] Public Const Alpha As ImeMode

[JScript] public var Alpha: ImeMode;

Description

Alphanumeric single-byte characters(SBC). This setting is valid for Korean and Japanese IME only.

c) ToString

[C#] public const ImeMode AlphaFull;

[C++] public: const ImeMode AlphaFull;

[VB] Public Const AlphaFull As ImeMode

[JScript] public var AlphaFull: ImeMode;

Description

Alphanumeric double-byte characters. This setting is valid for Korean and Japanese IME only.

d) ToString

[C#] public const ImeMode Disable;

[C++] public: const ImeMode Disable;

[VB] Public Const Disable As ImeMode

[JScript] public var Disable: ImeMode;

Description

The IME is disabled. With this setting, the users cannot turn the IME on from the keyboard, and the IME floating window is hidden.

e) ToString

[C#] public const ImeMode Hangul;

[C++] public: const ImeMode Hangul;

[VB] Public Const Hangul As ImeMode

[JScript] public var Hangul: ImeMode;

Description

Hangul SBC. This setting is valid for the Korean IME only.

f) ToString

[C#] public const ImeMode HangulFull;

[C++] public: const ImeMode HangulFull;

[VB] Public Const HangulFull As ImeMode

[JScript] public var HangulFull: ImeMode;

Description

Hangul DBC. This setting is valid for the Korean IME only.

g) ToString

[C#] public const ImeMode Hiragana;

[C++] public: const ImeMode Hiragana;

[VB] Public Const Hiragana As ImeMode

[JScript] public var Hiragana: ImeMode;

Description

Hiragana DBC. This setting is valid for the Japanese IME only.

h) ToString

[C#] public const ImeMode Inherit;

[C++] public: const ImeMode Inherit;

[VB] Public Const Inherit As ImeMode

[JScript] public var Inherit: ImeMode;

Description

Inherits the IME mode of the parent control.

i) ToString

[C#] public const ImeMode Katakana;

[C++] public: const ImeMode Katakana;

[VB] Public Const Katakana As ImeMode

[JScript] public var Katakana: ImeMode;

Description

Katakana DBC. This setting is valid for the Japanese IME only.

j) ToString

[C+] public const ImeMode KatakanaHalf;

[C++] public: const ImeMode KatakanaHalf;

[VB] Public Const KatakanaHalf As ImeMode

[JScript] public var KatakanaHalf: ImeMode;

Description

Katakana SBC. This setting is valid for the Japanese IME only.

k) ToString

[C#] public const ImeMode NoControl;

[C++] public: const ImeMode NoControl;

[VB] Public Const NoControl As ImeMode

[JScript] public var NoControl: ImeMode;

Description

None (Default).

l) ToString

[C#] public const ImeMode Off;

[C++] public: const ImeMode Off;

[VB] Public Const Off As ImeMode

[JScript] public var Off: ImeMode;

Description

The IME is off. This mode indicates that the IME is off, meaning that the object behaves the same as English entry mode. This setting is valid for Japanese, Simplified Chinese, and Traditional Chinese IME only.

m) ToString

[C#] public const ImeMode On;

[C++] public: const ImeMode On;

[VB] Public Const On As ImeMode

[JScript] public var On: ImeMode;

Description

The IME is on. This value indicates that the IME is on and characters specific to Chinese or Japanese can be entered. This setting is valid for Japanese, Simplified Chinese, and Traditional Chinese IME only.

IMessageFilter interface (System.Windows.Forms)

a) ToString

Description

Defines a message filter interface.

This interface allows an application to capture a message before it is dispatched to a control or form.

b) PreFilterMessage

[C#] bool PreFilterMessage(ref Message m);

[C++] bool PreFilterMessage(Message* m);

[VB] Function PreFilterMessage(ByRef m As Message) As Boolean

[JScript] function PreFilterMessage(m: Message) Boolean;

Description

Filters out a message before it is dispatched.

Return Value: true to filter the message and prevent it from being dispatched; false to allow the message to continue to the next filter or control.

Use System.Windows.Forms.IMessageFilter. PreFilterMessage(System.Windows.Forms.Message @) to filter out a message before it is dispatched to a control or form. For example, to prevent the System.Windows.Forms.Control. Click event of a System.Windows.Forms.Button control from being dispatched to the control, you implement the System. Windows.Forms.IMessageFilter.PreFilterMessage(System. Windows.Forms.Message @) method and return a true value when the System.Windows.Forms.Control.Click message occurs. You can also use this method to perform code work that you might need to do before the message is dispatched. The message to be dispatched. You cannot modify this message.

InputLanguage class (System.Windows.Forms)

a) PreFilterMessage

Description

Provides methods and fields to manage the input language. This class cannot be inherited.

An input language is a culture/keyboard layout pair that determines how the physical keys on a keyboard map or plot to characters in a language.

b) Culture c) PreFilterMessage

[C#] public CultureInfo Culture {get;}

[C++] public: _property CultureInfo* get_Culture( );

[VB] Public ReadOnly Property Culture As CultureInfo

[JScript] public function get Culture( ): CultureInfo;

Description

Gets the culture of the current input language.

This flag is passed to System.Windows.Forms.InputLanguage.CurrentInputLanguage to specify that the input language is for the process, not just for the current thread.

d) CurrentInputLanguage e) PreFilterMessage

[C#] public static InputLanguage CurrentInputLanguage {get; set;}

[C++] public: _property static InputLanguage* get_CurrentInputLanguage( ); public: _property static void set_CurrentInputLanguage(InputLanguage*);

[VB] Public Shared Property CurrentInputLanguage As InputLanguage

[JScript] public static function get CurrentInputLanguage( ): InputLanguage; public static function set CurrentInputLanguage(InputLanguage);

Description

Gets or sets the input language for the current thread.

f) DefaultInputLanguage g) PreFilterMessage

[C#] public static InputLanguage DefaultInputLanguage {get;}

[C++] public: _property static InputLanguage* get_DefaultInputLanguage( );

[VB] Public Shared ReadOnly Property DefaultInputLanguage As InputLanguage

[JScript] public static function get DefaultInputLanguage( ): InputLanguage;

Description

Gets the default input language for the system.

h) Handle i) PreFilterMessage

[C#] public IntPtr Handle {get;}

[C++] public: _property IntPtr get_Handle( );

[VB] Public ReadOnly Property Handle As IntPtr

[JScript] public function get Handle( ): IntPtr;

Description

Gets the handle for the input language.

j) InstalledInputLanguages k) PreFilterMessage

[C#] public static InputLanguageCollection InstalledInputLanguages {get;}

[C++] public: _property static InputLanguageCollection* get_InstalledInputLanguages( );

[VB] Public Shared ReadOnly Property InstalledInputLanguages As InputLanguageCollection

[JScript] public static function get InstalledInput Languages( ): InputLanguageCollection;

Description

Gets a list of all installed input languages.

l) LayoutName m) PreFilterMessage

[C#] public string LayoutName {get;}

[C++] public: _property String* get_LayoutName( );

[VB] Public ReadOnly Property LayoutName As String

[JScript] public function get LayoutName: String;

Description

Gets the name of the current keyboard layout as it appears in the regional settings of the operating system on the computer.

n) Equals

[C#] public override bool Equals(object value);

[C++] public: bool Equals(Object* value);

[VB] Overrides Public Function Equals(ByVal value As Object) As Boolean

[JScript] public override function Equals(value: Object): Boolean;

Description

Specifies whether two input languages are equal.

Return Value: true if the two languages are equal; otherwise, false. The language to test for equality.

o) From Culture

[C#] public static InputLanguage FromCulture(CultureInfo culture);

[C++] public: static InputLanguage* FromCulture(CultureInfo* culture);

[VB] Public Shared Function FromCulture(ByVal culture As CultureInfo) As InputLanguage

[JScript] public static function FromCulture(culture: CultureInfo): InputLanguage;

Description

Returns the input language associated with the specified culture.

Return Value: An System.Windows.Forms.InputLanguage that represents the previously selected input language. The System.Globalization.CultureInfo object that specifies the culture to convert from.

p) GetHashCode

[C#] public override int GetHashCode( );

[C++] public: int GetHashCode( );

[VB] Overrides Public Function GetHashCode( ) As Integer

[JScript] public override function GetHashCode( ): int;

Description

Returns the hash code for this input language.

Return Value: The hash code for this input language.

InputLanguageChangedEventArgs class (System.Windows.Forms)

a) ToString

Description

Provides data for the System.Windows.Forms.Form.InputLanguageChanged event.

You can use the data from the System.Windows.Forms.InputLanguageChangedEventArgs to make decisions about whether to change Input Method Editors (IME) or swap right-to-left values. You can also change a thread's System.Threading.Thread.CurrentCulture and System.Threading.Thread.CurrentUICulture properties so that different resources get picked up.

b) InputLanguageChangedEventArgs

Example Syntax:

c) ToString

[C#] public InputLanguageChangedEventArgs(CultureInfo culture, byte charSet);

[C++] public: InputLanguageChangedEventArgs(CultureInfo* culture, unsigned char charSet);

[VB] Public Sub New(ByVal culture As CultureInfo, ByVal charSet As Byte)

[JScript] public function InputLanguageChangedEventArgs (culture: CultureInfo, charSet: Byte); Initializes a new instance of the System.Windows.Forms.InputLanguageChangedEventArgs class.

Description

Initializes a new instance of the System.Windows.Forms.InputLanguageChangedEventArgs class with the specified locale and character set. The locale of the input language. The character set associated with the new input language.

d) InputLanguageChangedEventArgs

Example Syntax:

e) ToString

[C#] public InputLanguageChangedEventArgs(InputLanguage inputLanguage, byte charSet);

[C++] public: InputLanguageChangedEventArgs(InputLanguage* inputLanguage, unsigned char charSet);

[VB] Public Sub New(ByVal inputLanguage As InputLanguage, ByVal charSet As Byte)

[JScript] public function InputLanguageChangedEventArgs (inputLanguage: InputLanguage, charSet: Byte);

Description

Initializes a new instance of the System.Windows.Forms.InputLanguageChangedEventArgs class with the specified input language and character set.

The input language specifies a culture/keyboard layout pair. The input language. The character set associated with the new input language.

f) CharSet g) ToString

[C#] public byte CharSet {get;}

[C++] public: _property unsigned char get_CharSet( );

[VB] Public ReadOnly Property CharSet As Byte

[JScript] public function get CharSet( ): Byte;

Description

Gets the character set associated with the new input language.

This property is the Win32 character set that the user switched to. On ANSI systems, this property can be used to create fonts that can display the correct character set. On Unicode systems, you typically do not need to use this property. Instead, use the System.Globalization.CultureInfo class for these functionalities.

h) Culture i) ToString

[C#] public CultureInfo Culture {get;}

[C++] public: _property CultureInfo* get_Culture( );

[VB] Public ReadOnly Property Culture As CultureInfo

[JScript] public function get Culture( ): CultureInfo;

Description

Gets the locale of the input language.

The System.Windows.Forms.InputLanguageChanged Event Args.Culture property specifies a System.Globalization.CultureInfo object defining a set of user preference information dependent on the user's language, sub-language, country/region, and cultural conventions.

j) InputLanguage k) ToString

[C#] public InputLanguage InputLanguage {get;}

[C++] public: _property InputLanguage* get_InputLanguage( );

[VB] Public ReadOnly Property InputLanguage As InputLanguage

[JScript] public function get InputLanguage( ): InputLanguage;

Description

Gets a value indicating the input language.

InputLanguageChangedEventHandler delegate (System.Windows.Forms)

a) ToString

Description

Represents the method that will handle the System.Windows.Forms.Form.InputLanguageChanged event of a System.Windows.Forms.Form. The source of the event. An System.Windows.Forms.InputLanguageChangedEventArgs that contains the event data.

When you create a System.Windows.Forms.InputLanguageChangedEventHandler delegate, you identify the method that will handle the event. To associate the event with your event handler, add an instance of the delegate to the event. The event handler is called whenever the event occurs, unless you remove the delegate.

InputLanguageChangingEventArgs class (System.Windows.Forms)

a) ToString

Description

Provides data for the System.Windows.Forms.Form.InputLanguageChanging event.

You can use the data from the System.Windows.Forms.InputLanguageChangingEventArgs to prepare to change Input Method Editors (IME) or swap right-to-left values. You can also change a thread's System.Threading.Thread.CurrentCulture and System.Threading.Thread.CurrentUICulture properties so that different resources get picked up.

b) InputLanguageChangingEventArgs

Example Syntax:

c) ToString

[C#] public InputLanguageChangingEventArgs(CultureInfo culture, bool sysCharSet);

[C++] public: InputLanguageChangingEventArgs(CultureInfo* culture, bool sysCharSet);

[VB] Public Sub New(ByVal culture As CultureInfo, ByVal sysCharSet As Boolean)

[JScript] public function InputLanguageChangingEventArgs (culture: CultureInfo, sysCharSet: Boolean); Initializes a new instance of the System.Windows.Forms.InputLanguageChangingEventArgs class.

Description

Initializes a new instance of the System.Windows.Forms.InputLanguageChangingEventArgs class with the specified locale, character set, and acceptance. The locale of the requested input language. true if the system default font supports the character set required for the requested input language; otherwise, false.

d) InputLanguageChangingEventArgs

Example Syntax:

e) ToString

[C#] public InputLanguageChangingEventArgs(InputLanguage inputLanguage, bool sysCharSet);

[C++] public: InputLanguageChangingEventArgs(InputLanguage* inputLanguage, bool sysCharSet);

[VB] Public Sub New(ByVal inputLanguage As InputLanguage, ByVal sysCharSet As Boolean)

[JScript] public function InputLanguageChangingEventArgs (inputLanguage: InputLanguage, sysCharSet: Boolean);

Description

Initializes a new instance of the System.Windows.Forms.InputLanguageChangingEventArgs class with the specified input language, character set, and acceptance of a language change. The requested input language. true if the system default font supports the character set required for the requested input language; otherwise, false.

f) Cancel g) Culture h) ToString

Description

Gets the locale of the requested input language.

The System.Windows.Forms.InputLanguageChanged Event Args.Culture property specifies a System.Globalization.CultureInfo object defining a set of user preference information dependent on the user's language, sublanguage, country/region, and cultural conventions.

i) InputLanguage j) ToString

[C#] public InputLanguage InputLanguage {get;}

[C++] public: _property InputLanguage* get_InputLanguage( );

[VB] Public ReadOnly Property InputLanguage As InputLanguage

[JScript] public function get InputLanguage( ): InputLanguage;

Description

Gets a value indicating the input language.

k) SysCharSet l) ToString

[C#] public bool SysCharSet {get;}

[C++] public: _property bool get_SysCharSet( );

[VB] Public ReadOnly Property SysCharSet As Boolean

[JScript] public function get SysCharSet( ): Boolean;

Description

Gets a value indicating whether the system default font supports the character set required for the requested input language.

InputLanguageChangingEventHandler delegate (System.Windows.Forms)

a) ToString

Description

Represents the method that will handle the System.Windows.Forms.Form.InputLanguageChanging event of a System.Windows.Forms.Form. The source of the event. An System.Windows.Forms.InputLanguageChangingEventArgs that contains the event data.

When you create an System.Windows.Forms.InputLanguageChangingEventHandler delegate, you identify the method that will handle the event. To associate the event with your event handler, add an instance of the delegate to the event. The event handler is called whenever the event occurs, unless you remove the delegate.

InputLanguageCollection class (System.Windows.Forms)

a) ToString

Description

Stores System.Windows.Forms.InputLanguage objects. The System.Windows.Forms.InputLanguageCollection class is used by System.Windows.Forms.InputLanguage to provide a list of the input languages installed on the system.

b) Count c) InnerList d) Item e) ToString

Description

Gets the entry at the specified index of the System.Windows.Forms.InputLanguageCollection. The zero-based index of the entry to locate in the collection.

j) Contains

[C#] public bool Contains(InputLanguage value);

[C++] public: bool Contains(InputLanguage* value);

[VB] Public Function Contains(ByVal value As InputLanguage) As Boolean

[JScript] public function Contains(value: InputLanguage): Boolean;

Description

Gets a value indicating whether the System.Windows.Forms.InputLanguageCollection contains the specified System.Windows.Forms.InputLanguage.

Return Value: true if the System.Windows.Forms.InputLanguage is contained in the collection; otherwise, false. The System.Windows.Forms.InputLanguage to locate.

g) CopyTo

[C#] public void CopyTo(InputLanguage[ ] array, int index);

[C++] public: void CopyTo(InputLanguage* array[ ], int index);

[VB] Public Sub CopyTo(ByVal array( ) As InputLanguage, ByVal index As Integer)

[JScript] public function CopyTo(array: InputLanguage[ ], index: int);

Description

Copies the System.Windows.Forms.InputLanguageCollection values to a one-dimensional System.Array instance at the specified index. The one-dimensional array that is the destination of the values copied from System.Windows.Forms.InputLanguageCollection. The index in the array parameter where copying begins.

h) IndexOf

[C#] public int IndexOf(InputLanguage value);

[C++] public: int IndexOf(InputLanguage* value);

[VB] Public Function IndexOf(ByVal value As InputLanguage) As Integer

[JScript] public function IndexOf(value: InputLanguage): int;

Description

Returns the index of a System.Windows.Forms.InputLanguage in the System.Windows.Forms.InputLanguageCollection.

Return Value: The index of the System.Windows.Forms.InputLanguage in System.Windows.Forms.InputLanguageCollection, if found; otherwise, -1. The System.Windows.Forms.InputLanguage to locate.

InvalidateEventArgs class (System.Windows.Forms)

a) ToString

Description

Provides data for the System.Windows.Forms.Control.Invalidate(System.Drawing.Region) event.

The System.Windows. Forms.Control.Invalidate(System.Drawing. Region) event occurs when a control's display is updated. An System.Windows.Forms.InvalidateEventArgs specifies the System.Drawing.Graphics object to use to paint the control and the rectangle in which to paint.

b) InvalidateEventArgs

Example Syntax:

c) ToString

[C#] public InvalidateEventArgs(Rectangle invalidRect);

[C++] public: InvalidateEventArgs(Rectangle invalidRect);

[VB] Public Sub New(ByVal invalidRect As Rectangle)

[JScript] public function InvalidateEventArgs(invalidRect: Rectangle);

Description

Initializes a new instance of the System.Windows.Forms.InvalidateEventArgs class. The System.Drawing.Rectangle that contains the invalidated window area.

d) InvalidRect e) ToString

[C#] public Rectangle InvalidRect {get;}

[C++] public: _property Rectangle get_InvalidRect( );

[VB] Public ReadOnly Property InvalidRect As Rectangle

[JScript] public function get InvalidRect( ): Rectangle;

Description

Gets the System.Drawing.Rectangle that contains the invalidated window area.

InvalidateEventHandler delegate (System.Windows.Forms)

a) ToString

Description

Represents the method that will handle the System.Windows.Forms.Control.Invalidate(System.Drawing.Region) event of a System.Windows.Forms.Control. The source of the event. An System.Windows.Forms.InvalidateEventArgs that contains the event data.

When you create an System.Windows.Forms.Invalidate EventHandler delegate, you identify the method that will handle the event. To associate the event with your event handler, add an instance of the delegate to the event. The event handler is called whenever the event occurs, unless you remove the delegate. For more information about handling events with delegates, see.

ItemActivation enumeration (System.Windows.Forms)

a) ToString

Description

Specifies the user action that is required to activate items in a list view control and the feedback that is given as the user moves the mouse pointer over an item.

Use the members of this enumeration to set the value of the System.Windows.Forms.ListView.Activation property of the System.Windows.Forms.ListView control.

b) ToString

[C#] public const ItemActivation OneClick;

[C++] public: const ItemActivation OneClick;

[VB] Public Const OneClick As ItemActivation

[JScript] public var OneClick: ItemActivation;

Description

The user must single-click to activate items. The cursor changes to a hand pointer cursor, and the item text changes color as the user moves the mouse pointer over the item.

c) ToString

[C#] public const ItemActivation Standard;

[C++] public: const ItemActivation Standard;

[VB] Public Const Standard As ItemActivation

[JScript] public var Standard: ItemActivation;

Description

The user must double-click to activate items. No feedback is given as the user moves the mouse pointer over an item.

d) ToString

[C#] public const ItemActivation TwoClick;

[C++] public: const ItemActivation TwoClick;

[VB] Public Const TwoClick As ItemActivation

[JScript] public var TwoClick: ItemActivation;

Description

The user must double-click to activate items and the item text changes color as the user moves the mouse pointer over the item.

ItemBoundsPortion enumeration (System.Windows-.Forms)

a) ToString

Description

Specifies a portion of the list view item from which to retrieve the bounding rectangle.

Use the members of this enumeration when calling the System.Windows.Forms.ListView.GetItemRect(System.Int32) method of the System.Windows.Forms.ListView control. This enumeration is also used when calling the System.Windows.Forms.ListViewItem.GetBounds(System Windows. Forms.ItemBoundsPortion) method of the System.Windows. Forms.ListViewItem class.

b) ToString

[C#] public const ItemBoundsPortion Entire;

[C++] public: const ItemBoundsPortion Entire;

[VB] Public Const Entire As ItemBoundsPortion

[JScript] public var Entire: ItemBoundsPortion;

Description

The bounding rectangle of the entire item, including the icon, the item text, and the subitem text (if displayed), should be retrieved.

c) ToString

[C#] public const ItemBoundsPortion Icon;

[C++] public: const ItemBoundsPortion Icon;

[VB] Public Const Icon As ItemBoundsPortion

[JScript] public var Icon: ItemBoundsPortion;

Description

The bounding rectangle of the icon or small icon should be retrieved.

d) ToString

[C#] public const ItemBoundsPortion ItemOnly;

[C++] public: const ItemBoundsPortion ItemOnly;

[VB] Public Const ItemOnly As ItemBoundsPortion

[JScript] public var ItemOnly: ItemBoundsPortion;

Description

The bounding rectangle of the icon or small icon and the item text should be retrieved. In all views except Report view of the System.Windows.Forms.ListView, this value specifies the same bounding rectangle as the Entire value. In Report view, this value specifies the bounding rectangle specified by the Entire value without the subitems.

e) ToString

[C#] public const ItemBoundsPortion Label;

[C++] public: const ItemBoundsPortion Label;

[VB] Public Const Label As ItemBoundsPortion

[JScript] public var Label: ItemBoundsPortion;

Description

The bounding rectangle of the item text should be retrieved.

ItemChangedEventArgs class (System.Windows.Forms)

a) ToString

Description

Provides data for the System.Windows.Forms.CurrencyManager.ItemChanged event.

An System.Windows.Forms.CurrencyManager.Item Changed event occurs whenever the item in a list is changed. For example, this event will occur when the text of the list item is changed to a new value. This event is not raised when the item is moved to a new position within the list because of a new item being added.

b) Index c) ToString

[C#] public int Index {get;}

[C++] public: _property int get_Index( );

[VB] Public ReadOnly Property Index As Integer

[JScript] public function get Index( ): int;

Description

Indicates the position of the item being changed within the list.

ItemChangedEventHandler delegate (System.Windows. Forms)

a) ToString

Description

Represents the method that will handle the System.Windows. Forms.CurrencyManager.ItemChanged event of the System. Windows.Forms.CurrencyManager class. The source of the event. An System.Windows.Forms.ItemChangedEventArgs that contains the event data.

When you create an System.Windows.Forms.ItemChangedEventHandler delegate, you identify the method that will handle the event. To associate the event with your event handler, add an instance of the delegate to the event. The event handler is called whenever the event occurs, unless you remove the delegate. For more information about event handler delegates, see.

ItemCheckEventArgs class (System.Windows.Forms)

a) ToString

Description

Provides data for the System.Windows.Forms. CheckedListBox.ItemCheck event of the System.Windows.Forms. CheckedListBox and System.Windows.Forms.ListView controls.

The System.Windows.Forms.CheckedListBox.ItemCheck event occurs when the checked state of an item in a checked list box changes. The System.Windows.Forms.ItemCheckEventArgs class specifies the index of the item to change, the current value of the check box for the item, and the new value to set for the check box.

b) ItemCheckEventArgs

Example Syntax:

c) ToString

[C#] public ItemCheckEventArgs(int index, CheckState newCheckValue, CheckState currentValue);

[C++] public: ItemCheckEventArgs(int index, CheckState newCheckValue, CheckState currentValue);

[VB] Public Sub New(ByVal index As Integer, ByVal newCheckValue As CheckState, ByVal currentValue As CheckState)

[JScript] public function ItemCheckEventArgs(index: int, newCheckValue CheckState, currentValue CheckState);

Description

Initializes a new instance of the System.Windows.Forms. ItemCheckEventArgs class. The zero-based index of the item to change. One of the System.Windows.Forms.CheckState values that indicates whether to change the check box for the item to be checked, unchecked, or indeterminate. One of the System.Windows.Forms.CheckState values that indicates whether the check box for the item is currently checked, unchecked, or indeterminate.

d) CurrentValue e) ToString

[C#] public CheckState CurrentValue {get;}

[C++] public: _property CheckState get_CurrentValue( );

[VB] Public ReadOnly Property CurrentValue As CheckState

[JScript] public function get CurrentValue( ): CheckState;

Description

Gets a value indicating the current state of the item's check box.

This property enables you to determine the check state of the specified item in the System.Windows.Forms. CheckedList-Box before the check state change to apply is made.

f) Index g) ToString

[C#] public int Index {get;}

[C++] public: Property int get Index( );

[VB] Public ReadOnly Property Index As Integer

[JScript] public function get Index( ): int;

Description

Gets the zero-based index of the item to change.

You can use this property to determine which item's check box in the System.Windows.Forms.CheckedListBox is being changed.

h) NewValue i) ToString

[C#] public CheckState NewValue {get; set;}

[C++] public: _property CheckState get_NewValue( ); public: _property void set_NewValue(CheckState);

[VB] Public Property NewValue As CheckState

[JScript] public function get NewValue( ): CheckState; public function set NewValue(CheckState);

Description

Gets or sets a value indicating whether to set the check box for the item to be checked, unchecked, or indeterminate.

This property enables you to determine the new check state for the specified item before the check state is changed by the System.Windows.Forms.CheckedListBox control. In addition to determining the new check state, you can use this property in an event handler for the System.Windows.Forms. CheckedListBox.ItemCheck event to change the state to a different check state than the one specified. For example, if the user placed a check mark next to an item in the System. Windows.Forms.CheckedListBox that you have determined should not be checked based on the state of your application, you can override the change in the check mark state by setting this property to its previous setting or to a different check state.

ItemCheckEventHandler delegate (System.Windows. Forms)

a) ToString

Description

Represents the method that will handle the ItemCheck event of a System.Windows.Forms.CheckedListBox or System. Windows.Forms.ListView control. The source of the event. An System.Windows.Forms.ItemCheckEventArgs that contains the event data.

When you create an System.Windows.Forms.ItemCheck-EventHandler delegate, you identify the method that will handle the event. To associate the event with your event handler, add an instance of the delegate to the event. The event handler is called whenever the event occurs, unless you remove the delegate. For more information about event handler delegates, see.

ItemDragEventArgs class (System.Windows.Forms)

a) ToString

Description

Provides data for the System.Windows.Forms.ListView. ItemDrag event of the System.Windows.Forms.ListView and System.Windows.Forms.TreeView controls.

The System.Windows.Forms.ListView.ItemDrag event occurs when the user begins dragging an item. An System. Windows.Forms.ItemDragEventArgs object specifies which mouse button was pressed.

b) ItemDragEventArgs

Example Syntax:

c) ToString

[C#] public ItemDragEventArgs(MouseButtons button);

[C++] public: ItemDragEventArgs(MouseButtons button);

[VB] Public Sub New(ByVal button As MouseButtons)

[JScript] public function ItemDragEventArgs(button: MouseButtons); Initializes a new instance of the System. Windows.Forms.ItemDragEventArgs class.

Description

Initializes a new instance of the System.Windows.Forms. ItemDragEventArgs class with a specified mouse button.

When this version of the constructor is used, the value of the System.Windows.Forms.ItemDragEventArgs.Item property is automatically set to null. One of the System.Windows. Forms.MouseButtons values that represents which mouse button was pressed.

d) ItemDragEventArgs

Example Syntax:

e) ToString

[C#] public ItemDragEventArgs(MouseButtons button, object item);

[C++] public: ItemDragEventArgs(MouseButtons button, Object* item);

[VB] Public Sub New(ByVal button As MouseButtons, ByVal item As Object)

[JScript] public function ItemDragEventArgs(button: MouseButtons, item: Object);

Description

Initializes a new instance of the System.Windows.Forms.ItemDragEventArgs class with a specified mouse button and the item that is being dragged. One of the System.Windows.Forms.MouseButtons values that represents which mouse button was pressed. The item being dragged.

f) Button g) ToString

[C#] public MouseButtons Button {get;}

[C++] public: _property MouseButtons get_Button( );

[VB] Public ReadOnly Property Button As MouseButtons

[JScript] public function get Button( ): MouseButtons;

Description

Gets the name of the mouse button that was clicked during the drag operation.

This property enables you to determine which mouse button was pressed during a drag and drop operation. The value of this property can be used to properly determine how the drag and drop operation should be performed.

h) Item i) ToString

[C#] public object Item {get;}

[C++] public: _property Object* get_Item( );

[VB] Public ReadOnly Property Item As Object

[JScript] public function get Item( ): Object;

Description

Gets the item that is being dragged.

You can use this property to determine which item from the System.Windows.Forms.TreeView or System.Windows.Forms.ListView controls is being dragged from the control.

ItemDragEventHandler delegate (System.Windows.Forms)

a) ToString

Description

Represents the method that will handle the System.Windows.Forms.ListView.ItemDrag event of a System.Windows.Forms.ListView or System.Windows.Forms.TreeView control. The source of the event. An System.Windows.Forms.ItemDragEventArgs that contains the event data.

When you create an System.Windows.Forms.ItemDragEventHandler delegate, you identify the method that will handle the event. To associate the event with your event handler, add an instance of the delegate to the event. The event handler is called whenever the event occurs, unless you remove the delegate. For more information about event handler delegates, see.

IWin32Window interface (System.Windows.Forms)

a) ToString

Description

Provides an interface to expose Win32 HWND handles.

This interface is implemented on objects that expose Win32 HWND handles. The resultant handle can be used with Win32 API calls.

b) Handle c) ToString

[C#] IntPtr Handle {get;}

[C++] IntPtr get_Handle( );

[VB] ReadOnly Property Handle As IntPtr

[JScript] abstract function get Handle( ): IntPtr;

Description

Gets the handle to the window represented by the implementer.

Depending on the implementer, the value of the System.Windows.Forms.IWin32Window.Handle property could change during the life of the window.

IWindowTarget interface (System.Windows.Forms)

a) ToString

Description

This interface defines the communication layer between a Control object and the Win32 API. Each Control object has an internal implementation this interface that is called by the Win32 window.

b) OnHandleChange

[C#] void OnHandleChange(IntPtr newHandle);

[C++] void OnHandleChange(IntPtr newHandle);

[VB] Sub OnHandleChange(ByVal newHandle As IntPtr)

[JScript] function OnHandleChange(newHandle: IntPtr);

Description

Called when the window handle of the control has changed. The new window handle value.

c) OnMessage

[C#] void OnMessage(ref Message m);

[C++] void OnMessage(Message* m);

[VB] Sub OnMessage(ByRef m As Message)

[JScript] function OnMessage(m: Message);

Description

Called to do control-specific processing for this window. The message to process.

KeyEventArgs class (System.Windows.Forms)

a) OnMessage

Description

Provides data for the System.Windows.Forms.Control.KeyDown or System.Windows.Forms.Control.KeyUp event.

A System.Windows.Forms.KeyEventArgs, which specifies the key the user pressed and whether any modifier keys (CTRL, ALT, and SHIFT) were pressed at the same time, is passed with each System.Windows.Forms.Control.KeyDown or System.Windows.Forms.Control.KeyUp event.

b) KeyEventArgs

Example Syntax:

c) OnMessage

[C#] public KeyEventArgs(Keys keyData);

[C++] public: KeyEventArgs(Keys keyData);

[VB] Public Sub New(ByVal keyData As Keys)

[JScript] public function KeyEventArgs(keyData: Keys);

Description

Initializes a new instance of the System.Windows.Forms.KeyEventArgs class. The key code constant for the key that was pressed, combined with any modifier flags that indicate which CTRL, SHIFT, and ALT keys were pressed at the same time. Possible values are obtained be applying the bitwise OR (|) operator to constants from System.Windows.Forms.Keys d) Alt e) OnMessage

[C#] public virtual bool Alt {get;}

[C++] public: _property virtual bool get_Alt( );

[VB] Overridable Public ReadOnly Property Alt As Boolean

[JScript] public function get Alt( ): Boolean;

Description

Gets a value indicating whether the ALT key was pressed.

f) Control g) OnMessage

[C#] public bool Control {get;}

[C++] public: _property bool get_Control( );

[VB] Public ReadOnly Property Control As Boolean

[JScript] public function get Control( ): Boolean;

Description

Gets a value indicating whether the CTRL key was pressed.

h) Handled i) OnMessage

[C#] public bool Handled {get; set;}

[C++] public: _property bool get_Handled( ); public: _property void set_Handled(bool);

[VB] Public Property Handled As Boolean

[JScript] public function get Handled( ): Boolean; public function set Handled(Boolean);

Description

Gets or sets a value indicating whether the event was handled.

j) KeyCode k) OnMessage

[C#] public Keys KeyCode {get;}

[C++] public: _property Keys get_KeyCode( );

[VB] Public ReadOnly Property KeyCode As Keys

[JScript] public function get KeyCode( ): Keys;

Description

Gets the keyboard code for a System.Windows.Forms.Control.KeyDown or System.Windows.Forms.Control.KeyUp event.

l) KeyData m) OnMessage

[C#] public Keys KeyData {get;}

[C++] public: _property Keys get_KeyData( );

[VB] Public ReadOnly Property KeyData As Keys

[JScript] public function get KeyData( ): Keys;

Description

Gets the key data for a System.Windows.Forms.Control.KeyDown or System.Windows.Forms.Control.KeyUp event.

You can use constants from System.Windows.Forms.Keys to extract information from the System.Windows.Forms.KeyEventArgs.KeyData property. Use the bitwise AND (&) operator to compare data returned by System.Windows.Forms.KeyEventArgs.KeyData with constants in System.Windows.Forms.Keys to obtain information about which keys the user pressed. To determine whether a specific modifier key was pressed, use the System.Windows.Forms.KeyEventArgs.Control, System.Windows.Forms.KeyEvent Args.Shift, and System.Windows.Forms.KeyEventArgs.Alt properties.

n) KeyValue o) OnMessage

[C#] public int KeyValue {get;}

[C++] public: _property int get_KeyValue( );

[VB] Public ReadOnly Property KeyValue As Integer

[JScript] public function get KeyValue( ): int;

Description

Gets the keyboard value for a System.Windows.Forms.Control.KeyDown or System.Windows.Forms.Control.KeyUp event.

p) Modifiers q) OnMessage

[C#] public Keys Modifiers {get;}

[C++] public: _property Keys get_Modifiers( );

[VB] Public ReadOnly Property Modifiers As Keys

[JScript] public function get Modifiers( ): Keys;

Description

Gets the modifier flags for a System.Windows.Forms.Control.KeyDown or System.Windows.Forms.Control.KeyUp event. This indicates which modifier keys (CTRL, SHIFT, and/or ALT) were pressed.

To determine whether a specific modifier key was pressed, use the System.Windows.Forms.KeyEventArgs.Control, System.Windows.Forms.KeyEventArgs.Shift, and System.Windows.Forms.KeyEventArgs.Alt properties. Modifier flags can be combined with bitwise OR.

r) Shift s) OnMessage

[C#] public virtual bool Shift {get;}

[C++] public: _property virtual bool get_Shift( );

[VB] Overridable Public ReadOnly Property Shift As Boolean

[JScript] public function get Shift( ): Boolean;

Description

Gets a value indicating whether the SHIFT key was pressed.

KeyEventHandler delegate (System.Windows.Forms)

a) ToString

Description

Represents a method that will handle the System.Windows.Forms.Control.KeyUp or System.Windows.Forms.Control.KeyDown event of a System.Windows.Forms.Control. The source of the event. A System.Windows.Forms.KeyEventArgs that contains the event data.

When you create a System.Windows.Forms.KeyEventHandler delegate, you identify the method that will handle the event. To associate the event with your event handler, add an instance of the delegate to the event. The event handler is called whenever the event occurs, unless you remove the delegate. For more information about handling events with delegates, see.

KeyPressEventArgs class (System.Windows.Forms)

a) ToString

Description

Provides data for the System.Windows.Forms.Control.KeyPress event.

A System.Windows.Forms.KeyPressEventArgs specifies the character that is composed when the user presses a key. For example, when the user presses SHIFT+K, the System.Windows.Forms.KeyPressEventArgs.KeyChar property returns an uppercase K.

b) KeyPressEventArgs

Example Syntax:

c) ToString

[C#] public KeyPressEventArgs(char keyChar);

[C++] public: KeyPressEventArgs(_wchar_t keyChar);

[VB] Public Sub New(ByVal keyChar As Char)

[JScript] public function KeyPressEventArgs(keyChar: Char);

Description

Initializes a new instance of the System.Windows.Forms.KeyPressEventArgs class. The ASCII character corresponding to the key the user pressed.

d) Handled e) ToString

[C#] public bool Handled {get; set;}

[C++] public: _property bool get_Handled( ); public: _property void set_Handled(bool);

[VB] Public Property Handled As Boolean

[JScript] public function get Handled( ): Boolean; public function set Handled(Boolean);

Description

Gets or sets a value indicating whether the System.Windows.Forms.Control.KeyPress event was handled.

If the event is not handled, it will be sent to Windows for default processing.

f) KeyChar g) ToString

[C#] public char KeyChar {get;}

[C++] public: _property _wchar_t get_KeyChar( );

[VB] Public ReadOnly Property KeyChar As Char

[JScript] public function get KeyChar( ): Char;

Description

Gets the character corresponding to the key pressed.

KeyPressEventHandler delegate (System.Windows.Forms)

a) ToString

Description

Represents a method that will handle the System.Windows.Forms.Control.KeyPress event of a System.Windows.Forms.Control. The source of the event. A System.Windows.Forms.KeyPressEventArgs that contains the event data.

When you create a System.Windows.Forms.KeyPressEventHandler delegate, you identify the method that will handle the event. To associate the event with your event handler, add an instance of the delegate to the event. The event handler is called whenever the event occurs, unless you remove the delegate. For more information about handling events with delegates, see.

Keys enumeration (System.Windows.Forms)

a) ToString

Description

Specifies key codes and modifiers.

This class contains constants to use for processing keyboard input. Keys are identified by key values, which consist of a key code and a set of modifiers combined into a single integer value. The four left digits of a key value contain the key code (which is the same as a Windows virtual key code). The four right digits of a key value contain modifier bits for the SHIFT, CONTROL, and ALT keys.

b) ToString

[C#] public const Keys A;

[C++] public: const Keys A;

[VB] Public Const A As Keys

[JScript] public var A: Keys;

Description

The A key.

c) ToString

[C#] public const Keys Add;

[C++] public: const Keys Add;

[VB] Public Const Add As Keys

[JScript] public var Add: Keys;

Description

The Add key.

d) ToString

[C#] public const Keys Alt;

[C++] public: const Keys Alt;

[VB] Public Const Alt As Keys

[JScript] public var Alt: Keys;

Description

The ALT modifier key.

e) ToString

[C#] public const Keys Apps;

[C++] public: const Keys Apps;

[VB] Public Const Apps As Keys

[JScript] public var Apps: Keys;

Description

The Application key (Microsoft Natural Keyboard).

f) ToString

[C#] public const Keys Attn;

[C++] public: const Keys Attn;

[VB] Public Const Attn As Keys

[JScript] public var Attn Keys;

Description

The ATTN key.

g) ToString

[C#] public const Keys B;

[C++] public: const Keys B;

[VB] Public Const B As Keys

[JScript] public var B: Keys;

Description

The B key.

h) ToString

[C#] public const Keys Back;

[C++] public: const Keys Back;

[VB] Public Const Back As Keys

[JScript] public var Back: Keys;

Description

The BACKSPACE key.

i) ToString

[C#] public const Keys BrowserBack;

[C++] public: const Keys BrowserBack;

[VB] Public Const BrowserBack As Keys

[JScript] public var BrowserBack: Keys;

Description

The Browser Back key (Windows 2000 or later).

j) ToString

[C#] public const Keys BrowserFavorites;

[C++] public: const Keys BrowserFavorites;

[VB] Public Const BrowserFavorites As Keys

[JScript] public var BrowserFavorites: Keys;

Description

The Browser Favorites key (Windows 2000 or later).

Description

The Browser Favorites key.

k) ToString

[C#] public const Keys BrowserForward;

[C++] public: const Keys BrowserForward;

[VB] Public Const BrowserForward As Keys

[JScript] public var BrowserForward: Keys;

Description

The Browser Forward key (Windows 2000 or later).

l) ToString

[C#] public const Keys BrowserHome;

[C++] public: const Keys BrowserHome;

[VB] Public Const BrowserHome As Keys

[JScript] public var BrowserHome: Keys;

Description

The Browser Home key (Windows 2000 or later).

m) ToString

[C#] public const Keys BrowserRefresh;

[C++] public: const Keys BrowserRefresh;

[VB] Public Const BrowserRefresh As Keys

[JScript] public var BrowserRefresh: Keys;

Description

The Browser Refresh key (Windows 2000 or later).

n) ToString

[C#] public const Keys BrowserSearch;

[C++] public: const Keys BrowserSearch;

[VB] Public Const BrowserSearch As Keys

[JScript] public var BrowserSearch: Keys;

Description

The Browser Search key (Windows 2000 or later).

o) ToString

[C#] public const Keys BrowserStop;

[C++] public: const Keys BrowserStop;

[VB] Public Const BrowserStop As Keys

[JScript] public var BrowserStop: Keys;

Description

The Browser Stop key (Windows 2000 or later).

p) ToString

[C#] public const Keys C;

[C++] public: const Keys C;

[VB] Public Const C As Keys

[JScript] public var C: Keys;

Description

The C key.

q) ToString

[C#] public const Keys Cancel;

[C++] public: const Keys Cancel;

[VB] Public Const Cancel As Keys

[JScript] public var Cancel: Keys;

Description

The CANCEL key.

r) ToString

[C#] public const Keys Capital;

[C++] public: const Keys Capital;

[VB] Public Const Capital As Keys

[JScript] public var Capital: Keys;

Description

The CAPS LOCK key.

s) ToString

[C#] public const Keys CapsLock;

[C++] public: const Keys CapsLock;

[VB] Public Const CapsLock As Keys

[JScript] public var CapsLock: Keys;

Description

The CAPS LOCK key.

t) ToString

[C#] public const Keys Clear;

[C++] public: const Keys Clear;

[VB] Public Const Clear As Keys

[JScript] public var Clear: Keys;

Description

The CLEAR key.

u) ToString

[C#] public const Keys Control;

[C++] public: const Keys Control;

[VB] Public Const Control As Keys

[JScript] public var Control: Keys;

Description

The CTRL modifier key.

v) ToString

[C#] public const Keys ControlKey;

[C++] public: const Keys ControlKey;

[VB] Public Const ControlKey As Keys

[JScript] public var ControlKey: Keys;

Description

The CTRL key.

w) ToString

[C#] public const Keys Crsel;

[C++] public: const Keys Crsel;

[VB] Public Const Crsel As Keys

[JScript] public var Crsel: Keys;

Description

The CRSEL key.

x) ToString

[C#] public const Keys D;

[C++] public: const Keys D;

[VB] Public Const D As Keys

[JScript] public var D: Keys;

Description

The D key.

y) ToString

[C#] public const Keys D0;

[C++] public: const Keys D0;

[VB] Public Const D0 As Keys

[JScript] public var D0 Keys;

Description

The 0 key.

z) ToString

[C#] public const Keys D1;

[C++] public: const Keys D1;

[VB] Public Const D1 As Keys

[JScript] public var D1: Keys;

Description

The 1 key.

aa) ToString

[C#] public const Keys D2;

[C++] public: const Keys D2;

[VB] Public Const D2 As Keys

[JScript] public var D2 Keys;

Description

The 2 key.

bb) ToString

[C#] public const Keys D3;

[C++] public: const Keys D3;

[VB] Public Const D3 As Keys

[JScript] public var D3: Keys;

Description

The 3 key.

cc) ToString

[C#] public const Keys D4;

[C++] public: const Keys D4;

[VB] Public Const D4 As Keys

[JScript] public var D4: Keys;

Description

The 4 key.

dd) ToString

[C#] public const Keys D5;

[C++] public: const Keys D5;

[VB] Public Const D5 As Keys

[JScript] public var D5: Keys;

Description

The 5 key.

ee) ToString

[C#] public const Keys D6;

[C++] public: const Keys D6;

[VB] Public Const D6 As Keys

[JScript] public var D6: Keys;

Description

The 6 key.

ff) ToString

[C#] public const Keys D7;

[C++] public: const Keys D7;

[VB] Public Const D7 As Keys

[JScript] public var D7: Keys;

Description

The 7 key.

gg) ToString

[C#] public const Keys D8;

[C++] public: const Keys D8;

[VB] Public Const D8 As Keys

[JScript] public var D8: Keys;

Description

The 8 key.

hh) ToString

[C#] public const Keys D9;

[C++] public: const Keys D9;

[VB] Public Const D9 As Keys

[JScript] public var D9 Keys;

Description

The 9 key.

ii) ToString

[C#] public const Keys Decimal;

[C++] public: const Keys Decimal;

[VB] Public Const Decimal As Keys

[JScript] public var Decimal Keys;

Description

The Decimal key.

jj) ToString

[C#] public const Keys Delete;

[C++] public: const Keys Delete;

[VB] Public Const Delete As Keys

[JScript] public var Delete: Keys;

Description

The DEL key.

kk) ToString

[C#] public const Keys Divide;

[C++] public: const Keys Divide;

[VB] Public Const Divide As Keys

[JScript] public var Divide: Keys;

Description

The Divide key.

ll) ToString

[C++] public const Keys Down;

[C++] public: const Keys Down;

[VB] Public Const Down As Keys

[JScript] public var Down: Keys;

Description

The DOWN ARROW key.

mm) ToString

[C#] public const Keys E;

[C++] public: const Keys E;

[VB] Public Const E As Keys

[JScript] public var E: Keys;

Description

The E key.

nn) ToString

[C#] public const Keys End;

[C++] public: const Keys End;

[VB] Public Const End As Keys

[JScript] public var End: Keys;

Description

The END key.

oo) ToString

[C#] public const Keys Enter;

[C++] public: const Keys Enter;

[VB] Public Const Enter As Keys

[JScript] public var Enter Keys;

Description

The ENTER key.

pp) ToString

[C#] public const Keys EraseEof;

[C++] public: const Keys EraseEof;

[VB] Public Const EraseEof As Keys

[JScript] public var EraseEof: Keys;

Description

The ERASE EOF key.

qq) ToString

[C#] public const Keys Escape;

[C++] public: const Keys Escape;

[VB] Public Const Escape As Keys

[JScript] public var Escape: Keys;

Description

The ESC key.

rr) ToString

[C#] public const Keys Execute;

[C++] public: const Keys Execute;

[VB] Public Const Execute As Keys

[JScript] public var Execute: Keys;

Description

The EXECUTE key.

ss) ToString

[C#] public const Keys Exsel;

[C++] public: const Keys Exsel;

[VB] Public Const Exsel As Keys

[JScript] public var Exsel: Keys;

Description

The EXSEL key.

tt) ToString

[C#] public const Keys F;

[C++] public: const Keys F;

[VB] Public Const F As Keys

[JScript] public var F: Keys;

Description

The F key.

uu) ToString

[C#] public const Keys F1;

[C++] public: const Keys F1;

[VB] Public Const F1 As Keys

[JScript] public var F1: Keys;

Description

The F1 key.

vv) ToString

[C#] public const Keys F10;

[C++] public: const Keys F10;

[VB] Public Const F10 As Keys

[JScript] public var F10: Keys;

Description

The F10 key.

ww) ToString

[C#] public const Keys F11;

[C++] public: const Keys F11;

[VB] Public Const F11 As Keys

[JScript] public var F11: Keys;

Description

The F11 key.

xx) ToString

[C#] public const Keys F12;

[C++] public: const Keys F12;

[VB] Public Const F12 As Keys

[JScript] public var F12 Keys;

Description

The F12 key.

yy) ToString

[C#] public const Keys F13;

[C++] public: const Keys F13;

[VB] Public Const F13 As Keys

[JScript] public var F13 Keys;

Description

The F13 key.

zz) ToString

[C#] public const Keys F14;

[C++] public: const Keys F14;

[VB] Public Const F14 As Keys

[JScript] public var F14: Keys;

Description

The F14 key.

aaa) ToString

[C#] public const Keys F15;

[C++] public: const Keys F15;

[VB] Public Const F15 As Keys

[JScript] public var F15: Keys;

Description

The F15 key.

bbb) ToString

[C#] public const Keys F16;

[C++] public: const Keys F16;

[VB] Public Const F16 As Keys

[JScript] public var F16: Keys;

Description

The F16 key.

ccc) ToString

[C#] public const Keys F17;

[C++] public: const Keys F17;

[VB] Public Const F17 As Keys

[JScript] public var F17: Keys;

Description

The F17 key.

ddd) ToString

[C#] public const Keys F18;

[C++] public: const Keys F18;

[VB] Public Const F18 As Keys

[JScript] public var F18: Keys;

Description

The F18 key.

eee) ToString

[C#] public const Keys F19;

[C++] public: const Keys F19;

[VB] Public Const F19 As Keys

[JScript] public var F19: Keys;

Description

The F19 key.

fff) ToString

[C#] public const Keys F2;

[C++] public: const Keys F2;

[VB] Public Const F2 As Keys

[JScript] public var F2: Keys;

Description

The F2 key.

ggg) ToString

[C#] public const Keys F20;

[C++] public: const Keys F20;

[VB] Public Const F20 As Keys

[JScript] public var F20: Keys;

Description

The F20 key.

hhh) ToString

[C#] public const Keys F21;

[C++] public: const Keys F21;

[VB] Public Const F21 As Keys

[JScript] public var F21 Keys;

Description

The F21 key.

iii) ToString

[C#] public const Keys F22;

[C++] public: const Keys F22;

[VB] Public Const F22 As Keys

[JScript] public var F22: Keys;

Description

The F22 key.

jjj) ToString

[C#] public const Keys F23;

[C++] public: const Keys F23;

[VB] Public Const F23 As Keys

[JScript] public var F23: Keys;

Description

The F23 key.

kkk) ToString

[C#] public const Keys F24;

[C++] public: const Keys F24;

[VB] Public Const F24 As Keys

[JScript] public var F24: Keys;

Description

The F24 key.

lll) ToString

[C#] public const Keys F3;

[C++] public: const Keys F3;

[VB] Public Const F3 As Keys

[JScript] public var F3: Keys;

Description

The F3 key.

mmm) ToString

[C#] public const Keys F4;

[C++] public: const Keys F4;

[VB] Public Const F4 As Keys

[JScript] public var F4: Keys;

Description

The F4 key.

nnn) ToString

[C#] public const Keys F5;

[C++] public: const Keys F5;

[VB] Public Const F5 As Keys

[JScript] public var F5: Keys;

Description

The F5 key.

ooo) ToString

[C#] public const Keys F6;

[C++] public: const Keys F6;

[VB] Public Const F6 As Keys

[JScript] public var F6: Keys;

Description

The F6 key.

ppp) ToString

[C#] public const Keys F7;

[C++] public: const Keys F7;

[VB] Public Const F7 As Keys

[JScript] public var F7 Keys;

Description

The F7 key.

qqq) ToString

[C#] public const Keys F8;

[C++] public: const Keys F8;

[VB] Public Const F8 As Keys

[JScript] public var F8: Keys;

Description

The F8 key.

rrr) ToString

[C#] public const Keys F9;

[C++] public: const Keys F9;

[VB] Public Const F9 As Keys

[JScript] public var F9 Keys;

Description

The F9 key.

sss) ToString

[C#] public const Keys FinalMode;

[C++] public: const Keys FinalMode;

[VB] Public Const FinalMode As Keys

[JScript] public var FinalMode: Keys;

Description

The IME final mode key.

ttt) ToString

[C#] public const Keys G;

[C++] public: const Keys G;

[VB] Public Const G As Keys

[JScript] public var G: Keys;

Description

The G key.

uuu) ToString

[C#] public const Keys H;

[C++] public: const Keys H;

[VB] Public Const H As Keys

[JScript] public var H: Keys;

Description

The H key.

vvv) ToString

[C#] public const Keys HanguelMode;

[C++] public: const Keys HanguelMode;

[VB] Public Const HanguelMode As Keys

[JScript] public var HanguelMode: Keys;

Description

The IME Hanguel mode key. (maintained for compatibility; use HangulMode) The IME Hanguel mode key.

www) ToString

[C#] public const Keys HangulMode;

[C++] public: const Keys HangulMode;

[VB] Public Const HangulMode As Keys

[JScript] public var HangulMode: Keys;

Description

The IME Hangul mode key.

xxx) ToString

[C#] public const Keys HanjaMode;

[C++] public: const Keys HanjaMode;

[VB] Public Const HanjaMode As Keys

[JScript] public var HanjaMode: Keys;

Description

The IME Hanja mode key.

yyy) ToString

[C#] public const Keys Help;

[C++] public: const Keys Help;

[VB] Public Const Help As Keys

[JScript] public var Help: Keys;

Description

The HELP key.

zzz) ToString

[C#] public const Keys Home;

[C++] public: const Keys Home;

[VB] Public Const Home As Keys

[JScript] public var Home: Keys;

Description

The HOME key.

aaaa) ToString

[C#] public const Keys I;

[C++] public: const Keys I;

[VB] Public Const I As Keys

[JScript] public var I: Keys;

Description

The I key.

bbbb) ToString

[C#] public const Keys IMEAceept;

[C++] public: const Keys IMEAceept;

[VB] Public Const IMEAceept As Keys

[JScript] public var IMEAceept: Keys;

Description

The IME Accept key.

cccc) ToString

[C++] public const Keys IMEConvert;

[C++] public: const Keys IMEConvert;

[VB] Public Const IMEConvert As Keys

[JScript] public var IMEConvert: Keys;

Description

The IME Convert key.

dddd) ToString

[C#] public const Keys IMEModeChange;

[C++] public: const Keys IMEModeChange;

[VB] Public Const IMEModeChange As Keys

[JScript] public var IMEModeChange: Keys;

Description

The IME Mode Change key.

eeee) ToString

[C#] public const Keys IMENonconvert;

[C++] public: const Keys IMENonconvert;

[VB] Public Const IMENonconvert As Keys

[JScript] public var IMENonconvert: Keys;

Description

The IME Nonconvert key.

ffff) ToString

[C#] public const Keys Insert;

[C++] public: const Keys Insert;

[VB] Public Const Insert As Keys

[JScript] public var Insert: Keys;

Description

The INS key.

gggg) ToString

[C#] public const Keys J;

[C++] public: const Keys J;

[VB] Public Const J As Keys

[JScript] public var J: Keys;

Description

The J key.

hhhh) ToString

[C#] public const Keys JunjaMode;

[C++] public: const Keys JunjaMode;

[VB] Public Const JunjaMode As Keys

[JScript] public var JunjaMode: Keys;

Description

The IME Junja mode key.

iiii) ToString

[C++] public const Keys K;

[C++] public: const Keys K;

[VB] Public Const K As Keys

[JScript] public var K: Keys;

Description

The K key.

jjjj) ToString

[C#] public const Keys KanaMode;

[C++] public: const Keys KanaMode;

[VB] Public Const KanaMode As Keys

[JScript] public var KanaMode: Keys;

Description

The IME Kana mode key.

kkkk) ToString

[C#] public const Keys KanjiMode;

[C++] public: const Keys KanjiMode;

[VB] Public Const KanjiMode As Keys

[JScript] public var KanjiMode: Keys;

Description

The IME Kanji mode key.

llll) ToString

[C#] public const Keys KeyCode;

[C++] public: const Keys KeyCode;

[VB] Public Const KeyCode As Keys

[JScript] public var KeyCode: Keys;

Description

The bitmask to extract a key code from a key value.

mmmm) ToString

[C#] public const Keys L;

[C++] public: const Keys L;

[VB] Public Const L As Keys

[JScript] public var L: Keys;

Description

The L key.

nnnn) ToString

[C#] public const Keys LaunchApplication1;

[C++] public: const Keys LaunchApplication1;

[VB] Public Const LaunchApplication1 As Keys

[JScript] public var LaunchApplication1: Keys;

Description

The Start Application one key (Windows 2000 or later).

oooo) ToString

[C#] public const Keys LaunchApplication2;

[C++] public: const Keys LaunchApplication2;

[VB] Public Const LaunchApplication2 As Keys

[JScript] public var LaunchApplication2: Keys;

Description

The Start Application two key (Windows 2000 or later).

pppp) ToString

[C#] public const Keys LaunchMail;

[C++] public: const Keys LaunchMail;

[VB] Public Const LaunchMail As Keys

[JScript] public var LaunchMail: Keys;

Description

The Launch Mail key (Windows 2000 or later).

qqqq) ToString

[C#] public const Keys LButton;

[C++] public: const Keys LButton;

[VB] Public Const LButton As Keys

[JScript] public var LButton: Keys;

Description

The left mouse button.

rrrr) ToString

[C#] public const Keys LControlKey;

[C++] public: const Keys LControlKey;

[VB] Public Const LControlKey As Keys

[JScript] public var LControlKey: Keys;

Description

The left CTRL key.

ssss) ToString

[C#] public const Keys Left;

[C++] public: const Keys Left;

[VB] Public Const Left As Keys

[JScript] public var Left: Keys;

Description

The LEFT ARROW key.

tttt) ToString

[C#] public const Keys LineFeed;

[C++] public: const Keys LineFeed;

[VB] Public Const LineFeed As Keys

[JScript] public var LineFeed: Keys;

Description

The LINEFEED key.
uuuu) ToString

[C#] public const Keys LMenu;

[C++] public: const Keys LMenu;

[VB] Public Const LMenu As Keys

[JScript] public var LMenu: Keys;

Description

The left ALT key.
vvvv) ToString

[C#] public const Keys LShiftKey;

[C++] public: const Keys LShiftKey;

[VB] Public Const LShiftKey As Keys

[JScript] public var LShiftKey: Keys;

Description

The left SHIFT key.
wwww) ToString

[C#] public const Keys LWin;

[C++] public: const Keys LWin;

[VB] Public Const LWin As Keys

[JScript] public var LWin: Keys;

Description

The left Windows logo key (Microsoft Natural Keyboard).
xxxx) ToString

[C#] public const Keys M;

[C++] public: const Keys M;

[VB] Public Const M As Keys

[JScript] public var M: Keys;

Description

The M key.
yyyy) ToString

[C#] public const Keys MButton;

[C++] public: const Keys MButton;

[VB] Public Const MButton As Keys

[JScript] public var MButton: Keys;

Description

The middle mouse button (three-button mouse).
zzzz) ToString

[C#] public const Keys MediaNextTrack;

[C++] public: const Keys MediaNextTrack;

[VB] Public Const MediaNextTrack As Keys

[JScript] public var MediaNextTrack: Keys;

Description

The Media Next Track key (Windows 2000 or later).
aaaaa) ToString

[C#] public const Keys MediaPlayPause;

[C++] public: const Keys MediaPlayPause;

[VB] Public Const MediaPlayPause As Keys

[JScript] public var MediaPlayPause: Keys;

Description

The Media Play Pause key (Windows 2000 or later).
bbbbb) ToString

[C#] public const Keys MediaPreviousTrack;

[C++] public: const Keys MediaPreviousTrack;

[VB] Public Const MediaPreviousTrack As Keys

[JScript] public var MediaPreviousTrack: Keys;

Description

The Media Previous Track key (Windows 2000 or later).
ccccc) ToString

[C#] public const Keys MediaStop;

[C++] public: const Keys MediaStop;

[VB] Public Const MediaStop As Keys

[JScript] public var MediaStop: Keys;

Description

The Media Stop key (Windows 2000 or later).
ddddd) ToString

[C#] public const Keys Menu;

[C++] public: const Keys Menu;

[VB] Public Const Menu As Keys

[JScript] public var Menu: Keys;

Description

The ALT key.
eeeee) ToString

[C#] public const Keys Modifiers;

[C++] public: const Keys Modifiers;

[VB] Public Const Modifiers As Keys

[JScript] public var Modifiers: Keys;

Description

The bitmask to extract modifiers from a key value.
fffff) ToString

[C#] public const Keys Multiply;

[C++] public: const Keys Multiply;

[VB] Public Const Multiply As Keys

[JScript] public var Multiply: Keys;

Description

The Multiply key.
ggggg) ToString

[C#] public const Keys N;

[C++] public: const Keys N;

[VB] Public Const N As Keys

[JScript] public var N: Keys;

Description

The N key.
hhhhh) ToString

[C#] public const Keys Next;

[C++] public: const Keys Next;

[VB] Public Const Next As Keys

[JScript] public var Next: Keys;

Description

The PAGE DOWN key.
iiiii) ToString

[C#] public const Keys NoName;

[C++] public: const Keys NoName;

[VB] Public Const NoName As Keys

[JScript] public var NoName: Keys;

Description

A constant reserved for future use.
jjjjj) ToString

[C#] public const Keys None;

[C++] public: const Keys None;

[VB] Public Const None As Keys

[JScript] public var None: Keys;

Description

No key pressed.
kkkkk) ToString

[C#] public const Keys NumLock;

[C++] public: const Keys NumLock;

[VB] Public Const NumLock As Keys

[JScript] public var NumLock: Keys;

Description

The NUM LOCK key.
lllll) ToString

[C#] public const Keys NumPad0;

[C++] public: const Keys NumPad0;

[VB] Public Const NumPad0 As Keys

[JScript] public var NumPad0: Keys;

Description

The 0 key on the numeric keypad.
mmmmm) ToString

[C#] public const Keys NumPad1;

[C++] public: const Keys NumPad1;

[VB] Public Const NumPad1 As Keys

[JScript] public var NumPad1: Keys;

Description

The 1 key on the numeric keypad.
nnnnn) ToString

[C#] public const Keys NumPad2;

[C++] public: const Keys NumPad2;

[VB] Public Const NumPad2 As Keys

[JScript] public var NumPad2 Keys;

Description

The 2 key on the numeric keypad.
ooooo) ToString

[C#] public const Keys NumPad3;

[C++] public: const Keys NumPad3;

[VB] Public Const NumPad3 As Keys

[JScript] public var NumPad3: Keys;

Description

The 3 key on the numeric keypad.
ppppp) ToString

[C#] public const Keys NumPad4;

[C++] public: const Keys NumPad4;

[VB] Public Const NumPad4 As Keys

[JScript] public var NumPad4: Keys;

Description

The 4 key on the numeric keypad.
qqqqq) ToString

[C#] public const Keys NumPad5;

[C++] public: const Keys NumPad5;

[VB] Public Const NumPad5 As Keys

[JScript] public var NumPad5: Keys;

Description

The 5 key on the numeric keypad.
rrrrr) ToString

[C#] public const Keys NumPad6;

[C++] public: const Keys NumPad6;

[VB] Public Const NumPad6 As Keys

[JScript] public var NumPad6: Keys;

Description

The 6 key on the numeric keypad.
sssss) ToString

[C#] public const Keys NumPad7;

[C++] public: const Keys NumPad7;

[VB] Public Const NumPad7 As Keys

[JScript] public var NumPad7: Keys;

Description

The 7 key on the numeric keypad.
ttttt) ToString

[C#] public const Keys NumPad8;

[C++] public: const Keys NumPad8;

[VB] Public Const NumPad8 As Keys

[JScript] public var NumPad8: Keys;

Description

The 8 key on the numeric keypad.
uuuuu) ToString

[C#] public const Keys NumPad9;

[C++] public: const Keys NumPad9;

[VB] Public Const NumPad9 As Keys

[JScript] public var NumPad9: Keys;

Description

The 9 key on the numeric keypad.

vvvvv) ToString

[C#] public const Keys O;

[C++] public: const Keys O;

[VB] Public Const O As Keys

[JScript] public var O: Keys;

Description

The O key.

wwwww) ToString

[C#] public const Keys Oem8;

[C++] public: const Keys Oem8;

[VB] Public Const Oem8 As Keys

[JScript] public var Oem8: Keys;

Description

OEM specific.

xxxxx) ToString

[C#] public const Keys OemBackslash;

[C++] public: const Keys OemBackslash;

[VB] Public Const OemBackslash As Keys

[JScript] public var OemBackslash: Keys;

Description

The OEM Angle bracket or Backslash key on the RT 102 key keyboard (Windows 2000 or later).

yyyyy) ToString

[C#] public const Keys OemClear;

[C++] public: const Keys OemClear;

[VB] Public Const OemClear As Keys

[JScript] public var OemClear: Keys;

Description

The CLEAR key.

zzzzz) ToString

[C#] public const Keys OemCloseBrackets;

[C++] public: const Keys OemCloseBrackets;

[VB] Public Const OemCloseBrackets As Keys

[JScript] public var OemCloseBrackets: Keys;

Description

The OEM Close Bracket key on a US standard keyboard (Windows 2000 or later).

aaaaaa) ToString

[C#] public const Keys Oemcomma;

[C++] public: const Keys Oemcomma;

[VB] Public Const Oemcomma As Keys

[JScript] public var Oemcomma: Keys;

Description

The OEM Comma key on any country/region keyboard (Windows 2000 or later).

bbbbbb) ToString

[C#] public const Keys OemMinus;

[C++] public: const Keys OemMinus;

[VB] Public Const OemMinus As Keys

[JScript] public var OemMinus: Keys;

Description

The OEM Minus key on any country/region keyboard (Windows 2000 or later).

ccccc) ToString

[C#] public const Keys OemOpenBrackets;

[C++] public: const Keys OemOpenBrackets;

[VB] Public Const OemOpenBrackets As Keys

[JScript] public var OemOpenBrackets Keys;

Description

The OEM OpenBracket key on a US standard keyboard (Windows 2000 or later).

dddddd) ToString

[C#] public const Keys OemPeriod;

[C++] public: const Keys OemPeriod;

[VB] Public Const OemPeriod As Keys

[JScript] public var OemPeriod Keys;

Description

The OEM Period key on any country/region keyboard (Windows 2000 or later).

eeeeee) ToString

[C#] public const Keys OemPipe;

[C++] public: const Keys OemPipe;

[VB] Public Const OemPipe As Keys

[JScript] public var OemPipe: Keys;

Description

The OEM Pipe key on a US standard keyboard (Windows 2000 or later).

ffffff) ToString

[C#] public const Keys Oemplus;

[C++] public: const Keys Oemplus;

[VB] Public Const Oemplus As Keys

[JScript] public var Oemplus: Keys;

Description

The OEM Plus key on any country/region keyboard (Windows 2000 or later).

gggggg) ToString

[C#] public const Keys OemQuestion;

[C++] public: const Keys OemQuestion;

[VB] Public Const OemQuestion As Keys

[JScript] public var OemQuestion: Keys;

Description

The OEM Question Mark key on a US standard keyboard (Windows 2000 or later).

hhhhhh) ToString

[C#] public const Keys OemQuotes;

[C++] public: const Keys OemQuotes;

[VB] Public Const OemQuotes As Keys

[JScript] public var OemQuotes Keys;

Description

The OEM Singled/Double quote key on a US standard keyboard (Windows 2000 or later).

iiiiii) ToString

[C#] public const Keys OemSemicolon;

[C++] public: const Keys OemSemicolon;

[VB] Public Const OemSemicolon As Keys

[JScript] public var OemSemicolon: Keys;

Description

The OEM Semicolon key on a US standard keyboard (Windows 2000 or later).

jjjjjj) ToString

[C#] public const Keys Oemtilde;

[C++] public: const Keys Oemtilde;

[VB] Public Const Oemtilde As Keys

[JScript] public var Oemtilde: Keys;

Description

The OEM tilde key on a US standard keyboard (Windows 2000 or later).

kkkkkk) ToString

[C#] public const Keys P;

[C++] public: const Keys P;

[VB] Public Const P As Keys

[JScript] public var P: Keys;

Description

The P key.

llllll) ToString

[C#] public const Keys Pa1;

[C++] public: const Keys Pa1;

[VB] Public Const Pa1 As Keys

[JScript] public var Pa1: Keys;

Description

The PA1 key.

mmmmmm) ToString

[C#] public const Keys PageDown;

[C++] public: const Keys PageDown;

[VB] Public Const PageDown As Keys

[JScript] public var PageDown: Keys;

Description

The PAGE DOWN key.

nnnnnn) ToString

[C#] public const Keys PageUp;

[C++] public: const Keys PageUp;

[VB] Public Const PageUp As Keys

[JScript] public var PageUp: Keys;

Description

The PAGE UP key.

oooooo) ToString

[C#] public const Keys Pause;

[C++] public: const Keys Pause;

[VB] Public Const Pause As Keys

[JScript] public var Pause: Keys;

Description

The PAUSE key.

pppppp) ToString

[C#] public const Keys Play;

[C++] public: const Keys Play;

[VB] Public Const Play As Keys

[JScript] public var Play: Keys;

Description

The PLAY key.

qqqqqq) ToString

[C#] public const Keys Print;

[C++] public: const Keys Print;

[VB] Public Const Print As Keys

[JScript] public var Print: Keys;

Description

The PRINT key.

rrrrrr) ToString

[C#] public const Keys PrintScreen;

[C++] public: const Keys PrintScreen;

[VB] Public Const PrintScreen As Keys

[JScript] public var PrintScreen: Keys;

Description

The PRINT SCREEN key.

ssssss) ToString

[C#] public const Keys Prior;

[C++] public: const Keys Prior;

[VB] Public Const Prior As Keys

[JScript] public var Prior: Keys;

Description

The PAGE UP key.

tttttt) ToString

[C#] public const Keys ProcessKey;

[C++] public: const Keys ProcessKey;

[VB] Public Const ProcessKey As Keys

[JScript] public var ProcessKey: Keys;

Description

The PROCESS KEY key.
uuuuuu) ToString

[C#] public const Keys Q;

[C++] public: const Keys Q;

[VB] Public Const Q As Keys

[JScript] public var Q: Keys;

Description

The Q key.
vvvvvv) ToString

[C#] public const Keys R;

[C++] public: const Keys R;

[VB] Public Const R As Keys

[JScript] public var R: Keys;

Description

The R key.
wwwwww) ToString

[C#] public const Keys RButton;

[C++] public: const Keys RButton;

[VB] Public Const RButton As Keys

[JScript] public var RButton: Keys;

Description

The right mouse button.
xxxxxx) ToString

[C#] public const Keys RControlKey;

[C++] public: const Keys RControlKey;

[VB] Public Const RControlKey As Keys

[JScript] public var RControlKey: Keys;

Description

The right CTRL key.
yyyyyy) ToString

[C#] public const Keys Return;

[C++] public: const Keys Return;

[VB] Public Const Return As Keys

[JScript] public var Return: Keys;

Description

The RETURN key.
zzzzzz) ToString

[C#] public const Keys Right;

[C++] public: const Keys Right;

[VB] Public Const Right As Keys

[JScript] public var Right: Keys;

Description

The RIGHT ARROW key.
aaaaaaa) ToString

[C#] public const Keys RMenu;

[C++] public: const Keys RMenu;

[VB] Public Const RMenu As Keys

[JScript] public var RMenu: Keys;

Description

The right ALT key.
bbbbbbb) ToString

[C#] public const Keys RShiftKey;

[C++] public: const Keys RShiftKey;

[VB] Public Const RShiftKey As Keys

[JScript] public var RShiftKey: Keys;

Description

The right SHIFT key.
ccccccc) ToString

[C#] public const Keys RWin;

[C++] public: const Keys RWin;

[VB] Public Const RWin As Keys

[JScript] public var RWin Keys;

Description

The right Windows logo key (Microsoft Natural Keyboard).
ddddddd) ToString

[C#] public const Keys S;

[C++] public: const Keys S;

[VB] Public Const S As Keys

[JScript] public var S: Keys;

Description

The S key.
eeeeeee) ToString

[C#] public const Keys Scroll;

[C++] public: const Keys Scroll;

[VB] Public Const Scroll As Keys

[JScript] public var Scroll: Keys;

Description

The SCROLL LOCK key.
ffffff) ToString

[C#] public const Keys Select;

[C++] public: const Keys Select;

[VB] Public Const Select As Keys

[JScript] public var Select: Keys;

Description

The SELECT key.
ggggggg) ToString

[C+#] public const Keys SelectMedia;

[C++] public: const Keys SelectMedia;

[VB] Public Const SelectMedia As Keys

[JScript] public var SelectMedia: Keys;

Description

The Select Media key (Windows 2000 or later).
hhhhhhh) ToString

[C++] public const Keys Separator;

[C++] public: const Keys Separator;

[VB] Public Const Separator As Keys

[JScript] public var Separator: Keys;

Description

The Separator key.

iiiiii) ToString

[C#] public const Keys Shift;

[C++] public: const Keys Shift;

[VB] Public Const Shift As Keys

[JScript] public var Shift: Keys;

Description

The SHIFT modifier key.

jjjjjj) ToString

[C#] public const Keys ShiftKey;

[C++] public: const Keys ShiftKey;

[VB] Public Const ShiftKey As Keys

[JScript] public var ShiftKey: Keys;

Description

The SHIFT key.

kkkkkkk) ToString

[C#] public const Keys Snapshot;

[C++] public: const Keys Snapshot;

[VB] Public Const Snapshot As Keys

[JScript] public var Snapshot Keys;

Description

The PRINT SCREEN key.

lllllll) ToString

[C#] public const Keys Space;

[C++] public: const Keys Space;

[VB] Public Const Space As Keys

[JScript] public var Space: Keys;

Description

The SPACEBAR key.

mmmmmmm) ToString

[C#] public const Keys Subtract;

[C++] public: const Keys Subtract;

[VB] Public Const Subtract As Keys

[JScript] public var Subtract: Keys;

Description

The Subtract key.

nnnnnnn) ToString

[C#] public const Keys T;

[C++] public: const Keys T;

[VB] Public Const T As Keys

[JScript] public var T: Keys;

Description

The T key.

ooooooo) ToString

[C#] public const Keys Tab;

[C++] public: const Keys Tab;

[VB] Public Const Tab As Keys

[JScript] public var Tab: Keys;

Description

The TAB key.

ppppppp) ToString

[C#] public const Keys U;

[C++] public: const Keys U;

[VB] Public Const U As Keys

[JScript] public var U: Keys;

Description

The U key.

qqqqqqq) ToString

[C#] public const Keys Up;

[C++] public: const Keys Up;

[VB] Public Const Up As Keys

[JScript] public var Up: Keys;

Description

The UP ARROW key.

rrrrrrr) ToString

[C#] public const Keys V;

[C++] public: const Keys V;

[VB] Public Const V As Keys

[JScript] public var V: Keys;

Description

The V key.

sssssss) ToString

[C#] public const Keys VolumeDown;

[C++] public: const Keys VolumeDown;

[VB] Public Const VolumeDown As Keys

[JScript] public var VolumeDown: Keys;

Description

The Volume Down key (Windows 2000 or later).

ttttttt) ToString

[C#] public const Keys VolumeMute;

[C++] public: const Keys VolumeMute;

[VB] Public Const VolumeMute As Keys

[JScript] public var VolumeMute: Keys;

Description

The Volume Mute key (Windows 2000 or later).

uuuuuuu) ToString

[C#] public const Keys VolumeUp;

[C++] public: const Keys VolumeUp;

[VB] Public Const VolumeUp As Keys

[JScript] public var VolumeUp: Keys;

Description

The Volume Up key (Windows 2000 or later).

vvvvvvv) ToString

[C#] public const Keys W;

[C++] public: const Keys W;

[VB] Public Const W As Keys

[JScript] public var W: Keys;

Description

The W key.

wwwwwww) ToString

[C#] public const Keys X;

[C++] public: const Keys X;

[VB] Public Const X As Keys

[JScript] public var X: Keys;

Description

The X key.

xxxxxxx) ToString

[C+] public const Keys XButton1;

[C++] public: const Keys XButton1;

[VB] Public Const XButton1 As Keys

[JScript] public var XButton1: Keys;

Description

The first x mouse button (five-button mouse).

yyyyyyy) ToString

[C#] public const Keys XButton2;

[C++] public: const Keys XButton2;

[VB] Public Const XButton2 As Keys

[JScript] public var XButton2: Keys;

Description

The second x mouse button (five-button mouse).

zzzzzzz) ToString

[C#] public const Keys Y;

[C++] public: const Keys Y;

[VB] Public Const Y As Keys

[JScript] public var Y: Keys;

Description

The Y key.

aaaaaaaa) ToString

[C#] public const Keys Z;

[C++] public: const Keys Z;

[VB] Public Const Z As Keys

[JScript] public var Z: Keys;

Description

The Z key.

bbbbbbbb) ToString

[C#] public const Keys Zoom;

[C++] public: const Keys Zoom;

[VB] Public Const Zoom As Keys

[JScript] public var Zoom: Keys;

Description

The ZOOM key.

KeysConverter class (System.Windows.Forms)

a) ToString

Description

Provides a System.ComponentModel.TypeConverter to convert System.Windows.Forms.Keys objects to and from other representations.

b) KeysConverter

Example Syntax:

c) ToString

[C#] public KeysConverter( );

[C++] public: KeysConverter( );

[VB] Public Sub New( )

[JScript] public function KeysConverter( );

d) CanConvertFrom

[C#] public override bool CanConvertFrom(ITypeDescriptorContext context, Type sourceType);

[C++] public: bool CanConvertFrom(ITypeDescriptorContext* context, Type* sourceType);

[VB] Overrides Public Function CanConvertFrom(ByVal context As ITypeDescriptorContext, ByVal sourceType As Type) As Boolean

[JScript] public override function CanConvertFrom(context ITypeDescriptorContext, sourceType: Type): Boolean; Geta a value indicating whether this converter can convert an object in the Specified source type to the native type of the converter.

Description

Gets a value indicating whether this converter can convert an object in the specified source type to the native type of the converter using the specified context.

Return Value: true if this object can perform the conversion; otherwise, false.

Override this method to provide your own conversion requirements. An ITypeDescriptorContext that provides a format context, which can be used to extract additional information about the environment this converter is being invoked from. This parameter or properties of this parameter can be null. The type to convert from.

e) Compare

[C#] public int Compare(object a, object b);

[C++] public: _sealed int Compare(Object* a, Object* b);

[VB] NotOverridable Public Function Compare(ByVal a As Object, ByVal b As Object) As Integer

[JScript] public function Compare(a: Object, b: Object): int;

Description

Compares two key values for equivalence.

Return Value: An integer indicating the relationship between the to comparands.

This method uses System.String.Compare(System.String, System.String) to compare the two objects. An System.Object that represents the first key to compare. An System.Object that represents the second key to compare.

f) ConvertFrom

[C#] public override object ConvertFrom(ITypeDescriptorContext context, CultureInfo culture, object value);

[C++] public: Object* ConvertFrom(ITypeDescriptorContext* context, CultureInfo* culture, Object* value);

[VB] Overrides Public Function ConvertFrom(ByVal context As ITypeDescriptorContext, ByVal culture As CultureInfo, ByVal value As Object) As Object

[JScript] public override function ConvertFrom(context: IType DescriptorContext, culture: CultureInfo, value: Object): Object; Converts the specified object to the native type of the converter.

Description

Converts the specified object to the converter's native type.

Return Value: An Object that represents the converted value.

The context parameter can be used to extract additional information about the environment this converter is being invoked from. This may be null, so you should always check. Also, properties on the context object may also return null. An ITypeDescriptorContext that provides a format context, which can be used to extract additional information about the environment this converter is being invoked from. This parameter or properties of this parameter can be null. A CultureInfo object to provide locale information. The object to convert.

g) ConvertTo

[C#] public override object ConvertTo(ITypeDescriptorContext context, CultureInfo culture, object value, Type destinationType);

[C++] public: Object* ConvertTo(ITypeDescriptorContext* context, CultureInfo* culture, Object* value, Type* destinationType);

[VB] Overrides Public Function ConvertTo(ByVal context As ITypeDescriptorContext, ByVal culture As CultureInfo, ByVal value As Object, ByVal destinationType As Type) As Object

[JScript] public override function ConvertTo(context: ITypeDescriptorContext, culture: CultureInfo, value: Object, destinationType: Type): Object; Converts the Specified object object to the specified destination type.

Description

Converts the specified object to the specified destination type.

Return Value: An Object that represents the converted value.

Override this method to provide your own coversion requirements. An ITypeDescriptorContext that provides a format context, which can be used to extract additional information about the environment this converter is being invoked from. This parameter or properties of this parameter can be null. A CultureInfo object to provide locale information. The object to convert. The type to convert the object to.

h) GetStandardValues

[C#] public override StandardValuesCollection GetStandardValues(ITypeDescriptorContext context);

[C++] public: StandardValuesCollection* GetStandardValues(ITypeDescriptorContext* context);

[VB] Overrides Public Function GetStandardValues(ByVal context As ITypeDescriptorContext) As StandardValuesCollection

[JScript] public override function GetStandardValues(context: ITypeDescriptorContext): StandardValuesCollection; Returns a collection of standard values for the data type that this type converter is designed for.

Description

Returns a collection of standard values for the data type that this type converter is designed for when provided with a format context.

Return Value: A StandardValuesCollection that holds a standard set of valid values, or null if the data type does not support a standard set of values.

The collection returned contains the values of the keys that can be converted. An ITypeDescriptorContext that provides a format context, which can be used to extract additional information about the environment this converter is being invoked from. This parameter or properties of this parameter can be null.

i) GetStandardValuesExclusive

[C#] public override bool GetStandardValuesExclusive (IType DescriptorContext context);

[C++] public: bool GetStandardValuesExclusive(ITypeDescriptorContext* context);

[VB] Overrides Public Function GetStandardValuesExclusive(ByVal context As ITypeDescriptorContext) As Boolean

[JScript] public override function GetStandardValuesExclusive(context ITypeDescriptorContext) Boolean;

Description

Determines if the list of standard values returned from GetStandardValues is an exclusive list. If the list is exclusive, then no other values are valid, such as in an enum data type. If the list is not exclusive, then there are other valid values besides the list of standard values GetStandardValues provides.

Return Value: True if the collection returned from GetStandardValues is an exhaustive list of possible values, or false if other values are possible. The default for this method always returns false; Determines if the list of standard values returned from GetStandardValues is an exclusive list. If the list is exclusive, then no other values are valid, such as in an enum data type. If the list is not exclusive, then there are other valid values besides the list of standard values GetStandardValues provides. A formatter context. This object can be used to extract additional information about the environment this converter is being invoked from. This may be null, so you should always check. Also, properties on the context object may also return null.

j) GetStandardValuesSupported

[C#] public override bool GetStandardValuesSupported (IType DescriptorContext context);

[C++] public: bool GetStandardValuesSupported(ITypeDescriptorContext* context);

[VB] Overrides Public Function GetStandardValuesSupported(ByVal context As ITypeDescriptorContext) As Boolean

[JScript] public override function GetStandardValuesSupported(context ITypeDescriptorContext) Boolean; Gets a value indicating whether this object supports a standard set of values that can be picked from a list.

Description

Gets a value indicating whether this object supports a standard set of values that can be picked from a list.

Return Value: Always returns true. An ITypeDescriptorContext that provides a format context, which can be used to extract additional information about the environment this converter is being invoked from. This parameter or properties of this parameter can be null.

Label class (System.Windows.Forms)

a) ToString

Description

Represents a standard Windows label.

System.Windows.Forms.Label controls are typically used to provide descriptive text for a control. For example, you can use a System.Windows.Forms.Label to add descriptive text for a System.Windows.Forms.TextBox control to inform the user about the type of data expected in the control.

b) Label

Example Syntax:

c) ToString

[C#] public Label( );

[C++] public: Label( );

[VB] Public Sub New( )

[JScript] public function Label( );

Description

Initializes a new instance of the System.Windows.Forms.Label class.

By default, a label is displayed with its System.Windows.Forms.Label.AutoSize property set to false and with its System.Windows.Forms.Label.BorderStyle property set to BorderStyle.None.

d) AccessibilityObject e) AccessibleDefaultActionDescription f) AccessibleDescription g) AccessibleName h) AccessibleRole i) AllowDrop j) Anchor k) AutoSize l) ToString Description Gets or sets a value indicating whether the control is automatically resized to display its entire contents.

When this property is set to true the control's height and width are automatically adjusted to display the entire contents of the control. This property is typically set to true when you use a System.Windows.Forms.Label control to display various lengths of text, such as the status of an application process. You can also use this property when the application will display text in various languages, and the size of the text may increase or decrease based on the language settings in Windows.

m) BackColor n) BackgroundImage o) ToString

Description

Gets or sets the image rendered on the background of the control.

p) BindingContext q) BorderStyle r) ToString

Description

Gets or sets the border style for the control.

You can use this property to add a border to the control. This property is typically used to differentiate a System.Windows.Forms.Label that labels another control from a System.Windows.Forms.Label that displays the status of a process in an application.

s) Bottom t) Bounds u) CanFocus v) CanSelect w) Capture x) CausesValidation y) ClientRectangle z) ClientSize aa) CompanyName bb) Container cc) ContainsFocus dd) ContextMenu ee) Controls ff) Created gg) CreateParams hh) ToString Description Overrides Control. A Label is a Win32 STATIC control, which we setup here.

ii) Cursor jj) DataBindings kk) DefaultImeMode ll) ToString

Description

Gets the default Input Method Editor(IME) mode supported by this control.

mm) DefaultSize nn) ToString

[C#] protected override Size DefaultSize {get;}

[C++] protected: property virtual Size get_DefaultSize( );

[VB] Overrides Protected ReadOnly Property DefaultSize As Size

[JScript] protected function get DefaultSize( ): Size;

Description

Deriving classes can override this to configure a default size for their control. This is more efficient than setting the size in the control's constructor.

oo) DesignMode pp) DisplayRectangle qq) Disposing rr) Dock ss) Enabled tt) Events uu) FlatStyle vv) ToString Description Gets or sets the flat style appearance of the label control.

This property has no effect in the derived class, System.Windows.Forms.LinkLabel.

ww) Focused xx) Font yy) FontHeight zz) ForeColor aaa) Handle bbb) HasChildren ccc) Height ddd) Image eee) ToString Description Gets or sets the image that is displayed on a System.Windows.Forms.Label.

The System.Windows.Forms.Label.Image property cannot be used at the same time as the System.Windows.Forms.Label.ImageList and System.Windows.Forms.Label.ImageIndex properties. When the System.Windows.Forms.Label.Image property is used to display an image, the System.Windows.Forms.Label.ImageList and System.Windows.Forms.Label.ImageIndex properties are automatically set to their default settings.

fff) ImageAlign ggg) ToString

[C#] public ContentAlignment ImageAlign {get; set;}

[C++] public: _property ContentAlignment get_ImageAlign( ); public: _property void set_ImageAlign(ContentAlignment);

[VB] Public Property ImageAlign As ContentAlignment

[JScript] public function get ImageAlign( ): ContentAlignment; public function set ImageAlign(ContentAlignment);

Description

Gets or sets the alignment of an image that is displayed in the control.

This property enables you to align an image within the boundaries of the System.Windows.Forms.Label control to ensure that the image is properly displayed. You can add an image to a System.Windows.Forms.Label using the System.Windows.Forms.Label.Image property or the System.Windows.Forms.Label.ImageList and System.Windows.Forms.Label.ImageIndex properties. Images displayed in the control cannot be stretched or shrunk to fill the control if the control is larger or smaller than the image.

hhh) ImageIndex iii) ToString

[C#] public int ImageIndex {get; set;}

[C++] public: _property int get ImageIndex( ); public: _property void set_ImageIndex(int);

[VB] Public Property ImageIndex As Integer

[JScript] public function get ImageIndex( ): int; public function set ImageIndex(int);

Description

Gets or sets the index value of the image displayed on the System.Windows.Forms.Label.

The System.Windows.Forms.Label.ImageIndex and the System.Windows.Forms.Label.ImageList properties cannot be used at the same time as the System.Windows.Forms.Label.Image property. When the System.Windows.Forms.Label.ImageIndex property and System.Windows.Forms.Label.ImageList properties are used to display an image, the System.Windows.Forms.Label.Image property is automatically set to null.

jjj) ImageList kkk) ToString

[C#] public ImageList ImageList {get; set;}

[C++] public: _property ImageList* get_ImageList( ); public: _property void set_ImageList(ImageList*);

[VB] Public Property ImageList As ImageList

[JScript] public function get ImageList( ): ImageList; public function set ImageList(ImageList);

Description

Gets or sets the System.Windows.Forms.ImageList that contains the images to display in the System.Windows.Forms.Label control.

The System.Windows.Forms.Label.ImageIndex and the System.Windows.Forms.Label.ImageList properties cannot be used at the same time as the System.Windows.Forms.Label.Image property. When the System.Windows.Forms.Label.ImageIndex property and System.Windows.Forms.Label.ImageList properties are used to display an image, the System.Windows.Forms.Label.Image property is set to null.

lll) ImeMode mmm) ToString

[C#] public new ImeMode ImeMode {get; set;}

[C++] public: _property ImeMode get_ImeMode( ); public: _property void set_ImeMode(ImeMode);

[VB] Public Property ImeMode As ImeMode

[JScript] public function get ImeMode( ): ImeMode; public function set ImeMode(ImeMode);

Description

Gets or sets the Input Method Editor(IME) mode supported by this control.

nnn) InvokeRequired ooo) IsAccessible ppp) IsDisposed qqq) IsHandleCreated rrr) Left sss) Location ttt) Name uuu) Parent vvv) PreferredHeight www) ToString Description Gets the preferred height of the control.

This property returns the height that the control should be in order to properly display text, based on the font assigned to the control. You can use this property along with the System.Windows.Forms.Label.PreferredWidth property to ensure that the text in the System.Windows.Forms.Label control is displayed properly. You can use the System.Windows.Forms.Label.AutoSize property to automatically adjust the height and the width of the System.Windows.Forms.Label control, based on the text and font size.

xxx) PreferredWidth yyy) ToString

[C#] public virtual int PreferredWidth {get;}

[C++] public: _property virtual int get_PreferredWidth( );

[VB] Overridable Public ReadOnly Property PreferredWidth As Integer

[JScript] public function get PreferredWidth( ): int;

Description

Gets the preferred width of the control.

This property returns the length of the text string, but does not take line wrapping into consideration. For example, a text string that measures 300 pixels wide could be displayed as three lines in a System.Windows.Forms.Label that is only 100 pixels wide. The System.Windows.Forms.Label.PreferredWidth property still returns 300 pixels. You can use this property, along with the System.Windows.Forms.Label.PreferredHeight property, to ensure that the text in the System.Windows.Forms.Label control is displayed properly. You can use the System.Windows.Forms.Label.AutoSize property to automatically adjust the height and the width of the System.Windows.Forms.Label control based on the text and font size.

zzz) ProductName aaaa) ProductVersion bbbb) RecreatingHandle cccc) Region dddd) RenderRightToLeft eeee) RenderTransparent ffff) ToString Description Indicates whether the container control background is rendered on the System.Windows.Forms.Label.

gggg) ResizeRedraw hhhh) Right iiii) RightToLeft jjjj) ShowFocusCues kkkk) ShowKeyboardCues llll) Site mmmm) Size nnnn) TabIndex oooo) TabStop pppp) ToString Description Gets or sets a value indicating whether the user can tab to the System.Windows.Forms.Label.

qqqq) Tag rrrr) Text ssss) TextAlign tttt) ToString

Description

Gets or sets the alignment of text in the control.

You can use this property to align the text within a System.Windows.Forms.Label to match the layout of text and control on your form. For example, if your controls are all located near the right edge of the form, you can set the System.Windows.Forms.Label.TextAlign property to ContentAlignment.Right and the text will be aligned with the right edge of the control to align with your controls.

uuuu) Top vvvv) TopLevelControl wwww) UseMnemonic xxxx) ToString

Description

Gets or sets a value indicating whether the control interprets an ampersand character (&) in the control's System.Windows.Forms.Control.Text property to be an access key prefix character.

If the System.Windows.Forms.Label.UseMnemonic property is set to true and a mnemonic character (a character preceded by the ampersand) is defined in the System.Windows.Forms.Control.Text property of the System.Windows.Forms.Label, pressing ALT+ the mnemonic character sets the focus to the control that follows the System.Windows.Forms.Label in the tab order. You can use this property to provide proper keyboard navigation to the controls on your form.

yyyy) Visible zzzz) Width aaaaa) WindowTarget bbbbb) ToString

Description

Occurs when the value of the System.Windows.Forms.Label.AutoSize property has changed.

For more information about handling events, see.

ccccc) ToString ddddd) ToString eeeee) ToString fffff) ToString

Description

Occurs when the value of the System.Windows.Forms.Label.TextAlign property has changed.

For more information about handling events, see.

ggggg) CalcImageRenderBounds

[C#] protected Rectangle CalcImageRenderBounds(Image image, Rectangle r, ContentAlignment align);

[C++] protected: Rectangle CalcImageRenderBounds(Image* image, Rectangle r, ContentAlignment align);

[VB] Protected Function CalcImageRenderBounds(ByVal image As Image, ByVal r As Rectangle, ByVal align As ContentAlignment) As Rectangle

[JScript] protected function CalcImageRenderBounds(image: Image, r: Rectangle, align: ContentAlignment) Rectangle;

Description

Determines the size and location of an image drawn within the System.Windows.Forms.Label control based on the alignment of the control.

Return Value: A System.Drawing.Rectangle that represents the size and location of the specified image within the control.

You can use this method within a derived class of System.Windows.Forms.Label, to determine the size and location of an image to draw within the System.Windows.Forms.Label control based on its location within the control. The location of the image is based on the value of the control's System- .Windows.Forms.Label.ImageAlign property. The System.Drawing.Image used to determine size and location when drawn within the control. A System.Drawing.Rectangle that represents the area to draw the image in. The alignment of content within the control.

hhhhh) CreateAccessibilityInstance

[C#] protected override AccessibleObject CreateAccessibilityInstance( );

[C++] protected: AccessibleObject* CreateAccessibilityInstance( );

[VB] Overrides Protected Function CreateAccessibilityInstance( ) As AccessibleObject

[JScript] protected override function CreateAccessibilityInstance( ): AccessibleObject;

Description iiiii) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

jjjjj) DrawImage

[C#] protected void DrawImage(Graphics g, Image image, Rectangle r, ContentAlignment align);

[C++] protected: void DrawImage(Graphics* g, Image* image, Rectangle r, ContentAlignment align);

[VB] Protected Sub DrawImage(ByVal g As Graphics, ByVal image As Image, ByVal r As Rectangle, ByVal align As ContentAlignment)

[JScript] protected function DrawImage(g: Graphics, image: Image, r: Rectangle, align ContentAlignment);

Description

Draws an System.Drawing.Image within the specified bounds.

When you are creating your own control that derives from System.Windows.Forms.Label, you can use this method to draw images onto the surface of the control. The System.Drawing.Graphics surface on which to draw. The System.Drawing.Image to draw. The System.Drawing.Rectangle bounds to draw within. The alignment of the image to draw within the System.Windows.Forms.Label.

kkkkk) OnAutoSizeChanged

[C#] protected virtual void OnAutoSizeChanged(EventArgs e);

[C++] protected: virtual void OnAutoSizeChanged(Event Args* e);

[VB] Overridable Protected Sub OnAutoSizeChanged(ByVal e As EventArgs)

[JScript] protected function OnAutoSizeChanged(e: Event Args);

Description

Raises the System.Windows.Forms.Label.AutoSizeChanged event.

Raising an event invokes the event handler through a delegate. For more information, see. A System.EventArgs that contains the event data.

lllll) OnEnabledChanged

[C+] protected override void OnEnabledChanged(EventArgs e);

[C++] protected: void OnEnabledChanged(EventArgs* e);

[VB] Overrides Protected Sub OnEnabledChanged(ByVal e As EventArgs)

[JScript] protected override function OnEnabledChanged(e: EventArgs);

mmmmm) OnFontChanged

[C#] protected override void OnFontChanged(EventArgs e);

[C++] protected: void OnFontChanged(EventArgs* e);

[VB] Overrides Protected Sub OnFontChanged(ByVal e As EventArgs)

[JScript] protected override function OnFontChanged(e: EventArgs);

nnnnn) OnPaint

[C#] protected override void OnPaint(PaintEventArgs e);

[C++] protected: void OnPaint(PaintEventArgs* e);

[VB] Overrides Protected Sub OnPaint(ByVal e As PaintEventArgs)

[JScript] protected override function OnPaint(e: PaintEvent Args);

Description ooooo) OnParentChanged

[C#] protected override void OnParentChanged(EventArgs e);

[C++] protected: void OnParentChanged(EventArgs* e);

[VB] Overrides Protected Sub OnParentChanged(ByVal e As EventArgs)

[JScript] protected override function OnParentChanged(e: EventArgs);

ppppp) OnTextAlignChanged

[C#] protected virtual void OnTextAlignChanged(EventArgs e);

[C++] protected: virtual void OnTextAlignChanged(Event Args* e);

[VB] Overridable Protected Sub OnTextAlignChanged(ByVal e As EventArgs)

[JScript] protected function OnTextAlignChanged(e: EventArgs);

Description

Raises the System.Windows.Forms.Label.Text AlignChanged event.

Raising an event invokes the event handler through a delegate. For more information, see. An System.EventArgs that contains the event data.

qqqqq) On TextChanged

[C#] protected override void OnTextChanged(EventArgs e);

[C++] protected: void OnTextChanged(EventArgs* e);

[VB] Overrides Protected Sub OnTextChanged(ByVal e As EventArgs)

[JScript] protected override function OnTextChanged(e: EventArgs);

rrrrr) OnVisibleChanged

[C#] protected override void OnVisibleChanged(EventArgs e);

[C++] protected: void OnVisibleChanged(EventArgs* e);

[VB] Overrides Protected Sub OnVisibleChanged(ByVal e As EventArgs)

[JScript] protected override function OnVisibleChanged(e: EventArgs);

sssss) ProcessMnemonic

[C#] protected override bool ProcessMnemonic(char charCode);

[C++] protected: bool ProcessMnemonic(_wchar_t charCode);

[VB] Overrides Protected Function ProcessMnemonic(ByVal charCode As Char) As Boolean

[JScript] protected override function ProcessMnemonic(char Code: Char): Boolean;

Description

Overrides Control. This is called when the user has pressed an Alt-CHAR key combination and determines if that combination is an interesting mnemonic for this control.

ttttt) SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As BoundsSpecified)

[JScript] protected override function SetBoundsCore(x: int, y: int, width: int, height: int, specified: BoundsSpecified);

Description

Overrides Control.setBoundsCore to enforce autoSize.

uuuuu) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

vvvvv) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

Overrides Control. This processes certain messages that the Win32 STATIC class would normally override. The message to process.

LabelEditEventArgs class (System.Windows.Forms)

a) WndProc

Description

Provides data for the System.Windows.Forms.ListView.LabelEdit event.

A System.Windows.Forms.LabelEditEventArgs specifies the index and caption of a System.Windows.Forms.ListViewItem and the caption after it has been edited by the user. This class also provides the System.Windows.Forms.LabelEditEventArgs.CancelEdit property, which enables code in an event handler for the System.Windows.Forms.ListView.LabelEdit event to cancel the changes made to the label by the user.

b) LabelEditEventArgs

Example Syntax:

c) WndProc

[C#] public LabelEditEventArgs(int item);

[C++] public: LabelEditEventArgs(int item);

[VB] Public Sub New(ByVal item As Integer)

[JScript] public function LabelEditEventArgs(item: int); Initializes a new instance of the System.Windows.Forms.LabelEditEventArgs class.

Description

Initializes a new instance of the System.Windows.Forms.LabelEditEventArgs class with the specified index to the System.Windows.Forms.ListViewItem to edit.

You can use this constructor when raising the System.Windows.Forms.ListView.LabelEdit event at run time to specify a specific list item in the System.Windows.Forms.ListView to edit. The zero-based index of the System.Windows.Forms.ListViewItem, containing the label to edit.

d) LabelEditEventArgs

Example Syntax:

e) WndProc

[C#] public LabelEditEventArgs(int item, string label);

[C++] public: LabelEditEventArgs(int item, String* label);

[VB] Public Sub New(ByVal item As Integer, ByVal label As String)

[JScript] public function LabelEditEventArgs(item: int, label: String);

Description

Initializes a new instance of the System.Windows.Forms.LabelEditEventArgs class with the specified index to the System.Windows.Forms.ListViewItem being edited and the new text for the label of the System.Windows.Forms.ListViewItem.

You can use this constructor when raising the System.Windows.Forms.ListView.LabelEdit event at run time to specify a list item in the System.Windows.Forms.ListView to edit. The constructor also enables you to specify the new text associated with the label of the System.Windows.Forms.ListViewItem. The zero-based index of the System.Windows- .Forms.ListViewItem, containing the label to edit. The new text assigned to the label of the System.Windows.Forms.ListViewItem.

f) CancelEdit g) WndProc

[C#] public bool CancelEdit {get; set;}

[C++] public: _property bool get_CancelEdit( ); public: _property void set_CancelEdit(bool);

[VB] Public Property CancelEdit As Boolean

[JScript] public function get CancelEdit( ): Boolean; public function set CancelEdit(Boolean);

Description

Gets or sets a value indicating whether changes made to the label of the System.Windows.Forms.ListViewItem should be canceled.

You can use this property to cancel changes made to the label of a System.Windows.Forms.ListViewItem and revert it to its original text. Use this property to prevent an item's caption from being changed to a value that does not meet your application's requirements.

h) Item i) WndProc

[C#] public int Item {get;}

[C++] public: _property int get_Item( );

[VB] Public ReadOnly Property Item As Integer

[JScript] public function get Item( ): Mt;

Description

Gets the zero-based index of the System.Windows.Forms.ListViewItem containing the label to edit.

j) Label k) WndProc

[C#] public string Label {get;}

[C++] public: _property String* get_Label( );

[VB] Public ReadOnly Property Label As String

[JScript] public function get Label( ): String;

Description

Gets the new text assigned to the label of the System.Windows.Forms.ListViewItem.

LabelEditEventHandler delegate (System.Windows.Forms)

a) ToString

Description

Represents the method that handles the System.Windows.Forms.ListView.LabelEdit event of a System.Windows.Forms.ListView. The source of the event. A System.Windows.Forms.LabelEditEventArgs that contains the event data.

When you create a System.Windows.Forms.LabelEditEventHandler delegate, you identify the method that will handle the event. To associate the event with your event handler, add an instance of the delegate to the event. The event handler is called whenever the event occurs, unless you remove the delegate. For more information about delegates, see.

LayoutEventArgs class (System.Windows.Forms)

a) ToString

Description

Provides data for the System.Windows.Forms.Control.Layout event.

Changes to a control such as resizing, showing or hiding child controls, and adding or removing child controls make it necessary for a control to layout its child controls. A System.Windows.Forms.LayoutEventArgs object specifies the child control that has been changed, and the child control's affected property. For example, if a control has been made visible since the last layout operation, the System.Windows.Forms.Control.Visible property is affected.

b) LayoutEventArgs

Example Syntax:

c) ToString

[C#] public LayoutEventArgs(Control affectedControl, string affectedProperty);

[C++] public: LayoutEventArgs(Control* affectedControl, String* affectedProperty);

[VB] Public Sub New(ByVal affectedControl As Control, ByVal affectedProperty As String)

[JScript] public function LayoutEventArgs(affectedControl: Control, affectedProperty: String);

Description

Initializes a new instance of the System.Windows.Forms.LayoutEventArgs class with the specified control and property affected. The System.Windows.Forms.Control affected by the change. The property affected by the change.

d) AffectedControl e) ToString

[C#] public Control AffectedControl {get;}

[C++] public: _property Control* get_AffectedControl( );

[VB] Public ReadOnly Property AffectedControl As Control

[JScript] public function get AffectedControl( ): Control;

Description

Gets the child control affected by the change.

f) AffectedProperty g) ToString

[C#] public string AffectedProperty {get;}

[C++] public: _property String* get_AffectedProperty( );

[VB] Public ReadOnly Property AffectedProperty As String

[JScript] public function get AffectedProperty( ): String;

Description

Gets the property affected by the change.

If a child control has been made visible since the last layout operation, the System.Windows.Forms.Control.Visible property is affected.

LayoutEventHandler delegate (System.Windows.Forms)

a) ToString

Description

Represents the method that will handle the System.Windows.Forms.Control.Layout event of a System.Windows.Forms.ontrol. The source of the event. A System.Windows.Forms.LayoutEventArgs that contains the event data.

When you create a System.Windows.Forms.LayoutEvent Args delegate, you identify the method that will handle the event. To associate the event with your event handler, add an instance of the delegate to the event. The event handler is called whenever the event occurs, unless you remove the delegate. For more information about event handler delegates, see.

LeftRightAlignment enumeration (System.Windows. Forms)

a) ToString

Description

Specifies whether an object or text is aligned to the left or right of a reference point.

Use the members of this enumeration to set the values of the System.Windows.Forms.DateTimePicker.DropDownAlign and System.Windows.Forms.UpDownBase.UpDownAlign properties.

b) ToString

[C#] public const LeftRightAlignment Left;

[C++] public: const LeftRightAlignment Left;

[VB] Public Const Left As LeftRightAlignment

[JScript] public var Left: LeftRightAlignment;

Description

The object or text is aligned to the left of the reference point.

c) ToString

[C#] public const LeftRightAlignment Right;

[C++] public: const LeftRightAlignment Right;

[VB] Public Const Right As LeftRightAlignment

[JScript] public var Right: LeftRightAlignment;

Description

The object or text is aligned to the right of the reference point.

LinkLabel.Link class (System.Windows.Forms)

a) ToString

Description

Represents a link within a System.Windows.Forms.LinkLabel control. The System.Windows.Forms.LinkLabel.Link class defines the properties of a link within a System.Windows.Forms.LinkLabel control. You can use these properties to provide data to the System.Windows.Forms.LinkLabel. LinkClicked event of the System.Windows.Forms.LinkLabel control to perform tasks when the link is clicked in the control. The System.Windows.Forms.LinkLabel. Link.LinkData property enables you to define information that the System. Windows.Forms.LinkLabel.LinkClicked event can use to display a URL within Microsoft Internet Explorer or to open a file.

b) Enabled c) ToString

[C#] public bool Enabled {get; set;}

[C++] public: _property bool get_Enabled( ); public: _property void set_Enabled(bool);

[VB] Public Property Enabled As Boolean

[JScript] public function get Enabled( ): Boolean; public function set Enabled(Boolean);

Description

Gets or sets a value indicating whether the link is enabled.

You can use this property to display a link in a disabled state within the System.Windows.Forms.LinkLabel control. When a link is disabled, clicking on the link does not cause the System.Windows.Forms.LinkLabel control to raise the System.Windows.Forms.LinkLabel.LinkClicked event.

d) Length e) ToString

[C#] public int Length {get; set;}

[C++] public: _property int get_Length( ); public: _property void set_Length(int);

[VB] Public Property Length As Integer

[JScript] public function get Length( ): int; public function set Length(int);

Description

Gets or sets the number of characters in the link text.

To specify text from the System.Windows.Forms.LinkLabel to display as a link, set the System.Windows.Forms.LinkLabel.Link.Start property to the location in the text to start creating the link. After the System.Windows.Forms.LinkLabel.Link.Start property is set, set the value of the System.Windows.Forms.LinkLabel.Link.Length property to the number of characters, including the character position specified in the System.Windows.Forms.LinkLabel.Link.Start property, that you want to make the link text. For example, if you want to make the first word of the text "The quick brown fox" a link, you set the System.Windows.Forms.LinkLabel.Link.Start property to zero (0) and the System.Windows.Forms.LinkLabel.Link.Length property to three (3).

f) LinkData g) ToString

[C#] public object LinkData {get; set;}

[C++] public: _property Object* get_LinkData( ); public: _property void set_LinkData(Object*);

[VB] Public Property LinkData As Object

[JScript] public function get LinkData( ): Object; public function set LinkData(Object);

Description

Gets or sets the data associated with the link.

You can use this property to supply information related to the link. The information provided by this property can be used within the System.Windows.Forms.LinkLabel.LinkClicked event of the System.Windows.Forms.LinkLabel to provide information about the link that can be used to process the link being clicked. For example, you can specify the URL to display in Internet Explorer when the link is clicked as the value of the System.Windows.Forms.LinkLabel. Link.LinkData property. You can also use the System.Windows. Forms.LinkLabel.Link.LinkData property to identify a dialog to display when the user clicks on the link.

h) Start i) ToString

[C#] public int Start {get; set;}

[C++] public: _property int get_Start( ); public: _property void set_Start(int);

[VB] Public Property Start As Integer

[JScript] public function get Start( ): int; public function set Start(int);

Description

Gets or sets the starting location of the link within the text of the System.Windows.Forms.LinkLabel.

To specify text from the System.Windows.Forms.LinkLabel to display as a link, set the System.Windows.Forms.LinkLabel.Link.Start property to the location in the text to start creating the link. After the System.Windows.Forms.LinkLabel.Link.Start property is set, set the value of the System.Windows.Forms.LinkLabel.Link.Length property to the number of characters, including the character position specified in the System.Windows.Forms.LinkLabel.Link.Start property, that you want to make the link text. For example, if you want to make the first word of the text "The quick brown fox" a link, you set the System.Windows.Forms.LinkLabel.Link.Start property to zero (0) and the System.Windows.Forms.LinkLabel.Link.Length property to three (3).

j) Visited k) ToString

[C#] public bool Visited {get; set;}

[C++] public: _property bool get_Visited( ); public: _property void set Visited(bool);

[VB] Public Property Visited As Boolean

[JScript] public function get Visited( ): Boolean; public function set Visited(Boolean);

Description

Gets or sets a value indicating whether the user has visited the link.

A System.Windows.Forms.LinkLabel control does not automatically denote that a link is a visited link. To display the link as a visited link, you can set the value of this property to true in an event handler for the System.Windows.Forms.LinkLabel.LinkClicked event of a System.Windows.Forms.LinkLabel. A visited link is displayed using the color specified in the System.Windows.Forms.LinkLabel.VisitedLinkColor property of the System.Windows.Forms.LinkLabel control. Once the form containing the System.Windows.Forms.LinkLabel control is closed, the all display state associated with the link is deleted. In order to retain the display state of the link, you need to store the display state of the link in a registry setting associated with your application.

LinkArea structure (System.Windows.Forms)

a) ToString

Description

Represents an area within a System.Windows.Forms.LinkLabel control that represents a hyperlink within the control.

There are two ways to add a hyperlink to the text of a System.Windows.Forms.LinkLabel control. You can access the System.Windows.Forms.LinkLabel.LinkCollection.Add (System.Int32, System.Int32) method of the System.Windows.Forms.LinkLabel.LinkCollection class through the System.Windows.Forms.LinkLabel.Links property of the System.Windows.Forms.LinkLabel to add multiple hyperlinks to the control's text. If you only need to add a single hyperlink to the text of the control, you can use the System.Windows.Forms.LinkLabel.LinkArea property of the System.Windows.Forms.LinkLabel. This property accepts a System.Windows.Forms.LinkArea object that defines the location of the hyperlink within the control's text. When a hyperlink is specified using the System.Windows.Forms.LinkArea property, the link area is then added to the System.Windows.Forms.LinkLabel.LinkCollection in the same manner as adding the link using the System.Windows.Forms.LinkLabel.LinkCollection.Add(System.Int32, System. Int32) method of the System.Windows.Forms.LinkLabel.LinkCollection.

b) LinkArea

Example Syntax:

c) ToString

[C#] public LinkArea(int start, int length);

[C++] public: LinkArea(int start, int length);

[VB] Public Sub New(ByVal start As Integer, ByVal length As Integer)

[JScript] public function LinkArea(start: int, length: int);

Description

Initializes a new instance of the System.Windows.Forms.LinkArea class. The zero-based starting location of the link area within the text of the System.Windows.Forms.LinkLabel. The number of characters, after the starting character, to include in the link area.

d) IsEmpty e) ToString

[C#] public bool IsEmpty {get;}

[C++] public: _property bool get_IsEmpty( );

[VB] Public ReadOnly Property IsEmpty As Boolean

[JScript] public function get IsEmpty( ): Boolean;

Description

Gets a value indicating whether the System.Windows.Forms.LinkArea is empty.

You can use this property to determine whether a valid link area has been specified in this object instead of evaluating the values of the System.Windows.Forms.LinkArea.Length and System.Windows.Forms.LinkArea.Start properties.

f) Length g) ToString

[C#] public int Length {get; set;}

[C++] public: _property int get_Length( ); public: _property void set_Length(int);

[VB] Public Property Length As Integer

[JScript] public function get Length( ): int; public function set Length(int);

Description

Gets or sets the number of characters in the link area.

To specify text from the System.Windows.Forms.LinkLabel to display as a link, set the System.Windows.Forms.LinkArea.Start property to the location in the text to start creating the link. After the System.Windows.Forms.LinkArea.Start property is set, set the value of the System.Windows.Forms.LinkArea.Length property to the number of characters, including the character position specified in the System.Windows.Forms.LinkArea.Start property, that you want to make the link text. For example, if you want to make the first word of the text "The quick brown fox" a link, you set the System.Windows.Forms.LinkArea.Start property to zero (0) and the System.Windows.Forms.LinkArea.Length property to three (3).

h) Start
i) ToString

[C#] public int Start {get; set;}

[C++] public: _property int get_Start( ); public: _property void set_Start(int);

[VB] Public Property Start As Integer

[JScript] public function get Start( ): int; public function set Start(int);

Description

Gets or sets the starting location of the link area within the text of the System.Windows.Forms.LinkLabel.

To specify text from the System.Windows.Forms.LinkLabel to display as a link, set the System.Windows.Forms.LinkArea.Start property to the location in the text to start creating the link. After the System.Windows.Forms.LinkArea.Start property is set, set the value of the System.Windows.Forms.LinkArea.Length property to the number of characters, including the character position specified in the System.Windows.Forms.LinkArea.Start property, that you want to make the link text. For example, if you want to make the first word of the text "The quick brown fox" a link, you set the System.Windows.Forms.LinkArea.Start property to zero (0) and the System.Windows.Forms.LinkArea.Length property to three (3).

j) Equals

[C#] public override bool Equals(object o);

[C++] public: bool Equals(Object* o);

[VB] Overrides Public Function Equals(ByVal o As Object) As Boolean

[JScript] public override function Equals(o: Object): Boolean;

Description k) GetHashCode

[C#] public override int GetHashCode( );

[C++] public: int GetHashCode( );

[VB] Overrides Public Function GetHashCode( ) As Integer

[JScript] public override function GetHashCode( ): int;

Description

LinkArea.LinkAreaConverter class (System.Windows.Forms)

a) ToString

Description

Provides a type converter to convert System.Windows.Forms.LinkArea.LinkAreaConverter objects to and from various other representations.

For more information about type converters, see the System.ComponentModel.TypeConverter base class and.

b) LinkArea.LinkAreaConverter

Example Syntax:

c) ToString

[C#] public LinkArea.LinkAreaConverter( );

[C++] public: LinkAreaConverter( );

[VB] Public Sub New( )

[JScript] public function LinkArea.LinkAreaConverter( );

d) CanConvertFrom

[C#] public override bool CanConvertFrom(ITypeDescriptorContext context, Type sourceType);

[C++] public: bool CanConvertFrom(ITypeDescriptorContext* context, Type* sourceType);

[VB] Overrides Public Function CanConvertFrom(ByVal context As ITypeDescriptorContext, ByVal sourceType As Type) As Boolean

[JScript] public override function CanConvertFrom(context ITypeDescriptorContext, sourceType: Type): Boolean;

Description

Determines if this converter can convert an object in the given source type to the native type of the converter.

Return Value: True if this object can perform the conversion. A formatter context. This object can be used to extract additional information about the environment this converter is being invoked from. This may be null, so you should always check. Also, properties on the context object may also return null. The type you wish to convert from.

e) CanConvertTo

[C#] public override bool CanConvertTo(ITypeDescriptorContext context, Type destinationType);

[C++] public: bool CanConvertTo(ITypeDescriptorContext* context, Type* destinationType);

[VB] Overrides Public Function CanConvertTo(ByVal context As ITypeDescriptorContext, ByVal destinationType As Type) As Boolean

[JScript] public override function CanConvertTo(context ITypeDescriptorContext, destinationType: Type): Boolean;

Description

Gets a value indicating whether this converter can convert an object to the given destination type using the context.

Return Value: true if this converter can perform the conversion; otherwise, false.

The context parameter can be used to extract additional information about the environment this converter is being invoked from. This can be null, so always check. Also, properties on the context object can return null. An System.ComponentModel.ITypeDescriptorContext that provides a format context. A System.Type that represents the type you wish to convert to.

f) ConvertFrom

[C#] public override object ConvertFrom(ITypeDescriptorContext context, CultureInfo culture, object value);

[C++] public: Object* ConvertFrom(ITypeDescriptorContext* context, CultureInfo* culture, Object* value);

[VB] Overrides Public Function ConvertFrom(ByVal context As ITypeDescriptorContext, ByVal culture As CultureInfo, ByVal value As Object) As Object

[JScript] public override function ConvertFrom(context: ITypeDescriptorContext, culture: CultureInfo, value: Object): Object;

Description

Converts the given object to the converter's native type.

Return Value: The converted object. This will throw an exception if the conversion could not be performed. A formatter context. This object can be used to extract additional information about the environment this converter is being invoked from. This may be null, so you should always check. Also, properties on the context object may also return null. An optional culture info. If not supplied the current culture is assumed. The object to convert.

g) ConvertTo

[C#] public override object ConvertTo(ITypeDescriptorContext context, CultureInfo culture, object value, Type destinationType);

[C++] public: Object* ConvertTo(ITypeDescriptorContext* context, CultureInfo* culture, Object* value, Type* destinationType);

[VB] Overrides Public Function ConvertTo(ByVal context As ITypeDescriptorContext, ByVal culture As CultureInfo, ByVal value As Object, ByVal destinationType As Type) As Object

[JScript] public override function ConvertTo(context: ITypeDescriptorContext, culture: CultureInfo, value: Object, destinationType: Type): Object;

Description

Converts the given object to another type. The most common types to convert are to and from a string object. The default implementation will make a call to ToString on the object if the object is valid and if the destination type is string. If this cannot convert to the destination type, this will throw a NotSupportedException.

Return Value: The converted object. A formatter context. This object can be used to extract additional information about the environment this converter is being invoked from. This may be null, so you should always check. Also, properties on the context object may also return null. An optional culture info. If not supplied the current culture is assumed. The object to convert. The type to convert the object to.

h) CreateInstance

[C#] public override object CreateInstance(ITypeDescriptorContext context, IDictionary propertyValues);

[C++] public: Object* CreateInstance(ITypeDescriptorContext* context, IDictionary* propertyValues);

[VB] Overrides Public Function CreateInstance(ByVal context As ITypeDescriptorContext, ByVal propertyValues As IDictionary) As Object

[JScript] public override function CreateInstance(context: ITypeDescriptorContext, propertyValues: IDictionary): Object;

Description

Creates an instance of this type given a set of property values for the object. This is useful for objects that are immutable, but still want to provide changable properties.

Return Value: The newly created object, or null if the object could not be created. The default implementation returns null. A type descriptor through which additional context may be provided. A dictionary of new property values. The dictionary contains a series of name-value pairs, one for each property returned from GetProperties.

i) GetCreateInstanceSupported

[C#] public override bool GetCreateInstanceSupported (ITypeDescriptorContext context);

[C++] public: bool GetCreateInstanceSupported(ITypeDescriptorContext* context);

[VB] Overrides Public Function GetCreateInstanceSupported(ByVal context As ITypeDescriptorContext) As Boolean

[JScript] public override function GetCreateInstanceSupported(context: ITypeDescriptorContext): Boolean;

Description

Determines if changing a value on this object should require a call to CreateInstance to create a new value.

Return Value: Returns true if CreateInstance should be called when a change is made to one or more properties of this object. A type descriptor through which additional context may be provided.

j) GetProperties

[C#] public override PropertyDescriptorCollection GetProperties(ITypeDescriptorContext context, object value, Attribute[ ] attributes);

[C++] public: PropertyDescriptorCollection* GetProperties (ITypeDescriptorContext* context, Object* value, Attribute* attributes[ ]);

[VB] Overrides Public Function GetProperties(ByVal context As ITypeDescriptorContext, ByVal value As Object, ByVal attributes( ) As Attribute) As PropertyDescriptorCollection

[JScript] public override function GetProperties(context: ITypeDescriptorContext, value: Object, attributes: Attribute[ ]): PropertyDescriptorCollection;

Description

Retrieves the set of properties for this type. By default, a type has does not return any properties. An easy implementation of this method can just call TypeDescriptor.GetProperties for the correct data type.

Return Value: The set of properties that should be exposed for this data type. If no properties should be exposed, this may return null. The default implementation always returns null. A type descriptor through which additional context may be provided. The value of the object to get the properties for.

k) GetPropertiesSupported

[C#] public override bool GetPropertiesSupported(ITypeDescriptorContext context);

[C++] public: bool GetPropertiesSupported(ITypeDescriptorContext* context);

[VB] Overrides Public Function GetPropertiesSupported (ByVal context As ITypeDescriptorContext) As Boolean

[JScript] public override function GetPropertiesSupported (context ITypeDescriptorContext): Boolean;

Description

Determines if this object supports properties. By default, this is false.

Return Value: Returns true if GetProperties should be called to find the properties of this object. A type descriptor through which additional context may be provided.

LinkBehavior enumeration (System.Windows.Forms)

a) ToString

Description

Specifies the behaviors of a link in a System.Windows.Forms.LinkLabel.

Use the members of this enumeration to set the value of the System.Windows.Forms.LinkLabel.LinkBehavior property of the System.Windows.Forms.LinkLabel.

b) ToString

[C#] public const LinkBehavior AlwaysUnderline;

[C++] public: const LinkBehavior AlwaysUnderline;

[VB] Public Const AlwaysUnderline As LinkBehavior

[JScript] public var AlwaysUnderline: LinkBehavior;

Description

The link always displays with underlined text.

c) ToString

[C+] public const LinkBehavior HoverUnderline;

[C++] public: const LinkBehavior HoverUnderline;

[VB] Public Const HoverUnderline As LinkBehavior

[JScript] public var HoverUnderline: LinkBehavior;

Description

The link displays underlined text only when the mouse is hovered over the link text.

d) ToString

[C#] public const LinkBehavior NeverUnderline;

[C++] public: const LinkBehavior NeverUnderline;

[VB] Public Const NeverUnderline As LinkBehavior

[JScript] public var NeverUnderline: LinkBehavior;

Description

The link text is never underlined. The link can still be distinguished from other text by use of the System.Windows.Forms.LinkLabel.LinkColor property of the System.Windows.Forms.LinkLabel control.

e) ToString

[C#] public const LinkBehavior SystemDefault;

[C++] public: const LinkBehavior SystemDefault;

[VB] Public Const SystemDefault As LinkBehavior

[JScript] public var SystemDefault: LinkBehavior;

Description

The link is displayed using the system default method for displaying links.

LinkClickedEventArgs class (System.Windows.Forms)

a) ToString

Description

Provides data for the System.Windows.Forms.RichTextBox.LinkClicked event.

A System.Windows.Forms.LinkClickedEventArgs specifies the text of the link that is clicked in the System.Windows.Forms.RichTextBox.

b) LinkClickedEventArgs

Example Syntax:

c) ToString

[C#] public LinkClickedEventArgs(string linkText);

[C++] public: LinkClickedEventArgs(String* linkText);

[VB] Public Sub New(ByVal linkText As String)

[JScript] public function LinkClickedEventArgs(linkText: String);

Description

Initializes a new instance of the System.Windows.Forms.LinkClickedEventArgs class.

The text specified in the linkText parameter can be a URL, file path, or other data that you want specified for the link being clicked. The text of the link that is clicked in the System.Windows.Forms.RichTextBox control.

d) LinkText e) ToString

[C#] public string LinkText {get;}

[C++] public: _property String* get_LinkText( );

[VB] Public ReadOnly Property LinkText As String

[JScript] public function get LinkText( ): String;

Description

Gets the text of the link being clicked.

The text returned by this property could be a file, URL, or other data specified by the link that is clicked.

LinkClickedEventHandler delegate (System.Windows.Forms)

a) ToString

Description

Represents the method that will handle the System.Windows.Forms.RichTextBox.LinkClicked event of a System.Windows.Forms.RichTextBox. The source of the object. The System.Windows.Forms.LinkClickedEventArgs that contains the event data.

When you create a System.Windows.Forms.LinkClickedEventHandler delegate, you identify the method that will handle the event. To associate the event with your event handler, add an instance of the delegate to the event. The event handler is called whenever the event occurs, unless you remove the delegate. For more information about delegates, see.

LinkLabel.LinkCollection class (System.Windows.Forms)

a) ToString

Description

Represents the collection of links within a System.Windows.Forms.LinkLabel control.

The System.Windows.Forms.LinkLabel.LinkCollection class stores the link displayed in the System.Windows.Forms.LinkLabel control. Each item in the collection is an instance of the System.Windows.Forms.LinkLabel.Link class, which defines the information of the link.

b) LinkLabel.LinkCollection

Example Syntax:

c) ToString

[C#] public LinkLabel.LinkCollection(LinkLabel owner);

[C++] public: LinkCollection(LinkLabel* owner);

[VB] Public Sub New(ByVal owner As LinkLabel)

[JScript] public function LinkLabel.LinkCollection(owner: LinkLabel);

Description

Initializes a new instance of the System.Windows.Forms.Link Label.LinkCollection class.

An instance of this class cannot be created without associating it with a System.Windows.Forms.LinkLabel control. The System.Windows.Forms.LinkLabel control that owns the collection.

d) Count e) ToString

[C#] public int Count {get;}

[C++] public: _property int get_Count( );

[VB] Public ReadOnly Property Count As Integer

[JScript] public function get Count( ): int;

Description

Gets the number of links in the collection.

This property enables you to determine the number of links in the System.Windows.Forms.LinkLabel control. You can then use this value when looping through the values of the collection and need to provide a number of iterations to perform the loop.

f) IsReadOnly g) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether this collection is read-only.

This property is always false for this collection.

h) Item i) ToString

[C#] public virtual LinkLabel.Link this[int index] {get; set;}

[C++] public: _property virtual LinkLabel.Link* get_Item (int index); public: _property virtual void set_Item(int index, LinkLabel.Link*);

[VB] Overridable Public Default Property Item(ByVal index As Integer) As LinkLabel.Link

[JScript] returnValue=LinkCollectionObject.Item(index); LinkCollectionObject.Item(index)=returnValue;

Description

Gets and sets the link at the specified index within the collection.

You can use this method to obtain the link stored at a specific location within the collection. To determine the index of a specific item within the collection, use the System.Windows.Forms. LinkLabel.LinkCollection.IndexOf(System.Windows.Forms.LinkLabel.Link) method. The index of the link in the collection to get.

j) Add

[C#] public Link Add(int start, int length);

[C++] public: Link* Add(int start, int length);

[VB] Public Function Add(ByVal start As Integer, ByVal length As Integer) As Link

[JScript] public function Add(start: int, length: int): Link; Adds a link to the collection.

Description

Adds a link to the collection.

Return Value: A System.Windows.Forms.LinkLabel.Link object representing the link that was created and added to the collection.

A System.Windows.Forms.LinkLabel control can display multiple links within the text of the control. The System.Windows.Forms.LinkLabel.LinkCollection.Add(System.Int32, System.Int32) method enables you to convert text within the System.Windows.Forms.LinkLabel control to a link that can be clicked on by the user to perform tasks similar to a System.Windows.Forms.Button control. This method adds the link that is created to the System.Windows.Forms.LinkLabel.LinkCollection for the System.Windows.Forms.LinkLabel. For example, if you want to set the word "quick" in the label text, "The quick brown fox", you call this method with the start parameter set to the value of four (4), and the length parameter to five (5). The word "quick" then changes to a link and the link is added to the collection. If you want to associate information with the link, such as the URL to display or a file to open when the user clicks on the link, use the other version of the System.Windows.Forms.LinkLabel.Link Collection. Add(System.Int32, System.Int32) method. The starting character within the text of the label where the link is created. The number of characters after the starting character to include in the link text.

k) Add

[C#] public Link Add(int start, int length, object linkData);

[C++] public: Link* Add(int start, int length, Object* linkData);

[VB] Public Function Add(ByVal start As Integer, ByVal length As Integer, ByVal linkData As Object) As Link

[JScript] public function Add(start: int, length: int, linkData: Object): Link;

Description

Adds a link to the collection with information to associate with the link.

Return Value: A System.Windows.Forms.LinkLabel.Link object representing the link that was created and added to the collection.

A System.Windows.Forms.LinkLabel control can display multiple links within the text of the control. The System.Windows.Forms.LinkLabel.LinkCollection.Add(System.Int32, System.Int32) method enables you to convert text within the System.Windows.Forms.LinkLabel control to a link that can be clicked on by the user to perform tasks similar to a System.Windows.Forms.Button control. This method adds the link that is created to the System.Windows.Forms.LinkLabel.LinkCollection for the System.Windows.Forms.LinkLabel. For example, if you want to set the word "quick" in the label text, "The quick brown fox", you call this method with the start parameter set to the value of four (4), and the length parameter to five (5). The word "quick" then changes to a link and the link is added to the collection. This version of the Add method enables you to provide additional information that can be associated with the link through the linkData parameter. For example, you can pass a System.String object to the linkData parameter that contains a URL to display when the link is clicked. You can then use this information in your handler for the System.Windows.Forms.LinkLabel. LinkClicked event of the System.Windows.Forms.LinkLabel control to display the URL in Microsoft Internet Explorer. The starting character within the text of the label where the link is created. The number of characters after the starting character to include in the link text. The object containing the information to associate with the link.

l) Clear

[C#] public virtual void Clear( );

[C++] public: virtual void Clear( );

[VB] Overridable Public Sub Clear( )

[JScript] public function Clear( );

Description

Clears all links from the collection.

When you remove links from the collection, all information about the removed links is deleted. To remove a single link from the System.Windows.Forms.LinkLabel, use the System.Windows.Forms.LinkLabel.LinkCollection.Remove (System.Windows.Forms.LinkLabel.Link) or System.Windows.Forms.LinkLabel.LinkCollection.RemoveAt (System.Int32) method.

m) Contains

[C#] public bool Contains(LinkLabel.Link link);

[C++] public: bool Contains(LinkLabel.Link* link);

[VB] Public Function Contains(ByVal link As LinkLabel-.Link) As Boolean

[JScript] public function Contains(link: LinkLabel.Link): Boolean;

Description

Determines whether the specified link is within the collection.

Return Value: true if the specified link is within the collection; otherwise, false.

The System.Windows.Forms.LinkLabel.Link Collection. Contains(System.Windows.Forms.LinkLabel.Link) method enables you to determine whether a System.Windows. Forms.LinkLabel.Link object is a member of the collection. Once you know that the link is located within the collection, you can use the System.Windows.Forms.LinkLabel. LinkCollection.IndexOf(System.Windows.Forms.LinkLabel. Link) method to determine where the link is located within the collection. A System.Windows.Forms.LinkLabel.Link representing the link to search for in the collection.

n) GetEnumerator

[C#] public IEnumerator GetEnumerator( );

[C++] public: sealed IEnumerator* GetEnumerator( );

[VB] NotOverridable Public Function GetEnumerator( ) As IEnumerator

[JScript] public function GetEnumerator( ): IEnumerator;

Description

Returns an enumerator to use to iterate through the link collection.

Return Value: An System.Collections.IEnumerator object that represents the link collection.

o) IndexOf

[C#] public int IndexOf(LinkLabel.Link link);

[C++] public: int IndexOf(LinkLabel.Link* link);

[VB] Public Function IndexOf(ByVal link As LinkLabel. Link) As Integer

[JScript] public function IndexOf(link: LinkLabel.Link): int;

Description

Returns the index of the specified link within the collection.

Return Value: The zero-based index where the link is located within the collection; otherwise, negative one (−1).

The System.Windows.Forms.LinkLabel.LinkCollection. IndexOf(System.Windows.Forms.LinkLabel.Link) method enables you to determine where a link is located within the collection. To determine if a link is located within the collection before calling this method, use the System.Windows. Forms.LinkLabel.LinkCollection.Contains(System.Windows.Forms.LinkLabel.Link) method. A System.Windows. Forms.LinkLabel.Link representing the link to search for in the collection.

p) Remove

[C#] public void Remove(LinkLabel.Link value);

[C++] public: void Remove(LinkLabel.Link* value);

[VB] Public Sub Remove(ByVal value As LinkLabel.Link)

[JScript] public function Remove(value: LinkLabel.Link);

Description

Removes the specified link from the collection.

When you remove a link from the collection, the indices change for subsequent items in the collection. All information about the removed item is deleted. You can use this method to remove a specific link from the collection by specifying the actual item to remove from the collection. To specify the index of the link to remove instead of the link itself, use the System.Windows.Forms.LinkLabel. LinkCollection.Remove At(System.Int32) method. To remove all links from the collection, use the System.Windows.Forms.LinkLabel. LinkCollection.Clear method. A System.Windows. Forms.Link Label.Link that represents the link to remove from the collection.

q) RemoveAt

[C#] public void RemoveAt(int index);

[C++] public: sealed void RemoveAt(int index);

[VB] NotOverridable Public Sub RemoveAt(ByVal index As Integer)

[JScript] public function RemoveAt(index: int);

Description

Removes a link at a specified location within the collection.

When you remove a link from the collection, the indexes change for subsequent items in the collection. All information about the deleted link is lost. You can use this method to remove a specific link from the collection by specifying the index of the link to remove from the collection. To specify the link to remove instead of the index to the link, use the System.Windows.Forms.LinkLabel.LinkCollection.Remove (System.Windows.Forms.LinkLabel.Link) method. To remove all links from the collection, use the System.Windows.Forms.LinkLabel.LinkCollection.Clear method. The zero-based index of the item to remove from the collection.

r) ICollection.CopyTo

[C] void ICollection.CopyTo(Array dest, int index);

[C++] void ICollection::CopyTo(Array* dest, int index);

[VB] Sub CopyTo(ByVal dest As Array, ByVal index As Integer) Implements ICollection.CopyTo

[JScript] function ICollection.CopyTo(dest: Array, index: int);

s) IList.Add

[C#] int IList.Add(object value);

[C++] int IList::Add(Object* value);

[VB] Function Add(ByVal value As Object) As Integer Implements IList.Add

[JScript] function IList.Add(value: Object): int;

t) IList.Contains

[C#] bool IList.Contains(object link);

[C++] bool IList::Contains(Object* link);

[VB] Function Contains(ByVal link As Object) As Boolean Implements IList.Contains

[JScript] function IList.Contains(link: Object): Boolean;

u) IList.IndexOf

[C#] int IList.IndexOf(object link);

[C++] int IList::IndexOf(Object* link);

[VB] Function IndexOf(ByVal link As Object) As Integer Implements IList.IndexOf

[JScript] function IList.IndexOf(link: Object): int;

v) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index int, value: Object);

w) IList.Remove

[C#] void IList.Remove(object value);

[C++] void IList::Remove(Object* value);

[VB] Sub Remove(ByVal value As Object) Implements IList.Remove

[JScript] function IList.Remove(value: Object);

LinkLabel class (System.Windows.Forms)

a) ToString

Description

Represents a Windows label control that can display hyperlinks.

The System.Windows.Forms.LinkLabel control is similar to a System.Windows.Forms.Label control with the exception that it can display a hyperlink. Multiple hyperlinks can be specified in the text of the control. Each hyperlink can perform a different task within an application. For example, you can use a hyperlink to display a Web site in Microsoft Internet Explorer or to load a log file associated with an application.

b) LinkLabel

Example Syntax:

c) ToString

[C#] public LinkLabel( );

[C++] public: LinkLabel( );

[VB] Public Sub New( )

[JScript] public function LinkLabel( );

Description

Initializes a new default instance of the System.Windows.Forms.LinkLabel class.

d) AccessibilityObject e) AccessibleDefaultActionDescription f) AccessibleDescription g) AccessibleName h) AccessibleRole i) ActiveLinkColor j) ToString Description Gets or sets the color used to display an active link.

An active link is a link that is in the process of being clicked. This is similar to the depressed state of a System.Windows.Forms.Button control. You can use this property to specify the color that the link is displayed in when the link is in the process of being clicked.

k) AllowDrop l) Anchor m) AutoSize n) BackColor o) BackgroundImage p) BindingContext q) BorderStyle r) Bottom s) Bounds t) CanFocus u) CanSelect v) Capture w) Causes Validation x) ClientRectangle y) ClientSize z) CompanyName aa) Container bb) ContainsFocus cc) ContextMenu dd) Controls ee) Created ff) CreateParams gg) Cursor hh) DataBindings ii) DefaultImeMode jj) DefaultSize kk) DesignMode ll) DisabledLinkColor mm) ToString Description Gets or sets the color used when displaying a disabled link.

This property enables you to specify the color for links that are disabled in the System.Windows.Forms.LinkLabel. Disabled links do not cause the System.Windows.Forms.Link Label.LinkClicked event to be raised.

nn) DisplayRectangle oo) Disposing pp) Dock
qq) Enabled
rr) Events
ss) FlatStyle
tt) Focused
uu) Font
vv) FontHeight
ww) ForeColor
xx) Handle
yy) HasChildren
zz) Height
aaa) Image
bbb) ImageAlign
ccc) ImageIndex
ddd) ImageList
eee) ImeMode
fff) InvokeRequired
ggg) IsAccessible
hhh) IsDisposed
iii) IsHandleCreated
jjj) Left
kkk) LinkArea
lll) ToString Description Gets or sets the range in the text to treat as a link.

The System.Windows.Forms.LinkLabel.LinkArea property provides a quick way to specify a single hyperlink to display in the text of the System.Windows.Forms.LinkLabel control. The System.Windows.Forms.LinkArea object provides properties that specify the starting position of the link within the text of the control and the length of text for the hyperlink. When a hyperlink is specified using the System.Windows.Forms.LinkLabel.LinkArea property, the hyperlink is added to the System.Windows.Forms.LinkLabel.LinkCollection of the control. The System.Windows.Forms.LinkLabel.LinkArea property converts the System.Windows.Forms.LinkArea object assigned to it to a System.Windows.Forms.LinkLabel.Link object that is stored within the collection.

mmm) LinkBehavior
nnn) ToString

[C#] public LinkBehavior LinkBehavior {get; set;}

[C++] public: _property LinkBehavior get_LinkBehavior( ); public: _property void set_LinkBehavior(LinkBehavior);

[VB] Public Property LinkBehavior As LinkBehavior

[JScript] public function get LinkBehavior( ): LinkBehavior; public function set LinkBehavior(LinkBehavior);

Description

Gets or sets a value that represents the behavior of a link.

This property enables you to specify the behavior of links when they are displayed in the control. For example, if you want links to be displayed with an underline only when the mouse pointer is over a link, you can set this property to LinkBehavior.HoverUnderline. For more information on the types of behaviors that can be associated with a link, see System.Windows.Forms.LinkBehavior.

ooo) LinkColor
ppp) ToString

[C#] public Color LinkColor {get; set;}

[C++] public: _property Color get_LinkColor( ); public: _property void set_LinkColor(Color);

[VB] Public Property LinkColor As Color

[JScript] public function get LinkColor( ): Color; public function set LinkColor(Color);

Description

Gets or sets the color used when displaying a normal link.

This property enables you to specify the color that is initially displayed for all links in the System.Windows.Forms.LinkLabel.

qqq) Links
rrr) ToString

[C#] public LinkLabel.LinkCollection Links {get;}

[C++] public: _property LinkLabel.LinkCollection* get_Links( );

[VB] Public ReadOnly Property Links As LinkLabel.LinkCollection

[JScript] public function get Links( ): LinkLabel.LinkCollection;

Description

Gets the collection of links contained within the System.Windows.Forms.LinkLabel.

A System.Windows.Forms.LinkLabel control can display any number of links within the text of the control. This property enables you to access the System.Windows.Forms.LinkLabel.LinkCollection instance associated with the System.Windows.Forms.LinkLabel that represents the collection of links displayed in the control. You can then use the members of the System.Windows.Forms.LinkLabel.LinkCollection class to add, remove, and find links in the collection. For more information on the types of tasks you can perform with the link collection, see System.Windows.Forms.LinkLabel.LinkCollection.

sss) LinkVisited
ttt) ToString

[C#] public bool LinkVisited {get; set;}

[C++] public: _property bool get_LinkVisited( ); public: _property void set_LinkVisited(bool);

[VB] Public Property LinkVisited As Boolean

[JScript] public function get LinkVisited( ): Boolean; public function set LinkVisited(Boolean);

Description

Gets or sets a value indicating whether a link should be displayed as though it were visited.

A System.Windows.Forms.LinkLabel control does not automatically denote that a link is a visited link. To display the link as a visited link, you can set the value of this property to true in an event handler for the System.Windows.Forms.LinkLabel.LinkClicked event of a System.Windows.Forms.LinkLabel. A visited link is displayed using the color specified in the System.Windows.Forms.LinkLabel.VisitedLinkColor property of the System.Windows.Forms.LinkLabel control. Once the form containing the System.Windows.Forms.LinkLabel control is closed, the all display state associated with the link is deleted. In order to retain the display state of the link, you need to store the display state of the link in a registry setting associated with your application.

uuu) Location
vvv) Name
www) OverrideCursor
xxx) ToString

Description yyy) Parent
zzz) PreferredHeight
aaaa) PreferredWidth
bbbb) ProductName
cccc) ProductVersion
dddd) RecreatingHandle
eeee) Region
ffff) RenderRightToLeft
gggg) RenderTransparent
hhhh) ResizeRedraw
iiii) Right
jjjj) RightToLeft
kkkk) ShowFocusCues
llll) ShowKeyboardCues
mmmm) Site
nnnn) Size
oooo) TabIndex
pppp) TabStop
qqqq) Tag
rrrr) Text
ssss) ToString Description tttt) TextAlign
uuuu) Top
vvvv) TopLevelControl
wwww) UseMnemonic
xxxx) Visible
yyyy) VisitedLinkColor
zzzz) ToString Description Gets or sets the color used when displaying a link that that has been previously visited.

This property enables you to specify the color that is displayed for all links in the LinkLabelSystem.Windows.Forms that have been visited by the user.

aaaaa) Width
bbbbb) WindowTarget
ccccc) ToString

Description

Occurs when a link is clicked within the control.

Typically, the System.Windows.Forms.LinkLabel. LinkClicked event is handled to perform tasks when the user clicks on a link in the control. The event handler for the System. Windows.Forms.LinkLabel.LinkClicked event is passed an instance of the System.Windows.Forms.LinkLabel-LinkClickedEventArgs class that contains a System.Windows.Forms.LinkLabel.Link object that is associated with the link that was clicked. You can use information specified in the System.Windows.Forms.LinkLabel.Link.LinkData property of System.Windows.Forms.LinkLabel.Link class to determine which link was clicked or what type of task to perform when the link is clicked. For example, if a System. Windows.Forms.LinkLabel control has a System.Windows. Forms.LinkLabel.Link object defined with its System.Windows.Forms.LinkLabel.Link.LinkData property set to the string www.microsoft.com, you can use this information in an event handler for the System.Windows.Forms.LinkLabel. LinkClicked event to display the Web site.

ddddd) CreateAccessibilityInstance

[C#] protected override AccessibleObject CreateAccessibilityInstance( );

[C++] protected: AccessibleObject* CreateAccessibilityInstance( );

[VB] Overrides Protected Function CreateAccessibilityInstance( ) As AccessibleObject

[JScript] protected override function CreateAccessibilityInstance( ): AccessibleObject;

Description

Constructs the new instance of the accessibility object for this control. Subclasses should not call base.CreateAccessibility-Object.

eeeee) CreateHandle

[C#] protected override void CreateHandle( );

[C++] protected: void CreateHandle( );

[VB] Overrides Protected Sub CreateHandle( )

[JScript] protected override function CreateHandle( );

Description

Creates a handle for this control. This method is called by the .NET Framework, this should not be called. Inheriting classes should always call base.createHandle when overriding this method.

fffff) OnEnabledChanged

[C#] protected override void OnEnabledChanged(EventArgs e);

[C++] protected: void OnEnabledChanged(EventArgs* e);

[VB] Overrides Protected Sub OnEnabledChanged(ByVal e As EventArgs)

[JScript] protected override function OnEnabledChanged(e: EventArgs);

Description ggggg) OnFontChanged

[C#] protected override void OnFontChanged(EventArgs e);

[C++] protected: void OnFontChanged(EventArgs* e);

[VB] Overrides Protected Sub OnFontChanged(ByVal e As EventArgs)

[JScript] protected override function OnFontChanged(e: EventArgs);

Description hhhhh) OnGotFocus

[C#] protected override void OnGotFocus(EventArgs e);

[C++] protected: void OnGotFocus(EventArgs* e);

[VB] Overrides Protected Sub OnGotFocus(ByVal e As EventArgs)

[JScript] protected override function OnGotFocus(e: Event Args);

Description

Raises the System.Windows.Forms.Control.GotFocus event.

Raising an event invokes the event handler through a delegate. For more information, see. An System.EventArgs that contains the event data.

iiiii) OnKeyDown

[C#] protected override void OnKeyDown(KeyEventArgs e);

[C++] protected: void OnKeyDown(KeyEventArgs* e);

[VB] Overrides Protected Sub OnKeyDown(ByVal e As KeyEventArgs)

[JScript] protected override function OnKeyDown(e: KeyEventArgs);

Description

Raises the System.Windows.Forms.Control.OnKeyDown (System.Windows.Forms.KeyEventArgs) event.

Raising an event invokes the event handler through a delegate. For more information, see. A System.Windows.Forms. KeyEventArgs that contains the event data.

jjjjj) OnLinkClicked

[C#] protected virtual void OnLinkClicked(LinkLabelLinkClickedEventArgs e);

[C++] protected: virtual void OnLinkClicked(LinkLabel-LinkClickedEventArgs* e);

[VB] Overridable Protected Sub OnLinkClicked(ByVal e As LinkLabelLinkClickedEventArgs)

[JScript] protected function OnLinkClicked(e: LinkLabel-LinkClickedEventArgs);

Description

Raises the System.Windows.Forms.LinkLabel.LinkClicked event.

Raising an event invokes the event handler through a delegate. For more information, see. A System.Windows.Forms.Link LabelLinkClickedEventArgs that contains the event data.

kkkkk) OnLostFocus

[C#] protected override void OnLostFocus(EventArgs e);

[C++] protected: void OnLostFocus(EventArgs* e);

[VB] Overrides Protected Sub OnLostFocus(ByVal e As EventArgs)

[JScript] protected override function OnLostFocus(e: Event Args);

Description

Raises the System.Windows.Forms.Control.LostFocus event.

Raising an event invokes the event handler through a delegate. For more information, see. An System.EventArgs that contains the event data.

lllll) OnMouseDown

[C#] protected override void OnMouseDown(MouseEvent Args e);

[C++] protected: void OnMouseDown(MouseEventArgs* e);

[VB] Overrides Protected Sub OnMouseDown(ByVal e As MouseEventArgs)

[JScript] protected override function OnMouseDown(e: MouseEventArgs);

Description

Raises the System.Windows.Forms.Control.OnMouseDown (System.Windows.Forms.MouseEventArgs) event.

Raising an event invokes the event handler through a delegate. For more information, see. A System.Windows. Forms.Mouse EventArgs that contains the event data.

mmmmm) OnMouseLeave

[C#] protected override void OnMouseLeave(EventArgs e);

[C++] protected: void OnMouseLeave(EventArgs* e);

[VB] Overrides Protected Sub OnMouseLeave(ByVal e As EventArgs)

[JScript] protected override function OnMouseLeave(e: EventArgs);

Description

Raises the System.Windows.Forms.Control.OnMouseLeave (System.EventArgs) event.

Raising an event invokes the event handler through a delegate. For more information, see. An System.EventArgs that contains the event data.

nnnnn) OnMouseMove

[C#] protected override void OnMouseMove(MouseEvent Args e);

[C++] protected: void OnMouseMove(MouseEventArgs* e);

[VB] Overrides Protected Sub OnMouseMove(ByVal e As MouseEventArgs)

[JScript] protected override function OnMouseMove(e: MouseEventArgs);

Description

Raises the System.Windows.Forms.Control.OnMouseMove (System.Windows.Forms.MouseEventArgs) event.

Raising an event invokes the event handler through a delegate. For more information, see. A System.Windows. Forms.Mouse EventArgs that contains the event data.

ooooo) OnMouseUp

[C#] protected override void OnMouseUp(MouseEventArgs e);

[C++] protected: void OnMouseUp(MouseEventArgs* e);

[VB] Overrides Protected Sub OnMouseUp(ByVal e As MouseEventArgs)

[JScript] protected override function OnMouseUp(e: Mouse EventArgs);

Description

Raises the System.Windows.Forms.Control.OnMouseUp (System.Windows.Forms.MouseEventArgs) event.

Raising an event invokes the event handler through a delegate. For more information, see. A System.Windows. Forms.Mouse EventArgs that contains the event data.

ppppp) OnPaint

[C#] protected override void OnPaint(PaintEventArgs e);

[C++] protected: void OnPaint(PaintEventArgs* e);

[VB] Overrides Protected Sub OnPaint(ByVal e As Paint-EventArgs)

[JScript] protected override function OnPaint(e: PaintEvent Args);

Description

Raises the System.Windows.Forms.Control.OnPaint(System.Windows.Forms.PaintEventArgs) event.

Raising an event invokes the event handler through a delegate. For more information, see. A System.Windows.Forms.PaintEventArgs that contains the event data.

qqqqq) OnPaintBackground

[C#] protected override void OnPaintBackground(PaintEventArgs e);

[C++] protected: void OnPaintBackground(PaintEventArgs* e);

[VB] Overrides Protected Sub OnPaintBackground(ByVal e As PaintEventArgs)

[JScript] protected override function OnPaintBackground(e: PaintEventArgs);

Description rrrrr) On TextAlign Changed

[C#] protected override void OnTextAlignChanged(Event Args e);

[C++] protected: void OnTextAlignChanged(EventArgs* e);

[VB] Overrides Protected Sub OnTextAlignChanged(ByVal e As EventArgs)

[JScript] protected override function OnTextAlignChanged (e: EventArgs);

Description sssss) OnTextChanged

[C#] protected override void OnTextChanged(EventArgs e);

[C++] protected: void OnTextChanged(EventArgs* e);

[VB] Overrides Protected Sub OnTextChanged(ByVal e As EventArgs)

[JScript] protected override function OnTextChanged(e: EventArgs);

Description ttttt) PointInLink

[C#] protected Link PointInLink(int x, int y);

[C++] protected: Link* PointInLink(int x, int y);

[VB] Protected Function PointInLink(ByVal x As Integer, ByVal y As Integer) As Link

[JScript] protected function PointInLink(x: int, y: int): Link;

Description

Gets the link located at the specified client coordinates.

Return Value: A System.Windows.Forms.LinkLabel.Link representing the link located at the specified coordinates. If the point does not contain a link, null is returned.

This method enables you to determine whether a link is located at a specific point within a System.Windows.Forms.LinkLabel control. You can use this method in an event handler for the System.Windows.Forms.Control.Mouse Enter event of the control to determine whether the mouse pointer is hovering over a link in the control. Once you have determined that the mouse pointer is over a link, you can then display additional information about the link to the user through System.Windows.Forms.StatusBar text or a System.Windows.Forms.ToolTip. The horizontal coordinate of the point to search for a link. The vertical coordinate of the point to search for a link.

uuuuu) ProcessDialogKey

[C#] protected override bool ProcessDialogKey(Keys keyData);

[C++] protected: bool ProcessDialogKey(Keys keyData);

[VB] Overrides Protected Function ProcessDialogKey(ByVal keyData As Keys) As Boolean

[JScript] protected override function ProcessDialogKey(keyData: Keys): Boolean;

Description

Processes a dialog key. This method is called during message pre-processing to handle dialog characters, such as TAB, RETURN, ESCAPE, and arrow keys. This method is called only if the isInputKey( ) method indicates that the control isn't interested in the key. processDialogKey( ) simply sends the character to the parent's processDialogKey( ) method, or returns false if the control has no parent. The Form class overrides this method to perform actual processing of dialog keys. When overriding processDialogKey( ), a control should return true to indicate that it has processed the key. For keys that aren't processed by the control, the result of "base.processDialogChar( )" should be returned. Controls will seldom, if ever, need to override this method.

Return Value: true to consume the key, false to allow further processing. key code and modifier flags.

vvvvv) Select

[C#] protected override void Select(bool directed, bool forward);

[C++] protected: void Select(bool directed, bool forward);

[VB] Overrides Protected Sub Select(ByVal directed As Boolean, ByVal forward As Boolean)

[JScript] protected override function Select(directed: Boolean, forward: Boolean);

Description wwwww) SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As BoundsSpecified)

[JScript] protected override function SetBoundsCore(x: int, y: int, width: int, height: int, specified: BoundsSpecified);

Description

Performs the work of setting the bounds of this control. Inheriting classes can override this function to add size restrictions. Inheriting classes must call base.setBoundsCore to actually cause the bounds of the control to change. new left of the control. new right of the control. new width of the control. new height of the control. Which values were specified. This parameter is meant to reflect user intent, not indicate which values have changed.

xxxxx) IButtonControl.NotifyDefault

[C#] void IButtonControl.NotifyDefault(bool value);

[C++] void IButtonControl::NotifyDefault(bool value);

[VB] Sub NotifyDefault(ByVal value As Boolean) Implements IButtonControl.NotifyDefault

[JScript] function IButtonControl.NotifyDefault(value: Boolean);

yyyyy) IButtonControl.PerformClick

[C#] void IButtonControl.PerformClick( );

[C++] void IButtonControl::PerformClick( );

[VB] Sub PerformClick( ) Implements IButtonControl.PerformClick

[JScript] function IButtonControl.PerformClick( );

zzzzz) WndProc

[C#] protected override void WndProc(ref Message msg);

[C++] protected: void WndProc(Message* msg);

[VB] Overrides Protected Sub WndProc(ByRef msg As Message)

[JScript] protected override function WndProc(msg: Message);

Description

LinkLabelLinkClickedEventArgs class (System.Windows.Forms)

a) WndProc

Description

Provides data for the System.Windows.Forms.LinkLabel.OnLinkClicked(System.Windows.Forms.LinkLabelLinkClickedEventArgs) event.

b) LinkLabelLinkClickedEventArgs

Example Syntax:

c) WndProc

[C#] public LinkLabelLinkClickedEventArgs(LinkLabel.Link link);

[C++] public: LinkLabelLinkClickedEventArgs(LinkLabel.Link* link);

[VB] Public Sub New(ByVal link As LinkLabel.Link)

[JScript] public function LinkLabelLinkClickedEventArgs (link: LinkLabel.Link);

Description

Initializes a new instance of the System.Windows.Forms.Link LabelLinkClickedEventArgs class, given the link. The System.Windows.Forms.LinkLabel.Link that was clicked.

d) Link e) WndProc

[C#] public LinkLabel.Link Link {get;}

[C++] public: _property LinkLabel.Link* get_Link( );

[VB] Public ReadOnly Property Link As LinkLabel.Link

[JScript] public function get Link( ): LinkLabel.Link;

Description

Gets the System.Windows.Forms.LinkLabel.Link that was clicked.

LinkLabelLinkClickedEventHandler delegate (System.Windows.Forms)

a) ToString

Description

Represents the method that will handle the System.Windows.Forms.LinkLabel.LinkClicked event of a System.Windows.Forms.LinkLabel. The source of the event. A System.Windows.Forms.LinkLabelLinkClickedEventArgs that contains the event data.

When you create a System.Windows.Forms.LinkLabelLinkClickedEventHandler delegate, you identify the method that will handle the event. To associate the event with your event handler, add an instance of the delegate to the event. The event handler is called whenever the event occurs, until you remove the delegate. For more information about delegates, see.

LinkState enumeration (System.Windows.Forms)

a) ToString b) ToString

Description c) ToString

[C#] public const LinkState Hover;

[C++] public: const LinkState Hover;

[VB] Public Const Hover As LinkState

[JScript] public var Hover: LinkState;

Description d) ToString

[C#] public const LinkState Normal;

[C++] public: const LinkState Normal;

[VB] Public Const Normal As LinkState

[JScript] public var Normal: LinkState;

Description e) ToString

[C#] public const LinkState Visited;

[C++] public: const LinkState Visited;

[VB] Public Const Visited As LinkState

[JScript] public var Visited: LinkState;

Description

ListBindingConverter class (System.Windows.Forms)

a) ToString

Description

Provides a type converter to convert System.Windows.Forms.Binding objects to and from various other representations.

The System.Windows.Forms.ListBindingConverter is used to evaluate and convert a property of an object into a System.Windows.Forms.Binding.

b) ListBindingConverter

Example Syntax:

c) ToString

[C#] public ListBindingConverter( );

[C++] public: ListBindingConverter( );

[VB] Public Sub New( )

[JScript] public function ListBindingConverter( );

d) CanConvertTo

[C#] public override bool CanConvertTo(ITypeDescriptorContext context, Type destinationType);

[C++] public: bool CanConvertTo(ITypeDescriptorContext* context, Type* destinationType);

[VB] Overrides Public Function CanConvertTo(ByVal context As ITypeDescriptorContext, ByVal destinationType As Type) As Boolean

[JScript] public override function CanConvertTo(context: ITypeDescriptorContext, destinationType: Type): Boolean;

Description

Gets a value indicating whether this converter can convert an object to the given destination type using the context.

Return Value: true if this converter can perform the conversion; otherwise, false.

The context parameter can be used to extract additional information about the environment this converter is being invoked from. This can be null, so always check. Also, properties on the context object can return null. An System.ComponentModel.ITypeDescriptorContext that provides a format context. A System.Type that represents the type you wish to convert to.

e) ConvertTo

[C#] public override object ConvertTo(ITypeDescriptorContext context, CultureInfo culture, object value, Type destinationType);

[C++] public: Object* ConvertTo(ITypeDescriptorContext* context, CultureInfo* culture, Object* value, Type* destinationType);

[VB] Overrides Public Function ConvertTo(ByVal context As ITypeDescriptorContext, ByVal culture As CultureInfo, ByVal value As Object, ByVal destinationType As Type) As Object

[JScript] public override function ConvertTo(context: ITypeDescriptorContext, culture: CultureInfo, value: Object, destinationType: Type): Object;

Description

Converts the given object to another type. The most common types to convert are to and from a string object. The default implementation will make a call to ToString on the object if the object is valid and if the destination type is string. If this cannot convert to the destination type, this will throw a NotSupportedException.

Return Value: The converted object. A formatter context. This object can be used to extract additional information about the environment this converter is being invoked from. This may be null, so you should always check. Also, properties on the context object may also return null. An optional culture info. If not supplied the current culture is assumed. The object to convert. The type to convert the object to.

f) CreateInstance

[C#] public override object CreateInstance(ITypeDescriptorContext context, IDictionary propertyValues);

[C++] public: Object* CreateInstance(ITypeDescriptorContext* context, IDictionary* propertyValues);

[VB] Overrides Public Function CreateInstance(ByVal context As ITypeDescriptorContext, ByVal propertyValues As IDictionary) As Object

[JScript] public override function CreateInstance(context: ITypeDescriptorContext, propertyValues: IDictionary): Object;

Description

Creates an instance of this type given a set of property values for the object.

This is useful for objects that are immutable, but still want to provide changable properties.

Return Value: The newly created object, or null if the object could not be created. The default implementation returns null. A type descriptor through which additional context may be provided. A dictionary of new property values. The dictionary contains a series of name-value pairs, one for each property returned from GetProperties.

g) GetCreateInstanceSupported

[C#] public override bool GetCreateInstanceSupported (ITypeDescriptorContext context);

[C++] public: bool GetCreateInstanceSupported(ITypeDescriptorContext* context);

[VB] Overrides Public Function GetCreateInstanceSupported(ByVal context As ITypeDescriptorContext) As Boolean

[JScript] public override function GetCreateInstanceSupported(context: ITypeDescriptorContext): Boolean;

Description

Determines if changing a value on this object should require a call to CreateInstance to create a new value.

Return Value: Returns true if CreateInstance should be called when a change is made to one or more properties of this object. A type descriptor through which additional context may be provided.

ListBox class (System.Windows.Forms)

a) ToString

Description

Represents a Windows list box control.

The System.Windows.Forms.ListBox control enables you to display a list of items to the user that the user can select by clicking. A System.Windows.Forms.ListBox control can provide single or multiple selections using the System.Windows.Forms.ListBox.SelectionMode property. The System.Windows.Forms.ListBox also provides the System.Windows.Forms.ListBox.MultiColumn property to enable the display of items in columns instead of a straight vertical list of items. This allows the control to display more visible items and prevents the need for the user to scroll to an item.

b) ToString

[C#] public const int DefaultItemHeight;

[C++] public: const int DefaultItemHeight;

[VB] Public Const DefaultItemHeight As Integer

[JScript] public var DefaultItemHeight: int;

Description

Specifies the default item height for an owner-drawn Systen.Windows.Forms.ListBox.

c) ToString

[C#] public const int NoMatches;

[C++] public: const int NoMatches;

[VB] Public Const NoMatches As Integer

[JScript] public var NoMatches: int;

Description

Specifies that no matches are found during a search.

This constant is returned by the System.Windows.Forms.ListBox.FindString(System.String), System.Windows.Forms.ListBox.FindStringExact(System.String), and System.Windows.Forms.ListBox.IndexFromPoint(System.Drawing.Point) methods when no matching values are found in a search.

d) ListBox

Example Syntax:

e) ToString

[C#] public ListBox( );

[C++] public: ListBox( );

[VB] Public Sub New( )

[JScript] public function ListBox( );

Description

Initializes a new instance of the System.Windows.Forms.ListBox class.

f) AccessibilityObject g) AccessibleDefaultActionDescription h) AccessibleDescription i) AccessibleName j) AccessibleRole k) AllowDrop l) Anchor m) BackColor n) ToString Description o) BackgroundImage p) ToString

[C#] public override Image BackgroundImage {get; set;}

[C++] public: _property virtual Image* get_BackgroundImage( ); public: _property virtual void set_BackgroundImage (Image*);

[VB] Overrides Public Property BackgroundImage As Image

[JScript] public function get BackgroundImage( ): Image; public function set BackgroundImage(Image);

Description q) BindingContext r) BorderStyle s) ToString

Description

Retrieves the current border style. Values for this are taken from The System.Windows.Forms.BorderStyle enumeration.

Return Value: the current border style.

t) Bottom u) Bounds v) CanFocus w) CanSelect x) Capture y) Causes Validation z) ClientRectangle aa) ClientSize bb) Column Width cc) ToString Description Gets or sets the width of columns in a multicolumn System.Windows.Forms.ListBox.

If you set the value to zero (0), a default width is assigned to each column. If the System.Windows.Forms.ListBox is a multicolumn list box, this property returns the current width of each column in the list. You can use this property to ensure that each column in a multicolumn System.Windows.Forms.ListBox can properly display its items.

dd) CompanyName ee) Container ff) ContainsFocus gg) ContextMenu hh) Controls ii) Created jj) CreateParams kk) ToString Description Retrieves the parameters needed to create the handle. Inheriting classes can override this to provide extra functionality. They should not, however, forget to call base.getCreateParams( ) first to get the struct filled up with the basic info.

ll) Cursor mm) DataBindings nn) DataManager oo) DataSource pp) DefaultImeMode qq) DefaultSize rr) ToString Description ss) DesignMode tt) DisplayMember uu) DisplayRectangle vv) Disposing ww) Dock xx) DrawMode yy) ToString Description Gets or sets the drawing mode for the control.

zz) Enabled aaa) Events bbb) Focused ccc) Font ddd) FontHeight eee) ForeColor fff) ToString Description ggg) Handle hhh) HasChildren iii) Height jjj) HorizontalExtent kkk) ToString Description Gets or sets the width by which the horizontal scroll bar of a System.Windows.Forms.ListBox can scroll.

This property only reports a useful value if the System.Windows.Forms.ListBox.HorizontalScrollbar property is set to true. If the width of the System.Windows.Forms.ListBox is smaller than the value of this property, the horizontal scroll bar horizontally scrolls items in the System.Windows.Forms.ListBox. If the width of the System.Windows- .Forms.ListBox is equal to or greater than this value, the horizontal scroll bar is hidden. The value of this property is not dynamically updated by the System.Windows. Forms.ListBox. This property is useful when the items of the System.Windows.Forms.ListBox are owner-drawn. For example, if the owner drawn items of the System.Windows. Forms.ListBox are 200 pixels wide, but the System.Windows.Forms.ListBox is 60 pixels wide, the System.Windows. Forms.ListBox.HorizontalExtent property would need to be set to 200 in order to scroll the right edge of the items into the visible region of the control.

lll) HorizontalScrollbar mmm) ToString

[C#] public bool HorizontalScrollbar {get; set;}

[C++] public: _property bool get_HorizontalScrollbar( ); public: _property void set_HorizontalScrollbar(bool);

[VB] Public Property HorizontalScrollbar As Boolean

[JScript] public function get HorizontalScrollbar( ): Boolean; public function set HorizontalScrollbar(Boolean);

Description

Gets or sets a value indicating whether a horizontal scroll bar is displayed in the control.

The System.Windows.Forms.ListBox.HorizontalScrollbar property determines whether the System.Windows. Forms.ListBox should display a horizontal scroll bar when the width of items within the System.Windows.Forms.ListBox extend beyond the right edge of the control. When this property is set to true, the scroll bar is automatically displayed based on the width of items in the System.Windows. Forms.ListBox. If the System.Windows.Forms.ListBox is an owner-drawn list box, in order to properly display a horizontal scroll bar, you must set the System.Windows.Forms.ListBox.HorizontalExtent property.

nnn) ImeMode ooo) IntegralHeight ppp) ToString

Description

Gets or sets a value indicating whether the control should resize to avoid showing partial items.

When this property is set to true, the control automatically resizes to ensure that an item is not partially displayed. If you want to maintain the original size of the System.Windows. Forms.ListBox based on the space requirements of your form, set this property to false. If the System.Windows. Forms.ListBox does not contain any items, this property has no effect.

qqq) InvokeRequired rrr) IsAccessible sss) IsDisposed ttt) IsHandleCreated uuu) ItemHeight vvv) ToString Description Gets or sets the height of an item in the System.Windows. Forms.ListBox.

When the System.Windows.Forms.ListBox.DrawMode property is set to DrawMode.OwnerDrawFixed, all items have the same height. When the System.Windows. Forms.ListBox.DrawMode property is set to DrawMode. OwnerDrawVariable, the System.Windows.Forms.ListBox. ItemHeight property specifies the height of each item added to the System.Windows.Forms.ListBox. Because each item in an owner-drawn list can have a different height, you can use the System.Windows.Forms.ListBox.GetItemHeight(System. Int32) method to get the height of a specific item in the System.Windows.Forms.ListBox. If you use the System. Windows.Forms.ListBox.ItemHeight property on a System. Windows.Forms.ListBox with items of variable height, this property returns the height of the first item in the control.

www) Items xxx) ToString

[C#] public ListBox.ObjectCollection Items {get;}

[C++] public: _property ListBox.ObjectCollection* get_Items( );

[VB] Public ReadOnly Property Items As ListBox.ObjectCollection

[JScript] public function get Items( ): ListBox.ObjectCollection;

Description

Gets the items of the System.Windows.Forms.ListBox.

This property enables you to obtain a reference to the list of items that are currently stored in the System.Windows. Forms.ListBox. With this reference, you can add items, remove items, and obtain a count of the items in the collection. For more information on the tasks that can be performed with the item collection, see the System.Windows. Forms.ListBox.ObjectCollection class reference topics.

yyy) Left zzz) Location aaaa) MultiColumn bbbb) ToString

Description

Gets or sets a value indicating whether the System.Windows. Forms.ListBox supports multiple columns.

A multicolumn list box places items into as many columns as are needed to make vertical scrolling unnecessary. The user can use the keyboard to navigate to columns that are not currently visible. Set the System.Windows.Forms.ListBox. HorizontalScrollbar property to true to display a horizontal scroll bar that allows the user to scroll to columns that are not currently shown in the visible region of the System.Windows. Forms.ListBox. The value of the System.Windows. Forms.ListBox.ColumnWidth property determines the width of each column.

cccc) Name dddd) Parent eeee) PreferredHeight ffff) ToString

Description

Gets the combined height of all items in the System.Windows.Forms.ListBox.

This property enables you to determine the height that the System.Windows.Forms.ListBox needs to be sized to in order to display every available item in the list and to avoid displaying vertical scroll bars. If the amount of items in the System. Windows.Forms.ListBox is large, sizing the control using the value of the System.Windows.Forms.ListBox.PreferredHeight property might cause the System.Windows. Forms.ListBox to be sized outside of the client area of the form or container it is located within.

gggg) ProductName
hhhh) ProductVersion
iiii) RecreatingHandle
jjjj) Region
kkkk) RenderRightToLeft
llll) ResizeRedraw
mmmm) Right
nnnn) RightToLeft
oooo) ToString Description Gets or sets a value indicating whether text displayed by the control is displayed from right to left.

This property allows your menus to support languages that are written from right to left. When this property is set to true, item text is displayed from right to left instead of the default left to right method.

pppp) ScrollAlwaysVisible
qqqq) ToString

[C#] public bool ScrollAlwaysVisible {get; set;}

[C++] public: _property bool get ScrollAlwaysVisible( ); public: _property void set_ScrollAlwaysVisible(bool);

[VB] Public Property ScrollAlwaysVisible As Boolean

[JScript] public function get ScrollAlwaysVisible( ): Boolean; public function set ScrollAlwaysVisible(Boolean);

Description

Gets or sets a value indicating whether the vertical scroll bar is shown at all times.

The System.Windows.Forms.ListBox.ScrollAlwaysVisible property indicates whether a vertical scroll bar is always displayed, even if the number of items in the System.Windows.Forms.ListBox does not require displaying the vertical scroll bar. By default, a System.Windows.Forms.ListBox only shows a vertical scroll bar when there are enough items to warrant displaying. For multicolumn list boxes, the System.Windows.Forms.ListBox.ScrollAlwaysVisible property indicates that a horizontal scroll bar is displayed. A vertical scroll bar is never displayed regardless of the value of this property for a multicolumn System.Windows.Forms.ListBox.

rrrr) SelectedIndex
ssss) ToString

[C#] public override int SelectedIndex {get; set;}

[C++] public: _property virtual int get_SelectedIndex( ); public: _property virtual void set_SelectedIndex(int);

[VB] Overrides Public Property SelectedIndex As Integer

[JScript] public function get SelectedIndex( ): int; public function set SelectedIndex(int);

Description

Gets or sets the zero-based index of the currently selected item in a System.Windows.Forms.ListBox.

For a standard System.Windows.Forms.ListBox, you can use this property to determine the index of the item that is selected in the System.Windows.Forms.ListBox. If the System.Windows.Forms.ListBox.SelectionMode property of the System.Windows.Forms.ListBox is set to either SelectionMode.MultiSimple or SelectionMode.MultiExtended (which indicates a multiple-selection System.Windows.Forms.ListBox) and multiple items are selected in the list, this property can return the index to any selected item.

tttt) SelectedIndices
uuuu) ToString

[C#] public ListBox.SelectedIndexCollection SelectedIndices {get;}

[C++] public: _property ListBox.SelectedIndexCollection* get_SelectedIndices( );

[VB] Public ReadOnly Property SelectedIndices As ListBox.SelectedIndexCollection

[JScript] public function get SelectedIndices( ): ListBox.SelectedIndexCollection;

Description

Gets a collection that contains the zero-based indices of all currently selected items in the System.Windows.Forms.ListBox.

For a multiple-selection System.Windows.Forms.ListBox, this property returns a collection containing the indices to all items that are selected in the System.Windows.Forms.ListBox. For a single-selection System.Windows.Forms.ListBox, this property returns a collection containing a single element containing the index of the only selected item in the System.Windows.Forms.ListBox. For more information on how to manipulate the members of the selected indices collection, see System.Windows.Forms.ListBox.SelectedIndexCollection.

vvvv) SelectedItem
wwww) ToString

[C#] public object SelectedItem {get; set;}

[C++] public: _property Object* get_SelectedItem( ); public: _property void set_SelectedItem(Object*);

[VB] Public Property SelectedItem As Object

[JScript] public function get SelectedItem( ): Object; public function set SelectedItem(Object);

Description

Gets or sets the currently selected item in the System.Windows.Forms.ListBox.

For a standard System.Windows.Forms.ListBox, you can use this property to determine which item is selected in the System.Windows.Forms.ListBox. If the System.Windows.Forms.ListBox.SelectionMode property of the System.Windows.Forms.ListBox is set to either SelectionMode.MultiSimple or SelectionMode.MultiExtended (which indicates a multiple-selection System.Windows.Forms.ListBox) and multiple items are selected in the list, this property can return any selected item.

xxxx) SelectedItems
yyyy) ToString

[C#] public ListBox.SelectedObjectCollection SelectedItems {get;}

[C++] public: _property ListBox.SelectedObjectCollection* get_SelectedItems( );

[VB] Public ReadOnly Property SelectedItems As ListBox.SelectedObjectCollection

[JScript] public function get SelectedItems( ): ListBox.SelectedObjectCollection;

Description

Gets a collection containing the currently selected items in the System.Windows.Forms.ListBox.

For a multiple-selection System.Windows.Forms.ListBox, this property returns a collection containing the indices to all items that are selected in the System.Windows.Forms.ListBox. For a single-selection System.Windows.Forms.ListBox, this property returns a collection containing a single element containing the index of the only selected item in the System.Windows.Forms.ListBox. For more information on how to manipulate the members of the selected indices collection, see System.Windows.Forms.ListBox.SelectedIndexCollection.

zzzz) SelectedValue aaaaa) SelectionMode bbbbb) ToString

Description

Gets or sets the method in which items are selected in the System.Windows.Forms.ListBox.

The System.Windows.Forms.ListBox.SelectionMode property enables you to determine how many items in the System.Windows.Forms.ListBox a user can select at one time and how the user can make multiple-selections. When the System.Windows.Forms.ListBox.SelectionMode property is set to SelectionMode.MultiExtended, pressing SHIFT and clicking the mouse or pressing SHIFT and one of the arrow keys (UP ARROW, DOWN ARROW, LEFT ARROW, and RIGHT ARROW) extends the selection from the previously selected item to the current item. Pressing CTRL and clicking the mouse selects or deselects an item in the list. When the property is set to SelectionMode.MultiSimple, a mouse click or pressing the SPACEBAR selects or deselects an item in the list.

ccccc) ShowFocusCues ddddd) ShowKeyboardCues eeeee) Site fffff) Size ggggg) Sorted hhhhh) ToString Description Gets or sets a value indicating whether the items in the System.Windows.Forms.ListBox are sorted alphabetically.

You can use this property to automatically sort items alphabetically in a System.Windows.Forms.ListBox. As items are added to a sorted System.Windows.Forms.ListBox, the items are moved to the appropriate location in the sorted list. When adding items to a System.Windows.Forms.ListBox, it is more efficient to sort the items first and then add new items.

iiiii) TabIndex jjjjj) TabStop kkkkk) Tag mmmmm) ToString

Description

Gets or searches for the text of the currently selected item in the System.Windows.Forms.ListBox.

When the value of this property is set to a string value, the System.Windows.Forms.ListBox searches for the item within the System.Windows.Forms.ListBox that matches the specified text and selects the item. You can also use this property to determine which items are currently selected in the System.Windows.Forms.ListBox. If the System.Windows.Forms.ListBox.SelectionMode property of the System.Windows.Forms.ListBox is set to SelectionMode.MultiExtended, this property returns the text of the first selected item. If the System.Windows.Forms.ListBox.SelectionMode property of the System.Windows.Forms.ListBox is not set to SelectionMode.None, this property returns the text of the first selected item.

nnnnn) Top ooooo) TopIndex ppppp) ToString

Description

Gets or sets the index of the first visible item in the System.Windows.Forms.ListBox.

Initially, the item with the index position zero (0) is at the top of the visible region of the System.Windows.Forms.ListBox. If the contents of the System.Windows.Forms.ListBox have been scrolled, another item might be at the top of the control's display area. You can use this property to obtain the index within the System.Windows.Forms.ListBox.ObjectCollection for the System.Windows.Forms.ListBox of the item that is currently positioned at the top of the visible region of the control. You can also use this property to position an item in the list at the top of the visible region of the control.

qqqqq) TopLevelControl rrrrr) UseTabStops sssss) ToString

Description

Gets or sets a value indicating whether the System.Windows.Forms.ListBox can recognize and expand tab characters when drawing its strings.

ttttt) ValueMember uuuuu) Visible vvvvv) Width wwwww) WindowTarget xxxxx) ToString yyyyy) ToString Description Occurs when a visual aspect of an owner-drawn System.Windows.Forms.ListBox changes.

This event is used by an owner-drawn System.Windows.Forms.ListBox. The event is only raised when the System.Windows.Forms.ListBox.DrawMode property is set to DrawMode.OwnerDrawFixed or DrawMode.OwnerDrawVariable. You can use this event to perform the tasks needed to draw items in the System.Windows.Forms.ListBox. If you have a variable-sized item (when the System.Windows.Forms.ListBox.DrawMode property is set to DrawMode.OwnerDrawVariable), before drawing an item, the System.Windows.Forms.ListBox.MeasureItem event is raised. You can create an event handler for the System.Windows.Forms.ListBox.MeasureItem event to specify the size for the item that you are going to draw in your event handler for the System.Windows.Forms.ListBox.DrawItem event.

zzzzz) ToString

Description

Occurs when an owner-drawn System.Windows.Forms.ListBox is created and the sizes of the list items are determined.

You can create an event handler for this event to specify the size an item will be made before it is drawn in the System.Windows.Forms.ListBox.DrawItem event. The event is only raised when the System.Windows.Forms.ListBox. DrawMode property is set DrawMode.OwnerDrawVariable.

aaaaaa) ToString

Description

Occurs when the System.Windows.Forms.ListBox.SelectedIndex property has changed.

You can create an event handler for this event to determine when the selected index in the System.Windows.Forms.ListBox has been changed. This can be useful when you need to display information in other controls based on the current selection in the System.Windows.Forms.ListBox. You can use the event handler for this event to load the information in the other controls.

bbbbbb) AddItemsCore

[C#] protected virtual void AddItemsCore(object[ ] value);

[C++] protected: virtual void AddItemsCore(Object* value _gc[ ]);

[VB] Overridable Protected Sub AddItemsCore(ByVal value( ) As Object)

[JScript] protected function AddItemsCore(value: Object[ ]);

Description

Adds an array of items to the System.Windows.Forms.ListBox.

You can use this method in your derived classes to add items to the item collection. An array of objects to add to the control.

cccccc) Begin Update

[C#] public void BeginUpdate( );

[C++] public: void BeginUpdate( );

[VB] Public Sub BeginUpdate( )

[JScript] public function BeginUpdate( );

Description

Maintains performance while items are added to the System.Windows.Forms.ListBox one at a time by preventing the control from drawing until the System.Windows.Forms.ListBox.EndUpdate method is called.

The preferred way to add multiple items to the System.Windows.Forms.ListBox is to use the System.Windows.Forms.ListBox.ObjectCollection.AddRange(System.Windows.Forms.ListBox.ObjectCollection) method of the System.Windows.Forms.ListBox.ObjectCollection class (through the System.Windows.Forms.ListBox.Items property of the System.Windows.Forms.ListBox). This enables you to add an array of items to the list in a single operation. However, if you want to add items one at a time using the System.Windows.Forms.ListBox.ObjectCollection.Add (System.Object) method of the System.Windows.Forms.ListBox.ObjectCollection class, you can use the System.Windows.Forms.ListBox.BeginUpdate method to prevent the control from repainting the System.Windows.Forms.ListBox each time an item is added to the list. Once you have completed the task of adding items to the list, call the System.Windows.Forms.ListBox.EndUpdate method to enable the System.Windows.Forms.ListBox to repaint. This way of adding items can prevent flickered drawing of the System.Windows.Forms.ListBox when a large number of items are being added to the list.

dddddd) ClearSelected

[C#] public void ClearSelected( );

[C++] public: void ClearSelected( );

[VB] Public Sub ClearSelected( )

[JScript] public function ClearSelected( );

Description

Unselects all items in the System.Windows.Forms.ListBox. Calling this method is equivalent to setting the System.Windows.Forms.ListBox.SelectedIndex property to negative one (−1). You can use this method to quickly remove the selection from all items in the list.

eeeeee) CreateItemCollection

[C#] protected virtual ObjectCollection CreateItemCollection( );

[C++] protected: virtual ObjectCollection* CreateItemCollection( );

[VB] Overridable Protected Function CreateItem Collection( ) As ObjectCollection

[JScript] protected function CreateItemCollection( ): ObjectCollection;

Description

Creates a new instance of the item collection.

Return Value: A System.Windows.Forms.ListBox.ObjectCollection that represents the new item collection.

You can override this in your derived classes to provide a different collection to store your items.

ffffff) EndUpdate

[C#] public void EndUpdate( );

[C++] public: void EndUpdate( );

[VB] Public Sub EndUpdate( )

[JScript] public function EndUpdate( );

Description

Resumes painting the System.Windows.Forms.ListBox control after painting is suspended by the System.Windows.Forms.ListBox.BeginUpdate method.

The preferred way to add items to the System.Windows.Forms.ListBox is to use the System.Windows.Forms.ListBox.ObjectCollection.AddRange(System.Windows.Forms.ListBox.ObjectCollection) method of the System.Windows.Forms.ListBox.ObjectCollection class (through the System.Windows.Forms.ListBox.Items property of the System.Windows.Forms.ListBox). This enables you to add an array of items to the list at one time. However, if you want to add items one at a time using the System.Windows.Forms.ListBox.ObjectCollection.Add(System.Object) method of the System.Windows.Forms.ListBox.ObjectCollection class, you can use the System.Windows.Forms.ListBox.BeginUpdate method to prevent the control from repainting the System.Windows.Forms.ListBox each time an item is added to the list. Once you have completed the task of adding items to the list, call the System.Windows.Forms.ListBox.EndUpdate method to enable the System.Windows.Forms.ListBox to repaint. This way of adding items can prevent flickered drawing of the System.Windows.Forms.ListBox when a large number of items are being added to the list.

gggggg) FindString

[C#] public int FindString(string s);

[C++] public: int FindString(String* s);

[VB] Public Function FindString(ByVal s As String) As Integer

[JScript] public function FindString(s: String): int; Finds the first item in the System.Windows.Forms.ListBox that starts with the specified string.

Description

Finds the first item in the System.Windows.Forms.ListBox that starts with the specified string.

Return Value: The zero-based index of the first item found; returns ListBox.NoMatches if no match is found.

The search performed by this method is not case-sensitive. The search looks for words that partially match the specified search string parameter, S. You can use this method to search for the first item that matches the specified string. You can then perform tasks such as removing the item that contains the search text by using the System.Windows.Forms.ListBox. ObjectCollection.Remove(System.Object) method or changing the item's text. Once you have found the specified text, if you want to search for other instances of the text in the System.Windows.Forms.ListBox, you can use the version of the System.Windows.Forms.ListBox. FindString(System. String) method that provides a parameter for specifying a starting index within the System.Windows.Forms.ListBox. If you want to perform a search for an exact word match instead of a partial match, use the System.Windows.Forms.ListBox. FindStringExact(System.String) method. The text to search for.

hhhhhh) FindString

[C#] public int FindString(string s, int startIndex);

[C++] public: int FindString(String* s, int startIndex);

[VB] Public Function FindString(ByVal s As String, ByVal startIndex As Integer) As Integer

[JScript] public function FindString(s: String, startIndex: int): int;

Description

Finds the first item in the System.Windows.Forms.ListBox that starts with the specified string. The search starts at a specific starting index.

Return Value: The zero-based index of the first item found; returns ListBox.NoMatches if no match is found.

The search performed by this method is not case-sensitive. The search looks for words that partially match the specified search string parameter, S. You can use this method to search for the first item that matches the specified string at the specified starting index within the list of items for the System.Windows.Forms.ListBox. You can then perform tasks such as removing the item that contains the search text by using the System.Windows.Forms.ListBox.ObjectCollection.Remove (System.Object) method or changing the item's text. This method is typically used after a call has been made using the version of this method that does not specify a starting index. Once an initial item has been found in the list, this method is typically used to find further instances of the search text by specifying the index position in the startIndex parameter of the item after the first found instance of the search text. If you want to perform a search for an exact word match instead of a partial match, use the System.Windows.Forms.ListBox. FindString Exact(System.String) method. The text to search for. The zero-based index of the item before the first item to be searched. Set to negative one (−1) to search from the beginning of the control.

iiiiii) FindStringExact

[C#] public int FindStringExact(string s);

[C++] public: int FindStringExact(String* s);

[VB] Public Function FindStringExact(ByVal s As String) As Integer

[JScript] public function FindStringExact(s: String): int; Finds the first item in the System.Windows.Forms.ListBox that exactly matches the specified string.

Description

Finds the first item in the System.Windows.Forms.ListBox that exactly matches the specified string.

Return Value: The zero-based index of the first item found; returns ListBox.NoMatches if no match is found.

The search performed by this method is not case-sensitive. The search looks for an exact match to the words specified in the search string parameter, S. You can use this method to search for the first item that matches the specified string. You can then perform tasks such as removing the item that contains the search text by using the System.Windows. Forms.ListBox.ObjectCollection.Remove(System.Object) method or changing the item's text. Once you have found the specified text, if you want to search for other instances of the text in the System.Windows.Forms.ListBox, you can use the version of the System.Windows.Forms.ListBox. FindStringExact(System.String) method that provides a parameter for specifying a starting index within the System.Windows.Forms.ListBox. If you want to perform partial word search instead of an exact word match, use the System.Windows.Forms.ListBox. FindString(System.String) method. The text to search for.

jjjjjj) FindStringExact

[C#] public int FindStringExact(string s, int startIndex);

[C++] public: int FindStringExact(String* S, int startIndex);

[VB] Public Function FindStringExact(ByVal s As String, ByVal startIndex As Integer) As Integer

[JScript] public function FindStringExact(s: String, startIndex: int): int;

Description

Finds the first item in the System.Windows.Forms.ListBox that exactly matches the specified string. The search starts at a specific starting index.

Return Value: The zero-based index of the first item found; returns ListBox.NoMatches if no match is found.

The search performed by this method is not case-sensitive. The search looks for words that exactly match the specified search string parameter, S. You can use this method to search for the first item that matches the specified string at the specified starting index within the list of items for the System.Windows.Forms.ListBox. You can then perform tasks such as removing the item that contains the search text using the System.Windows.Forms.ListBox.ObjectCollection.Remove (System.Obje ct) method or change the item's text. This method is typically used after a call has been made using the version of this method that does not specify a starting index.

Once an initial item has been found in the list, this method is typically used to find further instances of the search text by specifying the index position in the startIndex parameter of the item after the first found instance of the search text. If you want to perform a partial word search instead of an exact word match, use the System.Windows.Forms.ListBox. FindString (System.String) method. The text to search for. The zero-based index of the item before the first item to be searched. Set to negative one (−1) to search from the beginning of the control.

kkkkkk) GetItemHeight

[C#] public int GetItemHeight(int index);

[C++] public: int GetItemHeight(int index);

[VB] Public Function GetItemHeight(ByVal index As Integer) As Integer

[JScript] public function GetItemHeight(index: int): int;

Description

Returns the height of an item in the System.Windows.Forms.ListBox.

Return Value: The height, in pixels, of the specified item.

If the System.Windows.Forms.ListBox.DrawMode property is not set to DrawMode.OwnerDrawVariable, the value of the index parameter is ignored because all items in a standard System.Windows.Forms.ListBox are the same size. You can use this property when you are using an owner-drawn System.Windows.Forms.ListBox to determine the size of any item within the System.Windows.Forms.ListBox. The zero-based index of the item to return the height for.

llllll) GetItemRectangle

[C#] public Rectangle GetItemRectangle(int index);

[C++] public: Rectangle GetItemRectangle(int index);

[VB] Public Function GetItemRectangle(ByVal index As Integer) As Rectangle

[JScript] public function GetItemRectangle(index: int): Rectangle;

Description

Returns the bounding rectangle for an item in the System.Windows.Forms.ListBox.

Return Value: A System.Drawing.Rectangle that represents the bounding rectangle for the specified item.

If the item specified in the index parameter is not visible, the rectangle returned by this method will be outside the visible portion of the control. You can use this method to determine the size and position of an item within the list. To get the height of an item, especially a variable-height owner drawn list item, you can use the System.Windows.Forms.ListBox.GetItemHeight(System.Int32) method. The zero-based index of item whose bounding rectangle you want to return.

mmmmmm) GetSelected

[C#] public bool GetSelected(int index);

[C++] public: bool GetSelected(int index);

[VB] Public Function GetSelected(ByVal index As Integer) As Boolean

[JScript] public function GetSelected(index: int): Boolean;

Description

Returns a value indicating whether the specified item is selected.

Return Value: true if the specified item is currently selected in the System.Windows.Forms.ListBox; otherwise, false.

You can used this method to quickly determine whether a specified item is selected. This method is useful when a specific operation needs to be performed when a specific item in a multiple-selection System.Windows.Forms.ListBox is selected. The zero-based index of the item that determines whether it is selected.

nnnnnn) IndexFromPoint

[C#] public int IndexFromPoint(Point p);

[C++] public: int IndexFromPoint(Point p);

[VB] Public Function IndexFromPoint(ByVal p As Point) As Integer

[JScript] public function IndexFromPoint(p: Point): int; Returns the zero-based index of the item at the specified coordinates.

Description

Returns the zero-based index of the item at the specified coordinates.

Return Value: The zero-based index of the item found at the specified coordinates; returns ListBox.NoMatches if no match is found.

This method enables you to determine which item is located at a specific location within the control. You can use this method to determine which item within the list is selected when a user right-clicks over the System.Windows.Forms.ListBox. The location of the cursor can be determined and passed to the p parameter of the System.Windows.Forms.ListBox.IndexFromPoint(System.Drawing.Point) method to determine which item the user right-clicked the mouse over. You can then display a shortcut menu to the user to provide tasks and features based on the specific item. A System.Drawing.Point object containing the coordinates used to obtain the item index.

oooooo) IndexFromPoint

[C#] public int IndexFromPoint(int x, int y);

[C++] public: int IndexFromPoint(int x, int y);

[VB] Public Function IndexFromPoint(ByVal x As Integer, ByVal y As Integer) As Integer

[JScript] public function IndexFromPoint(x: int, y: int): int;

Description

Returns the zero-based index of the item at the specified coordinates.

Return Value: The zero-based index of the item found at the specified coordinates; returns ListBox.NoMatches if no match is found.

This method enables you to determine which item that is located at a specific location within the control. You can use this method to determine which item within the list is selected when a user right-clicks over the System.Windows.Forms.ListBox. The location of the cursor can be determined and passed to the x and y parameters of the System.Windows.Forms.ListBox.IndexFromPoint(System.Drawing.Point) method to determine which item the user right-clicked the mouse over. You can then display a shortcut menu to the user to provide tasks and features based on the specific item. The x coordinate of the location to search. The y coordinate of the location to search.

pppppp) On Change UICues

[C#] protected override void OnChangeUICues(UICuesEventArgs e);

[C++] protected: void OnChangeUICues(UICuesEvent Args* e);

[VB] Overrides Protected Sub OnChangeUICues(ByVal e As UICuesEventArgs)

[JScript] protected override function OnChangeUICues(e: UICuesEventArgs);

Description qqqqqq) OnDataSourceChanged

[C#] protected override void OnDataSourceChanged(Event Args e);

[C++] protected: void OnDataSourceChanged(EventArgs* e);

[VB] Overrides Protected Sub OnDataSourceChanged(ByVal e As EventArgs)

[JScript] protected override function OnDataSourceChanged (e: EventArgs);

Description rrrrrr) OnDisplayMemberChanged

[C#] protected override void OnDisplayMemberChanged (EventArgs e);

[C++] protected: void OnDisplayMemberChanged(Event Args* e);

[VB] Overrides Protected Sub OnDisplayMemberChanged (ByVal e As EventArgs)

[JScript] protected override function OnDisplayMemberChanged(e: EventArgs);

Description ssssss) OnDrawItem

[C#] protected virtual void OnDrawItem(DrawItemEvent Args e);

[C++] protected: virtual void OnDrawItem(DrawItemEvent Args* e);

[VB] Overridable Protected Sub OnDrawItem(ByVal e As DrawItemEventArgs)

[JScript] protected function OnDrawItem(e: DrawItemEvent Args);

Description

Raises the System.Windows.Forms.ListBox.DrawItem event.

Raising an event invokes the event handler through a delegate. For more information, see. A System.Windows.Forms.DrawItemEventArgsthat contains the event data.

tttttt) OnFontChanged

[C#] protected override void OnFontChanged(EventArgs e);

[C++] protected: void OnFontChanged(EventArgs* e);

[VB] Overrides Protected Sub OnFontChanged(ByVal e As EventArgs)

[JScript] protected override function OnFontChanged(e: EventArgs);

Description uuuuuu) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

We need to know when the window handle has been created so we can set up a few things, like column width, etc! Inheriting classes should not forget to call base.OnHandleCreatedo.

vvvvvv) OnHandleDestroyed

[C#] protected override void OnHandleDestroyed(EventArgs e);

[C++] protected: void OnHandleDestroyed(EventArgs* e);

[VB] Overrides Protected Sub OnHandleDestroyed(ByVal e As EventArgs)

[JScript] protected override function OnHandleDestroyed(e: EventArgs);

Description

Overridden to make sure that we set up and clear out items correctly. Inheriting controls should not forget to call base.OnHandleDestroyed( ) Overridden to make sure that we set up and clear out items correctly. Inheriting controls should not forget to call base.OnHandleDestroyed( )

wwwwww) OnMeasureItem

[C#] protected virtual void OnMeasureItem(MeasureItem EventArgs e);

[C++] protected: virtual void OnMeasureItem(MeasureItem EventArgs* e);

[VB] Overridable Protected Sub OnMeasureItem(ByVal e As MeasureItemEventArgs)

[JScript] protected function OnMeasureItem(e: MeasureItem EventArgs);

Description

Raises the System.Windows.Forms.ListBox.MeasureItem event. Raising an event invokes the event handler through a delegate. For more information, see. A System.Windows.Forms.MeasureItemEventArgs that contains the event data.

xxxxxx) OnParentChanged

[C#] protected override void OnParentChanged(EventArgs e);

[C++] protected: void OnParentChanged(EventArgs* e);

[VB] Overrides Protected Sub OnParentChanged(ByVal e As EventArgs)

[JScript] protected override function OnParentChanged(e: EventArgs);

Description

We override this so we can re-create the handle if the parent has changed.

yyyyyy) OnResize

[C#] protected override void OnResize(EventArgs e);

[C++] protected: void OnResize(EventArgs* e);

[VB] Overrides Protected Sub OnResize(ByVal e As Event Args)

[JScript] protected override function OnResize(e: EventArgs);

Description zzzzzz) OnSelectedIndexChanged

[C#] protected override void OnSelectedIndexChanged (EventArgs e);

[C++] protected: void OnSelectedIndexChanged(Event Args* e);

[VB] Overrides Protected Sub OnSelectedIndexChanged (ByVal e As EventArgs)

[JScript] protected override function OnSelectedIndexChanged(e: EventArgs);

Description

Actually goes and fires the selectedIndexChanged event. Inheriting controls should use this to know when the event is fired [this is preferable to adding an event handler on yourself for this event]. They should, however, remember to call base.OnSelectedIndexChanged(e); to ensure the event is still fired to external listeners Actually goes and fires the selectedIndexChanged event. Inheriting controls should use this to know when the event is fired [this is preferable to adding an event handler on yourself for this event]. They should, however, remember to call base.OnSelectedIndexChanged(e); to ensure the event is still fired to external listeners Event object with the details aaaaaaa) RefreshItem

[C#] protected override void RefreshItem(int index);

[C++] protected: void RefreshItem(int index);

[VB] Overrides Protected Sub RefreshItem(ByVal index As Integer)

[JScript] protected override function RefreshItem(index: int);

Description

Reparses the object at the given index, getting new text string for it.

bbbbbbb) SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As BoundsSpecified)

[JScript] protected override function SetBoundsCore(x: int, y: int, width: int, height int, specified BoundsSpecified);

Description

Overrides Control.SetBoundsCore to remember the requestedHeight.

ccccccc) SetItem Core

[C#] protected override void SetItemCore(int index, object value);

[C++] protected: void SetItemCore(int index, Object* value);

[VB] Overrides Protected Sub SetItemCore(ByVal index As Integer, ByVal value As Object)

[JScript] protected override function SetItemCore(index: int, value: Object);

Description ddddddd) SetItemsCore

[C#] protected override void SetItemsCore(object[ ] value);

[C++] protected: void SetItemsCore(Object* value

[VB] Overrides Protected Sub SetItemsCore(ByVal value( ) As Object)

[JScript] protected override function SetItemsCore(value: Object[ ]);

Description

Clears the contents of the System.Windows.Forms.ListBox and adds the specified items to the control. An array of objects to insert into the control.

eeeeeee) SetSelected

[C#] public void SetSelected(int index, bool value);

[C++] public: void SetSelected(int index, bool value);

[VB] Public Sub SetSelected(ByVal index As Integer, ByVal value As Boolean)

[JScript] public function SetSelected(index: int, value: Boolean);

Description

Selects or clears the selection for the specified item in a System.Windows.Forms.ListBox.

You can use this property to set the selection of items in a multiple-selection System.Windows.Forms.ListBox. To select an item in a single-selection System.Windows.Forms.ListBox, use the System.Windows.Forms.ListBox.SelectedIndex property. The zero-based index of the item in a System.Windows.Forms.ListBox to select or clear the selection for. true to select the specified item; otherwise, false.

fffffff) Sort

[C#] protected virtual void Sort( );

[C++] protected: virtual void Sort( );

[VB] Overridable Protected Sub Sort( )

[JScript] protected function Sort( );

Description

Sorts the items in the System.Windows.Forms.ListBox alphabetically.

You can override this method in your derived class to provide your own sorting routine. When adding items to a System.Windows.Forms.ListBox, it is more efficient to sort the items first and then add new items.

ggggggg) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

hhhhhhh) WmReflectCommand

[C#] protected virtual void WmReflectCommand(ref Message m);

[C++] protected: virtual void WmReflectCommand(Message* m);

[VB] Overridable Protected Sub WmReflectCommand(ByRef m As Message)

[JScript] protected function WmReflectCommand(m: Message);

Description iiiiiii) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

The list's window procedure. Inheriting classes can override this to add extra functionality, but should not forget to call base.wndProc(m); to ensure the list continues to function properly. A Windows Message Object.

ListControl class (System.Windows.Forms)

a) WndProc

Description

Provides a common implementation of members for the System.Windows.Forms.ListBox and System.Windows.Forms.ComboBox classes.

The System.Windows.Forms.ListControl class provides implementations of common elements for the System.Windows.Forms.ListBox and System.Windows.Forms.ComboBox controls.

b) ListControl

Example Syntax:

c) WndProc

[C#] protected ListControl( );

[C++] protected: ListControl( );

[VB] Protected Sub New( )

[JScript] protected function ListControl( );

d) AccessibilityObject
e) AccessibleDefaultActionDescription
f) AccessibleDescription
g) AccessibleName
h) AccessibleRole
i) AllowDrop
j) Anchor
k) BackColor
l) BackgroundImage
m) BindingContext
n) Bottom
o) Bounds
p) CanFocus
q) CanSelect
r) Capture
s) Causes Validation
t) ClientRectangle
u) ClientSize
v) CompanyName
w) Container
x) ContainsFocus
y) ContextMenu
z) Controls
aa) Created
bb) CreateParams
cc) Cursor
dd) DataBindings
ee) DataManager
ff) WndProc Description Gets the System.Windows.Forms.CurrencyManager object associated with this control.

The System.Windows.Forms.ListControl.DataManager property is valid if the System.Windows.Forms.ListControl.DataSource property is set. If this is not a data-bound control, the default is null.

gg) DataSource hh) WndProc

[C#] public object DataSource {get; set;}

[C++] public: _property Object* get_DataSource( ); public: _property void set_DataSource(Object*);

[VB] Public Property DataSource As Object

[JScript] public function get DataSource( ): Object; public function set DataSource(Object);

Description

Gets or sets the data source for this System.Windows.Forms.ListControl object.

There are two ways to fill the System.Windows.Forms.ComboBox and System.Windows.Forms.ListBox controls.

ii) DefaultImeMode
jj) DefaultSize
kk) DesignMode
ll) DisplayMember
mm) WndProc

Description

Gets or sets a string that specifies the property of the data source whose contents to display.

The controls that inherit from System.Windows.Forms.ListControl can display diverse types of objects. If the specified property does not exist on the object or the value of System.Windows.Forms.ListControl.DisplayMember is an empty string (" "), the results of the object's ToString method are displayed instead.

nn) DisplayRectangle
oo) Disposing
pp) Dock
qq) Enabled
rr) Events
ss) Focused
tt) Font
uu) FontHeight
vv) ForeColor
ww) Handle
xx) HasChildren
yy) Height
zz) ImeMode
aaa) InvokeRequired
bbb) IsAccessible ccc) IsDisposed
ddd) IsHandleCreated
eee) Left
fff) Location
ggg) Name
hhh) Parent
iii) ProductName
jjj) ProductVersion
kkk) RecreatingHandle
lll) Region
mmm) RenderRightToLeft
nnn) ResizeRedraw
ooo) Right
ppp) RightToLeft
qqq) SelectedIndex
rrr) WndProc Description When overridden in a derived class, gets or sets the zero-based index of the currently selected item.

sss) SelectedValue
ttt) WndProc

[C#] public object SelectedValue {get; set;}

[C++] public: _property Object* get_SelectedValue( ); public: _property void set_SelectedValue(Object*);

[VB] Public Property SelectedValue As Object

[JScript] public function get SelectedValue( ): Object; public function set SelectedValue(Object);

Description

Gets or sets the value of the of the member property specified by the System.Windows.Forms.ListControl.ValueMember property.

If a property is not specified in System.Windows.Forms.ListControl.ValueMember, System.Windows.Forms.ListControl.SelectedValue returns the results of the ToString method of the object.

uuu) ShowFocusCues
vvv) ShowKeyboardCues
www) Site
xxx) Size
yyy) TabIndex
zzz) TabStop
aaaa) Tag
bbbb) Text
cccc) Top
dddd) TopLevelControl
eeee) ValueMember
ffff) WndProc Description Gets or sets a string that specifies the property of the data source from which to draw the value.

You specify the contents of the System.Windows.Forms.ListControl.ValueMember property in cases where you bind data.

gggg) Visible
hhhh) Width
iiii) WindowTarget
jjjj) WndProc

Description

Occurs when the System.Windows.Forms.ListControl.DataSource changes.

When you create a System.Windows.Forms.ListControl delegate, you identify the method that will handle the event. To associate the event with your event handler, add an instance of the delegate to the event. The event handler is called whenever the event occurs, unless you remove the delegate. For more information about event handler delegates, see.

kkkk) WndProc

[C#] public event EventHandler DisplayMemberChanged;

[C++] public: _event EventHandler* DisplayMemberChanged;

[VB] Public Event DisplayMemberChanged As EventHandler

Description

Occurs when the System.Windows.Forms.ListControl.DisplayMember property changes.

When you create a System.Windows.Forms.ListControl delegate, you identify the method that will handle the event. To associate the event with your event handler, add an instance of the delegate to the event. The event handler is called whenever the event occurs, unless you remove the delegate. For more information about event handler delegates, see.

llll) WndProc

Description

Occurs when the System.Windows.Forms.ListControl.SelectedValue property changes.

When you create a System.Windows.Forms.ListControl delegate, you identify the method that will handle the event. To associate the event with your event handler, add an instance of the delegate to the event. The event handler is called whenever the event occurs, unless you remove the delegate. For more information about event handler delegates, see.

mmmm) WndProc

Description

Occurs when the System.Windows.Forms.ListControl.ValueMember property changes.

When you create a System.Windows.Forms.ListControl delegate, you identify the method that will handle the event. To associate the event with your event handler, add an instance of the delegate to the event. The event handler is called whenever the event occurs, unless you remove the delegate. For more information about event handler delegates, see.

nnnn) FilterItemOnProperty

[C#] protected object FilterItemOnProperty(object item);

[C++] protected: Object* FilterItemOnProperty(Object* item);

[VB] Protected Function FilterItemOnProperty(ByVal item As Object) As Object

[JScript] protected function FilterItemOnProperty(item: Object): Object;

Description oooo) FilterItemOnProperty

[C#] protected object FilterItemOnProperty(object item, string field);

[C++] protected: Object* FilterItemOnProperty(Object* item, String* field);

[VB] Protected Function FilterItemOnProperty(ByVal item As Object, ByVal field As String) As Object

[JScript] protected function FilterItemOnProperty(item: Object, field: String) Object;

Description pppp) GetItem Text

[C#] public string GetItemText(object item);

[C++] public: String* GetItemText(Object* item);

[VB] Public Function GetItemText(ByVal item As Object) As String

[JScript] public function GetItemText(item: Object): String;

Description

Returns the text representation of the specified item.

Return Value: If the System.Windows.Forms.ListControl.DisplayMember property is null, the results of the object's toString method. Otherwise the results of the toString method of the member specified in the System.Windows.Forms.ListControl.DisplayMember property. The object from which to get the contents to display.

qqqq) IsInputKey

[C#] protected override bool IsInputKey(Keys keyData);

[C++] protected: bool IsInputKey(Keys keyData);

[VB] Overrides Protected Function IsInputKey(ByVal keyData As Keys) As Boolean

[JScript] protected override function IsInputKey(keyData: Keys): Boolean;

Description

Handling special input keys, such as pgup, pgdown, home, end, etc. . . .

rrrr) OnBindingContextChanged

[C#] protected override void OnBindingContextChanged(EventArgs e);

[C++] protected: void OnBindingContextChanged(Event Args* e);

[VB] Overrides Protected Sub OnBindingContextChanged (ByVal e As EventArgs)

[JScript] protected override function OnBindingContext Changed(e: EventArgs);

Description ssss) OnDataSourceChanged

[C#] protected virtual void OnDataSourceChanged(Event Args e);

[C++] protected: virtual void OnDataSourceChanged(Event Args* e);

[VB] Overridable Protected Sub OnDataSourceChanged (ByVal e As EventArgs)

[JScript] protected function OnDataSourceChanged(e: Event Args);

Description

Raises the System.Windows.Forms.ListControl.DataSourceChanged event.

Raising an event invokes the event handler through a delegate. For more information, see. An System.EventArgs that contains the event data.

tttt) OnDisplayMemberChanged

[C#] protected virtual void OnDisplayMemberChanged (EventArgs e);

[C++] protected: virtual void on DisplayMemberChanged (EventArgs* e);

[VB] Overridable Protected Sub OnDisplayMemberChanged(ByVal e As EventArgs)

[JScript] protected function OnDisplayMemberChanged(e: EventArgs);

Description

Raises the System.Windows.Forms.ListControl.DisplayMemberChanged event.

Raising an event invokes the event handler through a delegate. For more information, see. An System.EventArgs that contains the event data.

uuuu) OnSelectedIndexChanged

[C#] protected virtual void OnSelectedIndexChanged(Event Args e);

[C++] protected: virtual void OnSelectedIndexChanged (EventArgs* e);

[VB] Overridable Protected Sub OnSelectedIndexChanged (ByVal e As EventArgs)

[JScript] protected function OnSelectedIndexChanged(e: EventArgs);

Description

Raises the SelectedIndexChanged event.

Raising an event invokes the event handler through a delegate. For more information, see. An System.EventArgs that contains the event data.

vvvv) OnSelectedValueChanged

[C#] protected virtual void OnSelectedValueChanged(Event Args e);

[C++] protected: virtual void OnSelectedValueChanged (EventArgs* e);

[VB] Overridable Protected Sub OnSelectedValueChanged (ByVal e As EventArgs)

[JScript] protected function OnSelectedValueChanged(e: EventArgs);

Description

Raises the System.Windows.Forms.ListControl.SelectedValueChanged event.

Raising an event invokes the event handler through a delegate. For more information, see. An System.EventArgs that contains the event data.

wwww) OnValueMemberChanged

[C#] protected virtual void OnValueMemberChanged(Event Args e);

[C++] protected: virtual void OnValueMemberChanged (EventArgs* e);

[VB] Overridable Protected Sub OnValueMemberChanged (ByVal e As EventArgs)

[JScript] protected function OnValueMemberChanged(e: EventArgs);

Description

Raises the System.Windows.Forms.ListControl.Value MemberChanged event.

Raising an event invokes the event handler through a delegate. For more information, see. An System.EventArgs that contains the event data.

xxxx) RefreshItem

[C#] protected abstract void RefreshItem(int index);

[C++] protected: virtual void RefreshItem(int index)=0;

[VB] MustOverride Protected Sub RefreshItem(ByVal index As Integer)

[JScript] protected abstract function RefreshItem(index: int);

Description

When overridden in a derived class, resyncronizes the data of the object at the specified index with the contents of the data source. The zero-based index of the item whose data to refresh.

yyyy) SetItemCore

[C#] protected virtual void SetItemCore(int index, object value);

[C++] protected: virtual void SetItemCore(int index, Object* value);

[VB] Overridable Protected Sub SetItemCore(ByVal index As Integer, ByVal value As Object)

[JScript] protected function SetItemCore(index: int, value: Object);

Description zzzz) SetItemsCore

[C#] protected abstract void SetItemsCore(object[ ] items);

[C++] protected: virtual void SetItemsCore(Object* items _gc[ ])=0;

[VB] MustOverride Protected Sub SetItemsCore(ByVal items( ) As Object)

[JScript] protected abstract function SetItemsCore(items: Object[ ]);

Description

When overridden in a derived class, sets a array of objects in a collection in the derived class.

ListView class (System.Windows.Forms)

a) WndProc

Description

Displays a list of items in one of four views. Each item displays a caption, and optionally, an image.

The System.Windows.Forms.ListView.View property specifies how to display the items: Large Icons Small Icons List Details Displays a list of items in one of four views. Each item displays a caption and optionally an image.

b) ListView

Example Syntax:

c) WndProc

[C#] public ListView( );

[C++] public: ListView( );

[VB] Public Sub New( )

[JScript] public function ListView( );

Description

Initializes a new instance of the System.Windows. Forms.ListView class with default styles.

d) AccessibilityObject e) AccessibleDefaultActionDescription f) AccessibleDescription g) AccessibleName h) AccessibleRole i) Activation j) WndProc Description Gets or sets the kind of user action required to activate an item.

k) Alignment l) WndProc

[C#] public ListViewAlignment Alignment {get; set;}

[C++] public: _property ListViewAlignment get_Alignment( ); public: _property void set_Alignment(ListView Alignment);

[VB] Public Property Alignment As ListViewAlignment

[JScript] public function get Alignment( ): ListViewAlignment; public function set Alignment(ListViewAlignment);

Description

Gets or sets the default window side that items are aligned to.

m) AllowColumnReorder n) WndProc

[C#] public bool AllowColumnReorder {get; set;}

[C++] public: _property bool get_AllowColumnReorder( ); public: _property void set_AllowColumnReorder(bool);

[VB] Public Property AllowColumnReorder As Boolean

[JScript] public function get AllowColumnReorder( ): Boolean; public function set AllowColumnReorder(Boolean);

Description

Gets or sets whether the user can drag column headers to other column positions, thus changing the order of displayed columns.

This property is only meaningful in Details view.

o) AllowDrop p) Anchor q) AutoArrange r) WndProc

Description

Gets or sets whether items are automatically arranged according to the alignment property.

Items are also kept snapped to grid.

s) BackColor t) WndProc

[C#] public override Color BackColor {get; set;}

[C++] public: _property virtual Color get_BackColor( ); public: _property virtual void set_BackColor(Color);

[VB] Overrides Public Property BackColor As Color

[JScript] public function get BackColor( ): Color; public function set BackColor(Color);

Description

Gets or sets the background color.

u) BackgroundImage
v) WndProc

[C#] public override Image BackgroundImage {get; set;}

[C++] public: _property virtual Image* get_BackgroundImage( ); public: _property virtual void set_BackgroundImage (Image*);

[VB] Overrides Public Property BackgroundImage As Image

[JScript] public function get BackgroundImage( ): Image; public function set
BackgroundImage(Image);

Description
w) BindingContext
x) BorderStyle
y) WndProc

Description

Gets or sets the border style of the window.
z) Bottom
aa) Bounds
bb) CanFocus
cc) CanSelect
dd) Capture
ee) CausesValidation
ff) CheckBoxes
gg) WndProc Description Gets or sets whether every item will display a checkbox next to it. The user can change the state of the item by clicking the checkbox.
hh) CheckedIndices
ii) WndProc

[C#] public ListView.CheckedIndexCollection CheckedIndices {get;}

[C++] public: _property ListView.CheckedIndexCollection* get_CheckedIndices( );

[VB] Public ReadOnly Property CheckedIndices As ListView.CheckedIndexCollection

[JScript] public function get CheckedIndices( ) ListView.CheckedIndexCollection;

Description

Gets the indices of the currently checked list items.
jj) CheckedItems
kk) WndProc

[C#] public ListView.CheckedListViewItemCollection CheckedItems {get;}

[C++] public: _property ListView.CheckedListViewItemCollection* get_CheckedItems( );

[VB] Public ReadOnly Property CheckedItems As ListView.CheckedListViewItemCollection

[JScript] public function get CheckedItems( ) ListView.CheckedListViewItemCollection;

Description

Gets the currently checked list items.
ll) ClientRectangle
mm) ClientSize
nn) Columns
oo) WndProc Description Gets the collection of columns.
pp) CompanyName
qq) Container
rr) ContainsFocus
ss) ContextMenu
tt) Controls
uu) Created
vv) CreateParams
ww) WndProc Description Computes the handle creation parameters for the ListView control.
xx) Cursor
yy) DataBindings
zz) DefaultImeMode
aaa) DefaultSize
bbb) WndProc Description Deriving classes can override this to configure a default size for their control. This is more efficient than setting the size in the control's constructor.
ccc) DesignMode
ddd) DisplayRectangle
eee) Disposing
fff) Dock
ggg) Enabled
hhh) Events
iii) Focused
jjj) FocusedItem
kkk) WndProc Description Gets the item that currently has the user focus.

This is the item that is drawn with the dotted focus rectangle around it.
lll) Font
mmm) FontHeight
nnn) ForeColor
ooo) WndProc Description Gets or sets the foreground color.
ppp) FullRowSelect
qqq) WndProc

[C#] public bool FullRowSelect {get; set;}

[C++] public: _property bool get_FullRowSelect( ); public: _property void set_FullRowSelect(bool);

[VB] Public Property FullRowSelect As Boolean

[JScript] public function get FullRowSelect( ): Boolean; public function set FullRowSelect(Boolean);

Description

Gets or sets whether clicking an item will select only the item or the entire row the item is in.

This property is only meaningful in Details view.
rrr) GridLines
sss) WndProc

[C#] public bool GridLines {get; set;}

[C++] public: _property bool get_GridLines( ); public: _property void set_GridLines(bool);

[VB] Public Property GridLines As Boolean

[JScript] public function get GridLines( ): Boolean; public function set GridLines(Boolean);

Description

Gets or sets whether grid lines are drawn between items and subitems.

This property is only meaningful in Details view.

ttt) Handle uuu) HasChildren vvv) HeaderStyle www) WndProc

Description

Gets or sets the column header style.

This property is only meaningful in Details view.

xxx) Height yyy) HideSelection zzz) WndProc

Description

Gets or sets whether selected items are hidden when focus is removed from the System.Windows.Forms.ListView.

If false, selected items will still be highlighted (in a different color) when focus is moved away from the System.Windows-.Forms.ListView.

aaaa) HoverSelection bbbb) WndProc

[C#] public bool HoverSelection {get; set;}

[C++] public: _property bool get HoverSelection( ); public: _property void set_HoverSelection(bool);

[VB] Public Property HoverSelection As Boolean

[JScript] public function get HoverSelection( ): Boolean; public function set HoverSelection(Boolean);

Description

Gets or sets whether items can be selected by hovering over them with the mouse.

cccc) ImeMode dddd) InvokeRequired eeee) IsAccessible ffff) IsDisposed gggg) IsHandleCreated hhhh) Items iiii) WndProc Description Gets the list items.

jjjj) LabelEdit kkkk) WndProc

[C#] public bool LabelEdit {get; set;}

[C++] public: _property bool get_LabelEdit( ); public: _property void set_LabelEdit(bool);

[VB] Public Property LabelEdit As Boolean

[JScript] public function get LabelEdit( ): Boolean; public function set LabelEdit(Boolean);

Description

Gets or sets a value indicating whether the user can edit the labels of items in a System.Windows.Forms.ListView.

llll) LabelWrap mmmm) WndProc

[C#] public bool LabelWrap {get; set;}

[C++] public: _property bool get_Label Wrap(; public: _property void set_LabelWrap(bool);

[VB] Public Property LabelWrap As Boolean

[JScript] public function get LabelWrap( ): Boolean; public function set LabelWrap(Boolean);

Description Gets or sets a value indicating whether item labels wrap in icon view.

nnnn) LargeImageList oooo) WndProc

[C#] public ImageList LargeImageList {get; set;}

[C++] public: _property ImageList* get_LargeImageList( ); public: _property void set_LargeImageList(ImageList*);

[VB] Public Property LargeImageList As ImageList

[JScript] public function get LargeImageList( ): ImageList; public function set LargeImageList(ImageList);

Description

Gets or sets the currently set System.Windows.Forms.ImageList for Large Icon mode.

pppp) Left qqqq) ListViewItemSorter rrrr) WndProc

Description

Gets or sets the sorting comparer for this System.Windows.Forms.ListView ssss) Location tttt) MultiSelect uuuu) WndProc Description Gets or sets a value indicating whether multiple items in a System.Windows.Forms.ListView control can be selected at one time.

vvvv) Name wwww)Parent xxxx) ProductName yyyy) ProductVersion zzzz) RecreatingHandle aaaaa) Region bbbbb) RenderRightToLeft ccccc) ResizeRedraw ddddd) Right eeeee) RightToLeft fffff) Scrollable ggggg) WndProc Description Gets or sets whether scroll bars are visible or not.

hhhhh) SelectedIndices iiiii) WndProc

[C#] public ListView.SelectedIndexCollection SelectedIndices {get;}

[C++] public: _property ListView.SelectedIndexCollection* get_SelectedIndices( );

[VB] Public ReadOnly Property SelectedIndices As ListView.SelectedIndexCollection

[JScript] public function get SelectedIndices( ) ListView. SelectedIndexCollection;

Description

Gets the indices of the currently selected list of items.

jjjjj) SelectedItems kkkkk) WndProc

[C#] public ListView.SelectedListViewItemCollection SelectedItems {get;}

[C++] public: _property ListView.SelectedListViewItemCollection* get_SelectedItems( );

[VB] Public ReadOnly Property SelectedItems As ListView.SelectedListViewItemCollection

[JScript] public function get SelectedItems( ) ListView. SelectedListViewItemCollection;

Description

Gets the currently selected list of items.

lllll) ShowFocusCues mmmmm) ShowKeyboardCues nnnnn) Site ooooo) Size ppppp) SmallImageList qqqqq) WndProc Description Gets or sets the currently set SmallIcon image list.

rrrrr) Sorting sssss) WndProc

[C#] public SortOrder Sorting {get; set;}

[C++] public: _property SortOrder get_Sorting( ); public: _property void set Sorting(SortOrder);

[VB] Public Property Sorting As SortOrder

[JScript] public function get Sorting( ): SortOrder; public function set Sorting(SortOrder);

Description

Gets or sets the sort order of the items.

ttttt) StateImageList uuuuu) WndProc

[C#] public ImageList StateImageList {get; set;}

[C++] public: _property ImageList* get_StateImageList( ); public: _property void set_StateImageList(ImageList*);

[VB] Public Property StateImageList As ImageList

[JScript] public function get StateImageList( ): ImageList; public function set StateImageList(ImageList);

Description

Gets or sets the current state System.Windows.Forms.ImageList.

vvvvv) TabIndex wwwww) TabStop xxxxx) Tag yyyyy) Text zzzzz) WndProc

Description aaaaaa) Top bbbbbb) TopItem ccccc) WndProc

Description

Gets the item at the top of the list.

dddddd) TopLevelControl eeeeee) View ffffff) WndProc

Description

Gets or sets the current view.

gggggg) Visible hhhhhh) Width iiiii) WindowTarget jjjjj) WndProc

Description

Occurs after a label has been edited.

kkkkkk) WndProc

Description

Occurs before a label is changed by an edit.

llllll) WndProc

Description

Occurs when the user clicks a column.

mmmmmm) WndProc

Description

Occurs when an item is activated.

nnnnnn) WndProc

[C#] public event ItemCheckEventHandler ItemCheck;

[C++] public: _event ItemCheckEventHandler* ItemCheck;

[VB] Public Event ItemCheck As ItemCheckEventHandler

Description oooooo) WndProc

[C#] public event ItemDragEventHandler ItemDrag;

[C++] public: _event ItemDragEventHandler* ItemDrag;

[VB] Public Event ItemDrag As ItemDragEventHandler

Description pppppp) WndProc

Description qqqqqq) ArrangeIcons

[C#] public void ArrangeIcons( );

[C++] public: void ArrangeIcons( );

[VB] Public Sub ArrangeIcons( )

[JScript] public function ArrangeIcons( );

Description Arranges items Large Icon or Small Icon view.

rrrrrr) ArrangeIcons [C#] public void ArrangeIcons(ListViewAlignment value);

[C++] public: void ArrangeIcons(ListViewAlignment value);

[VB] Public Sub ArrangeIcons(ByVal value As ListView Alignment)

[JScript] public function ArrangeIcons(value: ListView Alignment); Arranges items Large Icon or Small Icon view. The items are arranged according to a particular behavior.

Description

In Large Icon or Small Icon view, arranges the items according to a given behavior.

The arrangement behavior may be: LVA_DEFAULT—Aligns items according to the current alignment style LVA_ALIGNLEFT—Aligns items along the left edge of the window LVA_ALIGNTOP—Aligns items along the top edge of the window LVA_SNAPTOGRID—Snaps all icons to the nearest grid position In Large Icon or Small Icon view, arranges the items according to one of the following behaviors: Arrangement behavior.

ssssss) Begin Update

[C#] public void BeginUpdate( );

[C++] public: void BeginUpdate( );

[VB] Public Sub BeginUpdate( )

[JScript] public function BeginUpdate( );

Description

Prevents the System.Windows.Forms.ListView from redrawing itself until System.Windows.Forms.ListView.EndUpdate is called.

Calling this method before individually adding or removing a large number of Items will improve performance and reduce flicker on the System.Windows.Forms.ListView as items are being updated. Always call System.Windows.Forms.ListView.EndUpdate immediately after the last item is updated.

tttttt) Clear

[C#] public void Clear( );

[C++] public: void Clear( );

[VB] Public Sub Clear( )

[JScript] public function Clear( );

Description

Removes all items and columns from the System.Windows.Forms.ListView uuuuuu) CreateHandle

[C++] protected: void CreateHandle( );

[VB] Overrides Protected Sub CreateHandle( )

[JScript] protected override function CreateHandle( );

Description vvvvvv) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the component.

Call dispose when the component is no longer needed. This method removes the component from its container (if the component has a site) and triggers the dispose event.

wwwwww) EndUpdate

[C#] public void EndUpdate( );

[C++] public: void EndUpdate( );

[VB] Public Sub EndUpdate( )

[JScript] public function EndUpdate( );

Description

Cancels the effect of System.Windows.Forms.ListView.BeginUpdate.

xxxxxx) EnsureVisible

[C#] public void EnsureVisible(int index);

[C++] public: void EnsureVisible(int index);

[VB] Public Sub EnsureVisible(ByVal index As Integer)

[JScript] public function EnsureVisible(index: int);

Description

Ensures that the item is visible, scrolling the view as necessary. The zero-based index of the item to scroll into view if necessary.

yyyyyy) GetItemAt

[C#] public ListViewItem GetItemAt(int x, int y);

[C++] public: ListViewItem* GetItemAt(int x, int y);

[VB] Public Function GetItemAt(ByVal x As Integer, ByVal y As Integer) As ListViewitem

[JScript] public function GetItemAt(x: int, y: int): ListView Item;

DescriptionReturns the current System.Windows.Forms.ListViewItem corresponding to the specific x,y coordinate.

Return Value: System.Windows.Forms.ListViewItem at position, or null if no item exists there. x position to check against y position to check against zzzzzz) GetItemRect

[C#] public Rectangle GetItemRect(int index);

[C++] public: Rectangle GetItemRect(int index);

[VB] Public Function GetItemRect(ByVal index As Integer) As Rectangle

[JScript] public function GetItemRect(index: int): Rectangle; Returns the specified portion of the bounding rectangle for the item of a System.Windows.Forms.ListView Description Returns a list item's bounding rectangle, including subitems.

Return Value: Rectangle associated with the System.Windows.Forms]. .ListViewItem'/>Returns a list item's bounding rectangle, including subitems. Zero based index into ListView's list of items aaaaaaa) GetItemRect

[C#] public Rectangle GetItemRect(int index, ItemBounds Portion portion);

[C++] public: Rectangle GetItemRect(int index, ItemBounds Portion portion);

[VB] Public Function GetItemRect(ByVal index As Integer, ByVal portion As ItemBoundsPortion) As Rectangle

[JScript] public function GetItemRect(index: int, portion: ItemBoundsPortion) Rectangle;

Description

Returns a specific portion of a list item's bounding rectangle.

Return Value: Rectangle associated with the System.Windows.Forms.ListViewItem. Zero based index into the list of items for a System.Windows.Forms.ListView. The portion of the item's rectange desired. This must be one of the values from the System.Windows.Forms.ItemBoundsPortion enumeration.

bbbbbbb) IsInputKey

[C#] protected override bool IsInputKey(Keys keyData);

[C++] protected: bool IsInputKey(Keys keyData);

[VB] Overrides Protected Function IsInputKey(ByVal keyData As Keys) As Boolean

[JScript] protected override function IsInputKey(keyData: Keys): Boolean;

Description

Handles special input keys, such as pgup, pgdown, home, end, and so on.

ccccccc) OnAfterLabelEdit

[C#] protected virtual void OnAfterLabelEdit(LabelEditEventArgs e);

[C++] protected: virtual void OnAfterLabelEdit(LabelEditEventArgs* e);

[VB] Overridable Protected Sub OnAfterLabelEdit(ByVal e As LabelEditEventArgs)

[JScript] protected function OnAfterLabelEdit(e: LabelEditEventArgs);

Description

Raises the System.Windows.Forms.ListView.AfterLabelEdit event. System.Windows.Forms.LabelEditEventArgs object with the details ddddddd) OnBeforeLabelEdit

[C#] protected virtual void OnBeforeLabelEdit(LabelEditEventArgs e);

[C++] protected: virtual void OnBeforeLabelEdit(LabelEditEventArgs* e);

[VB] Overridable Protected Sub OnBeforeLabelEdit(ByVal e As LabelEditEventArgs)

[JScript] protected function OnBeforeLabelEdit(e: LabelEditEventArgs);

Description

Raises the System.Windows.Forms.ListView.BeforeLabelEdit event. System.Windows.Forms.LabelEditEventArgs object with the details eeeeeee) On Column Click

[C+#] protected virtual void OnColumnClick(ColumnClickEventArgs e);

[C++] protected: virtual void OnColumnClick(ColumnClickEventtArgs* e);

[VB] Overridable Protected Sub OnColumnClick(ByVal e As ColumnClickEventArgs)

[JScript] protected function OnColumnClick(e: ColumnClickEventArgs);

Description

Raises the System.Windows.Forms.ListView.ColumnClick event. System.Windows.Forms.ColumnClickEventArgs object with the details.

fffffff) OnEnabledChanged

[C#] protected override void OnEnabledChanged(EventArgs e);

[C++] protected: void OnEnabledChanged(EventArgs* e);

[VB] Overrides Protected Sub OnEnabledChanged(ByVal e As EventArgs)

[JScript] protected override function OnEnabledChanged(e: EventArgs);

Description

Raises the EnabledChanged event. The EventArgs that contains the event data.

ggggggg) OnFontChanged

[C#] protected override void OnFontChanged(EventArgs e);

[C++] protected: void OnFontChanged(EventArgs* e);

[VB] Overrides Protected Sub OnFontChanged(ByVal e As EventArgs)

[JScript] protected override function OnFontChanged(e: EventArgs);

Description

Raises the FontChanged event. The EventArgs that contains the event data.

hhhhhhh) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description iiiiiii) OnHandleDestroyed

[C#] protected override void OnHandleDestroyed(EventArgs e);

[C++] protected: void OnHandleDestroyed(EventArgs* e);

[VB] Overrides Protected Sub OnHandleDestroyed(ByVal e As EventArgs)

[JScript] protected override function OnHandleDestroyed(e: EventArgs);

Description jjjjjjj) OnItemActivate

[C#] protected virtual void OnItemActivate(EventArgs e);

[C++] protected: virtual void OnItemActivate(EventArgs* e);

[VB] Overridable Protected Sub OnItemActivate(ByVal e As EventArgs)

[JScript] protected function OnItemActivate(e: EventArgs);

Description

Raises the System.Windows.Forms.ListView.ItemActivate event. Event object.

kkkkkkk) OnItem Check

[C#] protected virtual void OnItemCheck(ItemCheckEvent Args ice);

[C++] protected: virtual void OnItemCheck(ItemCheck-EventArgs* ice);

[VB] Overridable Protected Sub OnItemCheck(ByVal ice As ItemCheckEventArgs)

[JScript] protected function OnItemCheck(ice: ItemCheck-EventArgs);

Description

This is the code that actually fires the KeyEventArgs. Don't forget to call base.on ItemCheck( ) to ensure that itemCheck vents are correctly fired for all other keys. The KeyPress event that was fired.

lllllll) OnItemDrag

[C#] protected virtual void OnItemDrag(ItemDragEventArgs e);

[C++] protected: virtual void OnItemDrag(ItemDragEvent Args* e);

[VB] Overridable Protected Sub OnItemDrag(ByVal e As ItemDragEventArgs)

[JScript] protected function OnItemDrag(e: ItemDragEvent Args);

Description

Raises the System.Windows.Forms.ListView.ItemDrag event.

mmmmmmm) OnSelectedIndexChanged

[C#] protected virtual void OnSelectedIndexChanged(Event Args e);

[C++] protected: virtual void OnSelectedIndexChanged(E-ventArgs* e);

[VB] Overridable Protected Sub OnSelectedIndexChanged (ByVal e As EventArgs)

[JScript] protected function OnSelectedIndexChanged(e: EventArgs);

Description

Raises the System.Windows.Forms.ListView.S-electedIndexChanged event. Event object with the details nnnnnnn) RealizeProperties

[C#] protected void RealizeProperties( );

[C++] protected: void RealizeProperties( );

[VB] Protected Sub RealizeProperties( )

[JScript] protected function RealizeProperties( );

Description ooooooo) Sort

[C#] public void Sort( );

[C++] public: void Sort( );

[VB] Public Sub Sort( )

[JScript] public function Sort( );

Description

Updated the sorted order Updated the sorted order ppppppp) ToString

[C#] public override string ToString( );

[C++] public: String* ToString( );

[VB] Overrides Public Function ToString( ) As String

[JScript] public override function ToString( ) : String;

Description

Returns a string representation for this control.

Return Value: String Returns a string representation for this control.

qqqqqqq) UpdateExtendedStyles

[C#] protected void UpdateExtendedStyles( );

[C++] protected: void UpdateExtendedStyles( );

[VB] Protected Sub UpdateExtendedStyles( )

[JScript] protected function UpdateExtendedStyles( );

Description rrrrrrr) WndProc

[C#] protected override void WndProc(ref Message m);

[C++] protected: void WndProc(Message* m);

[VB] Overrides Protected Sub WndProc(ByRef m As Mes-sage)

[JScript] protected override function WndProc(m: Message);

Description

ListViewAlignment enumeration (System.Windows-.Forms)

a) WndProc

Description

Specifies how items align in the System.Windows. Forms.ListView.

Use the members of this enumeration to set the value of the System.Windows.Forms.ListView.Alignment property and the System.Windows.Forms.ListView.ArrangeIcons(Sys-tem.Windows.Forms.ListViewAlignment) method of the System.Windows.Forms.ListView control.

b) WndProc

[C#] public const ListViewAlignment Default;

[C++] public: const ListViewAlignment Default;

[VB] Public Const Default As ListViewAlignment

[JScript] public var Default: ListViewAlignment;

Description

When the user moves an item, it remains where it is dropped.

c) WndProc

[C#] public const ListViewAlignment Left;

[C++] public: const ListViewAlignment Left;

[VB] Public Const Left As ListViewAlignment

[JScript] public var Left ListViewAlignment;

DescriptionItems are aligned to the left of the System.Win-dows.Forms.ListView control.

d) WndProc

[C#] public const ListViewAlignment SnapToGrid;

[C++] public: const ListViewAlignment SnapToGrid;

[VB] Public Const SnapToGrid As ListViewAlignment

[JScript] public var SnapToGrid: ListViewAlignment;

Description

Items are aligned to an invisible grid in the control. When the user moves an item, it moves to the closest juncture in the grid.

e) WndProc

[C#] public const ListViewAlignment Top;

[C++] public: const ListViewAlignment Top;

[VB] Public Const Top As ListViewAlignment

[JScript] public var Top: ListViewAlignment;

Description

Items are aligned to the top of the System.Windows.Forms.ListView control.

ListViewItem class (System.Windows.Forms)

a) ToString

Description

Implements an item of a System.Windows.Forms.ListView.

b) ListViewItem

Example Syntax:

c) ToString

[C#] public ListViewItem( );

[C++] public: ListViewItem( );

[VB] Public Sub New( )

[JScript] public function ListViewItem( );

Description d) ListViewItem

Example Syntax:

e) ToString

[C#] public ListViewItem(string text);

[C++] public: ListViewItem(String* text);

[VB] Public Sub New(ByVal text As String)

[JScript] public function ListViewItem(text: String);

Description f) ListViewItem

Example Syntax g) ToString

[C#] public ListViewItem(string[ ] items);

[C++] public: ListViewItem(String* items _gc[ ]);

[VB] Public Sub New(ByVal items( ) As String)

[JScript] public function ListViewItem(items: String[ ]);

Description h) ListViewItem

Example Syntax:

i) ToString

[C#] public ListViewItem(ListViewItem.ListViewSubItem[ ] subItems, int imageIndex);

[C++] public: ListViewItem(ListViewItem.ListViewSubItem* subItems[ ], int imageIndex);

[VB] Public Sub New(ByVal subItems( ) As ListViewItem.ListViewSubItem, ByVal imageIndex As Integer)

[JScript] public function ListViewItem(subItems ListView Item.ListViewSubItem[ ], imageIndex int);

Description j) ListViewItem

Example Syntax:

k) ToString

[C#] public ListViewItem(string text, int imageIndex);

[C++] public: ListViewItem(String* text, int imageIndex);

[VB] Public Sub New(ByVal text As String, ByVal imageIndex As Integer)

[JScript] public function ListViewItem(text: String, imageIndex: int);

Description l) ListViewitem

Example Syntax m) ToString

[C#] public ListViewItem(string[ ] items, int imageIndex);

[C++] public: ListViewItem(String* items _gc[ ], int imageIndex);

[VB] Public Sub New(ByVal items(As String, ByVal imageIndex As Integer)

[JScript] public function ListViewItem(items: String[ ], imageIndex: int);

Description n) ListViewItem

Example Syntax:

o) ToString

[C#] public ListViewItem(string[ ] items, int imageIndex, Color foreColor, Color backColor, Font font);

[C++] public: ListViewItem(String* items gc[ ], int imageIndex, Color foreColor, Color backColor, Font* font);

[VB] Public Sub New(ByVal items( ) As String, ByVal imageIndex As Integer, ByVal foreColor As Color, ByVal backColor As Color, ByVal font As Font)

[JScript] public function ListViewItem(items: String[ ], imageIndex: int, foreColor: Color, backColor: Color, font: Font);

Description p) BackColor q) ToString

[C#] public Color BackColor {get; set;}

[C++] public: _property Color get_BackColor( ); public: _property void set_BackColor(Color);

[VB] Public Property BackColor As Color

[JScript] public function get BackColor( ): Color; public function set BackColor(Color);

Description

The font that this item will be displayed in. If its value is null, it will be displayed using the global font for the System.Windows.Forms.ListView control that hosts it.

r) Bounds s) Tostring

[C#] public Rectangle Bounds {get;}

[C++] public: _property Rectangle get Bounds( );

[VB] Public ReadOnly Property Bounds As Rectangle

[JScript] public function get Bounds( ): Rectangle;

Description

Returns the bounding rectangle of the System.Windows.Forms.ListViewItem, including subitems.

t) Checked u) ToString

[C#] public bool Checked {get; set;}

[C++] public: _property bool get_Checked( ); public: _property void set_Checked(bool);

[VB] Public Property Checked As Boolean

[JScript] public function get Checked( ): Boolean; public function set Checked(Boolean);

Description v) Focused w) ToString

[C#] public bool Focused {get; set;}

[C++] public: _property bool get_Focused( ); public: _property void set_Focused(bool);

[VB] Public Property Focused As Boolean

[JScript] public function get Focused( ) Boolean; public function set Focused(Boolean);

Description

Returns the focus state of the System.Windows.Forms.ListViewItem x) Font y) ToString

[C#] public Font Font {get; set;}

[C++] public: _property Font* get_Font( ); public: _property void set Font(Font*);

[VB] Public Property Font As Font

[JScript] public function get Font( ): Font; public function set Font(Font);

Description z) ForeColor aa) ToString

[C#] public Color ForeColor {get; set;}

[C++] public: _property Color get_ForeColor( ); public: _property void set_ForeColor(Color);

[VB] Public Property ForeColor As Color

[JScript] public function get ForeColor( ): Color; public function set ForeColor(Color);

Description bb) ImageIndex cc) ToString public int ImageIndex {get; set;} public: _property int get ImageIndex( ); public: _property void set_ImageIndex(int);

[VB] Public Property ImageIndex As Integer

[JScript] public function get ImageIndex( ): int; public function set ImageIndex(int);

Description

Returns the current System.Windows.Forms.ImageList.

dd) ImageList ee) ToString

[C#] public ImageList ImageList {get;}

[C++] public: _property ImageList* get_ImageList( );

[VB] Public ReadOnly Property ImageList As ImageList

[JScript] public function get ImageList( ): ImageList;

Description ff) Index gg) ToString

[C#] public int Index {get;}

[C++] public: _property Mt get_Index( );

[VB] Public ReadOnly Property Index As Integer

[JScript] public function get Index( ): int;

Description

Returns the index in the System.Windows.Forms.ListView control for the System.Windows.Forms.ListViewItem.

hh) ListView ii) ToString

[C#] public ListView ListView {get;}

[C++] public: _property ListView* get_ListView( );

[VB] Public ReadOnly Property ListView As ListView

[JScript] public function get ListView( ): ListView;

Description

Returns the System.Windows.Forms.ListView control that holds this System.Windows.Forms.ListViewItem.

jj) Selected kk) ToString

[C#] public bool Selected {get; set;}

[C++] public: _property bool get Selected( ); public: _property void set_Selected(bool);

[VB] Public Property Selected As Boolean

[JScript] public function get Selected( ): Boolean; public function set Selected(Boolean);

Description

Gets or set a value indicating whether the item is selected within a System.Windows.Forms.ListView control.

ll) StateImageIndex mm) ToString

[C#] public int StateImageIndex {get; set;}

[C++] public: _property int get_StateImageIndex( ); public: _property void set_StateImageIndex(int);

[VB] Public Property StateImageIndex As Integer

[JScript] public function get StateImageIndex( ): int; public function set StateImageIndex(int);

Description nn) SubItems oo) ToString

[C#] public ListViewItem.ListViewSubItemCollection SubItems {get;}

[C++] public: _property ListViewItem.ListViewSubItemCollection* get_SubItems( );

[VB] Public ReadOnly Property SubItems As ListViewItem.ListViewSubItemCollection

[JScript] public function get SubItems( ): ListViewItem.ListViewSubItemCollection;

Description pp) Tag qq) ToString

[C#] public object Tag {get; set;}

[C++] public: _property Object* get_Tag( ); public: _property void set_Tag(Object*);

[VB] Public Property Tag As Object

[JScript] public function get Tag( ): Object; public function set Tag(Object);

Description rr) Text ss) ToString

[C#] public string Text {get; set;}

[C++] public: _property String* get Text( ); public: _property void set Text(String*);

[VB] Public Property Text As String

[JScript] public function get Text( ): String; public function set Text(String);

Description

Text associated with this System.Windows.Forms.List ViewItem.

tt) UseItemStyleForSubItems uu) ToString

[C#] public bool UseItemStyleForSubItems {get; set;}

[C++] public: _property bool get_UseItemStyleForSubItems( ); public: _property void set_UseItemStyleForSubItems(bool);

[VB] Public Property UseItemStyleForSubItems As Boolean

[JScript] public function get UseItemStyleForSubItems( ) : Boolean; public function set UseItemStyleForSubItems (Boolean);

Description

Gets or sets a value indicating whether the font and coloring for the System.Windows.Forms.ListViewItem will be used for all of its subitems.

vv) BeginEdit

[C#] public void BeginEdit( );

[C++] public: void BeginEdit( );

[VB] Public Sub BeginEdit( )

[JScript] public function BeginEdit( );

Description

Begins the editing of the item's label.

Only effective if the System.Windows.Forms.ListView.LabelEdit property is true.

ww) Clone

[C#] public virtual object Clone( );

[C++] public: virtual Object* Clone( );

[VB] Overridable Public Function Clone( ) As Object

[JScript] public function Clone( ): Object;

Description xx) Deserialize

[C#] protected virtual void Deserialize(SerializationInfo info, StreamingContext context);

[C++] protected: virtual void Deserialize(SerializationInfo* info, StreamingContext context);

[VB] Overridable Protected Sub Deserialize(ByVal info As SerializationInfo, ByVal context As StreamingContext)

[JScript] protected function Deserialize(info: SerializationInfo, context StreamingContext);

Description yy) Ensure Visible

[C#] public virtual void EnsureVisible( );

[C++] public: virtual void EnsureVisible( );

[VB] Overridable Public Sub EnsureVisible( )

[JScript] public function EnsureVisible( );

Description

Ensures that the item is visible, scrolling the view as necessary.

zz) GetBounds

[C#] public Rectangle GetBounds(ItemBoundsPortion portion);

[C++] public: Rectangle GetBounds(ItemBoundsPortion portion);

[VB] Public Function GetBounds(ByVal portion As ItemBoundsPortion) As Rectangle

[JScript] public function GetBounds(portion: ItemBounds Portion): Rectangle;

Description

Returns a specific portion of the bounding rectangle for the System.Windows.Forms.ListViewItem.

Return Value: Rectangle associated with the System.Windows.Forms.ListViewItem. An System.Windows.Forms.ItemBoundsPortion that represents a portion of the System.Windows.Forms.ListViewItem for which to retrieve the bounding rectangle.

aaa) Remove

[C#] public virtual void Remove( );

[C++] public: virtual void Remove( );

[VB] Overridable Public Sub Remove( )

[JScript] public function Remove( );

Description bbb) Serialize

[C#] protected virtual void Serialize(SerializationInfo info, StreamingContext context);

[C++] protected: virtual void Serialize(SerializationInfo* info, StreamingContext context);

[VB] Overridable Protected Sub Serialize(ByVal info As SerializationInfo, ByVal context As StreamingContext)

[JScript] protected function Serialize(info: SerializationInfo, context StreamingContext);

Description

Saves this System.Windows.Forms.ListViewItem object to the given data stream.

ccc) ISerializable.GetObjectData

[C#] void ISerializable.GetObjectData(SerializationInfo info, StreamingContext context);

[C++] void ISerializable::GetObjectData(SerializationInfo* info, StreamingContext context);

[VB] Sub GetObjectData(ByVal info As SerializationInfo, ByVal context As StreamingContext) Implements ISerializable.GetObjectData

[JScript] function ISerializable.GetObjectData(info: SerializationInfo, context: StreamingContext);

ddd) ToString

[C#] public override string ToString( );

[C++] public: String* ToString( );

[VB] Overrides Public Function ToString( ) As String

[JScript] public override function ToString( ): String;

Description

ListView.ListViewItemCollection class (System.Windows.Forms)

a) ToString

Description b) ListView.List ViewItem Collection

Example Syntax:

c) ToString

[C#] public ListView.ListViewItemCollection(ListView owner);

[C++] public: ListViewItemCollection(ListView* owner);

[VB] Public Sub New(ByVal owner As ListView)

[JScript] public function ListView.ListViewItemCollection (owner: ListView);

Description d) Count e) ToString

[C#] public int Count {get;}

[C++] public: _property int get_Count( );

[VB] Public ReadOnly Property Count As Integer

[JScript] public function get Count( ): int;

Description

Returns the total number of items within the list view.

Return Value: Integer count of items.

f) IsReadOnly g) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description h) Item i) ToString

[C#] public virtual ListViewItem this[int displayIndex] {get; set;}

[C++] public: _property virtual ListViewItem* get_Item(int displayIndex); public: _property virtual void set_Item(int displayIndex, ListViewItem*);

[VB] Overridable Public Default Property Item(ByVal displayIndex As Integer) As ListViewItem

[JScript] returnValue=ListViewItemCollectionObject.Item (displayIndex);ListViewItemCollectionObject. Item(displayIndex)=returnValue;

Description

Returns a System.Windows.Forms.ListViewItem given it's zero-based index into the System.Windows.Forms.ListView.

j) Add

[C#] public virtual ListViewItem Add(ListViewItem value);

[C++] public: virtual ListViewItem* Add(ListViewItem* value);

[VB] Overridable Public Function Add(ByVal value As ListViewItem) As ListViewItem

[JScript] public function Add(value: ListViewItem): ListView Item;

Description

Add an item to the System.Windows.Forms.ListView. The item will be inserted either in the correct sorted position, or, if no sorting is set, at the end of the list.

Return Value: The System.Windows.Forms.ListViewItem object passed in. The System.Windows.Forms.ListViewItem object containing the item data k) Add

[C#] public virtual ListViewItem Add(string text);

[C++] public: virtual ListViewItem* Add(String* text);

[VB] Overridable Public Function Add(ByVal text As String) As ListViewItem

[JScript] public function Add(text: String): ListViewItem;

Description

Add an item to the System.Windows.Forms.ListView. The item will be inserted either in the correct sorted position, or, if no sorting is set, at the end of the list.

Return Value: A System.Windows.Forms.ListViewItem object representing the added item Add an item to the ListView. The item will be inserted either in the correct sorted position, or, if no sorting is set, at the end of the list. The text of the item.

l) Add

[C#] public virtual ListViewItem Add(string text, int imageIndex);

[C++] public: virtual ListViewItem* Add(String* text, int imageIndex);

[VB] Overridable Public Function Add(ByVal text As String, ByVal imageIndex As Integer) As ListViewItem

[JScript] public function Add(text: String, imageIndex: int): ListViewItem;

Description

Add an item to the System.Windows.Forms.ListView. The item will be inserted either in the correct sorted position, or, if no sorting is set, at the end of the list.

Return Value: A System.Windows.Forms.ListViewItem object representing the added item Add an item to the ListView. The item will be inserted either in the correct sorted position, or, if no sorting is set, at the end of the list. The text of the item. An index of the image in the System.Windows.Forms.ImageList object assigned to the System.Windows.Forms.ListView.ImageList property of the System.Windows.Forms.ListView to associate with the item.

m) AddRange

[C#] public void AddRange(ListViewItem[ ] values);

[C++] public: void AddRange(ListViewItem* values[ ]);

[VB] Public Sub AddRange(ByVal values( ) As List ViewItem)

[JScript] public function AddRange(values: ListView Item[ ]);

Description n) Clear

[C#] public virtual void Clear( );

[C++] public: virtual void Clear( );

[VB] Overridable Public Sub Clear( )

[JScript] public function Clear( );

Description

Removes all items from the list view.

o) Contains

[C#] public bool Contains(ListViewItem item);

[C++] public: bool Contains(ListViewItem* item);

[VB] Public Function Contains(ByVal item As ListView Item) As Boolean

[JScript] public function Contains(item: ListViewItem): Boolean;

Description p) CopyTo

[C#] public void CopyTo(Array dest, int index);

[C++] public: _sealed void CopyTo(Array* dest, int index);

[VB] NotOverridable Public Sub CopyTo(ByVal dest As Array, ByVal index As Integer)

[JScript] public function CopyTo(dest: Array, index: int);

Description q) GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description r) IndexOf

[C#] public int IndexOf(ListViewItem item);

[C++] public: int IndexOf(ListViewItem* item);

[VB] Public Function IndexOf(ByVal item As ListViewItem) As Integer

[JScript] public function IndexOf(item: ListViewItem): int;

Description s) Insert

[C#] public ListViewItem Insert(int index, ListViewItem item);

[C++] public: ListViewItem* Insert(int index, List ViewItem* item);

[VB] Public Function Insert(ByVal index As Integer, ByVal item As ListViewItem) As ListViewItem

[JScript] public function Insert(index: int, item: List ViewItem): ListViewItem;

Description t) Insert

[C#] public ListViewItem Insert(int index, string text);

[C++] public: ListViewItem* Insert(int index, String* text);

[VB] Public Function Insert(ByVal index As Integer, ByVal text As String) As ListViewItem

[JScript] public function Insert(index: int, text: String): ListViewItem;

Description u) Insert

[C#] public ListViewItem Insert(int index, string text, int imageIndex);

[C++] public: ListViewItem* Insert(int index, String* text, int imageIndex);

[VB] Public Function Insert(ByVal index As Integer, ByVal text As String, ByVal imageIndex As Integer) As List ViewItem

[JScript] public function Insert(index: int, text: String, imageIndex: int) ListViewItem;

Description v) Remove

[C#] public virtual void Remove(ListViewItem item);

[C++] public: virtual void Remove(ListViewItem* item);

[VB] Overridable Public Sub Remove(ByVal item As ListViewItem)

[JScript] public function Remove(item: ListViewItem);

Description

Removes an item from the System.Windows.Forms.ListView.System.Windows.Forms.ListViewItem to be removed w) RemoveAt

[C#] public virtual void RemoveAt(int index);

[C++] public: virtual void RemoveAt(int index);

[VB] Overridable Public Sub RemoveAt(ByVal index As Integer)

[JScript] public function RemoveAt(index int);

Description

Removes an item from the System.Windows.Forms.ListView. The zero-based index of the item that is to be removed.

x) IList.Add

[C#] int IList.Add(object item);

[C++] int IList::Add(Object* item);

[VB] Function Add(ByVal item As Object) As Integer Implements IList.Add

[JScript] function IList.Add(item: Object): int;

y) IList.Contains

[C#] bool IList.Contains(object item);

[C++] bool IList::Contains(Object* item);

[VB] Function Contains(ByVal item As Object) As Boolean Implements IList.Contains

[JScript] function IList.Contains(item: Object): Boolean;

z) IList.IndexOf

[C#] int IList.IndexOf(object item);

[C++] int IList::IndexOf(Object* item);

[VB] Function IndexOf(ByVal item As Object) As Integer Implements IList.IndexOf

[JScript] function IList.IndexOf(item Object): int;

aa) IList.Insert

[C#] void IList.Insert(int index, object item);

[C++] void IList::Insert(int index, Object* item);

[VB] Sub Insert(ByVal index As Integer, ByVal item As Object) Implements IList.Insert

[JScript] function IList.Insert(index: int, item: Object);

bb) IList.Remove

[C#] void IList.Remove(object item);

[C++] void IList::Remove(Object* item);

[VB] Sub Remove(ByVal item As Object) Implements IList.Remove

[JScript] function IList.Remove(item: Object);

ListViewItemConverter class (System.Windows.Forms)

a) ToString

Description

System.Windows.Forms.ListViewItemConverter is a class that can be used to convert System.Windows.Forms.List ViewItem objects from one data type to another.

b) ListViewItemConverter

Example Syntax:

c) ToString

[C#] public ListViewItemConverter( );

[C++] public: ListViewItemConverter( );

[VB] Public Sub New( )

[JScript] public function ListViewItemConverter( );

d) Can ConvertTo

[C#] public override bool CanConvertTo(ITypeDescriptorContext context, Type destinationType);

[C++] public: bool CanConvertTo(ITypeDescriptorContext* context, Type* destinationType);

[VB] Overrides Public Function CanConvertTo(ByVal context As ITypeDescriptorContext, ByVal destinationType As Type) As Boolean

[JScript] public override function CanConvertTo(context: ITypeDescriptorContext, destinationType: Type): Boolean;

Description

Gets a value indicating whether this converter can convert an object to the given destination type using the context.

Return Value: true if this converter can perform the conversion; otherwise, false.

The context parameter can be used to extract additional information about the environment this converter is being invoked from. This can be null, so always check. Also, properties on the context object can return null. An System.ComponentModel.ITypeDescriptorContext that provides a format context. A System.Type that represents the type you wish to convert to.

e) ConvertTo

[C#] public override object ConvertTo(ITypeDescriptorContext context, CultureInfo culture, object value, Type destinationType);

[C++] public: Object* ConvertTo(ITypeDescriptorContext* context, CultureInfo* culture, Object* value, Type* destinationType);

[VB] Overrides Public Function ConvertTo(ByVal context As ITypeDescriptorContext, ByVal culture As CultureInfo, ByVal value As Object, ByVal destinationType As Type) As Object

[JScript] public override function ConvertTo(context: ITypeDescriptorContext, culture: CultureInfo, value: Object, destinationType: Type): Object;

Description

Converts the given object to another type.

Return Value: The converted object.

The most common types to convert are to and from a string object. The default implementation will make a call to System.Object.ToString on the object if the object is valid and if the destination type is string. If this cannot convert to the destination type, this will throw a System.NotSupportedException. A formatter context. This object can be used to extract additional information about the environment this converter is being invoked from. This may be null, so you should always check. Also, properties on the context object may also return null. An optional culture info. If not supplied the current culture is assumed. The object to convert. The type to convert the object to.

ListViewItem.ListViewSubItem class (System.Windows.Forms)

a) ToString

Description b) ListViewItem.ListViewSubItem

Example Syntax:

c) ToString

[C#] public ListViewItem.ListViewSubItem( );

[C++] public: ListViewSubItem( );

[VB] Public Sub New( )

[JScript] public function ListViewItem.ListViewSubItem( );

Description d) ListViewItem.ListViewSubItem

Example Syntax:

e) ToString

[C#] public ListViewItem.ListViewSubItem(ListViewItem owner, string text);

[C++] public: ListViewSubItem(ListViewItem* owner, String* text);

[VB] Public Sub New(ByVal owner As ListViewItem, ByVal text As String)

[JScript] public function ListViewItem.ListViewSubItem (owner: ListViewItem, text String);

Description f) ListViewItem.ListViewSubItem

Example Syntax:

g) ToString

[C#] public ListViewItem.ListViewSubItem(ListViewItem owner, string text, Color foreColor, Color backColor, Font font);

[C++] public: ListViewSubItem(ListViewItem* owner, String* text, Color foreColor, Color backColor, Font* font);

[VB] Public Sub New(ByVal owner As ListViewItem, ByVal text As String, ByVal foreColor As Color, ByVal backColor As Color, ByVal font As Font)

[JScript] public function ListViewItem.ListViewSubItem (owner: ListViewItem, text: String, foreColor: Color, back-Color: Color, font: Font);

Description h) BackColor i) ToString

[C#] public Color BackColor {get; set;}

[C++] public: _property Color get_BackColor( ); public: _property void set_BackColor(Color);

[VB] Public Property BackColor As Color

[JScript] public function get BackColor( ): Color; public function set BackColor(Color);

Description j) Font k) ToString

[C#] public Font Font {get; set;}

[C++] public: _property Font* get_Font( ); public: _property void set_Font(Font*);

[VB] Public Property Font As Font

[JScript] public function get Font( ): Font; public function set Font(Font);

Description l) ForeColor m) ToString

[C#] public Color ForeColor {get; set;}

[C++] public: _property Color get_ForeColor( ); public: _property void set_ForeColor(Color);

[VB] Public Property ForeColor As Color

[JScript] public function get ForeColor( ): Color; public function set ForeColor(Color);

Description n) Text o) ToString

[C#] public string Text {get; set;}

[C++] public: _property String* get Text( ); public: _property void set_Text(String*);

[VB] Public Property Text As String

[JScript] public function get Text( ): String; public function set Text(String);

Description p) ResetStyle

[C#] public void ResetStyle( );

[C++] public: void ResetStyle( );

[VB] Public Sub ResetStyle( )

[JScript] public function ResetStyle( );

Description q) ToString

[C#] public override string ToString( );

[C++] public: String* ToString( );

[VB] Overrides Public Function ToString( ) As String

[JScript] public override function ToString( ): String;

Description

ListViewItem.ListViewSubItemCollection class (System.Windows.Forms)

a) ToString

Description b) ListViewItem.ListViewSubItemCollection

Example Syntax c) ToString

[C#] public ListViewItem.ListViewSubItemCollection(List-ViewItem owner);

[C++] public: ListViewSubItemCollection(ListViewItem* owner);

[VB] Public Sub New(ByVal owner As ListViewItem)

[JScript] public function ListViewItem.ListViewSubItem-Collection(owner ListViewItem);

Description d) Count e) ToString

[C#] public int Count {get;}

[C++] public: _property int get_Count( );

[VB] Public ReadOnly Property Count As Integer

[JScript] public function get Count( ): it;

Description

Returns the total number of items within the list view.

Return Value: Integer count of items.

f) IsReadOnly g) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description h) Item i) ToString

[C#] public ListViewItem.ListViewSubItem this[int index] {get; set;}

[C++] public: _property ListViewItem.ListViewSubItem* get_Item(int index); public: _property void set_Item(int index, ListViewItem.ListViewSubItem*);

[VB] Public Default Property Item(ByVal index As Integer) As ListViewItem.ListViewSubItem

[JScript] returnValue=List View SubItemCollectionObject. Item(index); ListViewSubItemCollectionObject.Item(index)= returnValue;

Description

Returns a System.Windows.Forms.ListView.List ViewSubItem given it's zero based index into the System.Windows. Forms.ListView.ListViewSubItemCollection. The zero based index into list of sub items.

j) Add

[C#] public ListViewSubItem Add(ListViewItem.ListViewSubItem item);

[C++] public: ListViewSubItem* Add(ListViewItem.ListViewSubItem* item);

[VB] Public Function Add(ByVal item As ListViewItem. ListViewSubItem) As ListViewSubItem

[JScript] public function Add(item: ListViewItem.ListViewSubItem) ListViewSubItem;

Description k) Add

[C#] public ListViewSubItem Add(string text);

[C++] public: ListViewSubItem* Add(String* text);

[VB] Public Function Add(ByVal text As String) As ListViewSubItem

[JScript] public function Add(text: String): ListViewSubItem;

Description l) Add

[C#] public ListViewSubItem Add(string text, Color foreColor, Color backColor, Font font);

[C++] public: ListViewSubItem* Add(String* text, Color foreColor, Color backColor, Font* font);

[VB] Public Function Add(ByVal text As String, ByVal foreColor As Color, ByVal backColor As Color, ByVal font As Font) As ListViewSubItem

[JScript] public function Add(text: String, foreColor: Color, backColor: Color, font Font) ListViewSubItem;

Description m) AddRange

[C#] public void AddRange(ListViewItem.ListViewSubItem[ ] items);

[C++] public: void AddRange(ListViewItem.ListViewSubItem* items[ ]);

[VB] Public Sub AddRange(ByVal items( ) As ListViewItem. ListViewSubItem)

[JScript] public function AddRange(items: ListViewItem. ListViewSubItem[ ]);

Description n) AddRange

[C#] public void AddRange(string[ ] items);

[C++] public: void AddRange(String* items _gc[ ]);

[VB] Public Sub AddRange(ByVal items( ) As String)

[JScript] public function AddRange(items: String[ ]);

Description o) AddRange

[C#] public void AddRange(string[ ] items, Color foreColor, Color backColor, Font font);

[C++] public: void AddRange(String* items _gc[ ], Color foreColor, Color backColor, Font* font);

[VB] Public Sub AddRange(ByVal items( ) As String, ByVal foreColor As Color, ByVal backColor As Color, ByVal font As Font)

[JScript] public function AddRange(items: String[ ], foreColor: Color, backColor: Color, font Font);

Description p) Clear

[C#] public void Clear( );

[C++] public: _sealed void Clear( );

[VB] NotOverridable Public Sub Clear( )

[JScript] public function Clear( );

Description q) Contains

[C#] public bool Contains(ListViewItem.ListViewSubItem subItem);

[C++] public: bool Contains(ListViewItem.ListViewSubItem* subItem);

[VB] Public Function Contains(ByVal subItem As List ViewItem.ListViewSubItem) As Boolean

[JScript] public function Contains(subItem: ListViewItem. ListViewSubItem) Boolean;

Description r) GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description s) IndexOf

[C#] public int IndexOf(ListViewItem.ListViewSubItem subItem);

[C++] public: int IndexOf(ListViewItem.ListViewSubItem* subItem);

[VB] Public Function IndexOf(ByVal subItem As List ViewItem.ListViewSubItem) As Integer

[JScript] public function IndexOf(subItem: ListViewItem. ListViewSubItem): int;

Description t) Insert

[C#] public void Insert(int index, ListViewItem.ListView SubItem item);

[C++] public: void Insert(int index, ListViewItem.ListView-SubItem* item);

[VB] Public Sub Insert(ByVal index As Integer, ByVal item As ListViewItem.ListViewSubItem)

[JScript] public function Insert(index: int, item List ViewItem.ListViewSubItem);

Description u) Remove

[C#] public void Remove(ListViewItem.ListViewSubItem item);

[C++] public: void Remove(ListViewItem.ListViewSub-Item* item);

[VB] Public Sub Remove(ByVal item As ListViewItem.List-ViewSubItem)

[JScript] public function Remove(item: ListViewItem.List-ViewSubItem);

Description v) RemoveAt

[C#] public void RemoveAt(int index);

[C++] public: _sealed void RemoveAt(int index);

[VB] NotOverridable Public Sub RemoveAt(ByVal index As Integer)

[JScript] public function RemoveAt(index: int);

Description w) ICollection.CopyTo

[C#] void ICollection.CopyTo(Array dest, int index);

[C++] void ICollection::CopyTo(Array* dest, int index);

[VB] Sub CopyTo(ByVal dest As Array, ByVal index As Integer) Implements ICollection.CopyTo

[JScript] function ICollection.CopyTo(dest: Array, index: int);

x) IList.Add

[C#] int IList.Add(object item);

[C++] int IList::Add(Object* item);

[VB] Function Add(ByVal item As Object) As Integer Implements IList.Add

[JScript] function IList.Add(item: Object): int;

y) IList.Contains

[C#] bool IList.Contains(object subItem);

[C++] bool IList::Contains(Object* subItem);

[VB] Function Contains(ByVal subItem As Object) As Boolean Implements IList.Contains

[JScript] function IList.Contains(subItem: Object): Boolean;

z) IList.IndexOf

[C#] int IList.IndexOf(object subItem);

[C++] int IList::IndexOf(Object* subItem);

[VB] Function IndexOf(ByVal subItem As Object) As Integer Implements IList.IndexOf

[JScript] function IList.IndexOf(subItem: Object): int; aa) IList.Insert

[C#] void IList.Insert(int index, object item);

[C++] void IList::Insert(int index, Object* item);

[VB] Sub Insert(ByVal index As Integer, ByVal item As Object) Implements IList.Insert

[JScript] function IList.Insert(index: int, item: Object);

bb) IListRemove

[C#] void IList.Remove(object item);

[C++] void IList::Remove(Object* item);

[VB] Sub Remove(ByVal item As Object) Implements IList.Remove

[JScript] function IList.Remove(item: Object);

MainMenu class (System.Windows.Forms)

a) ToString

Description

Represents the menu structure of a form.

The System.Windows.Forms.MainMenu control represents the container for the menu structure of a form. A menu is composed of System.Windows.Forms.MenuItem objects that represent the individual menu commands in the menu structure. Each System.Windows.Forms.MenuItem can be a command for your application or a parent menu for other submenu items. To bind the System.Windows.Forms.MainMenu to the System.Windows.Forms. Form that will display it, assign the System.Windows.Forms.MainMenu to the System.Windows.Forms. Form.Menu property of the System.Windows. Forms. Form b) MainMenu Example Syntax:

c) ToString

[C#] public MainMenu( );

[C++] public: MainMenu( );

[VB] Public Sub New( )

[JScript] public function MainMenu( ); Initializes a new instance of the System.Windows.Forms.MainMenu class.

Description

Initializes a new instance of the System.Windows.Forms. MainMenu class without any specified menu items.

This version of the constructor creates a System.Windows. Forms.MainMenu without any specified System.Windows. Forms.MenuItem objects. To add menu items to the control use the other version of this constructor that accepts an array of System.Windows.Forms.MenuItem objects as its parameter or use the System.Windows.Forms.Menu.Menu-ItemCollection.Add(System.String) method of the System. Windows.Forms.Menu.MenuItems property.

d) MainMenu

Example Syntax:

e) ToString

[C#] public MainMenu(MenuItem[ ] items);

[C++] public: MainMenu(MenuItem* items[ ]);

[VB] Public Sub New(ByVal items( ) As MenuItem)

[JScript] public function MainMenu(items: MenuItem[ ]);

Description

Initializes a new instance of the System.Windows.Forms. MainMenu with a specified set of System.Windows.Forms. MenuItem objects.

You can use this constructor to assign an array of System. Windows.Forms.MenuItem objects to the System.Windows. Forms.MainMenu at the time of its creation. After the System.Windows.Forms.MainMenu has been created you can add additional System.Windows.Forms.MenuItem objects to the System.Windows.Forms.MainMenu using the System. Windows.Forms.Menu.MenuItemCollection.Add(System. String) method of the System.Windows.Forms.Menu.MenuItems property. An array of System.Windows.Forms.MenuItem objects that will be added to the System.Windows. Forms.MainMenu.

f) Container
g) DesignMode
h) Events
i) Handle
j) IsParent
k) MdiListItem
l) MenuItems
m) RightToLeft
n) ToString Description Gets or sets whether the text displayed by the control is displayed from right to left.

This property allows your menus to support languages that are written from right to left. When this property is set to RightToLeft.Yes, the menu item text will be displayed from right to left instead of the default left to right method.

o) Site
p) CloneMenu

[C#] public virtual MainMenu CloneMenu( );

[C++] public: virtual MainMenu* CloneMenu( );

[VB] Overridable Public Function CloneMenu( ) As MainMenu

[JScript] public function CloneMenu( ): MainMenu;

Description

Creates a new System.Windows.Forms.MainMenu that is a duplicate of the current System.Windows.Forms.MainMenu.

Return Value: A System.Windows.Forms.MainMenu that represents the cloned menu.

You can use this method to create a copy of the menu structure stored in a System.Windows.Forms.MainMenu. You can use this method to reuse the menu structure stored in a System. Windows.Forms.MainMenu as the foundation for a new System.Windows.Forms.MainMenu. For example, if you want to create a menu structure that has the same menu items as an existing System.Windows.Forms.MainMenu but will also have additional System.Windows.Forms.MenuItem objects added to it, you can use the System.Windows.Forms.MainMenu.CloneMenu method to create a copy of the original System.Windows.Forms.MainMenu and then add the new System.Windows.Forms.MenuItem objects to the cloned System.Windows.Forms.MainMenu.

q) CreateMenuHandle

[C#] protected override IntPtr CreateMenuHandle( );

[C++] protected: IntPtr CreateMenuHandle( );

[VB] Overrides Protected Function CreateMenuHandle( ) As IntPtr

[JScript] protected override function CreateMenuHandle( ): IntPtr;

Description r) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the resources (other than memory) used by the System.Windows.Forms.MainMenu.

Call System.Windows.Forms.MainMenu.Dispose(System. Boolean) when you are finished using the System.Windows. Forms.MainMenu. The System.Windows.Forms.MainMenu.Dispose(System.Boolean) method leaves the System. Windows.Forms.MainMenu in an unusable state. After calling System.Windows.Forms.MainMenu.Dispose(System. Boolean), you must release all references to the System.Windows.Forms.MainMenu so the memory it was occupying can be reclaimed by garbage collection.

s) GetForm

[C#] public Form GetForm( );

[C++] public: Form* GetForm( );

[VB] Public Function GetForm( ) As Form

[JScript] public function GetForm( ): Form;

Description

Gets the System.Windows.Forms. Form that contains this control.

Return Value: A System.Windows.Forms. Form that is the container for this control. Returns null if the System.Windows.Forms.MainMenu is not currently hosted on a form.

This property enables you to determine if a specific System. Windows.Forms.MainMenu is parented to a form. The property is typically used when multiple System.Windows. Forms.MainMenu objects are being used on a form and you need to determine which one is currently being used by a form.

t) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

MdiClient class (System.Windows.Forms)

a) ToString

Description

Summary to Come

The MdiClient is that window that contains MDI children. This control should not be created directly, but rather only used by System.Windows.Forms. Form.

b) MdiClient

Example Syntax:

c) Tostring

[C#] public MdiClient( );

[C++] public: MdiClient( );

[VB] Public Sub New( )

[JScript] public function MdiClient( );

Description

Creates a new MdiClient.

d) AccessibilityObject e) AccessibleDefaultActionDescription f) AccessibleDescription g) AccessibleName h) AccessibleRole i) AllowDrop j) Anchor k) BackColor l) BackgroundImage m) ToString Description Use parent's BackgroundImage if our BackgroundImage isn't set.

n) BindingContext o) Bottom p) Bounds q) CanFocus r) CanSelect s) Capture t) Causes Validation u) ClientRectangle v) ClientSize w) CompanyName x) Container y) ContainsFocus z) ContextMenu aa) Controls bb) Created cc) CreateParams dd) ToString Description ee) Cursor ff) DataBindings gg) DefaultImeMode hh) DefaultSize ii) DesignMode jj) DisplayRectangle kk) Disposing ll) Dock mm) Enabled nn) Events oo) Focused pp) Font qq) FontHeight rr) ForeColor ss) Handle tt) HasChildren uu) Height vv) ImeMode ww) InvokeRequired xx) IsAccessible yy) IsDisposed zz) IsHandleCreated aaa) Left bbb) Location ccc) MdiChildren ddd) ToString Description The list of MDI children contained. This list will be sorted by the order in which the children were added to the form, not the current ZOrder.

eee) Name fff) Parent ggg) ProductName hhh) ProductVersion iii) RecreatingHandle jjj) Region kkk) RenderRightToLeft lll) ResizeRedraw mmm) Right nnn) RightToLeft ooo) ShowFocusCues ppp) ShowKeyboardCues qqq) Site rrr) Size sss) TabIndex ttt) TabStop uuu) Tag vvv) Text www) Top xxx) TopLevelControl yyy) Visible zzz) Width aaaa) WindowTarget bbbb) CreateControlsInstance

[C#] protected override ControlCollection CreateControlsInstance( );

[C++] protected: ControlCollection* CreateControlsInstance( );

[VB] Overrides Protected Function CreateControls Instance( ) As ControlCollection

[JScript] protected override function CreateControlsInstance( ): ControlCollection;

Description cccc) LayoutMdi

[C#] public void LayoutMdi(MdiLayout value);

[C++] public: void LayoutMdi(MdiLayout value);

[VB] Public Sub LayoutMdi(ByVal value As MdiLayout)

[JScript] public function LayoutMdi(value MdiLayout);

Description

Arranges the MDI child forms according to value, which should be a member of the MdiLayout enum. Any value from the MdiLayout enum class.

dddd) OnResize

[C#] protected override void OnResize(EventArgs e);

[C++] protected: void OnResize(EventArgs* e);

[VB] Overrides Protected Sub OnResize(ByVal e As Event Args)

[JScript] protected override function OnResize(e: Event Args);

Description eeee) ScaleCore

[C#] protected override void ScaleCore(float dx, float dy);

[C++] protected: void ScaleCore(float dx, float dy);

[VB] Overrides Protected Sub ScaleCore(ByVal dx As Single, ByVal dy As Single)

[JScript] protected override function ScaleCore(dx: float, dy: float);

Description

Performs the work of scaling the entire control and any child controls. Ratio to scale the control horizontally. Ratio to scale the control vertically.

ffff) SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As Bounds Specified)

[JScript] protected override function SetBoundsCore(x: int, y: int, width: int, height: int, specified: BoundsSpecified);

Description gggg) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

MdiLayout enumeration (System.Windows.Forms)

a) WndProc

Description

Specifies the layout of multiple document interface (MDI) child windows in an MDI parent window.

Use the members of this enumeration when calling the System.Windows.Forms. Form.LayoutMdi(System.Windows.Forms.MdiLayout) method of the System.Windows.Forms.Form class.

b) WndProc

[C#] public const MdiLayout ArrangeIcons;

[C++] public: const MdiLayout ArrangeIcons;

[VB] Public Const ArrangeIcons As MdiLayout

[JScript] public var ArrangeIcons: MdiLayout;

Description

All MDI child icons are arranged within the client region of the MDI parent form.

c) WndProc public const MdiLayout Cascade;

[C++] public: const MdiLayout Cascade;

[VB] Public Const Cascade As MdiLayout public var Cascade: MdiLayout;

Description

All MDI child windows are cascaded within the client region of the MDI parent form.

d) WndProc

[C#] public const MdiLayout TileHorizontal;

[C++] public: const MdiLayout TileHorizontal;

[VB] Public Const TileHorizontal As MdiLayout

[JScript] public var TileHorizontal: MdiLayout;

Description

All MDI child windows are tiled horizontally within the client region of the MDI parent form.

e) WndProc

[C#] public const MdiLayout TileVertical;

[C++] public: const MdiLayout TileVertical;

[VB] Public Const TileVertical As MdiLayout

[JScript] public var TileVertical: MdiLayout;

Description

All MDI child windows are tiled vertically within the client region of the MDI parent form.

MeasureItemEventArgs class (System.Windows.Forms)

a) ToString

Description

Provides data for the MeasureItem event of the System.Windows.Forms.ListBox, System.Windows.Forms.ComboBox, System.Windows.Forms.CheckedListBox, and System.Windows.Forms.MenuItem controls.

This event is sent when the OwnerDraw property of System.Windows.Forms.ListBox, System.Windows.Forms.ComboBox, System.Windows.Forms.CheckedListBox, or System.Windows.Forms.MenuItem is set to true. It is used to tell the drawing function how to size an item.

b) MeasureItemEventArgs

Example Syntax:

c) ToString

[C#] public MeasureItemEventArgs(Graphics graphics, int index);

[C++] public: MeasureItemEventArgs(Graphics* graphics, int index);

[VB] Public Sub New(ByVal graphics As Graphics, ByVal index As Integer)

[JScript] public function MeasureItemEventArgs(graphics: Graphics, index: int);

Description

Initializes a new instance of the System.Windows.Forms.MeasureItemEventArgs class. The System.Drawing.Graphics object being written to. The index of the item for which you need the height or width.

d) MeasureItemEventArgs

Example Syntax:

e) ToString

[C#] public MeasureItemEventArgs(Graphics graphics, int index, int itemHeight);

[C++] public: MeasureItemEventArgs(Graphics* graphics, int index, int itemHeight);

[VB] Public Sub New(ByVal graphics As Graphics, ByVal index As Integer,

ByVal itemHeight As Integer)

[JScript] public function MeasureItemEventArgs(graphics: Graphics, index: int, itemHeight int); Initializes a new instance of the System.Windows.Forms.MeasureItemEventArgs class.

Description

Initializes a new instance of the System.Windows.Forms.MeasureItemEventArgs class providing a parameter for the item height. The System.Drawing.Graphics object being written to. The index of the item for which you need the height or width. The height of the item to measure relative to the graphics object.

f) Graphics g) ToString

[C#] public Graphics Graphics {get;}

[C++] public: _property Graphics* get_Graphics( );

[VB] Public ReadOnly Property Graphics As Graphics

[JScript] public function get Graphics( ): Graphics;

Description

Gets the System.Drawing.Graphics object to measure against.

You use a System.Drawing.Graphics object to determine the scale to use when setting the System.Windows.Forms.MeasureItemEventArgs.ItemHeight and System.Windows.Forms.MeasureItemEventArgs.ItemWidth. Different types of graphics objects can have different scales, such as the difference in measurement scale between a monitor screen and a printer.

h) Index i) ToString

[C#] public int Index {get;}

[C++] public: _property int get_Index( );

[VB] Public ReadOnly Property Index As Integer [JScript] public function get Index( ): int;

Description

Gets or sets the index of the item for which the height and width is needed.

j) ItemHeight k) ToString

[C#] public int ItemHeight {get; set;}

[C++] public: _property int get_ItemHeight( ); public: _property void set_ItemHeight(int);

[VB] Public Property ItemHeight As Integer

[JScript] public function get ItemHeight( ): int; public function set ItemHeight(int);

Description

Gets or sets the height of the item specified by the System.Windows.Forms.MeasureItemEventArgs.Index.

l) Item Width m) ToString

[C#] public int ItemWidth {get; set;}

[C++] public: _property int get_ItemWidth( ); public: _property void set_ItemWidth(int);

[VB] Public Property ItemWidth As Integer

[JScript] public function get ItemWidth( ): int; public function set ItemWidth(int);

Description

Gets or sets the width of the item specified by the System.Windows.Forms.MeasureItemEventArgs.Index.

This member is only used by System.Windows.Forms.MenuItem. You use this property to ensure the menu is at least as wide as the widest menu item in the menu list.

MeasureItemEventHandler delegate (System.Windows.Forms)

a) ToString

Description

Represents the method that will handle the MeasureItem event of the System.Windows.Forms.ListBox, System.Windows.Forms.ComboBox, System.Windows.Forms.CheckedListBox, or System.Windows.Forms.MenuItem controls. The source of the event. A System.Windows.Forms.MeasureItemEventArgs that contains the event data.

When you create a System.Windows.Forms.MeasureItem EventHandler delegate, you identify the method that will handle the event. To associate the event with your event handler, add an instance of the delegate to the event. The event handler is called whenever the event occurs, unless you remove the delegate. For more information about event handler delegates, see.

Menu class (System.Windows.Forms)

a) ToString

Description

Represents the base functionality for all menus.

This class is the base class for the System.Windows.Forms.MainMenu, System.Windows.Forms.MenuItem, and System.Windows.Forms.ContextMenu classes. You cannot create an instance of this class. The menus for an application are comprised of System.Windows.Forms.MenuItem objects. These can contain other System.Windows.Forms.MenuItem objects, representing submenu items.

The System.Windows.Forms.MenuItem objects can be stored in a System.Windows.Forms.MainMenu for display as an entire menu structure for a form or a System.Windows.Forms.ContextMenu that is used to display shortcut menus. This class provides functionality that is common for all the menu classes.

b) ToString

[C#] public const int FindHandle;

[C++] public: const int FindHandle;

[VB] Public Const FindHandle As Integer

[JScript] public var FindHandle int;

Description

Used by findMenuItem Used by findMenuItem c) ToString

[C#] public const int FindShortcut;

[C++] public: const int FindShortcut;

[VB] Public Const FindShortcut As Integer

[JScript] public var FindShortcut int;

Description

Used by findMenuItem Used by findMenuItem d) Menu

Example Syntax:

e) ToString

[C#] protected Menu(MenuItem[ ] items);

[C++] protected: Menu(MenuItem* items[ ]);

[VB] Protected Sub New(ByVal items( ) As MenuItem)

[JScript] protected function Menu(items: MenuItem[ ]);

Description

This is an abstract class. Instances cannot be created, so the constructor is only called from derived classes.

f) Container g) DesignMode h) Events i) Handle j) ToString

Description

Gets a value representing the window handle for the menu.

You can use this property to obtain the handle to the menu to perform special operations to the menu outside of the functionality provided by this class or its derived classes.

k) IsParent l) ToString

[C#] public virtual bool IsParent {get;}

[C++] public: _property virtual bool get_IsParent( );

[VB] Overridable Public ReadOnly Property IsParent As Boolean [JScript] public function get IsParent( ): Boolean;

Description

Gets a value indicating whether this menu contains any menu items. This property is read-only.

You can use this method to determine whether there are any System.Windows.Forms.MenuItem objects assigned to this menu. This is equivalent to checking for null in the System.Windows.Forms.Menu.MenuItems property.

m) MdiListItem n) ToString

[C#] public MenuItem MdiListItem {get;}

[C++] public: _property MenuItem* get MdiListItem( );

[VB] Public ReadOnly Property MdiListItem As MenuItem

[JScript] public function get MdiListItem( ): MenuItem;

Description

Gets a value indicating the System.Windows.Forms.MenuItem that is used to display a list of Multiple Document Interface (MDI) child forms.

You can use this property to determine whether a System.Windows.Forms.MenuItem has been specified to display the list of open child windows in an MDI application. To use a specific System.Windows.Forms.MenuItem as an MDI list, set the System.Windows.Forms.MenuItem.MdiList property in the System.Windows.Forms.MenuItem to be used.

o) MenuItems p) ToString

[C#] public Menu.MenuItemCollection MenuItems {get;}

[C++] public: _property Menu.MenuItemCollection* get_MenuItems( );

[VB] Public ReadOnly Property MenuItems As Menu.MenuItemCollection

[JScript] public function get MenuItems( ) : Menu.MenuItemCollection;

Description

Gets a value indicating the collection of System.Windows.Forms.MenuItem objects associated with the menu.

You can use this property to obtain a reference to the list of menu items that are currently stored in the menu. For System.Windows.Forms.MainMenu and System.Windows.Forms.ContextMenu objects, the System.Windows.Forms.Menu.MenuItems property contains the entire menu structure in the control. For the System.Windows.Forms. MenuItem class, the System.Windows.Forms.Menu.MenuItems property contains the list of submenu items associated with the System.Windows.Forms.MenuItem. With the reference to the collection of menu items for the menu (provided by this property), you can add and remove menu items, determine the total number of menu items, and clear the list of menu items from the collection. For more information on maintaining the menu item collection for a menu, see the System.Windows.Forms.Menu.MenuItemCollection documentation.

q) Site r) CloneMenu

[C++] protected void CloneMenu(Menu menuSrc);

[C++] protected: void CloneMenu(Menu* menuSrc);

[VB] Protected Sub CloneMenu(ByVal menuSrc As Menu)

[JScript] protected function CloneMenu(menuSrc: Menu);

Description

Copies the System.Windows.Forms.Menu that is passed as a parameter to the current System.Windows.Forms.Menu.

This method copies the entire list of System.Windows.Forms.MenuItem objects (stored in the System.Windows.Forms.Menu passed in to menuSrc) into the current menu. You can use this method in your derived class to clone System.Windows.Forms.MenuItem objects. They can then be reused by other classes that derive from System.Windows.Forms.Menu, such as System.Windows.Forms.MainMenu, System.Windows.Forms.ContextMenu, and System.Windows.Forms.MenuItem. The System.Windows.Forms.Menu to copy.

s) CreateMenuHandle

[C#] protected virtual IntPtr CreateMenuHandle( );

[C++] protected: virtual IntPtr CreateMenuHandle( );

[VB] Overridable Protected Function CreateMenuHandle( ) As IntPtr

[JScript] protected function CreateMenuHandle( ): IntPtr;

Description t) Dispose

[C#] protected overide void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the resources (other than memory) used by the System.Windows.Forms.Menu.

Call System.Windows.Forms.Menu.Dispose(System. Boolean) when you are finished using the System.Windows. Forms.Menu. The System.Windows.Forms.Menu.Dispose (System.Boolean) method leaves the System.Windows. Forms.Menu in an unusable state. After calling System.Windows.Forms.Menu.Dispose(System. Boolean), you must release all references to the System.Windows.Forms.Menu so the memory it was occupying can be reclaimed by garbage collection.

u) FindMenuItem

[C#] public MenuItem FindMenuItem(int type, IntPtr value);

[C++] public: MenuItem* FindMenuItem(int type, IntPtr value);

[VB] Public Function FindMenuItem(ByVal type As Integer, ByVal value As IntPtr) As MenuItem

[JScript] public function FindMenuItem(type: int, value: IntPtr): MenuItem;

Description v) FindMergePosition

[C#] protected int FindMergePosition(int mergeOrder);

[C++] protected: int FindMergePosition(int mergeOrder);

[VB] Protected Function FindMergePosition(ByVal mergeOrder As Integer) As Integer

[JScript] protected function FindMergePosition(mergeOrder: it): int;

Description w) GetContextMenu

[C#] public ContextMenu GetContextMenu( );

[C++] public: ContextMenu* GetContextMenu( );

[VB] Public Function GetContextMenu( ) As ContextMenu

[JScript] public function GetContextMenu( ): ContextMenu;

Description

Gets the System. Windows.Forms.ContextMenu that contains this menu.

Return Value: The System.Windows.Forms.ContextMenu that contains this menu. The default is null.

This method allows you to obtain a reference to the System. Windows.Forms.ContextMenu that this menu is contained in. This property returns null if the menu is not contained in a System.Windows.Forms.ContextMenu. This can occur if the menu is contained in a System.Windows.Forms.MenuItem or System.Windows.Forms.MainMenu, or if the menu is not contained in any menu. You can use this property to determine whether a menu is currently being used, and also to determine where.

x) GetMainMenu

[C#] public MainMenu GetMainMenu( );

[C++] public: MainMenu* GetMainMenu( );

[VB] Public Function GetMainMenu( ) As MainMenu

[JScript] public function GetMainMenu( ) MainMenu;

Description

Gets the System.Windows. Forms.MainMenu that contains this menu.

Return Value: The System.Windows.Forms.Main Menu that contains this menu.

This method allows you to obtain a reference to the System. Windows.Forms.MainMenu this menu is currently located in. This property returns null if the menu is not contained in a System.Windows.Forms.MainMenu. This can occur if the menu is contained in a System.Windows.Forms.MenuItem or System.Windows.Forms.ContextMenu, or if the menu is not contained in any menu. You can use this property to determine whether a menu is currently being used, and also to determine where.

y) MergeMenu

[C#] public virtual void MergeMenu(Menu menuSrc);

[C++] public: virtual void MergeMenu(Menu* menuSrc);

[VB] Overridable Public Sub MergeMenu(ByVal menuSrc As Menu)

[JScript] public function MergeMenu(menuSrc: Menu);

Description

Merges the System.Windows.Forms.MenuItem objects of one menu with the current menu.

This method merges System.Windows.Forms.MenuItem objects from one menu with the current menu. The System. Windows.Forms.Menu whose menu items are merged with the menu items of the current menu.

z) ProcessCmdKey

[C#] protected virtual bool ProcessCmdKey(ref Message msg, Keys keyData);

[C++] protected: virtual bool ProcessCmdKey(Message* msg, Keys keyData);

[VB] Overridable Protected Function ProcessCmdKey(ByRef msg As Message, ByVal keyData As Keys) As Boolean

[JScript] protected function ProcessCmdKey(msg: Message, keyData: Keys): Boolean;

Description aa) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

MenuGlyph enumeration (System.Windows.Forms)

a) ToString

Description

Specifies the image to draw when drawing a menu with the System.Windows.Forms.ControlPaint.DrawMenuGlyph (System.Drawing.Graphics, System.Drawing.Rectangle, System.Windows.Forms.MenuGlyph) method.

The values of this enumeration are used in the System.Windows.Forms.ControlPaint.DrawMenuGlyph(System.Drawing.Graphics,System.Drawing.Rectangle,System.Windows.Forms. MenuGlyph) method of the System.Windows.Forms.ControlPaint class. These values represent the different types of symbols that can be drawn on a menu item.

b) ToString

[C#] public const MenuGlyph Arrow;

[C++] public: const MenuGlyph Arrow;

[VB] Public Const Arrow As MenuGlyph

[JScript] public var Arrow MenuGlyph;

Description

Draw s a submenu arrow.

c) ToString

[C#] public const MenuGlyph Bullet;

[C++] public: const MenuGlyph Bullet;

[VB] Public Const Bullet As MenuGlyph

[JScript] public var Bullet: MenuGlyph;

Description

Draws a menu bullet.

d) ToString

[C#] public const MenuGlyph Checkmark;

[C++] public: const MenuGlyph Checkmark;

[VB] Public Const Checkmark As MenuGlyph

[JScript] public var Checkark: MenuGlyph;

Description

Draws a menu check mark.

e) ToString

[C#] public const MenuGlyph Max;

[C++] public: const MenuGlyph Max;

[VB] Public Const Max As MenuGlyph

[JScript] public var Max: MenuGlyph;

Description f) ToString

[C#] public const MenuGlyph Min;

[C++] public: const MenuGlyph Min;

[VB] Public Const Min As MenuGlyph

[JScript] public var Min MenuGlyph;

Description

MenuItem class (System.Windows.Forms)

a) ToString

Description

Represents an individual item that is displayed within a System.Windows.Forms.MainMenu or System.Windows. Forms. ContextMenu.

In order for a System.Windows.Forms.MenuItem to be displayed, you must add it to a System.Windows.Forms.MainMenu or System.Windows.Forms.ContextMenu. To create submenus, you can add System.Windows.Forms.MenuItem objects to the System.Windows.Forms.Menu.MenuItems property of the parent System.Windows.Forms.MenuItem.

b) MenuItem

Example Syntax:

c) ToString

[C#] public MenuItem( );

[C++] public: MenuItem( );

[VB] Public Sub New( )

[JScript] public function MenuItem( ); Initializes a new instance of the System.Windows.Forms.MenuItem class.

Description

Initializes a System.Windows.Forms.MenuItem with a blank caption.

Once you have created a blank System.Windows.Forms. MenuItem using this constructor, you can use the properties and methods of the System.Windows.Forms.MenuItem class to specify the appearance and behavior of your System.Windows.Forms.MenuItem.

d) MenuItem

Example Syntax:

e) ToString

[C#] public MenuItem(string text);

[C++] public: MenuItem(String* text);

[VB] Public Sub New(ByVal text As String)

[JScript] public function MenuItem(text: String);

Description

Initializes a new instance of the System.Windows.Forms. MenuItem class with a specified caption for the menu item.

When you specify a caption for your menu item with the text parameter, you can also specify an access key by placing an '&' character before the character to be used as the access key. For example, to specify the "F" in "File" as an access key, you would specify the caption for the menu item as "&File". You can use this feature to provide keyboard navigation for your menus. The caption for the menu item.

f) MenuItem

Example Syntax g) ToString

[C+] public MenuItem(string text, EventHandler onclick);

[C++] public: MenuItem(String* text, EventHandler* onClick);

[VB] Public Sub New(ByVal text As String, ByVal onClick As EventHandler)

[JScript] public function MenuItem(text: String, onClick: EventHandler);

Description

Initializes a new instance of the class with a specified caption and event handler for the System.Windows.Forms.MenuItem.Click event of the menu item.

When you specify a caption for your menu item with the text parameter, you can also specify an access key by placing an '&' before the character to be used as the access key. For example, to specify the "F" in "File" as an access key, you would specify the caption for the menu item as "&File". You can use this feature to provide keyboard navigation for your menus. The caption for the menu item. The System. EventHandler that handles the System.Windows.Forms. MenuItem.Click event for this menu item.

h) MenuItem
Example Syntax:
i) ToString

[C#] public MenuItem(string text, MenuItem[ ] items);

[C++] public: MenuItem(String* text, MenuItem* items[ ]);

[VB] Public Sub New(ByVal text As String, ByVal items( ) As MenuItem)

[JScript] public function MenuItem(text: String, items: MenuItem[ ]);

Description

Initializes a new instance of the class with a specified caption and an array of submenu items defined for the menu item.

When you specify a caption for your menu item with the text parameter, you can also specify an access key by placing an '&' before the character to be used as the access key. For example, to specify the "F" in "File" as an access key, you would specify the caption for the menu item as "&File". You can use this feature to provide keyboard navigation for your menus. The caption for the menu item. An array of System. Windows.Forms.MenuItem objects that contains the submenu items for this menu item.

j) MenuItem
Example Syntax
k) ToString

[C#] public MenuItem(string text, EventHandler onClick, Shortcut shortcut);

[C++] public: MenuItem(String* text, EventHandler* onClick, Shortcut shortcut);

[VB] Public Sub New(ByVal text As String, ByVal onClick As EventHandler, ByVal shortcut As Shortcut)

[JScript] public function MenuItem(text: String, onClick: EventHandler, shortcut Shortcut);

Description

Initializes a new instance of the class with a specified caption, event handler, and associated shortcut key for the menu item.

When you specify a caption for your menu item with the text parameter, you can also specify an access key by placing an '&' before the character to be used as the access key. For example, to specify the "F" in "File" as an access key, you would specify the caption for the menu item as "&File". You can use this feature to provide keyboard navigation for your menus. This constructor also enables you to specify a shortcut key in addition to an access key to provide keyboard navigation. Shortcut keys allow you to specify a combination of keys that can be used to activate the menu item. The caption for the menu item. The System.EventHandler that handles the System.Windows.Forms.MenuItem.Click event for this menu item. One of the System.Windows.Forms.Shortcut values.

l) MenuItem
Example Syntax:
m) ToString

[C#] public MenuItem(MenuMerge mergeType, int merge Order, Shortcut shortcut, string text, EventHandler onClick, EventHandler on Popup, EventHandler on Select, Menu Item[ ] items);

[C++] public: MenuItem(MenuMerge mergeType, int mergeOrder, Shortcut shortcut, String* text, EventHandler* onClick, EventHandler* on Popup, EventHandler* on Select, MenuItem* items[ ]);

[VB] Public Sub New(ByVal mergeType As MenuMerge, ByVal mergeOrder As Integer, ByVal shortcut As Shortcut, ByVal text As String, ByVal onClick As EventHandler, ByVal onPopup As EventHandler, ByVal on Select As EventHandler, ByVal items( ) As MenuItem)

[JScript] public function MenuItem(mergeType: MenuMerge, mergeOrder: int, shortcut: Shortcut, text: String, onClick: EventHandler, on Popup EventHandler, on Select: EventHandler, items: MenuItem[ ]);

Description

Initializes a new instance of the System.Windows.Forms. MenuItem class with a specified caption; defined event-handlers for the System.Windows.Forms.MenuItem.Click, System.Windows.Forms.MenuItem.Select and System.Windows.Forms.MenuItem.Popup events; a shortcut key; a merge type; and order specified for the menu item.

When you specify a caption for your menu item with the text parameter, you can also specify an access key by placing an '&' before the character to be used as the access key. For example, to specify the "F" in "File" as an access key, you would specify the caption for the menu item as "&File". You can use this feature to provide keyboard navigation for your menus. One of the System.Windows.Forms.MenuMerge values. The relative position that this menu item will assume in a merged menu. One of the System.Windows.Forms.Shortcut values. The caption for the menu item. The System. EventHandler that handles the System.Windows.Forms. MenuItem.Click event for this menu item. The System. EventHandler that handles the System.Windows.Forms. MenuItem.Popup event for this menu item. The System. EventHandler that handles the System.Windows.Forms. MenuItem.Select event for this menu item. An array of System.Windows.Forms.MenuItem objects that contains the submenu items for this menu item.

n) BarBreak
o) ToString

[C#] public bool BarBreak {get; set;}

[C++] public: _property bool get_BarBreak( ); public: _property void set_BarBreak(bool);

[VB] Public Property BarBreak As Boolean

[JScript] public function get BarBreak( ): Boolean; public function set BarBreak(Boolean);

Description

Gets or sets a value indicating whether the System.Windows. Forms.MenuItem is placed on a new line (for a menu item added to a System.Windows.Forms.MainMenu object) or in a new column (for a submenu item or menu item displayed in a System.Windows.Forms.ContextMenu).

You can use the System.Windows.Forms.MenuItem. BarBreak property to create a menu where each menu item is placed next to each other horizontally instead of in a vertical list. You can also use this property to create a menu bar that contains multiple rows of top-level menu items.

p) Break
q) ToString

[C#] public bool Break {get; set;}

[C++] public: _property bool get_Break( ); public: _property void set_Break(bool);

[VB] Public Property Break As Boolean

[JScript] public function get Break( ): Boolean; public function set Break(Boolean);

Description

Gets or sets a value indicating whether the item is placed on a new line (for a menu item added to a System.Windows.Forms.MainMenu object) or in a new column (for a menu item or submenu item displayed in a System.Windows.Forms.ContextMenu).

You can use the System.Windows.Forms.MenuItem.Break property to create a menu where each menu is placed next to each other horizontally instead of in a vertical list. You can also use this property to create a menu bar that contains multiple rows of top-level menu items.

r) Checked s) ToString

[C#] public bool Checked {get; set;}

[C++] public: _property bool get_Checked( ); public: _property void set_Checked(bool);

[VB] Public Property Checked As Boolean

[JScript] public function get Checked( ): Boolean; public function set Checked(Boolean);

Description

Gets or sets a value indicating whether a check mark appears next to the text of the menu item.

You can use the System.Windows.Forms.MenuItem.Checked property in combination with other menu items in a menu to provide state for an application. For example, you can place a check mark on a menu item in a group of items to identify the size of the font to be displayed for the text in an application. You can also use the System.Windows.Forms.MenuItem.Checked property to identify the selected menu item in a group of mutually exclusive menu items.

t) Container u) DefaultItem v) ToString

Description

Gets or sets a value indicating whether the menu item is the default menu item.

The default menu item for a menu is boldfaced. When the user double-clicks a submenu that contains a default item, the default item is selected, and the submenu is closed. You can use the System.Windows.Forms.MenuItem.DefaultItem property to indicate, the default action that is expected in a menu or context menu.

w) DesignMode x) Enabled y) ToString

Description

Gets or sets a value indicating whether the menu item is enabled.

A System.Windows.Forms.MenuItem that is disabled is displayed in a gray color to indicate its state. When a parent menu item is disabled, all submenu items are not displayed.

z) Events aa) Handle bb) Index cc) ToString

Description

Gets or sets a value indicating the position of the menu item in its parent menu.

This property provides the indexed position of a menu item in the menu item collection of its parent menu. You can use this property to reposition a menu item to a different location within its menu. You can also use this property when creating a System.Windows.Forms.MenuItem to specify its position in a menu structure at the time of creation.

dd) IsParent ee) ToString

[C#] public override bool IsParent {get;}

[C++] public: _property virtual bool get IsParent( );

[VB] Overrides Public ReadOnly Property IsParent As Boolean

[JScript] public function get IsParent( ): Boolean;

Description

Gets a value indicating whether the menu item contains child menu items.

You can use this property with the System.Windows.Forms.MenuItem.Parent property to navigate in code through an entire menu structure.

ff) MdiList gg) ToString

[C#] public bool MdiList {get; set;}

[C++] public: _property bool get_MdiList( ); public: _property void set_MdiList(bool);

[VB] Public Property MdiList As Boolean

[JScript] public function get MdiList( ): Boolean; public function set MdiList(Boolean);

Description

Gets or sets a value indicating whether the menu item will be populated with a list of the Multiple Document Interface (MDI) child windows that are displayed within the associated form.

When a menu item is selected to display an MDI child window list, the list is displayed as a submenu of the menu item. Only forms that are defined as MDI child forms are displayed in the window list. Only nine child windows can be displayed at a time. If there are more than nine child windows displayed, a "More Windows . . . " menu item is displayed at the end of the window list. Clicking this menu item displays a dialog box with a complete list of the child windows that are currently active.

hh) MdiListItem ii) MenuID jj) ToString

Description

Gets a value indicating the Windows identifier for this menu item.

kk) MenuItems ll) MergeOrder mm) ToString

Description

Gets or sets a value indicating the relative position of the menu item when it is merged with another.

The merge order of a menu item specifies the relative position that this menu item will assume if the menu structure that the System.Windows.Forms.MenuItem is contained in is merged with another.

nn) MergeType oo) ToString

[C#] public MenuMerge MergeType {get; set;}

[C++] public: _property MenuMerge get MergeType( ); public: _property void set MergeType(MenuMerge);

[VB] Public Property MergeType As MenuMerge

[JScript] public function get MergeType( ): MenuMerge; public function set MergeType(MenuMerge);

Description

Gets or sets a value indicating the behavior of this menu item when its menu is merged with another.

The merge type of a menu item indicates how the menu item behaves when it has the same merge order as another menu item being merged. You can use merged menus to create a consolidated menu based on two or more existing menus.

pp) Mnemonic qq) ToString

[C#] public char Mnemonic {get;}

[C++] public: _property _wchar_t get_Mnemonic( );

[VB] Public ReadOnly Property Mnemonic As Char

[JScript] public function get Mnemonic( ): Char;

Description

Gets a value indicating the mnemonic character that is associated with this menu item.

The mnemonic character is the first character after a ampersand character in the text of the System.Windows.Forms.MenuItem. This property will not return a mnemonic if two ampersand characters are placed together as the ampersands are used to display an ampersand in the text of the System.Windows.Forms.MenuItem instead of defining a mnemonic character.

rr) OwnerDraw ss) ToString

[C#] public bool OwnerDraw {get; set;}

[C++] public: _property bool get_OwnerDraw( ); public: _property void set_OwnerDraw(bool);

[VB] Public Property OwnerDraw As Boolean

[JScript] public function get OwnerDraw( ): Boolean; public function set OwnerDraw(Boolean);

Description

Gets or sets a value indicating whether the code that you provide draws the menu item or Windows draws the menu item.

When the System.Windows.Forms.MenuItem.OwnerDraw property is set to true, you need to handle all drawing of the menu item. You can use this capability to create your own special menu displays.

tt) Parent uu) ToString

[C#] public Menu Parent {get;}

[C++] public: _property Menu* get_Parent( );

[VB] Public ReadOnly Property Parent As Menu

[JScript] public function get Parent( ): Menu;

Description

Gets a value indicating the menu that contains this menu item.

You can use this property to obtain the System.Windows.Forms.Menu object for a submenu. You can cast the System.Windows.Forms.Menu object returned by this property to a System.Windows.Forms.MenuItem object to manipulate it.

vv) RadioCheck ww) ToString

[C#] public bool RadioCheck {get; set;}

[C++] public: _property bool get RadioCheck( ); public: _property void set_RadioCheck(bool);

[VB] Public Property RadioCheck As Boolean

[JScript] public function get RadioCheck( ): Boolean; public function set RadioCheck(Boolean);

Description

Gets or sets a value indicating whether the System.Windows.Forms.MenuItem, if checked, displays a radio-button instead of a check mark.

Check marks do not necessarily imply a mutually exclusive state for a group of menu items. You can use this property to indicate to the user that the check mark of a menu item is mutually exclusive.

xx) Shortcut yy) ToString

[C#] public Shortcut Shortcut {get; set;}

[C++] public: _property Shortcut get Shortcut( ); public: _property void set_Shortcut(Shortcut);

[VB] Public Property Shortcut As Shortcut

[JScript] public function get Shortcut( ): Shortcut; public function set Shortcut(Shortcut);

Description

Gets or sets a value indicating the shortcut key associated with the menu item.

Shortcut keys provide a method for users to activate frequently used menu items in your menu system and to provide keyboard access to your application for those users who do not have access to a mouse or other pointer device.

zz) ShowShortcut aaa) ToString

[C#] public bool ShowShortcut {get; set;}

[C++] public: _property bool get_ShowShortcut( ); public: _property void set_ShowShortcut(bool);

[VB] Public Property ShowShortcut As Boolean

[JScript] public function get ShowShortcut( ): Boolean; public function set ShowShortcut(Boolean);

Description

Gets or sets a value indicating whether the shortcut key that is associated with the menu item is displayed next to the menu item caption.

You can use this property to provide the option for users to hide shortcuts from menus to conserve menu space or to hide a shortcut key from being displayed.

bbb) Site
ccc) Text
ddd) ToString

Description

Gets or sets a value indicating the caption of the menu item.

When you specify a caption for your menu item with the text parameter, you can also specify an access key by placing an '&' before the character to be used as the access key. For example, to specify the "F" in "File" as an access key, you would specify the caption for the menu item as "&File". You can use this feature to provide keyboard navigation for your menus.

eee) Visible
fff) ToString

[C#] public bool Visible {get; set;}

[C++] public: _property bool get_Visible( ); public: _property void set_Visible(bool);

[VB] Public Property Visible As Boolean

[JScript] public function get Visible( ): Boolean; public function set Visible(Boolean);

Description

Gets or sets a value indicating whether the menu item is visible. You can use this property to modify a menu structure without having to merge menus or disable menus. For example, if you want to hide a complete section of functionality from the menus for your application, you can hide them from the user by setting this property to false.

ggg) ToString

[C#] public event EventHandler Click;

[C++] public: _event EventHandler* Click;

[VB] Public Event Click As EventHandler

Description

Occurs when the menu item is clicked or selected using a shortcut key or access key defined for the menu item.

The System.Windows.Forms.MenuItem.Click event occurs when this System.Windows.Forms.MenuItem is clicked by the user. This event also occurs if the user selects the menu item using the keyboard and presses the Enter key. It can also occur if an access key or shortcut key is pressed that is associated with the System.Windows.Forms.MenuItem. For more information about handling events, see.

hhh) ToString

Description

Occurs when the System.Windows.Forms.MenuItem.OwnerDraw property of a menu item is set to true and a request is made to draw the menu item.

The System.Windows.Forms.DrawItemEventArgs argument passed to a System.Windows.Forms.MenuItem.DrawItem event handler provides a System.Drawing.Graphics object that enables you to perform drawing and other graphical operations on the surface of the menu item. You can use this event handler to create custom menus that meet the needs of your application. For more information about handling events, see.

iii) ToString

[C#] public event MeasureItemEventHandler MeasureItem;

[C++] public: event MeasureItemEventHandler* MeasureItem;

[VB] Public Event MeasureItem As MeasureItem EventHandler

Description

Occurs when the menu needs to know the size of a menu item before drawing it.

In order for this event to be raised, you must have the System.Windows.Forms.MenuItem.OwnerDraw property of the menu item set to true. This event is raised before owner drawn menus are drawn to allow for the size of the menu item to be drawn to be specified. For more information about handling events, see.

jjj) ToString

[C#] public event EventHandler Popup;

[C++] public: _event EventHandler* Popup;

[VB] Public Event Popup As EventHandler

Description

Occurs before a menu item's list of menu items is displayed.

This event only occurs when a menu item has submenu items to display. You can use this event handler to add, remove, enable, disable, check, or uncheck menu items based on the state of your application before they are displayed. For more information about handling events, see.

kkk) ToString

[C#] public event EventHandler Select;

[C++] public: _event EventHandler* Select;

[VB] Public Event Select As EventHandler

Description

Occurs when the user places the cursor over a menu item.

This event is typically raised when the user places the mouse cursor over the menu item. The event can also be raised when the user highlights a menu item using the keyboard by scrolling to the menu item with the arrow keys. You can use this event to display a detailed help string pertaining to this menu item in an application's status bar. For more information about handling events, see.

lll) CloneMenu

[C#] public virtual MenuItem CloneMenu( );

[C++] public: virtual MenuItem* CloneMenu( );

[VB] Overridable Public Function CloneMenu( ) As MenuItem

[JScript] public function CloneMenu( ): MenuItem; Creates a copy of a System.Windows.Forms.MenuItem Description Creates a copy of the current System.Windows.Forms.MenuItem.

Return Value: A System.Windows.Forms.MenuItem that represents the duplicated menu item.

System.Windows.Forms.MenuItem objects cannot be used in more than one place unless you obtain a copy of the System.Windows.Forms.MenuItem. You can call this method to create a copy of this menu item for use in a System.Windows.Forms.ContextMenu, System.Windows.Forms.MainMenu, or other System.Windows.Forms.MenuItem within your application. When a menu item is cloned, any event handlers specified in the original menu item will continue to function in the cloned version of the menu item. For example, if you created a System.Windows.Forms.MenuItem and connected its System.Windows.Forms.MenuItem.Click event to an event handler. When the menu item is cloned, the cloned menu item will call the same event handler.

mmm) CloneMenu

[C#] protected void CloneMenu(MenuItem itemSrc);

[C++] protected: void CloneMenu(MenuItem* itemSrc);

[VB] Protected Sub CloneMenu(ByVal itemSrc As MenuItem)

[JScript] protected function CloneMenu(itemSrc: MenuItem);

Description

Creates a copy of the specified System.Windows.Forms.MenuItem. Return Value: A System.Windows.Forms.MenuItem that represents the duplicated menu item.

Call this method to create copies of menu items that you have already created for use in a context menu or another menu structure within your application. This version of System.Windows.Forms.MenuItem.CloneMenu allows you to specify a specific System.Windows.Forms.MenuItem to copy instead of the menu item that is calling the method. You can use this method to initialize a new System.Windows.Forms.MenuItem object with a copy of another System.Windows.Forms.MenuItem. When a menu item is cloned, any event handlers specified in the original menu item will continue to function in the cloned version of the menu item. For example, if you created a System.Windows.Forms.MenuItem and connected its System.Windows.Forms.MenuItem.Click event to an event handler. When the menu item is cloned, the cloned menu item will call the same event handler. The System.Windows.Forms.MenuItem that represents the menu item to copy.

nnn) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the resources (other than memory) used by the System.Windows.Forms.MenuItem.

Call System.Windows.Forms.MenuItem.Dispose(System.Boolean) when you are finished using the System.Windows.Forms.MenuItem. The System.Windows.Forms.MenuItem.Dispose(System.Boolean) method leaves the System.Windows.Forms.MenuItem in an unusable state. After calling System.Windows.Forms.MenuItem.Dispose(System.Boolean), you must release all references to the System.Windows.Forms.MenuItem so the memory it was occupying can be reclaimed by garbage collection. ooo) MergeMenu

[C#] public virtual MenuItem MergeMenu( );

[C++] public: virtual MenuItem* MergeMenu( );

[VB] Overridable Public Function MergeMenu( ) As MenuItem

[JScript] public function MergeMenu( ): MenuItem; Merges this System.Windows.Forms.MenuItem with another System.Windows.Forms.MenuItem Description Merges this System.Windows.Forms.MenuItem with another System.Windows.Forms.MenuItem and returns the resulting merged System.Windows.Forms.MenuItem.

Return Value: A System.Windows.Forms.MenuItem that represents the merged menu item.

When you call this version of System.Windows.Forms.MenuItem.MergeMenu, the System.Windows.Forms.MenuItem returned is a copy of the current menu item that can be merged with another menu item without affecting the functionality of the current item. This version of the System.Windows.Forms.MenuItem.MergeMenu method is similar to calling the System.Windows.Forms.MenuItem. CloneMenu method that contains no parameters.

ppp) MergeMenu

[C#] public new void MergeMenu(MenuItem itemSrc);

[C++] public: void MergeMenu(MenuItem* itemSrc);

[VB] Shadows Public Sub MergeMenu(ByVal itemSrc As MenuItem)

[JScript] public hide function MergeMenu(itemSrc: MenuItem);

Description

Merges another menu item with this menu item.

Menu items are merged according to the value of the menu item's System.Windows.Forms.MenuItem.MergeType and System.Windows.Forms.MenuItem.MergeOrder properties. This version of the System.Windows.Forms.MenuItem.MergeMenu method enables you to merge two System.Windows.Forms.MenuItem objects (and their submenus) into a single menu. Menu merging is handled automatically when a Multiple Document Interface(MDI) parent form and a child both have menus. You can use this version of the method to merge two System.Windows.Forms.MenuItem objects (and their submenu items) located in a System.Windows.Forms.MainMenu control into a single menu within a System.Windows.Forms.ContextMenu. For example, you can call this version of the System.Windows.Forms.MenuItem. MergeMenu method to merge the menu items of a File and Edit menu into a single System.Windows.Forms.MenuItem that can then be added to and displayed by a System.Windows.Forms.ContextMenu. A System.Windows.Forms. MenuItem that specifies the menu item to merge with this one.

qqq) OnClick

[C#] protected virtual void OnClick(EventArgs e);

[C++] protected: virtual void OnClick(EventArgs* e);

[VB] Overridable Protected Sub OnClick(ByVal e As Event Args)

[JScript] protected function OnClick(e: EventArgs);

Description

Raises the System.Windows.Forms.MenuItem.Click event.

Raising an event invokes the event handler through a delegate. For more information, see. An System.EventArgsthat contains the event data.

rrr) OnDrawItem

[C#] protected virtual void OnDrawItem(DrawItemEvent Args e);

[C++] protected: virtual void OnDrawItem(DrawItemEvent Args* e);

[VB] Overridable Protected Sub OnDrawItem(ByVal e As DrawItemEventArgs)

[JScript] protected function OnDrawItem(e: DrawItemEvent Args);

Description

Raises the System.Windows.Forms.MenuItem.DrawItem event.

Raising an event invokes the event handler through a delegate. For more information, see. A System.Windows.Forms.DrawItemEventArgsthat contains the event data.

sss) OnInitMenuPopup

[C#] protected virtual void OnInitMenuPopup(EventArgs e);

[C++] protected: virtual void OnInitMenuPopup(EventArgs* e);

[VB] Overridable Protected Sub OnInitMenuPopup(ByVal e As EventArgs)

[JScript] protected function OnInitMenuPopup(e: Event Args); An System.EventArgsthat contains the event data.

ttt) OnMeasureItem

[C#] protected virtual void OnMeasureItem(MeasureItem EventArgs e);

[C++] protected: virtual void OnMeasureItem(MeasureItem EventArgs* e);

[VB] Overridable Protected Sub OnMeasureItem(ByVal e As

MeasureItemEventArgs)

[JScript] protected function OnMeasureItem(e: MeasureItem EventArgs);

Description

Raises the System.Windows.Forms.MenuItem.MeasureItem event.

Raising an event invokes the event handler through a delegate. For more information, see. A System.Windows.Forms.MeasureItemEventArgs that contains the event data.

uuu) OnPopup

[C#] protected virtual void OnPopup(EventArgs e);

[C++] protected: virtual void OnPopup(EventArgs* e);

[VB] Overridable Protected Sub OnPopup(ByVal e As Event Args)

[JScript] protected function OnPopup(e: EventArgs);

Description

Raises the System.Windows.Forms.MenuItem.Popup event.

Raising an event invokes the event handler through a delegate. For more information, see. An System.EventArgsthat contains the event data.

vvv) OnSelect

[C#] protected virtual void OnSelect(EventArgs e);

[C++] protected: virtual void OnSelect(EventArgs* e);

[VB] Overridable Protected Sub OnSelect(ByVal e As Event Args)

[JScript] protected function OnSelect(e: EventArgs);

Description

Raises the System.Windows.Forms.MenuItem.Select event.

Raising an event invokes the event handler through a delegate. For more information, see. An System.EventArgsthat contains the event data.

www) PerformClick

[C#] public void PerformClick( );

[C++] public: void PerformClick( );

[VB] Public Sub PerformClick( )

[JScript] public function PerformClick( );

Description

Generates a System.Windows.Forms.Control.Click event for the System.Windows.Forms.MenuItem, simulating a click by a user. You can use this menu to activate a menu item through code without passing any event information. For example, if you want to trigger a menu item based on an action that occurs in your application, you can call the System.Windows.Forms.MenuItem.PerformClick method for that System.Windows.Forms.MenuItem.

xxx) PerformSelect

[C#] public virtual void PerformSelect( );

[C++] public: virtual void PerformSelect( );

[VB] Overridable Public Sub PerformSelect( )

[JScript] public function PerformSelect( );

Description

Raises the System.Windows.Forms.MenuItem.Select event for this menu item.

This method allows you to raise the System.Windows.Forms.MenuItem.Select event without passing any event information to the event handler.

yyy) Tostring

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

Menu.MenuItemCollection class (System.Windows.Forms)

a) ToString

Description

Represents a collection of System.Windows.Forms.MenuItem objects.

This class represents the collection of System.Windows.Forms.MenuItem objects stored in a System.Windows.Forms.MainMenu, System.Windows.Forms.ContextMenu, or System.Windows.Forms.MenuItem. For the System.Windows.Forms.MainMenu and System.Windows.Forms.ContextMenu classes, this collection represents the entire menu structure for the control. For the System.Windows.Forms.

MenuItem class, this collection represents the list of submenu items associated with the System.Windows.Forms. MenuItem.

b) Menu.MenuItemCollection

Example Syntax:

c) Tostring

[C#] public Menu.MenuItemCollection(Menu owner);

[C++] public: MenuItemCollection(Menu* owner);

[VB] Public Sub New(ByVal owner As Menu)

[JScript] public function Menu.MenuItemCollection(owner: Menu);

Description

Initializes a new instance of the System.Windows.Forms. Menu.MenuItemCollection class.

This class requires that you associate the collection with a class that derives from System.Windows.Forms.Menu, such as the System.Windows.Forms.MainMenu, System.Windows.Forms.ContextMenu, or System.Windows.Forms. MenuItem class. Since you must specify a menu that is associated with this collection, you cannot create multiple menu item collections and associate them with a menu as needed. In order to switch the menu items associated with a menu, you must clear the collection of items and add the menu items to display to the collection. The System.Windows.Forms.Menu that owns this collection.

d) Count e) ToString

[C#] public int Count {get;}

[C++] public: _property int get_Count( );

[VB] Public ReadOnly Property Count As Integer

[JScript] public function get Count( ): int;

Description

Gets a value indicating the total number of System.Windows. Forms.MenuItem objects in the collection.

The System.Windows.Forms.Menu.MenuItem Collection. Count property holds the number of System.Windows. Forms.MenuItem objects assigned to the collection. You can use the System.Windows.Forms.Menu.MenuItemCollection.Count property value as the upper bounds of a loop to iterate through a collection. Keep in mind, the index value of a collection is a zero-based index, so you must subtract one from the looping variable. If you do not account for this, you will exceed the upper bounds of the collection and throw an exception.

f) IsReadOnly g) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the collection is read-only.

h) Item i) ToString

[C#] public virtual MenuItem this[int index] {get;}

[C++] public: _property virtual MenuItem* get_Item(int index);

[VB] Overridable Public Default ReadOnly Property Item (ByVal index As Integer) As MenuItem

[JScript] returnValue=MenuItemCollectionObject.Item(index);

Description

Retrieves the System.Windows.Forms.MenuItem at the specified indexed location in the collection.

To assign System.Windows.Forms.MenuItem objects to a specific location, or to retrieve them from the System.Windows.Forms.Menu.MenuItemCollection, you can reference the collection object with a specific index value. The index value of the System.Windows.Forms.Menu.MenuItemCollection is a zero-based index. The indexed location of the System.Windows.Forms.MenuItem in the collection.

j) Add

[C#] public virtual int Add(MenuItem item);

[C++] public: virtual int Add(MenuItem* item);

[VB] Overridable Public Function Add(ByVal item As MenuItem) As Integer

[JScript] public function Add(item: MenuItem): int;

Description

Adds a previously created System.Windows.Forms.MenuItem to the end of the current menu.

Return Value: The zero-based index where the item is stored in the collection. A System.Windows.Forms.MenuItem can only be contained in one menu at a time, and may not be added more than once to the same menu. To reuse a System.Windows.Forms.MenuItem in more than one menu, use the System.Windows.Forms.MenuItem.CloneMenu method of the System.Windows.Forms.MenuItem class. To remove a System.Windows.Forms.MenuItem that you have previously added, use the System.Windows.Forms.Menu. MenuItemCollection.Remove(System.Windows.Forms. MenuItem) method. The System.Windows.Forms.MenuItem to add.

k) Add

[C#] public virtual MenuItem Add(string caption);

[C++] public: virtual MenuItem* Add(String* caption);

[VB] Overridable Public Function Add(ByVal caption As String) As MenuItem

[JScript] public function Add(caption: String): MenuItem; Adds a new System.Windows.Forms.MenuItem to the collection.

Description

Adds a new System.Windows.Forms.MenuItem, to the end of the current menu, with a specified caption.

Return Value: A System.Windows.Forms.MenuItem that represents the menu item being added to the collection.

A System.Windows.Forms.MenuItem can only be contained in one menu at a time, and may not be added more than once to the same menu. To reuse a System.Windows.Forms. MenuItem in more than one menu, use the System.Windows. Forms.MenuItem.CloneMenu method of the System.Windows.Forms.MenuItem class. To remove a System.Windows. Forms.MenuItem that you have previously added, use the System.Windows.Forms. Menu. MenuItemCollection. Remove(System.Windows.Forms.MenuItem) method. The caption of the menu item.

l) Add

[C#] public virtual int Add(int index, MenuItem item);

[C++] public: virtual int Add(int index, MenuItem* item);

[VB] Overridable Public Function Add(ByVal index As Integer, ByVal item As MenuItem) As Integer

[JScript] public function Add(index: int, item: MenuItem): int;

Description

Adds a previously created System.Windows.Forms.MenuItem at the specified index within the menu item collection.

Return Value: The zero-based index where the item is stored in the collection.

A System.Windows.Forms.MenuItem can only be contained in one menu at a time, and may not be added more than once to the same menu. To reuse a System.Windows.Forms.MenuItem in more than one menu, use the System.Windows.Forms.MenuItem.CloneMenu method of the System.Windows.Forms.MenuItem class. To remove a System.Windows.Forms.MenuItem that you have previously added, use the System.Windows.Forms.Menu.MenuItemCollection.Remove(System.Windows.Forms.MenuItem) method. The position to add the new item. The System.Windows.Forms.MenuItem to add.

m) Add

[C#] public virtual MenuItem Add(string caption, EventHandler onclick);

[C++] public: virtual MenuItem* Add(String* caption, EventHandler* onClick);

[VB] Overridable Public Function Add(ByVal caption As String, ByVal onClick As EventHandler) As MenuItem

[JScript] public function Add(caption: String, onClick: EventHandler) MenuItem;

Description

Adds a new System.Windows.Forms.MenuItem to the end of the current menu with a specified caption and a specified event handler for the System.Windows.Forms.MenuItem.Click event.

Return Value: A System.Windows.Forms.MenuItem that represents the menu item being added to the collection.

A System.Windows.Forms.MenuItem can only be contained in one menu at a time, and may not be added more than once to the same menu. To reuse a System.Windows.Forms.MenuItem in more than one menu, use the System.Windows.Forms.MenuItem.CloneMenu method of the System.Windows.Forms.MenuItem class. To remove a System.Windows.Forms.MenuItem that you have previously added, use the System.Windows.Forms. Menu.MenuItemCollection. Remove(System.Windows.Forms.MenuItem) method. The caption of the menu item. An System.EventHandler that represents the event handler that is called when the item is clicked by the user or when a user, presses an accelerator or shortcut key for the menu item.

n) Add

[C#] public virtual MenuItem Add(string caption, MenuItem[ ] items);

[C++] public: virtual MenuItem* Add(String* caption, MenuItem* items[ ]);

[VB] Overridable Public Function Add(ByVal caption As String, ByVal items( ) As MenuItem) As MenuItem

[JScript] public function Add(caption: String, items: MenuItem[ ]): MenuItem;

Description

Adds a new System.Windows.Forms.MenuItem to the end of this menu with the specified caption, System.Windows.Forms.MenuItem.Click event handler, and items.

Return Value: A System.Windows.Forms.MenuItem that represents the menu item being added to the collection.

A System.Windows.Forms.MenuItem can only be contained in one menu at a time, and may not be added more than once to the same menu. To reuse a System.Windows.Forms.MenuItem in more than one menu, use the System.Windows.Forms.MenuItem.CloneMenu method of the System.Windows.Forms.MenuItem class. To remove a System.Windows.Forms.MenuItem that you have previously added, use the System.Windows.Forms.Menu.MenuItemCollection.Remove(System.Windows.Forms.MenuItem) method. The caption of the menu item. An array of System.Windows.Forms.MenuItem objects that this System.Windows.Forms.MenuItem will contain.

o) AddRange

[C#] public virtual void AddRange(MenuItem[ ] items);

[C++] public: virtual void AddRange(MenuItem* items[ ]);

[VB] Overridable Public Sub AddRange(ByVal items( ) As MenuItem)

[JScript] public function AddRange(items: MenuItem[ ]);

Description

Adds an array of previously created System.Windows.Forms.MenuItem objects to the collection.

You can use method to quickly add a group of previously created System.Windows.Forms.MenuItem objects to the collection instead of manually adding each System.Windows.Forms.MenuItem to the collection using the System.Windows.Forms.Menu.MenuItemCollection.Add(System.String) method. If the collection already contains System.Windows.Forms.MenuItem objects, calling this method will add the new System.Windows.Forms.MenuItem objects to the end of the collection. An array of System.Windows.Forms.MenuItem objects representing the menu items to add to the collection.

p) Clear

[C#] public virtual void Clear( );

[C++] public: virtual void Clear( );

[VB] Overridable Public Sub Clear( )

[JScript] public function Clear( );

Description

Removes all System.Windows.Forms.MenuItem objects from the menu item collection.

You can use this method to clear the entire collection of menu items from a menu. To remove an individual menu item from the collection, use the System.Windows.Forms.Menu.MenuItemCollection.Remove(System.Windows.Forms.MenuItem) method. To add new System.Windows.Forms.Menu- Item objects to the collection, use the System.Windows.Forms.Menu.MenuItemColletion.Add (System.String) method.

q) Contains

[C#] public bool Contains(MenuItem value);

[C++] public: bool Contains(MenuItem* value);

[VB] Public Function Contains(ByVal value As MenuItem) As Boolean

[JScript] public function Contains(value: MenuItem): Boolean;

Description

Determines if the specified System.Windows.Forms.MenuItem is a member of the collection.

Return Value: true if the System.Windows.Forms.MenuItem is a member of the collection; otherwise, false.

This method enables you to determine whether a System.Windows.Forms.MenuItem is member of the collection before attempting to perform operations on the System.Windows.Forms.MenuItem. You can use this method to confirm that a System.Windows.Forms.MenuItem has been added to or is still a member of the collection. The System.Windows.Forms.MenuItem to locate in the collection.

r) CopyTo

[C#] public void CopyTo(Array dest, int index);

[C++] public: _sealed void CopyTo(Array* dest, int index);

[VB] NotOverridable Public Sub CopyTo(ByVal dest As Array, ByVal index As Integer)

[JScript] public function CopyTo(dest: Array, index: int);

Description

Copies the entire collection into an existing array at a specified location within the array.

You can use this method to combine System.Windows.Forms.MenuItem objects from multiple collections into a single array. This feature enables you to easily combine two or more sets of menu items for use in a System.Windows.Forms.ContextMenu or System.Windows.Forms.MainMenu. The destination array. The index in the destination array at which storing begins.

s) GetEnumerator

[C#] public IEnumerator GetEnumerator( );

[C++] public: sealed IEnumerator* GetEnumerator( );

[VB] NotOverridable Public Function GetEnumerator( ) As IEnumerator

[JScript] public function GetEnumerator( ): IEnumerator;

Description

Returns an enumerator that can be used to iterate through the menu item collection.

Return Value: An System.Collections.IEnumerator object that represents the menu item collection.

t) IndexOf

[C#] public int IndexOf(MenuItem value);

[C++] public: int IndexOf(MenuItem* value);

[VB] Public Function IndexOf(ByVal value As MenuItem) As Integer

[JScript] public function IndexOf(value: MenuItem): int;

Description

Retrieves the index of a specific item in the collection.

Return Value: The zero-based index of the item found in the collection; otherwise, −1. The System.Windows.Forms.MenuItem to locate in the collection.

u) Remove

[C#] public virtual void Remove(MenuItem item);

[C++] public: virtual void Remove(MenuItem* item);

[VB] Overridable Public Sub Remove(ByVal item As MenuItem)

[JScript] public function Remove(item: MenuItem);

Description

Removes the specified System.Windows.Forms.MenuItem from the menu item collection.

When a System.Windows.Forms.MenuItem is removed from the menu item collection, all subsequent menu items are moved up one position in the collection. You can use this version of the System.Windows.Forms.Menu.MenuItemCollection.Remove(System.Windows.Forms.MenuItem) method to remove a specific System.Windows.Forms.MenuItem from the collection using a reference to the System.Windows.Forms.MenuItem to be removed. If you do not have a reference to the System.Windows.Forms.MenuItem that you want to remove, you can use the other version of this method that accepts, as a parameter, an index corresponding to the System.Windows.Forms.MenuItem to be removed. The System.Windows.Forms.MenuItem to remove.

v) RemoveAt

[C#] public virtual void RemoveAt(int index);

[C++] public: virtual void RemoveAt(int index);

[VB] Overridable Public Sub RemoveAt(ByVal index As Integer)

[JScript] public function RemoveAt(index: int); Removes a System.Windows.Forms.MenuItem from the menu item collection.

Description

Removes a System.Windows.Forms.MenuItem from the menu item collection at a specified index.

When a System.Windows.Forms.MenuItem is removed from the menu item collection, all subsequent menu items are moved up one position in the collection. The index of the System.Windows.Forms.MenuItem to remove.

w) IList.Add

[C#] int IList.Add(object value);

[C++] int IList::Add(Object* value);

[VB] Function Add(ByVal value As Object) As Integer Implements IList.Add

[JScript] function IList.Add(value: Object): int;

x) IList.Contains

[C#] bool IList.Contains(object value);

[C++] bool IList::Contains(Object* value);

[VB] Function Contains(ByVal value As Object) As Boolean Implements IList.Contains

[JScript] function IList.Contains(value: Object): Boolean;

y) IList.IndexOf

[C#] int IList.IndexOf(object value);

[C++] int IList.IndexOf(Object* value);

[VB] Function IndexOf(ByVal value As Object) As Integer Implements IList.IndexOf

[JScript] function IList.IndexOf(value: Object): int;

z) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

aa) IList.Remove

[C#] void IList.Remove(object value);

[C++] void IList::Remove(Object* value);

[VB] Sub Remove(ByVal value As Object) Implements IList.Remove

[JScript] function IList.Remove(value: Object);

MenuMerge enumeration (System.Windows.Forms)

a) ToString

Description

Specifies the behavior of a System.Windows.Forms.MenuItem when it is merged with items in another menu.

Use the members of this enumeration to set the value of the System.Windows.Forms.MenuItem.MergeType property of the System.Windows.Forms.MenuItem.

b) ToString

[C#] public const MenuMerge Add;

[C++] public: const MenuMerge Add;

[VB] Public Const Add As MenuMerge

[JScript] public var Add: MenuMerge;

Description

The System.Windows.Forms.MenuItem is added to the collection of existing System.Windows.Forms.MenuItem objects in a merged menu.

c) ToString

[C#] public const MenuMerge MergeItems;

[C++] public: const MenuMerge MergeItems;

[VB] Public Const MergeItems As MenuMerge

[JScript] public var MergeItems: MenuMerge;

Description

All submenu items of this System.Windows.Forms.MenuItem are merged with those of existing System.Windows.Forms.MenuItem objects at the same position in a merged menu.

d) ToString

[C++] public const MenuMerge Remove;

[C++] public: const MenuMerge Remove;

[VB] Public Const Remove As MenuMerge

[JScript] public var Remove MenuMerge;

Description

The System.Windows.Forms.MenuItem is not included in a merged menu.

e) ToString

[C#] public const MenuMerge Replace;

[C++] public: const MenuMerge Replace;

[VB] Public Const Replace As MenuMerge

[JScript] public var Replace: MenuMerge;

Description

The System.Windows.Forms.MenuItem replaces an existing System.Windows.Forms.MenuItem at the same position in a merged menu.

Message structure (System.Windows.Forms)

a) ToString

Description

Implements a Windows message.

The System.Windows.Forms.Message class wraps messages that Windows sends. You can use this class to wrap a message and assign it to the window procedure to be dispatched. You can also use this class to get information about a message the system sends to your application or controls.

b) HWnd c) ToString

[C#] public IntPtr HWnd {get; set;}

[C++] public: _property IntPtr get HWnd( ); public: _property void set_HWnd(IntPtr);

[VB] Public Property HWnd As IntPtr

[JScript] public function get HWnd( ): IntPtr; public function set HWnd(IntPtr);

Description

Gets or sets the window handle of the message.

d) LParam e) ToString

[C#] public IntPtr LParam {get; set;}

[C++] public: _property IntPtr get_LParam( ); public: _property void set_LParam(IntPtr);

[VB] Public Property LParam As IntPtr

[JScript] public function get LParam( ): IntPtr; public function set LParam(IntPtr);

Description

Specifies the System.Windows.Forms.Message.LParam field of the message.

The value of this field depends on the message. Use the System.Windows.Forms.Message.LParam field to get information that is important for handling the message.

f) Msg g) ToString

[C#] public int Msg {get; set;}

[C++] public: _property int get Msg( ); _public: _property void set_Msg(int);

[VB] Public Property Msg As Integer

[JScript] public function get Msg( ): int; public function set Msg(int);

Description

Gets or sets the ID number for the message.

h) Result i) ToString

[C#] public IntPtr Result {get; set;}

[C++] public: _property IntPtr get_Result( ); public: _property void set_Result(IntPtr);

[VB] Public Property Result As IntPtr

[JScript] public function get Result( ): IntPtr; public function set Result(IntPtr);

Description

Specifies the value that is returned to Windows in response to handling the message.

j) WParam k) ToString

[C#] public IntPtr WParam {get; set;}

[C++] public: _property IntPtr get_WParam( ); public: _property void set_WParam(IntPtr);

[VB] Public Property WParam As IntPtr

[JScript] public function get WParam( ): IntPtr; public function set WParam(IntPtr);

Description

Gets or sets the System.Windows.Forms.Message.WParam field of the message.

The value of this field depends on the message. Use the System.Windows.Forms.Message.WParam field to get information that is important to handling the message. This field is typically used to store small pieces of information, such as flags.

l) Create

[C#] public static Message Create(IntPtr hWnd, int msg, IntPtr wparam, IntPtr lparam);

[C++] public: static Message Create(IntPtr hWnd, int msg, IntPtr wparam, IntPtr lparam);

[VB] Public Shared Function Create(ByVal hWnd As IntPtr, ByVal msg As Integer, ByVal wparam As IntPtr, ByVal lparam As IntPtr) As Message

[JScript] public static function Create(hWnd: IntPtr, msg: int, wparam: IntPtr, lparam: IntPtr): Message;

Description

Creates a new System.Windows.Forms.Message object.

Return Value: A System.Windows.Forms.Message object that represents the message that was created.

Use the System.Windows.Forms.Message.Create(System.IntPtr,System.Int32,System.IntPtr, System.IntPtr) method to create a System.Windows.Forms.Message object to wrap a message sent by Windows. The window handle for the message. The message ID. The message wparam field. The message Iparam field.

m) Equals

[C#] public override bool Equals(object o);

[C++] public: bool Equals(Object* o);

[VB] Overrides Public Function Equals(ByVal o As Object) As Boolean

[JScript] public override function Equals(o: Object): Boolean;

Description n) GetHashCode

[C#] public override int GetHashCode( );

[C++] public: int GetHashCode( );

[VB] Overrides Public Function GetHashCode( ) As Integer

[JScript] public override function GetHashCode( ): int;

Description o) GetLParam

[C#] public object GetLParam(Type cls);

[C++] public: Object* GetLParam(Type* cls);

[VB] Public Function GetLParam(ByVal cls As Type) As Object

[JScript] public function GetLParam(cls: Type): Object;

Description

Gets the System.Windows.Forms.Message.LParam value, and converts the value to an object.

Return Value: An System.Object that represents an instance of the class specified by the cls parameter, with the data from the System.Windows.Forms.Message.LParam field of the message.

Use the System.Windows.Forms.Message.GetLParam(System.Type) method to retrieve information from the System.Windows.Forms.Message.LParam field of a message and convert it to an object. You can use this method to access objects passed in a message. The class to use to create an instance. You must declare this class using the @dll.struct directive.

p) ToString

[C#] public override string ToString( );

[C++] public: String* ToString( );

[VB] Overrides Public Function ToString( ) As String

[JScript] public override function ToString( ): String;

Description

MessageBox class (System.Windows.Forms)

a) ToString

Description

Displays a message box that can contain text, buttons, and symbols that inform and instruct the user.

You cannot create a new instance of the System.Windows.Forms.MessageBox class. To display a message box, call the static method System.Windows.Forms.MessageBox.Show (System.String,System.String, ystem.Windows.Forms.MessageBoxButtons,System.Windows.Forms.MessageBoxIcon, System.Windows.Forms.MessageBoxDefaultButton,System.Windows.Forms.MessageBoxOptions). The title, message, buttons, and icons displayed in the message box are determined by parameters that you pass to this method.

b) Show

[C#] public static DialogResult Show(string text);

[C++] public: static DialogResult Show(String* text);

[VB] Public Shared Function Show(ByVal text As String) As DialogResult

[JScript] public static function Show(text: String): DialogResult;

Description

Displays a message box with specified text.

Return Value: One of the System.Windows.Forms.DialogResult values.

By default, the message box displays an OK button. The message box does not contain a caption in the title. The text to display in the message box.

c) Show

[C#] public static DialogResult Show(IWin32Window owner, string text);

[C++] public: static DialogResult Show(IWin32Window* owner, String* text);

[VB] Public Shared Function Show(ByVal owner As IWin32Window, ByVal text As String) As DialogResult

[JScript] public static function Show(owner: IWin32Window, text: String) DialogResult;

Description

Displays a message box in front of the specified object and with the specified text.

Return Value: One of the System.Windows.Forms.DialogResult values.

You can use the owner parameter to specify a particular object, which implements the System.Windows.Forms.IWin32Window interface, to place the message box in front of. A message box is a modal dialog, which means no input (keyboard or mouse click) can occur except to objects on the modal form. The program must hide or close a modal form (typically in response to some user action) before input to another form can occur. The System.Windows.Forms.IWin32Window the message box will display in front of. The text to display in the message box.

d) Show

[C#] public static DialogResult Show(string text, string caption);

[C++] public: static DialogResult Show(String* text, String* caption);

[VB] Public Shared Function Show(ByVal text As String, ByVal caption As String) As DialogResult

[JScript] public static function Show(text: String, caption: String): DialogResult;

Description

Displays a message box with specified text and caption.

Return Value: One of the System.Windows.Forms.DialogResult values.

By default, the message box displays an OK button. The text to display in the message box. The text to display in the title bar of the message box.

e) Show

[C#] public static DialogResult Show(IWin32Window owner, string text, string caption);

[C++] public: static DialogResult Show(IWin32Window* owner, String* text, String* caption);

[VB] Public Shared Function Show(ByVal owner As IWin32Window, ByVal text As String, ByVal caption As String) As DialogResult

[JScript] public static function Show(owner: IWin32Window, text: String, caption: String): DialogResult;

Description

Displays a message box in front of the specified object and with the specified text and caption.

Return Value: One of the System.Windows.Forms.DialogResult values.

You can use the owner parameter to specify a particular object, which implements the System.Windows.Forms.IWin32Window interface, to place the message box in front of. A message box is a modal dialog, which means no input (keyboard or mouse click) can occur except to objects on the modal form. The program must hide or close a modal form (typically in response to some user action) before input to another form can occur. The System.Windows.Forms.IWin32Window the message box will display in front of. The text to display in the message box. The text to display in the title bar of the message box.

f) Show

[C#] public static DialogResult Show(string text, string caption, MessageBoxButtons buttons);

[C++] public: static DialogResult Show(String* text, String* caption, MessageBoxButtons buttons);

[VB] Public Shared Function Show(ByVal text As String, ByVal caption As String, ByVal buttons As MessageBoxButtons) As DialogResult

[JScript] public static function Show(text: String, caption: String, buttons MessageBoxButtons) DialogResult;

Description

Displays a message box with specified text, caption, and buttons.

Return Value: One of the System.Windows.Forms.DialogResult values.

You can have a maximum of three buttons on the message box. The text to display in the message box. The text to display in the title bar of the message box. One of the System.Windows.Forms.MessageBoxButtons that specifies which buttons to display in the message box.

g) Show

[C#] public static DialogResult Show(IWin32Window owner, string text, string caption, MessageBoxButtons buttons);

[C++] public: static DialogResult Show(IWin32Window* owner, String* text, String* caption, MessageBoxButtons buttons);

[VB] Public Shared Function Show(ByVal owner As IWin32Window, ByVal text As String, ByVal caption As String, ByVal buttons As MessageBoxButtons) As DialogResult

[JScript] public static function Show(owner: IWin32Window, text: String, caption: String, buttons: MessageBoxButtons): DialogResult;

Description

Displays a message box in front of the specified object and with the specified text, caption, and buttons.

Return Value: One of the System.Windows.Forms.DialogResult values.

You can use the owner parameter to specify a particular object, which implements the System.Windows.Forms.IWin32Window interface, to place the message box in front of. A message box is a modal dialog, which means no input (keyboard or mouse click) can occur except to objects on the modal form. The program must hide or close a modal form (typically in response to some user action) before input to another form can occur. The System.Windows.Forms.IWin32Window the message box will display in front of. The text to display in the message box. The text to display in the title bar of the message box. One of the System.Windows.Forms.MessageBoxButtons that specifies which buttons to display in the message box.

h) Show

[C#] public static DialogResult Show(string text, string caption, MessageBoxButtons buttons, MessageBoxIcon icon);

[C++] public: static DialogResult Show(String* text, String* caption, MessageBoxButtons buttons, MessageBoxIcon icon);

[VB] Public Shared Function Show(ByVal text As String, ByVal caption As String, ByVal buttons As MessageBoxButtons, ByVal icon As MessageBoxIcon) As DialogResult

[JScript] public static function Show(text: String, caption: String, buttons MessageBoxButtons, icon: MessageBoxIcon): DialogResult;

Description

Displays a message box with specified text, caption, buttons, and icon.

Return Value: One of the System.Windows.Forms.DialogResult values.

You can have a maximum of three buttons on the message box. The text to display in the message box. The text to display in the title bar of the message box. One of the System.Windows.Forms.MessageBoxButtons that specifies which buttons to display in the message box. One of the System.Windows.Forms.MessageBoxIcon; values that specifies which icon to display in the message box.

i) Show

[C#] public static DialogResult Show(IWin32Window owner, string text, string caption, MessageBoxButtons buttons, MessageBoxIcon icon);

[C++] public: static DialogResult Show(IWin32Window* owner, String* text, String* caption, MessageBoxButtons buttons, MessageBoxIcon icon);

[VB] Public Shared Function Show(ByVal owner As IWin32Window, ByVal text As String, ByVal caption As String, ByVal buttons As MessageBoxButtons, ByVal icon As MessageBoxIcon) As DialogResult

[JScript] public static function Show(owner: IWin32Window, text: String, caption: String, buttons: MessageBoxButtons, icon: MessageBoxIcon) DialogResult;

Description

Displays a message box in front of the specified object and with the specified text, caption, buttons, and icon.

Return Value: One of the System.Windows.Forms.DialogResult values.

You can use the owner parameter to specify a particular object, Which implements the System.Windows.Forms.IWin32Window interface, to place the message box in front of. A message box is a modal dialog, which means no input (keyboard or mouse click) can occur except to objects on the modal form. The program must hide or close a modal form (typically in response to some user action) before input to another form can occur. The System.Windows.Forms.IWin32Window the message box will display in front of. The text to display in the message box. The text to display in the title bar of the message box. One of the System.Windows.Forms.MessageBoxButtons that specifies which buttons to display in the message box. One of the System.Windows.Forms.MessageBoxIcon values that specifies which icon to display in the message box.

j) Show

[C#] public static DialogResult Show(string text, string caption, MessageBoxButtons buttons, MessageBoxIcon icon, MessageBoxDefaultButton defaultButton);

[C++] public: static DialogResult Show(String* text, String* caption, MessageBoxButtons buttons, MessageBoxIcon icon, MessageBoxDefaultButton defaultButton);

[VB] Public Shared Function Show(ByVal text As String, ByVal caption As String, ByVal buttons As MessageBoxButtons, ByVal icon As MessageBoxIcon, ByVal defaultButton As MessageBoxDefaultButton) As DialogResult

[JScript] public static function Show(text: String, caption: String, buttons MessageBoxButtons, icon: MessageBoxIcon, defaultButton MessageBoxDefaultButton): DialogResult;

Description

Displays a message box with the specified text, caption, buttons, icon, and default button.

Return Value: One of the System.Windows.Forms.DialogResult values.

You can have a maximum of three buttons on the message box. The text to display in the message box. The text to display in the title bar of the message box. One of the System.Windows.Forms.MessageBoxButtons that specifies which buttons to display in the message box. One of the System.Windows.Forms.MessageBoxIcon values that specifies which icon to display in the message box. One of the System.Windows.Forms.MessageBoxDefaultButton values which specifies which is the default button for the message box.

k) Show

[C#] public static DialogResult Show(IWin32Window owner, string text, string caption, MessageBoxButtons buttons, MessageBoxIcon icon, MessageBoxDefaultButton defaultButton);

[C++] public: static DialogResult Show(IWin32Window* owner, String* text, String* caption, MessageBoxButtons buttons, MessageBoxIcon icon, MessageBoxDefaultButton defaultButton);

[VB] Public Shared Function Show(ByVal owner As IWin32Window, ByVal text As String, ByVal caption As String, ByVal buttons As MessageBoxButtons, ByVal icon As MessageBoxIcon, ByVal defaultButton As MessageBoxDefaultButton) As DialogResult

[JScript] public static function Show(owner: IWin32Window, text: String, caption: String, buttons: MessageBoxButtons, icon: MessageBoxIcon, defaultButton: MessageBoxDefaultButton): DialogResult;

Description

Displays a message box in front of the specified object and with the specified text, caption, buttons, icon, and default button.

Return Value: One of the System.Windows.Forms.DialogResult values.

You can use the owner parameter to specify a particular object, which implements the System.Windows.Forms.IWin32Window interface, to place the message box in front of. A message box is a modal dialog, which means no input (keyboard or mouse click) can occur except to objects on the modal form. The program must hide or close a modal form (typically in response to some user action) before input to another form can occur. The System.Windows.Forms.IWin32Window the message box will display in front of. The text to display in the message box. The text to display in the title bar of the message box. One of the System.Windows.Forms.MessageBoxButtons that specifies which buttons to display in the message box. One of the System.Windows.Forms.MessageBoxIcon values that specifies which icon to display in the message box. One for the System.Windows.Forms.MessageBoxDefaultButton values which specifies which is the default button for the message box.

l) Show

[C#] public static DialogResult Show(string text, string caption, MessageBoxButtons buttons, MessageBoxIcon icon, MessageBoxDefaultButton defaultButton, MessageBoxOptions options);

[C++] public: static DialogResult Show(String* text, String* caption, MessageBoxButtons buttons, MessageBoxIcon icon, MessageBoxDefaultButton defaultButton, MessageBoxOptions options);

[VB] Public Shared Function Show(ByVal text As String, ByVal caption As String, ByVal buttons As MessageBoxButtons, ByVal icon As MessageBoxIcon, ByVal defaultButton As MessageBoxDefaultButton, ByVal options As MessageBoxOptions) As DialogResult

[JScript] public static function Show(text: String, caption: String, buttons: MessageBoxButtons, icon: MessageBoxIcon, defaultButton: MessageBoxDefaultButton, options: MessageBoxOptions): DialogResult; Displays a message box.

Description

Displays a message box with the specified text, caption, buttons, icon, default button, and options.

Return Value: One of the System.Windows.Forms.DialogResult values.

You can have a maximum of three buttons on the message box. The text to display in the message box. The text to display in the title bar of the message box. One of the System.Windows.Forms.MessageBoxButtons that specifies which buttons to display in the message box. One of the System.Windows.Forms.MessageBoxIcon values that specifies which icon to display in the message box. One of the System.Windows.Forms.MessageBoxDefaultButton values which specifies which is the default button for the message box. One of the System.Windows.Forms.MessageBoxOptions values which specifies which display and association options will be used for the message box.

m) Show

[C#] public static DialogResult Show(IWin32Window owner, string text, string caption, MessageBoxButtons buttons, MessageBoxIcon icon, MessageBoxDefaultButton defaultButton, MessageBoxOptions options);

[C++] public: static DialogResult Show(IWin32Window* owner, String* text, String* caption, MessageBoxButtons buttons, MessageBoxIcon icon, MessageBoxDefaultButton defaultButton, MessageBoxOptions options);

[VB] Public Shared Function Show(ByVal owner As IWin32Window, ByVal text As String, ByVal caption As String, ByVal buttons As MessageBoxButtons, ByVal icon As MessageBoxIcon, ByVal defaultButton As MessageBoxDefaultButton, ByVal options As MessageBoxOptions) As DialogResult

[JScript] public static function Show(owner: IWin32Window, text: String, caption: String, buttons: MessageBoxButtons, icon: MessageBoxIcon, defaultButton MessageBoxDefaultButton, options: MessageBoxOptions) DialogResult;

Description

Displays a message box in front of the specified object and with the specified text, caption, buttons, icon, default button, and options.

Return Value: One of the System.Windows.Forms.DialogResult values.

You can use the owner parameter to specify a particular object, which implements the System.Windows.Forms.IWin32Window interface, to place the message box in front of. A message box is a modal dialog, which means no input (keyboard or mouse click) can occur except to objects on the modal form. The program must hide or close a modal form (typically in response to some user action) before input to another form can occur. The System.Windows.Forms.IWin32Window the message box will display of. The text to display in the message box. The text to display in the title bar of the message box. One of the System.Windows.Forms.MessageBoxButtons that specifies which buttons to display in the message box. One of the System.Windows.Forms.MessageBoxIcon values that specifies which icon to display in the message box. One of the System.Windows.Forms.MessageBoxDefaultButton values which specifies which is the default button for the message box. One of the System.Windows.Forms.MessageBoxOptions values which specifies which display and association options will be used for the message box.

MessageBoxButtons enumeration (System.Windows.Forms)

a) ToString

Description

Specifies constants defining which buttons to display on a System.Windows.Forms.MessageBox.

This enumeration is used by System.Windows.Forms.MessageBox.

b) ToString

[C#] public const MessageBoxButtons AbortRetryIgnore;

[C++] public: const MessageBoxButtons AbortRetryIgnore;

[VB] Public Const AbortRetryIgnore As MessageBoxButtons

[JScript] public var AbortRetryIgnore: MessageBoxButtons;

Description

The message box contains Abort, Retry, and Ignore buttons.

c) ToString

[C#] public const MessageBoxButtons OK;

[C++] public: const MessageBoxButtons OK;

[VB] Public Const OK As MessageBoxButtons

[JScript] public var OK: MessageBoxButtons;

Description

The message box contains an OK button.

d) ToString

[C#] public const MessageBoxButtons OKCancel;

[C++] public: const MessageBoxButtons OKCancel;

[VB] Public Const OKCancel As MessageBoxButtons

[JScript] public var OKCancel: MessageBoxButtons;

Description

The message box contains OK and Cancel buttons.

e) ToString

[C#] public const MessageBoxButtons RetryCancel;

[C++] public: const MessageBoxButtons RetryCancel;

[VB] Public Const RetryCancel As MessageBoxButtons

[JScript] public var RetryCancel: MessageBoxButtons;

Description

The message box contains Retry and Cancel buttons.

f) ToString

[C#] public const MessageBoxButtons YesNo;

[C++] public: const MessageBoxButtons YesNo;

[VB] Public Const YesNo As MessageBoxButtons

[JScript] public var YesNo: MessageBoxButtons;

Description

The message box contains Yes and No buttons.

g) Tostring

[C#] public const MessageBoxButtons YesNoCancel;

[C++] public: const MessageBoxButtons YesNoCancel;

[VB] Public Const YesNoCancel As MessageBoxButtons

[JScript] public var YesNoCancel: MessageBoxButtons;

Description

The message box contains Yes, No, and Cancel buttons.

MessageBoxDefaultButton enumeration (System.Windows.Forms)

a) ToString

Description

Specifies constants defining the default button on a System.Windows.Forms.MessageBox.

This enumeration is used by System.Windows.Forms.MessageBox.

b) ToString

[C#] public const MessageBoxDefaultButton Button1;

[C++] public: const MessageBoxDefaultButton Button1;

[VB] Public Const Button1 As MessageBoxDefaultButton

[JScript] public var Button1: MessageBoxDefaultButton;

Description

The first button on the message box is the default button.

c) ToString

[C#] public const MessageBoxDefaultButton Button2;

[C++] public: const MessageBoxDefaultButton Button2;

[VB] Public Const Button2 As MessageBoxDefaultButton

[JScript] public var Button2: MessageBoxDefaultButton;

Description

The second button on the message box is the default button.

d) ToString

[C#] public const MessageBoxDefaultButton Button3;

[C++] public: const MessageBoxDefaultButton Button3;

[VB] Public Const Button3 As MessageBoxDefaultButton

[JScript] public var Button3: MessageBoxDefaultButton;

Description

The third button on the message box is the default button.

MessageBoxIcon enumeration (System.Windows.Forms)

a) ToString

Description

Specifies constants defining which information to display.

This enumeration is used by the System.Windows.Forms.MessageBox class.

The description of each member of this enumeration contains a typical representation of the symbol. The actual graphic displayed is a function of the operating system constants. In current implementations there are four unique symbols with multiple values assigned to them.

b) ToString

[C#] public const MessageBoxIcon Asterisk;

[C++] public: const MessageBoxIcon Asterisk;

[VB] Public Const Asterisk As MessageBoxIcon

[JScript] public var Asterisk: MessageBoxIcon;

Description

The message box contains a symbol consisting of a lowercase letter i in a circle.

c) ToString

[C#] public const MessageBoxIcon Error;

[C++] public: const MessageBoxIcon Error;

[VB] Public Const Error As MessageBoxIcon

[JScript] public var Error: MessageBoxIcon;

Description

The message box contains a symbol consisting of white X in a circle with a red background.

d) ToString

[C#] public const MessageBoxIcon Exclamation;

[C++] public: const MessageBoxIcon Exclamation;

[VB] Public Const Exclamation As MessageBoxIcon

[JScript] public var Exclamation: MessageBoxIcon;

Description

The message box contains a symbol consisting of an exclamation point in a triangle with a yellow background.

e) ToString

[C#] public const MessageBoxIcon Hand;

[C++] public: const MessageBoxIcon Hand;

[VB] Public Const Hand As MessageBoxIcon

[JScript] public var Hand: MessageBoxIcon;

Description

The message box contains a symbol consisting of a white X in a circle with a red background.

f) ToString

[C#] public const MessageBoxIcon Information;

[C++] public: const MessageBoxIcon Information;

[VB] Public Const Information As MessageBoxIcon

[JScript] public var Information: MessageBoxIcon;

Description

The message box contains a symbol consisting of a lowercase letter i in a circle.

g) ToString

[C#] public const MessageBoxIcon None;

[C++] public: const MessageBoxIcon None;

[VB] Public Const None As MessageBoxIcon

[JScript] public var None: MessageBoxIcon;

Description

The message box contain no symbols.

h) ToString

[C#] public const MessageBoxIcon Question;

[C++] public: const MessageBoxIcon Question;

[VB] Public Const Question As MessageBoxIcon

[JScript] public var Question: MessageBoxIcon;

Description

The message box contains a symbol consisting of a question mark in a circle.

i) ToString

[C#] public const MessageBoxIcon Stop;

[C++] public: const MessageBoxIcon Stop;

[VB] Public Const Stop As MessageBoxIcon

[JScript] public var Stop MessageBoxIcon;

Description

The message box contains a symbol consisting of white X in a circle with a red background.

j) ToString

[C#] public const MessageBoxIcon Warning;

[C++] public: const MessageBoxIcon Warning;

[VB] Public Const Warning As MessageBoxIcon

[JScript] public var Warning: MessageBoxIcon;

Description

The message box contains a symbol consisting of an exclamation-point in a triangle with a yellow background.

MessageBoxOptions enumeration (System.Windows.Forms)

a) ToString

Description

Specifies options on a System.Windows.Forms.MessageBox.

This enumeration is used by System.Windows.Forms.MessageBox.

b) ToString

[C#] public const MessageBoxOptions DefaultDesktopOnly;

[C++] public: const MessageBoxOptions DefaultDesktop Only;

[VB] Public Const DefaultDesktopOnly As MessageBoxOptions

[JScript] public var DefaultDesktopOnly: MessageBoxOptions;

Description

The message box is displayed on the active desktop.

c) ToString

[C#] public const MessageBoxOptions RightAlign;

[C++] public: const MessageBoxOptions RightAlign;

[VB] Public Const RightAlign As MessageBoxOptions

[JScript] public var RightAlign: MessageBoxOptions;

Description

The message box text is right-aligned.

d) ToString

[C#] public const MessageBoxOptions Rt1Reading;

[C++] public: const MessageBoxOptions Rt1Reading;

[VB] Public Const Rt1Reading As MessageBoxOptions

[JScript] public var Rt1Reading: MessageBoxOptions;

Description

Specifies that the message box text is displayed with right to left reading order.

e) ToString

[C#] public const MessageBoxOptions ServiceNotification;

[C++] public: const MessageBoxOptions ServiceNotification;

[VB] Public Const ServiceNotification As MessageBoxOptions

[JScript] public var ServiceNotification: MessageBoxOptions;

Description

The message box is displayed on the active desktop.

MethodInvoker delegate (System.Windows.Forms)

a) ToString

Description

Represents the method that handles the Invoke event for a method.

System.Windows.Forms.MethodInvoker provides a simple delegate that is used to invoke a method with a void parameter list. This delegate can be used when making calls to a control's invoke method, or when you need a simple delegate but don't want to define one yourself.

MonthCalendar class (System.Windows.Forms)

a) ToString

Description

Represents a standard Windows month calendar control.

The System.Windows.Forms.MonthCalendar control allows the user to select a date and time using a visual display. You can limit the date and times that can be selected by setting the System.Windows.Forms.MonthCalendar.MinDate and System.Windows.Forms.MonthCalendar.MaxDate properties.

b) MonthCalendar

Example Syntax:

c) ToString

[C#] public MonthCalendar( );

[C++] public: MonthCalendar( );

[VB] Public Sub New( )

[JScript] public function MonthCalendar( );

Description

Initializes a new instance of the System.Windows.Forms.MonthCalendar class.

Creates a new System.Windows.Forms.MonthCalendar object.

d) AccessibilityObject e) AccessibleDefaultActionDescription f) AccessibleDescription g) AccessibleName h) AccessibleRole i) AllowDrop j) Anchor k) AnnuallyBoldedDates l) ToString Description The array of System.DateTime objects that determines which annual days are shown in bold.

Using this property you can add multiple dates to the array of annually bolded dates. When you assign an array of dates the existing dates are cleared.

m) BackColor n) ToString

[C#] public override Color BackColor {get; set;}

[C++] public: _property virtual Color get_BackColor( ); public: _property virtual void set_BackColor(Color);

[VB] Overrides Public Property BackColor As Color

[JScript] public function get BackColor( ): Color; public function set BackColor(Color);

Description o) BackgroundImage p) ToString

[C#] public override Image BackgroundImage {get; set;}

[C++] public: _property virtual Image* get_BackgroundImage( ); public: _property virtual void set_BackgroundImage (Image*);

[VB] Overrides Public Property BackgroundImage As Image

[JScript] public function get BackgroundImage( ): Image; public function set BackgroundImage(Image);

Description q) BindingContext r) BoldedDates s) ToString

Description

Gets or sets the array of System.DateTime objects that determines which nonrecurring dates are displayed in bold.

Using this property you can assign an array of bolded dates. When you assign an array of dates the existing dates are first cleared.

t) Bottom u) Bounds v) CalendarDimensions w) ToString

Description

Gets or sets the number of columns and rows of months displayed.

Only one calendar year is displayed at a time, and the maximum number of months that can be displayed is 12. Valid combinations of columns and rows make a maximum product of 12; for values greater than the display will be modified on a best-fit basis.

x) CanFocus y) CanSelect z) Capture aa) CausesValidation bb) ClientRectangle cc) ClientSize dd) CompanyName ee) Container ff) ContainsFocus gg) ContextMenu hh) Controls ii) Created jj) CreateParams kk) ToString Description This is called when creating a window. Inheriting classes can overide this to add extra functionality, but should not forget to first call base.getCreateParams( ) to make sure the control continues to work correctly.

ll) Cursor mm) DataBindings nn) DefaultImeMode oo) ToString

Description

Gets a value indicating the input method editor for the System.Windows.Forms.MonthCalendar.

pp) DefaultSize qq) ToString

[C#] protected override Size DefaultSize {get;}

[C++] protected: property virtual Size get_DefaultSize( );

[VB] Overrides Protected ReadOnly Property DefaultSize As Size

[JScript] protected function get DefaultSize( ): Size;

Description

Gets the default size of the calendar.

The System.Windows.Forms.MonthCalendar.DefaultSize property includes the area necessary to include the "Today:" date display at the bottom of the calendar.

rr) DesignMode
ss) DisplayRectangle
tt) Disposing
uu) Dock
vv) Enabled
ww) Events
xx) FirstDayOfWeek
yy) ToString Description Gets or sets the first day of the week as displayed in the month calendar.

The following example uses the System.Windows.Forms.MonthCalendar.FirstDayOfWeek to modify the calendar display to begin with a day of the week other than the default. This example assumes that a System.Windows.Forms.MonthCalendar control, named monthCalendar1, and a System.Windows.Forms.ComboBox control, has been added to a System.Windows.Forms. Form and that this method is placed within the form and called from it.

zz) Focused
aaa) Font
bbb) FontHeight
ccc) ForeColor
ddd) ToString

Description eee) Handle
fff) HasChildren
ggg) Height
hhh) ImeMode
iii) ToString

Description

Gets or sets the Input Method Editor(IME) mode supported by this control.

jjj) InvokeRequired
kkk) IsAccessible
lll) IsDisposed
mmm) IsHandleCreated
nnn) Left
ooo) Location
ppp) MaxDate
qqq) ToString Description Gets or sets the maximum allowable date.

rrr) MaxSelectionCount
sss) ToString

[C#] public int MaxSelectionCount {get; set;}

[C++] public: _property int get_MaxSelectionCount( ); public: _property void set_MaxSelectionCount(int);

[VB] Public Property MaxSelectionCount As Integer

[JScript] public function get MaxSelectionCount( ): int; public function set MaxSelectionCount(int);

Description

The maximum number of days that can be selected in a month calendar control.

Setting this property does not affect the current selection range.

ttt) MinDate
uuu) ToString

[C#] public DateTime MinDate {get; set;}

[C++] public: _property DateTime get_MinDate( ); public: _property void set_MinDate(DateTime);

[VB] Public Property MinDate As DateTime

[JScript] public function get MinDate( ): DateTime; public function set MinDate(DateTime);

Description

Gets or sets the minimum allowable date.

vvv) MonthlyBoldedDates
www) ToString

[C#] public DateTime[ ] MonthlyBoldedDates {get; set;}

[C++] public: _property DateTime get_MonthlyBoldedDates( ); public: _property void set_MonthlyBoldedDates (DateTime[ ]);

[VB] Public Property MonthlyBoldedDates As DateTime 0

[JScript] public function get MonthlyBoldedDates( ): DateTime[ ]; public function set MonthlyBoldedDates (DateTime[ ]);

Description

The array of System.DateTime objects that determine which monthly days to bold.

Using this property you assign an array of monthly bolded dates. When you assign an array of dates, any preexisting dates are cleared.

xxx) Name
yyy) Parent
zzz) ProductName
aaaa) ProductVersion
bbbb) RecreatingHandle
cccc) Region
dddd) RenderRightToLeft
eeee) ResizeRedraw
ffff) Right
gggg) RightToLeft
hhhh) ScrollChange
iiii) ToString Description The scroll rate for a month calendar control.

The scroll rate is the number of months that the control moves its display when the user clicks a scroll button. If this value is zero, the number of months is reset to the default, which is the number of months displayed in the control. The maximum value is 20000.

jjjj) SelectionEnd
kkkk) ToString

[C#] public DateTime SelectionEnd {get; set;}

[C++] public: _property DateTime get_SelectionEnd( ); public: _property void set_SelectionEnd(DateTime);

[VB] Public Property SelectionEnd As DateTime

[JScript] public function get SelectionEnd( ): DateTime; public function set SelectionEnd(DateTime);

Description

Gets or sets the end date of the selected range of dates.

If you set System.Windows.Forms.MonthCalendar.SelectionEnd to a date that is earlier than the current System.Windows.Forms.MonthCalendar.SelectionStart, then System.Windows.Forms.MonthCalendar.SelectionStart is automatically set equal to System.Windows.Forms.MonthCalendar.SelectionEnd.

llll) SelectionRange mmmm)ToString

[C#] public SelectionRange SelectionRange {get; set;}

[C++] public: _property SelectionRange* get_SelectionRange( ); public: _property void set_SelectionRange(SelectionRange*);

[VB] Public Property SelectionRange As SelectionRange

[JScript] public function get SelectionRange( ): SelectionRange; public function set SelectionRange(SelectionRange);

Description

Retrieves the selected range of dates for a month calendar control.

Setting this property is functionally equivalent to using the System.Windows.Forms.MonthCalendar.SetSelectionRange(System.DateTime,System.Date Time) method. You can set the start and end dates separately by setting either System.Windows.Forms.MonthCalendar.SelectionStart or System.Windows.Forms.MonthCalendar.SelectionEnd.

nnnn) SelectionStart oooo) ToString

[C#] public DateTime SelectionStart {get; set;}

[C++] public: _property DateTime get_SelectionStart( ); public: _property void set_SelectionStart(DateTime);

[VB] Public Property SelectionStart As DateTime

[JScript] public function get_SelectionStart( ): DateTime; public function set SelectionStart(DateTime);

Description

Gets or sets the start date of the selected range of dates.

If you set System.Windows.Forms.MonthCalendar.SelectionStart to a date that is later than the current System.Windows.Forms.MonthCalendar.SelectionEnd then System.Windows.Forms.MonthCalendar.SelectionEnd is automatically set equal to System.Windows.Forms.MonthCalendar.SelectionStart.

pppp) ShowFocusCues qqqq) ShowKeyboardCues rrrr) ShowToday ssss) ToString

Description

Gets or sets a value indicating whether the date represented by the System.Windows.Forms.MonthCalendar.TodayDate property is shown at the bottom of the control.

The date is shown in the format specified by the system settings for the short date format.

tttt) ShowTodayCircle uuuu) ToString

[C#] public bool ShowTodayCircle {get; set;}

[C++] public: _property bool get_ShowTodayCircle( ); public: _property void set_ShowTodayCircle(bool);

[VB] Public Property ShowTodayCircle As Boolean

[JScript] public function get ShowTodayCircle( ): Boolean; public function set ShowTodayCircle(Boolean);

Description

Gets or sets a value indicating whether today's date is circled.

vvvv) ShowWeekNumbers wwww)ToString

[C#] public bool ShowWeekNumbers {get; set;}

[C++] public: _property bool get_ShowWeekNumbers( ); public: _property void set_ShowWeekNumbers(bool);

[VB] Public Property ShowWeekNumbers As Boolean

[JScript] public function get ShowWeekNumbers( ): Boolean; public function set ShowWeekNumbers(Boolean);

Description

Gets or sets a value indicating whether the month calendar control displays week numbers (1-52) to the left of each row of days.

xxxx) SingleMonthSize yyyy) ToString

[C#] public Size SingleMonthSize {get;}

[C++] public: _property Size get_SingleMonthSize( );

[VB] Public ReadOnly Property SingleMonthSize As Size

[JScript] public function get SingleMonthSize( ): Size;

Description

Gets the minimum size to display one month of the calendar.

The size information is presented in the form of x and y members representing the minimum width and height required to display one month in the control. The minimum required window size for a month calendar control depends on the currently selected font.

zzzz) Site aaaaa) Size bbbbb) TabIndex ccccc) TabStop ddddd) Tag eeeee) Text fffff) ToString Description ggggg) TitleBackColor hhhhh)ToString

[C#] public Color TitleBackColor {get; set;}

[C++] public: _property Color get TitleBackColor( ); public: _property void set_TitleBackColor(Color);

[VB] Public Property TitleBackColor As Color

[JScript] public function get TitleBackColor( ): Color; public function set TitleBackColor(Color);

Description

Gets or sets a value indicating the background color of the calendar's title area.

The font color of the days of the week text depends on the System.Windows.Forms.MonthCalendar.TitleBackColor property. Setting the System.Windows.Forms.MonthCalendar.TitleBackColor equal to the System.Windows.Forms.Control.BackColor for the main display area of the calendar causes the day of the week text to become unreadable.

iiiii) TitleForeColor jjjjj) ToString

[C#] public Color TitleForeColor {get; set;}

[C++] public: _property Color get_TitleForeColor( ); public: _property void set_TitleForeColor(Color);

[VB] Public Property TitleForeColor As Color

[JScript] public function get TitleForeColor( ): Color; public function set TitleForeColor(Color);

Description

Gets or sets a value indicating the foreground color of the calendar's title area.

kkkkk) TodayDate lllll) ToString

[C#] public DateTime TodayDate {get; set;}

[C++] public: _property DateTime get_TodayDate( ); public: _property void set_TodayDate(DateTime);

[VB] Public Property TodayDate As DateTime

[JScript] public function get TodayDate( ): DateTime; public function set TodayDate(DateTime);

Description

Gets or sets the value that is used by System.Windows.Forms.MonthCalendar as today's date.

By default the System.Windows.Forms.MonthCalendar.TodayDate property returns the current system time, and the System.Windows.Forms.MonthCalendar.TodayDateSet property is false. Setting the System.Windows.Forms.MonthCalendar.TodayDate property sets the System.Windows.Forms.MonthCalendar.TodayDateSet property to true, and from that point the value returned by the System.Windows.Forms.MonthCalendar.TodayDate property is the one the user sets.

mmmmm) TodayDateSet nnnnn) ToString

[C#] public bool TodayDateSet {get;}

[C++] public: _property bool get_TodayDateSet( );

[VB] Public ReadOnly Property TodayDateSet As Boolean

[JScript] public function get TodayDateSet( ): Boolean;

Description

Gets a value indicating whether the System.Windows.Forms.MonthCalendar.TodayDate property has been explicitly set.

ooooo) Top ppppp) TopLevelControl qqqqq) TrailingForeColor rrrrr) ToString

Description

Gets or sets a value indicating the color of days in months that are not fully displayed in the control.

When the calendar is displayed, there can be dates that precede and follow the months that are fully displayed. Using the System.Windows.Forms.MonthCalendar.TrailingForeColor property; you can modify the color of the text in which those days are displayed.

sssss) Visible ttttt) Width uuuuu) WindowTarget vvvvv) ToString wwwww)ToString

Description

Occurs when the date selected in the System.Windows.Forms.MonthCalendar changes.

When you create a System.Windows.Forms.MonthCalendar.DateChanged delegate, you identify the method that will handle the event. To associate the event with your event handler, add an instance of the delegate to the event. The event handler is called whenever the event occurs, unless you remove the delegate. For more information about event handler delegates, see.

xxxxx) ToString

[C#] public event DateRangeEventHandler DateSelected;

[C++] public: _event DateRangeEventHandler* DateSelected;

[VB] Public Event DateSelected As DateRangeEventHandler

Description

Occurs when a date is selected in the month calendar.

When you create a System.Windows.Forms.MonthCalendar.DateSelected delegate, you identify the method that will handle the event. To associate the event with your event handler, add an instance of the delegate to the event. The event handler is called whenever the event occurs, unless you remove the delegate. For more information about event handler delegates, see.

yyyyy) ToString zzzzz) AddAnnuallyBoldedDate

[C#] public void AddAnnuallyBoldedDate(DateTime date);

[C++] public: void AddAnnuallyBoldedDate(DateTime date);

[VB] Public Sub AddAnnuallyBoldedDate(ByVal date As DateTime)

[JScript] public function AddAnnuallyBoldedDate(date: DateTime);

Description

Adds a day that is displayed in bold on an annual basis in the month calendar.

You must call System.Windows.Forms.MonthCalendar.UpdateBoldedDates afterwards to update the display. The date to be displayed in bold.

aaaaaa) AddBoldedDate

[C#] public void AddBoldedDate(DateTime date);

[C++] public: void AddBoldedDate(DateTime date);

[VB] Public Sub AddBoldedDate(ByVal date As DateTime)

[JScript] public function AddBoldedDate(date: DateTime);

Description

Adds a day to be displayed in bold in the month calendar.

You must call System.Windows.Forms.MonthCalendar.UpdateBoldedDates afterwards to update the display. The date to be displayed in bold.

bbbbbb) AddMonthlyBoldedDate

[C#] public void AddMonthlyBoldedDate(DateTime date);

[C++] public: void AddMonthlyBoldedDate(DateTime date);

[VB] Public Sub AddMonthlyBoldedDate(ByVal date As DateTime)

[JScript] public function AddMonthlyBoldedDate(date: DateTime);

Description

Adds a day that is displayed in bold on a monthly basis in the month calendar.

You must call System.Windows.Forms.MonthCalendar.UpdateBoldedDates afterwards to update the display. The date to be displayed in bold.

cccccc) CreateHandle

[C#] protected override void CreateHandle( );

[C++] protected: void CreateHandle( );

[VB] Overrides Protected Sub CreateHandle( )

[JScript] protected override function CreateHandle( );

Description dddddd)Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Called to cleanup a MonthCalendar. Normally you do not need to call this as the garbage collector will cleanup the buffer for you. However, there may be times when you may want to expedite the garbage collectors cleanup.

eeeeee) GetDisplayRange

[C#] public SelectionRange GetDisplayRange(bool visible);

[C++] public: SelectionRange* GetDisplayRange(bool visible);

[VB] Public Function GetDisplayRange(ByVal visible As Boolean) As SelectionRange

[JScript] public function GetDisplayRange(visible: Boolean): SelectionRange;

Description

Retrieves date information that represents the low and high limits of the control's displayed dates.

Return Value: The begin and end dates of the displayed calendar.

The System.Windows.Forms.MonthCalendar.Get DisplayRange(System.Boolean) method returns a System.Windows.Forms.MonthCalendar.SelectionRange object that contains the begin and end dates that are displayed in the current view of the control. You can modify the returned range based on the value you specify for the visible parameter. By specifying false you can retrieve all dates displayed on the control; specifying true retrieves only those dates that are part of fully displayed months. true to retrieve only the dates that are fully contained in displayed months; otherwise, false.

ffffff) HitTest

[C#] public HitTestInfo HitTest(Point point);

[C++] public: HitTestInfo* HitTest(Point point);

[VB] Public Function HitTest(ByVal point As Point) As HitTestInfo

[JScript] public function HitTest(point: Point): HitTestInfo;

Description

Returns an object with information on which portion of a month calendar control is at a location specified by a System.Drawing.Point object.

Return Value: A System.Windows.Forms.MonthCalendar.HitTestInfo object that contains information about the specified point on the System.Windows.Forms.MonthCalendar. A System.Drawing.Point object containing the x and y coordinates of the point to be hit-tested.

gggggg) HitTest

[C#] public HitTestInfo HitTest(int x, int y);

[C++] public: HitTestInfo* HitTest(int x, int y);

[VB] Public Function HitTest(ByVal x As Integer, ByVal y As Integer) As HitTestInfo

[JScript] public function HitTest(x: int, y: int): HitTestInfo; Determines which element of the calendar is at a specified location.

Description

Returns a System.Windows.Forms.MonthCalendar.HitTestInfo object with information on which portion of a month calendar control is at a specified x and y location.

Return Value: A System.Windows.Forms.MonthCalendar.HitTestInfo object that contains information about the specified point on the System.Windows.Forms.MonthCalendar. The x coordinate of the point to be hit-tested. The y coordinate of the point to be hit-tested.

hhhhhh) IsInputKey

[C#] protected override bool IsInputKey(Keys keyData);

[C++] protected: bool IsInputKey(Keys keyData);

[VB] Overrides Protected Function IsInputKey(ByVal keyData As Keys) As Boolean

[JScript] protected override function IsInputKey(keyData: Keys): Boolean;

Description

Handling special input keys, such as pgup, pgdown, home, end, etc. . . .

iiiiii) OnBackColorChanged

[C#] protected override void OnBackColorChanged(EventArgs e);

[C++] protected: void OnBackColorChanged(EventArgs* e);

[VB] Overrides Protected Sub OnBackColorChanged(ByVal e As EventArgs)

[JScript] protected override function OnBackColorChanged(e: EventArgs);

Description jjjjjj) OnDateChanged

[C#] protected virtual void OnDateChanged(DateRange EventArgs drevent);

[C++] protected: virtual void OnDateChanged(DateRange EventArgs* drevent);

[VB] Overridable Protected Sub OnDateChanged(ByVal drevent As DateRangeEventArgs)

[JScript] protected function OnDateChanged(drevent: Date RangeEventArgs);

Description

Raises the System.Windows.Forms.MonthCalendar.DateChanged event.

Raising an event invokes the event handler through a delegate. For more information, see. A System.Windows.Forms.Date RangeEventArgs that contains the event data.

kkkkkk) OnDateSelected

[C#] protected virtual void OnDateSelected(DateRange EventArgs drevent);

[C++] protected: virtual void OnDateSelected(DateRange EventArgs* drevent);

[VB] Overridable Protected Sub OnDateSelected(ByVal drevent As DateRangeEventArgs)

[JScript] protected function OnDateSelected(drevent: Date RangeEventArgs);

Description

Raises the System.Windows.Forms.MonthCalendar.DateSelected event.

Raising an event invokes the event handler through a delegate. For more information, see. A System.Windows.Forms.Date RangeEventArgs that contains the event data.

llllll) OnFontChanged

[C#] protected override void OnFontChanged(EventArgs e);

[C++] protected: void OnFontChanged(EventArgs* e);

[VB] Overrides Protected Sub OnFontChanged(ByVal e As EventArgs)

[JScript] protected override function OnFontChanged(e: EventArgs);

Description

Raises the System.Windows.Forms.Control.FontChanged event.

The System.Windows.Forms.MonthCalendar.On Font Changed(System. Event Args) method resizes the control based on the new font size. This can cause the calendar to overlap other controls on the form if the potential sizing issues have not been taken into account. An System.Event Args that contains the event data.

mmmmmm) OnForeColorChanged

[C#] protected override void OnForeColorChanged(Event Args e);

[C++] protected: void OnForeColorChanged(EventArgs* e);

[VB] Overrides Protected Sub OnForeColorChanged(ByVal e As EventArgs)

[JScript] protected override function OnForeColorChanged (e: EventArgs);

Description nnnnnn) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

Overrides Control.OnHandleCreated( ) Overrides Control OnHandleCreated( )

oooooo) RemoveAllAnnuallyBoldedDates

[C#] public void RemoveAllAnnuallyBoldedDates( );

[C++] public: void RemoveAllAnnuallyBoldedDates( );

[VB] Public Sub RemoveAllAnnuallyBoldedDates( )

[JScript] public function RemoveAllAnnuallyBolded Dates( );

Description

Removes all the annually bolded dates.

This method clears all dates from the System.Windows. Forms.MonthCalendar.AnnuallyBoldedDates array. To remove a single date from the bolded dates, use the System. Windows.Forms.MonthCalendar. RemoveAnnuallyBolded-Date(System.DateTime) method.

pppppp) RemoveAllBoldedDates

[C#] public void RemoveAllBoldedDates( );

[C++] public: void RemoveAllBoldedDates( );

[VB] Public Sub RemoveAllBoldedDates( )

[JScript] public function RemoveAllBoldedDates( );

Description

Removes all the nonrecurring bolded dates.

This method clears the System.Windows.Forms.MonthCalendar.BoldedDates array. To remove a single date from the bolded dates, use the System.Windows.Forms. MonthCalendar. RemoveBolded Date(System.DateTime) method.

qqqqqq) RemoveAllMonthlyBoldedDates

[C#] public void RemoveAllMonthlyBoldedDates( );

[C++] public: void RemoveAllMonthlyBoldedDates( );

[VB] Public Sub RemoveAllMonthlyBoldedDates( )

[JScript] public function RemoveAllMonthlyBolded Dates( );

Description

Removes all the monthly bolded dates.

This method clears the System.Windows.Forms.MonthCalendar.MonthlyBoldedDates array. To remove a single date from the bolded dates, use the System.Windows.Forms. MonthCalendar.RemoveMonthlyBoldedDate(System.Date Time) method.

rrrrrr) RemoveAnnuallyBoldedDate

[C#] public void RemoveAnnuallyBoldedDate(DateTime date);

[C++] public: void RemoveAnnuallyBoldedDate(DateTime date);

[VB] Public Sub RemoveAnnuallyBoldedDate(ByVal date As DateTime)

[JScript] public function RemoveAnnuallyBoldedDate(date: DateTime);

Description

Removes the specified date from the list of annually bolded dates.

If the specified date occurs more than once in the date list, then only the first date is removed. When comparing dates, only the day and month are used. You must call System.Windows.Forms.MonthCalendar.UpdateBoldedDates to ensure that the display is updated to reflect the removal. The date to remove from the list.

ssssss) RemoveBoldedDate

[C#] public void RemoveBoldedDate(DateTime date);

[C++] public: void RemoveBoldedDate(DateTime date);

[VB] Public Sub RemoveBoldedDate(ByVal date As DateTime)

[JScript] public function RemoveBoldedDate(date: DateTime);

Description

Removes the specified date from the list of nonrecurring bolded dates.

If the specified date occurs more than once in the date list, then only the first date is removed. You must call System.Windows.Forms.MonthCalendar.UpdateBoldedDates to ensure that the display is updated to reflect the removal. The date to remove from the list.

tttttt) RemoveMonthlyBoldedDate

[C#] public void RemoveMonthlyBoldedDate(DateTime date);

[C++] public: void RemoveMonthlyBoldedDate(DateTime date);

[VB] Public Sub RemoveMonthlyBoldedDate(ByVal date As DateTime)

[JScript] public function RemoveMonthlyBoldedDate(date: DateTime);

Description

Removes the specified date from the list of monthly bolded dates.

If the specified date occurs more than once in the date list, then only the first date is removed. When comparing dates, only the day and month are used. You must call System.Windows.Forms.MonthCalendar.UpdateBoldedDates to ensure that the display is updated to reflect the removal. The date to remove from the list.

uuuuuu)SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As BoundsSpecified)

[JScript] protected override function SetBoundsCore(x: int, y: int, width: int, height: int, specified: BoundsSpecified); Overrides Control.SetBoundsCore to enforce auto-sizing.

vvvvvv) SetCalendarDimensions

[C#] public void SetCalendarDimensions(int x, int y);

[C++] public: void SetCalendarDimensions(int x, int y);

[VB] Public Sub SetCalendarDimensions(ByVal x As Integer, ByVal y As Integer)

[JScript] public function SetCalendarDimensions(x: int, y: int);

Description

Sets the number of columns and rows of months to display.

The maximum number of months that will be displayed is 12; restricted to one calendar year. The product of the x and y parameters should be or less. For values of x and y that have a product of more than 12, the greater of the x and y values will be iteratively reduced until the product is or less. The number of columns. The number of rows.

wwwwww) SetDate

[C#] public void SetDate(DateTime date);

[C++] public: void SetDate(DateTime date);

[VB] Public Sub SetDate(ByVal date As DateTime)

[JScript] public function SetDate(date: DateTime);

Description

Sets a date as the current selected date.

This method sets the System.Windows.Forms.MonthCalendar.SelectionStart and the System.Windows.Forms.MonthCalendar.SelectionEnd properties to the specified date and is the functional equivalent of setting the selection range to a single day through the System.Windows.Forms.MonthCalendar.SetSelectionRange(System.DateTime,System.DateTime) method or the System.Windows.Forms.MonthCalendar.SelectionRange property. The date to be selected.

xxxxxx) SetSelectionRange

[C#] public void SetSelectionRange(DateTime date1, DateTime date2);

[C++] public: void SetSelectionRange(DateTime date1, DateTime date2);

[VB] Public Sub SetSelectionRange(ByVal date1 As DateTime, ByVal date 2 As DateTime)

[JScript] public function SetSelectionRange(date1: DateTime, date2: DateTime);

Description

Sets the selected dates in a month calendar control to the specified date range.

Using this method is functionally equivalent to setting the System.Windows.Forms.MonthCalendar.SelectionRange property. You can set the start and end dates separately by setting either System.Windows.Forms.MonthCalendar.SelectionStart or System.Windows.Forms.MonthCalendar.SelectionEnd. The beginning date of the selection range. The end date of the selection range.

yyyyyy)ToString

[C#] public override string ToString( );

[C++] public: String* ToString( );

[VB] Overrides Public Function ToString( ) As String

[JScript] public override function ToString( ): String;

Description

Returns a string representation for this control.

Return Value, String Returns a string representation for this control.

zzzzzz) UpdateBoldedDates

[C#] public void UpdateBoldedDates( );

[C++] public: void UpdateBoldedDates( );

[VB] Public Sub UpdateBoldedDates( )

[JScript] public function UpdateBoldedDates( );

Description

Repaints the bolded dates reflect the dates set in the lists of bolded dates. Use the System.Windows.Forms.MonthCalendar.UpdateBoldedDates method to reflect changes made to System.Windows.Forms.MonthCalendar.AnnuallyBoldedDates, System.Windows.Forms.MonthCalendar.MonthlyBoldedDates, or System.Windows.Forms.MonthCalendar.BoldedDates either directly by modifying elements of the array or through any of the add or remove methods provided to modify the lists.

aaaaaaa) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

Overrided wndProc Overrided wndProc

MouseButtons enumeration (System.Windows.Forms)

a) WndProc

Description

Specifies constants that define which mouse button was pressed.

This enumeration is used by many classes, including System.Windows.Forms.AxHost, System.Windows.Forms.Controli, System.Windows.Forms.DataGrid, System.Windows.Forms. Form, System.Windows.Forms.RadioButton, System.Windows.Forms.Splitter, System.Windows. Forms.StatusBar, and System.Windows.Forms.UpDownBase.

b) WndProc

[C#] public const MouseButtons Left;

[C++] public: const MouseButtons Left;

[VB] Public Const Left As MouseButtons

[JScript] public var Left MouseButtons;

Description

The left mouse button was pressed.

c) WndProc

[C#] public const MouseButtons Middle;

[C++] public: const MouseButtons Middle;

[VB] Public Const Middle As MouseButtons

[JScript] public var Middle MouseButtons;

Description

The middle mouse button was pressed.

d) WndProc

[C#] public const MouseButtons None;

[C++] public: const MouseButtons None;

[VB] Public Const None As MouseButtons

[JScript] public var None: MouseButtons;

Description

No mouse button was pressed.

e) WndProc

[C#] public const MouseButtons Right;

[C++] public: const MouseButtons Right;

[VB] Public Const Right As MouseButtons

[JScript] public var Right: MouseButtons;

Description

The right mouse button was pressed.

f) WndProc

[C#] public const MouseButtons XButton1;

[C++] public: const MouseButtons XButton1;

[VB] Public Const XButton1 As MouseButtons

[JScript] public var XButton1 MouseButtons;

Description

The first XButton was pressed.

g) WndProc

[C#] public const MouseButtons XButton2;

[C++] public: const MouseButtons XButton2;

[VB] Public Const XButton2 As MouseButtons

[JScript] public var XButton2: MouseButtons;

Description

The second XButton was pressed.

MouseEventArgs class (System.Windows.Forms)

a) ToString

Description

Provides data for the MouseUp, MouseDown, and MouseMove events.

The MouseDown event occurs when the user presses the mouse button while the pointer is over a control. The MouseUp event occurs when the user releases the mouse button while the pointer remains over the control. The MouseMove event occurs when the user moves the mouse pointer over a control. A MouseEventArgs specifies which mouse button is pressed, how many times, the coordinates of the mouse click, and the amount the mouse wheel moved.

b) MouseEventArgs

Example Syntax:

c) ToString

[C#] public MouseEventArgs(MouseButtons button, int clicks, it x, int y, int delta);

[C++] public: MouseEventArgs(MouseButtons button, int clicks, int x, int y, int delta);

[VB] Public Sub New(ByVal button As MouseButtons, ByVal clicks As Integer, ByVal x As Integer, ByVal y As Integer, ByVal delta As Integer)

[JScript] public function MouseEventArgs(button: MouseButtons, clicks: int, x: int, y: int, delta: int);

Description

Initializes a new instance of the System.Windows.Forms.MouseEventArgs class. One of the System.Windows.Forms.MouseButtons values indicating which mouse button was pressed. The number of times a mouse button was pressed. The x-coordinate of a mouse click, in pixels. The y-coordinate of a mouse click, in pixels. A signed count of the number of detents the wheel has rotated.

d) Button e) ToString

[C#] public MouseButtons Button {get;}

[C++] public: _property MouseButtons get_Button( );

[VB] Public ReadOnly Property Button As MouseButtons

[JScript] public function get Button( ): MouseButtons;

Description

Gets which mouse button was pressed.

f) Clicks g) ToString

[C#] public int Clicks {get;}

[C++] public: _property int get_Clicks( );

[VB] Public ReadOnly Property Clicks As Integer

[JScript] public function get Clicks( ): int;

Description

Gets the number of times the mouse button was pressed and released.

h) Delta i) ToString

[C#] public int Delta {get;}

[C++] public: _property int get Delta( );

[VB] Public ReadOnly Property Delta As Integer

[JScript] public function get Delta( ): int;

Description

Gets a signed count of the number of detents the mouse wheel has rotated. A detent is the rotation of the mouse wheel one notch.

The mouse wheel combines the features of a wheel and a mouse button. The wheel has discrete, evenly-spaced notches. When you rotate the wheel, a wheel message is sent as each notch is encountered. One wheel notch, a detent, is defined by the windows constant WHEEL_DELTA, which is 120. A positive value indicates that the wheel was rotated forward, away from the user; a negative value indicates that the wheel was rotated backward, toward the user.

j) X k) ToString

[C#] public int X {get;}

[C++] public: _property int get_X( );

[VB] Public ReadOnly Property X As Integer

[JScript] public function get X( ): int;

Description

Gets the x-coordinate of a mouse click.

The mouse click coordinates are based on the client area of the form.

m) ToString

[C#] public int Y {get;}

[C++] public: _property int get_Y( );

[VB] Public ReadOnly Property Y As Integer

[JScript] public function get Y( ): int;

Description

Gets the y-coordinate of a mouse click.

The mouse click coordinates are based on the client area of the form.

MouseEventHandler delegate (System.Windows.Forms)

a) ToString

Description

Represents the method that will handle the MouseDown, MouseUp, or MouseMove event of a form, control, or other component. The source of the event. A System.Windows.Forms.MouseEventArgs that contains the event data.

When you create a System.Windows.Forms.Mouse EventHandler delegate, you identify the method that will handle the event. To associate the event with your event handler, add an instance of the delegate to the event. The event handler is called whenever the event occurs, unless you remove the delegate. For more information about handling events with delegates, see.

NativeWindow class (System.Windows.Forms)

a) ToString

Description

Provides a low-level encapsulation of a window handle and a window procedure. This class automatically manages window class creation and registration.

b) NativeWindow

Example Syntax:

c) ToString

[C#] public NativeWindow( );

[C++] public: NativeWindow( );

[VB] Public Sub New( )

[JScript] public function NativeWindow( );

d) Handle e) ToString

[C#] public IntPtr Handle {get;}

[C++] public: _property IntPtr get_Handle( );

[VB] Public ReadOnly Property Handle As IntPtr

[JScript] public function get Handle( ): IntPtr;

Description

Gets the handle for this window.

Use this method when calling Windows API methods that require a handle for a window or control.

f) AssignHandle

[C#] public void AssignHandle(IntPtr handle);

[C++] public: void AssignHandle(IntPtr handle);

[VB] Public Sub AssignHandle(ByVal handle As IntPtr)

[JScript] public function AssignHandle(handle: IntPtr);

Description

Assigns a handle to this window.

System.Windows.Forms.NativeWindow.WndProc(System.Windows.Forms.Message@) intercepts window messages sent to the handle parameter. Use System.Windows.Forms.NativeWindow.ReleaseHandle to reset the handle's window procedure to the default window procedure. The handle to assign to this window.

g) CreateHandle

[C#] public virtual void CreateHandle(CreateParams cp);

[C++] public: virtual void CreateHandle(CreateParams* cp);

[VB] Overridable Public Sub CreateHandle(ByVal cp As CreateParams)

[JScript] public function CreateHandle(cp: CreateParams);

Description

Creates a window handle for this window.

The cp parameter specifies the values that are passed to the NativeMethods.Windows.CreateWindowEx API method to create a window and its handle. A System.Windows.Forms.CreateParams that specifies the creation parameters for this window.

h) Def WndProc

[C#] public void DefWndProc(ref Message m);

[C++] public: void DefWndProc(Message* m);

[VB] Public Sub DefWndProc(ByRef m As Message)

[JScript] public function DefWndProc(m: Message);

Description

Invokes the default window procedure associated with this window. It is an error to call this method when the System.Windows.Forms.NativeWindow.Handle property is zero. The message that is currently being processed.

i) DestroyHandle

[C#] public virtual void DestroyHandle( );

[C++] public: virtual void DestroyHandle( );

[VB] Overridable Public Sub DestroyHandle( )

[JScript] public function DestroyHandle( );

Description

Destroys the handle associated with this window.

This method sets the System.Windows.Forms.NativeWindow.Handle 10 property to zero, and calls the System.Windows.Forms.NativeWindow.OnHandleChange method to reflect the change.

j) Finalize

[C#]~NativeWindow( );

[C++]~NativeWindow( );

[VB] Overrides Protected Sub Finalize( )

[JScript] protected override function Finalize( );

Description

Releases the resources associated with this window.

k) FromHandle

[C#] public static NativeWindow FromHandle(IntPtr handle);

[C++] public: static NativeWindow* FromHandle(IntPtr handle);

[VB] Public Shared Function FromHandle(ByVal handle As IntPtr) As NativeWindow

[JScript] public static function FromHandle(handle: IntPtr): NativeWindow;

Description

Retrieves the window associated with the specified handle.

Return Value: The System.Windows.Forms.NativeWindow associated with the specified handle. This method returns null when the handle does not have an associated window.

If you receive a handle from another method, use this method to retrieve the window associated with the handle. A handle to a window.

l) OnHandleChange

[C#] protected virtual void OnHandleChange( );

[C++] protected: virtual void OnHandleChange( );

[VB] Overridable Protected Sub OnHandleChange( )

[JScript] protected function OnHandleChange( );

Description

Specifies a notification method that is called when the handle for a window is changed.

This method is invoked when the value of the System.Windows.Forms.NativeWindow.Handle property has changed.

m) OnThreadException

[C#] protected virtual void OnThreadException(Exception e);

[C++] protected: virtual void OnThreadException(Exception* e);

[VB] Overridable Protected Sub OnThreadException(ByVal e As Exception)

[JScript] protected function OnThreadException(e: Exception);

Description

When overridden in a derived class, manages an unhandled thread exception.

Typically, System.Windows.Forms.Application.On ThreadException(System.Exception) handles thread exceptions. An System.Exception that specifies the unhandled thread exception.

n) ReleaseHandle

[C#] public virtual void ReleaseHandle( );

[C++] public: virtual void ReleaseHandle( );

[VB] Overridable Public Sub ReleaseHandle( )

[JScript] public function ReleaseHandle( );

Description

Releases the handle associated with this window.

This method does not destroy the window handle. Instead, it sets the handle's window procedure to the default window procedure. It sets the System.Windows.Forms.NativeWindow.Handle property to zero and calls System.Windows.Forms.NativeWindow.OnHandleChange to reflect the change.

o) WndProc

[C#] protected virtual void WndProc(ref Message m);

[C++] protected: virtual void WndProc(Message* m);

[VB] Overridable Protected Sub WndProc(ByRef m As Message)

[JScript] protected function WndProc(m: Message);

Description

Invokes the default window procedure associated with this window.

This method is called when a window message is sent to the handle of the window. A System.Windows.Forms.Message that is associated with the current Windows message.

NavigateEventArgs class (System.Windows.Forms)

a) WndProc

Description

Provides data for the System.Windows.Forms.DataGrid.Navigate event.

For more information about handling events, see.

b) NavigateEventArgs

Example Syntax:

c) WndProc

[C#] public NavigateEventArgs(bool is Forward);

[C++] public: NavigateEventArgs(bool is Forward);

[VB] Public Sub New(ByVal is Forward As Boolean)

[JScript] public function NavigateEventArgs(is Forward: Boolean);

Description

Initializes a new instance of the System.Windows.Forms.NavigateEventArgs class.

The is Forward parameter value is assigned to the System.Windows.Forms.NavigateEventArgs. Forward property. true to navigate in a forward direction; otherwise, false.

d) Forward e) WndProc

[C#] public bool Forward {get;}

[C++] public: _property bool get_Forward( );

[VB] Public ReadOnly Property Forward As Boolean

[JScript] public function get Forward( ): Boolean;

Description

Gets a value indicating whether to navigate in a forward direction.

NavigateEventHandler delegate (System.Windows-.Forms)

a) ToString

Description

Represents the method that will handle the System.Windows.Forms.NavigateEventArgs event of a System.Windows.Forms.DataGrid. The source of the event. A System.Windows.Forms.NavigateEventArgs that contains the event data. When you create a System.Windows.Forms.Navigate Event Args delegate, you identify the method that will handle the event. To associate the event with your event handler, add an instance of the delegate to the event. The event handler is called whenever the event occurs, unless you remove the delegate. For more information about event handler delegates, see.

NodeLabelEditEventArgs class (System.Windows.Forms)

a) ToString

Description

Provides data for the System.Windows.Forms.TreeView.BeforeLabelEdit and System.Windows.Forms.TreeView.AfterLabelEdit events.

The System.Windows.Forms.TreeView.AfterLabelEdit event occurs when the user finishes editing the text for a tree node. The System.Windows.Forms.TreeView.Before LabelEdit event occurs when the user begins editing the text for a tree node. A System.Windows.Forms.NodeLabelEditEventArgs object specifies the new text to associate with the tree node, the tree node that contains the label to edit, and whether the edit operation has been canceled.

b) NodeLabelEditEventArgs

Example Syntax:

c) ToString

[C#] public NodeLabelEditEventArgs(TreeNode node);

[C++] public: NodeLabelEditEventArgs(TreeNode* node);

[VB] Public Sub New(ByVal node As TreeNode)

[JScript] public function NodeLabelEditEventArgs(node: TreeNode); Initializes a new instance of the System.Windows.Forms.NodeLabelEditEventArgs class.

Description

Initializes a new instance of the System.Windows.Forms.NodeLabelEditEventArgs class for the specified System.Windows.Forms.TreeNode.

The System.Windows.Forms.NodeLabelEditEvent Args.Node property is assigned the node parameter value. The tree node containing the text to edit.

d) NodeLabelEditEventArgs

Example Syntax:

e) ToString

[C#] public NodeLabelEditEventArgs(TreeNode node, string label);

[C++] public: NodeLabelEditEventArgs(TreeNode* node, String* label);

[VB] Public Sub New(ByVal node As TreeNode, ByVal label As String)

[JScript] public function NodeLabelEditEventArgs(node: TreeNode, label String);

Description

Initializes a new instance of the System.Windows.Forms.NodeLabelEditEventArgs class for the specified System.Windows.Forms.TreeNode and the specified text with which to update the tree node label.

The System.Windows.Forms.NodeLabelEditEvent Args.Node property is assigned the node parameter value, and the System.Windows.Forms.NodeLabelEditEventArgs.Label property is assigned the label parameter value. The tree node containing the text to edit. The new text to associate with the tree node.

f) CancelEdit g) ToString

[C#] public bool CancelEdit {get; set;}

[C++] public: _property bool get_CancelEdit( ); public: _property void set_CancelEdit(bool);

[VB] Public Property CancelEdit As Boolean

[JScript] public function get CancelEdit( ): Boolean; public function set CancelEdit(Boolean);

Description

Gets or sets a value indicating whether the edit has been canceled.

h) Label i) ToString

[C#] public string Label {get;}

[C++] public: _property String* get Label( );

[VB] Public ReadOnly Property Label As String

[JScript] public function get Label( ): String;

Description

Gets the new text to associate with the tree node.

j) Node k) ToString

[C#] public TreeNode Node {get;}

[C++] public: _property TreeNode* get Node( );

[VB] Public ReadOnly Property Node As TreeNode

[JScript] public function get Node( ): TreeNode;

Description

Gets the tree node containing the text to edit.

NodeLabelEditEventHandler delegate (System.Windows.Forms)

a) ToString

Description

Represents the method that will handle the System.Windows.Forms.TreeView.BeforeLabelEdit and System.Windows.Forms.TreeView.AfterLabelEdit events of a System.Windows.Forms.TreeView control. The source of the event. A System.Windows.Forms.NodeLabelEditEventArgs that contains the event data.

When you create a System.Windows.Forms.NodeLabelEditEventArgs delegate, you identify the method that will handle the event. To associate the event with your event handler, add an instance of the delegate to the event. The event handler is called whenever the event occurs, unless you remove the delegate. For more information about event handler delegates, see.

NotifyIcon class (System.Windows.Forms)

a) ToString

Description

Specifies a component that creates an icon in the Windows System Tray. This class cannot be inherited.

Icons in the Windows System Tray are short cuts to processes that are running in the background of a computer, such as a virus protection program or a volume control. These processes do not come with their own user interfaces.

b) NotifyIcon

Example Syntax:

c) ToString

[C#] public NotifyIcon( );

[C++] public: NotifyIcon( );

[VB] Public Sub New( )

[JScript] public function NotifyIcon( ); Initializes a new instance of the System.Windows.Forms.NotifyIcon class.

Description

Initializes a new instance of the System.Windows.Forms.NotifyIcon class. When a new System.Windows.Forms.NotifyIcon is created, the System.Windows.Forms.NotifyIcon. Visible property is set to false. You must set the System.Windows.Forms.NotifyIcon.Visible property to true in order to use the System.Windows.Forms.NotifyIcon you created. This instance will exist until its container releases it to garbage collection.

d) NotifyIcon

Example Syntax:

e) ToString

[C#] public NotifyIcon(IContainer container);

[C++] public: NotifyIcon(IContainer* container);

[VB] Public Sub New(ByVal container As IContainer)

[JScript] public function NotifyIcon(container IContainer);

Description

Initializes a new instance of the System.Windows.Forms.NotifyIcon class with the specified container.

When a new System.Windows.Forms.NotifyIcon is created, the System.Windows.Forms.NotifyIcon.Visible property is set to false. You must set the System.Windows.Forms.NotifyIcon.Visible property to true in order to use the System.Windows.Forms.NotifyIcon you created. This instance will exist until its container releases it to garbage collection. An System.ComponentModel.IContainer that represents the container for the System.Windows.Forms.NotifyIcon control.

f) Container g) ContextMenu h) ToString

Description

Gets or sets the context menu for the tray icon.

The menu is shown when a right-mouse click is performed on an icon in the system tray. Context menus also are known as pop-up menus.

i) DesignMode j) Events k) Icon l) ToString

Description

Gets or sets the current icon.

m) Site n) Text o) ToString

Description

Gets or sets the ToolTip text displayed when the mouse hovers over a system tray icon.

If the text is null, no ToolTip is displayed.

p) Visible q) ToString

[C#] public bool Visible {get; set;}

[C++] public: _property bool get Visible( ); public: _property void set_Visible(bool);

[VB] Public Property Visible As Boolean

[JScript] public function get Visible( ): Boolean; public function set Visible(Boolean);

Description

Gets or sets a value indicating whether the icon is visible in the Windows System Tray.

Since the default value is false, in order for the icon to show up in the system tray, System.Windows.Forms.NotifyIcon. Visible must be set to true by the user. By setting this property, the user is prompted to program the rest of the functionality for the icon.

r) ToString

[C#] public event EventHandler Click;

[C++] public: _event EventHandler* Click;

[VB] Public Event Click As EventHandler

Description

Occurs when the user clicks the icon in the system tray.

For information about handling events, see.

s) ToString

Description

Occurs when the user double-clicks the icon in the system tray.

For information about handling events, see.

t) ToString

[C#] public event MouseEventHandler MouseDown;

[C++] public: _event MouseEventHandler* MouseDown;

[VB] Public Event MouseDown As MouseEventHandler

Description

Occurs when the user presses the mouse button while the pointer is over the icon in the system tray.

For information about handling events, see.

u) Tostring

[C#] public event MouseEventHandler MouseMove;

[C++] public: _event MouseEventHandler* MouseMove;

[VB] Public Event MouseMove As MouseEventHandler

Description

Occurs when the user moves the mouse while the pointer is over the icon in the system tray.

For information about handling events, see.

v) ToString

[C#] public event MouseEventHandler Mouseup;

[C++] public: _event MouseEventHandler* MouseUp;

[VB] Public Event MouseUp As MouseEventHandler

Description

Occurs when the user releases the mouse button while the pointer is over the icon in the system tray.

For information about handling events, see.

w) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the resources (other than memory) used by the System.Windows.Forms.NotifyIcon.

Call System.Windows.Forms.NotifyIcon.Dispose(System.Boolean) when you are finished using the System.Windows.Forms.NotifyIcon. The System.Windows.Forms.NotifyIcon.Dispose(System.Boolean) method leaves the System.Windows.Forms.NotifyIcon in an unusable state. After calling System.Windows.Forms.NotifyIcon.Dispose(System.Boolean), you must release all references to the System.Windows.Forms.NotifyIcon so the memory it was occupying can be reclaimed by garbage collection.

NumericUpDown class (System.Windows.Forms)

a) ToString

Description

Represents a Windows up-down control that displays numeric values.

A System.Windows.Forms.NumericUpDown control contains a single numeric value that can be incremented or decremented by clicking the up or down buttons of the control. The user may also enter in a value, unless the System.Windows.Forms.UpDownBase.ReadOnly property is set to true.

b) NumericUpDown

Example Syntax:

c) ToString

[C#] public NumericUpDown( );

[C++] public: NumericUpDown( );

[VB] Public Sub New( )

[JScript] public function NumericUpDown( );

Description

Initializes a new instance of the System.Windows.Forms.NumericUpDown class.

d) AccessibilityObject e) AccessibleDefaultActionDescription f) AccessibleDescription g) AccessibleName h) AccessibleRole i) ActiveControl j) AllowDrop k) Anchor l) AutoScroll m) AutoScrollMargin n) AutoScrollMinSize o) AutoScrollPosition p) BackColor q) BackgroundImage r) BindingContext s) BorderStyle
t) Bottom
u) Bounds
v) CanFocus
w) CanSelect
x) Capture
y) Causes Validation
z) ChangingText
aa) ClientRectangle
bb) ClientSize
cc) CompanyName
dd) Container
ee) ContainsFocus
ff) ContextMenu
gg) Controls
hh) Created
ii) CreateParams
jj) Cursor
kk) DataBindings
ll) DecimalPlaces
mm) ToString Description Gets or sets the number of decimal places to display in the up-down control.

When the System.Windows.Forms.NumericUpDown.DecimalPlaces property is set, the System.Windows.Forms.NumericUpDown.UpdateEditText method is called to update the up-down control's display to the new format.

nn) DefaultImeMode
oo) DefaultSize
pp) DesignMode
qq) DisplayRectangle
rr) Disposing
ss) Dock
tt) DockPadding
uu) Enabled
vv) Events
ww) Focused
xx) Font
yy) FontHeight
zz) ForeColor
aaa) Handle
bbb) HasChildren
ccc) Height
ddd) Hexadecimal
eee) ToString Description Gets or sets a value indicating whether the up-down control should display the value it contains in hexadecimal format.

When the System.Windows.Forms.NumericUpDown.Hexadecimal property is set, the System.Windows.Forms.NumericUpDown.UpdateEditText method is called to update the up-down control's display to the new format.

fff) HScroll
ggg) ImeMode
hhh) Increment
iii) ToString

Description

Gets or sets the value to increment or decrement the up-down control when the up or down buttons are clicked.

Clicking the up button causes the System.Windows.Forms.NumericUpDown.Value property to increment by the amount specified by the System.Windows.Forms.Numeric UpDown.Increment property and approach the System. Windows.Forms.NumericUpDown.Maximum property. Clicking the down button causes the System.Windows.Forms. Numeric UpDown.Value property to be decremented by the amount specified by the System.Windows.Forms.Numeric UpDown.Increment property and approach the System. Windows . Forms.NumericUpDown.Minimum property.

jjj) InterceptArrowKeys
kkk) InvokeRequired
lll) IsAccessible
mmm) IsDisposed
nnn) IsHandleCreated
ooo) Left
ppp) Location
qqq) Maximum
rrr) ToString Description Gets or sets the maximum value for the up-down control.

When the System.Windows.Forms.NumericUpDown.Maximum property is set, the System.Windows.Forms. NumericUpDown.Minimum property is evaluated and the System.Windows.Forms.NumericUpDown.UpdateEditText method is called. If the System.Windows.Forms.NumericUpDown.Minimum property is greater than the new System. Windows.Forms.NumericUpDown.Maximum property, the System.Windows.Forms.Numeric UpDown.Minimum property value is set equal to the System.Windows.Forms.NumericUpDown.Maximum value. If the current System.Windows.Forms. NumericUpDown. Value is greater than the new System.Windows.Forms.NumericUpDown.Maximum value. the System.Windows. Forms.NumericUpDown.Value property value is set equal to the System.Windows.Forms.NumericUpDown.Maximum value.

sss) Minimum
ttt) ToString

[C#] public decimal Minimum {get; set;}

[C++] public: _property Decimal get_Minimum( ); public: _property void set_Minimum(Decimal);

[VB] Public Property Minimum As Decimal [JScript] public function get Minimum( ): Decimal; public function set Minimum(Decimal);

Description

Gets or sets the minimum allowed value for the up-down control. When the System.Windows.Forms.NumericUpDown.Minimum property is set, the System.Windows. Forms. NumericUpDown.Maximum property is evaluated and the System.Windows.Forms.NumericUpDown.UpdateEditText method is called. If the new System. Windows.Forms.NumericUpDown.Minimum property value is greater than the System.Windows.Forms.Numeric UpDown.Maximum property value, the System.Windows . Forms.NumericUpDown.Maximum value is set equal to the System.Windows. Forms.NumericUpDown.Minimum value. If the System.Windows.Forms.NumericUpDown.Value is less than the new System.Windows.Forms. NumericUpDown.Minimum value, the System.Windows. Forms.NumericUpDown.Value property is also set equal to the System. Windows.Forms.NumericUpDown.Minimum value.

uuu) Name
vvv) Parent
www) ParentForm
xxx) PreferredHeight yyy) ProductName
zzz) ProductVersion
aaaa) ReadOnly
bbbb) RecreatingHandle
cccc) Region
dddd) RenderRightToLeft
eeee) ResizeRedraw
ffff) Right
gggg) RightToLeft
hhhh) ShowFocusCues
iiii) ShowKeyboardCues
jjjj) Site
kkkk) Size
llll) TabIndex
mmmm) TabStop
nnnn) Tag
oooo) Text
pppp) ToString Description The text displayed in the control.

qqqq) TextAlign
rrrr) ThousandsSeparator
ssss) ToString

Description

Gets or sets a value indicating whether a thousands separator is displayed in the up-down control when appropriate.

When the System.Windows.Forms.NumericUpDown.ThousandsSeparator property is set, the System.Windows.Forms.NumericUpDown.UpdateEditText method is called to update the up-down control's display to the new format.

tttt) Top
uuuu) TopLevelControl
vvvv) UpDownAlign
wwww) UserEdit
xxxx) Value
yyyy) ToString Description Gets or sets the value assigned to the up-down control.

When the System.Windows.Forms.NumericUpDown.Value property is set, the new value is validated to be between the System.Windows.Forms.NumericUpDown.Minimum and System.Windows.Forms.NumericUpDown.Maximum values. Following this, the System.Windows.Forms.Numeric UpDown.UpdateEditText method is called to update the up-down control's display with the new value in the appropriate format.

zzzz) Visible
aaaaa) VScroll
bbbbb) Width
ccccc) WindowTarget
ddddd) ToString

Description

Occurs when the System.Windows.Forms.NumericUpDown.Value property has been changed in some way.

For the System.Windows.Forms.NumericUpDown. OnValueChanged(System.EventArgs) event to occur, the System. Windows.Forms.NumericUpDown.Value property may be changed in code, by the user typing in a new value, or by clicking the up or down button.

eeeee) BeginInit

[C#] public void BeginInit( );

[C++] public: _sealed void BeginInit( );

[VB] NotOverridable Public Sub BeginInit( )

[JScript] public function BeginInit( );

Description

Handles tasks required when the control is being initialized.

fffff) CreateAccessibilityInstance

[C#] protected override AccessibleObject CreateAccessibilityInstance( );

[C++] protected: AccessibleObject* CreateAccessibilityInstance( );

[VB] Overrides Protected Function CreateAccessibilityInstance( ) As AccessibleObject

[JScript] protected override function CreateAccessibilityInstance( ) AccessibleObject;

Description ggggg) DownButton

[C#] public override void DownButton( );

[C++] public: void DownButton( );

[VB] Overrides Public Sub DownButton( )

[JScript] public override function DownButton( );

Description

Decrements the value of the up-down control.

When the System.Windows.Forms.NumericUpDown.DownButton method is called, either in code or by the click of the down button, the new value is validated and the control updated with the new value in the appropriate format. Specifically, if System.Windows.Forms.UpDownBase.UserEdit is set to true, System.Windows.Forms.NumericUpDown.ParseEditText is called prior to validating or updating the value. The value is then validated to be between the System.Windows.Forms.NumericUpDown.Minimum and System.Windows.Forms.NumericUpDown.Maximum values and the System.Windows.Forms.NumericUpDown.UpdateEditText method is called.

hhhhh) EndInit

[C#] public void EndInit( );

[C++] public: sealed void EndInit( );

[VB] NotOverridable Public Sub EndInit( )

[JScript] public function EndInit( );

Description

Called when initialization of the control is complete.

iiiii) OnTextBoxKeyPress

[C#] protected override void OnTextBoxKeyPress(object source, KeyPressEventArgs e);

[C++] protected: void OnTextBoxKeyPress(Object* source, KeyPressEventArgs* e);

[VB] Overrides Protected Sub OnTextBoxKeyPress(ByVal source As Object, ByVal e As KeyPressEventArgs)

[JScript] protected override function OnTextBoxKeyPress (source: Object, e KeyPressEventArgs);

Description

Restricts the entry of characters to digits (including hex), the negative sign, the decimal point, and editing keystrokes (backspace).

jjjjj) On ValueChanged

[C#] protected virtual void OnValueChanged(EventArgs e);

[C++] protected: virtual void OnValueChanged(EventArgs* e);

[VB] Overridable Protected Sub OnValueChanged(ByVal e As EventArgs)

[JScript] protected function OnValueChanged(e: Event Args);

Description

Raises the System.Windows.Forms.NumericUpDown.ValueChanged event.

Raising an event invokes the event handler through a delegate. For more information, see. An System.EventArgs that contains the event data.

kkkkk) ParseEditText

[C#] protected void ParseEditText( );

[C++] protected: void ParseEditText( );

[VB] Protected Sub ParseEditText( )

[JScript] protected function ParseEditText( );

Description

Converts the text displayed in the up-down control to a numeric value and evaluates it.

If System.Windows.Forms.UpDownBase.UserEdit is set to true, the text displayed is converted to a numeric value so it may be validated to be between the System.Windows.Forms.NumericUpDown.Minimum and System.Windows.Forms.NumericUpDown.Maximum property values.

lllll) ToString

[C#] public override string ToString( );

[C++] public: String* ToString( );

[VB] Overrides Public Function ToString( ) As String

[JScript] public override function ToString( ) String;

Description

Provides some interesting info about this control in String form.

mmmmm) UpButton

[C#] public override void UpButton( );

[C++] public: void UpButton( );

[VB] Overrides Public Sub UpButton( )

[JScript] public override function UpButton( );

Description

Increments the value of the up-down control.

When the System.Windows.Forms.NumericUpDown.UpButton method is called, either in code or by the click of the up button, the new value is validated and the control is updated with the new value in the appropriate format.

Specifically, if System.Windows.Forms.UpDownBase.UserEdit is set to true, System.Windows.Forms.NumericUpDown.ParseEditText is called prior to validating or updating the value. The value is then validated to be between the System.Windows.Forms.NumericUpDown.Minimum and System.Windows.Forms.NumericUpDown.Maximum values and the System.Windows.Forms.NumericUpDown.UpdateEditText method is called.

nnnnn) UpdateEditText

[C#] protected override void UpdateEditText( );

[C++] protected: void UpdateEditText( );

[VB] Overrides Protected Sub UpdateEditText( )

[JScript] protected override function UpdateEditText( );

Description

Displays the current value of the up-down control in the appropriate format.

If the up-down control is not being initialized, the current value is validated to be between the System.Windows.Forms.NumericUpDown.Minimum and System.Windows.Forms.NumericUpDown.Maximum values and is converted to the correct format for display in the control.

ooooo) ValidateEditText

[C#] protected override void ValidateEditText( );

[C++] protected: void ValidateEditText( );

[VB] Overrides Protected Sub ValidateEditText( )

[JScript] protected override function ValidateEditText( );

Description

Validates and updates the text displayed in the up-down control.

The System.Windows.Forms.NumericUpDown.Validate EditText method calls the System.Windows.Forms.Numeric UpDown.ParseEditText and System.Windows.Forms.NumericUpDown.UpdateEditText methods to validate and update the display of the up-down control.

ListBox.ObjectCollection class (System.Windows.Forms)

a) WndProc

Description

Represents the collection of items in a System.Windows.Forms.ListBox.

The System.Windows.Forms.ListBox.ObjectCollection class stores the items displayed in the System.Windows.Forms.ListBox. There are two other collections defined within the System.Windows.Forms.ListBox class that enable you to determine what items are selected within this collection. The System.Windows.Forms.ListBox.Selected ObjectCollection class provides properties and methods for determining what items are selected within the System.Windows.Forms.ListBox.ObjectCollection, while the System.Windows.Forms.ListBox.Selected IndexCollection class enables you to determine what indices within the System.Windows.Forms.ListBox.ObjectCollection are selected.

b) ListBox.ObjectCollection

Example Syntax:

c) WndProc

[C#] public ListBox.ObjectCollection(ListBox owner);

[C++] public: ObjectCollection(ListBox* owner);

[VB] Public Sub New(ByVal owner As ListBox)

[JScript] public function ListBox.ObjectCollection(owner: ListBox); Initializes a new instance of System.Windows.Forms.ListBox.ObjectCollection Description Initializes a new instance of System.Windows.Forms.ListBox.ObjectCollection.

You cannot create an instance of this class without associating it with a System.Windows.Forms.ListBox control. The System.Windows.Forms.ListBox that owns the collection.

d) ListBox.ObjectCollection

Example Syntax:

e) WndProc

[C#] public ListBox.ObjectCollection(ListBox owner, object [ ] value);

[C++] public: ObjectCollection(ListBox* owner, Object* value _gc[ ]);

[VB] Public Sub New(ByVal owner As ListBox, ByVal value( ) As Object) [JScript] public function ListBox.ObjectCollection(owner: ListBox, value Object[ ]);

Description

Initializes a new instance of System.Windows.Forms.ListBox.ObjectCollection containing an array of objects.

You cannot create an instance of this class without associating it with a System.Windows.Forms.ListBox control. The System.Windows.Forms.ListBox that owns the collection. An array of objects to add to the collection.

f) ListBox.ObjectCollection

Example Syntax:

g) WndProc

[C#] public ListBox.ObjectCollection(ListBox owner, ListBox.ObjectCollection value);

[C++] public: ObjectCollection(ListBox* owner, ListBox.ObjectCollection* value);

[VB] Public Sub New(ByVal owner As ListBox, ByVal value As ListBox.ObjectCollection)

[JScript] public function ListBox.ObjectCollection(owner: ListBox, value ListBox.ObjectCollection);

Description

Initializes a new instance of System.Windows.Forms.ListBox.ObjectCollection based on another System.Windows.Forms.ListBox.ObjectCollection.

You cannot create an instance of this class without associating it with a System.Windows.Forms.ListBox control. This version of the constructor enables you to use the items specified in an existing instance of the System.Windows.Forms.ListBox.ObjectCollection class to add items to the collection when it is created. You can use this constructor to use the items specified in another System.Windows.Forms.ListBox control with this collection. The System.Windows.Forms.ListBox that owns the collection. A System.Windows-.Forms.ListBox.ObjectCollection from which the contents are copied to this collection.

h) Count i) WndProc

[C#] public int Count {get;}

[C+] public: _property int get_Count( );

[VB] Public ReadOnly Property Count As Integer

[JScript] public function get Count( ): int;

Description

Gets the number of items in the collection.

This property enables you to determine the number of items in the System.Windows.Forms.ListBox. You can then use this value when you are looping through the values of the collection and you need to provide a number of iterations to perform the loop.

j) IsReadOnly k) WndProc

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the collection is read-only.

This property is always false for this collection.

I) Item m) WndProc

[C#] public virtual object this[int index] {get; set;}

[C++] public: _property virtual Object* get_Item(int index); public: _property virtual void set_Item(int index, Object*);

[VB] Overridable Public Default Property Item(ByVal index As Integer) As Object

[JScript] returnValue=ObjectCollectionObject.Item(index); ObjectCollectionObject.Item(index)=returnValue;

Description

Gets or sets the item at the specified index within the collection.

You can use this method to obtain the System.Windows.Forms.ListBox item stored at a specific location within the collection. To determine the index of a specific item within the collection, use the System.Windows.Forms.ListBox.ObjectCollection.IndexOf(System.Object) method. The index of the item in the collection to get or set.

n) Add

[C#] public int Add(object item);

[C++] public: int Add(Object* item);

[VB] Public Function Add(ByVal item As Object) As Integer

[JScript] public function Add(item: Object): int;

Description

Adds an item to the list of items for a System.Windows.Forms.ListBox.

Return Value: The zero-based index of the item in the collection.

If the System.Windows.Forms.ListBox.Sorted property of the System.Windows.Forms.ListBox is set to true, the item is inserted into the list alphabetically. Otherwise, the item is inserted at the end of the list. To insert an item into the list box at a specific position, use the System.Windows.Forms.ListBox.ObjectCollection.Insert(System.Int32, System.Object) method. To add a set of items to the list box in a single operation, use the System.Windows.Forms.ListBox.ObjectCollection.AddRange(System.Windows.Forms.List- Box.ObjectCollection) method. If you want to use the System.Windows.Forms.ListBox.ObjectCollection.Add (System.Object) method to add a large number of items to the list, use the System.Windows.Forms.ListBox.BeginUpdate and System.Windows.Forms.ListBox.EndUpdate methods to prevent the System.Windows.Forms.ListBox from repainting each time an item is added to the list until all items are added to the list. When adding items to a System.Windows.Forms.ListBox, it is more efficient to sort the items first and then add new items. An object representing the item to add to the collection.

o) AddRange

[C#] public void AddRange (object[ ] items);

[C++] public: void AddRange(Object* items _gc[ ]);

[VB] Public Sub AddRange(ByVal items( ) As Object)

[JScript] public function AddRange(items: Object[ ]); Adds a group of items to the list of items for a System.Windows.Forms.ListBox Description Adds an array of items to the list of items for a System.Windows.Forms.ListBox.

This method removes all existing items from the list box before inserting the new items. If the System.Windows.Forms.ListBox.Sorted property of the System.Windows . Forms.ListBox is set to true, the items are inserted into the list alphabetically. Otherwise, the items are inserted in the order that they occur within the array. This method is typically passed an array of System.String objects, but an array of any type of object can be passed to this method. When an object is added to the collection, the System.Windows.Forms.ListBox first checks to see if the System.Windows.Forms.ListControl.DisplayMember property of the System.Windows.Forms.ListControl class has the name of a member from the object specified to reference when obtaining the item text. If the System.Windows.Forms.ListControl.DisplayMember property does not have a member specified, the System.Windows.Forms.ListBox then calls the System.Object.ToString method of the object to obtain the text to display in the list. When using this method to add items to the System.Windows.Forms.ListBox, you do not need to call the System.Windows.Forms.ListBox.BeginUpdate and System.Windows.Forms.ListBox.EndUpdate methods to optimize performance. When adding items to a System.Windows.Forms.ListBox, it is more efficient to sort the items first and then add new items. You can use this method to add a group of items to the list or to reuse the items stored in a different System.Windows.Forms.ListBox. An array of objects to add to the list.

p) AddRange

[C#] public void AddRange(ListBox.ObjectCollection value);

[C++] public: void AddRange(ListBox.ObjectCollection* value);

[VB] Public Sub AddRange(ByVal value As ListBox.ObjectCollection)

[JScript] public function AddRange(value: ListBox.ObjectCollection);

Description

Adds the items of an existing System.Windows.Forms.ListBox.ObjectCollection to the list of items in a System.Windows.Forms.ListBox.

This method removes all existing items from the list box before inserting the new items. If the System.Windows.Forms.ListBox.Sorted property of the System.Windows.Forms.ListBox is set to true, the items are inserted into the list alphabetically. Otherwise, the items are inserted in the order that they occur within the array. This method is typically passed an array of System.String objects, but an array of any type of object can be passed to this method. When an object is added to the collection, the System.Windows.Forms.ListBox first checks to see if the System.Windows.Forms.ListControl.DisplayMember property of the System.Windows.Forms.ListControl class has the name of a member from the object specified to reference when obtaining the item text. If the System.Windows.Forms.ListControl.DisplayMember property does not have a member specified, the System.Windows.Forms.ListBox then calls the System.Object.ToString method of the object to obtain the text to display in the list. A System.Windows.Forms.ListBox.ObjectCollection to load into this collection.

q) Clear

[C#] public virtual void Clear( );

[C++] public: virtual void Clear( );

[VB] Overridable Public Sub Clear( )

[JScript] public function Clear( );

Description

Removes all items from the collection.

When you remove items from the list, all information about the deleted items is lost. To remove a single item from the System.Windows.Forms.ListBox, use the System.Windows.Forms.ListBox.ObjectCollection.Remove(System.Object) or System.Windows.Forms.ListBox.ObjectCollection.RemoveAt(System.Int32) method.

r) Contains

[C#] public bool Contains(object value);

[C++] public: sealed bool Contains(Object* value);

[VB] NotOverridable Public Function Contains(ByVal value As Object) As Boolean

[JScript] public function Contains(value: Object): Boolean;

Description

Determines whether the specified item is located within the collection.

Return Value: true if the item is located within the collection; otherwise, false.

The System.Windows.Forms.ListBox.ObjectCollection.Contains(System.Object) method enables you to determine whether an object is a member of the collection. Once you know that the item is located within the collection, you can use the System.Windows.Forms.ListBox.Object Collection.IndexOf(System.Obje Ct) method to determine where the item is located within the collection. An object representing the item to locate in the collection.

s) CopyTo

[C#] public void CopyTo(object[ ] dest, int arrayIndex);

[C++] public: void CopyTo(Object* dest _gc[ ], int arrayIndex);

[VB] Public Sub CopyTo(ByVal dest( ) As Object, ByVal arrayIndex As Integer)

[JScript] public function CopyTo(dest: Object[ ], arrayIndex: int); Copies the entire collection into an existing array at a specified location within the array.

Description

Copies the entire collection into an existing array of objects at a specified location within the array.

You can use this method to combine the items from multiple collections into a single array. You can then use this array to populate the contents of another System.Windows.Forms.ListBox control using the System.Windows.Forms.ListBox.ObjectCollection.AddRange(System.Windows.Forms.ListBox.ObjectCollection) method of the System.Windows.Forms.ListBox.ObjectCollection class. The object array in which the items from the collection are copied to. The location within the destination array to copy the items from the collection to.

t) GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumerator to use to iterate through the item collection.

Return Value: An System.Collections.IEnumerator object that represents the item collection.

u) IndexOf

[C#] public int IndexOf(object value);

[C++] public: _sealed int IndexOf(Object* value);

[VB] NotOverridable Public Function IndexOf(ByVal value As Object) As Integer

[JScript] public function IndexOf(value: Object): int;

Description

Returns the index within the collection of the specified item.

Return Value: The zero-based index where the item is located within the collection; otherwise, negative one (−1).

The System.Windows.Forms-ListBox.ObjectCollection.IndexOf(System.Object) method enables you to determine where an item is located within the collection. To determine whether an item is located within the collection before calling this method, use the System.Windows.Forms.ListBox.ObjectCollection.Contains(System.Object) method. An object representing the item to locate in the collection.

v) Insert

[C#] public void Insert(int index, object item);

[C++] public: _sealed void Insert(int index, Object* item);

[VB] NotOverridable Public Sub Insert(ByVal index As Integer, ByVal item As Object)

[JScript] public function Insert(index: int, item: Object);

Description

Inserts an item into the list box at the specified index.

This method enables you to insert an item at a specific position within the System.Windows.Forms.ListBox. If the System.Windows.Forms.ListBox.Sorted property of the System.Windows.Forms.ListBox is set to true, the item is added in the correct position within the sorted list regardless of the values specified in the index parameter. When an object is added to the collection, the System.Windows.Forms.ListBox first checks to see if the System.Windows.Forms.ListControl.DisplayMember property of the System.Windows.Forms.ListControl class has the name of a member from the object specified to reference when obtaining the item text. If the System.Windows.Forms.ListControl.DisplayMember property does not have a member specified, the System.Windows.Forms.ListBox then calls the System.Object.ToString method of the object to obtain the text to display in the list. The zero-based index location where the item is inserted. An object representing the item to insert.

w) Remove

[C#] public void Remove(object value);

[C++] public: _sealed void Remove(Object* value);

[VB] NotOverridable Public Sub Remove(ByVal value As Object)

[JScript] public function Remove(value: Object);

Description

Removes the specified object from the collection.

When you remove an item from the list, the indices change for subsequent items in the list. All information about the removed item is deleted. You can use this method to remove a specific item from the list by specifying the actual item to remove from the list. To specify the index of the item to remove instead of the item itself, use the System.Windows.Forms.ListBox.ObjectCollection.RemoveAt(System.Int32) method. To remove all items from the list, use the System.Windows.Forms.ListBox.ObjectCollection.Clear method. An object representing the item to remove from the collection.

x) RemoveAt

[C#] public void RemoveAt(int index);

[C++] public: _sealed void RemoveAt(int index);

[VB] NotOverridable Public Sub RemoveAt(ByVal index As Integer)

[JScript] public function RemoveAt(index: int);

Description

Removes the item at the specified index within the collection.

When you remove an item from the list, the indices change for subsequent items in the list. All information about the removed item is deleted. You can use this method to remove a specific item from the list by specifying the index of the item to remove from the list. To specify the item to remove instead of the index to the item, use the System.Windows.Forms.ListBox.ObjectCollection.Remove(System.Object) method. To remove all items from the list, use the System.Windows.Forms.ListBox.ObjectCollection.Clear method. The zero-based index of the item to remove.

y) ICollection.CopyTo

[C#] void ICollection.CopyTo(Array dest, int index);

[C++] void ICollection::CopyTo(Array* dest, int index);

[VB] Sub CopyTo(ByVal dest As Array, ByVal index As Integer) Implements ICollection.CopyTo

[JScript] function ICollection.CopyTo(dest: Array, index: int);

z) IList.Add

[C#] int IList.Add(object item);

[C++] int IList::Add(Object* item);

[VB] Function Add(ByVal item As Object) As Integer Implements IList.Add

[JScript] function IList.Add(item: Object): int;

CheckedListBox.ObjectCollection class (System.Windows.Forms)

a) ToString

Description

Represents the collection of items in a System.Windows-.Forms.CheckedListBox.

The collection is accessed from the parent control, System. Windows.Forms.CheckedListBox, by the System.Windows. Forms.CheckedListBox.Items property. To create a collection of objects to display in the System.Windows.Forms. CheckedListBox control, you can add or remove the items individually by using the System. Windows.Forms. CheckedListBox.ObjectCollection.Add(System. Object, System.Boolean) and System.Windows. Forms.ListBox.ObjectCollection.Remove(System.Object) methods.

b) CheckedListBox. ObjectCollection

Example Syntax:

c) ToString

[C#] public CheckedListBox.ObjectCollection (CheckedListBox owner);

[C++] public: ObjectCollection(CheckedListBox* owner);

[VB] Public Sub New(ByVal owner As CheckedListBox)

[JScript] public function CheckedListBox.ObjectCollection (owner: CheckedListBox);

Description

Initializes a new instance of the System.Windows.Forms. CheckedListBox.ObjectCollection class. The System.Windows.Forms.CheckedListBox that owns the collection.

d) Count e) IsReadOnly f) Item g) Add

[C#] public int Add(object item, bool is Checked);

[C++] public: int Add(Object* item, bool is Checked);

[VB] Public Function Add(ByVal item As Object, ByVal is Checked As Boolean) As Integer

[JScript] public function Add(item: Object, is Checked: Boolean): int; Adds an item to the list of items for a System. Windows.Forms.CheckedListBox.

Description

Adds an item to the list of items for a System.Windows. Forms. CheckedListBox, specifying the object to add and whether it is checked.

Return Value: The index of the newly added item.

This method adds an item to the list. For a list, the item is added to the end of the existing list of items. For a sorted checked list box, the item is inserted into the list according to its sorted position. A SystemException occurs if there is insufficient space available to store the new item. An object representing the item to add to the collection. true to check the item; otherwise, false.

h) Add

[C#] public int Add(object item, CheckState check);

[C++] public: int Add(Object* item, CheckState check);

[VB] Public Function Add(ByVal item As Object, ByVal check As CheckState) As Integer

[JScript] public function Add(item: Object, check: CheckState): int;

Description

Adds an item to the list of items for a System.Windows. Forms. CheckedListBox, specifying the object to add and the initial checked value.

Return Value: The index of the newly added item.

This method adds an item to the checked list box. For an unsorted checked list box, the item is added to the end of the existing list of items. For a sorted checked list box, the item is inserted into the list according to its sorted position. A SystemException occurs if there is insufficient space available to store the new item. An object representing the item to add to the collection. The initial System.Windows.Forms.CheckState for the checked portion of the item.

ComboBox.ObjectCollection class (System.Windows. Forms)

a) ToString

Description

Represents the collection of items in a System.Windows. Forms.ComboBox.

The System.Windows.Forms.ComboBox.ObjectCollection class encapsulates the items in the System.Windows.Forms. ComboBox. The object collection of a combo box can be used to manage many types of objects, including strings, images, and custom business objects.

b) ComboBox.ObjectCollection

Example Syntax:

c) ToString

[C#] public ComboBox.ObjectCollection(ComboBox owner);

[C++] public: ObjectCollection(ComboBox* owner);

[VB] Public Sub New(ByVal owner As ComboBox)

[JScript] public function ComboBox.ObjectCollection (owner: ComboBox);

Description

Initializes a new instance of System.Windows.Forms.ComboBox.ObjectCollection.

An instance of this class cannot be created without associating it with a System.Windows.Forms.ComboBox control. The System.Windows.Forms.ComboBox that owns this object collection.

d) Count e) ToString

[C#] public int Count {get;}

[C++] public: _property int get_Count( );

[VB] Public ReadOnly Property Count As Integer

[JScript] public function get Count( ): int;

Description

Gets the number of items in the collection.

This property enables you to determine the number of items in the System.Windows.Forms.ComboBox. You can use this value when looping through the values of the collection.

f) IsReadOnly g) ToString

[C#] public bool IsReadOnly {get;}

[C++] public: _property bool get IsReadOnly( );

[VB] Public ReadOnly Property IsReadOnly As Boolean

[JScript] public function get IsReadOnly( ): Boolean;

Description

Gets a value indicating whether this collection can be modified.

h) Item i) ToString

[C#] public virtual object this[int index] {get; set;}

[C++] public: _property virtual Object* get_Item(int index); public: _property virtual void set_Item(int index, Object*);

[VB] Overridable Public Default Property Item(ByVal index As Integer) As Object

[JScript] returnValue=ObjectCollectionObject.Item(index); ObjectCollectionObject.Item(index)=returnValue;

Description

Retrieves the item at the specified index within the collection.

You can use this method to obtain the item at the specified location within the collection. You can use System.Windows.Forms.ComboBox.ObjectCollection.IndexOf(System.Object) to find the location of an item, or you can use the index return from the System.Windows.Forms.ComboBox.ObjectCollection.Add(System.Object) method. The index of the item in the collection to retrieve.

j) Add

[C#] public int Add(object item);

[C++] public: Mt Add(Object* item);

[VB] Public Function Add(ByVal item As Object) As Integer

[JScript] public function Add(item: Object): int;

Description

Adds an item to the list of items for a System.Windows-.Forms. ComboBox.

Return Value: The zero-based index of the item in the collection.

This method adds an item to the combo box. If the System.Windows.Forms.ComboBox.Sorted property of the System.Windows.Forms.ComboBox is set to true, the item is inserted into the list alphabetically. Otherwise, the item is inserted at the end of the list. An object representing the item to add to the collection.

k) AddRange

[C#] public void AddRange(object[ ] items);

[C++] public: void AddRange(Object* items _gc[ ]);

[VB] Public Sub AddRange(ByVal items( ) As Object)

[JScript] public function AddRange(items: Object[ ]);

Description

Adds an array of items to the list of items for a System.Windows.Forms.ComboBox.

If the System.Windows.Forms.ComboBox.Sorted property of the System.Windows.Forms.ComboBox is set to true, the items are inserted into the list alphabetically. Otherwise, the items are inserted in the order they occur within the array. This method is typically passed an array of System.String objects, but an array of any type of object can be passed to this method. When an object is added to the collection, the method calls the object's System.Object.ToString method to obtain the string to display in the list. When using this method to add items to the collection, you do not need to call the System.Windows.Forms.ComboBox.BeginUpdate and System.Windows.Forms.ComboBox.EndUpdate methods to optimize performance. An array of objects to add to the list.

l) Clear

[C#] public void Clear( );

[C++] public: sealed void Clear( );

[VB] NotOverridable Public Sub Clear( )

[JScript] public function Clear( );

Description

Removes all items from the System.Windows.Forms.ComboBox.

When you remove items from the list, all information about the deleted items is lost. To remove a single item from the System.Windows.Forms.ComboBox, use the System.Windows.Forms.ComboBox.ObjectCollection.Remove(System.Object) or System.Windows.Forms.ComboBox.ObjectCollection.RemoveAt(System.Int32) method.

m) Contains

[C#] public bool Contains(object value);

[C++] public: _sealed bool Contains(Object* value);

[VB] NotOverridable Public Function Contains(ByVal value As Object) As Boolean

[JScript] public function Contains(value: Object): Boolean;

Description

Determines if the specified item is located within the collection.

Return Value: true if the item is located within the collection; otherwise, false.

The System.Windows.Forms.ComboBox.ObjectCollection.Contains(System.Object) method enables you to determine if an object is a member of the collection. Once you know that the item is located within the collection, you can use the System.Windows.Forms.ComboBox.ObjectCollection.IndexOf(System.Object) method to determine where the item is located within the collection. An object representing the item to locate in the collection.

n) CopyTo

[C#] public void CopyTo(object[ ] dest, int arrayIndex);

[C++] public: void CopyTo(Object* dest gc[ ], int arrayIndex);

[VB] Public Sub CopyTo(ByVal dest( ) As Object, ByVal arrayIndex As Integer)

[JScript] public function CopyTo(dest: Object[ ], arrayIndex: Int);

Description

Copies the entire collection into an existing array of objects at a specified location within the array.

You can use this method to combine the items from multiple collections into a single array. You can then use this array to populate the contents of another System.Windows.Forms. ComboBox control using the System.Windows.Forms. ComboBox.ObjectCollection.AddRange(System. Object[ ]) method of the System.Windows.Forms.Combo Box.ObjectCollection class. The object array to copy the collection to. The location in the destination array to copy the collection to.

o) GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumerator that can be used to iterate through the item collection.

Return Value: An System.Collections.IEnumerator object that represents the item collection.

p) IndexOf

[C#] public int IndexOf(object value);

[C++] public: _sealed int IndexOf(Object* value);

[VB] NotOverridable Public Function IndexOf(ByVal value As Object) As Integer

[JScript] public function IndexOf(value: Object): int;

Description

Retrieves the index within the collection of the specified item.

Return Value: The zero-based index where the item is located within the collection; otherwise, −1.

The System.Windows.Forms.ComboBox.ObjectCollection. IndexOf(System.Object) method enables you to determine where an item is located within the collection. To determine if an item is located within the collection before calling this method, use the System.Windows.Forms.ComboBox.ObjectCollection.Contains(System.Object) method. An object representing the item to locate in the collection.

q) Insert

[C#] public void Insert(int index, object item);

[C++] public: _sealed void Insert(int index, Object* item);

[VB] NotOverridable Public Sub Insert(ByVal index As Integer, ByVal item As Object)

[JScript] public function Insert(index: int, item: Object);

Description

Inserts an item into the collection at the specified index.

Return Value: The zero-based index of the newly added item.

If the System.Windows.Forms.ComboBox.sorted property of the System.Windows.Forms.ComboBox is true, the index parameter is ignored. When an object is added to the collection, the System.Windows.Forms.ComboBox calls the object's System.Object.ToString method is to obtain the string to display in the list. The zero-based index location where the item is inserted. An object representing the item to insert.

r) Remove

[C#] public void Remove(object value);

[C++] public: sealed void Remove(Object* value);

[VB] NotOverridable Public Sub Remove(ByVal value As Object)

[JScript] public function Remove(value: Object);

Description

Removes the specified item from the System.Windows. Forms.ComboBox. The System.Object to remove from the list.

s) RemoveAt

[C#] public void RemoveAt(int index);

[C++] public: _sealed void RemoveAt(int index);

[VB] NotOverridable Public Sub RemoveAt(ByVal index As Integer)

[JScript] public function RemoveAt(index: int);

Description

Removes an item from the System.Windows.Forms.ComboBox at the specified index. The index of the item to remove.

t) ICollection.CopyTo

[C#] void ICollection.CopyTo(Array dest, int index);

[C++] void ICollection::CopyTo(Array* dest, int index);

[VB] Sub CopyTo(ByVal dest As Array, ByVal index As Integer) Implements ICollection.CopyTo

[JScript] function ICollection.CopyTo(dest: Array, index: int);

u) IList.Add

[C#] int IList.Add(object item);

[C++] int IList::Add(Object* item);

[VB] Function Add(ByVal item As Object) As Integer Implements IList.Add

[JScript] function IList.Add(item: Object): int;

OpacityConverter class (System.Windows.Forms)

a) ToString

Description

Provides a type converter to convert opacity values to and from a string.

For more information about type converters, see the System. ComponentModel.TypeConverter base class and.

b) OpacityConverter

Example Syntax:

c) ToString

[C#] public OpacityConverter( );

[C++] public: OpacityConverter( );

[VB] Public Sub New( )

[JScript] public function OpacityConverter( );

d) CanConvertFrom

[C#] public override bool CanConvertFrom(ITypeDescriptorContext context, Type sourceType);

[C++] public: bool CanConvertFrom(ITypeDescriptorContext* context, Type* sourceType);

[VB] Overrides Public Function CanConvertFrom(ByVal context As ITypeDescriptorContext, ByVal sourceType As Type) As Boolean

[JScript] public override function CanConvertFrom(context ITypeDescriptorContext, sourceType: Type): Boolean; Returns whether this converter can convert an object in the given source type to the native type of the converter.

Description

Returns a value indicating whether this converter can convert an object of the specified source type to the native type of the converter using the specified context.

Return Value: true if this converter can perform the conversion; otherwise, false.

The sourceType is expected to be a System.String. A System.ComponentModel.ITypeDescriptorContext that provides information about the context of a type converter. The System.Type that represents the type you wish to convert from.

e) ConvertFrom

[C#] public override object ConvertFrom(ITypeDescriptorContext context, CultureInfo culture, object value);

[C++] public: Object* ConvertFrom(ITypeDescriptorContext* context, CultureInfo* culture, Object* value);

[VB] Overrides Public Function ConvertFrom(ByVal context As ITypeDescriptorContext, ByVal culture As CultureInfo, ByVal value As Object) AS Object

[JScript] public override function ConvertFrom(context: ITypeDescriptorContext, culture: CultureInfo, value: Object): Object; Converts the given value to the native type of the converter.

Description

Converts the specified object to the coverter's native type.

Return Value: An System.Object that represents the converted value.

Override this method to provide your own conversion requirements. A System.ComponentModel.ITypeDescriptorContext that provides information about the context of a type converter. The locale information for the conversion. The object to convert.

f) ConvertTo

[C#] public override object ConvertTo(ITypeDescriptorContext context, CultureInfo culture, object value, Type destinationType);

[C++] public: Object* ConvertTo(ITypeDescriptorContext* context, CultureInfo* culture, Object* value, Type* destinationType);

[VB] Overrides Public Function ConvertTo(ByVal context As ITypeDescriptorContext, ByVal culture As CultureInfo, ByVal value As Object, ByVal destinationType As Type) As Object

[JScript] public override function ConvertTo(context: ITypeDescriptorContext, culture: CultureInfo, value: Object, destinationType: Type): Object; Converts the given value object to the specified destination type.

Description

Converts from the coverter's native type to a value of the destination type.

Return Value: An System.Object that represents the converted value.

Override this method to provide your own conversion requirements. A System.ComponentModel.ITypeDescriptorContext that provides information about the context of a type converter. The locale information for the conversion. The value to convert. The type to convert the object to.

OpenFileDialog class (System.Windows.Forms)

a) ToString

Description

Represents a common dialog box that displays the control that allows the user to open a file. This class cannot be inherited.

This class allows you to check if a file exists and open it. The System.Windows.Forms.OpenFileDialog.ShowReadOnlyi property determines if a read-only check box appears in the dialog box. The System.Windows.Forms.OpenFileDialog.ReadOnlyChecked property indicates whether the read-only check box is checked.

b) OpenFileDialog

Example Syntax:

c) ToString

[C#] public OpenFileDialog( );

[C++] public: OpenFileDialog( );

[VB] Public Sub New( )

[JScript] public function OpenFileDialog( );

d) AddExtension e) CheckFileExists f) ToString

Description

Gets or sets a value indicating whether the dialog box displays a warning if the user specifies a file name that does not exist.

g) CheckPathExists h) Container i) DefaultExt j) DereferenceLinks k) DesignMode l) Events m) FileName n) FileNames o) Filter p) FilterIndex q) InitialDirectory r) Instance s) Multiselect t) ToString Description Gets or sets a value indicating whether the dialog box allows multiple files to be selected.

Use System.Windows.Forms.FileDialog.FileNames to access the fill list of selected file names.

u) Options v) ReadOnlyChecked w) ToString

Description

Gets or sets a value indicating whether the read-only check box is selected.

The System.Windows.Forms.OpenFileDialog.Read Only-Checked state does not affect the read/write mode that System.Windows.Forms.OpenFileDialog.OpenFile uses to open a file selected in the dialog.

x) RestoreDirectory y) ShowHelp z) ShowReadOnly aa) ToString

Description

Gets or sets a value indicating whether the dialog contains a read-only check box.

bb) Site cc) Title dd) ValidateNames ee) OpenFile

[C#] public Stream OpenFile( );

[C++] public: Stream* OpenFile( );

[VB] Public Function OpenFile( ) As Stream

[JScript] public function OpenFile( ): Stream;

Description

Opens the file selected by the user, with read-only permission. The file is specified by the System.Windows.Forms. FileDialog. FileName property.

Return Value: A System.IO.Stream that specifies the read-only file selected by the user.

The System.Windows.Forms.OpenFileDialog.OpenFile method is used to provide a facility to quickly open a file from the dialog box. The file is opened in read-only mode for security purposes. To open a file in a read/write mode, you must use another call such as System.IO.FileStream ff) Reset

[C#] public override void Reset( );

[C++] public: void Reset( );

[VB] Overrides Public Sub Reset( )

[JScript] public override function Reset( );

Description

Resets all properties to their default values.

Orientation enumeration (System.Windows.Forms)

a) ToString

Description

Specifies the orientation of controls or elements of controls.

This enumeration is used by members such as System.Windows.Forms.TrackBar.Orientation.

b) ToString

[C#] public const Orientation Horizontal;

[C++] public: const Orientation Horizontal;

[VB] Public Const Horizontal As Orientation

[JScript] public var Horizontal: Orientation;

Description

The control or element is oriented horizontally.

c) ToString

[C#] public const Orientation Vertical;

[C++] public: const Orientation Vertical;

[VB] Public Const Vertical As Orientation

[JScript] public var Vertical: Orientation;

Description

The control or element is oriented vertically.

OSFeature class (System.Windows.Forms)

a) ToString

Description

Provides operating-system specific feature queries.

Use the static instance of this class provided in the System. Windows.Forms.OSFeature. Feature property to query for operating system features. You cannot create an instance of this class.

b) ToString

[C#] public static readonly object LayeredWindows;

[C++] public: static Object* LayeredWindows;

[VB] Public Shared ReadOnly LayeredWindows As Object

[JScript] public static var LayeredWindows: Object;

Description

Represents the layered, top-level windows feature. This static field is read-only.

Layered windows are available only in Windows 2000. A layered window can be made transparent or translucent by the operating system.

c) ToString

[C#] public static readonly object Themes;

[C++] public: static Object* Themes;

[VB] Public Shared ReadOnly Themes As Object

[JScript] public static var Themes: Object;

Description

Represents the operating system themes feature. This static field is read-only.

d) OSFeature

Example Syntax:

e) ToString

[C#] protected OSFeature( );

[C++] protected: OSFeature( );

[VB] Protected Sub New( )

[JScript] protected function OSFeature( );

Description

Initializes a new instance of the System.Windows.Forms.OS-Feature class.

This class cannot be instantiated. To query for operating system features, use the static instance of System.Windows. Forms.OSFeature provided in this class.

f) Feature
g) ToString

[C#] public static OSFeature Feature {get;}

[C++] public: _property static OSFeature* get Feature( );

[VB] Public Shared ReadOnly Property Feature As OSFeature

[JScript] public static function get Feature( ): OSFeature;

Description

Represents the static instance of System.Windows.Forms.OSFeature to use for feature queries. This property is read-only.

Use this static property to query for operating system features. You cannot create an instance of this class.

h) GetVersionPresent

[C#] public override Version GetVersionPresent(object feature);

[C++] public: Version* GetVersionPresent(Object* feature);

[VB] Overrides Public Function GetVersionPresent(ByVal feature As Object) As Version

[JScript] public override function GetVersionPresent(feature: Object): Version;

Description

Retrieves the version of the specified feature currently available on the system.

Return Value: A System.Version representing the version of the specified operating system feature currently available on the system; or null if the feature cannot be found.

Use System.Windows.Forms.OSFeature.feature, the static instance of System.Windows.Forms.OSFeature provided in this class, to query for the version number of a feature. The feature whose version is requested.

OwnerDrawPropertyBag class (System.Windows.Forms)

a) ToString

Description

Class used to pass new font/color information around for "partial" ownerdraw list/treeview items.

b) OwnerDrawPropertyBag

Example Syntax:

c) ToString

[C#] public OwnerDrawPropertyBag( );

[C++] public: OwnerDrawPropertyBag( );

[VB] Public Sub New( )

[JScript] public function OwnerDrawPropertyBag( );

d) BackColor e) ToString

[C#] public Color BackColor {get; set;}

[C++] public: _property Color get_BackColor( ); public: _property void set_BackColor(Color);

[VB] Public Property BackColor As Color

[JScript] public function get BackColor( ): Color; public function set BackColor(Color);

Description f) Font g) ToString

[C#] public Font Font {get; set;}

[C++] public: _property Font* get_Font( ); public: _property void set_Font(Font*);

[VB] Public Property Font As Font

[JScript] public function get Font( ): Font; public function set Font(Font);

Description h) ForeColor i) ToString

[C#] public Color ForeColor {get; set;}

[C++] public: _property Color get_ForeColor( ); public: _property void set_ForeColor(Color);

[VB] Public Property ForeColor As Color

[JScript] public function get ForeColor( ): Color; public function set ForeColor(Color);

Description j) Copy

[C#] public static OwnerDrawPropertyBag Copy(OwnerDrawPropertyBag value);

[C++] public: static OwnerDrawPropertyBag* Copy(OwnerDrawPropertyBag* value);

[VB] Public Shared Function Copy(ByVal value As OwnerDrawPropertyBag) As OwnerDrawPropertyBag

[JScript] public static function Copy(value: OwnerDrawPropertyBag): OwnerDrawPropertyBag;

Description

Copies the bag. Always returns a valid ODPB object

Return Value: a shallow copy of the property bag Copies the bag. Always returns a valid ODPB object property bag to copy k) IsEmpty

[C#] public virtual bool IsEmpty( );

[C++] public: virtual bool IsEmpty( ));

[VB] Overridable Public Function IsEmpty( ) As Boolean

[JScript] public function IsEmpty( ): Boolean;

Description

Returns whether or not this property bag contains all default values (is empty)

Returns whether or not this property bag contains all default values (is empty)

PageSetupDialog class (System.Windows.Forms)

a) ToString

Description

Represents a dialog box that allows users to manipulate page settings, including margins and paper orientation.

The System.Windows.Forms.PageSetupDialog dialog box modifies the System.Drawing.Printing.PageSettings and System.Drawing.Printing.PrinterSettings information for a given System.Windows.Forms.PageSetupDialog.Document. The user can enable sections of the dialog box to manipulate printing, margins, and paper orientation, size, and source and to show help and network buttons.

b) PageSetupDialog
Example Syntax:
c) ToString

[C#] public PageSetupDialog( );

[C++] public: PageSetupDialog( );

[VB] Public Sub New( )

[JScript] public function PageSetupDialog( );

Description

Initializes a new instance of the System.Windows.Forms.PageSetupDialog class.

When an instance of System.Windows.Forms.PageSetupDialog is created, the following properties are initialized to the specified values.

d) AllowMargins
e) ToString

[C#] public bool AllowMargins {get; set;}

[C++] public: _property bool get_AllowMargins( ); public: _property void set_AllowMargins(bool);

[VB] Public Property AllowMargins As Boolean

[JScript] public function get AllowMargins( ): Boolean; public function set AllowMargins(Boolean);

Description

Gets or sets a value indicating whether the margins section of the dialog box is enabled.

f) AllowOrientation
g) ToString

[C#] public bool AllowOrientation {get; set;}

[C++] public: _property bool get_AllowOrientation( ); public: _property void set_AllowOrientation(bool);

[VB] Public Property AllowOrientation As Boolean

[JScript] public function get AllowOrientation( ): Boolean; public function set AllowOrientation(Boolean);

Description

Gets or sets a value indicating whether the orientation section of the dialog box (landscape vs. portrait) is enabled.

h) AllowPaper
i) ToString

[C#] public bool AllowPaper {get; set;}

[C++] public: _property bool get_AllowPaper( ); public: _property void set_AllowPaper(bool);

[VB] Public Property AllowPaper As Boolean

[JScript] public function get AllowPaper( ): Boolean; public function set AllowPaper(Boolean);

Description

Gets or sets a value indicating whether the paper section of the dialog box (paper size and paper source) is enabled.

j) AllowPrinter
k) ToString

[C#] public bool AllowPrinter {get; set;}

[C++] public: _property bool get_AllowPrinter( ); public: _property void set_AllowPrinter(bool);

[VB] Public Property AllowPrinter As Boolean [JScript] public function get AllowPrinter( ): Boolean; public function set AllowPrinter(Boolean);

Description

Gets or sets a value indicating whether the Printer button is enabled.

l) Container
m) DesignMode
n) Document
o) ToString

Description

Gets or sets a value indicating the System.Drawing.Printing.PrintDocument to get page settings from.

p) Events
q) MinMargins
r) ToString

Description

Gets or sets a value indicating the minimum margins the user is allowed to select, in hundredths of an inch.

s) PageSettings
t) ToString

[C#] public PageSettings PageSettings {get; set;}

[C++] public: _property PageSettings* get_PageSettings( ); public: _property void set PageSettings(PageSettings*);

[VB] Public Property PageSettings As PageSettings

[JScript] public function get PageSettings( ): PageSettings; public function set PageSettings(PageSettings);

Description

Gets or sets a value indicating the page settings to modify.

u) PrinterSettings
v) ToString

[C#] public PrinterSettings PrinterSettings {get; set;}

[C++] public: _property PrinterSettings* get_PrinterSettings( ); public: _property void set_PrinterSettings(PrinterSettings*);

[VB] Public Property PrinterSettings As PrinterSettings

[JScript] public function get PrinterSettings( ): PrinterSettings; public function set PrinterSettings(PrinterSettings);

Description

Gets or sets the printer settings the dialog box to modify when the user clicks the Printer button.

w) ShowHelp
x) ToString

[C#] public bool ShowHelp {get; set;}

[C++] public: _property bool get_ShowHelp( ); public: _property void set_ShowHelp(bool);

[VB] Public Property ShowHelp As Boolean

[JScript] public function get ShowHelp( ): Boolean; public function set ShowHelp(Boolean);

Description

Gets or sets a value indicating whether the Help button is visible.

y) ShowNetwork
z) ToString

[C#] public bool ShowNetwork {get; set;}

[C++] public: _property bool get_ShowNetwork( ); public: _property void set_ShowNetwork(bool);

[VB] Public Property ShowNetwork As Boolean

[JScript] public function get ShowNetwork( ): Boolean; public function set ShowNetwork(Boolean);

Description

Gets or sets a value indicating whether the Network button is visible.

aa) Site bb) Reset

[C#] public override void Reset( );

[C++] public: void Reset( );

[VB] Overrides Public Sub Reset( )

[JScript] public override function Reset( );

Description

Resets all options to their default values.

cc) RunDialog

[C#] protected override bool RunDialog(IntPtr hwndOwner);

[C++] protected: bool RunDialog(IntPtr hwndOwner);

[VB] Overrides Protected Function RunDialog(ByVal hwnd Owner As IntPtr) As Boolean

[JScript] protected override function RunDialog(hwndOwner: IntPtr): Boolean;

Description

PaintEventArgs class (System.Windows.Forms)

a) ToString

Description

Provides data for the System.Windows.Forms.Control.Paint event.

The System.Windows.Forms.Control.Paint event occurs when a control is redrawn. A System.Windows.Forms.PaintEventArgs specifies the System.Windows.Forms.PaintEvent Args.Graphics to use to paint the control and the System. Windows.Forms.PaintEventArgs.ClipRectangle in which to paint.

b) PaintEventArgs

Example Syntax:

c) ToString

[C#] public PaintEventArgs(Graphics graphics, Rectangle clipRect);

[C++] public: PaintEventArgs(Graphics* graphics, Rectangle clipRect);

[VB] Public Sub New(ByVal graphics As Graphics, ByVal clipRect As Rectangle)

[JScript] public function PaintEventArgs(graphics: Graphics, clipRect Rectangle);

Description

Initializes a new instance of the System.Windows.Forms. PaintEventArgs class with the specified graphics and clipping rectangle. The System.Drawing.Graphics object used to paint the item The System.Drawing.Rectangle that represents the rectangle in which to paint.

d) ClipRectangle e) ToString

[C#] public Rectangle ClipRectangle {get;}

[C++] public: _property Rectangle get_ClipRectangle( );

[VB] Public ReadOnly Property ClipRectangle As Rectangle

[JScript] public function get ClipRectangle( ): Rectangle;

Description

Indicates the rectangle in which to paint. This property is read-only.

f) Graphics g) ToString

[C#] public Graphics Graphics {get;}

[C++] public: _property Graphics* get Graphics( );

[VB] Public ReadOnly Property Graphics As Graphics

[JScript] public function get Graphics( ): Graphics;

Description

Indicates the System.Drawing.Graphics object used to paint. This property is read-only.

h) Dispose

[C#] public void Dispose( );

[C++] public: _sealed void Dispose( );

[VB] NotOverridable Public Sub Dispose( )

[JScript] public function Dispose( ); Releases the resources used by the System.Windows.Forms.PaintEventArgs Description Releases all resources used by the System.Windows.Forms. PaintEventArgs Calling System.Windows.Forms.PaintEvent Args.Dispose allows the resources used by the System. Windows.Forms.PaintEventArgs. to be reallocated for other purposes. For more information about System.Windows. Forms. PaintEventArgs.Dispose, see.

i) Dispose

[C#] protected virtual void Dispose(bool disposing);

[C++] protected: virtual void Dispose(bool disposing);

[VB] Overridable Protected Sub Dispose(ByVal disposing As Boolean)

[JScript] protected function Dispose(disposing: Boolean);

Description

Releases the unmanaged resources used by the System.Windows.Forms.PaintEventArgs and optionally releases the managed resources.

This method is called by the public method and the System. Object. Finalize method. true to release both managed and unmanaged resources; false to release only unmanaged resources.

j) Finalize

[C#]~PaintEventArgs( );

[C++]~PaintEventArgs( );

[VB] Overrides Protected Sub Finalize( )

[JScript] protected override function Finalize( );

Description

PaintEventHandler delegate (System.Windows.Forms)

a) ToString

Description

Represents the method that will handle the System.Windows.Forms.Control.Paint event of a System.Windows.Forms.Control class. The source of the event. A System.Windows.Forms.PaintEventArgs that contains the event data.

When you create a System.Windows.Forms.PaintEventHandler delegate, you identify the method that will handle the event. To associate the event with your event handler, add an instance of the delegate to the event. The event handler is called whenever the event occurs, unless you remove the delegate. For more information about handling events with delegates, see.

Panel class (System.Windows.Forms)

a) ToString

Description

Represents a Windows System.Windows.Forms.Panel control.

A System.Windows.Forms.Panel is a control that contains other controls. You can use a System.Windows.Forms.Panel to group collections of controls such as a group of System.Windows.Forms.RadioButton controls. As with other container controls such as the System.Windows.Forms.GroupBox control, if the System.Windows.Forms.Panel control's System.Windows.Forms.Control.Enabled property is set to false, the controls contained within the System.Windows.Forms.Panel will also be disabled.

b) Panel

Example Syntax:

c) ToString

[C#] public Panel( );

[C++] public: Panel( );

[VB] Public Sub New( )

[JScript] public function Panel( );

Description

Initializes a new instance of the System.Windows.Forms.Panel class.

d) AccessibilityObject e) AccessibleDefaultActionDescription f) AccessibleDescription g) AccessibleName h) AccessibleRole i) AllowDrop j) Anchor k) AutoScroll l) AutoScrollMargin m) AutoScrollMinSize n) AutoScrollPosition o) BackColor p) BackgroundImage q) BindingContext r) BorderStyle s) ToString Description Indicates the border style for the control.

By default, the System.Windows.Forms.Panel control is displayed without a border. You can use this property to distinguish the boundaries of the System.Windows.Forms.Panel control from other areas on the form.

t) Bottom u) Bounds v) CanFocus w) CanSelect x) Capture y) CausesValidation z) ClientRectangle aa) ClientSize bb) CompanyName cc) Container dd) ContainsFocus ee) ContextMenu ff) Controls gg) Created hh) CreateParams ii) ToString Description Returns the parameters needed to create the handle. Inheriting classes can override this to provide extra functionality. They should not, however, forget to call base.getCreateParams( ) first to get the struct filled up with the basic info.

jj) Cursor kk) DataBindings ll) DefaultImeMode mm) DefaultSize n) ToString

Description

Deriving classes can override this to configure a default size for their control. This is more efficient than setting the size in the control's constructor.

oo) DesignMode pp) DisplayRectangle qq) Disposing rr) Dock ss) DockPadding tt) Enabled uu) Events vv) Focused ww) Font xx) FontHeight yy) ForeColor zz) Handle aaa) HasChildren bbb) Height ccc) HScroll ddd) ImeMode eee) InvokeRequired fff) IsAccessible ggg) IsDisposed hhh) IsHandleCreated iii) Left jjj) Location kkk) Name lll) Parent mmm) ProductName nnn) ProductVersion ooo) RecreatingHandle ppp) Region qqq) RenderRightToLeft rrr) ResizeRedraw sss) Right ttt) RightToLeft uuu) ShowFocusCues vvv) ShowKeyboardCues
www) Site
xxx) Size
yyy) TabIndex
zzz) TabStop
aaaa) ToString Description bbbb) Tag
cccc) Text
dddd) ToString Description eeee) Top
ffff) TopLevelControl
gggg) Visible
hhhh) VScroll
iiii) Width
jjjj) WindowTarget
kkkk) ToString
llll) ToString
mmmm)ToString
nnnn) OnResize

[C#] protected override void OnResize(EventArgs eventargs);

[C++] protected: void OnResize(EventArgs* eventargs);

[VB] Overrides Protected Sub OnResize(ByVal eventargs As EventArgs)

[JScript] protected override function OnResize(eventargs: EventArgs);

Description

Fires the event indicating that the panel has been resized. Inheriting controls should use this in favour of actually listening to the event, but should not forget to call base.on Resize( ) to ensure that the event is still fired for external listeners. e Event to send oooo) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

PictureBox class (System.Windows.Forms)

a) WndProc

Description

Represents a Windows picture box control for displaying an image.

Typically the System.Windows.Forms.PictureBox is used to display graphics from a bitmap, icon, JPEG, GIF or other image file types.

b) PictureBox

Example Syntax:

c) WndProc

[C#] public PictureBox( );

[C++] public: PictureBox( );

[VB] Public Sub New( )

[JScript] public function PictureBox( );

Description

Initializes a new instance of the System.Windows.Forms.PictureBox class.

The following table shows initial property values for an instance of System.Windows.Forms.PictureBox.

d) AccessibilityObject
e) AccessibleDefaultActionDescription
f) AccessibleDescription
g) AccessibleName
h) AccessibleRole
i) AllowDrop
j) WndProc Description k) Anchor
l) BackColor
m) BackgroundImage
n) BindingContext
o) BorderStyle
p) WndProc Description Indicates the border style for the control.

You can specify this property at design time or run time.

q) Bottom
r) Bounds
s) CanFocus
t) CanSelect
u) Capture
v) Causes Validation
w) WndProc Description x) ClientRectangle
y) ClientSize
z) CompanyName
aa) Container
bb) ContainsFocus
cc) ContextMenu
dd) Controls
ee) Created
ff) CreateParams
gg) WndProc Description Returns the parameters needed to create the handle. Inheriting classes can override this to provide extra functionality. They should not, however, forget to call base.getCreateParams( ) first to get the struct filled up with the basic info.

hh) Cursor
ii) DataBindings
jj) DefaultImeMode
kk) WndProc

Description

Gets a value indicating the mode for Input Method Editor (IME) for the System.Windows.Forms.PictureBox.

ll) DefaultSize
mm) WndProc

[C#] protected override Size DefaultSize {get;}

[C++] protected: _property virtual Size get_DefaultSize( );

[VB] Overrides Protected ReadOnly Property DefaultSize As Size [JScript] protected function get DefaultSize( ): Size;

Description

Deriving classes can override this to configure a default size for their control. This is more efficient than setting the size in the control's constructor.

nn) DesignMode
oo) DisplayRectangle
pp) Disposing
qq) Dock
rr) Enabled
ss) Events
tt) Focused
uu) Font
vv) WndProc Description ww) FontHeight
xx) ForeColor
yy) WndProc Description zz) Handle
aaa) HasChildren
bbb) Height
ccc) Image
ddd) WndProc Description Indicates the image that the System.Windows.Forms.PictureBox displays.

The System.Windows.Forms.PictureBox.Image property is set to the System.Drawing.Image to display. You can do this either at design time or at run time.

eee) ImeMode
fff) WndProc

[C#] public new ImeMode ImeMode {get; set;}

[C++] public: _property ImeMode get_ImeMode( ); public: _property void set_ImeMode(ImeMode);

[VB] Public Property ImeMode As ImeMode

[JScript] public function get ImeMode( ): ImeMode; public function set ImeMode(ImeMode);

Description

Gets or sets the Input Method Editor(IME) mode supported by this control.

ggg) InvokeRequired
hhh) IsAccessible
iii) IsDisposed
jjj) IsHandleCreated
kkk) Left
lll) Location
mmm) Name
nnn) Parent
ooo) ProductName
ppp) ProductVersion
qqq) RecreatingHandle
rrr) Region
sss) RenderRightToLeft
ttt) ResizeRedraw
uuu) Right
vvv) RightToLeft
www) WndProc Description xxx) ShowFocusCues
yyy) ShowKeyboardCues
zzz) Site
aaaa) Size
bbbb) SizeMode
cccc) WndProc Description Indicates how the image is displayed.

Valid values for this property are taken from the System.Windows.Forms.PictureBoxSizeMode enumeration. By default, in PictureBoxSizeMode.Normal mode, the System.Drawing.Image is placed in the upper left corner of the System.Windows.Forms.PictureBox, and any part of the image too big for the System.Windows.Forms.PictureBox is clipped. Using the PictureBoxSizeMode.StretchImage value causes the image to stretch to fit the System.Windows.Forms.PictureBox.

dddd) TabIndex
eeee) WndProc

[C#] public new int TabIndex {get; set;}

[C++] public: _property int get_TabIndex( ); public: _property void set_TabIndex(int);

[VB] Public Property TabIndex As Integer

[JScript] public function get TabIndex( ): int; public function set TabIndex(int);

Description ffff) TabStop
gggg) WndProc

[C#] public new bool TabStop {get; set;}

[C++] public: _property bool get_TabStop( ); public: _property void set_TabStop(bool);

[VB] Public Property TabStop As Boolean

[JScript] public function get TabStop( ) : Boolean; public function set TabStop(Boolean);

Description hhhh) Tag
iiii) Text
jjjj) WndProc

Description kkkk) Top
llll) TopLevelControl
mmmm)Visible
nnnn) Width
oooo) WindowTarget
pppp) WndProc
qqqq) WndProc Description rrrr) WndProc

[C#] public new event KeyPressEventHandler KeyPress;

[C++] public: _event KeyPressEventHandler* KeyPress;

[VB] Shadows Public Event KeyPress As KeyPressEventHandler

Description ssss) WndProc

[C#] public new event KeyEventHandler KeyUp;

[C++] public: _event KeyEventHandler* KeyUp;

[VB] Shadows Public Event KeyUp As KeyEventHandler

Description tttt) WndProc uuuu) WndProc

Description

Occurs when System.Windows.Forms.PictureBox. Size-Mode changes. For more information about handling events, see.

vvvv) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description wwww) OnEnabledChanged

[C#] protected override void OnEnabledChanged(EventArgs e);

[C++] protected: void OnEnabledChanged(EventArgs* e);

[VB] Overrides Protected Sub OnEnabledChanged(ByVal e As EventArgs)

[JScript] protected override function OnEnabledChanged(e: EventArgs);

Description xxxx) OnPaint

[C#] protected override void OnPaint(PaintEventArgs pe);

[C++] protected: void OnPaint(PaintEventArgs* pe);

[VB] Overrides Protected Sub OnPaint(ByVal pe As Paint-EventArgs)

[JScript] protected override function OnPaint(pe: PaintEvent Args);

Description

Overridden onPaint to make sure that the image is painted correctly.

yyyy) OnParentChanged

[C#] protected override void OnParentChanged(EventArgs e);

[C++] protected: void OnParentChanged(EventArgs* e);

[VB] Overrides Protected Sub OnParentChanged(ByVal e As EventArgs)

[JScript] protected override function OnParentChanged(e: EventArgs);

Description zzzz) OnResize

[C#] protected override void OnResize(EventArgs e);

[C++] protected: void OnResize(EventArgs*

[VB] Overrides Protected Sub OnResize(ByVal e As Event Args)

[JScript] protected override function OnResize(e: Event Args);

Description

OnResize override to invalidate entire control in Stetch mode

OnResize override to invalidate entire control in Stetch mode aaaaa) OnSizeModeChanged

[C#] protected virtual void OnSizeModeChanged(EventArgs e);

[C++] protected: virtual void OnSizeModeChanged(Event Args* e);

[VB] Overridable Protected Sub OnSizeModeChanged(By-Val e As EventArgs)

[JScript] protected function OnSizeModeChanged(e: Event Args);

Description

Raises the System.Windows.Forms.PictureBox. SizeMo-deChanged event.

Raising an event invokes the event handler through a delegate. For more information, see. An System.EventArgs that contains the event data.

bbbbb) On VisibleChanged

[C#] protected override void OnVisibleChanged(EventArgs e);

[C++] protected: void OnVisibleChanged(EventArgs* e);

[VB] Overrides Protected Sub OnVisibleChanged(ByVal e As EventArgs)

[JScript] protected override function OnVisibleChanged(e: EventArgs);

Description ccccc) SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As Bounds Specified)

[JScript] protected override function SetBoundsCore(x: int, y: int, width: int, height: int, specified: BoundsSpecified);

Description

Overrides Control.setBoundsCore to enforce autoSize.

ddddd) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

PictureBoxSizeMode enumeration (System.Windows.Forms)

a) WndProc

Description

Specifies how an image is positioned within a System.Windows.Forms.PictureBox.

Use the members of this enumeration to set the value of the System.Windows.Forms.PictureBox.SizeMode property of the System.Windows.Forms.PictureBox.

b) WndProc

[C#] public const PictureBoxSizeMode AutoSize;

[C++] public: const PictureBoxSizeMode AutoSize;

[VB] Public Const AutoSize As PictureBoxSizeMode

[JScript] public var AutoSize: PictureBoxSizeMode;

Description

The System.Windows.Forms.PictureBox is sized equal to the size of the image that it contains.

c) WndProc

[C#] public const PictureBoxSizeMode CenterImage;

[C++] public: const PictureBoxSizeMode CenterImage;

[VB] Public Const CenterImage As PictureBoxSizeMode

[JScript] public var CenterImage: PictureBoxSizeMode;

Description

The image is displayed in the center if the System.Windows.Forms.PictureBox is larger than the image. If the image is larger than the System.Windows.Forms.PictureBox, the picture is placed in the center of the System.Windows.Forms.PictureBox and the outside edges are clipped.

d) WndProc

[c#] public const PictureBoxSizeMode Normal;

[C++] public: const PictureBoxSizeMode Normal;

[VB] Public Const Normal As PictureBoxSizeMode

[JScript] public var Normal: PictureBoxSizeMode;

Description

The image is placed in the upper-left corner of the System.Windows.Forms.PictureBox. The image is clipped if it is larger than the System.Windows.Forms.PictureBox it is contained in.

e) WndProc

[C#] public const PictureBoxSizeMode StretchImage;

[C++] public: const PictureBoxSizeMode StretchImage;

[VB] Public Const StretchImage As PictureBoxSizeMode

[JScript] public var StretchImage: PictureBoxSizeMode;

Description

The image within the System.Windows.Forms.PictureBox is stretched or shrunk to fit the size of the System.Windows.Forms.PictureBox.

PrintControllerWithStatusDialog class (System.Windows.Forms)

a) ToString

Description

Controls how a document is printed.

This class implements a System.Drawing.Printing.PrintController and adds a status dialog. A print controller specifies how a System.Drawing.Printing.PrintDocument is printed.

b) PrintControllerWithStatusDialog

Example Syntax:

c) ToString

[C#] public PrintControllerWithStatusDialog(PrintController underlyingcontroller);

[C++] public: PrintControllerWithStatusDialog(PrintController* underlyingcontroller);

[VB] Public Sub New(ByVal underlyingController As PrintController)

[JScript] public function PrintControllerWithStatusDialog (underlyingcontroller: PrintController); Initializes a new instance of the System.Windows.Forms.PrintControllerWithStatusDialog class.

Description

Initializes a new instance of the System.Windows.Forms.PrintControllerWithStatusDialog class, wrapping the supplied System.Drawing.Printing.PrintController. A System.Drawing.Printing.PrintController to encapsulate.

d) PrintControllerWithStatusDialog

Example Syntax:

e) ToString

[C#] public PrintControllerWithStatusDialog(PrintController underlyingController, string dialogTitle);

[C++] public: PrintControllerWithStatusDialog(PrintController* underlyingController, String* dialogTitle);

[VB] Public Sub New(ByVal underlyingController As PrintController, ByVal dialogTitle As String)

[JScript] public function PrintControllerWithStatusDialog (underlyingController PrintController, dialogTitle: String);

Description

Initializes a new instance of the System.Windows.Forms.PrintControllerWithStatusDialog class, wrapping the supplied System.Drawing.Printing.PrintController and specifying a title for the dialog. A System.Drawing.Printing.PrintController to encapsulate. A System.String containing a title for the status dialog.

f) OnEndPage

[C#] public override void OnEndPage(PrintDocument document, PrintPageEventArgs e);

[C++] public: void OnEndPage(PrintDocument* document, PrintPageEventArgs* e);

[VB] Overrides Public Sub OnEndPage(ByVal document As PrintDocument, ByVal e As PrintPageEventArgs)

[JScript] public override function OnEndPage(document: PrintDocument, e PrintPageEventArgs);

Description

Implements EndPage by delegating to the underlying controller.

g) OnEndPrint

[C#] public override void OnEndPrint(PrintDocument document, PrintEventArgs e);

[C++] public: void OnEndPrint(PrintDocument* document, PrintEventArgs* e);

[VB] Overrides Public Sub OnEndPrint(ByVal document As PrintDocument, ByVal e As PrintEventArgs)

[JScript] public override function OnEndPrint(document: PrintDocument, e: PrintEventArgs);

Description

Implements EndPrint by delegating to the underlying controller.

h) OnStartPage

[C#] public override Graphics OnStartPage(PrintDocument document, PrintPageEventArgs e);

[C++] public: Graphics* OnStartPage(PrintDocument* document, PrintPageEventArgs* e);

[VB] Overrides Public Function OnStartPage(ByVal document As PrintDocument, ByVal e As PrintPageEventArgs) As Graphics

[JScript] public override function OnStartPage(document: PrintDocument, e: PrintPageEventArgs) Graphics;

Description

Implements StartPage by delegating to the underlying controller.

i) OnStartPrint

[C#] public override void OnStartPrint(PrintDocument document, PrintEventArgs e);

[C++] public: void OnStartPrint(PrintDocument* document, PrintEventArgs* e);

[VB] Overrides Public Sub OnStartPrint(ByVal document As PrintDocument, ByVal e As PrintEventArgs)

[JScript] public override function OnStartPrint(document: PrintDocument, e: PrintEventArgs);

Description

Implements StartPrint by delegating to the underlying controller.

PrintDialog class (System.Windows.Forms)

a) ToString

Description

Allows users to select a printer and choose which portions of the document to print.

When you create an instance of System.Windows.Forms.PrintDialog, the read/write properties are set to initial values. For a list of these values, see the System.Windows.Forms.PrintDialog.#ctor constructor.

b) PrintDialog

Example Syntax:

c) ToString

[C#] public PrintDialog( );

[C++] public: PrintDialog( );

[VB] Public Sub New( )

[JScript] public function PrintDialog( );

Description

Initializes a new instance of the System.Windows.Forms.PrintDialog class.

When you create an instance of System.Windows.Forms.PrintDialog, the following read/write properties are set to initial values.

d) AllowPrintToFile e) ToString

[C#] public bool AllowPrintToFile {get; set;}

[C++] public: _property bool get AllowPrintToFile( ); public: _property void set_AllowPrintToFile(bool);

[VB] Public Property AllowPrintToFile As Boolean

[JScript] public function get AllowPrintToFile( ): Boolean; public function set AllowPrintToFile(Boolean);

Description

Gets or sets a value indicating whether the Print to file check box is enabled.

f) AllowSelection g) ToString

[C#] public bool AllowSelection {get; set;}

[C++] public: _property bool get_AllowSelection( ); public: _property void set_AllowSelection(bool);

[VB] Public Property AllowSelection As Boolean

[JScript] public function get AllowSelection( ): Boolean; public function set AllowSelection(Boolean);

Description

Gets or sets a value indicating whether the From . . . To . . . Page option button is enabled.

h) AllowSomePages i) ToString

[C#] public bool AllowSomePages {get; set;}

[C++] public: _property bool get_AllowSomePages( ); public: _property void set_AllowSomePages(bool);

[VB] Public Property AllowSomePages As Boolean

[JScript] public function get AllowSomePages( ): Boolean; public function set AllowSomePages(Boolean);

Description

Gets or sets a value indicating whether the Pages option button is enabled.

j) Container k) DesignMode l) Document m) ToString

Description

Gets or sets a value indicating the System.Drawing.Printing.PrintDocument used to obtain System.Drawing.Printing.PrinterSettings.

n) Events o) PrinterSettings p) ToString

Description

Gets or sets the System.Drawing.Printing.PrinterSettings the dialog box to modify.

q) PrintToFile r) ToString

[C#] public bool PrintToFile {get; set;}

[C++] public: _property bool get_PrintToFile( ); public: _property void set_PrintToFile(bool);

[VB] Public Property PrintToFile As Boolean

[JScript] public function get PrintToFile( ): Boolean; public function set PrintToFile(Boolean);

Description

Gets or sets a value indicating whether the Print to file check box is checked.

s) ShowHelp t) ToString

[C#] public bool ShowHelp {get; set;}

[C++] public: _property bool get_ShowHelp( ); public: _property void set_ShowHelp(bool);

[VB] Public Property ShowHelp As Boolean

[JScript] public function get ShowHelp( ): Boolean; public function set ShowHelp(Boolean);

Description

Gets or sets a value indicating whether the Help button is displayed.

u) ShowNetwork v) ToString

[C#] public bool ShowNetwork {get; set;}

[C++] public: _property bool get ShowNetwork( ); public: _property void set_ShowNetwork(bool);

[VB] Public Property ShowNetwork As Boolean

[JScript] public function get ShowNetwork( ): Boolean; public function set ShowNetwork(Boolean);

Description

Gets or sets a value indicating whether the Network button is displayed.

w) Site x) Reset

[C#] public override void Reset( );

[C++] public: void Reset( );

[VB] Overrides Public Sub Reset( )

[JScript] public override function Reset( );

Description

Resets all options, the last selected printer, and the page settings to their default values.

y) RunDialog

[C#] protected override bool RunDialog(IntPtr hwndOwner);

[C++] protected: bool RunDialog(IntPtr hwndOwner);

[VB] Overrides Protected Function RunDialog(ByVal hwnd Owner As IntPtr) As Boolean

[JScript] protected override function RunDialog(hwndOwner: IntPtr): Boolean;

Description

Specifies a print dialog box.

Return Value: true if the dialog was successfully run; otherwise, false. A value that represents the window handle of the owner window for the print dialog box.

PrintPreviewControl class (System.Windows.Forms)

a) ToString

Description

The raw "preview" part of print previewing, without any dialogs or buttons. Most PrintPreviewControl's are found on PrintPreviewDialog's, but they don't have to be.

When you create an instance of System.Windows.Forms.PrintPreviewControl, some of the read/write properties are set to initial values. For a list of these values, see the System.Windows.Forms.PrintPreviewControl.#ctor constructor.

b) PrintPreviewControl

Example Syntax:

c) ToString

[C#] public PrintPreviewControl( );

[C++] public: PrintPreviewControl( );

[VB] Public Sub New( )

[JScript] public function PrintPreviewControl( );

Description

Initializes a new instance of the System.Windows.Forms.PrintPreviewControl class.

When you create an instance of System.Windows.Forms.PrintPreviewControl the following read/write properties are initialized.

d) AccessibilityObject e) AccessibleDefaultActionDescription f) AccessibleDescription g) AccessibleName h) AccessibleRole i) AllowDrop j) Anchor k) AutoZoom l) ToString Description Gets or sets a value indicating whether resizing the control or changing the number of pages shown automatically adjusts the System.Windows.Forms.PrintPreviewControl.Zoom property.

m) BackColor n) BackgroundImage o) BindingContext p) Bottom q) Bounds r) CanFocus s) CanSelect t) Capture u) Causes Validation v) ClientRectangle w) ClientSize x) Columns y) ToString Description Gets or sets the number of pages displayed horizontally across the screen.

z) CompanyName aa) Container bb) ContainsFocus cc) ContextMenu dd) Controls ee) Created CreateParams gg) ToString Description Gets the CreateParams used to create the window. If a subclass overrides this function, it must call the base implementation.

hh) Cursor
ii) DataBindings
jj) DefaultImeMode
kk) DefaultSize
ll) DesignMode
mm) DisplayRectangle
nn) Disposing
oo) Dock
pp) Document
qq) ToString Description Gets or sets a value indicating the document to preview.

rr) Enabled
ss) Events
tt) Focused
uu) Font
vv) FontHeight
ww) ForeColor
xx) Handle
yy) HasChildren
zz) Height
aaa) ImeMode
bbb) InvokeRequired
ccc) IsAccessible
ddd) IsDisposed
eee) IsHandleCreated
fff) Left
ggg) Location
hhh) Name
iii) Parent
jjj) ProductName
kkk) ProductVersion
lll) RecreatingHandle
mmm) Region
nnn) RenderRightToLeft
ooo) ResizeRedraw
ppp) Right
qqq) RightToLeft
rrr) Rows
sss) ToString Description Gets or sets the number of pages displayed vertically down the screen.

ttt) ShowFocusCues
uuu) ShowKeyboardCues
vvv) Site
www) Size
xxx) StartPage
yyy) ToString Description Gets or sets the page number of the upper left page.

zzz) TabIndex
aaaa) TabStop
bbbb) Tag
cccc) Text
dddd) ToString

Description eeee) Top
ffff) TopLevelControl
gggg) UseAntiAlias
hhhh) ToString

Description

Gets or sets a value indicating whether to use anti-aliasing when displaying the print preview.

Anti-aliasing, also known as gray scaling, uses several shades of gray around areas of curves and diagonals in text to give the text a smoother appearance.

iiii) Visible
jjjj) Width
kkkk) WindowTarget
llll) Zoom
mmmm)ToString

Description

Gets or sets a value indicating how large the pages will appear.

nnnn) ToString

Description

Occurs when the start page changes.

For more information about handling events, see.

oooo) InvalidatePreview

[C#] public void InvalidatePreview( );

[C++] public: void InvalidatePreview( );

[VB] Public Sub InvalidatePreview( )

[JScript] public function InvalidatePreview( );

Description

Refreshes the preview of the document.

Call this method if the document appearance has changed.

pppp) OnPaint

[C#] protected override void OnPaint(PaintEventArgs pevent);

[C++] protected: void OnPaint(PaintEventArgs* pevent);

[VB] Overrides Protected Sub OnPaint(ByVal pevent As PaintEventArgs)

[JScript] protected override function OnPaint(pevent: PaintEventArgs);

Description

Paints the control.

qqqq) OnResize

[C#] protected override void OnResize(EventArgs eventargs);

[C++] protected: void OnResize(EventArgs* eventargs);

[VB] Overrides Protected Sub OnResize(ByVal eventargs As EventArgs)

[JScript] protected override function OnResize(eventargs: EventArgs);

Description

Invalidate the layout, if necessary.

rrrr) OnStartPageChanged

[C#] protected virtual void OnStartPageChanged(EventArgs e);

[C++] protected: virtual void OnStartPageChanged(Event Args* e);

[VB] Overridable Protected Sub OnStartPageChanged(ByVal e As EventArgs)

[JScript] protected function OnStartPageChanged(e: Event Args);

Description

Raises the System.Windows.Forms.PrintPreviewControl.StartPageChanged event.

Raising an event invokes the event handler through a delegate. For more information, see. An System.EventArgs that contains the event data.

ssss) ResetBackColor

[C#] public override void ResetBackColor( );

[C++] public: void ResetBackColor( );

[VB] Overrides Public Sub ResetBackColor( )

[JScript] public override function ResetBackColor( );

Description

Resets the back color to the defaults for the PrintPreviewControl.

tttt) ResetForeColor

[C#] public override void ResetForeColor( );

[C++] public: void ResetForeColor( );

[VB] Overrides Public Sub ResetForeColor( )

[JScript] public override function ResetForeColor( );

Description

Resets the back color to the defaults for the PrintPreviewControl.

uuuu) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

PrintPreviewDialog class (System.Windows.Forms)

a) WndProc

Description

Represents a dialog box form that contains a System.Windows.Forms.PrintPreviewControl.

When you create an instance of System.Windows.Forms.PrintPreviewDialog, some of the read/write properties are set to initial values. For a list of these, see the System.Windows.Forms. PrintPreviewDialog.#ctor constructor.

b) PrintPreviewDialog

Example Syntax:

c) WndProc

[C#] public PrintPreviewDialog( );

[C++] public: PrintPreviewDialog( );

[VB] Public Sub New( )

[JScript] public function PrintPreviewDialog( );

Description

Initializes a new instance of the System.Windows.Forms.PrintPreviewDialog class.

When you create an instance of System.Windows.Forms.PrintPreviewDialog, the System.Windows.Forms.PrintPreviewDialog.Document property is initialized to null. You can change the value for this property at run time.

d) AcceptButton e) WndProc

[C#] public new IButtonControl AcceptButton {get; set;}

[C++] public: _property IButtonControl* get AcceptButton( ); public: _property void set_AcceptButton(IButtonControl*);

[VB] Public Property AcceptButton As IButtonControl

[JScript] public function get AcceptButton( ): IButtonControl; public function set AcceptButton(IButtonControl);

Description

Gets or sets the button on the form that is clicked when the user presses the ENTER key.

This property allows you to designate a default action to occur when the user presses the ENTER key in your application. The button assigned to this property must be an System.Windows.Forms.IButtonControl that is on the current form or located within a container on the current form.

f) AccessibilityObject g) AccessibleDefaultActionDescription h) AccessibleDescription i) WndProc Description Gets or sets the accessible description of the control.

j) AccessibleName k) WndProc

[C#] public new string AccessibleName {get; set;}

[C++] public: _property String* get_AccessibleName( ); public: _property void set_AccessibleName(String*);

[VB] Public Property AccessibleName As String

[JScript] public function get AccessibleName( ): String; public function set AccessibleName(String);

Description

Gets or sets the accessible name of the control.

l) AccessibleRole m) WndProc

[C#] public new AccessibleRole AccessibleRole {get; set;}

[C++] public: _property AccessibleRole get_AccessibleRole( ); public: _property void set_AccessibleRole(AccessibleRole);

[VB] Public Property AccessibleRole As AccessibleRole

[JScript] public function get AccessibleRole( ): AccessibleRole; public function set AccessibleRole(AccessibleRole);

Description

The accessible role of the control.

n) ActiveControl o) ActiveMdiChild p) AllowDrop q) WndProc

Description

The AllowDrop property. If AllowDrop is set to true then this control will allow drag and drop operations and events to be used.

r) AllowTransparency
s) Anchor
t) WndProc

Description

The current value of the anchor property. The anchor property determines which edges of the control are anchored to the container's edges.

u) AutoScale
v) WndProc

[C#] public new bool AutoScale {get; set;}

[C++] public: _property bool get_AutoScale( ); public: _property void set_AutoScale(bool);

[VB] Public Property AutoScale As Boolean

[JScript] public function get AutoScale( ): Boolean; public function set AutoScale(Boolean);

Description

Gets or sets a value indicating whether the form adjusts its size to fit the height of the font used on the form and scales its controls.

You can use this property to allow your form and its controls to automatically adjust based on changes in the font. This can be useful in applications where the font might increase or decrease based on the language specified for use by Windows.

w) AutoScaleBaseSize
x) WndProc

[C#] public override Size AutoScaleBaseSize {get; set;}

[C++] public: _property virtual Size get_AutoScaleBase Size( ); public: _property virtual void set_AutoScaleBase Size(Size);

[VB] Overrides Public Property AutoScaleBaseSize As Size

[JScript] public function get AutoScaleBaseSize( ): Size; public function set AutoScaleBaseSize(Size);

Description

PrintPreviewDialog does not support AutoScaleBaseSize.

y) AutoScroll
z) WndProc

[C#] public override bool AutoScroll {get; set;}

[C++] public: _property virtual bool get_AutoScroll( ); public: _property virtual void set_AutoScroll(bool);

[VB] Overrides Public Property AutoScroll As Boolean

[JScript] public function get AutoScroll( ): Boolean; public function set AutoScroll(Boolean);

Description

Gets or sets a value indicating whether the form implements autoscrolling.

aa) AutoScrollMargin
bb) WndProc

[C#] public new Size AutoScrollMargin {get; set;}

[C++] public: _property Size get_AutoScrollMargin( ); public: _property void set_AutoScrollMargin(Size);

[VB] Public Property AutoScrollMargin As Size

[JScript] public function get AutoScrollMargin( ): Size; public function set AutoScrollMargin(Size);

Description

Gets or sets the size of the auto-scroll margin.

The auto-scroll-margin is used to determine the distance from the edges of the scrollable control. If the distance from the edge of a child control to parent-scrollable control is less than the value assigned to this property, the appropriate scroll bar is displayed.

cc) AutoScrollMinSize
dd) WndProc

[C#] public new Size AutoScrollMinSize {get; set;}

[C++] public: _property Size get AutoScrollMinSize( ); public: property void set AutoScrollMinSize(Size);

[VB] Public Property AutoScrollMinSize As Size

[JScript] public function get AutoScrollMinSize( ): Size; public function set AutoScrollMinSize(Size);

Description

Gets or sets the minimum size of the auto-scroll.

The System.Windows.Forms.PrintPreviewDialog.AutoScrollMinSize property is used to manage the screen size allocated to the automatic scroll bars.

ee) AutoScrollPosition
ff) BackColor
gg) WndProc

Description

The background color of this control. This is an ambient property and will always return a non-null value.

hh) BackgroundImage
ii) WndProc

[C#] public override Image BackgroundImage {get; set;}

[C++] public: _property virtual Image* get BackgroundImage( ); public: _property virtual void set_BackgroundImage (Image*);

[VB] Overrides Public Property BackgroundImage As Image

[JScript] public function get BackgroundImage( ): Image; public function set BackgroundImage(Image);

Description

The background image of the control.

jj) BindingContext
kk) Bottom
ll) Bounds
mm) CancelButton
nn) WndProc

Description

Gets or sets the button control that will be clicked when the user presses the ESC key.

oo) CanFocus
pp) CanSelect
qq) Capture
rr) CausesValidation
ss) WndProc

Description

Gets or sets a value indicating whether entering the control causes validation for all controls that require validation.

tt) ClientRectangle
uu) ClientSize
vv) CompanyName
ww) Container
xx) ContainsFocus
yy) ContextMenu
zz) WndProc Description The contextMenu associated with this control. The contextMenu will be shown when the user right clicks the mouse on the control.

aaa) ControlBox
bbb) WndProc

[C#] public new bool ControlBox {get; set;}

[C++] public: _property bool get_ControlBox( ); public: _property void set_ControlBox(bool);

[VB] Public Property ControlBox As Boolean

[JScript] public function get ControlBox( ): Boolean; public function set ControlBox(Boolean);

Description

Gets or sets a value indicating whether a control box is displayed in the caption bar of the form.

If the System.Windows.Forms.PrintPreviewDialog. ControlBox property is set to true, the control box is displayed in the upper-left corner of the caption bar. The control box is where the user can click to access the system menu.

ccc) Controls
ddd) Created
eee) CreateParams
fff) Cursor
ggg) WndProc

Description

Retrieves the cursor that will be displayed when the mouse is over this control.

hhh) DataBindings
iii) WndProc

[C#] public new ControlBindingsCollection DataBindings {get;}

[C++] public: _property ControlBindingsCollection* get DataBindings( );

[VB] Public ReadOnly Property DataBindings As ControlBindingsCollection

[JScript] public function get DataBindings( ): ControlBindingsCollection;

Description

Gets the data bindings for the control.

Use the System.Windows.Forms.PrintPreviewDialog. Data Bindings property to access the System.Windows.Forms. ControlBindingsCollection. By adding System.Windows. Binding objects to the collection, you can data-bind any property of a control to the property of an object.

jjj) DefaultImeMode
kkk) DefaultSize
lll) DesignMode
mmm) DesktopBounds
nnn) DesktopLocation
ooo) DialogResult
ppp) DisplayRectangle
qqq) Disposing
rrr) Dock
sss) WndProc Description The dock property. The dock property controls to which edge of the container this control is docked to. For example, when docked to the top of the container, the control will be displayed flush at the top of the container, extending the length of the container.

ttt) DockPadding
uuu) WndProc

[C#] public new ScrollableControl.Dock.PaddingEdges DockPadding {get;}

[C++] public: _property ScrollableControl.DockPaddingEdges* get_DockPadding( );

[VB] Public ReadOnly Property DockPadding As Scroll able Control.DockPaddingEdges

[JScript] public function get DockPadding( ) ScrollableControl.DockPaddingEdges;

Description vvv) Document
www) WndProc

[C#] public PrintDocument Document {get; set;}

[C++] public: _property PrintDocument* get_Document( ); public: _property void set_Document(PrintDocument*);

[VB] Public Property Document As PrintDocument

[JScript] public function get Document( ): PrintDocument; public function set Document(PrintDocument);

Description

Gets or sets the document to preview.

This property is equivalent to System.Windows.Forms.PrintPreviewControl.Document.

xx) Enabled
yyy) WndProc

[C#] public new bool Enabled {get; set;}

[C++] public: _property bool get_Enabled( ); public: _property void set_Enabled(bool);

[VB] Public Property Enabled As Boolean

[JScript] public function get Enabled( ): Boolean; public function set Enabled(Boolean);

Description

Get or sets a value indicating whether the control is enabled.

zzz) Events
aaaa) Focused
bbbb) Font
cccc) WndProc

Description

Retrieves the current font for this control. This will be the font used by default for painting and text in the control.

dddd) FontHeight
eeee) ForeColor
ffff) WndProc

Description

The foreground color of the control.

gggg) FormBorderStyle hhhh) WndProc

[C#] public new FormBorderStyle FormBorderStyle {get; set;}

[C++] public: _property FormBorderStyle get FormBorderStyle( ); public: _property void set_FormBorderStyle(FormBorderStyle);

[VB] Public Property FormBorderStyle As FormBorderStyle

[JScript] public function get FormBorderStyle( ): FormBorderStyle; public function set FormBorderStyle(FormBorderStyle);

Description

Gets or sets the border style of the form.

The border style of the form determines how the outer edge of the form appears. In addition to changing the border display for a form, certain border styles prevent the form from being sized. For example, the System.Windows.Forms. FormBorderStyle. FixedDialog border style changes the border of the form to that of a dialog box and prevents the form from being resized. The border style can also affect the size or availability of the caption bar section of a form.

iiii) Handle jjjj) HasChildren kkkk) Height llll) HelpButton mmmm) WndProc

Description

Gets or sets a value indicating whether a help button should be displayed in the caption box of the form.

When this property is set to true, a small button with a question mark appears in the caption bar to the left of the close button. You can use this button to display help for your application. You can create an event handler for the System.Windows.Forms.Control.HelpRequested event of the System. Windows.Forms.Control class to display help information to the user when the help button of the form is clicked.

nnnn) HScroll oooo) Icon pppp) WndProc

Description

Gets or sets the icon for the form.

A form's icon designates the picture that represents the form in the taskbar as well as the icon that is displayed for the control box of the form.

qqqq) ImeMode rrrr) WndProc

[C#] public new ImeMode ImeMode {get; set;}

[C++] public: _property ImeMode get_ImeMode( ); public: _property void set_ImeMode(ImeMode);

[VB] Public Property ImeMode As ImeMode

[JScript] public function get ImeMode( ): ImeMode; public function set ImeMode(ImeMode);

Description

Gets or sets the Input Method Editor(IME) mode supported by this control.

ssss) InvokeRequired tttt) IsAccessible uuuu) IsDisposed vvvv) IsHandleCreated wwww) IsMdiChild xxxx) IsMdiContainer yyyy) WndProc Description Gets or sets a value indicating whether the form is a container for multiple document interface (MDI) child forms.

This property changes the display and behavior of the form to an MDI parent form. When this property is set to true, the form displays a sunken client area with a raised border. All MDI child forms assigned to the parent form are displayed within its client area.

zzzz) IsRestrictedWindow aaaaa) KeyPreview bbbbb) WndProc

Description

Gets or sets a value indicating whether the form will receive key events before the event is passed to the control that has focus.

When this property is set to true, the form will receive all System.Windows.Forms.Control.KeyPress, System.Windows.Forms.Control.KeyDown, and System.Windows. Forms.Control.KeyUp events. After the form's event handlers have completed processing the keystroke, the keystroke is then assigned to the control with focus.

ccccc) Left ddddd) Location eeeee) WndProc

Description

Gets or sets the coordinates of the upper-left corner of the control relative to the upper-left corner of its container.

fffff) MaximizeBox ggggg) WndProc

[C#] public new bool MaximizeBox {get; set;}

[C++] public: _property bool get MaximizeBox( ); public: _property void set_MaximizeBox(bool);

[VB] Public Property MaximizeBox As Boolean

[JScript] public function get MaximizeBox( ): Boolean; public function set MaximizeBox(Boolean);

Description

Gets or sets a value indicating whether the maximize button is displayed in the caption bar of the form.

hhhhh) MaximizedBounds iiiii) MaximumSize jjjjj) WndProc

Description

Gets or sets the maximum size the form can be resized to.

This property enables you to limit the size of a form to a specified maximum size.

You can use this feature when displaying multiple windows at the same time, to ensure that a single window does not cause other windows to be hidden.

kkkkk) MdiChildren lllll) MdiParent mmmmm) Menu
nnnnn) WndProc

Description

Gets or sets the System.Windows.Forms.MainMenu that is displayed in the form.

You can use this property to switch between complete menu sets at run time.

For example, you can define one System.Windows.Forms. MainMenu to be displayed when your multiple document interface (MDI) form has no active MDI child forms and another System.Windows.Forms.MainMenu to display when a child window is displayed. You can also use a different System.Windows.Forms.MainMenu when specific conditions exist in your application that require displaying a different menu set.

ooooo) MergedMenu
ppppp) MinimizeBox
qqqqq) WndProc

Description

Gets or sets a value indicating whether the minimize button is displayed in the caption bar of the form.

A minimize button enables users to minimize a window to an icon. To display a minimize button, you must also set the form's FormBorderStyle property to either System.Windows.Forms. FormBorderStyle.FixedSingle, System.Windows.Forms. FormBorderStyle.Sizable, System.Windows. Forms. FormBorderStyle.Fixed3D, or System.Windows. Forms. FormBorderStyle. FixedDialog.

rrrrr) MinimumSize
sssss) WndProc

[C#] public new Size MinimumSize {get; set;}

[C++] public: _property Size get MinimumSize( ); public: _property void set_MinimumSize(Size);

[VB] Public Property MinimumSize As Size

[JScript] public function get MinimumSize( ): Size; public function set MinimumSize(Size);

Description

Gets the minimum size the form can be resized to.

This property enables you to limit the size of a form to a specified minimum size. You can use this feature to prevent a user from sizing a window to an undesirable size.

ttttt) Modal
uuuuu) Name
vvvvv) Opacity
wwwww) WndProc

Description

Opacity does not apply to PrintPreviewDialogs.

xxxxx) OwnedForms
yyyyy) Owner
zzzzz) Parent
aaaaaa) ParentForm
bbbbbb) PrintPreviewControl
cccccc) WndProc Description Gets a value indicating the System.Windows.Forms.PrintPreviewControl contained in this form.

dddddd)ProductName
eeeeee)Product Version
ffffff) RecreatingHandle
gggggg)Region
hhhhhh) RenderRightToLeft
iiiiii) ResizeRedraw
jjjjjj) Right
kkkkkk)RightToLeft
llllll) WndProc Description This is used for international applications where the language is written from RightToLeft. When this property is true, control placement and text will be from right to left.

mmmmmm)ShowFocusCues
nnnnnn) ShowInTaskbar
oooooo) WndProc

Description

Gets or sets a value indicating whether the form is displayed in the Windows taskbar.

If a form is parented within another form, the parented form is not displayed in the Windows taskbar.

pppppp) ShowKeyboardCues
qqqqqq) Site
rrrrrr) Size
ssssss) WndProc

Description

Gets or sets the size of the form.

This property allows you to set both the height and width of the form at the same time instead of setting the System.Windows.Forms.Control.Height and System.Windows.Forms. Control.Width properties individually. If you want to set the size and location of a form, you can use the System.Windows. Forms.Form.DesktopBounds property to size and locate the form based on desktop coordinates or use the System.Windows.Forms.Control.Bounds property of the System.Windows.Forms.Control class to set the size and location of the form based on screen coordinates.

tttttt) SizeGripStyle
uuuuuu)WndProc

[C#] public new SizeGripStyle SizeGripStyle {get; set;}

[C++] public: _property SizeGripStyle get_SizeGripStyle( ); public: _property void set_SizeGripStyle(SizeGripStyle);

[VB] Public Property SizeGripStyle As SizeGripStyle

[JScript] public function get SizeGripStyle( ): SizeGripStyle; public function set SizeGripStyle(SizeGripStyle);

Description vvvvvv) StartPosition
wwwwww) WndProc

[C#] public new FormStartPosition StartPosition {get; set;}

[C++] public: _property FormStartPosition get_StartPosition( ); public: _property void set_StartPosition(FormStartPosition);

[VB] Public Property StartPosition As FormStartPosition

[JScript] public function get StartPosition( ): FormStartPosition; public function set StartPosition(FormStartPosition);

Description

Gets or sets the starting position of the form at run time.

This property enables you to set the starting position of the form when it is displayed at run time. The form can be displayed manually or in the default location specified by Windows. You can also position the form to display in the center of the screen or in the center of its parent form for forms such as multiple document interface (MDI) child forms.

xxxxxx)TabIndex
yyyyyy) TabStop
zzzzzz) WndProc

Description

Gets or sets a value indicating whether the user can give the focus to this control using the TAB key.

aaaaaaa) Tag
bbbbbbb) WndProc

[C#] public new object Tag {get; set;}

[C++] public: _property Object* get Tag( ); public: _property void set_Tag(Object*);

[VB] Public Property Tag As Object

[JScript] public function get Tag( ): Object; public function set Tag(Object);

Description

Gets or sets the object that contains data about the control.

Retrieves or assigns the data currently associated with the tree node. Any System.Object derived type can be assigned to this property. If this property is being set through the Windows Forms designer, only text can be assigned.

ccccccc)Text
ddddddd)WndProc

[C#] public override string Text {get; set;}

[C++] public: _property virtual String* get_Text( ); public: _property virtual void set_Text(String*);

[VB] Overrides Public Property Text As String

[JScript] public function get Text( ): String; public function set Text(String);

Description

The current text associated with this control.

eeeeeee) Top
fffffff) TopLevel
ggggggg) TopLevelControl
hhhhhhh) TopMost
iiiiiii) WndProc Description Gets or sets a value indicating whether the form should be displayed as the top-most form of your application.

A top-most form is a form that overlaps all the other forms even if it is not the active or foreground form. Top-most forms are always displayed at the highest point in the Z-order of an application. You can use this method to create a form that is always displayed in your application, such as a Find and Replace tool window.

jjjjjjj) TransparencyKey
kkkkkkk) WndProc

[C#] public new Color TransparencyKey {get; set;}

[C++] public: _property Color get_TransparencyKey( ); public: _property void set_TransparencyKey(Color);

[VB] Public Property TransparencyKey As Color

[JScript] public function get TransparencyKey( ): Color; public function set TransparencyKey(Color);

Description

Gets or sets the color that will represent transparent areas of the form.

When the System.Windows.Forms.Form.TransparencyKey property is assigned a System.Drawing.Color, the areas of the form that have the same System.Windows.Forms.Control.BackColor will be displayed transparently. Any mouse actions, such as the click of the mouse, that are performed on the transparent areas of the form will be transferred to the windows below the transparent area. For example, if the client region of a form is made transparent, clicking the mouse on that area would send the event notification of the click to any window that is below it. If the color assigned to the System.Windows.Forms.Form.TransparencyKey property is the same as any controls on the form, they also will be displayed transparently. For example, if you have a System.Windows.Forms.Button control on a form that has its System.Windows.Forms.Form.TransparencyKey property set to SystemColors.Control, the control will be displayed transparently unless the System.Windows.Forms.Control.BackColor property of the System.Windows.Forms.Button control is changed to a different color.

lllllll) UseAntiAlias
mmmmmmm)WndProc

[C#] public bool UseAntiAlias {get; set;}

[C++] public: _property bool get_UseAntiAlias( ); public: _property void set_UseAntiAlias(bool);

[VB] Public Property UseAntiAlias As Boolean

[JScript] public function get UseAntiAlias( ): Boolean; public function set UseAntiAlias(Boolean);

Description

Gets or sets a value indicating whether to use anti-aliasing when displaying the print preview.

nnnnnnn) Visible
ooooooo) WndProc

[C#] public new bool Visible {get; set;}

[C++] public: _property bool get_Visible( ); public: _property void set_Visible(bool);

[VB] Public Property Visible As Boolean

[JScript] public function get Visible( ): Boolean; public function set Visible(Boolean);

Description

Gets or sets a value indicating whether the control is visible.

ppppppp) VScroll
qqqqqqq) Width
rrrrrrr) WindowState
sssssss) WndProc

Description

Gets or sets the form's window state.

Before a form is displayed, the System.Windows.Forms.Form.WindowState property is always set to FormWindowState.Normal, regardless of its initial setting. This is reflected in the System.Windows.Forms.Control.Height, System.Windows.Forms.Control. Left, System.Windows.Forms.Control.Top, and System.Windows.Forms.Control.Width property settings. If a form is hidden after it has been shown, these properties reflect the previous state until the form is shown again, regardless of any changes made to the System.Windows.Forms.Form.WindowState property.

ttttttt) WindowTarget uuuuuuu) CreateHandle

[C#] protected override void CreateHandle( );

[C++] protected: void CreateHandle( );

[VB] Overrides Protected Sub CreateHandle( )

[JScript] protected override function CreateHandle( );

Description

Creates the handle for the form that encapsulates the System.Windows.Forms.PrintPreviewDialog.

For more information on System.Windows.Forms.PrintPreviewDialog.CreateHandle see the System.Windows.Forms.Control.CreateHandle method.

vvvvvvv) OnClosing

[C#] protected override void OnClosing(CancelEventArgs e);

[C++] protected: void OnClosing(CancelEventArgs* e);

[VB] Overrides Protected Sub OnClosing(ByVal e As CancelEventArgs)

[JScript] protected override function OnClosing(e: CancelEventArgs);

Description

Forces the preview to be regenerated every time the dialog comes up Forces the preview to be regenerated every time the dialog comes up ProgressBar class (System.Windows.Forms)

a) WndProc

Description

Represents a Windows progress bar control.

A System.Windows.Forms.ProgressBar control visually indicates the progress of a lengthy operation. The System.Windows.Forms.ProgressBar control displays a bar that fills in from left to right with the system highlight color as an operation progresses. The System.Windows.Forms.ProgressBar control is typically used when an application performs tasks such as a file copy operation or when printing a number of documents. Users of an application might consider an application unresponsive when a long task is in progress if there is no visual cue. By using the System.Windows.Forms.ProgressBar in your application, you alert the user that the application is performing a lengthy task and that the application is still responding.

b) ProgressBar

Example Syntax:

c) WndProc

[C#] public ProgressBar( );

[C++] public: ProgressBar( );

[VB] Public Sub New( )

[JScript] public function ProgressBar( );

Description

Initializes a new instance of the System.Windows.Forms.ProgressBar class.

By default, the System.Windows.Forms.ProgressBar.Minimum property is set to 0, the System.Windows.Forms.ProgressBar.Maximum property is set to 100, and the System.Windows.Forms.ProgressBar.Step property is set to 10.

d) AccessibilityObject e) AccessibleDefaultActionDescription f) AccessibleDescription g) AccessibleName h) AccessibleRole i) AllowDrop j) WndProc Description k) Anchor l) BackColor m) WndProc Description Gets or sets the background color of the control.

n) BackgroundImage o) WndProc

[C#] public override Image BackgroundImage {get; set;}

[C++] public: _property virtual Image* get_BackgroundImage( ); public: _property virtual void set_BackgroundImage (Image*);

[VB] Overrides Public Property BackgroundImage As Image

[JScript] public function get BackgroundImage( ): Image; public function set BackgroundImage(Image);

Description p) BindingContext q) Bottom r) Bounds s) CanFocus t) CanSelect u) Capture v) CausesValidation w) WndProc Description x) ClientRectangle y) ClientSize z) CompanyName aa) Container bb) ContainsFocus cc) ContextMenu dd) Controls ee) Created ff) CreateParams gg) WndProc Description This is called when creating a window. Inheriting classes can override this to add extra functionality, but should not forget to first call base.getCreateParams( ) to make sure the control continues to work correctly.

hh) Cursor ii) DataBindings jj) DefaultImeMode kk) WndProc

Description

Gets the default Input Method Editor (IME) mode supported by this control.

As implemented in the System.Windows.Forms.ProgressBar class, this property always returns the System.Windows.Forms.ImeMode.Disable value.

ll) DefaultSize mm) WndProc

[C#] protected override Size DefaultSize {get;}

[C++] protected: property virtual Size get_DefaultSize( );

[VB] Overrides Protected ReadOnly Property DefaultSize As Size

[JScript] protected function get DefaultSize( ): Size;

Description

Gets the default size of the control.
nn) DesignMode
oo) DisplayRectangle
pp) Disposing
qq) Dock
rr) Enabled
ss) Events
tt) Focused
uu) Font
vv) WndProc Description Gets or sets the font of text in the System.Windows.Forms.ProgressBar.
ww) FontHeight
xx) ForeColor
yy) WndProc Description Gets or sets the foreground color of the control.
zz) Handle
aaa) HasChildren
bbb) Height
ccc) ImeMode
ddd) WndProc Description Gets or sets the Input Method Editor (IME) mode supported by this control.
eee) InvokeRequired
fff) IsAccessible
ggg) IsDisposed
hhh) IsHandleCreated
iii) Left
jjj) Location
kkk) Maximum
lll) WndProc Description Gets or sets the maximum value of the range of the control.

This property specifies the upper limit of the System.Windows.Forms.ProgressBar.Value property. When the value of the System.Windows.Forms.ProgressBar.Maximum property is changed, the System.Windows.Forms.ProgressBar control is redrawn to reflect the new range of the control. When the value of the System.Windows.Forms.ProgressBar.Value property is equal to the value of the System.Windows.Forms.ProgressBar.Maximum property, the progress bar is completely filled.
mmm) Minimum
nnn) WndProc

[C#] public int Minimum {get; set;}

[C++] public: _property int get_Minimum( ); public: _property void set_Minimum(int);

[VB] Public Property Minimum As Integer

[JScript] public function get Minimum( ): int; public function set Minimum(int);

Description

Gets or sets the minimum value of the range of the control.

This property specifies the lower limit of the System.Windows.Forms.ProgressBar.Value property. When the value of the System.Windows.Forms.ProgressBar.Minimum property is changed, the System.Windows.Forms.ProgressBar control is redrawn to reflect the new range of the control. When the value of the System.Windows.Forms.ProgressBar.Value property is equal to the value of the System.Windows.Forms.ProgressBar.Minimum property, the progress bar is empty. To change the value of the progress bar, use the System.Windows.Forms.ProgressBar.Step property with the System.Windows.Forms.ProgressBar.PerformStep method, use the System.Windows.Forms.ProgressBar.Increment(System.Int32) method, or set the value of the System.Windows.Forms.ProgressBar.Value property directly.
ooo) Name
ppp) Parent
qqq) ProductName
rrr) ProductVersion
sss) RecreatingHandle
ttt) Region
uuu) RenderRightToLeft
vvv) ResizeRedraw
www) Right
xxx) RightToLeft
yyy) WndProc Description
zzz) ShowFocusCues
aaaa) ShowKeyboardCues
bbbb) Site
cccc) Size
dddd) Step
eeee) WndProc Description Gets or sets the amount by which a call to the System.Windows.Forms.ProgressBar.PerformStep method increases the current position of the progress bar You can use the System.Windows.Forms.ProgressBar.Step property to specify the amount that each completed task in an operation changes the value of the progress bar. For example, if you are copying a group of files, you may want to set the value of the System.Windows.Forms.ProgressBar.Step property to and the value of the System.Windows.Forms.ProgressBar.Maximum property to the total number of files to copy. When each file is copied, you can call the System.Windows.Forms.ProgressBar.PerformStep method to increment the progress bar by the value of the System.Windows.Forms.ProgressBar.Step property. If you want to have more flexible control of the value of the progress bar, you can use the System.Windows.Forms.ProgressBar.Increment(System.Int32) method or set the value of the System.Windows.Forms. ProgressBar.Value property directly.
ffff) TabIndex
gggg) TabStop
hhhh) WndProc Description
iiii) Tag
jjjj) Text
kkkk) WndProc Description llll) Top mmmm) TopLevelControl nnnn) Value oooo) WndProc Description Gets or sets the current position of the progress bar.

The minimum and maximum values of the System.Windows.Forms.ProgressBar.Value property are specified by the System.Windows.Forms.ProgressBar.Minimum and System.Windows.Forms.ProgressBar.Maximum properties. This property enables you to increment or decrement the value of the progress bar directly. To perform consistent increases in the value of the System.Windows.Forms.ProgressBar control you can use the System.Windows.Forms.ProgressBar.Step property with the System.Windows.Forms.ProgressBar.PerformStep method. To increase the progress bar value by varying amounts, use the System.Windows.Forms.ProgressBar.Increment(System.Int32) method.

pppp) Visible qqqq) Width rrrr) WindowTarget ssss) WndProc tttt) WndProc uuuu) WndProc vvvv) WndProc wwww) WndProc xxxx) WndProc yyyy) CreateHandle

[C#] protected override void CreateHandle( );

[C++] protected: void CreateHandle( );

[VB] Overrides Protected Sub CreateHandle( )

[JScript] protected override function CreateHandle( );

Description zzzz) Increment

[C#] public void Increment(int value);

[C++] public: void Increment(int value);

[VB] Public Sub Increment(ByVal value As Integer)

[JScript] public function Increment(value: int);

Description

Advances the current position of the progress bar by the specified amount.

The System.Windows.Forms.ProgressBar.Increment(System. Int32) method enables you to increment the value of the progress bar by a specific amount. This method of incrementing the progress bar is similar to using the System.Windows.Forms.ProgressBar.Step property with the System.Windows.Forms.ProgressBar.PerformStep method. The System.Windows.Forms.ProgressBar.Value property specifies the current position of the System.Windows.Forms.ProgressBar. If, after calling the System.Windows.Forms.ProgressBar.Increment (System.Int32) method, the new value is greater than the value of the System.Windows.Forms.ProgressBar.Maximum property, the value is reset to the value of the System.Windows.Forms.ProgressBar.Minimum property. The specified amount by which to increment the progress bar's current position.

aaaaa) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

Overridden to set up our properties.

bbbbb) PerformStep

[C#] public void PerformStep( );

[C++] public: void PerformStep( );

[VB] Public Sub PerformStep( )

[JScript] public function PerformStep( );

Description

Advances the current position of the progress bar by the amount of the System.Windows.Forms.ProgressBar.Step property.

The System.Windows.Forms.ProgressBar.Increment(System. Int32) method increments the value of the progress bar by the amount specified by the Step property. You can use the System.Windows.Forms.ProgressBar.Step property to specify the amount that each completed task in an operation changes the value of the progress bar. For example, if you are copying a group of files, you may want to set the value of the System.Windows.Forms.ProgressBar.Step property to and the value of the System.Windows.Forms.ProgressBar.Maximum property to the total number of files to copy. When each file is copied, you can call the System.Windows.Forms.ProgressBar.PerformStep method to increment the progress bar by the value of the System.Windows.Forms.ProgressBar.Step property. If you want to have more flexible control of the value of the progress bar, you can use the System.Windows.Forms.ProgressBar.Increment(System. Int32) method or set the value of the System.Windows.Forms. ProgressBar.Value property directly.

ccccc) ToString

[C#] public override string ToString( );

[C++] public: String* ToString( );

[VB] Overrides Public Function ToString( ) As String

[JScript] public override unction ToString( ) : String;

Description

Returns a string representation for this control.

Return Value: String Returns a string representation for this control.

PropertyGrid class (System.Windows.Forms)

a) WndProc

Description

Provides a user interface for browsing the properties of an object.

To use the property grid, you create a new instance of the System.Windows.Forms.PropertyGrid class on a parent control and set System.Windows.Forms.PropertyGrid. SelectedObject to the object to display the properties for.

b) PropertyGrid
Example Syntax:
c) WndProc

[C#] public PropertyGrid( );

[C++] public: PropertyGrid( );

[VB] Public Sub New( )

[JScript] public function PropertyGrid( );

Description

Initializes a new instance of the System.Windows.Forms.PropertyGrid class.

To populate the grid, you must set the System.Windows.Forms.PropertyGrid.SelectedObject property.

d) AccessibilityObject
e) AccessibleDefaultActionDescription
f) AccessibleDescription
g) AccessibleName
h) AccessibleRole
i) ActiveControl
j) AllowDrop
k) Anchor
l) AutoScroll
m) AutoScrollMargin
n) AutoScrollMinSize
o) AutoScrollPosition
p) BackColor
q) WndProc Description r) BackgroundImage
s) WndProc

[C#] public override Image BackgroundImage {get; set;}

[C++] public: _property virtual Image* get_BackgroundImage( ); public: _property virtual void set_BackgroundImage (Image*);

[VB] Overrides Public Property BackgroundImage As Image

[JScript] public function get BackgroundImage( ): Image; public function set BackgroundImage(Image);

Description t) BindingContext
u) Bottom
V) Bounds
w) BrowsableAttributes
x) WndProc Description Gets or sets the browsable attributes associated with the object that the property grid is attached to.

Assigning an attribute collection that is empty or is null causes a new System.ComponentModel.AttributeCollection to be created with System.ComponentModel.BrowsableAttribute.Yes set.

y) CanFocus
z) CanSelect
aa) CanShowCommands
bb) WndProc

Description

Gets a value indicating whether the commands pane can be made visible for the currently selected objects.

This property is true if System.Windows.Forms.PropertyGrid.CommandsVisibleIfAvailable is true and the object has commands available.

cc) Capture
dd) CausesValidation
ee) ClientRectangle
ff) ClientSize
gg) CommandsBackColor
hh) WndProc Description Gets or sets the background color of the hot commands region.

ii) CommandsForeColor
jj) WndProc

[C#] public Color CommandsForeColor {get; set;}

[C++] public: _property Color get CommandsForeColor( ); public: _property void set_CommandsForeColor(Color);

[VB] Public Property CommandsForeColor As Color

[JScript] public function get CommandsForeColor( ): Color; public function set CommandsForeColor(Color);

Description

Gets or sets the foreground color for the hot commands region.

kk) CommandsVisible
ll) WndProc

[C#] public virtual bool CommandsVisible {get;}

[C++] public: _property virtual bool get_Commands Visible( );

[VB] Overridable Public ReadOnly Property CommandsVisible As Boolean

[JScript] public function get CommandsVisible( ): Boolean;

Description

Gets a value indicating whether the commands pane is visible.

This property is true if the selected object has commands available and the System Windows.Forms.PropertyGrid.CommandsVisibleIfAvailable property is true mm) CommandsVisibleIfAvailable
nn) WndProc

[C#] public virtual bool CommandsVisibleIfAvailable {get; set;}

[C++] public: _property virtual bool get_CommandsVisibleIfAvailable( ); public: _property virtual void set_CommandsVisibleIfAvailable(bool);

[VB] Overridable Public Property CommandsVisibleIfAvailable As Boolean

[JScript] public function get CommandsVisibleIf Available( ): Boolean; public function set CommandsVisibleIfAvailable(Boolean);

Description

Gets a value indicating whether the commands pane is visible for objects that expose verbs.

oo) CompanyName
pp) Container
qq) ContainsFocus
rr) ContextMenu ss) ContextMenuDefaultLocation
tt) WndProc Description Gets the default location for the context menu.

The context menu location is the center of the active property label in the grid. You can use this information to position the context menu when the menu is invoked using the keyboard.

uu) Controls
vv) WndProc

[C#] public new Control.ControlCollection Controls {get;}

[C++] public: _property Control.ControlCollection* get_Controls( );

[VB] Public ReadOnly Property Controls As Control.ControlCollection

[JScript] public function get Controls( ): Control.ControlCollection;

Description

Collection of child controls.

ww) Created
xx) CreateParams
yy) Cursor
zz) DataBindings
aaa) DefaultImeMode
bbb) DefaultSize
ccc) WndProc Description ddd) DefaultTabType
eee) WndProc

[C#] protected virtual Type DefaultTabType {get;}

[C++] protected: _property virtual Type* get_DefaultTabType( );

[VB] Overridable Protected ReadOnly Property DefaultTabType As Type

[JScript] protected function get DefaultTabType( ): Type;

Description

Gets the type of the default tab.

The default implementation of this property returns System.Windows.Forms.Design.PropertyTab.

fff) DesignMode
ggg) DisplayRectangle
hhh) Disposing
iii) Dock
jjj) DockPadding
kkk) DrawFlatToolbar
lll) WndProc
mmm) Enabled
nnn) Events
ooo) Focused
ppp) Font
qqq) FontHeight
rrr) ForeColor
sss) WndProc Description ttt) Handle
uuu) HasChildren
vvv) Height
www) HelpBackColor
xxx) WndProc Description Gets or sets the background color for the Help region.

yyy) HelpForeColor
zzz) WndProc

[C#] public Color HelpForeColor {get; set;}

[C++] public: _property Color get HelpForeColor( ); public: _property void set_HelpForeColor(Color);

[VB] Public Property HelpForeColor As Color

[JScript] public function get HelpForeColor( ): Color; public function set HelpForeColor(Color);

Description

Gets or sets the foreground color for the Help region.

aaaa) HelpVisible
bbbb) WndProc

[C#] public virtual bool HelpVisible {get; set;}

[C++] public: _property virtual bool get_HelpVisible( ); public: _property virtual void set_HelpVisible(bool);

[VB] Overridable Public Property HelpVisible As Boolean

[JScript] public function get HelpVisible( ): Boolean; public function set HelpVisible(Boolean);

Description

Gets or sets a value indicating whether the Help text is visible.

This method allows the display of any available help text associated with the selected property in the grid.

cccc) HScroll
dddd) ImeMode
eeee) InvokeRequired
ffff) IsAccessible
gggg) IsDisposed
hhhh) IsHandleCreated
iiii) LargeButtons
jjjj) WndProc Description Gets or sets a value indicating whether buttons appear in standard size or in large size.

You can use this property to enhance accessibility. Large buttons are 32 by 32 pixels rather than the standard by pixels.

kkkk) Left
llll) LineColor
mmmm)WndProc

Description

Gets or sets the color of the gridlines and borders.

nnnn) Location
oooo) Name
pppp) Parent
qqqq) ParentForm
rrrr) ProductName
ssss) ProductVersion
tttt) PropertySort
uuuu) WndProc Description Gets or sets the type of sorting the System.Windows.Forms.PropertyGrid uses to display properties.

When you set the System.Windows.Forms.PropertyGrid.PropertySort property, the appearance of the property sort buttons on the grid changes change to reflect the current state of the of the property.

vvvv) PropertyTabs wwww) WndProc

[C#] public PropertyGrid.PropertyTabCollection PropertyTabs {get;}

[C++] public: _property PropertyGrid.PropertyTabCollection* get_PropertyTabs( );

[VB] Public ReadOnly Property PropertyTabs As PropertyGrid.PropertyTabCollection

[JScript] public function get PropertyTabs( ) PropertyGrid.PropertyTabCollection;

Description

Gets a new collection of property tabs.

xxxx) RecreatingHandle yyyy) Region zzzz) RenderRightToLeft aaaaa) ResizeRedraw bbbbb) Right ccccc) RightToLeft ddddd) SelectedGridItem eeeee) WndProc Description Gets or sets the selected grid item.

Each System.Windows.Forms.GridItem corresponds to a property of the System.Windows.Forms.PropertyGrid.SelectedObject.

fffff) SelectedObject ggggg) WndProc

[C#] public object SelectedObject {get; set;}

[C++] public: _property Object* get_SelectedObject( ); public: _property void set_SelectedObject(Object*);

[VB] Public Property SelectedObject As Object

[JScript] public function get SelectedObject( ): Object; public function set SelectedObject(Object);

Description

Gets or sets the object for which the grid displays properties.

The System.Windows.Forms.PropertyGrid.SelectedObject property sets a single object into the grid to be browsed. If multiple objects are being browsed, this property returns the first one in the list. If no objects are selected, null is returned.

hhhhh) SelectedObjects iiiii) WndProc

[C#] public object[ ] SelectedObjects {get; set;}

[C++] public: _property Object* get_SelectedObjects( ); public: _property void set_SelectedObjects(Object* _gc[ ]);

[VB] Public Property SelectedObjects As Object( )

[JScript] public function get SelectedObjects( ): Object[ ]; public function set SelectedObjects(Object[ ]);

Description

Gets or sets the currently selected objects.

The System.Windows.Forms.PropertyGrid only displays the properties that are common to all the objects that are in the array. Assigning an array to the System.Windows.Forms.PropertyGrid.SelectedObjects replaces the reference to any System.Windows.Forms.PropertyGrid.SelectedObject you might might make.

jjjjj) SelectedTab kkkkk) WndProc

[C#] public PropertyTab SelectedTab {get;}

[C++] pubic: _property PropertyTab* get_SelectedTab( );

[VB] Public ReadOnly Property SelectedTab As PropertyTab

[JScript] public function get SelectedTab( ): PropertyTab;

Description

Gets the currently selected tab.

lllll) ShowFocusCues mmmmm)WndProc

[C#] protected override bool ShowFocusCues {get;}

[C++] protected: Property virtual bool get_ShowFocusCues( );

[VB] Overrides Protected ReadOnly Property ShowFocusCues As Boolean

[JScript] protected function get ShowFocusCues( ): Boolean;

Description nnnnn) ShowKeyboardCues ooooo) Site ppppp) WndProc

Description qqqqq) Size rrrrr) TabIndex sssss) TabStop ttttt) Tag uuuuu)Text vvvvv) Toolbar Visible wwwww)WndProc Description Gets or sets a value indicating whether the toolbar is visible.

xxxxx) Top yyyyy) TopLevelControl zzzzz) ViewBackColor aaaaaa) WndProc

Description

Gets or sets a value indicating the background color in the grid.

bbbbbb) ViewForeColor cccccc) WndProc

[C#] public Color ViewForeColor {get; set;}

[C++] public: _property Color get_ViewForeColor( ); public: _property void set_ViewForeColor(Color);

[VB] Public Property ViewForeColor As Color

[JScript] public function get ViewForeColor( ): Color; public function set ViewForeColor(Color);

Description

Gets or sets a value indicating the color of the text in the grid.

dddddd) Visible eeeeee) VScroll ffffff) Width gggggg)WindowTarget hhhhhh)WndProc Description Occurs when the sort mode is changed.

For more information about handling events, see.

iiiiii) WndProc

[C#] public event PropertyTabChangedEventHandler PropertyTabChanged;

[C++] public: _event PropertyTabChangedEventHandler* PropertyTabChanged;

[VB] Public Event PropertyTabChanged As PropertyTabChangedEventHandler

Description

Occurs when a property tab changes.

For more information about handling events, see.

jjjjjj) WndProc

[C#] public event PropertyValueChangedEventHandler PropertyValueChanged;

[C++] public: _event PropertyValueChangedEventHandler* PropertyValueChanged;

[VB] Public Event PropertyValueChanged As PropertyValueChangedEventHandler

Description

Occurs when a property value changes.

For more information about handling events, see.

kkkkkk) WndProc

Description

Occurs when the selected System.Windows.Forms.GridItem is changed.

For more information about handling events, see.

llllll) WndProc

[C#] public event EventHandler SelectedObjectsChanged;

[C++] public: _event EventHandler* SelectedObjectsChanged;

[VB] Public Event SelectedObjectsChanged As EventHandler

Description

Occurs when the objects selected by the System.Windows.Forms.PropertyGrid.SelectedObjects property have changed.

For more information about handling events, see.

mmmmmm) CollapseAllGridItems

[C#] public void CollapseAllGridItems( );

[C++] public: void CollapseAllGridItems( );

[VB] Public Sub CollapseAllGridItems( )

[JScript] public function CollapseAllGridItems( );

Description

Collapses all the categories in the System.Windows.Forms.PropertyGrid.

The method collapses the categories in the grid. Those categories that have grid items in the category have a plus sign (+) displayed next to that category.

nnnnnn) CreatePropertyTab

[C#] protected virtual PropertyTab CreatePropertyTab(Type tabType);

[C++] protected: virtual PropertyTab* CreatePropertyTab (Type* tabType);

[VB] Overridable Protected Function CreatePropertyTab (ByVal tabType As Type) As PropertyTab

[JScript] protected function CreatePropertyTab(tabType: Type): PropertyTab;

Description

When overridden in a derived class, allows for the creation of a System.Windows.Forms.Design.PropertyTab.

Return Value: The newly created property tab. Returns null in its default implementation.

See System.Windows.Forms.Design.PropertyTab for more information on creating property tabs. The type of tab to create.

oooooo)Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the resources (other than memory) used by the System.Windows.Forms.PropertyGrid.

Call System.Windows.Forms.PropertyGrid.Dispose (System. Boolean) when you are finished using the System.Windows.Forms.PropertyGrid. The System.Windows.Forms.PropertyGrid.Dispose(System.Boolean) method leaves the System.Windows.Forms.PropertyGrid in an unusable state. After calling System.Windows.Forms.PropertyGrid.Dispose (System.Boolean), you must release all references to the System.Windows.Forms.PropertyGrid so the memory it was occupying can be reclaimed by garbage collection.

pppppp) ExpandAllGridItems

[C#] public void ExpandAllGridItems( );

[C++] public: void ExpandAllGridItems( );

[VB] Public Sub ExpandAllGridItems( )

[JScript] public function ExpandAllGridItems( );

Description

Expands all the categories in the System.Windows.Forms.PropertyGrid.

qqqqqq) OnComComponentNameChanged

[C#] protected void OnComComponentNameChanged (ComponentRenameEventArgs e);

[C++] protected: void OnComComponentNameChanged (ComponentRenameEventArgs* e);

[VB] Protected Sub OnComComponentNameChanged(ByVal e As ComponentRenameEventArgs)

[JScript] protected function OnComComponentName Changed(e: ComponentRenameEventArgs);

Description

Raises the ComComponentNameChanged event.

Raising an event invokes the event handler through a delegate. For more information, see. A System.ComponentModel.Design.ComponentRenameEventArgs that contains the event data.

rrrrrr) OnFontChanged

[C#] protected override void OnFontChanged(EventArgs e);

[C++] protected: void OnFontChanged(EventArgs* e);

[VB] Overrides Protected Sub OnFontChanged(ByVal e As EventArgs)

[JScript] protected override function OnFontChanged(e: EventArgs);

Description ssssss) On GotFocus

[C#] protected override void OnGotFocus(EventArgs e);

[C++] protected: void OnGotFocus(EventArgs* e);

[VB] Overrides Protected Sub OnGotFocus(ByVal e As EventArgs)

[JScript] protected override function OnGotFocus(e: Event Args);

Description

Raises the GotFocus event.

Raising an event invokes the event handler through a delegate. For more information, see.

tttttt) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

Raises the HandleCreated event.

Raising an event invokes the event handler through a delegate. For more information, see.

uuuuuu)OnHandleDestroyed

[C#] protected override void OnHandleDestroyed(EventArgs e);

[C++] protected: void OnHandleDestroyed(EventArgs* e);

[VB] Overrides Protected Sub OnHandleDestroyed(ByVal e As EventArgs)

[JScript] protected override function OnHandleDestroyed(e: EventArgs);

Description vvvvvv) OnMouseDown

[C#] protected override void OnMouseDown(MouseEvent Args me);

[C++] protected: void OnMouseDown(MouseEventArgs* me);

[VB] Overrides Protected Sub OnMouseDown(ByVal me As MouseEventArgs)

[JScript] protected override function OnMouseDown(me: MouseEventArgs);

Description

Raises the System.Windows.Forms.Control.MouseDown event.

Raising an event invokes the event handler through a delegate. For more information, see. A System.Windows.Forms.Mouse EventArgs that contains the event data.

wwwwww) OnMouseMove

[C#] protected override void OnMouseMove(MouseEvent Args me);

[C++] protected: void OfMouseMove(MouseEventArgs* me);

[VB] Overrides Protected Sub OnMouseMove(ByVal me As MouseEventArgs)

[JScript] protected override function OnMouseMove(me: MouseEventArgs);

Description

Raises the System.Windows.Forms.Control.MouseMove event.

Raising an event invokes the event handler through a delegate. For more information, see. A System.Windows.Forms.Mouse EventArgs that contains the event data.

xxxxxx) OnMouseUp

[C#] protected override void OnMouseUp(MouseEventArgs me);

[C++] protected: void OnMouseUp(MouseEventArgs* me);

[VB] Overrides Protected Sub OnMouseUp(ByVal me As MouseEventArgs)

[JScript] protected override function OnMouseUp(me: Mouse EventArgs);

DescriptionRaises the System.Windows.Forms.Control.MouseUp event.

Raising an event invokes the event handler through a delegate. For more information, see. A System.Windows.Forms.Mouse EventArgs that contains the event data.

yyyyyy) OnNootifyPropertyValueUIItemsChanged

[C#] protected void OnNotifyPropertyValueUIItems Changed(object sender, EventArgs e);

[C++] protected: void OnNotifyPropertyValueUIItems Changed(Object* sender, EventArgs* e);

[VB] Protected Sub OnNotifyPropertyValueUIItems Changed(ByVal sender As Object, ByVal e As EventArgs)

[JScript] protected function OnNotifyPropertyValueUIItems Changed(sender: Object, e: EventArgs);

Description

Raises the NotifyPropertyValueUIItemsChanged event.

Raising an event invokes the event handler through a delegate. For more information, see. The source of the event. A System.EventArgs that contains the event data.

zzzzzz) OnPaint

[C#] protected override void OnPaint(PaintEventArgs pevent);

[C++] protected: void OnPaint(PaintEventArgs* pevent);

[VB] Overrides Protected Sub OnPaint(ByVal pevent As PaintEventArgs)

[JScript] protected override function OnPaint(pevent: PaintEventArgs);

Description

Raises the Paint event.

Raising an event invokes the event handler through a delegate. For more information, see.

aaaaaaa)OnPropertyTabchanged

[C#] protected virtual void OnPropertyTabChanged(PropertyTabChangedEventArgs e);

[C++] protected: virtual void OnPropertyTabChanged(PropertyTabChangedEventArgs* e);

[VB] Overridable Protected Sub OnPropertyTabChanged (ByVal e As PropertyTabChangedEventArgs)

[JScript] protected function OnPropertyTabChanged(e: PropertyTabChangedEventArgs);

Description

Raises the System.Windows.Forms.PropertyGrid. PropertyTabChanged event.

Raising an event invokes the event handler through a delegate. For more information, see. A System.Windows.Forms.PropertyTabChangedEventArgs that contains the event data.

bbbbbbb) OnPropertyValueChanged

[C#] protected virtual void OnPropertyValueChanged(PropertyValueChangedEventArgs e);

[C++] protected: virtual void OnPropertyValueChanged (PropertyValueChangedEventArgs* e);

[VB] Overridable Protected Sub OnPropertyValueChanged (ByVal e As PropertyValueChangedEventArgs)

[JScript] protected function OnPropertyValueChanged(e: PropertyValueChangedEventArgs);

Description

Raises the System.Windows.Forms.PropertyGrid. PropertyValueChanged event.

Raising an event invokes the event handler through a delegate. For more information, see. A System.Windows.Forms.PropertyValueChangedEventArgs that contains the event data.

ccccccc) OnResize

[C#] protected override void OnResize(EventArgs e);

[C++] protected: void OnResize(EventArgs* e);

[VB] Overrides Protected Sub OnResize(ByVal e As Event Args)

[JScript] protected override function OnResize(e: Event Args);

Description

Raises the OnResize event.

Raising an event invokes the event handler through a delegate. For more information, see.

ddddddd) OnSelectedGridItemChanged

[C#] protected virtual void OnSelectedGridItemChanged (SelectedGridItemChangedEventArgs e);

[C++] protected: virtual void OnSelectedGridItemChanged (SelectedGridItemChangedEventArgs* e);

[VB] Overridable Protected Sub OnSelectedGridItemChanged(ByVal e As SelectedGridItemChangedEventArgs)

[JScript] protected function OnSelectedGridItemChanged(e: SelectedGridItemChangedEventArgs);

Description

Raises the System.Windows.Forms.PropertyGrid.SelectedGridItemChanged event.

Raising an event invokes the event handler through a delegate. For more information, see. A System.Windows.Forms.SelectedGridItemChangedEventArgs that contains the event data.

eeeeeee) OnSelectedObjectsChanged

[C#] protected virtual void OnSelectedObjectsChanged (EventArgs e);

[C++] protected: virtual void OnSelectedObjectsChanged (EventArgs* e);

[VB] Overridable Protected Sub OnSelectedObjectsChanged (ByVal e As EventArgs)

[JScript] protected function OnSelectedObjectsChanged(e: EventArgs); Description Raises the System.Windows.Forms.PropertyGrid.SelectedObjectsChanged event.

Raising an event invokes the event handler through a delegate. For more information, see. An System.EventArgs that contains the event data.

fffffff) OnSystemColorsChanged

[C#] protected override void OnSystemColorsChanged (EventArgs e);

[C++] protected: void OnSystemColorsChanged(Event Args* e);

[VB] Overrides Protected Sub OnSystemColorsChanged (ByVal e As EventArgs)

[JScript] protected override function OnSystemColors Changed(e: EventArgs);

Description ggggggg) On VisibleChanged

[C#] protected override void OnVisibleChanged(EventArgs e);

[C++] protected: void OnVisibleChanged(EventArgs* e)

[VB] Overrides Protected Sub OnVisibleChanged(ByVal e As EventArgs)

[JScript] protected override function OnVisibleChanged(e: EventArgs);

Description

Raises the VisibleChanged event.

Raising an event invokes the event handler through a delegate. For more information, see.

hhhhhhh) ProcessDialogKey

[C#] protected override bool ProcessDialogKey(Keys keyData);

[C++] protected: bool ProcessDialogKey(Keys keyData);

[VB] Overrides Protected Function ProcessDialogKey(ByVal keyData As Keys) As Boolean

[JScript] protected override function ProcessDialogKey(keyData: Keys): Boolean;

Description

This is a test.

iiiiii) Refresh

[C#] public override void Refresh( );

[C++] public: void Refresh( );

[VB] Overrides Public Sub Refresh( )

[JScript] public override function Refresh( );

Description jjjjjj) Refresh Tabs

[C#] public void RefreshTabs(PropertyTabScope tabScope);

[C++] public: void RefreshTabs(PropertyTabScope tabScope);

[VB] Public Sub RefreshTabs(ByVal tabScope As PropertyTabScope)

[JScript] public function RefreshTabs(tabScope: PropertyTabScope);

Description

Refreshes the property tabs of the specified scope.

The System.Windows.Forms.PropertyGrid.RefreshTabs (System.ComponentModel.PropertyTabScope) method first deletes the property tabs of the specified scope, it then requires the objects and documents to rebuild the tabs. Either System.ComponentModel.PropertyTabScope.Component or System.ComponentModel.PropertyTabScope.Document.

kkkkkkk) ResetSelectedProperty

[C#] public void ResetSelectedProperty( );

[C++] public: void ResetSelectedProperty( );

[VB] Public Sub ResetSelectedProperty( )

[JScript] public function ResetSelectedProperty( );

Description

Resets the selected property to its default value.

Typically, the System.Windows.Forms.PropertyGrid.ResetSelectedProperty method is invoked by right clicking on the property. This method discards changes and attempts to reset the property to its default value.

lllllll) ScaleCore

[C#] protected override void ScaleCore(float dx, float dy);

[C++] protected: void ScaleCore(float dx, float dy);

[VB] Overrides Protected Sub ScaleCore(ByVal dx As Single, ByVal dy As Single)

[JScript] protected override function ScaleCore(dx: float, dy: float);

Description mmmmmmm) ShowEventsButton

[C#] protected void ShowEventsButton(bool value);

[C++] protected: void ShowEventsButton(bool value);

[VB] Protected Sub ShowEventsButton(ByVal value As Boolean)

[JScript] protected function ShowEventsButton(value: Boolean);

Description nnnnnnn) IComPropertyBrowser.DropDownDone

[C#] void IComPropertyBrowser.DropDownDone( );

[C++] void IComPropertyBrowser::DropDownDone( );

[VB] Sub DropDownDone( ) Implements IComPropertyBrowser.DropDownDone

[JScript] function IComPropertyBrowser.DropDown Done( );

ooooooo) IComPropertyBrowser.EnsurePendingChangesCommitted

[C++] bool IComPropertyBrowser::EnsurePendingChangesCommitted( );

[VB] Function EnsurePendingChangesCommitted( ) As Boolean Implements IComPropertyBrowser.EnsurePendingChangesCommitted

[JScript] function IComPropertyBrowser.EnsurePendingChangesCommitted( ): Boolean;

ppppppp)IComPropertyBrowser.HandleF4

[C#] void IComPropertyBrowser.HandleF4( );

[C++] void IComPropertyBrowser::HandleF4( );

[VB] Sub HandleF4( ) Implements IComPropertyBrowser. HandleF4

[JScript] function IComPropertyBrowser.HandleF4( );

qqqqqqq) IComPropertyBrowser.LoadState

[C#] void IComPropertyBrowser.LoadState(RegistryKey optRoot);

[C++] void IComPropertyBrowser::LoadState(RegistryKey* optRoot);

[VB] Sub LoadState(ByVal optRoot As RegistryKey) Implements IComPropertyBrowser.LoadState

[JScript] function IComPropertyBrowser.LoadState(opt Root: RegistryKey);

rrrrrrr) IComPropertyBrowser.SaveState

[C#] void IComPropertyBrowser.SaveState(RegistryKey optRoot);

[C++] void IComPropertyBrowser::SaveState(RegistryKey* optRoot);

[VB] Sub SaveState(ByVal optRoot As RegistryKey) Implements IComPropertyBrowser.SaveState

[JScript] function IComPropertyBrowser.SaveState(opt Root: RegistryKey);

sssssss) UnsafeNativeMethods.IPropertyNotify Sink On Changed

[C#] void UnsafeNativeMethods.IPropertyNotifySink.OnChanged(int dispID);

[C++] void UnsafeNativeMethods::IPropertyNotifySink::OnChanged(int dispID);

[VB] Sub IPropertyNotifySink.OnChanged(ByVal dispID As Integer) Implements UnsafeNativeMethods.IPropertyNotifySink.OnChanged

[JScript] function UnsafeNativeMethods.IPropertyNotifySink.OnChanged(dispID: int);

ttttttt) UnsafeNativeMethods.IPropertyNotifySink.OnRequestEdit

[C#] int UnsafeNativeMethods.IPropertyNotifySink.OnRequestEdit(int dispID);

[C++] int UnsafeNativeMethods::IPropertyNotifySink::OnRequestEdit(inti dispID);

[VB] Function IPropertyNotifySink.OnRequestEdit(ByVal dispID As Integer) As Integer Implements UnsafeNativeMethods.IPropertyNotifySink.OnRequestEdit

[JScript] function UnsafeNativeMethods.IPropertyNotifySink.OnRequestEdit(dispID: int): int;

uuuuuuu) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

PropertyManager class (System.Windows.Forms)

a) WndProc

Description

Maintains a System.Windows.Forms.Binding between an object's property and a data-bound control property.

The System.Windows.Forms.PropertyManager inherits from the System.Windows.Forms.BindingManagerBase, and it is used to maintain the current property of an object, rather than the property of a current object in a list. For this reason, trying to set the System.Windows.Forms.BindingManagerBase.Position or System.Windows.Forms.BindingManagerBase.Count property for a System.Windows.Forms.PropertyManager has no effect. Similarly, the System.Windows.Forms.BindingManagerBase.AddNew and System.Windows.Forms.BindingManagerBase.RemoveAt(System.Int32) methods are not supported because there is no underlying list of data to add to or delete from.

b) PropertyManager

Example Syntax:

c) WndProe

Description

Initializes a new instance of the System.Windows.Forms.PropertyManager class.

d) Bindings e) Count f) WndProc

Description g) Current h) WndProc

[C#] public override object Current {get;}

[C++] public: _property virtual Object* get_Current( );

[VB] Overrides Public ReadOnly Property Current As Object

[JScript] public function get Current( ): Object;

Description

Gets the object to which the data-bound property belongs.

The System.Windows.Forms.PropertyManager.Current property returns the data source of a data-bound relationship.

i) Position j) WndProc

[C#] public override int Position {get; set;}

[C++] public: _property virtual int get_Position( ); public: _property virtual void set_Position(int);

[VB] Overrides Public Property Position As Integer

[JScript] public function get Position( ): int; public function set Position(int);

Description k) AddNew

[C#] public override void AddNew( );

[C++] public: void AddNew( );

[VB] Overrides Public Sub AddNew( )

[JScript] public override function AddNew( );

Description

Adds a new row.

l) CancelCurrentEdit

[C#] public override void CancelCurrentEdit( );

[C++] public: void CancelCurrentEdit( );

[VB] Overrides Public Sub CancelCurrentEdit( )

[JScript] public override function CancelCurrentEdit( );

Description

Cancels the ccurrent System.Windows.Forms.Binding between a data binding and a data-bound property.

m) EndCurrentEdit

[C#] public override void EndCurrentEdit( );

[C++] public: void EndCurrentEdit( );

[VB] Overrides Public Sub EndCurrentEdit( )

[JScript] public override function EndCurrentEdit( );

Description

Ends the ccurrent System.Windows.Forms.Binding between a data binding and a data-bound property.

n) GetItemProperties

[C#] public override PropertyDescriptorCollection GetItemProperties( );

[C++] public: PropertyDescriptorCollection* GetItemProperties( );

[VB] Overrides Public Function GetItemProperties( ) As PropertyDescriptorCollection

[JScript] public override function GetItemProperties( ) PropertyDescriptorCollection;

Description

Gets the property descriptors for the managed object.

Return Value: A PropertyDescriptorCollection containing the PropertyDescriptor objects for the managed object.

o) GetListName

[C+] protected internal override string GetListName(ArrayList listAccessors);

[C++] protected public: String* GetListName(ArrayList* listAccessors);

[VB] Overrides Protected Friend Dim Function GetListName (ByVal listAccessors As ArrayList) As String

[JScript] package override function GetListName(listAccessors: ArrayList): String;

Description

Gets the name of the underlying data list.

p) OnCurrentChanged

[C#] protected internal override void OnCurrentChanged (EventArgs ea);

[C++] protected public: void OnCurrentChanged(Event Args* ea);

[VB] Overrides Protected Friend Dim Sub OnCurrentChanged(ByVal ea As EventArgs)

[JScript] package override function OnCurrentChanged(ea: EventArgs);

Description

Raises the System.Windows.Forms.BindingManagerBase.CurrentChanged event.

q) RemoveAt

[C#] public override void RemoveAt(int index);

[C++] public: void RemoveAt(int index);

[VB] Overrides Public Sub RemoveAt(ByVal index As Integer)

[JScript] public override function RemoveAt(index: int);

Description

Deletes a specifed row.

r) ResumeBinding

[C#] public override void ResumeBinding( );

[C++] public: void ResumeBinding( );

[VB] Overrides Public Sub ResumeBinding( )

[JScript] public override function ResumeBinding( );

Description

Resumnes the data binding between an data source and a data-bound property.

s) SuspendBinding

[C#] public override void SuspendBinding( );

[C++] public: void SuspendBinding( );

[VB] Overrides Public Sub SuspendBinding( )

[JScript] public override function SuspendBinding( );

Description

Suspends the data binding between an data source and a data-bound property. System.Windows.Forms.PropertyManager.SuspendBinding and System.Windows.Forms.PropertyManager.ResumeBinding are two methods that allow the temporary suspension and resumption of data binding. You typically suspend data binding if the user must be allowed to make several edits to data fields before validation occurs. For example, if one field must be changed in accordance with a second, but where validating the first field would cause the second field to be in error.

t) UpdateIsBinding

[C#] protected override void UpdateIsBinding( );

[C++] protected: void UpdateIsBinding( );

[VB] Overrides Protected Sub UpdateIsBinding( )

[JScript] protected override function UpdateIsBinding( );

Description

Updates the ccurrent System.Windows.Forms.Binding between a data binding and a data-bound property.

PropertySort enumeration (System.Windows.Forms)

a) UpdateIsBinding

Description

Specifies how properties are sorted in the System.Windows.Forms.PropertyGrid.

Use the members of this enumeration to set the value of the System.Windows.Forms.PropertyGrid.PropertySort property of the System.Windows.Forms.PropertyGrid.

b) UpdateIsBinding

[C#] public const PropertySort Alphabetical;

[C++] public: const PropertySort Alphabetical;

[VB] Public Const Alphabetical As PropertySort

[JScript] public var Alphabetical: PropertySort;

Description

Properties are sorted in an alphabetical list.

c) UpdateIsBinding

[C#] public const PropertySort Categorized;

[C++] public: const PropertySort Categorized;

[VB] Public Const Categorized As PropertySort

[JScript] public var Categorized A PropertySort;

Description

Properties are displayed according to their category in a group. The categories are defined by the properties themselves.

d) UpdateIsBinding

[C#] public const PropertySort CategorizedAlphabetical;

[C++] public: const PropertySort CategorizedAlphabetical;

[VB] Public Const CategorizedAlphabetical As PropertySort

[JScript] public var CategorizedAlphabetical: PropertySort;

Description

Properties are displayed according to their category in a group. The properties are further sorted alphabetically within the group. The categories are defined by the properties themselves.

e) UpdateIsBinding

[C#] public const PropertySort NoSort;

[C++] public: const PropertySort NoSort;

[VB] Public Const No Sort As PropertySort

[JScript] public var NoSort: PropertySort;

Description

Properties are displayed in the order in which they are retrieved from the System.ComponentModel.TypeDescriptor.

PropertyTabChangedEventArgs class (System.Windows.Forms)

a) ToString

Description

Provides data for the System.Windows.Forms.PropertyGrid.PropertyTabchanged event of a System.Windows.Forms.PropertyGrid.

The System.Windows.Forms.PropertyGrid. PropertyTab-Changed event occurs when the user selects a new property tab in the System.Windows.Forms.PropertyGrid.

b) PropertyTabChangedEventArgs

Example Syntax:

c) ToString

[C#] public PropertyTabChangedEventArgs(PropertyTab oldTab, PropertyTab newTab);

[C++] public: PropertyTabChangedEventArgs(PropertyTab* oldTab, PropertyTab* newTab);

[VB] Public Sub New(ByVal oldTab As PropertyTab, ByVal newTab As PropertyTab)

[JScript] public function PropertyTabChangedEventArgs (oldTab: PropertyTab, newTab PropertyTab);

Description

Initializes a new instance of the System.Windows.Forms. PropertyTabChangedEventArgs class. The Previously selected property tab. The newly selected property tab.

d) NewTab e) ToString

[C#] public PropertyTab NewTab {get;}

[C++] public: _property PropertyTab* get_NewTab( );

[VB] Public ReadOnly Property NewTab As PropertyTab

[JScript] public function get NewTab( ): PropertyTab;

Description

Gets the new System.Windows.Forms.Design.PropertyTab selected.

f) OldTab g) ToString

[C#] public PropertyTab OldTab {get;}

[C++] public: _property PropertyTab* get_OldTab( );

[VB] Public ReadOnly Property OldTab As PropertyTab

[JScript] public function get OldTab( ): PropertyTab;

Description

Gets the old System.Windows.Forms.Design.PropertyTab selected.

PropertyTabChangedEventHandler delegate (System. Windows.Forms)

a) ToString

Description

Represents the method that will handle the System.Windows. Forms. PropertyGrid.PropertyTabChanged event of a System.Windows.Forms.PropertyGrid. The source of the event. A System.Windows.Forms.PropertyTabChangedEventArgs that contains the event data.

When you create a System.Windows.Forms.PropertyTabChangedEventHandler delegate, you identify the method that will handle the event. To associate the event with your event handler, add an instance of the delegate to the event. The event handler is called whenever the event occurs, unless you remove the delegate.

PropertyGrid.PropertyTabCollection class (System.Windows.Forms)

a) ToString

Description

Contains a collection of System.Windows.Forms.Design. PropertyTab objects.

b) Count c) ToString

[C#] public int Count {get;}

[C++] public: _property int get_Count( );

[VB] Public ReadOnly Property Count As Integer

[JScript] public function get Count( ): int;

Description

Gets the number of property tabs in the collection.

d) Item e) ToString

[C#] public PropertyTab this[int index] {get;}

[C++] public: _property PropertyTab* get_Item(int index);

[VB] Public Default ReadOnly Property Item(ByVal index As Integer) As PropertyTab

[JScript] returnValue=PropertyTabCollectionObject.Item (index);

Description

Gets the System.Windows.Forms.Design.PropertyTab at the specified index. The index of the System.Windows.Forms. Design.PropertyTab to return.

f) AddTabType

[C#] public void AddTabType(Type propertyTabType);

[C++] public: void AddTabType(Type* propertyTabType);

[VB] Public Sub AddTabType(ByVal propertyTabType As Type)

[JScript] public function AddTabType(propertyTabType: Type); Adds a property tab to the collection.

Description

Adds a property tab of the specified type to the collection.

The property tab is added to the collection with a scope of System.ComponentModel.PropertyTabScope.Global. The property tab type to add to the grid.

g) AddTabType

[C#] public void AddTabType(Type propertyTabType, PropertyTabScope tabScope);

[C++] public: void AddTabType(Type* propertyTabType, PropertyTabScope tabScope);

[VB] Public Sub AddTabType(ByVal propertyTabType As Type, ByVal tabScope As PropertyTabScope)

[JScript] public function AddTabType(propertyTabType: Type, tabScope: PropertyTabScope);

Description

Adds a property tab of the specified type and with the specified scope to the collection. The property tab type to add to the grid. One of the System.ComponentModel.PropertyTabScope values.

h) Clear

[C++] public void Clear(PropertyTabScope tabscope);

[C++] public: void Clear(PropertyTabScope tabscope);

[VB] Public Sub Clear(ByVal tabScope As PropertyTabScope)

[JScript] public function Clear(tabScope: PropertyTabScope);

Description

Removes all the property tabs of the specified scope from the collection.

This method clears the tabs of the specified scope or smaller. The tabscope parameter must be System.ComponentModel.PropertyTabScope.Component or System.ComponentModel.PropertyTabScope.Document. The scope of the tabs to clear.

i) GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumeration of all the property tabs in the collection.

Return Value: An System.Collections.IEnumerator for the System.Windows.Forms.PropertyGrid.PropertyTabCollection.

This method creates an enumerator that contains a snapshot of the collection. You can change the collection by changing the enumerator; however, multiple enumerators can simultaneously access the same collection. Changing the collection (either directly or through another enumerator) can cause System.Collections.IEnumerator.Current or System.Collections.IEnumerator.MoveNext to throw an exception.

j) RemoveTabType

[C#] public void RemoveTabType(Type propertyTabType);

[C++] public: void RemoveTabType(Type* propertyTabType);

[VB] Public Sub RemoveTabType(ByVal propertyTabType As Type)

[JScript] public function RemoveTabType(propertyTabType: Type);

Description

Removes the specified tab type from the collection.

Removing the tab from the collection removes it from the property grid. The tab type to remove from the collection.

k) ICollection.CopyTo

[C#] void ICollection.CopyTo(Array dest, int index);

[C++] void ICollection::CopyTo(Array* dest, int index);

[VB] Sub CopyTo(ByVal dest As Array, ByVal index As Integer) Implements ICollection.CopyTo

[JScript] function ICollection.CopyTo(dest: Array, index: int);

PropertyValueChangedEventArgs class (System.Windows.Forms)

a) ToString

Description

Provides data for the System.Windows.Forms.PropertyGrid.PropertyValueChanged event of a System.Windows.Forms.PropertyGrid.

The System.Windows.Forms.PropertyGrid.Property ValueChanged event occurs when the user changes the value of a property, which is specified as a System.Windows.Forms.GridItem, in a System.Windows.Forms. PropertyGrid.

b) PropertyValueChangedEventArgs

Example Syntax:

c) ToString

[C#] public PropertyValueChangedEventArgs(GridItem changedItem, object oldValue);

[C++] public: PropertyValueChangedEventArgs(GridItem* changedItem, Object* oldValue);

[VB] Public Sub New(ByVal changedItem As GridItem, ByVal oldValue As Object)

[JScript] public function PropertyValueChangedEventArgs (changedItem GridItem, oldValue Object);

Description

Initializes a new instance of the System.Windows.Forms.PropertyValueChangedEventArgs class. The item in the grid that changed. The old property value.

d) ChangedItem e) ToString

[C#] public GridItem ChangedItem {get;}

[C++] public: _property GridItem* get_ChangedItem( );

[VB] Public ReadOnly Property ChangedItem As GridItem

[JScript] public function get ChangedItem( ): GridItem;

Description

Gets the System.Windows.Forms.GridItem that was changed.

f) OldValue g) ToString

[C#] public object OldValue {get;}

[C++] public: _property Object* get_OldValue( );

[VB] Public ReadOnly Property OldValue As Object

[JScript] public function get OldValue( ): Object;

Description

The value of the grid item before it was changed.

This property provides you with the value of the property as it was before the change was applied. You can find the new value by querying the property grid with the specified System.Windows.Forms.PropertyValueChanged EventArgs. ChangedItem.

PropertyValueChangedEventHandler delegate (System. Windows.Forms)

a) ToString

Description

The event handler class that is invoked when a property in the grid is modified by the user.

QueryAccessibilityHelpEventArgs class (System.Windows.Forms)

a) ToString

Description

Provides data for the System.Windows.Forms.Control.QueryAccessibilityHelp event.

b) QueryAccessibilityHelpEventArgs

Example Syntax:

c) Tostring

[C#] public QueryAccessibilityHelpEventArgs( );

[C++] public: QueryAccessibilityHelpEventArgs( );

[VB] Public Sub New( )

[JScript] public function QueryAccessibilityHelpEvent Args( ); Initializes a new instance of the System.Windows.Forms.QueryAccessibilityHelpEventArgs class.

DescriptionInitializes a new instance of the System.Windows.Forms.QueryAccessibilityHelpEventArgs class.

d) QueryAccessibilityHelpEventArgs

Example Syntax:

e) ToString

[C#] public QueryAccessibilityHelpEventArgs(string helpNamespace, string helpString, string helpKeyword);

[C++] public: QueryAccessibilityHelpEventArgs(String* helpNamespace, String* helpString, String* helpKeyword);

[VB] Public Sub New(ByVal helpNamespace As String, ByVal helpString As String, ByVal helpKeyword As String)

[JScript] public function QueryAccessibilityHelpEventArgs (helpNamespace: String, helpString: String, helpKeyword: String);

Description

Initializes a new instance of the System.Windows.Forms.QueryAccessibilityHelpEventArgs class. The file containing Help for the System.Windows.Forms.AccessibleObject. The string defining what Help to get for the System.Windows.Forms.AccessibleObject. The keyword to associate with Help request for the System.Windows.Forms.AccessibleObject.

f) HelpKeyword g) ToString

[C#] public string HelpKeyword {get; set;}

[C++] public: _property String* get_HelpKeyword( ); public: _property void set_HelpKeyword(String*);

[VB] Public Property HelpKeyword As String

[JScript] public function get HelpKeyword( ): String; public function set HelpKeyword(String);

Description

Gets or sets the help keyword for the specified control.

h) HelpNamespace i) ToString

[C#] public string HelpNamespace {get; set;}

[C++] public: _property String* get_HelpNamespace( ); public: _property void set_HelpNamespace(String*);

[VB] Public Property HelpNamespace As String

[JScript] public function get HelpNamespace( ): String; public function set HelpNamespace(String);

Description

Gets or sets a value specifying the name of the help file.

j) HelpString k) ToString

[C#] public string HelpString {get; set;}

[C++] public: _property String* get_HelpString( ); public: _property void set_HelpString(String*);

[VB] Public Property HelpString As String

[JScript] public function get HelpString( ): String; public function set HelpString(String);

Description

Gets or sets the string defining what help to get for the System.Windows.Forms.AccessibleObject.

QueryAccessibilityHelpEventHandler delegate (System.Windows.Forms)

a) ToString

Description

Represents the method that will handle the QueryAccessibilityHelp event of an System.Windows.Forms.Accessibilityobject.

When you create a System.Windows.Forms.QueryAccessibilityHelpEventHandler delegate, you identify the method that will handle the event. To associate the event with your event handler, add an instance of the delegate to the event. The event handler is called whenever the event occurs, unless you remove the delegate. For more information about event handler delegates, see.

QueryContinueDragEventArgs class (System.Windows.Forms)

a) ToString

Description

Provides data for the System.Windows.Forms.Control.QueryContinueDrag event.

The System.Windows.Forms.Control.QueryContinueDrag event occurs during a drag-and-drop operation and allows the drag source to determine whether the drag-and-drop operation should be canceled. A System.Windows.Forms.QueryContinueDragEventArgs object specifies whether and how the drag-and-drop operation should proceed, whether any modifier keys are pressed, and whether the user has pressed the ESC key.

b) QueryContinueDragEventArgs

Example Syntax:

c) Tostring

[C#] public QueryContinueDragEventArgs(int keyState, bool escapePressed, DragAction action);

[C++] public: QueryContinueDragEventArgs(int keyState, bool escapePressed, DragAction action);

[VB] Public Sub New(ByVal keyState As Integer, ByVal escapePressed As Boolean, ByVal action As DragAction)

[JScript] public function QueryContinueDragEventArgs (keyState: int, escapePressed: Boolean, action: DragAction);

Description

Initializes a new instance of the System.Windows.Forms.QueryContinueDragEventArgs class. The current state of the SHIFT, CTRL, and ALT keys. true if the ESC key was pressed; otherwise, false. One of the System.Windows.Forms.DragAction values.

d) Action
e) ToString

[C#] public DragAction Action {get; set;}

[C++] public: _property DragAction get_Action( ); public: _property void set_Action(DragAction);

[VB] Public Property Action As DragAction

[JScript] public function get Action( ): DragAction; public function set Action(DragAction);

Description

Gets or sets the status of a drag-and-drop operation.
f) EscapePressed
g) ToString

[C#] public bool EscapePressed {get;}

[C++] public: _property bool get_EscapePressed( );

[VB] Public ReadOnly Property EscapePressed As Boolean

[JScript] public function get EscapePressed( ): Boolean;

Description

Gets whether the user pressed the ESC key.
h) KeyState
i) ToString

[C#] public int KeyState {get;}

[C++] public: _property int get_KeyState( );

[VB] Public ReadOnly Property KeyState As Integer

[JScript] public function get KeyState( ): int;

Description

Gets the current state of the SHIFT, CTRL, and ALT keys.
QueryContinueDragEventHandler delegate (System.Windows.Forms)
a) ToString Description Represents the method that will handle the System.Windows.Forms.Control.QueryContinueDrag event of a System.Windows.Forms.Control. The source of an event. A System.Windows.Forms.QueryContinueDragEventArgs that contains the event data.

When you create a System.Windows.Forms.QueryContinueDragEventHandler delegate, you identify the method that will handle the event. To associate the event with your event handler, add an instance of the delegate to the event. The event handler is called whenever the event occurs, unless you remove the delegate. For more information about handling events with delegates, see.
RadioButton class (System.Windows.Forms)
a) ToString Description Represents a Windows radio button.

The System.Windows.Forms.RadioButton control may display text, an System.Drawing.Image, or both.
b) RadioButton
Example Syntax:
c) ToString

[C#] public RadioButton( );

[C++] public: RadioButton( );

[VB] Public Sub New( )

[JScript] public function RadioButton( );

Description

Initializes a new instance of the System.Windows.Forms.RadioButton class.

The default view of the System.Windows.Forms.RadioButton has its text aligned to the right of the button and the System.Windows.Forms.RadioButton.AutoCheck property is set to true.
d) AccessibilityObject
e) AccessibleDefaultActionDescription
f) AccessibleDescription
g) AccessibleName
h) AccessibleRole
i) AllowDrop
j) Anchor
k) Appearance
l) Tostring Description Gets or set the value that determines the appearance of the radio button control.

If the System.Windows.Forms.RadioButton.Appearance value is set to Normal, then the System.Windows.Forms.RadioButton control is drawn with a circular check box. If the value is set to Appearance.Button, then the System.Windows.Forms.RadioButton control is drawn as a button that may be toggled to an up or down state. Either type may display text, an image, or both.
m) AutoCheck
n) ToString

[C#] public bool AutoCheck {get; set;}

[C++] public: _property bool get_AutoCheck( ); public: _property void set_AutoCheck(bool);

[VB] Public Property AutoCheck As Boolean

[JScript] public function get AutoCheck( ): Boolean; public function set AutoCheck(Boolean);

Description

Gets or sets a value indicating whether the System.Windows.Forms.RadioButton.Checked value and the appearance of the control automatically change when the control is clicked.

If the System.Windows.Forms.RadioButton.Checked value is set to false, the radio button portion of the control must be checked in code in the System.Windows.Forms.Control.Click event handler. In addition, if the System.Windows.Forms.RadioButton is part of a System.Windows.Forms.RadioButton control group, this property ensures that only one of the controls is checked at a given time.
o) BackColor
p) BackgroundImage
q) BindingContext
r) Bottom
s) Bounds
t) CanFocus
u) CanSelect
v) Capture
w) Causes Validation
x) CheckAlign
y) ToString Description Gets or sets the location of the check box portion of the radio button control.

z) Checked aa) ToString

[C#] public bool Checked {get; set;}

[C++] public: _property bool get_Checked( ); public: _property void set_Checked(bool);

[VB] Public Property Checked As Boolean

[JScript] public function get Checked( ): Boolean; public function set Checked(Boolean);

Description

Gets or sets a value indicating whether the control is checked.

bb) ClientRectangle cc) ClientSize dd) CompanyName ee) Container ff) ContainsFocus gg) ContextMenu hh) Controls ii) Created jj) CreateParams kk) ToString Description ll) Cursor mm) DataBindings nn) DefaultImeMode oo) DefaultSize pp) ToString Description Deriving classes can override this to configure a default size for their control. This is more efficient than setting the size in the control's constructor.

qq) DesignMode rr) DisplayRectangle ss) Disposing tt) Dock uu) Enabled vv) Events ww) FlatStyle xx) Focused yy) Font zz) FontHeight aaa) ForeColor bbb) Handle ccc) HasChildren ddd) Height eee) Image fff) ImageAlign ggg) ImageIndex hhh) ImageList iii) ImeMode jjj) InvokeRequired kkk) IsAccessible lll) IsDefault mmm) IsDisposed nnn) IsHandleCreated ooo) Left ppp) Location qqq) Name rrr) Parent sss) ProductName ttt) ProductVersion uuu) RecreatingHandle vvv) Region www) RenderRightToLeft xxx) ResizeRedraw yyy) Right zzz) RightToLeft aaaa) ShowFocusCues bbbb) ShowKeyboardCues cccc) Site dddd) Size eeee) TabIndex ffff) TabStop gggg) ToString Description Gets or sets a value indicating whether the user can give the focus to this control using the TAB key.

hhhh) Tag iiii) Text jjjj) TextAlign kkkk) ToString

Description

Gets or sets the alignment of the text on the radiobutton control.

llll) Top mmmm) TopLevelControl nnnn) Visible oooo) Width pppp) WindowTarget qqqq) ToString Description Occurs when the System.Windows.Forms.RadioButton.Appearance property value changes.

For more information about handling events, see.

rrrr) ToString

Description

Occurs when the value of the System.Windows.Forms.RadioButton.Checked property changes.

For more information about handling events, see.

ssss) CreateAccessibilityInstance

[C#] protected override AccessibleObject CreateAccessibilityInstance( );

[C++] protected: AccessibleObject* CreateAccessibilityInstance( );

[VB] Overrides Protected Function CreateAccessibilityInstance( ) As AccessibleObject

[JScript] protected override function CreateAccessibilityInstance( ): AccessibleObject;

Description

Constructs the new instance of the accessibility object for this control. Subclasses should not call base.CreateAccessibilityObject.

tttt) OnCheckedChanged

[C#] protected virtual void OnCheckedChanged(EventArgs e);

[C++] protected: virtual void OnCheckedChanged(EventArgs* e);

[VB] Overridable Protected Sub OnCheckedChanged(ByVal e As EventArgs)

[JScript] protected function OnCheckedChanged(e: EventArgs);

Description

Raises the System.Windows.Forms.CheckBox. CheckedChanged event.

Raising an event invokes the event handler through a delegate. For more information, see. An System.EventArgs that contains the event data.

uuuu) OnClick

[C#] protected override void OnClick(EventArgs e);

[C++] protected: void OnClick(EventArgs* e);

[VB] Overrides Protected Sub OnClick(ByVal e As EventArgs)

[JScript] protected override function OnClick(e: EventArgs);

Description

We override this to implement the autoCheck functionality.

vvvv) OnEnter

[C#] protected override void OnEnter(EventArgs e);

[C++] protected: void OnEnter(EventArgs* e);

[VB] Overrides Protected Sub OnEnter(ByVal e As EventArgs)

[JScript] protected override function OnEnter(e: EventArgs);

Description wwww) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description xxxx) OnMouseUp

[C#] protected override void OnMouseUp(MouseEventArgs mevent);

[C++] protected: void OnMouseUp(MouseEventArgs* mevent);

[VB] Overrides Protected Sub OnMouseUp(ByVal mevent As MouseEventArgs)

[JScript] protected override function OnMouseUp(mevent: MouseEventArgs);

Description

Raises the System.Windows.Forms. ButtonBase.OnMouseUp(System.Windows.Forms.MouseEventArgs) event.

Raising an event invokes the event handler through a delegate. For an overview, see XXX. A System.Windows.Forms.Mouse EventArgs that contains the event data.

yyyy) PerformClick

[C#] public void PerformClick( );

[C++] public: void PerformClick( );

[VB] Public Sub PerformClick( )

[JScript] public function PerformClick( );

Description

Generates a System.Windows.Forms.Control.Click event for the button, simulating a click by a user.

zzzz) ProcessMnemonic

[C#] protected override bool ProcessMnemonic(char charCode);

[C++] protected: bool ProcessMnemonic(_wchar_t charCode);

[VB] Overrides Protected Function ProcessMnemonic(ByVal charCode As Char) As Boolean

[JScript] protected override function ProcessMnemonic(charCode: Char): Boolean;

Description aaaaa) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

RadioButton.RadioButtonAccessibleObject class (System.Windows.Forms)

a) WndProc

Description b) RadioButton.RadioButtonAccessibleObject

Example Syntax:

c) WndProc

[C#] public RadioButton.RadioButtonAccessibleObject(RadioButton owner);

[C++] public: RadioButtonAccessibleObject(RadioButton* owner);

[VB] Public Sub New(ByVal owner As RadioButton)

[JScript] public function RadioButton.RadioButtonAccessibleObject(owner RadioButton);

Description d) Bounds e) DefaultAction f) WndProc

Description g) Description h) Handle i) Help j) KeyboardShortcut k) Name l) Owner m) Parent n) Role o) WndProc Description p) State q) WndProc

[C#] public override AccessibleStates State {get;}

[C++] public: _property virtual AccessibleStates get_State( );

[VB] Overrides Public ReadOnly Property State As AccessibleStates

[JScript] public function get State( ): AccessibleStates;

Description r) Value s) DoDefaultAction

[C#] public override void DoDefaultAction( );

[C++] public: void DoDefaultAction( );

[VB] Overrides Public Sub DoDefaultAction( )

[JScript] public override function DoDefaultAction( );

Description

RichTextBox class (System.Windows.Forms)

a) UseStdAccessibleObjects

Description

Represents a Windows rich text box control.

The System.Windows.Forms.RichTextBox control allows the user to enter and edit text while also providing more advanced formatting features than the standard System.Windows.Forms.TextBox control. Text can be assigned directly to the control, or can be loaded from a Rich Text Format (RTF) or plain text file. The text within the control can be assigned character and paragraph formatting.

b) Rich TextBox

Example Syntax:

c) UseStdAccessibleObjects

[C#] public RichTextBox( );

[C++] public: RichTextBox( );

[VB] Public Sub New( )

[JScript] public function RichTextBox( );

Description

Initializes a new instance of the System.Windows.Forms.RichTextBox class.

By default, the System.Windows.Forms.TextBoxBase. Multiline property of the control is set to true.

d) AcceptsTab e) AccessibilityObject f) AccessibleDefaultActionDescription g) AccessibleDescription h) AccessibleName i) AccessibleRole j) AllowDrop k) UseStdAccessibleObjects Description Gets or sets a value indicating whether the control will allow drag and drop operations.

l) Anchor m) AutoSize n) UseStdAccessibleObjects

Description

Gets or sets a value indicating whether the size of the System.Windows.Forms.RichTextBox automatically adjusts when the font assigned to the control is changed.

When this property is set to true, the System.Windows.Forms. RichTextBox resizes its height based on the size of the font assigned to the control. You can use this property to ensure that the user can read text assigned to the control regardless of the font.

o) AutoWordSelection p) UseStdAccessibleObjects

[C#] public bool AutoWordSelection {get; set;}

[C++] public: _property bool get AutoWordSelection( ); public: _property void set_AutoWordSelection(bool);

[VB] Public Property AutoWordSelection As Boolean

[JScript] public function get AutoWordSelection( ): Boolean; public function set AutoWordSelection(Boolean);

Description

Gets or sets a value indicating whether automatic word selection is enabled.

If this property is set to true, selecting any part of the text in the control results in the selection of the entire word. For example, if System.Windows.Forms.RichTextBox. AutoWordSelection is set to true, the user can double-click on any part of a word in the control and the entire word is selected automatically.

q) BackColor r) BackgroundImage s) UseStdAccessibleObjects

Description t) BindingContext u) BorderStyle v) Bottom w) Bounds x) BulletIndent y) UseStdAccessibleObjects Description Gets or sets the indentation used in the System.Windows.Forms.RichTextBox control when the bullet style is applied to the text.

To apply the bullet style to a paragraph of text, set the System.Windows.Forms.RichTextBox.SelectionBullet property to true and then set the System.Windows.Forms.RichTextBox.BulletIndent property to the number of pixels that the text should be indented. The paragraph will have the bullet style applied to it with the specified amount of indentation after the bullet. This property only affects the current paragraph within the control's text and the currently selected bullet in a list of bulleted items. To apply a different indentation level to an entire list of bulleted items, all of the text of the bulleted items must be selected before setting the System.Windows.Forms.RichTextBox.BulletIndent property.

z) CanFocus aa) CanRedo bb) UseStdAccessibleObjects

Description

Gets a value indicating whether there are actions that have occurred within the System.Windows.Forms.RichTextBox that can be reapplied.

You can use this property to determine whether the last operation undone in the System.Windows.Forms.RichTextBox can be reapplied using the System.Windows.Forms.RichTextBox. Redo method.

cc) CanSelect
dd) CanUndo
ee) Capture
ff) CausesValidation
gg) ClientRectangle
hh) ClientSize
ii) CompanyName
jj) Container
kk) ContainsFocus
ll) ContextMenu
mm) Controls
nn) Created
oo) CreateParams
pp) UseStdAccessibleObjects
qq) Cursor
rr) DataBindings
ss) DefaultImeMode
tt) DefaultSize
uu) UseStdAccessibleObjects Description vv) DesignMode
ww) DetectUrls
xx) UseStdAccessibleObjects Description Gets or sets a value indicating whether or not the System.Windows.Forms.RichTextBox will automatically format a Uniform Resource Locator (URL) when it is typed into the control.

If this property is set to true, any text entered into the control that is determined by the System.Windows.Forms.RichTextBox to be a URL is automatically formatted as a link. You can create an event handler for the System.Windows.Forms.RichTextBox.LinkClicked event to handle all links clicked in the control. The System.Windows.Forms.LinkClickedEventArgs that is provided to the event handler for the System.Windows.Forms.RichTextBox.LinkClicked event provides data that enables you to determine which link was clicked in the control in order to process the link.

yy) DisplayRectangle
zz) Disposing
aaa) Dock
bbb) Enabled
ccc) Events
ddd) Focused
eee) Font
fff) UseStdAccessibleObjects Description Gets or sets the font used when displaying text in the control.

ggg) FontHeight
hhh) ForeColor
iii) UseStdAccessibleObjects

Description

Gets or sets the font used when displaying text in the control.

jjj) Handle
kkk) HasChildren
lll) Height
mmm) HideSelection
nnn) ImeMode
ooo) InvokeRequired
ppp) IsAccessible
qqq) IsDisposed
rrr) IsHandleCreated
sss) Left
ttt) Lines
uuu) Location
vvv) MaxLength
www) UseStdAccessibleObjects Description xxx) Modified
yyy) Multiline
zzz) UseStdAccessibleObjects
aaaa) Name
bbbb) Parent
cccc) PreferredHeight
dddd) ProductName
eeee) ProductVersion
ffff) ReadOnly
gggg) RecreatingHandle
hhhh) RedoActionName
iiii) UseStdAccessibleObjects Description Gets the name of the action that can be reapplied to the control when the System.Windows.Forms.RichTextBox.Redo method is called.

If this property returns an empty string (" "), there is no operation available to reapply to the control. You can use this method to determine the last action undone in the System.Windows.Forms.RichTextBox control that can then be reapplied to the control when a call to the System.Windows.Forms. RichTextBox.Redo method is made. You can determine whether there are any operations to be reapplied to the control by using the System.Windows.Forms.RichTextBox.CanRedo property.

jjjj) Region
kkkk) RenderRightToLeft
llll) ResizeRedraw
mmmm) Right
nnnn) RightMargin
oooo) UseStdAccessibleObjects Description Gets or sets the size of a single line of text within the System.Windows.Forms.RichTextBox control.

When a value greater than zero is entered into the control, a nonvisible margin is placed in the control at the specified number of pixels from the left side of the control. Any text that is entered that extends beyond this margin is placed on the next line of text in the control. This property affects all text currently entered into the control as well as any additional text entered into the control after the property is set. You can use this property to specify a maximum line width for all text entered into a System.Windows.Forms.RichTextBox control.

pppp) RightToLeft
qqqq) Rtf
rrrr) UseStdAccessibleObjects

Description

Gets or sets the text of the System.Windows.Forms.RichTextBox control, including all Rich Text Format (RTF) codes.

You can use this property to place RTF formatted text into the control for display or to extract the text of the control with the specified RTF formatting defined in the text of the control. This property is typically used when you are assigning RTF text from another RTF source, such as Microsoft Word or Windows WordPad, to the control.

ssss) ScrollBars
tttt) UseStdAccessibleObjects

[C#] public RichTextBoxScrollBars ScrollBars {get; set;}

[C++] public: _property RichTextBoxScrollBars get_ScrollBars( ); public: _property void set_ScrollBars(RichTextBoxScrollBars);

[VB] Public Property ScrollBars As RichTextBoxScrollBars

[JScript] public function get ScrollBars( ): RichTextBoxScrollBars; public function set ScrollBars(RichTextBoxScrollBars);

Description

Gets or sets the type of scroll bars to display in the System.Windows.Forms.RichTextBox control.

This property enables you to provide horizontal and vertical scroll bars to the user of the System.Windows.Forms.RichTextBox control to enable scrolling text within the control that is outside of the physical dimensions of the control. You can also use this property to remove scroll bars from the control to restrict scrolling the contents of the control.

uuuu) SelectedRtf
vvvv) UseStdAccessibleObjects

[C#] public string SelectedRtf {get; set;}

[C++] public: _property String* get_SelectedRtf( ); public: _property void set_SelectedRtf(String*);

[VB] Public Property SelectedRtf As String

[JScript] public function get SelectedRtf( ): String; public function set SelectedRtf(String);

Description

Gets or sets the currently selected Rich Text Format (RTF) formatted text in the control.

This property enables you to obtain the selected text in the control, including the RTF formatting codes. You can use this property to copy text from your control, complete with formatting, and paste the text in other applications that accept RTF formatted text, such as Microsoft Word and Windows WordPad. To get the selected text, without RTF formatting codes, use the System.Windows.Forms.TextBoxBase.SelectedText property.

wwww) SelectedText
xxxx) UseStdAccessibleObjects

[C#] public override string SelectedText {get; set;}

[C++] public: _property virtual String* get_SelectedText( ); public: _property virtual void set_SelectedText(String*);

[VB] Overrides Public Property SelectedText As String

[JScript] public function get SelectedText( ): String; public function set SelectedText(String);

Description

Gets or sets the selected text within the System.Windows.Forms.RichTextBox.

yyyy) SelectionAlignment
zzzz) UseStdAccessibleObjects

[C#] public HorizontalAlignment SelectionAlignment {get; set;}

[C++] public: _property HorizontalAlignment get_SelectionAlignment( ); public: _property void set_SelectionAlignment(HorizontalAlignment);

[VB] Public Property SelectionAlignment As HorizontalAlignment

[JScript] public function get SelectionAlignment( ): HorizontalAlignment; public function set SelectionAlignment(HorizontalAlignment);

Description

Gets or sets the alignment to apply to the current selection or insertion point.

If no paragraph is selected in the control, setting this property applies the alignment setting to the paragraph in which the insertion point appears as well as to paragraphs created after the paragraph that has the alignment property setting. For example, if there are two paragraphs in a System.Windows.Forms.RichTextBox control and the insertion point is located within the second paragraph. If you set the System.Windows.Forms.RichTextBox.SelectionAlignment property to HorizontalAlignment.Center, the paragraph at the insertion point will be centered within the control. If a third paragraph is created after the second paragraph, it also is aligned to the center of the control.

aaaaa) SelectionBullet
bbbbb) UseStdAccessibleObjects

[C#] public bool SelectionBullet {get; set;}

[C++] public: _property bool get_SelectionBullet( ); public: _property void set_SelectionBullet(bool);

[VB] Public Property SelectionBullet As Boolean

[JScript] public function get SelectionBullet( ): Boolean; public function set SelectionBullet(Boolean);

Description

Gets or sets a value indicating whether the bullet style is applied to the current selection or insertion point.

If no text is selected, the bullet style is applied to the current insertion point and to all paragraphs that the user enters after the insertion point. The bullet style is applied to the text of the control until the insertion point is moved or when the user presses the Enter key on an empty bullet item.

ccccc) SelectionCharOffset
ddddd) UseStdAccessibleObjects

[C#] public int SelectionCharOffset {get; set;}

[C++] public: _property int get SelectionCharOffset( ); public: _property void set_SelectionCharOffset(int);

[VB] Public Property SelectionCharOffset As Integer

[JScript] public function get SelectionCharOffset( ): int; public function set SelectionCharOffset(int);

Description

Gets or sets whether text in the control appears on the baseline, as a superscript, or as a subscript below the baseline.

If this property is set to zero, the text appears on the baseline. If it is a positive number, the number specifies the number of pixels by which to raise the text selection above the baseline. If it is a negative number, this number specifies the number of pixels by which to subscript the text selection. You can use this property to specify text as superscript or subscript.

eeeee) SelectionColor
fffff) UseStdAccessibleObjects

[C#] public Color SelectionColor {get; set;}

[C++] public: _property Color get_SelectionColor( ); public: _property void set_SelectionColor(Color);

[VB] Public Property SelectionColor As Color

[JScript] public function get SelectionColor( ): Color; public function set SelectionColor(Color);

Description

Gets or sets the text color of the current text selection or insertion point.

If the current text selection has more than one color specified, this property returns Color.Empty. If no text is currently selected, the text color specified in this property is applied to the current insertion point and to all text that is typed into the control after the insertion point. The text color setting applies until the property is changed to a different color or until the insertion point is moved to a different section within the control.

ggggg) SelectionFont hhhhh) UseStdAccessibleObjects

[C#] public Font SelectionFont {get; set;}

[C++] public: _property Font* get_SelectionFont( ); public: _property void set_SelectionFont(Font*);

[VB] Public Property SelectionFont As Font

[JScript] public function get SelectionFont( ): Font; public function set

SelectionFont(Font);

Description

Gets or sets the font of the current text selection or insertion point.

If the current text selection has more than one font specified, this property is null. If no text is currently selected, the font specified in this property is applied to the current insertion point and to all text that is typed into the control after the insertion point. The font setting applies until the property is changed to a different font or until the insertion point is moved to a different section within the control.

iiiii) SelectionHangingIndent jjjjj) UseStdAccessibleObjects

[C#] public int SelectionHangingIndent {get; set;}

[C++] public: _property int get_SelectionHangingIndent( ); public: _property void set_SelectionHangingIndent(int);

[VB] Public Property SelectionHangingIndent As Integer

[JScript] public function get SelectionHangingIndent( ): int; public function set SelectionHangingIndent(int);

Description

Gets or sets the distance between the left edge of the first line of text in the selected paragraph and the left edge of subsequent lines in the same paragraph.

If no text is currently selected, the hanging indent is applied to the paragraph in which the insertion point appears and to all text that is typed into the control after the insertion point. The hanging indent setting applies until the property is changed to a different value or until the insertion point is moved to a different paragraph within the control.

kkkkk) SelectionIndent lllll) UseStdAccessibleObjects

[C#] public int SelectionIndent {get; set;}

[C++] public: _property int get_SelectionIndent( ); public: _property void set_SelectionIndent(int);

[VB] Public Property SelectionIndent As Integer

[JScript] public function get SelectionIndent( ): int; public function set SelectionIndent(int);

Description

Gets or sets the distance in pixels between the left edge of the System.Windows.Forms.RichTextBox and the left edge of the current text selection or text added after the insertion point.

If no text is currently selected, the indentation setting is applied to the paragraph in which the insertion point appears and to all text that is typed into the control after the insertion point. The indentation setting applies until the property is changed to a different value or until the insertion point is moved to a different paragraph within the control.

mmmmm) SelectionLength nnnnn) UseStdAccessibleObjects

[C#] public override int SelectionLength {get; set;}

[C++] public: _property virtual int get_SelectionLength( ); public: _property virtual void set_SelectionLength(int);

[VB] Overrides Public Property SelectionLength As Integer

[JScript] public function get SelectionLength( ): int; public function set SelectionLength(int);

Description

Gets or sets the number of characters selected in control.

You can use this property to determine if any characters are currently selected in the text box control before performing operations on the selected text. You can also use this property to determine the total number of characters (including spaces) that are selected when performing single character tasks in a for loop.

ooooo) SelectionProtected pppp) UseStdAccessibleObjects

[C#] public bool SelectionProtected {get; set;}

[C++] public: _property bool get_SelectionProtected( ); public: _property void set_SelectionProtected(bool);

[VB] Public Property SelectionProtected As Boolean

[JScript] public function get SelectionProtected( ): Boolean; public function set SelectionProtected(Boolean);

Description

Gets or sets a value indicating whether the current text selection is protected.

If no text is currently selected, the protection setting is applied to the paragraph in which the insertion point appears and to all text that is typed into the control after the insertion point. The protection setting applies until the property is changed to a different value or until the insertion point is moved to a different paragraph within the control.

qqqqq) SelectionRightIndent rrrrr) UseStdAccessibleObjects

[C#] public int SelectionRightIndent {get; set;}

[C++] public: _property int get_SelectionRightIndent( ); public: _property void set_SelectionRightIndent(int);

[VB] Public Property SelectionRightIndent As Integer

[JScript] public function get SelectionRightIndent( ): int; public function set SelectionRightIndent(int);

Description

The distance (in pixels) between the right edge of the RichTextBox control and the right edge of the text that is selected or added at the current insertion point.

If no text is currently selected, the indentation setting is applied to the paragraph in which the insertion point appears and to all text that is typed into the control after the insertion point. The indentation setting applies until the property is changed to a different value or until the insertion point is moved to a different paragraph within the control.

sssss) SelectionStart
ttttt) SelectionTabs
uuuuu) UseStdAccessibleObjects

Description

Gets or sets the absolute tab stop positions in a System.Windows.Forms.RichTextBox control.

This property enables you to obtain an array that contains the spacing for each tab in the current text selection within the System.Windows.Forms.RichTextBox control. You can then use this property to adjust the size of each tab within the text selection. For example, if you want to adjust the tab space within the document, you can select the entire document and obtain the list of tab spaces using the System.Windows. Forms. RichTextBox.SelectionTabs property. You can then adjust them to new values and reassign them to this property.

vvvvv) SelectionType
wwwww) UseStdAccessible Objects

[C#] public RichTextBoxSelectionTypes SelectionType {get;}

[C++] public: _property RichTextBoxSelectionTypes get_SelectionType( );

[VB] Public ReadOnly Property SelectionType As RichTextBoxSelectionTypes

[JScript] public function get SelectionType( ): RichTextBoxSelectionTypes;

Description

Gets the selection type within the control.

You can use this property to determine the type of data that is currently selected in the control in order to handle the selection properly when performing tasks within the control on the current selection. The property can represent any combination of values from the System.Windows.Forms.RichTextBoxSelectionTypes enumeration representing the many types of objects in the current selection.

xxxxx) ShowFocusCues
yyyyy) ShowKeyboardCues
zzzzz) ShowSelectionMargin
aaaaaa) UseStdAccessibleObjects Description Gets or sets a value indicating whether a selection margin is displayed in the System.Windows.Forms.RichTextBox.

You can use this property to enable the user to easily select lines of text in the System.Windows.Forms-RichTextBox. The selection margin is added to the left side of the System. Windows.Forms.RichTextBox. This margin makes it easier for the user to select text starting on the left side of the control. The user can click in the selection margin to select a single line of text or double-click to select the entire paragraph that the line double-clicked is contained within.

bbbbbb) Site
cccccc) Size
dddddd) TabIndex
eeeeee) TabStop
ffffff) Tag
gggggg) Text
hhhhhh) UseStdAccessibleObjects
iiiiii) TextLength
kkkkkk) TopLevelControl
llllll) UndoActionName
mmmmmm) UseStdAccessibleObjects Description Gets the name of the action that can be undone in the control when the System.Windows.Forms.TextBoxBase.Undo method is called.

This property enables you to determine the last action that was done within the control that can be undone. You can use this property to limit the operations available to be undone by the user of the control.

nnnnnn) visible
oooooo) Width
pppppp) WindowTarget
qqqqqq) WordWrap
rrrrrr) ZoomFactor
ssssss) UseStdAccessibleObjects Description Gets or sets the current zoom level of the System.Windows. Forms.RichTextBox.

The value of this property can be between 0.64 and 64.0. A value of 1.0 indicates that no zoom is applied to the control. The zoom feature performs optimally when the document contains TrueType fonts. When a non-TrueType font is used within the document of the control, the System.Windows. Forms.RichTextBox.ZoomFactor property will use the nearest whole number value. You can use this property to enable the user of the System.Windows.Forms.RichTextBox control to zoom into sections of the documentation that are too small to view or to condense the view to enable more of the document to be viewed on screen.

tttttt) UseStdAccessibleObjects

Description

Occurs when contents within the control are resized.

For more information about handling events, see.

uuuuuu) UseStdAccessibleObjects
vvvvvv) UseStdAccessibleObjects

Description

Occurs when the user completes a drag-and-drop wwwwww) UseStdAccessibleObjects

[C#] public new event DragEventHandler DragEnter;

[C++] public: _event DragEventHandler* DragEnter;

[VB] Shadows Public Event DragEnter As DragEventHandler

Description xxxxxx) UseStdAccessibleObjects

[C#] public new event EventHandler DragLeave;

[C++] public: _event EventHandler* DragLeave;

[VB] Shadows Public Event DragLeave As EventHandler

Description yyyyyy) UseStdAccessibleObjects

[C#] public new event DragEventHandler DragOver;

[C++] public: _event DragEventHandler* DragOver;

[VB] Shadows Public Event DragOver As DragEventHandler

Description zzzzzz) UseStdAccessibleObjects

Description aaaaaaa) UseStdAccessibleObjects

Description

Occurs when the user clicks the horizontal scroll bar of the control.

For more information about handling events, see.

bbbbbbb) UseStdAccessibleObjects

[C#] public event EventHandler ImeChange;

[C++] public: _event EventHandler* ImeChange;

[VB] Public Event ImeChange As EventHandler

Description

Occurs when the user switches input methods on an Asian version of the Windows operating system.

For more information about handling events, see.

ccccccc) UseStdAccessibleObjects

Description

Occurs when the user clicks on a link within the text of the control.

You can create an event handler for this event to process a link that has been clicked within the control. Using the information provided to the event handler, you can determine which link was clicked in the document.

ddddddd) UseStdAccessibleObjects

Description

Occurs when the user attempts to modify protected text in the control.

You can create an event handler for this event in your applications to determine when the user has attempted to modify text that has been marked as protected in the control. The event handler can be used to notify the user that the text the user is attempting to modify is protected or to display a dialog box that enables the user to make appropriate changes to the text. For example, if the protected area is a date, you can display a dialog box that enables the user to choose a date which can then be applied to the text of the control.

eeeeeee) UseStdAccessibleObjects

Description fffffff) UseStdAccessibleObjects

Description

Occurs when the selection of text within the control has changed.

You can create an event handler for this event to determine when the user has changed text selection within the control. An event handler for this event can be used to keep text selected until the user has completed a task within the application.

ggggggg) UseStdAccessibleObjects

Description

Occurs when the user clicks the vertical scroll bars of the control.

For more information about handling events, see.

hhhhhhh) CanPaste

[C#] public bool CanPaste(DataFormats.Format clipFormat);

[C++] public: bool CanPaste(DataFormats. Format* clipFormat);

[VB] Public Function CanPaste(ByVal clipFormat As DataFormats.Format) As Boolean

[JScript] public function CanPaste(clipFormat: DataFormats.Format): Boolean;

Description

Determines whether you can paste information from the Clipboard in the specified data format.

Return Value: true if you can paste data from the Clipboard in the specified data format; otherwise, false.

You can use this method to determine whether the current contents of the Clipboard are in a specified Clipboard data format before allowing the user to paste the information into the System.Windows.Forms.RichTextBox control. For example, you could create an event handler for a System.Windows.Forms.MenuItem.Popup event of a paste command System.Windows.Forms.MenuItem and use this method to determine whether the paste System.Windows.Forms.MenuItem should be enabled based on the type of data in the Clipboard. One of the System.Windows.Forms.DataFormats.Format values.

iiiiiii) CreateRichEditOleCallback

[C#] protected virtual object CreateRichEditOleCallback( );

[C++] protected: virtual Object* CreateRichEditOleCallback( );

[VB] Overridable Protected Function CreateRichEditOleCallback( ) As Object

[JScript] protected function CreateRichEditOleCallback( ): Object;

Description

Creates an IRichEditOleCallback compatible object for handling RichEdit callback operations.

Return Value: An object that implements the IRichEditOleCallback interface.

You can override this method in your derived class to allow access to the underlying RichEdit features. If you override this method, all drag and drop events will not be raised. You will have to provide your own support for drag and drop as a result. For more information on the IRichEditOleCallback interface, refer to the MSDN documentation in the Platform SDK reference.

[C#] public int Find(char[ ] characterSet);

[C++] public: int Find(_wchar_t characterSet _gc);

[VB] Public Function Find(ByVal characterSet( ) As Char) As Integer

[JScript] public function Find(characterSet: Char[ ]): int;

Description

Searches the text of a System.Windows.Forms.RichTextBox control for the first instance of a character from a list of characters.

Return Value: The location within the control where the search characters were found or a negative one (−1) if the search characters are not found or an empty search character set is specified in the char parameter.

This version of the System.Windows.Forms.RichTextBox. Find(System.String) method searches for the first instance of a character from a list of characters specified in the characterSet parameter and returns the location of the character. For example, you pass an array of characters containing the character 'Q'. If the control contained the text "The Quick Brown Fox", the System.Windows.Forms.RichTextBox. Find(System.String) method would return the value of four. An upper case character and a lower case character are considered different values in the search. The array of characters to search for.

kkkkkkk) Find

[C#] public int Find(string str);

[C++] public: int Find(String* str);

[VB] Public Function Find(ByVal str As String) As Integer

[JScript] public function Find(str: String): int; Searches for text within the contents of the System.Windows.Forms.RichTextBox Description Searches the text in a System.Windows.Forms.RichTextBox control for a string.

Return Value: The location within the control where the search text was found or a negative one (−1) if the search string is not found or an empty search string is specified in the strparameter.

The System.Windows.Forms.RichTextBox. Find(System.String) method searches for the text specified in the strparameter and returns the location of the first character within the control. If the property returns a negative value, the text string being searched for was not found within the contents of the control. You can use this method to create search functionality that can be provided to the user of the control. You can also use this method to search for text to be replaced with a specific format. For example, if the user entered dates into the control, you could use the System.Windows.Forms.RichTextBox. Find(System.String) method to search for all dates in the document and replace them with the appropriate format before using the System.Windows.Forms.RichTextBox.SaveFile(System.String) method of the control. The text to locate in the control.

lllllll) Find

[C#] public int Find(char[ ] characterSet, int start);

[C++] public: int Find(_wchar_t characterSet _gc[ ], int start);

[VB] Public Function Find(ByVal characterSet( ) As Char, ByVal start As Integer) As Integer

[JScript] public function Find(characterSet: Char[ ], start: int): int;

Description

Searches the text of a System.Windows.Forms.RichTextBox control, at a specific starting point, for the first instance of a character from a list of characters.

Return Value: The location within the control where the search characters are found.

This version of the System.Windows.Forms.RichTextBox.Find(System.String) method searches for the first instance of a character from a list of characters specified in the characterSet parameter and returns the location the character. For example, you pass an array of characters containing the character 'Q'. If the control contained the text "The Quick Brown Fox", the System.Windows.Forms.RichTextBox. Find(System.String) method would return the value of four. An upper case character and a lower case character are considered different values in the search. The array of characters to search for. The location within the control's text at which to begin searching.

mmmmmmm)Find

[C#] public int Find(string str, RichTextBoxFinds options);

[C++] public: int Find(String* str, RichTextBoxFinds options);

[VB] Public Function Find(ByVal str As String, ByVal options As RichTextBoxFinds) As Integer

[JScript] public function Find(str: String, options: RichTextBoxFinds): int;

Description

Searches the text in a System.Windows.Forms.RichTextBox control for a string with specific options applied to the search.

Return Value: The location within the control where the search text was found.

The System.Windows.Forms.RichTextBox. Find(System.String) method searches for the text specified in the str parameter and returns the location of the first character within the control. If the property returns a negative value, the text string being searched for was not found within the contents of the control. You can use this method to create search functionality that can be provided to the user of the control. You can also use this method to search for text to be replaced with a specific format. For example, if the user entered dates into the control, you can use the System.Windows.Forms.RichTextBox.Find (System.String) method to search for all dates in the document and replace them with the appropriate format before using the System.Windows.Forms.RichTextBox.SaveFile (System.String) method of the control. The text to locate in the control. A bitwise combination of the System. Windows. Forms.RichTextBoxFinds values.

nnnnnnn) Find

[C#] public int Find(char[ ] characterSet, int start, int end);

[C++] public: int Find_wchar_t characterSet _gc[ ], int start, int end);

[VB] Public Function Find(ByVal characterSet( ) As Char, ByVal start As Integer, ByVal end As Integer) As Integer

[JScript] public function Find(characterSet: Char[ ], start: int, end: int): int;

Description

Searches a range of text in a System.Windows.Forms.RichTextBox control for the first instance of a character from a list of characters.

Return Value: The location within the control where the search characters are found.

This version of the System.Windows.Forms.RichTextBox.Find(System.String) method searches for the first instance of a character from a list of characters specified in the characterSet parameter and returns the location of the character. For example, you pass an array of characters containing the character 'Q'. If the control contained the text "The Quick Brown Fox", the System.Windows.Forms.RichTextBox. Find(System.String) method would return the value of four. An upper case character and a lower case character are considered different values in the search. The array of characters to search for. The location within the control's text at which to begin searching. The location within the control's text at which to end searching.

ooooooo) Find

[C#] public int Find(string str, int start, RichTextBoxFinds options);

[C++] public: int Find(String* str, int start, RichTextBoxFinds options);

[VB] Public Function Find(ByVal str As String, ByVal start As Integer, ByVal options As RichTextBoxFinds) As Integer

[JScript] public function Find(str: String, start: int, options: RichTextBoxFinds): int;

Description

Searches the text in a System.Windows.Forms.RichTextBox control for a string at a specific location within the control and with specific options applied to the search.

Return Value: The location within the control where the search text was found.

The System.Windows.Forms.RichTextBox. Find(System.String) method searches for the text specified in the strparameter and returns the location of the first character of the search string within the control. If the property returns a negative value, the text string being searched for was not found within the contents of the control. You can use this method to create search functionality that can be provided to the user of the control. You can also use this method to search for text to be replaced with a specific format. For example, if the user entered dates into the control, you could use the System.Windows.Forms.RichTextBox. Find(System.String) method to search for all dates in the document and replace them with the appropriate format before using the System. Windows. Forms. RichTextBox.SaveFile(System.String) method of the control. The text to locate in the control. The location within the control's text at which to begin searching. A bitwise combination of the System.Windows.Forms.RichTextBoxFinds values.

ppppppp) Find

[C#] public int Find(string str, int start, int end, RichTextBoxFinds options);

[C++] public: int Find(String* str, int start, int end, RichTextBoxFinds options);

[VB] Public Function Find(ByVal str As String, ByVal start As Integer, ByVal end As Integer, ByVal options As RichTextBoxFinds) As Integer

[JScript] public function Find(str: String, start: int, end: int, options RichTextBoxFinds) int;

Description

Searches the text in a System.Windows.Forms.RichTextBox control for a string within a range of text within the control and with specific options applied to the search.

Return Value: The location within the control where the search text was found.

The System.Windows.Forms.RichTextBox. Find(System. String) method searches for the text specified in the str parameter and returns the location of the first character of the search string within the control. If the property returns a negative value, the text string being searched for was not found within the contents of the control. You can use this method to create search functionality that can be provided to the user of the control. You can also use this method to search for text to be replaced with a specific format. For example, if the user entered dates into the control, you can use the System.Windows.Forms.RichTextBox. Find(System.String) method to search for all dates in the document and replace them with the appropriate format before using the System. Windows. Forms. RichTextBox.SaveFile(System.String) method of the control. The text to locate in the control. The location within the control's text at which to begin searching. The location within the control's text at which to end searching. This value must be equal to negative one (−1) or greater than or equal to the start parameter. A bitwise combination of the System. Windows.Forms.RichTextBoxFinds values.

qqqqqqq) GetCharFromPositon

[C#] public char GetCharFromPosition(Point pt);

[C++] public: _wchar_t GetCharFromPosition(Point Pt);

[VB] Public Function GetCharFromPosition(ByVal pt As Point) As Char

[JScript] public function GetCharFromPosition(pt: Point): Char;

Description

Gets the character that is closest to the specified location within the control.

Return Value: The character at the specified location.

If the location specified in the pt parameter is outside the client area of the control, the first character of the string closest to the point specified in pt is returned. You can use this method to determine which characters are located near a specific point within the control. You can then use this value to perform operations on the text at that location. The location from which to seek the nearest character.

rrrrrrr) GetCharIndexFromPosition

[C#] public int GetCharIndexFromPosition(Point pt);

[C++] public: int GetCharIndexFromPosition(Point pt);

[VB] Public Function GetCharIndexFromPosition(ByVal pt As Point) As Integer

[JScript] public function GetCharIndexFromPosition(pt: Point): int;

Description

Gets the index of the character nearest to the specified location.

Return Value: The zero-based character index at the specified location.

This method returns the character index that is closest to the position specified in the pt parameter. The character index is a zero-based index of text in the control, including spaces.

You can use this method to determine where in the text the user has the mouse over by passing the mouse coordinates to this method. This can be useful if you want to perform tasks when the user hovers the mouse pointer over a word in the text of the control. The location to search.

sssssss) GetLineFromCharIndex

[C#] public int GetLineFromCharIndex(int index);

[C++] public: int GetLineFromCharIndex(int index);

[VB] Public Function GetLineFromCharIndex(ByVal index As Integer) As Integer

[JScript] public function GetLineFromCharIndex(index: int): int;

Description

Gets the line number from the specified character position within the text of the System.Windows.Forms.RichTextBox control.

Return Value: The zero-based line number where the character index is located in.

This method enables you to determine the line number based on the character index specified in the index parameter of the method. The first line of text in the control returns the value zero. You can use this method to determine which line a specific character index is located within. For example, after calling the System.Windows.Forms.RichTextBox. Find(System.String) method to search for text, you can obtain the character index to where the search results are found. You can call this method with the character index returned by the System.Windows.Forms.RichTextBox. Find(System.String) method to determine which line the word was found. The character index position to search.

ttttttt) GetPositionFromCharIndex

[C#] public Point GetPositionFromCharIndex(int index);

[C++] public: Point GetPositionFromCharIndex(int index);

[VB] Public Function GetPositionFromCharIndex(ByVal index As Integer) As Point

[JScript] public function GetPositionFromCharIndex(index: int): Point;

Description

Gets the location within the control at the specified character index.

Return Value: The location of the specified character.

This method enables you to determine where in the control a specific character index is located. You can use this method for such tasks as displaying context menu items or help information for a word in the control. For example, if you wanted to display a menu of options to the user when the user right clicks on a word in the control, you can use this method to determine the position of the word to properly display a System.Windows.Forms.ContextMenu control. The index of the character for which to retrieve the location.

uuuuuuu) LoadFile

[C#] public void LoadFile(string path);

[C++] public: void LoadFile(String* path);

[VB] Public Sub LoadFile(ByVal path As String)

[JScript] public function LoadFile(path: String); Loads the contents of a file into the System.Windows.Forms.RichTextBox control.

Description

Loads a Rich Text Format (RTF) or standard ASCII text file into the System.Windows.Forms.RichTextBox control.

When loading a file with the System.Windows.Forms.RichTextBox.LoadFile(System.String) method, the contents of the file being loaded replace the entire contents of the System.Windows.Forms.RichTextBox control. This will cause the values of the System.Windows.Forms.TextBoxBase.Text and System.Windows.Forms.RichTextBox.Rtf properties to change. You can use this method to load a previously created text or RTF document into the control for manipulation. If you want to save the file, you can use the System.Windows.Forms.RichTextBox.SaveFile(System.String) method. The name and location of the file to load into the control.

vvvvvvv) LoadFile

[C#] public void LoadFile(Stream data, RichTextBoxStreamType fileType);

[C++] public: void LoadFile(Stream* data, RichTextBoxStreamType fileType);

[VB] Public Sub LoadFile(ByVal data As Stream, ByVal fileType As RichTextBoxStreamType)

[JScript] public function LoadFile(data: Stream, fileType RichTextBoxStreamType);

Description

Loads the contents of an existing data stream into the System.Windows.Forms.RichTextBox control.

You can use this version of the System.Windows.Forms.RichTextBox.LoadFile(System.String) method to load the System.Windows.Forms.RichTextBox with data from an existing stream of data. The data that is loaded into the control replaces the entire contents of the System.Windows.Forms.RichTextBox control. This will cause the values of the System.Windows.Forms.TextBoxBase.Text and System.Windows.Forms.RichTextBox.Rtf properties to change. You can use this method to load a file that has been previously opened into a data stream into the control for manipulation. If you want to save contents of the control back into the stream, you can use the System.Windows.Forms.RichTextBox.SaveFile (System.String) method that accepts a System.IO.Stream object as a parameter. A stream of data to load into the System.Windows.Forms.RichTextBox control. One of the System.Windows.Forms.RichTextBoxStreamType values.

wwwwwww) LoadFile

[C#] public void LoadFile(string path, RichTextBoxStreamType fileType);

[C++] public: void LoadFile(String* path, RichTextBoxStreamType fileType);

[VB] Public Sub LoadFile(ByVal path As String, ByVal fileType As RichTextBoxStreamType)

[JScript] public function LoadFile(path: String, fileType: RichTextBoxStreamType);

Description

Loads a specific type of file into the System.Windows.Forms.RichTextBox control.

When loading a file with the System.Windows.Forms.RichTextBox.LoadFile(System.String) method, the contents of the file being loaded replace the entire contents of the System.Windows.Forms.RichTextBox control. This will cause the values of the System.Windows.Forms.TextBoxBase.Text and System.Windows.Forms.RichTextBox.Rtf properties to change. You can use this method to load a previously created text or Rich Text Format (RTF) document into the control for manipulation. If you want to save the file, you can use the System.Windows.Forms.RichTextBox.SaveFie(System. String) method. The name and location of the file to load into the control. One of the System.Windows.Forms.RichTextBoxStreamType values.

xxxxxxx) OnBackColorChanged

[C+] protected override void OnBackColorChanged(Event Args e);

[C++] protected: void OnBackColorChanged(EventArgs* e);

[VB] Overrides Protected Sub OnBackColorChanged(ByVal e As EventArgs)

[JScript] protected override function OnBackColorChanged (e: EventArgs);

yyyyyyy) OnContentsResized

[C#] protected virtual void OnContentsResized(ContentsResizedEventArgs e);

[C++] protected: virtual void OnContentsResized(ContentsResizedEventArgs* e);

[VB] Overridable Protected Sub OnContentsResized(ByVal e As ContentsResizedEventArgs)

[JScript] protected function OnContentsResized(e: ContentsResizedEventArgs);

Description

Raises the System.Windows.Forms.RichTextBox. ContentsResized event.

Raising an event invokes the event handler through a delegate. For more information, see. A System.Windows.Forms.ContentsResizedEventArgs that contains the event data.

zzzzzzz) OnContextMenuChanged

[C#] protected override void OnContextMenuChanged (EventArgs e);

[C++] protected: void OnContextMenuChanged(EventArgs* e);

[VB] Overrides Protected Sub OnContextMenuChanged (ByVal e As EventArgs)

[JScript] protected override function OnContextMenuChanged(e: EventArgs);

Description aaaaaaaa) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

bbbbbbbb) OnHandleDestroyed

[C#] protected override void OnHandleDestroyed(EventArgs e);

[C++] protected: void OnHandleDestroyed(EventArgs* e);

[VB] Overrides Protected Sub OnHandleDestroyed(ByVal e As EventArgs)

[JScript] protected override function OnHandleDestroyed(e: EventArgs);

cccccccc) OnHScroll

[C#] protected virtual void OnHScroll(EventArgs e);

[C++] protected: virtual void OnHScroll(EventArgs* e);

[VB] Overridable Protected Sub OnHScroll(ByVal e As EventArgs)

[JScript] protected function OnHScroll(e: EventArgs);

Description

Raises the System.Windows.Forms.RichTextBox.HScroll event.

Raising an event invokes the event handler through a delegate. For more information, see. An System.EventArgs that contains the event data.

dddddddd) OnImeChange

[C#] protected virtual void OnImeChange(EventArgs e);

[C++] protected: virtual void OnImeChange(EventArgs* e);

[VB] Overridable Protected Sub OnImeChange(ByVal e As EventArgs)

[JScript] protected function OnImeChange(e: EventArgs);

Description

Raises the System.Windows.Forms.RichTextBox. ImeChange event.

Raising an event invokes the event handler through a delegate. For more information, see. An System.EventArgs that contains the event data.

eeeeeeee) OnLinkClicked

[C#] protected virtual void OnLinkClicked(LinkClicked EventArgs e);

[C++] protected: virtual void OnLinkClicked(LinkClicked EventArgs* e);

[VB] Overridable Protected Sub OnLinkClicked(ByVal e As LinkClickedEventArgs)

[JScript] protected function OnLinkClicked(e: LinkClickedEventArgs);

Description

Raises the System.Windows.Forms.RichTextBox.LinkClicked event.

Raising an event invokes the event handler through a delegate. For more information, see. A System.Windows.Forms.LinkClickedEventArgs that contains the event data.

ffffffff) OnProtected

[C#] protected virtual void OnProtected(EventArgs e);

[C++] protected: virtual void OnProtected(EventArgs* e);

[VB] Overridable Protected Sub OnProtected(ByVal e As EventArgs)

[JScript] protected function OnProtected(e: EventArgs);

Description

Raises the System.Windows.Forms.RichTextBox.Protected event.

Raising an event invokes the event handler through a delegate. For more information, see. An System.EventArgs that contains the event data.

gggggggg) OnRightToLeftChanged

[C#] protected override void OnRightToLeftChanged(EventArgs e);

[C++] protected: void OnRightToLeftChanged(EventArgs* e);

[VB] Overrides Protected Sub OnRightToLeftChanged(ByVal e As EventArgs)

[JScript] protected override function OnRightToLeftChanged(e: EventArgs);

hhhhhhhh) OnSelectionChanged

[C#] protected virtual void OnSelectionChanged(EventArgs e);

[C++] protected: virtual void OnSelectionChanged(EventArgs* e);

[VB] Overridable Protected Sub OnSelectionChanged(ByVal e As EventArgs)

[JScript] protected function OnSelectionChanged(e: EventArgs);

Description

Raises the System.Windows.Forms.RichTextBox.SelectionChanged event.

Raising an event invokes the event handler through a delegate. For more information, see. An System.EventArgs that contains the event data.

iiiiiii) OnStyleChanged

[C#] protected override void OnStyleChanged(EventArgs e);

[C++] protected: void OnStyleChanged(EventArgs* e);

[VB] Overrides Protected Sub OnStyleChanged(ByVal e As EventArgs)

[JScript] protected override function OnStyleChanged(e: EventArgs);

Description jjjjjjj) OnTextChanged

[C#] protected override void OnTextChanged(EventArgs e);

[C++] protected: void OnTextChanged(EventArgs* e);

[VB] Overrides Protected Sub OnTextChanged(ByVal e As EventArgs)

[JScript] protected override function OnTextChanged(e: EventArgs);

Description

Fires the event indicating that the text property has been changed. Inheriting controls should use this in favour of actually listening to the event, but should not forget to call base.on TextChanged( ) to ensure that the event is still fired for external listeners. Event to send kkkkkkkk) On VScroll

[C#] protected virtual void OnVScroll(EventArgs e);

[C++] protected: virtual void OnVScroll(EventArgs* e);

[VB] Overridable Protected Sub OnVScroll(ByVal e As EventArgs)

[JScript] protected function OnVScroll(e: EventArgs);

Description

Raises the System.Windows.Forms.RichTextBox.VScroll event.

Raising an event invokes the event handler through a delegate. For more information, see. An System.EventArgs that contains the event data.

llllllll) Paste

[C#] public void Paste(DataFormats.Format clipFormat);

[C++] public: void Paste(DataFormats.Format* clipFormat);

[VB] Public Sub Paste(ByVal clipFormat As DataFormats.Format)

[JScript] public function Paste(clipFormat: DataFormats.Format); Pastes the contents of the Clipboard into the control.

Description

Pastes the contents of the Clipboard in the specified Clipboard format.

You can use this method to paste data from the clipboard into the control. This version of the System.Windows.Forms.RichTextBox.Paste(System.Windows.Forms.DataFormats.Format) method is different from the System.Windows.Forms.TextBoxBase.Paste method as it allows you to paste only text in a specified Clipboard format. You can use the System.Windows.Forms.RichTextBox.CanPaste(System.Windows.Forms.DataFormats.Format) method to determine whether the data within the Clipboard is in the specified Clipboard format. You can then call this version of the System.Windows.Forms.RichTextBox.Paste(System.Windows.Forms.DataFormats.Format) method to ensure that the paste operation is made with the appropriate data format. The Clipboard format in which the data should be obtained from the Clipboard.

mmmmmmmm) Redo

[C#] public void Redo( );

[C++] public: void Redo( );

[VB] Public Sub Redo( )

[JScript] public function Redo( );

Description

Reapplies the last operation that was undone in the control.

You can then use the System.Windows.Forms.RichTextBox.Redo method to reapply the last undo operation to the control. The System.Windows.Forms.RichTextBox.CanRedo method enables you to determine whether the last operation the user has undone can be reapplied to the control.

nnnnnnnn) SaveFile

[C#] public void SaveFile(string path);

[C++] public: void SaveFile(String* path);

[VB] Public Sub SaveFile(ByVal path As String)

[JScript] public function SaveFile(path: String); Saves the contents of the System.Windows.Forms.RichTextBox to a file.

Description

Saves the contents of the System.Windows.Forms.RichTextBox to a Rich Text Format (RTF) file.

The System.Windows.Forms.RichTextBox.SaveFile(System.String) method enables you to save the entire contents of the control to an RTF file that can be used by other programs such as Microsoft Word and Windows WordPad. If the file name that is passed to the path parameter already exists at the specified directory, the file will be overwritten without notice. You can use the System.Windows.Forms.RichTextBox.LoadFile(System.String) method to load the contents of a file into the System.Windows.Forms.RichTextBox. The name and location of the file to save.

oooooooo) SaveFile

[C#] public void SaveFile(Stream data, RichTextBoxStreamType fileType);

[C++] public: void SaveFile(Stream* data, RichTextBoxStreamType fileType);

[VB] Public Sub SaveFile(ByVal data As Stream, ByVal fileType As RichTextBoxStreamType)

[JScript] public function SaveFile(data: Stream, fileType: RichTextBoxStreamType);

Description

Saves the contents of a System.Windows.Forms.RichTextBox control to an open data stream.

This version of the System.Windows.Forms.RichTextBox.SaveFile(System.String) method enables you to save the entire contents of the control to the data stream that is already opened. The data stream can then save the information to a file. You can use the System.Windows.Forms.RichTextBox.LoadFile(System.String) method to load the contents of a file into the System.Windows.Forms.RichTextBox. The data stream that contains the file to save to. One of the System.Windows.Forms.RichTextBoxStreamType values.

pppppppp) SaveFile

[C#] public void SaveFile(string path, RichTextBoxStreamType fileType);

[C++] public: void SaveFile(String* path, RichTextBoxStreamType fileType);

[VB] Public Sub SaveFile(ByVal path As String, ByVal fileType As RichTextBoxStreamType)

[JScript] public function SaveFile(path: String, fileType RichTextBoxStreamType);

Description

Saves the contents of the System.Windows.Forms.RichTextBox to a specific type of file.

The System.Windows.Forms.RichTextBox.SaveFile(System.String) method enables you to save the entire contents of the control to an RTF file that can be used by other programs such as Microsoft Word and Windows WordPad. If the file name that is passed to the path parameter already exists at the specified directory, the file will be overwritten without notice. You can use the System.Windows.Forms.RichTextBox.LoadFile(System.String) method to load the contents of a file into the System.Windows.Forms.RichTextBox. The name and location of the file to save. One of the System.Windows.Forms.RichTextBoxStreamType values.

qqqqqqqq) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

RichTextBoxFinds enumeration (System.Windows.Forms)

a) WndProc

Description

Specifies how a text search is carried out in a System.Windows.Forms.RichTextBox control.

An application locates text in the System.Windows.Forms.RichTextBox control by calling the System.Windows. Forms.RichTextBox. Find(System.String) method of the System.Windows.Forms.RichTextBox control. This enumeration enables you to specify how the search is performed when the System.Windows.Forms.RichTextBox. Find(System.String) method is called. You can combine one or more values from this enumeration to specify more than one search option when calling the System.Windows.Forms.RichTextBox. Find(System.String) method.

b) WndProc

[C#] public const RichTextBoxFinds MatchCase; [C++] public: const RichTextBoxFinds MatchCase;

[VB] Public Const MatchCase As RichTextBoxFinds

[JScript] public var MatchCase: RichTextBoxFinds;

Description

Locate only instances of the search text that have the exact casing.

c) WndProc

[C#] public const RichTextBoxFinds NoHighlight;

[C++] public: const RichTextBoxFinds NoHighlight;

[VB] Public Const NoHighlight As RichTextBoxFinds

[JScript] public var NoHighlight: RichTextBoxFinds;

Description

The search text, if found, should not be highlighted.

d) WndProc

[C#] public const RichTextBoxFinds None;

[C++] public: const RichTextBoxFinds None;

[VB] Public Const None As RichTextBoxFinds

[JScript] public var None: RichTextBoxFinds;

Description

Locate all instances of the search text, whether the instances found in the search are whole words or not.

e) WndProc

[C#] public const RichTextBoxFinds Reverse;

[C++] public: const RichTextBoxFinds Reverse;

[VB] Public Const Reverse As RichTextBoxFinds

[JScript] public var Reverse: RichTextBoxFinds;

Description

The search starts at the end of the control's document and searches to the beginning of the document.

f) WndProc

[C#] public const RichTextBoxFinds WholeWord;

[C++] public: const RichTextBoxFinds WholeWord;

[VB] Public Const WholeWord As RichTextBoxFinds

[JScript] public var WholeWord: RichTextBoxFinds;

Description

Locate only instances of the search text that are whole words.

RichTextBoxScrollBars enumeration (System.Windows.Forms)

a) ToString

Description

Specifies the type of scroll bars to display in a System.Windows.Forms.RichTextBox control.

Use the members of this enumeration to set the value of the System.Windows.Forms.RichTextBox.ScrollBars property of the System.Windows.Forms.RichTextBox control.

b) ToString

[C#] public const RichTextBoxScrollBars Both;

[C++] public: const RichTextBoxScrollBars Both;

[VB] Public Const Both As RichTextBoxScrollBars

[JScript] public var Both: RichTextBoxScrollBars;

Description

Display both a horizontal and a vertical scroll bar when needed.

c) ToString

[C#] public const RichTextBoxScrollBars ForcedBoth;

[C++] public: const RichTextBoxScrollBars ForcedBoth;

[VB] Public Const ForcedBoth As RichTextBoxScrollBars

[JScript] public var ForcedBoth: RichTextBoxScrollBars;

Description

Always display both a horizontal and a vertical scroll bar.

d) ToString

[C#] public const RichTextBoxScrollBars ForcedHorizontal;

[C++] public: const RichTextBoxScrollBars ForcedHorizontal;

[VB] Public Const ForcedHorizontal As RichTextBoxScrollBars

[JScript] public var ForcedHorizontal: RichTextBoxScrollBars;

Description

Always display a horizontal scroll bar.

e) ToString

[C#] public const RichTextBoxScrollBars ForcedVertical;

[C++] public: const RichTextBoxScrollBars ForcedVertical;

[VB] Public Const ForcedVertical As RichTextBoxScrollBars

[JScript] public var ForcedVertical: RichTextBoxScrollBars;

Description

Always display a vertical scroll bar.

f) ToString

[C#] public const RichTextBoxScrollBars Horizontal;

[C++] public: const RichTextBoxScrollBars Horizontal;

[VB] Public Const Horizontal As RichTextBoxScrollBars

[JScript] public var Horizontal: RichTextBoxScrollBars;

Description

Display a horizontal scroll bar only when text is longer than the width of the control.

g) ToString

[C#] public const RichTextBoxScrollBars None;

[C++] public: const RichTextBoxScrollBars None;

[VB] Public Const None As RichTextBoxScrollBars

[JScript] public var None: RichTextBoxScrollBars;

Description

No scroll bars are displayed.

h) ToString

[C#] public const RichTextBoxScrollBars Vertical;

[C++] public: const RichTextBoxScrollBars Vertical;

[VB] Public Const Vertical As RichTextBoxScrollBars

[JScript] public var Vertical: RichTextBoxScrollBars;

Description

Display a vertical scroll bar only when text is longer than the height of the control.

RichTextBoxSelectionAttribute enumeration (System.Windows.Forms)

a) ToString

Description

Specifies whether any characters in the current selection have the style or attribute.

The System.Windows.Forms.RichTextBox class uses this enumeration internally.

b) ToString

[C#] public const RichTextBoxSelectionAttribute All;

[C++] public: const RichTextBoxSelectionAttribute All;

[VB] Public Const All As RichTextBoxSelectionAttribute

[JScript] public var All: RichTextBoxSelectionAttribute;

Description

All characters.

c) ToString

[C#] public const RichTextBoxSelectionAttribute Mixed;

[C++] public: const RichTextBoxSelectionAttribute Mixed;

[VB] Public Const Mixed As RichTextBoxSelectionAttribute

[JScript] public var Mixed: RichTextBoxSelectionAttribute;

Description

Some but not all characters.

d) ToString

[C#] public const RichTextBoxSelectionAttribute None;

[C++] public: const RichTextBoxSelectionAttribute None;

[VB] Public Const None As RichTextBoxSelectionAttribute

[JScript] public var None: RichTextBoxSelectionAttribute;

Description

No characters.

RichTextBoxSelectionTypes enumeration (System.Windows.Forms)

a) ToString

Description

Specifies the type of selection in a System.Windows.Forms. RichTextBox control.

Use the members of this enumeration to determine the value of the System.Windows.Forms.RichTextBox. SelectionType property of the System.Windows.Forms. RichTextBox class. The System.Windows.Forms.RichTextBox.SelectionType property can return any combination of values from this enumeration.

b) ToString

[C#] public const RichTextBoxSelectionTypes Empty;

[C++] public: const RichTextBoxSelectionTypes Empty;

[VB] Public Const Empty As RichTextBoxSelectionTypes

[JScript] public var Empty: RichTextBoxSelectionTypes;

Description

No text is selected in the current selection.

c) ToString

[C#] public const RichTextBoxSelectionTypes MultiChar;

[C++] public: const RichTextBoxSelectionTypes MultiChar;

[VB] Public Const MultiChar As RichTextBoxSelectionTypes

[JScript] public var MultiChar: RichTextBoxSelectionTypes;

Description

More than one character is selected.

d) ToString

[C#] public const RichTextBoxSelectionTypes MultiObject;

[C++] public: const RichTextBoxSelectionTypes MultiObject;

[VB] Public Const MultiObject As RichTextBoxSelectionTypes

[JScript] public var MultiObject: RichTextBoxSelectionTypes;

Description

More than one Object Linking and Embedding (OLE) object is selected.

e) ToString

[C+] public const RichTextBoxSelectionTypes Object;

[C++] public: const RichTextBoxSelectionTypes Object;

[VB] Public Const Object As RichTextBoxSelectionTypes

[JScript] public var Object: RichTextBoxSelectionTypes;

Description

At least one Object Linking and Embedding (OLE) object is selected.

f) ToString

[C#] public const RichTextBoxSelectionTypes Text;

[C++] public: const RichTextBoxSelectionTypes Text;

[VB] Public Const Text As RichTextBoxSelectionTypes

[JScript] public var Text: RichTextBoxSelectionTypes;

Description

The current selection contains only text.

RichTextBoxStreamType enumeration (System.Windows.Forms)

a) ToString

Description

Specifies the types of input and output streams used to load and save data in the System.Windows.Forms.RichTextBox control.

Use the members of this enumeration when calling the System.Windows.Forms.RichTextBox.LoadFile(System. String) and System.Windows.Forms.RichTextBox.SaveFile (System.String) methods of the System. Windows.Forms. RichTextBox control.

b) ToString

[C#] public const RichTextBoxStreamType PlainText;

[C++] public: const RichTextBoxStreamType PlainText;

[VB] Public Const PlainText As RichTextBoxStreamType

[JScript] public var PlainText: RichTextBoxStreamType;

Description

A plain text stream that includes spaces in places of Object Linking and Embedding (OLE) objects.

c) ToString

[C#] public const RichTextBoxStreamType RichNoOleObjs;

[C++] public: const RichTextBoxStreamType RichNoOleObjs;

[VB] Public Const RichNoOleObjs As RichTextBoxStreamType

[JScript] public var RichNoOleObjs: RichTextBoxStreamType;

Description

A Rich Text Format (RTF) stream with spaces in place of OLE objects. This value is only valid for use with the System.Windows.Forms.RichTextBox.SaveFile(System.String) method of the System.Windows.Forms.RichTextBox control.

d) ToString

[C#] public const RichTextBoxStreamType RichText;

[C++] public: const RichTextBoxStreamType RichText;

[VB] Public Const RichText As RichTextBoxStreamType

[JScript] public var RichText: RichTextBoxStreamType;

Description

A Rich Text Format (RTF) stream.

e) ToString

[C#] public const RichTextBoxStreamType TextTextOle Objs;

[C++] public: const RichTextBoxStreamType TextTextOle Objs;

[VB] Public Const TextTextOleObjs As RichTextBoxStreamType

[JScript] public var TextTextOleObjs: RichTextBoxStreamType;

Description

A plain text stream with a textual representation of OLE objects. This value is only valid for use with the System.Windows.Forms.RichTextBox.SaveFile(System.String) method of the System.Windows.Forms.RichTextBox control.

f) ToString

[C#] public const RichTextBoxStreamType UnicodePlainText;

[C++] public: const RichTextBoxStreamType UnicodePlainText;

[VB] Public Const UnicodePlainText As RichTextBoxStreamType

[JScript] public var UnicodePlainText: RichTextBoxStreamType;

Description

A text stream that contains spaces in place of Object Linking and Embedding (OLE) objects. The text is encoded in Unicode.

RichTextBoxWordPunctuations enumeration (System.Windows.Forms)

a) ToString

Description

Specifies the types of punctuation tables that can be used with the System.Windows.Forms. RichTextBox control's word-wrapping and word-breaking features.

b) ToString

[C#] public const RichTextBoxWordPunctuations All;

[C++] public: const RichTextBoxWordPunctuations All;

[VB] Public Const All As RichTextBoxWordPunctuations

[JScript] public var All: RichTextBoxWordPunctuations;

Description

Used as a mask.

c) ToString

[C#] public const RichTextBoxWordPunctuations Custom;

[C++] public: const RichTextBoxWordPunctuations Custom;

[VB] Public Const Custom As RichTextBoxWordPunctuations

[JScript] public var Custom: RichTextBoxWordPunctuations;

Description

Use a custom defined punctuation table.

d) ToString

[C#] public const RichTextBoxWordPunctuations Level1;

[C++] public: const RichTextBoxWordPunctuations Level1;

[VB] Public Const Level1 As RichTextBoxWordPunctuations

[JScript] public var Level1: RichTextBoxWordPunctuations;

Description

Use pre-defined Level 1 punctuation table as default.

e) ToString

[C#] public const RichTextBoxWordPunctuations Level2;

[C++] public: const RichTextBoxWordPunctuations Level2;

[VB] Public Const LevelAs RichTextBoxWordPunctuations

[JScript] public var Level2: RichTextBoxWordPunctuations;

Description

Use pre-defined Level 2 punctuation table as default.

RightToLeft enumeration (System.Windows.Forms)

a) ToString

Description

Specifies a value indicating whether the text appears from right to left, such as when using Hebrew or Arabic fonts.

This enumeration is used by System.Windows.Forms.ContextMenu, System.Windows.Forms.MainMenu, System.Windows.Forms.ProgressBar, System.Text.RegularExpressions.Regex and System.Windows.Forms.Control.

b) ToString

[C#] public const RightToLeft Inherit;

[C++] public: const RightToLeft Inherit;

[VB] Public Const Inherit As RightToLeft

[JScript] public var Inherit RightToLeft;

Description

The direction the text read is inherited from the parent control.

c) ToString

[C#] public const RightToLeft No;

[C++] public: const RightToLeft No;

[VB] Public Const No As RightToLeft

[JScript] public var No: RightToLeft;

Description

The text reads from left to right. This is the default.

d) ToString

[C#] public const RightToLeft Yes;

[C++] public: const RightToLeft Yes;

[VB] Public Const Yes As RightToLeft

[JScript] public var Yes RightToLeft;

Description

The text reads from right to left.

SaveFileDialog class (System.Windows.Forms)

a) ToString

Description

Represents a common dialog box that allows the user to specify options for saving a file. This class cannot be inherited.

This class allows you to open and overwrite an existing file or create a new file.

b) SaveFileDialog

Example Syntax:

c) ToString

[C#] public SaveFileDialog( );

[C++] public: SaveFileDialog( );

[VB] Public Sub New( )

[JScript] public function SaveFileDialog( );

d) AddExtension e) CheckFileExists

CheckPathExists g) Container
h) CreatePrompt
i) ToString

Description

Gets or sets a value indicating whether the dialog box prompts the user for permission to create a file if the user specifies a file that does not exist.

j) DefaultExt
k) DereferenceLinks
l) DesignMode
m) Events
n) FileName
o) FileNames
p) Filter
q) FilterIndex
r) InitialDirectory
s) Instance
t) Options
u) OverwritePrompt
v) Tostring Description Gets or sets a value indicating whether the Save As dialog box displays a warning if the user specifies a file name that already exists.

w) RestoreDirectory
x) ShowHelp
y) Site
z) Title
aa) ValidateNames
bb) OpenFile

[C#] public Stream OpenFile( );

[C++] public: Stream* OpenFile( );

[VB] Public Function OpenFile( ) As Stream

[JScript] public function OpenFile( ): Stream;

Description

Opens the file with read/write permission selected by the user.

Return Value: The read/write file selected by the user.

For security purposes, this method creates a new file with the selected name and opens it with read/write permissions. This can cause unintentional loss of data if you select an existing file to save to. To save data to an existing file while retaining existing data, use the System.IO.File class to open the file using the file name returned in the System.Windows.Forms.FileDialog.FileName property.

cc) Reset

[C#] public override void Reset( );

[C++] public: void Reset( );

[VB] Overrides Public Sub Reset( )

[JScript] public override function Reset( );

Description

Resets all dialog box options to their default values.

Screen class (System.Windows.Forms)

a) ToString

Description

Represents a display device or multiple display devices on a single system.

The constructor for this object is public, so you cannot explicitly create a System.Windows.Forms.Screen object. The object is created when you call its public methods.

b) AllScreens
c) ToString

[C#] public static Screen[ ] AllScreens {get;}

[C++] public: _property static Screen* get_AllScreens( );

[VB] Public Shared ReadOnly Property AllScreens As Screen( )

[JScript] public static function get AllScreens( ): Screen[ ];

Description

Gets an array of all displays on the system.

d) Bounds
e) ToString

[C#] public Rectangle Bounds {get;}

[C++] public: _property Rectangle get_Bounds( );

[VB] Public ReadOnly Property Bounds As Rectangle

[JScript] public function get Bounds( ): Rectangle;

Description

Gets the bounds of the display.

f) DeviceName
g) ToString

[C#] public string DeviceName {get;}

[C++] public: _property String* get_DeviceName( );

[VB] Public ReadOnly Property DeviceName As String

[JScript] public function get DeviceName( ): String;

Description

Gets the device name associated with a display.

h) Primary
i) ToString

[C#] public bool Primary {get;}

[C++] public: _property bool get_Primary( );

[VB] Public ReadOnly Property Primary As Boolean

[JScript] public function get Primary( ): Boolean;

Description

Gets a value indicating whether a particular display is the primary device.

j) PrimaryScreen
k) ToString

[C#] public static Screen PrimaryScreen {get;}

[C++] public: _property static Screen* get_PrimaryScreen( );

[VB] Public Shared ReadOnly Property PrimaryScreen As Screen

[JScript] public static function get PrimaryScreen( ): Screen;

Description

Gets the primary display.

For a single display system, the primary display is the only display.

l) WorkingArea
m) ToString

[C#] public Rectangle WorkingArea {get;}

[C++] public: _property Rectangle get_WorkingArea( );

[VB] Public ReadOnly Property WorkingArea As Rectangle

[JScript] public function get WorkingArea( ): Rectangle;

Description

Gets the working area of the display. The working area is the desktop area of the display, excluding taskbars, docked windows, and docked tool bars.

The working area is the desktop area of the display, excluding taskbars, docked windows, and docked tool bars.

n) Equals

[C#] public override bool Equals(object obj);

[C++] public: bool Equals(Object* obj);

[VB] Overrides Public Function Equals(ByVal obj As Object) As Boolean

[JScript] public override function Equals(obj: Object): Boolean;

Description

Gets or sets a value indicating whether the specified object is equal to this Screen.

Return Value: true if the specified object is equal to this System.Windows.Forms.Screen; otherwise, false. The object to compare to this System.Windows.Forms.Screen.

o) FromControl

[C#] public static Screen FromControl(Control control);

[C++] public: static Screen* FromControl(Control* control);

[VB] Public Shared Function FromControl(ByVal control As Control) As Screen

[JScript] public static function FromControl(control: Control): Screen;

Description

Retrieves a System.Windows.Forms.Screen for the display that contains the largest portion of the specified control.

Return Value: A System.Windows.Forms.Screen for the display that contains the largest region of the specified control. In multiple display environments where no display contains the control, the display closest to the specified control is returned. A System.Windows.Forms.Control for which to retrieve a System.Windows.Forms.Screen.

p) FromHandle

[C+] public static Screen FromHandle(IntPtr hwnd);

[C++] public: static Screen* FromHandle(IntPtr hwnd);

[VB] Public Shared Function FromHandle(ByVal hwnd As IntPtr) As Screen

[JScript] public static function FromHandle(hwnd: IntPtr): Screen;

Description

Retrieves a System.Windows.Forms.Screen for the display that contains the largest portion of the of the object referred to by the specified handle.

Return Value: A System.Windows.Forms.Screen for the display that contains the largest region of the object. In multiple display environments where no display contains any portion of the specified window, the display closest to the object is returned. The window handle for which to retrieve the System.Windows.Forms.Screen.

q) FromPoint

[C#] public static Screen FromPoint(Point point);

[C++] public: static Screen* FromPoint(Point point);

[VB] Public Shared Function FromPoint(ByVal point As Point) As Screen

[JScript] public static function FromPoint(point: Point): Screen;

Description

Retrieves a System.Windows.Forms.Screen for the display that contains the specified point.

Return Value: A System.Windows.Forms.Screen for the display that contains the point. In multiple display environments where no display contains the point, the display closest to the specified point is returned. A System.Drawing.Point that specifies the location for which to retrieve a System.Windows.Forms.Screen.

r) FromRectangle

[C#] public static Screen FromRectangle(Rectangle rect);

[C++] public: static Screen* FromRectangle(Rectangle rect);

[VB] Public Shared Function FromRectangle(ByVal rect As Rectangle) As Screen

[JScript] public static function FromRectangle(rect: Rectangle): Screen;

Description

Retrieves a System.Windows.Forms.Screen for the display that contains the largest portion of the rectangle.

Return Value: A System.Windows.Forms.Screen for the display that contains the largest region of the specified rectangle. In multiple display environments where no display contains the rectangle, the display closest to the rectangle is returned. A System.Drawing.Rectangle that specifies the area for which to retrieve the display.

s) GetBounds

[C#] public static Rectangle GetBounds(Control ctl);

[C++] public: static Rectangle GetBounds(Control* ctl);

[VB] Public Shared Function GetBounds(ByVal ctl As Control) As Rectangle

[JScript] public static function GetBounds(ctl: Control): Rectangle;

Description

Retrieves the bounds of the display that contains the largest portion of the specified control.

Return Value: A System.Drawing. Rectangle that specifies the bounds of the display that contains the specified control. In multiple display environments where no display contains the specified control, the display closest to the control is returned. The System.Windows.Forms.Control for which to retrieve the display bounds.

t) GetBounds

[C#] public static Rectangle GetBounds(Point pt);

[C++] public: static Rectangle GetBounds(Point Pt);

[VB] Public Shared Function GetBounds(ByVal pt As Point) As Rectangle

[JScript] public static function GetBounds(pt: Point): Rectangle; Retrieves the bounds of the display.

Description

Retrieves the bounds of the display that contains the specified point.

Return Value: A System.Drawing.Rectangle that specifies the bounds of the display that contains the specified point. In multiple display environments where no display contains the specified point, the display closest to the point is returned. A System.Drawing.Point that specifies the coordinates for which to retrieve the display bounds.

u) GetBounds

[C#] public static Rectangle GetBounds(Rectangle rect);

[C++] public: static Rectangle GetBounds(Rectangle rect);

[VB] Public Shared Function GetBounds(ByVal rect As Rectangle) As Rectangle

[JScript] public static function GetBounds(rect: Rectangle): Rectangle;

Description

Retrieves the bounds of the display that contains the largest portion of the specified rectangle.

Return Value: A System.Drawing.Rectangle that specifies the bounds of the display that contains the specified rectangle. In multiple display environments where no monitor contains the specified rectangle, the monitor closest to the rectangle is returned. A System.Drawing.Rectangle that specifies the area for which to retrieve the display bounds.

v) GetHashCode

[C#] public override int GetHashCode( );

[C++] public: int GetHashCode( );

[VB] Overrides Public Function GetHashCode( ) As Integer

[JScript] public override function GetHashCode( ): int;

Description

Computes and retrieves a hash code for an object.

Return Value: A hash code for an object.

w) GetWorkingArea

[C#] public static Rectangle GetWorkingArea(Control ctl);

[C++] public: static Rectangle GetWorkingArea(Control* ctl);

[VB] Public Shared Function GetWorkingArea(ByVal ctl As Control) As Rectangle

[JScript] public static function GetWorkingArea(ctl: Control): Rectangle;

Description

Retrieves the working area for the display that contains the largest region of the specified control. The working area is the desktop area of the display, excluding taskbars, docked windows, and docked tool bars.

Return Value: A System.Drawing.Rectangle that specifies the working area.

In multiple display environments where no display contains the specified control, the display closest to the control is returned. The System.Windows.Forms.Control for which to retrieve the working area.

x) GetWorkingArea

[C#] public static Rectangle GetWorkingArea(Point pt);

[C++] public: static Rectangle GetWorkingArea(Point pt);

[VB] Public Shared Function GetWorkingArea(ByVal pt As Point) As Rectangle

[JScript] public static function GetWorkingArea(pt: Point): Rectangle; Retrieves the working area of a display.

Description

Retrieves the working area closest to the specified point. The working area is the desktop area of the display, excluding taskbars, docked windows, and docked tool bars.

Return Value: A System.Drawing.Rectangle that specifies the working area.

In multiple display environments where no display contains the specified point, the display closest to the point is returned. A System.Drawing.Point that specifies the coordinates for which to retrieve the working area.

y) GetWorkingArea

[C#] public static Rectangle GetWorkingArea(Rectangle rect);

[C++] public: static Rectangle GetWorkingArea(Rectangle rect);

[VB] Public Shared Function GetWorkingArea(ByVal rect As Rectangle) As Rectangle

[JScript] public static function GetWorkingArea(rect: Rectangle): Rectangle;

Description

Retrieves the working area for the display that contains the largest portion of the specified rectangle. The working area is the desktop area of the display, excluding taskbars, docked windows, and docked tool bars.

Return Value: A System.Drawing.Rectangle that specifies the working area. In multiple display environments where no display contains the specified rectangle, the display closest to the rectangle is returned. The System.Drawing.Rectangle that specifies the area for which to retrieve the working area.

z) ToString

[C#] public override string ToString( );

[C++] public: String* ToString( );

[VB] Overrides Public Function ToString( ) As String

[JScript] public override function ToString( ): String;

Description

Retrieves a string representing this object.

Return Value: A string representation of the object.

ScrollableControl class (System.Windows.Forms)

a) ToString

Description

Defines a base class for controls that support auto-scrolling behavior.

You do not typically use this class directly. The System.Windows.Forms.ContainerControl and System.Windows.Forms.Panel classes inherit from this class.

b) ToString

[C#] protected const int ScrollStateAutoScrolling;

[C++] protected: const int ScrollStateAutoScrolling;

[VB] Protected Const ScrollStateAutoScrolling As Integer

[JScript] protected var ScrollStateAutoScrolling: int;

Description c) ToString

[C#] protected const it ScrollStateFullDrag;

[C++] protected: const int ScrollStateFullDrag;

[VB] Protected Const ScrollStateFullDrag As Integer

[JScript] protected var ScrollStateFullDrag: int;

Description d) ToString

[C#] protected const int ScrollStateHScrollVisible;

[C++] protected: const int ScrollStateHScrollVisible;

[VB] Protected Const ScrollStateHScrollVisible As Integer

[JScript] protected var ScrollStateHScrollVisible: int;

Description e) ToString

[C#] protected const int ScrollStateUserHasScrolled;

[C++] protected: const int ScrollStateUserHasScrolled;

[VB] Protected Const ScrollStateUserHasScrolled As Integer

[JScript] protected var ScrollStateUserHasScrolled: int;

Description f) ToString

[C#] protected const int ScrollStateVScrollVisible;

[C++] protected: const int ScrollStateVScrollVisible;

[VB] Protected Const ScrollStateVScrollVisible As Integer

[JScript] protected var ScrollStateVScrollVisible: int;

Description g) ScrollableControl

Example Syntax:

h) ToString

[C#] public ScrollableControl( );

[C++] public: ScrollableControl( );

[VB] Public Sub New( )

[JScript] public function ScrollableControl( );

Description

Initializes a new instance of the System.Windows.Forms.ScrollableControl class.

i) AccessibilityObject j) AccessibleDefaultActionDescription k) AccessibleDescription l) AccessibleName m) AccessibleRole n) AllowDrop o) Anchor p) AutoScroll q) ToString Description Gets or sets a value indicating whether the container will allow the user to scroll to any controls placed outside of its visible boundaries.

When true, this property allows the container to have a virtual size that is larger than its visible boundaries.

r) AutoScrollMargin s) ToString

[C#] public Size AutoScrollMargin {get; set;}

[C++] public: _property Size get_AutoScrollMargin( ); public: _property void set_AutoScrollMargin(Size);

[VB] Public Property AutoScrollMargin As Size

[JScript] public function get AutoScrollMargin( ): Size; public function set AutoScrollMargin(Size);

Description

Gets or sets the size of the auto-scroll margin.

The auto-scroll-margin is the distance between any child controls and the edges of the scrollable parent control. The System.Windows.Forms.ScrollableControl.AutoScrollMargin size is added to the size of any child controls contained in the scrollable control to determine whether or not scroll bars are needed. The System.Windows.Forms.ScrollableControl.AutoScrollMargin property is evaluated when the parent scrollable control is resized or the individual child controls are brought into view, and is used to determine if scroll bars need to be displayed. Docked controls are excluded from the calculations that determine if scroll bars need to be displayed.

t) AutoScrollMinSize u) ToString

[C#] public Size AutoScrollMinSize {get; set;}

[C++] public: _property Size get_AutoScrollMinSize( ); public: _property void set_AutoScrollMinSize(Size);

[VB] Public Property AutoScrollMinSize As Size

[JScript] public function get AutoScrollMinSize( ): Size; public function set AutoScrollMinSize(Size);

Description

Gets or sets the minimum size of the auto-scroll.

The System.Windows.Forms.ScrollableControl.Auto ScrollMinSize property is used to manage the screen size allocated to the automatic scroll bars.

v) AutoScrollPosition w) ToString

[C#] public Point AutoScrollPosition {get; set;}

[C++] public: _property Point get_AutoScrollPosition( ); public: property void set_AutoScrollPosition(Point);

[VB] Public Property AutoScrollPosition As Point

[JScript] public function get AutoScrollPosition( ): Point; public function set AutoScrollPosition(Point);

Description

Gets or sets the location of the auto-scroll position.

The System.Windows.Forms.ScrollableControl.Auto ScrollPosition property is used to adjust the position of controls contained on the scrollable control.

x) BackColor y) BackgroundImage z) BindingContext aa) Bottom bb) Bounds cc) CanFocus dd) CanSelect ee) Capture ff) CausesValidation
gg) ClientRectangle
hh) ClientSize
ii) CompanyName
jj) Container
kk) ContainsFocus
ll) ContextMenu
mm) Controls
nn) Created
oo) CreateParams
pp) ToString Description Retrieves the CreateParams used to create the window. If a subclass overrides this function, it must call the base implementation.

qq) Cursor
rr) DataBindings
ss) DefaultImeMode
tt) DefaultSize
uu) DesignMode
vv) DisplayRectangle
ww) ToString Description Retrieves the current display rectangle. The display rectangle is the virtual display area that is used to layout components. The position and dimensions of the Form's display rectangle change during autoScroll.

xx) Disposing
yy) Dock
zz) DockPadding
aaa) ToString

Description

Gets the dock padding settings for all edges of the control.

This property controls the border inside of this control for docked components.

bbb) Enabled
ccc) Events
ddd) Focused
eee) Font
fff) FontHeight
ggg) ForeColor
hhh) Handle
iii) HasChildren
jjj) Height
kkk) HScroll
lll) ToString Description Gets or sets a value indicating whether the horizontal scroll bar is visible.

mmm) ImeMode
nnn) InvokeRequired
ooo) IsAccessible
ppp) IsDisposed
qqq) IsHandleCreated
rrr) Left
sss) Location
ttt) Name
uuu) Parent
vvv) ProductName
www) ProductVersion
xxx) RecreatingHandle
yyy) Region
zzz) RenderRightToLeft
aaaa) ResizeRedraw
bbbb) Right
cccc) RightToLeft
dddd) ShowFocusCues
eeee) ShowKeyboardCues
ffff) Site
gggg) Size
hhhh) TabIndex
iiii) TabStop
jjjj) Tag
kkkk) Text
llll) Top
mmmm) TopLevelControl
nnnn) Visible
oooo) VScroll
pppp) ToString Description Gets or sets a value indicating whether the vertical scroll bar is visible.

qqqq) Width
rrrr) WindowTarget
ssss) AdjustFormScrollbars

[C#] protected virtual void AdjustFormScrollbars(bool displayScrollbars);

[C++] protected: virtual void AdjustFormScrollbars(bool displayScrollbars);

[VB] Overridable Protected Sub AdjustFormScrollbars(ByVal displayScrollbars As Boolean)

[JScript] protected function AdjustFormScrollbars(displayScrollbars: Boolean);

Description

Adjusts the auto-scroll bars on the container based on the current control positions and the control currently selected. true to show the scroll bars; otherwise, false.

tttt) GetScrollState

[C#] protected bool GetScrollState(int bit);

[C++] protected: bool GetScrollState(int bit);

[VB] Protected Function GetScrollState(ByVal bit As Integer) As Boolean

[JScript] protected function GetScrollState(bit: int): Boolean;

Description

Tests a given scroll state bit to determine if it is set.

Return Value: true if the given bit is set; otherwise, false. The scroll state bit to test.

uuuu) OnLayout

[C#] protected override void OnLayout(LayoutEventArgs levent);

[C++] protected: void OnLayout(LayoutEventArgs* levent);

[VB] Overrides Protected Sub OnLayout(ByVal levent As LayoutEventArgs)

[JScript] protected override function OnLayout(levent: LayoutEventArgs);

Description

Forces the layout of any docked or anchored child controls.

vvvv) OnMouseWheel

[C#] protected override void OnMouseWheel(MouseEventArgs e);

[C++] protected: void OnMouseWheel(MouseEventArgs* e);

[VB] Overrides Protected Sub OnMouseWheel(ByVal e As MouseEventArgs)

[JScript] protected override function OnMouseWheel(e: MouseEventArgs);

Description

Handles mouse wheel processing for our scrollbars.

wwww) OnVisibleChanged

[C#] protected override void OnVisibleChanged(EventArgs e);

[C++] protected: void OnVisibleChanged(EventArgs* e)

[VB] Overrides Protected Sub OnVisibleChanged(ByVal e As EventArgs)

[JScript] protected override function OnVisibleChanged(e: EventArgs);

Description xxxx) ScaleCore

[C#] protected override void ScaleCore(float dx, float dy);

[C++] protected: void ScaleCore(float dx, float dy);

[VB] Overrides Protected Sub ScaleCore(ByVal dx As Single, ByVal dy As Single)

[JScript] protected override function ScaleCore(dx: float, dy: float);

Description yyyy) ScrollControlIntoView

[C#] public void ScrollControlIntoView(Control activeControl);

[C++] public: void ScrollControlIntoView(Control* activeControl);

[VB] Public Sub ScrollControlIntoView(ByVal activeControl As Control)

[JScript] public function ScrollControlIntoView(activeControl: Control);

Description

Scrolls the currently active control into view if we are an AutoScroll Form that has the Horiz or Vert scrollbar displayed . . . .

Description

Scrolls the currently active control into view if we are an AutoScroll Form that has the Horiz or Vert scrollbar displayed . . . .

zzzz) SetAutoScrollMargin

[C#] public void SetAutoScrollMargin(int x, int y);

[C++] public: void SetAutoScrollMargin(int x, int y);

[VB] Public Sub SetAutoScrollMargin(ByVal x As Integer, ByVal y As Integer)

[JScript] public function SetAutoScrollMargin(x: int, y: int);

Description

Sets the size of the auto-scroll margins.

The margin sets the width and height of the border around each control. This margin is used to determine when scroll bars are needed on the container and where to scroll to when a control is selected. The System.Drawing.Size.Width value. The System.Drawing.Size.Height value.

aaaaa) SetDisplayRectLocation

[C#] protected void SetDisplayRectLocation(int x, int y);

[C++] protected: void SetDisplayRectLocation(int x, int y);

[VB] Protected Sub SetDisplayRectLocation(ByVal x As Integer, ByVal y As Integer)

[JScript] protected function SetDisplayRectLocation(x: int, y: int);

Description

Adjusts the displayRect to be at the offset x, y. The contents of the Form is scrolled using Windows.ScrollWindowEx. X Offset (not delta!) Y Offset (not delta!)

bbbbb) SetScrollState

[C#] protected void SetScrollState(int bit, bool value);

[C++] protected: void SetScrollState(int bit, bool value);

[VB] Protected Sub SetScrollState(ByVal bit As Integer, ByVal value As Boolean)

[JScript] protected function SetScrollState(bit: int, value: Boolean);

Description

Sets a given scroll state bit. The scroll state bit to set. The value to set the bit.

ccccc) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

The button's window procedure. Inheriting classes can override this to add extra functionality, but should not forget to call base.wndProc(m); to ensure the button continues to function properly. A Windows Message Object.

ScrollBar class (System.Windows.Forms)

a) WndProc

Description

Implements the basic functionality of a scroll bar control.

You typically do not inherit directly from System.Windows.Forms.ScrollBar.

To create your own scroll bar class, inherit from the System.Windows.Forms.VScrollBar or System.Windows.Forms.HScrollBar class.

b) ScrollBar

Example Syntax:

c) WndProc

[C#] public ScrollBar( );

[C++] public: ScrollBar( );

[VB] Public Sub New( )

[JScript] public function ScrollBar( );

Description

Initializes a new instance of the System.Windows.Forms.ScrollBar class.

By default, the System.Windows.Forms.Control.TabStop property is set to false when a new instance of a System.Windows.Forms.ScrollBar is created.

d) AccessibilityObject
e) AccessibleDefaultActionDescription
f) AccessibleDescription
g) AccessibleName
h) AccessibleRole
i) AllowDrop
j) Anchor
k) BackColor
l) WndProc Description m) BackgroundImage
n) WndProc

[C#] public override Image BackgroundImage {get; set;}

[C++] public: _property virtual Image* get_BackgroundImage( ); public: _property virtual void set_BackgroundImage (Image*);

[VB] Overrides Public Property BackgroundImage As Image

[JScript] public function get BackgroundImage( ): Image; public function set BackgroundImage(Image);

Description o) BindingContext
p) Bottom
q) Bounds
r) CanFocus
s) CanSelect
t) Capture
u) CausesValidation
v) ClientRectangle
w) ClientSize
x) CompanyName
y) Container
z) ContainsFocus
aa) ContextMenu
bb) Controls
cc) Created
dd) CreateParams
ee) WndProc Description Retrieves the parameters needed to create the handle. Inheriting classes can override this to provide extra functionality. They should not, however, forget to call base.getCreateParams( ) first to get the struct filled up with the basic info.

ff) Cursor
gg) DataBindings
hh) DefaultImeMode
ii) WndProc

Description

Gets the default Input Method Editor(IME) mode supported by this control.

As implemented in the System.Windows.Forms.ScrollBar class, this property always returns the System.Windows.Forms.ImeMode.Disable value.

jj) DefaultSize
kk) DesignMode
ll) DisplayRectangle
mm) Disposing
nn) Dock
oo) Enabled
pp) Events
qq) Focused
rr) Font
ss) WndProc Description tt) FontHeight
uu) ForeColor
vv) WndProc Description Gets or sets the foreground color of the scroll bar control.

This property may only be changed programmatically, it is not visible in the Properties window.

ww) Handle
xx) HasChildren
yy) Height
zz) ImeMode
aaa) WndProc

Description

Gets or sets the Input Method Editor(IME) mode supported by this control.

bbb) InvokeRequired
ccc) IsAccessible
ddd) IsDisposed
eee) IsHandleCreated
fff) LargeChange
ggg) WndProc Description Gets or sets a value to be added to or subtracted from to the System.Windows.Forms.ScrollBar.Value property when the scroll box is moved a large distance.

When the user presses the PAGE UP or PAGE DOWN key or clicks in the scroll bar track on either side of the scroll box, the System.Windows.Forms.ScrollBar.Value property changes according to the value set in the System.Windows.Forms.ScrollBar.LargeChange property.

hhh) Left
iii) Location
jjj) Maximum
kkk) WndProc

Description

Gets or sets the upper limit of values of the scrollable range.

You might consider adjusting the System.Windows.Forms.ScrollBar.Maximum property dynamically to match the size of the scroll bar's parent. This can be in proportion to pixel size or number of rows or lines displayed, for example.

lll) Minimum
mmm) WndProc

[C#] public int Minimum {get; set;}

[C++] public: _property int get Minimum( ); public: _property void set_Minimum(int);

[VB] Public Property Minimum As Integer

[JScript] public function get Minimum( ): int; public function set Minimum(int);

Description

Gets or sets the lower limit of values of the scrollable range.

nnn) Name
ooo) Parent
ppp) ProductName
qqq) ProductVersion
rrr) RecreatingHandle
sss) Region
ttt) RenderRightToLeft
uuu) ResizeRedraw
vvv) Right
www) RightToLeft
xxx) ShowFocusCues
yyy) ShowKeyboardCues
zzz) Site
aaaa) Size
bbbb) SmallChange
cccc) WndProc Description Gets or sets the value to be added to or subtracted from to the System.Windows.Forms.ScrollBar.Value property when the scroll box is moved a small distance.

When the user presses one of the arrow keys or clicks one of the scroll bar buttons the System.Windows.Forms.ScrollBar. Value property changes according to the value set in the System.Windows.Forms.ScrollBar.SmallChange property.

dddd) TabIndex
eeee) TabStop
ffff) WndProc

Description gggg) Tag
hhhh) Text
iiii) WndProc

Description jjjj) Top
kkkk) TopLevelControl
llll) Value
mmmm) WndProc

Description

Gets or sets a numeric value that represents the current position of the scroll box on the scroll bar control.

nnnn) Visible
oooo) Width
pppp) WindowTarget
qqqq) WndProc
rrrr) WndProc
ssss) WndProc
tttt) WndProc
uuuu) WndProc Description Occurs when the scroll box has been moved by either a mouse or keyboard action.

For more information about handling events, see.

vvvv) WndProc

Description

Occurs when the System.Windows.Forms.ScrollBar.Value property has changed, either by a System.Windows.Forms. ScrollBar.Scroll event or programmatically.

For more information about handling events, see.

wwww) OnEnabledChanged

[C#] protected override void OnEnabledChanged(EventArgs e);

[C++] protected: void OnEnabledChanged(EventArgs* e);

[VB] Overrides Protected Sub OnEnabledChanged(ByVal e As EventArgs)

[JScript] protected override function OnEnabledChanged(e: EventArgs);

xxxx) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

Creates the handle. overridden to help set up scrollbar information.

yyyy) OnScroll

[C#] protected virtual void OnScroll(ScrollEventArgs se);

[C++] protected: virtual void OnScroll(ScrollEventArgs* se);

[VB] Overridable Protected Sub OnScroll(ByVal se As ScrollEventArgs)

[JScript] protected function OnScroll(se: ScrollEventArgs);

Description

Raises the System.Windows.Forms.ScrollBar.Scroll event.

Raising an event invokes the event handler through a delegate. For more information, see. A System.Windows.Forms.ScrollEventArgs that contains the event data.

zzzz) OnValueChanged

[C#] protected virtual void OnValueChanged(EventArgs e);

[C++] protected: virtual void OnValueChanged(EventArgs* e);

[VB] Overridable Protected Sub OnValueChanged(ByVal e As EventArgs)

[JScript] protected function OnValueChanged(e: Event Args);

Description

Raises the System.Windows.Forms.ScrollBar.ValueChanged event.

Raising an event invokes the event handier through a delegate. For more information, see. An System.EventArgs that contains the event data.

aaaaa) ToString

[C#] public override string ToString( );

[C++] public: String* ToString( );

[VB] Overrides Public Function ToString( ) As String

[JScript] public override function ToString( ): String;

Description bbbbb) UpdateScrollInfo

[C#] protected void UpdateScrollInfo( );

[C++] protected: void UpdateScrollInfo( );

[VB] Protected Sub UpdateScrollInfo( )

[JScript] protected function UpdateScrollInfo( );

Description

Internal helper method Internal helper method ccccc) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

ScrollBars enumeration (System.Windows.Forms)

a) WndProc

Description

Specifies which scroll bars will be visible on a control.

This enumeration is used by members such as System.Windows.Forms.TextBox.ScrollBars.

b) WndProc

[C#] public const ScrollBars Both;

[C++] public: const ScrollBars Both;

[VB] Public Const Both As ScrollBars

[JScript] public var Both: ScrollBars;

Description

Both horizontal and vertical scroll bars are shown.

c) WndProc

[C#] public const ScrollBars Horizontal;

[C++] public: const ScrollBars Horizontal;

[VB] Public Const Horizontal As ScrollBars

[JScript] public var Horizontal: ScrollBars;

Description

Only horizontal scroll bars are shown.

d) WndProc

[C#] public const ScrollBars None;

[C++] public: const ScrollBars None;

[VB] Public Const None As ScrollBars

[JScript] public var None: ScrollBars;

Description

No scroll bars are shown.

e) WndProc

[C#] public const ScrollBars Vertical;

[C++] public: const ScrollBars Vertical;

[VB] Public Const Vertical As ScrollBars

[JScript] public var Vertical: ScrollBars;

Description

Only vertical scroll bars are shown.

ScrollButton enumeration (System.Windows.Forms)

a) ToString

Description

Specifies the type of scroll arrow to draw on a scroll bar.

This enumeration is used by members such as System.Windows.Forms.ControlPaint.DrawScrollButton(System.Drawing.Graphics, System.Drawing.Rectangle, System.Windows.Forms.ScrollButton, System.Windows.Forms.ButtonState).

b) ToString

[C#] public const ScrollButton Down;

[C++] public: const ScrollButton Down;

[VB] Public Const Down As ScrollButton

[JScript] public var Down: ScrollButton;

Description

A down-scroll arrow.

c) ToString

[C#] public const ScrollButton Left;

[C++] public: const ScrollButton Left;

[VB] Public Const Left As ScrollButton

[JScript] public var Left: ScrollButton;

Description

A left-scroll arrow.

d) ToString

[C#] public const ScrollButton Max;

[C++] public: const ScrollButton Max;

[VB] Public Const Max As ScrollButton

[JScript] public var Max: ScrollButton;

Description

A maximum-scroll arrow.

e) ToString

[C#] public const ScrollButton Min;

[C++] public: const ScrollButton Min;

[VB] Public Const Min As ScrollButton

[JScript] public var Min: ScrollButton;

Description

A minimum-scroll arrow.

f) ToString

[C#] public const ScrollButton Right;

[C++] public: const ScrollButton Right;

[VB] Public Const Right As ScrollButton

[JScript] public var Right: ScrollButton;

Description

A right-scroll arrow.

g) ToString

[C#] public const ScrollButton Up;

[C++] public: const ScrollButton Up;

[VB] Public Const Up As ScrollButton

[JScript] public var Up: ScrollButton;

Description

An up-scroll arrow.

ScrollEventArgs class (System.Windows.Forms)

a) ToString

Description

Provides data for the System.Windows.Forms.ScrollBar-.Scroll event.

The System.Windows.Forms.ScrollBar.Scroll event occurs when the user changes the value of the scroll bar. This event can result from a variety of actions, such as clicking a scroll bar arrow, pressing the UP ARROW or DOWN ARROW, or dragging the scroll box. The System.Windows.Forms.S-crollEventArgs specifies the type of scroll event that occurred and the new value of the scroll bar.

b) ScrollEventArgs

Example Syntax:

c) ToString

[C#] public ScrollEventArgs(ScrollEventType type, int newValue);

[C++] public: ScrollEventArgs(ScrollEventType type, int newValue);

[VB] Public Sub New(ByVal type As ScrollEventType, ByVal newValue As Integer)

[JScript] public function ScrollEventArgs(type: ScrollEvent-Type, newValue: int); Initializes a new instance of the System.Windows.Forms.ScrollEventArgs class.

Description

Initializes a new instance of the System.Windows.Forms. ScrollEventArgs class. One of the System.Windows.Forms. ScrollEventType values. The new value for the scroll bar.

d) NewValue e) ToString

[C#] public int NewValue {get; set;}

[C++] public: _property int get_NewValue( ); public: _property void set_NewValue(int);

[VB] Public Property NewValue As Integer

[JScript] public function get NewValue( ): int; public function set NewValue(int);

Description

Gets or sets the new System.Windows.Forms.ScrollBar. Value of the scroll bar.

f) Type g) ToString

[C#] public ScrollEventType Type {get;}

[C++] public: _property ScrollEventType get_Type( );

[VB] Public ReadOnly Property Type As ScrollEventType

[JScript] public function get Type( ): ScrollEventType;

Description

Gets the type of scroll event that occurred.

ScrollEventHandler delegate (System.Windows.Forms)

a) ToString

Description

Represents the method that handles the Scroll event of a System.Windows.Forms.ScrollBar, System.Windows. Forms. TrackBar, or System.Windows.Forms.DataGrid. The source of the event. A System.Windows.Forms.ScrollEvent Args that contains the event data.

When you create a System.Windows.Forms.ScrollEventArgs delegate, you identify the method that will handle the event. To associate the event with your event handler, add an instance of the delegate to the event. The event handler is called whenever the event occurs, unless you remove the delegate. For more information about event handler delegates, see.

ScrollEventType enumeration (System.Windows.Forms)

a) ToString

Description

Specifies the type of action used to raise the System.Windows.Forms.ScrollBar.Scroll event.

This enumeration is used by members such as System.Windows.Forms.ScrollEventArgs.Type.

b) ToString

[C#] public const ScrollEventType EndScroll;

[C++] public: const ScrollEventType EndScroll;

[VB] Public Const EndScroll As ScrollEventType

[JScript] public var EndScroll: ScrollEventType;

Description

The scroll box has stopped moving.

c) ToString

[C#] public const ScrollEventType First;

[C++] public: const ScrollEventType First;

[VB] Public Const First As ScrollEventType

[JScript] public var First: ScrollEventType;

Description

The scroll box was moved to the System.Windows.Forms.S-crollBar.Minimum position.

d) ToString

[C#] public const ScrollEventType LargeDecrement;

[C++] public: const ScrollEventType LargeDecrement;

[VB] Public Const LargeDecrement As ScrollEventType

[JScript] public var LargeDecrement: ScrollEventType;

Description

The scroll box moved a large distance. The user clicked the scroll bar to the left(horizontal) or above(vertical) the scroll box, or pressed the PAGE UP key.

e) ToString

[C#] public const ScrollEventType LargeIncrement;

[C++] public: const ScrollEventType LargeIncrement;

[VB] Public Const LargeIncrement As ScrollEventType

[JScript] public var LargeIncrement: ScrollEventType;

Description

The scroll box moved a large distance. The user clicked the scroll bar to the right(horizontal) or below(vertical) the scroll box, or pressed the PAGE DOWN key.

f) ToString

[C#] public const ScrollEventType Last;

[C++] public: const ScrollEventType Last;

[VB] Public Const Last As ScrollEventType

[JScript] public var Last: ScrollEventType;

Description

The scroll box was moved to the System.Windows.Forms.ScrollBar.Maximum position.

g) ToString

[C#] public const ScrollEventType SmallDecrement;

[C++] public: const ScrollEventType SmallDecrement;

[VB] Public Const SmallDecrement As ScrollEventType

[JScript] public var SmallDecrement: ScrollEventType;

Description

The scroll box was moved a small distance. The user clicked the left(horizontal) or top(vertical) scroll arrow or pressed the UP ARROW key.

h) ToString

[C#] public const ScrollEventType SmallIncrement;

[C++] public: const ScrollEventType SmallIncrement;

[VB] Public Const SmallIncrement As ScrollEventType

[JScript] public var SmallIncrement: ScrollEventType;

Description

The scroll box was moved a small distance. The user clicked the right(horizontal) or bottom(vertical) scroll arrow or pressed the DOWN ARROW key.

i) ToString

[C#] public const ScrollEventType ThumbPosition;

[C++] public: const ScrollEventType ThumbPosition;

[VB] Public Const ThumbPosition As ScrollEventType

[JScript] public var ThumbPosition: ScrollEventType;

Description

The scroll box was moved.

j) ToString

[C#] public const ScrollEventType ThumbTrack;

[C++] public: const ScrollEventType ThumbTrack;

[VB] Public Const ThumbTrack As ScrollEventType

[JScript] public var ThumbTrack: ScrollEventType;

Description

The scroll box is currently being moved.

SecurityIDType enumeration (System.Windows.Forms)

a) ToString

Description b) ToString

[C#] public const SecurityIDType Alias;

[C++] public: const SecurityIDType Alias;

[VB] Public Const Alias As SecurityIDType

[JScript] public var Alias: SecurityIDType;

Description c) ToString

[C#] public const SecurityIDType Computer;

[C++] public: const SecurityIDType Computer;

[VB] Public Const Computer As SecurityIDType

[JScript] public var Computer SecurityIDType;

Description d) ToString

[C#] public const SecurityIDType DeletedAccount;

[C++] public: const SecurityIDType DeletedAccount;

[VB] Public Const DeletedAccount As SecurityIDType

[JScript] public var DeletedAccount: SecurityIDType;

Description e) ToString

[C#] public const SecurityIDType Domain;

[C++] public: const SecurityIDType Domain;

[VB] Public Const Domain As SecurityIDType

[JScript] public var Domain: SecurityIDType;

Description f) ToString

[C#] public const SecurityIDType Group;

[C++] public: const SecurityIDType Group;

[VB] Public Const Group As SecurityIDType

[JScript] public var Group: SecurityIDType;

Description g) ToString

[C#] public const SecurityIDType Invalid;

[C++] public: const SecurityIDType Invalid;

[VB] Public Const Invalid As SecurityIDType

[JScript] public var Invalid SecurityIDType;

Description h) ToString

[C#] public const SecurityIDType Unknown;

[C++] public: const SecurityIDType Unknown;

[VB] Public Const Unknown As SecurityIDType

[JScript] public var Unknown: SecurityIDType;

Description i) ToString

[C#] public const SecurityIDType User;

[C++] public: const SecurityIDType User;

[VB] Public Const User As SecurityIDType

[JScript] public var User: SecurityIDType;

Description j) ToString

[C#] public const SecurityIDType WellKnownGroup;

[C++] public: const SecurityIDType WellKnownGroup;

[VB] Public Const WellKnownGroup As SecurityIDType

[JScript] public var WellKnownGroup SecurityIDType;

Description

SelectedGridItemChangedEventArgs class (System.Windows.Forms)

a) ToString

Description

Provides data for the System.Windows.Forms.PropertyGrid.SelectedGridItemChanged event of the System.Windows.Forms.PropertyGrid control.

The System.Windows.Forms.PropertyGrid.Selected GridItemChanged event occurs when the user changes the System.Windows.Forms.GridItem that is selected in a System.Windows.Forms.PropertyGrid.

b) SelectedGridItemChangedEventArgs

Example Syntax:

c) ToString

[C#] public SelectedGridItemChangedEventArgs(GridItem oldSel, GridItem newSel);

[C++] public: SelectedGridItemChangedEventArgs(GridItem* oldSel, GridItem* newSel);

[VB] Public Sub New(ByVal oldSel As GridItem, ByVal newSel As GridItem)

[JScript] public function SelectedGridItemChangedEvent Args(oldSel: GridItem, newSel GridItem);

Description

Initializes a new instance of the System.Windows.Forms.SelectedGridItemChangedEventArgs class. The previously selected grid item. The newly selected grid item.

d) NewSelection e) ToString

[C#] public GridItem NewSelection {get;}

[C++] public: _property GridItem* get_NewSelection( );

[VB] Public ReadOnly Property NewSelection As GridItem

[JScript] public function get NewSelection( ): GridItem;

Description

Gets the newly selected System.Windows.Forms.GridItem object.

f) OldSelection g) ToString

[C#] public GridItem OldSelection {get;}

[C++] public: _property GridItem* get_OldSelection( );

[VB] Public ReadOnly Property OldSelection As GridItem

[JScript] public function get OldSelection( ): GridItem;

Description

Gets the previously selected System.Windows.Forms.GridItem object.

SelectedGridItemChangedEventHandler delegate (System.Windows.Forms)

a) ToString

Description

Represents the method that will handle the System.Windows.Forms.PropertyGrid.SelectedGridItemChanged event of a System.Windows.Forms.PropertyGrid. The source of the event. A System.Windows.Forms.SelectedGridItem ChangedEventArgs that contains the event data.

When you create a System.Windows.Forms.SelectedGridItemChangedEventHandler delegate, you identify the method that will handle the event. To associate the event with your event handler, add an instance of the delegate to the event. The event handler is called whenever the event occurs, unless you remove the delegate.

ListBox.SelectedIndexCollection class (System.Windows.Forms)

a) ToString

Description

Represents the collection containing the indices to the selected items in a System.Windows.Forms.ListBox.

The System.Windows.Forms.ListBox.Selected IndexCollection class stores the indices to the selected items in the System.Windows.Forms.ListBox. The indices stored in the System.Windows.Forms.ListBox.SelectedIndexCollection are index positions within the System.Windows.Forms.ListBox.ObjectCollection class. The System.Windows.Forms.ListBox.ObjectCollection class stores all items displayed in the System.Windows.Forms.ListBox.

b) ListBoxSelectedIndexCollection

Example Syntax:

c) ToString

[C#] public ListBox.SelectedIndexCollection(ListBox owner);

[C++] public: SelectedIndexCollection(ListBox* owner);

[VB] Public Sub New(ByVal owner As ListBox)

[JScript] public function ListBox.SelectedIndexCollection (owner: ListBox);

Description

Initializes a new instance of the System.Windows.Forms.ListBox.SelectedIndexCollection class.

You cannot create an instance of this class without associating it with a System.Windows.Forms.ListBox control. A System.Windows.Forms.ListBox representing the owner of the collection.

d) Count e) ToString

[C#] public int Count {get;}

[C++] public: _property int get_Count( );

[VB] Public ReadOnly Property Count As Integer

[JScript] public function get Count: int;

Description

Gets the number of items in the collection.

This property enables you to determine the number of selected items in the System.Windows.Forms.ListBox. You can then use this value when looping through the values of the collection and you need to provide a number of iterations to perform the loop. Unless the System.Windows.Forms.ListBox.SelectionMode property of the System.Windows.Forms.ListBox is set to SelectionMode.MultiSimple or SelectionMode.MultiExtended, this property always returns a value of zero (0) or one (1) depending on whether you have a selected item.

f) IsReadOnly
g) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the collection is read-only.

This property is always true for this collection. The items in this collection are modified only by the System.Windows.Forms.ListBox control.

h) Item
i) ToString

[C#] public int this[int index] {get;}

[C++] public: _property int get_Item(int index);

[VB] Public Default ReadOnly Property Item(ByVal index As Integer) As Integer

[JScript] returnValue=SelectedIndexCollectionObject.Item (index);

Description

Gets the index value at the specified index within this collection.

This indexer enables you to get a specific selected index from the System.Windows.Forms.ListBox.SelectedIndex Collection. The index stored in the collection is an index into the System.Windows.Forms.ListBox.ObjectCollection of the System.Windows.Forms.ListBox that represents a selected item in the System.Windows.Forms.ListBox. The index of the item in the collection to get.

j) Contains

[C#] public bool Contains(int selectedIndex);

[C++] public: bool Contains(int selectedIndex);

[VB] Public Function Contains(ByVal selectedIndex As Integer) As Boolean

[JScript] public function Contains(selectedIndex: int): Boolean;

Description

Determines whether the specified index is located within the collection.

Return Value: true if the specified index from the System.Windows.Forms.ListBox.ObjectCollection for the System.Windows.Forms.ListBox is an item in this collection; otherwise, false.

The System.Windows.Forms.ListBox.Selected IndexCollection.Contains(System.Int32) method enables you to determine whether an index position from the System.Windows.Forms.ListBox.ObjectCollection class is a member of the selected indices stored in the System.Windows.Forms.ListBox.SelectedIndexCollection. You can use this to determine whether a specific item in a multiple-selection System.Windows.Forms.ListBox is selected. The index to locate in the collection.

k) CopyTo

[C#] public void CopyTo(Array dest, int index);

[C++] public: _sealed void CopyTo(Array* dest, int index);

[VB] NotOverridable Public Sub CopyTo(ByVal dest As Array, ByVal index As Integer)

[JScript] public function CopyTo(dest: Array, index: int);

Description

Copies the entire collection into an existing array at a specified location within the array.

You can use this method to combine the selected indexes from multiple collections into a single array. The destination array. The index in the destination array at which storing begins.

l) GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumerator to use to iterate through the selected indices collection.

Return Value: An System.Collections.IEnumerator object that represents the selected indices collection.

m) IndexOf

[C#] public int IndexOf(int selectedIndex);

[C++] public: int IndexOf(int selectedIndex);

[VB] Public Function IndexOf(ByVal selectedIndex As Integer) As Integer

[JScript] public function IndexOf(selectedIndex: int): int;

Description

Returns the index within the System.Windows.Forms.ListBox.SelectedIndexCollection of the specified index from the System.Windows.Forms.ListBox.ObjectCollection of the System.Windows.Forms.ListBox.

Return Value: The zero-based index in the collection where the specified index of the System.Windows.Forms.ListBox.ObjectCollection was located within the System.Windows.Forms.ListBox.SelectedIndexCollection; otherwise, negative one (−1).

Once you know that an item is located within the collection (using the System.Windows.Forms.ListBox.Selected IndexCollection.Contains(System.Int32) method), you can use the System.Windows.Forms.ListBox.SelectedIndex Collection.IndexOf(System.Int32) method to determine where a specific index position within the System.Windows.Forms.ListBox.ObjectCollection for the System. Windows.Forms.ListBox is stored within the System.Windows.Forms.ListBox.SelectedIndexCollection. The zero-based index from the System.Windows.Forms.ListBox.ObjectCollection to locate in this collection.

n) IList.Add

[C#] int IList.Add(object value);

[C++] int IList::Add(Object* value);

[VB] Function Add(ByVal value As Object) As Integer Implements IList.Add

[JScript] function IList.Add(value: Object): int;

o) IList.Clear

[C#] void IList.Clear( );

[C++] void IList::Clear( );

[VB] Sub Clear( ) Implements IList.Clear

[JScript] function IList.Clear( );

p) IList.Contains

[C#] bool IList.Contains(object selectedIndex);

[C++] bool IList::Contains(Object* selectedIndex);

[VB] Function Contains(ByVal selectedIndex As Object) As Boolean Implements IList.Contains

[JScript] function IList.Contains(selectedIndex: Object): Boolean;

q) IList.IndexOf

[C#] int IList.IndexOf(object selectedIndex);

[C++] int IList::IndexOf(Object* selectedIndex);

[VB] Function IndexOf(ByVal selectedIndex As Object) As Integer Implements IList.IndexOf

[JScript] function IList.IndexOf(selectedIndex: Object): int;

r) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

s) IList.Remove

[C#] void IList.Remove(object value);

[C++] void IList::Remove(Object* value);

[VB] Sub Remove(ByVal value As Object) Implements IList.Remove

[JScript] function IList.Remove(value: Object);

t) IList.RemoveAt

[C#] void IList.RemoveAt(int index);

[C++] void IList::RemoveAt(int index);

[VB] Sub RemoveAt(ByVal index As Integer) Implements IList.RemoveAt

[JScript] function IList.RemoveAt(index: int);

ListView.SelectedIndexCollection class (System.Windows.Forms)

a) ToString

Description b) ListView.SelectedIndexCollection

Example Syntax:

c) ToString

[C#] public ListView.SelectedIndexCollection(ListView owner);

[C++] public: SelectedIndexCollection(ListView* owner);

[VB] Public Sub New(ByVal owner As ListView)

[JScript] public function ListView.SelectedIndexCollection (owner: ListView);

Description d) Count e) ToString

[C#] public int Count {get;}

[C++] public: _property int get_Count( );

[VB] Public ReadOnly Property Count As Integer

[JScript] public function get Count( ): int;

Description

Gets the number of currently selected items.

f) IsReadOnly g) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets whether the collection is read-only.

h) Item i) ToString

[C#] public int this[int index] {get;}

[C++] public: _property int get_Item(int index);

[VB] Public Default ReadOnly Property Item(ByVal index As Integer) As Integer

[JScript] returnValue=SelectedIndexCollectionObject.Item (index);

Description

Selected item in the list.

j) Contains

[C#] public bool Contains(int selectedIndex);

[C++] public: bool Contains(int selectedIndex);

[VB] Public Function Contains(ByVal selectedIndex As Integer) As Boolean

[JScript] public function Contains(selectedIndex: int): Boolean;

Description k) CopyTo

[C#] public void CopyTo(Array dest, int index);

[C++] public: _sealed void CopyTo(Array* dest, int index);

[VB] NotOverridable Public Sub CopyTo(ByVal dest As Array, ByVal index As Integer)

[JScript] public function CopyTo(dest: Array, index: int);

Description l) GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description m) IndexOf

[C#] public int IndexOf(int selectedIndex);

[C++] public: int IndexOf(int selectedIndex);

[VB] Public Function IndexOf(ByVal selectedIndex As Integer) As Integer

[JScript] public function IndexOf(selectedIndex: int): int;

Description n) IList.Add

[C#] int IList.Add(object value);

[C++] int IList::Add(Object* value);

[VB] Function Add(ByVal value As Object) As Integer Implements IList.Add

[JScript] function IList.Add(value: Object): int;

o) IList.Clear

[C#] void IList.Clear( );

[C++] void IList::Clear( );

[VB] Sub Clear( ) Implements IList.Clear

[JScript] function IList.Clear( );

p) IList.Contains

[C#] bool IList.Contains(object selectedIndex);

[C++] bool IList::Contains(Object* selectedIndex);

[VB] Function Contains(ByVal selectedIndex As Object) As Boolean Implements IList.Contains

[JScript] function IList.Contains(selectedIndex: Object): Boolean;

q) IList.IndexOf

[C#] int IList.IndexOf(object selectedIndex);

[C++] int IList::IndexOf(Object* selectedIndex);

[VB] Function IndexOf(ByVal selectedIndex As Object) As Integer Implements IList.IndexOf

[JScript] function IList.IndexOf(selectedIndex: Object): int;

r) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

s) IList.Remove

[C#] void IList.Remove(object value);

[C++] void IList::Remove(Object* value);

[VB] Sub Remove(ByVal value As Object) Implements IList.Remove

[JScript] function IList.Remove(value: Object);

t) IList.RemoveAt

[C#] void IList.RemoveAt(int index);

[C++] void IList::RemoveAt(int index);

[VB] Sub RemoveAt(ByVal index As Integer) Implements IList.RemoveAt

[JScript] function IList.RemoveAt(index: int);

ListView.SelectedListViewItemCollection class (System.Windows.Forms)

a) ToString

Description b) ListView.SelectedListViewItemCollection

Example Syntax:

c) ToString

[C#] public ListView.SelectedListViewItemCollection(ListView owner);

[C++] public: SelectedListViewItemCollection(ListView* owner);

[VB] Public Sub New(ByVal owner As ListView)

[JScript] public function ListView.SelectedListViewItemCollection(owner ListView);

Description d) Count e) ToString

[C#] public int Count {get;}

[C++] public: _property int get_Count( );

[VB] Public ReadOnly Property Count As Integer

[JScript] public function get Count( ): int;

Description

Gets the number of currently selected items.

f) IsReadOnly g) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description h) Item i) ToString

[C#] public ListViewItem this[int index] {get;}

[C++] public: _property ListViewItem* get_Item(int index);

[VB] Public Default ReadOnly Property Item(ByVal index As Integer) As ListViewItem

[JScript] returnValue=SelectedListViewItemCollectionObject.Item(index);

Description

Selected item in the list.

j) Clear

[C#] public void Clear( );

[C++] public: _sealed void Clear( );

[VB] NotOverridable Public Sub Clear( )

[JScript] public function Clear( );

Description

Unselects all items.

k) Contains

[C#] public bool Contains(ListViewItem item);

[C++] public: bool Contains(ListViewItem* item);

[VB] Public Function Contains(ByVal item As ListView Item) As Boolean

[JScript] public function Contains(item: ListViewItem): Boolean;

Description l) CopyTo

[C#] public void CopyTo(Array dest, int index);

[C++] public: _sealed void CopyTo(Array* dest, int index);

[VB] NotOverridable Public Sub CopyTo(ByVal dest As Array, ByVal index As Integer)

[JScript] public function CopyTo(dest: Array, index: int);

Description m) GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description n) IndexOf

[C#] public int IndexOf(ListViewItem item);

[C++] public: int IndexOf(ListViewItem* item);

[VB] Public Function IndexOf(ByVal item As ListViewItem) As Integer

[JScript] public function IndexOf(item: ListViewItem): int;

Description o) IList.Add

[C#] int IList.Add(object value);

[C++] int IList::Add(Object* value);

[VB] Function Add(ByVal value As Object) As Integer Implements IList.Add

[JScript] function IList.Add(value: Object): int;

p) IList.Contains

[C#] bool IList.Contains(object item);

[C++] bool IList::Contains(Object* item);

[VB] Function Contains(ByVal item As Object) As Boolean Implements IList.Contains

[JScript] function IList.Contains(item: Object): Boolean;

q) IList.IndexOf

[C#] int IList.IndexOf(object item);

[C++] int IList::IndexOf(Object* item);

[VB] Function IndexOf(ByVal item As Object) As Integer Implements IList.IndexOf

[JScript] function IList.IndexOf(item: Object): int;

r) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index int, value: Object);

s) IList.Remove

[C#] void IList.Remove(object value);

[C++] void IList::Remove(Object* value);

[VB] Sub Remove(ByVal value As Object) Implements IList.Remove

[JScript] function IList.Remove(value: Object);

t) IList.RemoveAt

[C#] void IList.RemoveAt(int index);

[C++] void IList::RemoveAt(int index);

[VB] Sub RemoveAt(ByVal index As Integer) Implements IList.RemoveAt

[JScript] function IList.RemoveAt(index: int);

ListBox.SelectedObjectCollection class (System.Windows.Forms)

a) ToString

Description

Represents the collection of selected items in the System.Windows.Forms.ListBox.

The System.Windows.Forms.ListBox.Selected ObjectCollection class stores the selected items in the System.Windows.Forms.ListBox. The items stored in the System.Windows.Forms.ListBox.SelectedObjectCollection are items contained within the System.Windows.Forms.ListBox.ObjectCollection class. The System.Windows.Forms.ListBox.ObjectCollection class stores all items displayed in the System.Windows.Forms.ListBox.

b) ListBox.SelectedObjectCollection

Example Syntax:

c) ToString

[C#] public ListBox.SelectedObjectCollection(ListBox owner);

[C++] public: SelectedObjectCollection(ListBox* owner);

[VB] Public Sub New(ByVal owner As ListBox)

[JScript] public function ListBox.SelectedObjectCollection (owner: ListBox);

Description

Initializes a new instance of the System.Windows.Forms.ListBox.SelectedObjectCollection class.

An instance of this class cannot be created without associating it with a System.Windows.Forms.ListBox control. A System.Windows.Forms.ListBox representing the owner of the collection.

d) Count e) ToString

[C#] public int Count {get;}

[C++] public: _property int get Count( );

[VB] Public ReadOnly Property Count As Integer

[JScript] public function get Count( ): int;

Description

Gets the number of items in the collection.

This property enables you to determine the number of selected items in the System.Windows.Forms.ListBox. You can then use this value when looping through the values of the collection and you need to provide a number of iterations to perform the loop. Unless the System.Windows.Forms.ListBox.SelectionMode property of the System.Windows.Forms.ListBox is set to SelectionMode.MultiSimple or SelectionMode.MultiExtended, this property always returns a value of zero (0) or one (1) depending on whether you have a selected item.

f) IsReadOnly g) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the collection is read-only.

This property is always true for this collection.

h) Item i) ToString

[C#] public object this[int index] {get; set;}

[C++] public: property Object* get_Item(int index); public: _property void set_Item(int index, Object*);

[VB] Public Default Property Item(ByVal index As Integer) As Object

[JScript] returnValue=SelectedObjectCollectionObject.Item (index); SelectedObjectCollectionObject.Item (index)=returnValue;

Description

Gets the item at the specified index within the collection.

This indexer enables you to get a specific item from the System.Windows.Forms.ListBox.SelectedObjectCollection. The item stored in this collection is an item within the System.Windows.Forms.ListBox.ObjectCollection of the System.Windows.Forms.ListBox that represents a selected item in the System.Windows.Forms.ListBox. The index of the item in the collection to retrieve.

j) Contains

[C#] public bool Contains(object selectedObject);

[C++] public: _sealed bool Contains(Object* selectedObject);

[VB] NotOverridable Public Function Contains(ByVal selectedObject As Object) As Boolean

[JScript] public function Contains(selectedObject: Object): Boolean;

Description

Determines whether the specified item is located within the collection.

Return Value: true if the specified item is located in the collection; otherwise, false.

The System.Windows.Forms.ListBox.Selected ObjectCollection.Contains(System.Object) method enables you to determine whether an item from the System.Windows.Forms.ListBox.ObjectCollection class is a member of the selected items stored in the System.Windows.Forms.ListBox.SelectedObjectCollection. You can use this to determine if a specific item in a multiple-selection System.Windows.Forms.ListBox is selected. An object representing the item to locate in the collection.

k) CopyTo

[C#] public void CopyTo(Array dest, int index);

[C++] public: sealed void CopyTo(Array* dest, int index);

[VB] NotOverridable Public Sub CopyTo(ByVal dest As Array, ByVal index As Integer)

[JScript] public function CopyTo(dest: Array, index: int);

Description

Copies the entire collection into an existing array at a specified location within the array.

You can use this method to combine the selected indexes from multiple collections into a single array. An System.Array representing the array to copy the contents of the collection to. The location within the destination array to copy the items from the collection to.

l) GetEnumerator

[C#] public IEnumerator GetEnumerator( );

[C++] public: sealed IEnumerator* GetEnumerator( );

[VB] NotOverridable Public Function GetEnumerator( ) As IEnumerator

[JScript] public function GetEnumerator( ): IEnumerator;

Description

Returns an enumerator that can be used to iterate through the selected item collection.

Return Value: An System.Collections.IEnumerator object that represents the item collection.

m) IndexOf

[C#] public int IndexOf(object selectedObject);

[C++] public: _sealed int IndexOf(Object* selectedObject);

[VB] NotOverridable Public Function IndexOf(ByVal selectedObject As Object) As Integer

[JScript] public function IndexOf(selectedObject: Object): int;

Description

Returns the index within the collection of the specified item.

Return Value The zero-based index of the item in the collection; otherwise, -1.

Once you know that an item is located within the collection (using the System.Windows.Forms.ListBox.Selected ObjectCollection.Contains(System.Object) method), you can use the System.Windows.Forms.ListBox.SelectedObjectCollection.IndexOf(System.Object) method to determine where a specific item within the System.Windows.Forms.ListBox.ObjectCollection for the System.Windows.Forms.ListBox is stored within the System.Windows.Forms.ListBox.SelectedObjectCollection. An object representing the item to locate in the collection.

n) IList.Add

[C#] int IList.Add(object value);

[C++] int IList::Add(Object* value);

[VB] Function Add(ByVal value As Object) As Integer Implements IList.Add

[JScript] function IList.Add(value: Object): int;

o) IList.Clear

[C#] void IList.Clear( );

[C++] void IList::Clear( );

[VB] Sub Clear( ) Implements IList.Clear

[JScript] function IList.Clear( );

p) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

q) IList.Remove

[C#] void IList.Remove(object value);

[C++] void IList::Remove(Object* value);

[VB] Sub Remove(ByVal value As Object) Implements IList.Remove

[JScript] function IList.Remove(value: Object);

r) IList.RemoveAt

[C#] void IList.RemoveAt(int index);

[C++] void IList::RemoveAt(int index);

[VB] Sub RemoveAt(ByVal index As Integer) Implements IList.RemoveAt

[JScript] function IList.RemoveAt(index: int);

SelectionMode enumeration (System.Windows.Forms)

a) ToString

Description

Specifies the selection behavior of a list box.

This enumeration is used by classes such as System.Windows.Forms.ListBox and System.Windows.Forms.CheckedListBox.

b) ToString

[C#] public const SelectionMode MultiExtended;

[C++] public: const SelectionMode MultiExtended;

[VB] Public Const MultiExtended As SelectionMode

[JScript] public var MultiExtended: SelectionMode;

Description

Multiple items can be selected, and the user can use the SHIFT, CTRL, and arrow keys to make selections Indicates that more than one item at a time can be selected, and keyboard combinations, such as SHIFT and CTRL can be used to help in selection.

c) ToString

[C#] public const SelectionMode MultiSimple;

[C++] public: const SelectionMode MultiSimple;

[VB] Public Const MultiSimple As SelectionMode

[JScript] public var MultiSimple: SelectionMode;

Description

Multiple items can be selected.

d) ToString

[C#] public const SelectionMode None;

[C++] public: const SelectionMode None;

[VB] Public Const None As SelectionMode

[JScript] public var None: SelectionMode;

Description

No items can be selected.

e) ToString

[C#] public const SelectionMode One;

[C++] public: const SelectionMode One;

[VB] Public Const One As SelectionMode

[JScript] public var One: SelectionMode;

Description

Only one item can be selected.

SelectionRange class (System.Windows.Forms)

a) ToString

Description

Represents a date selection range in a month calendar control.

The System.Windows.Forms.SelectionRange is the date or dates selected and highlighted on the System.Windows.Forms.MonthCalendar control. If only one date is selected, the System.Windows.Forms.SelectionRange.Start and System.Windows.Forms.SelectionRange.End property values will be equal. The System.Windows.Forms.SelectionRange may be changed by the user 23 clicking a date while dragging the mouse pointer across the desired dates, or you 24 can set the range in code. For example, you may want to have the user enter a date range into two System.Windows.Forms.TextBox controls or two System.Windows.Forms.DateTimePicker controls and set the System.Windows.Forms.SelectionRange based on those dates.

b) SelectionRange

Example Syntax:

c) ToString

[C#] public SelectionRange( );

[C++] public: SelectionRange( );

[VB] Public Sub New( )

[JScript] public function SelectionRange( ); Initializes a new instance of the System.Windows.Forms.SelectionRange class.

Description

Initializes a new instance of the System.Windows.Forms.SelectionRange class.

The System.Windows.Forms.SelectionRange.Start and System.Windows.Forms.SelectionRange.End values are set to null when this constructor is used.

d) SelectionRange

Example Syntax:

e) ToString

[C#] public SelectionRange(SelectionRange range);

[C++] public: SelectionRange(SelectionRange* range);

[VB] Public Sub New(ByVal range As SelectionRange)

[JScript] public function SelectionRange(range: SelectionRange);

Description

Initializes a new instance of the System.Windows.Forms.SelectionRange class with the specified selection range.

The System.Windows.Forms.SelectionRange.Start and System.Windows.Forms.SelectionRange.End property values are assigned the System.Windows.Forms.SelectionRange.Start and System.Windows.Forms.SelectionRange.End property values of the assigned System.Windows.Forms.SelectionRange object. The existing System.Windows.Forms.SelectionRange object.

f) SelectionRange

Example Syntax:

g) ToString

[C#] public SelectionRange(DateTime lower, DateTime upper);

[C++] public: SelectionRange(DateTime lower, DateTime upper);

[VB] Public Sub New(ByVal lower As DateTime, ByVal upper As DateTime)

[JScript] public function SelectionRange(lower: DateTime, upper: DateTime);

Description

Initializes a new instance of the System.Windows.Forms.SelectionRange class with the specified beginning and ending dates.

If the lower System.DateTime value is greater than the upper System.DateTime value, the lower value will be assigned to the System.Windows.Forms.SelectionRange.End property instead of the System.Windows.Forms.SelectionRange.Start property. The starting date in the System.Windows.Forms.SelectionRange. The ending date in the System.Windows.Forms.SelectionRange.

h) End i) ToString

[C#] public DateTime End {get; set;}

[C++] public: _property DateTime get_End( ); public: property void set_End(DateTime);

[VB] Public Property End As DateTime

[JScript] public function get End( ): DateTime; public function set End(DateTime);

Description

Gets or sets the ending date and time of the selection range.

j) Start k) ToString

[C#] public DateTime Start {get; set;}

[C++] public: _property DateTime get_Start( ); public: _property void set Start(DateTime);

[VB] Public Property Start As DateTime

[JScript] public function get Start( ): DateTime; public function set Start(DateTime);

Description

Gets or sets the starting date and time of the selection range.

l) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

SelectionRangeConverter class (System.Windows.Forms)

a) ToString

Description

Provides a type converter to convert System.Windows.Forms.SelectionRange objects to and from various other representations.

For more information about type converters, see the System.ComponentModel.TypeConverter base class and.

b) SelectionRangeConverter

Example Syntax:

c) ToString

[C#] public SelectionRangeConverter( );

[C++] public: SelectionRangeConverter( );

[VB] Public Sub New( )

[JScript] public function SelectionRangeConverter( );

d) CanConvertFrom

[C#] public override bool CanConvertFrom(ITypeDescriptorContext context, Type sourceType);

[C++] public: bool CanConvertFrom(ITypeDescriptorContext* context, Type* sourceType);

[VB] Overrides Public Function CanConvertFrom(ByVal context As ITypeDescriptorContext, ByVal sourceType As Type) As Boolean

[JScript] public override function CanConvertFrom(context: ITypeDescriptorContext, sourceType: Type): Boolean;

Description

Determines if this converter can convert an object in the given source type to the native type of the converter.

Return Value: True if this object can perform the conversion.

e) CanConvertTo

[C#] public override bool CanConvertTo(ITypeDescriptorContext context, Type destinationType);

[C++] public: bool CanConvertTo(ITypeDescriptorContext* context, Type* destinationType);

[VB] Overrides Public Function CanConvertTo(ByVal context As ITypeDescriptorContext, ByVal destinationType As Type) As Boolean

[JScript] public override function CanConvertTo(context: ITypeDescriptorContext, destinationType: Type): Boolean;

Description

Gets a value indicating whether this converter can convert an object to the given destination type using the context.

Return Value: true if this converter can perform the conversion; otherwise, false.

The context parameter can be used to extract additional information about the environment this converter is being invoked from. This can be null, so always check. Also, properties on the context object can return null.

f) ConvertFrom

[C#] public override object ConvertFrom(ITypeDescriptorContext context, CultureInfo culture, object value);

[C++] public: Object* ConvertFrom(ITypeDescriptorContext* context, CultureInfo* culture, Object* value);

[VB] Overrides Public Function ConvertFrom(ByVal context As ITypeDescriptorContext, ByVal culture As CultureInfo, ByVal value As Object) As Object

[JScript] public override function ConvertFrom(context: ITypeDescriptorContext, culture: CultureInfo, value: Object): Object;

Description

Converts the given object to the converter's native type.

Return Value: The converted object. This will throw an exception if the conversion could not be performed.

g) ConvertTo

[C#] public override object ConvertTo(ITypeDescriptorContext context, CultureInfo culture, object value, Type destinationType);

[C++] public: Object* ConvertTo(ITypeDescriptorContext* context, CultureInfo* culture, Object* value, Type* destinationType);

[VB] Overrides Public Function ConvertTo(ByVal context As ITypeDescriptorContext, ByVal culture As CultureInfo, ByVal value As Object, ByVal destinationType As Type) As Object

[JScript] public override function ConvertTo(context: ITypeDescriptorContext, culture: CultureInfo, value: Object, destinationType: Type): Object;

Description

Converts the given object to another type. The most common types to convert are to and from a string object. The default implementation will make a call to ToString on the object if the object is valid and if the destination type is string. If this cannot convert to the destination type, this will throw a NotSupportedException.

Return Value: The converted object.

h) CreateInstance

[C#] public override object CreateInstance(ITypeDescriptorContext context, IDictionary propertyValues);

[C++] public: Object* CreateInstance(ITypeDescriptorContext* context, IDictionary* propertyValues);

[VB] Overrides Public Function CreateInstance(ByVal context As ITypeDescriptorContext, ByVal propertyValues As IDictionary) As Object

[JScript] public override function CreateInstance(context ITypeDescriptorContext, propertyValues: IDictionary): Object;

Description

Creates an instance of this type given a set of property values for the object. This is useful for objects that are immutable, but still want to provide changable properties.

Return Value The newly created object, or null if the object could not be created. The default implementation returns null.

i) GetCreateInstanceSupported

[C#] public override bool GetCreateInstanceSupported (ITypeDescriptorContext context);

[C++] public: bool GetCreateInstanceSupported(ITypeDescriptorContext* context);

[VB] Overrides Public Function GetCreateInstanceSupported(ByVal context As ITypeDescriptorContext) As Boolean

[JScript] public override function GetCreateInstanceSupported(context: ITypeDescriptorContext): Boolean;

Description

Determines if changing a value on this object should require a call to CreateInstance to create a new value.

Return Value. Returns true if CreateInstance should be called when a change is made to one or more properties of this object.

j) GetProperties

[C#] public override PropertyDescriptorCollection GetProperties(ITypeDescriptorContext context, object value, Attribute[ ] attributes);

[C++] public: PropertyDescriptorCollection* GetProperties (ITypeDescriptorContext* context, Object* value, Attribute* attributes[ ]);

[VB] Overrides Public Function GetProperties(ByVal context As ITypeDescriptorContext, ByVal value As Object, ByVal attributes( ) As Attribute) As PropertyDescriptorCollection

[JScript] public override function GetProperties(context: ITypeDescriptorContext, value: Object, attributes: Attribute[ ]): PropertyDescriptorCollection;

Description

Retrieves the set of properties for this type. By default, a type has does not return any properties. An easy implementation of this method can just call TypeDescriptor.GetProperties for the correct data type.

Return Value: The set of properties that should be exposed for this data type. If no properties should be exposed, this may return null. The default implementation always returns null.

k) GetPropertiesSupported

[C#] public override bool GetPropertiesSupported(ITypeDescriptorContext context);

[C++] public: bool GetPropertiesSupported(ITypeDescriptorContext* context);

[VB] Overrides Public Function GetPropertiesSupported (ByVal context As ITypeDescriptorContext) As Boolean

[JScript] public override function GetPropertiesSupported (context: ITypeDescriptorContext): Boolean;

Description

Determines if this object supports properties. By default, this is false.

Return Value: Returns true if GetProperties should be called to find the properties of this object.

SendKeys class (System.Windows.Forms)

a) ToString

Description

Provides methods for sending keystrokes to an application.

Use System.Windows.Forms.SendKeys to send keystrokes and keystroke combinations to the active application. This class cannot be instantiated. To send a keystroke to a class and immediately continue with the flow of your program, use System.Windows.Forms.SendKeys.Send(System.String) To wait for any processes started by the keystroke, use System. Windows.Forms.SendKeys.SendWait(System.String).

b) Flush

[C#] public static void Flush( );

[C++] public: static void Flush( );

[VB] Public Shared Sub Flush( )

[JScript] public static function Flush( );

Description

Processes all the Windows messages currently in the message queue.

Because there is no managed method to activate another application, you can either use this class within the current application or use native Windows methods, such as Find-Window and SetForegroundWindow, to force focus on other applications.

c) Send

[C#] public static void Send(string keys);

[C++] public: static void Send(String* keys);

[VB] Public Shared Sub Send(ByVal keys As String)

[JScript] public static function Send(keys: String);

Description

Sends keystrokes to the active application.

Each key is represented by one or more characters. To specify a single keyboard character, use the character itself. For example, to represent the letter A, pass in the string "A" to the method. To represent more than one character, append each additional character to the one preceding it. To represent the letters A, B, and C, specify the parameter as "ABC". The string of keystrokes to send.

d) SendWait

[C#] public static void SendWait(string keys);

[C++] public: static void SendWait(String* keys);

[VB] Public Shared Sub SendWait(ByVal keys As String)

[JScript] public static function SendWait(keys: String);

Description

Sends the given keys to the active application, and then waits for the messages to be processed.

Use System.Windows.Forms.SendKeys.SendWait(System. String) to send keystrokes or combinations of keystrokes to the active application and wait for the keystroke messages to be processed. You can use this method to send keystrokes to an application and wait for any processes that are started by the keystrokes to be completed. This can be important if the other application must finish before your application can continue. The string of keystrokes to send.

Shortcut enumeration (System.Windows.Forms)

a) ToString

Description

Specifies shortcut keys that can be used by menu items.

Use the members of this enumeration to set the value of the System.Windows.Forms.MenuItem.Shortcut property of the System.Windows.Forms.MenuItem class.

b) ToString

[C#] public const Shortcut Alt0;

[C++] public: const Shortcut Alt0

[VB] Public Const Alt0 As Shortcut

[JScript] public var Alt0: Shortcut;

Description

The shortcut keys ALT+0.

c) ToString

[C+] public const Shortcut Alt1;

[C++] public: const Shortcut Alt1;

[VB] Public Const Alt1 As Shortcut

[JScript] public var Alt1: Shortcut;

Description

The shortcut keys ALT+1.

d) ToString

[C#] public const Shortcut Alt2;

[C++] public: const Shortcut Alt2;

[VB] Public Const Alt2 As Shortcut

[JScript] public var Alt2: Shortcut;

Description

The shortcut keys ALT+2.

e) ToString

[C#] public const Shortcut Alt3;

[C++] public: const Shortcut Alt3;

[VB] Public Const Alt3 As Shortcut

[JScript] public var Alt3: Shortcut;

Description

The shortcut keys ALT+3.

f) ToString

[C#] public const Shortcut Alt4;

[C++] public: const Shortcut Alt4;

[VB] Public Const Alt4 As Shortcut

[JScript] public var Alt4: Shortcut;

Description

The shortcut keys ALT+4.

g) ToString

[C#] public const Shortcut Alt5;

[C++] public: const Shortcut Alt5;

[VB] Public Const Alt5 As Shortcut

[JScript] public var Alt5: Shortcut;

Description

The shortcut keys ALT+5.

h) ToString

[C#] public const Shortcut Alt6;

[C++] public: const Shortcut Alt6;

[VB] Public Const Alt6 As Shortcut

[JScript] public var Alt6: Shortcut;

Description

The shortcut keys ALT+6.

i) ToString

[C#] public const Shortcut Alt7;

[C++] public: const Shortcut Alt7;

[VB] Public Const Alt7 As Shortcut

[JScript] public var Alt7: Shortcut;

Description

The shortcut keys ALT+7.

j) ToString

[C#] public const Shortcut Alt8;

[C++] public: const Shortcut Alt8;

[VB] Public Const Alt8 As Shortcut

[JScript] public var Alt8: Shortcut;

Description

The shortcut keys ALT+8.

k) ToString

[C#] public const Shortcut Alt9;

[C++] public: const Shortcut Alt9;

[VB] Public Const Alt9 As Shortcut

[JScript] public var Alt9: Shortcut;

Description

The shortcut keys ALT+9.

l) ToString

[C#] public const Shortcut AltBksp;

[C++] public: const Shortcut AltBksp;

[VB] Public Const AltBksp As Shortcut

[JScript] public var AltBksp: Shortcut;

Description

The shortcut keys ALT+BACKSPACE.

m) ToString

[C#] public const Shortcut AltF1;

[C++] public: const Shortcut AltF1;

[VB] Public Const AltF1 As Shortcut

[JScript] public var AltF1: Shortcut;

Description

The shortcut keys ALT+F1.

n) ToString

[C#] public const Shortcut AltF10;

[C++] public: const Shortcut AltF10;

[VB] Public Const AltF10 As Shortcut

[JScript] public var AltF10: Shortcut;

Description

The shortcut keys ALT+F10.

o) ToString

[C#] public const Shortcut AltF11;

[C++] public: const Shortcut AltF11;

[VB] Public Const AltF11 As Shortcut

[JScript] public var AltF11: Shortcut;

Description

The shortcut keys ALT+F11.

p) ToString

[C#] public const Shortcut AltF12;

[C++] public: const Shortcut AltF12;

[VB] Public Const AltF12 As Shortcut

[JScript] public var AltF12: Shortcut;

Description

The shortcut keys ALT+F12.

q) ToString

[C#] public const Shortcut AltF2;

[C++] public: const Shortcut AltF2;

[VB] Public Const AltF2 As Shortcut

[JScript] public var AltF2: Shortcut;

Description

The shortcut keys ALT+F2.

r) ToString

[C#] public const Shortcut AltF3;

[C++] public: const Shortcut AltF3;

[VB] Public Const AltF3 As Shortcut

[JScript] public var AltF3: Shortcut;

Description

The shortcut keys ALT+F3.

s) ToString

[C#] public const Shortcut AltF4;

[C++] public: const Shortcut AltF4;

[VB] Public Const AltF4 As Shortcut

[JScript] public var AltF4: Shortcut;

Description

The shortcut keys ALT+F4.

t) ToString

[C#] public const Shortcut AltF5;

[C++] public: const Shortcut AltF5;

[VB] Public Const AltF5 As Shortcut

[JScript] public var AltF5: Shortcut;

Description

The shortcut keys ALT+F5.

u) ToString

[C#] public const Shortcut AltF6;

[C++] public: const Shortcut AltF6;

[VB] Public Const AltF6 As Shortcut

[JScript] public var AltF6: Shortcut;

Description

The shortcut keys ALT+F6.

v) ToString

[C#] public const Shortcut AltF7;

[C++] public: const Shortcut AltF7;

[VB] Public Const AltF7 As Shortcut

[JScript] public var AltF7: Shortcut;

Description

The shortcut keys ALT+F7.

w) ToString

[C#] public const Shortcut AltF8;

[C++] public: const Shortcut AltF8;

[VB] Public Const AltF8 As Shortcut

[JScript] public var AltF8: Shortcut;

Description

The shortcut keys ALT+F8.

x) ToString

[C#] public const Shortcut AltF9;

[C++] public: const Shortcut AltF9;

[VB] Public Const AltF9 As Shortcut

[JScript] public var AltF9: Shortcut;

Description

The shortcut keys ALT+F9.

y) ToString

[C#] public const Shortcut Ctrl0;

[C++] public: const Shortcut Ctrl0;

[VB] Public Const Ctrl0 As Shortcut

[JScript] public var Ctrl0: Shortcut;

Description

The shortcut keys CTRL+0.

z) ToString

[C#] public const Shortcut Ctrl1;

[C++] public: const Shortcut Ctrl1;

[VB] Public Const Ctrl1 As Shortcut

[JScript] public var Ctrl1: Shortcut;

Description

The shortcut keys CTRL+1.

aa) ToString

[C#] public const Shortcut Ctrl2;

[C++] public: const Shortcut Ctrl2;

[VB] Public Const Ctrl2 As Shortcut

[JScript] public var Ctrl2:Shortcut;

Description

The shortcut keys CTRL+2.

bb) ToString

[C#] public const Shortcut Ctrl3;

[C++] public: const Shortcut Ctrl3;

[VB] Public Const Ctrl3 As Shortcut

[JScript] public var Ctrl3: Shortcut;

Description

The shortcut keys CTRL+3.

cc) ToString

[C#] public const Shortcut Ctrl4;

[C++] public: const Shortcut Ctrl4;

[VB] Public Const Ctrl4 As Shortcut

[JScript] public var Ctrl4: Shortcut;

Description

The shortcut keys CTRL+4.

dd) ToString

[C#] public const Shortcut Ctrl5;

[C++] public: const Shortcut Ctrl5;

[VB] Public Const Ctrl5 As Shortcut

[JScript] public var Ctrl5: Shortcut;

Description

The shortcut keys CTRL+5.

ee) ToString

[C#] public const Shortcut Ctrl6;

[C++] public: const Shortcut Ctrl6;

[VB] Public Const Ctrl6 As Shortcut

[JScript] public var Ctrl6: Shortcut;

Description

The shortcut keys CTRL+6.

ff) ToString

[C#] public const Shortcut Ctrl7;

[C++] public: const Shortcut Ctrl7;

[VB] Public Const Ctrl7 As Shortcut

[JScript] public var Ctrl7: Shortcut;

Description

The shortcut keys CTRL+7.

gg) ToString

[C#] public const Shortcut Ctrl8;

[C++] public: const Shortcut Ctrl8;

[VB] Public Const Ctrl8 As Shortcut

[JScript] public var Ctrl8: Shortcut;

Description

The shortcut keys CTRL+8.

hh) ToString

[C#] public const Shortcut Ctrl9;

[C++] public: const Shortcut Ctrl9;

[VB] Public Const Ctrl9 As Shortcut

[JScript] public var Ctrl9: Shortcut;

Description

The shortcut keys CTRL+9.

ii) ToString

[C#] public const Shortcut CtrlA;

[C++] public: const Shortcut CtrlA;

[VB] Public Const CtrlA As Shortcut

[JScript] public var CtrlA: Shortcut;

Description

The shortcut keys CTRL+A.

jj) ToString

[C#] public const Shortcut CtrlB;

[C++] public: const Shortcut CtrlB;

[VB] Public Const CtrlB As Shortcut

[JScript] public var CtrlB: Shortcut;

Description

The shortcut keys CTRL+B.

kk) ToString

[C#] public const Shortcut CtrlC;

[C++] public: const Shortcut CtrlC;

[VB] Public Const CtrlC As Shortcut

[JScript] public var CtrlC: Shortcut;

Description

The shortcut keys CTRL+C.

ll) ToString

[C#] public const Shortcut CtrlD;

[C++] public: const Shortcut CtrlD;

[VB] Public Const CtrlD As Shortcut

[JScript] public var CtrlD: Shortcut;

Description

The shortcut keys CTRL+D.

mm) ToString

[C#] public const Shortcut CtrlDel;

[C++] public: const Shortcut CtrlDel;

[VB] Public Const CtrlDel As Shortcut

[JScript] public var CtrlDel: Shortcut;

Description

The shortcut keys CTRL+DELETE.

nn) ToString

[C#] public const Shortcut CtrlE;

[C++] public: const Shortcut CtrlE;

[VB] Public Const CtrlE As Shortcut

[JScript] public var CtrlE: Shortcut;

Description

The shortcut keys CTRL+E.

oo) ToString

[C#] public const Shortcut CtrlF;

[C++] public: const Shortcut CtrlF;

[VB] Public Const CtrlF As Shortcut

[JScript] public var CtrlF: Shortcut;

Description

The shortcut keys CTRL+F.

pp) ToString

[C#] public const Shortcut CtrlF1;

[C++] public: const Shortcut CtrlF1;

[VB] Public Const CtrlF1 As Shortcut

[JScript] public var CtrlF1: Shortcut;

Description

The shortcut keys CTRL+F1.

qq) ToString

[C#] public const Shortcut CtrlF10;

[C++] public: const Shortcut CtrlF10;

[VB] Public Const CtrlF10 As Shortcut

[JScript] public var CtrlF10: Shortcut;

Description

The shortcut keys CTRL+F10.

rr) ToString

[C#] public const Shortcut CtrlF11;

[C++] public: const Shortcut CtrlF11;

[VB] Public Const CtrlF11 As Shortcut

[JScript] public var CtrlF11: Shortcut;

Description

The shortcut keys CTRL+F1.

ss) ToString

[C#] public const Shortcut CtrlF12;

[C++] public: const Shortcut CtrlF12;

[VB] Public Const CtrlF12 As Shortcut

[JScript] public var CtrlF12: Shortcut;

Description

The shortcut keys CTRL+F12.

tt) ToString

[C#] public const Shortcut CtrlF2;

[C++] public: const Shortcut CtrlF2;

[VB] Public Const CtrlF2 As Shortcut

[JScript] public var CtrlF2: Shortcut;

Description

The shortcut keys CTRL+F2.

uu) ToString

[C#] public const Shortcut CtrlF3;

[C++] public: const Shortcut CtrlF3;

[VB] Public Const CtrlF3 As Shortcut

[JScript] public var CtrlF3: Shortcut;

Description

The shortcut keys CTRL+F3.

vv) ToString

[C#] public const Shortcut CtrlF4;

[C++] public: const Shortcut CtrlF4;

[VB] Public Const CtrlF4 As Shortcut

[JScript] public var CtrlF4: Shortcut;

Description

The shortcut keys CTRL+F4.

ww) ToString

[C#] public const Shortcut CtrlF5;

[C++] public: const Shortcut CtrlF5;

[VB] Public Const CtrlF5 As Shortcut

[JScript] public var CtrlF5: Shortcut;

Description

The shortcut keys CTRL+F5.

xx) ToString

[C#] public const Shortcut CtrlF6;

[C++] public: const Shortcut CtrlF6;

[VB] Public Const CtrlF6 As Shortcut

[JScript] public var CtrlF6: Shortcut;

Description

The shortcut keys CTRL+F6.

yy) ToString

[C#] public const Shortcut CtrlF7;

[C++] public: const Shortcut CtrlF7;

[VB] Public Const CtrlF7 As Shortcut

[JScript] public var CtrlF7: Shortcut;

Description

The shortcut keys CTRL+F7.

zz) ToString

[C#] public const Shortcut CtrlF8;

[C++] public: const Shortcut CtrlF8;

[VB] Public Const CtrlF8 As Shortcut

[JScript] public var CtrlF8: Shortcut;

Description

The shortcut keys CrRL+F8.

aaa) ToString

[C#] public const Shortcut CtrlF9;

[C++] public: const Shortcut CtrlF9;

[VB] Public Const CtrlF9 As Shortcut

[JScript] public var CtrlF9: Shortcut;

Description

The shortcut keys CTRL+F9.

bbb) ToString

[C#] public const Shortcut CtrlG;

[C++] public: const Shortcut CtrlG;

[VB] Public Const CtrlG As Shortcut

[JScript] public var CtrlG: Shortcut;

Description

The shortcut keys CTRL+G.

ccc) ToString

[C#] public const Shortcut CtrlH;

[C++] public: const Shortcut CtrlH;

[VB] Public Const CtrlH As Shortcut

[JScript] public var CtrlH: Shortcut;

Description

The shortcut keys CTRL+H.

ddd) ToString

[C#] public const Shortcut CtrlI;

[C++] public: const Shortcut CtrlI;

[VB] Public Const CtrlI As Shortcut

[JScript] public var CtrlI: Shortcut;

Description

The shortcut keys CTRL+I.

eee) ToString

[C#] public const Shortcut CtrlIns;

[C++] public: const Shortcut CtrlIns;

[VB] Public Const CtrlIns As Shortcut

[JScript] public var CtrlIns: Shortcut;

Description

The shortcut keys CTRL+INSERT.

fff) ToString

[C#] public const Shortcut CtrlJ;

[C++] public: const Shortcut CtrlJ;

[VB] Public Const CtrlJ As Shortcut

[JScript] public var CtrlJ: Shortcut;

Description

The shortcut keys CTRL+J.

ggg) ToString

[C#] public const Shortcut CtrlK;

[C++] public: const Shortcut CtrlK;

[VB] Public Const CtrlK As Shortcut

[JScript] public var CtrlK: Shortcut;

Description

The shortcut keys CrRL+K.

hhh) ToString

[C#] public const Shortcut CtrlL;

[C++] public: const Shortcut CtrlL;

[VB] Public Const CtrlL As Shortcut

[JScript] public var CtrlL: Shortcut;

Description

The shortcut keys CTRL+L.

iii) ToString

[C#] public const Shortcut CtrlM;

[C++] public: const Shortcut CtrlM;

[VB] Public Const CtrlM As Shortcut

[JScript] public var CtrlM: Shortcut;

Description

The shortcut keys CTRL+M.

jjj) ToString

[C#] public const Shortcut CtrlN;

[C++] public: const Shortcut CtrlN;

[VB] Public Const CtrlN As Shortcut

[JScript] public var CtrlN: Shortcut;

Description

The shortcut keys CTRL+N.

kkk) ToString

[C#] public const Shortcut CtrlO;

[C++] public: const Shortcut CtrlO;

[VB] Public Const CtrlO As Shortcut

[JScript] public var CtrlO: Shortcut;

Description

The shortcut keys CTRL+O.

lll) ToString

[C#] public const Shortcut CtrlP;

[C++] public: const Shortcut CtrlP;

[VB] Public Const CtrlP As Shortcut

[JScript] public var CtrlP Shortcut;

Description

The shortcut keys CTRL+P.

mmm) ToString

[C#] public const Shortcut CtrlQ;

[C++] public: const Shortcut CtrlQ;

[VB] Public Const CtrlQ As Shortcut

[JScript] public var CtrlQ: Shortcut;

Description

The shortcut keys CTRL+Q.

nnn) ToString

[C#] public const Shortcut CtrlR;

[C++] public: const Shortcut CtrlR;

[VB] Public Const CtrlR As Shortcut

[JScript] public var CtrlR: Shortcut;

Description

The shortcut keys CTRL+R.

ooo) ToString

[C#] public const Shortcut CtrlS;

[C++] public: const Shortcut CtrlS;

[VB] Public Const CtrlS As Shortcut

[JScript] public var CtrlS: Shortcut;

Description

The shortcut keys CTRL+S.

ppp) ToString

[C#] public const Shortcut CtrlShift0;

[C++] public: const Shortcut CtrlShift0;

[VB] Public Const CtrlShift0 As Shortcut

[JScript] public var CtrlShift0: Shortcut;

Description

The shortcut keys CTRL+SHIFT+0.

qqq) ToString

[C#] public const Shortcut CtrlShift1;

[C++] public: const Shortcut CtrlShift1;

[VB] Public Const CtrlShift1 As Shortcut

[JScript] public var CtrlShift1: Shortcut;

Description

The shortcut keys CTRL+SHIFT+1.

rrr) ToString

[C#] public const Shortcut CtrlShift2;

[C++] public: const Shortcut CtrlShift2;

[VB] Public Const CtrlShift2 As Shortcut

[JScript] public var CtrlShift2: Shortcut;

Description

The shortcut keys CTRL+SHIFT+2.

sss) ToString

[C#] public const Shortcut CtrlShift3;

[C++] public: const Shortcut CtrlShift3;

[VB] Public Const CtrlShift3 As Shortcut

[JScript] public var CtrlShift3: Shortcut;

Description

The shortcut keys CTRL+SHIFT+3.

ttt) ToString

[C#] public const Shortcut CtrlShift4;

[C++] public: const Shortcut CtrlShift4;

[VB] Public Const CtrlShift4 As Shortcut

[JScript] public var CtrlShift4: Shortcut;

Description

The shortcut keys CTRL+SHIFT+4.

uuu) ToString

[C#] public const Shortcut CtrlShift5;

[C++] public: const Shortcut CtrlShift5;

[VB] Public Const CtrlShift5 As Shortcut

[JScript] public var CtrlShift5: Shortcut;

Description

The shortcut keys CTRL+SHIFT+5.

vvv) ToString

[C#] public const Shortcut CtrlShift6;

[C++] public: const Shortcut CtrlShift6;

[VB] Public Const CtrlShift6 As Shortcut

[JScript] public var CtrlShift6: Shortcut;

Description

The shortcut keys CTRL+SHIFT+6.

www) ToString

[C#] public const Shortcut CtrlShift7;

[C++] public: const Shortcut CtrlShift7;

[VB] Public Const CtrlShift7 As Shortcut

[JScript] public var CtrlShift7: Shortcut;

Description

The shortcut keys CTRL+SHIFT+7.

xxx) ToString

[C#] public const Shortcut CtrlShift8;

[C++] public: const Shortcut CtrlShift8;

[VB] Public Const CtrlShift8 As Shortcut

[JScript] public var CtrlShift8: Shortcut;

Description

The shortcut keys CTRL+SHIFT+8.

yyy) ToString

[C#] public const Shortcut CtrlShift9;

[C++] public: const Shortcut CtrlShift9;

[VB] Public Const CtrlShift9 As Shortcut

[JScript] public var CtrlShift9: Shortcut;

Description

The shortcut keys CTRL+SHIFT+9.

zzz) ToString

[C#] public const Shortcut CtrlShiftA;

[C++] public: const Shortcut CtrlShiftA;

[VB] Public Const CtrlShiftA As Shortcut

[JScript] public var CtrlShiftA: Shortcut;

Description

The shortcut keys CTRL+SHIFT+A.

aaaa) ToString

[C#] public const Shortcut CtrlShiftB;

[C++] public: const Shortcut CtrlShiftB;

[VB] Public Const CtrlShiftB As Shortcut

[JScript] public var CtrlShiftB: Shortcut;

Description

The shortcut keys CTRL+SHIFT+B.

bbbb) ToString

[C#] public const Shortcut CtrlShiftC;

[C++] public: const Shortcut CtrlShiftC;

[VB] Public Const CtrlShiftC As Shortcut

[JScript] public var CtrlShiftC: Shortcut;

Description

The shortcut keys CTRL+SHIFT+C.

cccc) ToString

[C#] public const Shortcut CtrlShiftD;

[C++] public: const Shortcut CtrlShiftD;

[VB] Public Const CtrlShiftD As Shortcut

[JScript] public var CtrlShiftD: Shortcut;

Description

The shortcut keys CTRL+SHIFT+D.

dddd) ToString

[C#] public const Shortcut CtrlShiftE;

[C++] public: const Shortcut CtrlShiftE;

[VB] Public Const CtrlShiftE As Shortcut

[JScript] public var CtrlShiftE: Shortcut;

Description

The shortcut keys CTRL+SHIFT+E.

eeee) ToString

[C#] public const Shortcut CtrlShiftF;

[C++] public: const Shortcut CtrlShiftF;

[VB] Public Const CtrlShiftF As Shortcut

[JScript] public var CtrlShiftF: Shortcut;

Description

The shortcut keys CTRL+SHIFT+F.

ffff) ToString

[C#] public const Shortcut CtrlShiftF1;

[C++] public: const Shortcut CtrlShiftF1;

[VB] Public Const CtrlShiftF1 As Shortcut

[JScript] public var CtrlShiftF1: Shortcut;

Description

The shortcut keys CTRL+SHIFT+F1.

gggg) ToString

[C#] public const Shortcut CtrlShiftF10;

[C++] public: const Shortcut CtrlShiftF10;

[VB] Public Const CtrlShiftF10 As Shortcut

[JScript] public var CtrlShiftF10: Shortcut;

Description

The shortcut keys CTRL+SHIFT+F10.

hhhh) ToString

[C#] public const Shortcut CtrlShiftF11;

[C++] public: const Shortcut CtrlShiftF11;

[VB] Public Const CtrlShiftF11 As Shortcut

[JScript] public var CtrlShiftF11: Shortcut;

Description

The shortcut keys CTRL+SHIFT+F11.

iiii) ToString

[C#] public const Shortcut CtrlShiftF12;

[C++] public: const Shortcut CtrlShiftF12;

[VB] Public Const CtrlShiftF12 As Shortcut

[JScript] public var CtrlShiftF12: Shortcut;

Description

The shortcut keys CTRL+SHIFT+F12.

jjjj) ToString

[C#] public const Shortcut CtrlShiftF2;

[C++] public: const Shortcut CtrlShiftF2;

[VB] Public Const CtrlShiftF2 As Shortcut

[JScript] public var CtrlShiftF2: Shortcut;

Description

The shortcut keys CTRL+SHIFT+F2.

kkkk) ToString

[C#] public const Shortcut CtrlShiftF3;

[C++] public: const Shortcut CtrlShiftF3;

[VB] Public Const CtrlShiftF3 As Shortcut

[JScript] public var CtrlShiftF3: Shortcut;

Description

The shortcut keys CTRL+SHIFT+F3.

llll) ToString

[C#] public const Shortcut CtrlShiftF4;

[C++] public: const Shortcut CtrlShiftF4;

[VB] Public Const CtrlShiftF4 As Shortcut

[JScript] public var CtrlShiftF4: Shortcut;

Description

The shortcut keys CTRL+SHIFT+F4.

mmmm) ToString

[C#] public const Shortcut CtrlShiftF5;

[C++] public: const Shortcut CtrlShiftF5;

[VB] Public Const CtrlShiftF5 As Shortcut

[JScript] public var CtrlShiftF5: Shortcut;

Description

The shortcut keys CTRL+SHIFT+F5.

nnnn) ToString

[C#] public const Shortcut CtrlShiftF6;

[C++] public: const Shortcut CtrlShiftF6;

[VB] Public Const CtrlShiftF6 As Shortcut

[JScript] public var CtrlShiftF6: Shortcut;

Description

The shortcut keys CTRL+SHIFT+F6.

oooo) ToString

[C#] public const Shortcut CtrlShiftF7;

[C++] public: const Shortcut CtrlShiftF7;

[VB] Public Const CtrlShiftF7 As Shortcut

[JScript] public var CtrlShiftF7: Shortcut;

Description

The shortcut keys CTRL+SHIFT+F7.

pppp) ToString

[C#] public const Shortcut CtrlShiftF8;

[C++] public: const Shortcut CtrlShiftF8;

[VB] Public Const CtrlShiftF8 As Shortcut

[JScript] public var CtrlShiftF8: Shortcut;

Description

The shortcut keys CTRL+SHIFT+F8.

qqqq) ToString

[C#] public const Shortcut CtrlShiftF9;

[C++] public: const Shortcut CtrlShiftF9;

[VB] Public Const CtrlShiftF9 As Shortcut

[JScript] public var CtrlShiftF9: Shortcut;

Description

The shortcut keys CTRL+SHIFT+F9.

rrrr) ToString

[C#] public const Shortcut CtrlShiftG;

[C++] public: const Shortcut CtrlShiftG;

[VB] Public Const CtrlShiftG As Shortcut

[JScript] public var CtrlShiftG: Shortcut;

Description

The shortcut keys CTRL+SHIFT+G.

ssss) ToString

[C#] public const Shortcut CtrlShiftH;

[C++] public: const Shortcut CtrlShiftH;

[VB] Public Const CtrlShiftH As Shortcut

[JScript] public var CtrlShiftH: Shortcut;

Description

The shortcut keys CTRL+SHIFT+H.

tttt) ToString

[C#] public const Shortcut CtrlShiftI;

[C++] public: const Shortcut CtrlShiftI;

[VB] Public Const CtrlShiftI As Shortcut

[JScript] public var CtrlShiftI: Shortcut;

Description

The shortcut keys CTRL+SHIFT+I.

uuuu) ToString

[C#] public const Shortcut CtrlShiftJ;

[C++] public: const Shortcut CtrlShiftJ;

[VB] Public Const CtrlShiftJ As Shortcut

[JScript] public var CtrlShiftJ: Shortcut;

Description

The shortcut keys CTRL+SHIFT+J.

vvvv) ToString

[C+] public const Shortcut CtrlShiftK;

[C++] public: const Shortcut CtrlShiftK;

[VB] Public Const CtrlShiftK As Shortcut

[JScript] public var CtrlShiftK: Shortcut;

Description

The shortcut keys CTRL+SHIFT+K.

wwww) ToString

[C#] public const Shortcut CtrlShiftL;

[C++] public: const Shortcut CtrlShiftL;

[VB] Public Const CtrlShiftL As Shortcut

[JScript] public var CtrlShiftL: Shortcut;

Description

The shortcut keys CTRL+SHIFT+L.

xxxx) ToString

[C#] public const Shortcut CtrlShiftM;

[C++] public: const Shortcut CtrlShiftM;

[VB] Public Const CtrlShiftM As Shortcut

[JScript] public var CtrlShiftM: Shortcut;

Description

The shortcut keys CTRL+SHIFT+M.

yyyy) ToString

[C#] public const Shortcut CtrlShiftN;

[C++] public: const Shortcut CtrlShiftN;

[VB] Public Const CtrlShiftN As Shortcut

[JScript] public var CtrlShiftN: Shortcut;

Description

The shortcut keys CTRL+SHIFT+N.

zzzz) ToString

[C#] public const Shortcut CtrlShiftO;

[C++] public: const Shortcut CtrlShiftO;

[VB] Public Const CtrlShiftO As Shortcut

[JScript] public var CtrlShiftO: Shortcut;

Description

The shortcut keys CTRL+SHIFT+O.

aaaaa) ToString

[C#] public const Shortcut CtrlShiftP;

[C++] public: const Shortcut CtrlShiftP;

[VB] Public Const CtrlShiftP As Shortcut

[JScript] public var CtrlShiftP: Shortcut;

Description

The shortcut keys CTRL+SHIFT+P.

bbbbb) ToString

[C#] public const Shortcut CtrlShiftQ;

[C++] public: const Shortcut CtrlShiftQ;

[VB] Public Const CtrlShiftQ As Shortcut

[JScript] public var CtrlShiftQ: Shortcut;

Description

The shortcut keys CTRL+SHIFT+Q.

ccccc) ToString

[C#] public const Shortcut CtrlShiftR;

[C++] public: const Shortcut CtrlShiftR;

[VB] Public Const CtrlShiftR As Shortcut

[JScript] public var CtrlShiftR: Shortcut;

Description

The shortcut keys CTRL+SHIFT+R.

ddddd) ToString

[C#] public const Shortcut CtrlShiftS;

[C++] public: const Shortcut CtrlShiftS;

[VB] Public Const CtrlShiftS As Shortcut

[JScript] public var CtrlShiftS: Shortcut;

Description

The shortcut keys CTRL+SHIFT+S.

eeeee) ToString

[C#] public const Shortcut CtrlShiftT;

[C++] public: const Shortcut CtrlShiftT;

[VB] Public Const CtrlShiftT As Shortcut

[JScript] public var CtrlShiftT: Shortcut;

Description

The shortcut keys CTRL+SHIFT+T.

fffff) ToString

[C#] public const Shortcut CtrlShiftU;

[C++] public: const Shortcut CtrlShiftU;

[VB] Public Const CtrlShiftU As Shortcut

[JScript] public var CtrlShiftU: Shortcut;

Description

The shortcut keys CTRL+SHIFT+U.

ggggg) ToString

[C#] public const Shortcut CtrlShiftV;

[C++] public: const Shortcut CtrlShiftV;

[VB] Public Const CtrlShiftV As Shortcut

[JScript] public var CtrlShiftV: Shortcut;

Description

The shortcut keys CTRL+SHIFT+V.

hhhhh) ToString

[C#] public const Shortcut CtrlShiftW;

[C++] public: const Shortcut CtrlShiftW;

[VB] Public Const CtrlShiftW As Shortcut

[JScript] public var CtrlShiftW: Shortcut;

Description

The shortcut keys CTRL+SHIFT+W.

iiiii) ToString

[C#] public const Shortcut CtrlShiftX;

[C++] public: const Shortcut CtrlShiftX;

[VB] Public Const CtrlShiftX As Shortcut

[JScript] public var CtrlShiftX: Shortcut;

Description

The shortcut keys CTRL+SHIFT+X.

jjjjj) ToString

[C#] public const Shortcut CtrlShiftY;

[C++] public: const Shortcut CtrlShiftY;

[VB] Public Const CtrlShiftY As Shortcut

[JScript] public var CtrlShiftY: Shortcut;

Description

The shortcut keys CTRL+SHIFT+Y.

kkkkk) ToString

[C#] public const Shortcut CtrlShiftZ;

[C++] public: const Shortcut CtrlShiftZ;

[VB] Public Const CtrlShiftZ As Shortcut

[JScript] public var CtrlShiftZ: Shortcut;

Description

The shortcut keys CTRL+SHIFT+Z.

lllll) ToString

[C#] public const Shortcut CtrlT;

[C++] public: const Shortcut CtrlT;

[VB] Public Const CtrlT As Shortcut

[JScript] public var CtrlT: Shortcut;

Description

The shortcut keys CTRL+T.

mmmmm) ToString

[C#] public const Shortcut CtrlU;

[C++] public: const Shortcut CtrlU;

[VB] Public Const CtrlU As Shortcut

[JScript] public var CtrlU: Shortcut;

Description

The shortcut keys CTRL+U The shortcut keys CTRL+U nnnnn) ToString

[C#] public const Shortcut CtrlV;

[C++] public: const Shortcut CtrlV;

[VB] Public Const CtrlV As Shortcut

[JScript] public var CtrlV: Shortcut;

Description

The shortcut keys CTRL+V.

ooooo) ToString

[C#] public const Shortcut CtrlW;

[C++] public: const Shortcut CtrlW;

[VB] Public Const CtrlW As Shortcut

[JScript] public var CtrlW: Shortcut;

Description

The shortcut keys CTRL+W.

ppppp) ToString

[C#] public const Shortcut CtrlX;

[C++] public: const Shortcut CtrlX;

[VB] Public Const CtrlX As Shortcut

[JScript] public var CtrlX: Shortcut;

Description

The shortcut keys CTRL+X.

qqqqq) ToString

[C#] public const Shortcut CtrlY;

[C++] public: const Shortcut CtrlY;

[VB] Public Const CtrlY As Shortcut

[JScript] public var CtrlY: Shortcut;

Description

The shortcut keys CTRL+Y.

rrrrr) ToString

[C#] public const Shortcut CtrlZ;

[C++] public: const Shortcut CtrlZ;

[VB] Public Const CtrlZ As Shortcut

[JScript] public var CtrlZ: Shortcut;

Description

The shortcut keys CTRL+Z.

sssss) ToString

[C#] public const Shortcut Del;

[C++] public: const Shortcut Del;

[VB] Public Const Del As Shortcut

[JScript] public var Del: Shortcut;

Description

The shortcut key DELETE.

ttttt) ToString

[C#] public const Shortcut F1;

[C++] public: const Shortcut F1;

[VB] Public Const F1 As Shortcut

[JScript] public var F1: Shortcut;

Description

The shortcut key F1.

uuuuu) ToString

[C#] public const Shortcut F10;

[C++] public: const Shortcut F10;

[VB] Public Const F10 As Shortcut

[JScript] public var F10: Shortcut;

Description

The shortcut key F10.

vvvvv) ToString

[C#] public const Shortcut F11;

[C++] public: const Shortcut F11;

[VB] Public Const F11 As Shortcut

[JScript] public var F11: Shortcut;

Description

The shortcut key F11.

wwwww) ToString

[C#] public const Shortcut F12;

[C++] public: const Shortcut F12;

[VB] Public Const F12 As Shortcut

[JScript] public var F12: Shortcut;

Description

The shortcut key F12.

xxxxx) ToString

[C#] public const Shortcut F2;

[C++] public: const Shortcut F2;

[VB] Public Const F2 As Shortcut

[JScript] public var F2: Shortcut;

Description

The shortcut key F2.

yyyyy) ToString

[C#] public const Shortcut F3;

[C++] public: const Shortcut F3;

[VB] Public Const F3 As Shortcut

[JScript] public var F3: Shortcut;

Description

The shortcut key F3.

zzzzz) ToString

[C#] public const Shortcut F4;

[C++] public: const Shortcut F4;

[VB] Public Const F4 As Shortcut

[JScript] public var F4: Shortcut;

Description

The shortcut key F4.

aaaaaa) ToString

[C#] public const Shortcut F5;

[C++] public: const Shortcut F5;

[VB] Public Const F5 As Shortcut

[JScript] public var F5: Shortcut;

Description

The shortcut key F5.

bbbbbb) ToString

[C#] public const Shortcut F6;

[C++] public: const Shortcut F6;

[VB] Public Const F6 As Shortcut

[JScript] public var F6: Shortcut;

Description

The shortcut key F6.

cccccc) ToString

[C#] public const Shortcut F7;

[C++] public: const Shortcut F7;

[VB] Public Const F7 As Shortcut

[JScript] public var F7: Shortcut;

Description

The shortcut key F7.

dddddd) ToString

[C#] public const Shortcut F8;

[C++] public: const Shortcut F8;

[VB] Public Const F8 As Shortcut

[JScript] public var F8: Shortcut;

Description

The shortcut key F8.

eeeeee) ToString

[C#] public const Shortcut F9;

[C++] public: const Shortcut F9;

[VB] Public Const F9 As Shortcut

[JScript] public var F9: Shortcut;

Description

The shortcut key F9.

ffffff) ToString

[C#] public const Shortcut Ins;

[C++] public: const Shortcut Ins;

[VB] Public Const Ins As Shortcut

[JScript] public var Ins: Shortcut;

Description

The shortcut key INSERT.

gggggg) ToString

[C#] public const Shortcut None;

[C++] public: const Shortcut None;

[VB] Public Const None As Shortcut

[JScript] public var None: Shortcut;

Description

No shortcut key is associated with the menu item.

hhhhhh) ToString

[C#] public const Shortcut ShiftDel;

[C++] public: const Shortcut ShiftDel;

[VB] Public Const ShiftDel As Shortcut

[JScript] public var ShiftDel: Shortcut;

Description

The shortcut keys SHIFT+DELETE.

iiiiii) ToString

[C#] public const Shortcut ShiftF1;

[C++] public: const Shortcut ShiftF1;

[VB] Public Const ShiftF1 As Shortcut

[JScript] public var ShiftF1: Shortcut;

Description

The shortcut keys SHIFT+F1.

jjjjjj) ToString

[C#] public const Shortcut ShiftF10;

[C++] public: const Shortcut ShiftF10;

[VB] Public Const ShiftF10 As Shortcut

[JScript] public var ShiftF10: Shortcut;

Description

The shortcut keys SHIFT+F10.

kkkkkk) ToString

[C#] public const Shortcut ShiftF11;

[C++] public: const Shortcut ShiftF11;

[VB] Public Const ShiftF11 As Shortcut

[JScript] public var ShiftF11: Shortcut;

Description

The shortcut keys SHIFT+F11.

lllll) ToString

[C#] public const Shortcut ShiftF12;

[C++] public: const Shortcut ShiftF12;

[VB] Public Const ShiftF12 As Shortcut

[JScript] public var ShiftF12: Shortcut;

Description

The shortcut keys SHIFT+F12.

mmmmmm) ToString

[C#] public const Shortcut ShiftF2;

[C++] public: const Shortcut ShiftF2;

[VB] Public Const ShiftF2 As Shortcut

[JScript] public var ShiftF2: Shortcut;

Description

The shortcut keys SHIFT+F2.

nnnnnn) ToString

[C#] public const Shortcut ShiftF3;

[C++] public: const Shortcut ShiftF3;

[VB] Public Const ShiftF3 As Shortcut

[JScript] public var ShiftF3: Shortcut;

Description

The shortcut keys SHIFT+F3.

oooooo) ToString

[C#] public const Shortcut ShiftF4;

[C++] public: const Shortcut ShiftF4;

[VB] Public Const ShiftF4 As Shortcut

[JScript] public var ShiftF4: Shortcut;

Description

The shortcut keys SHIFT+F4.

pppppp) ToString

[C#] public const Shortcut ShiftF5;

[C++] public: const Shortcut ShiftF5;

[VB] Public Const ShiftF5 As Shortcut

[JScript] public var ShiftF5: Shortcut;

Description

The shortcut keys SHIFT+F5.

qqqqqq) ToString

[C#] public const Shortcut ShiftF6;

[C++] public: const Shortcut ShiftF6;

[VB] Public Const ShiftF6 As Shortcut

[JScript] public var ShiftF6: Shortcut;

Description

The shortcut keys SHIFT+F6.

rrrrrr) ToString

[C#] public const Shortcut ShiftF7;

[C++] public: const Shortcut ShiftF7;

[VB] Public Const ShiftF7 As Shortcut

[JScript] public var ShiftF7: Shortcut;

Description

The shortcut keys SHIFT+F7.

ssssss) ToString

[C#] public const Shortcut ShiftF8;

[C++] public: const Shortcut ShiftF8;

[VB] Public Const ShiftF8 As Shortcut

[JScript] public var ShiftF8:Shortcut;

Description

The shortcut keys SHIFT+F8.

tttttt) ToString

[C#] public const Shortcut ShiftF9;

[C++] public: const Shortcut ShiftF9;

[VB] Public Const ShiftF9 As Shortcut

[JScript] public var ShiftF9: Shortcut;

Description

The shortcut keys SHIFT+F9.

uuuuuu) ToString

[C#] public const Shortcut ShiftIns;

[C++] public: const Shortcut ShiftIns;

[VB] Public Const ShiftIns As Shortcut

[JScript] public var ShiftIns: Shortcut;

Description

The shortcut keys SHIFT+INSERT.

SizeGripStyle enumeration (System.Windows.Forms)

a) ToString

Description

Specifies the style of the sizing grip on a System.Windows.Forms.Form.

Use the members of this enumeration to set the value of the System.Windows.Forms.Form.SizeGripStyle property of the System.Windows.Forms.Form.

b) ToString

[C#] public const SizeGripStyle Auto;

[C++] public: const SizeGripStyle Auto;

[VB] Public Const Auto As SizeGripStyle

[JScript] public var Auto: SizeGripStyle;

Description

The sizing grip is automatically displayed when needed.

c) ToString

[C#] public const SizeGripStyle Hide;

[C++] public: const SizeGripStyle Hide;

[VB] Public Const Hide As SizeGripStyle

[JScript] public var Hide SizeGripStyle;

Description

The sizing grip is hidden.

d) ToString

[C#] public const SizeGripStyle Show;

[C++] public: const SizeGripStyle Show;

[VB] Public Const Show As SizeGripStyle

[JScript] public var Show: SizeGripStyle;

Description

The sizing grip is always shown on the form.

SortOrder enumeration (System.Windows.Forms)

a) ToString

Description

Specifies how items in a list are sorted.

Use the members of this enumeration to set the value of the System.Windows.Forms.ListView.Sorting property of the System.Windows.Forms.ListView control.

b) ToString

[C#] public const SortOrder Ascending;

[C++] public: const SortOrder Ascending;

[VB] Public Const Ascending As SortOrder

[JScript] public var Ascending: SortOrder;

Description

The items are sorted in ascending order.

c) ToString

[C#] public const SortOrder Descending;

[C++] public: const SortOrder Descending;

[VB] Public Const Descending As SortOrder

[JScript] public var Descending: SortOrder;

Description

The items are sorted in descending order.

d) ToString

[C#] public const SortOrder None;

[C++] public: const SortOrder None;

[VB] Public Const None As SortOrder

[JScript] public var None: SortOrder;

Description

The items are not sorted.

Splitter class (System.Windows.Forms)

a) ToString

Description

Represents a splitter control that provides the ability for the user to resize docked controls.

The System.Windows.Forms.Splitter control enables you to resize controls that are docked to the edges of the System. Windows.Forms.Splitter control at runtime. When the user passes the mouse pointer over the System.Windows.Forms.S-plitter control, the cursor changes to indicate that the controls docked to the System.Windows.Forms.Splitter control can be resized. The System.Windows.Forms.Splitter control enables the user to resize the docked control that is immediately before it in the docking order. Therefore, to enable the user to resize a docked control, dock the control you want the user to be able to resize to an edge of a container, and then dock a splitter to the same side of that container. For example, to create a window similar to Windows Explorer, add a System. Windows.Forms.TreeView control to a form and set its System.Windows.Forms.Control.Dock property to DockStyle.Left. Add a System.Windows.Forms.Splitter control to the form and set its System.Windows.Forms.Control.Dock property to DockStyle.Left as well. To complete the form layout, add a System.Windows.Forms.ListView control and set its System.Windows.Forms.Control.Dock property to DockStyle.Fill to have the System.Windows.Forms.ListView occupy the remaining space on the form. At runtime, the user can then resize the width of the System.Windows.Forms. TreeView control (as well as the System.Windows. Forms.ListView control) by moving the System.Windows. Forms.Splitter control.

b) Splitter

Example Syntax:

c) ToString

[C#] public Splitter( );

[C++] public: Splitter( );

[VB] Public Sub New( )

[JScript] public function Splitter( );

Description

Initializes a new instance of the System.Windows.Forms.S-plitter class.

d) AccessibilityObject e) AccessibleDefaultActionDescription f) AccessibleDescription g) AccessibleName h) AccessibleRole i) AllowDrop j) ToString Description k) Anchor l) ToString

[C#] public override AnchorStyles Anchor {get; set;}

[C++] public: _property virtual AnchorStyles get_Anchor( ); public: _property virtual void set_Anchor(AnchorStyles);

[VB] Overrides Public Property Anchor As AnchorStyles

[JScript] public function get Anchor( ): AnchorStyles; public function set Anchor(AnchorStyles);

Description

The current value of the anchor property. The anchor property determines which edges of the control are anchored to the container's edges.

m) BackColor n) BackgroundImage o) ToString

Description p) BindingContext q) BorderStyle r) ToString

Description

Gets or sets the style of border for the System.Windows. Forms.Splitter control.

s) Bottom t) Bounds u) CanFocus v) CanSelect w) Capture x) CausesValidation y) ClientRectangle z) ClientSize aa) CompanyName bb) Container
cc) ContainsFocus
dd) ContextMenu
ee) Controls
ff) Created
gg) CreateParams
hh) ToString Description Returns the parameters needed to create the handle. Inheriting classes can override this to provide extra functionality. They should not, however, forget to call base.getCreateParams( ) first to get the struct filled up with the basic info.

ii) Cursor
jj) DataBindings
kk) DefaultImeMode
ll) ToString

Description

Gets the default Input Method Editor (IME) mode supported by this control.

As implemented in the System.Windows.Forms.Splitter class, this property always returns the System.Windows.Forms.ImeMode.Disable value.

mm) DefaultSize
nn) ToString

[C#] protected override Size DefaultSize {get;}

[C++] protected: _property virtual Size get_DefaultSize( );

[VB] Overrides Protected ReadOnly Property DefaultSize As Size

[JScript] protected function get DefaultSize( ): Size;

Description

Gets the default size of the control.

oo) DesignMode
pp) DisplayRectangle
qq) Disposing
rr) Dock
ss) ToString

Description tt) Enabled
uu) Events
vv) Focused
ww) Font
xx) ToString

Description yy) FontHeight
zz) ForeColor
aaa) ToString

Description bbb) Handle
ccc) HasChildren
ddd) Height
eee) ImeMode
fff) ToString

Description

Gets or sets the Input Method Editor (IME) mode supported by this control.

ggg) InvokeRequired
hhh) IsAccessible
iii) IsDisposed
jjj) IsHandleCreated
kkk) Left
lll) Location
mmm) MinExtra
nnn) ToString Description Gets or sets the minimum distance that must remain between the System.Windows.Forms.Splitter control and the edge of the opposite side of the container (or the closest control docked to that side).

For a System.Windows.Forms.Splitter control docked horizontally (a System.Windows.Forms.Splitter control docked to the top or bottom of a container), the minimum height of the area of the container reserved for undocked controls is this value minus the height of the System.Windows.Forms.Splitter control. For a System.Windows.Forms.Splitter control docked vertically (a System.Windows.Forms.Splitter control docked to the left or right of a container), the minimum width of the area of the container reserved for undocked controls is this value minus the width of the System.Windows.Forms.Splitter control. The user cannot move the splitter past the limit specified by this property.

ooo) MinSize
ppp) ToString

[C#] public int MinSize {get; set;}

[C++] public: _property int get MinSize( ); public: _property void set_MinSize(int);

[VB] Public Property MinSize As Integer

[JScript] public function get MinSize( ): int; public function set MinSize(int);

Description

Gets or sets the minimum distance that must remain between the System.Windows.Forms.Splitter control and the container edge that the control is docked to.

For a System.Windows.Forms.Splitter control docked horizontally (a System.Windows.Forms.Splitter control docked to the top or bottom of a container), this value is the minimum height of the resizable control. For a System.Windows.Forms.Splitter control docked vertically (a System.Windows.Forms.Splitter control docked to the left or right of a container), this value is the minimum width of the resizable control. The user cannot move the splitter past the limit specified by this property.

qqq) Name
rrr) Parent
sss) ProductName
ttt) ProductVersion
uuu) RecreatingHandle
vvv) Region
www) RenderRightToLeft
xxx) ResizeRedraw
yyy) Right
zzz) RightToLeft
aaaa) ShowFocusCues
bbbb) ShowKeyboardCues
cccc) Site
dddd) Size
eeee) SplitPosition
ffff) ToString Description Gets or sets the distance between the System.Windows.Forms.Splitter control and the container edge that the control is docked to.

For a horizontal System.Windows.Forms.Splitter control (a System.Windows.Forms.Splitter control docked to the top or bottom of a container), this value is the height of the resizable control. For a vertical System.Windows.Forms.Splitter control (a System.Windows.Forms.Splitter control docked to the left or right of a container), this value is the width of the resizable control. You can use the System.Windows.Forms.Splitter.SplitPosition property in an event handler for the System.Windows.Forms.Splitter.SplitterMoved or System.Windows.Forms.Splitter.SplitterMoving events to determine the size of the control that the System.Windows.Forms.Splitter control is docked to and limit its width to a specified maximum width (or height if a horizontally aligned System.Windows.Forms.Splitter control).

gggg) TabIndex
hhhh) TabStop
iiii) ToString

Description jjjj) Tag
kkkk) Text
llll) ToString

Description mmmm) Top
nnnn) TopLevelControl
oooo) Visible
pppp) Width
qqqq) WindowTarget
rrrr) ToString Description ssss) ToString Description tttt) ToString

[C#] public new event KeyPressEventHandler KeyPress;

[C++] public: _event KeyPressEventHandler* KeyPress;

[VB] Shadows Public Event KeyPress As KeyPressEventHandler

Description uuuu) ToString

[C#] public new event KeyEventHandler KeyUp;

[C++] public: _event KeyEventHandler* KeyUp;

[VB] Shadows Public Event KeyUp As KeyEventHandler

Description vvvv) ToString

Description wwww) ToString

Description

Occurs when the System.Windows.Forms.Splitter control is moved.

You can create an event handler for the System.Windows.Forms.Splitter.SplitterMoved to perform resize validation in your application. For example, if a System.Windows.Forms.Splitter control is docked to the edges of a System.Windows.Forms.TreeView control and a System.Windows.Forms.ListView control, you can write code in the System.Windows.Forms.Splitter.SplitterMoved event to determine if the minimum and/or maximum size for both the System.Windows.Forms.TreeView and the System.Windows.Forms.ListView controls has been exceeded and resize the controls to their minimum or maximum size.

xxxx) ToString

[C#] public event SplitterEventHandler SplitterMoving;

[C++] public: _event SplitterEventHandler* SplitterMoving;

[VB] Public Event SplitterMoving As SplitterEventHandler

Description

Occurs when the System.Windows.Forms.Splitter control is in the process of moving.

You can create an event handler for the System.Windows.Forms.Splitter.SplitterMoving to perform resize validation in your application. For example, if a System.Windows.Forms.Splitter control is docked to the edges of a System.Windows.Forms.TreeView control and a System.Windows.Forms.ListView control, you can write code in the System.Windows.Forms.Splitter.SplitterMoved event to determine if the minimum and/or maximum size for both the System.Windows.Forms.TreeView and the System.Windows.Forms.ListView controls has been exceeded and restrict the resizing of the controls to their minimum or maximum size.

yyyy) OnKeyDown

[C#] protected override void OnKeyDown(KeyEventArgs e);

[C++] protected: void OnKeyDown(KeyEventArgs* e);

[VB] Overrides Protected Sub OnKeyDown(ByVal e As KeyEventArgs)

[JScript] protected override function OnKeyDown(e: KeyEventArgs);

Description zzzz) OnMouseDown

[C#] protected override void OnMouseDown(MouseEventArgs e);

[C++] protected: void OnMouseDown(MouseEventArgs* e);

[VB] Overrides Protected Sub OnMouseDown(ByVal e As MouseEventArgs)

[JScript] protected override function OnMouseDown(e: MouseEventArgs);

Description aaaaa) OnMouseMove

[C#] protected override void OnMouseMove(MouseEventArgs e);

[C++] protected: void OnMouseMove(MouseEventArgs* e);

[VB] Overrides Protected Sub OnMouseMove(ByVal e As MouseEventArgs)

[JScript] protected override function OnMouseMove(e: MouseEventArgs);

Description bbbbb) OnMouseUp

[C#] protected override void OnMouseUp(MouseEventArgs e);

[C++] protected: void OnMouseUp(MouseEventArgs* e);

[VB] Overrides Protected Sub OnMouseUp(ByVal e As MouseEventArgs)

[JScript] protected override function OnMouseUp(e: Mouse EventArgs);

Description ccccc) OnSplitterMoved

[C#] protected virtual void OnSplitterMoved(SplitterEvent Args sevent);

[C++] protected: virtual void OnSplitterMoved(Splitter-EventArgs* sevent);

[VB] Overridable Protected Sub OnSplitterMoved(ByVal sevent As SplitterEventArgs)

[JScript] protected function OnSplitterMoved(sevent: Split-terEventArgs);

Description

Raises the System.Windows.Forms.Splitter.SplitterMoved event.

Raising an event invokes the event handler through a delegate. For more information, see. A System.Windows.Forms.Split-terEventArgs that contains the event data.

ddddd) OnSplitterMoving

[C#] protected virtual void OnSplitterMoving(SplitterEvent Args sevent);

[C++] protected: virtual void OnSplitterMoving(Splitter-EventArgs* sevent);

[VB] Overridable Protected Sub OnSplitterMoving(ByVal sevent As SplitterEventArgs)

[JScript] protected function OnSplitterMoving(sevent: Split-terEventArgs);

Description

Raises the System.Windows.Forms.Splitter.SplitterMoving event.

Raising an event invokes the event handler through a delegate. For more information, see. A System.Windows.Forms.Split-terEventArgs that contains the event data.

eeeee) PreFilterMessage

[C#] public bool PreFilterMessage(ref Message m);

[C++] public: _sealed bool PreFilterMessage(Message* m);

[VB] NotOverridable Public Function PreFilterMessage(By-Ref m As Message) As Boolean

[JScript] public function PreFilterMessage(m: Message): Boolean;

Description fffff) SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As BoundsSpecified)

[JScript] protected override function SetBoundsCore(x: int, y: int, width: int, height: int, specified: BoundsSpecified);

Description ggggg) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

SplitterEventArgs class (System.Windows.Forms)

a) WndProc

Description

Provides data for System.Windows.Forms.Splitter. Splitter-Moving and the System.Windows.Forms.Splitter. Splitter-Moved events.

The System.Windows.Forms.Splitter.SplitterMoving event occurs when the user is moving the System.Windows. Forms.Splitter control. The and System.Windows.Forms. Splitter.SplitterMoved events occur when the user finishes moving the System.Windows.Forms.Splitter control. The System.Windows.Forms.SplitterEventArgs class specifies the position of the mouse pointer and the position of the upper-left corner of the System.Windows.Forms.Splitter control.

b) SplitterEventArgs

Example Syntax:

c) WndProc

[C#] public SplitterEventArgs(int x, int y, int splitX, int splitY);

[C++] public: SplitterEventArgs(int x, int y, int splitX, int splitY);

[VB] Public Sub New(ByVal x As Integer, ByVal y As Inte-ger, ByVal splitX As Integer, ByVal splitY As Integer)

[JScript] public function SplitterEventArgs(x: int, y: int, splitX: int, splitY: int);

Description

Initializes an instance of the System.Windows.Forms.Split-terEventArgs class with the specified coordinates of the mouse pointer and the coordinates of the upper-left corner of the System.Windows.Forms.Splitter control. The x-coordi-nate of the mouse pointer (in client coordinates). The y-coor-dinate of the mouse pointer (in client coordinates). The x-co-ordinate of the upper-left corner of the System.Windows.Forms.Splitter (in client coordinates). The y-coordinate of the upper-left corner of the System.Windows. Forms.Splitter (in client coordinates).

d) SplitX e) WndProc

[C#] public int SplitX {get; set;}

[C++] public: _property int get_SplitX( ); public: _property void set_SplitX(int);

[VB] Public Property SplitX As Integer

[JScript] public function get SplitX( ): int; public function set SplitX(int);

Description

Gets or sets the x-coordinate of the upper-left corner of the System.Windows.Forms.Splitter (in client coordinates).

You can use this property along with the System.Windows. Forms.SplitterEventArgs.SplitY property of this class to determine the position of the System.Windows.Forms.Splitter control when the System.Windows.Forms.Splitter. SplitterMoving and System.Windows.Forms.Splitter. SplitterMoved events are raised.

f) SplitY g) WndProc

[C#] public int SplitY {get; set;}

[C++] public: _property int get_SplitY( ); public: _property void set_SplitY(int);

[VB] Public Property SplitY As Integer

[JScript] public function get SplitY( ): int; public function set SplitY(int);

Description

Gets or sets the y-coordinate of the upper-left corner of the System.Windows.Forms.Splitter (in client coordinates).

You can use this property along with the System.Windows. Forms.SplitterEventArgs.SplitX property of this class to determine the position of the System.Windows.Forms.Splitter control when the System.Windows.Forms.Splitter. SplitterMoving and System.Windows.Forms.Splitter. SplitterMoved events are raised.

h) X i) WndProc

[C#] public int X {get;}

[C++] public: _property int get_X( );

[VB] Public ReadOnly Property X As Integer

[JScript] public function get X( ): int;

Description

Gets the x-coordinate of the mouse pointer (in client coordinates).

You can use this property along with the System.Windows. Forms.SplitterEventArgs.Y property of this class to determine the current location of the mouse pointer when the System.Windows.Forms.Splitter.SplitterMoving and System.Windows.Forms.Splitter.SplitterMoved events are raised.

j) Y k) WndProc

[C#] public int Y {get;}

[C++] public: _property int get_Y( );

[VB] Public ReadOnly Property Y As Integer

[JScript] public function get Y( ): int;

Description

Gets the y-coordinate of the mouse pointer (in client coordinates).

You can use this property along with the System.Windows. Forms.SplitterEventArgs.X property of this class to determine the current location of the mouse pointer when the System.Windows.Forms.Splitter.SplitterMoving and System.Windows.Forms.Splitter.SplitterMoved events are raised.

SplitterEventHandler delegate (System.Windows.Forms)

a) ToString

Description

Represents the method that will handle the System.Windows. Forms.Splitter.SplitterMoving and System.Windows. Forms.Splitter.SplitterMoved events of a System.Windows. Forms.Splitter. The source of the event. A System.Windows. Forms.SplitterEventArgs that contains the event data.

When you create a(n) System.Windows.Forms.SplitterEventHandler delegate, you identify the method that will handle the event. To associate the event with your event handler, add an instance of the delegate to the event. The event handler is called whenever the event occurs, unless you remove the delegate. For more information about event handler delegates, see.

AxHost.State class (System.Windows.Forms)

a) ToString

Description

Encapsulates the persisted state of an ActiveX control.

The System.Windows.Forms.AxHost.State object can be created by retrieving the System.Windows.Forms.AxHost.OcxState property of an System.Windows.Forms.AxHost object, or by reading the control's state from a data stream.

b) AxHost.State

Example Syntax:

c) ToString

[C#] public AxHost.State(Stream ms, int storageType, bool manualUpdate, string licKey);

[C++] public: State(Stream* ms, int storageType, bool manualUpdate, String* licKey);

[VB] Public Sub New(ByVal ms As Stream, ByVal storage Type As Integer, ByVal manualUpdate As Boolean, ByVal licKey As String)

[JScript] public function AxHost.State(ms: Stream, storage Type: int, manualUpdate: Boolean, licKey: String);

d) ISerializable.GetObjectData

[C#] void ISerializable.GetObjectData(SerializationInfo si, StreamingContext context);

[C++] void ISerializable::GetObjectData(SerializationInfo* si, StreamingContext context);

[VB] Sub GetObjectData(ByVal si As SerializationInfo, ByVal context As StreamingContext) Implements ISerializable.GetObjectData

[JScript] function ISerializable.GetObjectData(si: SerializationInfo, context StreamingContext);

StatusBar class (System.Windows.Forms)

a) ToString

Description

Represents a Windows status bar control.

Typically a System.Windows.Forms.StatusBar control consists of System.Windows.Forms.StatusBarPanel objects, each of which typically displays text and/or an icon. You can also provide owner-drawn panels to provide custom panels such as a progress bar or a series of images that displays the state of your application. A System.Windows.Forms.StatusBar control typically displays information about an object being viewed on a System.Windows.Forms.Form, the object's components, or contextual information that relates to that object's operation within your application.

b) StatusBar

Example Syntax:

c) ToString

[C#] public StatusBar( );

[C++] public: StatusBar( );

[VB] Public Sub New( )

[JScript] public function StatusBar( );

Description

Initializes a new instance of the System.Windows.Forms.StatusBar class.

The default System.Windows.Forms.StatusBar has no panels.

d) AccessibilityObject e) AccessibleDefaultActionDescription f) AccessibleDescription g) AccessibleName h) AccessibleRole i) AllowDrop j) Anchor k) BackColor l) ToString Description The background color of this control. This is an ambient property and will always return a non-null value.

m) BackgroundImage n) ToString

[C#] public override Image BackgroundImage {get; set;}

[C++] public: property virtual Image* get_BackgroundImage( ); public: _property virtual void set_BackgroundImage (Image*);

[VB] Overrides Public Property BackgroundImage As Image

[JScript] public function get BackgroundImage( ): Image; public function set BackgroundImage(Image);

Description

Gets or sets the image rendered on the background of the System.Windows.Forms.StatusBar control.

o) BindingContext p) Bottom q) Bounds r) CanFocus s) CanSelect t) Capture u) CausesValidation v) ClientRectangle w) ClientSize x) CompanyName y) Container z) ContainsFocus aa) ContextMenu bb) Controls cc) Created dd) CreateParams ee) ToString Description Gets the System.Windows.Forms.CreateParams object used to create the handle for this control.

ff) Cursor gg) DataBindings hh) DefaultImeMode ii) ToString

Description

Gets the default Input Method Editor (IME) mode supported by this control.

As implemented in the System.Windows.Forms.StatusBar class, this property always returns the System.Windows.Forms.ImeMode.Disable value.

jj) DefaultSize kk) ToString

[C#] protected override Size DefaultSize {get;}

[C++] protected: _property virtual Size get_DefaultSize( );

[VB] Overrides Protected ReadOnly Property DefaultSize As Size

[JScript] protected function get DefaultSize( ): Size;

Description

Gets the default size of the control.

ll) DesignMode mm) DisplayRectangle nn) Disposing oo) Dock pp) ToString

Description

Gets or sets the docking behavior of the System.Windows.Forms.StatusBar control.

qq) Enabled rr) Events ss) Focused tt) Font uu) ToString

Description

Gets or sets the font the System.Windows.Forms.StatusBar control will use to display information.

vv) FontHeight ww) ForeColor xx) ToString

Description

Gets or sets the forecolor for the control.

yy) Handle zz) HasChildren aaa) Height bbb) ImeMode ccc) ToString

Description

Gets or sets the Input Method Editor (IME) mode supported by this control.

ddd) InvokeRequired eee) IsAccessible fff) IsDisposed ggg) IsHandleCreated hhh) Left iii) Location jjj) Name kkk) Panels lll) ToString Description Gets the collection of System.Windows.Forms.StatusBar panels contained within the control.

The System.Windows.Forms.StatusBar control can display a number of panels provide information to the user of your application. For example, a panel could display the current time or the progress of a file download. Each panel displayed by the System.Windows.Forms.StatusBar control is an instance of the System.Windows.Forms.StatusBarPanel class. The System.Windows.Forms.StatusBar.Panels property enables you to obtain a reference to the collection of System.Windows.Forms.StatusBarPanel objects that are currently stored in the System.Windows.Forms.StatusBar control. With this reference, you can add panels, remove panels, access a specific panel within the collection, and obtain a count of the panels in the System.Windows.Forms.StatusBar control. For more information on the tasks that can be performed with the panel collection, see the System.Windows.Forms.StatusBar.StatusBarPanelCollection class reference topics.

mmm) Parent
nnn) ProductName
ooo) ProductVersion
ppp) RecreatingHandle
qqq) Region
rrr) RenderRightToLeft
sss) ResizeRedraw
ttt) Right
uuu) RightToLeft
vvv) ShowFocusCues
www) ShowKeyboardCues
xxx) ShowPanels yyy) ToString Description Gets or sets a value indicating whether any panels that have been added to the System.Windows.Forms.StatusBar control are displayed.

By default, the System.Windows.Forms.StatusBar control displays the value of its System.Windows.Forms.Control.Text property without any panels. When this property is set to true, any System.Windows.Forms.StatusBarPanel objects specified in the System.Windows.Forms.StatusBar control are displayed. No panels are initially created when you instantiate an instance of the System.Windows.Forms.StatusBar class. You can add panels to a System.Windows.Forms.StatusBar control by using the System.Windows.Forms.StatusBar.StatusBarPanelCollection.Add(System.String) method of the System.Windows.Forms.StatusBar.StatusBarPanelCollection class. This collection class can be accessed through the System.Windows.Forms.StatusBar.Panels property of System.Windows.Forms.StatusBar.

zzz) Site
aaaa) Size
bbbb) SizingGrip
cccc) ToString

Description

Gets or sets a value indicating whether a sizing grip is displayed in the lower-right corner of the System.Windows.Forms.StatusBar control.

You can use this property to display a sizing grip to provide an indication to the user when a form is resizable. If the System.Windows.Forms.Form.FormBorderStyle property of your System.Windows.Forms.Form is set to a border style that is not resizable, such as FormBorderStyle.Fixed3D or FormBorderStyle.Dialog, you should set the System.Windows.Forms.StatusBar.SizingGrip property to false to prevent the user from thinking that the form can be resized.

dddd) TabIndex
eeee) TabStop
ffff) ToString

Description

Gets or sets a value indicating whether the user will be able to tab to the System.Windows.Forms.StatusBar.

gggg) Tag
hhhh) Text
iiii) ToString

Description

Gets or sets the status bar text.

jjjj) Top
kkkk) TopLevelControl
llll) Visible
mmmm) Width
nnnn) WindowTarget
oooo) ToString Description Occurs when a visual aspect of an owner-drawn System.Windows.Forms.StatusBar control changes.

You can use this event to perform drawing operations in an owner-drawn System.Windows.Forms.StatusBar control. For example, if you display an owner-drawn System.Windows.Forms.StatusBarPanel object that displays a progress bar, you can use this event to perform the drawing of the progress bar on the panel. The data provided to the event through the System.Windows.Forms.StatusBar DrawItem EventArgs object passed as a parameter to the event handler enables you to determine the panel that needs to be drawn and the System.Drawing.Graphics object to use to draw to the panel.

pppp) ToString

Description

Occurs when a System.Windows.Forms.StatusBarPanel object on a System.Windows.Forms.StatusBar control is clicked.

You can use this event to perform tasks when a panel within a System.Windows.Forms.StatusBar control is clicked. The data provided to the event through the System.Windows.Forms.StatusBarPanelClickEventArgs object passed as a parameter to the event handler enables you to determine the System.Windows.Forms.StatusBarPanel object that was clicked by the user in order to perform tasks on the selected panel.

qqqq) CreateHandle

[C#] protected override void CreateHandle( );

[C++] protected: void CreateHandle( );

[VB] Overrides Protected Sub CreateHandle( )

[JScript] protected override function CreateHandle( );

Description rrrr) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the resources (other than memory) used by the System.Windows.Forms.StatusBar.

This method is called by the public Dispose( ) method and the System.Object.Finalize method.

ssss) OnDrawItem

[C#] protected virtual void OnDrawItem(StatusBarDraw-Item EventArgs sbdievent);

[C++] protected: virtual void OnDrawItem(StatusBarDraw-ItemEventArgs* sbdievent);

[VB] Overridable Protected Sub OnDrawItem(ByVal sbdi-event As StatusBarDrawItemEventArgs)

[JScript] protected function OnDrawItem(sbdievent Status-BarDrawItemEventArgs);

Description

Raises the System.Windows.Forms.StatusBar.OnDrawItem (System.Windows.Forms.StatusBarDrawItemEventArgs) event.

Raising an event invokes the event handler through a delegate. For more information, see. A System.Windows.Forms.StatusBarDrawItemEventArgs that contains the event data.

tttt) OnHandleCreated

[C#] protected override void OnHandleCreated(Event Args e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

Raises the System.Windows.Forms.Control.HandleCreated event.

Raising an event invokes the event handler through a delegate. For more information, see. An System.EventArgs that contains the event data.

uuuu) OnHandleDestroyed

[C#] protected override void OnHandleDestroyed(Event Args e);

[C++] protected: void OnHandleDestroyed(EventArgs* e);

[VB] Overrides Protected Sub OnHandleDestroyed(ByVal e As EventArgs)

[JScript] protected override function OnHandleDestroyed(e: EventArgs);

Description

Raises the System.Windows.Forms.Control. HandleDestroyed event.

Raising an event invokes the event handler through a delegate. For more information, see . . . . An System.EventArgs that contains the event data.

vvvv) OnLayout

[C#] protected override void OnLayout(LayoutEventArgs levent);

[C++] protected: void OnLayout(LayoutEventArgs* levent);

[VB] Overrides Protected Sub OnLayout(ByVal levent As LayoutEventArgs)

[JScript] protected override function OnLayout(levent: LayoutEventArgs);

Description

Raises the Layout event.

Raising an event invokes the event handler through a delegate. For more information, see . . . . A LayoutEventArgs that contains the event data.

wwww)OnMouseDown

[C#] protected override void OnMouseDown(MouseEvent Args e);

[C++] protected: void OnMouseDown(MouseEventArgs* e);

[VB] Overrides Protected Sub OnMouseDown(ByVal e As MouseEventArgs)

[JScript] protected override function OnMouseDown(e: MouseEventArgs);

Description

Raises the System.Windows.Forms.StatusBar. OnMouseDown(System.Windows.Forms.MouseEventArgs) event.

Raising an event invokes the event handler through a delegate. For more information, see . . . . A System.Windows.Forms.MouseEventArgs that contains the event data.

xxxx) OnMouseUp

[C#] protected override void OnMouseUp(MouseEventArgs mevent);

[C++] protected: void OnMouseUp(MouseEventArgs* mevent);

[VB] Overrides Protected Sub OnMouseUp(ByVal mevent As MouseEventArgs)

[JScript] protected override function OnMouseUp(mevent: MouseEventArgs);

Description

Raises the System.Windows.StatusBar.OnMouseUp event.

yyyy) OnPanelClick

[C#] protected virtual void OnPanelClick(StatusBarPanel-ClickEventArgs e);

[C++] protected: virtual void OnPanelClick(StatusBarPanel-ClickEventArgs* e);

[VB] Overridable Protected Sub OnPanelClick(ByVal e As StatusBarPanelClickEventArgs)

[JScript] protected function OnPanelClick(e: StatusBarPanelClickEventArgs);

Description

Raises the System.Windows.Forms.StatusBar.OnPanelClick (System.Windows.Forms.StatusBarPanelClickEventArgs) event.

Raising an event invokes the event handler through a delegate. For more information, see. A System.Windows.Forms.StatusBarPanelClickEventArgs that contains the event data.

zzzz) OnResize

[C#] protected override void OnResize(EventArgs e);

[C++] protected: void OnResize(EventArgs* e);

[VB] Overrides Protected Sub OnResize(ByVal e As Event Args)

[JScript] protected override function OnResize(e: Event Args);

Description

Raises the System.Windows.Forms.StatusBar.OnResize (System.EventArgs) event.

Raising an event invokes the event handler through a delegate. For an overview, see. An System.EventArgs that contains the event data.

aaaaa) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

bbbbb) WndProc

[C#] protected override void WndProc(ref Message m);

[C++] protected: void WndProc(Message* m);

[VB] Overrides Protected Sub WndProc(ByRef m As Message)

[JScript] protected override function WndProc (m: Message);

Description

Base wndProc. All messages are sent to wndProc after getting filtered through the preProcessMessage function. Inheriting controls should call base.wndProc for any messages that they don't handle.

StatusBarDrawItemEventArgs class (System.Windows.Forms)

a) WndProc

Description

Provides data for the System.Windows.Forms.StatusBar.DrawItem event.

The System.Windows.Forms.StatusBar.DrawItem event occurs when a visual aspect of an owner-drawn System.Windows.Forms.StatusBarPanel changes. A System.Windows.Forms.StatusBarDrawItemEventArgs specifies the System.Drawing.Graphics object to use to draw the panel, the System.Drawing.Rectangle object in which to draw the panel, the panel identification number, state information about the panel, and the panel to draw. You can use the data provided by this class in an event handler for the System.Windows.Forms.StatusBar.DrawItem event to create custom drawn panels in your application's System.Windows. Forms.StatusBar control.

b) StatusBarDrawItemEventArgs

Example Syntax:

c) WndProc

[C#] public StatusBarDrawItemEventArgs(Graphics g, Font font, Rectangle r, int itemId, DrawItemState itemState, StatusBarPanel panel);

[C++] public: StatusBarDrawItemEventArgs(Graphics* g, Font* font, Rectangle r, int itemId, DrawItemState itemState, StatusBarPanel* panel);

[VB] Public Sub New(ByVal g As Graphics, ByVal font As Font, ByVal r As Rectangle, ByVal itemId As Integer, ByVal itemState As DrawItemState, ByVal panel As StatusBarPanel)

[JScript] public function StatusBarDrawItemEventArgs(g: Graphics, font: Font, r: Rectangle, itemId: int, itemState: DrawItemState, panel: StatusBarPanel);

Description

Initializes a new instance of the System.Windows.Forms.StatusBarDrawItemEventArgs class. The System.Drawing.Graphics object to use to draw the System.Windows.Forms.StatusBarPanel. The System.Drawing.Font used to render text. The System.Drawing.Rectangle object that represents the client area of the System.Windows.Forms.StatusBarPanel. The zero-based index of the panel in the System.Windows.Forms.StatusBar.StatusBarPanelCollection of the System.Windows.Forms.StatusBar control. One of the System.Windows.Forms.DrawItemState values that represents state information about the System.Windows.Forms.StatusBarPanel. A System.Windows.Forms.StatusBarPanel that represents the panel to draw.

d) BackColor e) Bounds f) Font g) ForeColor h) Graphics i) Index j) Panel k) WndProc Description Gets the System.Windows.Forms.StatusBarPanel to draw.

The System.Windows.Forms.StatusBarDraw ItemEvent Args. Panel property enables you to obtain the System.Windows. Forms.StatusBarPanel object that needs to be drawn. You can use this within the event handler for the System.Windows. Forms.StatusBar.DrawItem event of a System.Windows. Forms.StatusBar control to perform owner-draw tasks on the System.Windows.Forms.StatusBarPanel that requires drawing.

l) State

StatusBarDrawItemEventHandler delegate (System.Windows.Forms)

a) ToString

Description

Represents the method that will handle the System.Windows.Forms.StatusBar.DrawItem event of a System.Windows.Forms.StatusBar. The source of the event. A System.Windows.Forms.StatusBarDrawItemEventArgs that contains the event data.

When you create a(n) System.Windows.Forms.StatusBarDrawItemEventHandler delegate, you identify the method that will handle the event. To associate the event with your event handler, add an instance of the delegate to the event. The event handler is called whenever the event occurs, unless you remove the delegate. For more information about event handler delegates, see.

StatusBarPanel class (System.Windows.Forms)

a) ToString

Description

Represents a panel in a System.Windows.Forms.StatusBar control.

A System.Windows.Forms.StatusBarPanel object represents an individual panel in the System.Windows.Forms.StatusBar.StatusBarPanelCollection of a System.Windows.Forms.StatusBar control. A System.Windows.Forms.StatusBarPanel object can contain text and/or an icon which can be used to reflect the status of an application. Use the System.Windows.Forms.StatusBar.StatusBarPanelCollection, accessible through the System.Windows.Forms.StatusBar.Panels property of a System.Windows.Forms.StatusBar control, to retrieve, add, or remove an individual System.Windows.Forms.StatusBarPanel object.

b) StatusBarPanel

Example Syntax:

c) ToString

[C#] public StatusBarPanel( );

[C++] public: StatusBarPanel( );

[VB] Public Sub New( )

[JScript] public function StatusBarPanel( );

Description

Initializes a new instance of the System.Windows.Forms.StatusBarPanel class.

When you create an instance of System.Windows.Forms.StatusBarPanel, the following read/write properties are set to initial values.

d) Alignment e) ToString

[C#] public HorizontalAlignment Alignment {get; set;}

[C++] public: _property HorizontalAlignment get_Alignment( ); public: _property void set_Alignment(HorizontalAlignment);

[VB] Public Property Alignment As HorizontalAlignment

[JScript] public function get Alignment( ): HorizontalAlignment; public function set Alignment(HorizontalAlignment);

Description

Gets or sets the alignment of text and icons within the System.Windows.Forms.StatusBarPanel.

You can use this property to horizontally align the text and/or the icon assigned to the System.Windows.Forms.StatusBarPanel.Icon property within the borders of the panel. Text and icons can be aligned to the left, right, or center of the System.Windows.Forms.StatusBarPanel. There is no way to independently position an icon within the System.Windows.Forms.StatusBarPanel. For example, you cannot position an icon to the left side of the System.Windows.Forms.StatusBarPanel while aligning the text on the right side. The icon is always positioned to the left side of the text regardless of how the text is aligned.

f) AutoSize g) ToString

[C#] public StatusBarPanelAutoSize AutoSize {get; set;}

[C++] public: _property StatusBarPanelAutoSize get_AutoSize( ); public: _property void set_AutoSize(StatusBarPanelAutoSize);

[VB] Public Property AutoSize As StatusBarPanelAutoSize

[JScript] public function get AutoSize( ): StatusBarPanelAutoSize; public function set AutoSize(StatusBarPanelAutoSize);

Description

Gets or sets a value indicating whether the System.Windows.Forms.StatusBarPanel is autosized.

System.Windows.Forms.StatusBarPanel objects set to StatusBarPanelAutoSize.Contents have precedence over those panels set to the StatusBarPanelAutoSize.Spring value. For example, a System.Windows.Forms.StatusBarPanel that has its System.Windows.Forms.StatusBarPanel.AutoSize property set to StatusBarPanelAutoSize.Spring is shortened if a System.Windows.Forms.StatusBarPanel object with the System.Windows.Forms.StatusBarPanel.AutoSize property set to StatusBarPanelAutoSize.Contents requires that space. You can use this property to ensure that the contents of a System.Windows.Forms.StatusBarPanel are properly displayed is a System.Windows.Forms.StatusBar control that contains more than one panel. For example, you may want a panel containing text to adjust automatically to the amount of text it is displaying (StatusBarPanelAutoSize.Contents), while another panel on the System.Windows.Forms.StatusBar that displays an owner-drawn progress bar would need to be a fixed size (StatusBarPanelAutoSize.None).

h) BorderStyle i) ToString

[C#] public StatusBarPanelBorderStyle BorderStyle {get; set;}

[C++] public: _property StatusBarPanelBorderStyle get BorderStyle( ); public: _property void set_BorderStyle(StatusBarPanelBorderStyle);

[VB] Public Property BorderStyle As StatusBarPanelBorderStyle

[JScript] public function get BorderStyle( ): StatusBarPanelBorderStyle; public function set BorderStyle(StatusBarPanelBorderStyle);

Description

Gets or sets the border style of the System.Windows.Forms.StatusBarPanel.

You can use this property to differentiate a panel from other panels in a System.Windows.Forms.StatusBar control.

j) Container k) DesignMode l) Events m) Icon n) ToString

Description

Gets or sets the icon to display within the System.Windows.Forms.StatusBarPanel.

You can use this property to display an icon that represents the state of your application or a process within your application.

For example, you can display an icon in a System.Windows.Forms.StatusBarPanel to indicate whether a file save operation is in progress or complete.

o) MinWidth p) ToString

[C#] public int MinWidth {get; set;}

[C++] public: _property int get_MinWidth( ); public: _property void set_MinWidth(int);

[VB] Public Property MinWidth As Integer

[JScript] public function get MinWidth( ): int; public function set MinWidth(int);

Description

Gets or sets the minimum allowed width of the System.Windows.Forms.StatusBarPanel within the System.Windows.Forms.StatusBar control.

The System.Windows.Forms.StatusBarPanel.MinWidth property is used when the System.Windows.Forms.StatusBarPanel.AutoSize property is set to StatusBarPanelAutoSize.Contents or StatusBarPanelAutoSize.Spring, to prevent the System.Windows.Forms.StatusBarPanel from autosizing to a width that is too small. When the System.Windows.Forms.StatusBarPanel.AutoSize property is set to StatusBarPanelAutoSize.None, the System.Windows.Forms.StatusBarPanel.MinWidth property is automatically set to the same value as the System.Windows.Forms.StatusBarPanel.Width property.

q) Parent r) ToString

[C#] public StatusBar Parent {get;}

[C++] public: _property StatusBar* get_Parent( );

[VB] Public ReadOnly Property Parent As StatusBar

[JScript] public function get Parent( ): StatusBar;

Description

Gets the System.Windows.Forms.StatusBar control that hosts the System.Windows.Forms.StatusBarPanel.

You can use this property to determine the System.Windows.Forms.StatusBar control that a System.Windows.Forms.StatusBarPanel object is contained within.

s) Site t) Style u) ToString

Description

Gets or sets the style of the System.Windows.Forms.StatusBarPanel.

You can use this property to indicate whether a System.Windows.Forms.StatusBarPanel displays text or whether the panel is managed as an owner-drawn System.Windows.Forms.StatusBarPanel. To determine when a System.Windows.Forms.StatusBarPanel object needs to be drawn, create an event handler for the System.Windows.Forms.StatusBar.DrawItem event of the System.Windows.Forms.StatusBar control. The System.Windows.Forms.StatusBarDrawItemEventArgs object passed as a parameter to an event handler of the System.Windows.Forms.StatusBar.DrawItem event enables you to determine which panel needs to be drawn. The System.Windows.Forms.StatusBarDrawItemEventArgs also provides a System.Drawing.Graphics object you can use to perform drawing tasks on the System Windows.Forms.StatusBarPanel.

v) Text w) ToString

[C#] public string Text {get; set;}

[C++] public: _property String* get Text( ); public: _property void set_Text(String*);

[VB] Public Property Text As String

[JScript] public function get Text( ): String; public function set Text(String);

Description

Gets or sets the text of the System.Windows.Forms.StatusBarPanel.

This property represents the text that is displayed when the System.Windows.Forms.StatusBarPanel.Style property is set to StatusBarPanelStyle.Text. You can use this property to display information about your application in a System.Windows.Forms.StatusBar control. For example, you can use the System.Windows.Forms.StatusBarPanel.Text property to display help information when the user moves the mouse over a menu or to display the name and location of a file that is opened in an application. To align the text within System.Windows.Forms.StatusBarPanel property, use the System.Windows.Forms.StatusBarPanel.Alignment property.

x) ToolTipText y) ToString

[C#] public string ToolTipText {get; set;}

[C++] public: _property String* get_ToolTipText( ); public: _property void set_ToolTipText(String*);

[VB] Public Property ToolTipText As String

[JScript] public function get ToolTipText( ): String; public function set ToolTipText(String);

Description

Gets or sets ToolTip text associated with the System.Windows.Forms.StatusBarPanel.

You can use this property to display additional information in a ToolTip when the user hovers the mouse over a System.Windows.Forms.StatusBarPanel. For example, you can display a ToolTip that provides data transfer speed for a System.Windows.Forms.StatusBarPanel that displays the status of a file transfer.

z) Width aa) ToString

[C#] public int Width {get; set;}

[C++] public: _property int get_Width( ); public: _property void set_Width(int);

[VB] Public Property Width As Integer

[JScript] public function get Width( ): int; public function set Width(int);

Description

Gets or sets the width of the System.Windows.Forms.StatusBarPanel within the System.Windows.Forms.StatusBar control.

The System.Windows.Forms.StatusBarPanel.Width property always reflects the actual width of a System.Windows.Forms.StatusBarPanel and cannot be smaller than the System.Windows.Forms.StatusBarPanel.MinWidth property. To autosize the width of the System.Windows.Forms.StatusBarPanel to the contents of the System.Windows.Forms.StatusBarPanel you can use the System.Windows.Forms.StatusBarPanel.AutoSize property.

bb) BeginInit

[C#] public void BeginInit( );

[C++] public: sealed void BeginInit( );

[VB] NotOverridable Public Sub BeginInit( )

[JScript] public function BeginInit( );

Description

Begins the initialization of a System.Windows.Forms.StatusBarPanel

This method is used to start the initialization of a component that is used on a form or used by another component. The System.Windows.Forms.StatusBarPanel.EndInit method ends the initialization. Using the System.Windows.Forms.StatusBarPanel.BeginInit and System.Windows.Forms.StatusBarPanel.EndInit methods prevents the control from being used before it is fully initialized.

cc) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

[To be suplied.]

dd) EndInit

[C#] public void EndInit( );

[C++] public: _sealed void EndInit( );

[VB] NotOverridable Public Sub EndInit( )

[JScript] public function EndInit( );

Description

Ends the initialization of a System.Windows.Forms.StatusBarPanel

This method is used to end the initialization of a component that is used by another component. The System.Windows.Forms.StatusBarPanel.BeginInit method starts the initialization. Using the System.Windows.Forms.StatusBarPanel.BeginInit and System.Windows.Forms.StatusBarPanel.EndInit methods prevents the control from being used before it is fully initialized.

ee) ToString

[C#] public override string ToString( );

[C++] public: String* ToString( );

[VB] Overrides Public Function ToString( ) As String

[JScript] public override function ToString( ): String;

Description

Retrieves a string that contains information about the panel.

Return Value: Returns a string that contains the class name for the control and the text it contains.

StatusBarPanelAutoSize enumeration (System.Windows.Forms)

a) ToString

Description

Specifies how a System.Windows.Forms.StatusBarPanel on a System.Windows.Forms.StatusBar control autosizes when the control resizes.

This enumeration is used by the System.Windows.Forms.StatusBarPanel.AutoSize property. The System.Windows.Forms.StatusBarPanel.AutoSize property specifies how a System.Windows.Forms.StatusBarPanel is autosized on a System.Windows.Forms.StatusBar control.

b) ToString

[C#] public const StatusBarPanelAutoSize Contents;

[C++] public: const StatusBarPanelAutoSize Contents;

[VB] Public Const Contents As StatusBarPanelAutoSize

[JScript] public var Contents: StatusBarPanelAutoSize;

Description

The width of the StatusBarPanel is determined by its contents.

c) ToString

[C#] public const StatusBarPanelAutoSize None;

[C++] public: const StatusBarPanelAutoSize None;

[VB] Public Const None As StatusBarPanelAutoSize

[JScript] public var None: StatusBarPanelAutoSize;

Description

The System.Windows.Forms.StatusBarPanel does not change size when the System.Windows.Forms.StatusBar control resizes.

d) ToString

[C#] public const StatusBarPanelAutoSize Spring;

[C++] public: const StatusBarPanelAutoSize Spring;

[VB] Public Const Spring As StatusBarPanelAutoSize

[JScript] public var Spring: StatusBarPanelAutoSize;

Description

The System.Windows.Forms.StatusBarPanel shares the available space on the System.Windows.Forms.StatusBar (the space not taken up by other panels whose System.Windows.Forms.StatusBarPanel.AutoSize property is set to StatusBarPanelAutoSize.None or StatusBarPanelAutoSize.Contents) with other panels that have their System.Windows.Forms.StatusBarPanel.AutoSize property set to StatusBarPanelAutoSize.Spring.

StatusBarPanelBorderStyle enumeration (System.Windows.Forms)

a) ToString

Description

Specifies the appearance of the border for a System.Windows.Forms.StatusBarPanel on a System.Windows.Forms.StatusBar control.

This enumeration is used by the System.Windows.Forms.StatusBarPanel.BorderStyle property of the System.Windows.Forms.StatusBarPanel class. The System.Windows.Forms.StatusBarPanel.BorderStyle property enables you to specify the style of border to display a System.Windows.Forms.StatusBarPanel within a System.Windows.Forms.StatusBar.

b) ToString

[C#] public const StatusBarPanelBorderStyle None;

[C++] public: const StatusBarPanelBorderStyle None;

[VB] Public Const None As StatusBarPanelBorderStyle

[JScript] public var None: StatusBarPanelBorderStyle;

Description

No border is displayed.

c) ToString

[C#] public const StatusBarPanelBorderStyle Raised;

[C++] public: const StatusBarPanelBorderStyle Raised;

[VB] Public Const Raised As StatusBarPanelBorderStyle

[JScript] public var Raised: StatusBarPanelBorderStyle;

Description

The System.Windows.Forms.StatusBarPanel is displayed with a three-dimensional raised border.

d) ToString

[C#] public const StatusBarPanelBorderStyle Sunken;

[C++] public: const StatusBarPanelBorderStyle Sunken;

[VB] Public Const Sunken As StatusBarPanelBorderStyle

[JScript] public var Sunken: StatusBarPanelBorderStyle;

Description

The System.Windows.Forms.StatusBarPanel is displayed with a three-dimensional sunken border.

StatusBarPanelClickEventArgs class (System.Windows.Forms)

a) ToString

Description

Provides data for the System.Windows.Forms.StatusBar.PanelClick event.

The System.Windows.Forms.StatusBar.PanelClick event occurs when the user clicks a panel on the System.Windows.Forms.StatusBar. A System.Windows.Forms.StatusBarPanelClickEventArgs specifies which System.Windows.Forms.StatusBarPanel was clicked, the mouse button that was pressed, how many times it was pressed, and the coordinates of the mouse click at the time the System.Windows.Forms.StatusBarPanel was clicked.

You can use the data provided by this class in an event handler for the System.Windows.Forms.StatusBar.PanelClick event to perform tasks related to the System.Windows.Forms.StatusBarPanel being clicked. For example, if a System.Windows.Forms.StatusBarPanel is used to display the time, you could create an event handler for the System.Windows.Forms.StatusBar.PanelClick event and use data provided by this class to display a dialog that allows you to modify the date and time on the system.

b) StatusBarPanelClickEventArgs

Example Syntax:

c) ToString

[C#] public StatusBarPanelClickEventArgs(StatusBarPanel statusBarPanel, MouseButtons button, int clicks, int x, int y);

[C++] public: StatusBarPanelClickEventArgs(StatusBarPanel* statusBarPanel, MouseButtons button, int clicks, int x, int

[VB] Public Sub New(ByVal statusBarPanel As StatusBarPanel, ByVal button As MouseButtons, ByVal clicks As Integer, ByVal x As Integer, ByVal y As Integer)

[JScript] public function StatusBarPanelClickEventArgs (statusBarPanel StatusBarPanel, button: MouseButtons, clicks: int, x: int, y: int);

Description

Initializes a new instance of the System.Windows.Forms.StatusBarPanelClickEventArgs class. The System.Windows.Forms.StatusBarPanel that represents the panel that was clicked. One of the System.Windows.Forms.MouseButtons values that represents the mouse buttons that were clicked while over the System.Windows.Forms.StatusBarPanel. The number of times that the mouse button was clicked. The x-coordinate of the mouse click. The y-coordinate of the mouse click.

d) Button e) Clicks f) Delta g) StatusBarPanel h) ToString

Description

Gets the System.Windows.Forms.StatusBarPanel to draw.

The System.Windows.Forms.StatusBarPanelClick Event Args.StatusBarPanel property enables you to obtain the System.Windows.Forms.StatusBarPanel object that was clicked. You can use this within the event handler for the System.Windows.Forms.StatusBar.PanelClick event of a System.Windows.Forms.StatusBar control to perform tasks such as displaying custom dialog boxes when a System.Windows.Forms.StatusBarPanel within a System.Windows.Forms.StatusBar control is clicked.

i) X j) Y

StatusBarPanelClickEventHandler delegate (System.Windows.Forms)

a) ToString

Description

Represents the method that will handle the System.Windows.Forms.StatusBar.PanelClick event of a System.Windows.Forms.StatusBar. The source of the event. A System.Windows.Forms.StatusBarPanelClickEventArgs that contains the event data.

When you create a(n) System.Windows.Forms.StatusBarPanelClickEventHandler delegate, you identify the method that will handle the event. To associate the event with your event handler, add an instance of the delegate to the event. The event handler is called whenever the event occurs, unless you remove the delegate. For more information about event handler delegates, see.

StatusBar.StatusBarPanelCollection class (System.Windows.Forms)

a) ToString

Description

Represents the collection of panels in a System.Windows.Forms.StatusBar control.

The System.Windows.Forms.StatusBar.Status BarPanelCollection class stores the panels displayed in the System.Windows.Forms.StatusBar. Each object in the collection is an instance of the StatusBarPanel class which defines the display characteristics and behaviors of a panel displayed in a System.Windows.Forms.StatusBar.

b) StatusBar.StatusBarPanelCollection

Example Syntax:

c) ToString

[C#] public StatusBar.StatusBarPanelCollection(StatusBar owner);

[C++] public: StatusBarPanelCollection(StatusBar* owner);

[VB] Public Sub New(ByVal owner As StatusBar)

[JScript] public function StatusBar.StatusBarPanelCollection(owner: StatusBar);

Description

Initializes a new instance of the System.Windows.Forms.StatusBar.StatusBarPanelCollection class.

You cannot create an instance of this class without associating it with a System.Windows.Forms.StatusBar control. The System.Windows.Forms.StatusBar control that contains this collection.

d) Count e) ToString

[C#] public int Count {get;}

[C++] public: _property int get_Count( );

[VB] Public ReadOnly Property Count As Integer

[JScript] public function get Count( ): int;

Description

Gets the number of items in the collection.

This property enables you to determine the number of panels in the System.Windows.Forms.StatusBar. You can then use this value when you are looping through the values of the collection and you need to provide a number of iterations to perform the loop.

f) IsReadOnly g) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether this collection is read-only.

This property is always false for this collection.

h) Item i) ToString

[C#] public virtual StatusBarPanel this[int index] {get; set;}

[C++] public: _property virtual StatusBarPanel* get_Item(int index); public: _property virtual void set_Item(int index, StatusBarPanel*);

[VB] Overridable Public Default Property Item(ByVal index As Integer) As StatusBarPanel

[JScript] returnValue=StatusBarPanelCollectionObject.Item (index); StatusBarPanelCollectionObject.Item (index)=returnValue;

Description

Gets or sets the System.Windows.Forms.StatusBarPanel at the specified index.

You can use this method to obtain the System.Windows.Forms.StatusBarPanel stored at a specific location within the collection. To determine the index of a specific panel within the collection, use the System.Windows.Forms.StatusBar.StatusBarPanelCollection.IndexOf(System.Windows.Forms.StatusBarPanel) method. The index of the panel in the collection to get or set.

j) Add

[C#] public virtual int Add(StatusBarPanel value);

[C++] public: virtual int Add(StatusBarPanel* value);

[VB] Overridable Public Function Add(ByVal value As StatusBarPanel) As Integer

[JScript] public function Add(value: StatusBarPanel): int;

Description

Adds a System.Windows.Forms.StatusBarPanel to the collection.

Return Value: The zero-based index of the item in the collection.

You can add panels to a System.Windows.Forms.StatusBar control to display more than one type of information. This version of the System.Windows.Forms.StatusBar.StatusBarPanelCollection.Add(System.String) method adds the System.Windows.Forms.StatusBarPanel object specified in the value parameter to the collection. The order in which panels are located in the System.Windows.Forms.StatusBar.StatusBarPanelCollection represents the order that panels are displayed within the System.Windows.Forms.StatusBar control. Panels are displayed from left to right starting with the first panel in the collection. The System.Windows.Forms.Control.RightToLeft property of the System.Windows.Forms.StatusBar control does not change the order in which panels are displayed in the System.Windows.Forms.StatusBar. To insert a panel at a specific position in the collection, use the System.Windows.Forms.StatusBar.StatusBarPanelCollection.Insert(System.Int32, System.Windows.Forms.StatusBarPanel) method. To add a set of panels to the collection in a single operation, use the System.Windows.Forms.StatusBar.StatusBarPanelCollection.AddRange (System.Windows. Forms.StatusBarPanel[ ]) method. A System.Windows.Forms.StatusBarPanel that represents the panel to add to the collection.

k) Add

[C#] public virtual StatusBarPanel Add(string text);

[C++] public: virtual StatusBarPanel* Add(String* text);

[VB] Overridable Public Function Add(ByVal text As String) As StatusBarPanel

[JScript] public function Add(text: String): StatusBarPanel; Adds a System.Windows.Forms.StatusBarPanel to the collection.

Description

Adds a System.Windows.Forms.StatusBarPanel with the specified text to the collection.

Return Value: A System.Windows.Forms.StatusBarPanel that represents the panel that was added to the collection.

You can add panels to a System.Windows.Forms.StatusBar control to display more than one type of information. This version of the System.Windows.Forms.StatusBar.StatusBarPanelCollection.Add(System.String) method creates a new System.Windows.Forms.StatusBarPanel object with the text specified in the text parameter and adds it to collection. The order in which panels are located in the System.Windows.Forms.StatusBar.StatusBarPanelCollection represents the order that panels are displayed within the System.Windows.Forms.StatusBar control. Panels are displayed from left to right starting with the first panel in the collection. The System.Windows.Forms.Control.RightToLeft property of the System.Windows.Forms.StatusBar control does not change the order in which panels are displayed in the System.Windows.Forms.StatusBar. To insert a panel at a specific position in the collection, use the System.Windows.Forms.StatusBar.StatusBarPanelCollection.Insert(System.Int32, System.Windows.Forms.StatusBarPanel) method. To add a set of panels to the collection in a single operation, use the System.Windows.Forms.StatusBar.StatusBar PanelCollection.AddRange (System.Windows.Forms.StatusBarPanel[ ]) method. The text for the System.Windows.Forms.StatusBarPanel that is being added.

l) AddRange

[C#] public virtual void AddRange(StatusBarPanel[ ] panels);

[C++] public: virtual void AddRange(StatusBarPanel* panels[ ]);

[VB] Overridable Public Sub AddRange(ByVal panels( ) As StatusBarPanel)

[JScript] public function AddRange(panels: StatusBarPanel[ ]);

Description

Adds an array of System.Windows.Forms.StatusBarPanel objects to the collection.

You can add panels to a System.Windows.Forms.StatusBar control to display more than one type of information. The System.Windows.Forms.StatusBar.StatusBarPanel Collection.AddRange (System.Windows.Forms.StatusBarPanel[ ]) method adds an array of System.Windows.Forms.StatusBarPanel objects specified in the panels parameter to the collection. All existing panels in the collection are removed from the collection before inserting new panels. The order in which panels are located in the System.Windows.Forms.StatusBar.StatusBarPanel Collection represents the order that panels are displayed within the System.Windows.Forms.StatusBar control. Panels are displayed from left to right starting with the first panel in the collection. The System.Windows.Forms.Control.RightToLeft property of the System.Windows.Forms.StatusBar control does not change the order in which panels are displayed in the System.Windows.Forms.StatusBar. To add a single System.Windows.Forms.StatusBarPanel object to the collection, use the System.Windows.Forms.StatusBar. StatusBarPanel Collection.Add(System.String) method. To insert a panel at a specific position in the System.Windows. Forms.StatusBar control (and in this collection), use the System.Windows.Forms.StatusBar.StatusBarPanelCollection. Insert(System.Int32, System.Windows.Forms.StatusBarPanel) method. An array of System.Windows.Forms.StatusBarPanel objects to add.

m) Clear

[C#] public virtual void Clear( );

[C++] public: virtual void Clear( );

[VB] Overridable Public Sub Clear( )

[JScript] public function Clear( );

Description

Removes all items from the collection.

When you remove panels from the collection, all information about the deleted panels is lost. To remove a single panel from the System.Windows.Forms.StatusBar, use the System.Windows.Forms.StatusBar.StatusBarPanelCollection.Remove (System.Windows.Forms.StatusBarPanel) or System.Windows.Forms.StatusBar.StatusBarPanelCollection.Remove At(System.Int32) method.

n) Contains

[C#] public bool Contains(StatusBarPanel panel);

[C++] public: bool Contains(StatusBarPanel* panel);

[VB] Public Function Contains(ByVal panel As StatusBarPanel) As Boolean

[JScript] public function Contains(panel: StatusBarPanel): Boolean;

Description

Determines whether the specified panel is located within the collection.

Return Value: true if the panel is located within the collection; otherwise, false.

The System.Windows.Forms.StatusBar.Status BarPanelCollection.Contains(System.Windows.Forms.StatusBarPanel) method enables you to determine whether a panel is a member of the collection. Once you know that the item is located within the collection, you can use the System.Windows.Forms.StatusBar.StatusBarPanelCollection.IndexOf(System.Windows.Forms.StatusBarPanel) method to determine where the panel is located within the collection. The System.Windows.Forms.StatusBarPanel to locate in the collection.

o) GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumerator to use to iterate through the item collection.

Return Value An System.Collections.IEnumerator object that represents the item collection.

p) IndexOf

[C#] public int IndexOf(StatusBarPanel panel);

[C++] public: int IndexOf(StatusBarPanel* panel);

[VB] Public Function IndexOf(ByVal panel As StatusBarPanel) As Integer

[JScript] public function IndexOf(panel: StatusBarPanel): int;

Description

Returns the index within the collection of the specified panel.

Return Value: The zero-based index where the panel is located within the collection; otherwise, negative one (−1).

The System.Windows.Forms.StatusBar.StatusBarPanel Collection.IndexOf(System.Windows.Forms.StatusBarPanel) method enables you to determine where a panel is located within the collection. To determine whether an item is located within the collection before calling this method, use the System.Windows.Forms.StatusBar.StatusBarPanel Collection. Contains(System.Windows.Forms.StatusBarPanel) method. The System.Windows.Forms.StatusBarPanel object to locate in the collection.

q) Insert

[C#] public virtual void Insert(int index, StatusBarPanel value);

[C++] public: virtual void Insert(int index, StatusBarPanel* value);

[VB] Overridable Public Sub Insert(ByVal index As Integer, ByVal value As StatusBarPanel)

[JScript] public function Insert(index: int, value: StatusBarPanel);

Description

Inserts the specified System.Windows.Forms.StatusBarPanel into the collection at the specified index.

You can add panels to a System.Windows.Forms.StatusBar control to display more than one type of information. The System.Windows.Forms.StatusBar.StatusBarPanel Collection.Insert(System.Int32, System.Windows.Forms.StatusBarPanel) method enables you to create a new System.Windows.Forms.StatusBarPanel object and insert it at a specific location within the collection. The order in which panels are located in the System.Windows.Forms.StatusBar. StatusBarPanelCollection represents the order that panels are displayed within the System.Windows.Forms.StatusBar control. Panels are displayed from left to right starting with the first panel in the collection. The System.Windows.Forms.Control. RightToLeft property of the System.Windows.Forms.StatusBar control does not change the order in which panels are displayed in the System.Windows.Forms.StatusBar. To add a panel to the end of the collection, use the System.Windows.Forms.StatusBar.StatusBarPanelCollection.Add(System.String) method. To add a set of panels to the collection in a single operation, use the System.Windows.Forms.StatusBar.StatusBarPanelCollection.AddRange (System.Windows.Forms.StatusBarPanel[ ]) method. The zero-based index location where the panel is inserted. A System.Windows.Forms.StatusBarPanel representing the panel to insert.

r) Remove

[C#] public virtual void Remove(StatusBarPanel value);

[C++] public: virtual void Remove(StatusBarPanel* value);

[VB] Overridable Public Sub Remove(ByVal value As StatusBarPanel)

[JScript] public function Remove(value: StatusBarPanel);

Description

Removes the specified System.Windows.Forms.StatusBarPanel from the collection.

When you remove a panel from the list, the indices change for subsequent items in the collection. All information about the removed panel is deleted. You can use this method to remove a specific panel from the System.Windows.Forms.StatusBar by specifying the actual System.Windows.Forms.StatusBarPanel to remove from the collection. To specify the index of the panel to remove instead of the panel itself, use the System.Windows.Forms.StatusBar.StatusBarPanel Collection. RemoveAt (System.Int32) method. To remove all panels from the collection, use the System.Windows.Forms.StatusBar.StatusBarPanelCollection.Clear method. The System. Windows.Forms.StatusBarPanel representing the panel to remove from the collection.

s) RemoveAt

[C#] public virtual void RemoveAt(int index);

[C++] public: virtual void RemoveAt(int index);

[VB] Overridable Public Sub RemoveAt(ByVal index As Integer)

[JScript] public function RemoveAt(index: int);

Description

Removes the System.Windows.Forms.StatusBarPanel located at the specified index within the collection.

When you remove a panel from the collection, the indices change for subsequent panels in the collection. All information about the removed panel is deleted. You can use this method to remove a specific panel from the list by specifying the index of the panel to remove from the collection. To specify the panel to remove instead of the index to the panel, use the System.Windows.Forms.StatusBar.Status BarPanelCollection.Remove(System.Windows.Forms.StatusBarPanel) method. To remove all panels from the System.Windows.Forms.StatusBar control, use the System. Windows.Forms.StatusBar.StatusBarPanelCollection.Clear method. The zero-based index of the item to remove.

t) ICollection.CopyTo

[C#] void ICollection.CopyTo(Array dest, int index);

[C++] void ICollection::CopyTo(Array* dest, int index);

[VB] Sub CopyTo(ByVal dest As Array, ByVal index As Integer) Implements ICollection.CopyTo

[JScript] function ICollection.CopyTo(dest: Array, index: int);

u) IList.Add

[C#] int IList.Add(object value);

[C++] int IList::Add(Object* value);

[VB] Function Add(ByVal value As Object) As Integer Implements IList.Add

[JScript] function IList.Add(value: Object): int;

v) IList.Contains

[C#] bool IList.Contains(object panel);

[C++] bool IList::Contains(Object* panel);

[VB] Function Contains(ByVal panel As Object) As Boolean Implements IList.Contains

[JScript] function IList.Contains(panel: Object): Boolean;

w) IList.IndexOf

[C#] int IList.IndexOf(object panel);

[C++] int IList::IndexOf(Object* panel);

[VB] Function IndexOf(ByVal panel As Object) As Integer Implements IList.IndexOf

[JScript] function IList.IndexOf(panel: Object): int;

x) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

y) IList.Remove

[C#] void IList.Remove(object value);

[C++] void IList::Remove(Object* value);

[VB] Sub Remove(ByVal value As Object) Implements IList. Remove

[JScript] function IList.Remove(value Object);

StatusBarPanelStyle enumeration (System.Windows. Forms)

a) ToString

Description

Specifies whether a System.Windows.Forms.StatusBarPanel object on a System.Windows.Forms.StatusBar control is owner-drawn or system-drawn.

Use the members of this enumeration to set the value of the System.Windows.Forms.StatusBarPanel.Style property of the System.Windows.Forms.StatusBarPanel class. The Style property determines the way in which the System.Windows. Forms.StatusBarPanel will be displayed.

b) ToString

[C#] public const StatusBarPanelStyle OwnerDraw;

[C++] public: const StatusBarPanelStyle OwnerDraw;

[VB] Public Const OwnerDraw As StatusBarPanelStyle

[JScript] public var OwnerDraw: StatusBarPanelStyle;

Description

The System.Windows.Forms.StatusBarPanel is drawn by the owner.

c) ToString

[C#] public const StatusBarPanelStyle Text;

[C++] public: const StatusBarPanelStyle Text;

[VB] Public Const Text As StatusBarPanelStyle

[JScript] public var Text: StatusBarPanelStyle;

Description

The System.Windows.Forms.StatusBarPanel displays text in the standard font.

StructFormat enumeration (System.Windows.Forms)

a) ToString

Description b) ToString

[C#] public const StructFormat Ansi;

[C++] public: const StructFormat Ansi;

[VB] Public Const Ansi As StructFormat

[JScript] public var Ansi: StructFormat;

Description c) ToString

[C#] public const StructFormat Auto;

[C++] public: const StructFormat Auto;

[VB] Public Const Auto As StructFormat

[JScript] public var Auto: StructFormat;

Description d) ToString

[C#] public const StructFormat Unicode;

[C++] public: const StructFormat Unicode;

[VB] Public Const Unicode As StructFormat

[JScript] public var Unicode: StructFormat;

Description

SystemInformation class (System.Windows.Forms)

a) ToString

Description

Provides information about the operating system.

System.Windows.Forms.SystemInformation provides static methods and properties that can be used to get information such as Windows display element sizes, operating system settings, network availability, and the capabilities of hardware installed on the system. This class cannot be instantiated.

b) ArrangeDirection c) ToString

[C#] public static ArrangeDirection ArrangeDirection {get;}

[C++] public: _property static ArrangeDirection get_ArrangeDirection( );

[VB] Public Shared ReadOnly Property ArrangeDirection As ArrangeDirection

[JScript] public static function get ArrangeDirection( ): ArrangeDirection;

Description

Gets flags specifying how the operating system arranges minimized windows.

d) ArrangeStartingPosition e) ToString

[C#] public static ArrangeStartingPosition ArrangeStartingPosition {get;}

[C++] public: _property static ArrangeStartingPosition get_ArrangeStartingPosition( );

[VB] Public Shared ReadOnly Property ArrangeStartingPosition As ArrangeStartingPosition

[JScript] public static function get ArrangeStarting Position( ): ArangeStartingPosition;

Description

Gets flags specifying how the operating system arranges minimized windows.

The value is a combination of one starting position value and one direction value.

f) BootMode g) ToString

[C#] public static BootMode BootMode {get;}

[C++] public: _property static BootMode get_BootMode( );

[VB] Public Shared ReadOnly Property BootMode As BootMode

[JScript] public static function get BootMode( ): BootMode;

Description

Gets a value that specifies how the system was started.

Use System.Windows.Forms.SystemInformation.BootMode to determine how the user started the system. For applications running on Windows 95 or Windows 98, you can use this property to determine whether the operating system is in fail-safe mode. Your application uses this information to operate appropriately when it accesses system services and hardware.

h) Border3DSize i) ToString

[C#] public static Size Border3DSize {get;}

[C++] public: _property static Size get_Border3DSize( );

[VB] Public Shared ReadOnly Property Border3DSize As Size

[JScript] public static function get Border3DSize( ): Size;

Description

Gets the dimensions, in pixels, of a three-dimensional (3-D) border.

System.Windows.Forms.SystemInformation.Border3DSize is the three-dimensional counterpart of the System.Windows.Forms.SystemInformation.BorderSize. Use this property when creating a control that has a 3-D border to determine the proper sizing of the border.

j) BorderSize k) ToString

[C#] public static Size BorderSize {get;}

[C++] public: _property static Size get_BorderSize( );

[VB] Public Shared ReadOnly Property BorderSize As Size

[JScript] public static function get BorderSize( ): Size;

Description

Gets the width and height, in pixels, of a window border.

The System.Windows.Forms.SystemInformation.Border Size property is the non-three-dimensional counterpart of the System.Windows.Forms.SystemInformation.Border3DSize property. Use this property when creating a control that has a border to determine the proper sizing of the border.

l) CaptionButtonSize m) ToString

[C#] public static Size CaptionButtonSize {get;}

[C++] public: property static Size get_CaptionButtonSize( );

[VB] Public Shared ReadOnly Property CaptionButtonSize As Size

[JScript] public static function get CaptionButtonSize( ): Size;

Description

Gets the dimensions, in pixels, of a caption bar or title bar button.

Use System.Windows.Forms.SystemInformation.Caption ButtonSize to get the dimensions of a button in the caption bar of window, to place additional caption buttons in the caption of a window, and to ensure the button is properly sized.

n) CaptionHeight o) ToString

[C#] public static int CaptionHeight {get;}

[C++] public: _property static int get_CaptionHeight( );

[VB] Public Shared ReadOnly Property CaptionHeight As Integer

[JScript] public static function get CaptionHeight( ): int;

Description

Gets the height, in pixels, of the normal caption area of a window.

Use System.Windows.Forms.SystemInformation. CaptionHeight to determine the size of the standard window caption. You can also perform special display operations or add a caption button to the caption of a window.

p) ComputerName q) ToString

[C#] public static string ComputerName {get;}

[C++] public: _property static String* get_Computer Name( );

[VB] Public Shared ReadOnly Property ComputerName As String

[JScript] public static function get ComputerName( ): String;

Description

Gets the computer name of the current system.

Use System.Windows.Forms.SystemInformation. ComputerName to determine the name of the computer as it is displayed to other users on a network. This name is established at system startup, when it is initialized from the Registry.

r) CursorSize s) ToString

[C#] public static Size CursorSize {get;}

[C++] public: _property static Size get_CursorSize( );

[VB] Public Shared ReadOnly Property CursorSize As Size

[JScript] public static function get CursorSize( ): Size;

Description

Gets the dimensions, in pixels, of a cursor.

The system cannot create cursors of other sizes.

t) DbcsEnabled u) ToString

[C#] public static bool DbcsEnabled {get;}

[C++] public: _property static bool get_DbcsEnabled( );

[VB] Public Shared ReadOnly Property DbcsEnabled As Boolean

[JScript] public static function get DbcsEnabled( ): Boolean;

Description

Gets a value indicating whether the operating system is capable of handling double-byte character set (DBCS) characters.

Use System.Windows.Forms.SystemInformation. DbcsEnabled to determine whether the operating system on which your application is running supports DBCS. Although an operating system can support DBCS, this does not mean that the user runs a culture that uses DBCS.

v) DebugOS w) ToString

[C#] public static bool DebugOS {get;}

[C++] public: _property static bool get_DebugOS( );

[VB] Public Shared ReadOnly Property DebugOS As Boolean

[JScript] public static function get DebugOS( ): Boolean;

Description

Gets a value indicating whether this is a debug version of the operating system.

x) DoubleClickSize y) ToString

[C#] public static Size DoubleClickSize {get;}

[C++] public: _property static Size get_DoubleClickSize( );

[VB] Public Shared ReadOnly Property DoubleClickSize As Size

[JScript] public static function get DoubleClickSize( ): Size;

Description

Gets the dimensions, in pixels, of the area within which the user must click for the operating system to consider the two clicks a double-click.

The rectangle is centered around the first click.

z) DoubleClickTime aa) ToString

[C#] public static int DoubleClickTime {get;}

[C++] public: _property static int get_DoubleClickTime( );

[VB] Public Shared ReadOnly Property DoubleClickTime As Integer

[JScript] public static function get DoubleClickTime( ): int;

Description

Gets the maximum number of milliseconds allowed between mouse clicks for a double-click to be valid.

A double-click is a series of two clicks of the mouse button, the second occurring within a specified length of time after the first. The double-click time is the maximum number of milliseconds that can occur between the first and second click of a double-click. For a double-click to be registered, it must also be within the same region. To determine this region, use System.Windows.Forms.SystemInformation.DoubleClickSize.

bb) DragFullWindows cc) ToString

[C#] public static bool DragFullWindows {get;}

[C++] public: _property static bool get_DragFullWindows( );

[VB] Public Shared ReadOnly Property DragFullWindows As Boolean

[JScript] public static function get DragFullWindows( ): Boolean;

Description

Gets a value indicating whether the user has enabled full window drag.

When this property is true, the contents of windows are displayed when moving and sizing.

dd) DragSize ee) ToString

[C#] public static Size DragSize {get;}

[C++] public: _property static Size get_DragSize( );

[VB] Public Shared ReadOnly Property DragSize As Size

[JScript] public static function get DragSize( ): Size;

Description

Gets the dimensions, in pixels, of the rectangle that a drag operation must extend to be considered a drag operation. The rectangle is centered on a drag point.

Use System.Windows.Forms.SystemInformation.DragSize to determine the size of the rectangle that Windows uses as a boundary before starting a drag operation. This rectangle allows limited movement before a drag operation begins, enabling the user to click and release the mouse button easily without unintentionally starting a drag operation.

ff) FixedFrameBorderSize gg) ToString

[C#] public static Size FixedFrameBorderSize {get;}

[C++] public: _property static Size get_FixedFrameBorderSize( );

[VB] Public Shared ReadOnly Property FixedFrameBorderSize As Size

[JScript] public static function get FixedFrameBorderSize( ): Size;

Description

Gets the thickness, in pixels, of the border for a window that has a caption and is not resizable.

hh) FrameBorderSize ii) ToString

[C#] public static Size FrameBorderSize {get;}

[C++] public: _property static Size get_FrameBorderSize( );

[VB] Public Shared ReadOnly Property FrameBorderSize As Size

[JScript] public static function get FrameBorderSize( ): Size;

Description

Gets the thickness, in pixels, of the border for a window that can be resized.

jj) HighContrast kk) ToString

[C#] public static bool HighContrast {get;}

[C++] public: _property static bool get_HighContrast( );

[VB] Public Shared ReadOnly Property HighContrast As Boolean

[JScript] public static function get HighContrast( ): Boolean;

Description

Gets a value indicating whether the user has selected to run in high-contrast mode.

ll) HorizontalScrollBarArrowWidth mm) ToString

[C#] public static int HorizontalScrollBarArrowWidth {get;}

[C++] public: _property static int get_HorizontalScrollBarArrowWidth( );

[VB] Public Shared ReadOnly Property HorizontalScrollBarArrowWidth As Integer

[JScript] public static function get HorizontalScrollBarArrowWidth( ): int;

Description

Gets the width, in pixels, of the arrow bitmap on the horizontal scroll bar.

nn) HorizontalScrollBarHeight oo) ToString

[C#] public static int HorizontalScrollBarHeight {get;}

[C++] public: _property static int get_HorizontalScrollBarHeight( );

[VB] Public Shared ReadOnly Property HorizontalScrollBarHeight As Integer

[JScript] public static function get HorizontalScrollBarHeight( ): int;

Description

Gets the height, in pixels, of the horizontal scroll bar.

pp) HorizontalScrollBarThumb Width qq) ToString

[C#] public static int HorizontalScrollBarThumbWidth {get;}

[C++] public: _property static int get HorizontalScrollBarThumbWidth( );

[VB] Public Shared ReadOnly Property HorizontalScrollBarThumbWidth As Integer

[JScript] public static function get HorizontalScrollBarThumbWidth( ): int;

Description

Gets the width, in pixels, of the scroll box in a horizontal scroll bar.

Use System.Windows.Forms.SystemInformation. HorizontalScrollBarThumb Width to determine the width of the scroll box used to indicate scroll bar position and to drag the scroll bar to a new position. The scroll box is also called the thumb.

rr) IconSize ss) ToString

[C#] public static Size IconSize {get;}

[C++] public: _property static Size get_IconSize( );

[VB] Public Shared ReadOnly Property IconSize As Size

[JScript] public static function get IconSize( ): Size;

Description

Gets the default dimensions, in pixels, of an icon.

Use System.Windows.Forms.SystemInformation.IconSize to determine the Windows default icon size. This property determines whether the size of icons displayed in your applications are consistent with icons displayed in Windows.

tt) IconSpacingSize uu) ToString

[C#] public static Size IconSpacingSize {get;}

[C++] public: _property static Size get_IconSpacingSize( );

[VB] Public Shared ReadOnly Property IconSpacingSize As Size

[JScript] public static function get IconSpacingSize( ): Size;

Description

Gets the dimensions, in pixels, of the grid used to arrange icons in a large-icon view.

Use System.Windows.Forms.SystemInformation. IconSpacingSize to determine the grid that each icon fits into when you arrange them. This value is always greater than or equal to System.Windows.Forms.SystemInformation.IconSize.

vv) KanjiWindowHeight ww) ToString

[C#] public static int KanjiWindowHeight {get;}

[C++] public: _property static int get_KanjiWindow Height( );

[VB] Public Shared ReadOnly Property KanjiWindowHeight As Integer

[JScript] public static function get KanjiWindowHeight( ): int;

Description

Gets the height, in pixels, of the Kanji window at the bottom of the screen for double-byte character set (DBCS) versions of Windows.

Use System.Windows.Forms.SystemInformation. KanjiWindowHeight to determine the height of the Kanji window on operating systems that support DBCS. To determine whether the operating system supports DBCS, use the System.Windows.Forms.SystemInformation.DbcsEnabled property.

xx) MaxWindowTrackSize yy) ToString

[C#] public static Size MaxWindowTrackSize {get;}

[C++] public: _property static Size get_MaxWindowTrackSize( );

[VB] Public Shared ReadOnly Property MaxWindowTrackSize As Size

[JScript] public static function get MaxWindowTrackSize( ): Size;

Description

Gets the default maximum dimensions, in pixels, of a window that has a caption and sizing borders.

The value returned by System.Windows.Forms.SystemInformation.MaxWindowTrackSize refers to dimensions of the entire desktop. The user cannot drag the window frame to a size larger than these dimensions. A System.Windows.Forms.Form can override this value by overriding the System.Windows.Forms.Form.MaximumSize property.

zz) MenuButtonSize aaa) ToString

[C#] public static Size MenuButtonSize {get;}

[C++] public: _property static Size get_MenuButtonSize( );

[VB] Public Shared ReadOnly Property MenuButtonSize As Size

[JScript] public static function get MenuButtonSize( ): Size;

Description

Gets the dimensions, in pixels, of menu-bar buttons.

Use this property to determine the size of a menu button, such as the child window close buttons used in a multiple-document-interface application. The dimensions of a menu button can be similar to the dimensions returned for caption buttons using System.Windows.Forms.SystemInformation. ToolWindowCaptionButton Size.

bbb) MenuCheckSize ccc) ToString

[C#] public static Size MenuCheckSize {get;}

[C++] public: _property static Size get_MenuCheckSize( );

[VB] Public Shared ReadOnly Property MenuCheckSize As Size

[JScript] public static function get MenuCheckSize( ): Size;

Description

Gets the dimensions, in pixels, of the default size of a menu check mark.

Use System.Windows.Forms.SystemInformation. MenuCheckSize to determine the size of the image used by Windows to display a check mark next to a selected menu item.

ddd) MenuFont eee) ToString

[C#] public static Font MenuFont {get;}

[C++] public: _property static Font* get_MenuFont( );

[VB] Public Shared ReadOnly Property MenuFont As Font

[JScript] public static function get MenuFont( ): Font;

Description

Gets the operating system font for menus.

fff) MenuHeight ggg) ToString

[C#] public static int MenuHeight {get;}

[C++] public: _property static int get_MenuHeight( );

[VB] Public Shared ReadOnly Property MenuHeight As Integer

[JScript] public static function get MenuHeight( ): int;

Description

Gets the height of one line of a menu in pixels.

Use System.Windows.Forms.SystemInformation. MenuHeight to determine the height that is currently defined by Windows for a menu bar.

hhh) MidEastEnabled iii) ToString

[C#] public static bool MidEastEnabled {get;}

[C++] public: _property static bool get_MidEastEnabled( );

[VB] Public Shared ReadOnly Property MidEastEnabled As Boolean

[JScript] public static function get MidEastEnabled( ): Boolean;

Description

Gets a value indicating whether the operating system is enabled for Hebrew and Arabic languages.

jjj) MinimizedWindowSize kkk) ToString

[C#] public static Size MinimizedWindowSize {get;}

[C++] public: _property static Size get_MinimizedWindowSize( );

[VB] Public Shared ReadOnly Property MinimizedWindowSize As Size

[JScript] public static function get MinimizedWindowSize( ): Size;

Description

Gets the dimensions, in pixels, of a normal minimized window.

lll) MinimizedWindowSpacingSize mmm) ToString

[C#] public static Size MinimizedWindowSpacingSize {get;}

[C++] public: _property static Size get_MinimizedWindowSpacingSize( );

[VB] Public Shared ReadOnly Property MinimizedWindowSpacingSize As Size

[JScript] public static function get MinimizedWindowSpacingSize( ): Size;

Description

Gets the dimensions, in pixels, of the grid into which minimized windows are placed.

Use System.Windows.Forms.SystemInformation. MinimizedWindowSpacing Size to determine the rectangle to which a minimized window is sized when arranged. The value of this property is always greater than or equal to the value of the System.Windows.Forms.SystemInformation.MinimumWindowSize property.

nnn) MinimumWindowSize ooo) ToString

[C#] public static Size MinimumWindowSize {get;}

[C++] public: _property static Size get_MinimumWindowSize( );

[VB] Public Shared ReadOnly Property MinimumWindowSize As Size

[JScript] public static function get MinimumWindowSize( ): Size;

Description

Gets the minimum allowable dimensions, in pixels, of a window.

Use System.Windows.Forms.SystemInformation. MinimumWindowSize to determine the dimensions specified by Windows as the minimum size for a window. You can use this property to limit the resizing of the windows of your application to a size larger than the dimension returned by this property.

ppp) MinWindowTrackSize qqq) ToString

[C#] public static Size MinWindowTrackSize {get;}

[C++] public: _property static Size get_MinWindowTrackSize( );

[VB] Public Shared ReadOnly Property MinWindowTrackSize As Size

[JScript] public static function get MinWindowTrackSize( ): Size;

Description

Gets the default minimum tracking dimensions, in pixels, of the operating system for a window.

The user cannot drag the window frame to a size smaller than these dimensions. A Form can override these values by overriding the System.Windows.Forms.Form.MinimumSize.

rrr) MonitorCount sss) ToString

[C#] public static int MonitorCount {get;}

[C++] public: _property static int get_MonitorCount( );

[VB] Public Shared ReadOnly Property MonitorCount As Integer

[JScript] public static function get MonitorCount( ): int;

Description

Gets the number of display monitors on the desktop.

This property returns a value greater than one only if multiple monitors are currently connected to the operating system.

ttt) MonitorsSameDisplayFormat uuu) ToString

[C#] public static bool MonitorsSameDisplayFormat {get;}

[C++] public: _property static bool get_MonitorsSameDisplayFormat( );

[VB] Public Shared ReadOnly Property MonitorsSameDisplayFormat As Boolean

[JScript] public static function get MonitorsSameDisplayFormat( ): Boolean;

Description

Gets a value indicating whether all the display monitors have the same color format.

Use System.Windows.Forms.SystemInformation. MonitorsSameDisplayFormat to determine whether all monitors currently connected to the system have the same color format. For example, the RGB values can be encoded with a different number of bits, or those bits can be located in different places in a pixel's color value.

vvv) MouseButtons www) ToString

[C#] public static int MouseButtons {get;}

[C++] public: _property static int get_MouseButtons( );

[VB] Public Shared ReadOnly Property MouseButtons As Integer

[JScript] public static function get MouseButtons( ): int;

Description

Gets the number of buttons on the mouse.

Use System.Windows.Forms.SystemInformation.Mouse Buttons to determine the number of mouse buttons that your application can support. You can also use System.Windows.Forms.SystemInformation.MouseButtons to provide additional functionality if more than two buttons are available.

xxx) MouseButtonsSwapped yyy) ToString

[C#] public static bool MouseButtonsSwapped {get;}

[C++] public: _property static bool get_MouseButtons Swapped( );

[VB] Public Shared ReadOnly Property MouseButtons Swapped As Boolean

[JScript] public static function get MouseButtonsSwapped( ): Boolean;

Description

Gets a value indicating whether the functions of the left and right mouse buttons have been swapped.

Use System.Windows.Forms.SystemInformation. MouseButtonsSwapped to determine whether the left and right mouse buttons have opposite usage. This property determines how the system responds to mouse button clicks and other mouse button events.

zzz) MousePresent aaaa) ToString

[C#] public static bool MousePresent {get;}

[C++] public: _property static bool get_MousePresent( );

[VB] Public Shared ReadOnly Property MousePresent As Boolean

[JScript] public static function get MousePresent( ): Boolean;

Description

Gets a value indicating whether a mouse is installed.

bbbb) MouseWheelPresent cccc) ToString

[C#] public static bool MouseWheelPresent {get;}

[C++] public: _property static bool get_MouseWheelPresent( );

[VB] Public Shared ReadOnly Property MouseWheelPresent As Boolean

[JScript] public static function get MouseWheelPresent( ): Boolean;

Description

Gets a value indicating whether a mouse with a mouse wheel is installed.

Use this property to determine whether to process code that requires a mouse wheel.

dddd) MouseWheelScrollLines eeee) ToString

[C#] public static int MouseWheelScrollLines {get;}

[C++] public: _property static int get_MouseWheelScrollLines( );

[VB] Public Shared ReadOnly Property MouseWheelScrollLines As Integer

[JScript] public static function get MouseWheelScroll Lines( ): int;

Description

Gets the number of lines to scroll when the mouse wheel is rotated.

Use this property to determine how many lines to increase or decrease in a control that has a scroll bar.

ffff) NativeMouseWheelSupport gggg) ToString

[C#] public static bool NativeMouseWheelSupport {get;}

[C++] public: _property static bool get_NativeMouseWheel-Support( );

[VB] Public Shared ReadOnly Property NativeMouseWheel-Support As Boolean

[JScript] public static function get NativeMouseWheelSupport( ): Boolean;

Description

Gets a value indicating whether the operating system natively supports a mouse wheel.

Mouse wheel operations that occur through a System.Windows.Forms.Control object work even if the operating system does not natively support the wheel.

hhhh) Network iiii) ToString

[C#] public static bool Network {get;}

[C++] public: _property static bool get_Network( );

[VB] Public Shared ReadOnly Property Network As Boolean

[JScript] public static function get Network( ): Boolean;

Description

Gets a value indicating whether this computer is connected to a network.

Use System.Windows.Forms.SystemInformation.Network to determine whether a network is available before performing network-oriented operations.

jjjj) PenWindows kkkk) ToString

[C#] public static bool PenWindows {get;}

[C++] public: _property static bool get_PenWindows( );

[VB] Public Shared ReadOnly Property PenWindows As Boolean

[JScript] public static function get PenWindows( ): Boolean;

Description

Gets a value indicating whether the Microsoft Windows for Pen Computing extensions are installed.

llll) PrimaryMonitorMaximizedWindowSize mmmm) ToString

[C#] public static Size PrimaryMonitorMaximizedWindowSize {get;}

[C++] public: _property static Size get_PrimaryMonitor-MaximizedWindowSize( );

[VB] Public Shared ReadOnly Property PrimaryMonitor-MaximizedWindowSize As Size

[JScript] public static function get PrimaryMonitorMaximizedWindowSize( ): Size;

Description

Gets the default dimensions, in pixels, of a maximized window on the primary monitor.

nnnn) PrimaryMonitorSize oooo) ToString

[C#] public static Size PrimaryMonitorSize {get;}

[C++] public: _property static Size get_PrimaryMonitor Size( );

[VB] Public Shared ReadOnly Property PrimaryMonitorSize As Size

[JScript] public static function get PrimaryMonitorSize( ): Size;

Description

Gets the dimensions, in pixels, of the primary display monitor.

pppp) RightAlignedMenus qqqq) ToString

[C#] public static bool RightAlignedMenus {get;}

[C++] public: _property static bool get_RightAligned Menus( );

[VB] Public Shared ReadOnly Property RightAlignedMenus As Boolean

[JScript] public static function get RightAlignedMenus( ): Boolean;

Description

Gets a value indicating whether drop-down menus are right-aligned with the corresponding menu-bar item.

rrrr) Secure ssss) ToString

[C#] public static bool Secure {get;}

[C++] public: _property static bool get_Secure( );

[VB] Public Shared ReadOnly Property Secure As Boolean

[JScript] public static function get Secure( ): Boolean;

Description

Gets a value indicating whether security is present on this operating system.

System.Windows.Forms.SystemInformation.Secure allows you to determine whether a Security Manager is available from the operating system. Windows NT and Windows 2000 provide a Security Manager to determine access to the operating system registry and to the file system. Windows 95 and 98 do not provide a Security Manager.

tttt) ShowSounds uuuu) ToString

[C#] public static bool ShowSounds {get;}

[C++] public: _property static bool get_ShowSounds( );

[VB] Public Shared ReadOnly Property ShowSounds As Boolean

[JScript] public static function get ShowSounds( ): Boolean;

Description

Gets a value indicating whether the user requires an application to present information in visual form in situations when it would present the information in audible form.

Use System.Windows.Forms.SystemInformation. ShowSounds to determine whether the application can play sounds and other audio outputs or whether the audio needs to be visually shown. This property can help provide accessibility to your application.

vvvv) SmallIconSize wwww) ToString

[C#] public static Size SmallIconSize {get;}

[C++] public: _property static Size get_SmallIconSize( );

[VB] Public Shared ReadOnly Property SmallIconSize As Size

[JScript] public static function get SmallIconSize( ): Size;

Description

Gets the recommended dimensions, in pixels, of a small icon.

Use System.Windows.Forms.SystemInformation. SmallIconSize to determine the size of small icons in Windows. Small icons typically appear in window captions and in the Small Icon view in Windows Explorer.

xxxx) ToolWindowCaptionButtonSize yyyy) ToString

[C#] public static Size ToolWindowCaptionButtonSize {get;}

[C++] public: _property static Size get_ToolWindowCaptionButtonSize( );

[VB] Public Shared ReadOnly Property ToolWindowCaptionButtonSize As Size

[JScript] public static function get ToolWindowCaptionButtonSize( ): Size;

Description

Gets the dimensions, in pixels, of small caption buttons.

Small captions are used in floating tool windows. Use System.Windows.Forms.SystemInformation.Tool WindowCaptionButton Size to get the dimensions of the buttons placed in the caption of a tool window. You can use this property when adding your own custom buttons to the caption in a tool window.

zzzz) ToolWindowCaptionHeight aaaaa) ToString

[C#] public static int ToolWindowCaptionHeight {get;}

[C++] public: _property static int get_ToolWindowCaptionHeight( );

[VB] Public Shared ReadOnly Property ToolWindowCaptionHeight As Integer

[JScript] public static function get ToolWindowCaptionHeight( ): int;

Description

Gets the height, in pixels, of a small caption.

Small captions are used in floating tool windows. Use System.Windows.Forms.SystemInformation.ToolWindow CaptionHeight to determine the height of a tool window caption in Windows. This property can assist in manipulating the caption area of a tool window.

bbbbb) UserDomainName ccccc) ToString

[C#] public static string UserDomainName {get;}

[C++] public: _property static String* get_UserDomainName( );

[VB] Public Shared ReadOnly Property UserDomainName As String

[JScript] public static function get UserDomainName( ): String;

Description

Gets the name of the user domain.

ddddd) UserInteractive eeeee) ToString

[C#] public static bool UserInteractive {get;}

[C++] public: _property static bool get_UserInteractive( );

[VB] Public Shared ReadOnly Property UserInteractive As Boolean

[JScript] public static function get UserInteractive( ): Boolean;

Description

Gets a value indicating whether the current process is running in user-interactive mode.

This property is false only when running as a service process or from inside a Web application. When System.Windows.Forms.SystemInformation.UserInteractive is false, do not display any modal dialogs or message boxes, as there is no GUI for the user to interact with.

fffff) UserName ggggg) ToString

[C#] public static string UserName {get;}

[C++] public: _property static String* get_UserName( );

[VB] Public Shared ReadOnly Property UserName As String

[JScript] public static function get UserName( ): String;

Description

Gets the user name for the current thread (the name of the user currently logged on to the operating system).

hhhhh) VerticalScrollBarArrowHeight iiiii) ToString

[C#] public static int VerticalScrollBarArrowHeight {get;}

[C++] public: _property static int get_VerticalScrollBarArrowHeight( );

[VB] Public Shared ReadOnly Property VerticalScrollBarArrowHeight As Integer

[JScript] public static function get VerticalScrollBarArrowHeight( ): int;

Description

Gets the height, in pixels, of the arrow bitmap on the vertical scroll bar.

jjjjj) VerticalScrollBarThumbHeight kkkkk) ToString

[C#] public static int VerticalScrollBarThumbHeight {get;}

[C++] public: _property static int get_VerticalScrollBarThumbHeight( );

[VB] Public Shared ReadOnly Property VerticalScrollBarThumbHeight As Integer

[JScript] public static function get VerticalScrollBarThumbHeight( ): int;

Description

Gets the height, in pixels, of the scroll box in a vertical scroll bar.

Use System.Windows.Forms.SystemInformation. VerticalScrollBarThumbHeight to determine the height of the box used to indicate scroll bar position and to drag the scroll bar to a new position. The scroll box is also called the thumb.

lllll) VerticalScrollBarWidth mmmmm)ToString

[C#] public static int VerticalScrollBarWidth {get;}

[C++] public: _property static int get_VerticalScrollBarWidth( );

[VB] Public Shared ReadOnly Property VerticalScrollBarWidth As Integer

[JScript] public static function get VerticalScrollBarWidth( ): int;

Description

Gets the width, in pixels, of the vertical scroll bar.

nnnnn) VirtualScreen ooooo) ToString

[C#] public static Rectangle VirtualScreen {get;}

[C++] public: _property static Rectangle get_Virtual Screen( );

[VB] Public Shared ReadOnly Property VirtualScreen As Rectangle

[JScript] public static function get VirtualScreen( ): Rectangle;

Description

Gets the bounds of the virtual screen.

Use System.Windows.Forms.SystemInformation. VirtualScreen to determine the bounds of the entire desktop on a multi-monitor system. You can then determine the maximum visual space available on a system that has multiple monitors installed.

ppppp) WorkingArea qqqqq) ToString

[C#] public static Rectangle WorkingArea {get;}

[C++] public: _property static Rectangle get_Working Area( );

[VB] Public Shared ReadOnly Property WorkingArea As Rectangle

[JScript] public static function get WorkingArea( ): Rectangle;

Description

Gets the size, in pixels, of the working area.

Use System.Windows.Forms.SystemInformation. Working Area to determine the bounds of the screen that can be used by applications. The working area is the portion of the screen not hidden by the operating system tray and other top-level windows that are docked to the Windows desktop.

TabAlignment enumeration (System.Windows.Forms)

a) ToString

Description

Specifies the locations of the tabs in a tab control.

This enumeration is used by members such as System.Windows.Forms.TabControl.Alignment.

b) ToString

[C#] public const TabAlignment Bottom;

[C++] public: const TabAlignment Bottom;

[VB] Public Const Bottom As TabAlignment

[JScript] public var Bottom: TabAlignment;

Description

The tabs are located across the bottom of the control.

c) ToString

[C#] public const TabAlignment Left;

[C++] public: const TabAlignment Left;

[VB] Public Const Left As TabAlignment

[JScript] public var Left: TabAlignment;

Description

The tabs are located along the left edge of the control.

d) ToString

[C#] public const TabAlignment Right;

[C++] public: const TabAlignment Right;

[VB] Public Const Right As TabAlignment

[JScript] public var Right: TabAlignment;

Description

The tabs are located along the right edge of the control.

e) ToString

[C#] public const TabAlignment Top;

[C++] public: const TabAlignment Top;

[VB] Public Const Top As TabAlignment

[JScript] public var Top: TabAlignment;

Description

The tabs are located across the top of the control.

TabAppearance enumeration (System.Windows.Forms)

a) ToString

Description

Specifies the appearance of the tabs in a tab control.

This enumeration is used by members such as System.Windows.Forms.TabControl.Appearance.

b) ToString

[C#] public const TabAppearance Buttons;

[C++] public: const TabAppearance Buttons;

[VB] Public Const Buttons As TabAppearance

[JScript] public var Buttons TabAppearance;

Description

The tabs have the appearance of three-dimensional buttons.

c) ToString

[C#] public const TabAppearance FlatButtons;

[C++] public: const TabAppearance FlatButtons;

[VB] Public Const FlatButtons As TabAppearance

[JScript] public var FlatButtons: TabAppearance;

Description

The tabs have the appearance of flat buttons.

d) ToString

[C#] public const TabAppearance Normal;

[C++] public: const TabAppearance Normal;

[VB] Public Const Normal As TabAppearance

[JScript] public var Normal: TabAppearance;

Description

The tabs have the standard appearance of tabs.

TabControl class (System.Windows.Forms)

a) ToString

Description

Manages a related set of tab pages.

A System.Windows.Forms.TabControl contains tab pages, which are represented by System.Windows.Forms.TabPage objects that you add through the System.Windows.Forms.Control.Controls property.

b) TabControl

Example Syntax:

c) ToString

[C#] public TabControl( );

[C++] public: TabControl( );

[VB] Public Sub New( )

[JScript] public function TabControl( );

Description

Initializes a new instance of the System.Windows.Forms.TabControl class.

d) AccessibilityObject e) AccessibleDefaultActionDescription f) AccessibleDescription g) AccessibleName h) AccessibleRole i) Alignment j) ToString Description Gets or sets the area of the control (for example, along the top) where the tabs are aligned.

When the System.Windows.Forms.TabControl.Alignment property is set to Left or Right, the System.Windows.Forms.TabControl.Multiline property is automatically set to true.

k) AllowDrop l) Anchor m) Appearance n) ToString

Description

Gets or sets the visual appearance of the control's tabs.

When you set the System.Windows.Forms.TabControl.Appearance property to FlatButtons, it only appears as such when the System.Windows.Forms.TabControl.Alignment property is set to Top. Otherwise, the System.Windows.Forms.TabControl.Appearance property displays as if set to the Buttons value.

o) BackColor p) ToString

[C#] public override Color BackColor {get; set;}

[C++] public: _property virtual Color get_BackColor( ); public: _property virtual void set.BackColor(Color);

[VB] Overrides Public Property BackColor As Color

[JScript] public function get BackColor( ): Color; public function set BackColor(Color);

Description q) BackgroundImage r) ToString

[C#] public override Image BackgroundImage {get; set;}

[C++] public: _property virtual Image* get_BackgroundImage( );public: _property virtual void set_BackgroundImage (Image*);

[VB] Overrides Public Property BackgroundImage As Image

[JScript] public function get BackgroundImage( ): Image; public function set BackgroundImage(Image);

Description s) BindingContext t) Bottom u) Bounds v) CanFocus w) CanSelect x) Capture y) CausesValidation z) ClientRectangle aa) ClientSize bb) CompanyName cc) Container dd) ContainsFocus ee) ContextMenu ff) Controls gg) Created hh) CreateParams ii) ToString Description Returns the parameters needed to create the handle. Inheriting classes can override this to provide extra functionality. They should not, however, forget to call base.getCreateParams( ) first to get the struct filled up with the basic info.

jj) Cursor kk) DataBindings ll) DefaultImeMode mm) DefaultSize nn) ToString

Description

Deriving classes can override this to configure a default size for their control. This is more efficient than setting the size in the control's constructor.

oo) DesignMode pp) DisplayRectangle qq) ToString

Description

Gets the display area of the control's tab pages.

rr) Disposing ss) Dock tt) DrawMode uu) ToString

Description

Gets or sets the way that the control's tab pages are drawn.

Tab pages can be drawn by the control or by the user of the control. The System.Windows.Forms.TabControl.DrawMode property allows users of the control to customize the way that the tab control is drawn.

vv) Enabled ww) Events xx) Focused yy) Font
zz) FontHeight
aaa) ForeColor
bbb) ToString Description ccc) Handle
ddd) HasChildren
eee) Height
fff) HotTrack
ggg) ToString Description Gets or sets a value indicating whether the control's tabs change in appearance when the mouse passes over them.

hhh) ImageList
iii) ToString

[C#] public ImageList ImageList {get; set;}

[C++] public: _property ImageList* get_ImageList( ); public: Property void set_ImageList(ImageList*);

[VB] Public Property ImageList As ImageList

[JScript] public function get ImageList( ): ImageList; public function set ImageList(ImageList);

Description

Gets or sets the images to display on the control's tabs.

To display an image on a tab, set the System.Windows.Forms.TabPage.ImageIndex property of that System.Windows.Forms.TabPage. The System.Windows.Forms.TabPage.ImageIndex acts as the index into the System.Windows.Forms.TabControl.ImageList.

jjj) ImeMode
kkk) InvokeRequired
lll) IsAccessible
mmm) IsDisposed
nnn) IsHandleCreated
ooo) ItemSize
ppp) ToString Description Gets or sets the size of the control's tabs.

To change the System.Drawing.Size.Width property of the System.Windows.Forms.TabControl.ItemSize property, the System.Windows.Forms.TabControl.SizeMode property must be set to Fixed.

qqq) Left
rrr) Location
sss) Multiline
ttt) ToString

Description

Gets or sets a value indicating whether more than one row of tabs can be displayed.

If System.Windows.Forms.TabControl.Multiline is false, only one row of tabs is displayed—even if all the tabs do not fit in the available space. In that case, however, arrows are displayed that allow the user to navigate to the undisplayed tabs.

uuu) Name
vvv) Padding
www) ToString

Description

Gets or sets the amount of space around each item on the control's tab pages.

xxx) Parent
yyy) ProductName
zzz) ProductVersion
aaaa) RecreatingHandle
bbbb) Region
cccc) RenderRightToLeft
dddd) ResizeRedraw
eeee) Right
ffff) RightToLeft
gggg) RowCount
hhhh) ToString Description Gets the number of rows that are currently being displayed in the control's tab strip.

Use the System.Windows.Forms.TabControl.RowCount property when the System.Windows.Forms.TabControl.Multiline property is true and you want to know the number of rows that the tabs occupy.

iiii) SelectedIndex
jjjj) ToString

[C#] public int SelectedIndex {get; set;}

[C++] public: _property int get_SelectedIndex( ); public: Property void set_SelectedIndex(int);

[VB] Public Property SelectedIndex As Integer

[JScript] public function get SelectedIndex( ): int; public function set SelectedIndex(int);

Description

Gets or sets the index of the currently-selected tab page.

kkkk) SelectedTab
llll) ToString

[C#] public TabPage SelectedTab {get; set;}

[C++] public: _property TabPage* get_SelectedTab( );public: _property void set_SelectedTab(TabPage*);

[VB] Public Property SelectedTab As TabPage

[JScript] public function get SelectedTab( ): TabPage; public function set SelectedTab(TabPage);

Description

Gets or sets the currently-selected tab page.

The selection to the given tab, provided it equals a tab in the list.

mmmm) ShowFocusCues
nnnn) ShowKeyboardCues
oooo) ShowToolTips
pppp) ToString

Description

Gets or sets a value indicating whether a tab's ToolTip is shown when the mouse passes over the tab.

To create a ToolTip for a tab, set the System.Windows.Forms.TabPage.ToolTipText property of the System.Windows.Forms.TabPage.

qqqq) Site
rrrr) Size
ssss) SizeMode
tttt) ToString

Description

Gets or sets the way that the control's tabs are sized.

uuuu) TabCount vvvv) ToString

[C#] public int TabCount {get;}

[C++] public: _property int get_TabCount( );

[VB] Public ReadOnly Property TabCount As Integer

[JScript] public function get TabCount( ): int;

Description

Gets the number of tabs in the tab strip.

wwww) TabIndex xxxx) TabPages yyyy) ToString

Description

Gets the collection of tab pages in this tab control.

zzzz) TabStop aaaaa) Tag bbbbb) Text ccccc) ToString ddddd) Top eeeee) TopLevelControl fffff) Visible ggggg) Width hhhhh) WindowTarget iiiii) ToString Description jjjjj) ToString Description Occurs when the tabs are drawn, if the System.Windows.Forms.TabControl.DrawMode property is set to OwnerDrawFixed.

For more information about handling events, see.

kkkkk) ToString

Description

Occurs when the System.Windows.Forms.TabControl.SelectedIndex property is changed.

For more information about handling events, see.

lllll) CreateControlsInstance

[C#] protected override ControlCollection CreateControlsInstance( );

[C++] protected: ControlCollection* CreateControlsInstance( );

[VB] Overrides Protected Function CreateControls Instance( ) As ControlCollection

[JScript] protected override function CreateControlsInstance( ): ControlCollection;

Description mmmmm) CreateHandle

[C#] protected override void CreateHandle( );

[C++] protected: void CreateHandle( );

[VB] Overrides Protected Sub CreateHandle( )

[JScript] protected override function CreateHandle( );

Description nnnnn) GetControl

[C#] public Control GetControl(int index);

[C++] public: Control* GetControl(int index);

[VB] Public Function GetControl(ByVal index As Integer) As Control

[JScript] public function GetControl(index: int): Control;

Description ooooo) GetItems

[C#] protected virtual object[ ] GetItems( );

[C++] protected: virtual Object* GetItems( ) _gc[ ];

[VB] Overridable Protected Function GetItems( ) As Object( )

[JScript] protected function GetItems( ): Object[ ];

Description

This has package scope so that TabStrip and TabControl can call it.

ppppp) GetItems

[C#] protected virtual object[ ] GetItems(Type baseType);

[C++] protected: virtual Object* GetItems(Type* base Type) _gc[ ]

[VB] Overridable Protected Function GetItems(ByVal baseType As Type) As Object( )

[JScript] protected function GetItems(baseType: Type): Object[ ];

Description

This has package scope so that TabStrip and TabControl can call it.

qqqqq) GetTabRect

[C#] public Rectangle GetTabRect(int index);

[C++] public: Rectangle GetTabRect(int index);

[VB] Public Function GetTabRect(ByVal index As Integer) As Rectangle

[JScript] public function GetTabRect(index: int): Rectangle;

Description

Returns the bounding rectangle for a specified tab in this tab control.

Return Value: A System.Drawing.Rectangle that represents the bounds of the specified tab. The O-based index of the tab you want.

rrrrr) GetToolTipText

[C#] protected string GetToolTipText(object item);

[C++] protected: String* GetToolTipText(Object* item);

[VB] Protected Function GetToolTipText(ByVal item As Object) As String

[JScript] protected function GetToolTipText(item: Object): String;

Description sssss) IsInputKey

[C#] protected override bool IsInputKey(Keys keyData);

[C++] protected: bool IsInputKey(Keys keyData);

[VB] Overrides Protected Function IsInputKey(ByVal keyData As Keys) As Boolean

[JScript] protected override function IsInputKey(keyData: Keys): Boolean;

Description

Determines whether the specified key is a regular input key or a special key that requires preprocessing.

Return Value: true if the specified key is a regular input key; otherwise, false.

Call this method during window-message preprocessing to determine whether the specified key is a regular input key that should be sent directly to the tab control or a special key (such as PAGE UP and PAGE DOWN) that should preprocessed. In the latter case, send the key to the control only if it is not consumed by the preprocessing phase. One of the System.Windows.Forms.Keys values.

ttttt) OnDrawItem 14

[C#] protected virtual void OnDrawItem(DrawItemEventArgs e);

[C++] protected: virtual void OnDrawItem(DrawItemEventArgs* e);

[VB] Overridable Protected Sub OnDrawItem(ByVal e As DrawItemEventArgs)

[JScript] protected function OnDrawItem(e: DrawItemEventArgs);

Description

Raises the System.Windows.Forms.TabControl.DrawItem event.

Raising an event invokes the event handler through a delegate. For more information, see. A System.Windows.Forms.DrawItemEventArgs that contains the event data.

uuuuu) OnFontChanged

[C#] protected override void OnFontChanged(EventArgs e);

[C++] protected: void OnFontChanged(EventArgs* e);

[VB] Overrides Protected Sub OnFontChanged(ByVal e As EventArgs)

[JScript] protected override function OnFontChanged(e: EventArgs);

Description

Raises the System.Windows.Forms.Control.FontChanged event.

Raising an event invokes the event handler through a delegate. For more information, see. An System.EventArgs that contains the event data.

vvvvv) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

This is a notification that the handle has been created. We do some work here to configure the handle. Overriders should call base.OnHandleCreated( ) This is a notification that the handle has been created. We do some work here to configure the handle. Overriders should call base.OnHandleCreated( )

wwwww) OnHandleDestroyed

[C#] protected override void OnHandleDestroyed(EventArgs e);

[C++] protected: void OnHandleDestroyed(EventArgs* e);

[VB] Overrides Protected Sub OnHandleDestroyed(ByVal e As EventArgs)

[JScript] protected override function OnHandleDestroyed(e: EventArgs);

Description

Raises the System.Windows.Forms.Control. HandleDestroyed event.

Raising an event invokes the event handler through a delegate. For more information, see. An System.EventArgs that contains the event data.

xxxxx) OnKeyDown

[C#] protected override void OnKeyDown(KeyEventArgs ke);

[C++] protected: void OnKeyDown(KeyEventArgs* ke);

[VB] Overrides Protected Sub OnKeyDown(ByVal ke As KeyEventArgs)

[JScript] protected override function OnKeyDown(ke: KeyEventArgs);

Description

We override this to get tabbing functionality. If overriding this, remember to call base.onKeyDown.

yyyyy) OnResize

[C#] protected override void OnResize(EventArgs e);

[C++] protected: void OnResize(EventArgs* e);

[VB] Overrides Protected Sub OnResize(ByVal e As EventArgs)

[JScript] protected override function OnResize(e: EventArgs);

Description zzzzz) OnSelectedIndexChanged

[C#] protected virtual void OnSelectedIndexChanged(EventArgs e);

[C++] protected: virtual void OnSelectedIndexChanged(EventArgs* e);

[VB] Overridable Protected Sub OnSelectedIndexChanged(ByVal e As EventArgs)

[JScript] protected function OnSelectedIndexChanged(e: EventArgs);

Description

Raises the System.Windows.Forms.TabControl. SelectedIndexChanged event.

Raising an event invokes the event handler through a delegate. For more information, see. An System.EventArgs that contains the event data.

aaaaaa) OnStyleChanged

[C#] protected override void OnStyleChanged(EventArgs e);

[C++] protected: void OnStyleChanged(EventArgs* e);

[VB] Overrides Protected Sub OnStyleChanged(ByVal e As EventArgs)

[JScript] protected override function OnStyleChanged(e: EventArgs);

Description bbbbbb) ProcessKeyPreview

[C#] protected override bool ProcessKeyPreview(ref Message m);

[C++] protected: bool ProcessKeyPreview(Message* m);

[VB] Overrides Protected Function ProcessKeyPreview(ByRef m As Message) As Boolean

[JScript] protected override function ProcessKeyPreview(m: Message): Boolean;

Description

We override this to get the Ctrl and Ctrl-Shift Tab functionality.

cccccc) RemoveAll

[C#] protected void RemoveAll( );

[C++] protected: void RemoveAll( );

[VB] Protected Sub RemoveAll( )

[JScript] protected function RemoveAll( );

Description

Removes all the tab pages and additional controls from this tab control.

All controls are removed through the Controls property.

dddddd) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

eeeeee) UpdateTabSelection

[C#] protected void UpdateTabSelection(bool uiselected);

[C++] protected: void UpdateTabSelection(bool uiselected);

[VB] Protected Sub UpdateTabSelection(ByVal uiselected As Boolean)

[JScript] protected function UpdateTabSelection(uiselected: Boolean);

Description

Description

Set the panel selections appropriately Set the panel selections appropriately ffffff) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

The tab's window procedure. Inheriting classes can override this to add extra functionality, but should not forget to call base.wndProc(m); to ensure the tab continues to function properly. A Windows Message Object.

TabDrawMode enumeration (System.Windows.Forms)

a) WndProc

Description

Specifies whether the tabs in a tab control are owner-drawn (drawn by the parent window), or drawn by the operating system.

This enumeration is used by members such as System.Windows.Forms.TabControl.DrawMode.

b) WndProc

[C#] public const TabDrawMode Normal;

[C++] public: const TabDrawMode Normal;

[VB] Public Const Normal As TabDrawMode

[JScript] public var Normal: TabDrawMode;

Description

The tabs are drawn by the operating system, and are of the same size.

c) WndProc

[C#] public const TabDrawMode OwnerDrawFixed;

[C++] public: const TabDrawMode OwnerDrawFixed;

[VB] Public Const OwnerDrawFixed As TabDrawMode

[JScript] public var OwnerDrawFixed: TabDrawMode;

Description

The tabs are drawn by the parent window, and are of the same size.

TabPage class (System.Windows.Forms)

a) ToString

Description

Represents a single tab page in a System.Windows.Forms.TabControl.

For more information about how this control responds to the System.Windows.Forms.Control.Focus and System.Windows.Forms.Control.Select methods, see the following System.Windows.Forms.Control members: System.Windows.Forms.Control.CanFocus, System.Windows.Forms. Control.CanSelect, System.Windows.Forms.Control.Focused, System.Windows.Forms.Control.ContainsFocus, System.Windows.Forms.Control.Focus, System.Windows.Forms.Control.Select.

b) TabPage

Example Syntax:

c) ToString

[C#] public TabPage( );

[C++] public: TabPage( );

[VB] Public Sub New( )

[JScript] public function TabPage( ); Initializes a new instance of the System.Windows.Forms.TabPage class.

Description

Initializes a new instance of the System.Windows.Forms.TabPage class.

d) TabPage

Example Syntax:

e) ToString

[C#] public TabPage(string text);

[C++] public: TabPage(String* text);

[VB] Public Sub New(ByVal text As String)

[JScript] public function TabPage(text: String);

Description

Initializes a new instance of the System.Windows.Forms.TabPage class, specifies the text for the tab.

The System.Windows.Forms.TabPage.Text property is set to the value of the text parameter. The text for the tab.

f) AccessibilityObject g) AccessibleDefaultActionDescription h) AccessibleDescription i) AccessibleName j) AccessibleRole k) AllowDrop l) Anchor m) ToString Description Gets or sets the way that the tab page anchors to the edges of its container.

When a tab page is anchored to an edge of a tab control, the distance between the tab page and the specified edge remains constant when the tab control resizes. For example, if a tab page is anchored to the right edge of its tab control, the distance between the right edge of the tab page and the right edge of the tab control remains constant when the tab control resizes. A tab page can be anchored to any combination of edges. If the tab page is anchored to opposite edges of its container (for example, the top and bottom), it resizes when the tab control resizes. If a tab page has its System.Windows.Forms.Control.Anchor property set to AnchorStyle.None, the tab page moves half of the distance that the tab control is resized. For example, if a System.Windows.Forms.TabPage has its System.Windows.Forms.TabPage.Anchor property set to AnchorStyle.None and the System.Windows.Forms.TabControl that the tab page is located on is resized by 20 pixels in either direction, the button will be moved 10 pixels in both directions.

n) AutoScroll o) AutoScrollMargin p) AutoScrollMinSize q) AutoScrollPosition r) BackColor s) BackgroundImage t) BindingContext u) BorderStyle v) Bottom w) Bounds x) CanFocus y) CanSelect z) Capture aa) CausesValidation bb) ClientRectangle cc) ClientSize dd) CompanyName ee) Container ff) ContainsFocus gg) ContextMenu hh) Controls ii) Created jj) CreateParams kk) Cursor ll) DataBindings mm) DefaultImeMode nn) DefaultSize oo) DesignMode pp) DisplayRectangle qq) Disposing rr) Dock ss) ToString Description Gets or sets the position and manner in which the tab page is docked.

When a control is docked to an edge of it's container, it will always be positioned flush against that edge when the container is resized. If more than one control is docked to an edge, the controls will not be placed on top of each other.

tt) DockPadding uu) Enabled vv) ToString

Description

Gets or sets a value indicating whether the tab is enabled.

ww) Events xx) Focused yy) Font zz) FontHeight aaa) ForeColor bbb) Handle ccc) HasChildren ddd) Height eee) HScroll fff) ImageIndex ggg) ToString Description Gets or sets the index to the image displayed on this tab.

The System.Windows.Forms.TabPage.ImageIndex points to an image in the System.Windows.Forms.TabControl object's associated System.Windows.Forms.TabControl.ImageList.

hhh) ImeMode iii) InvokeRequired jjj) IsAccessible kkk) IsDisposed lll) IsHandleCreated mmm) Left nnn) Location ooo) Name ppp) Parent qqq) ProductName rrr) ProductVersion sss) RecreatingHandle ttt) Region uuu) RenderRightToLeft vvv) ResizeRedraw www) Right xxx) RightToLeft yyy) ShowFocusCues zzz) ShowKeyboardCues aaaa) Site bbbb) Size
cccc) TabIndex
dddd) ToString Description The index of this tab page into the System.Windows.Forms. TabControl object's tab-page collection.

You can access the tab-page collection through the System. Windows.Forms.TabControl.TabPages property of the System.Windows.Forms.TabControl.

eeee) TabStop
ffff) ToString

[C#] public new bool TabStop {get; set;}

[C++] public: _property bool get_TabStop( ); public: _property void set_TabStop(bool);

[VB] Public Property TabStop As Boolean

[JScript] public function get TabStop( ) : Boolean; public function set TabStop(Boolean);

Description

Gets or sets a value indicating whether the focus moves to this tab page when the user presses the TAB key.

gggg) Tag
hhhh) Text
iiii) ToString

Description

Gets or sets the text to display on the tab.

jjjj) ToolTipText
kkkk) ToString

[C#] public string ToolTipText {get; set;}

[C++] public: _property String* get_ToolTipText( ); public: _property void set_ToolTipText(String*);

[VB] Public Property ToolTipText As String

[JScript] public function get ToolTipText( ): String; public function set ToolTipText(String);

Description

Gets or sets the ToolTip text for this tab.

This tab page belongs to a System.Windows.Forms.TabControl instance. The ToolTip text appears when the user moves the mouse over the tab—if the System.Windows.Forms.TabControl.ShowToolTips property of the System.Windows. Forms.TabControl is true. For more information on ToolTips, see the System.Windows.Forms.ToolTip class.

llll) Top
mmmm) TopLevelControt
nnnn) Visible
oooo) ToString

Description

Gets or sets a value indicating whether the tab is visible.

pppp) VScroll
qqqq) Width
rrrr) WindowTarget
ssss) CreateControlsInstance

[C#] protected override ControlCollection CreateControlsInstance( );

[C++] protected: Control Collection* CreateControlsInstance( );

[VB] Overrides Protected Function CreateControls Instance( ) As ControlCollection

[JScript] protected override function CreateControlsInstance( ): ControlCollection;

Description

Constructs the new instance of the Controls collection objects. Subclasses should not call base.CreateControlsInstance. Our version creates a control collection that does not support Constructs the new instance of the Controls collection objects. Subclasses should not call base.CreateControlsInstance. Our version creates a control collection that does not support tttt) GetTabPageOfComponent

[C#] public static TabPage GetTabPageOfComponent(object comp);

[C++] public: static TabPage* GetTabPageOfComponent (Object* comp);

[VB] Public Shared Function GetTabPageOfComponent(ByVal comp As Object) As TabPage

[JScript] public static function GetTabPageOfComponent (comp: Object) TabPage;

Description

Retrieves the tab page that contains the specified object.

Return Value: The System.Windows.Forms.TabPage that contains the specified object, or null if the object cannot be found. The object to look for.

uuuu) SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As BoundsSpecified)

[JScript] protected override function SetBoundsCore(x: int, y: int, width: int, height: int, specified: BoundsSpecified);

Description overrides main setting of our bounds so that we can control our size and that of our TabPages . . . .

vvvv) ToString

[C#] public override string ToString( );

[C++] public: String* ToString( );

[VB] Overrides Public Function ToString( ) As String

[JScript] public override function ToString( ): String;

Description

Returns a string containing the value of the System.Windows. Forms.TabPage.Text property for the System.Windows. Forms.TabPage object's default printing.

Return Value: A string containing the value of the System. Windows.Forms.TabPage.Text property.

TabControl.TabPageCollection class (System.Windows.Forms)

a) WndProc

Description

Contains a collection of System.Windows.Forms.TabPage objects.

b) TabControl.TabPageCollection

Example Syntax:

c) WndProc

[C#] public TabControl.TabPageCollection(TabControl owner);

[C++] public: TabPageCollection(TabControl* owner);

[VB] Public Sub New(ByVal owner As TabControl)

[JScript] public function TabControl.TabPageCollection (owner: TabControl);

Description

Initializes a new instance of the System.Windows.Forms.TabControl.TabPageCollection class. The System.Windows.Forms.TabControl that this collection belongs to.

d) Count e) WndProc

[C#] public int Count {get;}

[C++] public: _property int get Count( );

[VB] Public ReadOnly Property Count As Integer

[JScript] public function get Count( ): int;

Description

Gets the number of tab pages in the collection.

f) IsReadOnly g) WndProc

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the collection is read-only.

h) Item i) WndProc

[C#] public virtual TabPage this[int index] {get; set;}

[C++] public: _property virtual TabPage* get_Item(int index); public: _property virtual void set_Item(int index, TabPage*);

[VB] Overridable Public Default Property Item(ByVal index As Integer) As TabPage

[JScript] returnValue=TabPageCollectionObject.Item(index); TabPageCollectionObject.Item(index)=returnValue;

Description

Gets or sets a System.Windows.Forms.TabPage in the collection. The 0-based index of the tab page to get or set.

j) Add

[C+] public void Add(TabPage value);

[C++] public: void Add(TabPage* value);

[VB] Public Sub Add(ByVal value As TabPage)

[JScript] public function Add(value: TabPage);

Description

Adds a System.Windows.Forms.TabPage to the collection. The System.Windows.Forms.TabPage to add.

k) AddRange

[C#] public void AddRange(TabPage[ ] pages);

[C++] public: void AddRange(TabPage* pages[ ]);

[VB] Public Sub AddRange(ByVal pages( ) As TabPage)

[JScript] public function AddRange(pages: TabPage[ ]);

Description

Adds a set of tab pages to the collection. An array of type System.Windows.Forms.TabPage that contains the tab pages to add.

l) Clear

[C#] public virtual void Clear( );

[C++] public: virtual void Clear( );

[VB] Overridable Public Sub Clear( )

[JScript] public function Clear( );

Description

Removes all the tab pages from the collection.

m) Contains

[C#] public bool Contains(TabPage page);

[C++] public: boot Contains(TabPage* page);

[VB] Public Function Contains(ByVal page As TabPage) As Boolean

[JScript] public function Contains(page: TabPage): Boolean;

Description

Determines whether a specified tab page is in the collection.

Return Value: true if the specified System.Windows.Forms.TabPage is in the collection; otherwise, false. The System.Windows.Forms.TabPage to locate in the collection.

n) GetEnumerator

[C#] public IEnumerator GetEnumerator( );

[C++] public: sealed IEnumerator* GetEnumerator( );

[VB] NotOverridable Public Function GetEnumerator( ) As IEnumerator

[JScript] public function GetEnumerator( ): IEnumerator;

Description

Returns an enumeration of all the tab pages in the collection.

Return Value: An System.Collections.IEnumerator for the System.Windows.Forms.TabControl.TabPageCollection.

This method creates an enumerator that contains a snapshot of the collection.

You can change the collection by changing the enumerator; however, multiple enumerators can simultaneously access the same collection. Changing the collection (either directly or through another enumerator) can thus cause System.Collections.IEnumerator.Current or System.Collections.IEnumerator.MoveNext to throw an exception.

o) IndexOf

[C#] public int IndexOf(TabPage page);

[C++] public: int IndexOf(TabPage* page);

[VB] Public Function IndexOf(ByVal page As TabPage) As Integer

[JScript] public function IndexOf(page: TabPage): int;

Description

Returns the index of the specified tab page in the collection.

Return Value: The 0-based index of the tab page; −1 if it cannot be found. The System.Windows.Forms.TabPage to locate in the collection.

p) Remove

[C#] public void Remove(TabPage value);

[C++] public: void Remove(TabPage* value);

[VB] Public Sub Remove(ByVal value As TabPage)

[JScript] public function Remove(value: TabPage);

Description

Removes a System.Windows.Forms.TabPage from the collection. The System.Windows.Forms.TabPage to remove.

q) RemoveAt

[C#] public void RemoveAt(int index);

[C++] public: _sealed void RemoveAt(int index);

[VB] NotOverridable Public Sub RemoveAt(ByVal index As Integer)

[JScript] public function RemoveAt(index: int);

Description

Removes the tab page at the specified index from the collection. The 0-based index of the System.Windows.Forms.TabPage to remove.

r) ICollection.CopyTo

[C#] void ICollection.CopyTo(Array dest, int index);

[C++] void ICollection::CopyTo(Array* dest, int index);

[VB] Sub CopyTo(ByVal dest As Array, ByVal index As Integer) Implements ICollection.CopyTo

[JScript] function ICollection.CopyTo(dest: Array, index: int);

s) IList.Add

[C#] int IList.Add(object value);

[C++] int IList::Add(Object* value);

[VB] Function Add(ByVal value As Object) As Integer Implements IList.Add

[JScript] function IList.Add(value: Object): int;

t) IList.Contains

[C#] bool IList.Contains(object page);

[C++] bool IList::Contains(Object* page);

[VB] Function Contains(ByVal page As Object) As Boolean Implements IList.Contains

[JScript] function IList.Contains(page: Object): Boolean;

u) IList.IndexOf

[C#] int IList.IndexOf(object page);

[C++] int IList::IndexOf(Object* page);

[VB] Function IndexOf(ByVal page As Object) As Integer Implements IList.IndexOf

[JScript] function IList.IndexOf(page: Object): int;

v) IList.Insert

[C#] void IList.Insert(int index, object value);

[C++] void IList::Insert(int index, Object* value);

[VB] Sub Insert(ByVal index As Integer, ByVal value As Object) Implements IList.Insert

[JScript] function IList.Insert(index: int, value: Object);

w) IList.Remove

[C#] void IList.Remove(object value);

[C++] void IList::Remove(Object* value);

[VB] Sub Remove(ByVal value As Object) Implements IList.Remove

[JScript] function IList.Remove(value: Object);

TabPage.TabPageControlCollection class (System.Windows.Forms)

a) ToString

Description

Contains the collection of controls that the System.Windows.Forms.TabPage uses.

b) TabPage.TabPageControlCollection

Example Syntax:

c) ToString

[C#] public TabPage.TabPageControlCollection(TabPage owner);

[C++] public: TabPageControlCollection(TabPage* owner);

[VB] Public Sub New(ByVal owner As TabPage)

[JScript] public function TabPage.TabPageControlCollection (owner: TabPage);

Description

Initializes a new instance of the System.Windows.Forms.TabPage.TabPageControlCollection class. The System.Windows.Forms.TabPage that contains this collection of controls.

d) Count e) IsReadOnly f) Item g) Add

[C#] public override void Add(Control value);

[C++] public: void Add(Control* value);

[VB] Overrides Public Sub Add(ByVal value As Control)

[JScript] public override function Add(value: Control);

Description

Adds a control to the collection.

The specified control is added to the end of the collection. If the control is already a child of another control, it is removed from the other control. The control to add.

TabSizeMode enumeration (System.Windows.Forms)

a) ToString

Description

Specifies how tabs in a tab control are sized.

This enumeration is used by members such as System.Windows.Forms.TabControl.SizeMode.

b) ToString

[C#] public const TabSizeMode FillToRight;

[C++] public: const TabSizeMode FillToRight;

[VB] Public Const FillToRight As TabSizeMode

[JScript] public var FillToRight: TabSizeMode;

Description

The width of each tab is sized so that each row of tabs fills the entire width of the container control. This is only applicable to tab controls with more than one row.

c) ToString

[C#] public const TabSizeMode Fixed;

[C++] public: const TabSizeMode Fixed;

[VB] Public Const Fixed As TabSizeMode

[JScript] public var Fixed: TabSizeMode;

Description

All tabs in a control are the same width.

d) ToString

[C#] public const TabSizeMode Normal;

[C++] public: const TabSizeMode Normal;

[VB] Public Const Normal As TabSizeMode

[JScript] public var Normal: TabSizeMode;

Description

The width of each tab is sized to accommodate what is displayed on the tab, and the size of tabs in a row are not adjusted to fill the entire width of the container control.

TextBox class (System.Windows.Forms)

a) ToString

Description

Represents a Windows text box control.

The System.Windows.Forms.TextBox control allows the user to enter text in an application. This control has additional functionality that is not found in the standard Windows text box control, including multiline editing and password character masking.

b) TextBox

Example Syntax:

c) ToString

[C#] public TextBox( );

[C++] public: TextBox( );

[VB] Public Sub New( )

[JScript] public function TextBox( );

Description

Initializes a new instance of the System.Windows.Forms.TextBox class.

The parent container control defines the color and font settings for the System.Windows.Forms.TextBox.

d) AcceptsReturn e) ToString

[C#] public bool AcceptsReturn {get; set;}

[C++] public: _property bool get_AcceptsReturn( ); public: property void set_AcceptsReturn(bool);

[VB] Public Property AcceptsReturn As Boolean

[JScript] public function get AcceptsReturn( ): Boolean; public function set AcceptsReturn(Boolean);

Description

Gets or sets a value indicating whether pressing ENTER in a multiline System.Windows.Forms.TextBox control creates a new line of text in the control or activates the default button for the form.

If the value of this property is false, the user must press CTRL+ENTER to create a new line in a multiline System.Windows.Forms.TextBox control. If there is no default button for the form, then the ENTER key will always create a new line of text in the control, no matter what the value of this property.

f) AcceptsTab g) AccessibilityObject h) AccessibleDefaultActionDescription i) AccessibleDescription j) AccessibleName k) AccessibleRole l) AllowDrop m) Anchor n) AutoSize o) BackColor p) BackgroundImage q) BindingContext r) BorderStyle s) Bottom t) Bounds u) CanFocus v) CanSelect w) CanUndo x) Capture y) CausesValidation z) CharacterCasing aa) ToString Description Gets or sets whether the System.Windows.Forms.TextBox control modifies the case of characters as they are typed.

You can use the System.Windows.Forms.TextBox.CharacterCasing property to change the case of characters as required by your application. For example, you could change the case of all characters entered in a System.Windows.Forms.TextBox control used for password entry to uppercase or lowercase to enforce a policy for passwords.

bb) ClientRectangle cc) ClientSize dd) CompanyName ee) Container ff) ContainsFocus gg) ContextMenu hh) Controls ii) Created jj) CreateParams kk) ToString Description Returns the parameters needed to create the handle. Inheriting classes can override this to provide extra functionality. They should not, however, forget to call base.getCreateParams( ) first to get the struct filled up with the basic info.

ll) Cursor
mm) DataBindings
nn) DefaultImeMode
oo) ToString

Description pp) DefaultSize
qq) DesignMode
rr) DisplayRectangle
ss) Disposing
tt) Dock
uu) Enabled
vv) Events
ww) Focused
xx) Font
yy) FontHeight
zz) ForeColor
aaa) Handle
bbb) HasChildren
ccc) Height
ddd) HideSelection
eee) ImeMode
fff) InvokeRequired
ggg) IsAccessible
hhh) IsDisposed
iii) IsHandleCreated
jjj) Left
kkk) Lines
lll) Location
mmm) MaxLength
nnn) Modified
ooo) Multiline
ppp) Name
qqq) Parent
rrr) PasswordChar
sss) ToString Description Gets or sets the character used to mask characters of a password in a single-line System.Windows.Forms.TextBox control.

If the System.Windows.Forms.TextBoxBase.Multiline property is set to true, setting the System.Windows.Forms.TextBox.PasswordChar property has no visual effect. When the System.Windows.Forms.TextBox.PasswordChar property is set to true, cut, copy, and paste actions in the control using the keyboard are not allowed, regardless of whether the System.Windows.Forms.TextBoxBase.Multiline property is set to true or false.

ttt) PreferredHeight
uuu) ProductName
vvv) ProductVersion
www) ReadOnly
xxx) RecreatingHandle
yyy) Region
zzz) RenderRightToLeft
aaaa) ResizeRedraw
bbbb) Right
cccc) RightToLeft
dddd) ScrollBars
eeee) ToString Description Gets or sets which scroll bars should appear in a multiline System.Windows.Forms.TextBox control.

Horizontal scroll bars will not be shown if the System.Windows.Forms.TextBoxBase.WordWrap property is set to true, regardless of the value of the System.Windows.Forms.TextBox.ScrollBars property.

ffff) SelectedText
gggg) SelectionLength
hhhh) SelectionStart
iiii) ShowFocusCues
jjjj) ShowKeyboardCues
kkkk) Site
llll) Size
mmmm) TabIndex
nnnn) TabStop
oooo) Tag
pppp) Text
qqqq) TextAlign
rrrr) ToString Description Gets or sets how text is aligned in a System.Windows.Forms.TextBox control.

You can use this property to align the text within a System.Windows.Forms.TextBox to match the layout of text on your form. For example, if your controls are all located on the right side of the form, you can set the System.Windows.Forms.Label.TextAlign property to HorizontalAlignment.Right, and the text will be aligned with the right side of the control instead of the default left alignment.

ssss) TextLength
tttt) Top
uuuu) TopLevelControl
vvvv) Visible
wwww) Width
xxxx) WindowTarget
yyyy) WordWrap
zzzz) ToString Description Occurs when the value of the System.Windows.Forms.TextBox.TextAlign property has changed.

For more information about handling events, see.

aaaaa) IsInputKey

[C#] protected override bool IsInputKey(Keys keyData);

[C++] protected: bool IsInputKey(Keys keyData);

[VB] Overrides Protected Function IsInputKey(ByVal keyData As Keys) As Boolean

[JScript] protected override function IsInputKey(keyData: Keys): Boolean;

Description

Overridden to handle RETURN key.

bbbbb) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

Overridden to update the newly created handle with the settings of the PasswordChar properties.

ccccc) OnMouseUp

[C#] protected override void OnMouseUp(MouseEventArgs mevent);

[C++] protected: void OnMouseUp(MouseEventArgs* mevent);

[VB] Overrides Protected Sub OnMouseUp(ByVal mevent As MouseEventArgs)

[JScript] protected override function OnMouseUp(mevent: MouseEventArgs);

Raises the System.Windows.Forms.TextBox.OnMouseUp (System.Windows.Forms.MouseEventArgs) event.

ddddd) OnTextAlignChanged

[C#] protected virtual void OnTextAlignChanged(EventArgs e);

[C++] protected: virtual void OnTextAlignChanged(Event Args* e);

[VB] Overridable Protected Sub OnTextAlignChanged(ByVal e As EventArgs)

[JScript] protected function OnTextAlignChanged(e: Event Args);

Description

Raises the System.Windows.Forms.TextBox.Text AlignChanged event.

Raising an event invokes the event handler through a delegate. For more information, see. An System.EventArgs that contains the event data.

eeeee) WndProc

[C#] protected override void WndProc(ref Message m);

[C++] protected: void WndProc(Message* m),

[VB] Overrides Protected Sub WndProc(ByRef m As Message)

[JScript] protected override function WndProc(m: Message);

Description

The edits window procedure. Inheriting classes can override this to add extra functionality, but should not forget to call base.wndProc(m); to ensure the combo continues to function properly. A Windows Message Object.

TextBoxBase class (System.Windows.Forms)

a) WndProc

Description

Implements the basic functionality required by text controls.

This class implements the core features of text manipulation controls, such as System.Windows.Forms.TextBox and System.Windows.Forms.RichTextBox. These include text selection, Clipboard functionality, multiline text control support, and many events.

b) AcceptsTab c) WndProc

[C#] public bool AcceptsTab {get; set;}

[C++] public: _property bool get_AcceptsTab( ); public: _property void set_AcceptsTab(bool);

[VB] Public Property AcceptsTab As Boolean

[JScript] public function get AcceptsTab( ): Boolean; public function set AcceptsTab(Boolean);

Description

Gets or sets a value indicating whether pressing the TAB key in a multiline text box control types a TAB character in the control instead of moving the focus to the next control in the tab order.

If the System.Windows.Forms.TextBoxBase.AcceptsTab property is set to true, the user must press CTRL+TAB to move the focus to the next control in the tab order.

d) AccessibilityObject e) AccessibleDefaultActionDescription f) AccessibleDescription g) AccessibleName h) AccessibleRole i) AllowDrop j) Anchor k) AutoSize l) WndProc Description Gets or sets a value indicating whether the height of the control automatically adjusts when the font assigned to the control is changed.

Multiline text box controls ignore this property setting. When this property is set to true, the text box control resizes its height based on the size of the font assigned to the control. You can use this property to ensure that the user can read text assigned to a single-line version of the control regardless of the font.

m) BackColor n) WndProc

[C#] public override Color BackColor {get; set;}

[C++] public: property virtual Color get_BackColor( ); public: _property virtual void set_BackColor(Color);

[VB] Overrides Public Property BackColor As Color

[JScript] public function get BackColor( ): Color; public function set BackColor(Color);

Description

Gets or sets the background color of the control.

You can use the System.Windows.Forms.TextBoxBase.BackColor property to change the background color of the text control to blend into the color scheme of your forms.

o) BackgroundImage p) WndProc

[C#] public override Image BackgroundImage {get; set;}

[C++] public: _property virtual Image* get BackgroundImage( ); public: _property virtual void set_BackgroundImage (Image*);

[VB] Overrides Public Property BackgroundImage As Image

[JScript] public function get BackgroundImage( ): Image; public function set BackgroundImage(Image);

Description q) BindingContext r) BorderStyle s) WndProc

Description

Gets or sets the border type of the text box control.

You can use the System.Windows.Forms.TextBoxBase.BorderStyle property to create borderless and flat style controls, in addition to the default three-dimensional control.

t) Bottom
u) Bounds
v) CanFocus
w) CanSelect
x) CanUndo
y) WndProc

Description

Gets a value indicating whether the user can undo the previous operation in a text box control.

If this method returns true, you can call the System.Windows.Forms.TextBoxBase.Undo method to undo the last operation in a text box. You can use this method in the System.Windows.Forms.MenuItem.Popup event of a System.Windows.Forms.MenuItem, or in code that manages the state of buttons on a System.Windows.Forms.ToolBar to enable or disable the ability to undo the previous operation in a text box control.

z) Capture
aa) CausesValidation
bb) ClientRectangle
cc) ClientSize
dd) CompanyName
ee) Container
ff) ContainsFocus
gg) ContextMenu
hh) Controls
ii) Created
jj) CreateParams
kk) WndProc Description Returns the parameters needed to create the handle. Inheriting classes can 17 override this to provide extra functionality. They should not, however, forget to call base.getCreateParams( ) first to get the struct filled up with the basic info.

ll) Cursor
mm) DataBindings
nn) DefaultImeMode
oo) DefaultSize
pp) WndProc

Description

Deriving classes can override this to configure a default size for their control. This is more efficient than setting the size in the control's constructor.

qq) DesignMode
rr) DisplayRectangle
ss) Disposing
tt) Dock
uu) Enabled
vv) Events
ww) Focused
xx) Font
yy) FontHeight
zz) ForeColor
aaa) WndProc Description Gets or sets the foreground color of the control.

You can use the System.Windows.Forms.TextBoxBase.ForeColor property to change the color of the text within the control to match the text of other controls on your form. You can also use this property to highlight a specific text box that contains an invalid value.

bbb) Handle
ccc) HasChildren
ddd) Height
eee) HideSelection
fff) WndProc

Description

Gets or sets a value indicating whether the selected text in the text box control remains highlighted when the control loses focus.

You can use this property to keep text highlighted in a text box control while another form or a dialog box has focus, such as a spelling checker dialog box.

ggg) ImeMode
hhh) InvokeRequired
iii) IsAccessible
jjj) IsDisposed
kkk) IsHandleCreated
lll) Left
mmm) Lines
nnn) WndProc Description Gets or sets the lines of text in a text box control.

Each element in the array becomes a line of text in the text box control. If the System.Windows.Forms.TextBoxBase. Multiline property of the text box control is set to true and a newline character appears in the text, the text following the newline character is added to a new element in the array and displayed on a separate line.

ooo) Location
ppp) MaxLength
qqq) WndProc

Description

Gets or sets the maximum number of characters the user can type into the text box control.

When this property is set to zero, the maximum length of the text that can be entered in the control is limited only by available memory. You can use this property to restrict the length of text entered in the control for values such as postal codes and telephone numbers. You can also use this property to restrict the length of text entered when the data is to be entered in a database. You can limit the text entered into the control to the maximum length of the corresponding field in the database.

rrr) Modified
sss) WndProc

[C#] public bool Modified {get; set;}

[C++] public: _property bool get_Modified( ); public: _property void set_Modified(bool);

[VB] Public Property Modified As Boolean

[JScript] public function get Modified( ): Boolean; public function set Modified(Boolean);

Description

Gets or sets a value that indicates that the text box control has been modified by the user since the control was created or its contents were last set.

You can use this property to determine if the user has modified the contents of the text box control. You can also set this property in code to indicate that changes were made to the text box control by the application. This property can be used by validation and data-saving methods to determine if changes were made in a text box control so the changed contents can be validated or saved.

ttt) Multiline uuu) WndProc

[C#] public virtual bool Multiline {get; set;}

[C++] public: _property virtual bool get_Multiline( ); public: property virtual void set_Multiline(bool);

[VB] Overridable Public Property Multiline As Boolean

[JScript] public function get Multiline( ): Boolean; public function set Multiline(Boolean);

Description

Gets or sets a value indicating whether this is a multiline text box control.

A multiline text box allows you to display more than one line of text in the control. If the System.Windows.Forms.TextBoxBase.WordWrap property is set to true, text entered into the multiline text box is wrapped to the next line in the control. If the System.Windows.Forms.TextBoxBase.WordWrap property is set to false, text entered into the multiline text box control will be displayed on the same line until a newline character is entered.

vvv) Name www) Parent xxx) PreferredHeight yyy) WndProc

Description

Gets the preferred height for a single-line text box.

The size returned by this property is based on the font height and border style of the text box. You can use this property to determine the appropriate size of the text box to ensure that text is properly displayed in the control. The value returned by this property is in pixels.

zzz) ProductName aaaa) ProductVersion bbbb) ReadOnly cccc) WndProc

Description

Gets or sets a value indicating whether text in the text box is read-only.

When this property is set to true, the contents of the control cannot be changed by the user at runtime. With this property set to true, you can still set the value of the System.Windows.Forms.TextBoxBase.Text property in code. You can use this feature instead of disabling the control with the System.Windows.Forms.Control.Enabled property to allow the contents to be copied.

dddd) RecreatingHandle eeee) Region ffff) RenderRightToLeft gggg) ResizeRedraw hhhh) Right iiii) RightToLeft jjjj) SelectedText kkkk) WndProc Description Gets or sets a value indicating the currently selected text in the control.

You can assign text to this property to change the text currently selected in the text box. If no text is currently selected in the text box, this property returns a zero-length string.

llll) SelectionLength mmmm) WndProc

[C#] public virtual int SelectionLength {get; set;}

[C++] public: _property virtual int get_SelectionLength( ); public: _property virtual void set_SelectionLength(int);

[VB] Overridable Public Property SelectionLength As Integer

[JScript] public function get SelectionLength( ): int; public function set SelectionLength(int);

Description

Gets or sets the number of characters selected in the text box.

You can use this property to determine if any characters are currently selected in the text box control before performing operations on the selected text. When the value of the System.Windows.Forms.TextBoxBase.SelectionLength property is set to a value that is larger than the number of characters within the text of the control, the value of the System.Windows.Forms.TextBoxBase.SelectionLength property is set to the entire length of text within the control minus the value of the System.Windows.Forms.TextBoxBase. SelectionStart property (if any value is specified for the System.Windows.Forms.TextBoxBase.SelectionStart property).

nnnn) SelectionStart oooo) WndProc

[C#] public int SelectionStart {get; set;}

[C++] public: _property int get_SelectionStart( ); public: _property void set_SelectionStart(int);

[VB] Public Property SelectionStart As Integer

[JScript] public function get SelectionStart( ): int; public function set SelectionStart(int);

Description

Gets or sets the starting point of text selected in the text box.

If no text is selected in the control, this property indicates the insertion point for new text. If you set this property to a location beyond the length of the text in the control, the selection start position will be placed after the last character. When text is selected in the text box control, changing this property may decrease the value of the System.Windows.Forms.TextBoxBase.SelectionLength property. If the remaining text in the control after the position indicated by the System.Windows.Forms.TextBoxBase.SelectionStart property is less than the value of the System.Windows.Forms.TextBoxBase.SelectionLength property, the value of the System.Windows.Forms.TextBoxBase.SelectionLength property is automatically decreased. The value of the System.Windows.Forms.TextBoxBase.SelectionStart property never causes an increase in the System.Windows.Forms.TextBoxBase.SelectionLength property.

pppp) ShowFocusCues
qqqq) ShowKeyboardCues
rrrr) Site
ssss) Size
tttt) TabIndex
uuuu) TabStop
vvvv) Tag
wwww) Text
xxxx) WndProc Description Gets or sets the current text in the text box.

To display multiple lines of text in a text box, set the System.Windows.Forms.TextBoxBase.Multiline property to true. To read or set the text of a multiline text box, use the System.Windows.Forms.TextBoxBase.Lines property. The amount of text that can be stored in the System.Windows.Forms.TextBoxBase.Text property is limited to 65 KB of memory for the System.Windows.Forms.TextBox control. The amount of text that can be entered in the System.Windows.Forms.RichTextBox control is limited only by available system memory.

yyyy) TextLength
zzzz) WndProc

[C#] public int TextLength {get;}

[C++] public: _property int get_TextLength( );

[VB] Public ReadOnly Property TextLength As Integer

[JScript] public function get TextLength( ): int;

Description

Gets the length of text in the control.

You can use this property to determine the number of characters in a string for tasks such as searching for specific strings of text within the text of the control, where knowledge of the total number of characters is needed.

aaaaa) Top
bbbbb) TopLevelControl
ccccc) Visible
ddddd) Width
eeeee) WindowTarget
fffff) WordWrap
ggggg) WndProc Description Indicates whether a multiline text box control automatically wraps words to the beginning of the next line when necessary.

If this property is set to true, horizontal scroll bars are not displayed regardless of the System.Windows.Forms.TextBox.ScrollBars property setting.

hhhhh) WndProc

[C#] public event EventHandler AcceptsTabChanged;

[C++] public: _event EventHandler* AcceptsTabChanged;

[VB] Public Event AcceptsTabChanged As EventHandler

Description

Occurs when the value of the System.Windows.Forms.TextBoxBase.AcceptsTab property has changed.

For more information about handling events, see.

iiiii) WndProc

[C#] public event EventHandler AutoSizeChanged;

[C++] public: _event EventHandler* AutoSizeChanged;

[VB] Public Event AutoSizeChanged As EventHandler

Description

Occurs when the value of the System.Windows.Forms.TextBoxBase.AutoSize property has changed.

For more information about handling events, see.

jjjjj) WndProc

Description

Occurs when the value of the System.Windows.Forms.TextBoxBase.BorderStyle property has changed.

For more information about handling events, see.

kkkkk) WndProc

Description

Occurs when the text box is clicked.

For more information about handling events, see.

lllll) WndProc

Description

Occurs when the value of the System.Windows.Forms.TextBoxBase.HideSelection property has changed.

For more information about handling events, see.

mmmmm) WndProc

Description

Occurs when the value of the System.Windows.Forms.TextBoxBase.Modified property has changed.

For more information about handling events, see.

nnnnn) WndProc

Description

Occurs when the value of the System.Windows.Forms.TextBoxBase.Multiline property has changed.

For more information about handling events, see.

ooooo) WndProc

Description

Occurs when the value of the System.Windows.Forms.TextBoxBase.ReadOnly property has changed.

For more information about handling events, see.

ppppp) AppendText

[C#] public void AppendText(string text);

[C++] public: void AppendText(String* text);

[VB] Public Sub AppendText(ByVal text As String)

[JScript] public function AppendText(text: String);

Description

Appends text to the current text of text box.

You can use this method to add text to the existing text in the control instead of using the concatenation operator (+) to concatenate text to the System.Windows.Forms.TextBoxBase.Text property. The text to append to the current contents of the text box.

qqqqq) Clear

[C#] public void Clear( );

[C++] public: void Clear( );

[VB] Public Sub Clear( )

[JScript] public function Clear( );

Description

Clears all text from the text box control.

You can use this method to clear the contents of the control instead of assigning the System.Windows.Forms.TextBoxBase.Text property an empty string.

rrrrr) ClearUndo

[C#] public void ClearUndo( );

[C++] public: void ClearUndo( );

[VB] Public Sub ClearUndo( )

[JScript] public function ClearUndo( );

Description

Clears information about the most recent operation from the undo buffer of the text box.

You can use this method to prevent an undo operation from repeating, based on the state of your application.

sssss) Copy

[C#] public void Copy( );

[C++] public: void Copy( );

[VB] Public Sub Copy( )

[JScript] public function Copy( );

Description

Copies the current selection in the text box to the Clipboard.

You can use this method, instead of using the System.Windows.Forms.Clipboard class, to copy text in the text box and place it in the Clipboard.

ttttt) CreateHandle

[C#] protected override void CreateHandle( );

[C++] protected: void CreateHandle( );

[VB] Overrides Protected Sub CreateHandle( )

[JScript] protected override function CreateHandle( );

Description uuuuu) Cut

[C#] public void Cut( );

[C++] public: void Cut( );

[VB] Public Sub Cut( )

[JScript] public function Cut( );

Description

Moves the current selection in the text box to the Clipboard.

This method will only cut text from the text box if text is selected in the control.

You can use this method, instead of using the System.Windows.Forms.Clipboard class, to copy text in the text box and move it to the Clipboard.

vvvvv) IsInputKey

[C#] protected override bool IsInputKey(Keys keyData);

[C++] protected: bool IsInputKey(Keys keyData);

[VB] Overrides Protected Function IsInputKey(ByVal keyData As Keys) As Boolean

[JScript] protected override function IsInputKey(keyData: Keys): Boolean;

Description

Overridden to handle TAB key.

wwwww) OnAcceptsTabChanged

[C#] protected virtual void OnAcceptsTabChanged(EventArgs e);

[C++] protected: virtual void OnAcceptsTabChanged(EventArgs* e);

[VB] Overridable Protected Sub OnAcceptsTabChanged (ByVal e As EventArgs)

[JScript] protected function OnAcceptsTabChanged(e: EventArgs);

Description

Raises the System.Windows.Forms.TextBoxBase. AcceptsTabChanged event.

Raising an event invokes the event handler through a delegate. For more information, see. An System.EventArgs that contains the event data.

xxxxx) OnAutoSizeChanged

[C#] protected virtual void OnAutoSizeChanged(EventArgs e);

[C++] protected: virtual void OnAutoSizeChanged(EventArgs* e);

[VB] Overridable Protected Sub OnAutoSizeChanged(ByVal e As EventArgs)

[JScript] protected function OnAutoSizeChanged(e: EventArgs);

Description

Raises the System.Windows.Forms.TextBoxBase. AutoSizeChanged event.

Raising an event invokes the event handler through a delegate. For more information, see. An System.EventArgs that contains the event data.

yyyyy) OnBorderStyleChanged

[C#] protected virtual void OnBorderStyleChanged(EventArgs e);

[C++] protected: virtual void OnBorderStyleChanged(EventArgs* e);

[VB] Overridable Protected Sub OnBorderStyleChanged (ByVal e As EventArgs)

[JScript] protected function OnBorderStyleChanged(e: EventArgs);

Description

Raises the System.Windows.Forms.TextBoxBase. BorderStyleChanged event.

Raising an event invokes the event handler through a delegate. For more information, see. An System.EventArgs that contains the event data.

zzzzz) OnFontChanged

[C#] protected override void OnFontChanged(EventArgs e);

[C++] protected: void OnFontChanged(EventArgs* e)

[VB] Overrides Protected Sub OnFontChanged(ByVal e As EventArgs)

[JScript] protected override function OnFontChanged(e: EventArgs);

Description aaaaaa) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

Overridden to update the newly created handle with the settings of the MaxLength and PasswordChar properties.

bbbbbb) OnHandleDestroyed

[C#] protected override void OnHandleDestroyed(EventArgs e);

[C++] protected: void OnHandleDestroyed(EventArgs* e);

[VB] Overrides Protected Sub OnHandleDestroyed(ByVal e As EventArgs)

[JScript] protected override function OnHandleDestroyed(e: EventArgs);

Description cccccc) OnHideSelectionChanged

[C#] protected virtual void OnHideSelectionChanged(Event Args e);

[C++] protected: virtual void OnHideSelectionChanged (EventArgs* e);

[VB] Overridable Protected Sub OnHideSelectionChanged (ByVal e As EventArgs)

[JScript] protected function OnHideSelectionChanged(e: EventArgs);

Description

Raise the System.Windows.Forms.TextBox-Base.HideSelectionChanged event.

Raising an event invokes the event handler through a delegate. For more information, see. An System.EventArgs that contains the event data.

dddddd) OnModifiedChanged

[C#] protected virtual void OnModifiedChanged(EventArgs e);

[C++] protected: virtual void OnModifiedChanged(Event Args* e);

[VB] Overridable Protected Sub OnModifiedChanged(By-Val e As EventArgs)

[JScript] protected function OnModifiedChanged(e: Event Args);

Description

Raises the System.Windows.Forms.TextBoxBase. Modified-Changed event.

Raising an event invokes the event handler through a delegate. For more information, see. An System.EventArgs that contains the event data.

eeeeee) OnMultilineChanged

[C#] protected virtual void OnMultilineChanged(EventArgs e);

[C++] protected: virtual void OnMultilineChanged(Event Args* e);

[VB] Overridable Protected Sub OnMultilineChanged(By-Val e As EventArgs)

[JScript] protected function OnMultilineChanged(e: Event Args);

Description

Raises the System.Windows.Forms.TextBox-Base.MultilineChanged event.

Raising an event invokes the event handler through a delegate. For more information, see. An System.EventArgs that contains the event data.

ffffff) OnReadOnlyChanged

[C#] protected virtual void OnReadOnlyChanged(EventArgs e);

[C++] protected: virtual void on ReadOnlyChanged(Event Args* e);

[VB] Overridable Protected Sub OnReadOnlyChanged(By-Val e As EventArgs)

[JScript] protected function OnReadOnlyChanged(e: Event Args);

Description

Raises the System.Windows.Forms.TextBoxBase. ReadOn-lyChanged event.

Raising an event invokes the event handler through a delegate. For more information, see. An System.EventArgs that contains the event data.

gggggg) Paste

[C#] public void Paste( );

[C++] public: void Paste( );

[VB] Public Sub Paste( )

[JScript] public function Paste( );

Description

Replaces the current selection in the text box with the contents of the Clipboard.

The System.Windows.Forms.TextBoxBase.Paste method will only paste text into the control if text is currently stored in the Clipboard. Once your application exits, any content stored in the Clipboard is removed.

hhhhhh) ProcessDialogKey

[C#] protected override bool ProcessDialogKey(Keys key-Data);

[C++] protected: bool ProcessDialogKey(Keys keyData);

[VB] Overrides Protected Function ProcessDialogKey(By-Val keyData As Keys) As Boolean

[JScript] protected override function ProcessDialogKey(key-Data: Keys): Boolean;

iiiiii) ScrollToCaret

[C#] public void ScrollToCaret( );

[C++] public: void ScrollToCaret( );

[VB] Public Sub ScrollToCaret( )

[JScript] public function ScrollToCaret( );

Description

Scrolls the contents of the control to the current caret position.

This method enables you to scroll the contents of the control until the caret is within the visible region of the control. If the caret is positioned below the visible region of the control, the System.Windows.Forms.TextBoxBase.ScrollToCaret method will scroll the contents of the control until the caret is visible at the bottom of the control. If the caret is positioned above the visible region of the control, this method scrolls the contents of the control until the caret is visible at the top of the control. You can use this method in a multiline text box to ensure that the current text entry point is within the visible region of the control.

jjjjjj) Select

[C#] public void Select(int start, int length);

[C++] public: void Select(int start, int length);

[VB] Public Sub Select(ByVal start As Integer, ByVal length As Integer)

[JScript] public function Select(start: int, length: int); Selects text within the control.

Description

Selects a range of text in the text box.

If you want to set the start position to the first character in the control's text, set the start parameter to 0. You can use this method to select a substring of text, such as when searching through the text of the control and replacing information. The position of the first character in the current text selection within the text box. The number of characters to select.

kkkkkk) SelectAll

[C#] public void SelectAll( );

[C++] public: void SelectAll( );

[VB] Public Sub SelectAll( )

[JScript] public function SelectAll( );

Description

Selects all text in the text box.

This method enables you to select all text within the control. You can use this method inconjunction with the System.Windows.Forms.TextBoxBase.Cut method, which requires text to be selected in the control, to cut the entire contents of the control and paste them into the Clipboard.

llllll) SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As BoundsSpecified)

[JScript] protected override function SetBoundsCore(x: int, y: int, width: int, height: int, specified: BoundsSpecified);

Description

Overrides Control.setBoundsCore to enforce autoSize.

mmmmmm) ToString

[C#] public override string ToString( );

[C++] public: String* ToString( );

[VB] Overrides Public Function ToString( ) As String

[JScript] public override function ToString( ): String;

Description

Provides some interesting information for the TextBox control in String form.

Return Value: String Provides some interesting information for the TextBox control in String form.

nnnnnn) Undo

[C#] public void Undo( );

[C++] public: void Undo( );

[VB] Public Sub Undo( )

[JScript] public function Undo( );

Description

Undoes the last edit operation in the text box.

This method will undo the last clipboard or text change operation performed in the text box control if the System.Windows.Forms.TextBoxBase.CanUndo property returns true.

oooooo) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

The edits window procedure. Inheriting classes can override this to add extra functionality, but should not forget to call base.wndProc(m); to ensure the combo continues to function properly. A Windows Message Object.

ThreadExceptionDialog class (System.Windows.Forms)

a) WndProc

Description

Implements a dialog box that is displayed when an unhandled exception occurs in a thread.

b) ThreadExceptionDialog

Example Syntax:

c) WndProc

[C#] public ThreadExceptionDialog(Exception t);

[C++] public: ThreadExceptionDialog(Exception* t);

[VB] Public Sub New(ByVal t As Exception)

[JScript] public function ThreadExceptionDialog(t: Exception);

Description

Initializes a new instance of the System.Windows.Forms.ThreadExceptionDialog class.

Information contained in will be displayed in the System.Windows.Forms.ThreadExceptionDialog box. The System.Exception that represents the exception that occurred.

d) AcceptButton e) AccessibilityObject j) AccessibleDefaultActionDescription g) AccessibleDescription h) AccessibleName i) AccessibleRole
j) ActiveControl
k) ActiveMdiChild
l) AllowDrop
m) AllowTransparency
n) Anchor
o) AutoScale
p) AutoScaleBaseSize
q) AutoScroll
r) AutoScrollMargin
s) AutoScrollMinSize
t) AutoScrollPosition
u) BackColor
v) BackgroundImage
w) BindingContext
x) Bottom
y) Bounds
z) CancelButton
aa) CanFocus
bb) CanSelect
cc) Capture
dd) CausesValidation
ee) ClientRectangle
ff) ClientSize
gg) CompanyName
hh) Container
ii) ContainsFocus
jj) ContextMenu
kk) ControlBox
ll) Controls
mm) Created
nn) CreateParams
oo) Cursor
pp) DataBindings
qq) DefaultImeMode
rr) DefaultSize
ss) DesignMode
tt) DesktopBounds
uu) DesktopLocation
vv) DialogResult
ww) DisplayRectangle
xx) Disposing
yy) Dock
zz) DockPadding
aaa) Enabled
bbb) Events
ccc) Focused
ddd) Font
eee) FontHeight
fff) ForeColor
ggg) FormBorderStyle
hhh) Handle
iii) HasChildren
jjj) Height
kkk) HelpButton
lll) HScroll
mmm) Icon
nnn) ImeMode
ooo) InvokeRequired
ppp) IsAccessible
qqq) IsDisposed
rrr) IsHandleCreated
sss) IsMdiChild
ttt) IsMdiContainer
uuu) IsRestrictedWindow
vvv) KeyPreview
www) Left
xxx) Location
yyy) MaximizeBox
zzz) MaximizedBounds
aaaa) MaximumSize
bbbb) MdiChildren
cccc) MdiParent
dddd) Menu
eeee) MergedMenu
ffff) MinimizeBox
gggg) MinimumSize
hhhh) Modal
iiii) Name
jjjj) Opacity
kkkk) OwnedForms
llll) Owner
mmmm)Parent
nnnn) ParentForm
oooo) ProductName
pppp) ProductVersion
qqqq) RecreatingHandle
rrrr) Region
ssss) RenderRightToLeft
tttt) ResizeRedraw
uuuu) Right
vvvv) RightToLeft
wwww) ShowFocusCues
xxxx) ShowInTaskbar
yyyy) ShowKeyboardCues
zzzz) Site
aaaaa) Size
bbbbb) SizeGripStyle
ccccc) StartPosition
ddddd) TabIndex
eeeee) TabStop
fffff) Tag
ggggg) Text
hhhhh) Top
iiiii) TopLevel
jjjjj) TopLevelControl
kkkkk) TopMost
lllll) TransparencyKey
mmmmm) Visible
nnnnn) VScroll
ooooo) Width
ppppp) WindowState
qqqqq) WindowTarget TickStyle enumeration (System.Windows.Forms)

a) WndProc

Description

Specifies the location of tick marks in a System.Windows.Forms.TrackBar control.

Use the members of this enumeration to set the value of the System.Windows.Forms.TrackBar.TickStyle property of the System.Windows.Forms.TrackBar control.

b) WndProc

[C#] public const TickStyle Both;

[C++] public: const TickStyle Both;

[VB] Public Const Both As TickStyle

[JScript] public var Both: TickStyle;

Description

Tick marks are located on both sides of the control.

c) WndProc

[C#] public const TickStyle BottomRight;

[C++] public: const TickStyle BottomRight;

[VB] Public Const BottomRight As TickStyle

[JScript] public var BottomRight: TickStyle;

Description

Tick marks are located on the bottom of a horizontal control or on the right side of a vertical control.

d) WndProc

[C#] public const TickStyle None;

[C++] public: const TickStyle None;

[VB] Public Const None As TickStyle

[JScript] public var None: TickStyle;

Description

No tick marks appear in the control.

e) WndProc

[C#] public const TickStyle TopLeft;

[C++] public: const TickStyle TopLeft;

[VB] Public Const TopLeft As TickStyle

[JScript] public var TopLeft: TickStyle;

Description

Tick marks are located on the top of a horizontal control or on the left of a vertical control.

Timer class (System.Windows.Forms)

a) ToString

Description

Implements a timer that raises an event at user-defined intervals. This timer is optimized for use in Windows Forms applications and must be used in a window.

A System.Windows.Forms.Timer is used to raise an event at user-defined intervals. This Windows timer is designed for a single-threaded environment where UI threads are used to perform processing. It requires that the user code have a UI message pump available and always operate from the same thread, or marshal the call onto another thread.

b) Timer

Example Syntax:

c) ToString

[C#] public Timer( );

[C++] public: Timer( );

[VB] Public Sub New( )

[JScript] public function Timer( ); Initializes a new instance of the System.Windows.Forms.Timer class.

Description

Initializes a new instance of the System.Windows.Forms.Timer class.

When a new timer is created, it is disabled; that is, System.Windows.Forms.Timer.Enabled is set to false. To enable the timer, call the System.Windows.Forms.Timer.Start method or set System.Windows.Forms.Timer.Enabled to true.

d) Timer

Example Syntax:

e) ToString

[C#] public Timer(IContainer container);

[C++] public: Timer(IContainer* container);

[VB] Public Sub New(ByVal container As IContainer)

[JScript] public function Timer(container: IContainer);

Description

Initializes a new instance of the System.Windows.Forms.Timer class with the specified container.

When a new timer is created, it is disabled; that is, System.Windows.Forms.Timer.Enabled is set to false. To enable the timer, call the System.Windows.Forms.Timer.Start method or set System.Windows.Forms.Timer.Enabled to true. An System.ComponentModel.IContainer that represents the container for the timer.

f) Container g) DesignMode h) Enabled i) ToString

Description

Gets or sets whether the timer is running.

The timer is not subject to garbage collection when the value is true.

j) Events k) Interval l) ToString

Description

Gets or sets the time, in milliseconds, between timer ticks.

To get the number of seconds in the interval, divide this number by 1,000.

m) Site n) ToString

Description

Occurs when the specified timer interval has elapsed and the timer is enabled.

For more information about handling events, see.

o) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the resources (other than memory) used by the timer.

Call System.Windows.Forms.Timer.Dispose(System.Boolean) when you are finished using the timer. The System.Windows.Forms.Timer.Dispose(System.Boolean) method leaves the timer in an unusable state. After calling System.Windows.Forms.Timer.Dispose(System.Boolean), you must release all references to the timer so the memory it was occupying can be reclaimed by garbage collection.

p) OnTick

[C#] protected virtual void OnTick(EventArgs e);

[C++] protected: virtual void OnTick(EventArgs* e);

[VB] Overridable Protected Sub OnTick(ByVal e As Event Args)

[JScript] protected function OnTick(e: EventArgs);

Description

Raises the System.Windows.Forms.Timer.Tick event.

This method is called for each timer tick. It calls any methods that are added through System.Windows.Forms.Timer.Tick. If you are inheriting from System.Windows.Forms.Timer, you can override this method. An System.EventArgs that contains the event data. This is always System.EventArgs. Empty.

q) Start

[C#] public void Start( );

[C++] public: void Start( );

[VB] Public Sub Start( )

[JScript] public function Start( );

Description

Starts the timer.

You can also start the timer by setting the System.Windows. Forms.Timer.Enabled property to true.

r) Stop

[C#] public void Stop( );

[C++] public: void Stop( );

[VB] Public Sub Stop( )

[JScript] public function Stop( );

Description

Stops the timer.

You can also stop the timer by setting the System.Windows. Forms.Timer.Enabled property to false. A timer that is disabled is subject to garbage collection.

s) ToString

[C#] public override string ToString( );

[C++] public: String* ToString( );

[VB] Overrides Public Function ToString( ) As String

[JScript] public override function ToString( ): String;

Description returns us as a string.

ToolBar class (System.Windows.Forms)

a) ToString

Description

Represents a Windows toolbar.

System.Windows.Forms.ToolBar controls are used to display System.Windows.Forms.ToolBarButton controls that can appear as a standard button, a toggle-style button, or a drop-down style button. You can assign images to the buttons by instantiating an System.Windows.Forms.ImageList object, assigning it to the System.Windows.Forms.ToolBar.ImageList property of the toolbar, and assigning the image index value to the System.Windows.Forms.ToolBarButton. ImageIndex property of the button. You can then assign text to be displayed underneath or to the right of the image by setting the System.Windows.Forms.ToolBarButton.Text property of the System.Windows.Forms.ToolBarButton.

b) ToolBar

Example Syntax:

c) ToString

[C#] public ToolBar( );

[C++] public: ToolBar( );

[VB] Public Sub New( )

[JScript] public function ToolBar( );

Description

Initializes a new instance of the System.Windows.Forms. ToolBar class.

A newly instantiated toolbar control will be blank; add System.Windows.Forms.ToolBarButton controls by setting the System.Windows.Forms.ToolBar.Buttons property.

d) AccessibilityObject e) AccessibleDefaultActionDescription j) AccessibleDescription g) AccessibleName h) AccessibleRole i) AllowDrop j) Anchor k) Appearance l) ToString Description Gets or set the value that determines the appearance of a toolbar control and its buttons.

The System.Windows.Forms.ToolBar.Appearance property affects the appearance of the buttons assigned to the toolbar. When the appearance is set to ToolBarAppearance.Normal, the toolbar's buttons appear three-dimensional and raised. Set the System.Windows.Forms.ToolBar.Appearance property of the toolbar to ToolBarAppearance.Flat to give the toolbar's buttons a flat appearance. As the mouse pointer moves over the flat buttons, they appear raised and three-dimensional. Flat button separators appear as etched lines rather than spaces between the raised buttons. The flat style buttons will give your application a Web look.

m) AutoSize n) ToString

[C#] public bool AutoSize {get; set;}

[C++] public: _property bool get_AutoSize( ); public: _property void set_AutoSize(bool);

[VB] Public Property AutoSize As Boolean

[JScript] public function get AutoSize( ): Boolean; public function set AutoSize(Boolean);

Description

Gets or sets a value indicating whether the toolbar adjusts its size automatically, based on the size of the buttons and the dock style.

When System.Windows.Forms.ToolBar.AutoSize is set to true, the System.Windows.Forms.ToolBar control sizes itself to accommodate the toolbar buttons, based upon the button size and the System.Windows.Forms.DockStyle of the toolbar.

o) BackColor
p) ToString

[C#] public override Color BackColor {get; set;}

[C++] public: _property virtual Color get_BackColor( );public: _property virtual void set_BackColor(Color);

[VB] Overrides Public Property BackColor As Color

[JScript] public function get BackColor( ): Color; public function set BackColor(Color);

Description
q) BackgroundImage
r) ToString

[C#] public override Image BackgroundImage {get; set;}

[C++] public: _property virtual Image* get_BackgroundImage( ); public: _property virtual void set_BackgroundImage (Image*);

[VB] Overrides Public Property BackgroundImage As Image

[JScript] public function get BackgroundImage( ): Image; public function set BackgroundImage(Image);

Description
s) BindingContext
t) BorderStyle
u) ToString

Description

Gets or sets the border style of the toolbar control.

The System.Windows.Forms.ToolBar can take on a sunken, three-dimensional appearance when the System.Windows. Forms.BorderStyle property is set to BorderStyle.Fixed3D. To display a flat thin border around the toolbar control, set the System.Windows.Forms.BorderStyle property to Border-Style.FixedSingle.
v) Bottom
w) Bounds
x) Buttons
y) ToString Description Gets the collection of System.Windows.Forms.ToolBarButton controls assigned to the toolbar control.

The System.Windows.Forms.ToolBar.Buttons property is a zero-based indexed collection used to hold all the System. Windows.Forms.ToolBarButton controls assigned to the toolbar. Since the property is read-only, it can not be assigned a collection of toolbar buttons directly. Toolbar buttons may be added or removed by using the methods inherited from the System.Windows.Forms.ToolBar.ToolBarButtonCollection class. Use the System.Windows.Forms.ToolBar. ToolBar-ButtonCollection.Add(System. Windows.Forms. ToolBar-Button) method to add individual buttons and the System. Windows.Forms.ToolBar. ToolBarButtonCollection.Remove(System.Windows.Forms. ToolBarButton) method to delete a button. Call the System. Windows.Forms.ToolBar. ToolBarButtonCollection.Clear method to remove all the buttons from the collection.
z) ButtonSize
aa) ToString

[C#] public Size ButtonSize {get; set;}

[C++] public: _property Size get_ButtonSize( ); public: _property void set_ButtonSize(Size);

[VB] Public Property ButtonSize As Size

[JScript] public function get ButtonSize( ): Size; public function set ButtonSize(Size);

Description

Gets or sets the size of the buttons on the toolbar control.

If the System.Windows.Forms.ToolBar.ButtonSize is not set, it will be set to its default, or alternatively, a System.Drawing.Size object is computed to accommodate the largest System.Drawing.Image and text assigned to the System.Windows.Forms.ToolBarButton controls.
bb) CanFocus
cc) CanSelect
dd) Capture
ee) CausesValidation
ff) ClientRectangle
gg) ClientSize
hh) CompanyName
ii) Container
jj) ContainsFocus
kk) ContextMenu
ll) Controls
mm) Created
nn) CreateParams
oo) ToString Description Returns the parameters needed to create the handle. Inheriting classes can override this to provide extra functionality. They should not, however, forget to get base.CreateParams first to get the struct filled up with the basic info.
pp) Cursor
qq) DataBindings
rr) DefaultImeMode
SS) ToString Description Gets the default Input Method Editor(IME) mode supported by this control.

As implemented in the System.Windows.Forms.ToolBar class, this property always returns the System.Windows. Forms.ImeMode.Disable value.
tt) DefaultSize
uu) ToString

[C#] protected override Size DefaultSize {get;}

[C++] protected: _property virtual Size get_DefaultSize( );

[VB] Overrides Protected ReadOnly Property DefaultSize As Size

[JScript] protected function get DefaultSize( ): Size;

Description

Deriving classes can override this to configure a default size for their control. This is more efficient than setting the size in the control's constructor.
vv) DesignMode
ww) DisplayRectangle
xx) Disposing
yy) Divider
zz) ToString Description Gets or sets a value indicating whether the toolbar displays a divider.

Dividers are displayed to help distinguish the toolbar from adjacent controls, such as menus.

aaa) Dock bbb) ToString

[C#] public override DockStyle Dock {get; set;}

[C++] public: _property virtual DockStyle get_Dock( ); public: _property virtual void set_Dock(DockStyle);

[VB] Overrides Public Property Dock As DockStyle

[JScript] public function get Dock( ): DockStyle; public function set Dock(DockStyle);

Description

Sets the way in which this ToolBar is docked to its parent. We need to override this to ensure autoSizing works correctly Sets the way in which this ToolBar is docked to its parent. We need to override this to ensure autoSizing works correctly ccc) DropDownArrows ddd) ToString

[C#] public bool DropDownArrows {get; set;}

[C++] public: _property bool get_DropDownArrows( ); public: property void set_DropDownArrows(bool);

[VB] Public Property DropDownArrows As Boolean

[JScript] public function get DropDownArrows( ): Boolean; public function set DropDownArrows(Boolean);

Description

Gets or sets a value indicating whether drop-down buttons on a toolbar display down arrows.

When System.Windows.Forms.ToolBar.DropDownArrows is set to false, no down arrows will display on drop-down style toolbar buttons. When the user clicks the drop-down button on the toolbar, the menu will drop down for selection. When the drop-down arrow is displayed, the user must press the down arrow to display the menu.

eee) Enabled fff) Events ggg) Focused hhh) Font iii) FontHeight jjj) ForeColor kkk) ToString Description lll) Handle mmm) HasChildren nnn) Height ooo) ImageList ppp) ToString Description Gets or sets the collection of images available to the toolbar button controls.

If you instantiate an System.Windows.Forms.ImageList object and assign it to the System.Windows.Forms.ToolBar.ImageList property, you will be able to assign an image from the list to the System.Windows.Forms.ToolBarButton controls by assigning the image's index value to the System.Windows.Forms.ToolBarButton.ImageIndex property of the toolbar button.

qqq) ImageSize rrr) ToString

[C#] public Size ImageSize {get;}

[C++] public: _property Size get_ImageSize( );

[VB] Public ReadOnly Property ImageSize As Size

[JScript] public function get ImageSize( ): Size;

Description

Gets the size of the images in the image list assigned to the toolbar.

sss) ImeMode ttt) ToString

[C#] public new ImeMode ImeMode {get; set;}

[C++] public: _property ImeMode get_ImeMode( ); public: _property void set_ImeMode(ImeMode);

[VB] Public Property ImeMode As ImeMode

[JScript] public function get ImeMode( ): ImeMode; public function set ImeMode(ImeMode);

Description

Gets or sets the Input Method Editor(IME) mode supported by this control.

uuu) InvokeRequired vvv) IsAccessible www) IsDisposed xxx) IsHandleCreated yyy) Left zzz) Location aaaa) Name bbbb) Parent cccc) ProductName dddd) ProductVersion eeee) RecreatingHandle ffff) Region gggg) RenderRightToLeft hhhh) ResizeRedraw iiii) Right jjjj) RightToLeft kkkk) ToString Description llll) ShowFocusCues mmmm) ShowKeyboardCues nnnn) ShowToolTips oooo) ToString Description Gets or sets a value indicating whether the toolbar displays a tool tip for each button.

To set the text displayed by the tool tip, set the System.Windows.Forms.ToolBarButton.ToolTipText property of each System.Windows.Forms.ToolBarButton on the System.Windows.Forms.ToolBar. To cause the tool tip to display as the user moves the mouse pointer over the toolbar button, set the System.Windows.Forms.ToolBar.ShowToolTips property to true.

pppp) Site qqqq) Size rrrr) TabIndex ssss) TabStop tttt) ToString

Description true if XXXX; otherwise, false. The default is XXX.

uuuu) Tag vvvv) Text wwww) ToString

Description xxxx) TextAlign yyyy) ToString

[C#] public ToolBarTextAlign TextAlign {get; set;}

[C++] public: _property ToolBarTextAlign get_TextAlign( ); public: _property void set_TextAlign(ToolBarTextAlign);

[VB] Public Property TextAlign As ToolBarTextAlign

[JScript] public function get TextAlign( ): ToolBarTextAlign; public function set TextAlign(ToolBarTextAlign);

Description

Gets or sets the alignment of text in relation to each image displayed on the toolbar button controls.

The System.Windows.Forms.ToolBarButton.Text can be aligned underneath or to the right of the image displayed on the System.Windows.Forms.ToolBarButton controls.

zzzz) Top aaaaa) TopLevelControl bbbbb) Visible ccccc) Width ddddd) WindowTarget eeeee) Wrappable fffff) ToString Description Gets or sets a value indicating whether the toolbar buttons wrap to the next line if the toolbar becomes too small to display all the buttons on the same line.

Toolbar buttons can be divided into logical groups by using separators. A separator is a toolbar button with the System.Windows.Forms.ToolBarButton.Style property set to ToolBarButtonStyle.Separator. If the System.Windows.Forms.ToolBar.Wrappable property is set to true and the toolbar becomes too small to display all the buttons on the same line, the toolbar will be broken into additional lines, with the breaks occurring at the separators. This ensures that button groups stay together. Toolbar buttons that are not in a group can be separated when the toolbar wraps. The toolbar may become too small to display all of its buttons on the same line if its parent System.Windows.Forms.Form is resized.

ggggg) ToString

Description

Occurs when a System.Windows.Forms.ToolBarButton on the System.Windows.Forms.ToolBar is clicked.

For more information about handling events, see.

hhhhh) ToString

[C#] public event ToolBarButtonClickEventHandler ButtonDropDown;

[C++] public: _event ToolBarButtonClickEventHandler* ButtonDropDown;

[VB] Public Event ButtonDropDown As ToolBarButtonClickEventHandler

Description

Occurs when a drop-down style System.Windows.Forms.ToolBarButton or its down arrow is clicked.

For more information about handling events, see.

iiiii) CreateHandle

[C#] protected override void CreateHandle( );

[C++] protected: void CreateHandle( );

[VB] Overrides Protected Sub CreateHandle( )

[JScript] protected override function CreateHandle( );

Description jjjjj) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing Boolean);

Description kkkkk) OnButtonClick

[C#] protected virtual void OnButtonClick(ToolBarButtonClickEventArgs e);

[C++] protected: virtual void OnButtonClick(ToolBarButtonClickEventArgs* e);

[VB] Overridable Protected Sub OnButtonClick(ByVal e As ToolBarButtonClickEventArgs)

[JScript] protected function OnButtonClick(e: ToolBarButtonClickEventArgs);

Description

Raises the System.Windows.Forms.ToolBar.ButtonClick event.

Raising an event invokes the event handler through a delegate. For more information, see. A System.Windows.Forms.ToolBarButtonClickEventArgs that contains the event data.

lllll) OnButtonDropDown

[C#] protected virtual void OnButtonDropDown(ToolBarButtonClickEventArgs e);

[C++] protected: virtual void OnButtonDropDown(ToolBarButtonClickEventArgs* e);

[VB] Overridable Protected Sub OnButtonDropDown(ByVal e As ToolBarButtonClickEventArgs)

[JScript] protected function OnButtonDropDown(e: ToolBarButtonClickEventArgs);

Description

Raises the System.Windows.Forms.ToolBar.Button DropDown event.

Raising an event invokes the event handler through a delegate. For more information, see. A System.Windows.Forms.ToolBarButtonClickEventArgs that contains the event data.

mmmmm) OnFontChanged

[C#] protected override void OnFontChanged(EventArgs e);

[C++] protected: void OnFontChanged(EventArgs* e);

[VB] Overrides Protected Sub OnFontChanged(ByVal e As EventArgs)

[JScript] protected override function OnFontChanged(e: EventArgs);

Description

Overridden to ensure that the buttons and the control resize properly whenever the font changes. A System.Windows.Forms.ToolBarButtonClickEventArgs that contains the event data.

nnnnn) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

Overridden from the control class so we can add all the buttons and do whatever work needs to be done. Don't forget to call base.OnHandleCreated. An System.EventArgs that contains the event data.

ooooo) OnResize

[C#] protected override void OnResize(EventArgs e);

[C++] protected: void OnResize(EventArgs* e);

[VB] Overrides Protected Sub OnResize(ByVal e As Event Args)

[JScript] protected override function OnResize(e: Event Args);

Description

The control is being resized. Make sure the width/height are correct. An System.EventArgs that contains the event data.

ppppp) SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As Bounds Specified)

[JScript] protected override function SetBoundsCore(x: int, y: int, width: int, height: int, specified: BoundsSpecified);

Description

Overrides Control.setBoundsCore to enforce autoSize.

qqqqq) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

rrrrr) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

ToolBarAppearance enumeration (System.Windows.Forms)

a) WndProc

Description

Specifies the type of toolbar to display.

This enumeration is used by members such as System.Windows.Forms.ToolBar.Appearance.

b) WndProc

[C#] public const ToolBarAppearance Flat;

[C++] public: const ToolBarAppearance Flat;

[VB] Public Const Flat As ToolBarAppearance

[JScript] public var Flat: ToolBarAppearance;

Description

The toolbar and buttons appear flat, but the buttons change to three-dimensional as the mouse pointer moves over them.

c) WndProc

[C#] public const ToolBarAppearance Normal;

[C++] public: const ToolBarAppearance Normal;

[VB] Public Const Normal As ToolBarAppearance

[JScript] public var Normal: ToolBarAppearance;

Description

The toolbar and buttons appear as standard three-dimensional controls.

ToolBarButton class (System.Windows.Forms)

a) ToString

Description

Represents a Windows toolbar button.

System.Windows.Forms.ToolBarButton controls are parented by System.Windows.Forms.ToolBar controls. Common properties to set once the toolbar button has been instantiated are System.Windows.Forms.ToolBarButton.Text and System.Windows.Forms.ToolBarButton.ImageIndex. The text to be displayed underneath or to the right of the image can be set by setting the System.Windows.Forms.ToolBarButton.Text property of the button. You can assign images to the buttons by instantiating an System.Windows.Forms.ImageList object, assigning it to the System.Windows.Forms.ToolBar.ImageList property of the toolbar, and then assigning the image index value to the System.Windows.Forms.ToolBarButton.ImageIndex property of the button.

b) ToolBarButton

Example Syntax:

c) ToString

[C#] public ToolBarButton( );

[C++] public: ToolBarButton( );

[VB] Public Sub New( )

[JScript] public function ToolBarButton( ); Initializes a new instance of the System.Windows.Forms.ToolBarButton class.

Description

Initializes a new instance of the System.Windows.Forms.ToolBarButton class.

A newly instantiated System.Windows.Forms.ToolBarButton has no default System.Windows.Forms.ToolBarButton.Text or System.Drawing.Image assigned to it. The button's default style is ToolBarButtonStyle.PushButton.

d) ToolBarButton

Example Syntax:

e) ToString

[C#] public ToolBarButton(string text);

[C++] public: ToolBarButton(String* text);

[VB] Public Sub New(ByVal text As String)

[JScript] public function ToolBarButton(text: String);

Description

Initializes a new instance of the System.Windows.Forms.ToolBarButton class and displays the assigned text on the button.

The newly instantiated System.Windows.Forms.ToolBarButton has no System.Drawing.Image assigned to it. The button's default style is System.Windows.Forms.ToolBarButtonStyle.PushButton. The text parameter is assigned to the System.Windows.Forms.ToolBarButton.Text property and is displayed on the new toolbar button control. The text to display on the new System.Windows.Forms.ToolBarButton.

f) Container g) DesignMode h) DropDownMenu i) ToString

Description

Gets or sets the menu to be displayed in the drop-down toolbar button.

You can specify a System.Windows.Forms.MenuItem or context menu to be displayed when the drop-down button is pressed. This property is not used unless the System.Windows.Forms.ToolBarButtonStyle is set to DropDownButton.

j) Enabled k) ToString

[C#] public bool Enabled {get; set;}

[C++] public: _property bool get_Enabled( ); public: _property void set_Enabled(bool);

[VB] Public Property Enabled As Boolean

[JScript] public function get Enabled( ): Boolean; public function set Enabled(Boolean);

Description

Gets or sets a value indicating whether the button is enabled.

When the System.Windows.Forms.ToolBarButton.Enabled property is set to false, the toolbar button cannot be pressed, and the button's appearance changes. The System.Drawing.Image and System.Windows.Forms.ToolBarButton.Text assigned to the button will appear grayed out. If the image or text has multiple colors, they will be displayed in a monochromatic gray.

l) Events m) ImageIndex n) ToString

Description

Gets or sets the index value of the image assigned to the button.

The System.Windows.Forms.ToolBarButton.ImageIndex value references the indexed value of the images in an System.Windows.Forms.ImageList assigned to the parent System.Windows.Forms.ToolBar control.

o) Parent p) ToString

[C#] public ToolBar Parent {get;}

[C++] public: _property ToolBar* get_Parent( );

[VB] Public ReadOnly Property Parent As ToolBar

[JScript] public function get Parent( ): ToolBar;

Description

Gets the toolbar control that the toolbar button is assigned to.

q) PartialPush r) ToString

[C#] public bool PartialPush {get; set;}

[C++] public: _property bool get_PartialPush( ); public: _property void set_PartialPush(bool);

[VB] Public Property PartialPush As Boolean

[JScript] public function get PartialPush( ): Boolean; public function set PartialPush(Boolean);

Description

Gets or sets a value indicating whether a toggle-style toolbar button is partially pushed.

When System.Windows.Forms.ToolBarButton.PartialPush is set to true, the toolbar button appears to have its face grayed. This appearance is different from the dimmed appearance when the System.Windows.Forms.ToolBarButton.Enabled property is set to false since the partial-push appearance gives a haze to the entire button face. This property has no effect unless the System.Windows.Forms.ToolBarButtonStyle is set to ToggleButton.

s) Pushed t) ToString

[C#] public bool Pushed {get; set;}

[C++] public: _property bool get Pushed( ); public: _property void set_Pushed(bool);

[VB] Public Property Pushed As Boolean

[JScript] public function get Pushed( ): Boolean; public function set Pushed(Boolean);

Description

Gets or sets a value indicating whether a toggle-style toolbar button is currently in the pushed state.

When System.Windows.Forms.ToolBarButton.Pushed is set to true, the toolbar button appears sunken or inset relative to the other buttons. This property has no effect unless the System.Windows.Forms.ToolBarButtonStyle is set to ToggleButton.

u) Rectangle v) ToString

[C#] public Rectangle Rectangle {get;}

[C++] public: _property Rectangle get_Rectangle( );

[VB] Public ReadOnly Property Rectangle As Rectangle

[JScript] public function get Rectangle( ): Rectangle;

Description

Gets the bounding rectangle for a toolbar button.

If the System.Windows.Forms.ToolBar and the current button are both System.Windows.Forms.ToolBarButton.Visible, then this property retrieves the bounding rectangle the button is currently contained in.

w) Site x) Style y) ToString

Description

Gets or sets the style of the toolbar button.

If the button System.Windows.Forms.ToolBarButton.Style is set to System.Windows.Forms.ToolBarButtonStyle. DropDownButton you can specify a System.Windows.Forms. MenuItem to be displayed when the drop-down button is pressed. If the style is set to ToolBarButtonStyle.Separator, the toolbar button appears as a button separator and not as a button. The ToolBarButtonStyle.ToggleButton style causes the toolbar button to act like a toggle button; it can be in an on or off state.

z) Tag aa) ToString

[C#] public object Tag {get; set;}

[C++] public: _property Object* get_Tag( ); public: _property void set_Tag(Object*);

[VB] Public Property Tag As Object

[JScript] public function get Tag( ): Object; public function set Tag(Object);

Description

Gets or sets the object that contains data about the toolbar button.

Retrieves or assigns the data currently associated with the toolbar button. Any System.Object derived type may be assigned to this property. If this property is being set through the Windows Forms designer, only text may be assigned.

bb) Text cc) ToString

[C#] public string Text {get; set;}

[C++] public: _property String* get_Text( ); public: _property void set Text(String*);

[VB] Public Property Text As String

[JScript] public function get Text( ): String; public function set Text(String);

Description

Gets or sets the text displayed on the toolbar button.

The default the Text property value is an empty string (" ") unless you created the control with the System.Windows.Forms.ToolBar.#ctor constructor that accepts the text string as a parameter. The orientation of the text on the toolbar button is determined by the System.Windows.Forms.ToolBar.TextAlign property of the button's parent System.Windows.Forms.ToolBar, which can be set to one of the System.Windows.Forms.ToolBarTextAlign enumeration values. The orientation is in relation to the image assigned to the button. If no image is assigned to the button, there will be space left for one on the surface of the toolbar button.

dd) ToolTipText ee) ToString

[C#] public string ToolTipText {get; set;}

[C++] public: _property String* get_ToolTipText( ); public: property void set_ToolTipText(String*);

[VB] Public Property ToolTipText As String

[JScript] public function get ToolTipText( ): String; public function set ToolTipText(String);

Description

Gets or sets the text that appears as a tool tip for a control.

To enable the display of the tool tip text when the mouse pointer is moved over the button, set the System.Windows. Forms.ToolBar.ShowToolTips property of the button's parent System.Windows.Forms.ToolBar to true.

ff) Visible gg) ToString

[C#] public bool Visible {get; set;}

[C++] public: _property bool get_Visible( ); public: _property void set_Visible(bool);

[VB] Public Property Visible As Boolean

[JScript] public function get Visible( ): Boolean; public function set Visible(Boolean);

Description

Gets or sets a value indicating whether the toolbar button is visible.

If the toolbar button is not visible, it will not be displayed on the toolbar, and therefore cannot receive user input.

hh) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description ii) ToString

[C#] public override string ToString( );

[C++] public: String* ToString( );

[VB] Overrides Public Function ToString( ) As String

[JScript] public override function ToString( ): String;

Description

ToolBarButtonClickEventArgs class (System.Windows. Forms)

a) ToString

Description

Provides data for the System.Windows.Forms.ToolBar.ButtonClick event.

The event occurs whenever the user clicks on a button on a System.Windows.Forms.ToolBar control. The System.Windows.Forms.ToolBarButtonClickEventArgs.button property contains the System.Windows.Forms.ToolBarButton object with the information about the button that was clicked.

b) ToolBarButtonClickEventArgs

Example Syntax:

c) ToString

[C#] public ToolBarButtonClickEventArgs(ToolBarButton button);

[C++] public: ToolBarButtonClickEventArgs(ToolBarButton* button);

[VB] Public Sub New(ByVal button As ToolBarButton)

[JScript] public function ToolBarButtonClickEventArgs (button: ToolBarButton);

Description

Initializes a new instance of the System.Windows.Forms. ToolBarButtonClickEventArgs class.

The System.Windows.Forms.ToolBarButtonClick Event Args.button property is set equal to the button parameter. The System.Windows.Forms.ToolBarButton that was clicked.

d) Button e) ToString

[C#] public ToolBarButton Button {get; set;}

[C++] public: _property ToolBarButton* get_Button( ); public: _property void set_Button(ToolBarButton*);

[VB] Public Property Button As ToolBarButton

[JScript] public function get Button( ): ToolBarButton; public function set Button(ToolBarButton);

Description

Gets or sets the System.Windows.Forms.ToolBarButton that was clicked.

The System.Windows.Forms.ToolBarButtonClick Event Args.button property is initially set equal to the button parameter of the System.Windows. Forms. Tool BarButtonClickEventArgs.#ctor constructor.

ToolBarButtonClickEventHandler delegate (System.Windows.Forms)

a) ToString

Description

Represents the method that will handle the System.Windows. Forms.ToolBar.ButtonClick event of a System.Windows. Forms.ToolBar. The source of the event. A System.Windows. Forms.ToolBarButtonClickEventArgs that contains the event data.

When you create a System.Windows.Forms.ToolBarButtonClickEventHandler delegate, you identify the method that will handle the event. To associate the event with your event handler, add an instance of the delegate to the event. The event handler is called whenever the event occurs, unless you remove the delegate. For more information about handling events with delegates, see.

ToolBar.ToolBarButtonCollection class (System.Windows.Forms)

a) ToString

Description

Encapsulates a collection of System.Windows.Forms.ToolBarButton controls for use by the System.Windows.Forms. ToolBar class.

The System.Windows.Forms.ToolBar.ToolBarButton Collection is a zero-based indexed collection used by the System.Windows.Forms.ToolBar class to hold all the System. Windows.Forms.ToolBarButton controls assigned to the toolbar. Use the System.Windows.Forms.ToolBar. ToolBarButtonCollection.Add(System. Windows.Forms. ToolBarButton) method to add individual buttons and the System. Windows.Forms.ToolBar.ToolBarButtonCollection.Remove (System.Windows.Forms.ToolBarButton) method to delete them. Call the System.Windows.Forms.ToolBar. ToolBarButtonCollection.Clear method to remove all the buttons from the collection.

b) ToolBar.ToolBarButtonCollection

Example Syntax:

c) ToString

[C#] public ToolBar.ToolBarButtonCollection(ToolBar owner);

[C++] public: ToolBarButtonCollection(ToolBar* owner);

[VB] Public Sub New(ByVal owner As ToolBar)

[JScript] public function ToolBar.ToolBarButtonCollection (owner: ToolBar);

Description

Initializes a new instance of the System.Windows.Forms. ToolBar.ToolBarButtonCollection class and assigns it to the specified toolbar.

You do not need to instantiate the System.Windows.Forms. ToolBar.ToolBarButtonCollection object and explicitly call its constructor. When you assign the System.Windows. Forms. ToolBar.Buttons property of a System.Windows. Forms. ToolBar object, a System.Windows.Forms.ToolBar. ToolBarButtonCollection object will be created. You can then gain access to its properties and methods, and assign System. Windows.Forms.ToolBarButton controls to the collection. The System.Windows.Forms.ToolBar that parents the collection of System.Windows.Forms.ToolBarButton controls.

d) Count e) ToString

[C#] public int Count {get;}

[C++] public: _property int get_Count( );

[VB] Public ReadOnly Property Count As Integer

[JScript] public function get Count( ): int;

Description

Gets the number of buttons in the toolbar button collection.

The System.Windows.Forms.ToolBar.ToolBarButton Collection.Count property holds the actual count of the System. Windows.Forms.ToolBarButton controls assigned to the collection. It is common to use the System.Windows.Forms. ToolBar.ToolBarButtonCollection.Count property value as the upper bounds of a loop to iterate through a collection. Keep in mind that the index value of a collection is a zero-based index, so you must subtract one from the looping variable. If you do not account for this, you is will exceed the upper bounds of the collection and throw an exception.

f) IsReadOnly g) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the collection is read-only.

h) Item i) ToString

[C#] public virtual ToolBarButton this[int index] {get; set;}

[C++] public: _property virtual ToolBarButton* get_Item(int index); public: _property virtual void set Item(int index, ToolBarButton*);

[VB] Overridable Public Default Property Item(ByVal index As Integer) As ToolBarButton

[JScript] returnValue=ToolBarButtonCollectionObject.Item (index);ToolBarButtonCollectionObject.Item (index)=returnValue;

Description

Gets or sets the toolbar button at the specified indexed location in the toolbar button collection.

To assign System.Windows.Forms.ToolBarButton controls to a specific location, or to retrieve them from the System.Windows.Forms.ToolBar.ToolBarButtonCollection, you can reference the collection object with a specific index value. The index value of the System.Windows.Forms.ToolBar.ToolBarButtonCollection is a zero-based index. The indexed location of the System.Windows.Forms.ToolBarButton in the collection.

j) Add

[C#] public int Add(string text);

[C++] public: int Add(String* text);

[VB] Public Function Add(ByVal text As String) As Integer

[JScript] public function Add(text: String): int;

Description

Adds a new toolbar button to the end of the toolbar button collection with the specified System.Windows.Forms.ToolBarButton.Text property value.

Return Value: The zero-based index value of the System.Windows.Forms.ToolBarButton added to the collection.

You can also add new System.Windows.Forms.ToolBarButton objects to the collection by using the System.Windows.Forms.ToolBar.ToolBarButtonCollection.AddRange(System.Windows.Forms.ToolBarButton[ ]) or System.Windows.Forms.ToolBar.ToolBarButtonCollection.Insert(System.Int32, System.Windows.Forms.ToolBarButton) methods, or the other version of the System.Windows.Forms.ToolBar.ToolBarButtonCollection.Add(System. Windows.Forms.ToolBarButton) method. The text to display on the new System.Windows.Forms.ToolBarButton.

k) Add

[C#] public int Add(ToolBarButton button);

[C++] public: int Add(ToolBarButton* button);

[VB] Public Function Add(ByVal button As ToolBarButton) As Integer

[JScript] public function Add(button: ToolBarButton): int; Adds a new toolbar button to the end of the toolbar button collection.

Description

Adds a the specified toolbar button to the end of the toolbar button collection.

Return Value: The zero-based index value of the System.Windows.Forms.ToolBarButton added to the collection.

You can also add new System.Windows.Forms.ToolBarButton objects to the collection by using the System.Windows.Forms.ToolBar.ToolBarButtonCollection.AddRange(System.Windows.Forms.ToolBarButton[ ]) or System.Windows.Forms.ToolBar.ToolBarButtonCollection.Insert(System.Int32, System.Windows.Forms.ToolBarButton) methods, or the other version of the System.Windows.Forms.ToolBar.ToolBarButtonCollection.Add(System. Windows.Forms.ToolBarButton) method. The System.Windows.Forms.ToolBarButton to be added after all existing buttons.

l) AddRange

[C#] public void AddRange(ToolBarButton[ ] buttons);

[C++] public: void AddRange(ToolBarButton* buttons[ ]);

[VB] Public Sub AddRange(ByVal buttons( ) As ToolBarButton)

[JScript] public function AddRange(buttons: ToolBar Button[ ]);

Description

Adds a collection of toolbar buttons to this toolbar button collection.

The System.Windows.Forms.ToolBarButton objects contained in the nodes array are appended to the end of the collection. The collection of System.Windows.Forms.ToolBarButton controls to add to this System.Windows.Forms.ToolBar.ToolBarButtonCollection contained in an array.

m) Clear

[C#] public void Clear( );

[C++] public: _sealed void Clear( );

[VB] NotOverridable Public Sub Clear( )

[JScript] public function Clear( );

Description

Removes all buttons from the toolbar button collection.

The System.Windows.Forms.ToolBar.ToolBarButton Collection.Clear method iterates through the collection and removes all toolbar buttons assigned to the System.Windows.Forms.ToolBar.ToolBarButtonCollection.

n) Contains

[C#] public bool Contains(ToolBarButton button);

[C++] public: bool Contains(ToolBarButton* button);

[VB] Public Function Contains(ByVal button As ToolBarButton) As Boolean

[JScript] public function Contains(button: ToolBarButton): Boolean;

Description

Determines if the specified toolbar button is a member of the collection.

Return Value: true if the System.Windows.Forms.ToolBarButton is a member of the collection; otherwise, false.

This method enables you to determine whether a System.Windows.Forms.ToolBarButton is member of the collection before attempting to perform operations on the System.Windows.Forms.ToolBarButton. You can use this method to confirm that a System.Windows.Forms.ToolBarButton has been added to or is still a member of the collection. The System.Windows.Forms.ToolBarButton to locate in the collection.

o) GetEnumerator

[C#] public IEnumerator GetEnumerator( );

[C++] public: _sealed IEnumerator* GetEnumerator( );

[VB] NotOverridable Public Function GetEnumerator( ) As IEnumerator

[JScript] public function GetEnumerator( ): IEnumerator;

Description

Returns an enumerator that can be used to iterate through the toolbar button collection.

Return Value: An System.Collections.IEnumerator object that represents the tree node collection.

p) IndexOf

[C#] public int IndexOf(ToolBarButton button);

[C++] public: int IndexOf(ToolBarButton* button);

[VB] Public Function IndexOf(ByVal button As ToolBarButton) As Integer

[JScript] public function IndexOf(button: ToolBarButton): int;

Description

Retrieves the index of the specified toolbar button in the collection.

Return Value: The zero-based index of the item found in the collection; otherwise, -1.

This method gives you easy access to the index value of the System.Windows.Forms.ToolBarButton in the collection. The index value allows you to easily determine which System.Windows.Forms.ToolBarButton was clicked on the System.Windows.Forms.ToolBar. The System.Windows.Forms.ToolBarButton clicked can be determined by evaluating the System.Windows.Forms.ToolBar. ToolBarButtonCollection.IndexOf(System.Windows.Forms. ToolBarButton) value of the System.Windows.Forms.ToolBarButtonClickEventArgs.Button property. The System.Windows.Forms.ToolBarButton to locate in the collection.

q) Insert

[C#] public void Insert(int index, ToolBarButton button);

[C++] public: void Insert(int index, ToolBarButton* button);

[VB] Public Sub Insert(ByVal index As Integer, ByVal button As ToolBarButton)

[JScript] public function Insert(index: int, button: ToolBarButton);

Description

Inserts an existing toolbar button in the toolbar button collection at the specified location.

You can also add new System.Windows.Forms.ToolBarButton objects to the collection by using the System.Windows.Forms.ToolBar.ToolBarButtonCollection.Add(System.Windows.Forms.ToolBarButton) or System.Windows.Forms. ToolBar.ToolBarButtonCollection.AddRange(System. Windows.Forms.ToolBarButton[ ]) methods. The indexed location within the collection to insert the toolbar button. The System.Windows.Forms.ToolBarButton to insert.

r) Remove

[C#] public void Remove(ToolBarButton button);

[C++] public: void Remove(ToolBarButton* button);

[VB] Public Sub Remove(ByVal button As ToolBarButton)

[JScript] public function Remove(button: ToolBarButton);

Description

Removes a given button from the toolbar button collection.

To remove toolbar buttons from the collection, use the System.Windows.Forms.ToolBar.ToolBarButtonCollection. RemoveAt(System.Int32), or System. Windows.Forms.ToolBar.ToolBarButtonCollection.Clear methods. The System.Windows.Forms.ToolBarButton to remove from the collection.

s) RemoveAt

[C#] public void RemoveAt(int index);

[C++] public: _sealed void RemoveAt(int index);

[VB] NotOverridable Public Sub RemoveAt(ByVal index As Integer)

[JScript] public function RemoveAt(index: int);

Description

Removes a given button from the toolbar button collection.

The System.Windows.Forms.ToolBar.ToolBarButton Collection.Remove(System.Windows.Forms.ToolBarButton) method removes the System.Windows.Forms.ToolBarButton at the specified location in the System.Windows.Forms. ToolBar.ToolBarButtonCollection. If you wish to remove all System.Windows.Forms.ToolBarButton controls from the collection, use the System.Windows.Forms.ToolBar. ToolBarButtonCollection.Clear method. The indexed location of the System.Windows.Forms.ToolBarButton in the collection.

t) ICollection.CopyTo

[C#] void ICollection.CopyTo(Array dest, int index);

[C++] void ICollection::CopyTo(Array* dest, int index);

[VB] Sub CopyTo(ByVal dest As Array, ByVal index As Integer) Implements ICollection.CopyTo

[JScript] function ICollection.CopyTo(dest: Array, index: int);

u) IList.Add

[C#] int IList.Add(object button);

[C++] int IList::Add(Object* button);

[VB] Function Add(ByVal button As Object) As Integer Implements IList.Add

[JScript] function IList.Add(button: Object): int;

v) IList.Contains

[C#] bool IList.Contains(object button);

[C++] bool IList::Contains(Object* button);

[VB] Function Contains(ByVal button As Object) As Boolean Implements IList.Contains

[JScript] function IList.Contains(button Object): Boolean;

w) IList.IndexOf

[C#] int IList.IndexOf(object button);

[C++] int IList::IndexOf(Object* button);

[VB] Function IndexOf(ByVal button As Object) As Integer Implements IList.IndexOf

[JScript] function IList.IndexOf(button: Object): int;

x) IList.Insert

[C#] void IList.Insert(int index, object button);

[C++] void IList::Insert(int index, Object* button);

[VB] Sub Insert(ByVal index As Integer, ByVal button As Object) Implements IList.Insert

[JScript] function IList.Insert(index: int, button: Object);

y) IList.Remove

[C#] void IList.Remove(object button);

[C++] void IList::Remove(Object* button);

[VB] Sub Remove(ByVal button As Object) Implements IList.Remove

[JScript] function IList.Remove(button: Object);

ToolBarButtonStyle enumeration (System.Windows.Forms)

a) ToString

Description

Specifies the button style within a toolbar.

This enumeration is used by members such as System.Windows.Forms.ToolBarButton.Style.

b) ToString

[C#] public const ToolBarButtonStyle DropDownButton;

[C++] public: const ToolBarButtonStyle DropDownButton;

[VB] Public Const DropDownButton As ToolBarButtonStyle

[JScript] public var DropDownButton: ToolBarButtonStyle;

Description

A drop-down control that displays a menu or other window when clicked.

c) ToString

[C#] public const ToolBarButtonStyle PushButton;

[C++] public: const ToolBarButtonStyle PushButton;

[VB] Public Const PushButton As ToolBarButtonStyle

[JScript] public var PushButton: ToolBarButtonStyle;

Description

A standard, three-dimensional button.

d) ToString

[C#] public const ToolBarButtonStyle Separator;

[C++] public: const ToolBarButtonStyle Separator;

[VB] Public Const Separator As ToolBarButtonStyle

[JScript] public var Separator: ToolBarButtonStyle;

Description

A space or line between toolbar buttons. The appearance depends on the value of the System.Windows.Forms.ToolBar.Appearance property.

e) ToString

[C#] public const ToolBarButtonStyle ToggleButton;

[C++] public: const ToolBarButtonStyle ToggleButton;

[VB] Public Const ToggleButton As ToolBarButtonStyle

[JScript] public var ToggleButton: ToolBarButtonStyle;

Description

A toggle button that appears sunken when clicked and retains the sunken appearance until clicked again.

ToolBarTextAlign enumeration (System.Windows.Forms)

a) ToString

Description

Specifies the alignment of text on the toolbar button control.

This enumeration is used by members such as System.Windows.Forms.ToolBar.TextAlign.

b) ToString

[C#] public const ToolBarTextAlign Right;

[C++] public: const ToolBarTextAlign Right;

[VB] Public Const Right As ToolBarTextAlign

[JScript] public var Right: ToolBarTextAlign;

Description

The text is aligned to the right of the toolbar button image.

c) ToString

[C#] public const ToolBarTextAlign Underneath;

[C++] public: const ToolBarTextAlign Underneath;

[VB] Public Const Underneath As ToolBarTextAlign

[JScript] public var Underneath: ToolBarTextAlign;

Description

The text is aligned underneath the toolbar button image.

ToolTip class (System.Windows.Forms)

a) ToString

System.Windows.Forms.ToolTipSystem.Windows.Forms.Tool TipSystem.Windows.Forms.TextBoxSystem.Windows.Forms.ToolTipSystem.Windows.Forms.ToolTip System.Windows.Forms.PictureBox b) ToolTip Example Syntax:

c) ToString

Description

Initializes a new instance of the System.Windows.Forms.ToolTip class without a specified container.

This constructor associates the System.Windows.Forms.ToolTip class with the container that is creating the instance of the control.

d) ToolTip

Example Syntax:

e) ToString

[C#] public ToolTip(IContainer cont);

[C++] public: ToolTip(IContainer* cont);

[VB] Public Sub New(ByVal cont As IContainer)

[JScript] public function ToolTip(cont: IContainer); Initializes a new instance of the System.Windows.Forms.ToolTip class.

Description

Initializes a new instance of the System.Windows.Forms. ToolTip class with a specified container.

This constructor enables you to associate a System.Windows. Forms.ToolTip with any container. An object that implements the System.ComponentModel.IContainer interface that represents the container of the System.Windows.Forms. ToolTip.

f) Active g) ToString

[C#] public bool Active {get; set;}

[C++] public: _property bool get Active( ); public: _property void set Active(bool);

[VB] Public Property Active As Boolean

[JScript] public function get Active( ): Boolean; public function set Active(Boolean);

Description

Gets or sets a value indicating whether the System.Windows. Forms.ToolTip is currently active.

This property allows you to enable or disable the display of ToolTip text for all controls that have text specified in this particular System.Windows.Forms.ToolTip. More than one System.Windows.Forms.ToolTip can be created and assigned to a form; setting the System.Windows.Forms.ToolTip.Active property to false only affects the specified System.Windows.Forms.ToolTip. You can allow users to set the value of this property in a form that provides application options to provide the ability for the user to enable or disable the display of ToolTips in your application.

h) AutomaticDelay i) ToString

[C#] public int AutomaticDelay {get; set;}

[C++] public: _property int get_AutomaticDelay( ); public: _property void set_AutomaticDelay(int);

[VB] Public Property AutomaticDelay As Integer

[JScript] public function get AutomaticDelay( ): int; public function set AutomaticDelay(int);

Description

Gets or sets the automatic delay for the System.Windows. Forms.ToolTip.

The System.Windows.Forms.ToolTip.AutomaticDelay property enables you to set a single delay value which is then used to set the values of the System.Windows.Forms.ToolTip. AutoPopDelay, System.Windows.Forms.ToolTip.Initial Delay, and System.Windows.Forms.ToolTip.ReshowDelay properties. Each time the System.Windows.Forms.ToolTip. AutomaticDelay property is set, the following values are set by default.

j) AutoPopDelay k) ToString

[C#] public int AutoPopDelay {get; set;}

[C++] public: _property int get_AutoPopDelay( ); public: _property void set_AutoPopDelay(int);

[VB] Public Property AutoPopDelay As Integer

[JScript] public function get AutoPopDelay( ): int; public function set AutoPopDelay(int);

Description

Gets or sets the period of time the System.Windows.Forms. ToolTip remains visible if the mouse pointer is stationary within a control with specified ToolTip text.

This property enables you to shorten or lengthen the time that the System.Windows.Forms.ToolTip window is displayed when the mouse pointer is over a control. For example, if you display extensive help in a ToolTip window, you can increase the value of this property to ensure that the user has sufficient time to read the text.

l) Container m) DesignMode n) Events o) InitialDelay p) ToString

Description

Gets or sets the time that passes before the System.Windows. Forms.ToolTip appears.

This property enables you to shorten or lengthen the time that the System.Windows.Forms.ToolTip waits before displaying a ToolTip window. If the value of the System.Windows. Forms. ToolTip.Initial Delay property is set to a value that is too long in duration, the user of your application may not know that your application provides ToolTip help. You can use this property to ensure that the user has ToolTips displayed quickly by shortening the time specified.

q) ReshowDelay r) ToString

[C#] public int ReshowDelay {get; set;}

[C++] public: _property int get_ReshowDelay( ); public: _property void set_ReshowDelay(int);

[VB] Public Property ReshowDelay As Integer

[JScript] public function get ReshowDelay( ): int; public function set ReshowDelay(int);

Description

Gets or sets the length of time that must transpire before subsequent ToolTip windows appear as the mouse pointer moves from one control to another.

This property enables you to shorten or lengthen the time that the System.Windows.Forms.ToolTip waits before displaying a ToolTip window after a previous ToolTip window is displayed. The first time a ToolTip window is displayed the value of the System.Windows.Forms.ToolTip.InitialDelay property is used to determine the delay to apply before initially showing the ToolTip window. When a ToolTip window is currently being displayed and the user moves the cursor to another control that displays a ToolTip window, the value of the System.Windows.Forms.ToolTip.ReshowDelay property is used before showing the ToolTip for the new control. The ToolTip window from the previous control must still be displayed in order for the delay specified in the System.Windows.Forms.ToolTip.ReshowDelay property to be used, otherwise the System.Windows.Forms.ToolTip.InitialDelay property value is used.

s) ShowAlways t) ToString

[C#] public bool ShowAlways {get; set;}

[C++] public: _property bool get_ShowAlways( ); public: _property void set_ShowAlways(bool);

[VB] Public Property ShowAlways As Boolean

[JScript] public function get ShowAlways( ): Boolean; public function set ShowAlways(Boolean);

Description

Gets or sets a value indicating whether the System.Windows.Forms.ToolTip appears even when its parent control is not active.

This property enables you to display a ToolTip window even when the container of the System.Windows.Forms.ToolTip is not active. You can use this feature in a modeless window application to enable ToolTip windows to be displayed regardless of which modeless window is active. This feature is also useful when creating a control using the System.Windows.Forms.UserControl that contains a number of controls within it that display ToolTip windows. Since the System.Windows.Forms.UserControl is often not the active window on a form, setting this property to true enables the controls within the System.Windows.Forms.UserControl to display ToolTip windows at any time.

u) Site v) CanExtend

[C#] public bool CanExtend(object target);

[C++] public: _sealed bool CanExtend(Object* target);

[VB] NotOverridable Public Function CanExtend(ByVal target As Object) As Boolean

[JScript] public function CanExtend(target: Object): Boolean;

Description

Returns true if the ToolTip can offer an extender property to the specified target component.

Return Value: True if this ToolTip can offer one or more extender properties. Target object to add extender property to.

w) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description

Disposes of the System.Windows.Forms.ToolTip component.

If the System.Windows.Forms.ToolTip component has a site, this method removes the component from its container and raises the Dispose event.

x) Finalize

[C#] ~ToolTip( );

[C++] ~ToolTip( );

[VB] Overrides Protected Sub Finalize( )

[JScript] protected override function Finalize( ); Finalizes garbage collection.

y) GetToolTip

[C#] public string GetToolTip(Control control);

[C++] public: String* GetToolTip(Control* control);

[VB] Public Function GetToolTip(ByVal control As Control) As String

[JScript] public function GetToolTip(control: Control): String;

Description

Retrieves the System.Windows.Forms.ToolTip text associated with the specified control.

Return Value: The System.Windows.Forms.ToolTip text for the specified control.

This method enables you to retrieve the ToolTip text for any control. If the ToolTip text changes dramatically in an application, you can use this method to find out what text is displayed at any point within the application when a control displays different text depending on the state of the application. To change the text that a control is displaying, use the System.Windows.Forms.ToolTip.SetToolTip(System.Windows.Forms.Control, System.String) method. The control for which to retrieve the System.Windows.Forms.ToolTip text.

z) RemoveAll

[C#] public void RemoveAll( );

[C++] public: void RemoveAll( );

[VB] Public Sub RemoveAll( )

[JScript] public function RemoveAll( );

Description

Removes all ToolTip text currently associated with the System.Windows.Forms.ToolTip control.

You can use this method to remove all ToolTip text that is associated with the System.Windows.Forms.ToolTip control. To disable the display of text instead of removing all ToolTip text from the System.Windows.Forms.ToolTip control, use the System.Windows.Forms.ToolTip.Active property.

aa) SetToolTip

[C#] public void SetToolTip(Control control, string caption);

[C++] public: void SetToolTip(Control* control, String* caption);

[VB] Public Sub SetToolTip(ByVal control As Control, ByVal caption As String)

[JScript] public function SetToolTip(control: Control, caption: String);

Description

Associates System.Windows.Forms.ToolTip text with the specified control.

In addition to setting the ToolTip text to display for a control, you can also use this method to change the text to display for a control. Calling the System.Windows.Forms.ToolTip.SetToolTip(System.Windows.Forms.Control, System.String) method more than once for a given control does not specify multiple ToolTip text to display for a control but instead changes the current ToolTip text for the control. To determine the ToolTip text that is associated with a control at runtime, you can use the System.Windows.Forms.ToolTip.Get- ToolTip(System.Windows.Forms.Control) method. The System.Windows.Forms.Control to associate the ToolTip text with. The ToolTip text to display when the mouse cursor is over the control.

bb) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

TrackBar class (System.Windows.Forms)

a) ToString

Description

Represents a standard Windows track bar.

The System.Windows.Forms.TrackBar is a scrollable control similar to the System.Windows.Forms.ScrollBar control. You can configure ranges through which the value of the System.Windows.Forms.TrackBar.Value property of a track bar scrolls by setting the System.Windows.Forms.TrackBar.Minimum property to specify the lower end of the range and the System.Windows.Forms.TrackBar.Maximum property to specify the upper end of the range.

b) TrackBar

Example Syntax:

c) ToString

[C#] public TrackBar( );

[C++] public: TrackBar( );

[VB] Public Sub New( )

[JScript] public function TrackBar( );

Description

Initializes a new instance of the System.Windows.Forms.TrackBar class.

The track bar is created with a default horizontal orientation and a range of zero to 10, with a tick mark shown for every value.

d) AccessibilityObject e) AccessibleDefaultActionDescription f) AccessibleDescription g) AccessibleName h) AccessibleRole i) AllowDrop j) Anchor k) AutoSize l) ToString Description Gets or sets a value indicating whether the control's height or width is being automatically sized.

You can set the System.Windows.Forms.TrackBar.AutoSize property to true to cause the track bar to adjust either its height or width, depending on orientation, to ensure that the control uses only the required amount of space.

m) BackColor n) BackgroundImage o) ToString

Description p) BindingContext q) Bottom r) Bounds s) CanFocus t) CanSelect u) Capture v) CausesValidation w) ClientRectangle x) ClientSize y) CompanyName z) Container aa) ContainsFocus bb) ContextMenu cc) Controls dd) Created ee) CreateParams ff) ToString Description This is called when creating a window. Inheriting classes can override this to add extra functionality, but should not forget to first call base.getCreateParams( ) to make sure the control continues to work correctly.

Return Value: a CreateParams object with the information for creating this Control.

gg) Cursor hh) DataBindings ii) DefaultImeMode jj) ToString

Description

Gets a value indicating the mode for the Input Method Editor (IME) for the System.Windows.Forms.TrackBar.

kk) DefaultSize ll) ToString

[C#] protected override Size DefaultSize {get;}

[C++] protected: _property virtual Size get_DefaultSize( );

[VB] Overrides Protected ReadOnly Property DefaultSize As Size

[JScript] protected function get DefaultSize( ): Size;

Description

Deriving classes can override this to configure a default size for their control. This is more efficient than setting the size in the control's constructor.

mm) DesignMode nn) DisplayRectangle oo) Disposing pp) Dock qq) Enabled rr) Events ss) Focused tt) Font uu) ToString Description vv) FontHeight ww) ForeColor xx) ToString Description Gets the foreground color of the track bar.

yy) Handle zz) HasChildren aaa) Height
bbb) ImeMode
ccc) ToString

Description

Gets or sets the Input Method Editor (IME) mode supported by this control.

ddd) InvokeRequired
eee) IsAccessible
fff) IsDisposed
ggg) IsHandleCreated
hhh) LargeChange
iii) ToString Description Gets or sets a value to be added to or subtracted from the System.Windows.Forms.TrackBar.Value property when the scroll box is moved a large distance.

When the user presses the PAGE UP or PAGE DOWN key or clicks the track bar on either side of the slider, the System.Windows.Forms.TrackBar.Value property changes according to the value set in the System.Windows.Forms.TrackBar.LargeChange property. You might consider setting the System.Windows.Forms.TrackBar.LargeChange value to a percentage of the System.Windows.Forms.Control.Height (for a vertically oriented track bar) or System.Windows. Forms.Control.Width (for a horizontally oriented track bar) values. This keeps the distance your track bar moves in proportion to its size.

jjj) Left
kkk) Location
lll) Maximum
mmm) ToString

Description

Gets or sets the upper limit of the range this System.Windows.Forms.TrackBar is working with.

You can use the System.Windows.Forms.TrackBar.SetRange (System.Int32, System.Int32) method to set both the System.Windows.Forms.TrackBar.Maximum and System.Windows.Forms.TrackBar.Minimum properties at the same time.

nnn) Minimum
ooo) ToString

[C#] public int Minimum {get; set;}

[C++] public: _property int get_Minimum( ); public: _property void set_Minimum(int);

[VB] Public Property Minimum As Integer

[JScript] public function get Minimum( ): int; public function set Minimum(int);

Description

Gets ir sets the lower limit of the range this System.Windows.Forms.TrackBar is working with.

You can use the System.Windows.Forms.TrackBar.SetRange (System.Int32, System.Int32) method to set both the System.Windows.Forms.TrackBar.Maximum and System.Windows.Forms.TrackBar.Minimum properties at the same time.

ppp) Name
qqq) Orientation
rrr) ToString

Description

Gets or sets a value indicating the horizontal or vertical orientation of the track bar.

When the System.Windows.Forms.TrackBar.Orientation property is set to System.Windows.Forms.Orientation.Horizontal, the slider moves from right to left as the System.Windows.Forms.TrackBar.Value increases. When the System.Windows.Forms.TrackBar.Orientation property is set to System.Windows.Forms.Orientation.Vertical, the slider moves from bottom to top as the System.Windows.Forms.TrackBar.Value increases.

sss) Parent
ttt) ProductName
uuu) ProductVersion
vvv) RecreatingHandle
www) Region
xxx) RenderRightToLeft
yyy) ResizeRedraw
zzz) Right
aaaa) RightToLeft
bbbb) ShowFocusCues
cccc) ShowKeyboardCues
dddd) Site
eeee) Size
ffff) SmallChange
gggg) ToString Description Gets or sets the value added to or subtracted from to the System.Windows.Forms.TrackBar.Value property when the slider is moved a small distance.

When the user presses one of the arrow keys, the System.Windows.Forms.TrackBar.Value property changes according to the value set in the System.Windows.Forms.TrackBar.SmallChange property.

hhhh) TabIndex
iiii) TabStop
jjjj) Tag
kkkk) Text
llll) ToString

Description mmmm) TickFrequency
nnnn) ToString

[C#] public int TickFrequency {get; set;}

[C++] public: _property int get_TickFrequency( ); public: _property void set_TickFrequency(int);

[VB] Public Property TickFrequency As Integer

[JScript] public function get TickFrequency( ): int; public function set TickFrequency(int);

Description

Gets or sets a value that specifies the delta between ticks drawn on the control.

For a System.Windows.Forms.TrackBar with a large range of values between the System.Windows.Forms.TrackBar.Minimum and the System.Windows.Forms.TrackBar.Maximum, it might be impractical to draw all the ticks for values on the control. For example, if you have a control with a range of 100, passing in a value of five here causes the control to draw 20 ticks. In this case each tick would represent 5 units in the range of values.

oooo) TickStyle
pppp) ToString

[C#] public TickStyle TickStyle {get; set;}

[C++] public: _property TickStyle get_TickStyle( ); public: _property void set_TickStyle(TickStyle);

[VB] Public Property TickStyle As TickStyle

[JScript] public function get TickStyle( ): TickStyle; public function set TickStyle(TickStyle);

Description

Gets or sets a value indicating how to display the tick marks on the track bar.

You can use the System.Windows.Forms.TrackBar.TickStyle property to modify the manner in which the tick marks are displayed on the track bar.

qqqq) Top rrrr) TopLevelControl ssss) Value tttt) ToString

Description

Gets or sets a numeric value that represents the current position of the slider on the track bar control.

The System.Windows.Forms.TrackBar.Value property contains the number that represents the current position of the slider on the track bar.

uuuu) Visible vvvv) Width wwww) WindowTarget xxxx) ToString yyyy) ToString zzzz) ToString Description Occurs when either a mouse or keyboard action moves the slider.

When you create a System.Windows.Forms.TrackBar.Scroll delegate, you identify the method that will handle the event. To associate the event with your event handler, add an instance of the delegate to the event. The event handler is called whenever the event occurs, unless you remove the delegate.

aaaaa) ToString

Description

Occurs when the System.Windows.Forms.TrackBar.Value property of a track bar changes, either by movement of the slider or by manipulation in code.

You can use this event to update other controls when the value represented in the track bar changes.

bbbbb) BeginInit

[C#] public void BeginInit( );

[C++] public: _sealed void BeginInit( );

[VB] NotOverridable Public Sub BeginInit( )

[JScript] public function BeginInit( );

Description

Begins the initialization of a System.Windows.Forms.TrackBar that is used on a form or used by another component. The initialization occurs at run time.

The Visual Studio.NET design environment uses this method to start the initialization of a component that is used on a form or used by another component. The System.Windows.Forms.TrackBar.EndInit method ends the initialization. Using System.Windows.Forms.TrackBar.BeginInit and System.Windows.Forms.TrackBar.EndInit methods prevents the control from being used before it is fully initialized.

ccccc) CreateHandle

[C#] protected override void CreateHandle( );

[C++] protected: void CreateHandle( );

[VB] Overrides Protected Sub CreateHandle( )

[JScript] protected override function CreateHandle( );

Description ddddd) EndInit

[C#] public void EndInit( );

[C++] public: sealed void EndInit( );

[VB] NotOverridable Public Sub EndInit( )

[JScript] public function EndInit( );

Description

Ends the initialization of a System.Windows.Forms.TrackBar that is used on a form or used by another component. The initialization occurs at run time.

The Visual Studio.NET design environment uses this method to end the initialization of a component that is used on a form or used by another component. The System.Windows.Forms.TrackBar.BeginInit method starts the initialization. Using the System.Windows.Forms.TrackBar.BeginInit and System.Windows.Forms.TrackBar.EndInit methods prevents the control from being used before it is fully initialized.

eeeee) IsInputKey

[C#] protected override bool IsInputKey(Keys keyData);

[C++] protected: bool IsInputKey(Keys keyData);

[VB] Overrides Protected Function IsInputKey(ByVal keyData As Keys) As Boolean

[JScript] protected override function IsInputKey(keyData: Keys): Boolean;

Description

Handling special input keys, such as pgup, pgdown, home, end, etc. . . . .

fffff) OnBackColorChanged

[C#] protected override void OnBackColorChanged(Event Args e);

[C++] protected: void OnBackColorChanged(Event Args* e);

[VB] Overrides Protected Sub OnBackColorChanged(By Val e As EventArgs)

[JScript] protected override function OnBackColorChanged (e: EventArgs);

Description

This method is called by the control when any property changes. Inheriting controls can override this method to get property change notification on basic properties. Inheriting controls must call base.propertyChanged.

ggggg) OnHandleCreated

[C#] protected override void OnHandleCreated(Event Args e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description hhhhh) OnScroll

[C#] protected virtual void OnScroll(EventArgs e);

[C++] protected: virtual void OnScroll(EventArgs* e);

[VB] Overridable Protected Sub OnScroll(ByVal e As Event Args)

[JScript] protected function OnScroll(e: EventArgs);

Description

Raises the Scroll event.

You can use the System.Windows.Forms.TrackBar.OnScroll (System.EventArgs) event to update other controls as the position of the slider changes. An System.EventArgs that contains the event data.

iiiii) OnValueChanged

[C#] protected virtual void OnValueChanged(EventArgs e);

[C++] protected: virtual void OnValueChanged(Event Args* e);

[VB] Overridable Protected Sub OnValueChanged(ByVal e As EventArgs)

[JScript] protected function OnValueChanged(e: Event Args);

Description

Actually fires the "valueChanged" event.

jjjjj) SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As BoundsSpecified)

[JScript] protected override function SetBoundsCore(x: int, y int, width: int, height int, specified: BoundsSpecified);

Description

Overrides Control.setBoundsCore to enforce autoSize.

kkkkk) SetRange

[C#] public void SetRange(int minValue, int maxValue);

[C++] public: void SetRange(int minValue, int maxValue);

[VB] Public Sub SetRange(ByVal minValue As Integer, ByVal maxValue As Integer)

[JScript] public function SetRange(minValue: int, maxValue: int);

Description

Sets the minimum and maximum values for a System.Windows.Forms.TrackBar control.

You can use this method to set the entire range for the System.Windows.Forms.TrackBar control at the same time. To set the minimum or maximum values individually use the System.Windows.Forms.TrackBar.Minimum and System.Windows.Forms.TrackBar.Maximum properties. If the minValue parameter is greater than the maxValue parameter, the maxValue is set equal to minValue. The lower limit of the range of the track bar. The upper limit of the range of the track bar.

lllll) ToString

[C#] public override string ToString( );

[C++] public: String* ToString( );

[VB] Overrides Public Function ToString( ) As String

[JScript] public override function ToString( ): String;

Description

Returns a string representation for this control.

Return Value: String Returns a string representation for this control.

mmmmm) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

The button's window procedure. Inheriting classes can override this to add extra functionality, but should not forget to call base.wndProc(m); to ensure the button continues to function properly. A Windows Message Object.

TreeNode class (System.Windows.Forms)

a) WndProc

Description

Represents a node of a System.Windows.Forms.TreeView.

The System.Windows.Forms.TreeNode.Nodes collection holds all the child System.Windows.Forms.TreeNode objects assigned to the current System.Windows.Forms.TreeNode. You can add, remove, or clone a System.Windows.Forms.TreeNode; when doing so, all child tree nodes are added, removed, or cloned. Each System.Windows.Forms.TreeNode can contain a collection of other System.Windows.Forms.TreeNode objects. This can make it difficult to determine where you are in the System.Windows.Forms. TreeView when iterating through the collection. To determine your location in a tree structure, use the System.Windows.Forms.TreeNode.FullPath property. The System.Windows.TreeNode.FullPath string can be parsed using the System.Windows.Forms.TreeView. PathSeparator string value to determine where a System. Windows.Forms.TreeNode label begins and ends.

b) TreeNode

Example Syntax:

c) WndProc

[C#] public TreeNode( );

[C++] public: TreeNode( );

[VB] Public Sub New( )

[JScript] public function TreeNode( ); Initializes a new instance of the System.Windows.Forms.TreeNode class.

Description

Initializes a new instance of the System.Windows.Forms.TreeNode class.

d) TreeNode
Example Syntax:
e) WndProc

[C#] public TreeNode(string text);

[C++] public: TreeNode(String* text);

[VB] Public Sub New(ByVal text As String)

[JScript] public function TreeNode(text: String);

Description

Initializes a new instance of the System.Windows.Forms. TreeNode class with the specified label text.

The text parameter value is assigned to the node's System. Windows.Forms.TreeNode.Text property and becomes the tree node label. The label System.Windows.Forms.Tree Node.Text of the new tree node.

f) TreeNode
Example Syntax:
g) WndProc

[C#] public TreeNode(string text, TreeNode[ ] children);

[C++] public: TreeNode(String* text, TreeNode* children[ ]);

[VB] Public Sub New(ByVal text As String, ByVal children( ) As TreeNode)

[JScript] public function TreeNode(text: String, children: TreeNode[ ]);

Description

Initializes a new instance of the System.Windows.Forms. TreeNode class with the specified label text and child tree nodes.

The text parameter value is assigned to the node's System. Windows.Forms.TreeNode.Text property and becomes the tree node label. The tree nodes contained in the children array are added to the System.Windows.Forms.TreeNode Collection stored in the System.Windows.Forms.TreeNode. Nodes property. The label System.Windows.Forms.Tree Node.Text of the new tree node. An array of child System.Windows. Forms.TreeNode objects.

h) TreeNode
Example Syntax:
i) WndProc

[C#] public TreeNode(string text, int imageIndex, int selectedImageIndex);

[C++] public: TreeNode(String* text, int imageIndex, int selectedImageIndex);

[VB] Public Sub New(ByVal text As String, ByVal imageIndex As Integer, ByVal selectedImageIndex As Integer)

[JScript] public function TreeNode(text: String, imageIndex: int, selectedImageIndex: int);

Description

Initializes a new instance of the System.Windows.Forms. TreeNode class with the specified label text and images to display when the tree node is in a selected and unselected state.

The text parameter value is assigned to the node's System. Windows.Forms.TreeNode.Text property and becomes the tree node label. The imageIndex and selectedImageIndex values are the index values of an System.Drawing.Image stored in the System.Windows.Forms.ImageList assigned to the System.Windows.Forms.TreeView.ImageList property. The image referenced in the imageIndex property is displayed when the tree node is not selected. Likewise, the image referenced in the selectedImageIndex property is displayed when the tree node is in a selected state. The label System. Windows.Forms.TreeNode.Text of the new tree node. The index value of System.Drawing.Image to display when the tree node is unselected. The index value of System.Drawing. Image to display when the tree node is selected.

j) TreeNode
Example Syntax:
k) WndProc

[C#] public TreeNode(string text, int imageIndex, int selectedImageIndex, TreeNode[ ] children);

[C++] public: TreeNode(String* text, int imageIndex, int selectedImageIndex, TreeNode* children[ ]);

[VB] Public Sub New(ByVal text As String, ByVal imageIndex As Integer, ByVal selectedImageIndex As Integer, ByVal children( ) As TreeNode)

[JScript] public function TreeNode(text: String, imageIndex: int, selectedImageIndex: int, children: TreeNode[ ]);

Description

Initializes a new instance of the System.Windows.Forms. TreeNode class with the specified label text, child tree nodes, and images to display when the tree node is in a selected and unselected state.

The text parameter value is assigned to the node's System. Windows.Forms.TreeNode.Text property and becomes the tree node label. The imageIndex and selectedImageIndex values are the index values of an System.Drawing.Image stored in the System.Windows.Forms.ImageList assigned to the System.Windows.Forms.TreeView.ImageList property. The image referenced in the imageIndex parameter is displayed when the tree node is not selected. Likewise, the image referenced in the selectedImageIndex parameter is displayed when the tree node is in a selected state. The tree nodes contained in the children array are added to the System.Windows.Forms.TreeNodeCollection stored in the System.Windows.Forms.TreeNode.Nodes property. The label System. Windows.Forms.TreeNode.Text of the new tree node. The index value of System.Drawing.Image to display when the tree node is unselected. The index value of System.Drawing. Image to display when the tree node is selected. An array of child System.Windows.Forms.TreeNode objects.

l) BackColor
m) WndProc

[C#] public Color BackColor {get; set;}

[C++] public: _property Color get_BackColor( ); public: _property void set_BackColor(Color);

[VB] Public Property BackColor As Color

[JScript] public function get BackColor( ): Color; public function set BackColor(Color);

Description

Gets or sets the background color of the tree node.

If the System.Windows.Forms.TreeNode.BackColor property is set to null, the System.Drawing.Color used is the System.Windows.Forms.Control.BackColor property value of the System.Windows.Forms.TreeView control that the tree node is assigned to.

n) Bounds
o) WndProc

[C#] public Rectangle Bounds {get;}

[C++] public: _property Rectangle get_Bounds( );

[VB] Public ReadOnly Property Bounds As Rectangle

[JScript] public function get Bounds( ): Rectangle;

Description

Gets the bounds of the tree node.

The coordinates are relative to the upper left corner of the System.Windows.Forms.TreeView control.

p) Checked
q) WndProc

[C#] public bool Checked {get; set;}

[C++] public: _property bool get_Checked( ); public: _property void set_Checked(bool);

[VB] Public Property Checked As Boolean

[JScript] public function get Checked( ): Boolean; public function set Checked(Boolean);

Description

Gets or sets a value indicating whether the tree node is in a checked state.

r) FirstNode
s) WndProc

[C#] public TreeNode FirstNode {get;}

[C++] public: _property TreeNode* get_FirstNode( );

[VB] Public ReadOnly Property FirstNode As TreeNode

[JScript] public function get FirstNode( ): TreeNode;

Description

Gets the first child tree node in the tree node collection.

The System.Windows.Forms.TreeNode.FirstNode is the first child System.Windows.Forms.TreeNode in the System.Windows.Forms.TreeNodeCollection stored in the System.Windows.Forms.TreeNode.Nodes property of the current tree node. If the System.Windows.Forms.TreeNode has no child tree node, the System.Windows.Forms.TreeNode.FirstNode property returns null.

t) ForeColor
u) WndProc

[C#] public Color ForeColor {get; set;}

[C++] public: _property Color get_ForeColor( ); public: _property void set_ForeColor(Color);

[VB] Public Property ForeColor As Color

[JScript] public function get ForeColor( ): Color; public function set ForeColor(Color);

Description

Gets or sets the foreground color of the tree node.

If null, the System.Drawing.Color used is the System.Windows.Forms.Control.ForeColor property value of the System.Windows.Forms.TreeView control that the tree node is assigned to.

v) FullPath
w) WndProc

[C#] public string FullPath {get;}

[C++] public: _property String* get FullPath( );

[VB] Public ReadOnly Property FullPath As String

[JScript] public function get FullPath( ): String;

Description

Gets the path from the root tree node to the current tree node.

The path consists of the labels of all of the tree nodes that must be navigated to get to this tree node, starting at the root tree node. The node labels are separated by the delimiter character specified in the System.Windows.Forms.TreeView. PathSeparator property of the System.Windows.Forms. TreeView control that contains this node. For example, if the delimiter character of the tree view control named “Location” is set to the backslash character, (\), the System.Windows. Forms. TreeNode.FullPath property value is “Country\Region\State”.

x) Handle
y) WndProc

[C#] public IntPtr Handle {get;}

[C++] public: _property IntPtr get_Handle( );

[VB] Public ReadOnly Property Handle As IntPtr

[JScript] public function get Handle( ): IntPtr;

Description

Gets the handle of the tree node.

If a handle is not already created when the System.Windows. Forms.TreeNode.Handle property is referenced, it is created.

z) ImageIndex
aa) WndProc

[C#] public int ImageIndex {get; set;}

[C++] public: _property int get ImageIndex( ); public: _property void set_ImageIndex(int);

[VB] Public Property ImageIndex As Integer

[JScript] public function get ImageIndex( ): int; public function set ImageIndex(int);

Description

Gets or sets the image list index value of the image displayed when the tree node is in the unselected state.

The System.Windows.Forms.TreeNode.ImageIndex value is the index value of an System.Drawing.Image stored in the System.Windows.Forms.ImageList assigned to the System. Windows.Forms.TreeView.ImageList property.

bb) Index
cc) WndProc

[C#] public int Index {get;}

[C++] public: _property int get_Index( );

[VB] Public ReadOnly Property Index As Integer

[JScript] public function get Index( ): int;

Description

Gets the position of the tree node in the tree node collection.

dd) IsEditing
ee) WndProc

[C#] public bool IsEditing {get;}

[C++] public: _property bool get_IsEditing( );

[VB] Public ReadOnly Property IsEditing As Boolean

[JScript] public function get IsEditing( ): Boolean;

Description

Gets a value indicating whether the tree node is in an editable state.

ff) IsExpanded gg) WndProc

[C#] public bool IsExpanded {get;}

[C++] public: _property bool get_IsExpanded( );

[VB] Public ReadOnly Property IsExpanded As Boolean

[JScript] public function get IsExpanded( ): Boolean;

Description

Gets a value indicating whether the tree node is in the expanded state.

hh) IsSelected ii) WndProc

[C#] public bool IsSelected {get;}

[C++] public: _property bool get_IsSelected( );

[VB] Public ReadOnly Property IsSelected As Boolean

[JScript] public function get IsSelected( ): Boolean;

Description

Gets a value indicating whether the tree node is in the selected state.

jj) IsVisible kk) WndProc

[C#] public bool IsVisible {get;}

[C++] public: _property bool get_IsVisible( );

[VB] Public ReadOnly Property IsVisible As Boolean

[JScript] public function get IsVisible( ): Boolean;

Description

Gets a value indicating whether the tree node is visible.

ll) LastNode mm) WndProc

[C#] public TreeNode LastNode {get;}

[C++] public: _property TreeNode* get LastNode( );

[VB] Public ReadOnly Property LastNode As TreeNode

[JScript] public function get LastNode( ): TreeNode;

Description

Gets the last child tree node.

The System.Windows.Forms.TreeNode.LastNode is the last child System.Windows.Forms.TreeNode in the System.Windows.Forms.TreeNodeCollection stored in the System.Windows.Forms.TreeNode.Nodes property of the current tree node. If the System.Windows.Forms.TreeNode has no child tree node, the System.Windows.Forms.TreeNode.LastNode property returns null.

nn) NextNode oo) WndProc

[C#] public TreeNode NextNode {get;}

[C++] public: _property TreeNode* get_NextNode( );

[VB] Public ReadOnly Property NextNode As TreeNode

[JScript] public function get NextNode( ): TreeNode;

Description

Gets the next sibling tree node.

The System.Windows.Forms.TreeNode.NextNode is the next sibling System.Windows.Forms.TreeNode in the System.Windows.Forms.TreeNodeCollection stored in the System.Windows.Forms.TreeNode.Nodes property of the tree node's parent System.Windows.Forms.TreeNode. If there is no next tree node, the System.Windows.Forms.TreeNode.NextNode property returns null.

pp) NextVisibleNode qq) WndProc

[C#] public TreeNode NextVisibleNode {get;}

[C++] public: _property TreeNode* get_NextVisibleNode( );

[VB] Public ReadOnly Property NextVisibleNode As TreeNode

[JScript] public function get NextVisibleNode( ): TreeNode;

Description

Gets the next visible tree node.

The System.Windows.Forms.TreeNode.NextVisibleNode can be a child, sibling, or a tree node from another branch. If there is no next tree node, the System.Windows.Forms.TreeNode.NextVisibleNode property returns null rr) NodeFont ss) WndProc

[C#] public Font NodeFont {get; set;}

[C++] public: _property Font* get_NodeFont( ); public: _property void set_NodeFont(Font*);

[VB] Public Property NodeFont As Font

[JScript] public function get NodeFont( ): Font; public function set NodeFont(Font);

Description

Gets or sets the font used to display the text on the tree node's label.

If null, the System.Drawing.Font used is the System.Windows.Forms.Control.Font property value of the System.Windows.Forms.TreeView control that this node is attached to.

tt) Nodes uu) WndProc

[C#] public TreeNodeCollection Nodes {get;}

[C++] public: _property TreeNodeCollection* get_Nodes( );

[VB] Public ReadOnly Property Nodes As TreeNodeCollection

[JScript] public function get Nodes( ): TreeNodeCollection;

Description

Gets the collection of System.Windows.Forms.TreeNode objects assigned to the current tree node.

The System.Windows.Forms.TreeNode.Nodes property can hold a collection of other System.Windows.Forms.TreeNode objects. Each of the tree node in the collection has a System.Windows.Forms.TreeNode.Nodes property that can contain its own System.Windows.Forms.TreeNodeCollection. This nesting of tree nodes can make it difficult to navigate a tree structure. The System.Windows.Forms.TreeNode.FullPath property makes it easier to determine your location in a tree.

vv) Parent
ww) WndProc

[C#] public TreeNode Parent {get;}

[C++] public: _property TreeNode* get_Parent( );

[VB] Public ReadOnly Property Parent As TreeNode

[JScript] public function get Parent( ): TreeNode;

Description

Gets the parent tree node of the current tree node.

If the tree node is at the root level, the System.Windows.Forms.TreeNode.Parent property returns null.

xx) PrevNode
yy) WndProc

[C#] public TreeNode PrevNode {get;}

[C++] public: _property TreeNode* get_PrevNode( );

[VB] Public ReadOnly Property PrevNode As TreeNode

[JScript] public function get PrevNode( ): TreeNode;

Description

Gets the previous sibling tree node.

The System.Windows.Forms.TreeNode.PrevNode is the previous sibling System.Windows.Forms.TreeNode in the System.Windows.Forms.TreeNodeCollection stored in the System.Windows.Forms.TreeNode.Nodes property of the tree node's parent System.Windows.Forms.TreeNode. If there is no previous tree node, the System.Windows.Forms.Tree Node.PrevNode property returns null.

zz) PrevVisibleNode
aaa) WndProc

[C#] public TreeNode PrevVisibleNode {get;}

[C++] public: _property TreeNode* get_PrevVisibleNode( );

[VB] Public ReadOnly Property PrevVisibleNode As TreeNode

[JScript] public function get PrevVisibleNode( ): TreeNode;

Description

Gets the previous visible tree node.

The System.Windows.Forms.TreeNode.PrevVisibleNode can be a child, sibling, or a tree node from another branch. If there is no previous tree node, the System.Windows.Forms.TreeNode.PrevVisibleNode property returns null.

bbb) SelectedImageIndex
ccc) WndProc

[C#] public int SelectedImageIndex {get; set;}

[C++] public: _property int get_SelectedImageIndex( ); public: property void set_SelectedImageIndex(int);

[VB] Public Property SelectedImageIndex As Integer

[JScript] public function get SelectedImageIndex( ): int; public function set SelectedImageIndex(int);

Description

Gets or sets the image list index value of the image that is displayed when the tree node is in the selected state.

The System.Windows.Forms.TreeNode.SelectedImage Index value is the index value of an System.Drawing.Image stored in the System.Windows.Forms.ImageList assigned to the System.Windows.Forms.TreeView.ImageList property.

ddd) Tag
eee) WndProc

[C#] public object Tag {get; set;}

[C++] public: _property Object* get_Tag( ); public: _property void set_Tag(Object*);

[VB] Public Property Tag As Object

[JScript] public function get Tag( ): Object; public function set Tag(Object);

Description

Gets or sets the object that contains data about the tree node.

Any System.Object derived type may be assigned to this property. If this property is being set through the Windows Forms designer, only text may be assigned.

fff) Text
ggg) WndProc

[C#] public string Text {get; set;}

[C++] public: _property String* get_Text( ); public: _property void set_Text(String*);

[VB] Public Property Text As String

[JScript] public function get Text( ): String; public function set Text(String);

Description

Gets or sets the text displayed in the label of the tree node.

This property cannot be set by the user if the System.Windows.Forms.TreeView.LabelEdit property of the parent System.Windows.Forms.TreeView is set to false. The alternative to setting this property explicitly is to create the tree node using one of the System.Windows.Forms.TreeNode.#ctor constructors that has a string parameter that represents the System.Windows.Forms.TreeNode.Text property. The label is displayed next to the System.Windows.Forms.TreeNode image, if one is displayed.

hhh) TreeView
iii) WndProc

[C#] public TreeView TreeView {get;}

[C++] public: _property TreeView* get_TreeView( );

[VB] Public ReadOnly Property TreeView As TreeView

[JScript] public function get TreeView( ): TreeView;

Description

Gets the parent tree view that the tree node is assigned to.

jjj) BeginEdit

[C#] public void BeginEdit( );

[C++] public: void BeginEdit( );

[VB] Public Sub BeginEdit( )

[JScript] public function BeginEdit( );

Description

Initiates the editing of the tree node label.

A common place to use this method is to call it on the System.Windows.Forms.MenuItem.Click event of a System.Windows.Forms.MenuItem or System.Windows.Forms.ContextMenu.

kkk) Clone

[C#] public virtual object Clone( );

[C++] public: virtual Object* Clone( );

[VB] Overridable Public Function Clone( ) As Object

[JScript] public function Clone( ) Object;

Description

Copies the tree node and the entire subtree rooted at this tree node.

Return Value: The System.Object that represents the cloned System.Windows.Forms.TreeNode object.

The tree structure from the tree node being cloned and below is copied. Any child tree nodes assigned to the System.Windows.Forms.TreeNode being cloned is included in the new tree node and subtree.

lll) Collapse

[C#] public void Collapse( );

[C++] public: void Collapse( );

[VB] Public Sub Collapse( )

[JScript] public function Collapse( );

Description

Collapses the tree node.

The System.Windows.Forms.TreeNode.Collapse method only collapses the current System.Windows.Forms.TreeNode; child tree nodes are not collapsed.

mmm) EndEdit

[C#] public void EndEdit(bool cancel);

[C++] public: void EndEdit(bool cancel);

[VB] Public Sub EndEdit(ByVal cancel As Boolean)

[JScript] public function EndEdit(cancel: Boolean);

Description

Ends the editing of the tree node label. true if the editing of the tree node label text was canceled without being saved; otherwise, false.

nnn) EnsureVisible

[C#] public void EnsureVisible( );

[C++] public: void EnsureVisible( );

[VB] Public Sub EnsureVisible( )

[JScript] public function EnsureVisible( );

Description

Ensures that the tree node is visible, expanding tree nodes and scrolling the tree view control as necessary.

When the System.Windows.Forms.TreeNode.EnsureVisible method is called, the tree is expanded and scrolled to ensure that the current tree node is visible in the System.Windows.Forms.TreeView. This method is useful if you are selecting a tree node in code based on certain criteria. By calling this method after selecting the node, it ensures that the user can see and interact with the selected node.

ooo) Expand

[C#] public void Expand( );

[C++] public: void Expand( );

[VB] Public Sub Expand( )

[JScript] public function Expand( );

Description

Expands the tree node.

The System.Windows.Forms.TreeNode.Expand method expands the current System.Windows.Forms.TreeNode down to the next level of nodes.

ppp) ExpandAll

[C#] public void ExpandAll( );

[C++] public: void ExpandAll( );

[VB] Public Sub ExpandAll( )

[JScript] public function ExpandAll( );

Description

Expands all the child tree nodes.

The System.Windows.Forms.TreeNode.ExpandAll method expands all the child tree nodes assigned to the System.Windows.Forms.TreeNode.Nodes collection.

qqq) FromHandle

[C#] public static TreeNode FromHandle(TreeView tree, IntPtr handle);

[C++] public: static TreeNode* FromHandle(TreeView* tree, IntPtr handle);

[VB] Public Shared Function FromHandle(ByVal tree As TreeView, ByVal handle As IntPtr) As TreeNode

[JScript] public static function FromHandle(tree: TreeView, handle: IntPtr): TreeNode;

Description

Returns the tree node with the specified handle and assigned to the specified tree view control.

Return Value: A System.Windows.Forms.TreeNode that represents the tree node assigned to the specified System.Windows.Forms.TreeView control with the specified handle. The System.Windows.Forms.TreeView that contains the tree node. The handle of the tree node.

rrr) GetNodeCount

[C#] public int GetNodeCount(bool includeSubTrees);

[C++] public: int GetNodeCount(bool includeSubTrees);

[VB] Public Function GetNodeCount(ByVal includeSubTrees As Boolean) As Integer

[JScript] public function GetNodeCount(includeSubTrees: Boolean): int;

Description

Returns the number of child tree nodes.

Return Value: The number of child tree nodes assigned to the System.Windows.Forms.TreeNode.Nodes collection. true if the resulting count includes all tree nodes indirectly rooted at this tree node; otherwise, false.

sss) Remove

[C+] public void Remove( );

[C++] public: void Remove( );

[VB] Public Sub Remove( )

[JScript] public function Remove( );

Description

Removes the current tree node from the tree view control.

When the System.Windows.Forms.TreeNode.Remove method is called, the tree node and any child tree nodes assigned to the System.Windows.Forms.TreeNode are removed from the System.Windows.Forms.TreeView. The removed child nodes are removed from the System.Windows.Forms.TreeView, but are still attached to this tree node.

ttt) Toggle

[C#] public void Toggle( );

[C++] public: void Toggle( );

[VB] Public Sub Toggle( )

[JScript] public function Toggle( );

Description

Toggles the tree node to either the expanded or collapsed state.

The tree node is toggled to the state opposite its current state, either expanded or collapsed.

uuu) ToString

[C#] public override string ToString( );

[C++] public: String* ToString( );

[VB] Overrides Public Function ToString( ) As String

[JScript] public override function ToString( ): String;

Description

Returns the label text for the tree node Returns the label text for the tree node TreeNodeCollection class (System.Windows.Forms)

a) ToString

Description

Represents a collection of System.Windows.Forms.TreeNode objects.

The System.Windows.Forms.TreeNodeCollection.Add(System.String), System.Windows.Forms.TreeNodeCollection.Remove(System.Windows. Forms.TreeNode), and System.Windows.Forms.TreeNodeCollection.RemoveAt(System.Int32) methods enable you to add and remove individual tree nodes from the collection.

You can also use the System.Windows.Forms.TreeNodeCollection.AddRange(System.Windows.Forms.TreeNode[ ]) or System.Windows.Forms.TreeNodeCollection.Clear methods to add or remove all the tree nodes from the collection.

b) Count c) ToString

[C#] public int Count {get;}

[C++] public: _property int get_Count( );

[VB] Public ReadOnly Property Count As Integer

[JScript] public function get Count( ): int;

Description

Gets the total number of System.Windows.Forms.TreeNode objects in the collection.

The System.Windows.Forms.TreeNodeCollection.Count property holds the number of System.Windows.Forms.TreeNode objects assigned to the collection. You can use the System.Windows.Forms.TreeNodeCollection.Count property value as the upper bounds of a loop to iterate through a collection.

d) IsReadOnly e) ToString

[C#] public bool IsReadOnly {get;}

[C++] public: _property bool get_IsReadOnly( );

[VB] Public ReadOnly Property IsReadOnly As Boolean

[JScript] public function get IsReadOnly( ): Boolean;

Description

Gets a value indicating whether the collection is read-only.

f) Item g) ToString

[C#] public virtual TreeNode this[int index] {get; set;}

[C++] public: _property virtual TreeNode* get_Item(int index); public: ,property virtual void set_Item(int index, TreeNode*);

[VB] Overridable Public Default Property Item(ByVal index As Integer) As TreeNode

[JScript] returnValue=TreeNodeCollectionObject.Item(index); TreeNodeCollectionObject.Item(index)=returnValue;

Description

Indicates the System.Windows.Forms.TreeNode at the specified indexed location in the collection.

To assign System.Windows.Forms.TreeNode objects to a specific location, or to retrieve them from the System.Windows.Forms.TreeNodeCollection, you can reference the collection object with a specific index value. The index value of the System.Windows.Forms.TreeNodeCollection is a zero-based index. The indexed location of the System.Windows.Forms.TreeNode in the collection.

h) Add

[C#] public virtual TreeNode Add(string text);

[C++] public: virtual TreeNode* Add(String* text);

[VB] Overridable Public Function Add(ByVal text As String) As TreeNode

[JScript] public function Add(text: String): TreeNode; Adds a new tree node to the collection.

Description

Adds a new tree node to the end of the current tree node collection with the specified label text.

Return Value: A System.Windows.Forms.TreeNode that represents the tree node being added to the collection.

You can also add new System.Windows.Forms.TreeNode objects to the collection by using the System.Windows.Forms. TreeNodeCollection.AddRange(System.Windows.Forms. TreeNode[ ]) or System.Windows.Forms.TreeNodeCollection.Insert(System.Int32,System.Windows.Forms.TreeNode) methods. The label text displayed by the System.Windows.Forms.TreeNode.

i) Add

[C#] public virtual int Add(TreeNode node);

[C++] public: virtual int Add(TreeNode* node);

[VB] Overridable Public Function Add(ByVal node As TreeNode) As Integer

[JScript] public function Add(node: TreeNode): int;

Description

Adds a previously created tree node to the end of the tree node collection.

Return Value: The zero-based index value of the System.Windows.Forms.TreeNode added to the tree node collection.

This version of the System.Windows.Forms.TreeNodeCollection.Add(System.String) method allows you to add previously created System.Windows.Forms.TreeNode objects to the end of the tree node collection. The System.Windows.Forms.TreeNode to add to the collection.

j) AddRange

[C#] public virtual void AddRange(TreeNode[ ] nodes);

[C++] public: virtual void AddRange(TreeNode* nodes[ ]);

[VB] Overridable Public Sub AddRange(ByVal nodes( ) As TreeNode)

[JScript] public function AddRange(nodes: TreeNode[ ]);

Description

Adds an array of previously created tree nodes to the collection.

The System.Windows.Forms.TreeNode objects contained in the nodes array are appended to the end of the collection. An array of System.Windows.Forms.TreeNode objects representing the tree nodes to add to the collection.

k) Clear

[C#] public virtual void Clear( );

[C++] public: virtual void Clear( );

[VB] Overridable Public Sub Clear( )

[JScript] public function Clear( );

Description

Removes all tree nodes from the collection.

You can use this method to clear the entire collection of tree nodes from a tree view.

l) Contains

[C#] public bool Contains(TreeNode node);

[C++] public: bool Contains(TreeNode* node);

[VB] Public Function Contains(ByVal node As TreeNode) As Boolean

[JScript] public function Contains(node: TreeNode): Boolean;

Description

Determines whether the specified tree node is a member of the collection.

Return Value: true if the System.Windows.Forms.TreeNode is a member of the collection; otherwise, false.

This method enables you to determine whether a System.Windows.Forms.TreeNode is a member of the collection before attempting to perform operations on the System.Windows.Forms.TreeNode.

You can use this method to confirm that a System.Windows.Forms.TreeNode has been added to or is still a member of the collection. The System.Windows.Forms.TreeNode to locate in the collection.

m) CopyTo

[C#] public void CopyTo(Array dest, int index);

[C++] public: _sealed void CopyTo(Array* dest, int index);

[VB] NotOverridable Public Sub CopyTo(ByVal dest As Array, ByVal index As Integer)

[JScript] public function CopyTo(dest: Array, index: int);

Description

Copies the entire collection into an existing array at a specified location within the array. The destination array. The index in the destination array at which storing begins.

n) GetEnumerator

[C#] public IEnumerator GetEnumerator( );

[C++] public: sealed IEnumerator* GetEnumerator( );

[VB] NotOverridable Public Function GetEnumerator( ) As IEnumerator

[JScript] public function GetEnumerator( ): IEnumerator;

Description

Returns an enumerator that can be used to iterate through the tree node collection.

Return Value: An System.Collections.IEnumerator object that represents the tree node collection.

o) IndexOf

[C#] public int IndexOf(TreeNode node);

[C++] public: int IndexOf(TreeNode* node);

[VB] Public Function IndexOf(ByVal node As TreeNode) As Integer

[JScript] public function IndexOf(node: TreeNode): int;

Description

Returns the index of the specified tree node in the collection.

Return Value: The zero-based index of the item found in the tree node collection; otherwise, -1. The System.Windows.Forms.TreeNode to locate in the collection.

p) Insert

[C#] public virtual void Insert(int index, TreeNode node);

[C++] public: virtual void Insert(int index, TreeNode* node);

[VB] Overridable Public Sub Insert(ByVal index As Integer, ByVal node As TreeNode)

[JScript] public function Insert(index: int, node: TreeNode);

Description

Inserts an existing tree node in the tree node collection at the specified location.

If the System.Windows.Forms.TreeView.Sorted property is set to true, the index parameter value is ignored. The System.Windows.Forms.TreeNode is inserted into the tree view and the System.Windows.Forms.TreeView resorted. The indexed location within the collection to insert the tree node. The System.Windows.Forms.TreeNode to insert into the collection.

q) Remove

[C#] public void Remove(TreeNode node);

[C++] public: void Remove(TreeNode* node);

[VB] Public Sub Remove(ByVal node As TreeNode)

[JScript] public function Remove(node: TreeNode);

Description

Removes the specified tree node from the tree node collection.

When a System.Windows.Forms.TreeNode is removed from the tree node collection, all subsequent tree nodes are moved up one position in the collection. The System.Windows. Forms.TreeNode to remove.

r) RemoveAt

[C#] public virtual void RemoveAt(int index);

[C++] public: virtual void RemoveAt(int index);

[VB] Overridable Public Sub RemoveAt(ByVal index As Integer)

[JScript] public function RemoveAt(index: int);

Description

Removes a tree node from the tree node collection at a specified index.

When a System.Windows.Forms.TreeNode is removed from the tree node collection, all subsequent tree nodes are moved up one position in the collection. The index of the System. Windows.Forms.TreeNode to remove.

s) IList.Add

[C#] int IList.Add(object node);

[C++] int IList::Add(Object* node);

[VB] Function Add(ByVal node As Object) As Integer Implements IList.Add

[JScript] function IList.Add(node: Object): int;

t) IList.Contains

[C#] bool IList.Contains(object node);

[C++] bool IList::Contains(Object* node);

[VB] Function Contains(ByVal node As Object) As Boolean Implements IList.Contains

[JScript] function IList.Contains(node: Object): Boolean;

u) IList.IndexOf

[C#] int IList.IndexOf(object node);

[C++] int IList::IndexOf(Object* node);

[VB] Function IndexOf(ByVal node As Object) As Integer Implements IList.IndexOf

[JScript] function IList.IndexOf(node: Object): int;

v) IList.Insert

[C#] void IList.Insert(int index, object node);

[C++] void IList::Insert(int index, Object* node);

[VB] Sub Insert(ByVal index As Integer, ByVal node As Object) Implements IList.Insert

[JScript] function IList.Insert(index: int, node: Object);

w) IList.Remove

[C#] void IList.Remove(object node);

[C++] void IList::Remove(Object* node);

[VB] Sub Remove(ByVal node As Object) Implements IList. Remove

[JScript] function IList.Remove(node: Object);

TreeNodeConverter class (System.Windows.Forms)

a) ToString

Description

Provides a type converter to convert System.Windows.Forms. TreeNode objects to and from various other representations.

For more information about type converters, see the System. ComponentModel.TypeConverter base class and.

b) TreeNodeConverter

Example Syntax:

c) ToString

[C#] public TreeNodeConverter( );

[C++] public: TreeNodeConverter( );

[VB] Public Sub New( )

[JScript] public function TreeNodeConverter( );

d) CanConvertTo

[C#] public override bool CanConvertTo(ITypeDescriptorContext context, Type destinationType);

[C++] public: bool CanConvertTo(ITypeDescriptorContext* context, Type* destinationType);

[VB] Overrides Public Function CanConvertTo(ByVal context As ITypeDescriptorContext, ByVal destinationType As Type) As Boolean

[JScript] public override function CanConvertTo(context: ITypeDescriptorContext, destinationType: Type): Boolean;

Description

Gets a value indicating whether this converter can convert an object to the given destination type using the context.

Return Value: true if this converter can perform the conversion; otherwise, false.

The context parameter can be used to extract additional information about the environment this converter is being invoked from. This can be null, so always check. Also, properties on the context object can return null. An System.ComponentModel.ITypeDescriptorContext that provides a format context. A System.Type that represents the type you wish to convert to.

e) ConvertTo

[C#] public override object ConvertTo(ITypeDescriptorContext context, CultureInfo culture, object value, Type destinationType);

[C++] public: Object* ConvertTo(ITypeDescriptorContext* context, CultureInfo* culture, Object* value, Type* destinationType);

[VB] Overrides Public Function ConvertTo(ByVal context As ITypeDescriptorContext, ByVal culture As CultureInfo, ByVal value As Object, ByVal destinationType As Type) As Object

[JScript] public override function ConvertTo(context: ITypeDescriptorContext, culture: CultureInfo, value: Object, destinationType: Type): Object;

Description

Converts the given object to another type. The most common types to convert are to and from a string object. The default implementation will make a call to ToString on the object if the object is valid and if the destination type is string. If this cannot convert to the destination type, this will throw a NotSupportedException.

Return Value: The converted object. A formatter context. This object can be used to extract additional information about the environment this converter is being invoked from. This may be null, so you should always check. Also, properties on the context object may also return null. An optional culture info. If not supplied the current culture is assumed. The object to convert. The type to convert the object to.

TreeView class (System.Windows.Forms)

a) ToString

Description

Displays a hierarchical collection of labeled items, each represented by a System.Windows.Forms.TreeNode.

The System.Windows.Forms.TreeView.Nodes collection holds all the System.Windows.Forms.TreeNode objects that are assigned to the System.Windows.Forms.TreeView control. The tree nodes in this collection are referred to as the root tree nodes. Any tree node that is subsequently added to a root tree node is referred to as a child node. Because each System.Windows.Forms.TreeNode can contain a collection of other System.Windows.Forms.TreeNode objects, you might find it difficult to determine your location in the tree structure when you iterate through the collection. You can parse the System.Windows.Forms.TreeNode.FullPath string by using the System.Windows.Forms.TreeView.PathSeparator string value to determine where a System.Windows.Forms.TreeNode label begins and ends.

b) TreeView

Example Syntax:

c) ToString

[C#] public TreeView( );

[C++] public: TreeView( );

[VB] Public Sub New( )

[JScript] public function TreeView( );

Description

Initializes a new instance of the System.Windows.Forms.TreeView class.

d) AccessibilityObject
e) AccessibleDefaultActionDescription
f) AccessibleDescription
g) AccessibleName
h) AccessibleRole
i) AllowDrop
j) Anchor
k) BackColor
l) ToString Description The background color for this control. Specifying null for this parameter sets the control's background color to its parent's background color.

m) BackgroundImage
n) ToString

[C#] public override Image BackgroundImage {get; set;}

[C++] public: _property virtual Image* get BackgroundImage( ); public: _property virtual void set BackgroundImage (Image*);

[VB] Overrides Public Property BackgroundImage As Image

[JScript] public function get BackgroundImage( ): Image; public function set BackgroundImage(Image);

Description o) BindingContext
p) BorderStyle
q) ToString

Description

Gets or sets the border style of the tree view control.

When the System.Windows.Forms.TreeView.BorderStyle property is set to System.Windows. Forms. BorderStyle.Fixed3D, the System.Windows.Forms.TreeView has a sunken, three-dimensional appearance. To display a flat, thin border around the System.Windows.Forms.TreeView control, set the System.Windows.Forms.BorderStyle property to System.Windows.Forms.BorderStyle.Fixed Single.

r) Bottom
s) Bounds
t) CanFocus
u) CanSelect
v) Capture
w) CausesValidation
x) CheckBoxes
y) ToString Description Gets or sets a value indicating whether check boxes are displayed next to the tree nodes in the tree view control.

A check box is displayed to the left of both the tree node label and tree node System.Drawing.Image, if any. Check boxes allow the user to select more than one tree node at a time.

z) ClientRectangle
aa) ClientSize
bb) CompanyName
cc) Container
dd) ContainsFocus
ee) ContextMenu
ff) Controls
gg) Created
hh) CreateParams
ii) ToString Description jj) Cursor
kk) DataBindings
ll) DefaultImeMode
mm) DefaultSize
nn) ToString Description Deriving classes can override this to configure a default size for their control. This is more efficient than setting the size in the control's constructor.

oo) DesignMode
pp) DisplayRectangle
qq) Disposing
rr) Dock
ss) Enabled
tt) Events
uu) Focused
vv) Font
ww) FontHeight
xx) ForeColor
yy) ToString Description The current foreground color for this control, which is the color the control uses to draw its text.

zz) FullRowSelect
aaa) ToString

[C#] public bool FullRowSelect {get; set;}

[C++] public: _property bool get_FullRowSelect( ); public: _property void set_FullRowSelect(bool);

[VB] Public Property FullRowSelect As Boolean

[JScript] public function get FullRowSelect( ): Boolean; public function set FullRowSelect(Boolean);

Description

Gets or sets a value indicating whether the selection highlight spans the width of the tree view control.

When System.Windows.Forms.TreeView.FullRowSelect is true, a selection highlight spans the entire width of the tree view, display rather than the width of just the tree node label. The System.Windows.Forms.TreeView.FullRowSelect property is ignored if System.Windows.Forms.TreeView.ShowLines is set to true.

bbb) Handle
ccc) HasChildren
ddd) Height
eee) HideSelection
fff) ToString

Description

Gets or sets a value indicating whether the selected tree node remains highlighted even when the tree view has lost the focus.

ggg) HotTracking
hhh) ToString

[C#] public bool HotTracking {get; set;}

[C++] public: _property bool get_HotTracking( ); public: _property void set_HotTracking(bool);

[VB] Public Property HotTracking As Boolean

[JScript] public function get HotTracking( ): Boolean; public function set HotTracking(Boolean);

Description

Gets or sets a value indicating whether a tree node label takes on the appearance of a hyperlink as the mouse pointer passes over it.

If the System.Windows.Forms.TreeView.CheckBoxes property is set to true, the System.Windows.Forms.TreeView.HotTracking property has no effect.

iii) ImageIndex
jjj) ToString

[C#] public int ImageIndex {get; set;}

[C++] public: _property int get ImageIndex( ); public: _property void set_ImageIndex(int);

[VB] Public Property ImageIndex As Integer

[JScript] public function get ImageIndex( ): int; public function set ImageIndex(int);

Description

Gets or sets the image-list index value of the default image that is displayed by the tree nodes.

The System.Windows.Forms.TreeView.ImageIndex value is the index of an System.Drawing.Image stored in the System.Windows.Forms.ImageList object assigned to the System.Windows.Forms.TreeView.ImageList property.

kkk) ImageList
lll) ToString

[C#] public ImageList ImageList {get; set;}

[C++] public: _property ImageList* get_ImageList( ); public: _property void set_ImageList(ImageList*);

[VB] Public Property ImageList As ImageList

[JScript] public function get ImageList( ): ImageList; public function set ImageList (ImageList);

Description

Gets or sets the System.Windows.Forms.ImageList that contains the System.Drawing.Image objects used by the tree nodes.

If the System.Windows.Forms.ImageList property value is anything other than null, all the tree nodes display the first System.Drawing.Image stored in the System.Windows.Forms.ImageList.

mmm) ImeMode
nnn) Indent
ooo) ToString

Description

Gets or sets the distance to indent each of the child tree node levels.

ppp) InvokeRequired
qqq) IsAccessible
rrr) IsDisposed
sss) IsHandleCreated
ttt) ItemHeight
uuu) ToString Description Gets or sets the height of each tree node in the tree view control.

vvv) LabelEdit
www) ToString

[C#] public bool LabelEdit {get; set;}

[C++] public: _property bool get_LabelEdit( ); public: _property void set_LabelEdit(bool);

[VB] Public Property LabelEdit As Boolean

[JScript] public function get LabelEdit( ): Boolean; public function set LabelEdit(Boolean);

Description

Gets or sets a value indicating whether the label text of the tree nodes can be edited.

The System.Windows.Forms.TreeNode.BeginEdit method works only if the System.Windows.Forms.TreeView.LabelEdit property is true. If System.Windows.Forms.TreeView.LabelEdit is false when you attempt to edit the label, an exception will be thrown and the tree node will not be put in to an editable state.

xxx) Left
yyy) Location
zzz) Name
aaaa) Nodes
bbbb) ToString

Description

Gets the collection of tree nodes that are assigned to the tree view control.

The System.Windows.Forms.TreeView.Nodes property holds a collection of System.Windows.Forms.TreeNode objects, each of which has a System.Windows.Forms. TreeNode.Nodes property that can contain its own System. Windows.Forms.TreeNodeCollection. This nesting of tree nodes can make it difficult to navigate a tree structure, but the System.Windows.Forms.TreeNode.FullPath property makes it easier to determine your location within the tree structure.

cccc) Parent
dddd) PathSeparator
eeee) ToString

Description

Gets or sets the delimiter string that the tree node path uses.

The tree node path consists of a set of tree node labels separated by the System.Windows.Forms.TreeView. PathSeparator delimiter strings. The labels range from the root tree node to the tree node that you want.

ffff) ProductName
gggg) ProductVersion
hhhh) RecreatingHandle
iiii) Region
jjjj) RenderRightToLeft
kkkk) ResizeRedraw
llll) Right
mmmm) RightToLeft
nnnn) Scrollable
oooo) ToString Description Gets or sets a value indicating whether the tree view control displays scroll bars when they are needed.

If this property is set to true scroll bars are displayed on the System.Windows.Forms.TreeView when any System.Windows.Forms.TreeNode object is located outside the control's client region.

pppp) SelectedImageIndex
qqqq) ToString

[C#] public int SelectedImageIndex {get; set;}

[C++] public: _property int get_SelectedImageIndex( ); public: property void set_SelectedImageIndex(int);

[VB] Public Property SelectedImageIndex As Integer

[JScript] public function get SelectedImageIndex( ): int; public function set SelectedImageIndex(int);

Description

Gets or sets the image list index value of the image that is displayed when a tree node is selected.

The System.Windows.Forms.TreeView.SelectedImageIndex value is the index of an System.Drawing.Image stored in the System.Windows.Forms.ImageList object assigned to the System.Windows.Forms.TreeView.ImageList property.

rrrr) SelectedNode
ssss) ToString

[C#] public TreeNode SelectedNode {get; set;}

[C++] public: _property TreeNode* get_SelectedNode( ); public: _property void set_SelectedNode(TreeNode*);

[VB] Public Property SelectedNode As TreeNode

[JScript] public function get SelectedNode( ): TreeNode; public function set SelectedNode(TreeNode);

Description

Gets or sets the tree node that is currently selected in the tree view control.

If no System.Windows.Forms.TreeNode is currently selected, the System.Windows.Forms.TreeView. Selected Node property is null.

tttt) ShowFocusCues
uuuu) ShowKeyboardCues
vvvv) ShowLines
wwww) ToString

Description

Gets or sets a value indicating whether lines are drawn between tree nodes in the tree view control.

If System.Windows.Forms.TreeView.ShowLines is set to true, the System.Windows.Forms.TreeView.FullRowSelect property is ignored.

xxxx) ShowPlusMinus
yyyy) ToString

[C#] public bool ShowPlusMinus {get; set;}

[C++] public: _property bool get_ShowPlusMinus( ); public: _property void set_ShowPlusMinus(bool);

[VB] Public Property ShowPlusMinus As Boolean

[JScript] public function get ShowPlusMinus( ): Boolean; public function set ShowPlusMinus(Boolean);

Description

Gets or sets a value indicating whether plus-sign (+) and minus-sign (−) buttons are displayed next to tree nodes that contain child tree nodes.

The plus-sign and minus-sign buttons appear next to the root tree nodes only if the System.Windows.Forms.TreeView.ShowRootLines property is true. If the plus-sign and minus-sign buttons are not displayed, no visual cue exists to indicate that the tree node contains child tree nodes and is expandable. The user then must double-click a tree node to determine whether it contains child tree nodes, to expand it, or to collapse it.

zzzz) ShowRootLines
aaaaa) ToString

[C#] public bool ShowRootLines {get; set;}

[C++] public: _property bool get_ShowRootLines( ); public: _property void set_ShowRootLines(bool);

[VB] Public Property ShowRootLines As Boolean

[JScript] public function get ShowRootLines( ): Boolean; public function set ShowRootLines(Boolean);

Description

Gets or sets a value indicating whether lines are drawn between the tree nodes that are at the root of the tree view.

If the System.Windows.Forms.TreeView.ShowRootLines property is false, the plus-sign and minus-sign buttons will not appear next to the root tree nodes, and the System.Windows.Forms.TreeView.ShowPlusMinus property will have no effect.

bbbbb) Site
ccccc) Size
ddddd) Sorted eeeee) ToString

Description

Gets or sets a value indicating whether the tree nodes in the tree view are sorted.

When System.Windows.Forms.TreeView.Sorted is set to true, the System.Windows.Forms.TreeNode objects are sorted in alphabetical order.

fffff) TabIndex ggggg) TabStop hhhhh) Tag iiiii) Text jjjjj) ToString

Description kkkkk) Top lllll) TopLevelControl mmmmm) TopNode nnnnn) ToString

Description

Gets the first fully-visible tree node in the tree view control.

Initially, the System.Windows.Forms.TreeView.TopNode returns the first root tree node, which is located at the top of the System.Windows.Forms.TreeView. However, if the user has scrolled the contents, another tree node might be at the top.

ooooo) Visible ppppp) VisibleCount qqqqq) ToString

Description

Gets the number of tree nodes that can be fully visible in the tree view control.

The System.Windows.Forms.TreeView.VisibleCount value can be greater than the number of tree nodes in the tree view. The value is calculated by dividing the height of the client window by the height of a tree node item. The result is the total number of System.Windows.Forms.TreeNode objects that the System.Windows.Forms.TreeView is capable of displaying within its current dimensions.

rrrrr) Width sssss) WindowTarget ttttt) ToString

Description

Occurs after the tree node check box is checked.

For more information about handling events, see.

uuuuu) ToString

[C++] public event TreeViewEventHandler AfterCollapse;

[C++] public: _event TreeViewEventHandler* AfterCollapse;

[VB] Public Event AfterCollapse As TreeViewEventHandler

Description

Occurs after the tree node is collapsed.

For more information about handling events, see.

vvvvv) ToString

[C#] public event TreeViewEventHandler AfterExpand;

[C++] public: _event TreeViewEventHandler* AfterExpand;

[VB] Public Event AfterExpand As TreeViewEventHandler

Description

Occurs after the tree node is expanded.

For more information about handling events, see.

wwwww) ToString

[C#] public event NodeLabelEditEventHandler AfterLabelEdit;

[C++] public: _event NodeLabelEditEventHandler* AfterLabelEdit;

[VB] Public Event AfterLabelEdit As NodeLabelEditEventHandler

Description

Occurs after the tree node label text is edited.

For more information about handling events, see.

xxxxx) ToString

[C#] public event TreeViewEventHandler AfterSelect;

[C++] public: _event TreeViewEventHandler* AfterSelect;

[VB] Public Event AfterSelect As TreeViewEventHandler

Description

Occurs after the tree node is selected.

For more information about handling events, see.

yyyyy) ToString

Description

Occurs before the tree node check box is checked.

For more information about handling events, see.

zzzzz) ToString

[C#] public event TreeViewCancelEventHandler BeforeCollapse;

[C++] public: _event TreeViewCancelEventHandler* Before Collapse;

[VB] Public Event BeforeCollapse As TreeViewCancelEventHandler

Description

Occurs before the tree node is collapsed.

For more information about handling events, see.

aaaaaa) ToString

[C#] public event TreeViewCancelEventHandler BeforeExpand;

[C++] public: _event TreeViewCancelEventHandler* Before Expand;

[VB] Public Event BeforeExpand As TreeViewCancelEventHandler

Description

Occurs before the tree node is expanded.

For more information about handling events, see.

bbbbbb) ToString

[C#] public event NodeLabelEditEventHandler BeforeLabelEdit;

[C++] public: _event NodeLabelEditEventHandler* Before LabelEdit;

[VB] Public Event BeforeLabelEdit As NodeLabelEditEventHandler

Description

Occurs before the tree node label text is edited.

For more information about handling events, see.

cccccc) ToString

[C#] public event TreeViewCancelEventHandler BeforeSelect;

[C++] public: _event TreeViewCancelEventHandler* BeforeSelect;

[VB] Public Event BeforeSelect As TreeViewCancelEventHandler

Description

Occurs before the tree node is selected.

For more information about handling events, see.

dddddd) ToString

Description

Occurs when an item is dragged into the tree view control.

For more information about handling events, see.

eeeeee) Begin Update

[C#] public void BeginUpdate( );

[C++] public: void BeginUpdate( );

[VB] Public Sub BeginUpdate( )

[JScript] public function BeginUpdate( );

Description

Disables any redrawing of the tree view.

To maintain performance while items are added one at a time to the System.Windows.Forms.TreeView, call the System.Windows.Forms.TreeView.BeginUpdate method. The System.Windows.Forms.TreeView.BeginUpdate method prevents the control from painting until the System.Windows.Forms.TreeView.EndUpdate method is called.

ffffff) CollapseAll

[C#] public void CollapseAll( );

[C++] public: void CollapseAll( );

[VB] Public Sub CollapseAll( )

[JScript] public function CollapseAll( );

Description

Collapses all the tree nodes.

The System.Windows.Forms.TreeView.CollapseAll method collapses all the System.Windows.Forms.TreeNode objects, including all the child tree nodes, that are in the System.Windows.Forms.TreeView control.

gggggg) CreateHandle

[C#] protected override void CreateHandle( );

[C++] protected: void CreateHandle( );

[VB] Overrides Protected Sub CreateHandle( )

[JScript] protected override function CreateHandle( );

Description hhhhhh) Dispose

[C#] protected override void Dispose(bool disposing);

[C++] protected: void Dispose(bool disposing);

[VB] Overrides Protected Sub Dispose(ByVal disposing As Boolean)

[JScript] protected override function Dispose(disposing: Boolean);

Description iiiiii) EndUpdate

[C#] public void EndUpdate( );

[C++] public: void EndUpdate( );

[VB] Public Sub EndUpdate( )

[JScript] public function EndUpdate( );

Description

Enables the redrawing of the tree view.

To maintain performance while items are added one at a time to the System.Windows.Forms.TreeView, call the System.Windows.Forms.TreeView.BeginUpdate method. The System.Windows.Forms.TreeView.BeginUpdate method prevents the control from painting until the System.Windows.Forms.TreeView.EndUpdate method is called.

jjjjjj) ExpandAll

[C#] public void ExpandAll( );

[C++] public: void ExpandAll( );

[VB] Public Sub ExpandAll( )

[JScript] public function ExpandAll( );

Description

Expands all the tree nodes.

The System.Windows.Forms.TreeView.ExpandAll method expands all the System.Windows.Forms.TreeNode objects, including all the child tree nodes, that are in the System.Windows.Forms.TreeView control.

kkkkkk) GetItemRenderStyles

[C#] protected OwnerDrawPropertyBag GetItemRenderStyles(TreeNode node, int state);

[C++] protected: OwnerDrawPropertyBag* GetItemRenderStyles(TreeNode* node, int state);

[VB] Protected Function GetItemRenderStyles(ByVal node As TreeNode, ByVal state As Integer) As OwnerDrawPropertyBag

[JScript] protected function GetItemRenderStyles(node: TreeNode, state: int) OwnerDrawPropertyBag;

Description

Generates colors for each item. This can be overridden to provide colors on a per state/per node basis, rather than using the ForeColor/BackColor/NodeFont properties on TreeNode.

Return Value: an OwnerDrawPropertyBag object containing the font and colors Generates colors for each item. This can be overridden to provide colors on a per state/per node basis, rather than using the ForeColor/BackColor/NodeFont properties on TreeNode. the TreeNode currently being drawn the NMCUSTOMDRAW style bits for this node llllll) GetNodeAt

[C#] public TreeNode GetNodeAt(Point pt);

[C++] public: TreeNode* GetNodeAt(Point pt);

[VB] Public Function GetNodeAt(ByVal pt As Point) As TreeNode

[JScript] public function GetNodeAt(pt: Point): TreeNode; Retrieves the tree node that is at the specified location.

Description

Retrieves the tree node that is at the specified point.

Return Value: The System.Windows.Forms.TreeNode at the specified point, in tree view coordinates.

You can pass the System.Windows.Forms.MouseEvent Args.X and System.Windows.Forms.MouseEventArgs.Y coordinates of the System.Windows.Forms.Control. Mouse-Down event as the System.Drawing.Point.X and System. Drawing.Point.Y values of a new System.Drawing.Point object. The System.Drawing.Point to evaluate and retrieve the node from.

mmmmmmm) GetNodeAt

[C#] public TreeNode GetNodeAt(int x, int y);

[C++] public: TreeNode* GetNodeAt(int x, int y);

[VB] Public Function GetNodeAt(ByVal x As Integer, ByVal y As Integer) As TreeNode

[JScript] public function GetNodeAt(x: int, y: int): TreeNode;

Description

Retrieves the tree node at the point with the specified coordinates.

Return Value: The System.Windows.Forms.TreeNode at the specified location, in tree view coordinates.

You can pass the System.Windows.Forms.MouseEvent Args.X and System.Windows.Forms.MouseEventArgs.Y coordinates of the System.Windows.Forms.Control. Mouse-Down event as the x and y parameters. The System. Drawing.Point.X position to evaluate and retrieve the node from. The System.Drawing.Point.Y position to evaluate and retrieve the node from.

nnnnnn) GetNodeCount

[C#] public int GetNodeCount(bool includeSubTrees);

[C++] public: int GetNodeCount(bool includeSubTrees);

[VB] Public Function GetNodeCount(ByVal includeSubTrees As Boolean) As Integer

[JScript] public function GetNodeCount(includeSubTrees: Boolean): int;

Description

Retrieves the number of tree nodes, optionally including those in all subtrees, assigned to the tree view control.

Return Value: The number of tree nodes, optionally including those in all subtrees, assigned to the tree view control.

If includeSubTrees is true, the result is the number of all the tree nodes in the entire tree structure. true to count the System.Windows.Forms.TreeNode items that the subtrees contain; otherwise, false.

oooooo) IsInputKey

[C#] protected override bool IsInputKey(Keys keyData);

[C++] protected: bool IsInputKey(Keys keyData);

[VB] Overrides Protected Function IsInputKey(ByVal keyData As Keys) As Boolean

[JScript] protected override function IsInputKey(keyData: Keys): Boolean;

Description

Overridden to handle RETURN key.

pppppp) OnAfterCheck

[C#] protected virtual void OnAfterCheck(TreeViewEvent Args e);

[C++] protected: virtual void OnAfterCheck(TreeViewEvent Args* e);

[VB] Overridable Protected Sub OnAfterCheck(ByVal e As TreeViewEventArgs)

[JScript] protected function OnAfterCheck(e: TreeViewEventArgs);

Description

Raises the System.Windows.Forms.TreeView.AfterCheck event.

Raising an event invokes the event handler through a delegate. For more information, see. A System.Windows.Forms.TreeViewEventArgs that contains the event data.

qqqqqq) OnAfterCollapse

[C+] protected virtual void OnAfterCollapse(TreeViewEvent Args e);

[C++] protected: virtual void OnAfterCollapse(TreeViewEventArgs* e);

[VB] Overridable Protected Sub OnAfterCollapse(ByVal e As TreeViewEventArgs)

[JScript] protected function OnAfterCollapse(e: TreeViewEventArgs);

Description

Raises the System.Windows.Forms.TreeView.AfterCollapse event.

Raising an event invokes the event handler through a delegate. For more information, see. A System.Windows.Forms.TreeViewEventArgs that contains the event data.

rrrrrr) OnAfterExpand

[C#] protected virtual void OnAfterExpand(TreeViewEvent Args e);

[C++] protected: virtual void OnAfterExpand(TreeViewEventArgs* e);

[VB] Overridable Protected Sub OnAfterExpand(ByVal e As TreeViewEventArgs)

[JScript] protected function OnAfterExpand(e: TreeViewEventArgs);

Description

Raises the System.Windows.Forms.TreeView.AfterExpand event.

Raising an event invokes the event handler through a delegate. For more information, see. A System.Windows.Forms.TreeViewEventArgs that contains the event data.

ssssss) OnAfterLabelEdit

[C#] protected virtual void OnAfterLabelEdit(NodeLabelEditEventArgs e);

[C++] protected: virtual void OnAfterLabelEdit(NodeLabelEditEventArgs* e);

[VB] Overridable Protected Sub OnAfterLabelEdit(ByVal e As NodeLabelEditEventArgs)

[JScript] protected function OnAfterLabelEdit(e: NodeLabelEditEventArgs);

Description

Raises the System.Windows.Forms.TreeView. AfterLabelEdit event.

Raising an event invokes the event handler through a delegate. For more information, see. A System.Windows.Forms.NodeLabelEditEventArgs that contains the event data.

tttttt) OnAfterSelect

[C#] protected virtual void OnAfterSelect(TreeViewEvent Args e);

[C++] protected: virtual void OnAfterSelect(TreeViewEvent Args* e);

[VB] Overridable Protected Sub OnAfterSelect(ByVal e As TreeViewEventArgs)

[JScript] protected function OnAfterSelect(e: TreeViewEventArgs);

Description

Raises the System.Windows.Forms.TreeView.AfterSelect event.

Raising an event invokes the event handler through a delegate. For more information, see. A System.Windows.Forms.TreeViewEventArgs that contains the event data.

uuuuuu) OnBeforeCheck

[C#] protected virtual void OnBeforeCheck(TreeViewCancelEventArgs e);

[C++] protected: virtual void OnBeforeCheck(TreeViewCancelEventArgs* e);

[VB] Overridable Protected Sub OnBeforeCheck(ByVal e As TreeViewCancelEventArgs)

[JScript] protected function OnBeforeCheck(e: TreeViewCancelEventArgs);

Description

Raises the System.Windows.Forms.TreeView.BeforeCheck event.

Raising an event invokes the event handler through a delegate. For more information, see. A System.Windows.Forms.TreeViewCancelEventArgs that contains the event data.

vvvvvv) OnBeforeCollapse

[C#] protected virtual void OnBeforeCollapse(TreeViewCancelEventArgs e);

[C++] protected: virtual void OnBeforeCollapse(TreeViewCancelEventArgs* e);

[VB] Overridable Protected Sub OnBeforeCollapse(ByVal e As TreeViewCancelEventArgs)

[JScript] protected function OnBeforeCollapse(e: TreeViewCancelEventArgs);

Description

Raises the System.Windows.Forms.TreeView.BeforeCollapse event.

Raising an event invokes the event handler through a delegate. For more information, see. A System.Windows.Forms.TreeViewCancelEventArgs that contains the event data.

wwwwww) OnBeforeExpand

[C#] protected virtual void OnBeforeExpand(TreeViewCancelEventArgs e);

[C++] protected: virtual void OnBeforeExpand(TreeViewCancelEventArgs* e);

[VB] Overridable Protected Sub OnBeforeExpand(ByVal e As TreeViewCancelEventArgs)

[JScript] protected function OnBeforeExpand(e: TreeViewCancelEventArgs);

Description

Raises the System.Windows.Forms.TreeView.BeforeExpand event.

Raising an event invokes the event handler through a delegate. For more information, see. A System.Windows.Forms.TreeViewCancelEventArgs that contains the event data.

xxxxxx) OnBeforeLabelEdit

[C#] protected virtual void OnBeforeLabelEdit(NodeLabelEditEventArgs e);

[C++] protected: virtual void OnBeforeLabelEdit(NodeLabelEditEventArgs* e);

[VB] Overridable Protected Sub OnBeforeLabelEdit(ByVal e As NodeLabelEditEventArgs)

[JScript] protected function OnBeforeLabelEdit(e: NodeLabelEditEventArgs);

Description

Raises the System.Windows.Forms.TreeView.BeforeLabelEdit event.

Raising an event invokes the event handler through a delegate. For more information, see. A System.Windows.Forms.NodeLabelEditEventArgs that contains the event data.

yyyyyy) OnBeforeSelect

[C#] protected virtual void OnBeforeSelect(TreeViewCancelEventArgs e);

[C++] protected: virtual void OnBeforeSelect(TreeViewCancelEventArgs* e);

[VB] Overridable Protected Sub OnBeforeSelect(ByVal e As TreeViewCancelEventArgs)

[JScript] protected function OnBeforeSelect(e: TreeViewCancelEventArgs);

Description

Raises the System.Windows.Forms.TreeView.BeforeSelect event.

Raising an event invokes the event handler through a delegate. For more information, see. A System.Windows.Forms.TreeViewCancelEventArgs that contains the event data.

zzzzzz) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description aaaaaaa) OnHandleDestroyed

[C#] protected override void OnHandleDestroyed(EventArgs e);

[C++] protected: void OnHandleDestroyed(EventArgs* e);

[VB] Overrides Protected Sub OnHandleDestroyed(ByVal e As EventArgs)

[JScript] protected override function OnHandleDestroyed(e: EventArgs);

Description bbbbbbb) OnItemDrag

[C#] protected virtual void OnItemDrag(ItemDragEventArgs e);

[C++] protected: virtual void OnItemDrag(ItemDragEvent Args* e);

[VB] Overridable Protected Sub OnItemDrag(ByVal e As ItemDragEventArgs)

[JScript] protected function OnItemDrag(e: ItemDragEvent Args);

Description

Raises the System.Windows.Forms.TreeView.ItemDrag event.

Raising an event invokes the event handler through a delegate. For more information, see. An System.Windows.Forms. ItemDragEventArgs that contains the event data.

ccccccc) OnKeyDown

[C#] protected override void OnKeyDown(KeyEventArgs e);

[C++] protected: void OnKeyDown(KeyEventArgs* e);

[VB] Overrides Protected Sub OnKeyDown(ByVal e As KeyEventArgs)

[JScript] protected override function OnKeyDown(e: KeyEventArgs);

Description

Handles the OnBeforeCheck/OnAfterCheck for keyboard clicks Handles the OnBeforeCheck/OnAfterCheck for keyboard clicks ddddddd) OnKeyPress

[C#] protected override void OnKeyPress(KeyPressEvent Args e);

[C++] protected: void OnKeyPress(KeyPressEventArgs* e);

[VB] Overrides Protected Sub OnKeyPress(ByVal e As KeyPressEventArgs)

[JScript] protected override function OnKeyPress(e: KeyPressEventArgs);

Description

Handles the OnBeforeCheck/OnAfterCheck for keyboard clicks Handles the OnBeforeCheck/OnAfterCheck for keyboard clicks eeeeeee) OnKeyUp

[C#] protected override void OnKeyUp(KeyEventArgs e);

[C++] protected: void OnKeyUp(KeyEventArgs* e);

[VB] Overrides Protected Sub OnKeyUp(ByVal e As KeyEventArgs)

[JScript] protected override function OnKeyUp(e: KeyEvent Args);

Description

Handles the OnBeforeCheck/OnAfterCheck for keyboard clicks Handles the OnBeforeCheck/OnAfterCheck for keyboard clicks fffffff) ToString

[C#] public override string ToString( );

[C++] public: String* ToString( );

[VB] Overrides Public Function ToString( ) As String

[JScript] public override function ToString( ): String;

Description

Returns a string representation for this control.

Return Value String Returns a string representation for this control.

ggggggg) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

TreeViewAction enumeration (System.Windows.Forms)

a) WndProc

Description

Specifies the action that raised a System.Windows.Forms. TreeViewEventArgs event.

This enumeration is used by members such as the System.Windows.Forms.TreeViewEventArgs.#ctor constructor.

b) WndProc

[C#] public const TreeViewAction ByKeyboard;

[C++] public: const TreeViewAction ByKeyboard;

[VB] Public Const ByKeyboard As TreeViewAction

[JScript] public var ByKeyboard: TreeViewAction;

Description

The event was caused by a keystroke.

c) WndProc

[C#] public const TreeViewAction ByMouse;

[C++] public: const TreeViewAction ByMouse;

[VB] Public Const ByMouse As TreeViewAction

[JScript] public var ByMouse: TreeViewAction;

Description

The event was caused by a mouse operation.

d) WndProc

[C#] public const TreeViewAction Collapse;

[C++] public: const TreeViewAction Collapse;

[VB] Public Const Collapse As TreeViewAction

[JScript] public var Collapse: TreeViewAction;

Description

The event was caused by the System.Windows.Forms. TreeNode collapsing.

e) WndProc

[C#] public const TreeViewAction Expand;

[C++] public: const TreeViewAction Expand;

[VB] Public Const Expand As TreeViewAction

[JScript] public var Expand: TreeViewAction;

Description

The event was caused by the System.Windows.Forms. TreeNode expanding.

f) WndProc

[C#] public const TreeViewAction Unknown;

[C++] public: const TreeViewAction Unknown;

[VB] Public Const Unknown As TreeViewAction

[JScript] public var Unknown: TreeViewAction;

Description

The action that caused the event is unknown.

TreeViewCancelEventArgs class (System.Windows. Forms)

a) ToString

Description

Provides data for the System.Windows.Forms.TreeView.BeforeCheck, System.Windows.Forms.TreeView.Before Collapse, System.Windows.Forms.TreeView.BeforeExpand, or System.Windows.Forms.TreeView.BeforeSelect events of a System.Windows.Forms.TreeView control.

For more information about handling events, see.

b) TreeViewCancelEventArgs

Example Syntax:

c) ToString

[C#] public TreeViewCancelEventArgs(TreeNode node, bool cancel, TreeViewAction action);

[C++] public: TreeViewCancelEventArgs(TreeNode* node, bool cancel, TreeViewAction action);

[VB] Public Sub New(ByVal node As TreeNode, ByVal cancel As Boolean, ByVal action As TreeViewAction)

[JScript] public function TreeViewCancelEventArgs(node: TreeNode, cancel: Boolean, action: TreeViewAction);

Description

Initializes a new instance of the System.Windows.Forms. TreeViewCancelEventArgs class with the specified tree node, a value specifying whether the event is to be canceled, and the type of tree view action that raised the event. The System. Windows.Forms.TreeNode that the event is responding to. true to cancel the event; otherwise, false. The type of System. Windows.Forms.TreeViewAction that raised the event.

d) Action e) ToString

[C#] public TreeViewAction Action {get;}

[C++] public: _property TreeViewAction get_Action( );

[VB] Public ReadOnly Property Action As TreeViewAction

[JScript] public function get Action( ): TreeViewAction;

Description

Gets the type of System.Windows.Forms.TreeViewAction that raised the event.

f) Cancel g) Node h) ToString

Description

Gets the tree node to be checked, expanded, collapsed, or selected.

TreeViewCancelEventHandler delegate (System.Windows.Forms)

a) ToString

Description

Represents the method that will handle the System.Windows. Forms.TreeView.BeforeCheck, System.Windows.Forms. TreeView.BeforeCollapse, System.Windows.Forms.TreeView.BeforeExpand, or System.Windows.Forms.TreeView. BeforeSelect event of a System.Windows.Forms.TreeView. The source of the event. A System.Windows.Forms.TreeViewCancelEventArgs that contains the event data.

When you create a System.Windows.Forms.TreeViewCancelEventArgs delegate, you identify the method that will handle the event. To associate the event with your event handler, add an instance of the delegate to the event. The event handler is called whenever the event occurs, unless you remove the delegate. For more information about event handler delegates, see.

TreeViewEventArgs class (System.Windows.Forms)

a) ToString

Description

Provides data for the System.Windows.Forms.TreeView.AfterCheck, System.Windows.Forms.TreeView. AfterCollapse, System.Windows.Forms.TreeView.AfterExpand, or System.Windows.Forms.TreeView.AfterSelect events of a System.Windows.Forms.TreeView control.

For more information about handling events, see.

b) TreeViewEventArgs

Example Syntax:

c) ToString

[C#] public TreeViewEventArgs(TreeNode node);

[C++] public: TreeViewEventArgs(TreeNode* node);

[VB] Public Sub New(ByVal node As TreeNode)

[JScript] public function TreeViewEventArgs(node: TreeNode); Initializes a new instance of the System.Windows.Forms.TreeViewEventArgs class.

Description

Initializes a new instance of the System.Windows.Forms. TreeViewEventArgs class for the specified tree node. The System.Windows.Forms.TreeNode that the event is responding to.

d) TreeViewEventArgs

Example Syntax:

e) ToString

[C#] public TreeViewEventArgs(TreeNode node, TreeViewAction action);

[C++] public: TreeViewEventArgs(TreeNode* node, TreeViewAction action);

[VB] Public Sub New(ByVal node As TreeNode, ByVal action As TreeViewAction)

[JScript] public function TreeViewEventArgs(node: TreeNode, action: TreeViewAction);

Description

Initializes a new instance of the System.Windows.Forms.TreeViewEventArgs class for the specified tree node and with the specified type of action that raised the event. The System.Windows.Forms.TreeNode that the event is responding to. The type of System.Windows.Forms.TreeViewAction that raised the event.

f) Action g) ToString

[C#] public TreeViewAction Action {get;}

[C++] public: _property TreeViewAction get_Action( );

[VB] Public ReadOnly Property Action As TreeViewAction

[JScript] public function get Action( ): TreeViewAction;

Description

Gets the type of action that raised the event.

h) Node i) ToString

[C#] public TreeNode Node {get;}

[C++] public: _property TreeNode* get Node( );

[VB] Public ReadOnly Property Node As TreeNode

[JScript] public function get Node( ): TreeNode;

Description

Gets the tree node that has been checked, expanded, collapsed, or selected.

TreeViewEventHandler delegate (System.Windows.Forms)

a) ToString

Description

Represents the method that will handle the System.Windows.Forms.TreeView.AfterCheck, System.Windows.Forms. Tree View.AfterCollapse, System.Windows.Forms.TreeView.AfterExpand, or System.Windows.Forms.TreeView. After Select event of a System.Windows.Forms.TreeView. The source of the event. A System.Windows.Forms.TreeViewEventArgs that contains the event data.

When you create a System.Windows.Forms.TreeViewEventArgs delegate, you identify the method that will handle the event. To associate the event with your event handler, add an instance of the delegate to the event. The event handler is called whenever the event occurs, unless you remove the delegate. For more information about event handler delegates, see.

TreeViewImageIndexConverter class (System.Windows.Forms)

a) ToString

Description

Provides a type converter to convert data for an image index to and from one data type to another for use by the System.Windows.Forms.TreeView control.

For more information about type converters, see the System.ComponentModel.TypeConverter base class and.

b) TreeViewImageIndexConverter

Example Syntax:

c) ToString

[C#] public TreeViewImageIndexConverter( );

[C++] public: TreeViewImageIndexConverter( );

[VB] Public Sub New( )

[JScript] public function TreeViewImageIndexConverter( );

d) IncludeNoneAsStandardValue e) ToString

[C#] protected override bool IncludeNoneAsStandardValue {get;}

[C++] protected: property virtual bool get_IncludeNoneAsStandardValue( );

[VB] Overrides Protected ReadOnly Property IncludeNone AsStandardValue As Boolean

[JScript] protected function get IncludeNoneAsStandardValue( ): Boolean;

Description

Gets a value indicating whether a none or null value is valid in the System.ComponentModel.TypeConverter.Standard ValuesCollection collection.

As implemented in this class, this property always returns false.

AxHost.TypeLibraryTimeStampAttribute class (System.Windows.Forms)

a) ToString b) AxHost.TypeLibraryTimeStampAttribute

Example Syntax:

c) ToString d) TypeId e) Value f) ToString

UICues enumeration (System.Windows.Forms)

a) ToString

Description

Specifies the state of the user interface.

This enumeration is used by members such as the System.Windows.Forms.UICuesEventArgs.#ctor constructor.

b) ToString

[C#] public const UICues Changed;

[C++] public: const UICues Changed;

[VB] Public Const Changed As UICues

[JScript] public var Changed: UICues;

Description

The state of the focus cues and keyboard cues has changed.

c) ToString

[C#] public const UICues ChangeFocus;

[C++] public: const UICues ChangeFocus;

[VB] Public Const ChangeFocus As UICues

[JScript] public var ChangeFocus: UICues;

Description

The state of the focus cues has changed.

d) ToString

[C#] public const UICues ChangeKeyboard;

[C++] public: const UICues ChangeKeyboard;

[VB] Public Const ChangeKeyboard As UICues

[JScript] public var ChangeKeyboard: UICues;

Description

The state of the keyboard cues has changed.

e) ToString

[C#] public const UICues None;

[C++] public: const UICues None;

[VB] Public Const None As UICues

[JScript] public var None: UICues;

Description

No change was made.

f) ToString

[C#] public const UICues ShowFocus;

[C++] public: const UICues ShowFocus;

[VB] Public Const ShowFocus As UICues

[JScript] public var ShowFocus: UICues;

Description

Focus rectangles are displayed after the change.

g) ToString

[C#] public const UICues ShowKeyboard;

[C++] public: const UICues ShowKeyboard;

[VB] Public Const ShowKeyboard As UICues

[JScript] public var ShowKeyboard: UICues;

Description

Keyboard cues are underlined after the change.

h) ToString

[C#] public const UICues Shown;

[C++] public: const UICues Shown;

[VB] Public Const Shown As UICues

[JScript] public var Shown: UICues;

Description

Focus rectangles are displayed and keyboard cues are underlined after the change.

UICuesEventArgs class (System.Windows.Forms a) ToString

Description

Provides data for the System.Windows.Forms.Control-.ChangeUICues event.

A System.Windows.Forms.UICuesEventArgs specifies which user interface feature changed and its new value.

b) UICuesEventArgs

Example Syntax:

c) ToString

[C#] public UICuesEventArgs(UICues uicues);

[C++] public: UICuesEventArgs(UICues uicues);

[VB] Public Sub New(ByVal uicues As UICues)

[JScript] public function UICuesEventArgs(uicues UICues);

Description

Initializes a new instance of the System.Windows.Forms.UICuesEventArgs class with the specified System.Windows.Forms.UICues. A bitwise combination of the System.Windows.Forms.UICues values.

d) Changed e) ToString

[C#] public UICues Changed {get;}

[C++] public: _property UICues get_Changed( );

[VB] Public ReadOnly Property Changed As UICues

[JScript] public function get Changed( ): UICues;

Description

Gets the bitwise combination of the System.Windows.Forms.UICues values.

f) ChangeFocus g) ToString

[C#] public bool ChangeFocus {get;}

[C++] public: _property bool get_ChangeFocus( );

[VB] Public ReadOnly Property ChangeFocus As Boolean

[JScript] public function get ChangeFocus( ): Boolean;

Description

Gets a value indicating whether the state of the focus cues has changed.

h) ChangeKeyboard i) ToString

[C#] public bool ChangeKeyboard {get;}

[C++] public: _property bool get_ChangeKeyboard( );

[VB] Public ReadOnly Property ChangeKeyboard As Boolean

[JScript] public function get ChangeKeyboard( ): Boolean;

Description

Gets a value indicating whether the state of the keyboard cues has changed.

j) ShowFocus k) ToString

[C#] public bool ShowFocus {get;}

[C++] public: _property bool get_ShowFocus( );

[VB] Public ReadOnly Property ShowFocus As Boolean

[JScript] public function get ShowFocus( ): Boolean;

Description

Gets a value indicating whether focus rectangles are shown after the change.

l) ShowKeyboard m) ToString

[C#] public bool ShowKeyboard {get;}

[C++] public: _property bool get ShowKeyboard( );

[VB] Public ReadOnly Property ShowKeyboard As Boolean

[JScript] public function get ShowKeyboard( ): Boolean;

Description

Gets a value indicating whether keyboard cues are underlined after the change.

UICuesEventHandler delegate (System.Windows.Forms)

a) ToString

Description

Represents a method that will handle the System.Windows.Forms.Control.ChangeUICues event of a System.Windows.Forms.Control. The source of the event. A System.Windows.Forms.UICuesEventArgs that contains the event data.

When you create a System.Windows.Forms.UICuesEventHandier delegate, you identify the method that will handle the event. To associate the event with your event handler, add an instance of the delegate to the event. The event handler is called whenever the event occurs, unless you remove the delegate. For more information about handling events with delegates, see.

UpDownBase class (System.Windows.Forms)

a) ToString

Description

Implements the basic functionality required by an up-down control.

The up-down control consists of a text box and a small vertical scroll bar, commonly referred to as a spinner control. The System.Windows.Forms.UpDownBase class links the two controls and allows the user to change the display in the text box by clicking the up or down buttons or by entering the appropriate type of value directly into the text box. Use the up-down control in cases where you want to limit the list of values a user may select, similar to a list box or combo box. Depending upon the type of list you wish to display, the advantage to using an up-down control is that it allows you to quickly set a range of valid values, rather than adding items one at a time. Implementing an up-down control requires less data validation than a text box, as you may limit the data type when you derive a class from System.Windows.Forms.UpDownBase. An example of this is the System.Windows.Forms.NumericUpDown class, which limits the values to the numeric type and uses a System.Windows.Forms.Numeric UpDown.Minimum and System.Windows.Forms.Numeric UpDown.Maximum property to validate the data.

b) UpDownBase

Example Syntax:

c) ToString

[C#] public UpDownBase( );

[C++] public: UpDownBase( );

[VB] Public Sub New( )

[JScript] public function UpDownBase( );

Description

Initializes a new instance of the System.Windows.Forms.UpDownBase class.

d) AccessibilityObject e) AccessibleDefaultActionDescription f) AccessibleDescription g) AccessibleName h) AccessibleRole i) ActiveControl j) AllowDrop k) Anchor l) AutoScroll m) ToString Description n) AutoScrollMargin o) ToString

[C#] public new Size AutoScrollMargin {get; set;}

[C++] public: _property Size get_AutoScrollMargin( );public: _property void set_AutoScrollMargin(Size);

[VB] Public Property AutoScrollMargin As Size

[JScript] public function get AutoScrollMargin( ): Size; public function set AutoScrollMargin(Size);

Description p) AutoScrollMinSize q) ToString

[C#] public new Size AutoScrollMinSize {get; set;}

[C++] public: _property Size get_AutoScrollMinSize( ); public: _property void set_AutoScrollMinSize(Size);

[VB] Public Property AutoScrollMinSize As Size

[JScript] public function get AutoScrollMinSize( ): Size; public function set AutoScrollMinSize(Size);

Description r) AutoScrollPosition s) BackColor t) ToString

Description

Gets or sets the background color for the text box portion of the up-down control.

u) BackgroundImage v) ToString

[C#] public override Image BackgroundImage {get; set;}

[C++] public: _property virtual Image* get_BackgroundImage( ); public: _property virtual void set_BackgroundImage (Image*);

[VB] Overrides Public Property BackgroundImage As Image

[JScript] public function get BackgroundImage( ): Image; public function set BackgroundImage(Image);

Description w) BindingContext x) BorderStyle y) ToString

Description

Gets or sets the border style for the up-down control.

You can use the System.Windows.Forms.TextBoxBase. BorderStyle property to create borderless and flat controls in addition to the default three-dimensional control.

z) Bottom aa) Bounds bb) CanFocus cc) CanSelect dd) Capture ee) CausesValidation ff) ChangingText gg) ToString Description Gets or sets a value indicating whether the text property is being changed internally by its parent class.

The System.Windows.Forms.UpDownBase.ChangingText property acts as a flag for the System.Windows.Forms.UpDownBase class. This property is used by derived classes to indicate when the class is changing the current System.Windows.Forms.UpDownBase.Text property internally. If this property is set to false, the control assumes that the user is changing the System.Windows.Forms.UpDownBase.Text property, and will set the System.Windows.Forms.UpDownBase.UserEdit property to true.

hh) ClientRectangle
ii) ClientSize
jj) CompanyName
kk) Container
ll) ContainsFocus
mm) ContextMenu
nn) ToString Description The contextMenu associated with this control. The contextMenu will be shown when the user right clicks the mouse on the control. We override this property here in UpDownBase to set the contextmenu on the child edit control.

oo) Controls
pp) Created
qq) CreateParams
rr) ToString

Description

Returns the parameters needed to create the handle. Inheriting classes can override this to provide extra functionality. They should not, however, forget to call base.getCreateParams( ) first to get the struct filled up with the basic info.

ss) Cursor
tt) DataBindings
uu) DefaultImeMode
vv) DefaultSize
ww) ToString

Description

Deriving classes can override this to configure a default size for their control. This is more efficient than setting the size in the control's constructor.

xx) DesignMode
yy) DisplayRectangle
zz) Disposing
aaa) Dock
bbb) DockPadding
ccc) ToString Description ddd) Enabled
eee) Events
fff) Focused
ggg) ToString Description Returns true if this control has focus.

hhh) Font
iii) FontHeight
jjj) ForeColor
kkk) ToString

Description

Gets or sets the foreground color for the control.

lll) Handle
mmm) HasChildren
nnn) Height
ooo) HScroll
ppp) ImeMode
qqq) InterceptArrowKeys
rrr) ToString Description Gets or sets a value indicating whether the user can use the UP ARROW and DOWN ARROW keys to select values.

If System.Windows.Forms.UpDownBase.InterceptArrowKeys is set to true and the up-down control has focus, the user may use the UP ARROW and DOWN ARROW keys to select values.

sss) InvokeRequired
ttt) IsAccessible
uuu) IsDisposed
vvv) IsHandleCreated
www) Left
xxx) Location
yyy) Name
zzz) Parent
aaaa) ParentForm
bbbb) PreferredHeight
cccc) ToString Description Gets the height of the up-down control.

The System.Windows.Forms.UpDownBase.PreferredHeight property value is based on the System.Windows.Forms.TextBoxBase. PreferredHeight property of the text box portion of the control and is adjusted for the style of border.

dddd) ProductName
eeee) ProductVersion
ffff) ReadOnly
gggg) ToString

Description

Gets or sets a value indicating whether the text may be changed by the use of the up or down buttons only.

By setting the System.Windows.Forms.UpDownBase. ReadOnly property to true, you will eliminate the need for much validation of the System.Windows.Forms.UpDownBase. Text property. The user will be restricted to the use of the up and down buttons to change the System.Windows.Forms.UpDownBase.Text values. It will only allow them to select values you specify.

hhhh) RecreatingHandle
iiii) Region
jjjj) RenderRightToLeft
kkkk) ResizeRedraw
llll) Right
mmmm) RightToLeft
nnnn) ShowFocusCues
oooo) ShowKeyboardCues
pppp) Site
qqqq) Size
rrrr) TabIndex
ssss) TabStop
tttt) Tag
uuuu) Text
vvvv) ToString Description Gets or sets the text displayed in the up-down control.

If the System.Windows.Forms.UpDownBase.Text property is set while the System.Windows.Forms.UpDownBase.UserEdit property is set to true, the System.Windows.

Forms.UpDownBase.UpdateEditText method will be called. If the System.Windows.Forms.UpDownBase.Text property is set while the System.Windows.Forms.UpDownBase.UserEdit property is set to false, System.Windows. Forms.UpDownBase.ValidateEditText will be called.

wwww) TextAlign xxxx) ToString

[C#] public HorizontalAlignment TextAlign {get; set;}

[C++] public: _property HorizontalAlignment get_TextAlign( ); public: _property void set_TextAlign(HorizontalAlignment);

[VB] Public Property TextAlign As HorizontalAlignment

[JScript] public function get TextAlign( ): HorizontalAlignment; public function set TextAlign(HorizontalAlignment);

Description

Gets or sets the alignment of the text in the up-down control.

yyyy) Top zzzz) TopLevelControl aaaaa) UpDownAlign bbbbb) ToString

Description

Gets or sets the alignment of the up and down buttons on the up-down control.

ccccc) UserEdit ddddd) ToString

[C#] protected bool UserEdit {get; set;}

[C++] protected: _property bool get_UserEdit( ); protected: _property void set_UserEdit(bool);

[VB] Protected Property UserEdit As Boolean

[JScript] protected function get UserEdit( ): Boolean; protected function set UserEdit(Boolean);

Description

Gets or sets a value indicating whether a value has been entered by the user.

If the System.Windows.Forms.UpDownBase.Text property is set while the System.Windows.Forms.UpDownBase.UserEdit property is set to true, the System.Windows. Forms.UpDownBase.UpdateEditText method is called. If the System.Windows.Forms.UpDownBase.Text property is set while the System.Windows.Forms.UpDownBase.UserEdit property is set to false, System.Windows. Forms.UpDownBase.ValidateEditText is called.

eeeee) Visible fffff) VScroll ggggg) Width hhhhh) WindowTarget iiiii) DownButton

[C#] public abstract void DownButton( );

[C++] public: virtual void DownButton( )=0;

[VB] MustOverride Public Sub DownButton( )

[JScript] public abstract function DownButton( );

Description

When overridden in a derived class, handles the pressing of the down button on the up-down control.

When overriding this method in a derived class, be sure to call the System.Windows.Forms.UpDownBase.UpdateEditText method.

jjjjj) OnChanged

[C#] protected virtual void OnChanged(object source, Event Args e);

[C++] protected: virtual void OnChanged(Object* source, EventArgs* e);

[VB] Overridable Protected Sub OnChanged(ByVal source As Object, ByVal e As EventArgs)

[JScript] protected function OnChanged(source: Object, e: EventArgs); When overridden in a derived class, raises the Changed event. event.

kkkkk) OnFontChanged

[C#] protected override void OnFontChanged(EventArgs e);

[C++] protected: void OnFontChanged(EventArgs* e);

[VB] Overrides Protected Sub OnFontChanged(ByVal e As EventArgs)

[JScript] protected override function OnFontChanged(e: EventArgs); Raises the FontChanged event.

lllll) OnHandleCreated

[C#] protected override void OnHandleCreated(EventArgs e);

[C++] protected: void OnHandleCreated(EventArgs* e);

[VB] Overrides Protected Sub OnHandleCreated(ByVal e As EventArgs)

[JScript] protected override function OnHandleCreated(e: EventArgs);

Description

Initialise the updown. Adds the edit and updown buttons.

mmmmm) OnLayout

[C#] protected override void OnLayout(LayoutEventArgs e);

[C++] protected: void OnLayout(LayoutEventArgs* e);

[VB] Overrides Protected Sub OnLayout(ByVal e As LayoutEventArgs)

[JScript] protected override function OnLayout(e: LayoutEventArgs);

Description

Handle the layout event. The size of the edit control, and the position of the UpDown control must be modified.

nnnnn) OnMouseWheel

[C#] protected override void OnMouseWheel(MouseEvent Args e);

[C++] protected: void OnMouseWheel(MouseEventArgs* e);

[VB] Overrides Protected Sub OnMouseWheel(ByVal e As MouseEventArgs)

[JScript] protected override function OnMouseWheel(e: MouseEventArgs);

Description

Raises the System.Windows.Forms.Control.MouseWheel event.

If the up-down control has focus when this event occurs, the direction the mouse wheel scrolled is determined and either the System.Windows.Forms.UpDownBase.UpButton or System.Windows.Forms.UpDownBase.DownButton method is called. A System.Windows.Forms.MouseEvent Args that contains the event data.

ooooo) OnTextBoxKeyDown

[C#] protected virtual void OnTextBoxKeyDown(object source, KeyEventArgs e);

[C++] protected: virtual void OnTextBoxKeyDown(Object* source, KeyEventArgs* e);

[VB] Overridable Protected Sub OnTextBoxKeyDown(ByVal source As Object, ByVal e As KeyEventArgs)

[JScript] protected function OnTextBoxKeyDown(source: Object, e: KeyEventArgs);

Description

Raises the System.Windows.Forms.Control.KeyDown event.

If the System.Windows.Forms.UpDownBase.Intercept ArrowKeys property is set to true and the key being pressed is the UP ARROW key, the System.Windows.Forms.UpDownBase.UpButton method is called. Likewise, if the key being pressed is the DOWN ARROW key, the System.Windows.Forms.UpDownBase.DownButton method is called. The source of the event. A System.Windows.Forms.KeyEvent Args that contains the event data.

ppppp) OnTextBoxKeyPress

[C#] protected virtual void OnTextBoxKeyPress(object source, KeyPressEventArgs e);

[C++] protected: virtual void OnTextBoxKeyPress(Object* source, KeyPressEventArgs* e);

[VB] Overridable Protected Sub OnTextBoxKeyPress(ByVal source As Object, ByVal e As KeyPressEventArgs)

[JScript] protected function OnTextBoxKeyPress(source: Object, e: KeyPressEventArgs);

Description

Raises the System.Windows.Forms.Control.KeyPress event.

Raising an event invokes the event handler through a delegate. For more information, see. The source of the event. A System.Windows.Forms.KeyPressEventArgs that contains the event data.

qqqqq) OnTextBoxLostFocus

[C#] protected virtual void OnTextBoxLostFocus(object source, EventArgs e);

[C++] protected: virtual void OnTextBoxLostFocus(Object* source, EventArgs* e);

[VB] Overridable Protected Sub OnTextBoxLostFocus(ByVal source As Object, ByVal e As EventArgs)

[JScript] protected function OnTextBoxLostFocus(source: Object, e: EventArgs);

Description

Raises the System.Windows.Forms.Control.LostFocus event.

Validates the text in the text box portion of the control when the up-down control loses focus. The source of the event. An System.EventArgs that contains the event data.

rrrrr) OnTextBoxResize

[C#] protected virtual void OnTextBoxResize(object source, EventArgs e);

[C++] protected: virtual void OnTextBoxResize(Object* source, EventArgs* e);

[VB] Overridable Protected Sub OnTextBoxResize(ByVal source As Object, ByVal e As EventArgs)

[JScript] protected function OnTextBoxResize(source: Object, e: EventArgs);

Description

Raises the System.Windows.Forms.Control.Resize event.

Adjusts the size of the up-down control when the text box portion of the control is resized. The source of the event. An System.EventArgs that contains the event data.

sssss) OnTextBoxTextChanged

[C#] protected virtual void OnTextBoxTextChanged(object source, EventArgs e);

[C++] protected: virtual void OnTextBoxTextChanged(Object* source, EventArgs* e);

[VB] Overridable Protected Sub OnTextBoxTextChanged (ByVal source As Object, ByVal e As EventArgs)

[JScript] protected function OnTextBoxTextChanged (source: Object, e: EventArgs);

Description

Raises the System.Windows.Forms.Control.TextChanged event.

Raising an event invokes the event handler through a delegate. For more information, see. The source of the event. An System.EventArgs that contains the event data.

ttttt) Select

[C#] public void Select(int start, int length);

[C++] public: void Select(int start, int length);

[VB] Public Sub Select(ByVal start As Integer, ByVal length As Integer)

[JScript] public function Select(start: int, length: int); Selects a range of text in the up-down control.

Description

Selects a range of text in the up-down control specifying the starting position and number of characters to select.

The System.Windows.Forms.UpDownBase.Select(System.Int32, System.Int32) method can be used when the up-down control gets focus, or when the System.Windows.Forms.UpDownBase.Text property fails data validation. When adding the validation code for the System.Windows.Forms.UpDownBase.ValidateEditText method in a derived class, call the System.Windows.Forms.UpDownBase.Select(System.Int32, System.Int32) method when validation fails. The position of the first character to be selected. The total number of characters to be selected.

uuuuu) SetBoundsCore

[C#] protected override void SetBoundsCore(int x, int y, int width, int height, BoundsSpecified specified);

[C++] protected: void SetBoundsCore(int x, int y, int width, int height, BoundsSpecified specified);

[VB] Overrides Protected Sub SetBoundsCore(ByVal x As Integer, ByVal y As Integer, ByVal width As Integer, ByVal height As Integer, ByVal specified As BoundsSpecified)

[JScript] protected override function SetBoundsCore(x: int, y: int, width: int, height: int, specified: BoundsSpecified);

Description

Restricts the vertical size of the control Restricts the vertical size of the control vvvvv) UpButton

[C#] public abstract void UpButton( );

[C++] public: virtual void UpButton( )=0;

[VB] MustOverride Public Sub UpButton( )

[JScript] public abstract function UpButton( );

Description

When overridden in a derived class, handles the pressing of the up button on the up-down control.

When overriding this method in a derived class, be sure to call the System.Windows.Forms.UpDownBase.UpdateEditText method.

wwwww) UpdateEditText

[C#] protected abstract void UpdateEditText( );

[C++] protected: virtual void UpdateEditText( )=0;

[VB] MustOverride Protected Sub UpdateEditText( )

[JScript] protected abstract function UpdateEditText( );

Description

When overridden in a derived class, updates the text displayed in the up-down control.

When overriding this method in a derived class, be sure to update the System.Windows.Forms.UpDownBase.Text property of the up-down control.

xxxxx) ValidateEditText

[C#] protected virtual void ValidateEditText( );

[C++] protected: virtual void ValidateEditText( );

[VB] Overridable Protected Sub ValidateEditText( )

[JScript] protected function ValidateEditText( );

Description

When overridden in a derived class, validates the text displayed in the up-down control.

Examples of validation may include comparing the text entered to the data type set in your derived class, comparing it to a list of values, or verifying it to be within a range of values.

UpDownEventArgs class (System.Windows.Forms)

a) WndProc

Description

Provides data for the UpDownEvent

UpDownEventArgs This event is triggered when a button is pushed in the updown control. The event contains information on which button was pressed.

b) UpDownEventArgs

Example Syntax:

c) WndProc

[C#] public UpDownEventArgs(int buttonPushed);

[C++] public: UpDownEventArgs(int buttonPushed);

[VB] Public Sub New(ByVal buttonPushed As Integer)

[JScript] public function UpDownEventArgs(buttonPushed: int);

Description d) ButtonID e) WndProc

[C#] public int ButtonID {get;}

[C++] public: _property int get_ButtonID( );

[VB] Public ReadOnly Property ButtonID As Integer

[JScript] public function get ButtonID( ): int;

Description

UpDownEventHandler delegate (System.Windows.Forms)

a) ToString

Description

UpDownEventHandler A delegate for an updown event handler.

UserControl class (System.Windows.Forms)

a) ToString

Description

Provides an empty control that can be used to create other controls.

By extending System.Windows.Forms.ContainerControl, System.Windows.Forms.UserControl inherits all the standard positioning and mnemonic-handling code that is necessary in a user control.

b) UserControl

Example Syntax:

c) ToString

[C#] public UserControl( );

[C++] public: UserControl( );

[VB] Public Sub New( )

[JScript] public function UserControl( );

Description

Initializes a new instance of the System.Windows.Forms.UserControl class.

You do not typically create an instance of System.Windows.Forms.UserControl. To create your own user control class, inherit from the System.Windows.Forms.UserControl class.

d) AccessibilityObject e) AccessibleDefaultActionDescription f) AccessibleDescription g) AccessibleName h) AccessibleRole i) ActiveControl j) AllowDrop k) Anchor l) AutoScroll m) AutoScrollMargin n) AutoScrollMinSize o) AutoScrollPosition p) BackColor q) BackgroundImage r) BindingContext s) Bottom t) Bounds u) CanFocus
v) CanSelect
w) Capture
x) CausesValidation
y) ClientRectangle
z) ClientSize
aa) CompanyName
bb) Container
cc) ContainsFocus
dd) ContextMenu
ee) Controls
ff) Created
gg) CreateParams
hh) Cursor
ii) DataBindings
jj) DefaultImeMode
kk) DefaultSize
ll) ToString Description The default size for this user control.
mm) DesignMode
nn) DisplayRectangle
oo) Disposing
pp) Dock
qq) DockPadding
rr) Enabled
ss) Events
tt) Focused
uu) Font
vv) FontHeight
ww) ForeColor
xx) Handle
yy) HasChildren
zz) Height
aaa) HScroll
bbb) ImeMode
ccc) InvokeRequired
ddd) IsAccessible
eee) IsDisposed
fff) IsHandleCreated
ggg) Left
hhh) Location
iii) Name
jjj) Parent
kkk) ParentForm
lll) ProductName
mmm) ProductVersion
nnn) RecreatingHandle
ooo) Region
ppp) RenderRightToLeft
qqq) ResizeRedraw
rrr) Right
sss) RightToLeft
ttt) ShowFocusCues
uuu) ShowKeyboardCues
vvv) Site
www) Size
xxx) TabIndex
yyy) TabStop
zzz) Tag
aaaa) Text
bbbb) ToString Description cccc) Top
dddd) TopLevelControl
eeee) Visible
ffff) VScroll
gggg) Width
hhhh) WindowTarget
iiii) ToString Description Occurs before the control becomes visible for the first time.

You can use this event to perform tasks such as allocating resources used by the control.

jjjj) OnCreateControl

[C#] protected override void OnCreateControl( );

[C++] protected: void OnCreateControl( );

[VB] Overrides Protected Sub OnCreateControl( )

[JScript] protected override function OnCreateControl( );

Description

Raises the CreateControl event.

Raising an event invokes the event handler through a delegate. For more information, see.

kkkk) OnLoad

[C#] protected virtual void OnLoad(EventArgs e);

[C++] protected: virtual void OnLoad(EventArgs* e);

[VB] Overridable Protected Sub OnLoad(ByVal e As Event Args)

[JScript] protected function OnLoad(e: EventArgs);

Description

Raises the System.Windows.Forms.UserControl. Load event.

The System.Windows.Forms.UserControl.Load event occurs after the control is created, but before the control becomes visible for the first time. An System.EventArgs that contains the event data.

llll) OnMouseDown

[C#] protected override void OnMouseDown(MouseEvent Args e);

[C++] protected: void OnMouseDown(MouseEventArgs* e);

[VB] Overrides Protected Sub OnMouseDown(ByVal e As MouseEventArgs)

[JScript] protected override function OnMouseDown(e: MouseEventArgs);

Description mmmm) WndProc

[C#] protected override void WndProc(ref Message m);

[C++] protected: void WndProc(Message* m);

[VB] Overrides Protected Sub WndProc(ByRef m As Message)

[JScript] protected override function WndProc(m: Message);

Description

View enumeration (System.Windows.Forms)

a) WndProc

Description

Specifies how list items are displayed in a System.Windows. Forms.ListView control.

Use the members of this enumeration to set the value of the System.Windows.Forms.ListView.View property of the System.Windows.Forms.ListView control.

b) WndProc

[C#] public const View Details;

[C++] public: const View Details;

[VB] Public Const Details As View

[JScript] public var Details View;

Description

Each item appears on a separate line with further information about each item arranged in columns. The left most column contains a small icon and label, and subsequent columns contain sub items as specified by the application. A column displays a header which can display a caption for the column. The user can resize each column at runtime.

c) WndProc

[C#] public const View LargeIcon;

[C++] public: const View LargeIcon;

[VB] Public Const LargeIcon As View

[JScript] public var LargeIcon: View;

Description

Each item appears as a full-sized icon with a label below it.

d) WndProc

[C#] public const View List;

[C++] public: const View List;

[VB] Public Const List As View

[JScript] public var List: View;

Description

Each item appears as a small icon with a label to its right. Items are arranged in columns with no column headers.

e) WndProc

[C#] public const View SmallIcon;

[C++] public: const View SmallIcon;

[VB] Public Const SmallIcon As View

[JScript] public var SmallIcon View;

Description

Each item appears as a small icon with a label to its right.

VScrollBar class (System.Windows.Forms)

a) ToString

Description

Represents a standard Windows vertical scroll bar.

Most controls that need scroll bars already provide them and do not require this control. This is true of a multi-line System.Windows.Forms.TextBox control, a System.Windows.Forms.ListBox, and a System.Windows.Forms.ComboBox, for example.

b) VScrollBar

Example Syntax:

c) ToString

[C#] public VScrollBar( );

[C++] public: VScrollBar( );

[VB] Public Sub New( )

[JScript] public function VScrollBar( );

d) AccessibilityObject e) AccessibleDefaultActionDescription j) AccessibleDescription g) AccessibleName h) AccessibleRole i) AllowDrop j) Anchor k) BackColor l) BackgroundImage m) BindingContext n) Bottom o) Bounds p) CanFocus q) CanSelect r) Capture s) CausesValidation t) ClientRectangle u) ClientSize v) CompanyName w) Container x) ContainsFocus y) ContextMenu z) Controls aa) Created bb) CreateParams cc) ToString Description Returns the parameters needed to create the handle. Inheriting classes can override this to provide extra functionality. They should not, however, forget to call base.getCreateParams( ) first to get the struct filled up with the basic info.

dd) Cursor ee) DataBindings ff) DefaultImeMode gg) DefaultSize hh) ToString

Description

Figure 4:
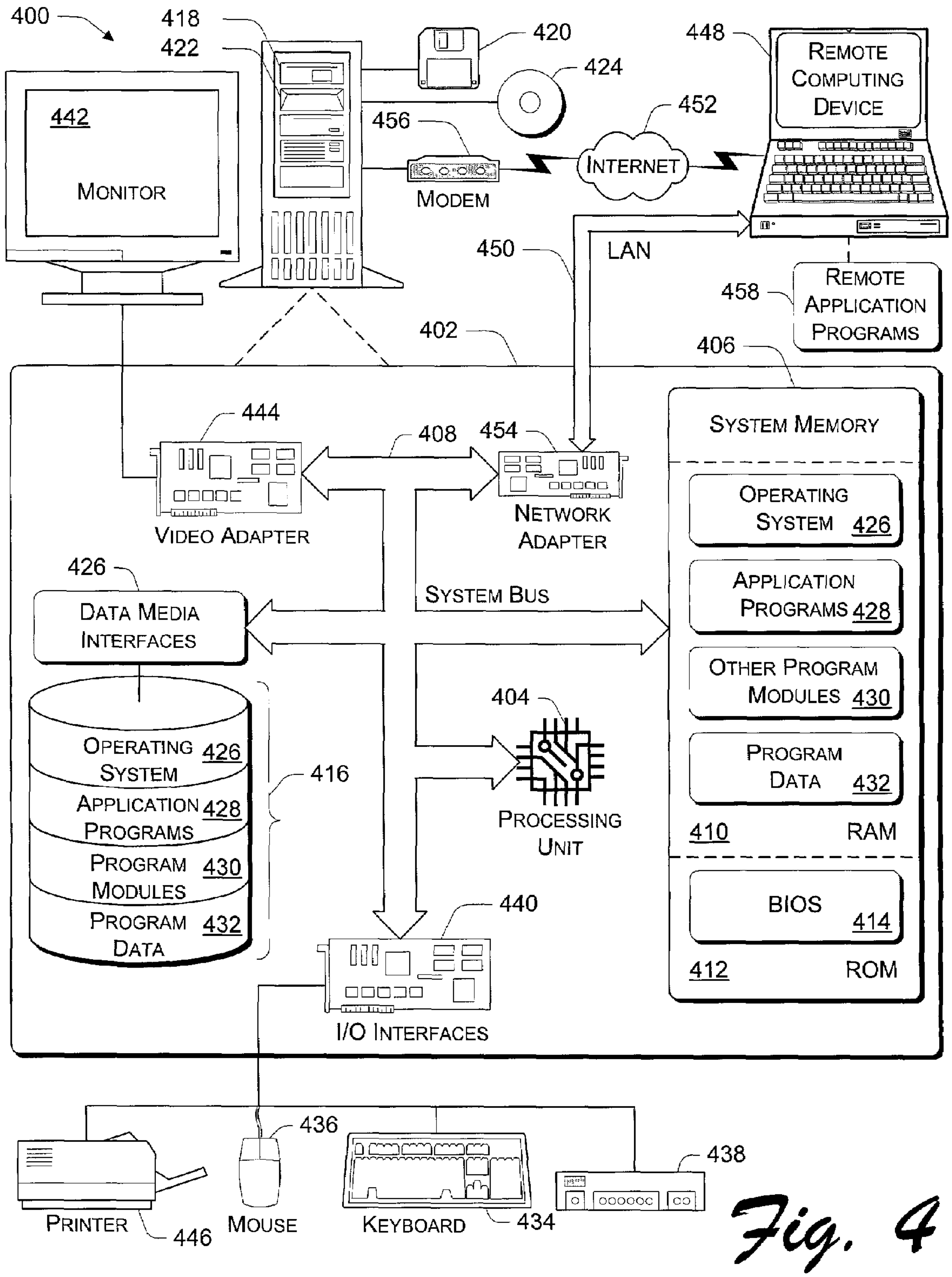
FIG. 4 is a block diagram of an exemplary computer that may execute all or part of the software architecture.

Deriving classes can override this to configure a default size for their control. This is more efficient than setting the size in the control's construct Exemplary Computing System and Environment FIG. 4 illustrates an example of a suitable computing environment 400 within which the programming framework 132 may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The framework 132 may be implemented with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on.

The framework 132 may be described in the general context of computer-executable instructions, such as program modules, being executed by one or more computers or other devices. Generally, program modules include routines, programs, objects, components, data structures, etc. that perform particular tasks or implement particular abstract data types. The framework 132 may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing device in the form of a computer 402. The components of computer 402 can include, by are not limited to, one or more processors or processing units 404, a system memory 406, and a system bus 408 that couples various system components including the processor 404 to the system memory 406.

The system bus 408 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of the operating system 426, one or more application programs 428, other program modules 430, and program data 432 (or some combination thereof) may include elements of the programming framework 132.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and so on. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

An implementation of the framework 132, and particularly, the API 142 or calls made to the API 142, may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A software architecture embodied on one or more computer-readable storage media, the software architecture executed by a computing device for a distributed computing system comprising:

an application configured to handle requests submitted by remote devices over a network; and a multi-tiered framework comprising:

an application program interface layer organized into multiple root namespaces, the application program interface layer to present functions used by the application to access network and computing resources of the distributed computing system;

a common language runtime layer, wherein calls to the application program interface layer are handed to the common language runtime layer supporting applications written in a plurality of different languages and translated into an intermediate supported language, the application program interface layer comprising various types related to constructing user interfaces, wherein the types define a collection of classes, interfaces, delegates, enumerations, and structures which belong to a group assigned a group name associated with one of the root namespaces, and wherein each of the types is referenced by a hierarchical name comprising a top level identifier prefixed to the group name;

an operating system layer or an object model service, wherein the calls handed to the common language runtime layer are executed locally by the operating system layer or the object model service; and a common language specification for local execution by the operating system layer or the object model service, wherein the common language specification provides an ability to use a particular code module written in a first programming language with a code module written in a second programming language.

2. A software architecture as recited in claim 1, wherein the distributed computing system comprises client devices and server devices that handle requests from the client devices, the remote devices comprising at least one client device.

3. A software architecture as recited in claim 1, wherein the distributed computing system comprises client devices and server devices that handle requests from the client devices, the remote devices comprising at least one server device that is configured as a Web server.

4. A software architecture as recited in claim 1, wherein the various types comprise classes, interfaces, delegates, structures and enumerations.

5. A multi-tiered architecture including an application program interface layer embodied on one or more computer readable storage media, comprising:

multiple types related to constructing user interfaces;

individual types being associated with one or more groups and being referenced by one or more hierarchical names, wherein each hierarchical name includes a top level identifier prefixed to a group name assigned to one of the one or more groups, the types comprising:

classes which represent managed heap allocated data that has reference assignment semantics;

interfaces that define a contract that other types can implement;

delegates that are object oriented function pointers; and structures that represent static allocated data that has value assignment semantics and enumerations which are value types that represent named constants;

wherein the application program interface layer is associated with:

a common language runtime layer supporting applications written in a plurality of different languages and translated into an intermediate language supported by the common runtime layer; and a common language specification for local execution by an operating system or an object model service, wherein the common language specification provides the ability to use a particular code module written in a first programming language with a code module written in a second programming language.

6. An application program interface as recited in claim 5, wherein the classes comprise a forms class that represents a window or a dialog box that makes up an application's user interface.

7. An application program interface as recited in claim 6, wherein the forms class has multiple members comprising one or more of: public static properties, public static methods, public instance constructors, public instance methods, public instance properties, public instance events, protected instance properties, and protected instance methods.

8. An application program interface as recited in claim 5, wherein the type comprising the interfaces comprises a button control interface that allows a control to act like a button on a form.

9. An application program interface as recited in claim 5, wherein the type comprising the interfaces comprises a container control interface that provides functionality for a control to act as a parent for other controls.

10. An application program interface as recited in claim 5, wherein the type comprising the interfaces comprises an editing notification interface.

11. An application program interface as recited in claim 5, wherein the type comprising the interfaces comprises a data object interface that provides a format independent mechanism for transferring data.

12. An application program interface as recited in claim 5, wherein the type comprising the interfaces comprises a feature support interface that specifies a standard interface for retrieving feature information from a current system.

13. An application program interface as recited in claim 5, wherein the type comprising the interfaces comprises a message filter interface.

14. An application program interface as recited in claim 5, wherein the type comprising the interfaces comprises a handle-exposing interface to expose handles.

15. An application program interface as recited in claim 5, wherein the type comprising the interfaces comprises one or more of the following interfaces:

a button control interface that allows a control to act like a button on a form;

a container control interface that provides functionality for a control to act as a parent for other controls;

an editing notification interface;

a data object interface that provides a format independent mechanism for transferring data;

a feature support interface that specifies a standard interface for retrieving feature information from a current system;

a message filter interface; and a handle-exposing interface to expose handles.

16. A distributed computer software architecture embodied on one or more computer-readable storage media, the distributed computer software architecture comprising:

one or more applications configured to be executed on one or more computing devices, the applications handling requests submitted from remote computing devices;

a networking platform to support the one or more applications;

an application programming interface to interface the one or more applications with the networking platform, the application programming interface comprising various types related to constructing user interfaces, individual types being associated with one or more groups and being referenced by one or more hierarchical names, wherein each of the hierarchical names includes a top level identifier prefixed to a group name assigned to one of the one or more groups; and a common language runtime layer supporting applications written in a plurality of different languages and translated into an intermediate language supported by the common runtime layer; and a common language specification for local execution by an operating system or an object model service, wherein the common language specification provides an ability to use a particular code module written in a first programming language with a code module written in a second programming language.

17. A distributed computer software architecture as recited in claim 16, wherein the various types comprise classes, interfaces, delegates, structures and enumerations.

18. A distributed computer software architecture as recited in claim 17, wherein the classes comprises a forms class that represents a window or a dialog box that makes up an application's user interface.

19. A distributed computer software architecture as recited in claim 18, wherein the forms class has multiple members comprising one or more of: public static properties, public static methods, public instance constructors, public instance methods, public instance properties, public instance events, protected instance properties, and protected instance methods.

20. A distributed computer software architecture as recited in claim 17, wherein the type comprising the interfaces comprises a button control interface that allows a control to act like a button on a form.

21. A distributed computer software architecture as recited in claim 17, wherein the type comprising the interfaces comprises a container control interface that provides functionality for a control to act as a parent for other controls.

22. A distributed computer software architecture as recited in claim 17, wherein the type comprising the interfaces comprises an editing notification interface.

23. A distributed computer software architecture as recited in claim 17, wherein the type comprising the interfaces comprises a data object interface that provides a format independent mechanism for transferring data.

24. A distributed computer software architecture as recited in claim 17, wherein the type comprising the interfaces comprises a feature support interface that specifies a standard interface for retrieving feature information from a current system.

25. A distributed computer software architecture as recited in claim 17, wherein the type comprising the interfaces comprises a message filter interface.

26. A distributed computer software architecture as recited in claim 17, wherein the type comprising the interfaces comprises a handle-exposing interface to expose handles.

27. A distributed computer software architecture as recited in claim 17, wherein the type comprising the interfaces comprises one or more of the following interfaces:

a button control interface that allows a control to act like a button on a form;

a container control interface that provides functionality for a control to act as a parent for other controls;

an editing notification interface;

a data object interface that provides a format independent mechanism for transferring data;

a feature support interface that specifies a standard interface for retrieving feature information from a current system;

a message filter interface; and a handle-exposing interface to expose handles.

28. A computer system including one or more microprocessors and one or more software programs stored on one or more computer-readable storage media, the one or more software programs utilizing an application program interface to request services from an operating system, the application program interface including separate commands to request services comprising services related to constructing user interfaces, wherein the application program interface groups API functions into multiple namespaces that define a collection of classes which represent managed heap allocated data that has reference assignment semantics, interfaces that define a contract that other types can implement, delegates that are object oriented function pointers, enumerations which are value types that represent named constants and structures that represent static allocated data that has value assignment semantics, the application program interface being associated with:

a common language runtime layer supporting applications written in a plurality of different languages and translated into an intermediate language supported by the common runtime layer; and a common language specification for local execution by an operating system or an object model service, wherein the common language specification provides an ability to use a particular code module written in a first programming language with a code module written in a second programming language; and wherein the type comprising the interfaces comprises one or more of the following interfaces:

a button control interface that allows a control to act like a button on a form;

a container control interface that provides functionality for a control to act as a parent for other controls;

an editing notification interface;

a data object interface that provides a format independent mechanism for transferring data;

a feature support interface that specifies a standard interface for retrieving feature information from a current system;

a message filter interface; or a handle-exposing interface to expose handles.

29. A method, comprising:

managing network and computing resources for a distributed computing system;

exposing a set of functions that enable developers to access the network and computing resources of the distributed computing system, the set of functions comprising functions to facilitate construction of user interfaces, wherein the user interfaces include windowing, menus, and dialogs, and wherein the functions are grouped into multiple namespaces that define a collection of classes which represent managed heap allocated data that has reference assignment semantics, interfaces that define a contract that other types can implement, delegates that are object oriented function pointers, enumerations which are value types that represent named constants and structures that represent static allocated data that has value assignment semantics;

using a common language runtime layer supporting applications written in a plurality of different languages and translated into an intermediate language supported by the common runtime layer; and using a common language specification for local execution by an operating system or an object model service, wherein the common language specification provides an ability to use a particular code module written in a first programming language with a code module written in a second programming language.

30. A method as recited in claim 29, further comprising receiving a request from a remote computing device, the request containing a call to the set of functions.

* * * * *